US012468304B1

(12) United States Patent
Ebrahimi Afrouzi et al.

(10) Patent No.: US 12,468,304 B1
(45) Date of Patent: Nov. 11, 2025

(54) VERSATILE MOBILE PLATFORM

(71) Applicants: Ali Ebrahimi Afrouzi, Henderson, NV (US); Lukas Fath, York (CA); Chen Zhang, Richmond (CA); Brian Highfill, Castro Valley, CA (US); Amin Ebrahimi Afrouzi, Encinitas, CA (US); Shahin Fathi Djalali, San Leandro, CA (US); Masih Ebrahimi Afrouzi, North Las Vegas, NV (US); Azadeh Afshar Bakooshli, Henderson, NV (US)

(72) Inventors: Ali Ebrahimi Afrouzi, Henderson, NV (US); Lukas Fath, York (CA); Chen Zhang, Richmond (CA); Brian Highfill, Castro Valley, CA (US); Amin Ebrahimi Afrouzi, Encinitas, CA (US); Shahin Fathi Djalali, San Leandro, CA (US); Masih Ebrahimi Afrouzi, North Las Vegas, NV (US); Azadeh Afshar Bakooshli, Henderson, NV (US)

(73) Assignee: AI Incorporated, Toronto (CA)

( * ) Notice: Subject to any disclaimer, the term of this patent is extended or adjusted under 35 U.S.C. 154(b) by 822 days.

(21) Appl. No.: 17/497,701

(22) Filed: Oct. 8, 2021

Related U.S. Application Data

(63) Continuation of application No. 16/509,099, filed on Jul. 11, 2019, now Pat. No. 11,199,853.

(Continued)

(51) Int. Cl.
*G05D 1/00* (2024.01)
*B25J 5/00* (2006.01)

(Continued)

(52) U.S. Cl.
CPC .............. *G05D 1/0246* (2013.01); *B25J 5/00* (2013.01); *B25J 11/0085* (2013.01); *B25J 13/006* (2013.01)

(58) Field of Classification Search
CPC ....... G05D 1/0246; B25J 5/00; B25J 11/0085; B25J 13/006
See application file for complete search history.

(56) References Cited

U.S. PATENT DOCUMENTS 6,781,338 B2 8/2004 Jones
7,211,980 B1 5/2007 Bruemmer
(Continued)

*Primary Examiner* — Khoi H Tran
*Assistant Examiner* — Nhi Q Bui

(57) ABSTRACT

Provided is a tangible, non-transitory, machine readable medium storing instructions that when executed by a processor effectuates operations including: capturing, with at least one exteroceptive sensor, readings of an environment and capturing, with at least one proprioceptive sensor, readings indicative of displacement of a wheeled device; estimating, with the processor using an ensemble of simulated positions of possible new locations of the wheeled device, the readings of the environment, and the readings indicative of displacement, a corrected position of the wheeled device to replace a last known position of the wheeled device; determining, by the processor using the readings of the exteroceptive sensor, a most feasible position of the wheeled device as the corrected position; and, transmitting, by the processor, status information of tasks performed by the wheeled device to an external processor, wherein the status information initiates a second wheeled device to perform a second task.

78 Claims, 334 Drawing Sheets

Related U.S. Application Data

(60) Provisional application No. 62/774,420, filed on Dec. 3, 2018, provisional application No. 62/772,026, filed on Nov. 27, 2018, provisional application No. 62/760,267, filed on Nov. 13, 2018, provisional application No. 62/756,896, filed on Nov. 7, 2018, provisional application No. 62/748,921, filed on Oct. 22, 2018, provisional application No. 62/748,943, filed on Oct. 22, 2018, provisional application No. 62/748,513, filed on Oct. 21, 2018, provisional application No. 62/746,688, filed on Oct. 17, 2018, provisional application No. 62/740,580, filed on Oct. 3, 2018, provisional application No. 62/740,558, filed on Oct. 3, 2018, provisional application No. 62/740,573, filed on Oct. 3, 2018, provisional application No. 62/739,738, filed on Oct. 1, 2018, provisional application No. 62/737,270, filed on Sep. 27, 2018, provisional application No. 62/737,576, filed on Sep. 27, 2018, provisional application No. 62/736,676, filed on Sep. 26, 2018, provisional application No. 62/736,239, filed on Sep. 25, 2018, provisional application No. 62/735,137, filed on Sep. 23, 2018, provisional application No. 62/731,740, filed on Sep. 14, 2018, provisional application No. 62/730,675, filed on Sep. 13, 2018, provisional application No. 62/729,015, filed on Sep. 10, 2018, provisional application No. 62/720,478, filed on Aug. 21, 2018, provisional application No. 62/720,521, filed on Aug. 21, 2018, provisional application No. 62/702,148, filed on Jul. 23, 2018, provisional application No. 62/699,582, filed on Jul. 17, 2018, provisional application No. 62/699,367, filed on Jul. 17, 2018, provisional application No. 62/699,101, filed on Jul. 17, 2018, provisional application No. 62/696,723, filed on Jul. 11, 2018.

(51) Int. Cl.
*B25J 11/00* (2006.01)
*B25J 13/00* (2006.01)

(56) References Cited

U.S. PATENT DOCUMENTS

| | | | | |
|---|---|---|---|---|
| 7,689,321 | B2 * | 3/2010 | Karlsson | G05D 1/0246 701/28 |
| 7,826,926 | B2 | 11/2010 | Myeong | |
| 7,957,836 | B2 | 6/2011 | Myeong | |
| 8,452,450 | B2 | 5/2013 | Dooley | |
| 9,427,874 | B1 | 8/2016 | Rublee | |
| 2004/0158354 | A1 | 8/2004 | Lee | |
| 2008/0075357 | A1 | 3/2008 | Yoon | |
| 2008/0232678 | A1 | 9/2008 | Yoon | |
| 2010/0152945 | A1 | 6/2010 | Park | |
| 2010/0256908 | A1 | 10/2010 | Shimshoni | |
| 2011/0082585 | A1 | 4/2011 | Sofman | |
| 2012/0213443 | A1 | 8/2012 | Shin | |
| 2012/0219207 | A1 * | 8/2012 | Shin | B25J 9/1697 901/50 |
| 2013/0138247 | A1 * | 5/2013 | Gutmann | G05D 1/028 901/1 |
| 2014/0129027 | A1 | 5/2014 | Schnittman | |
| 2014/0350839 | A1 * | 11/2014 | Pack | G05D 1/0231 901/1 |
| 2016/0129592 | A1 * | 5/2016 | Saboo | B25J 5/007 700/248 |
| 2019/0339711 | A1 * | 11/2019 | Kwak | G05D 1/028 |
| 2020/0338731 | A1 * | 10/2020 | Lynders | F16M 11/18 |

* cited by examiner

FIG. 20A
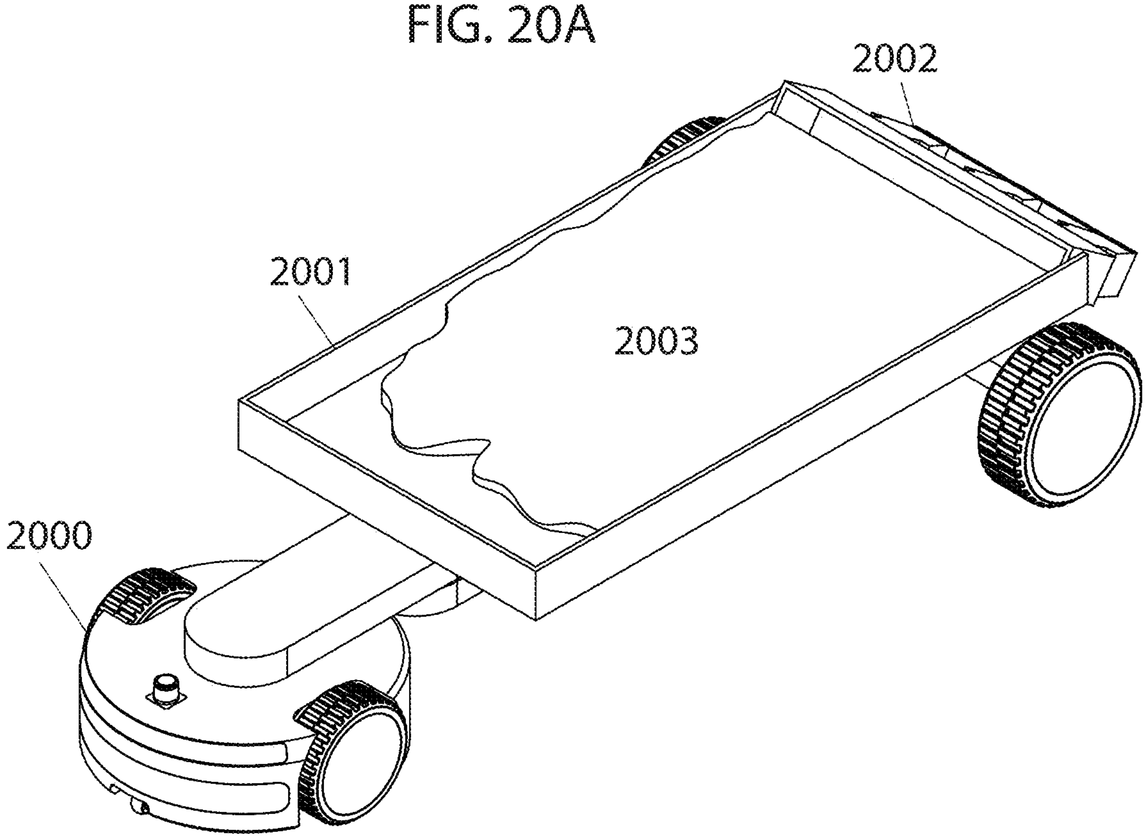
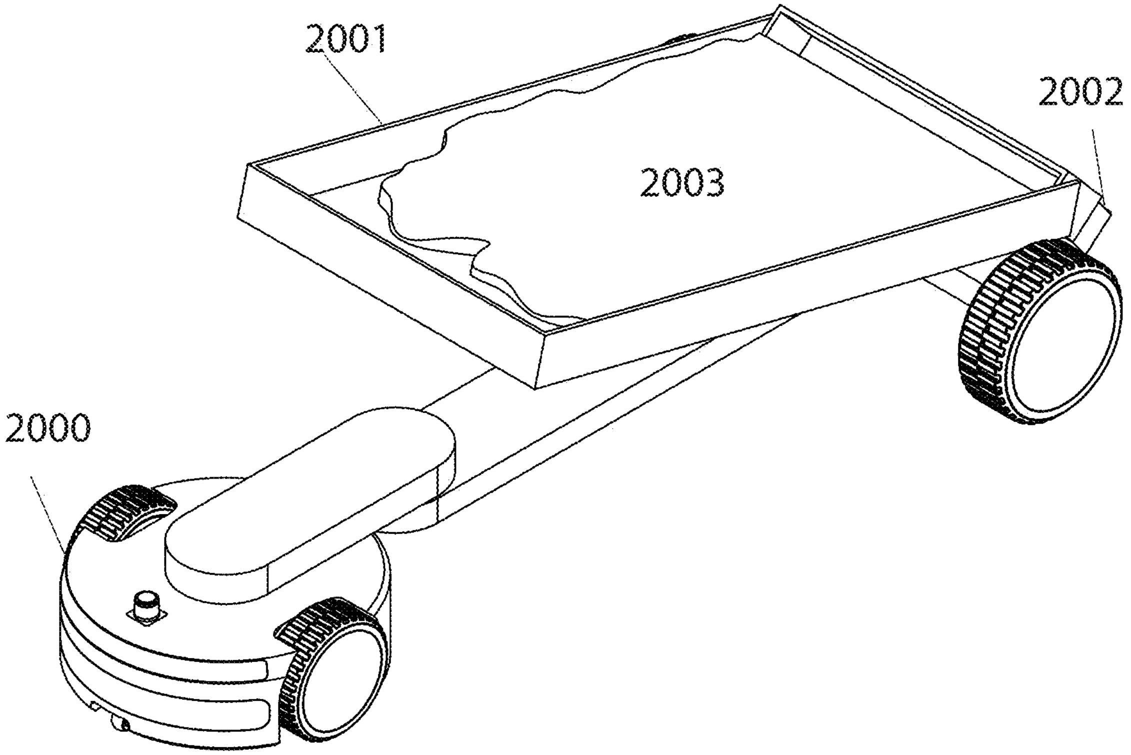

16900 16901 16902

Total Cost: 122

Total Cost: 104

Total Cost: 106

Total Cost: 104

Total Cost: 104

FIG. 236D
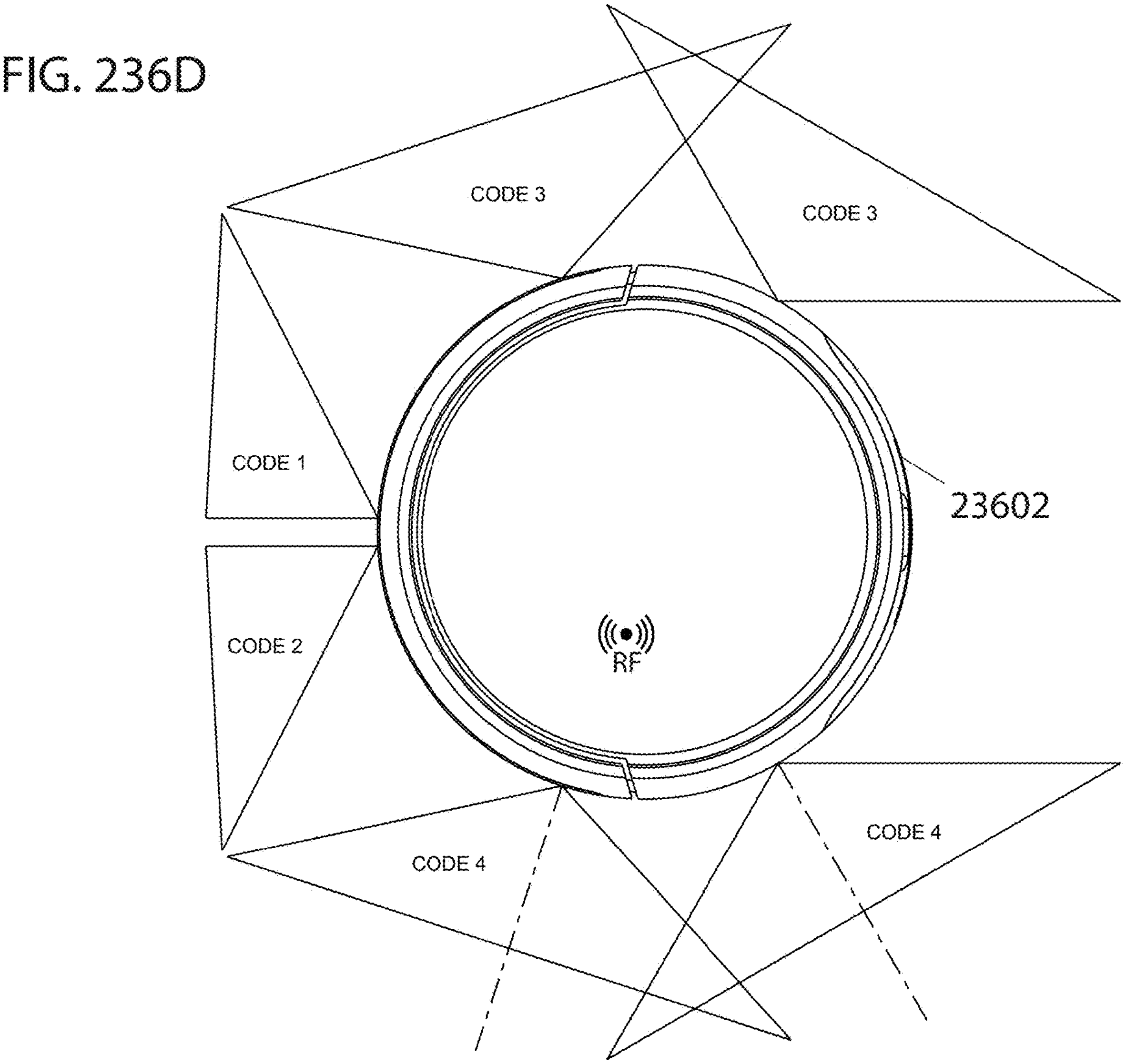
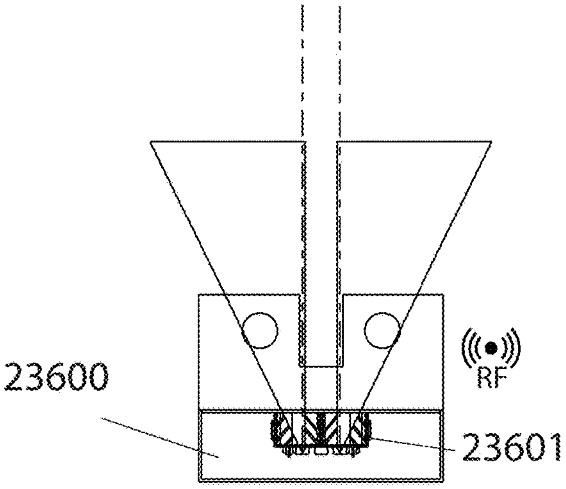

FIG. 236E
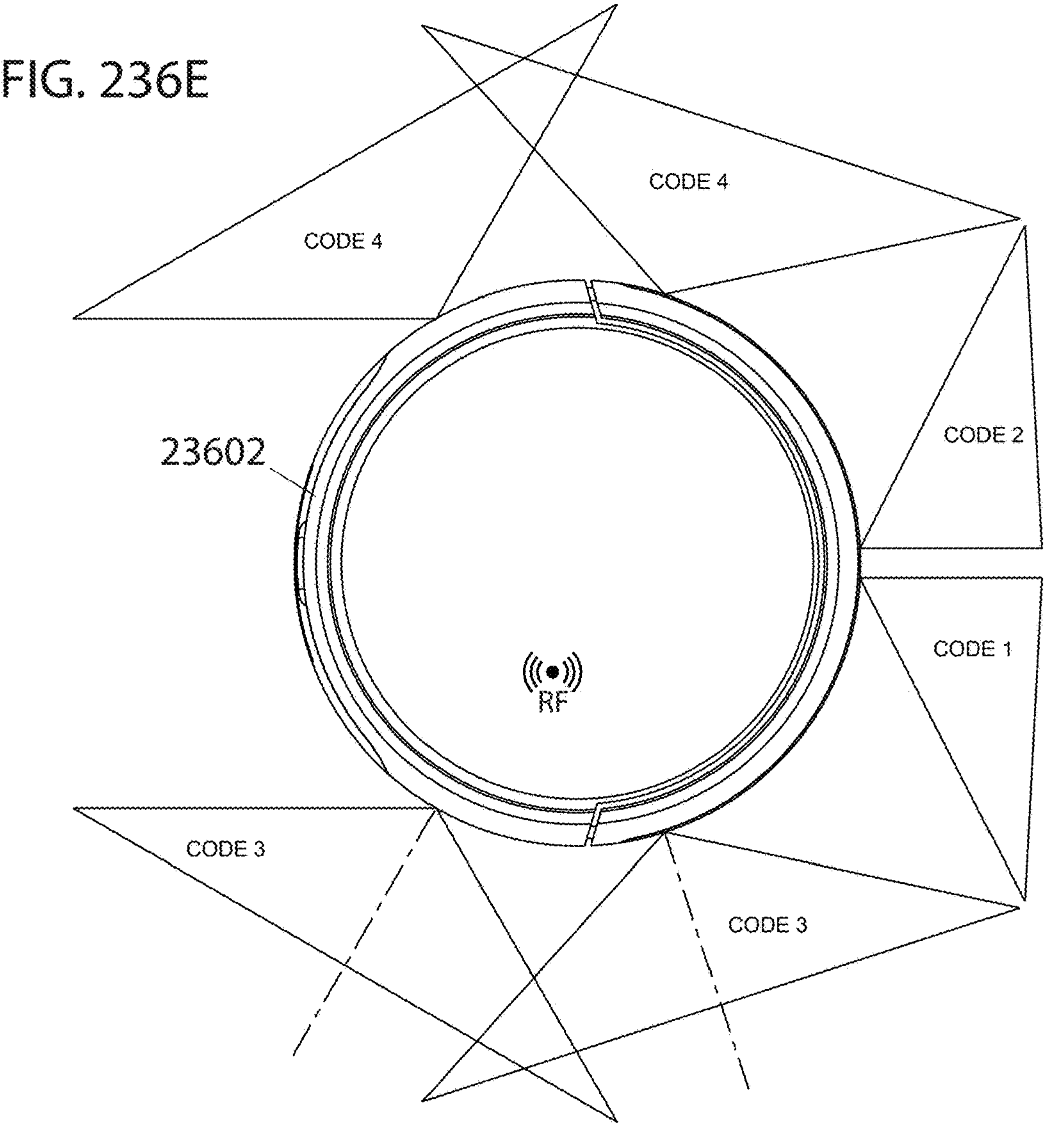
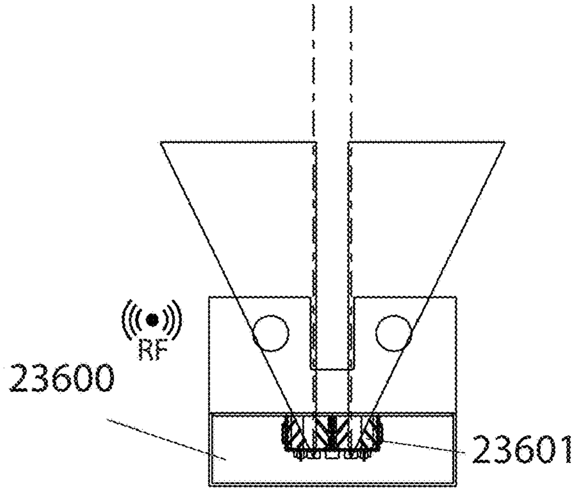

VERSATILE MOBILE PLATFORM

CROSS-REFERENCE TO RELATED APPLICATIONS

This application is a Continuation of U.S. Non-Provisional patent application Ser. No. 16/509,099, filed Jul. 11, 2019, which claims the benefit of Provisional Patent Application Nos. 62/746,688, filed Oct. 17, 2018, 62/740,573, filed Oct. 3, 2018, 62/740,580, filed Oct. 3, 2018, 62/702,148, filed Jul. 23, 2018, 62/699,101, filed Jul. 17, 2018, 62/720,478, filed Aug. 21, 2018, 62/720,521, filed Aug. 21, 2018, 62/735,137, filed Sep. 23, 2018, 62/740,558, filed Oct. 3, 2018, 62/696,723, filed Jul. 11, 2018, 62/736,676, filed Sep. 26, 2018, 62/699,367, filed Jul. 17, 2018, 62/699,582, filed Jul. 17, 2018, 62/729,015, filed Sep. 10, 2018, 62/730,675, filed Sep. 13, 2018, 62/736,239, filed Sep. 25, 2018, 62/737,270, filed Sep. 27, 2018, 62/739,738, filed Oct. 1, 2018, 62/748,943, filed Oct. 22, 2018, 62/756,896, filed Nov. 7, 2018, 62/772,026, filed Nov. 27, 2018, 62/774,420, filed Dec. 3, 2018, 62/748,513, filed Oct. 21, 2018, 62/748,921, filed Oct. 22, 2018, 62/731,740, filed Sep. 14, 2018, 62/760,267, Nov. 13, 2018, and 62/737,576, filed Sep. 27, 2018, each of which is hereby incorporated by reference.

In this patent, certain U.S. patents, U.S. patent applications, or other materials (e.g., articles) have been incorporated by reference. Specifically, U.S. Patent Application Nos. 62/746,688, 62/740,573, 62/740,580, 62/702,148, 62/699,101, 62/720,478, 62/720,521, 62/735,137, 62/740,558, 62/696,723, 62/736,676, 62/699,367, 62/699,582, 62/729,015, 62/730,675, 62/736,239, 62/737,270, 62/739,738, 62/748,943, 62/756,896, 62/772,026, 62/774,420, Ser. Nos. 15/272,752, 15/949,708, 16/048,179, 16/048,185, 16/163,541, 16/163,562, 16/163,508, 16/185,000, 16/109,617, 16/051,328, 15/449,660, 16/041,286, 15/406,890, 14/673,633, 16/163,530, 16/297,508, 15/614,284, 15/955,480, 15/425,130, 15/955,344, 15/243,783, 15/954,335, 15/954,410, 15/257,798, 15/674,310, 15/224,442, 15/683,255, 15/048,827, 14/817,952, 15/619,449, 16/198,393, 15/981,643, 15/986,670, 15/447,450, 15/447,623, 15/951,096, 16/270,489, 16/130,880, 14/948,620, 14/922,143, 15/878,228, 15/924,176, 16/024,263, 16/203,385, 15/647,472, 15/462,839, 16/239,410, 16/230,805, 16/129,757, 16/245,998, 16/353,019, 15/447,122, 16/393,921, 16/440,904, 15/673,176, 16/058,026, 14/970,791, 16/375,968, 15/432,722, 16/238,314, 14/941,385, 16/279,699, 16/041,470, 15/006,434, 14/850,219, 15/177,259, 15/792,169, 14/673,656, 15/676,902, 15/410,624, and 16/504,012 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to semi-autonomous and autonomous robotic devices.

BACKGROUND

Autonomous or semi-autonomous robots are increasingly used within consumer homes and commercial establishments. In several instances, robots are desirable for the convenience they provide to a user. For example, autonomous robots may be used to autonomously execute actions such as sweeping, mopping, dusting, scrubbing, power washing, transportation, towing, snow plowing, salt distribution, mining, surgery, delivery, painting, and other actions traditionally executed by humans themselves or human-operated machines. Autonomous robots may efficiently execute such actions using a map of an environment generated by the robot for navigation and localization of the robot. The map may be further used to optimize execution of actions by dividing the environment into subareas and choosing an optimal navigation path. With robots being increasingly used for multiple functions, a VMP robot that may be customized for multiple different applications may be advantageous.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a wheeled device, including: a chassis; a set of wheels coupled to the chassis; one or more electric motors for rotating the set of wheels; a plurality of modules for performing work coupled to the chassis; a processor electronically coupled to a plurality of sensors, including at least one exteroceptive sensor and at least one proprioceptive sensor; and a tangible, non-transitory, machine readable medium storing instructions that when executed by the processor effectuates operations including: capturing, with the at least one exteroceptive sensor, readings of the environment and capturing, with the at least one proprioceptive sensor, readings indicative of displacement of the wheeled device; estimating, with the processor using an ensemble of simulated positions of possible new locations of the wheeled device, the readings of the environment, and the readings indicative of displacement, a corrected position of the wheeled device to replace a last known position of the wheeled device, wherein: the processor loses or reduces knowledge of a current position of the wheeled device in relation to a global frame of reference of the environment of the wheeled device due to drift or slippage not reliably recordable by the at least one proprioceptive sensor when the wheeled device moves along a path from the last known position to a new intended position while performing a first task; and the processor estimates each simulated position by adding the readings captured by the at least one proprioceptive sensor to the last known position and at least one possible variation of error in the readings indicative of displacement of the wheeled device captured with the at least one proprioceptive sensor; determining, by the processor using the readings of the exteroceptive sensor, a most feasible position of the wheeled device as the corrected position; and transmitting, by the processor, status information of one or more tasks performed by the wheeled device to an external processor, wherein the status information initiates a second wheeled device to perform a second task.

Provided is a tangible, non-transitory, machine readable medium storing instructions that when executed by a processor effectuates operations including: capturing, with at least one exteroceptive sensor, readings of an environment and capturing, with at least one proprioceptive sensor, readings indicative of displacement of a wheeled device; estimating, with the processor using an ensemble of simulated positions of possible new locations of the wheeled device, the readings of the environment, and the readings indicative of displacement, a corrected position of the wheeled device to replace a last known position of the wheeled device, wherein: the processor loses or reduces knowledge of a current position of the wheeled device in relation to a global frame of reference of the environment of the wheeled device due to drift or slippage not reliably recordable by the at least one proprioceptive sensor when the wheeled device moves along a path from the last known position to a new intended position while performing a first task; and, the processor estimates each simulated position by adding the readings captured by the at least one proprioceptive sensor to the last known position and at least one possible variation of error in the readings indicative of displacement of the wheeled device captured with the at least one proprioceptive sensor; determining, by the processor using the readings of the exteroceptive sensor, a most feasible position of the wheeled device as the corrected position; and, transmitting, by the processor, status information of tasks performed by the wheeled device to an external processor, wherein the status information initiates a second wheeled device to perform a second task.

BRIEF DESCRIPTION OF THE DRAWINGS

FIGS. 20A and 20B illustrate an example of a VMP robot customized to function as a fertilizer dispensing robot, according to some embodiments.

FIGS. 42A-42C illustrate an example of a brush guard, according to some embodiments.

FIGS. 43A-43C illustrate an example of a housing, according to some embodiments.

FIGS. 44A-44C illustrate an example of a brush assembly, according to some embodiments.

FIGS. 120A-120C illustrate how an overlapping area is detected in some embodiments using raw pixel intensity data and the combination of data at overlapping points.

FIG. 121 illustrates an example of a set of readings taken with a depth sensor of a robotic device in some embodiments.

FIG. 122 illustrates a depth sensor of a robotic device measuring the distance to an object within an environment, as provided in some embodiments.

FIG. 123 illustrates an example of an adaptive threshold a processor of a robotic device uses in detecting an opening in a wall in some embodiments.

FIG. 124 illustrates an example of a probability density of an x-coordinate reading taken by a sensor of the robotic device in some embodiments.

FIG. 125 illustrates a depth sensor of a robotic device measuring a boundary and an opening in the wall of an environment in some embodiments.

FIGS. 126A and 126B illustrate a camera taking distance measurements of an enclosure within a first range of sight and resulting segment of a 2D boundary of the enclosure in some embodiments.

FIGS. 127A and 127B illustrate how a segment of a 2D boundary of an enclosure is constructed from distance measurements taken within successively overlapping range of sight in some embodiments.

FIG. 128 illustrates a complete 2D boundary of an enclosure constructed from distance measurements taken within successively overlapping range of sight in some embodiments.

FIGS. 129A-129D illustrate construction of an incomplete 2D boundary of an enclosure and the method for completing the incomplete 2D boundary of the enclosure in some embodiments.

FIGS. 129E-129F illustrate how an opening in the wall is used to segment an area into subareas in some embodiments.

FIGS. 130A-130D illustrate a process of identifying an opening in a wall separating two rooms as a doorway in some embodiments.

Figure 130A:
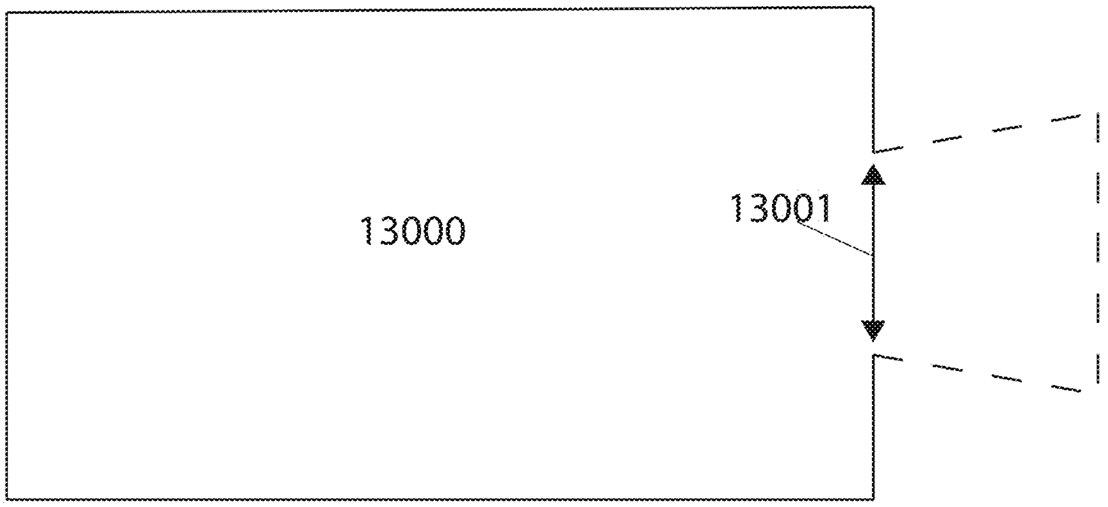
Figure 130B:
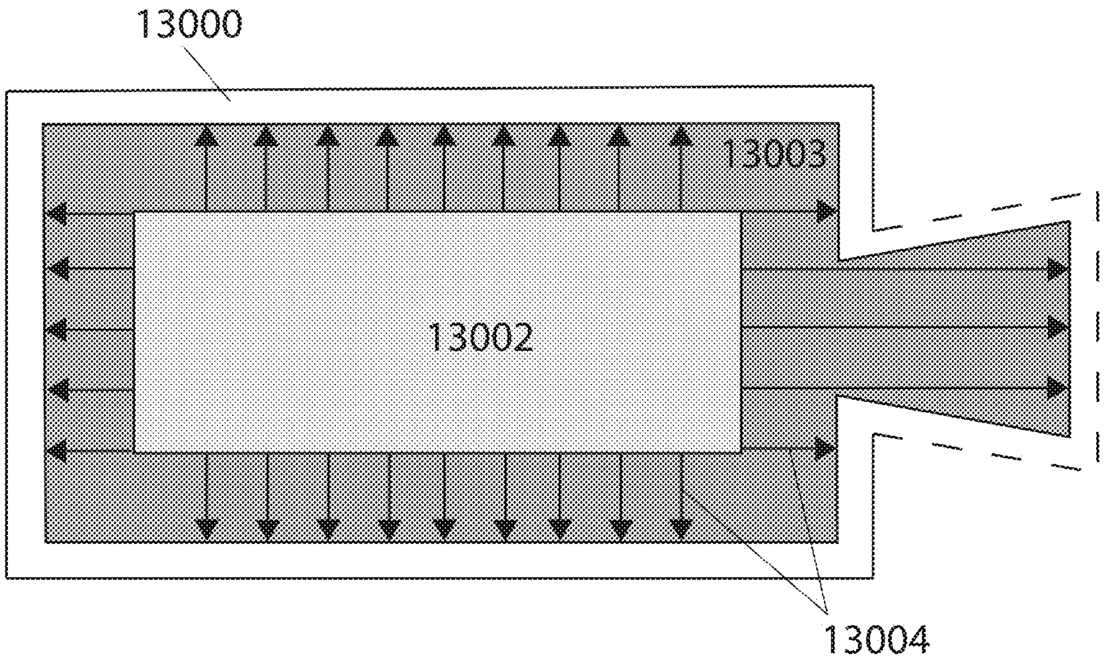
Figure 130C:
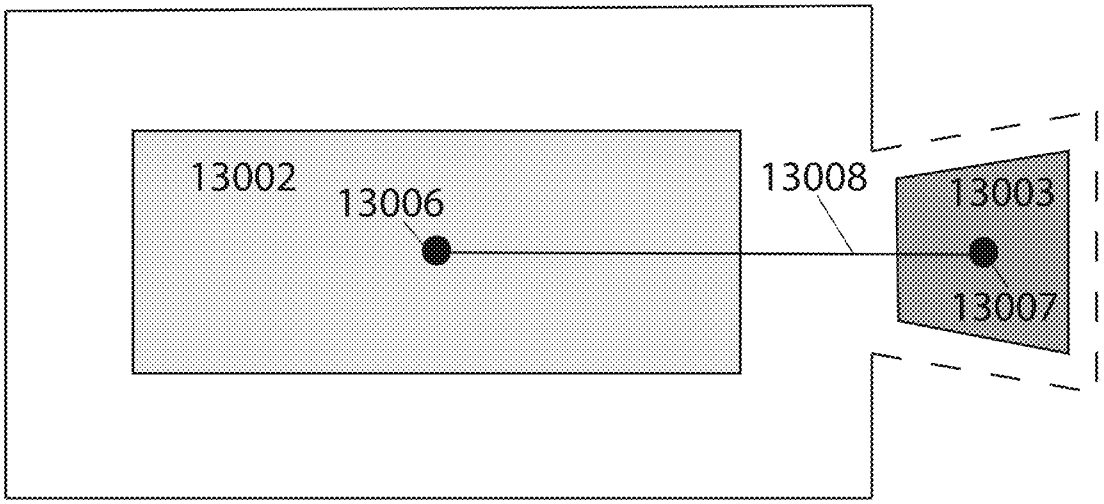
Figure 130D:
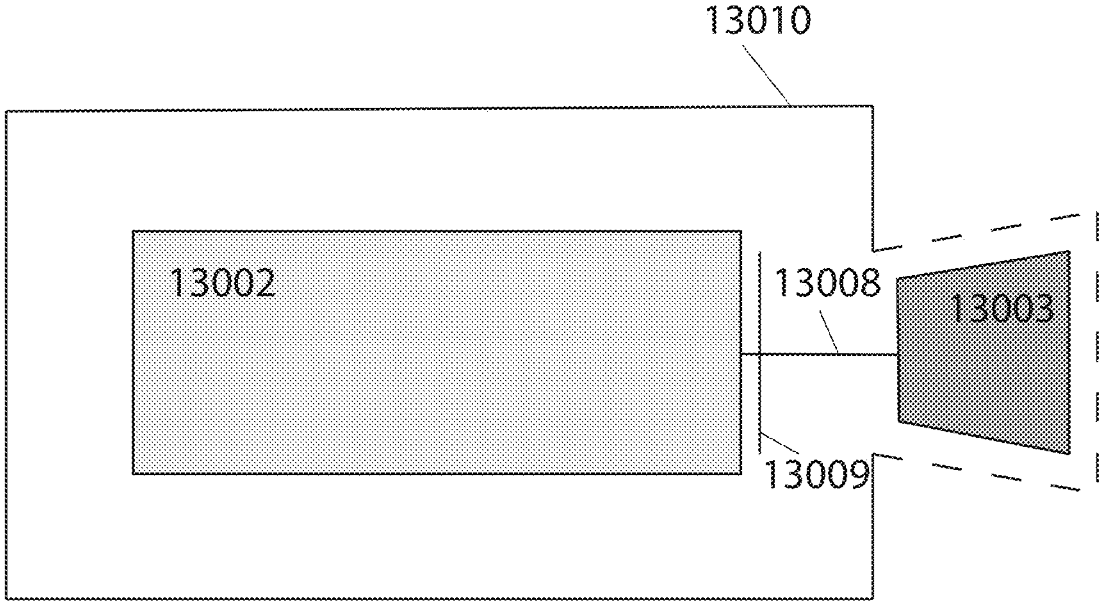
Figure 130E:
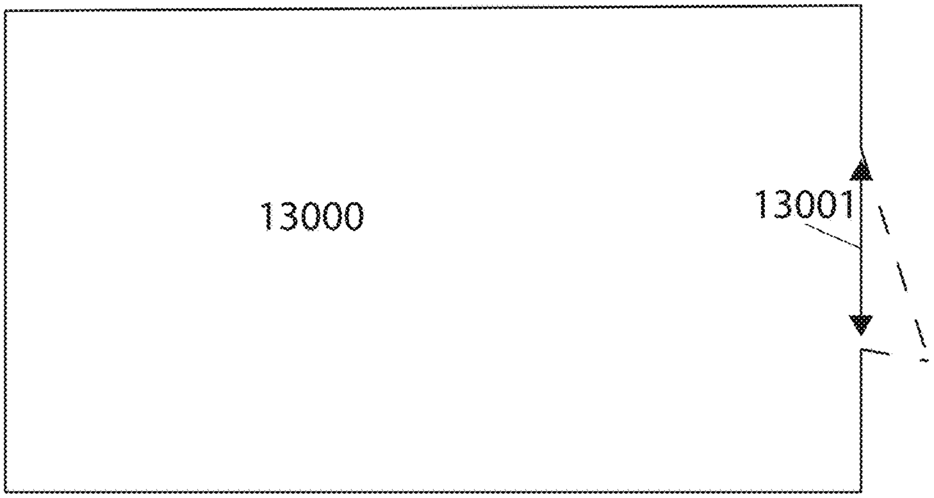
Figure 130F:
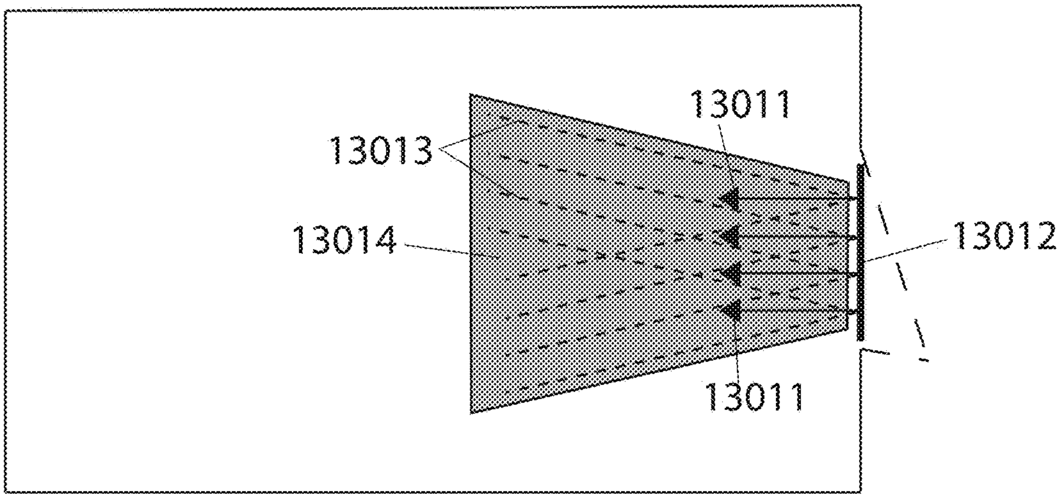
Figure 130G:
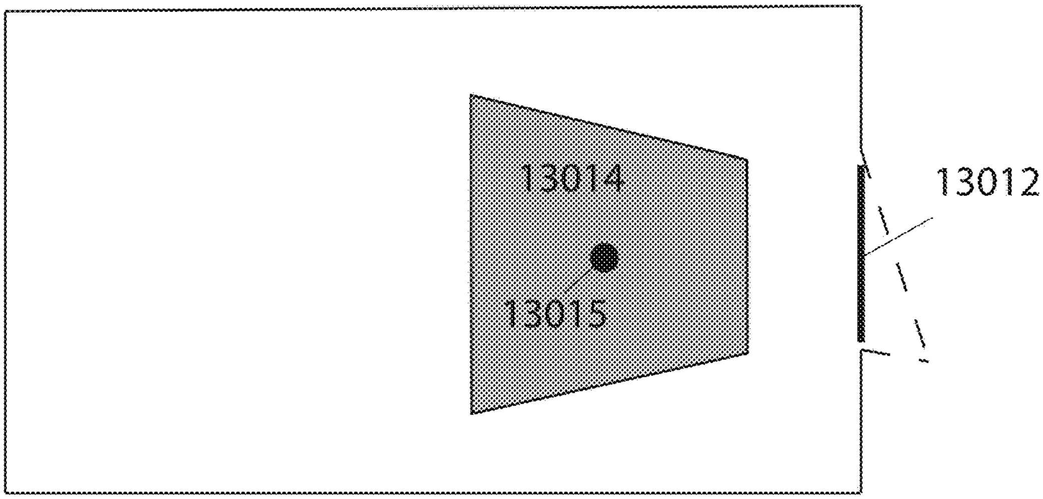

FIGS. 130E-130G illustrate the process of determining the location with best line of sight for discovering an opening in the wall and beyond in some embodiments.

Figure 131:
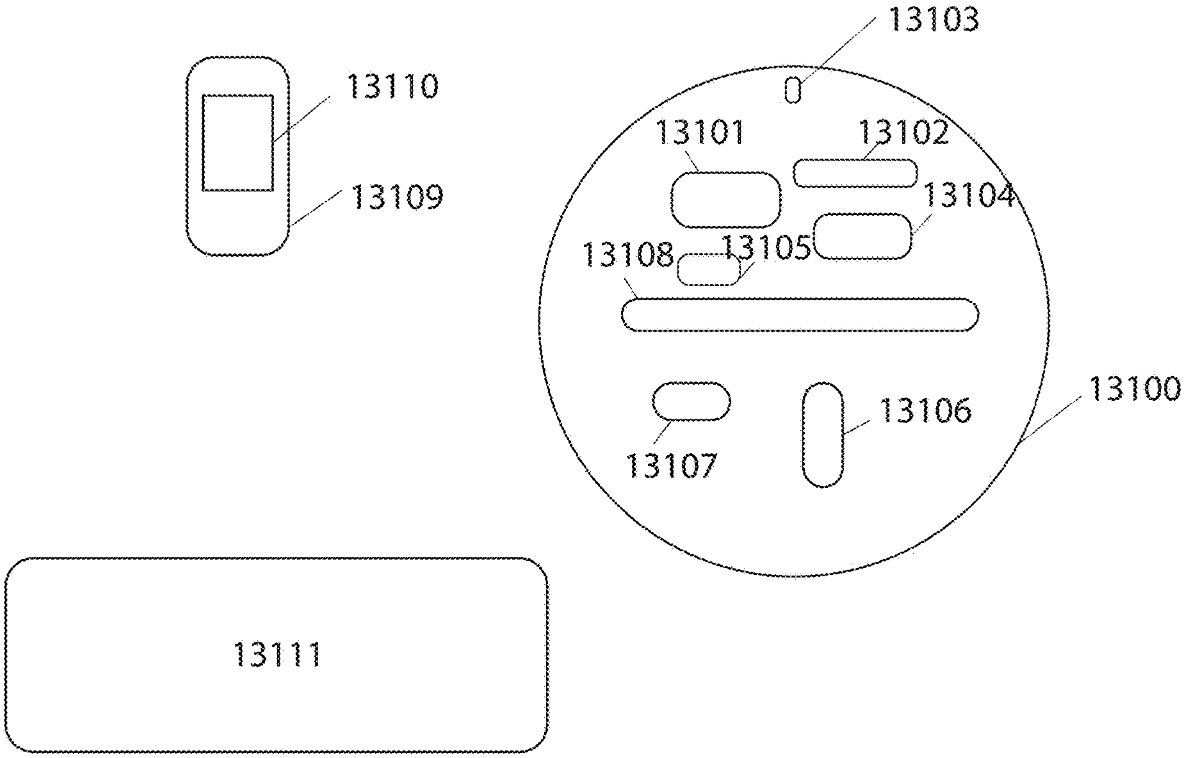

FIG. 131 is a schematic diagram of an example of a robot with which the present techniques may be implemented in some embodiments.

Figure 132:
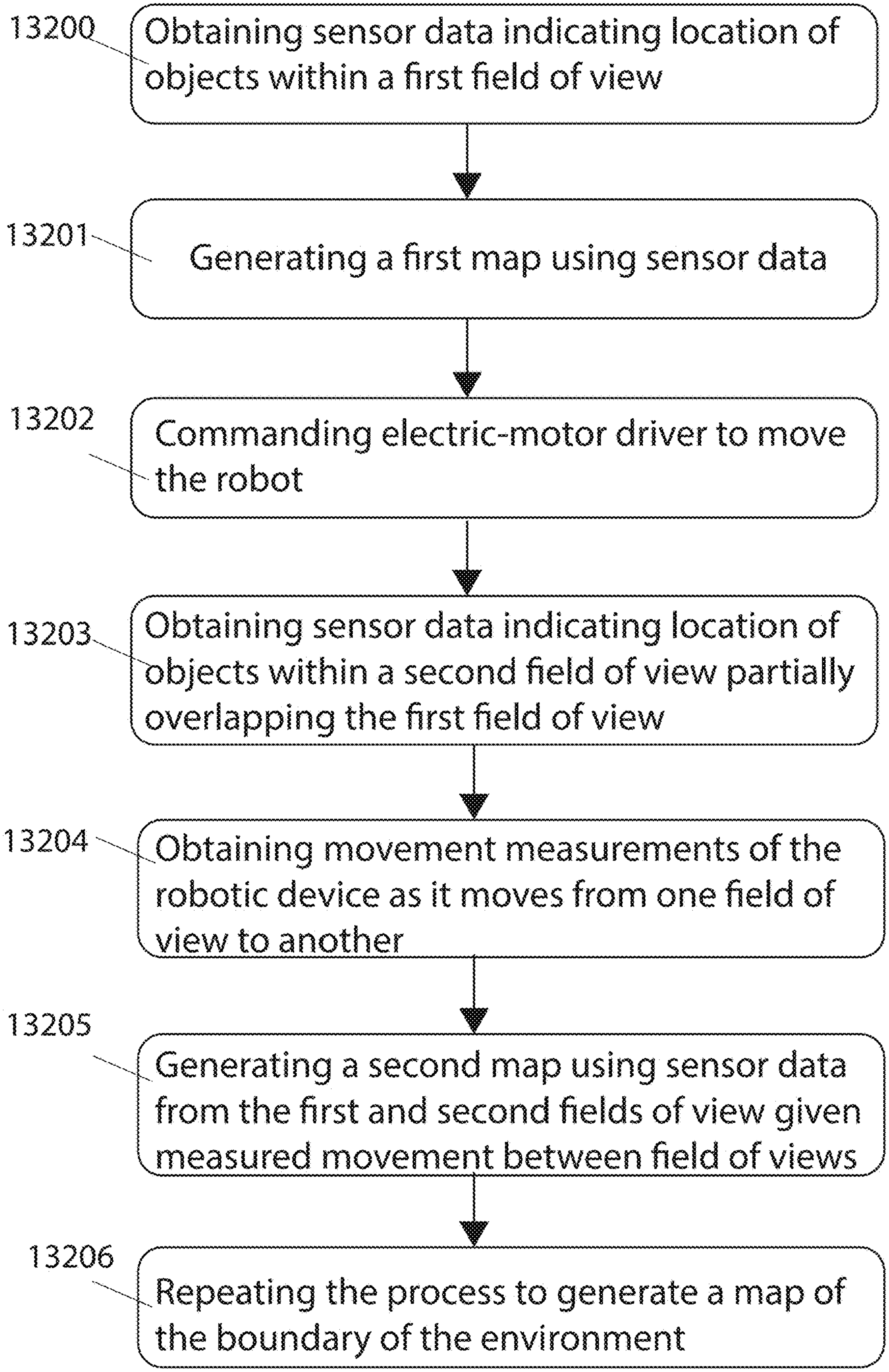

FIG. 132 is a flowchart describing an example of a method for finding the boundary of an environment in some embodiments.

Figure 133A:
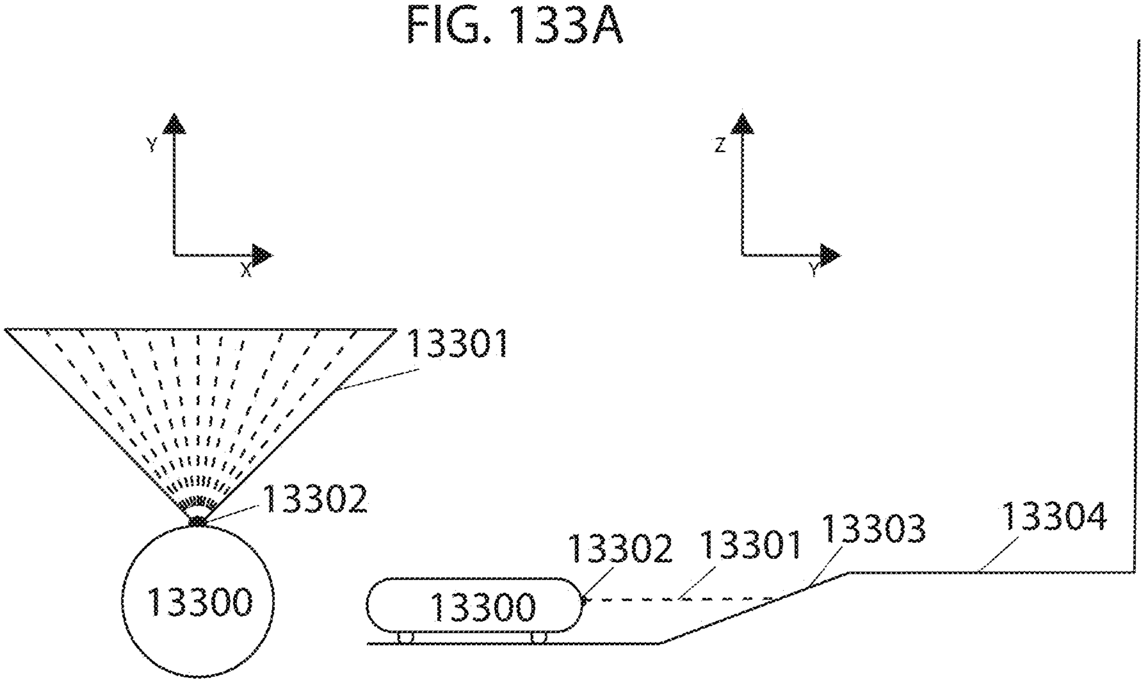
Figure 133B:
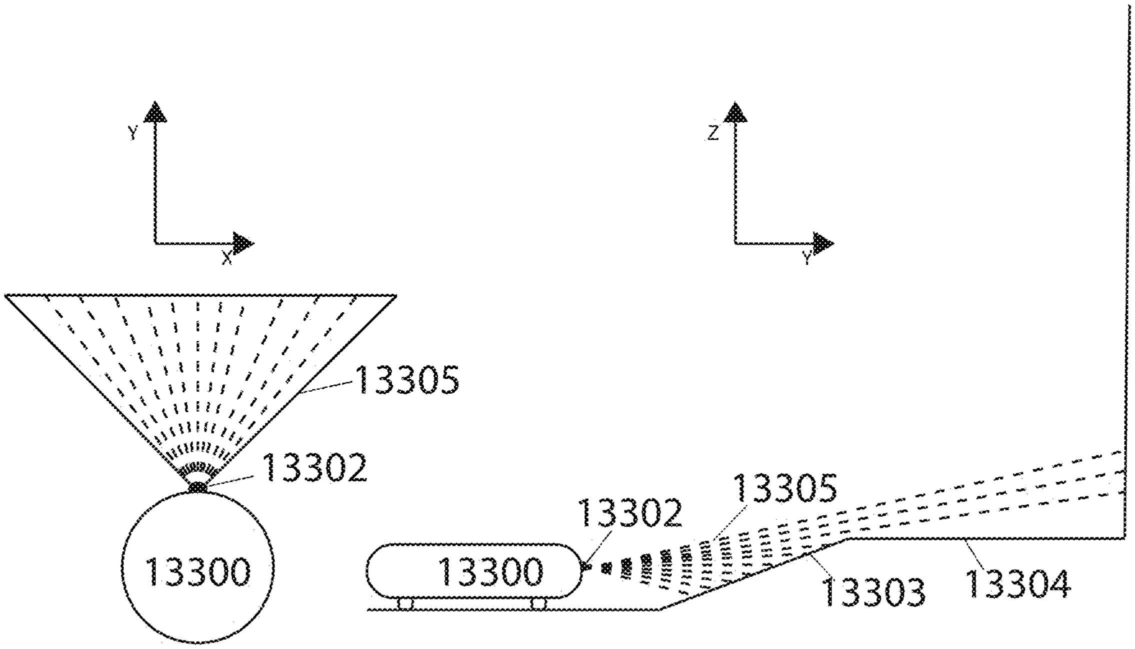

FIGS. 133A and 133B illustrate depth measurements taken in two dimensions and three dimensions, respectively, in some embodiments.

Figure 134:
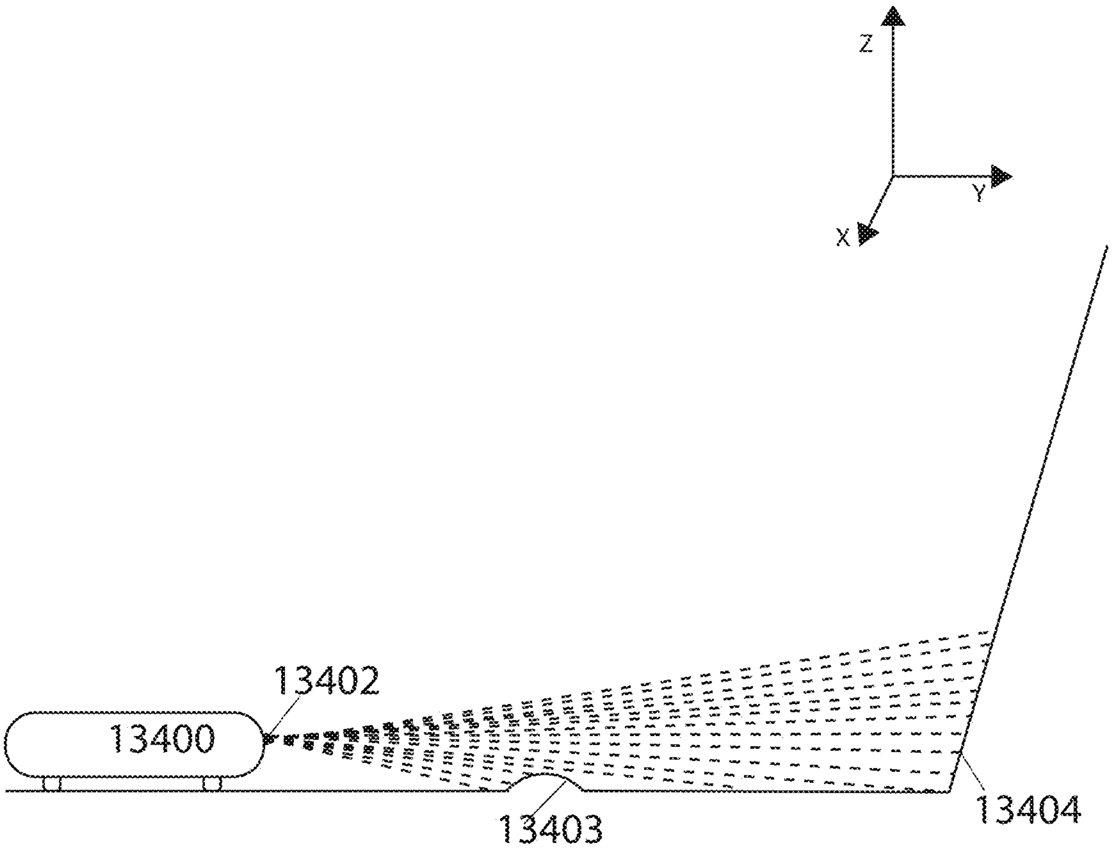

FIG. 134 illustrates an example of classifying a feature of an environment observed using a sensor of a robotic device in some embodiments.

Figure 135A:
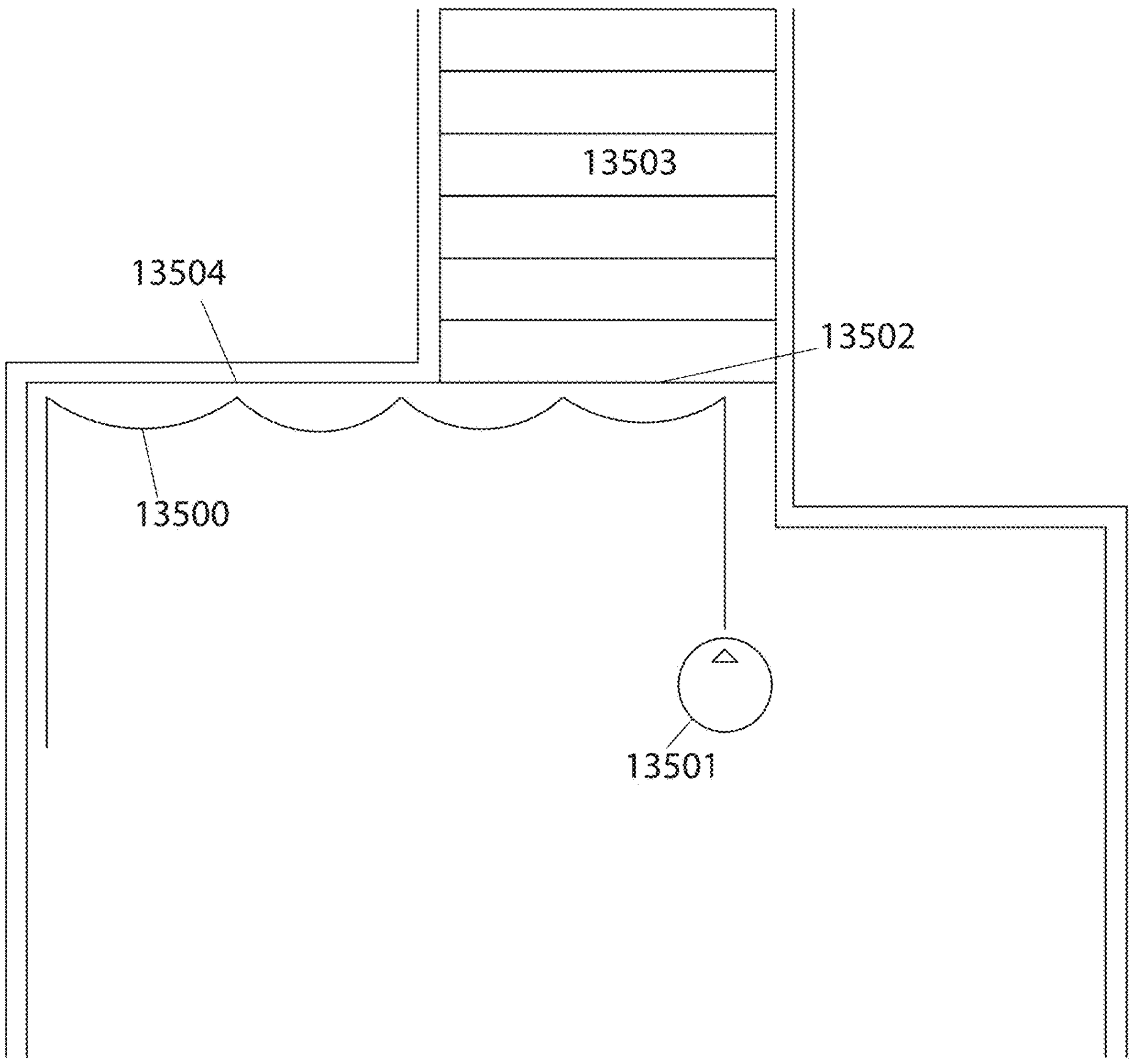
Figure 135B:
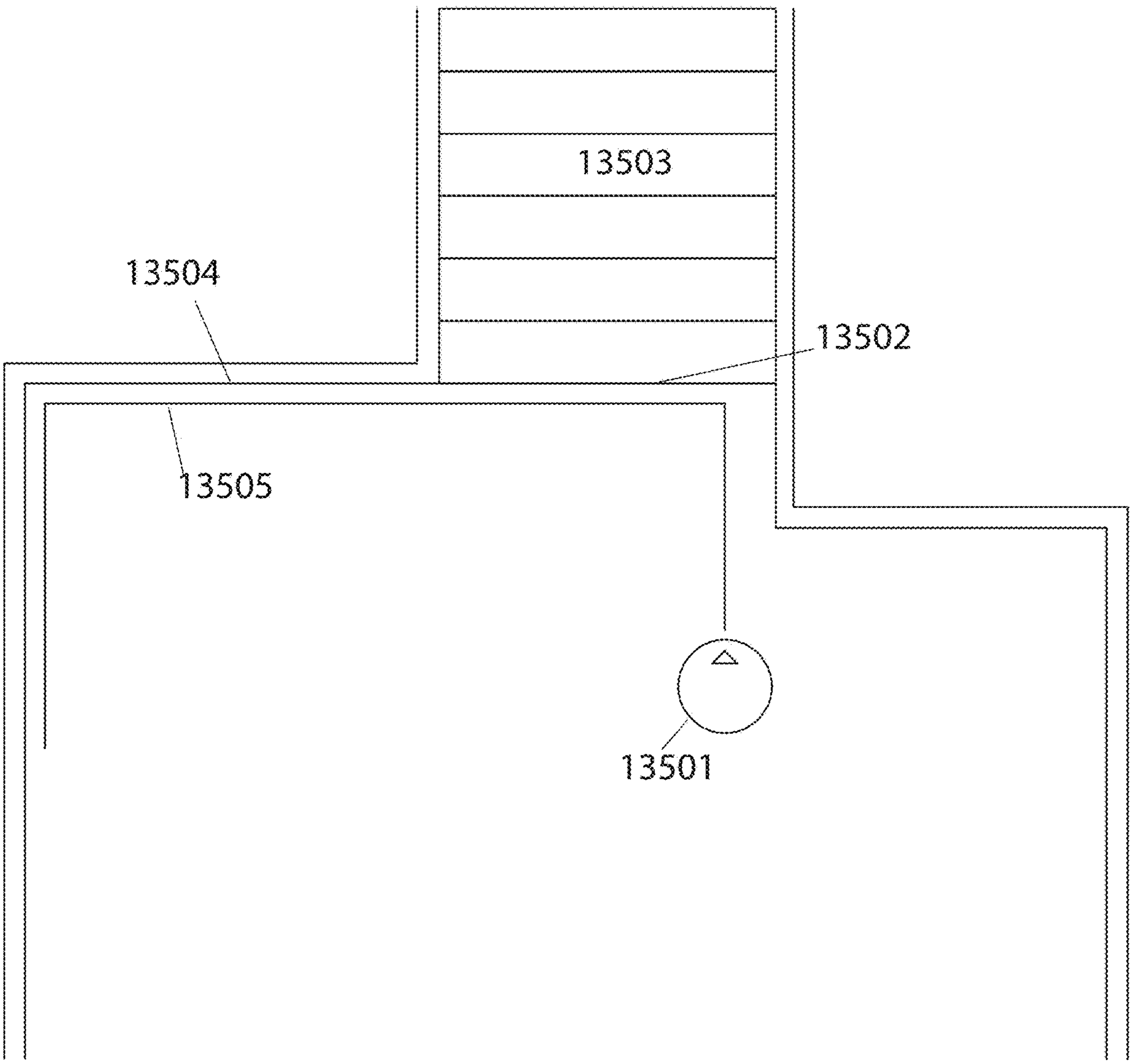
Figure 135C:
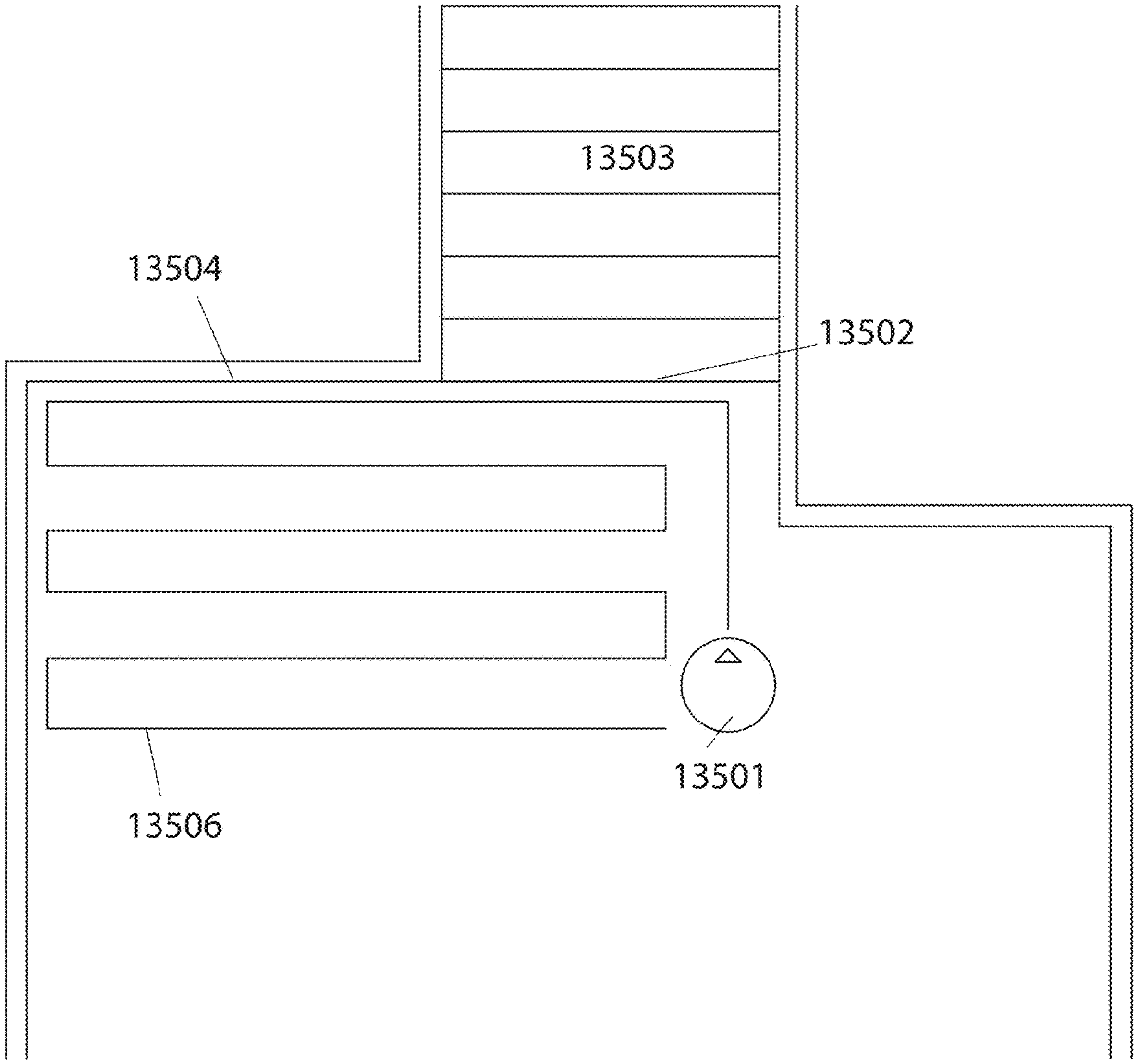

FIGS. 135A-135C illustrate an example of an evolution of a path of a VMP robot upon detecting an edge, according to some embodiments.

Figure 136A:
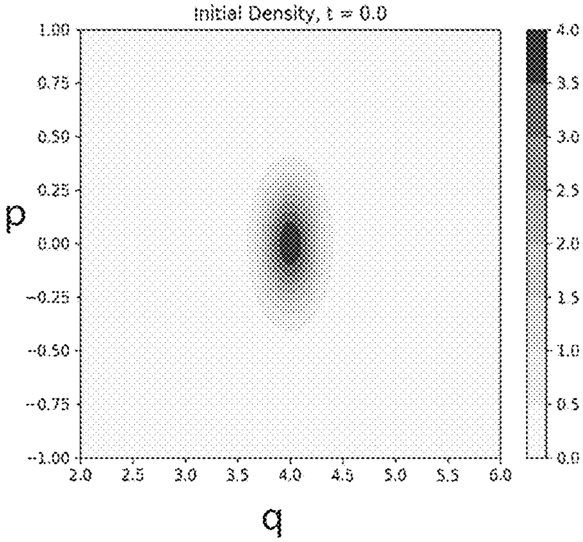

FIG. 136A illustrates an example of an initial phase space probability density of a robotic device, according to some embodiments.

Figure 136B:
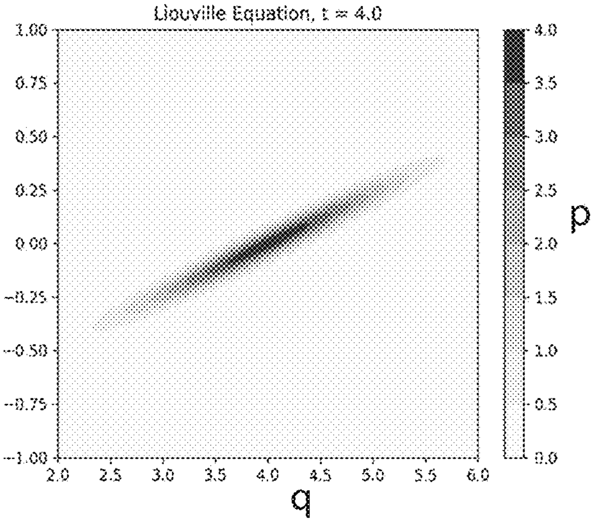
Figure 136C:
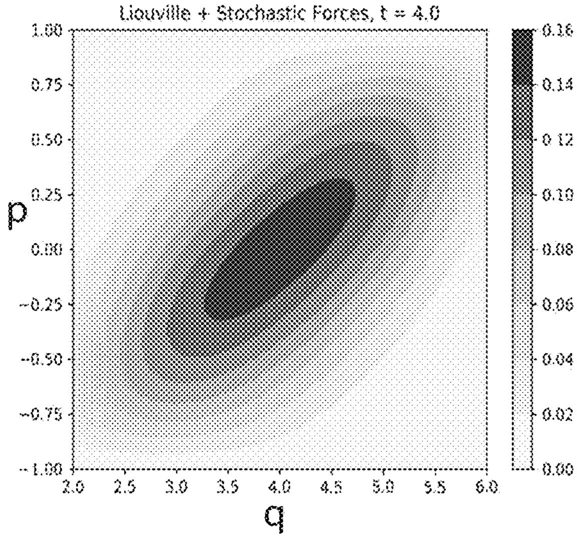
Figure 136D:
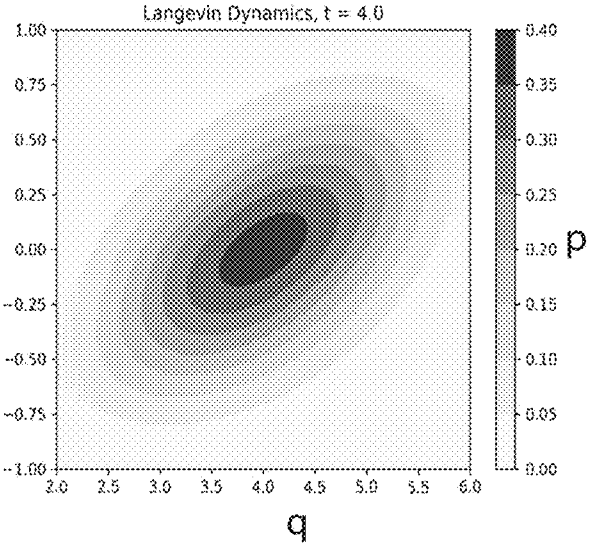

FIGS. 136B-136D illustrates examples of the time evolution of the phase space probability density, according to some embodiments.

FIGS. 137A-137F illustrate examples of current probability distributions and observation probability distributions and the resulting updated probability distributions after re-weighting the current probability distributions with the observation probability distributions, according to some embodiments.

FIGS. 138A-138D illustrate examples of initial phase space probability distributions, according to some embodiments.

Figure 139A:
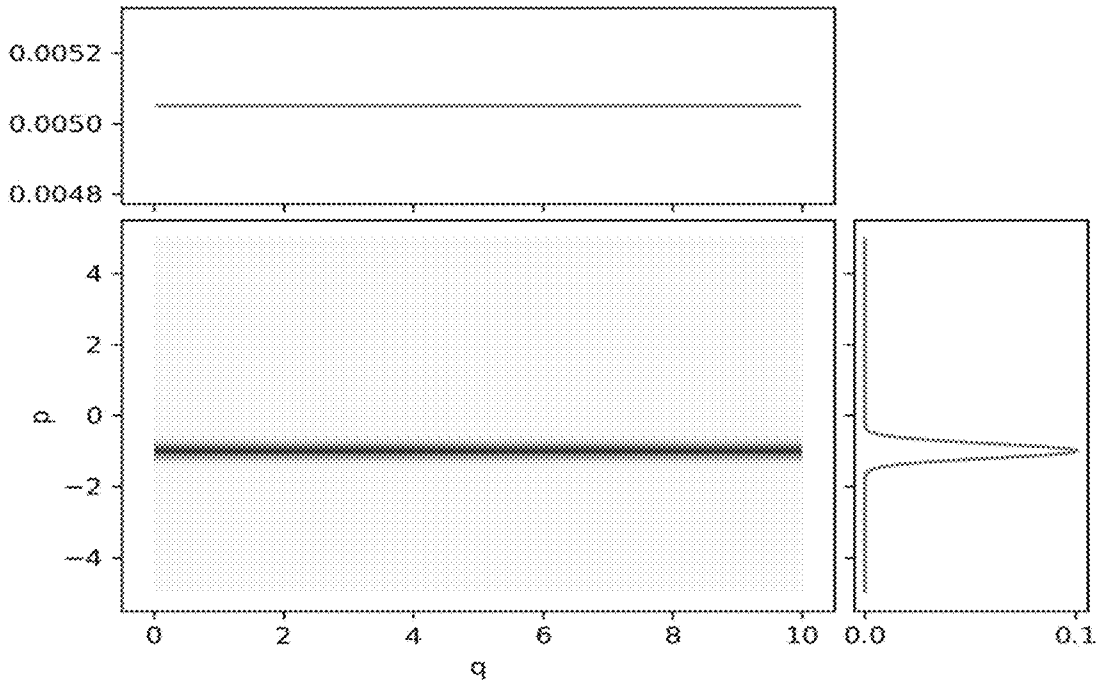
Figure 139B:
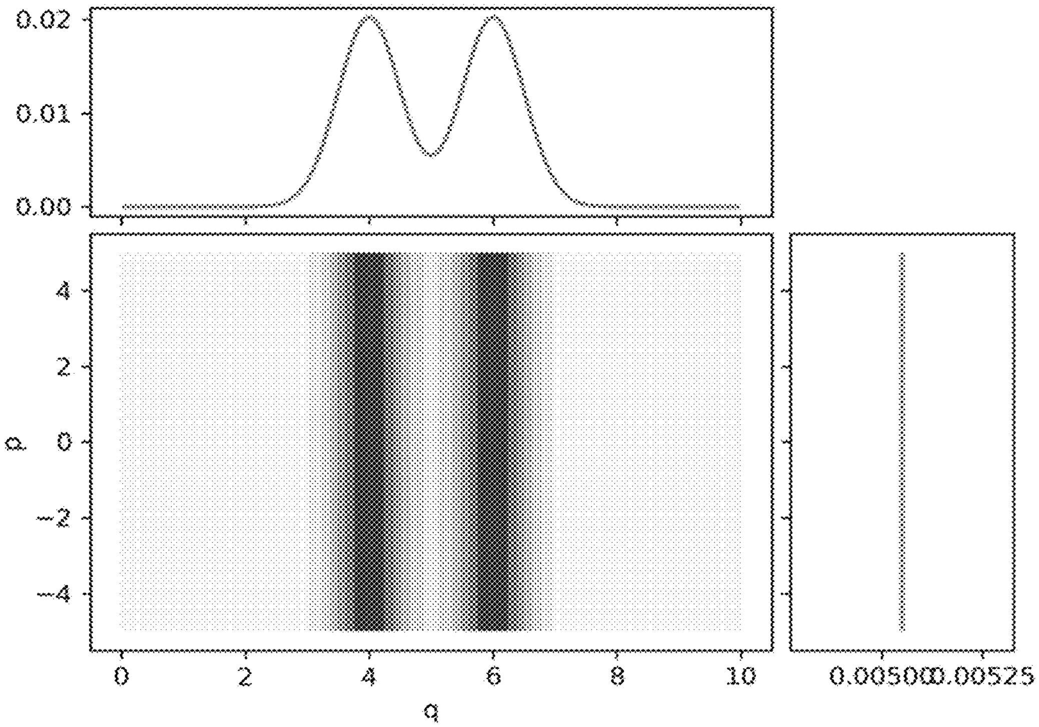

FIGS. 139A and 139B illustrate examples of observation probability distributions, according to some embodiments.

Figure 140:
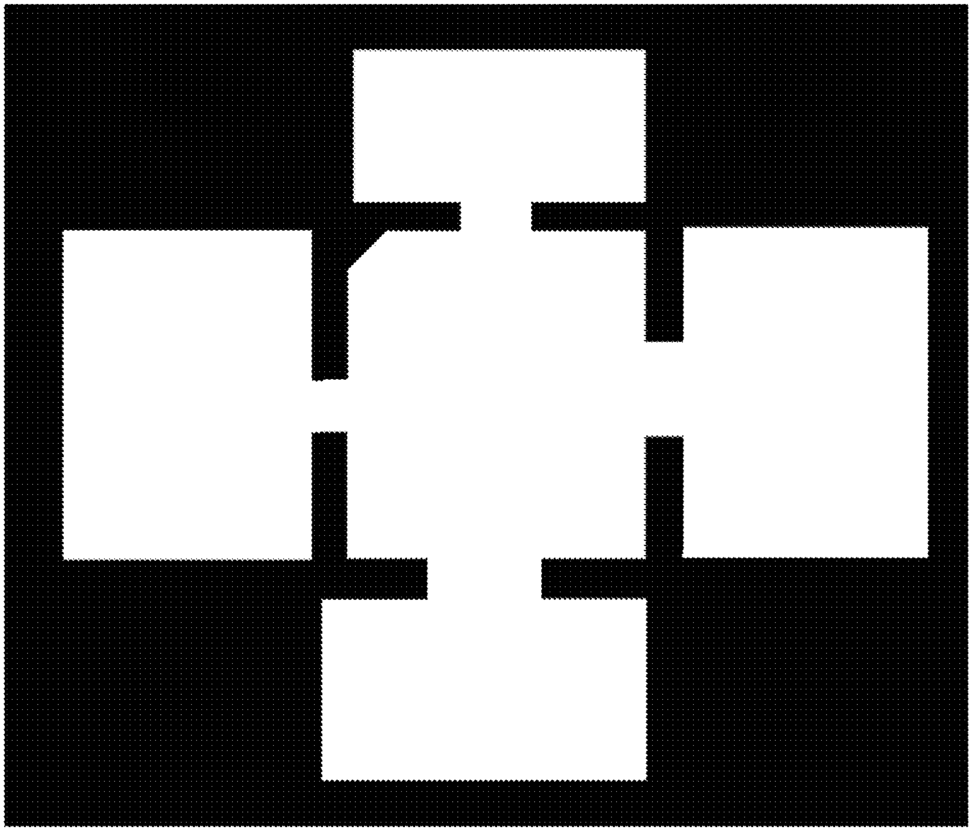

FIG. 140 illustrates an example of a map of an environment, according to some embodiments.

Figure 141A:
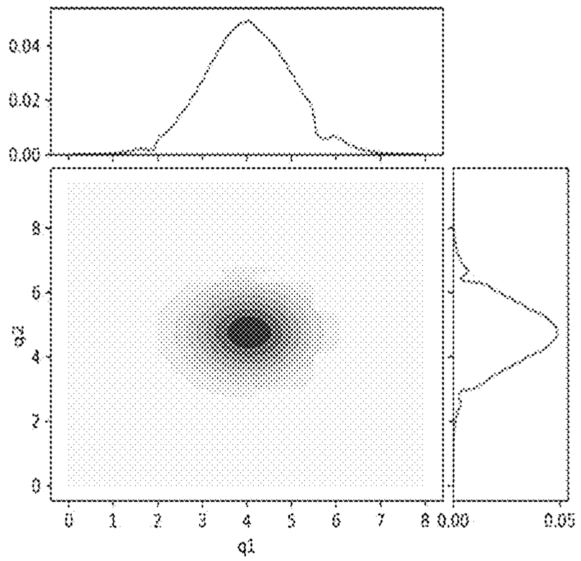
Figure 141B:
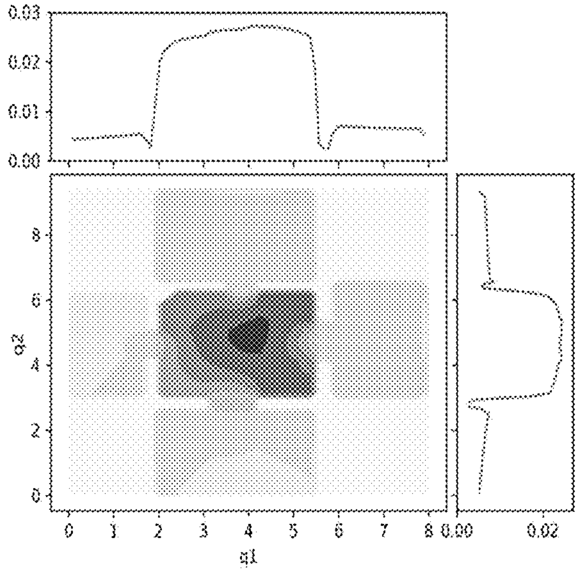
Figure 141C:
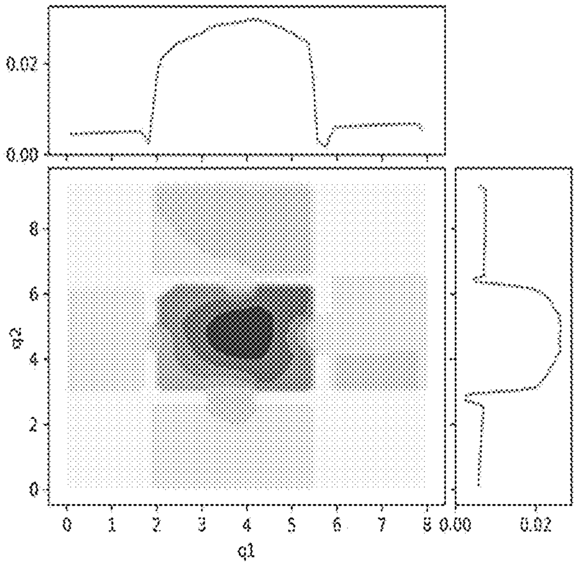

FIGS. 141A-141C illustrate an example of an evolution of a probability density reduced to the $q_1$, $q_2$ space at three different time points, according to some embodiments.

Figure 142A:
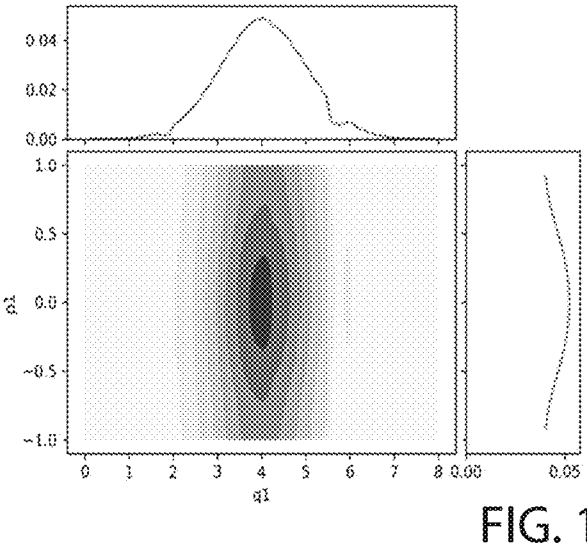
Figure 142B:
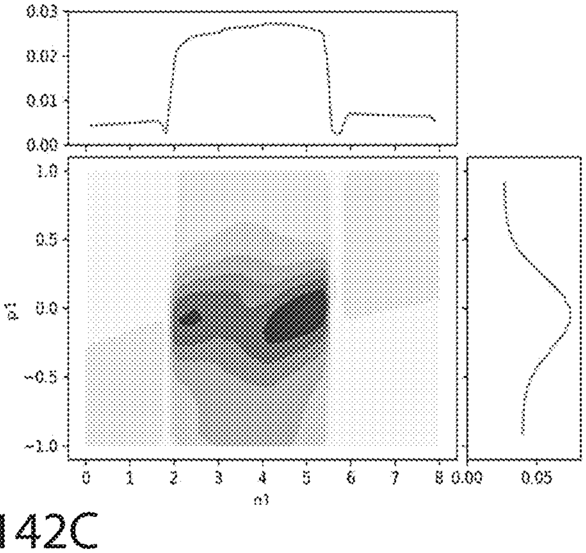
Figure 142C:
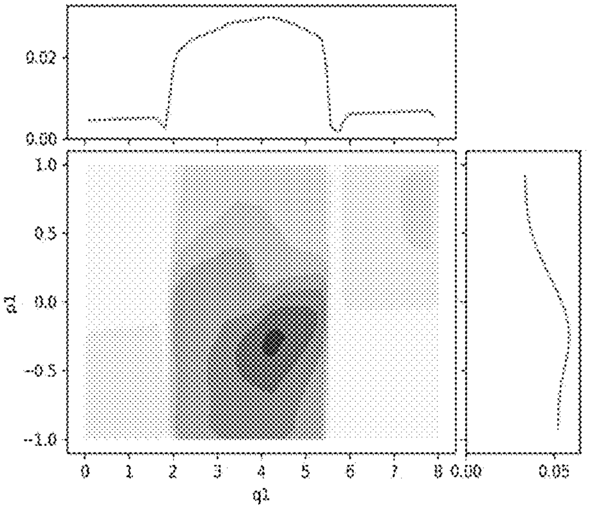

FIGS. 142A-142C illustrate an example of an evolution of a probability density reduced to the $p_1$, $q_1$ space at three different time points, according to some embodiments.

Figure 143A:
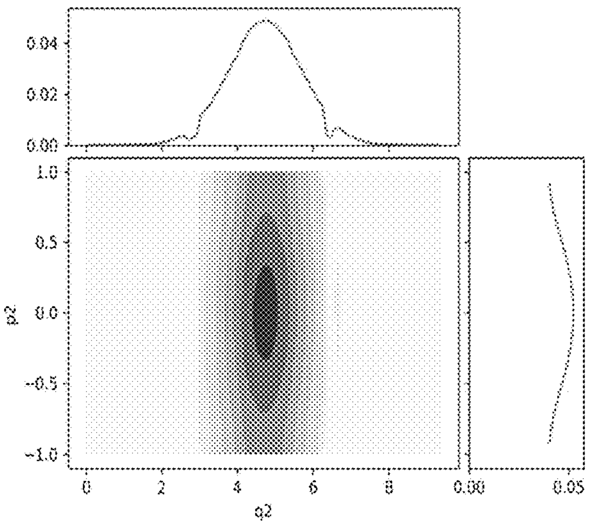
Figure 143B:
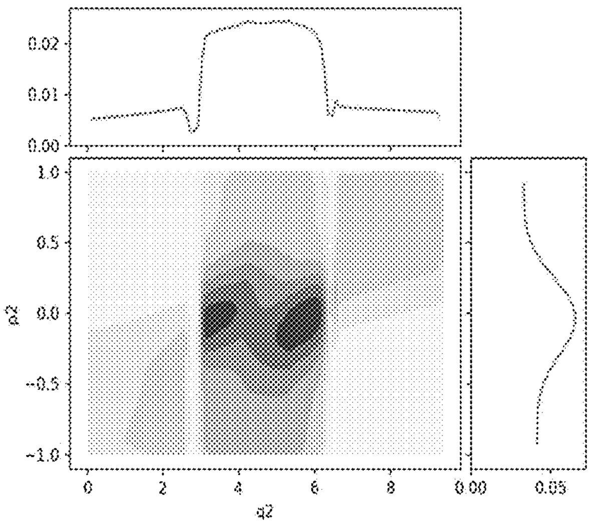
Figure 143C:
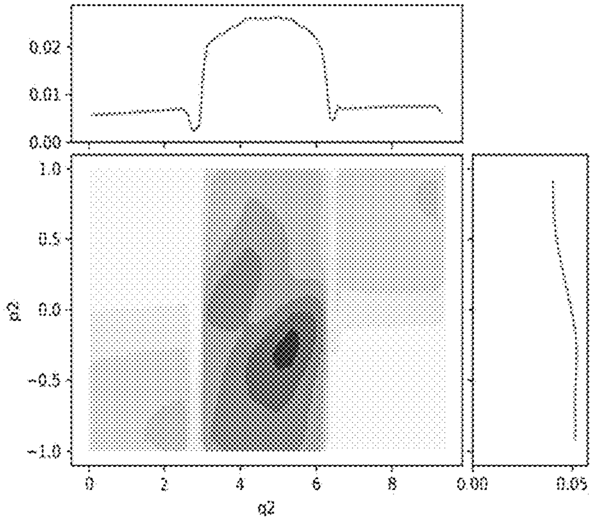

FIGS. 143A-143C illustrate an example of an evolution of a probability density reduced to the $p_2$, $q_2$ space at three different time points, according to some embodiments.

Figure 144:
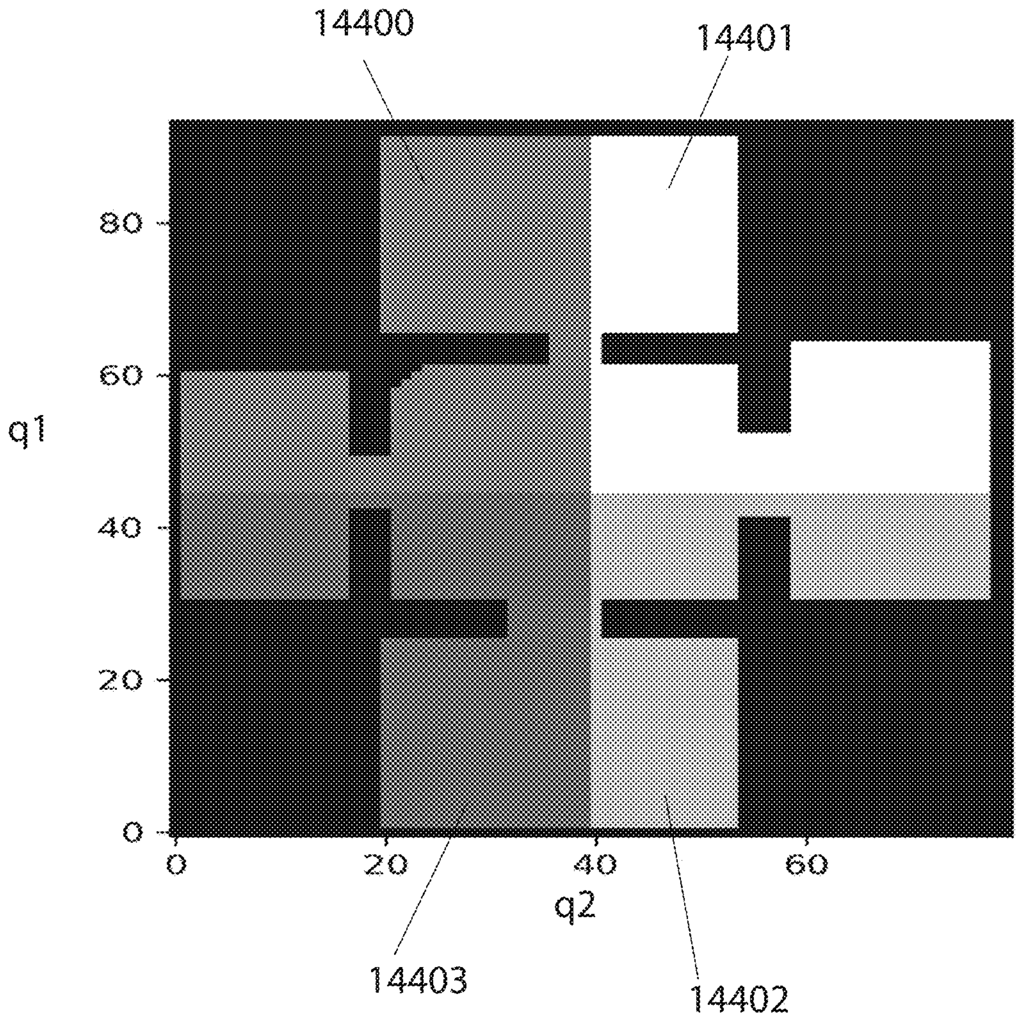

FIG. 144 illustrates an example of a map indicating floor types, according to some embodiments.

Figure 145:
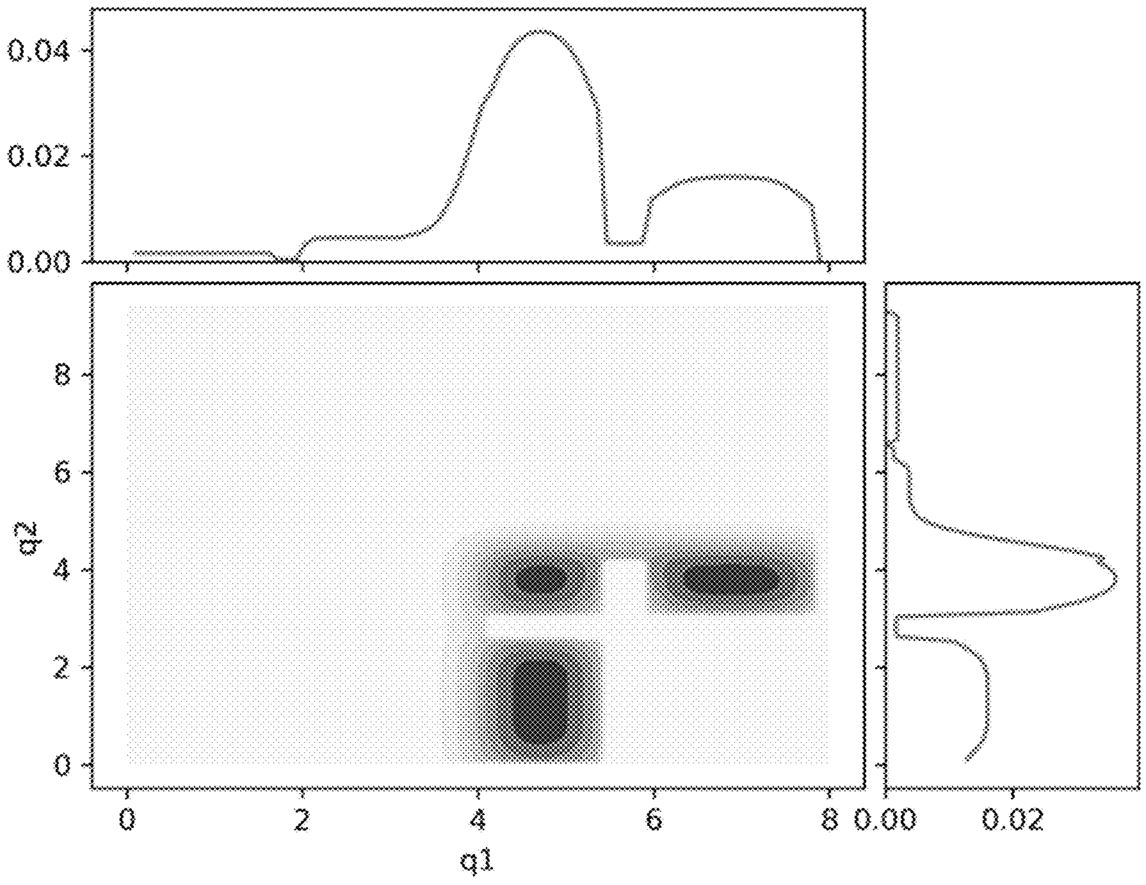

FIG. 145 illustrates an example of an updated probability density after observing floor type, according to some embodiments.

Figure 146:
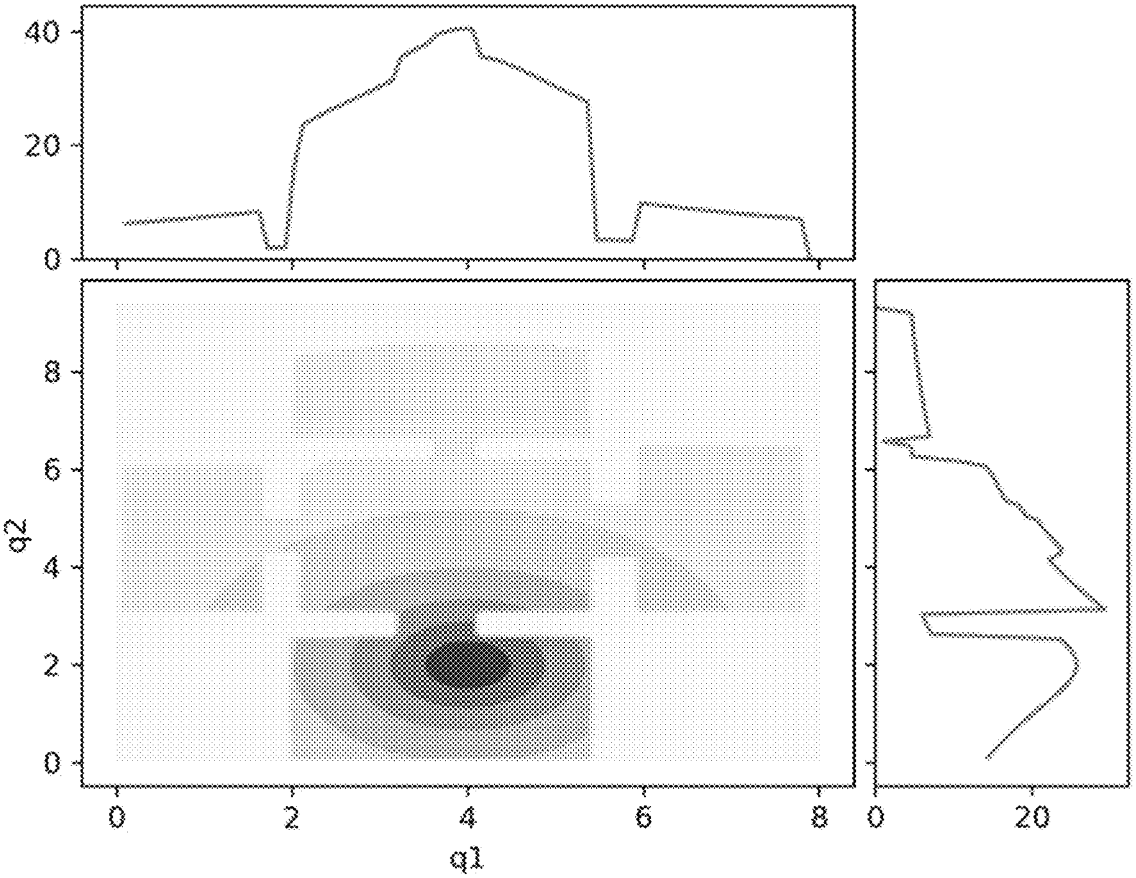

FIG. 146 illustrates an example of a Wi-Fi map, according to some embodiments.

Figure 147:
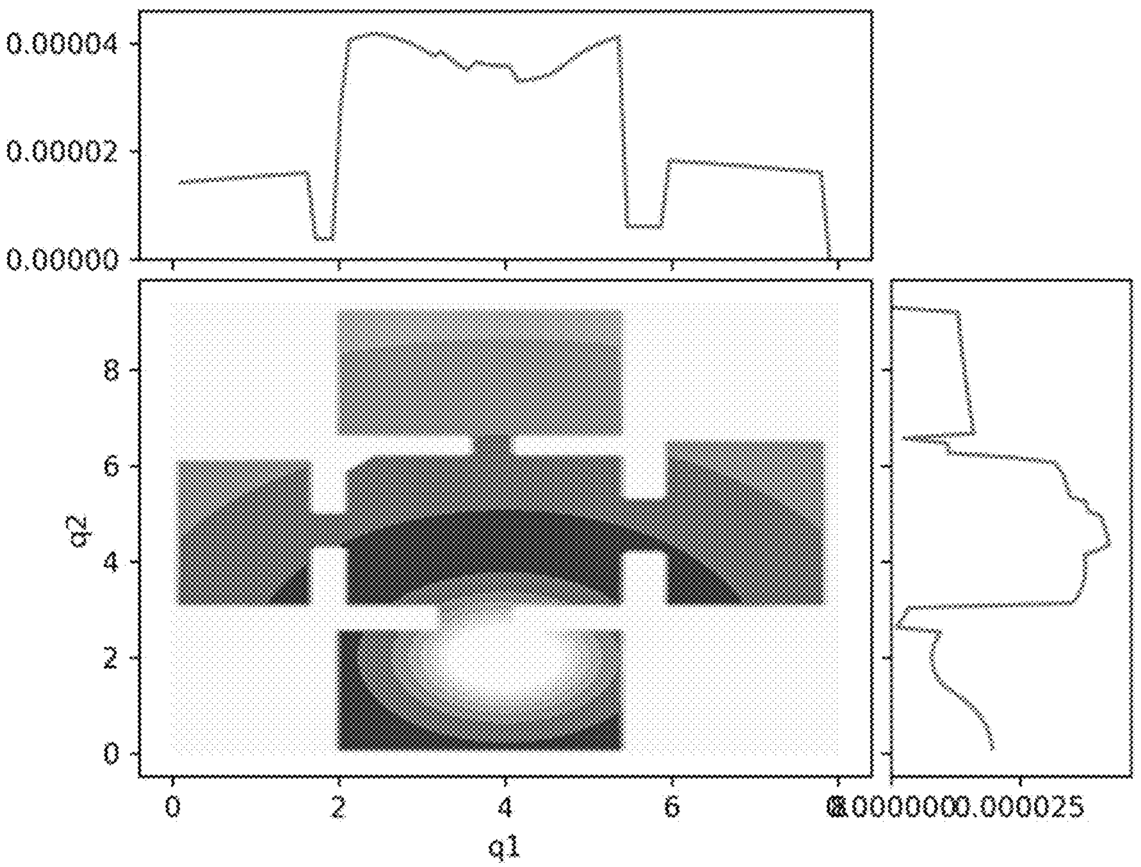

FIG. 147 illustrates an example of an updated probability density after observing Wi-Fi strength, according to some embodiments.

Figure 148:
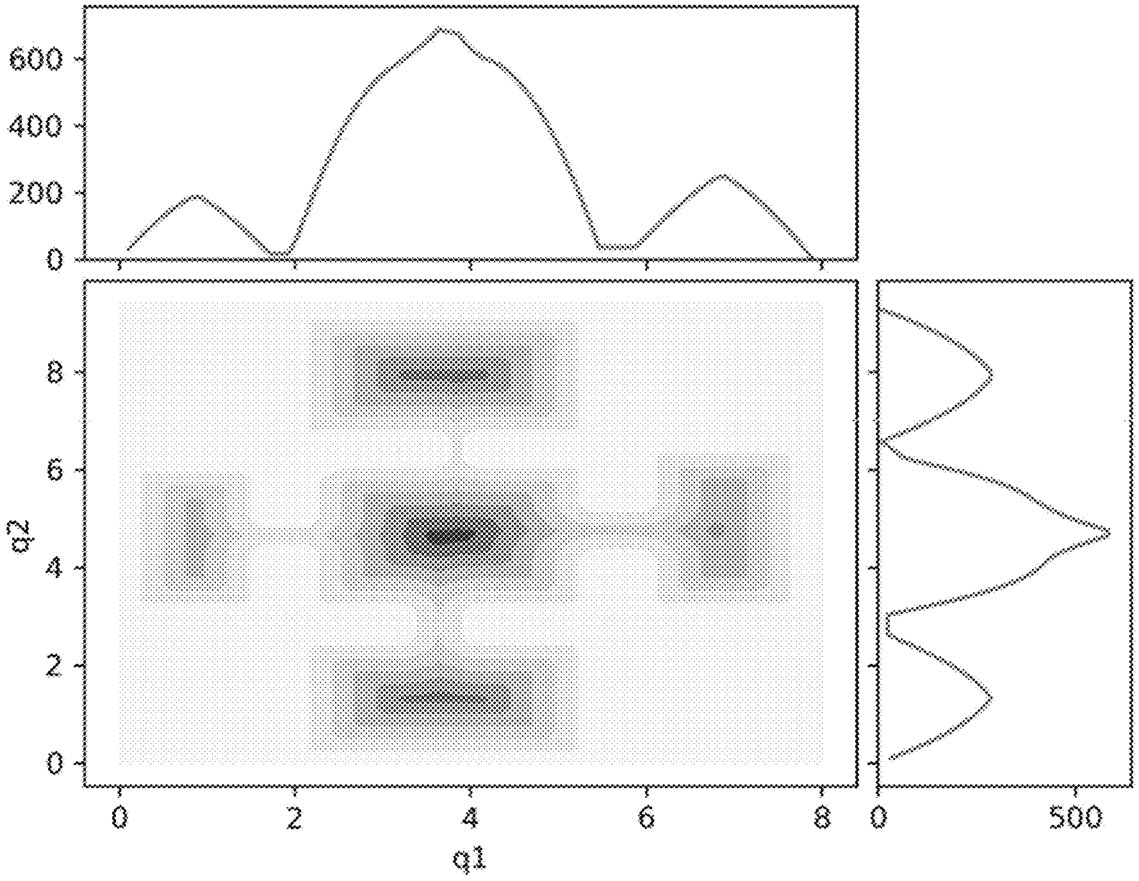

FIG. 148 illustrates an example of a wall distance map, according to some embodiments.

Figure 149:
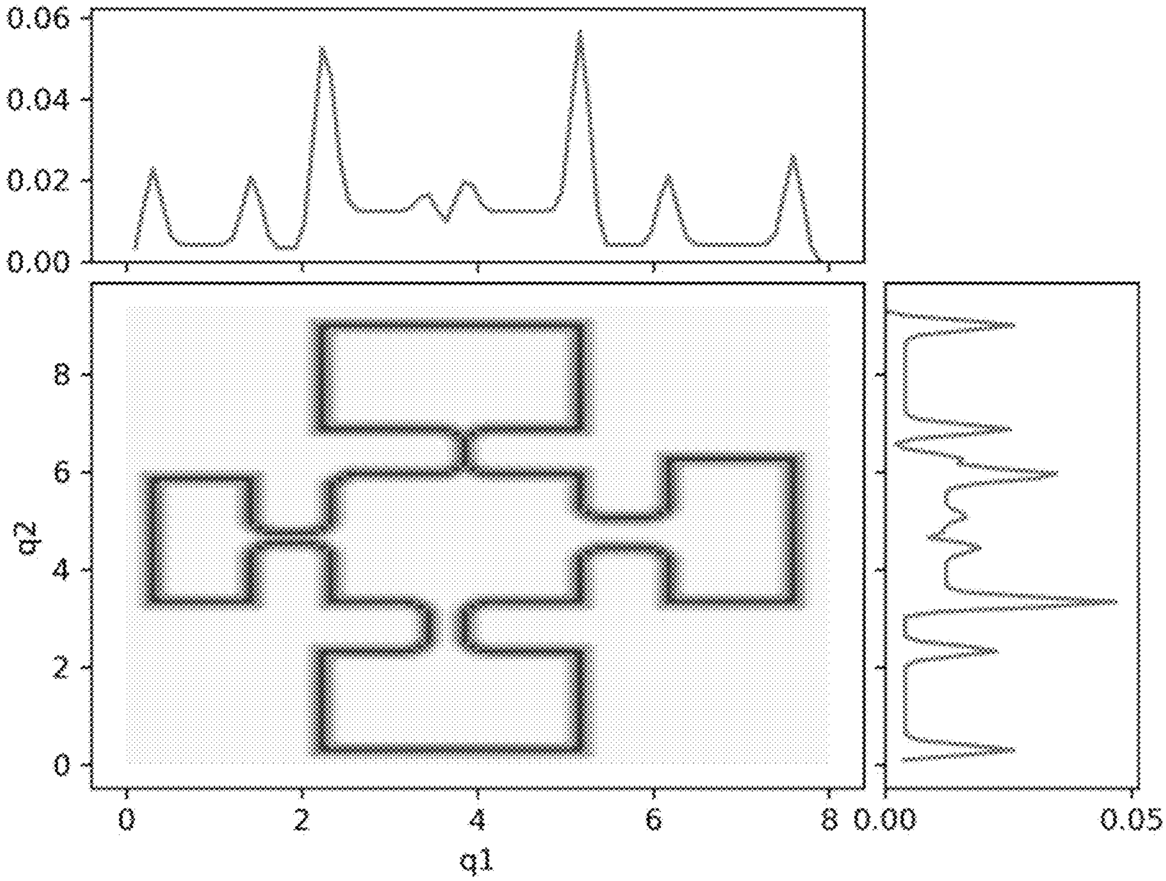
Figure 150:
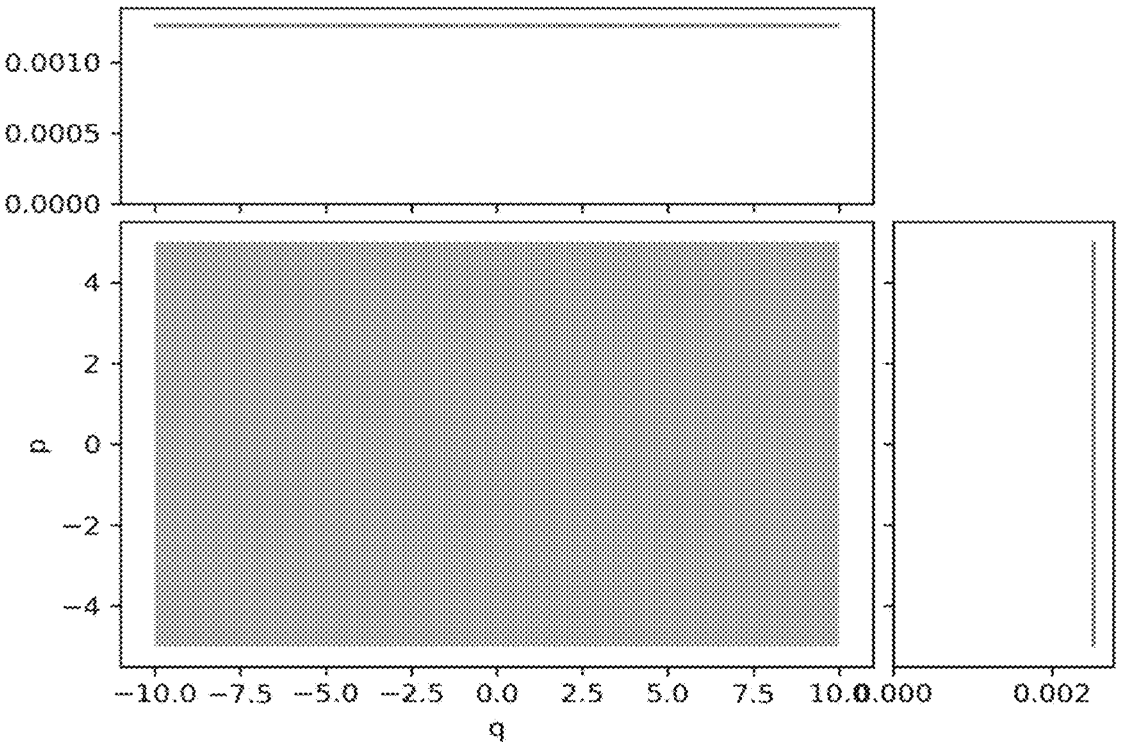
Figure 151:
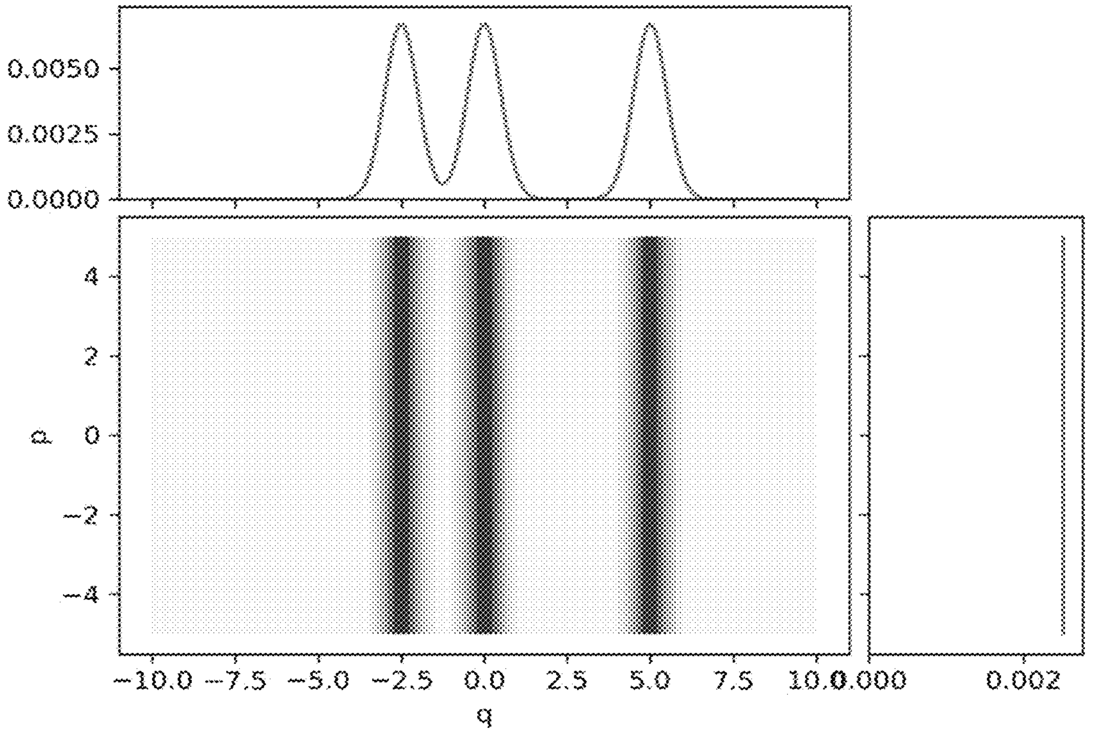

FIG. 149 illustrates an example of an updated probability density after observing distances to a wall, according to some embodiments.

FIGS. 150-153 illustrate an example of an evolution of a probability density of a position of a robotic device as it moves and observes doors, according to some embodiments.

Figure 154:
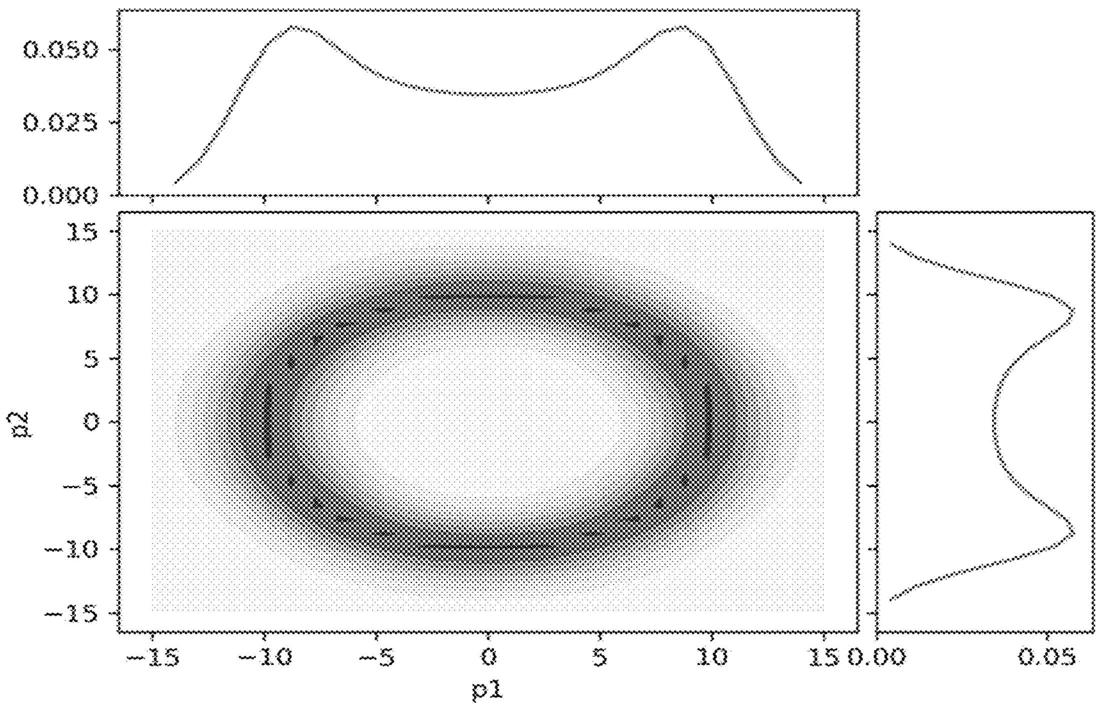

FIG. 154 illustrates an example of a velocity observation probability density, according to some embodiments.

Figure 155:
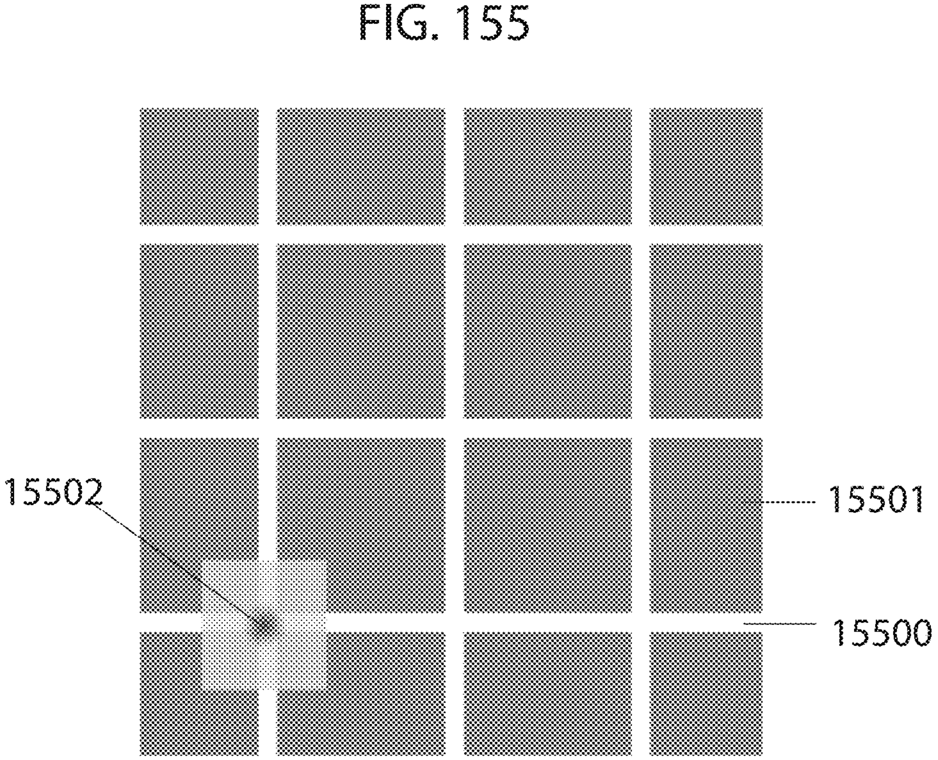

FIG. 155 illustrates an example of a road map, according to some embodiments.

FIGS. 156A-156D illustrate an example of a wave packet, according to some embodiments.

FIGS. 157A-157E illustrate an example of evolution of a wave function in a position and momentum space with observed momentum, according to some embodiments.

FIGS. 158A-158E illustrate an example of evolution of a wave function in a position and momentum space with observed momentum, according to some embodiments.

FIGS. 159A-159E illustrate an example of evolution of a wave function in a position and momentum space with observed momentum, according to some embodiments.

FIGS. 160A-160E illustrate an example of evolution of a wave function in a position and momentum space with observed momentum, according to some embodiments.

Figure 161A:
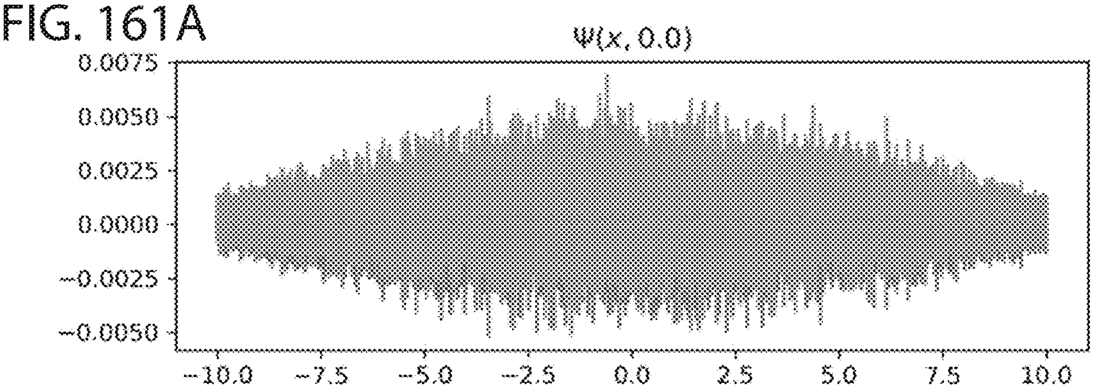
Figure 161B:
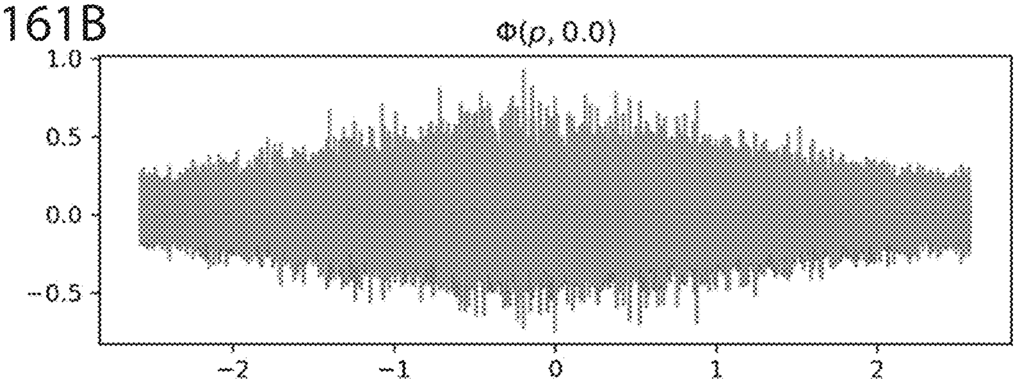

FIGS. 161A and 161B illustrate an example of an initial wave function of a state of a robotic device, according to some embodiments.

Figure 162A:
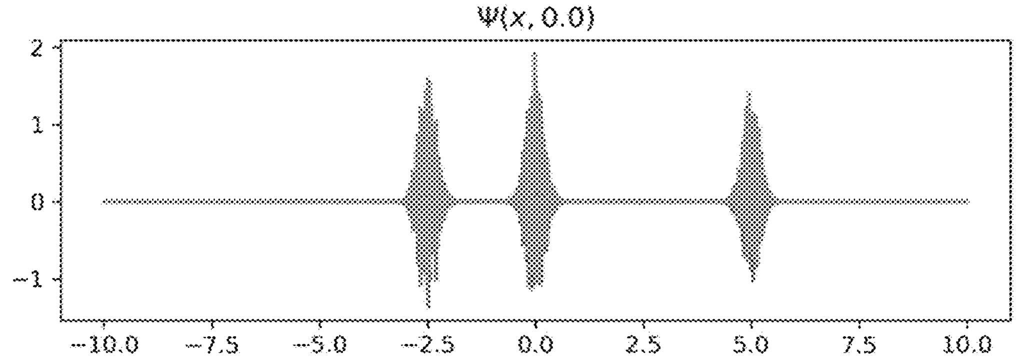
Figure 162B:
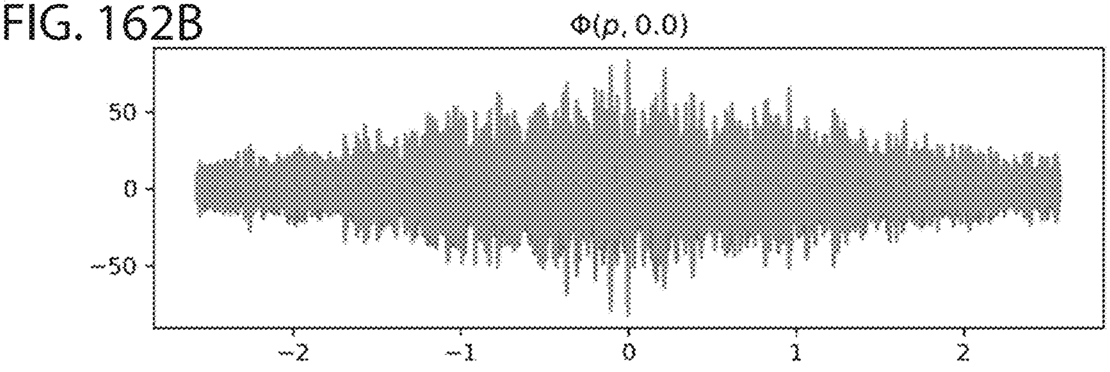

FIGS. 162A and 162B illustrate an example of a wave function of a state of a robotic device after observations, according to some embodiments.

Figure 163A:
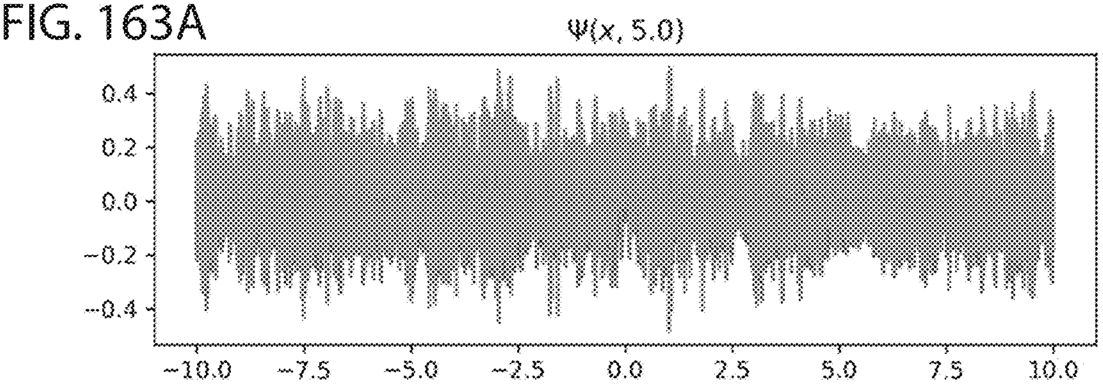
Figure 163B:
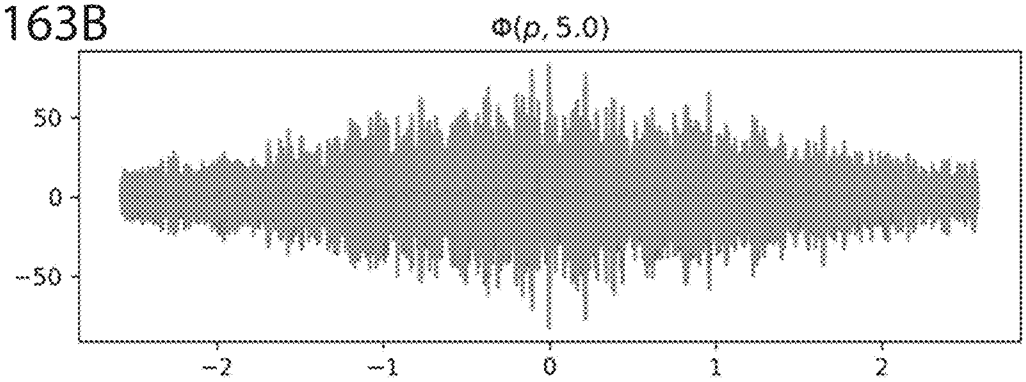
Figure 164A:
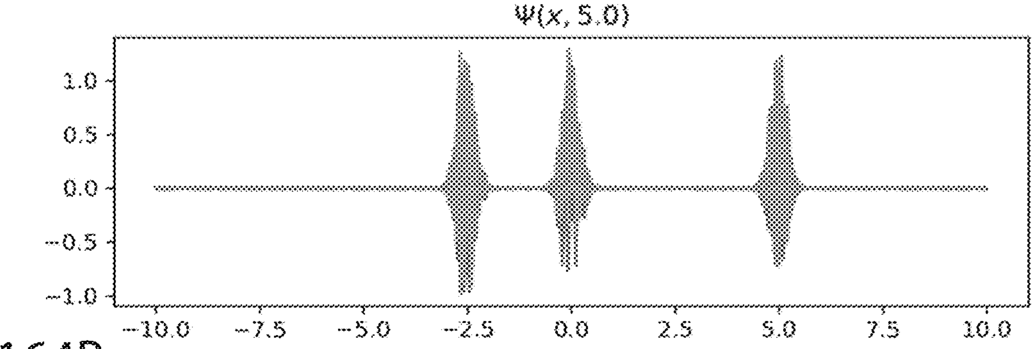
Figure 164B:
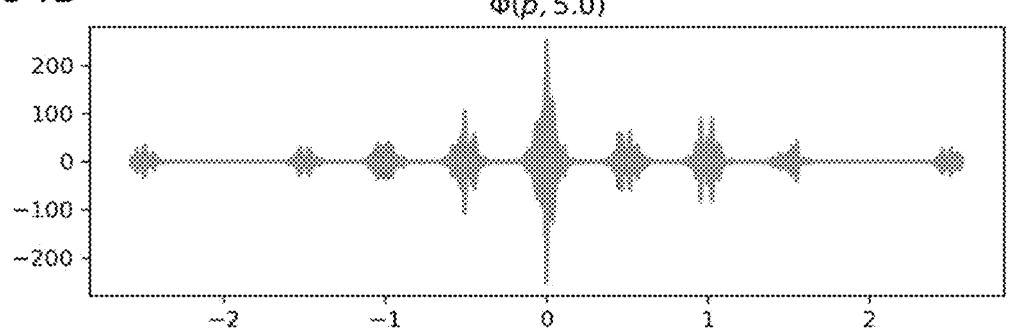

FIGS. 163A and 163B illustrate an example of an evolved wave function of a state of a robotic device, according to some embodiments.

FIGS. 164A, 164B, 165A-165H, and 166A-166F illustrate an example of a wave function of a state of a robotic device after observations, according to some embodiments.

Figure 167A:
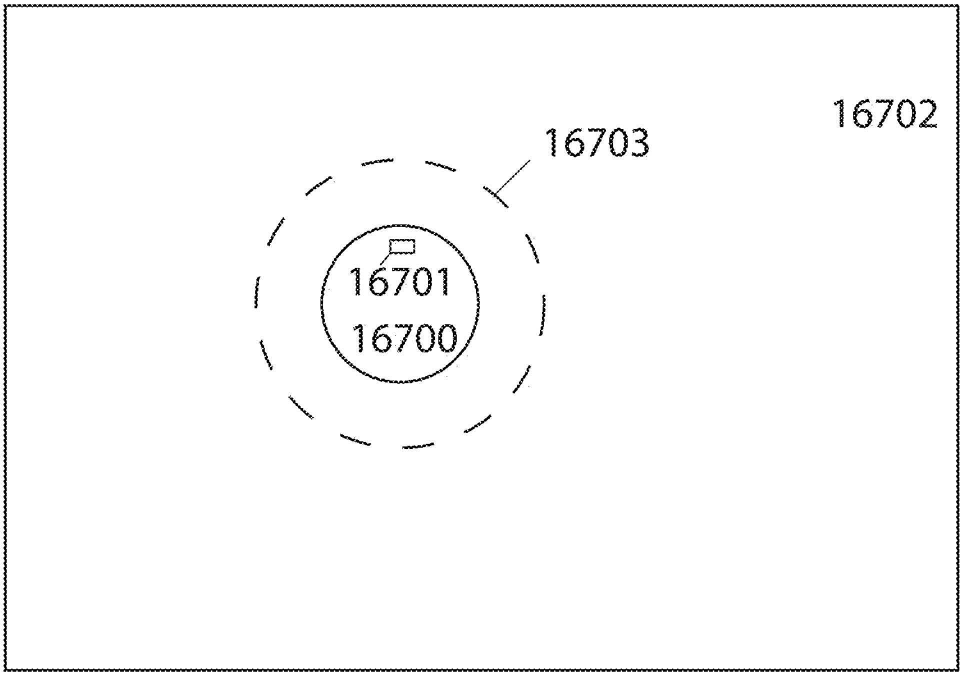
Figure 167B:
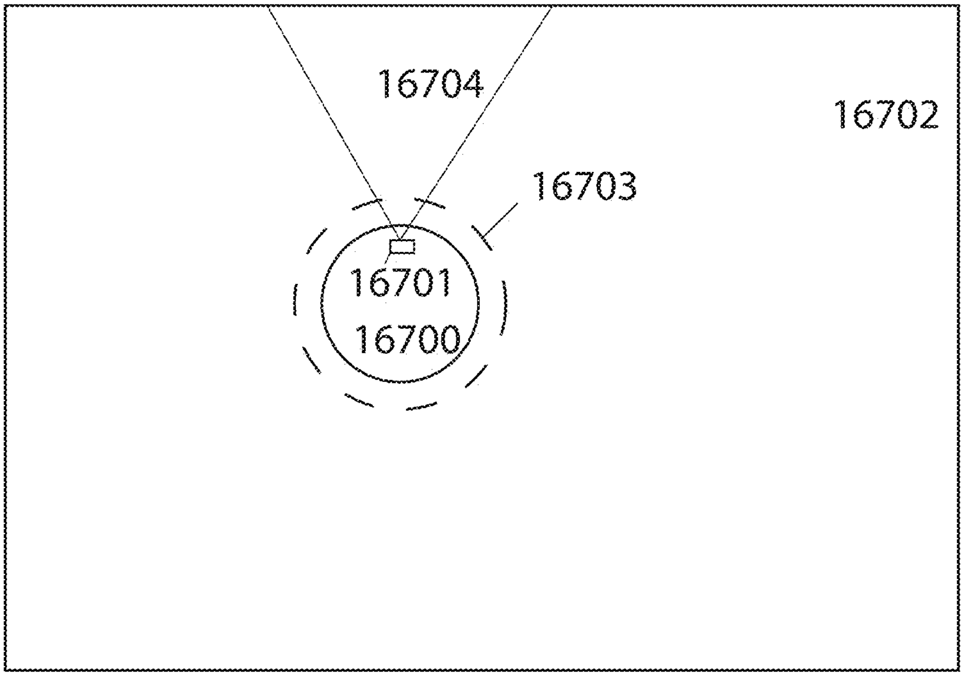
Figure 167C:
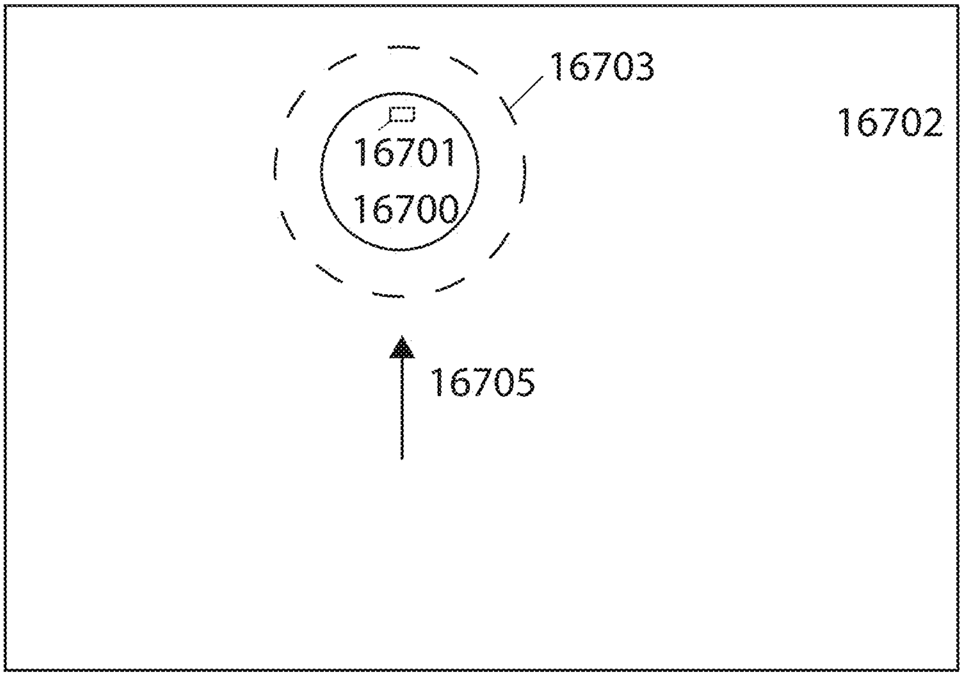

FIGS. 167A-167C illustrate an example of seed localization, according to some embodiments.

Figure 168:
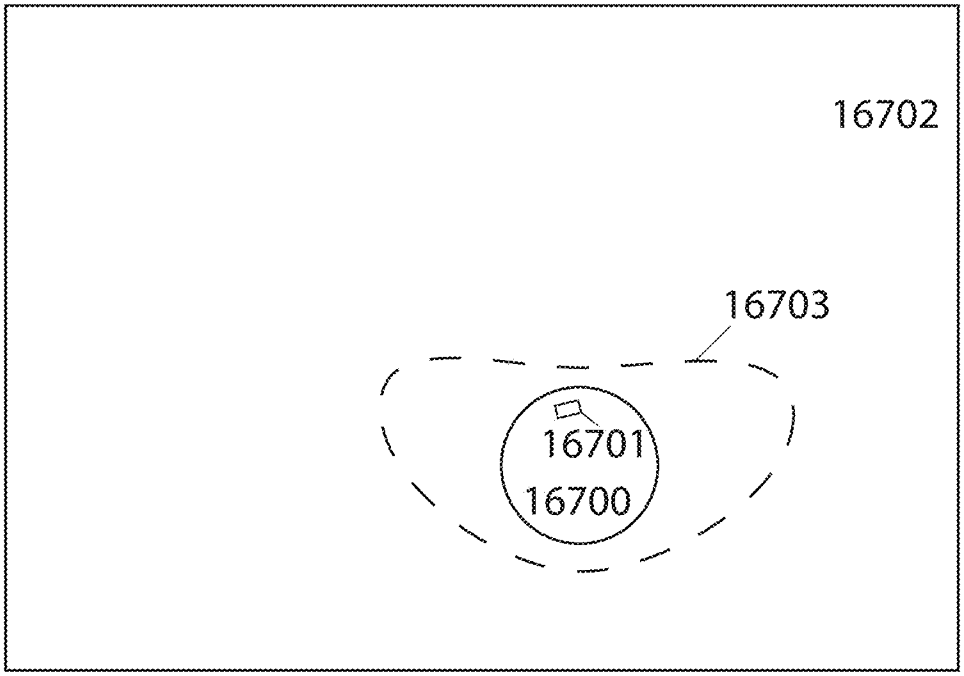

FIG. 168 illustrates an example of a shape of a region with which a robot is located, according to some embodiments.

Figure 169:
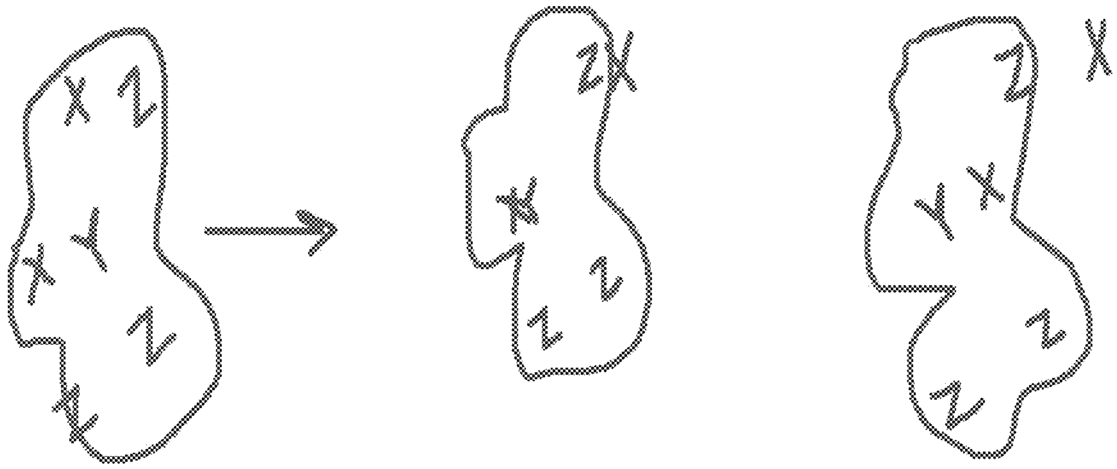

FIG. 169 illustrates an example of an evolution of an ensemble, according to some embodiments.

Figure 170A:
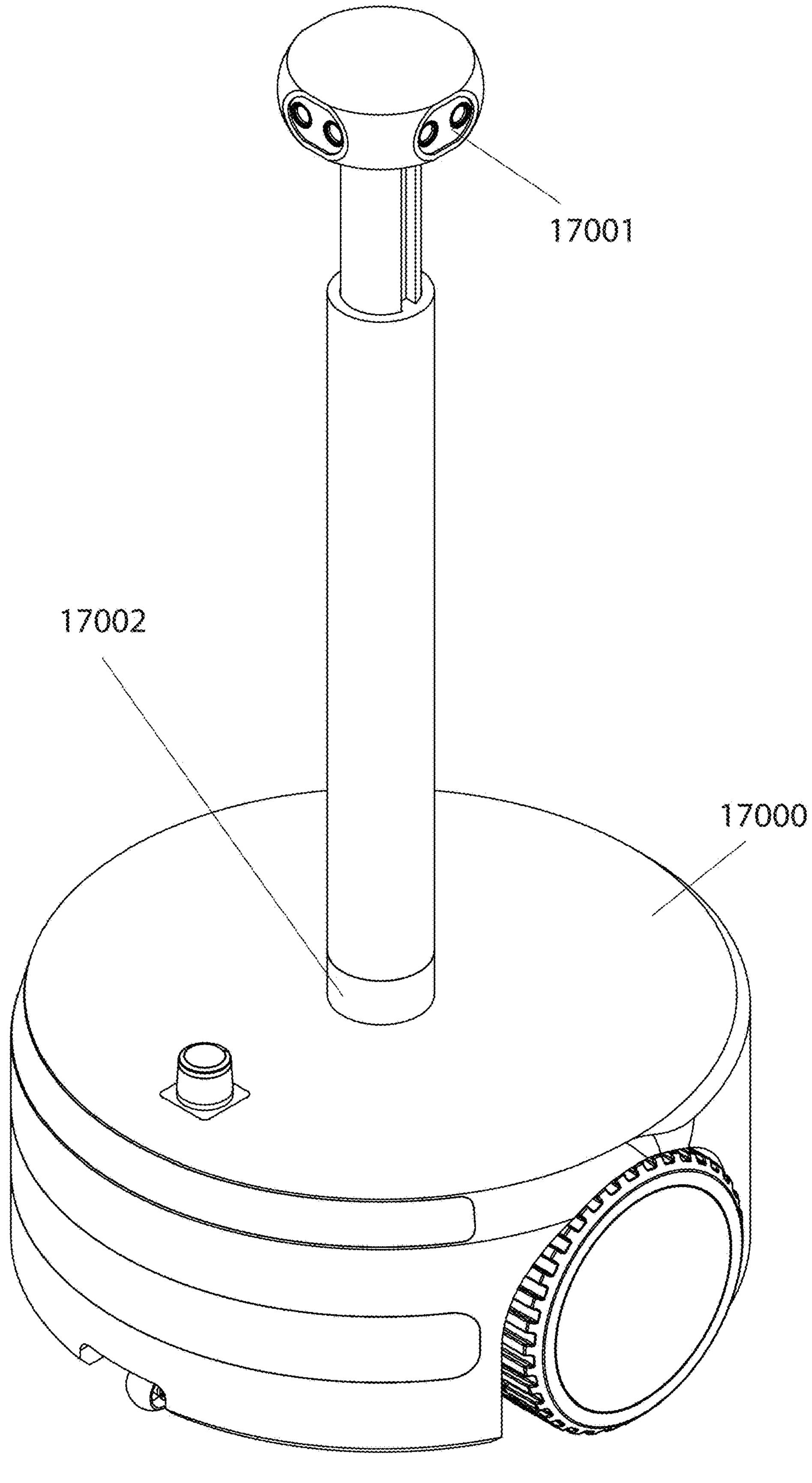
Figure 170B:
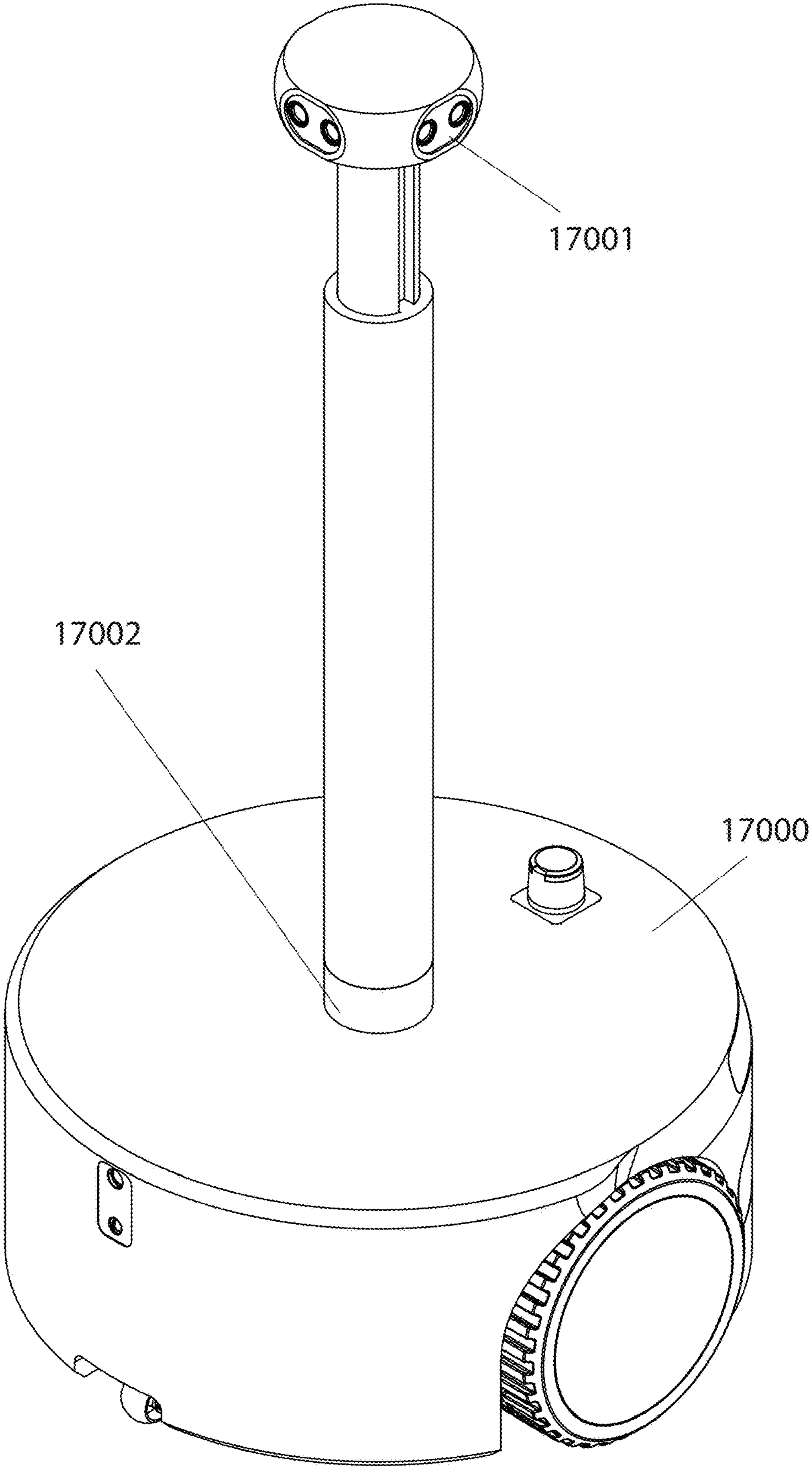

FIGS. 170A and 170B illustrate an example of image capturing and video recording robot, according to some embodiments.

Figure 171A:
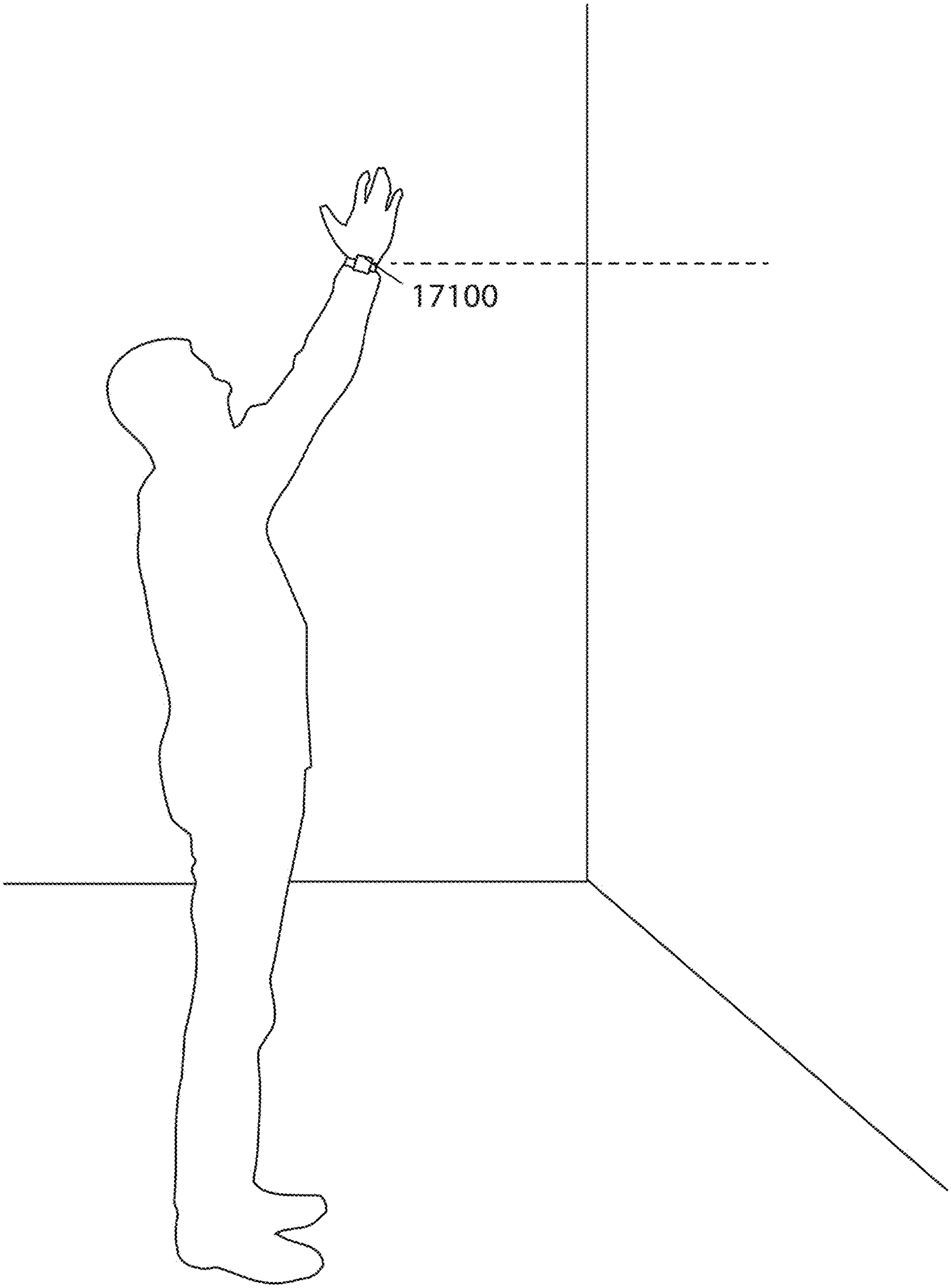
Figure 171B:
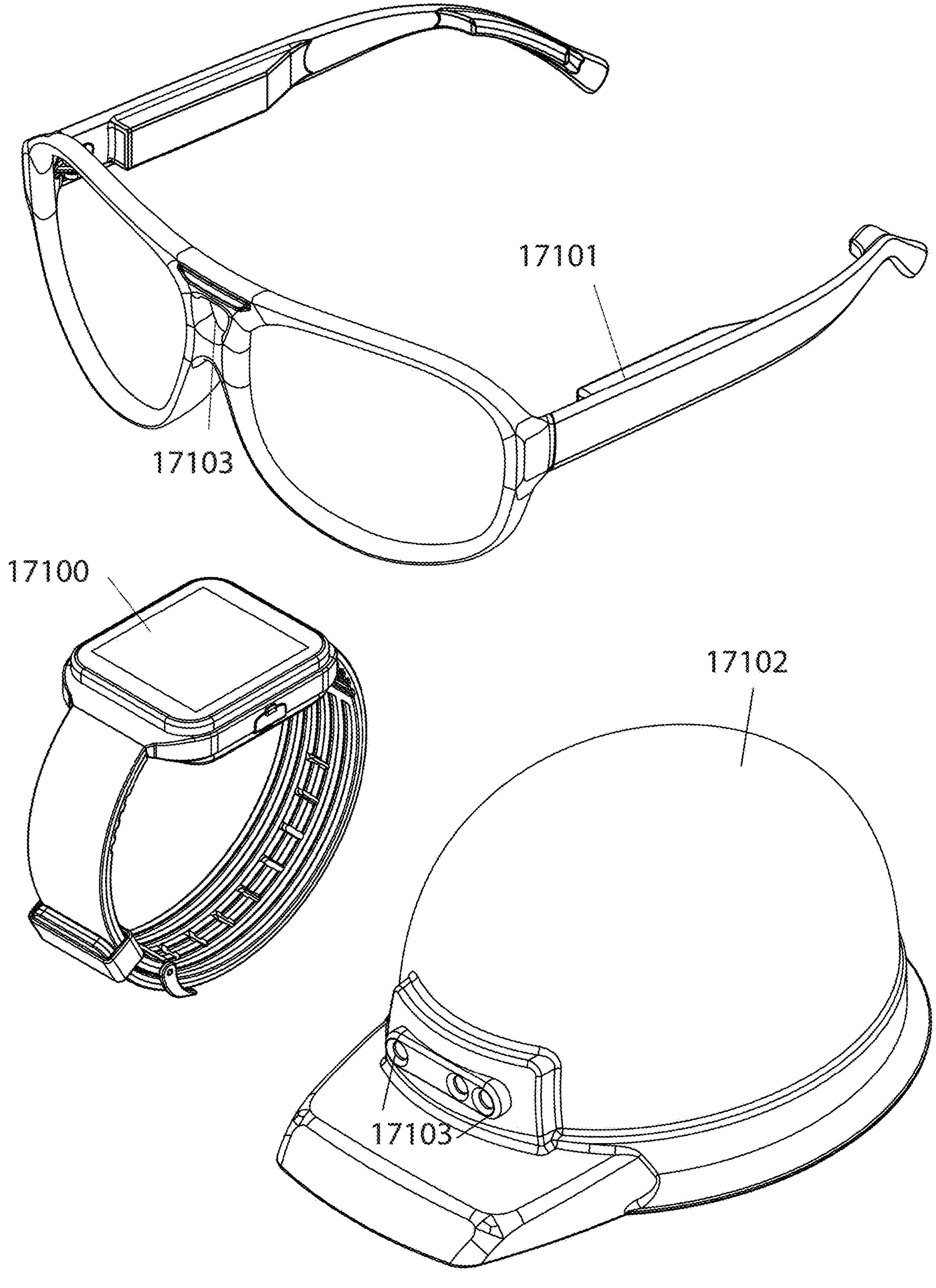

FIGS. 171A and 171B illustrate examples of wearable devices that may implement SLAM methods and techniques described herein.

Figure 172:
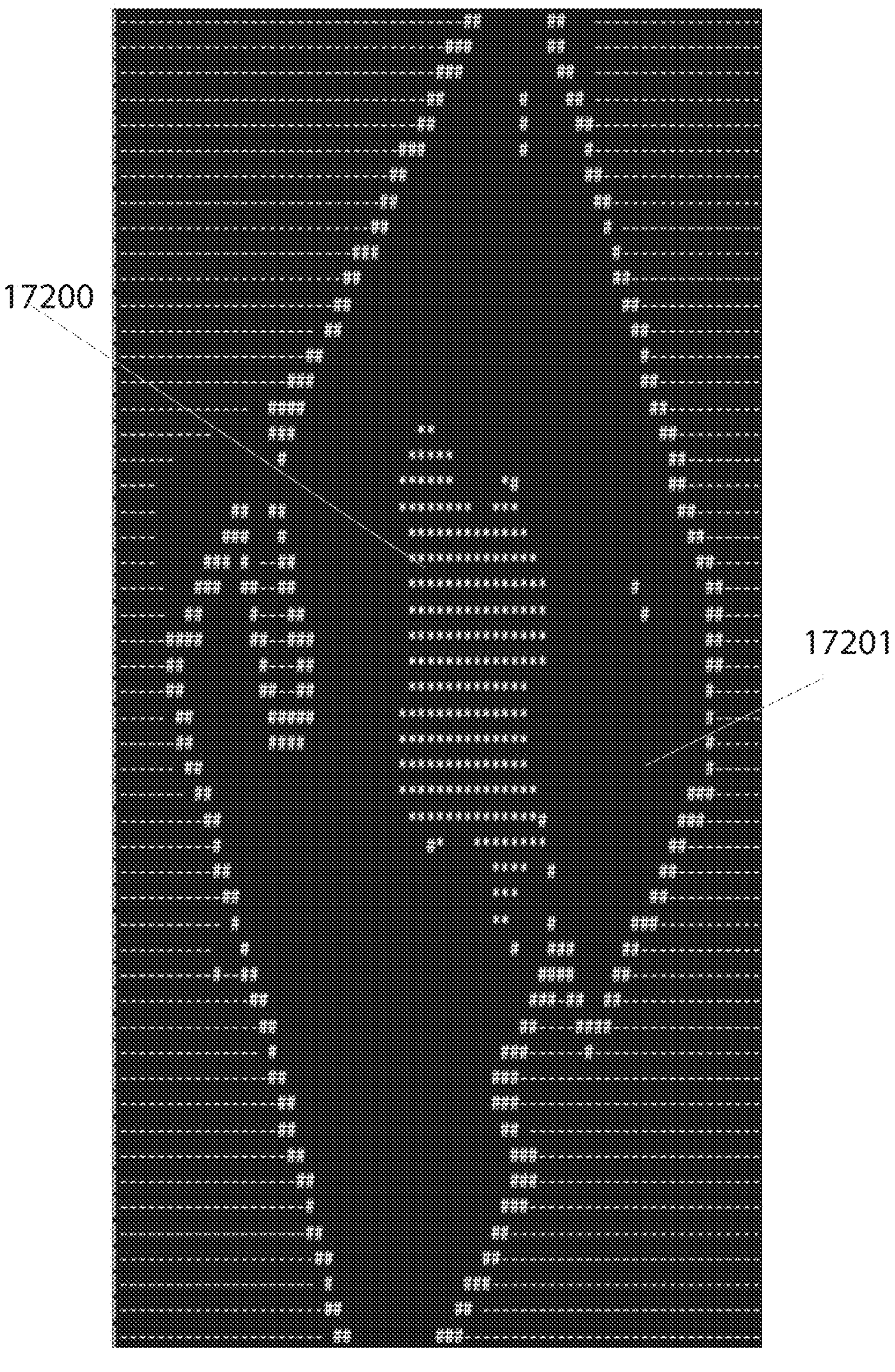

FIG. 172 illustrates an example of a map including high and low obstacle density areas, according to some embodiments.

Figure 173A:
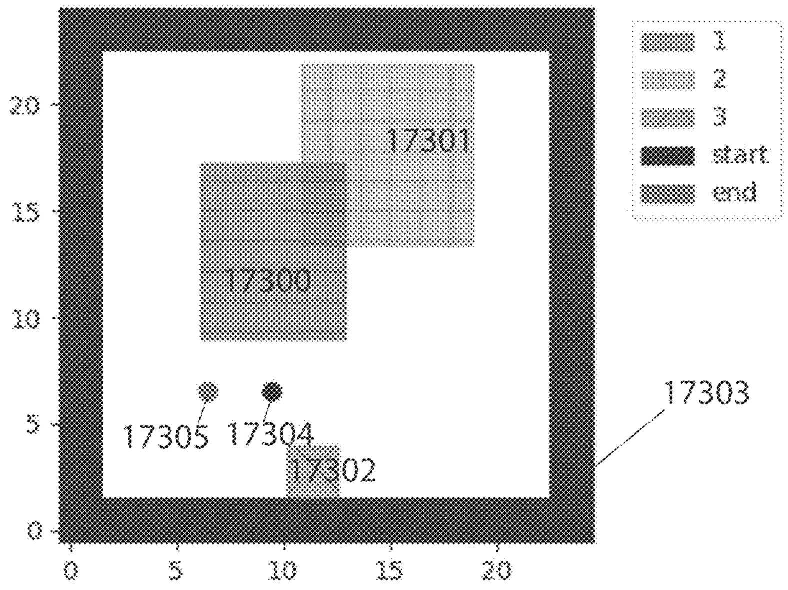
Figure 173B:
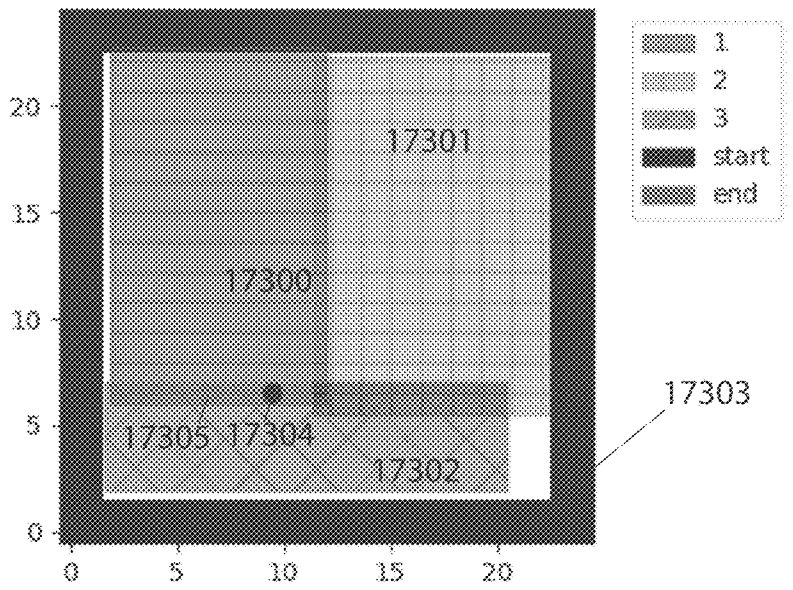
Figure 173C:
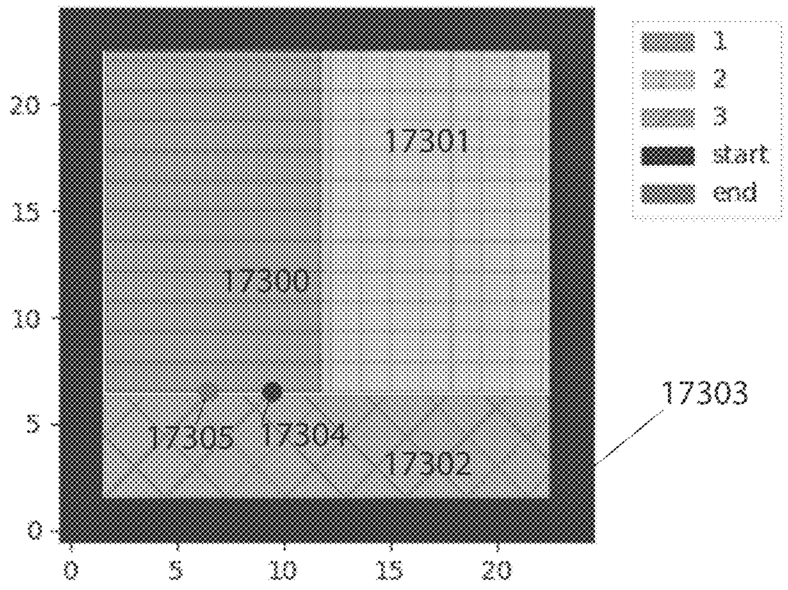

FIGS. 173A-173C illustrate embodiments of a method for optimizing surface coverage of a continuous space with rectangular zones, embodying features of the present techniques and executed by some embodiments.

Figure 174A:
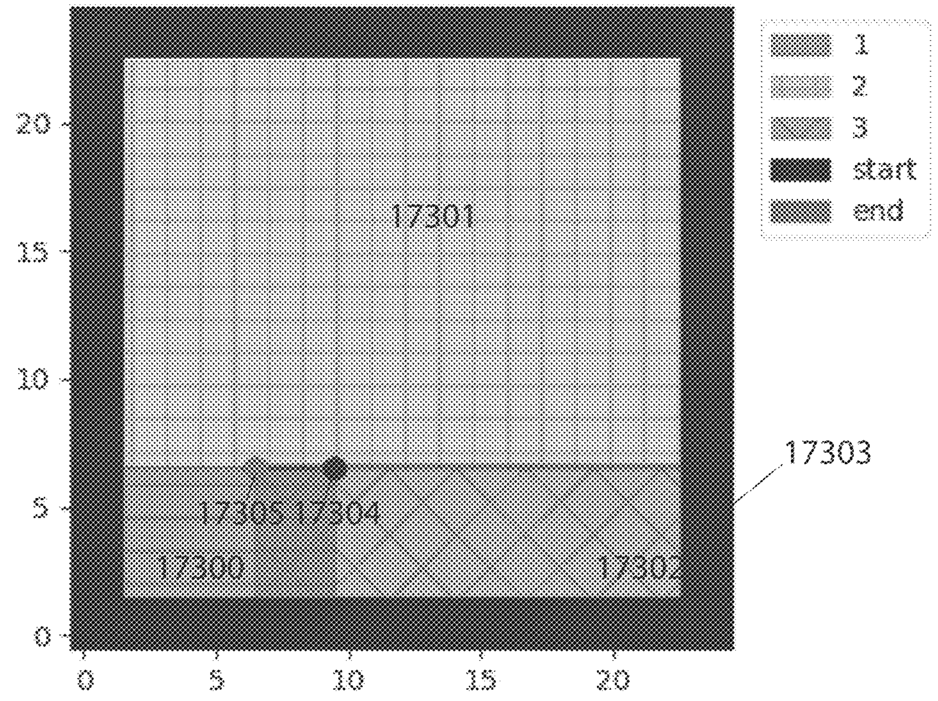
Figure 174B:
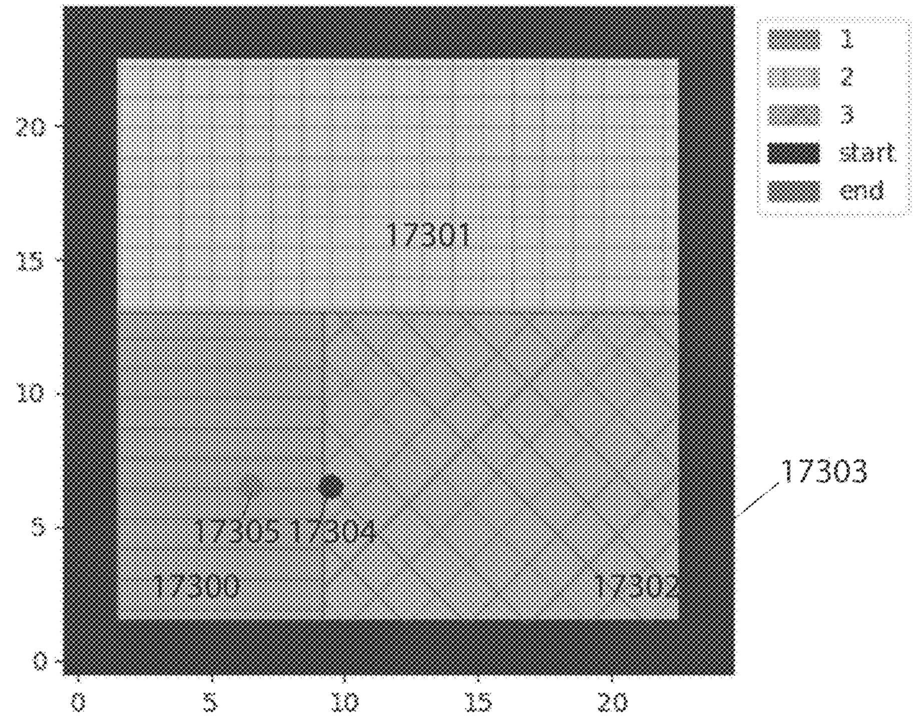

FIGS. 174A and 174B illustrate an example of deadlock encountered during optimizing surface coverage of a workspace.

Figure 175A:
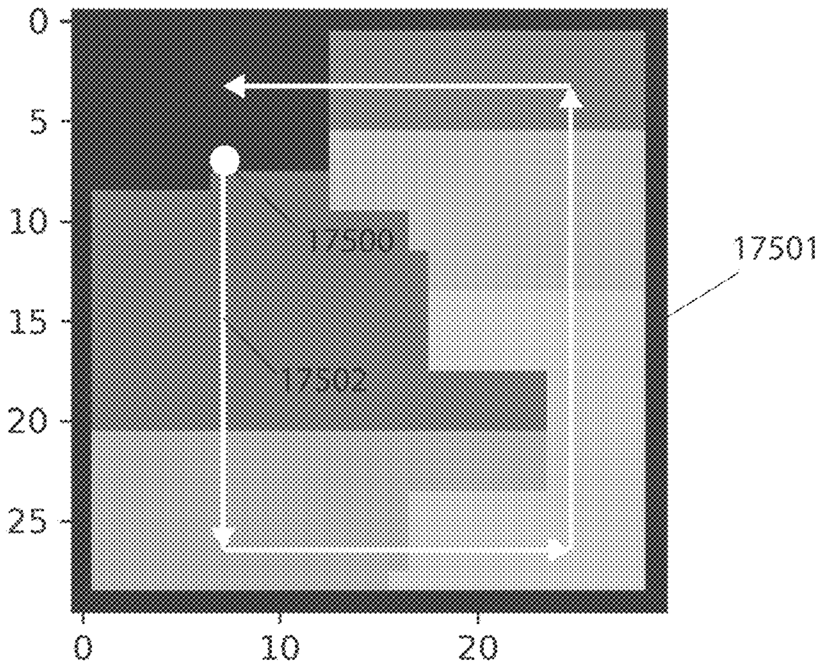
Figure 175B:
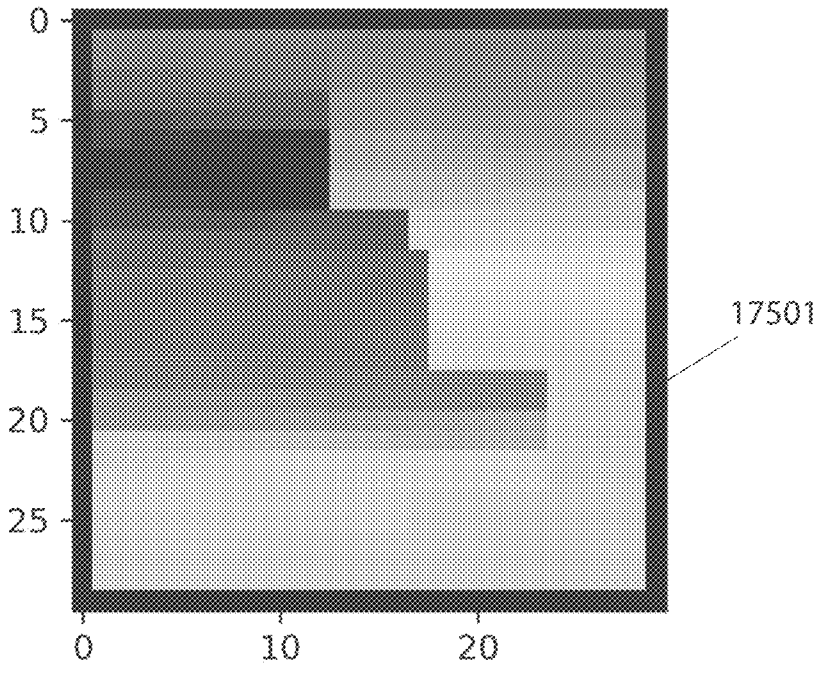

FIGS. 175A and 175B illustrate patterns followed by embodiments implementing a method for optimizing surface coverage of a discrete space with rectangular zone, according to some embodiments.

Figure 176A:
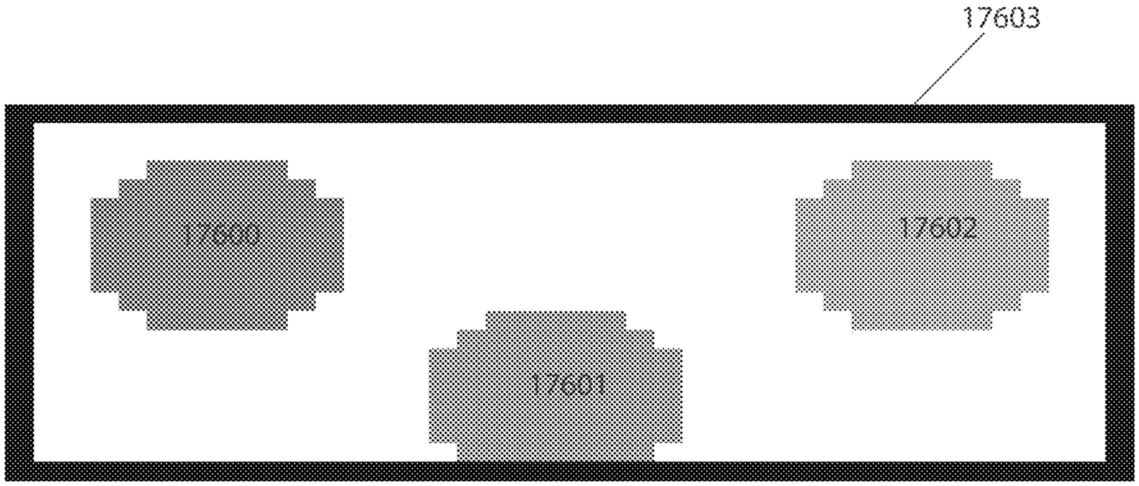
Figure 176B:
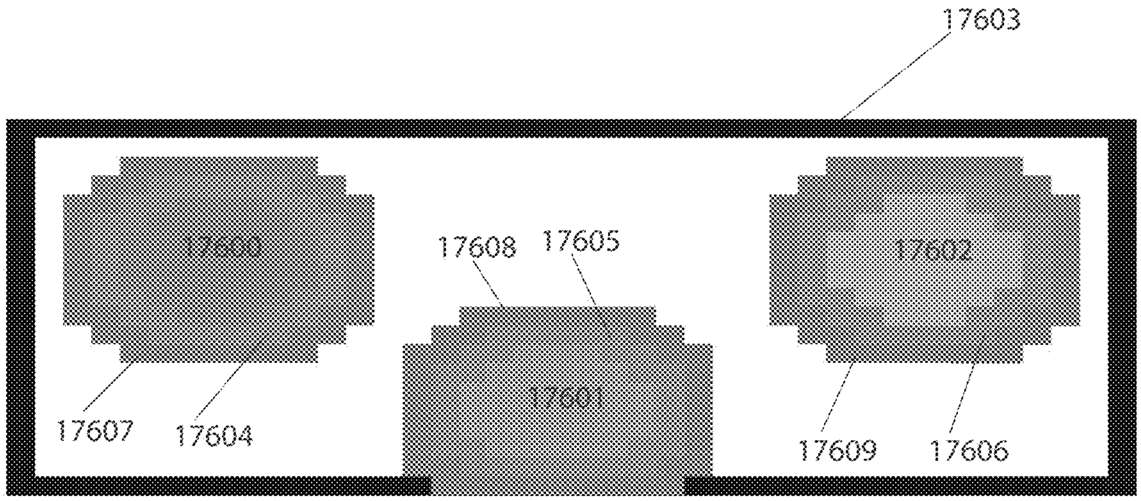

FIGS. 176A and 176B illustrate patterns followed by embodiments implementing a method for optimizing surface coverage of a discrete space with arbitrarily shaped zones, according to some embodiments.

Figure 177A:
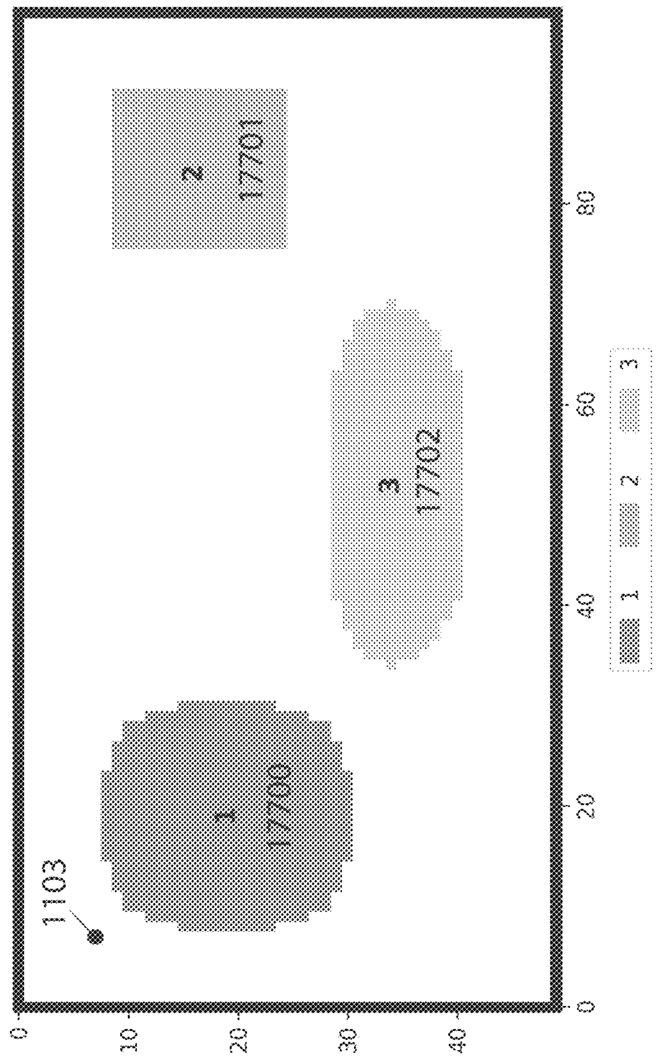
Figure 177B:
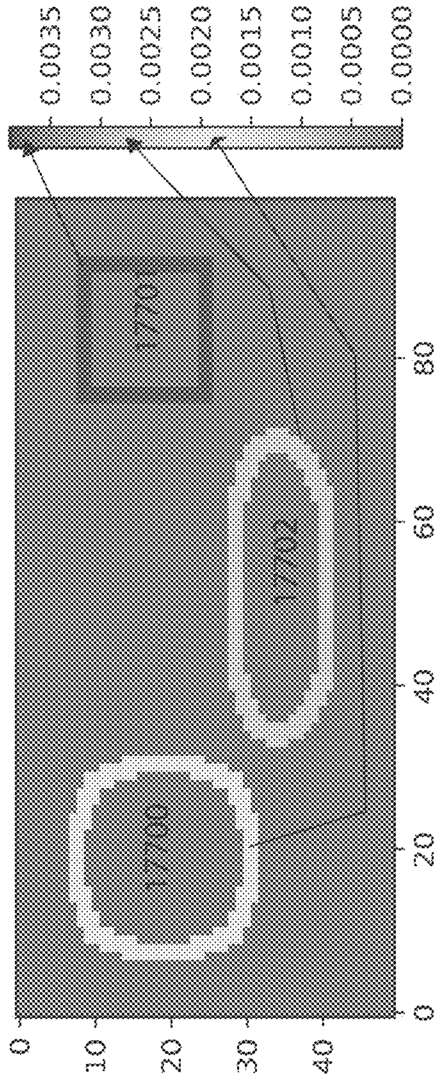
Figure 177C:
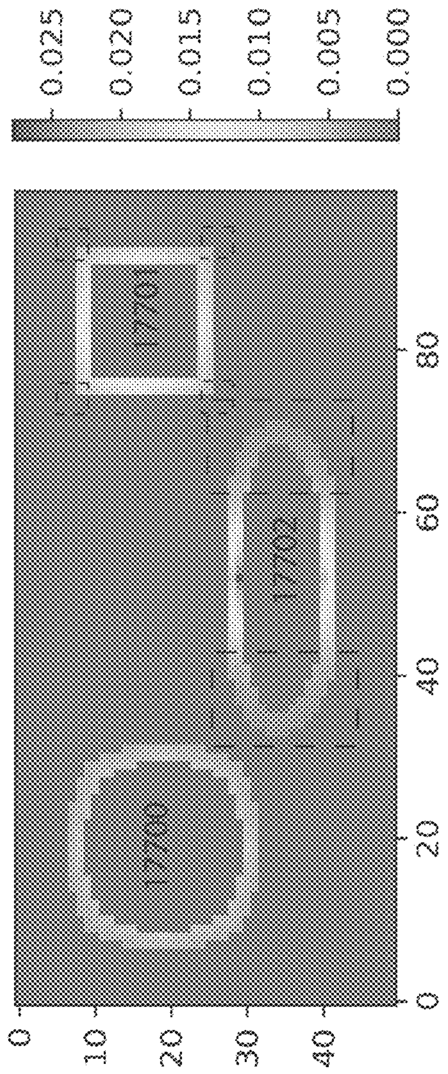
Figure 178:
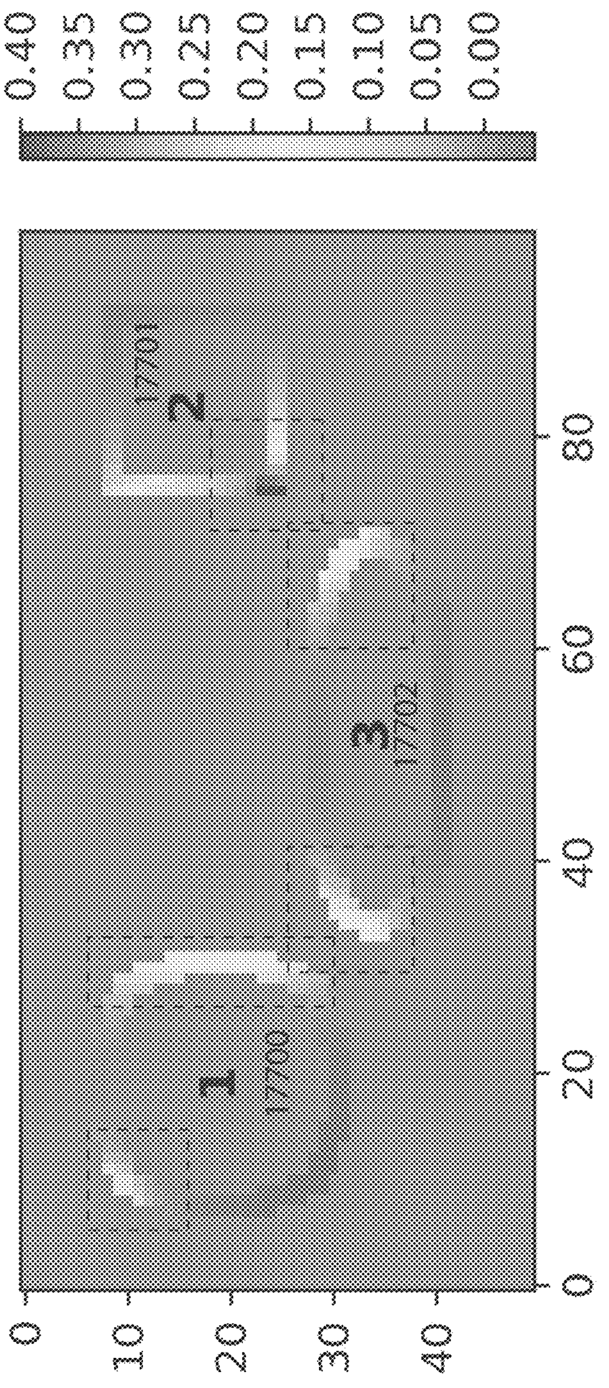

FIGS. 177A-177C illustrate example measures of area and distance from the center of a zone used in assigning a numerical value to boundary nodes of a zone, in accordance with some embodiments;

FIG. 178 illustrates an example measure for order of zone coverage used in assigning a numerical value to boundary nodes of a zone, according to some embodiments.

Figure 179A:
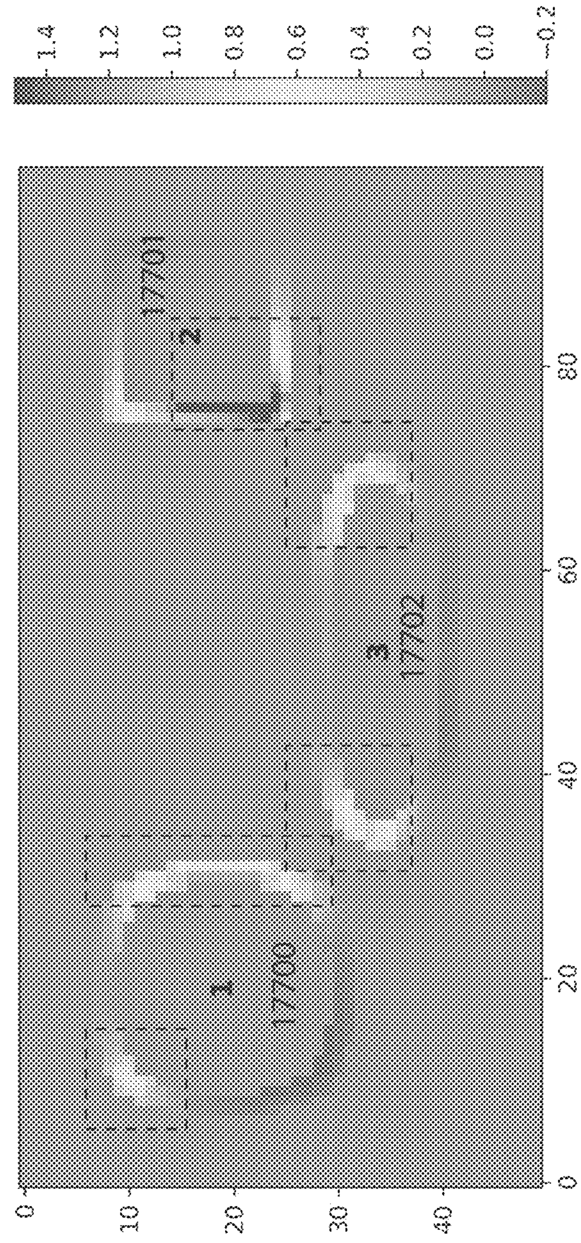
Figure 179B:
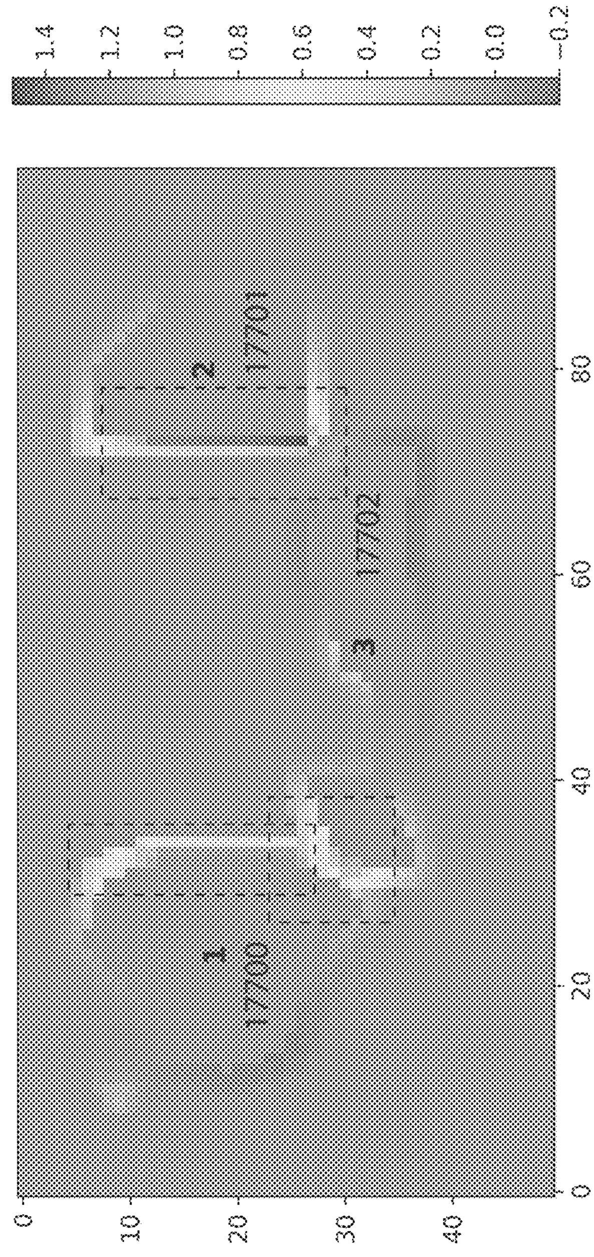

FIGS. 179A and 179B illustrate example numerical values of boundary nodes of zones and expansion/contraction of zones based on magnitude of numerical values of boundary nodes, according to some embodiments.

FIGS. 180, 181A-181C, 182, 183A, and 183B illustrate patterns followed by embodiments implementing a method for optimizing surface coverage of a workspace with rectangular zones, according to some embodiments.

Figure 184A:
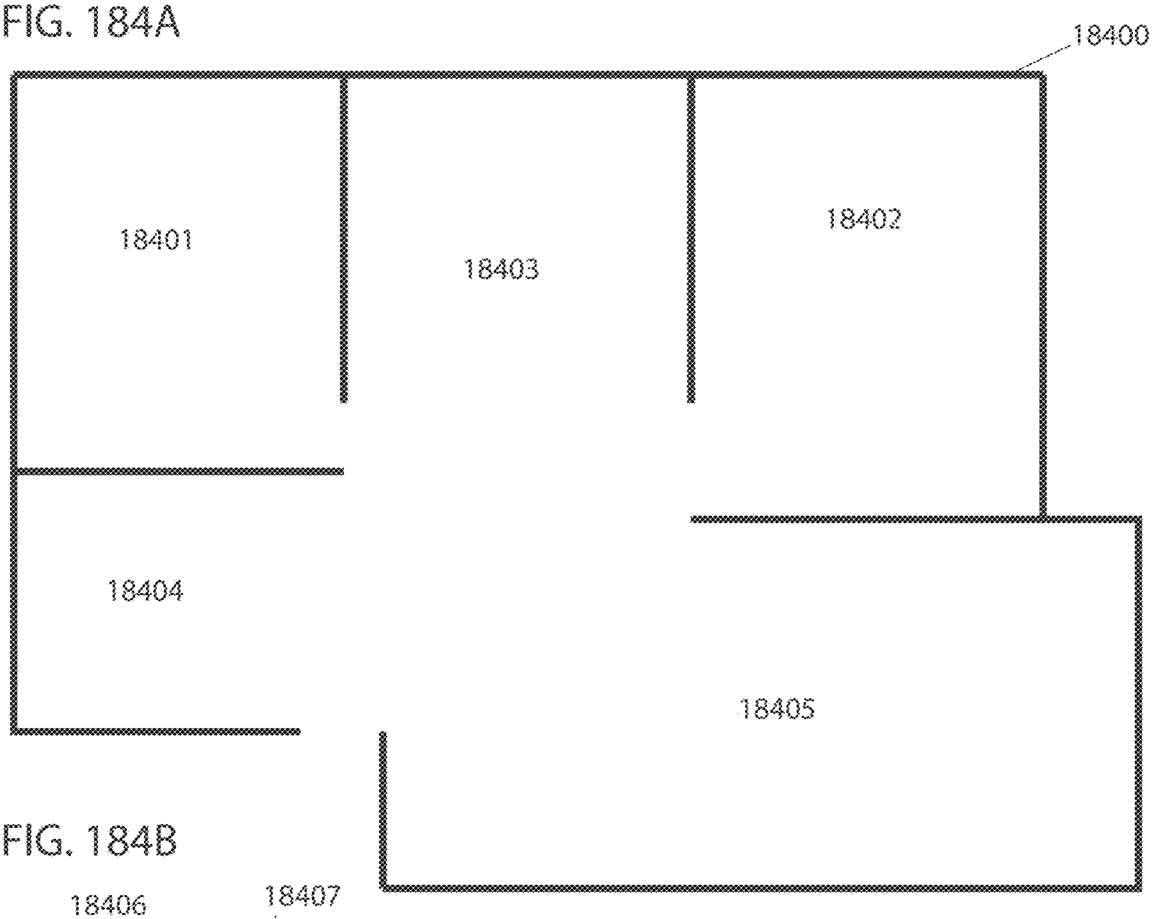
Figure 184B:
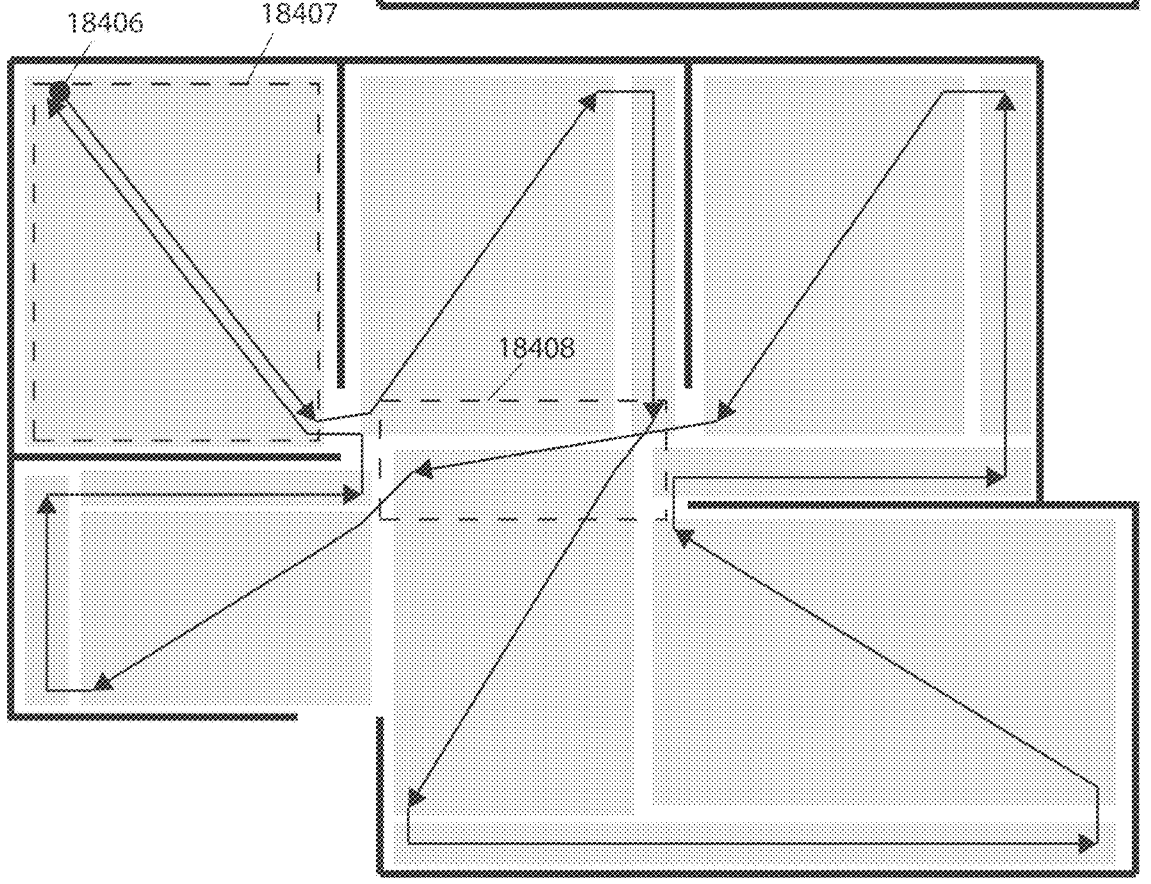
Figure 184C:
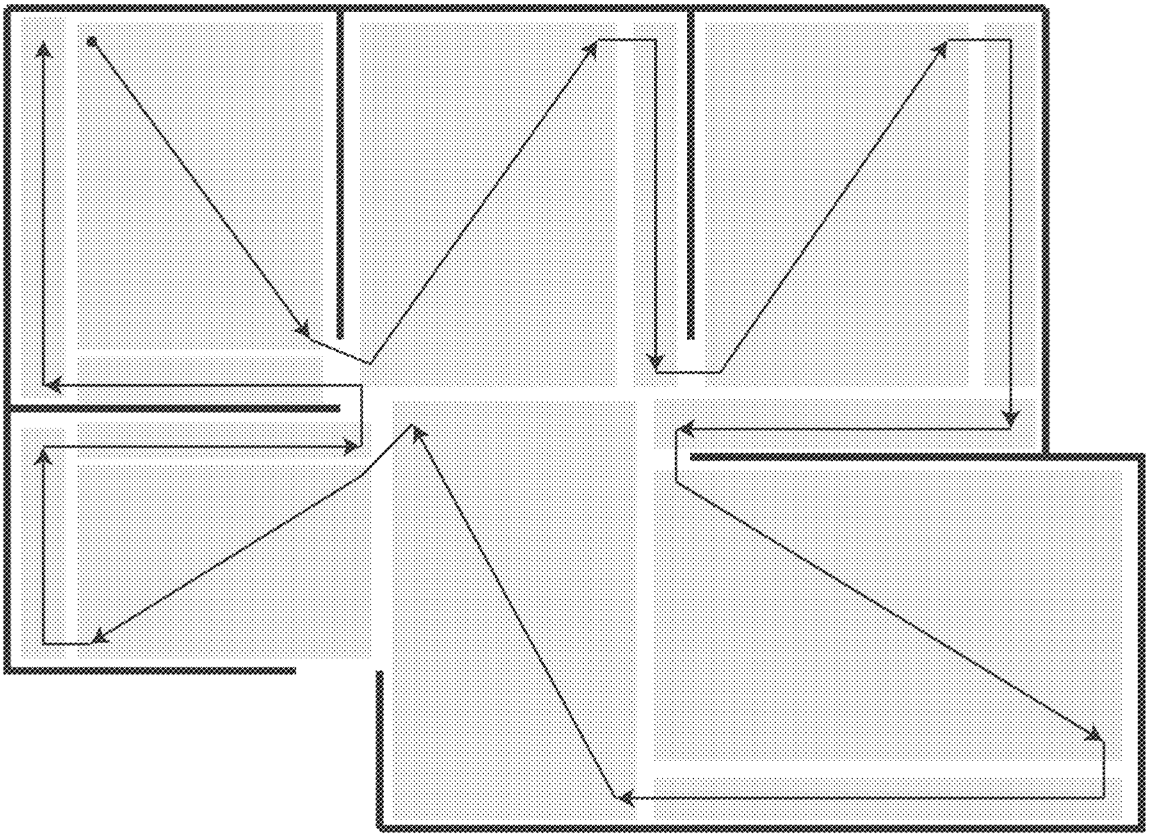

FIGS. 184A-184C illustrate optimization of zone division and order of zone coverage of a workspace, according to some embodiments.

Figure 185:
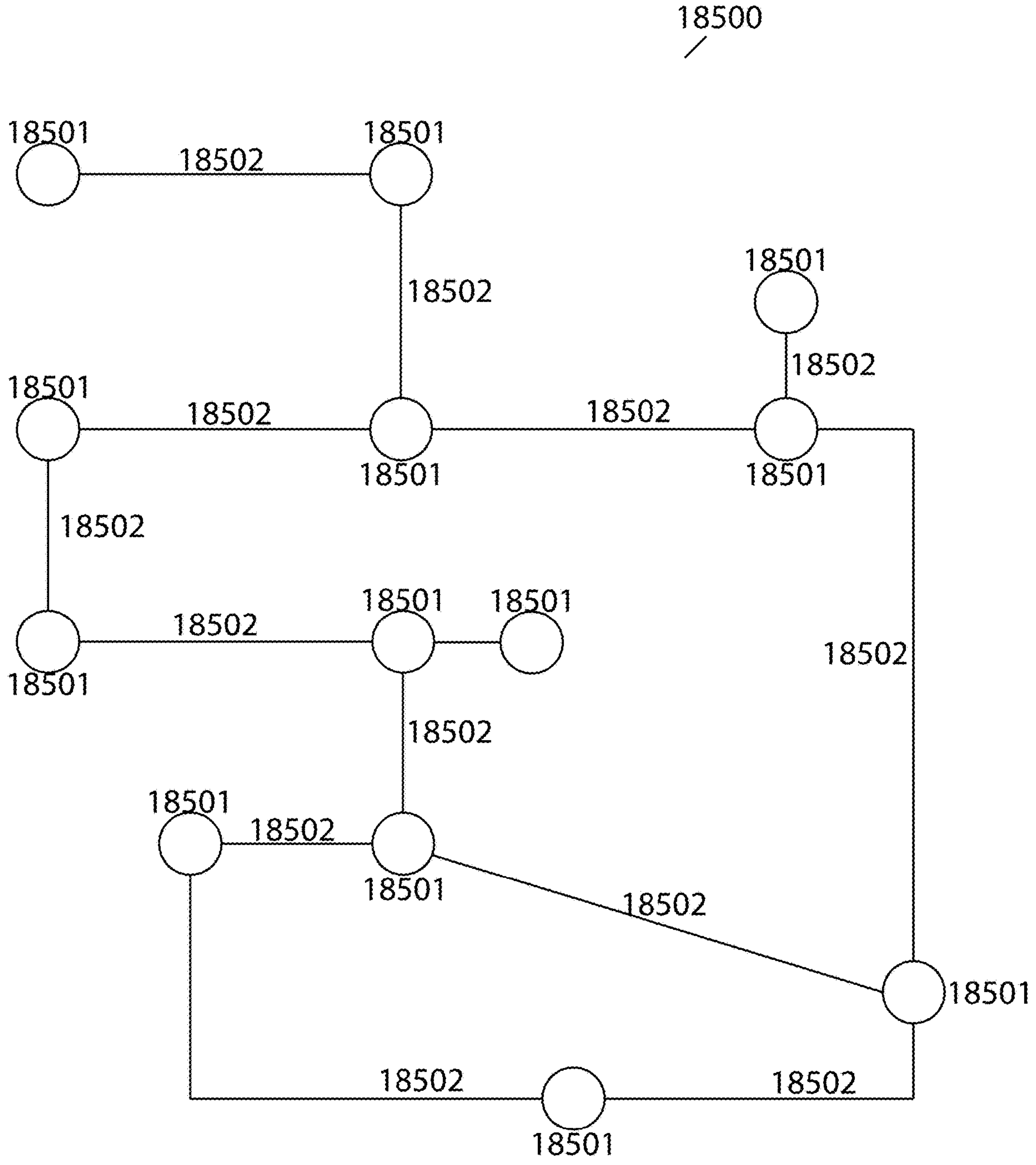

FIG. 185 illustrates an example of a network including a plurality of nodes connected by links, according to some embodiments.

Figure 186:
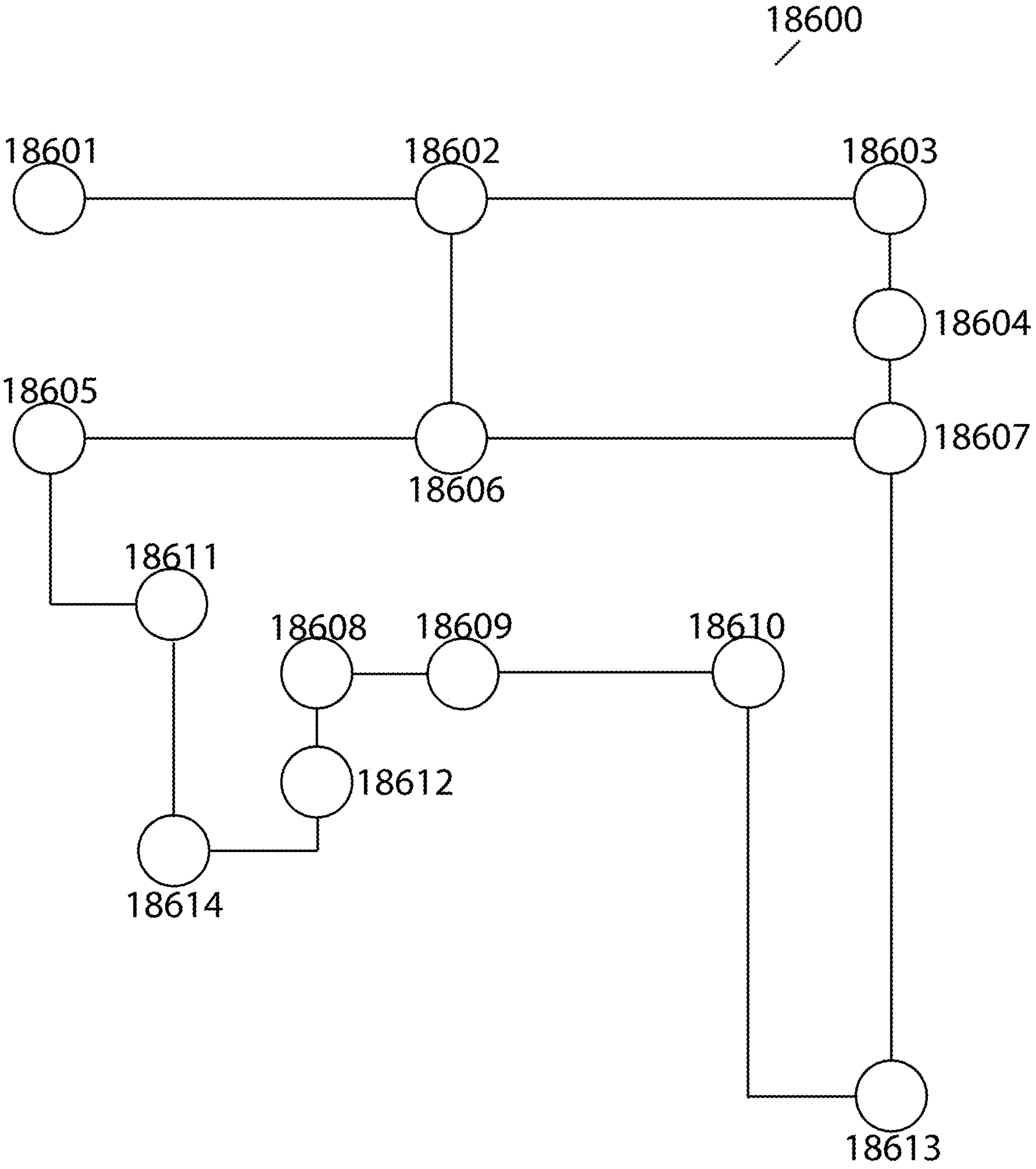

FIG. 186 illustrates an example of a network including a plurality of nodes connected by links, according to some embodiments.

Figure 187A:
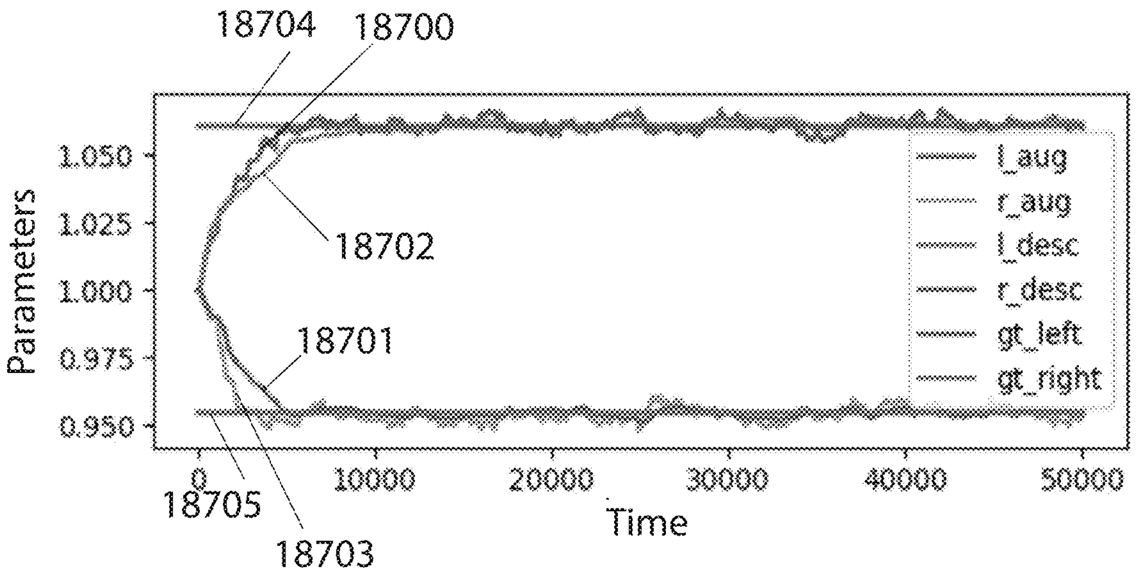
Figure 187B:
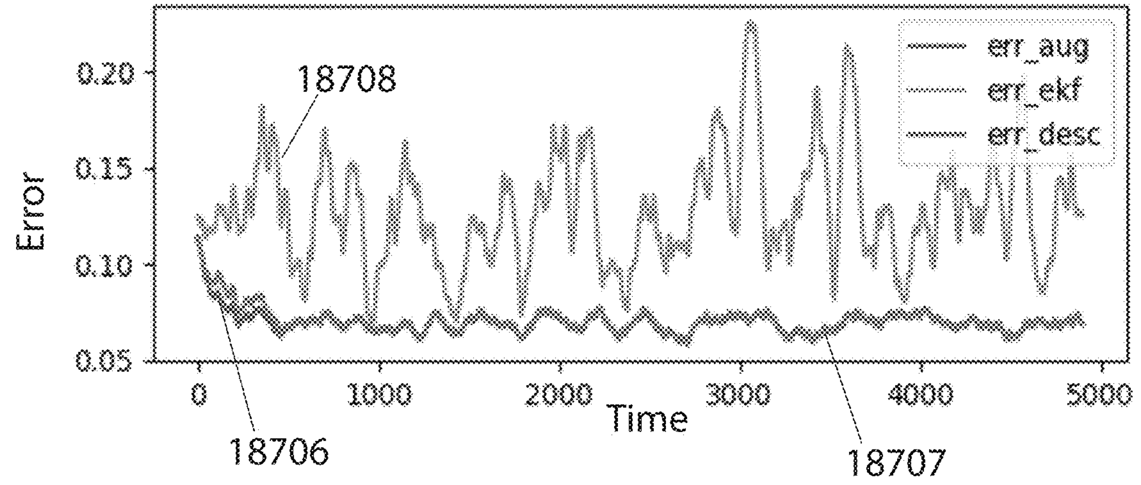

FIGS. 187A and 187B illustrate results of an exemplary method for estimating parameters of a motion model of a robotic device, according to some embodiments.

Figure 188A:
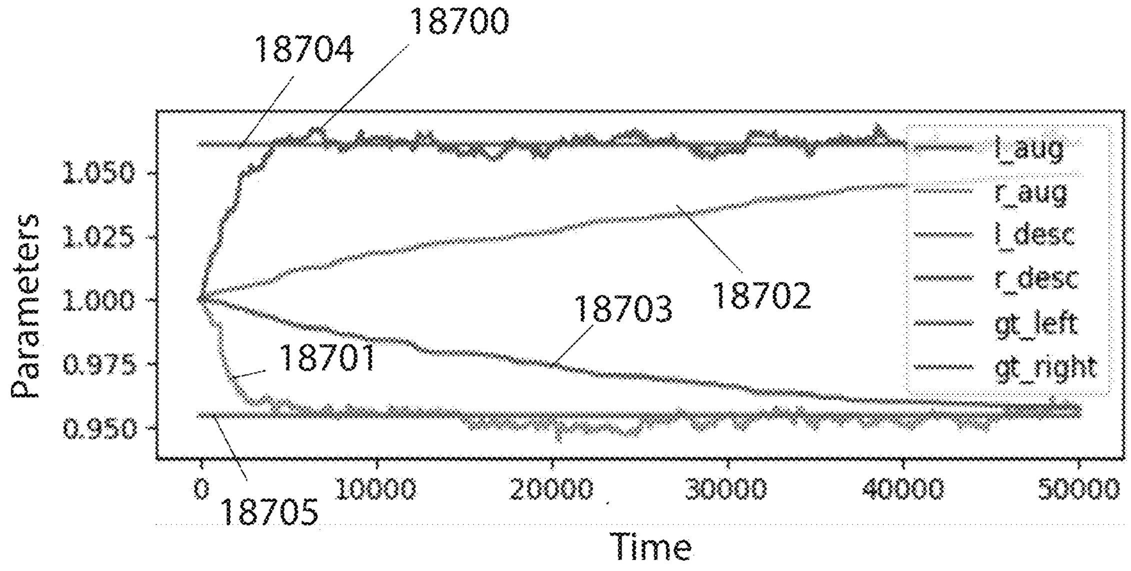
Figure 188B:
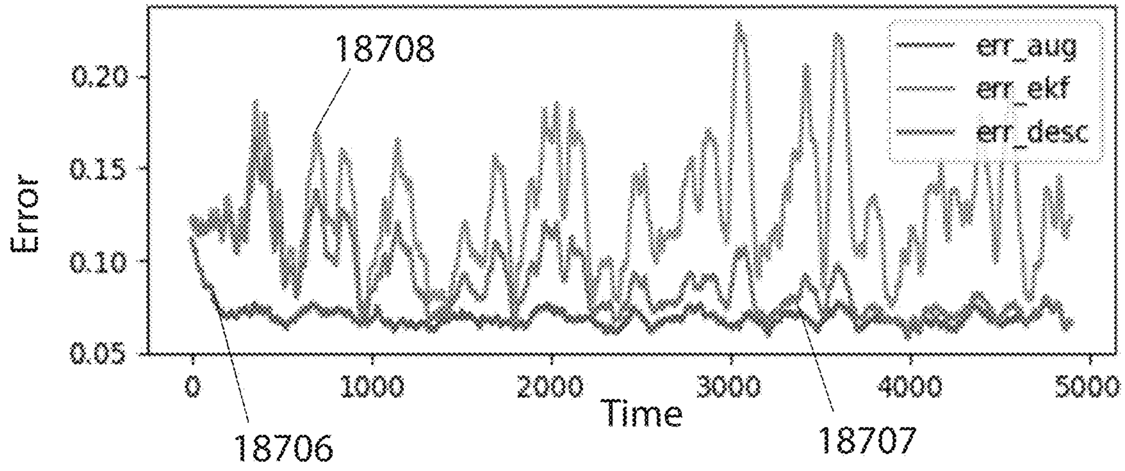

FIGS. 188A and 188B illustrate results of an exemplary method for estimating parameters of a motion model of a robotic device, according to some embodiments.

Figure 189A:
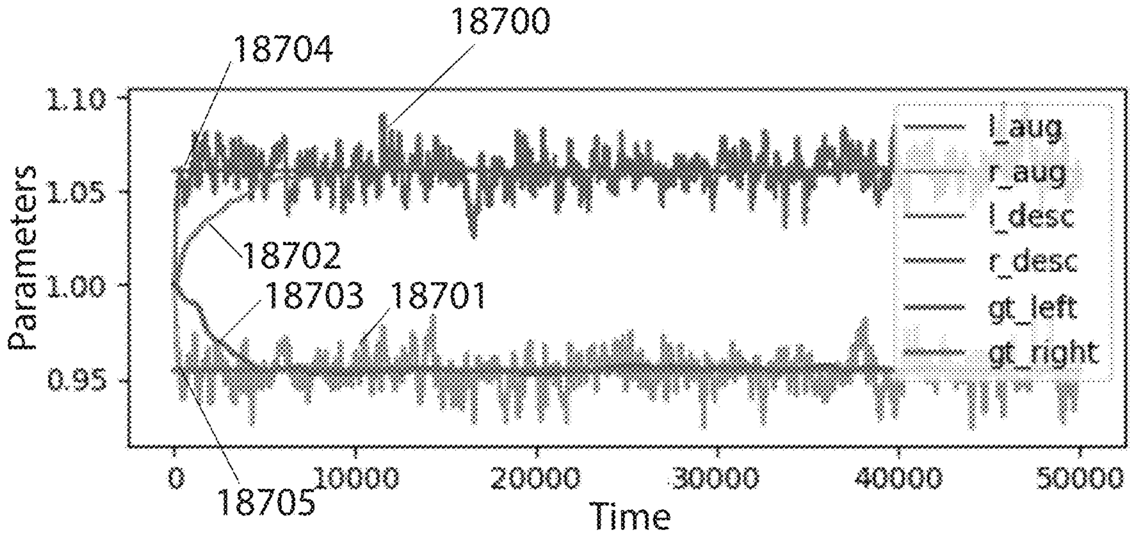
Figure 189B:
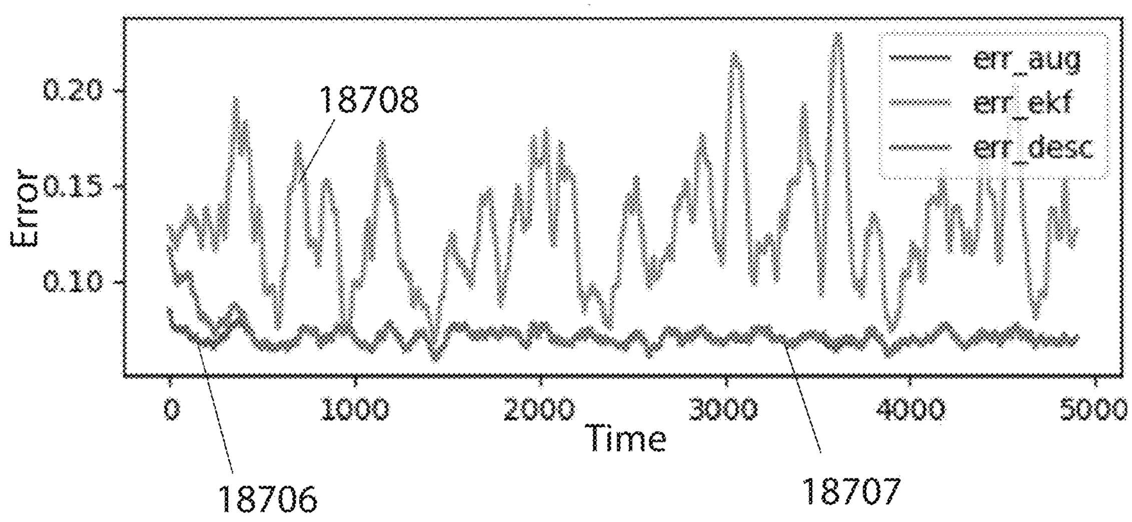

FIGS. 189A and 189B illustrate results of an exemplary method for estimating parameters of a motion model of a robotic device, according to some embodiments.

Figure 190A:
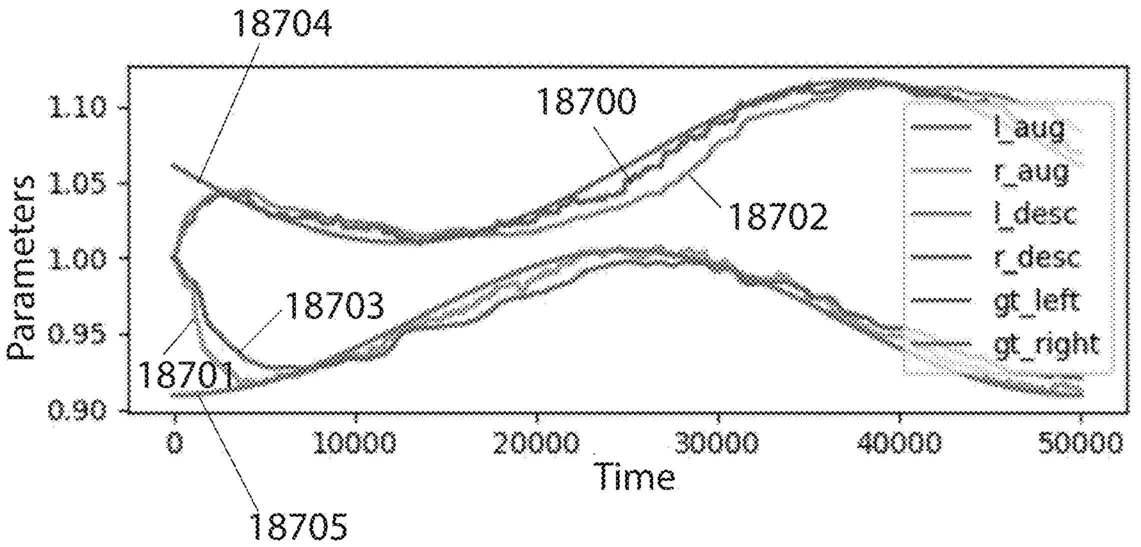
Figure 190B:
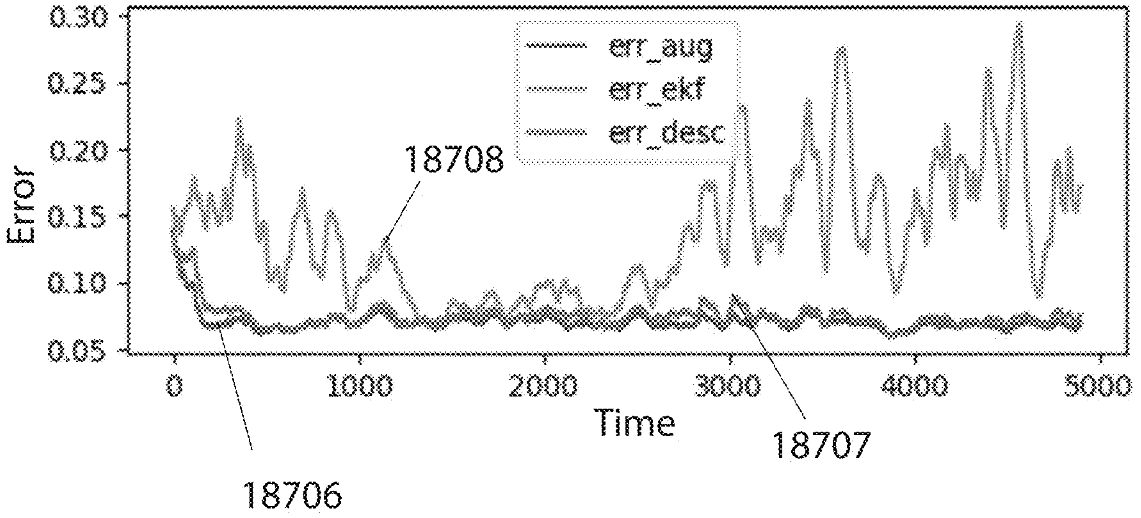

FIGS. 190A and 190B illustrate results of an exemplary method for estimating parameters of a motion model of a robotic device, according to some embodiments.

Figure 191A:
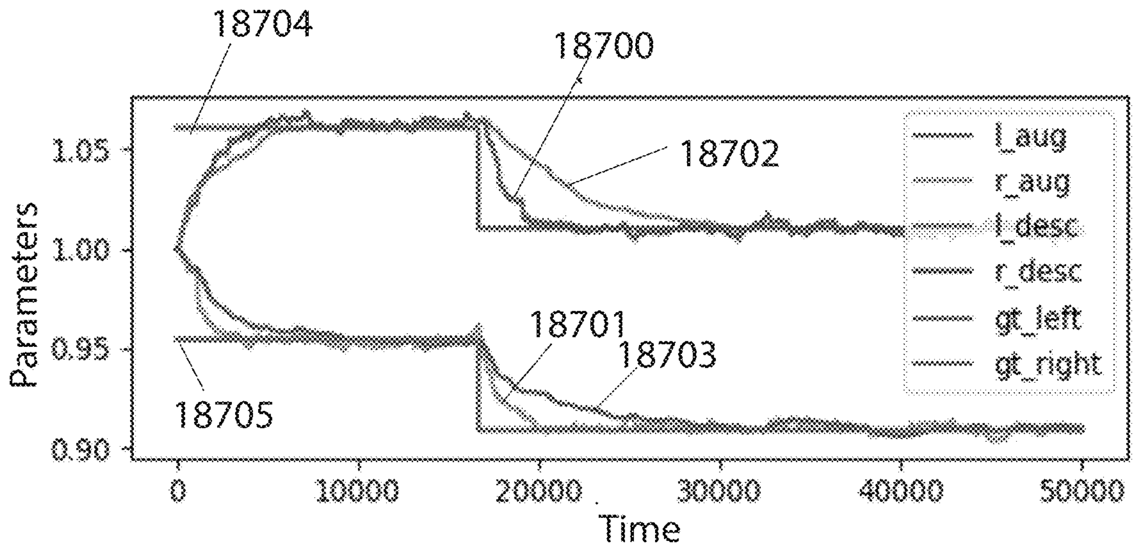
Figure 191B:
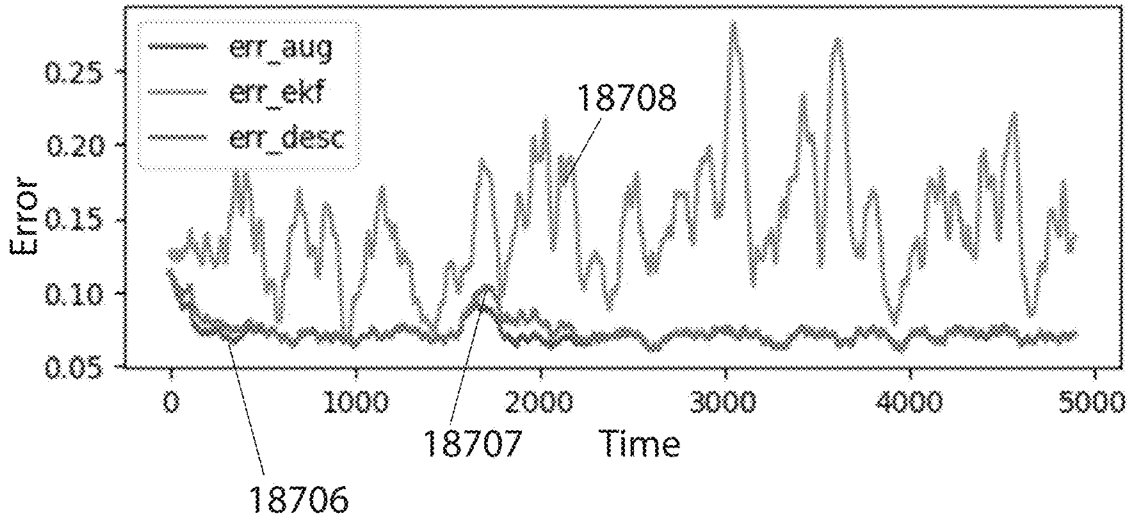

FIGS. 191A and 191B illustrate results of an exemplary method for estimating parameters of a motion model of a robotic device, according to some embodiments.

Figure 192:
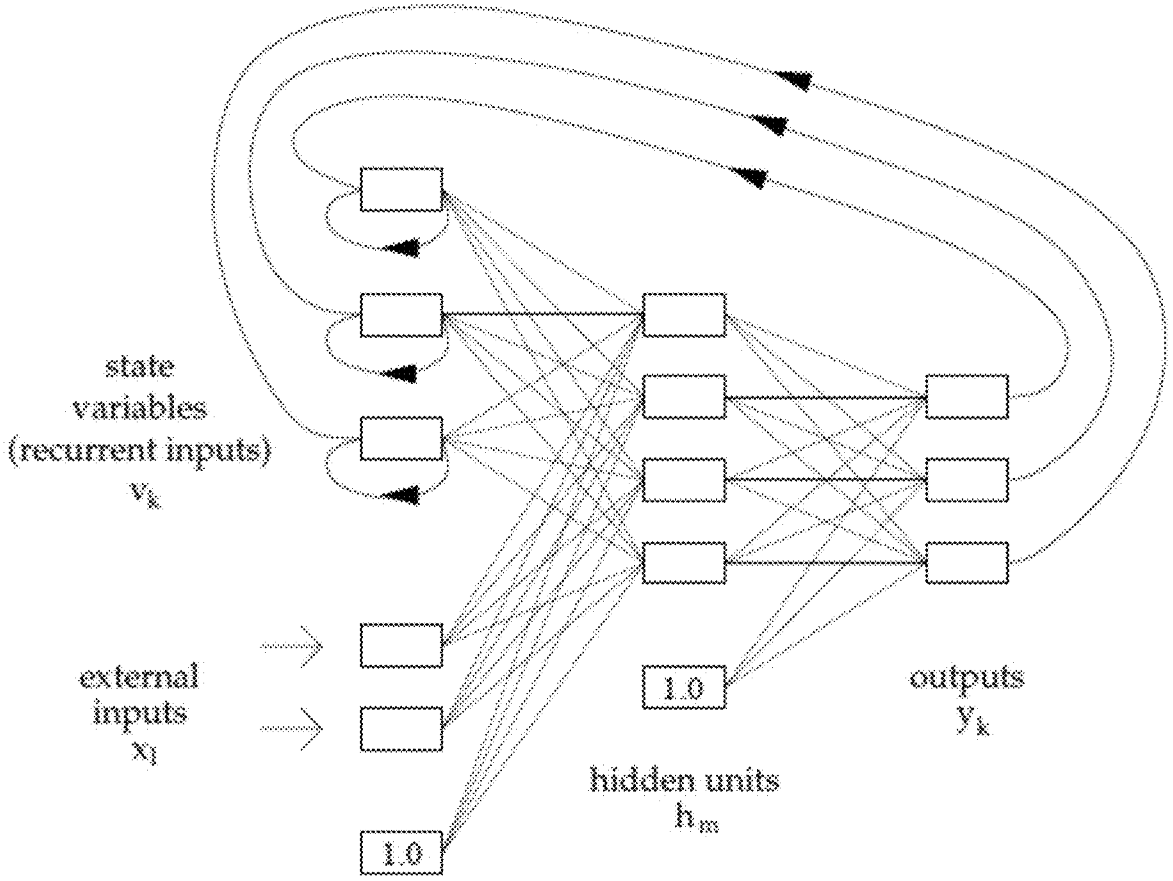

FIG. 192 illustrates an example hierarchy of a recurrent neural network, according to some embodiments.

Figure 193:
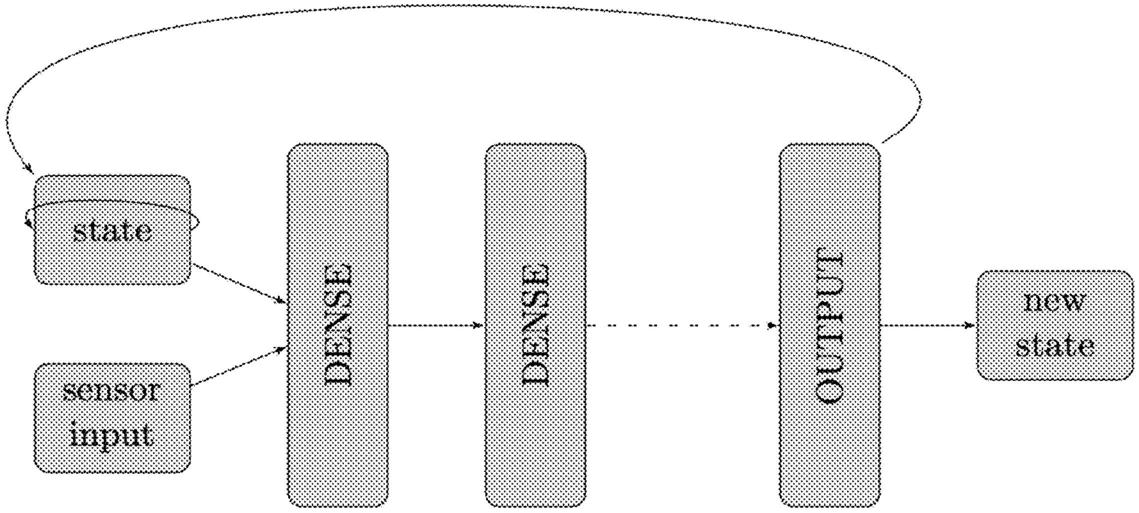

FIG. 193 illustrates an example of a motion model of a robotic device, according to some embodiments.

Figure 194:
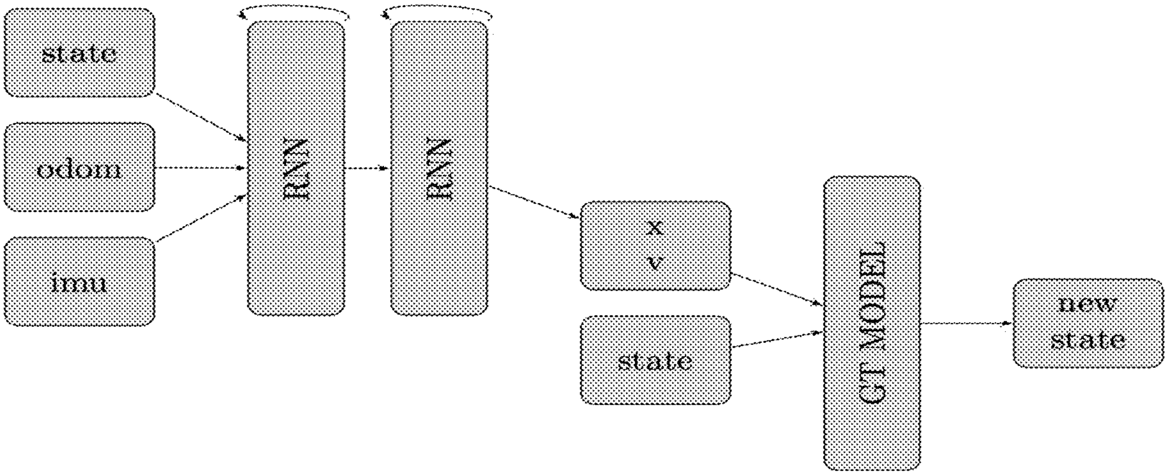

FIG. 194 illustrates an example of a motion model of a robotic device, according to some embodiments.

Figure 195:
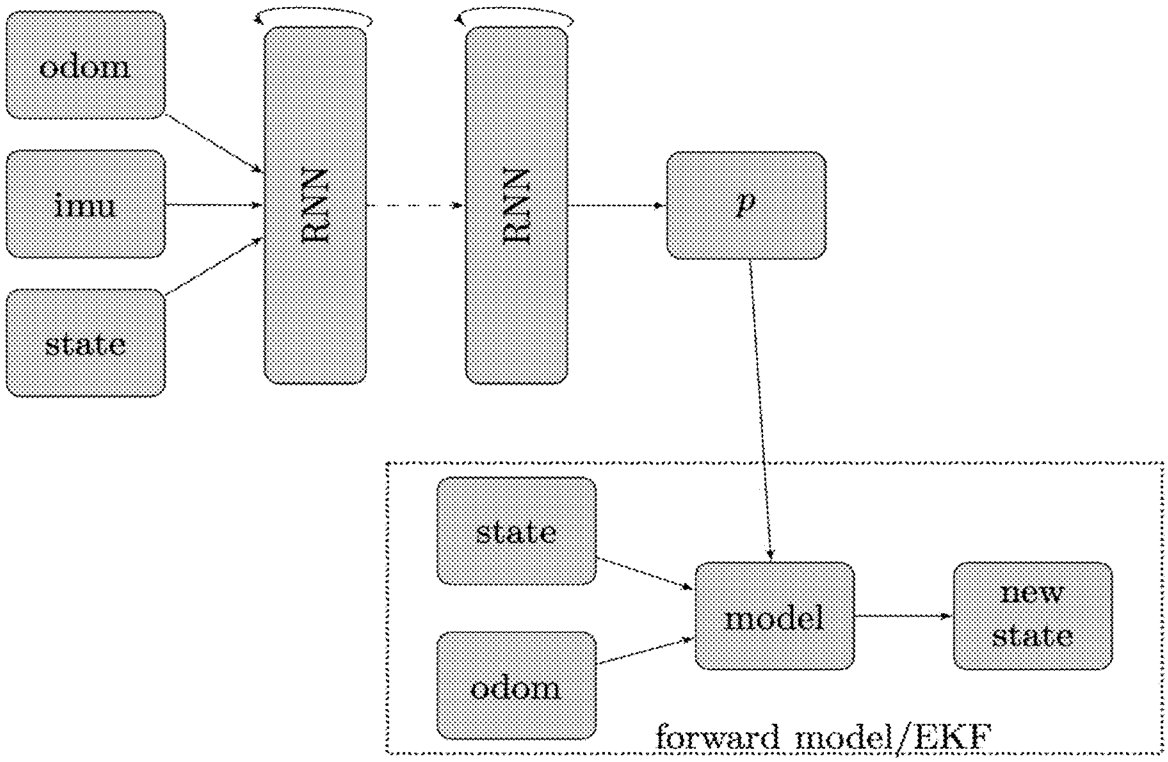

FIG. 195 illustrates an example of a motion model of a robotic device, according to some embodiments.

Figure 196:
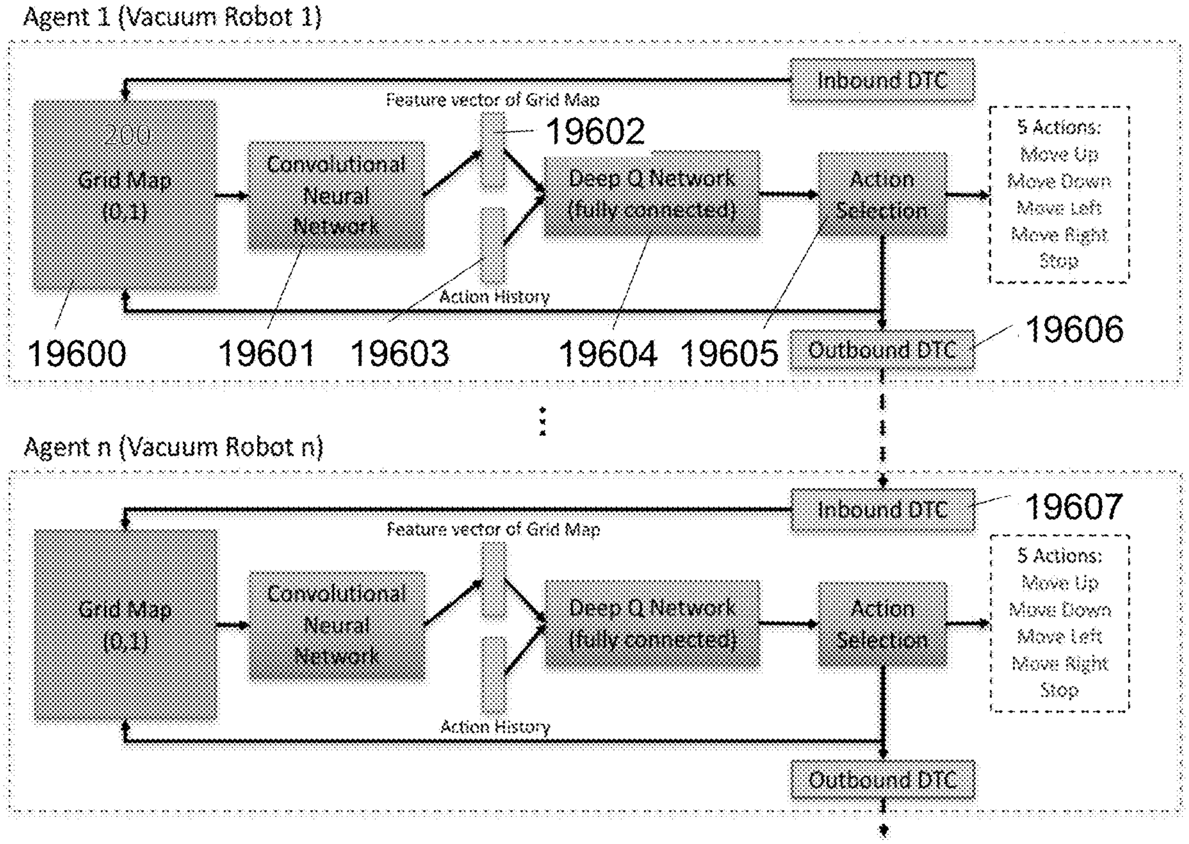

FIG. 196 illustrates an example of a Deep Collaborative Reinforcement Learning framework, according to some embodiments.

Figure 197:
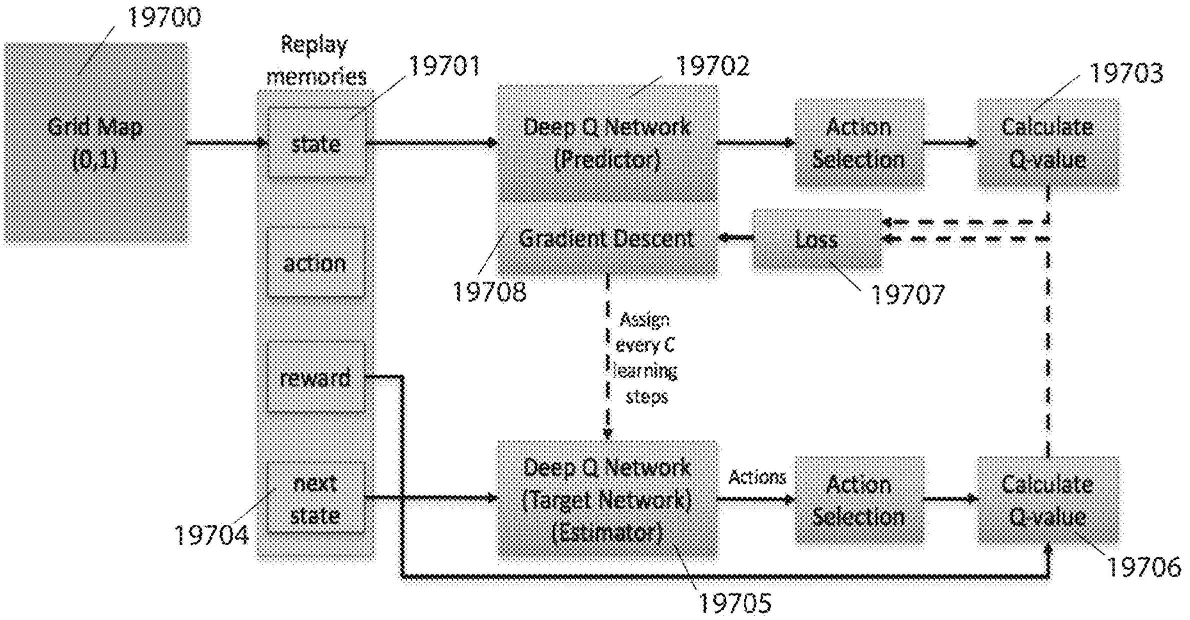

FIG. 197 illustrates an example of a method for training a single DQN of a cleaning robot, according to some embodiments.

Figure 198:
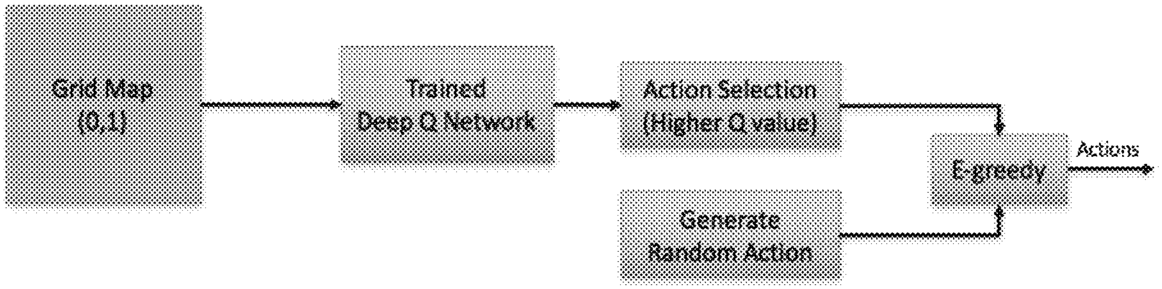

FIG. 198 illustrates a flowchart describing testing of a single cleaning robot, according to some embodiments.

Figure 199:
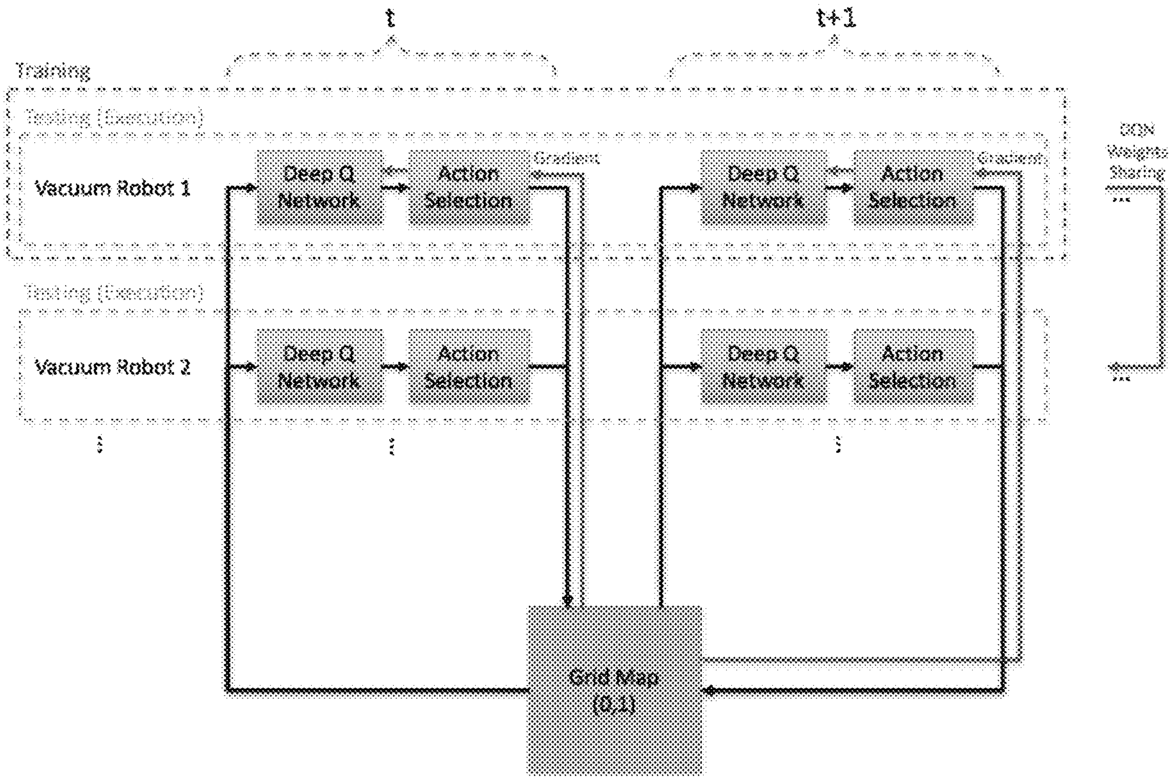

FIG. 199 illustrates an example of decentralized learning for collaborating robots, according to some embodiments.

Figure 200:
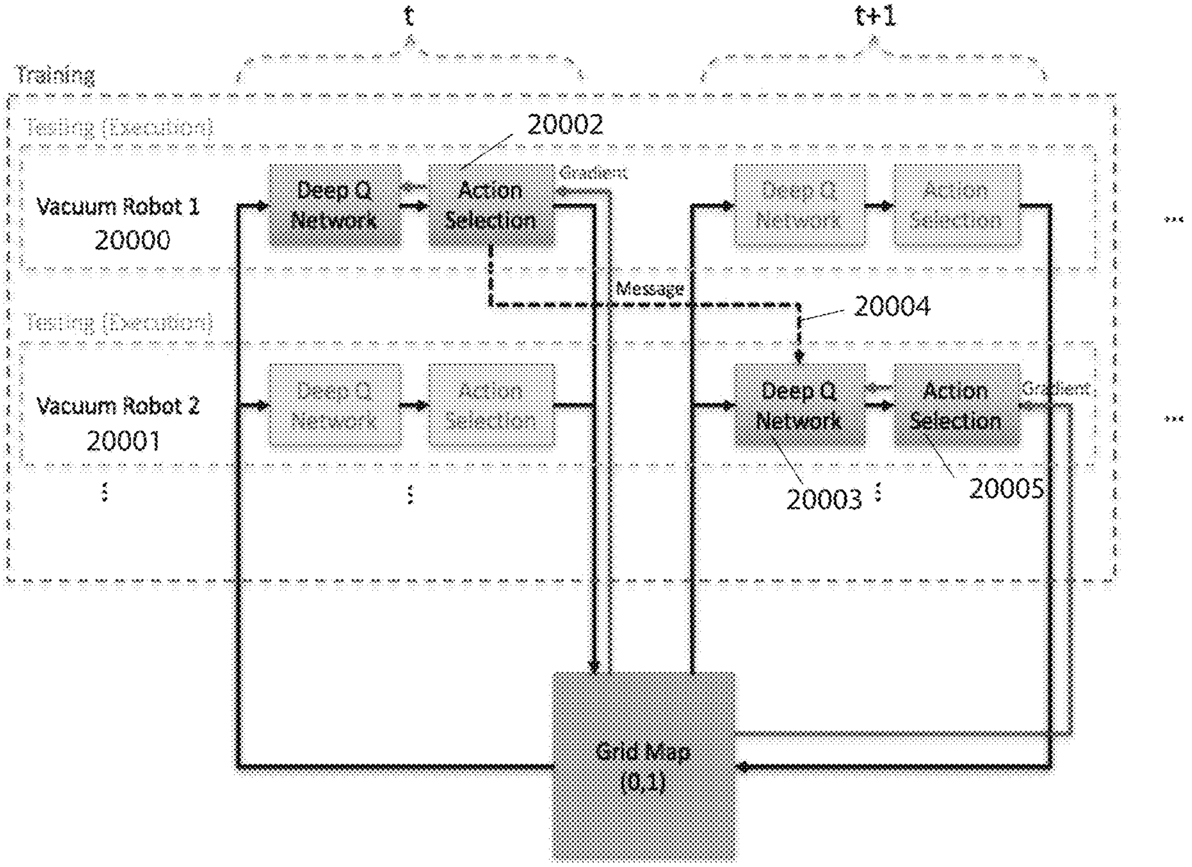

FIG. 200 illustrates an example of decentralized learning for collaborating robots, according to some embodiments.

Figure 201:
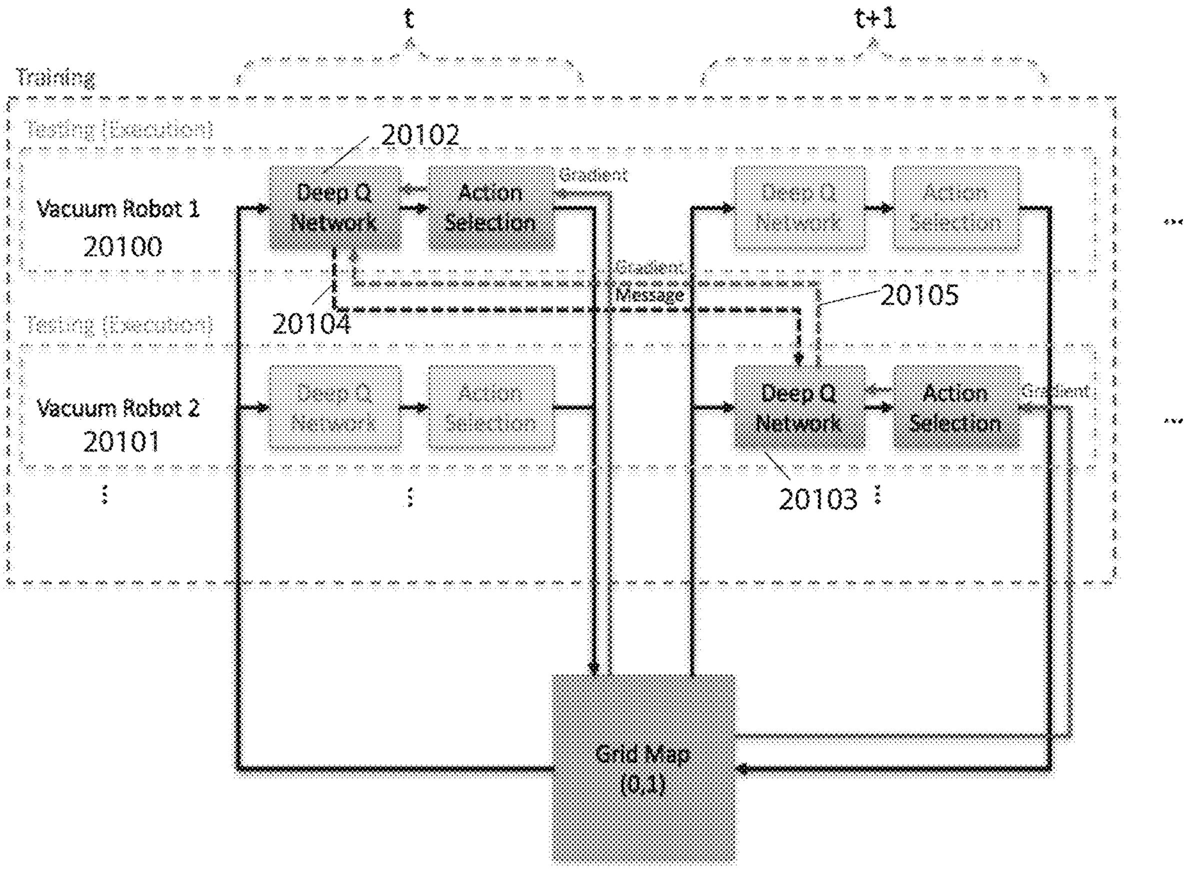

FIG. 201 illustrates an example of centralized learning for collaborating robots, according to some embodiments.

Figure 202:
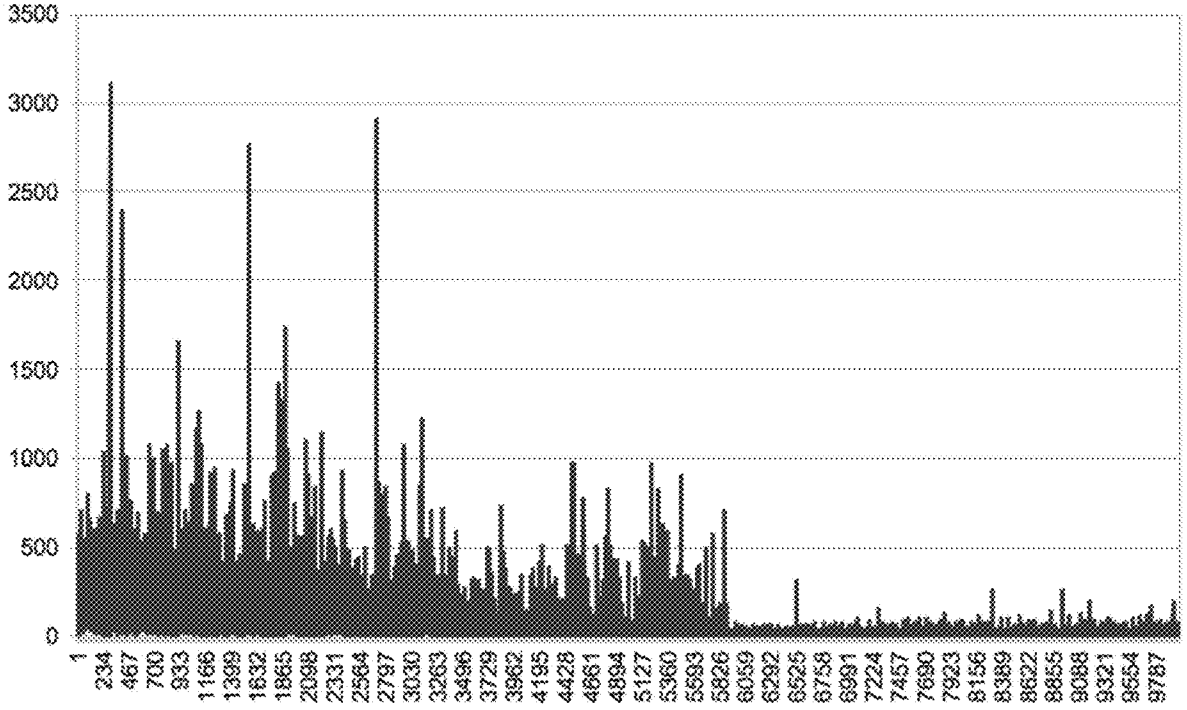

FIG. 202 illustrates the total movements of a robot during cleaning for consecutive episodes while training a DQN.

Figure 203:
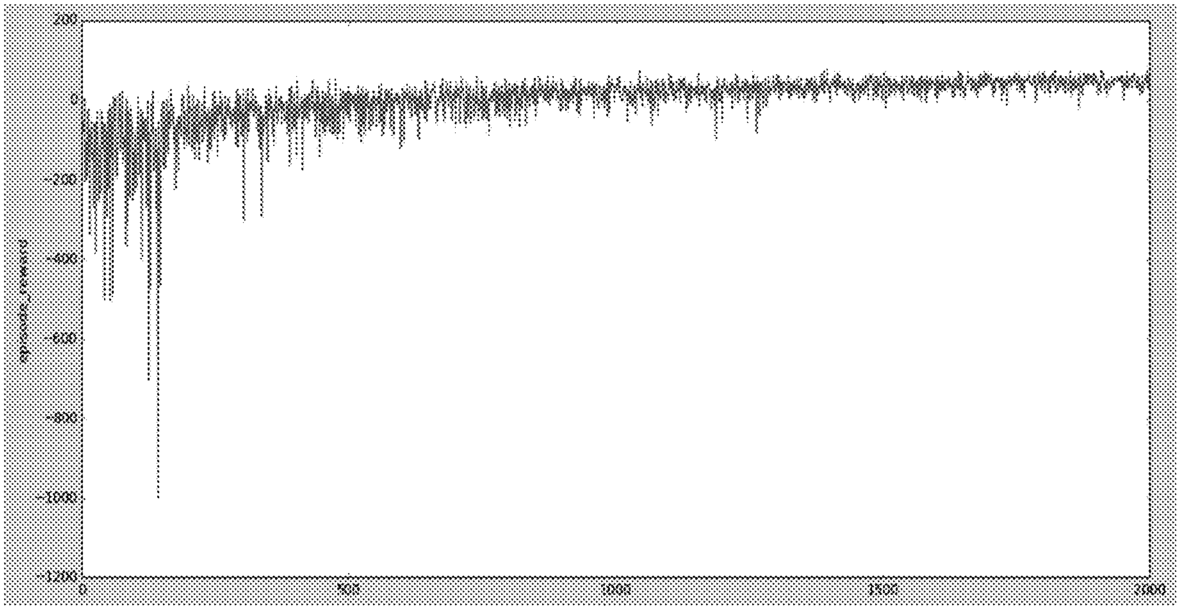

FIG. 203 illustrates a graph of episode reward for consecutive episodes resulting from training of a Kers-rl based DQN.

Figure 204:
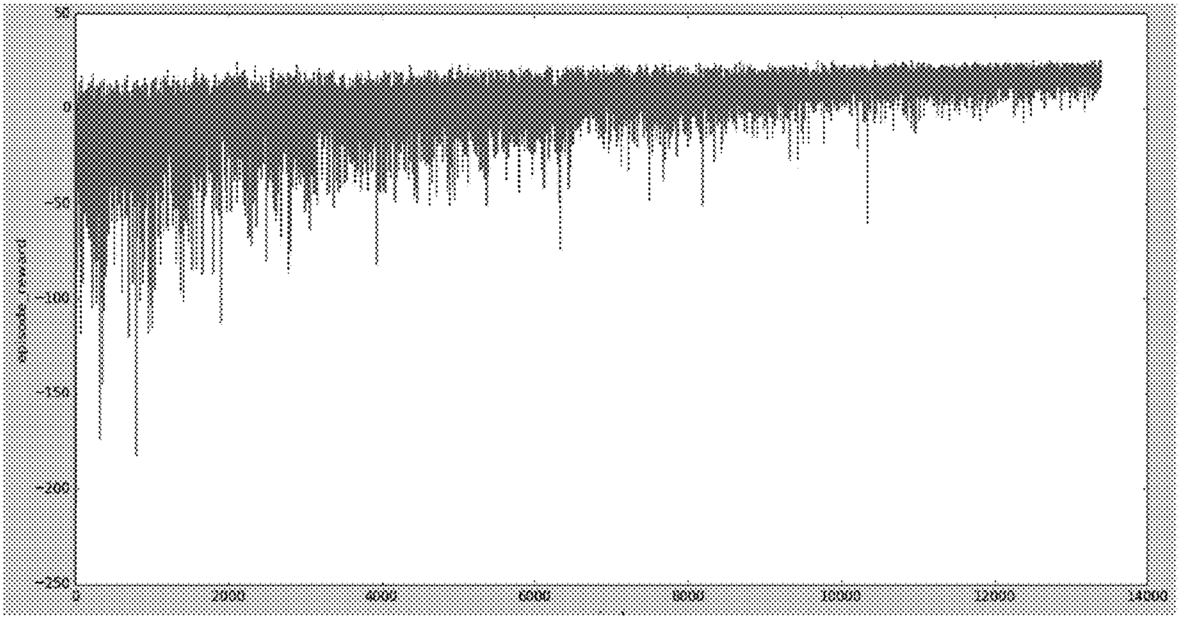

FIG. 204 illustrates a graph of episode reward for consecutive episodes when training a DQN for 1,000,000 steps.

Figure 205:
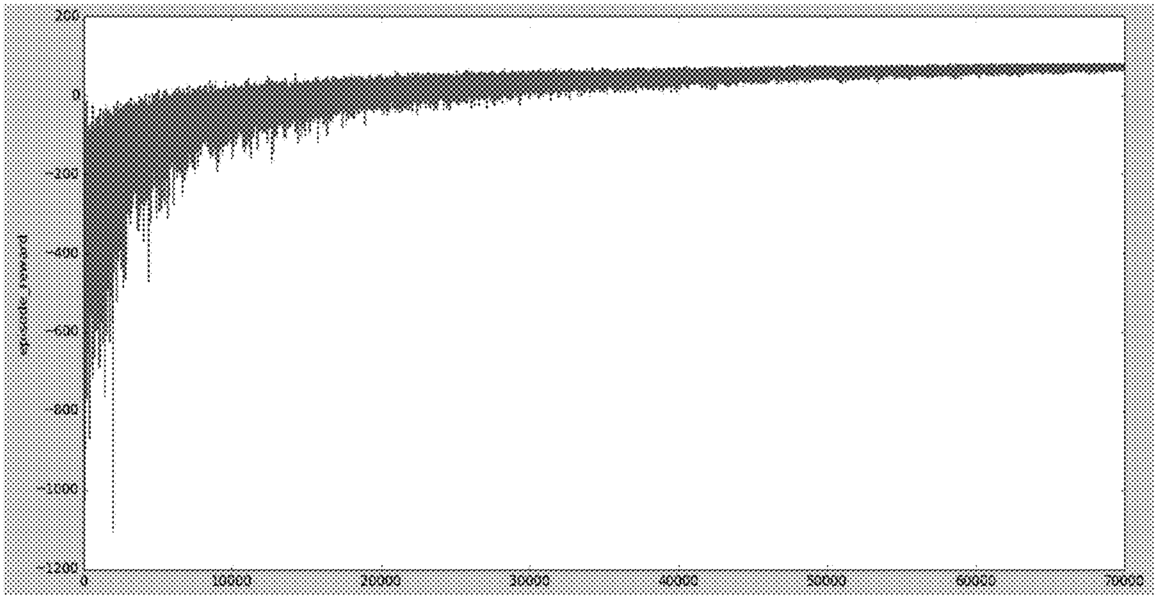

FIG. 205 illustrates a graph of episode reward for consecutive episodes when training a DQN for 10,000,000 steps.

Figure 206:
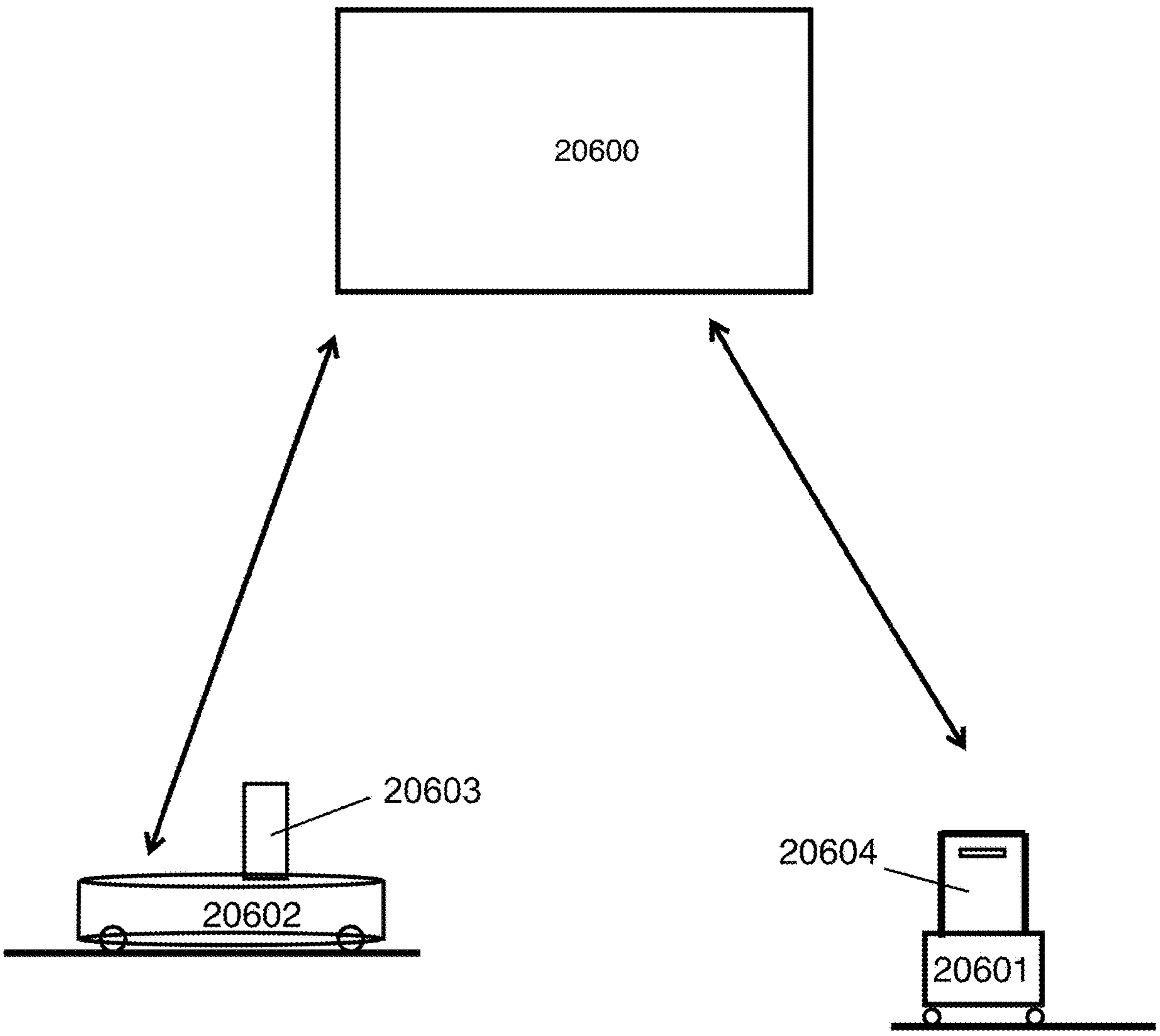

FIG. 206 illustrates an embodiment of a method for sending information to an autonomous device using cloud services and RF interface, according to some embodiments.

Figure 207:
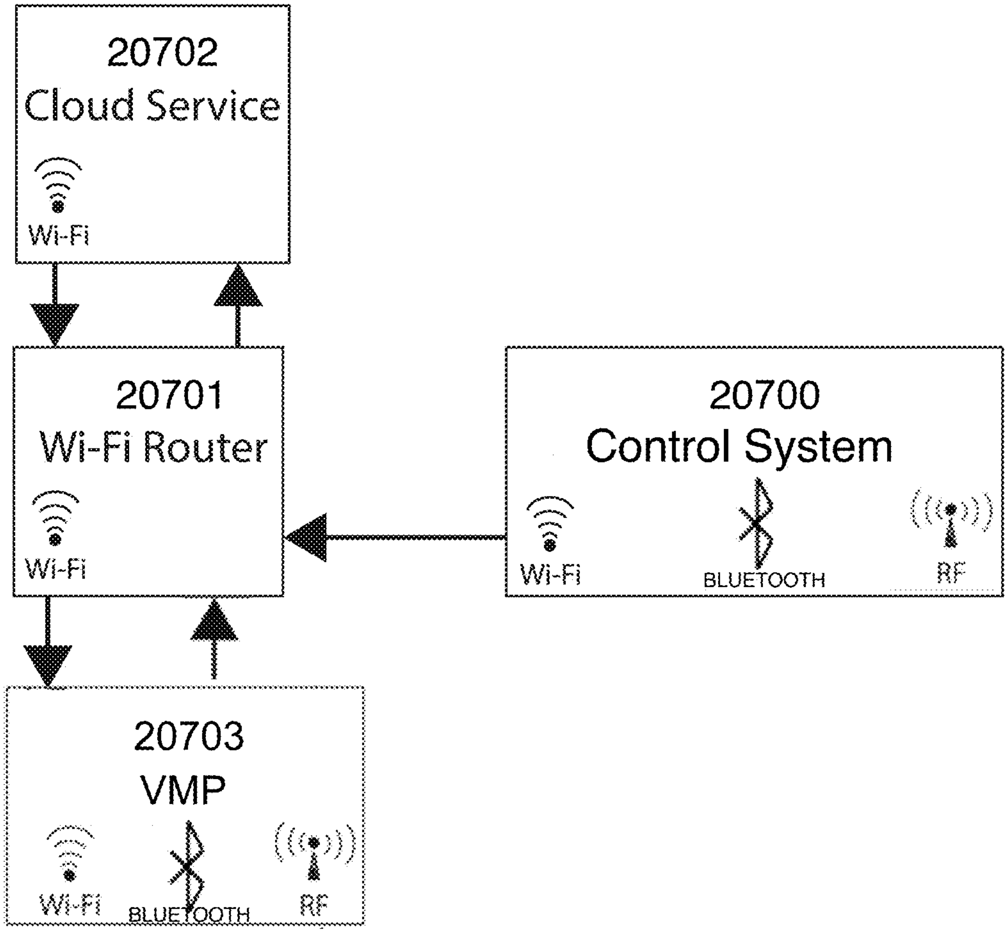

FIG. 207 illustrates a flowchart depicting an embodiment of a method for sending information to an autonomous robotic device using cloud services and RF interface, according to some embodiments.

Figure 208:
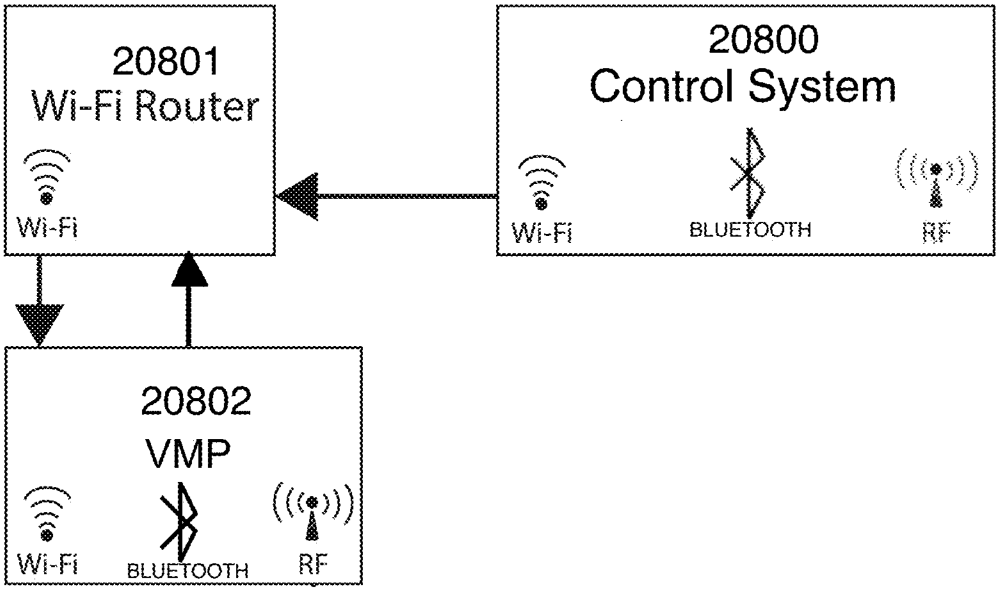

FIG. 208 illustrates a flowchart depicting an embodiment of a method for sending information to an autonomous robotic device using local connection and RF interface, according to some embodiments.

Figure 209:
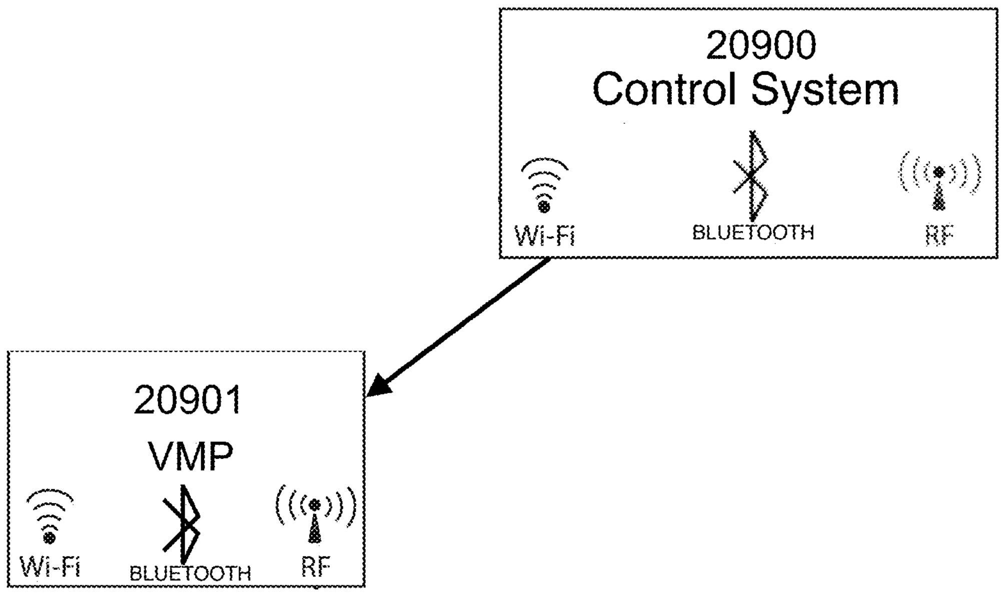

FIG. 209 illustrates a flowchart depicting an embodiment of a method for sending information to an autonomous robotic device using Bluetooth connection, in according to some embodiments.

FIGS. 210A-210D illustrate an example of VMP robot customized to transport a passenger pod, according to some embodiments.

Figure 211:
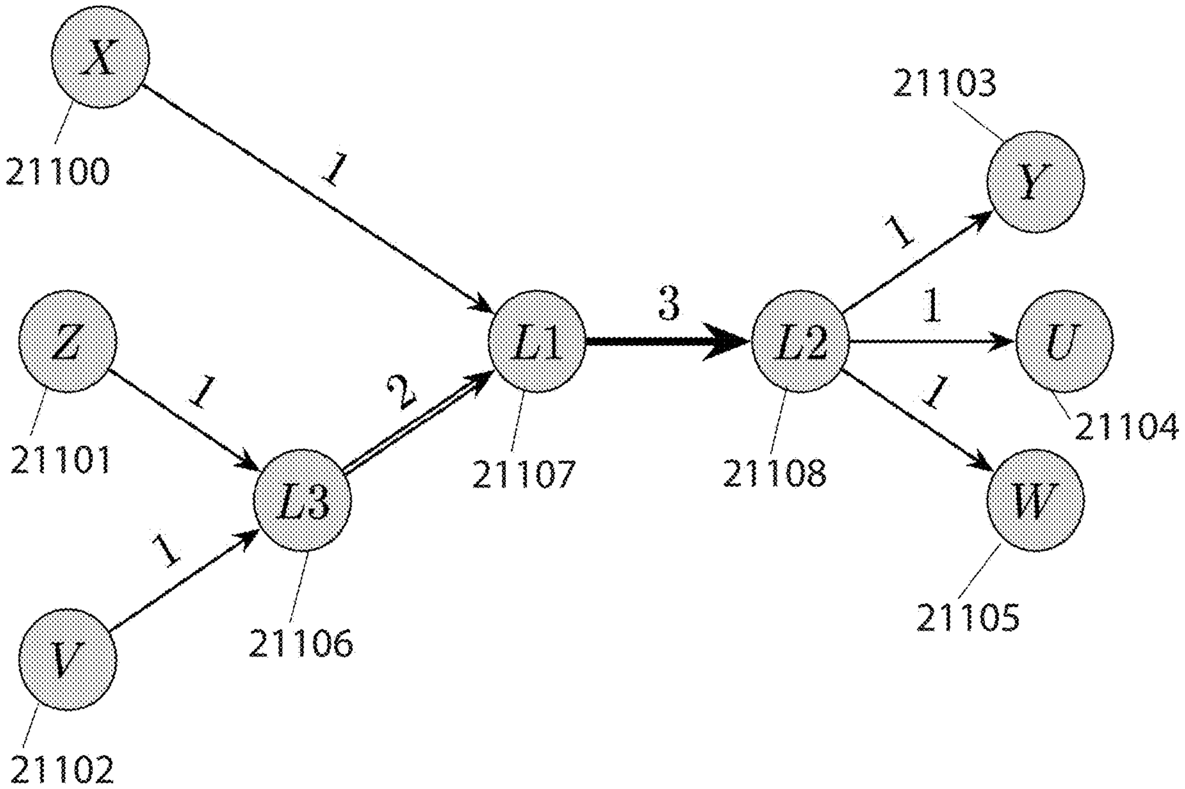

FIG. 211 illustrates an example of VMP robot paths when linking and unlinking together, according to some embodiments.

Figure 212A:
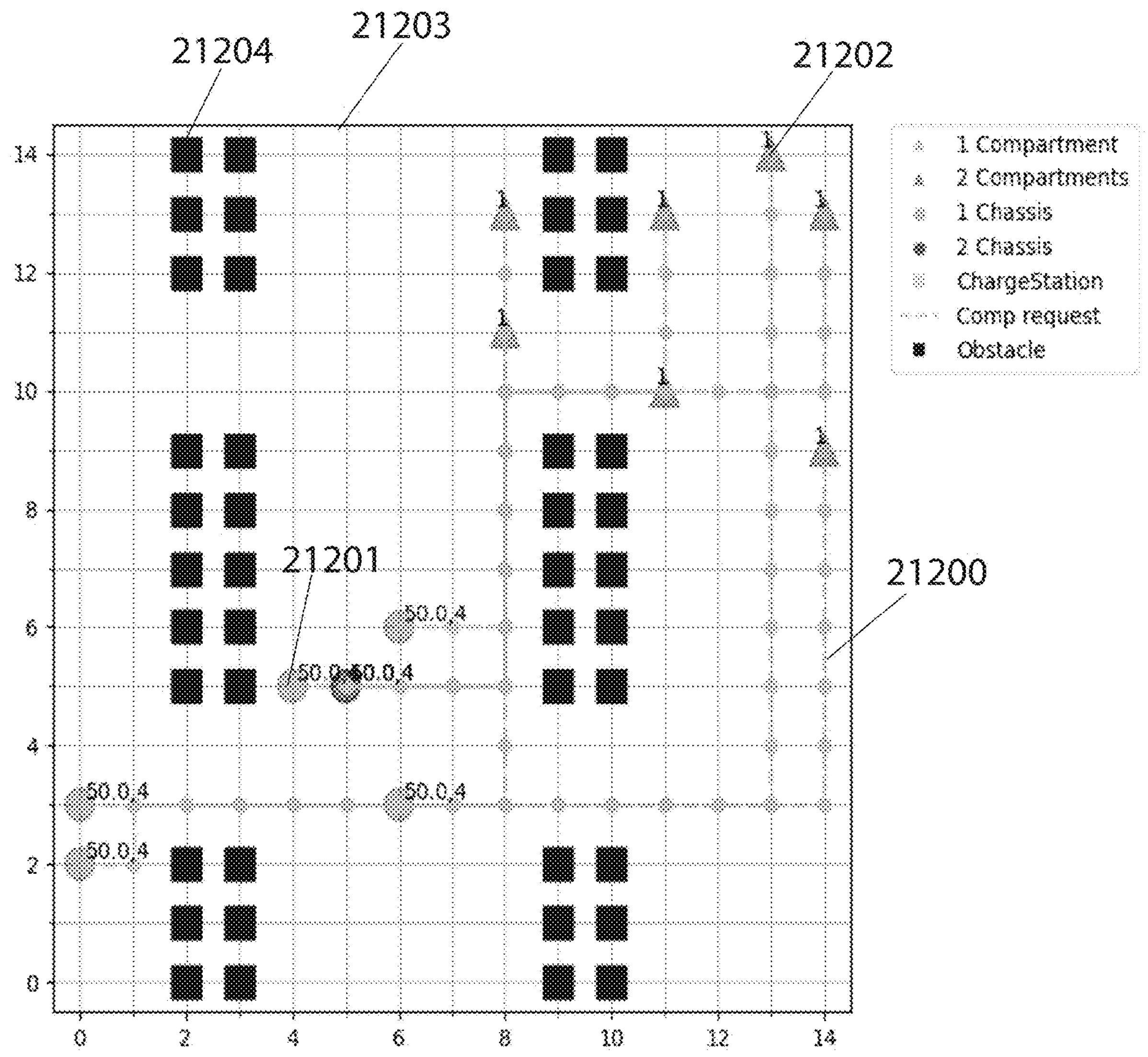
Figure 212B:
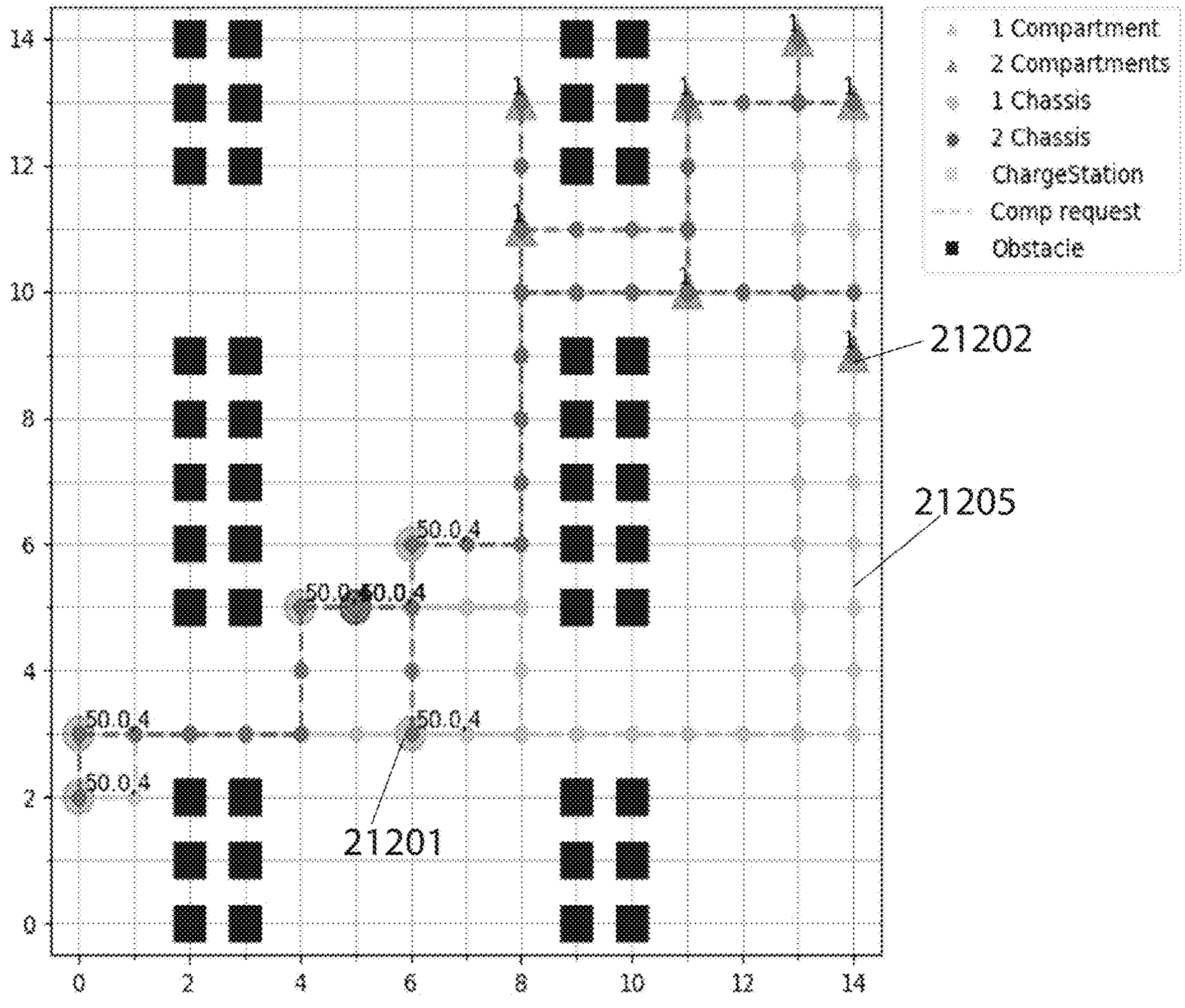

FIGS. 212A and 212B illustrate results of method for finding matching route segments between two VMP robots, according to some embodiments.

Figure 213:
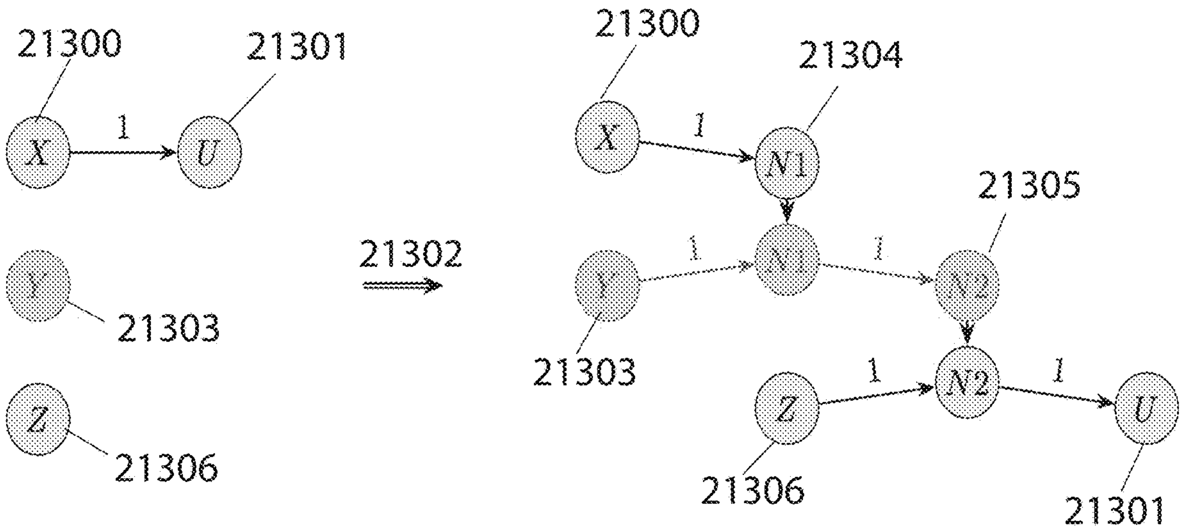

FIG. 213 illustrates an example of VMP robot paths when transferring pods between one another, according to some embodiments.

Figure 214:
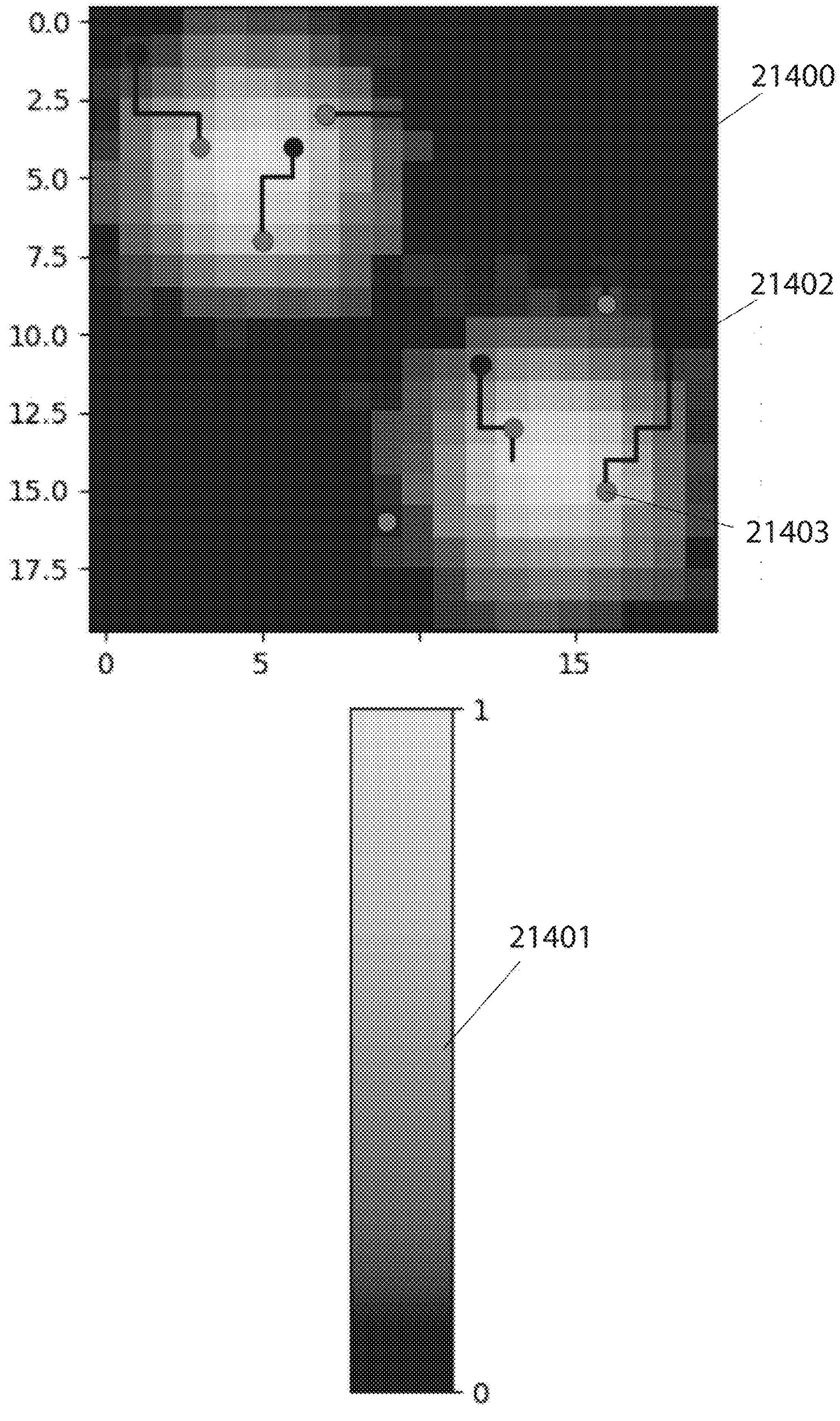

FIG. 214 illustrates how pod distribution changes after minimization of a cost function, according to some embodiments.

Figure 215:
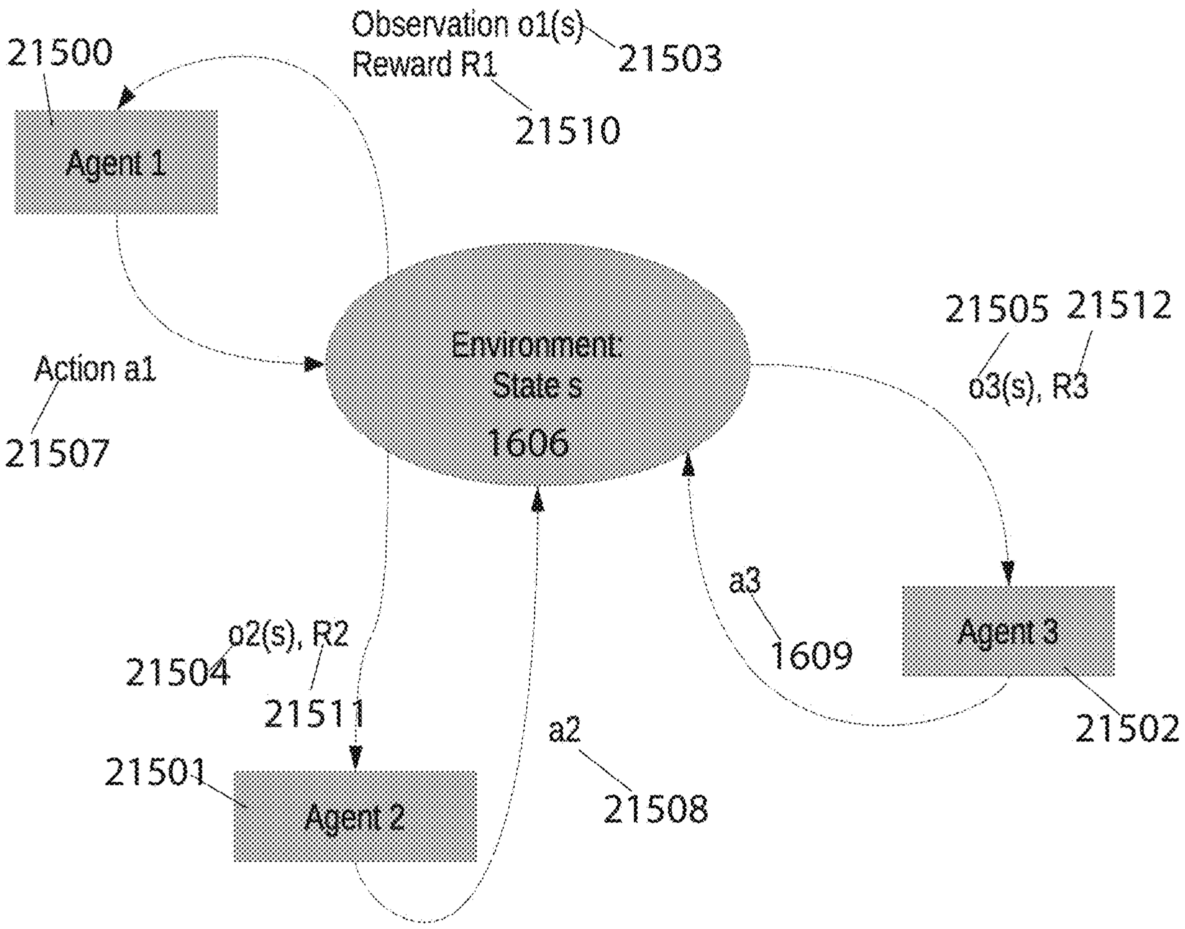

FIG. 215 illustrates an example of a multi-agent partially observable MDP, according to some embodiments.

Figure 216:
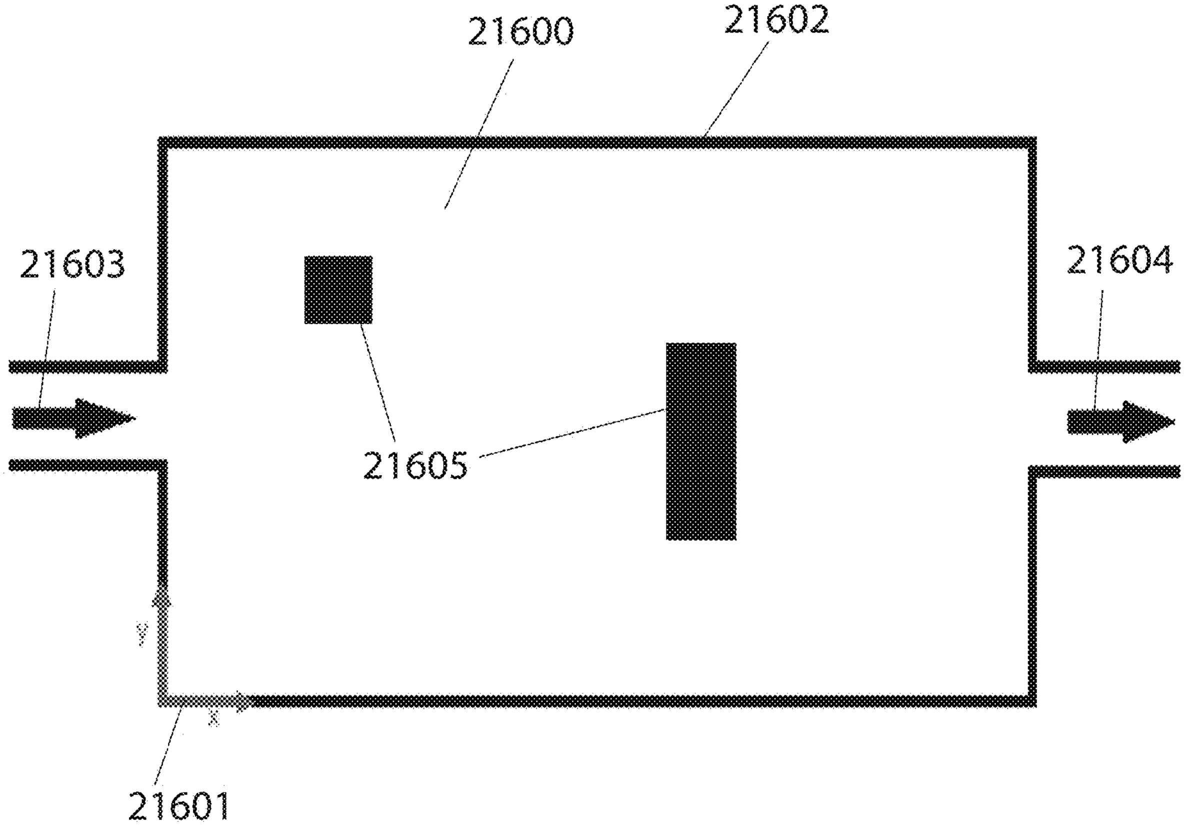

FIG. 216 illustrates an example of a parking area, according to some embodiments.

Figure 217:
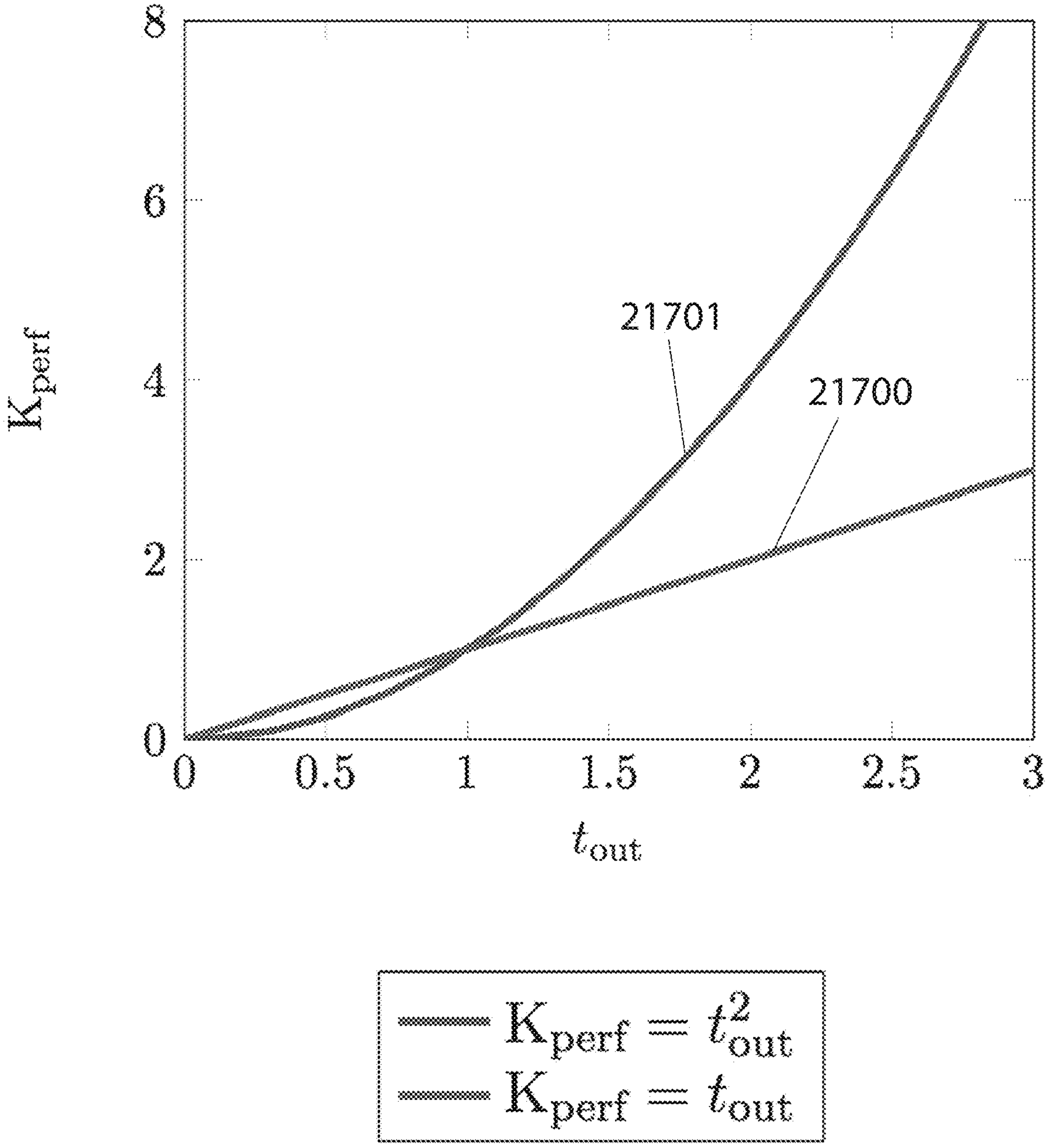

FIG. 217 illustrates an example of how a performance metric changes with increasing time to exit a parking area, according to some embodiments.

Figure 218A:
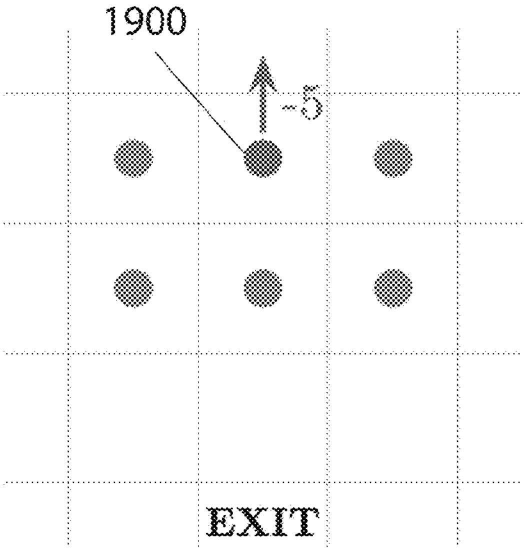
Figure 218B:
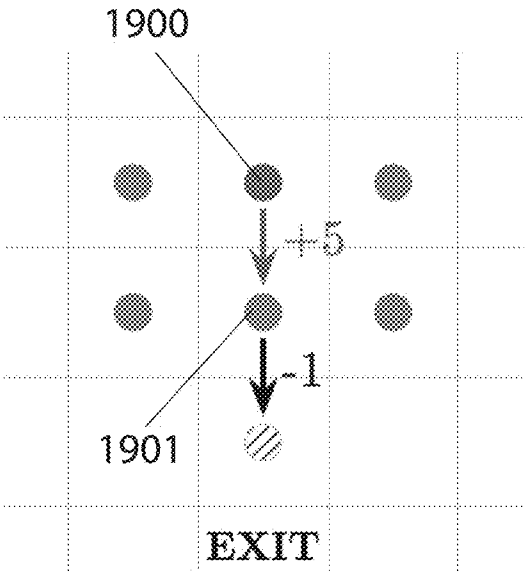
Figure 218C:
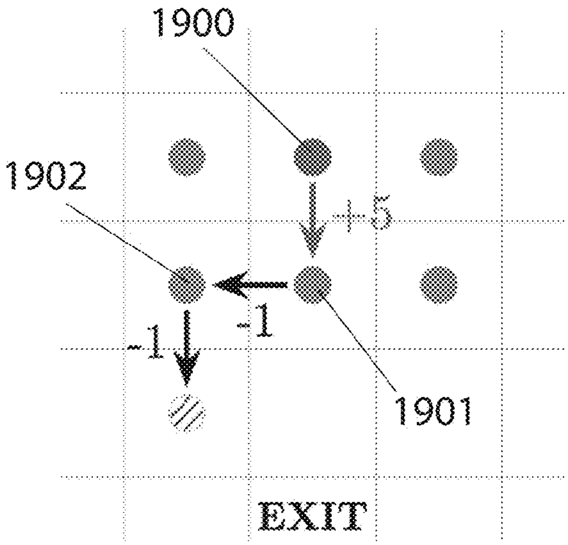

FIGS. 218A-218C illustrate examples of different action sequences of VMP robots, according to some embodiments.

Figure 219A:
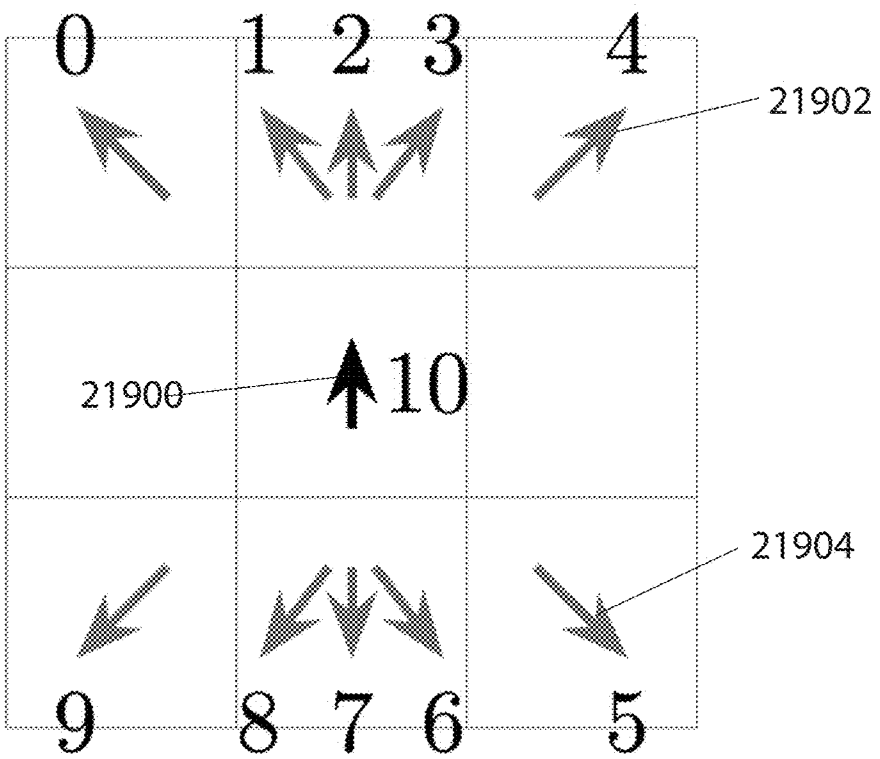
Figure 219B:
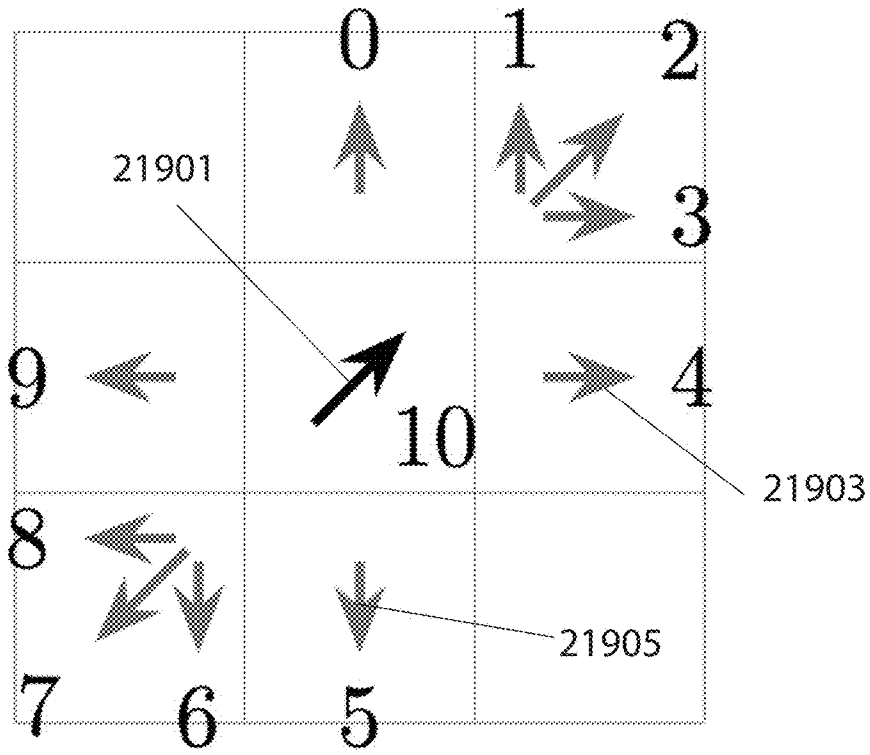

FIGS. 219A and 219B illustrate possible actions of a VMP robot in a parking area, according to some embodiments.

Figure 220:
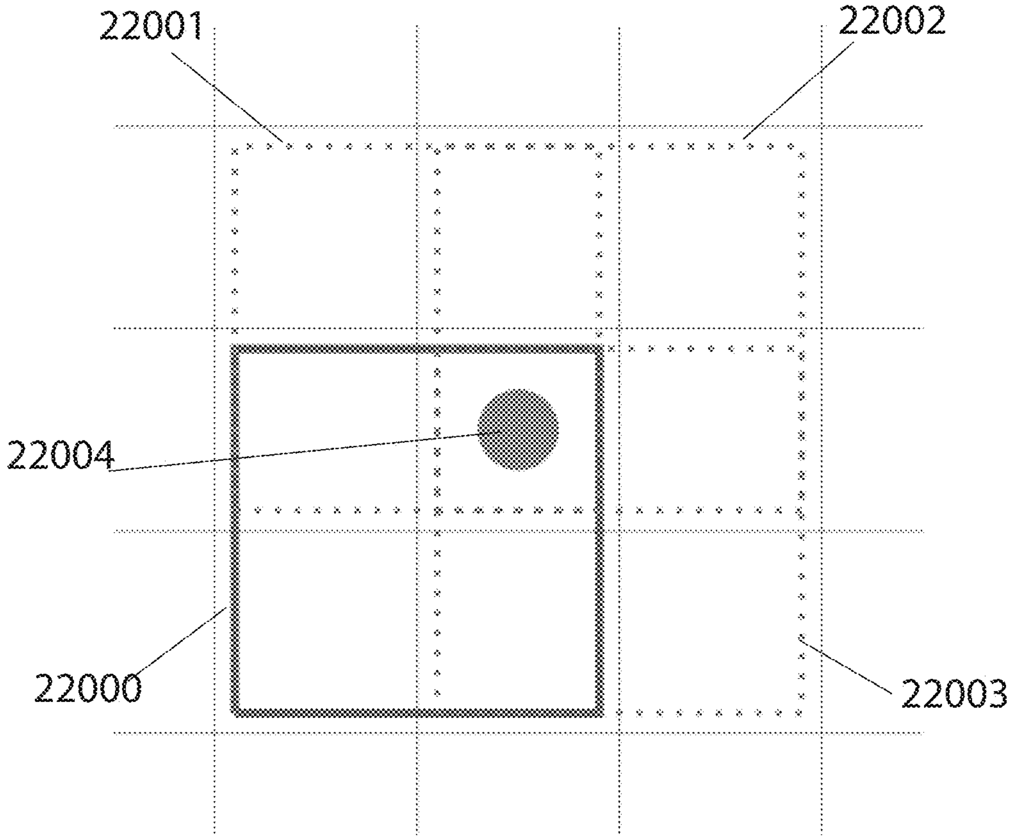

FIG. 220 illustrates four 2-by-2 blocks of a particular parking spot, according to some embodiments.

Figure 221:
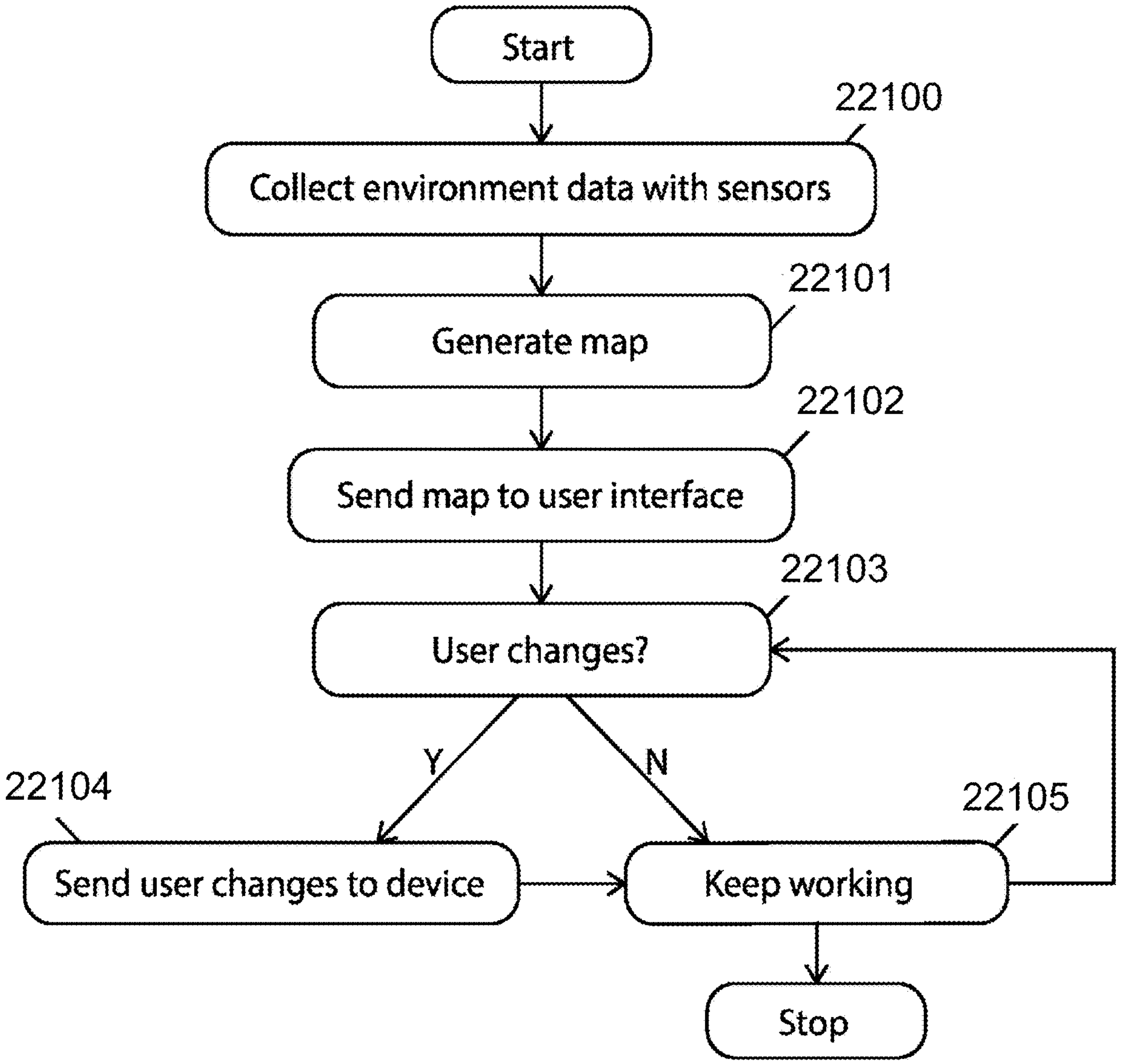

FIG. 221 illustrates a process of generating a map and making changes to the map through a user interface in some embodiments.

Figure 222:
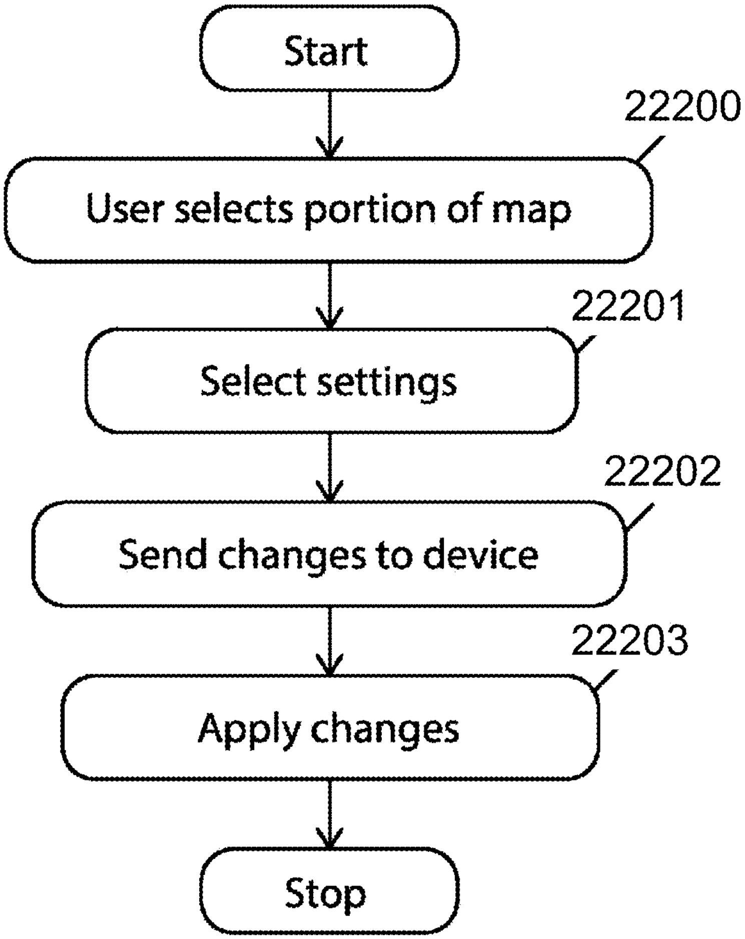

FIG. 222 illustrates a process of selecting settings for a VMP robot through a user interface in some embodiments.

Figure 223A:
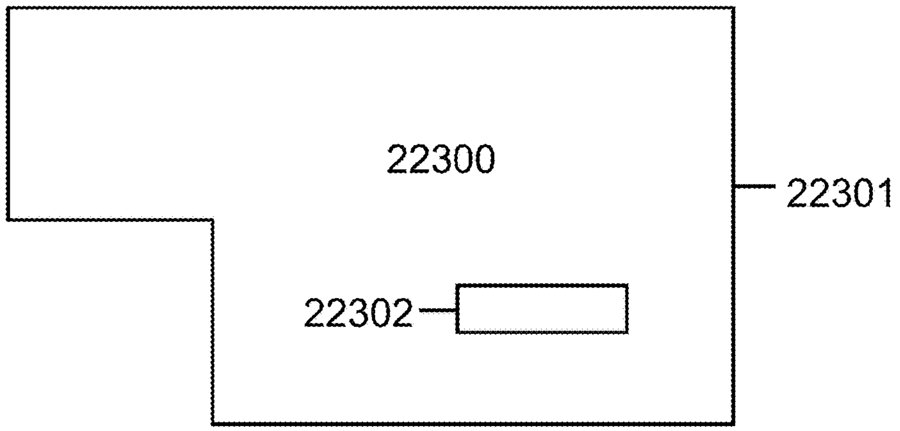

FIG. 223A illustrates a plan view of an exemplary workspace in some use cases.

Figure 223B:
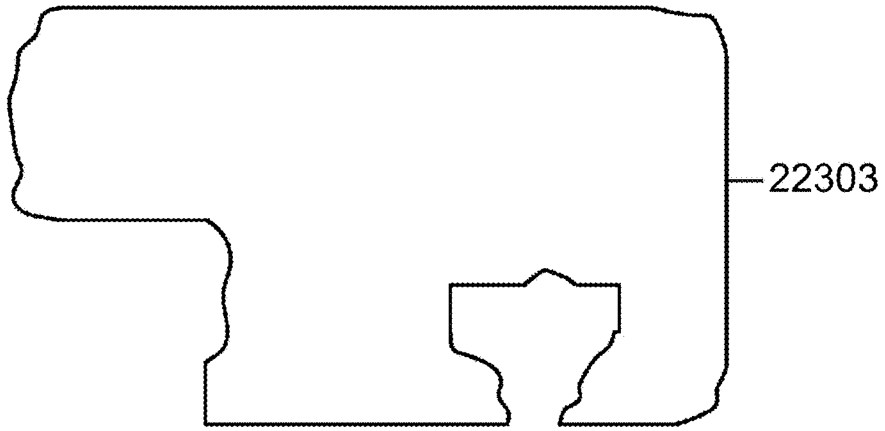

FIG. 223B illustrates an overhead view of an exemplary two-dimensional map of the workspace generated by a processor of a VMP robot in some embodiments.

Figure 223C:
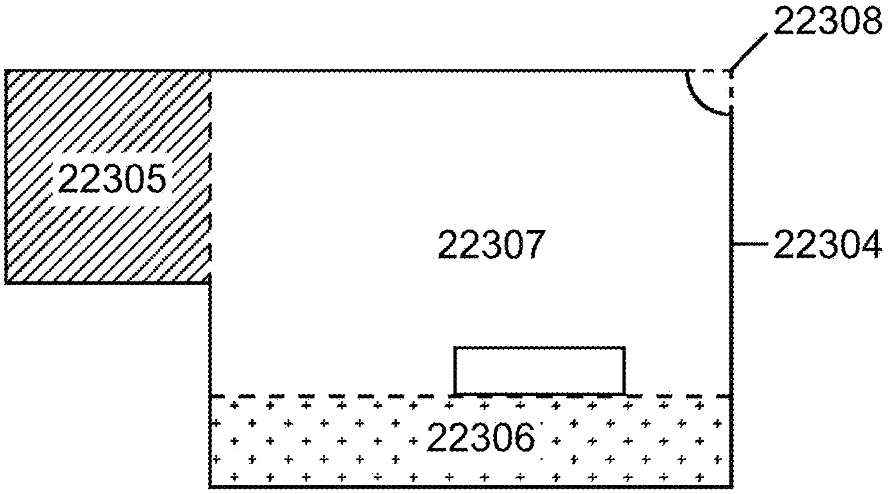

FIG. 223C illustrates a plan view of the adjusted, exemplary two-dimensional map of the workspace in some embodiments.

Figure 224A:
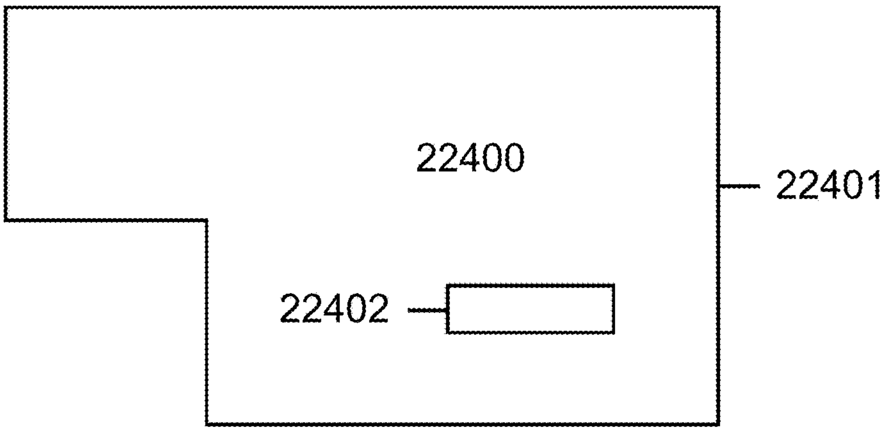
Figure 224B:
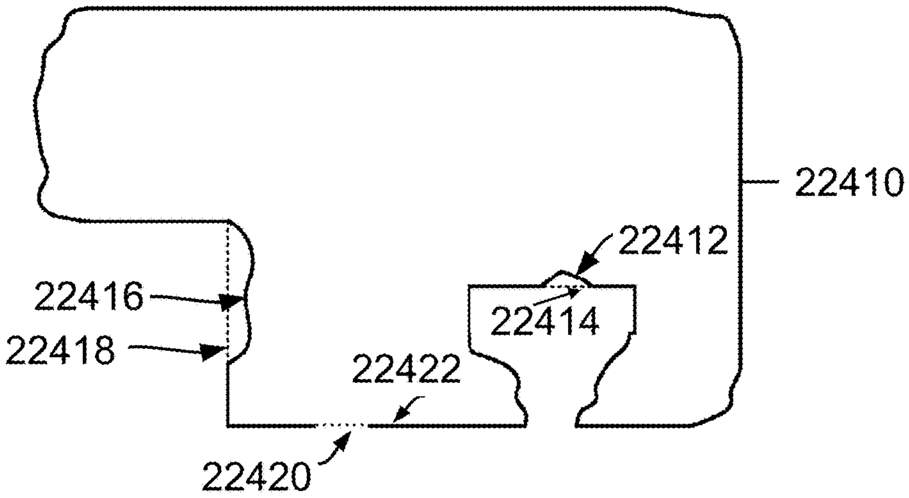

FIGS. 224A and 224B illustrate an example of the process of adjusting perimeter lines of a map in some embodiments.

Figure 225:
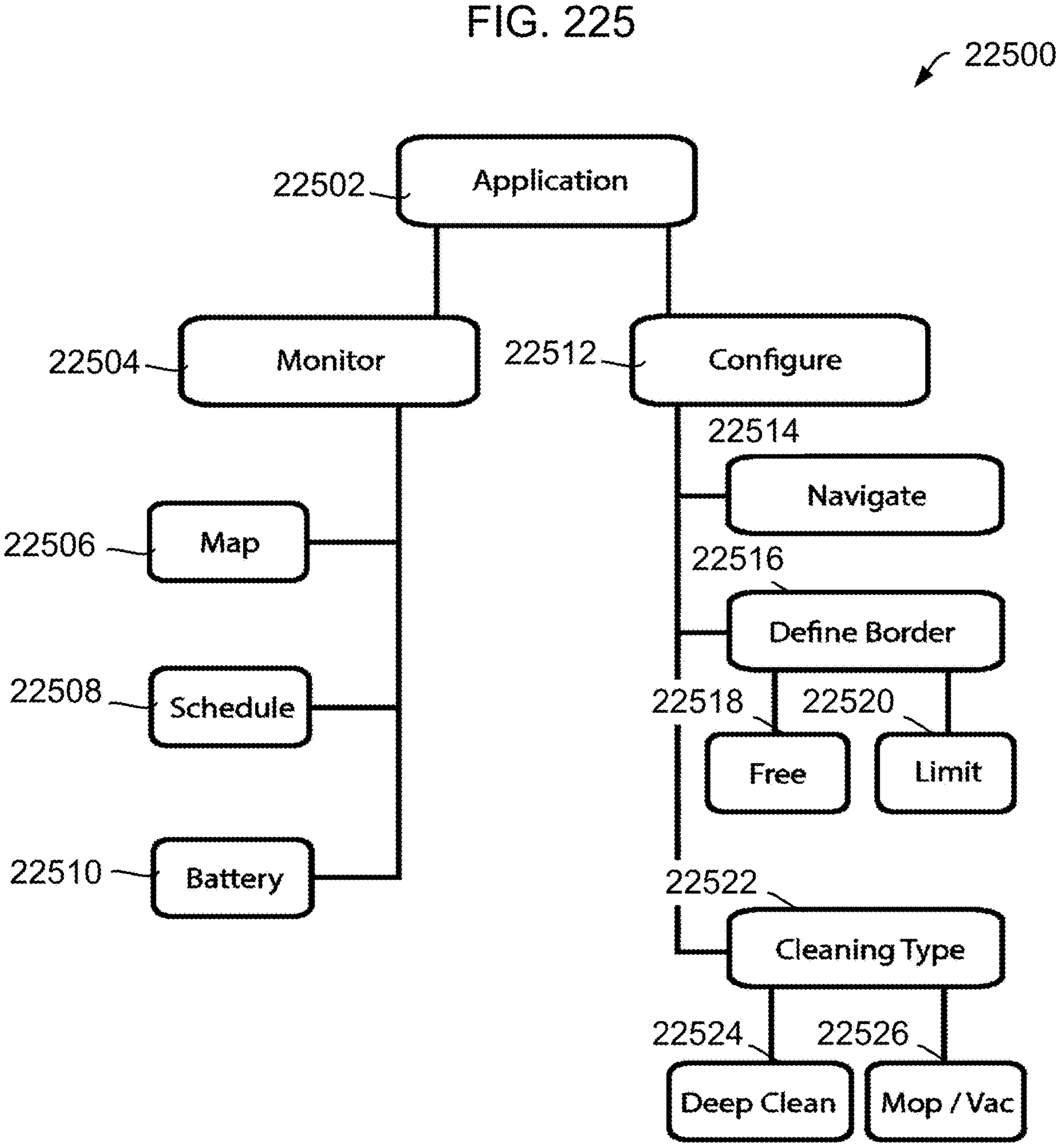

FIG. 225 illustrates a flowchart of applications for customizing a job of a workspace in some embodiments.

Figure 226:
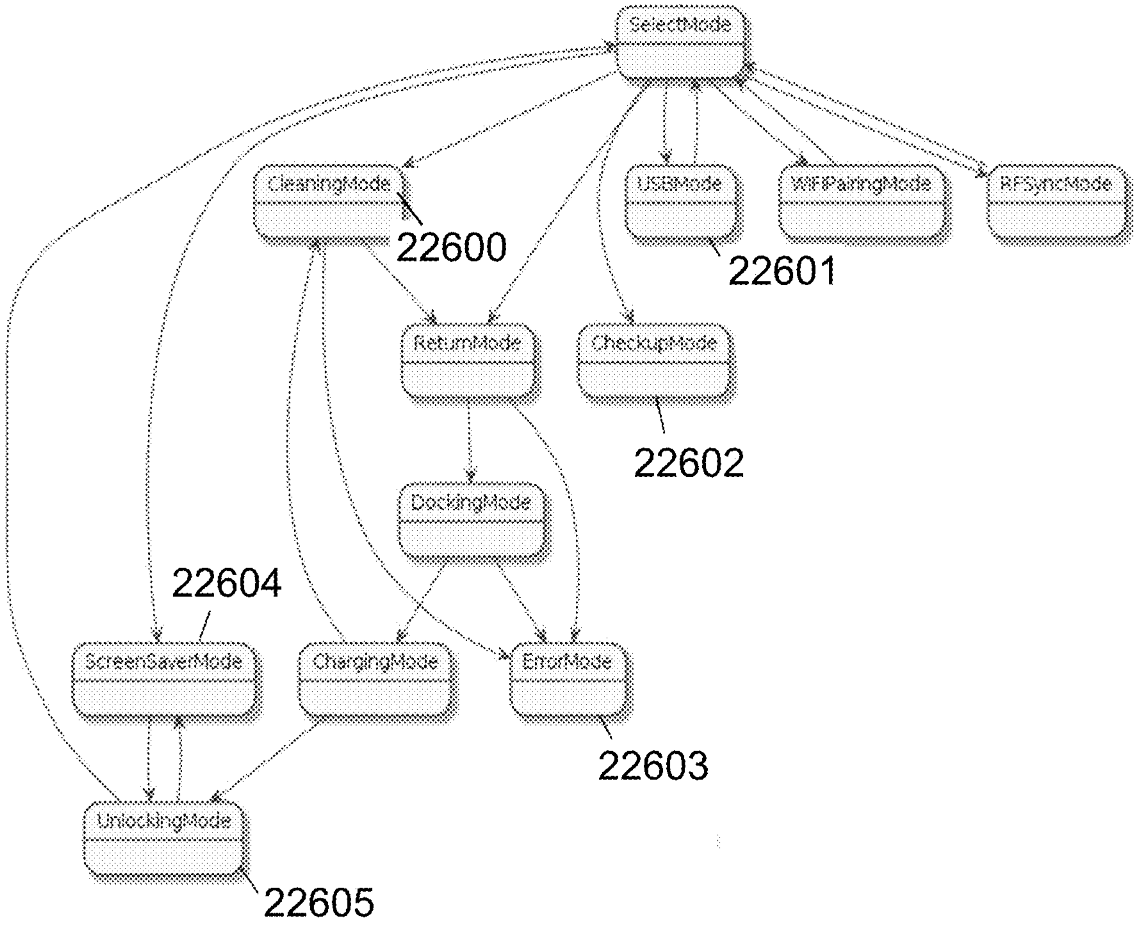

FIG. 226 illustrates an example of a finite state machine chart, according to some embodiments.

Figure 227:
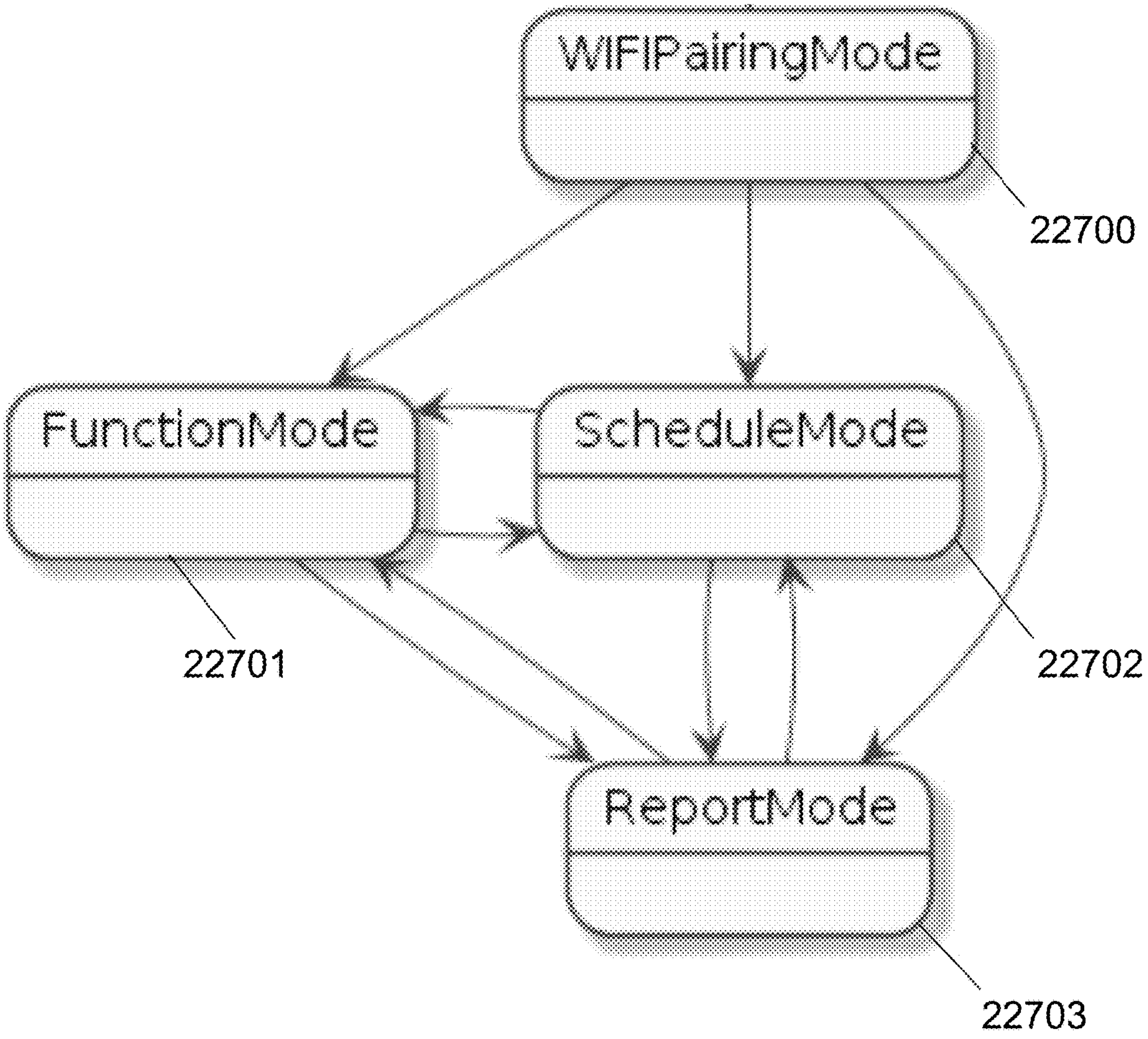

FIG. 227 illustrates an example of a finite state machine chart, according to some embodiments.

Figure 228A:
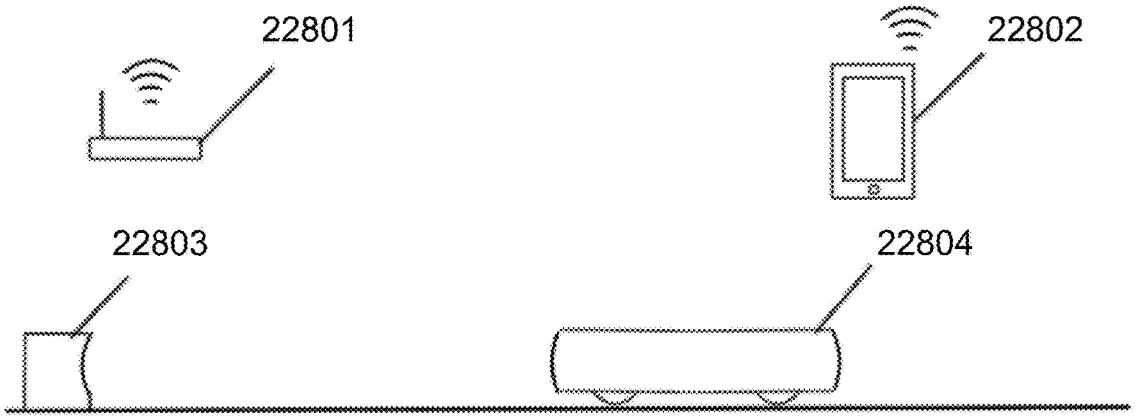

FIG. 228A illustrates a mobile device connected to a wireless network that is also accessible to a docking station corresponding to a VMP robot, according to some embodiments.

Figure 228B:
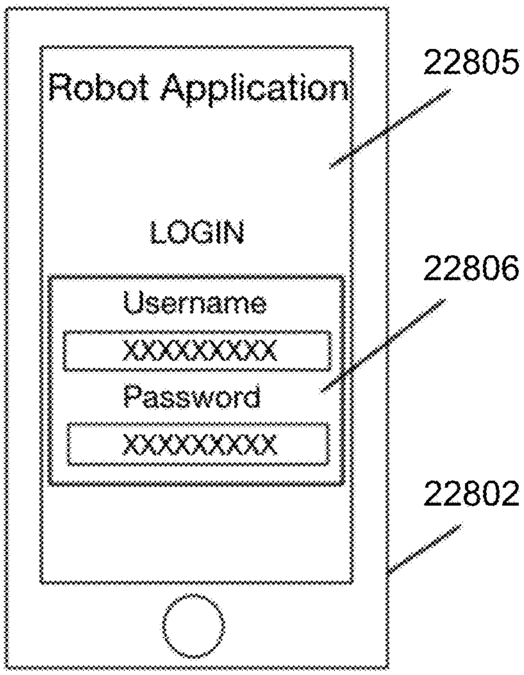

FIG. 228B illustrates how a user may log into a mobile device application designed specifically for use with a VMP robot and having connectivity to a VMP robot cloud service, according to some embodiments.

Figure 228C:
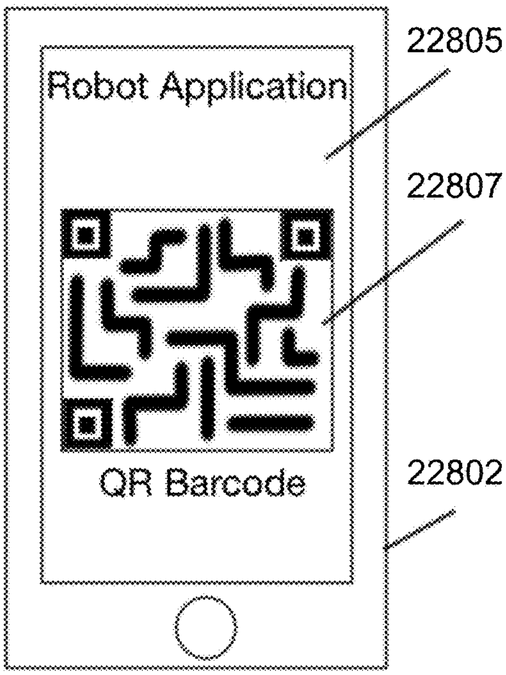

FIG. 228C illustrates a QR barcode generated by the mobile device application containing Wi-Fi access point's SSID, Wi-Fi password, and cloud service login information, according to some embodiments.

Figure 229:
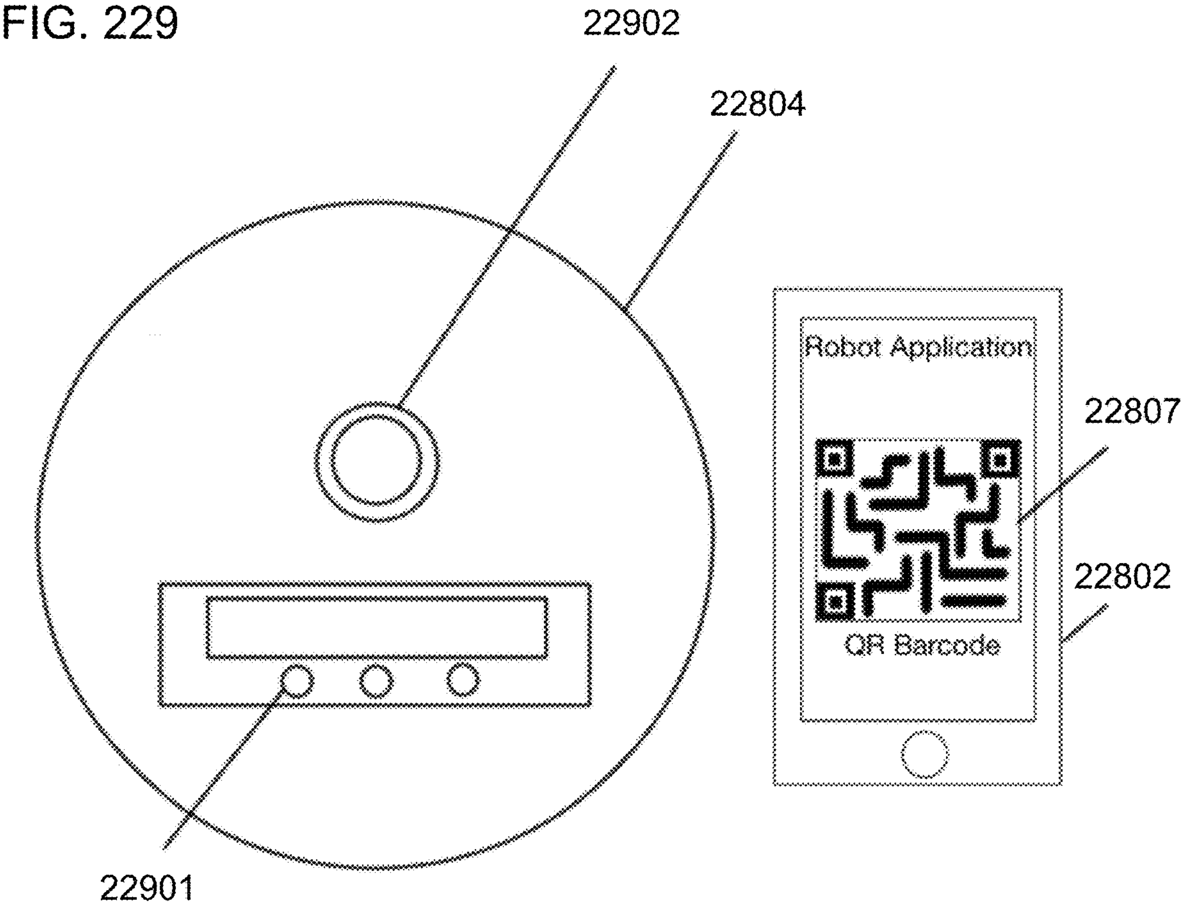

FIG. 229 illustrates the process of initiating barcode scanning mode on the VMP robot for the purpose of scanning the generated QR barcode, according to some embodiments.

Figure 230:
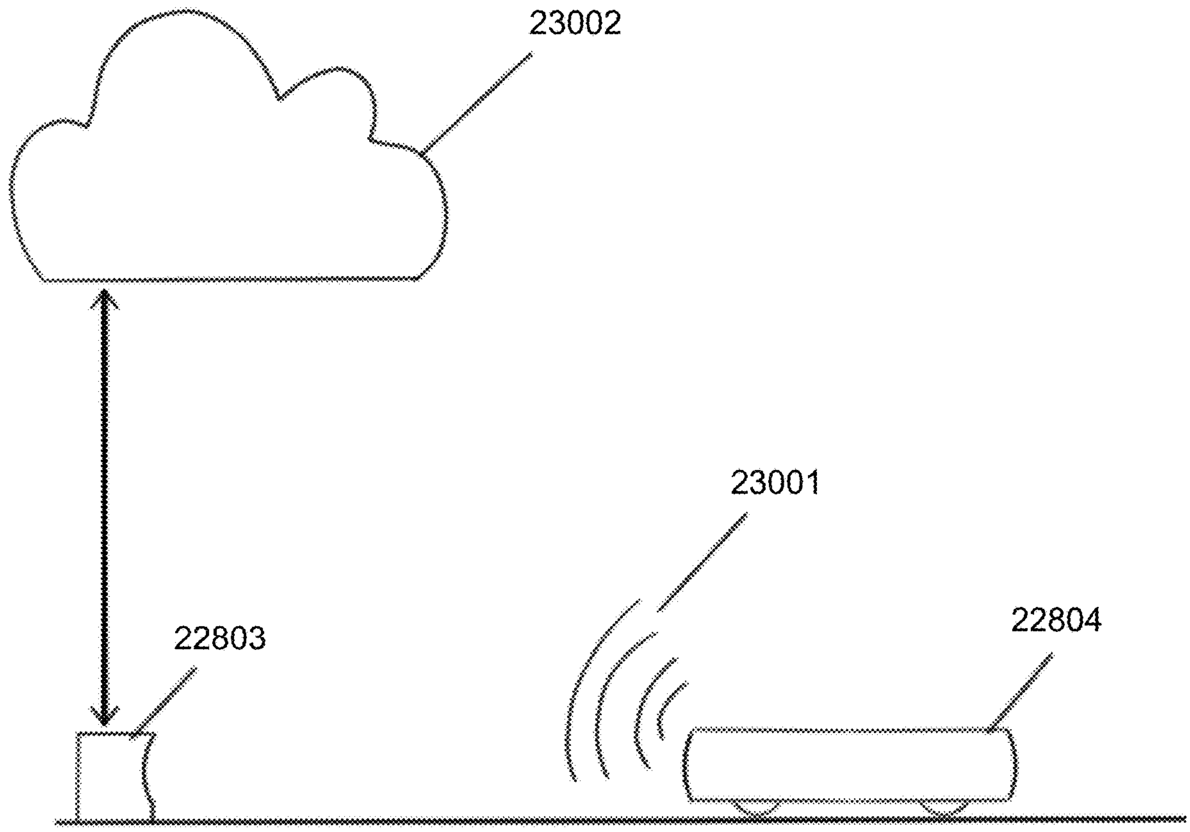

FIG. 230 illustrates the VMP robot sharing Wi-Fi access point's SSID, Wi-Fi password and cloud service login information extrapolated from the scanned QR barcode with the docking station via RF, according to some embodiments.

Figure 231:
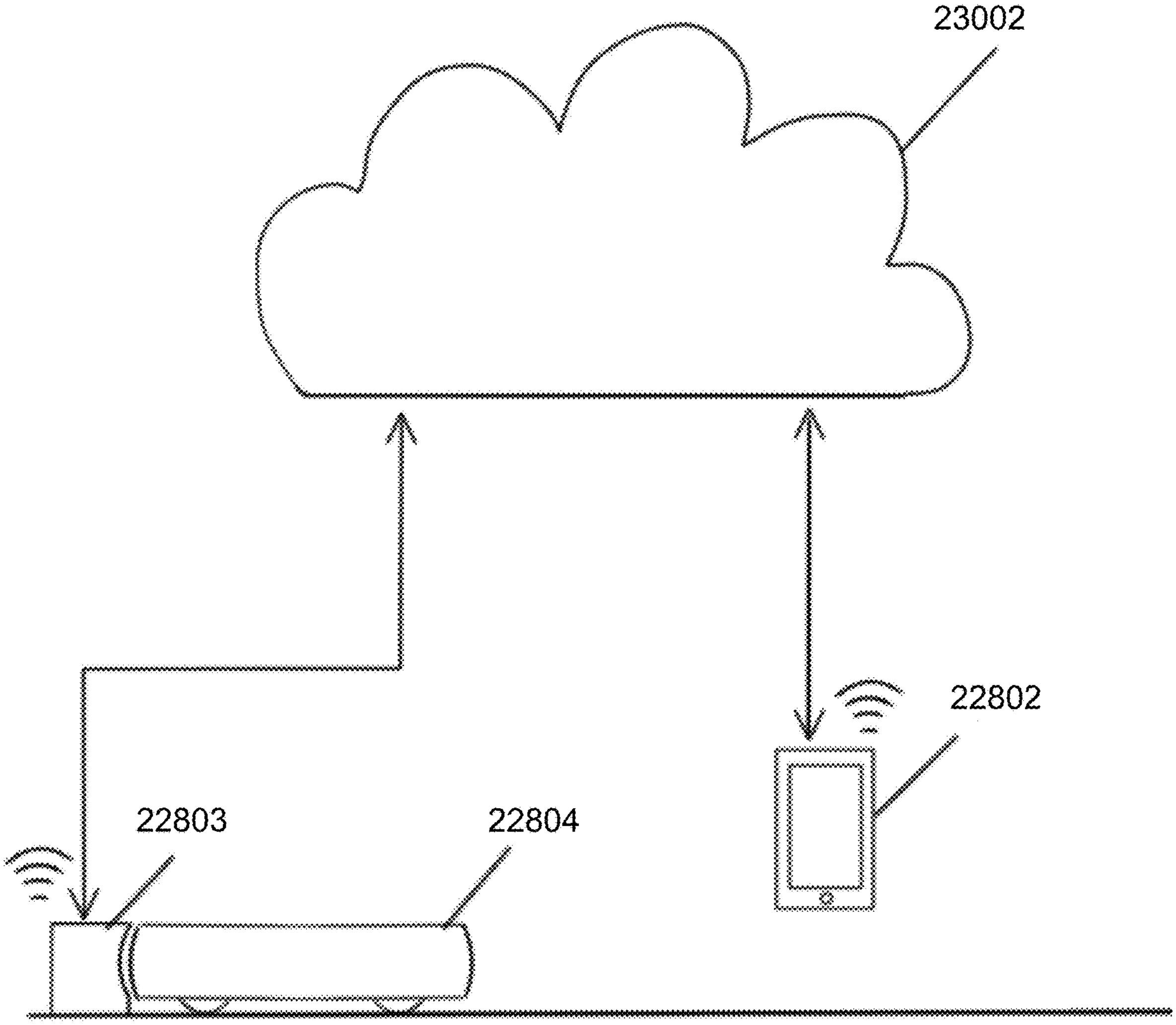

FIG. 231 illustrates the mobile device application and docking station corresponding to the VMP robot connected with the VMP robot cloud service, according to some embodiments.

Figure 232:
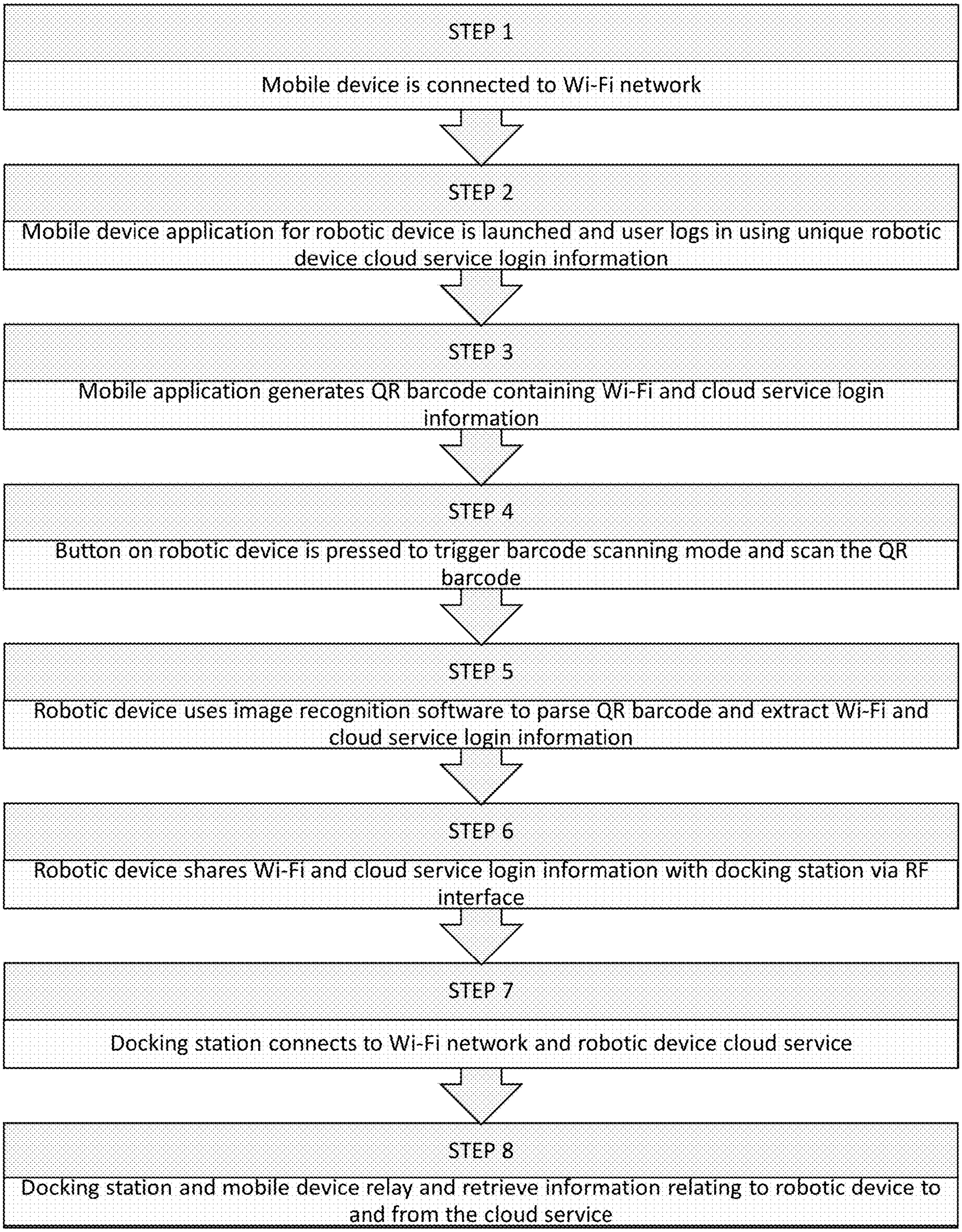

FIG. 232 illustrates a flowchart depicting the steps required to pair the VMP robot to a mobile device application, according to some embodiments.

Figure 233:
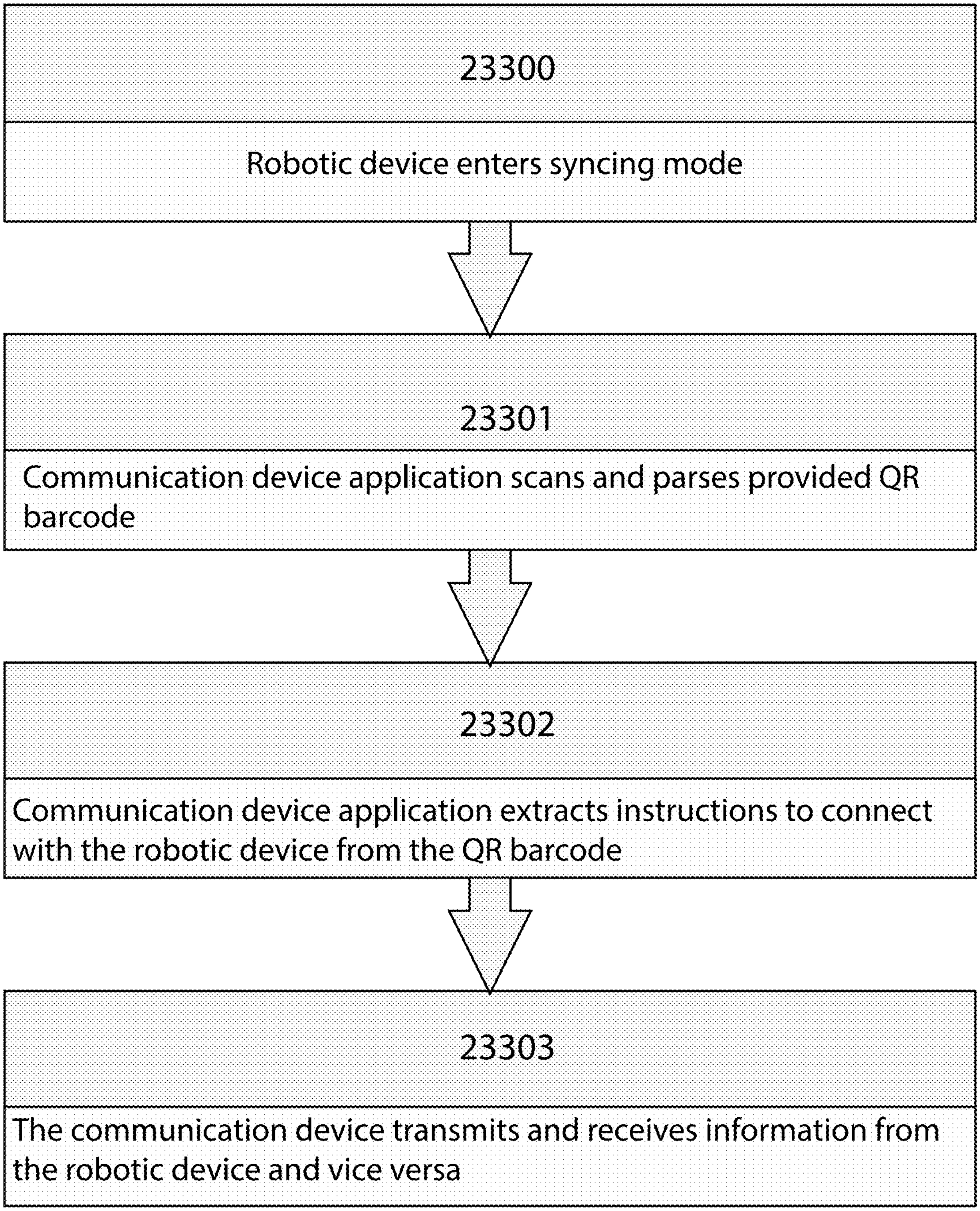

FIG. 233 illustrates a flowchart depicting the steps required to pair the VMP robot to an application of a communication device, according to some embodiments.

Figure 234A:
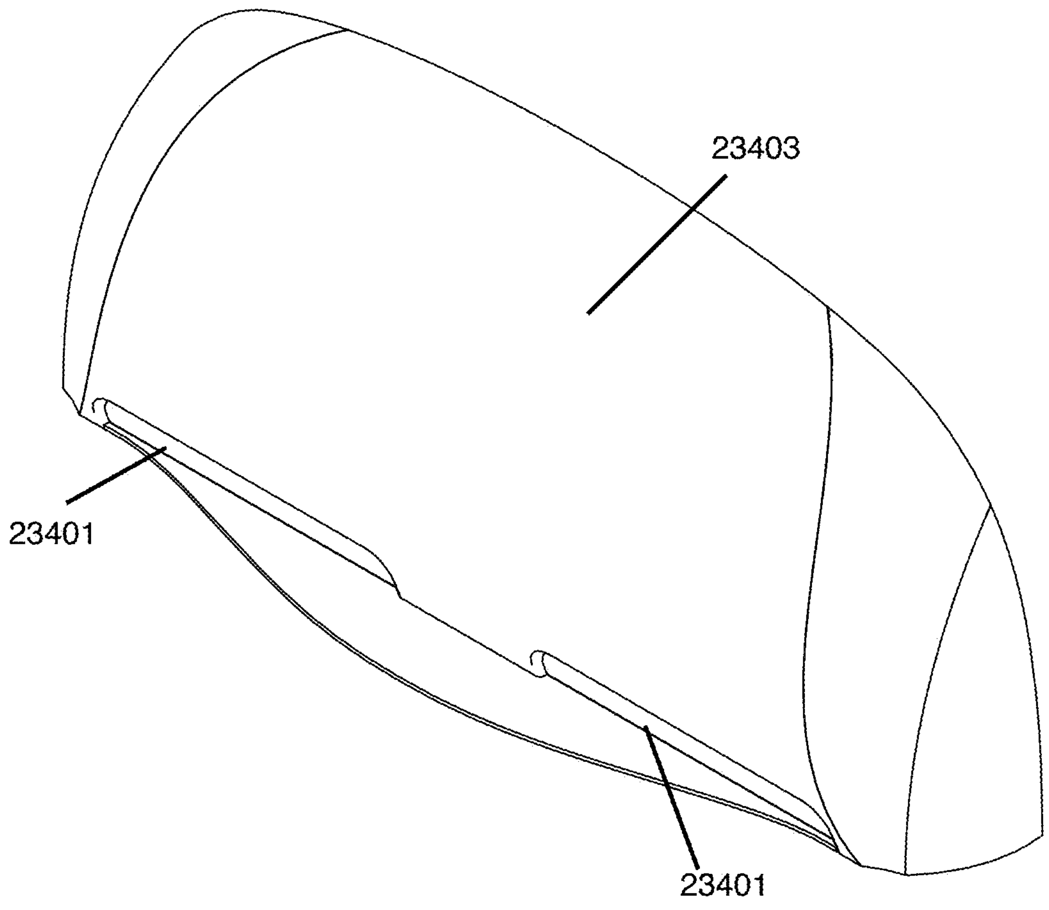
Figure 234B:
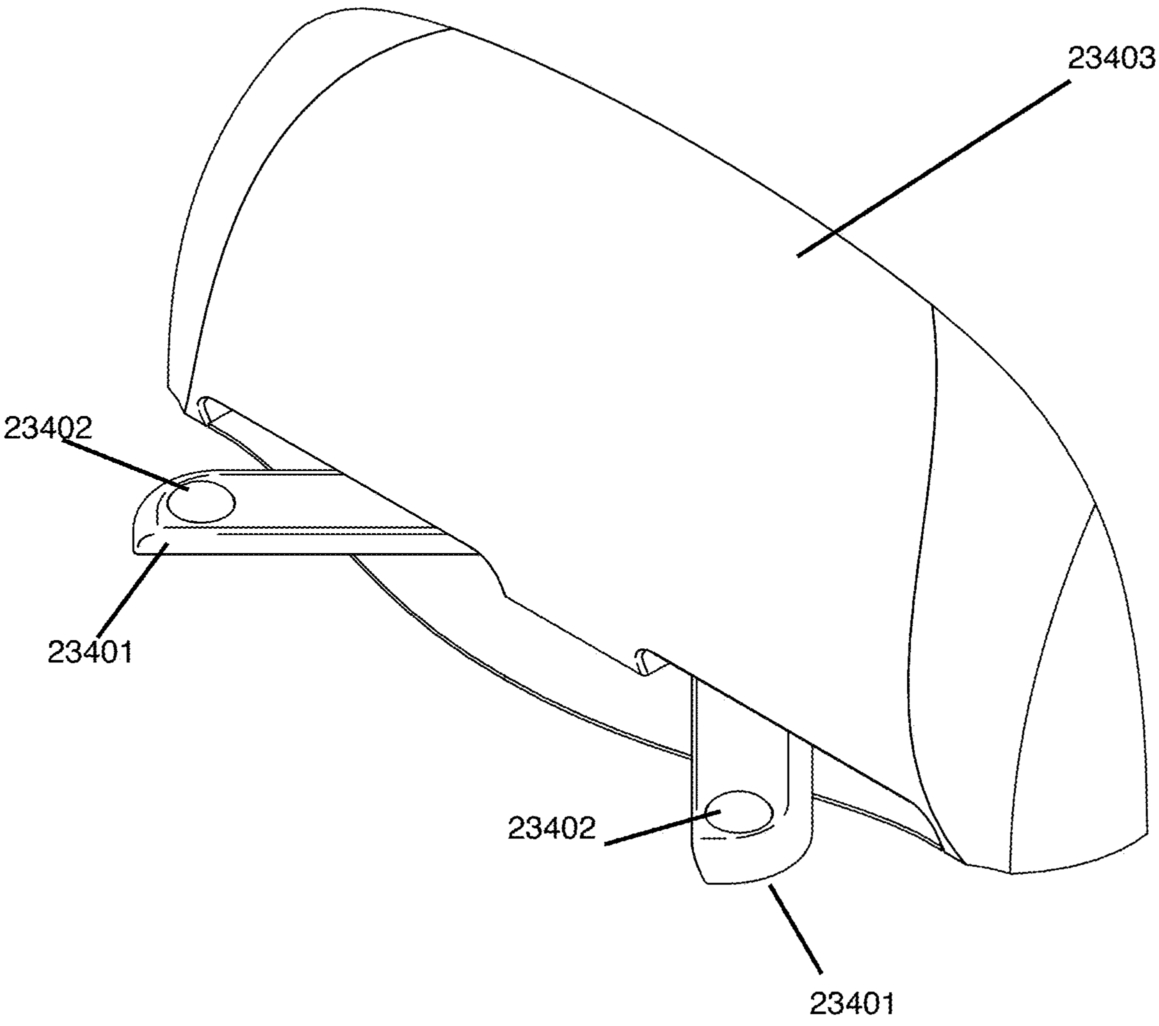
Figure 234C:
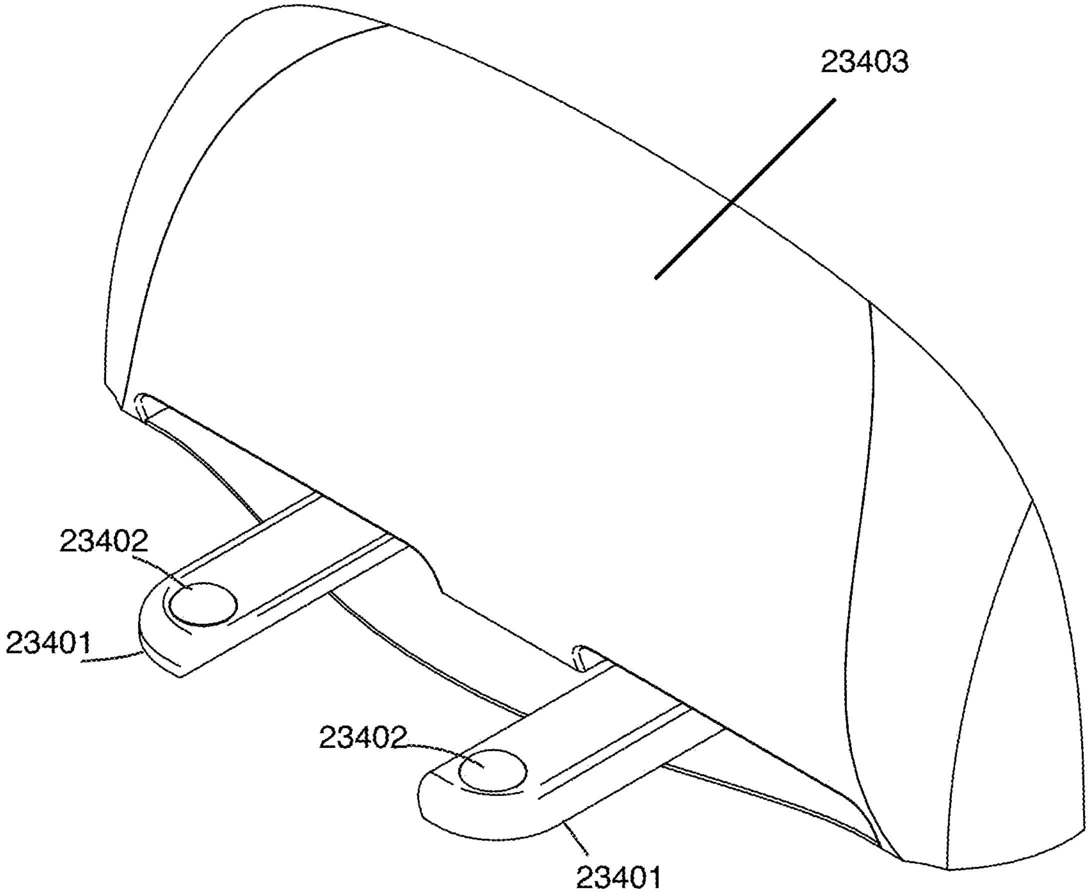

FIGS. 234A-234C illustrate a charging station with extendable prongs stored inside, extendable prongs extended partially in between z stored position and z fully extended position, and extendable prongs in a fully extended position, respectively, according to some embodiments.

Figure 235A:
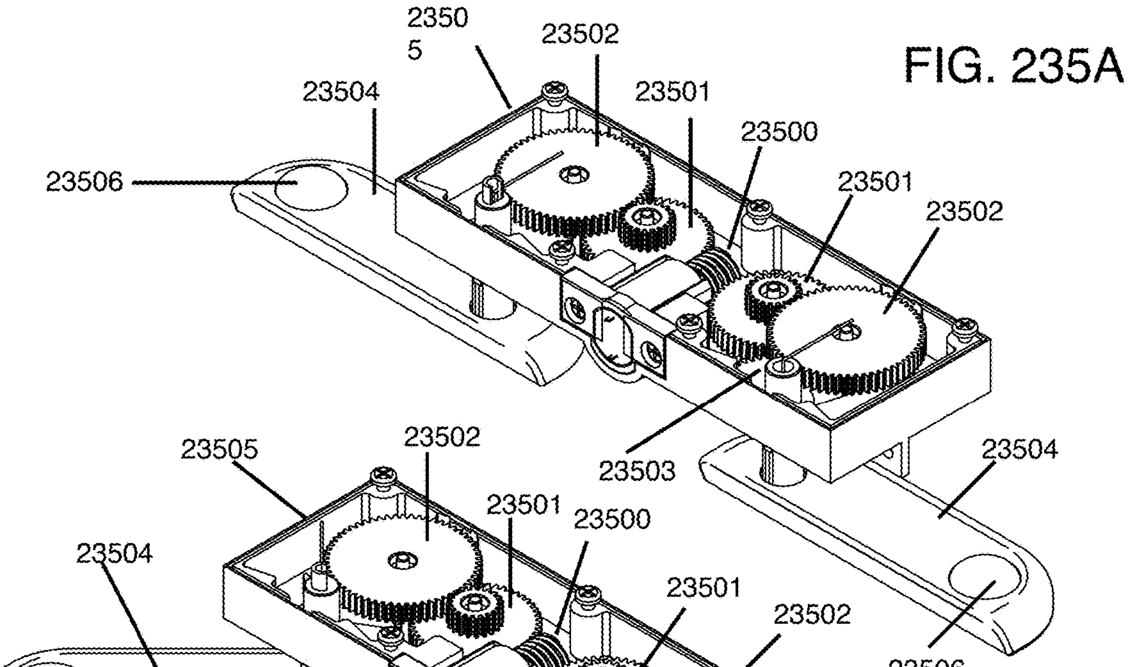
Figure 235B:
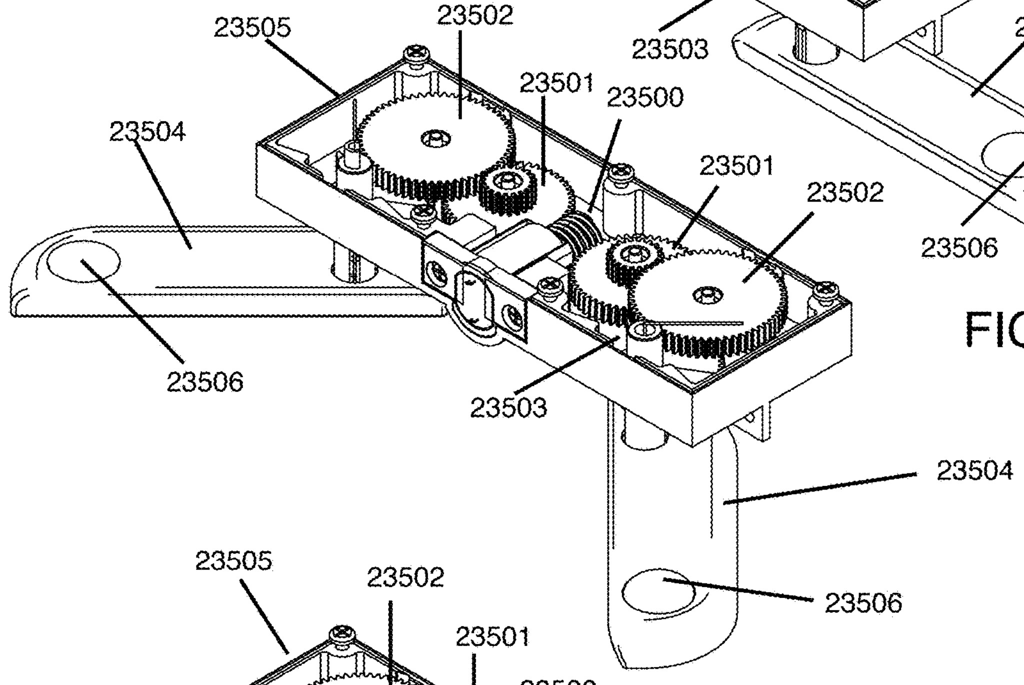
Figure 235C:
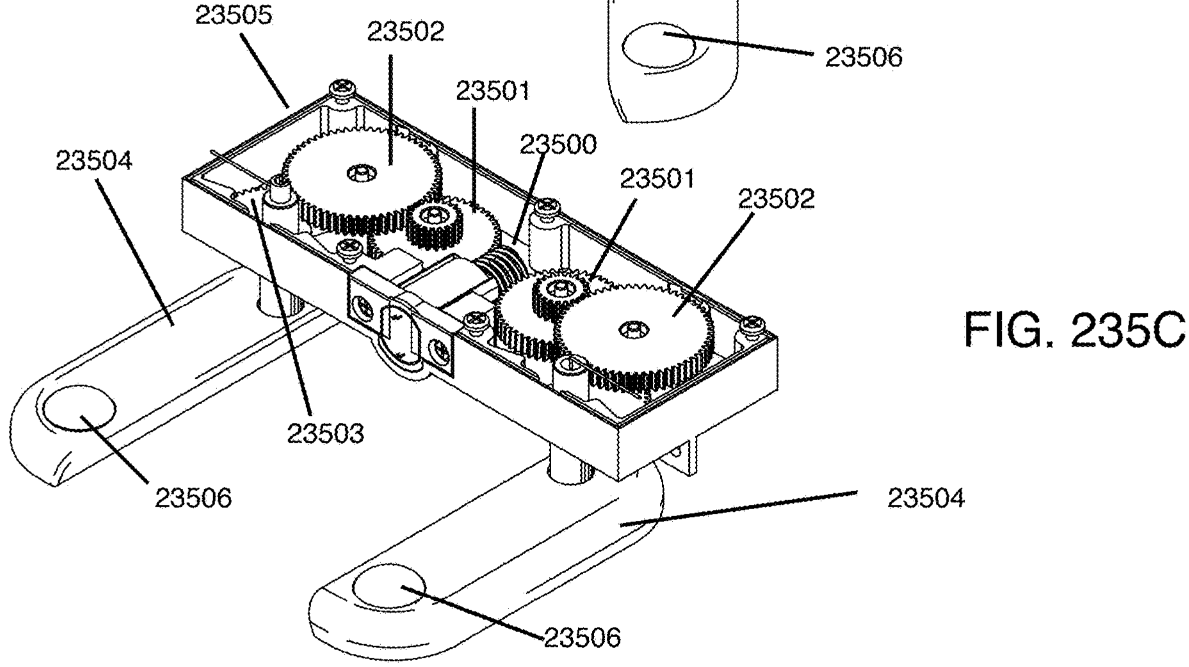

FIGS. 235A-235C illustrate internal mechanics of a gearbox of a charging station with extendable prongs in a stored position, extendable prongs in a partially extended position between a stored and fully extended position, and extendable prongs in a fully extended position, respectively, according to some embodiments.

FIGS. 236A-236F illustrate a charging station with a mechanical filter, according to some embodiments.

FIGS. 237A-237D illustrate a charging station with magnetic charging contacts retracted and extended, according to some embodiments.

Figure 238A:
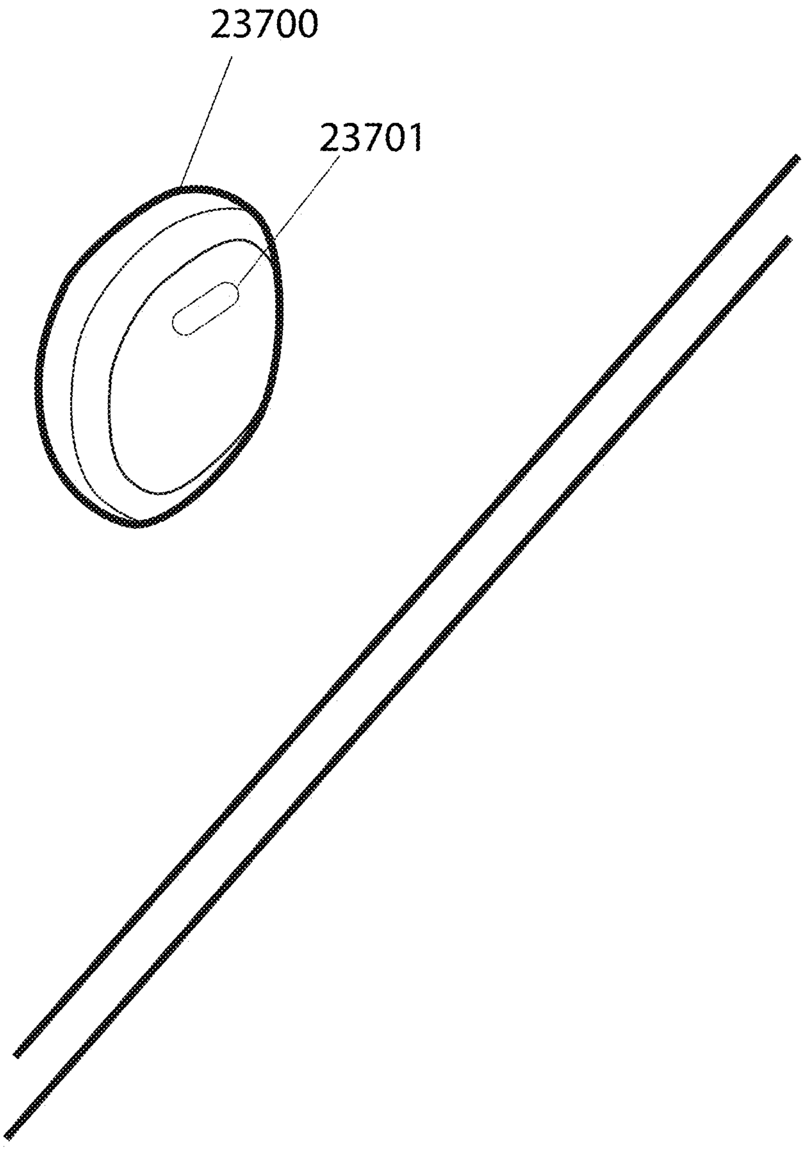
Figure 238B:
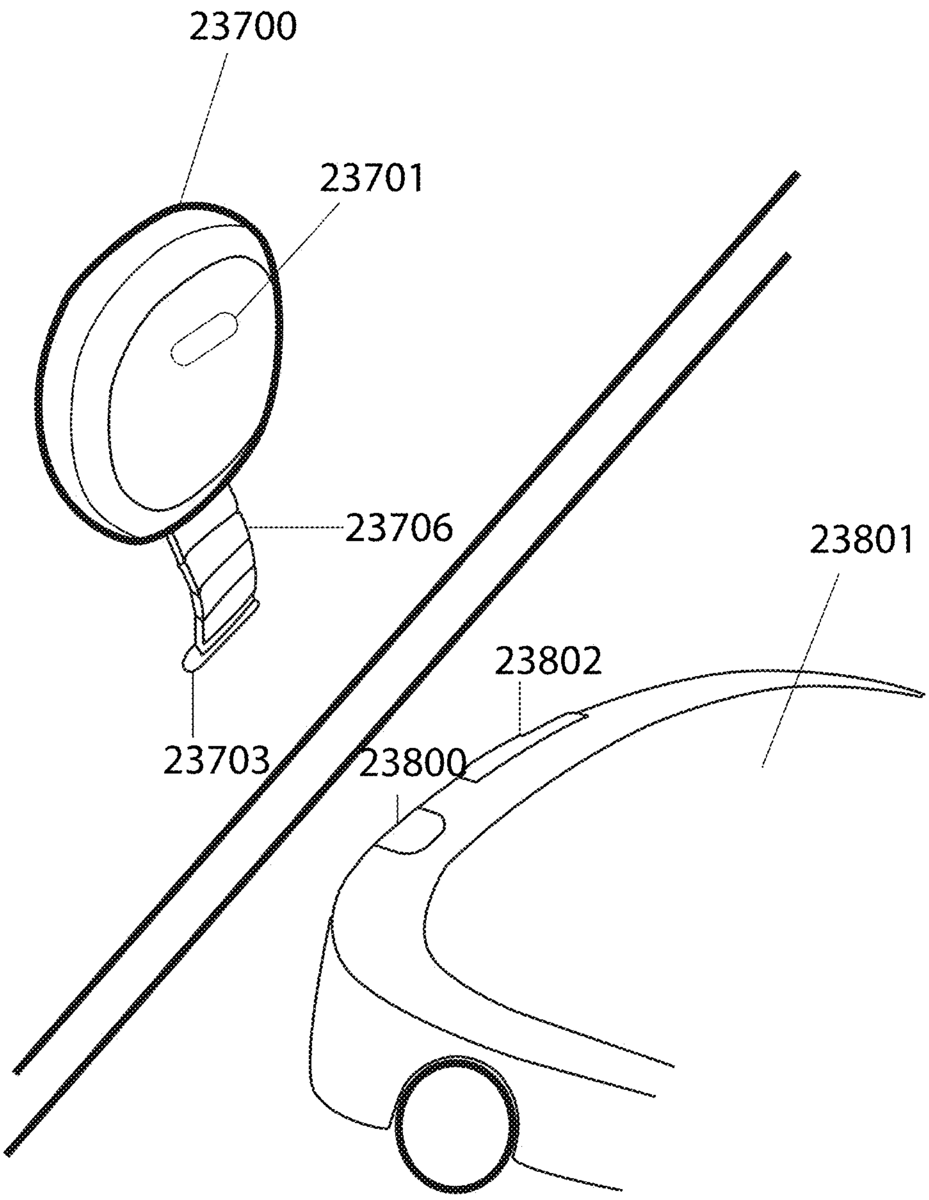

FIGS. 238A and 238B illustrate a charging station extending magnetic charging contacts upon detecting a mobile robotic device approaching for charging, according to some embodiments.

Figure 239A:
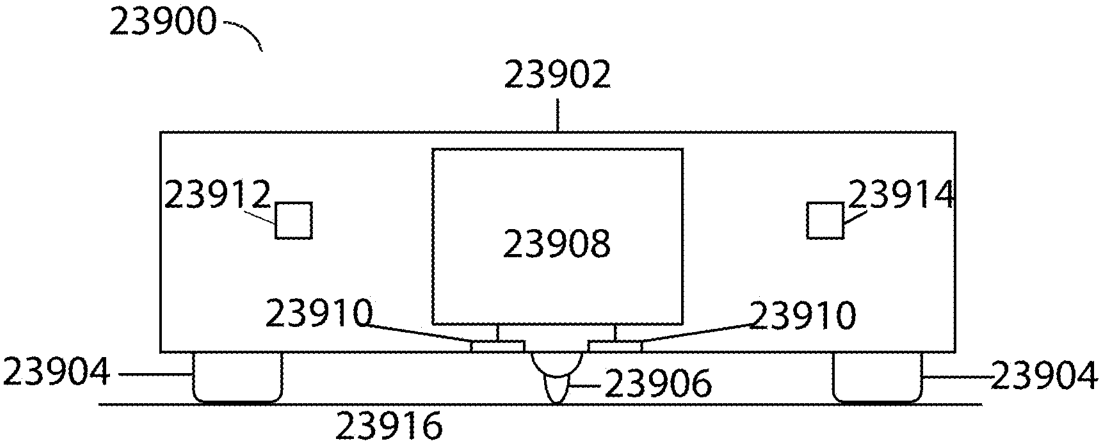

FIG. 239A illustrates an example of a mobile robot, according to some embodiments.

Figure 239B:
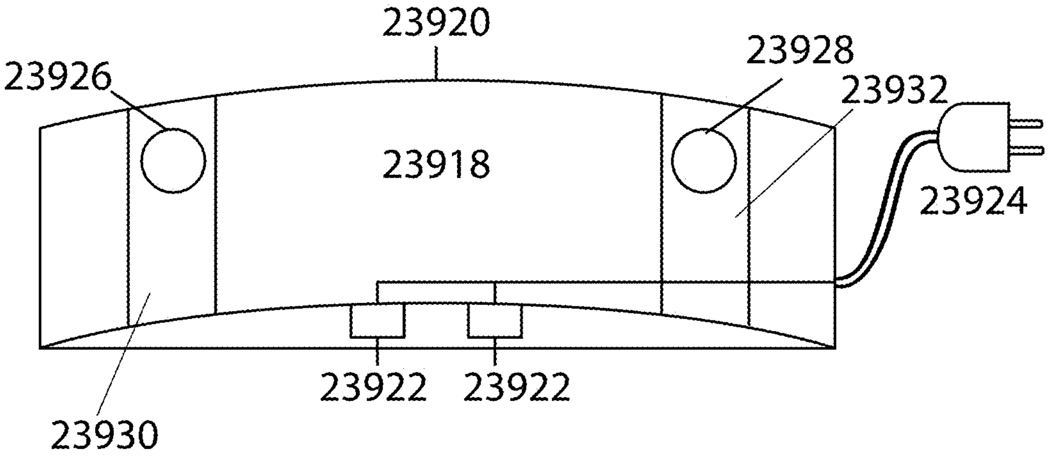

FIG. 239B illustrates an example of a recharge station, according to some embodiments.

Figure 240:
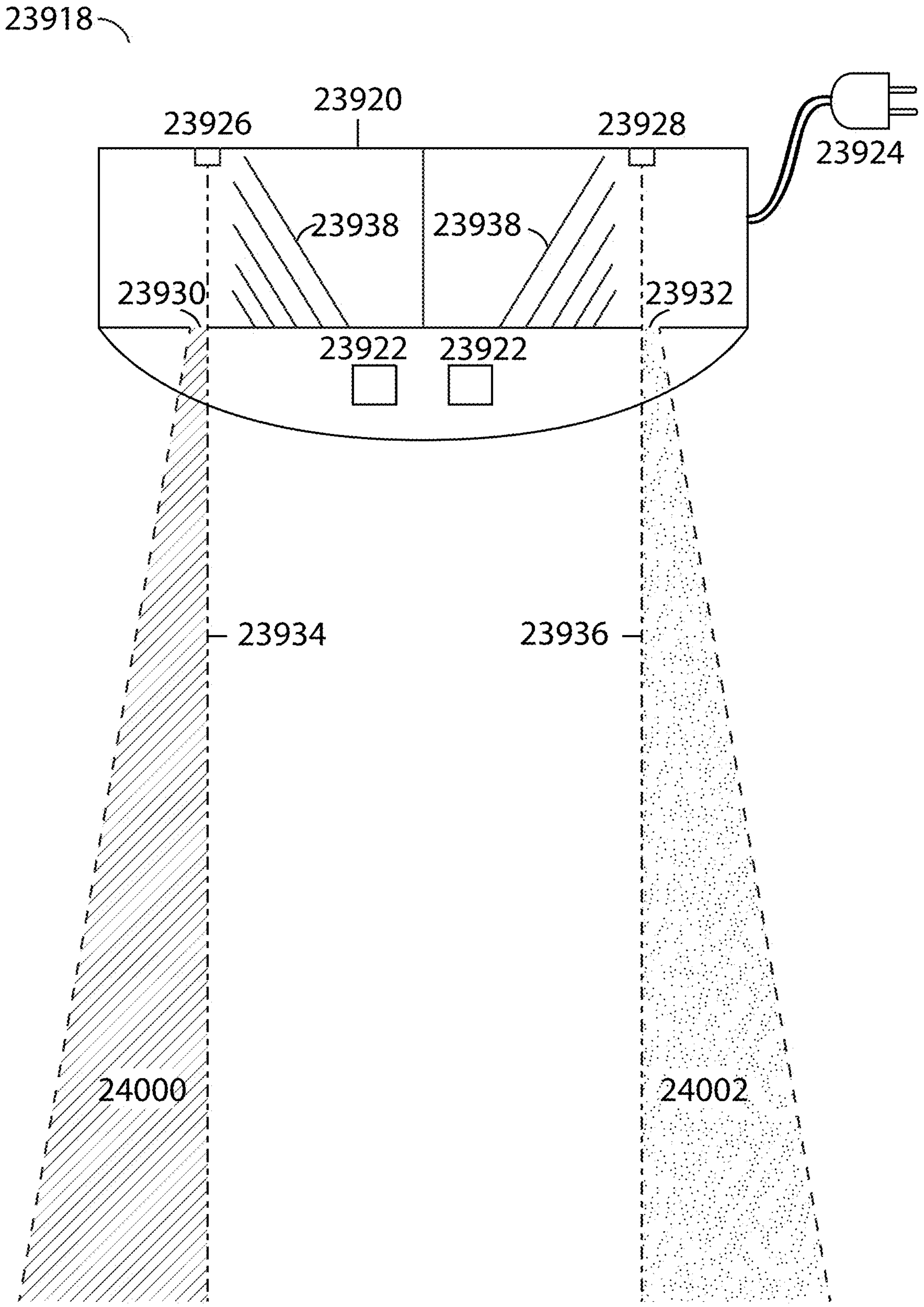

FIG. 240 illustrates an example of a recharge station, according to some embodiments.

Figure 241:
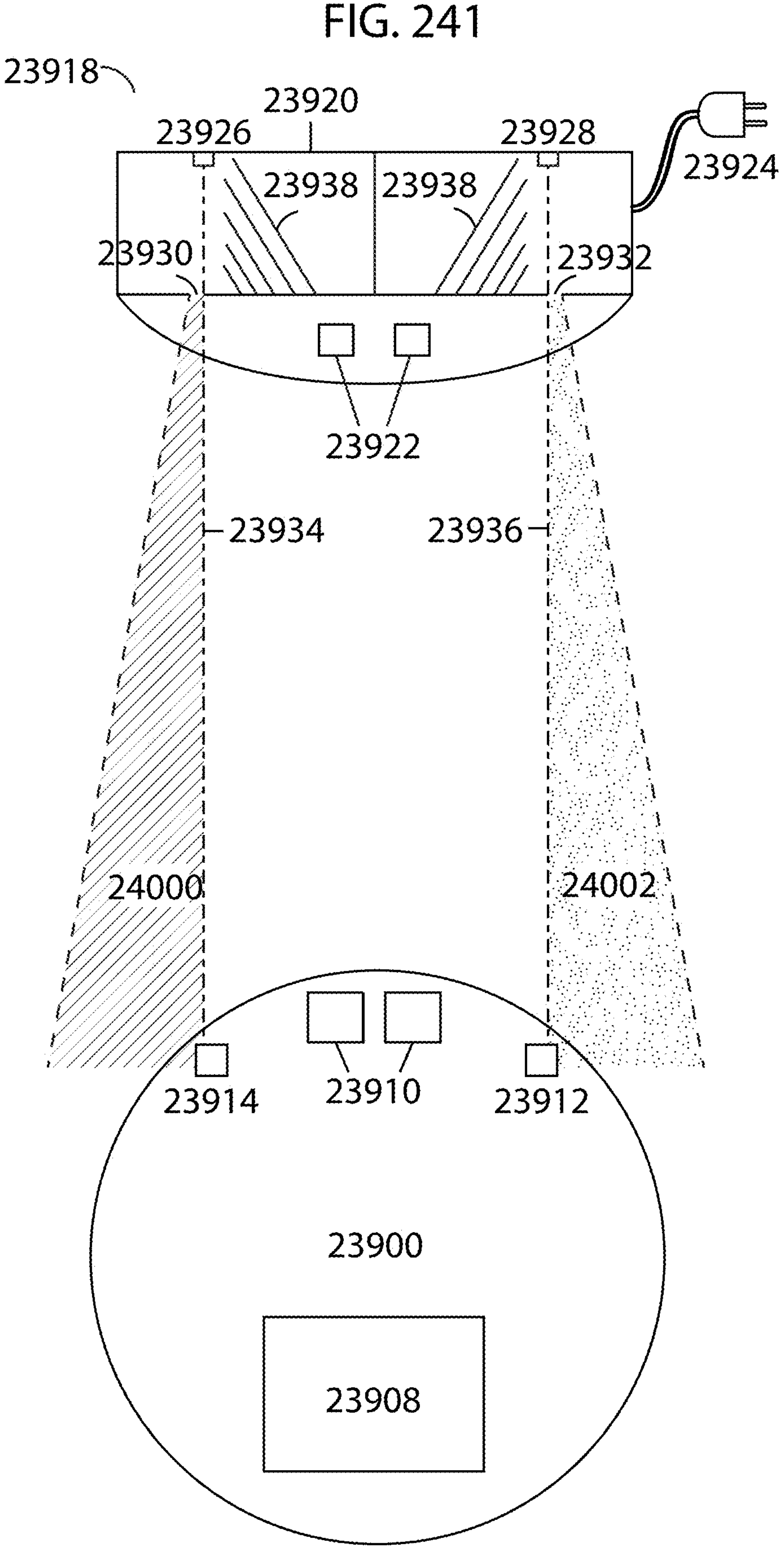

FIG. 241 illustrates an example of a mobile robot navigating to a recharge station, according to some embodiments.

Figure 242:
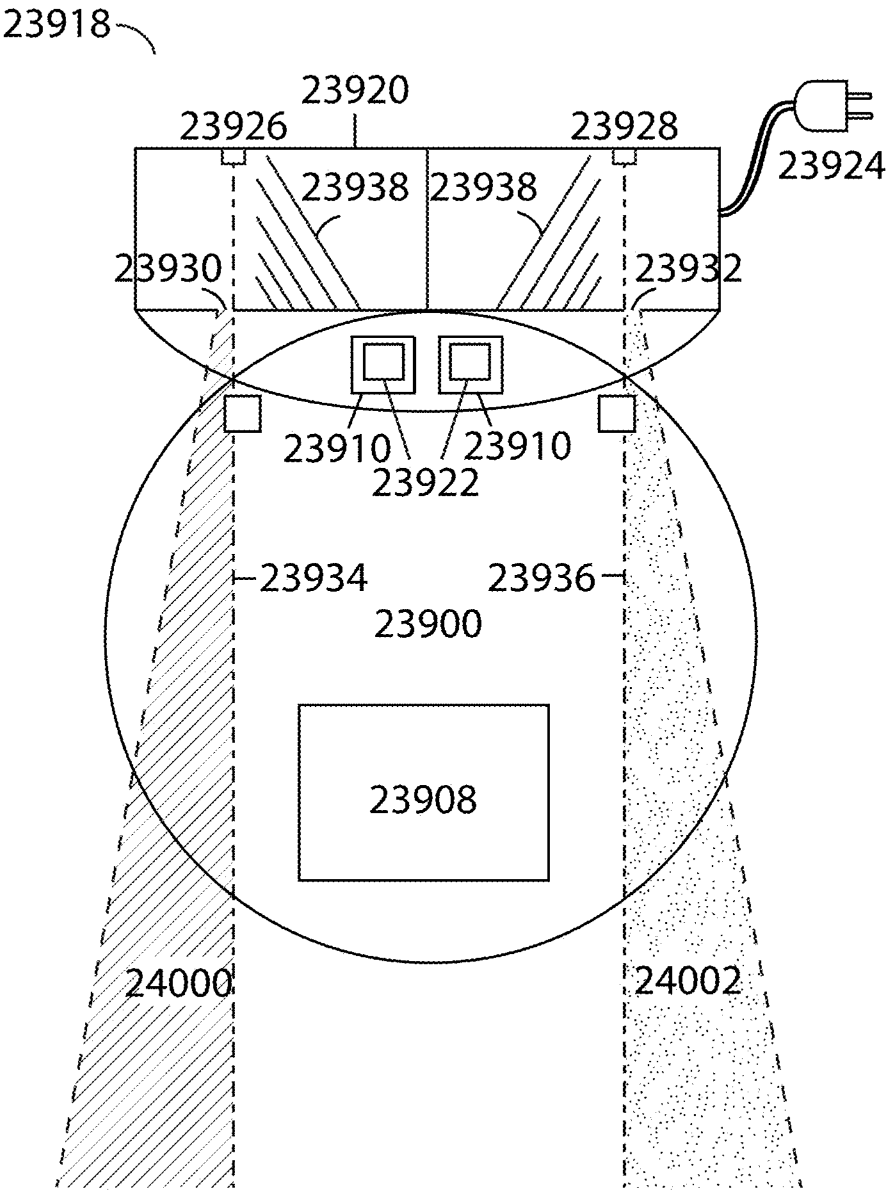

FIG. 242 illustrates an example of a mobile robot recharging on a recharge station, according to some embodiments.

FIGS. 243A-243D illustrate an example of a charging station that may connect to a central vacuum system of a home, according to some embodiments.

Figure 244:
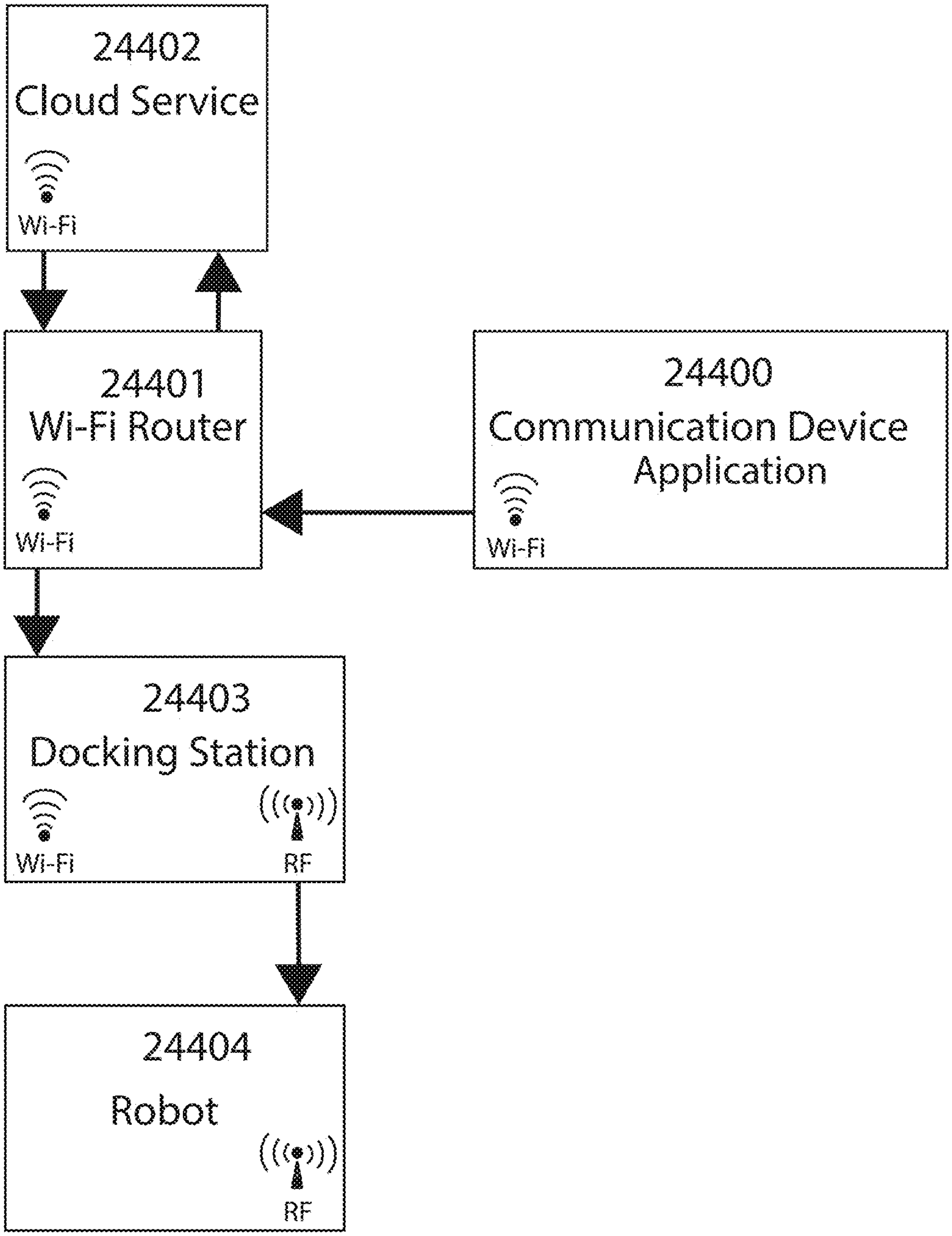

FIG. 244 illustrates a flowchart depicting an embodiment of a method for sending information to a robot via cloud services and RF interface, according to some embodiments.

Figure 245:
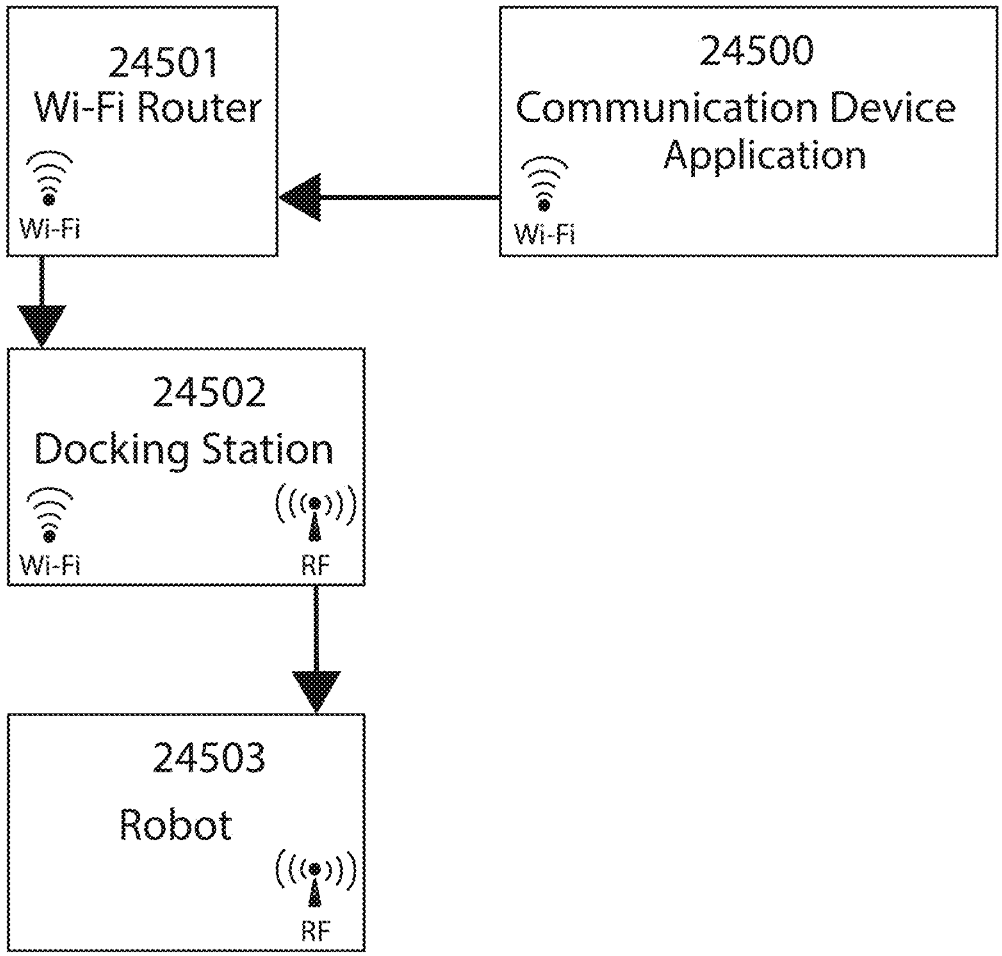

FIG. 245 illustrates a flowchart depicting an embodiment of a method for sending information to a robot via local connection and RF interface, according to some embodiments.

DETAILED DESCRIPTION OF SOME EMBODIMENTS

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a Versatile Mobile Platform robot (VMP robot), an autonomous robotic device, customizable to provide a variety of different functions. For example, the VMP robot may be customized to function as a smart bin for refuse and recyclables, an autonomous indoor trash bin, a robotic mop, a robotic transportation device for transporting other robotic devices, a luggage carrying robotic device, a robotic commercial cleaner, a robotic transportation device for passenger pods, a robotic towing device, a food delivering robotic device, a car washing robotic device, a robotic vacuum, etc. In some embodiments, the VMP robot includes, but is not limited to, wheels, motors, a power source, internal and external sensors, one or more processors, one or more controllers, mapping capabilities including area division, localization capabilities, and path planning capabilities. In some embodiments, the VMP robot includes software that may be customized depending on the intended function of the VMP robot. In some embodiments, the wheels are mecanum wheels and allow movement in any direction. In some embodiments, the VMP robot further includes a wheel suspension system. In some embodiments, sensors include one or more of, but are not limited to, sonar sensors, light detection and ranging (LIDAR) sensors, laser detection and ranging (LADAR) sensors, cameras, stereo and structured light sensors, time-of-flight sensors, TSSP sensors, infrared (IR) sensors, tactile sensors, ultrasonic sensors, depth sensing cameras, optical flow sensors, IR illuminator, light transmitters and receivers, odometry sensors, optical encoders, inertial measurement units (IMU), global positioning systems (GPS), structure from motion sensors, and gyroscopes. In some embodiments, the VMP robot further includes one or more electrical ports (e.g., electrical socket, mobile device charging port, home assistant charging port, etc.) that are supplied electricity using a separate or the same rechargeable battery as the main rechargeable battery of the VMP robot or solar energy. The VMP robot may further include network capabilities such as Wi-Fi™ or Bluetooth capability and USB ports. Other robotic devices with other configurations may also be used.

In some embodiments, the VMP robot further includes an operating system and an operating system interface. In some embodiments, the operating system interface is displayed on a touch screen of the VMP robot or any structure coupled thereto. In some embodiments, different types of hardware may be installed and detected by the operating system such that the VMP robot may be customized based on the intended function. In some embodiments, wherein the installed hardware is not detected by the operating system, the operating system interface displays a message to a user requesting the driver file of the hardware. In some embodiments, the VMP robot includes expansion slots for different types of hardware, such as imaging sensors, movement sensors, RAM, hard drives, controllers, etc., such that different types of hardware may be added and removed as needed. For example, a VMP robot customized with a warming oven and cooler for delivering take-out food (and any additional structure coupled thereto, such as the warming over for example) may be equipped with high-resolution sensors and additional RAM as the processor must recognize and respond to street signs (e.g., speed limits, stop signs, and stop lights) and environmental conditions (e.g., speed bumps or potholes) while travelling at a relatively quick speed. In another example, a VMP robot customized with a trash bin may navigate from a back of a house to a front of the house for refuse pickup. In this instance, the VMP robot (and any additional structure coupled thereto, such as the trash bin for example) may only be equipped with low-resolution sensors as high-speed travel is not required and navigation is limited to moving from the back of the house to the front of the house. In a further example, a VMP robot may be customized with a loading and unloading mechanism for loading and unloading a passenger pod used by the VMP robot to transport persons from a home to an office. Since the functionality involves transportation of humans, the VMP robot may be equipped with high resolution sensors to provide the highest safety standards. In some embodiments, hardware is installed on an as need basis depending on, for example, the transported item, the payload, and the intended function of the customized VMP robot. In some embodiments, the hardware and operating system of the VMP robot may be calibrated or recalibrated for their intended function. For example, if a VMP robot was not initially calibrated for transportation of shipping containers from a shipyard to a train yard, new hardware (e.g., cameras, sensors, memory, processors, hard drives, etc.) and mechanical structures (e.g., tow bar, extended platform, etc.) required in transporting shipping containers may be added. In some embodiments, additional software may be used to meet functionality requirements of the VMP robot.

In some embodiments, the VMP robot is customized based on, for example, the transported item, the payload, or the intended functionality of the VMP robot. For example, a VMP robot may be customized to further include a platform of a particular size for transporting items, a loading and unloading mechanism that allows for transportation of passenger pods, a shovel for plowing, a wheel lift for towing vehicles, robotic arms for garbage pickup, a forklift for lifting vehicles, etc. In some embodiments, the VMP robot may be customized to include clasps, magnets, straps, cords or other securing mechanisms to secure items transported to the VMP robot.

In some embodiments, the VMP robot includes speech recognition technology. For example, the VMP robot may include acoustic sensors to record voice commands that the processor may process and based on the result actuate the VMP robot to execute a particular action. Examples of voice activated robots are provided in U.S. Patent Application Nos. 62/699,367 and 62/699,582, the entire contents of which are hereby incorporated by reference. In some embodiments, the VMP robot may include speakers and the processor may respond or communicate with an operator using speech technology. For example, a user may verbally state a keyword which may activate a VMP robot customized to function as smart bin for refuse. Once activated, the user may provide verbal commands to the smart bin, such as refuse collection which triggers the smart bin to autonomously navigate to the refuse collection site. In another example, the user may provide verbal commands to a VMP robot customized to function as a mobile robotic cleaner including a type of cleaning, a cleaning location, a brush rpm, a suctioning power, a type of liquid for mopping, deep cleaning or light surface cleaning, a type of work surface for cleaning, and the like. In some embodiments, the VMP robot may use voice recognition software. The voice recognition may be able to understand sounds, text, commands, and the like. Further, the voice recognition software may use voice tone software for authenticating a user. In some embodiments, an application of a communication device paired with the processor of the VMP robot may be used by the user to provide commands, as described further below.

In some embodiments, the VMP robot may connect with other electronic devices, including static devices and mobile devices. In some embodiments, a user may provide commands to the VMP robot and the processor of the VMP robot may process the commands, and if applicable relay the commands to the paired electronic devices to which the commands are directed. In some embodiments, the commands are relayed between electronic devices using radio frequency (RF), Bluetooth, Wi-Fi, or other wireless transmission method. For example, a user may command a VMP robot customized as a smart bin to empty refuse and recyclables within and outside of the house. The processor of the smart bin may communicate with one or more indoor robotic trash bins within the house and command them to navigate to and empty their refuse into the smart bin prior to the smart bin navigating to a refuse pickup location, and may communicate with a smart recycling bin to command it to navigate to a recycling pick up location. While the smart bin does not have the ability to empty refuse from within the house or empty recyclables it may provide instructions to the one or more indoor robotic trash bins and smart recycling bin to which it is connect with. In another example, a user may provide instruction to wash the laundry to a VMP robot customized to function as an indoor robotic trash bin. Although the indoor robotic trash bin does not have the ability to wash the laundry, the processor of the indoor robotic trash bin may communicate the instructions to a robotic laundry hamper and robotic washing machine to which it is connected to. In one example, a VMP robot customized as a vacuum cleaner communicates with a robotic mop and notifies the robotic mop after finishing vacuuming in an area, triggering the robotic mop to mop the area. Or the vacuum cleaner communicates with the robotic mop to provide an area it will be cleaning and a movement path and the robotic mop follows immediately behind the robotic vacuum along the same path, such that a location is mopped immediately after being vacuumed. In some cases, the robotic mop follows the robotic vacuum cleaner by detecting signal transmitted from the robotic vacuum cleaner. In another example, one robot may move along a path while mopping the floors, while another robot follows immediately behind along the same path while polishing the floors. In some cases, more than two robots may collaborate in completing complementary tasks. For example, a robotic sweeper may move along a path while sweeping, a robotic mop may follow along the same path immediately behind the robotic sweeper and mop the floors, and a robotic floor polisher may follow along the same path immediately behind the robotic mop while polishing the floors. In other examples, different complementary tasks may be executed by different types of robotic devices. For example, an outdoor robotic blower may follow along an edge of a street while blowing debris into piles for easy collection, while an outdoor robotic sweeper may follow along the same path immediately behind to collect any debris the robotic blower may have missed. An example of an outdoor debris cleaning robot is described in U.S. Patent Application No. 62/737,270, the entire contents of which is hereby incorporated by reference. The outdoor debris cleaning robot may employ similar methods and techniques described herein. In some embodiments, the processor of the leader robot may determine an amount of delay between itself and the robot following immediately behind. In another instance, the processor of the VMP robot may connect with a home and may actuate different functions or provide instructions to devices controlling actuation of different functions within a home based on instructions provided to the VMP robot by a user. For example, a user may instruct the VMP robot to turn a shower ten minutes prior to their alarm sounding, and the VMP robot connected to both the alarm and the shower may provide required instructions to the shower, or a user may request the VMP robot to water the lawn, and the VMP robot connected to the sprinklers actuates the sprinklers to turn on, or a user may ask the VMP robot to dim, turn off, or turn on, lights or a fan in a room, and the VMP robot connected with the lights and fan may actuate or instruct the lights or fan to dim, turn off, or turn on. The above are provided as examples, however many possibilities are available. In some embodiments, the processor of the VMP robot may interact with the user by asking a question to which the VMP robot may respond (e.g., what is the weather outside?), instructing the VMP robot to provide particular information (e.g., provide a joke, play music or a particular song, etc.), playing a game, and many other ways. In some embodiments, the processor of the VMP robot uses information stored internally to provide a response to an interaction provided by a user. In some embodiments, the VMP robot connects with the internet and searches the internet to provide a response to an interaction provided by a user. In some embodiments, the VMP robot may follow a user around the environment when not executing an intended function (e.g., when not cleaning for a VMP robot customized as a surface cleaning robot) such that the user may relay commands from any location within the environment. In some embodiments, the user remotely provides instructions to the processor of the VMP robot using an application of a communication device paired with the processor. In some embodiments, after remaining idle in a position adjacent to the user, the processor of the VMP robot may alert the user (e.g., via lights or a noise) when the user moves to avoid the user injuring themselves.

In some embodiments, the processor of the VMP robot may be pre-paired with particular electronic devices. In some embodiments, the processor of the VMP robot may search for one or more electronic devices with which it may establish a connection. In some embodiments, a user may be notified if the processor is unable to establish a connected with a particular electronic device. In some embodiments, a user is notified when a task or action is completed or incomplete. In some embodiments, information is provided to the user through an application of a communication device paired with the processor of the VMP robot, a graphical user interface of the VMP robot, audio, etc. In some embodiments, the processor of VMP robot may understand speech of a user, formulate sentences that a user may understand, and communicate using a computer simulated voice.

Figure 1A:
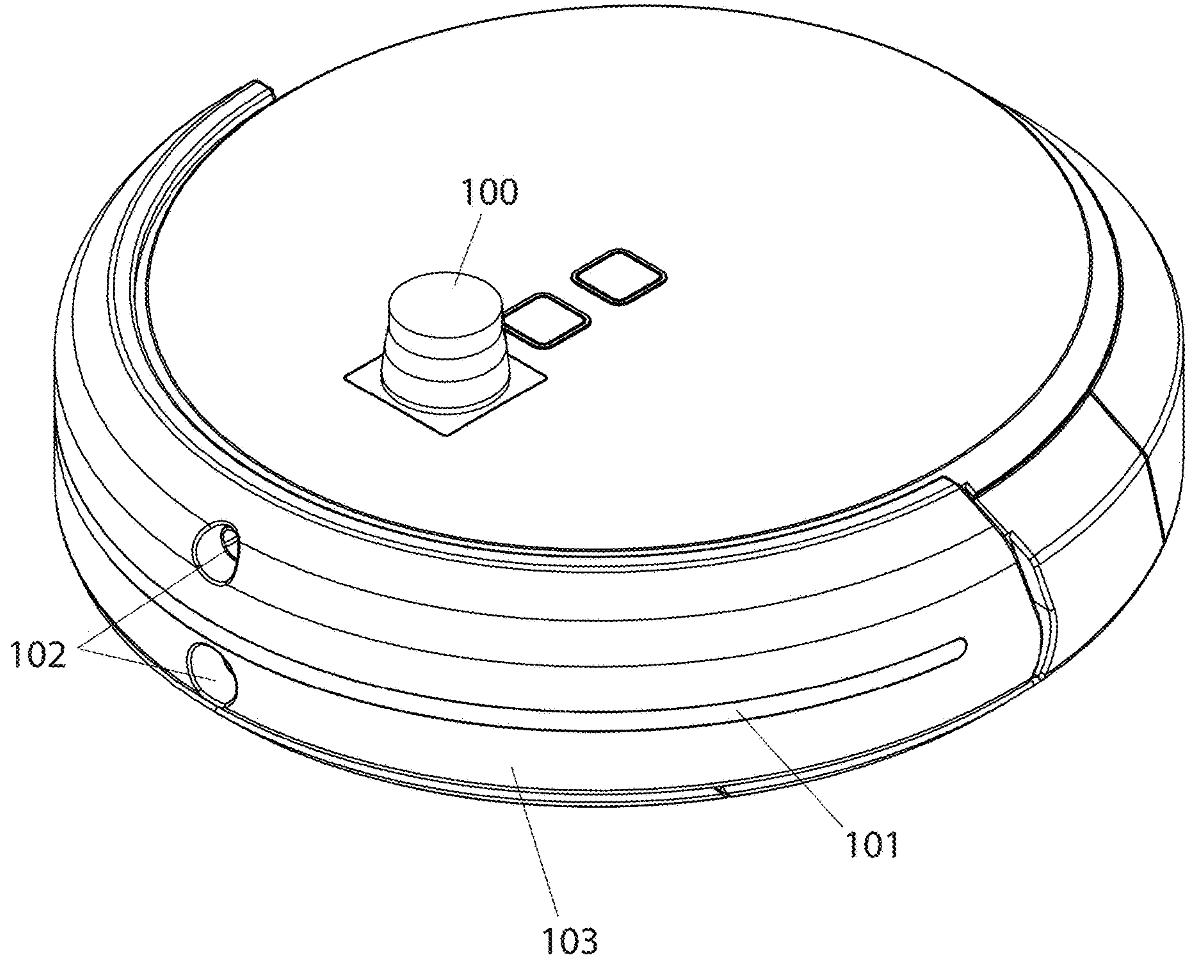
FIGS. 1A and 1B illustrate an example of a small VMP robot, according to some embodiments.
Figure 1B:
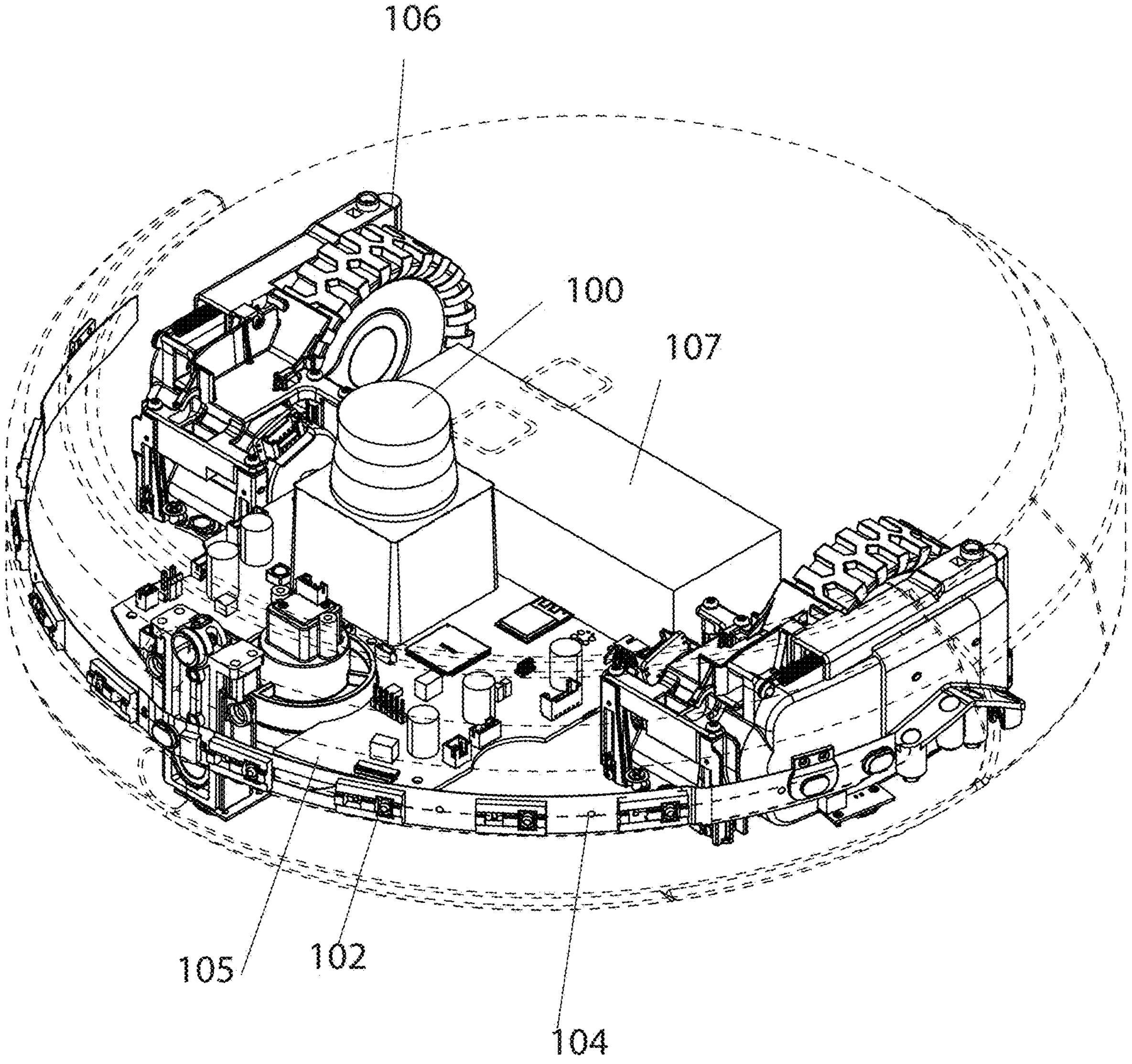
Figure 2A:
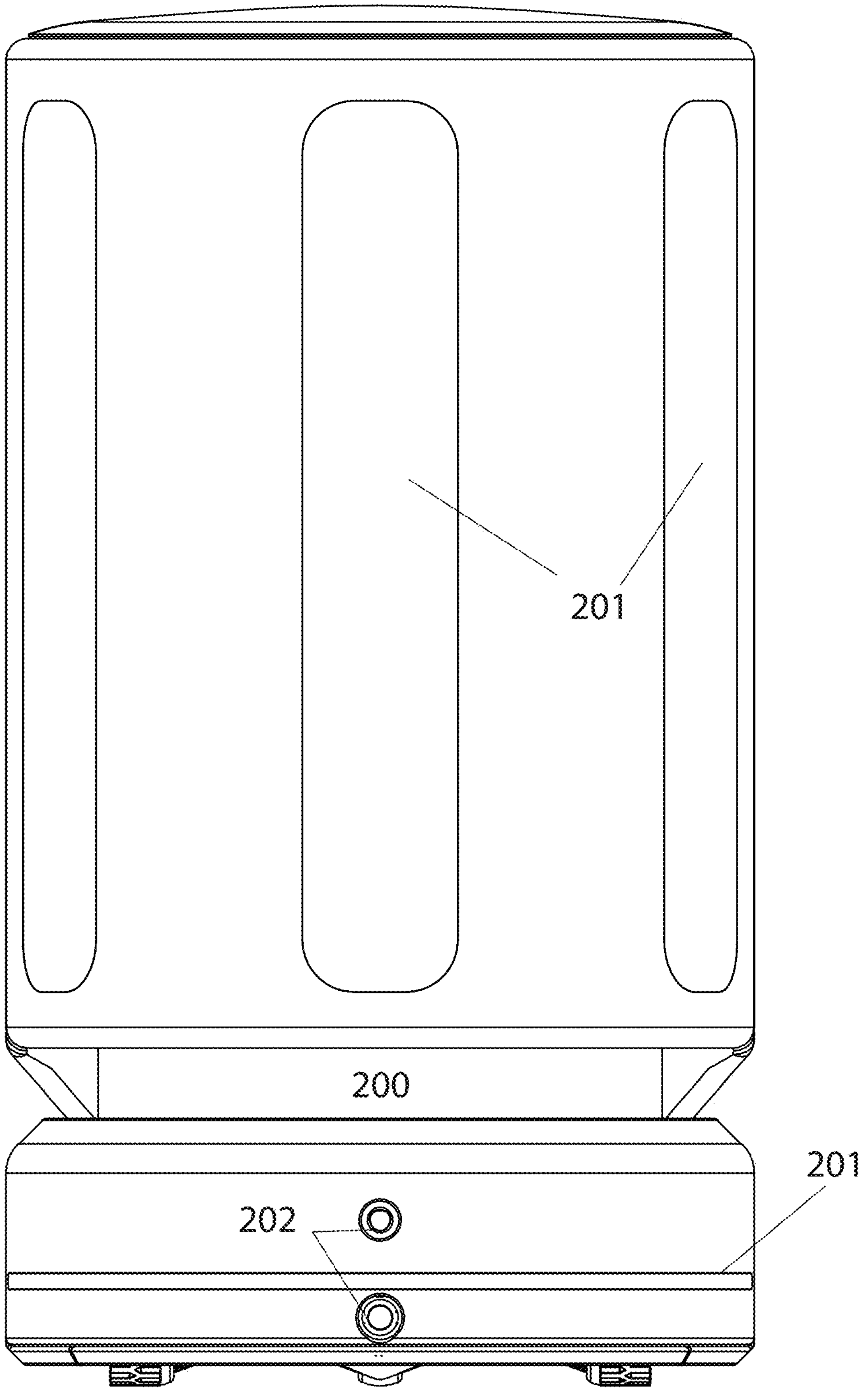
FIGS. 2A and 2B illustrate a VMP robot customized to function as a robotic indoor trash bin, according to some embodiments.
Figure 2B:
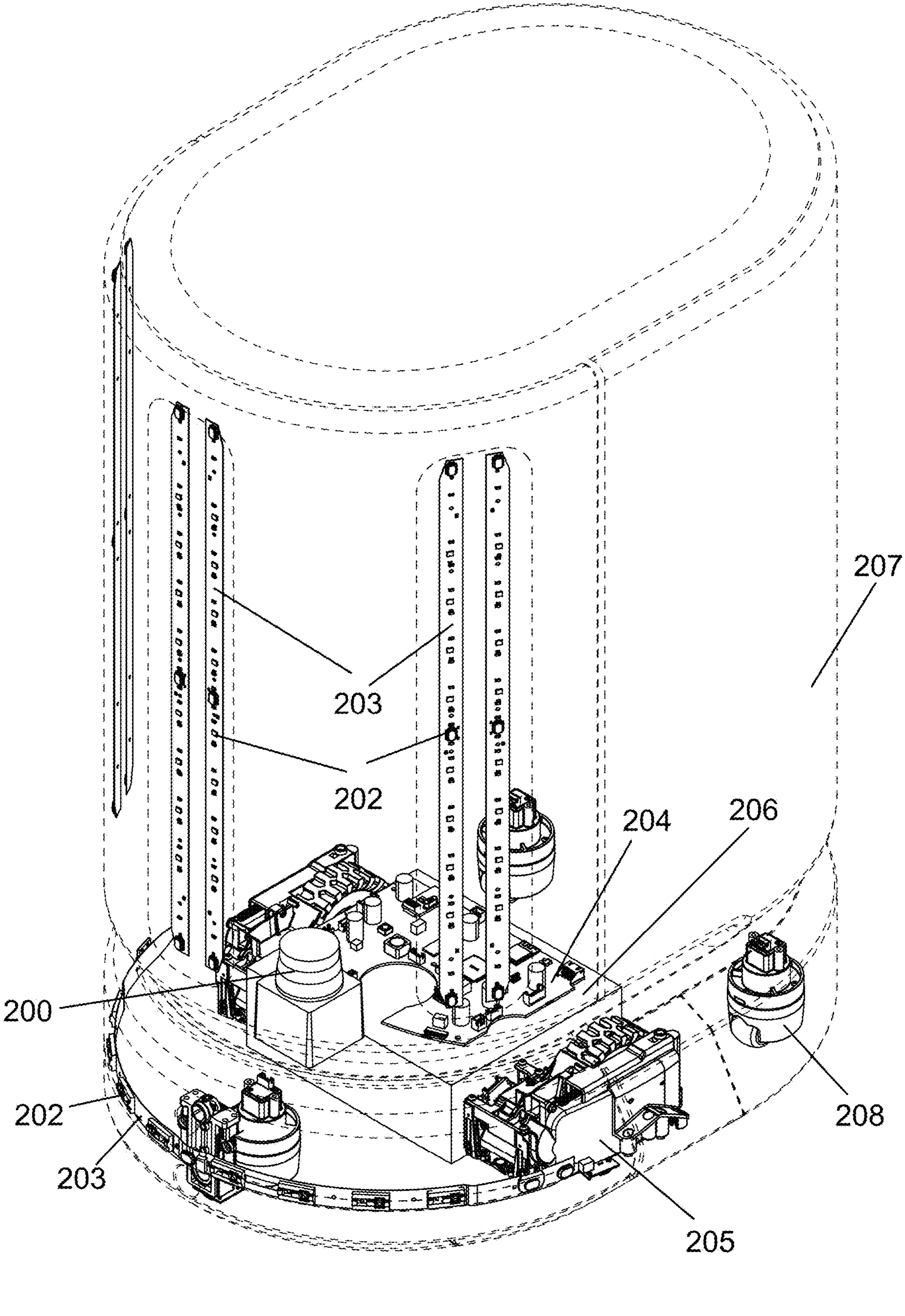

FIG. 1A illustrates an example of a small VMP robot including LIDAR 100, sensor window 101 behind which sensors are positioned, sensors 102 (e.g., camera, laser emitter) and bumper 103. FIG. 1B illustrates internal components of the small VMP robot including LIDAR 100, sensors 102 of sensor array 104, PCB 105, wheels including suspension 106, and battery 107. The VMP robot may be customized (e.g., by customizing software, hardware, and structure) to provide various different functions. In some embodiments, the same internal components and some base components are maintained (e.g., sensors, PCB, drive wheels, etc.) for each VMP robot customization, while additional electronic components and structures may be added depending on the intended function and desired design of the robot. Furthermore, the shell of each VMP robot customization may be modified. For example, FIG. 2A illustrates the VMP robot customized to function as an indoor trash bin including LIDAR window 200, sensor windows 201 behind which sensors are positioned and sensors 202 (e.g., camera, laser emitter, etc.). FIG. 2B illustrates internal components of the indoor trash bin including LIDAR 200, sensors 202 of sensor arrays 203, PCB 204, wheels including suspension 205, and battery 206. The internal trash bin includes similar components as the VMP robot illustrates in FIGS. 1A and 1B, however the body of the VMP robot was increased in side to accommodate the trash bin 207 by adding additional castor wheels 208. The trash bin 207 may or may not include a lid. In some cases, the lid may autonomously open upon detecting a person approaching to dispose refuse or may be opened by a user using voice command or by activating a button. In some instance, the trash bin may be replaced by a compost bin or recycling bin or other type of bin. In some cases, a user chooses a designated location of an indoor trash bin in a map of the environment using an application of a communication device. In some cases, the processor generates a map of the environment and localizes using mapping and localization methods described herein. In some cases, the indoor trash bin includes sensors that collect data may be used by the processor to detect a fill level of the trash bin. In some instances, the indoor trash bin notifies a user that it is full using lights, a noise, or displaying a message on a local user interface or an application of a communication device paired with the VMP robot. In some cases, the trash bin autonomously navigates to a location where refuse is emptied (e.g., garage) when full or when instructed by a user. In some cases, the indoor trash bin may autonomously empty the refuse when full at a location where refuse is emptied and return back to a particular location. In some instances, a user may instruct an indoor trash bin to navigate to a particular location to facilitate throwing refuse away. For example, the indoor trash bin (or compost bin) may navigate to each person sitting at a dining table after dinner, such that each person may easily empty their remaining food into the trash bin. In some cases, the indoor trash bin autonomously navigates to areas with high user activity. For example, if there is a high level of activity detected in a living the indoor trash bin may autonomously navigate to the living room, then may later retreat to a designated location. In some instances, such as in large commercial offices, a control system may manage multiple indoor trash bins and may instruct a full indoor trash bin to navigate to a location for emptying refuse and an empty (or with minimal refuse) indoor trash bin to replace the location of the full indoor trash bin. In other instances, processors of two or more indoor trash bins collaborate to coordinate the replacement of a full indoor trash bin when it departs to empty its refuse. Collaboration methods such as those described herein may be used.

Figure 3:
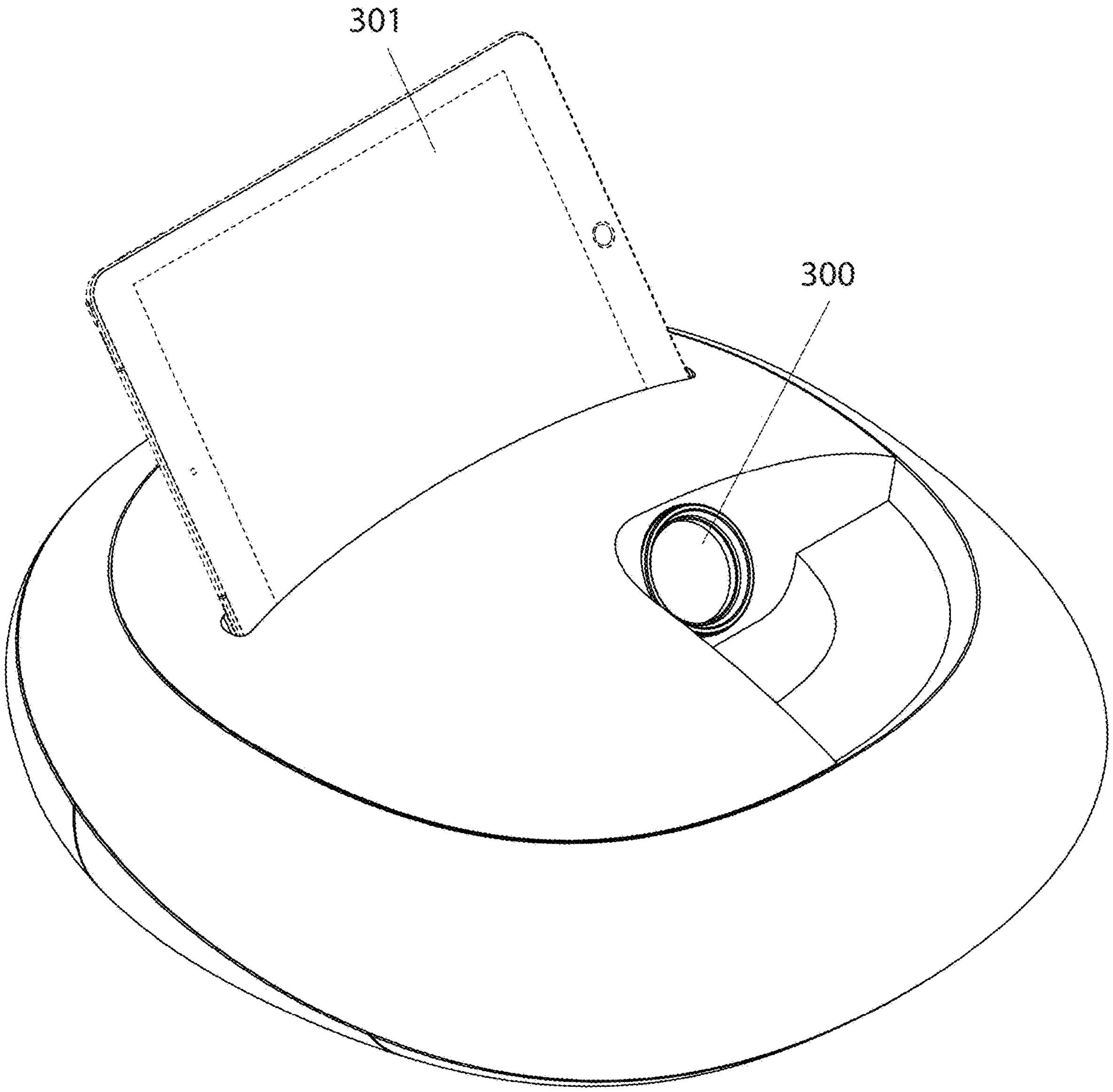
FIG. 3 illustrates a VMP robot customized to function as a robotic multimedia device, according to some embodiments.

FIG. 3 illustrates the VMP robot customized to function as a multimedia device including a projector 300 for projecting videos and a holder for a communication device, such as a tablet 301 that may display a video or play music through speakers of the multimedia device or the communication device. In some instances, the multimedia device may autonomously follow a user around an environment, playing a desired type of music. In some instances, the multimedia device may connect with other speakers within the environment and play the music through those speakers. In some cases, the processor of the multimedia device learns the type of music a user likes and autonomously chooses the music to play. In some cases, the music is streamed from the communication device or the internet or is stored in a memory of the multimedia device. In some instances, a user may provide voice commands to the multimedia device, such as "play music" or "play country music" or "play movie". In some instances, the processor of the multimedia device learns optimal positioning within an environment or subarea of the environment for playing music through its speakers or for projecting a video. In some instances, the multimedia device may project a video that is playing on the communication device or may stream a video directly from the internet or that is stored in the internal memory. In some instances, the projector projects a light pattern for decorative reasons. In some instances, the light pattern is choreographed to the music. An example of a multimedia robot is described in U.S. Patent Application No. 62/772,026, the entire contents of which is hereby incorporated by reference.

Figure 4A:
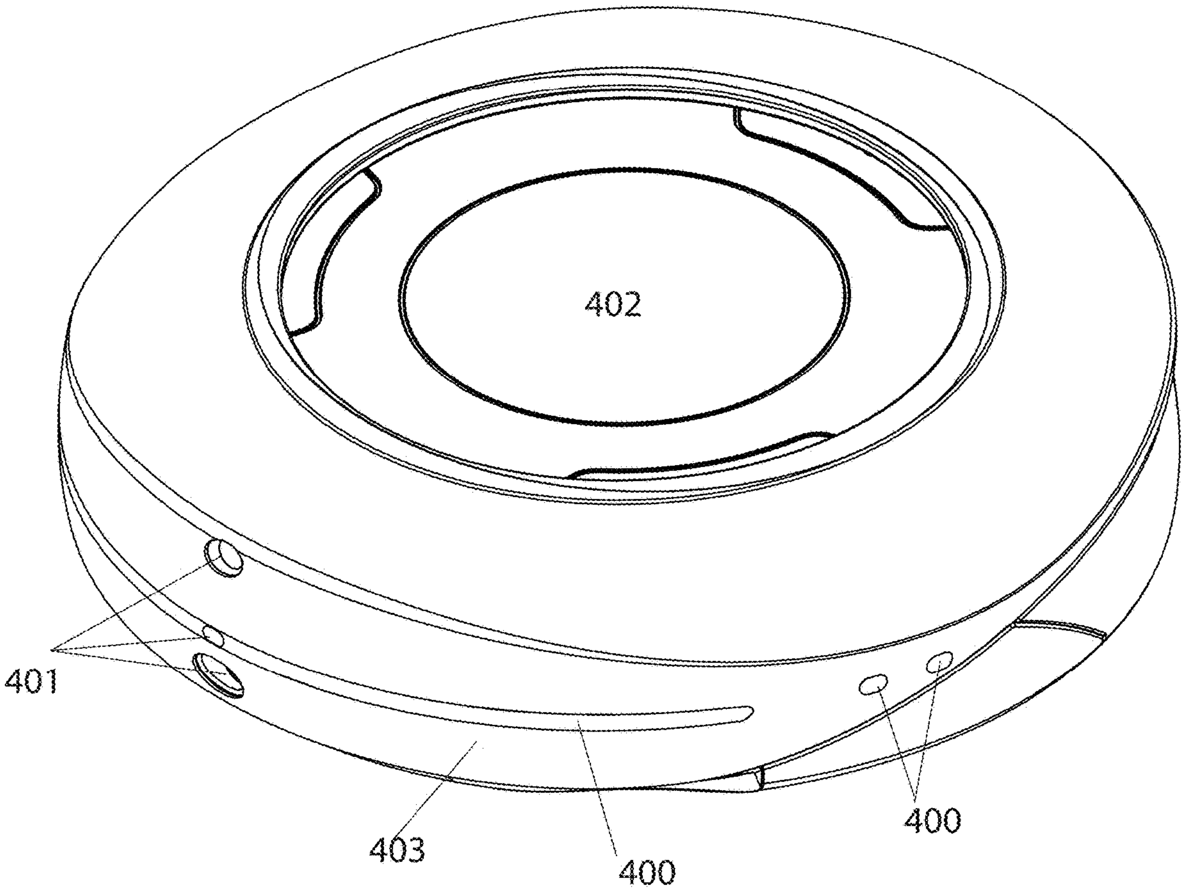
FIGS. 4A and 4B illustrate a VMP robot customized to function as a robotic vacuum, according to some embodiments.
Figure 4B:
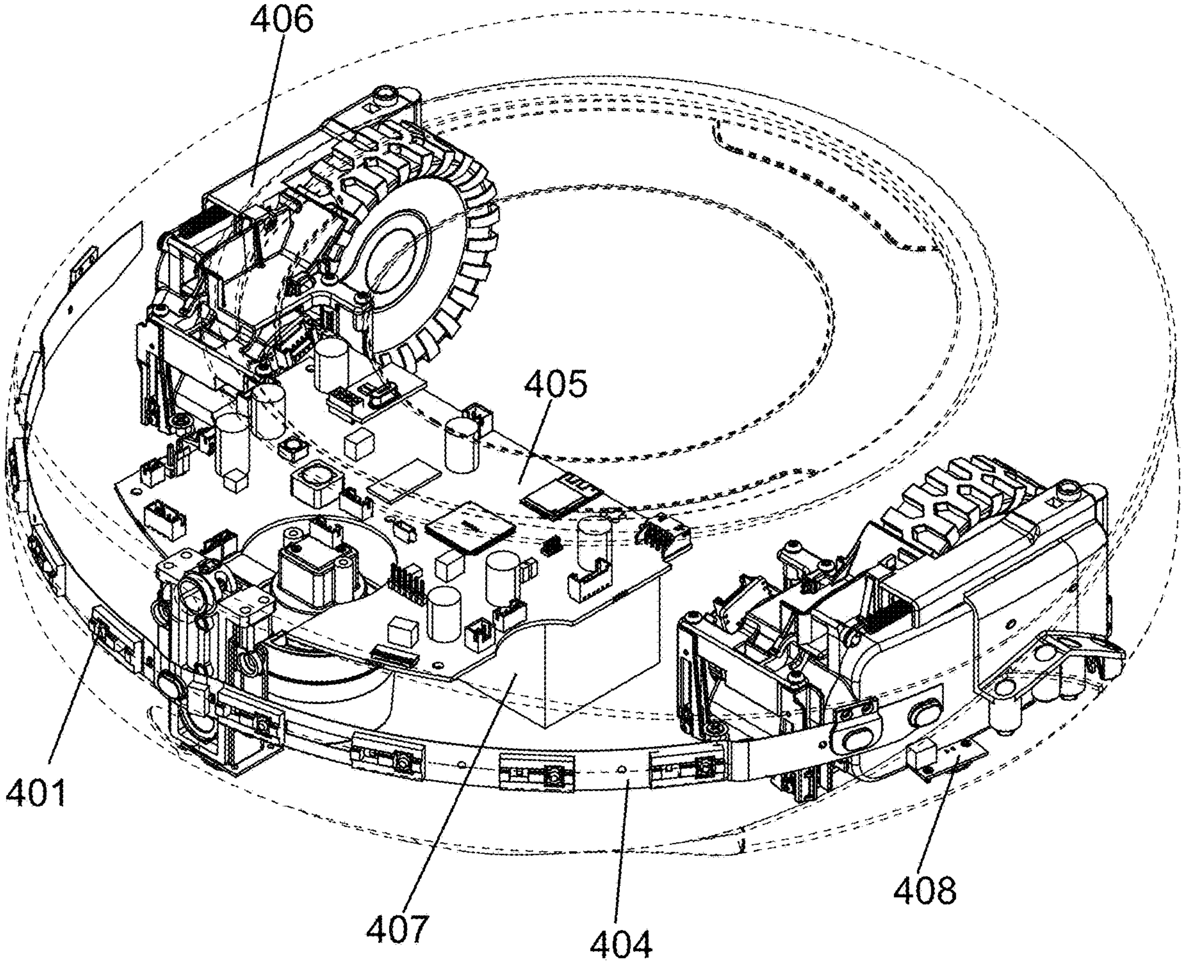
Figure 5A:
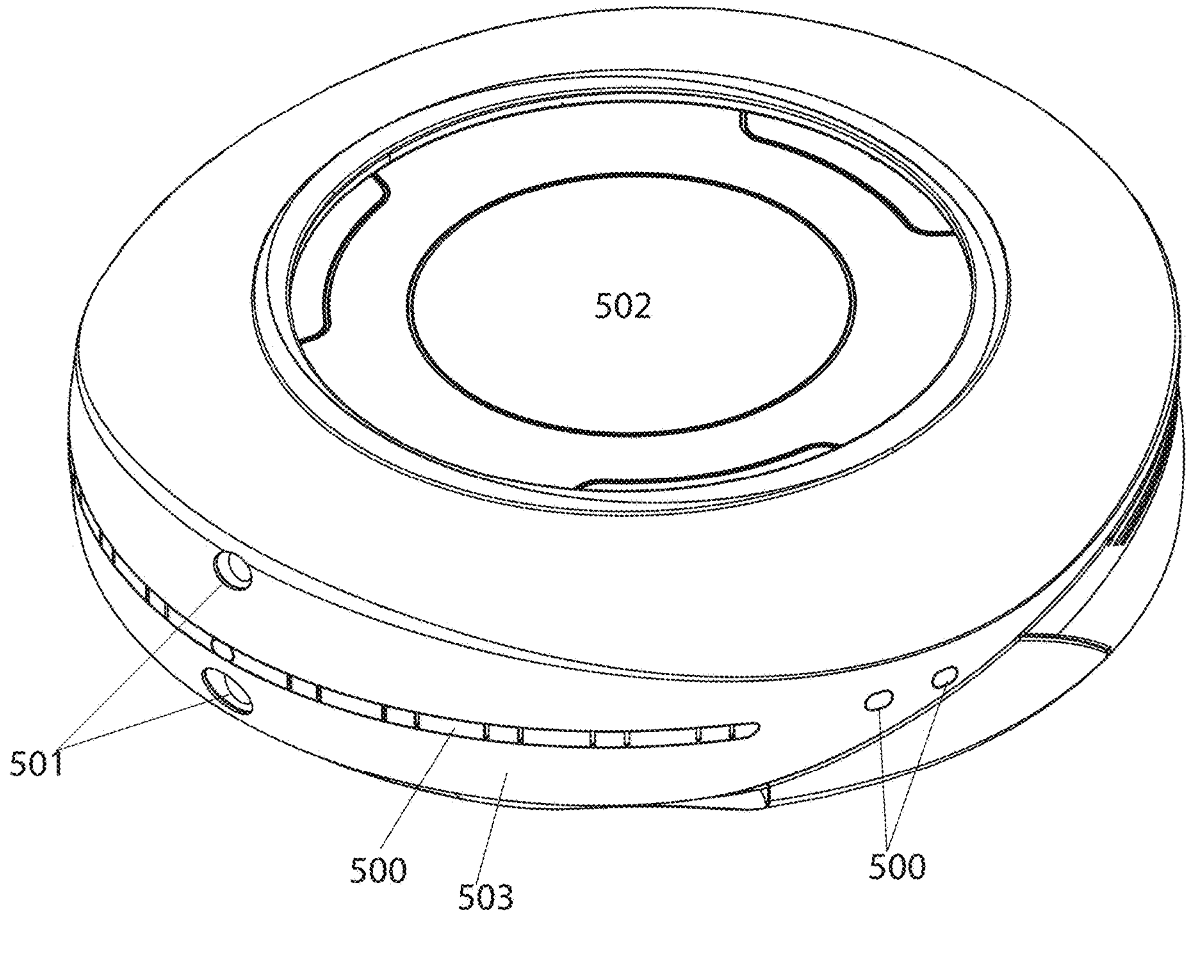
FIGS. 5A and 5B illustrate a VMP robot customized to function as a robotic steam mop, according to some embodiments.
Figure 5B:
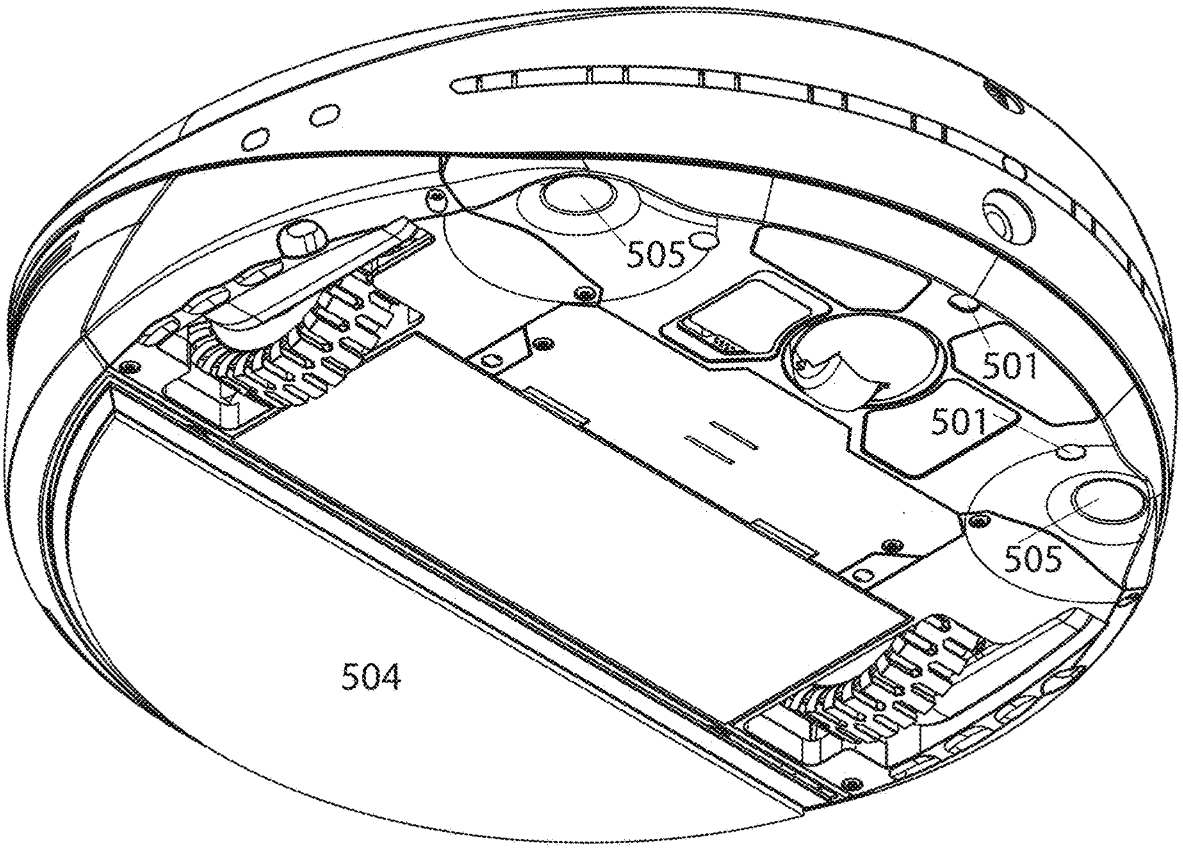

FIG. 4A illustrates a VMP robot customized to function as a robotic vacuum including sensor windows 400 behind which sensors are positioned, sensors 401 (e.g., camera, laser emitter, TOF sensor, etc.), user interface 402, and bumper 403. FIG. 4B illustrates internal components of the robotic vacuum including sensors 401 of sensor array 404, PCB 405, wheels including suspension 406, battery 407, and floor sensor 408. FIG. 5A illustrates a VMP robot customized to function as a robotic steam mop including sensor window 500 behind which sensors are positioned, sensors 501 (e.g., camera, laser emitter, TOF sensor, etc.), user interface 502, and bumper 503. FIG. 5B illustrates a bottom perspective view of the steam mop with mopping pad 504, side brush attachment points 505, and sensors 501 (e.g., floor sensor, edge sensor, etc.). Internal components of the robotic steam mop may be similar to those shown in FIG. 5B. Processors of robotic surface cleaners, the robotic vacuum and robotic steam mop provided in these particular examples, may map their surroundings and localize themselves within the map using mapping and localization methods described herein. In some cases, the robotic surface cleaner rotates 360 degrees in one or more positions to scan an area and generate a map from the scans. In other instances, the robotic surface cleaner explores an area while mapping, and in some cases, perform work while exploring and mapping. In some instances, the processor divides the surroundings into subareas and orders the different subareas for cleaning using area division methods described herein. In some cases, the processor determines an optimal cleaning path based on various factors such as, minimal repeat coverage, coverage time, total coverage, travel distance, etc. using path planning methods described herein. In some instances, both the robotic vacuum and the robotic steam mop collaborate, wherein the robotic vacuum completes coverage of an area, and once complete notifies the robotic steam mop thereby triggering the robotic steam mop to mop the area. In some instance, the robotic steam mop follows directly behind the robotic vacuum, the two sharing the exact same movement path such that a location is mopped immediately after the location is vacuumed. In other cases, the robotic vacuum and robotic steam mop may be replaced by other types of surface cleaners, such as robotic mop, robotic UV sterilizer, robotic floor polisher, robotic floor scrubber, etc. In some instances, a single robotic surface cleaner includes two or more cleaning tools. For example, the vacuum may be in a front portion and the steam mop in a rear portion of the robotic surface cleaner, such that during operation a location is vacuumed prior to being mopped. In some cases, cleaning tools may be activated or deactivated during operation such that a user may choose the type of cleaning.

Figure 6:
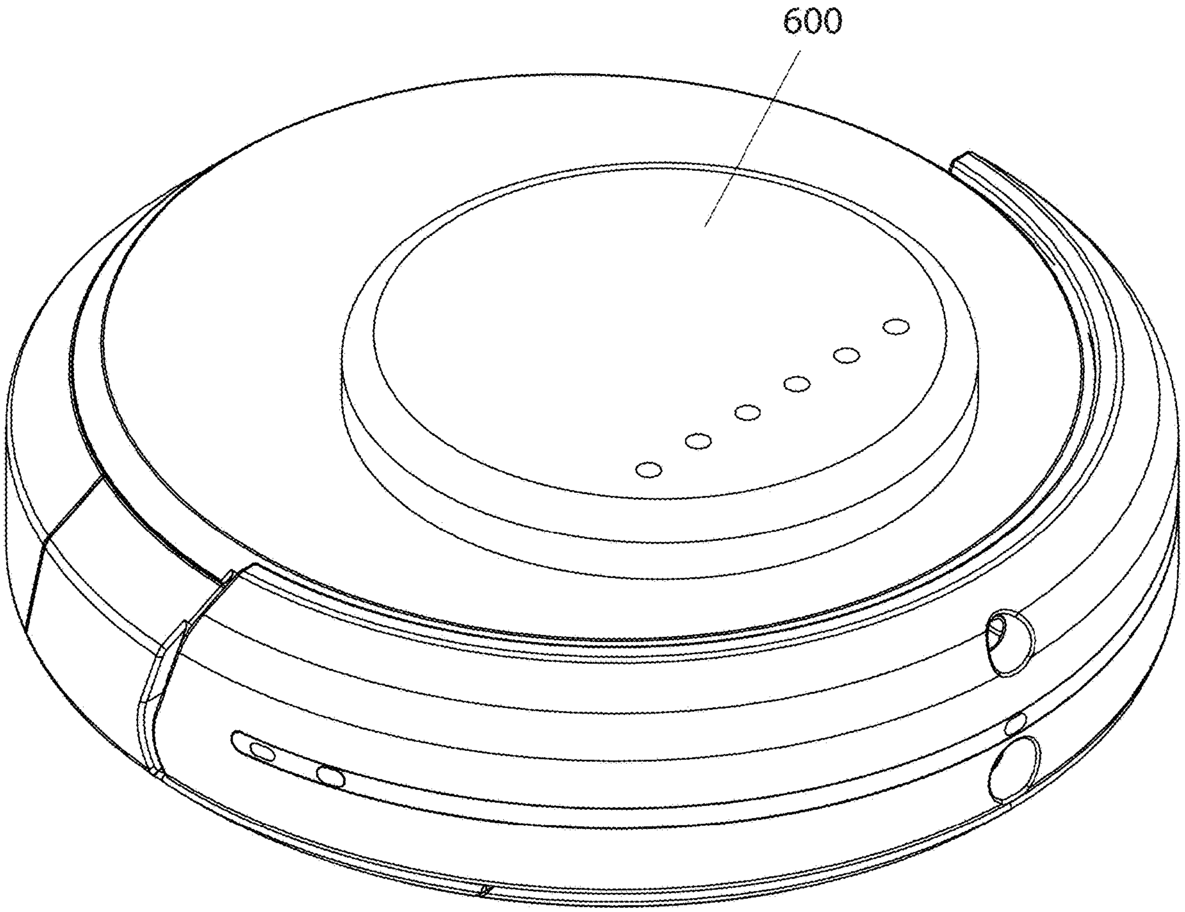
FIG. 6 illustrates a VMP robot customized to function as a mobile robotic router, according to some embodiments.

FIG. 6 illustrates the VMP robot customized to function as a robotic mobile router including similar components as the robots described above with the addition of a router 600. In instances, the robotic mobile router may be used for rebroadcasting a Wi-Fi signal. In some instances, the robotic mobile router may be stored in at least one location such as at a base station and may be called upon by a user when Wi-Fi servicing is required. In some cases, the robotic mobile router may broadcast a Wi-Fi signal from a predetermined location on a recurring basis. For example, a user may select that a robotic mobile router broadcast a Wi-Fi signal from a same location on a recurring basis. In some instances, the processor of the robotic mobile router may use historical data and machine learning techniques for determining an optimal location from which to broadcast a Wi-Fi signal from using similar methods as those described herein. In some instance, the processor may measure the strength of the Wi-Fi signal rebroadcasted and the strength of the Wi-Fi signal of connected electronic devices when located in different locations. In some instances, the processor may detect activity level or the location of connected electronic devices in an environment and position the robotic mobile router closer to areas which high activity level or highest density of connected electronic devices. In some cases, a schedule may be set for a robotic mobile router to provide Wi-Fi signal broadcasting services. For example, a schedule may be set for a robotic mobile router to navigate to at least one predetermined signal broadcasting location at least one predetermined date and time that may or may not be recurring on a, for example, weekly or bi-weekly basis. For example, a user may arrive at a home and watch television in the living room at the same time every weeknight, and the robotic mobile router may therefore provide a Wi-Fi signal service at this location and time each night. After completion of Wi-Fi broadcasting services, the robotic mobile router may autonomously navigate back to a designated storage location such as, for example, a base station. In some cases, scheduling information for Wi-Fi signal broadcasting may be provided to the processor using an application of a communication device connected with the processor, a remote control, a user interface on the robotic mobile router, or another type of device that may communicate with the processor. In some instances, the robotic mobile router will act as a Wi-Fi repeater, taking a Wi-Fi signal from, for example, a stationary router, or a stationary router and modem and rebroadcasting the signal to boost the Wi-Fi signal in an area with a non-existent or weak Wi-Fi signal strength. In some cases, the stationary router or modem may be, for example, a base station of the robotic mobile router. For example, the base station may act as a main modem and router for internet connection. In some instances, the base station may act as a storage location and/or charging station for the robotic mobile router. In some cases, the base station may be a stationary router that rebroadcasts a signal from a main router or main router/modem. In some cases, the processor of the robotic mobile router determines the most optimal location for boosting a signal in an environment based on factors such as, location of one or more users, electronic devices connected with the router, the main router, other Wi-Fi repeating devices, electronic devices connected and currently using the most data, and the like. In some instances, the robotic mobile router follows a user around an environment to constantly provide strong Wi-Fi signal. The robotic mobile router may be paired with a communication device of the user such as, for example, a mobile phone, smartwatch, or other device, and as the user traverses the environment, the processor may track the location of the device to follow the user. Alternatively, or in addition, a remote control or remote key held by the user may be paired with the mobile robotic device, and as the user traverse the environment, the mobile robotic device will track the location of the remote and follow. Other alternative embodiments are possible and are not intended to be restricted to these examples. In some instances, the robotic mobile router may be paired with an application of a communications device or a remote control. The user may use the application or remote control to request the robotic mobile router navigate to a particular location in a map. Alternatively, a user may capture an image that is transmitted to the processor for processing to determine the location captured in the image, to which the robotic mobile router may navigate. In some instances, the user request signal boosting and the processor determines the location of the user and navigates to the user. In some instances, the processor detects when one or more electronic devices are connected to the Wi-Fi and autonomously navigates to a location that provides optimal signal strength for the one or more electronic devices. For example, the processor may detect a smart phone and smart TV in a living room connected to the Wi-Fi and navigate to a location in the living to provide optimal signal strength. In some instances, the processor continuously monitors the signal strength of electronic devices connected to the Wi-Fi and adjusts its location in real-time to provide optimal signal strength to the devices. In some instances, the processor only considers electronic devices actively being used. In some instances, the processor determines optimal locations for providing strong signal strength using reinforcement learning methods or machine learning methods such as those described herein. In some instances, the processor uses historical data such as scheduling data, days and times electronic devices are connected and actively used, types of electronic devices connected and amount of data used by each electronic device, locations of electronic devices connected when actively used, and the like in determining optimal locations for providing strong signal strength to electronic devices. For example, the processor may detect a smart TV actively used in the same location at the same time on a same day, and therefore may predict that Wi-Fi signal boosting is required at the same location on the same day and at the same time. In some instances, the processor detects its location in an environment by capturing images and identifying features in the images and determines if it is located in a burdensome location, such as a middle of a hallway that may act as a tripping hazard to users. In some instances, robotic mobile router repositions itself if located in a burdensome location to a next best location or does not reposition itself unless instructed to by a user. In some instances, two or more robotic mobile routers collaborate to provide optimal Wi-Fi signal strength to connected electronic devices within an environment. For example, if a first electronic device is located in a living room while a second electronic device is located in a bedroom and neither electronic devices are receiving strong Wi-Fi signal, two robotic mobile routers may be required. The two processors may collaborate such that the first robotic mobile router may provide an optimal signal strength to electronic device A, while the second robotic mobile router provides an optimal signal strength to electronic device B. Additionally, processor of both robotic mobile routers may determine locations for the two mobile routers that allows their signal strengths to intersect in a middle area between their two locations to strong signal strength to electronic devices A and B and any electronic devices located in the middle area. In some instances, the first robotic mobile router may attempt to find an optimal location to provide strong signal strength to both electronic devices A and B. If an adequate signal strength may not be provided to both electronic devices A and B, the processor of the first robotic mobile router may communicate and collaborate with the processor of the second robotic mobile router such that both electronic devices A and B may be provided adequate signal strength. In some instances, the processor of the robotic mobile router may provide priority to one or more electronic devices based on instructions provided by a user, amount of data used, type of internet activity used. For example, the robotic mobile router may prioritize providing a strong signal strength to an electronic device with higher priority when, for example, providing two or more devices with strong signal strength simultaneously is not possible. In some instances, a status of the robotic mobile router may be displayed on the user interface of the robotic mobile router, an application of a communication device paired with the processor, a remote control, or other device paired with the processor of the robotic mobile router or may be provided using audio or visual methods. Examples of statuses and/or messages may include, but are not limited to, parked at base station, on route to Wi-Fi signal repeating location, repeating Wi-Fi signal, Wi-Fi signal strength, optimality of the Wi-Fi signal strength, parked at Wi-Fi signal repeating location, on route to base station, function delayed, stuck, collision with obstruction, damaged, and the like. In some instances, a robotic mobile router may be a static wireless internet signal booster. For example, the robotic mobile router may repeat a wireless signal from a static location, such as a base station during charging. Further details of a robotic mobile router are provided in U.S. Patent Application Nos. 62/696,723 and 62/736,676, the entire contents of which are hereby incorporated by reference.

Figure 7:
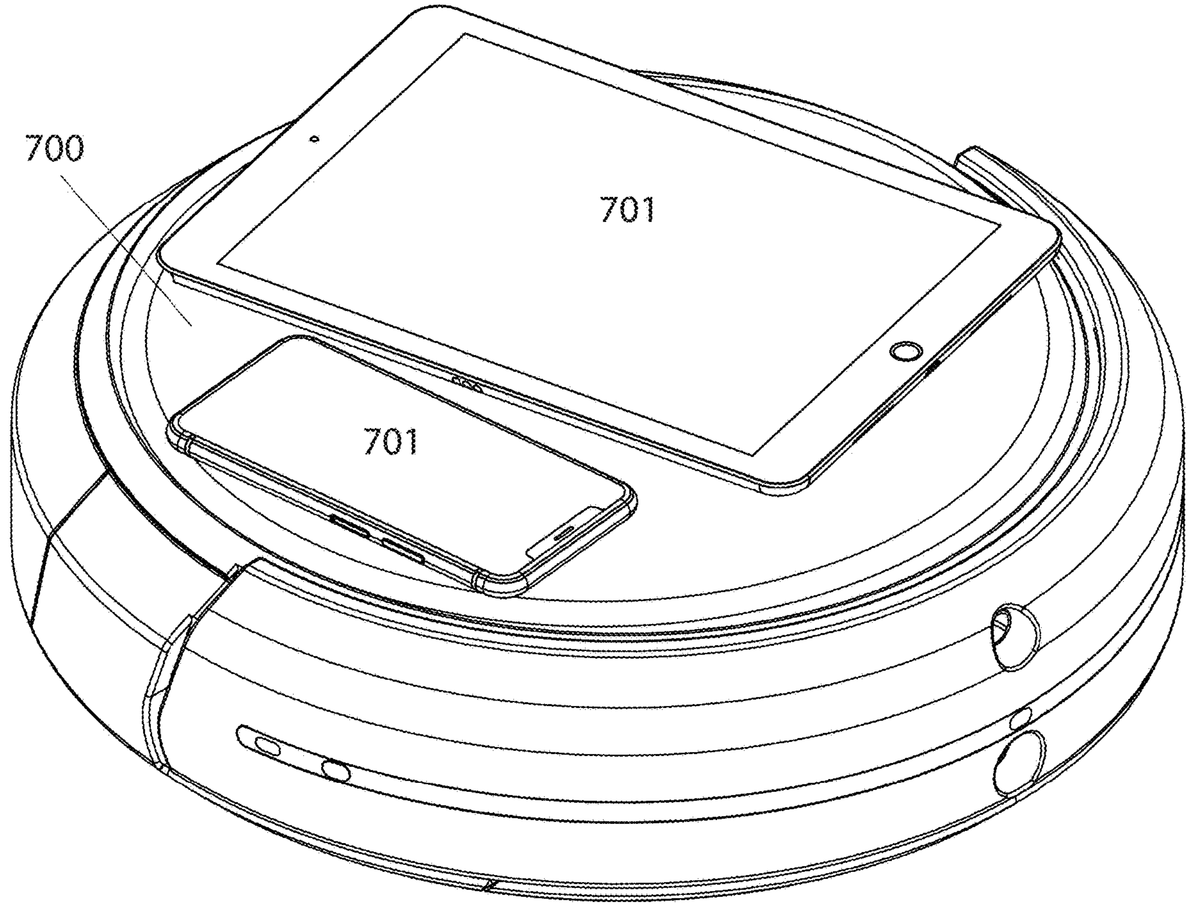
FIG. 7 illustrates a VMP robot customized to function as a mobile robot charger, according to some embodiments.

FIG. 7 illustrates the VMP robot customized to function as a robotic mobile charger including similar internal components as the robots described above with the addition of a charging pad 700 on which electronic devices 701 may charge using inductive charging. In some instances, the robotic mobile charger may be used for charging electronic devices. In some embodiments, the robotic mobile charger may remain stationary at, for example, a charging station until a request is received by the processor. In some cases, the robotic mobile charger navigates to a requested location for charging of an electronic device. In some instances, the robotic mobile charger may provide inductive charging capability, providing the battery of an electronic device with charging power to recharge the battery by, for example, placing the electronic device on top of the robotic mobile charger, within a slot or indentation of the robotic mobile charger, and the like. For example, an electronic device capable of inductive charging (e.g., a smart phone, a smart watch, a table, or other device) may be placed on a flat charging pad positioned on a top of the robotic mobile charger for charging. In some instance, the flat charging pad includes an inductive charging plate. In some cases, the inductive charging plate is place within a slot or indentation. In some instances, the robotic mobile charger includes electrical sockets or USB ports or built-in chargers for particular devices (e.g., mobile phone, tablets, etc.). For example, the charging cable of a mobile phone may plug into the USB port of the robotic mobile charger and may receive power from a battery of the robotic mobile charger to provide to the connected mobile phone for charging. In another example, an electronic device, such as a laptop, may plug into a three-prong socket of the robotic mobile charger for electrical power. This may be useful in locations where there is a shortage of electrical sockets, such as at a conference room. In one example, a router is plugged into a socket of the robotic mobile charger and the robotic mobile charger locates itself such that the router may provide optimal Wi-Fi signal strength to users. In some instances, the processor of the robotic mobile charger may be paired with electronic devices such that it may monitor their battery levels. In some instances, the robotic mobile charger autonomously navigates to a smartphone, a smartwatch, and the like for charging of the electronic device when their battery level is below a predetermined threshold. In some cases, a user may request a robotic mobile charger to a particular location using an application of a communications device. The request may be for a particular location and at a particular date and time and in some instances, may be recurring. In some instances, robotic mobile chargers are used within a personal space or may be used in public areas. In some instances, the type of connected required may be specified (e.g., USB, iPhone charger, socket, etc.) as some robotic mobile charger may not include all types of connections. In some instances, the robotic mobile charger navigates to a docking station for charging, to a predetermined location, to complete another request, or the like after completion of a request (i.e., charging of a device). In some embodiments, the processor of the robotic mobile charger may broadcast a signal for replacement by another robotic mobile charger when a battery level of the robotic mobile charger is low or when functional problems are detected. In some cases, a control system manages two or more robotic mobile chargers and decides which requests to provide to each robotic mobile charger based on various factors, such as location of the robotic mobile charger, location of the request, type of connectors of the robotic mobile charger, battery level, etc. using control system management methods described here. In some cases, processors of robotic mobile chargers collaborate to determine which robotic mobile charger executes each request using collaborative methods such as those described here. In some cases, more than one user may use a single robotic mobile charger such that various electronic devices are charged at once. In some instances, the processor may control the level of charging power provided. For example, if there is a need for an electronic device to be powered up quickly, a higher than normal level of charging power may be provided to the electronic device. In some cases, the robotic mobile charger may travel at a faster speed if the charging request indicates that the electronic device needs to be charged quickly. In some cases, the processor of the robotic mobile charger may receive multiple requests simultaneously and may decide which request to fulfill first based on, for example, the frequency of requests from a particular user, loyalty index of users, current battery level of the electronic devices, charging rate of the electronic devices (e.g., based on historical data), power consumption required for charging each electronic device, the types of electronic devices, last charging date (e.g., based on historical data), and the like. In some instances, the processor predicts when charging service is required and autonomously provides charging service where required. For example, if a request for charging a smartphone in the master bedroom is placed every night at approximately 9:00 PM, the robotic mobile charger may autonomously arrive at the master bedroom at approximately 9:00 PM every night. In some cases, an electronic device may require urgent charging while the robotic mobile charger is providing charging to another electronic device located elsewhere. The robotic mobile device may interrupt the current charging service and fulfill the urgent charging request. In some cases, the processor prioritizes users with higher loyalty index, wherein the loyalty index of a user increases each time they charge an electronic device. In other instances, the processor prioritizes users that have used the robotic mobile charger less. In some instances, the processor priorities particular types of electronic devices. In some cases, the robotic mobile charger completely charges one electronic device (or a set of electronic devices in cases wherein multiple electronic devices are charging simultaneously) before moving on to charge another electronic device (or another set of electronic devices). Further details of a robotic mobile charger are described in U.S. Patent Application No. 62/736,239, the entire contents of which is hereby incorporated by reference.

Figure 8:
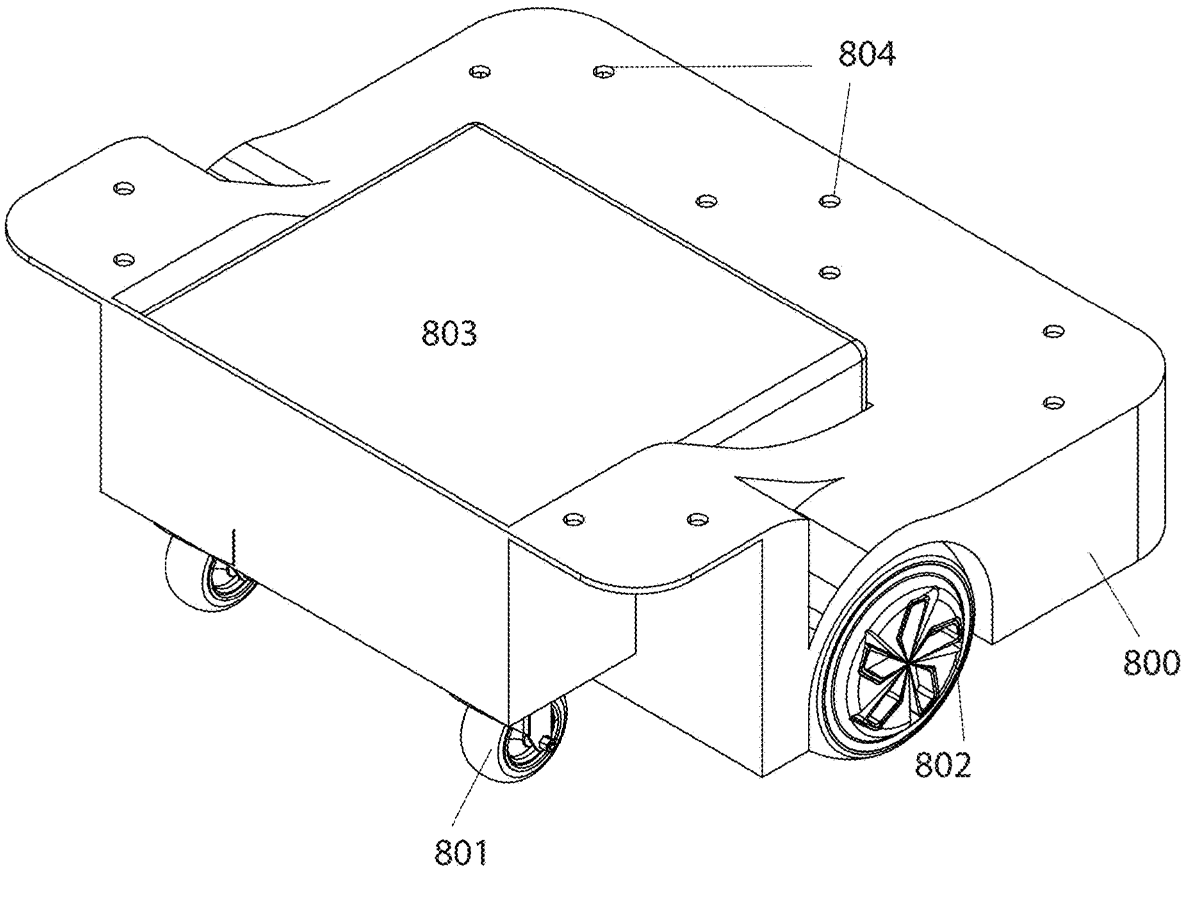
FIG. 8 illustrates an example of a large VMP robot, according to some embodiments.
Figure 9A:
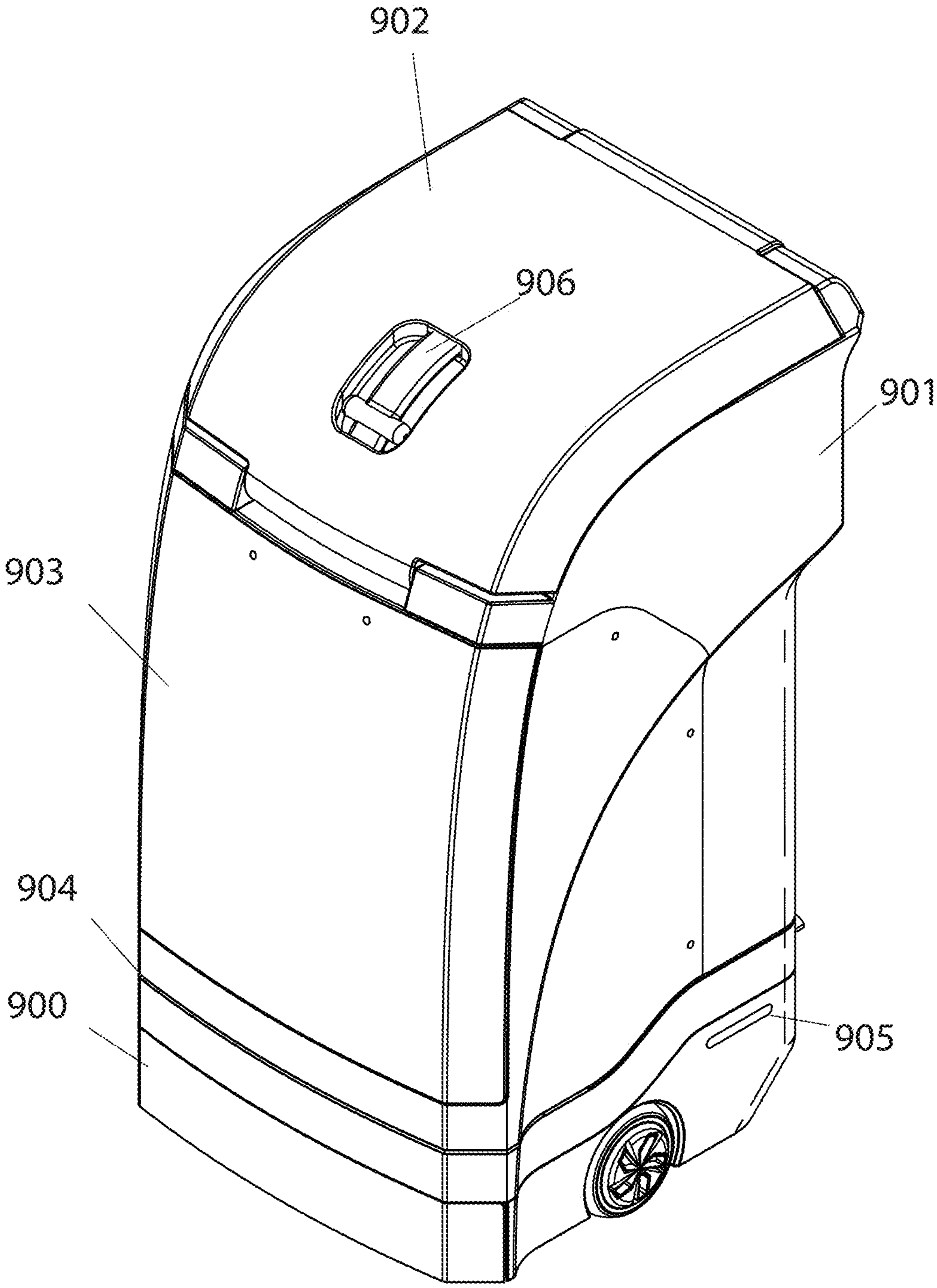
FIGS. 9A-9D illustrate a VMP robot customized to function as a smart bin, according to some embodiments.
Figure 9B:
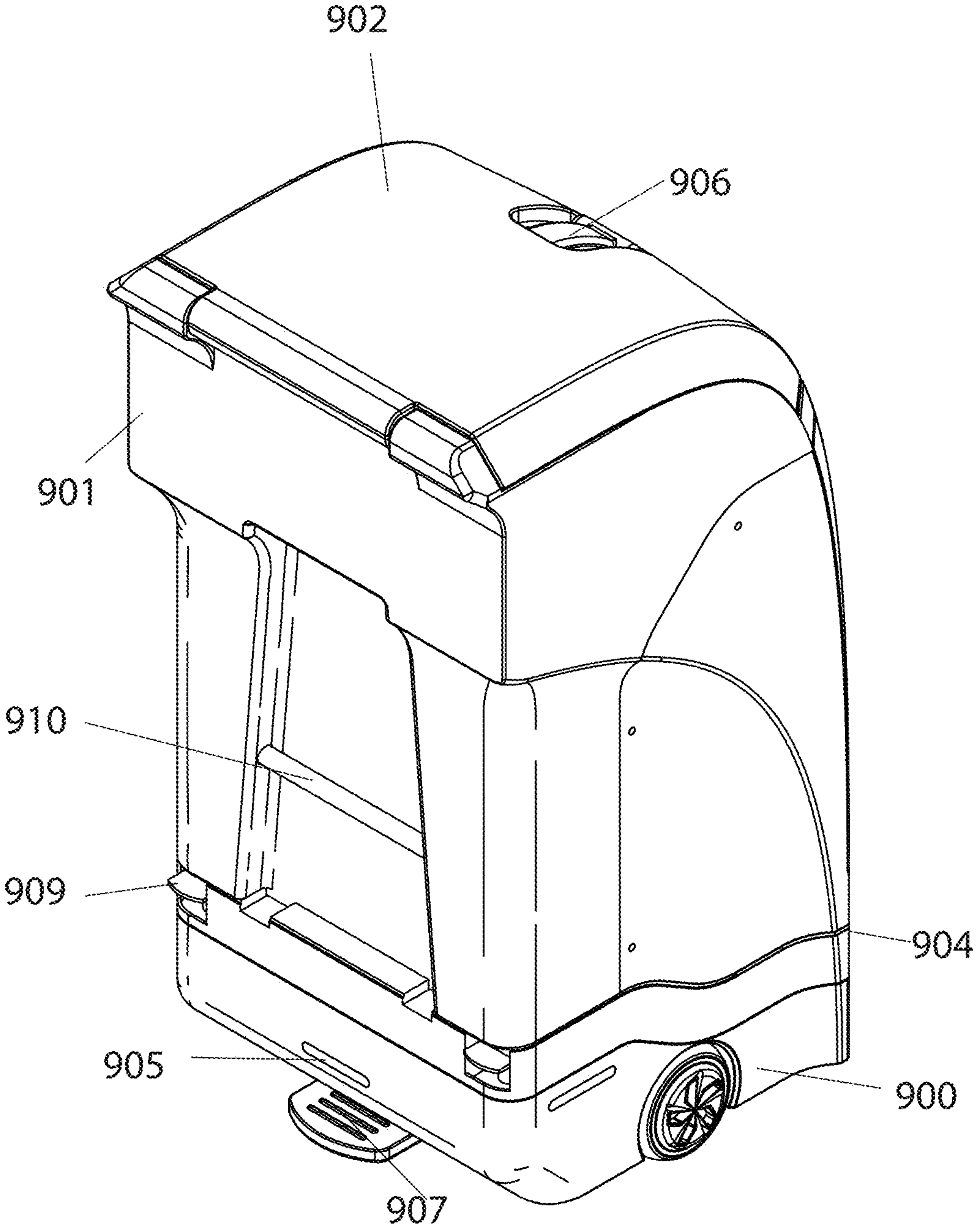
Figure 9C:
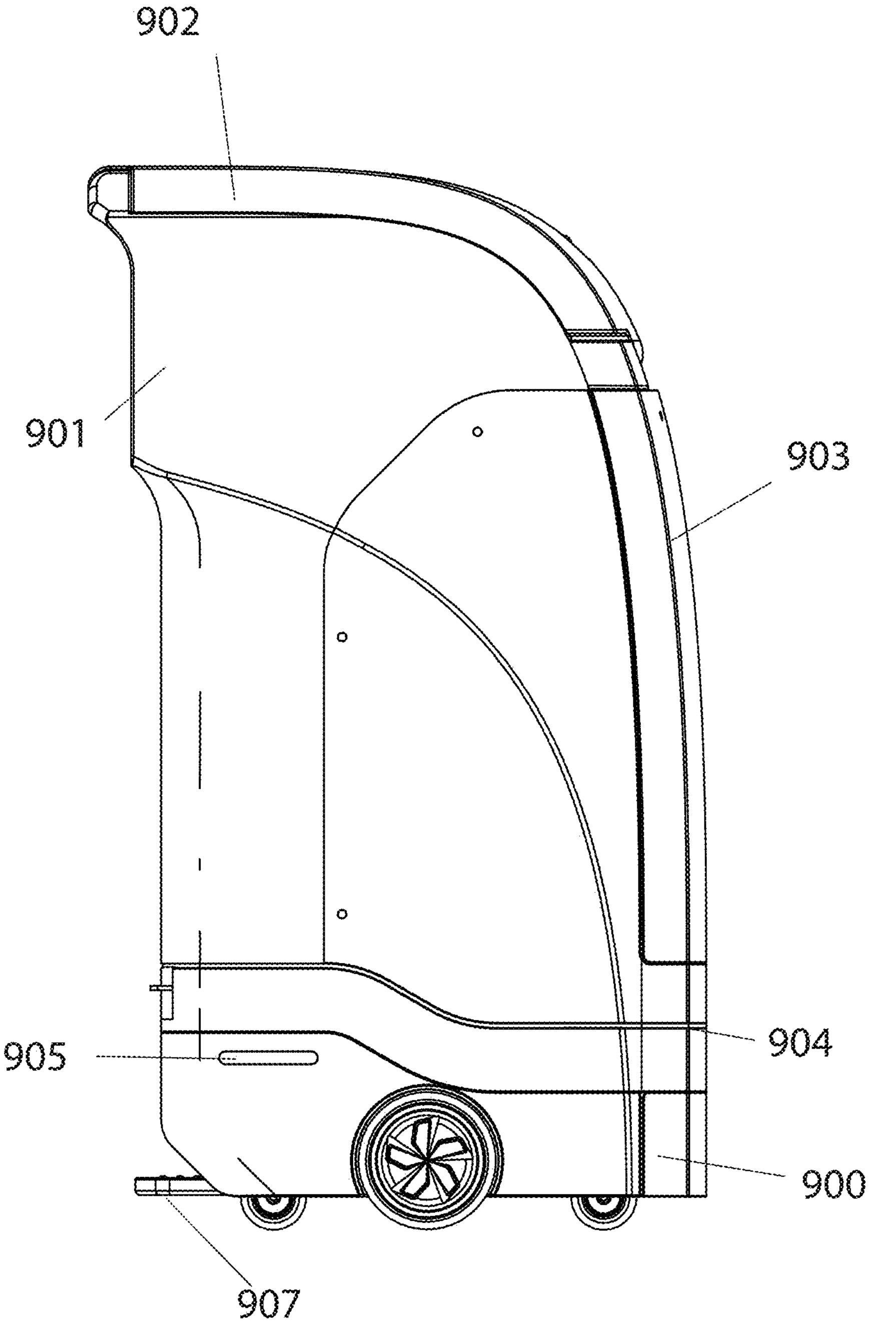
Figure 9D:
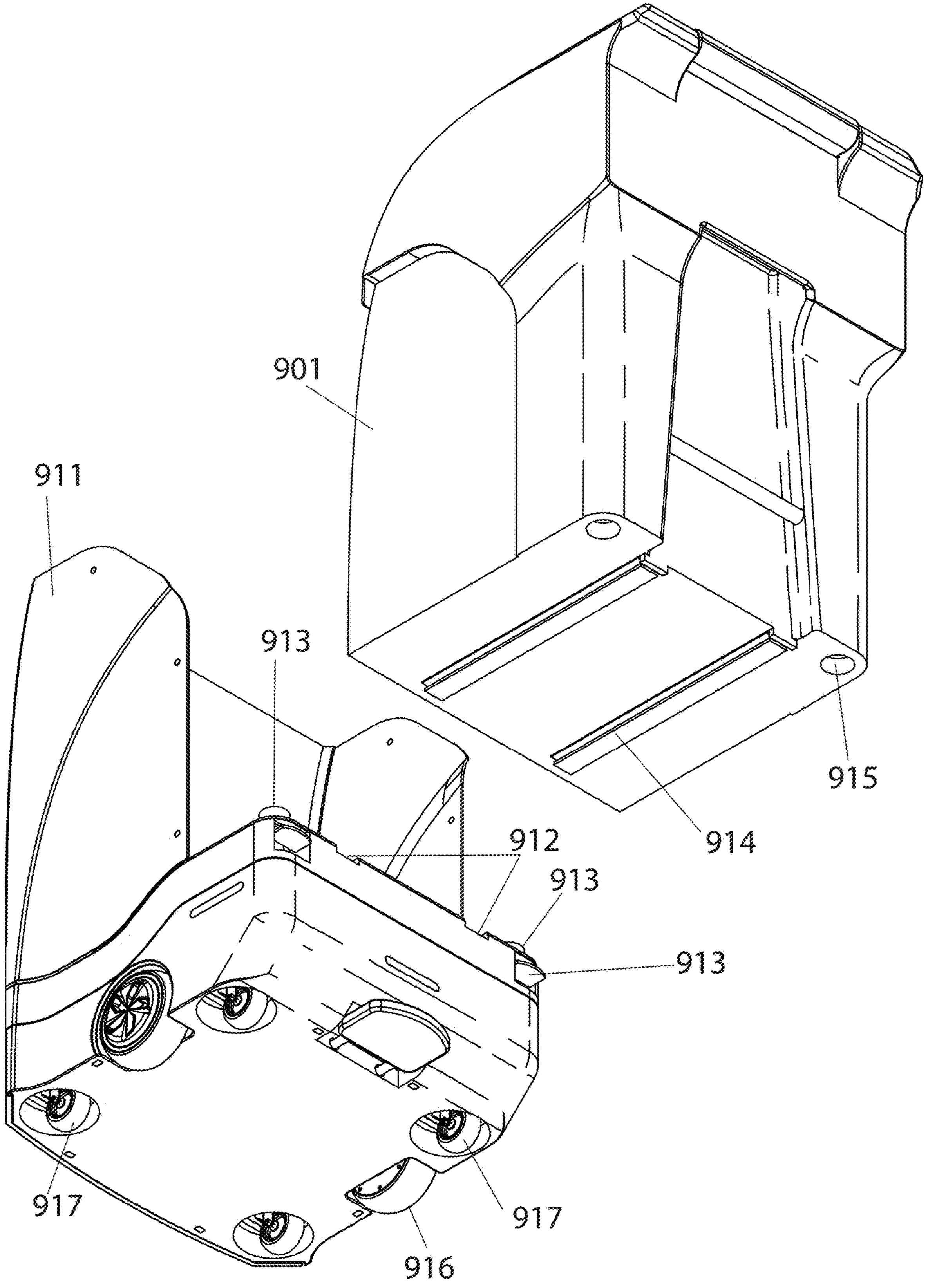
Figure 10A:
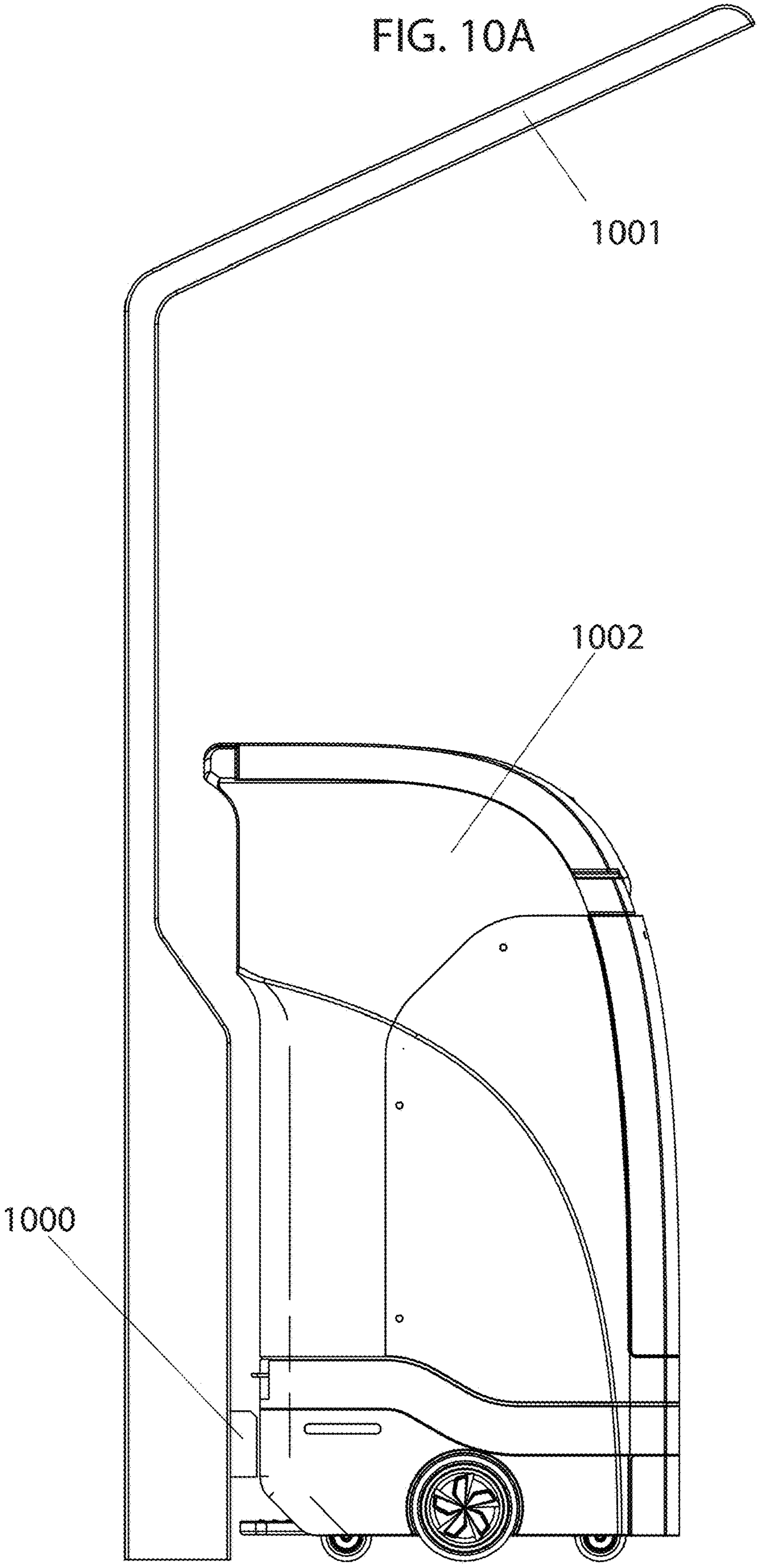
FIGS. 10A and 10B illustrate a charging station of a smart bin, according to some embodiments.
Figure 10B:
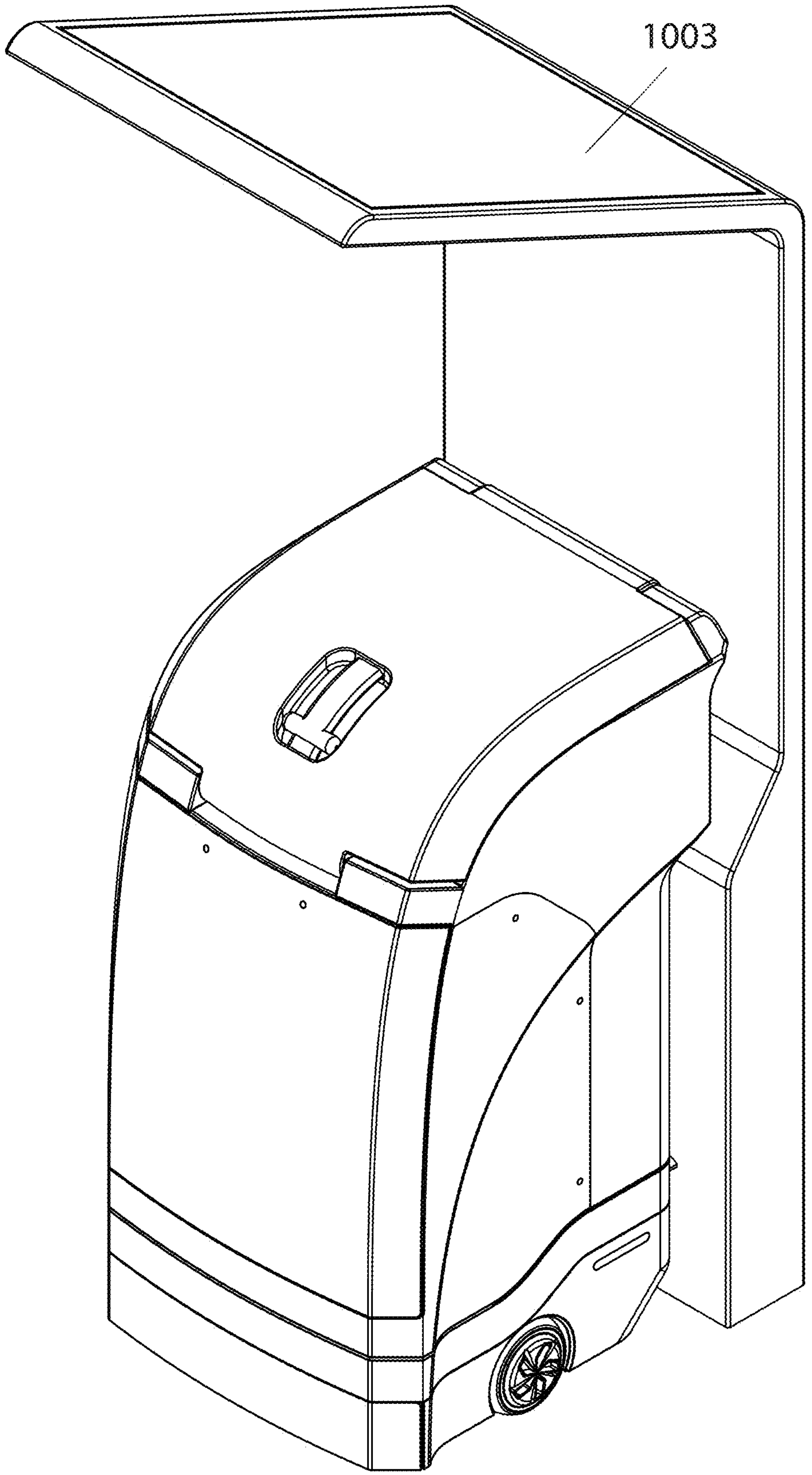

FIG. 8 illustrates a top perspective view of a larger VMP robot 800 including casing 800, caster wheels 801, drive wheels 802, battery 803, and securing holes 803 for securing different structures to the platform depending on the intended function of the robotic device. In some embodiments, the VMP robot is customized to function as a smart bin for refuse or recyclables. In some embodiments, customizing the VMP robot to function as a smart bin includes further equipping the VMP robot with one or more of a bin receptacle, a bin including a lift handle, a lift bar and a lid that attaches to the bin receptacle, a bumper coupled to the bin receptacle, additional sensors, a manual break, and a locking mechanism for locking the bin to the VMP robot. Another example of a smart bin is described in U.S. patent application Ser. No. 16/129,757, the entire contents of which is hereby incorporated by reference. In some embodiments, the smart bin autonomously navigates from a storage location to a refuse collection site for refuse removal from the smart bin. After removal of the refuse, the smart bin autonomously navigates back to the storage location. For example, the smart bin navigates from a storage location behind a home to the end of a drive way at a particular time and date for refuse pick up by the city. After the refuse has been removed from the smart bin, the smart bin navigates back to the storage location behind the house. In some embodiments, the smart bin only navigates to the refuse collection site if the amount of refuse is above a predetermined threshold. In some embodiments, the smart bin determines the amount of refuse within the bin using a light transmitter and corresponding receiver, that are placed opposite one another in the bin at a particular height. When the receiver no longer receives the transmitted light, the processor determines that the refuse has at least reached that height within the bin. In some embodiments, the refuse container navigates to the refuse collections on a recurring basis (e.g., every other Wednesday morning). In some embodiments, the processor receives a refuse collection schedule including a location and time for refuse collection, described further below. In some embodiments, the processor of the smart bin learns a movement path from a storage location to a refuse collection site by physically wheeling the smart bin from the storage location to the refuse collection site one or more times while the processor learns the path. This method of path learning is further described below. FIG. 9A illustrates a VMP robot 900 customized as a smart bin including bin 901 with bin lid 902, bumper 903, LIDAR window 904, sensor window 905, and lid handle 906. FIG. 9B illustrates a rear perspective view of the smart bin with manual brake 907, lift handle 908 for the bin 901, sensor window 905, foot pedals 909 that control pins (not shown) used to hold the bin in place, and lift handle 910. FIG. 9C illustrates a side view of the smart bin. Different types of sensors, as described above, are positioned behind sensor windows. FIG. 9D illustrates bin 901 removed from a bin receptacle 911 of the smart bin. Bin receptacle 911 includes rails 912 and pins 913 operated by foot pedals 910. The bottom of bin 901 includes rails 914 that slide into rails 912 of bin receptacle 911 and pin holes 915 for pins 913, thereby locking bin 901 in place. In some embodiments, pins 913 are operated by a motor or by other automatic mechanical means. In some embodiments, activating a button or switch on the smart bin or audio command causes retraction and extension of pins 913. Drive wheels 916 and castor wheels 917 are also illustrated in FIG. 9D. In some embodiments, the smart bin recharges at an outdoor recharging station. In some embodiments, the charging station provides protection for the smart bin to minimize the effects of environmental conditions (e.g., weather) on the smart bin. FIG. 10A illustrates a side view of an example of a smart bin charging station including charging contacts 1000 and cover 1001 with a smart bin 1002 docked for charging. FIG. 10B illustrates a top perspective view of the smart bin charging station with solar panel 1003. In some embodiments, the smart bin recharges using solar power stored by the solar panels of the smart bin charging station. In some instances, the smart bin includes solar panels and is powered using solar energy.

Figure 11A:
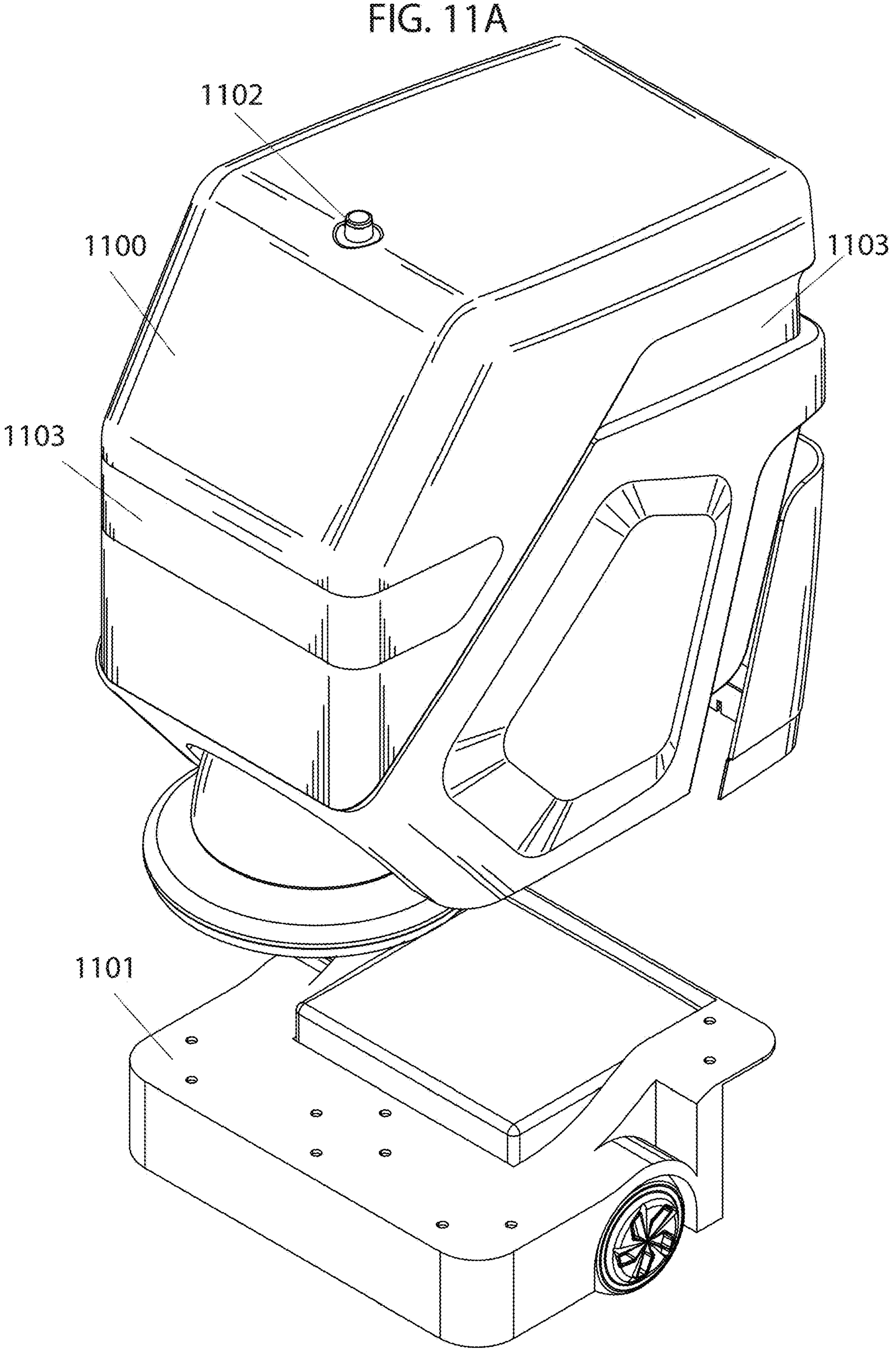
FIGS. 11A and 11B illustrate a VMP robot customized to function as a commercial floor scrubber, according to some embodiments.
Figure 11B:
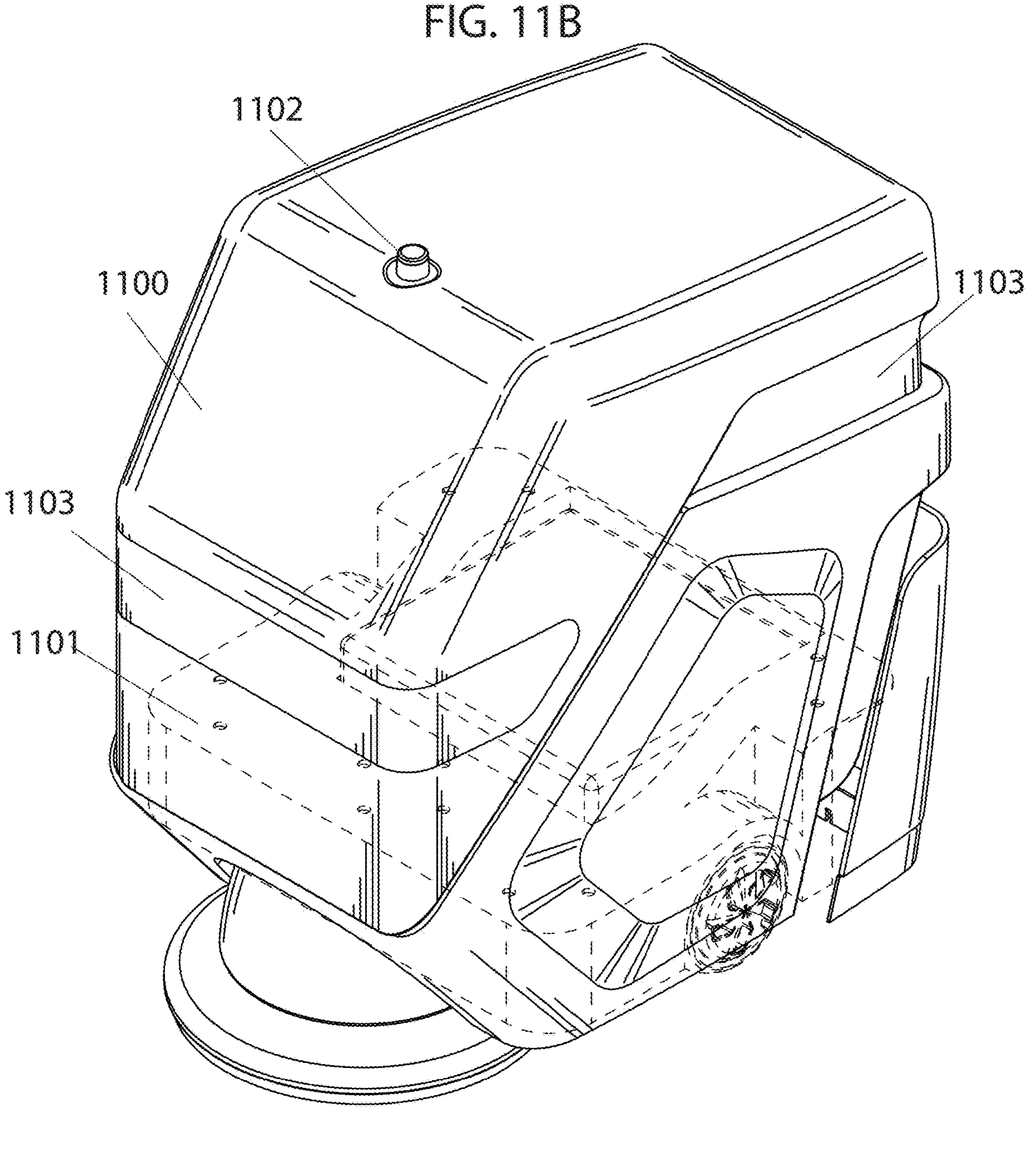

In some embodiments, a larger VMP robot is used for applications requiring a larger base. FIG. 11A illustrates another example wherein a VMP robot is customized to function as a commercial floor scrubber including the commercial floor scrubber 1100 and VMP robot 1101, that fits with floor scrubber 1100 as illustrated in FIG. 11B. Floor scrubber 1100 includes LIDAR 1102 and sensor windows 1103 behind which sensors are housed. The components and wheels of VMP robot 1101 are similar to those described for the VMP robot in FIG. 8, a smaller variation of VMP robot 1101. In some cases, the commercial floor scrubber is used for cleaning areas in which high levels of debris may routinely be encountered. The commercial floor scrubber may operate in large establishments such as malls, airports, parks, restaurants, office buildings, public buildings, public transportation, arenas, sporting venues, concert venues, and the like. The commercial floor scrubber may be beneficial for cleaning locations with high foot traffic as they result in large amounts of debris accumulation due to the large volume of individuals that frequent these locations. In some instances, VMP robot 110 may direct other types of surface cleaning robots or the scrubbing tool may be exchangeable with other cleaning tools or additional cleaning tools may be added to the commercial floor scrubber. In some instances, the processor may activate and deactivate different cleaning tools or may autonomously exchange cleaning tools at a base station that, for example, stores multiple different cleaning tools. Other cleaning tools include a brush, a vacuum, an UV sterilizer, a sweeper, a mop, a steamer, a polisher, a power washer, and the like. In some instances, additional components that are required for the use of certain cleaning tools may be included. For example, a dustbin may be included when the vacuum and brush tools are used. In another example, a fluid reservoir and fluid flow mechanism may be included when the mop tool is used. In other cases, a fluid reservoir and heating element may be included when the steamer is used or a fluid reservoir and pump when the power washer tool is used or a polish dispenser when the polishing tool is used. In some instances, the cleaning tools used may depend on, for example, the type and amount of debris in the environment or a preset schedule. For example, upon observing a liquid on the driving surface, the processor may decide to use a mop to clean the driving surface. In another example, upon observing trash on the driving surface, the processor may decide to use a sweeper to cleaning the driving surface. In some cases, processors of two or more VMP robots with commercial floor scrubbers collaborated to clean the environment using collaborative methods such as those described herein. In some instances, processors divide the area to be cleaned and share areas that have been individually covered with another in an effort to avoid repeat coverage. For example, processors may collaborate and decide or one processor may decide that one commercial floor scrubber clean a first level of a mall and the other commercial floor scrubber clean a second level of a mall. In some instances, processors of VMP robots with different cleaning tools collaborate to clean the environment. For example, processors may collaborate and decide or one processor may decide that a first VMP robot with commercial mop cleans the floor of the environment while a second VMP robot with commercial polisher follow behind on the same path to polish the floors. In some cases, the environment is divided using area division methods described herein. In other instances, a central control system may autonomously manage the two or more VMP robots with commercial floor scrubbers. For example, a control system may instruct a processor of a first VMP robot with commercial floor scrubber to clean a first level of an office that is tiled and a processor of a second VMP robot with commercial vacuum to clean a second level of an office that is carpeted. In yet another instance, an operator operates the central control system. In some cases, processors of VMP robots transmit cleaning coverage information to the control system while cleaning the environment such that the control system may efficiently manage cleaning of the environment and avoid repeat coverage of areas. In some cases, processors of VMP robots transmit other information to the control system, such as battery level, status, location, movement path, etc. In some instances, settings and movement path of the VMP robot may be dependent on debris accumulation, type, and size within the environment, as described in detail below. In some instance, the VMP robot with commercial cleaning tool may observe discolored surfaces, smudges, or the like on a driving surface and may operate to remove them from the driving surface. In some cases, the processor may be provided a cleaning schedule by a user using a communication device paired with the processor or user interface of the VMP robot or by a control system. For example, a schedule may include cleaning an entire retail establishment over the course of a week with the VMP robot with commercial floor scrubber operating for two hours daily after closing. In such an example, the processor of the VMP robot may prioritize cleaning areas with a higher likelihood of debris accumulation, such as an area surrounding a cash register or changing rooms, before cleaning other areas. Furthering the example, the processor may focus on cleaning areas surrounding the cash register and changing rooms every day, while cleaning other areas with lower likelihood of debris accumulation, such as a stock room, twice a week. In some instances, the processor keeps track of areas it has cleaned during each cleaning session. In some cases, the VMP robot with commercial floor scrubber may drive at a slower speed in areas where debris is present or in areas with higher likelihood of debris accumulation to more carefully clean them. In some cases, the processor may adjust tool settings based on debris accumulation. For example, a higher impeller RPM, a higher brush RPM, a higher sweeper RPM, a higher scrubber ROM, a higher mop RPM, or a higher polisher RPM may be used in areas where there is a higher likelihood of debris accumulation. In some instances, the VMP robot with commercial floor scrubber may pass over areas with a debris accumulation level greater than a minimum predetermined threshold level multiple times during a cleaning session. In some instances, the VMP robot with commercial floor scrubber may operate in an area for a predetermined amount of time. In some cases, the VMP robot with commercial floor scrubber may be programmed to operate in area at some frequency over a period of time. For example, the VMP robot with commercial floor scrubber may be programmed to operate in areas with a high level of debris accumulation for a predetermined amount of time. In another example, the VMP robot with commercial floor scrubber may be programmed to clean a room that has a recurring high level of debris accumulation five days a week. In some cases, the processor may use machine learning based on historical data and sensor data to predict which areas need cleaning at each cleaning session. Data used in machine learning may include, but not limited to, level of debris accumulation in different areas, types of debris in different areas, areas cleaned in prior cleaning sessions, cleaning paths, obstacles in different areas, types of obstacles in different areas, types of driving surfaces operated on, scheduling information, preferences used in prior cleaning sessions, collaborations between VMP robots, types of cleaning tools used in different areas, frequency of cleaning different areas, battery efficiency, battery level, total coverage of an area, coverage time of an area, and the like information. Further details of a commercial surface cleaning robot are described in U.S. Patent Application No. 62/739,738, the entire contents of which is hereby incorporated by reference.

Figure 12A:
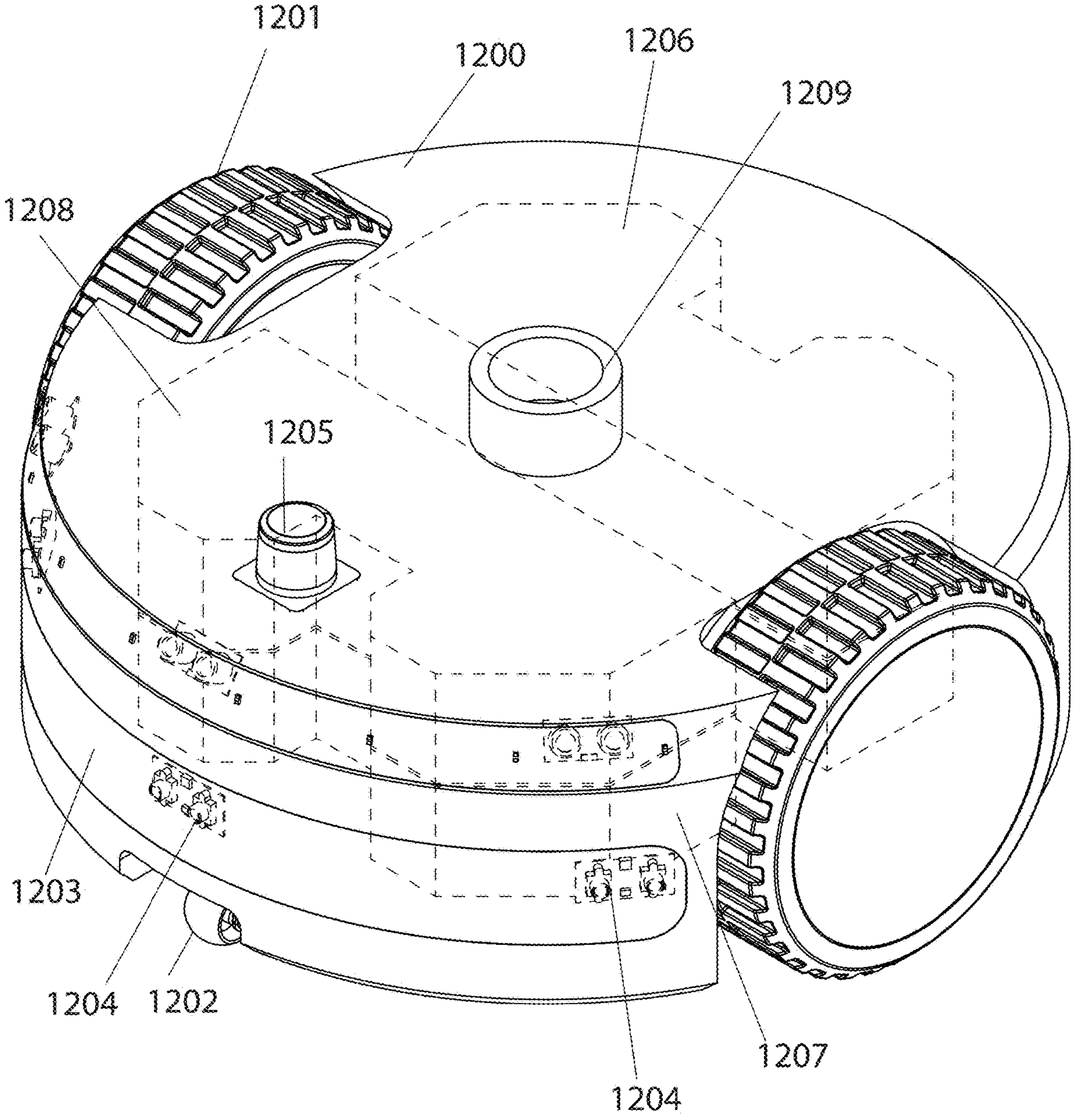
FIGS. 12A and 12B illustrate an example of a VMP robot, according to some embodiments.
Figure 12B:
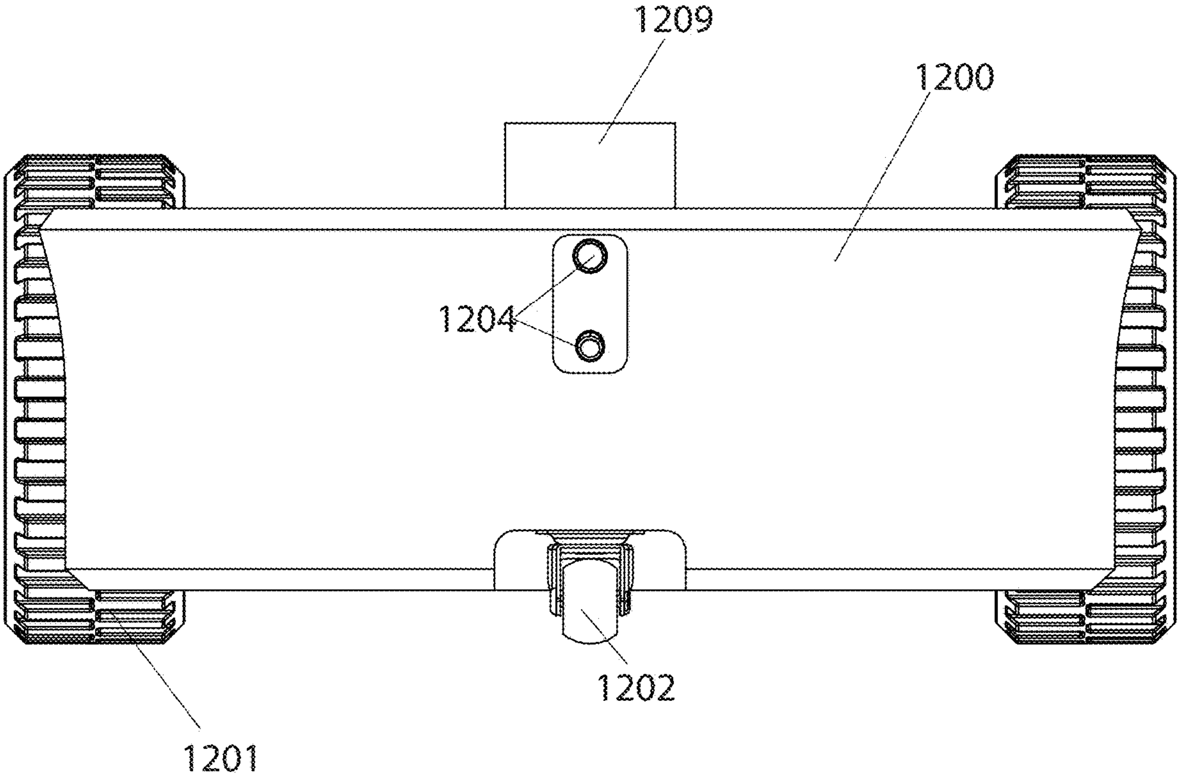
Figure 13A:
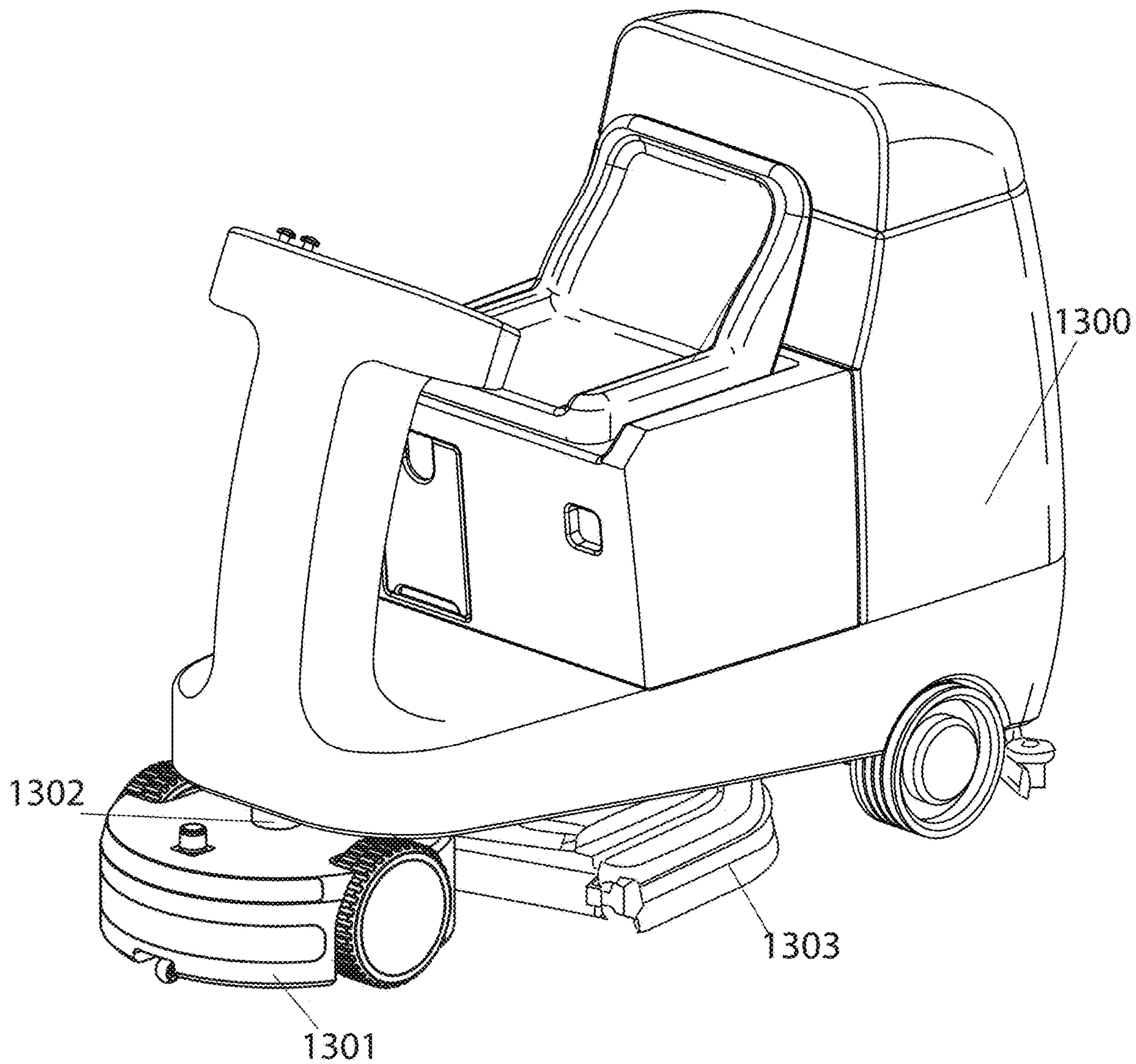
FIGS. 13A and 13B illustrate an example of a VMP robot customized to function as a robotic scrubber, according to some embodiments.
Figure 13B:
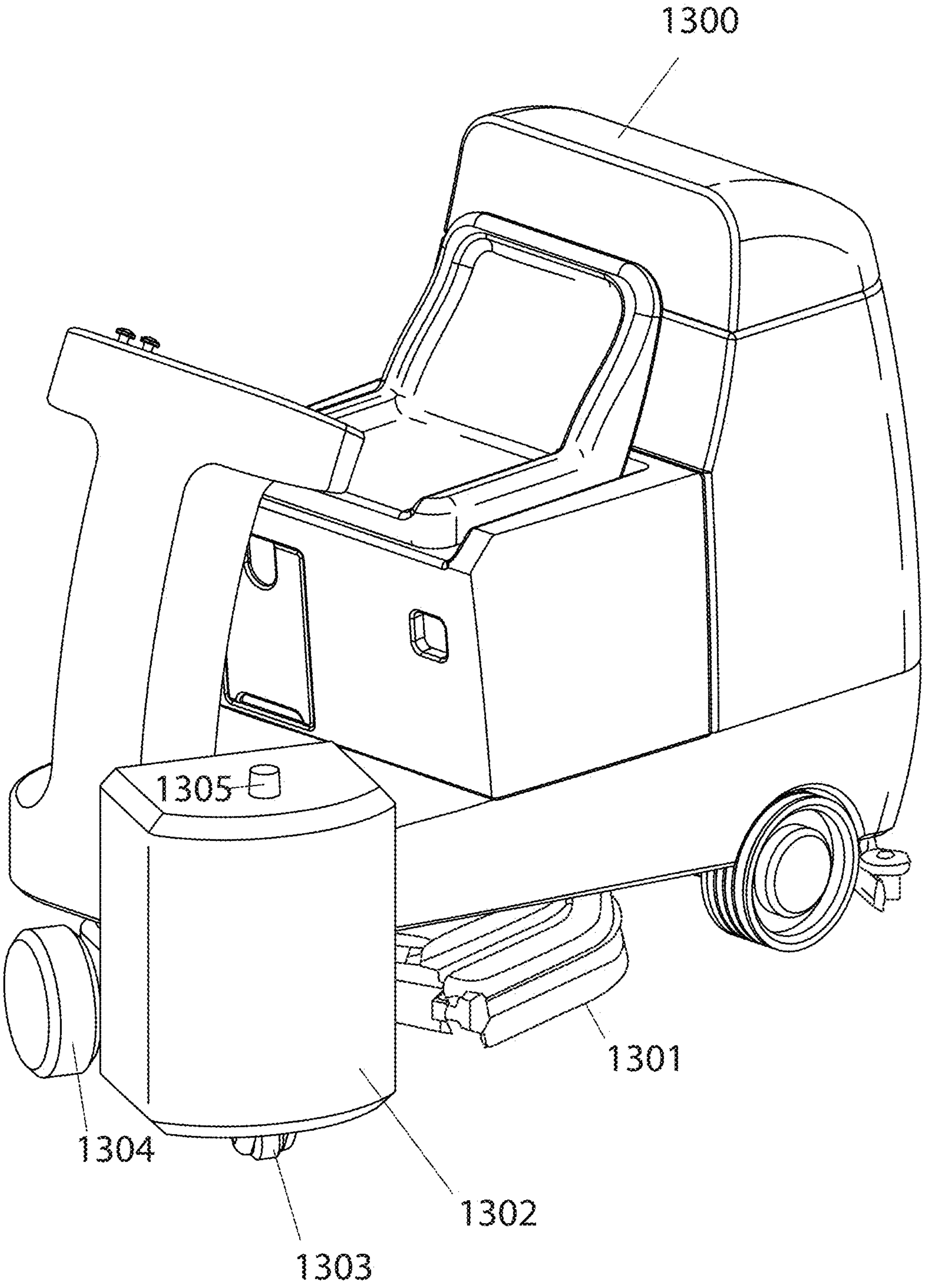
Figure 14A:
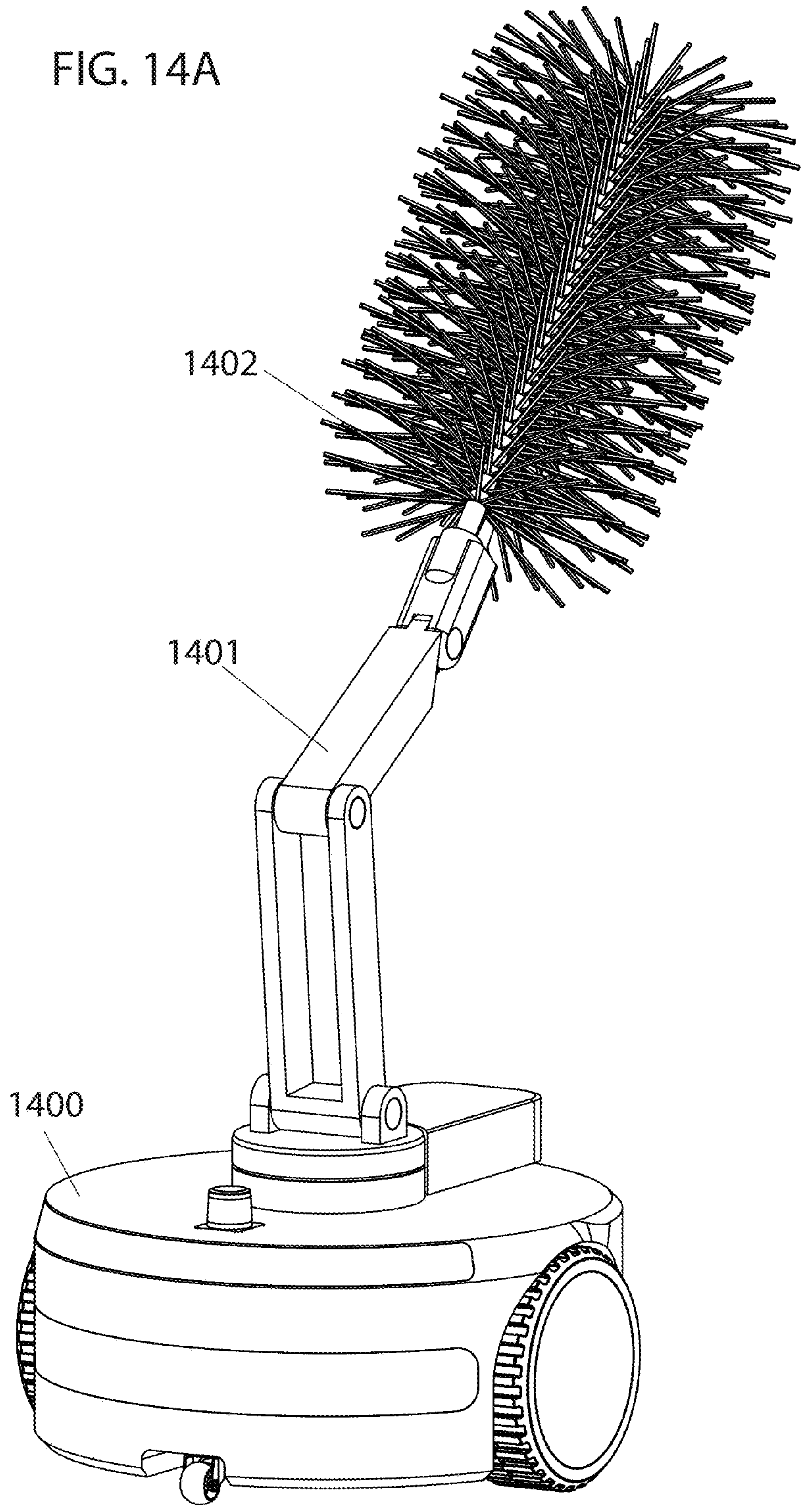
FIGS. 14A and 14B illustrate an example of a VMP robot customized to function as a car washing robot, according to some embodiments.
Figure 14B:
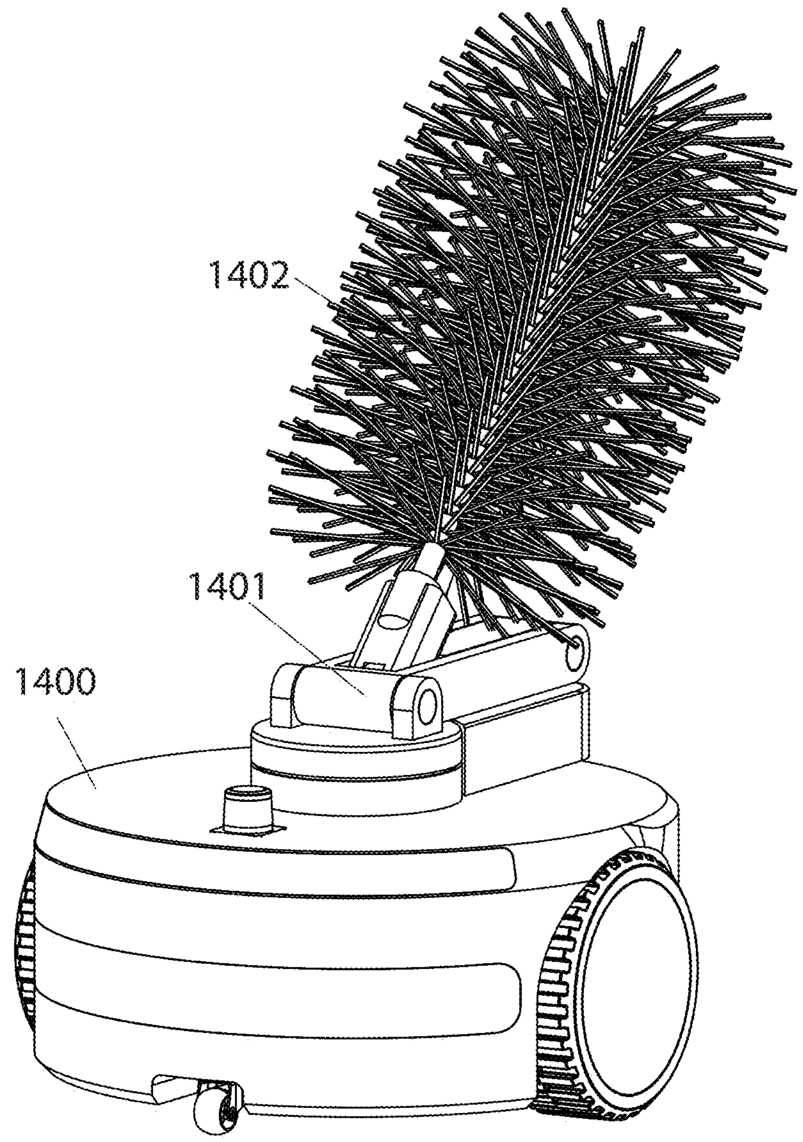

FIG. 12A illustrates another example of a VMP robot including a casing 1200, drive wheels 1201, castor wheels 1202, sensor windows 1203, sensors 1204, omnidirectional LIDAR 1205, battery 1206, memory 1207, processor 1208, and connector 1209, that may implement the methods and techniques described herein. FIG. 12B illustrates the VMP robot without internal components shown from a rear view. The sensors 1204 shown in FIG. 12B in the rear view of the VMP robot may include a line laser and image sensor that may be used by the processor of the VMP robot to align the robot with payloads, charging station, or other machines. In some embodiments, program code stored in the memory 1207 and executed by the processor 1208 may effectuate the operations described herein. In some embodiments, the processor 1208 of the VMP robot uses at least some of the methods and techniques described herein to, for example, generate a map, localize, determine an optimal movement path, determine optimal coverage of an area, collaborate with other VMP robots or robots to improve efficiency of executing one or more tasks, and the like. In some embodiments, connector 1209 may be used to connect different components to the VMP robot, such that it may be customized to provide a particular function. In embodiments, the same internal structure of the VMP robot may be used while the casing may be customized based on the function or desired design of the robot. For example, FIG. 13A illustrates a commercial robotic scrubber 1300 pivotally coupled to VMP robot 1301 using connector 1302. The VMP robot 1301 navigates around an environment while robotic scrubber 1300 follows for surface cleaning using cleaning tool 1303. In some instances, additional sensors are provided on the robotic scrubber 1300 that interface with VMP robot 1301 and allow the processor to observe the environment at higher heights. In some cases, cleaning tool 1303 may be exchanged for various other types of cleaning tools. In some cases, the processor of VMP robot 1301 maps a commercial establishment and localizes itself within the environment using mapping and localization methods described herein. In some instances, the processor determines an optimal cleaning path within the environment by, for example, reducing total cleaning time and total distance travelled. In some cases, the processor divides the commercial establishment into subareas and cleans each subarea one by one, finishing cleaning in one subarea before moving onto another. In some instances, an operator may create subareas, choose operations and cleaning settings for different subareas, set a schedule for the entire environment or specific subareas, choose or modify a movement path, modify the map, etc. using an application of a communication device paired with the processor or a user interface of the VMP robot 1301 or coupled robotic scrubber 1300. In some cases, processors of two or more VMP robots with coupled robotic scrubbers collaborate to clean the commercial establishment more efficiently using collaborative methods described herein. In other instances, VMP robot 1301 may connect with other objects such as a vehicle, another robot, a cart of items, a wagon, a trailer, etc. FIG. 13B illustrates commercial robotic scrubber 1300 with cleaning tool 1301 coupled to another type of VMP robot 1302 turning to direct robotic scrubber 1300 towards the right. VMP robot 1302 includes castor wheel 1303, drive wheels 1304, and LIDAR 1305. Sensor windows behind which sensors are positioned are not shown but may be included. In some instances, a larger VMP robot 1302 may be required if, for example, a smaller VMP robot does not have the capacity (e.g., required power) to direct robotic scrubber 1300. FIGS. 13A and 13B also illustrate that different VMP robots may be used interchangeably as can add on structures, such as robotic scrubber 1300. In another example, FIGS. 14A and 14B illustrate a VMP robot 1400 customized to provide car washing via a robotic arm 1401 with brush 1402 coupled to the VMP robot 1400 using a connector. In some instances, robotic arm 1401 has six degrees of freedom and is installed on top of the VMP robot 1400. In some instances, the end of robotic arm 1401 includes the rotating brush 1402 for cleaning cars. In some cases, there may be a spray nozzle near the brush 1402 to spray cleaning liquid while brush 1402 is spinning. In some embodiments, robotic arm 1401 retracts as in FIG. 14B when not in use. In some cases, the sensors of the VMP robot 1400 detect the vehicle and based on detection of the vehicle the processor moves robotic arm 1401 such that rotating brush 1402 contacts the vehicle. In some cases, rotating brush 1402 includes a tactile sensor that may be used to detect when contact is made with the body of the vehicle. In some cases, the robotic arm 1401 may be configured to clean vehicles of various heights by, for example, adding additional links to provide access to all parts of a larger vehicle. In some instances, a vehicle drives into and parks at a designated car washing area and one or more car washing VMP robots approach for cleaning the vehicle. In some cases, one or more of the VMP robots drive one or more times around the vehicle, while the processor maps the vehicle. In some instances, the processor marks area of vehicle as complete after cleaning it. In some cases, processors of two or more VMP robots collaborate to clean a vehicle by dividing areas of the vehicle to be cleaned and notifying one another of areas covered to avoid repeat coverage. In some cases, there are multiple steps for cleaning the vehicle and there may be different attachments to the robotic arm for two or more of the steps. For example, the robotic arm may alternate between a sponge for soaping the vehicle, a brush for scrubbing the vehicle, a water spray nozzle for washing down the vehicle, a cloth for wiping down the vehicle, and a polishing pad for polishing the vehicle. In some cases, different VMP robots perform each of these steps.

Figure 15A:
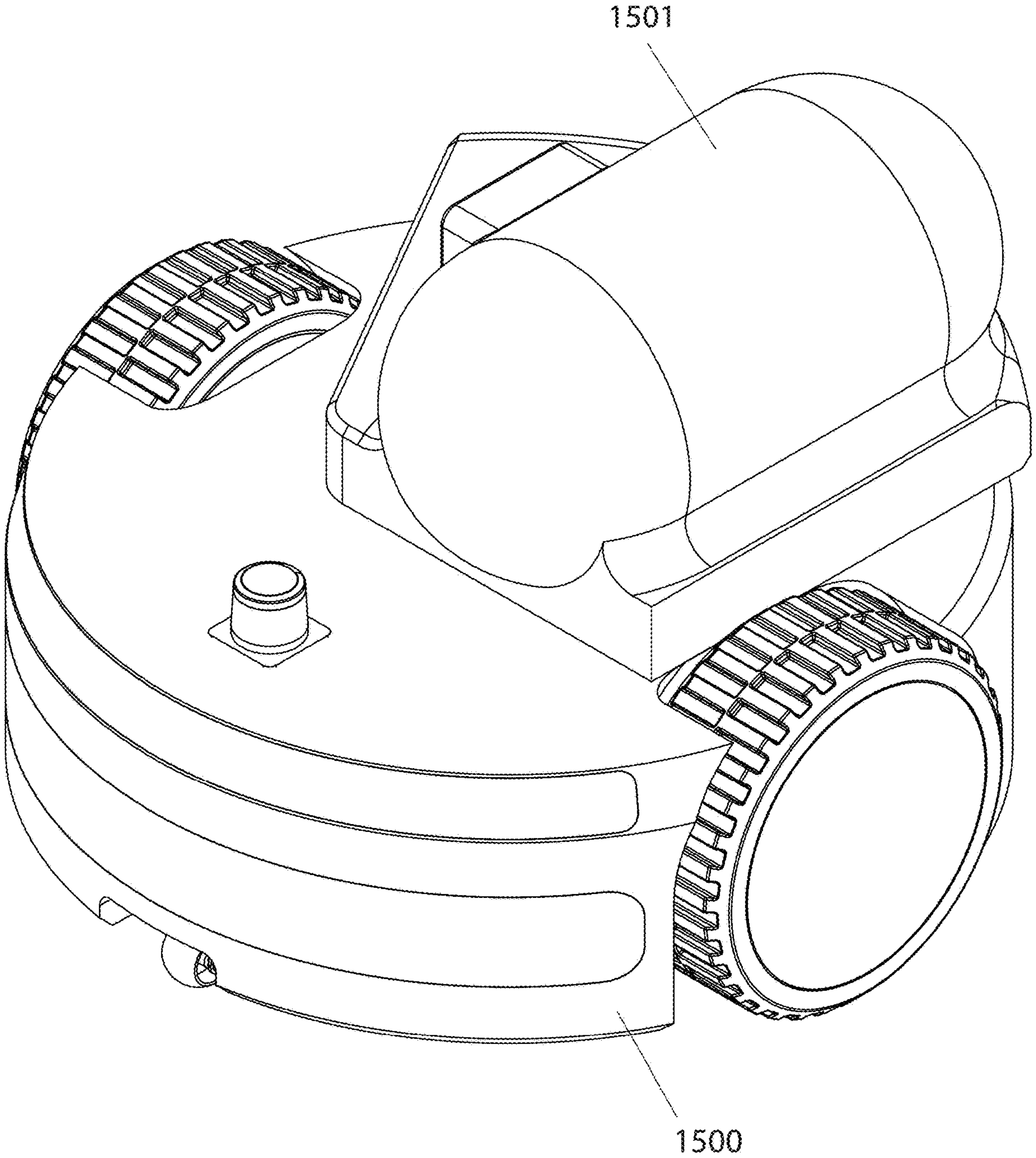
FIGS. 15A and 15B illustrate an example of a VMP robot customized to function as an air compressor robot, according to some embodiments.
Figure 15B:
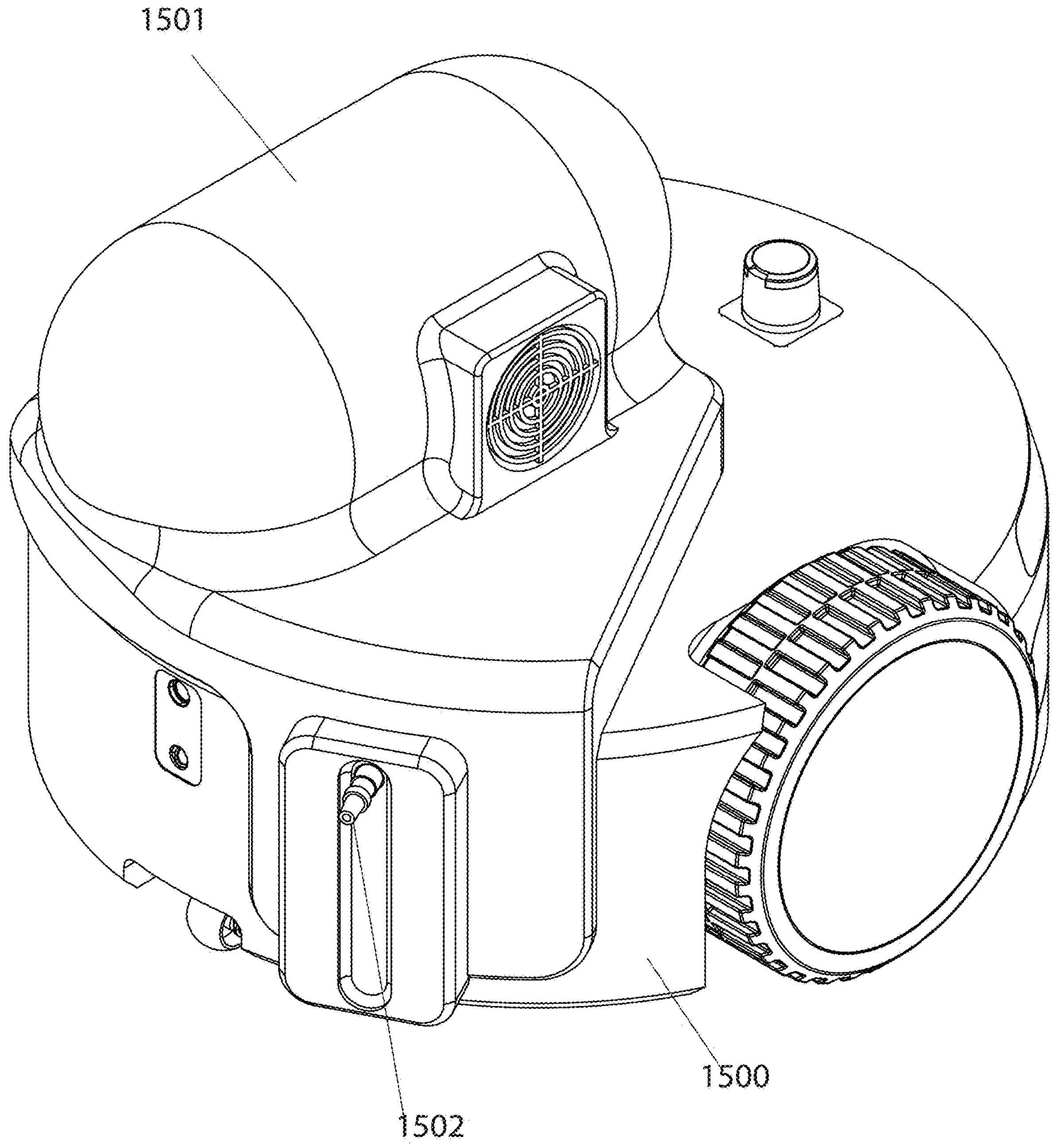
Figure 16:
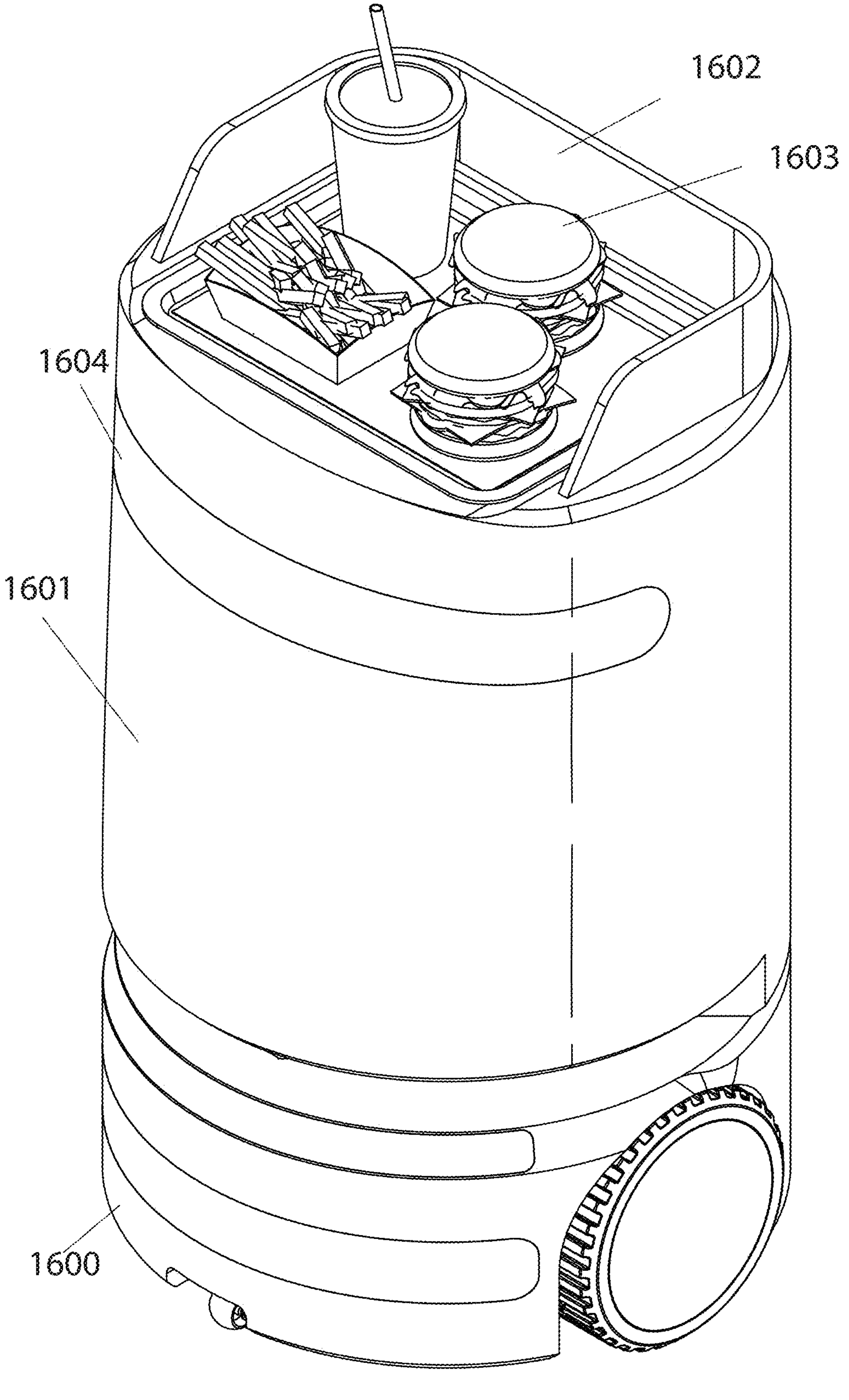
FIGS. 16 and 17 illustrate an example of a VMP robot customized to function as a food delivery robotic device, according to some embodiments.
Figure 17:
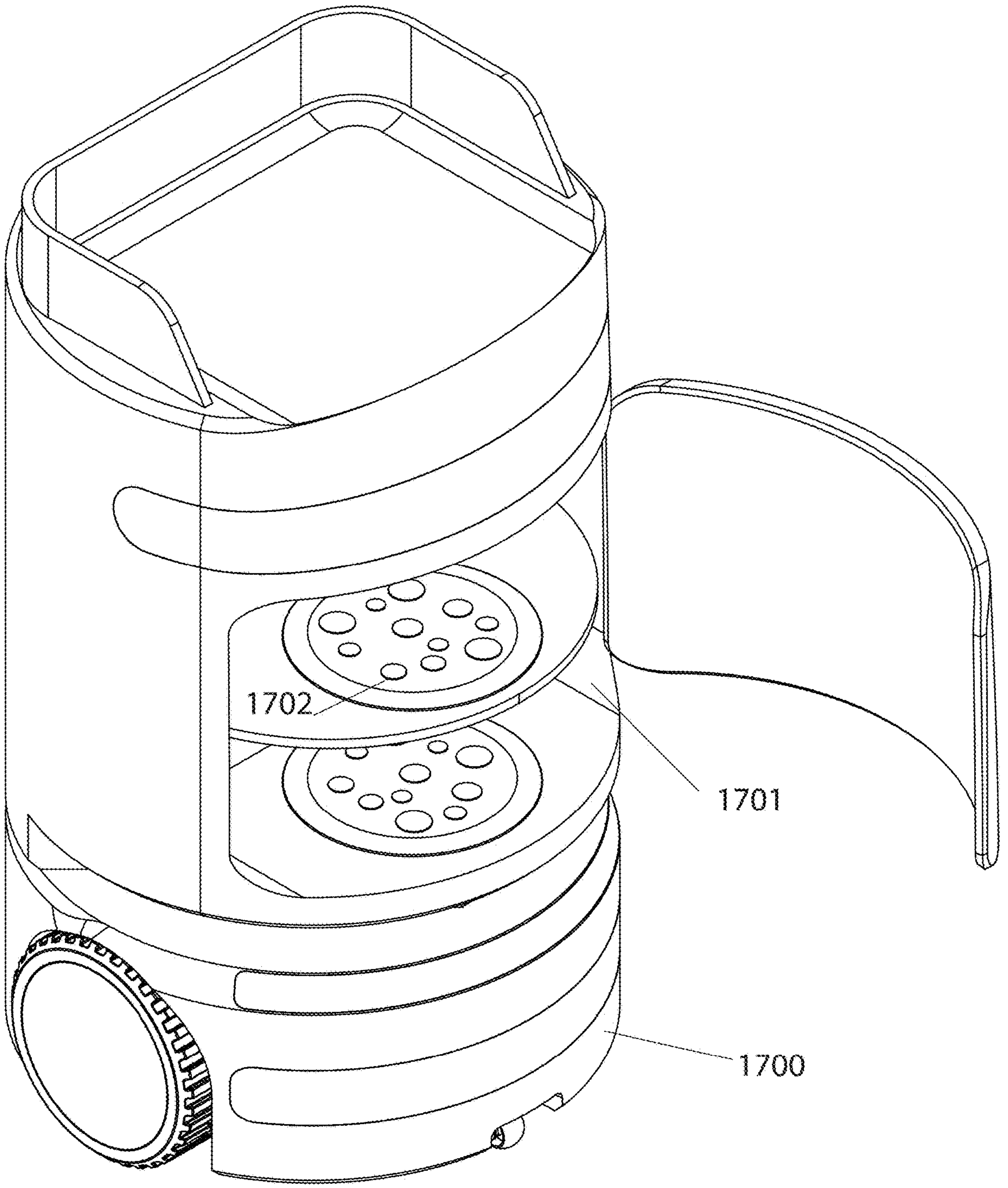
Figure 18A:
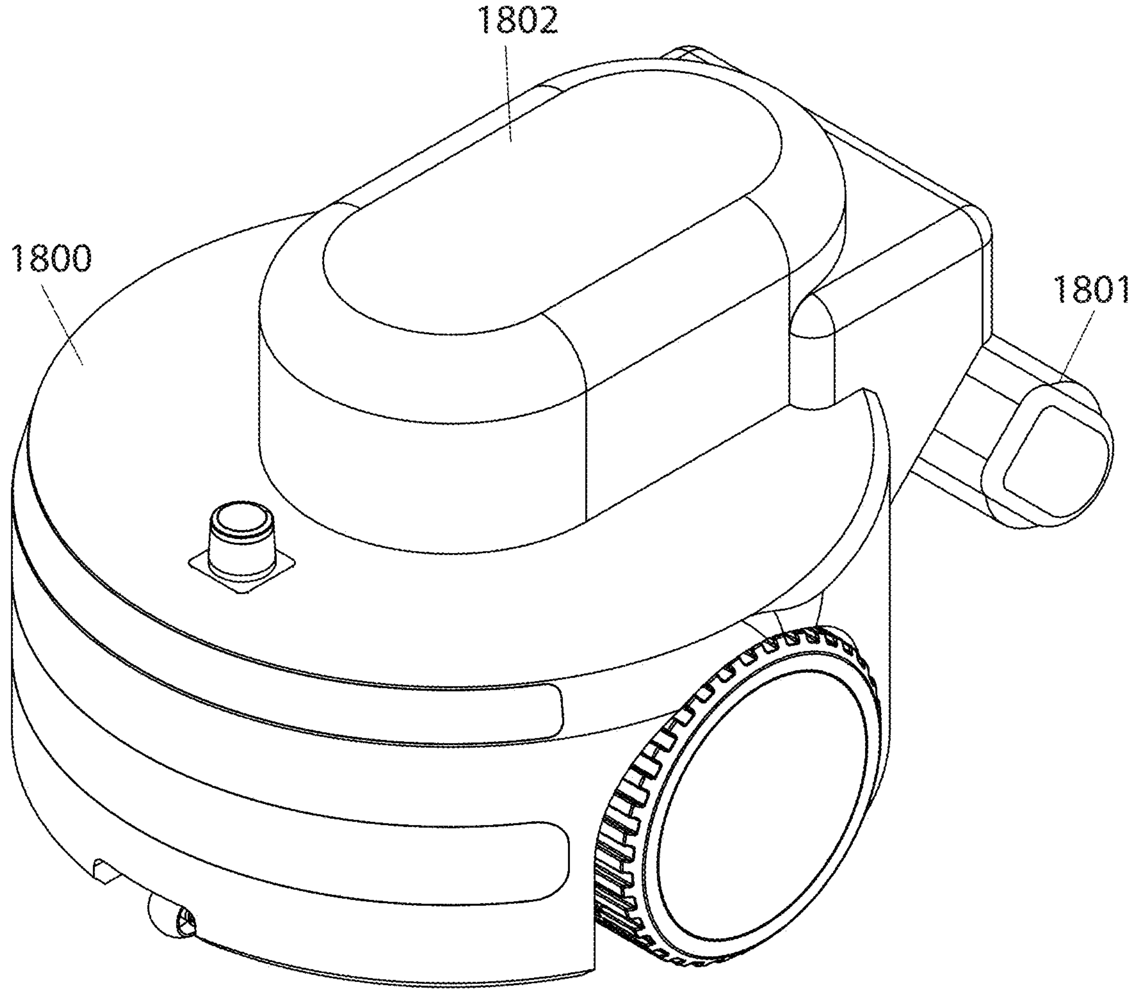
FIGS. 18A-18D illustrate an example of a VMP robot customized to function as a painting robotic device, according to some embodiments.
Figure 18B:
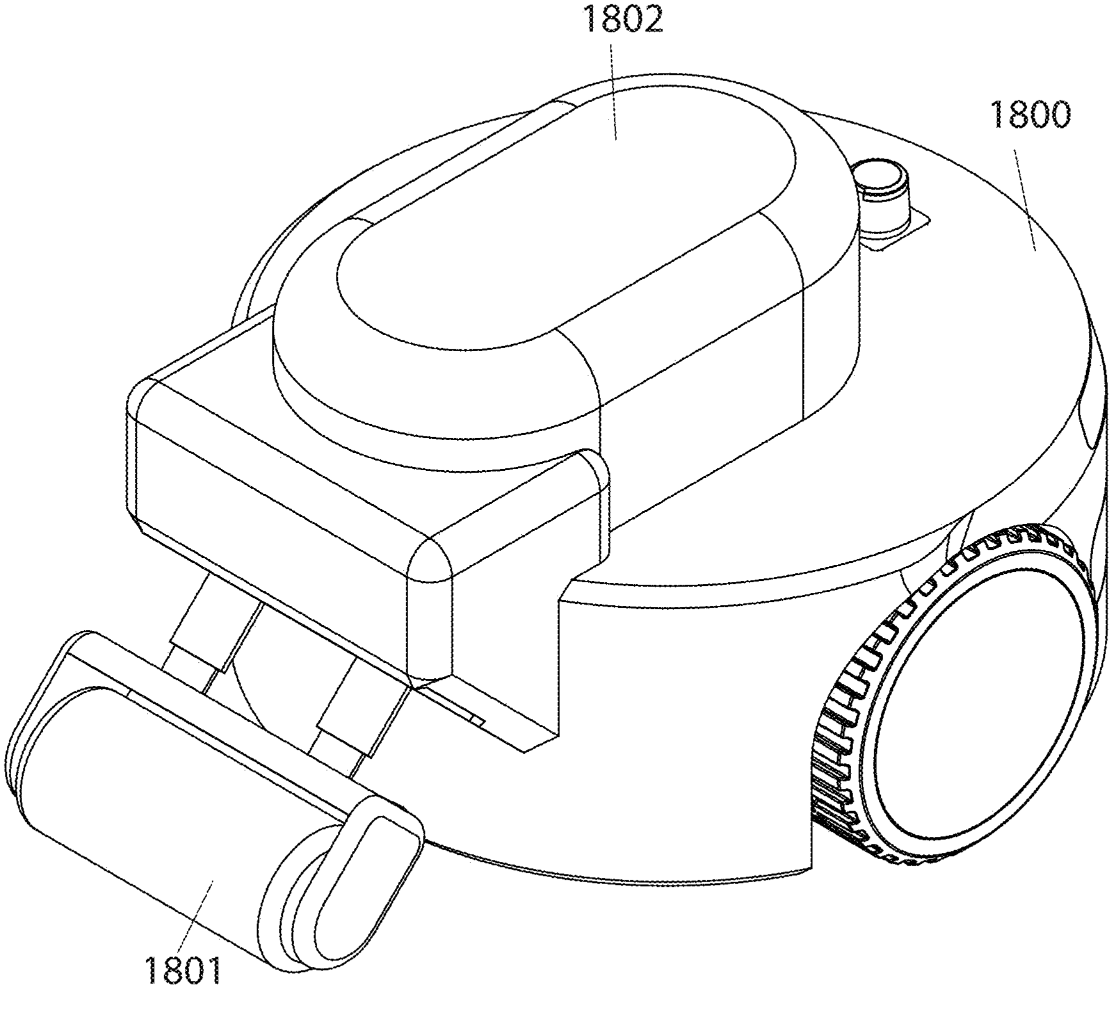
Figure 18C:
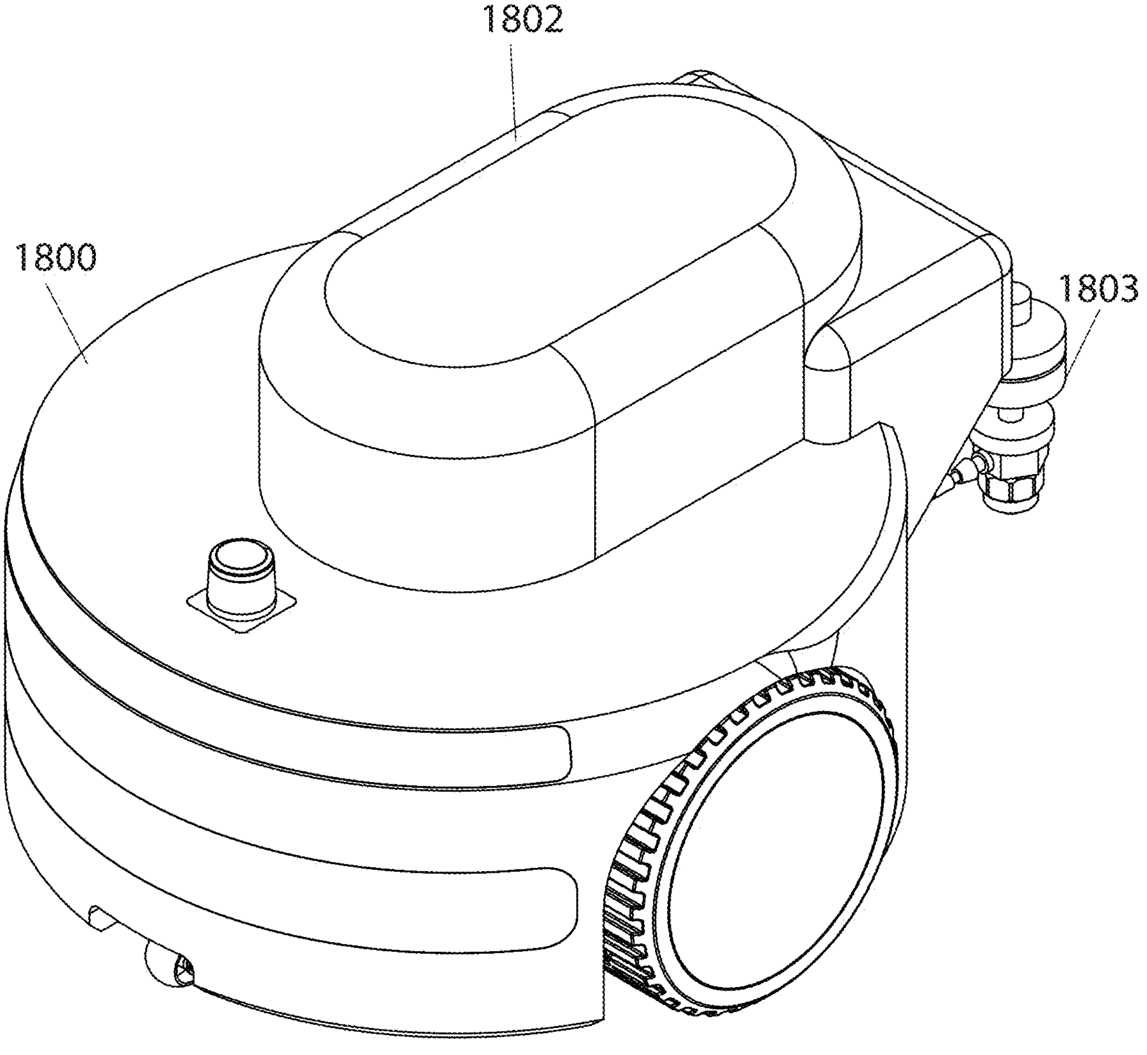
Figure 18D:
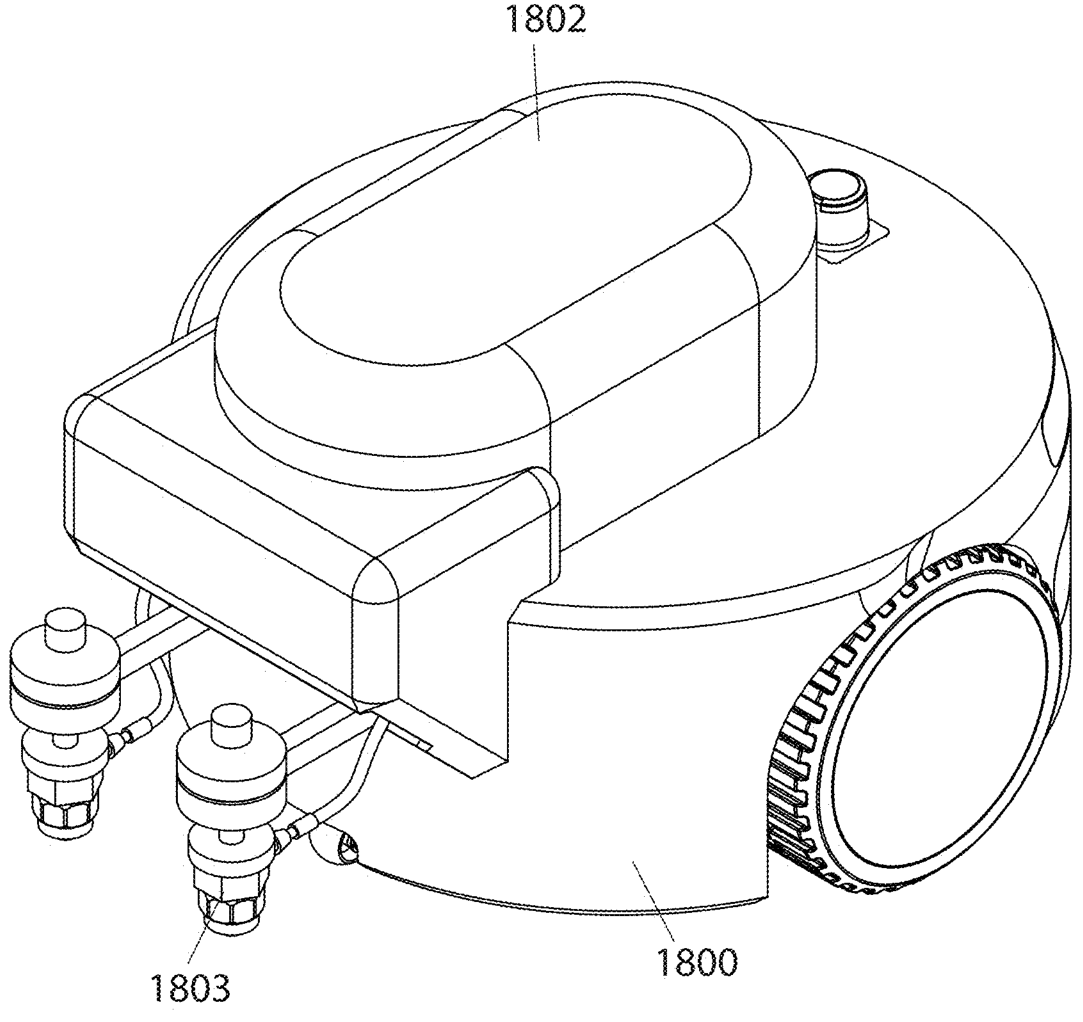

FIGS. 15A and 15B illustrate a front and rear perspective view of another example, with a VMP robot 1500 fitted with an air compressor 1501. FIG. 15B shows nozzle 1502 of air compressor 1501. In some instances, the VMP robot 1500 maps an area around a vehicle and autonomously connects nozzle 1502 to the tires of the vehicle to fill them with air. In some instances, the processor of the VMP robot uses features of tires to detect the tires on the vehicle and the air nozzle of the tire. For example, a camera of the VMP robot may capture images of the vehicle as the VMP robot navigates around the vehicle. The processor may use computer vision technology to detect features of tires (e.g., tread shape, color, location relative to the rest of the vehicle, etc.). In some cases, air compressor 1501 includes an air pressure sensor such that tires may autonomously be filled to a particular pressure. In some instances, a user chooses the desired air pressure using, for example, a user interface on the VMP robot or an application of a communication device paired with the processor of the air compressor VMP robot. In some cases, the processor of the VMP robot may detect the make and model of the vehicle and fill the tires to an air pressure suggested by the manufacturer for the particular make and model. In some cases, such information on suggested air tire pressure for different make and models are stored in a database in a memory of the VMP robot. In another example, FIG. 16 illustrates VMP robot 1600 customized to provide food delivery. Due to the increased height after customization of the VMP robot, main compartment 1601 may also include additional sensors 1604 that operate in conjunction with VMP robot 1600 such that the processor may observe the environment at higher heights. In some instances, a user may request food be delivered from a particular restaurant using an application of a communication device. The application of the communication device transmits the request to a control system that manages multiple food delivery robots. Based on various factors, such as current location of food delivery robots, pick up location, drop off location, battery or fuel level of food delivery robots, etc. the control system transmits the request to a processor of a particular food delivery robot. In some cases, processors of multiple food delivery robots collaborate to determine which robot executes which task. In other instances, the food delivery robot may operate a server in a restaurant. A tray 1602 for food items 1603 may therefore be included for delivery to tables of customers in cases where the food delivery robot functions as a server. In some cases, main compartment 1601 may be one or more of: a fridge, a freezer, an oven, a warming oven, a cooler, or other food preparation or maintenance equipment. For example, the food delivery robot may cook a pizza in an oven on route to a delivery destination such that is freshly cooked for the customer, a freezer may keep ice cream cold on route to a delivery destination, or a warming oven may keep cooked food warm on route to a delivery destination. For example, FIG. 17 illustrates a VMP robot 1700 customized to function as a pizza cooking and delivery robot including oven 1701 for cooking pizza 1702 on route to a delivery location such that a customer may receive a freshly cooked pizza 1702. In some cases, the food delivery robot includes more than one food preparation or maintenance equipment. Further details of a food delivery robot are described in U.S. Patent Application No. 62/729,015, the entire contents of which is hereby incorporated by reference. FIGS. 18A and 18B illustrate yet another example, wherein VMP robot 1800 is customized to function as a painting robot including a paint roller 1801 and paint tank 1802. FIGS. 18C and 18D illustrate an alternative painting robot wherein nozzles 1803 are used instead of paint roller 1801. In some cases, the robot paints streets or roofs in a city white to reduce heat in urban areas. In some cases, different paint applicators and configurations may be used. For example, a long arm with a roller may be coupled to the VMP robot for painting a ceiling. In some instances, an operator uses a communication device paired with the VMP robot to control navigation and painting. In some cases, the processor of the VMP robot maps an area and localizes itself using mapping and localization methods similar to those described herein. In some cases, a user may access the map using an application of a communication device paired with the processor, and choose areas within the map (e.g., walls, ceilings, etc.) for painting and in some cases, the color of paint for the areas selected. In some instances, processors of multiple painting robots may collaborate to more efficiently paint one or more areas using collaborative methods similar to those described herein. For example, the processors may divide an area for painting and share with one another areas that have been painted to avoid painting the same area twice. In some cases, a user may provide a particular pattern to be painted using the application of the communication device. For example, a painting robot may paint a butterfly on a wall or may paint 0.5 m long lines spaced 0.5 m apart on a road.

Figure 19:
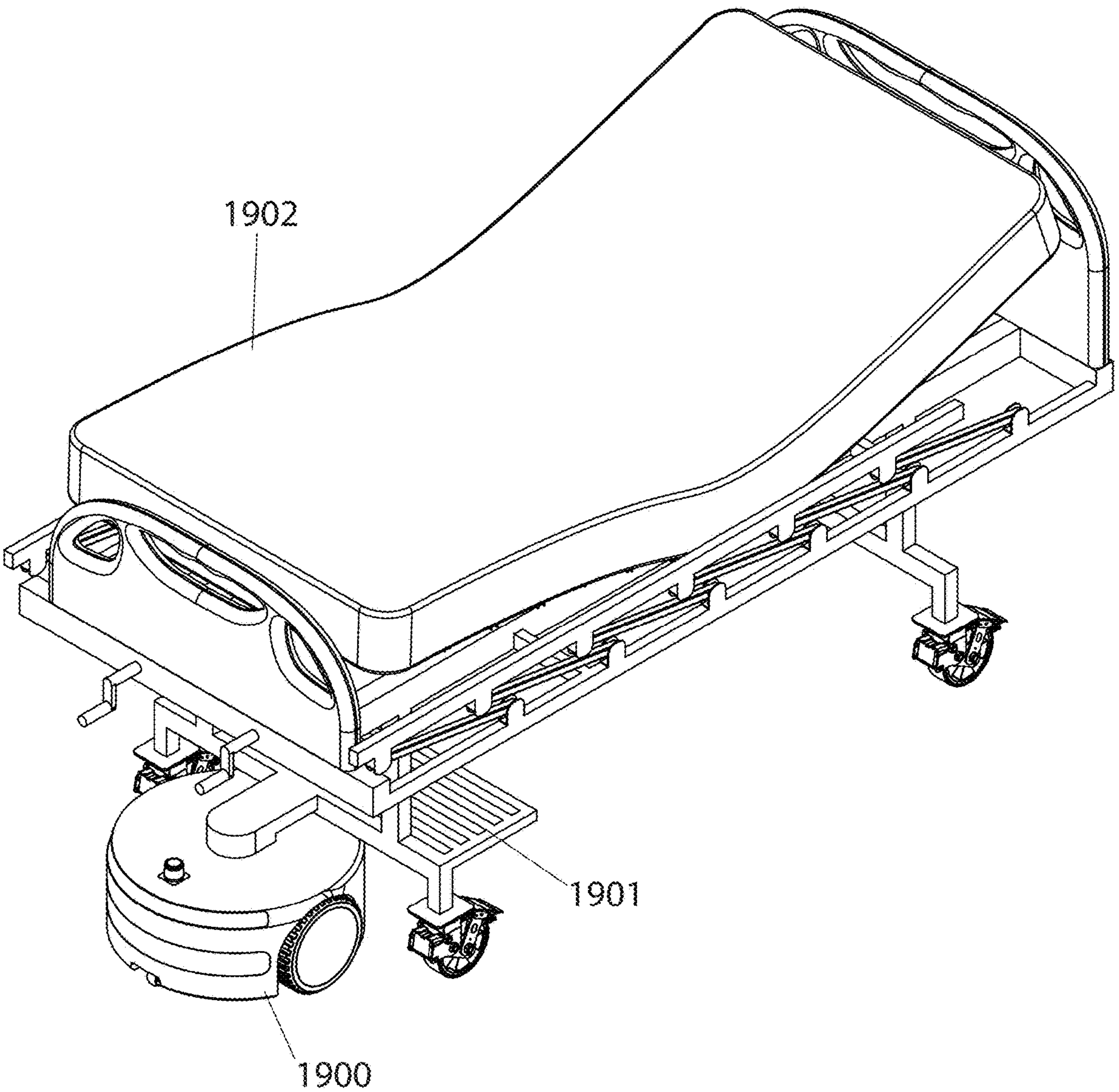
FIG. 19 illustrates an example of a VMP robot customized to function as a robotic hospital bed, according to some embodiments.
Figure 20B:
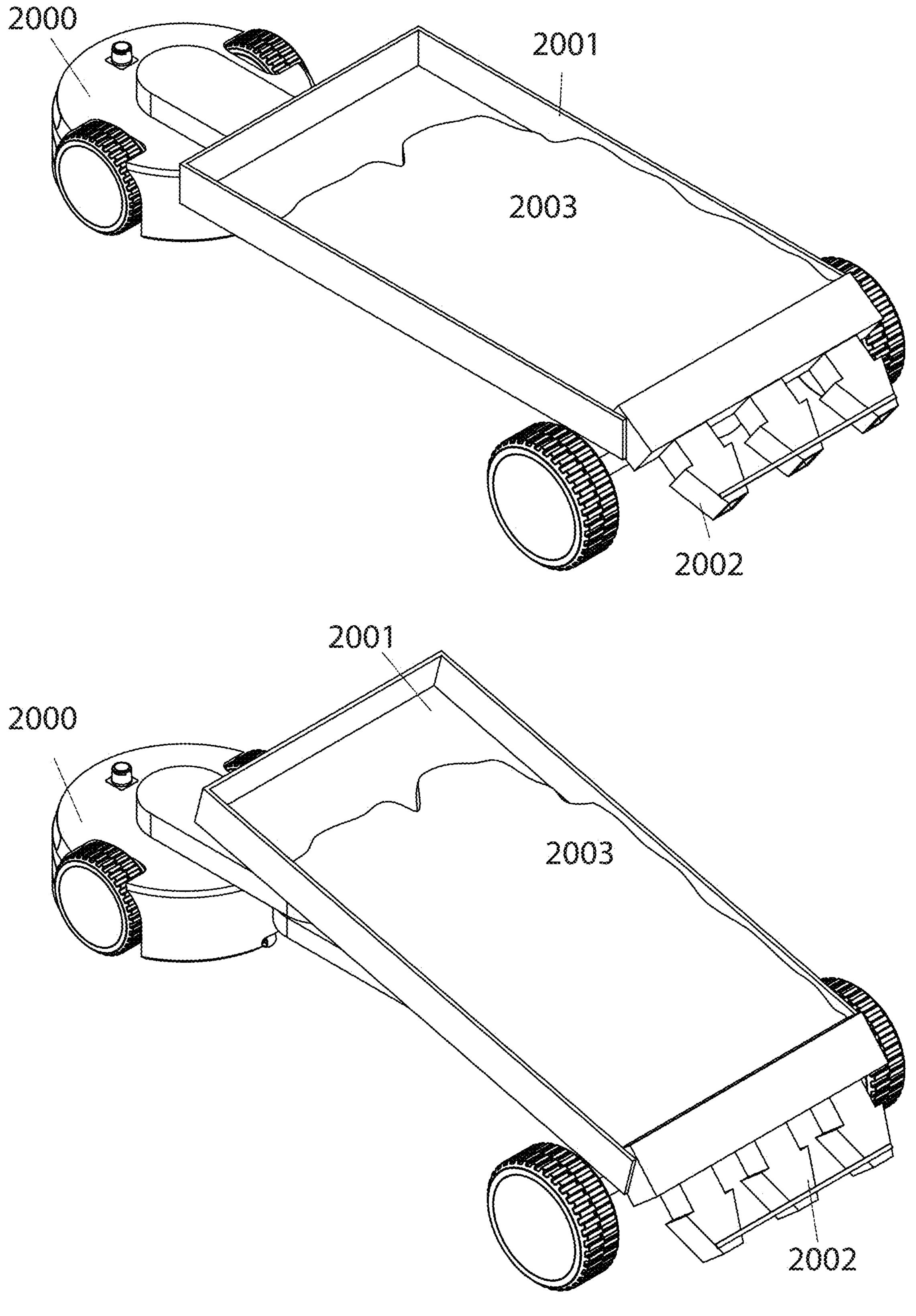
Figure 21:
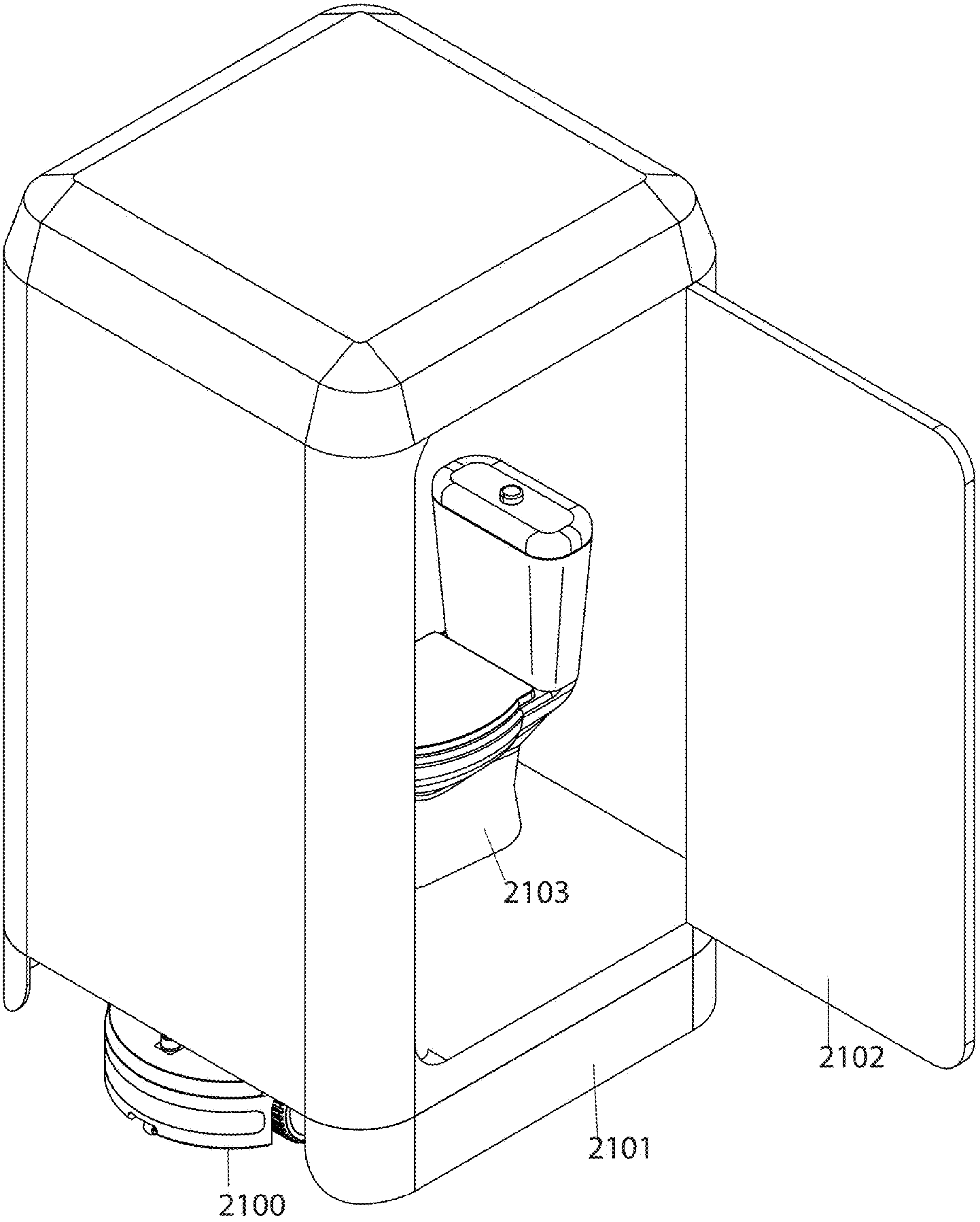
FIG. 21 illustrates an example of a VMP robot customized to function as a robotic mobile washroom, according to some embodiments.

FIG. 19 illustrates the VMP robot customized to function as a robotic hospital bed including VMP robot 1900 and coupled hospital bed frame 1901 with mattress 1902. The mattress 1902 is angled for maximum comfort of a patient. In some cases, the patient or the processor of the VMP robot autonomously adjusts the angle of mattress 1902. In some cases, the hospital bed frame may include sensors that interface with the VMP robot 1900 to provide observation at higher height. In some cases, the processor of the VMP robot 1900 is alerted when a hospital bed is needed in a particular location. The VMP robot 1900 may navigate to an unused hospital bed, coupled to the hospital bed frame 1901 and drive the hospital bed to the particular location. In some instances, the VMP robot 1900 may already be coupled to an unused hospital bed. In other instances, the processor of the VMP robot 1900 is provided instructions to transport a patient in a hospital bed from a first location to a second location. In some cases, the processor of the VMP robot receives instructions or information from an application of a communication device paired with the processor. In some cases, an operator inputs instructions or information into the application and the application transmits the information to the processor. In some instances, the processor of the VMP robot 1900 has inventory of unused hospital beds and their locations. The processor may have further inventory of used hospital beds and their locations. The VMP robot 1900 reduces the need for hospital staff to transport hospital beds and therefore provides hospital staff with more time to attend to patients. Multiple VMP robots for transporting hospital beds may be used simultaneously. In some cases, the processors of the multiple VMP robots collaborate to determine which tasks each VMP robot is to perform. In some cases, a control system manages all VMP robots in a hospital. In some embodiments, the processors of one or more VMP robots operating in a hospital to transport hospital beds may implement the methods and techniques described herein to, for example, determine optimal movement paths within the hospital, determine optimal collaboration, generate a map, localize, etc. FIGS. 20A and 20B illustrate a VMP robot customized to function as a fertilizer dispensing robot including VMP robot 2000 and coupled fertilizer bed 2001 with dispensers 2002 that direct fertilizer 2003 as it exits the fertilizer bed 2001. In some cases, fertilizer bed 2001 may be lifted with a hydraulic arm (not shown) to increase the rate of fertilizer dispersion. In some cases, an operator may choose the how high to lift the bed or may choose a rate of fertilizer dispersion and the processor of the VMP robot 2000 may autonomously adjust how high fertilizer bed 2001 is lifted. In some embodiments dispensers 2002 include sensors that may measures the rate of fertilizer dispersion and based on the measurement the processor may increase or decrease how high fertilizer bed 2001 is lifted to achieve the desired rate of fertilizer dispersion. In some embodiments, the VMP robot 2000 with coupled fertilizer dispersion mechanism drives in a boustrophedon pattern across a field, each alternating row slightly overlapping such that fertilizer is spread in all areas of the field. In some cases, an operator may control the movement of the VMP robot with coupled fertilizer dispersion mechanism using a communication device paired with the processor of the VMP robot. In some cases, an operator selects a region of a field on which fertilizer is to be dispersed on an application of a communication device paired with the processor of VMP robot 2000 and the VMP robot 2000 covers the selected region. In some embodiments, the operator also selects the total amount of fertilizer to disperse in the region (e.g., in kg or other units) and the processor determines the rate of fertilizer dispersion based on the total amount of fertilizer and the size of the region. In some cases, fertilizer bed 2001 includes weight sensors or other sensors that detect when fertilizer is depleted. In some cases, the VMP robot 2000 navigates back to a location where additional fertilizer may be collected. In some cases, the processor notifies the operator of low levels of fertilizer via the application or a user interface of the VMP robot. Multiple VMP robots with coupled fertilizer dispensing mechanisms may collaborate using collaboration techniques described herein to reduce the amount of time required to fertilize one or more fields. FIG. 21 illustrates the VMP robot 2100 customized to function as a mobile washroom including washroom 2101 with door 2102 and toilet 2103. In some cases, VMP robot 2100 facilitates moving washroom 2101 from a first location to a second location. For example, at a large construction site the region in which workers operate may change and VMP robot 2100 moves washroom 2101 from a first region in which workers operate to a second region in which workers operate such that the washroom is within a reasonable distance from the workers. In some cases, the mobile washroom reduces the number of washrooms required at a job site as the washroom is easily moved. In some instances, VMP robot 2100 drives to a particular location for emptying the contents of the washroom. In some cases, washroom 2101 includes sensors that may be used to detect when washroom 2101 needs emptying. In some instances, VMP robot 2100 transports washroom 2101 to a first location, decouples from washroom 2101, and navigates to a second washroom, couples to the second washroom and transports it to a second location. In some instances, an operator may use an application of a communication device to choose the desired location of one or more washrooms in an environment. In some cases, a single VMP robot 2100 transports one or more washrooms to the desired one or more location. In other cases, multiple VMP robots collaborate to transport multiple washrooms to desired locations. In some instances, a control system manages mobile washrooms and may be alerted when a mobile washroom needs emptying or moving to a new location. The control system transmits an instruction to a VMP robot to transport a particular mobile washroom for emptying or to a particular location. In some cases, VMP robots are parked in a parking lot until an instruction is received, at which point the VMP robot executes the instruction, and then returns back to the parking lot and autonomously parks.

Figure 22:
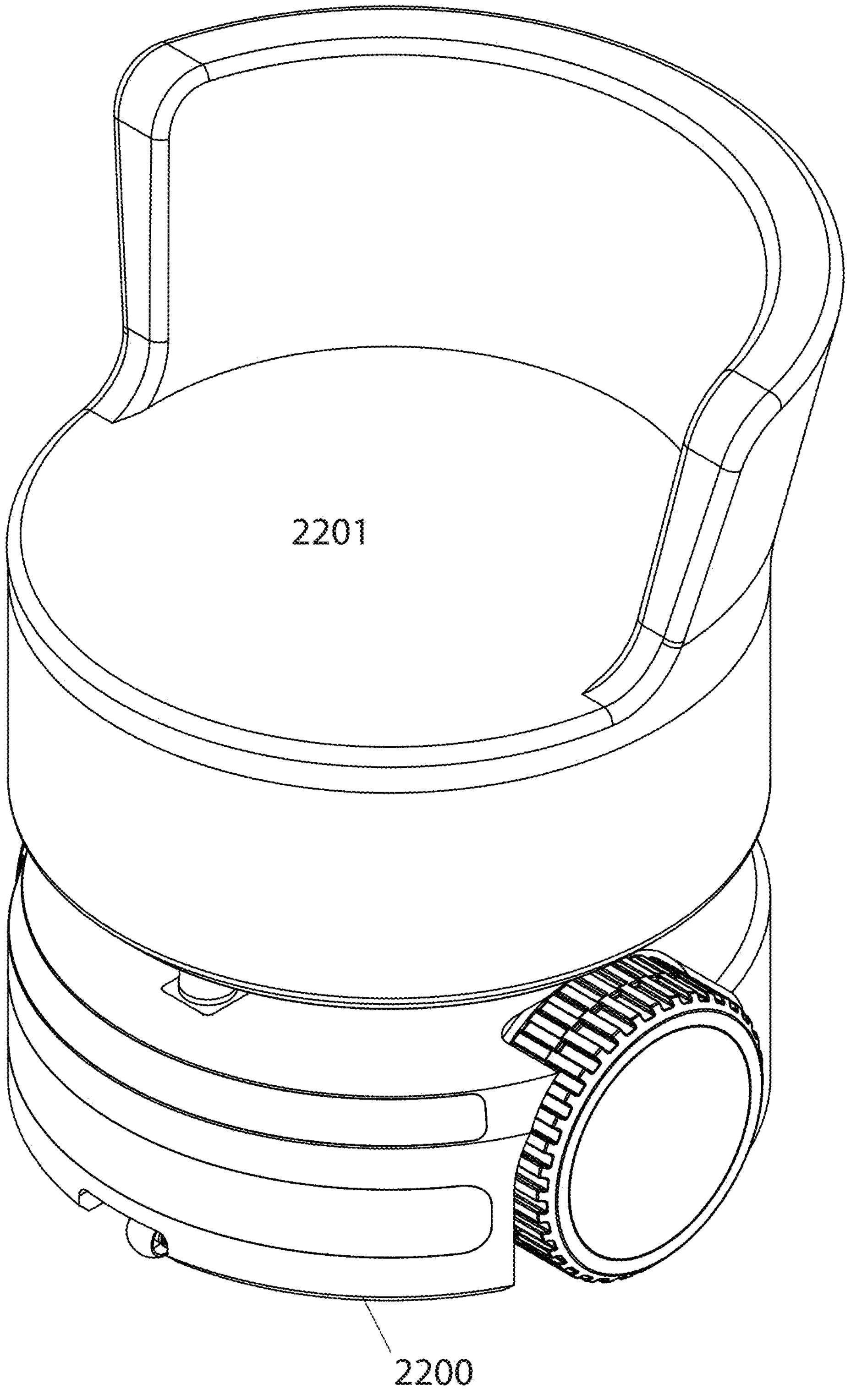
FIG. 22 illustrates an example of a VMP robot customized to function as a robotic mobile chair, according to some embodiments.
Figure 23:
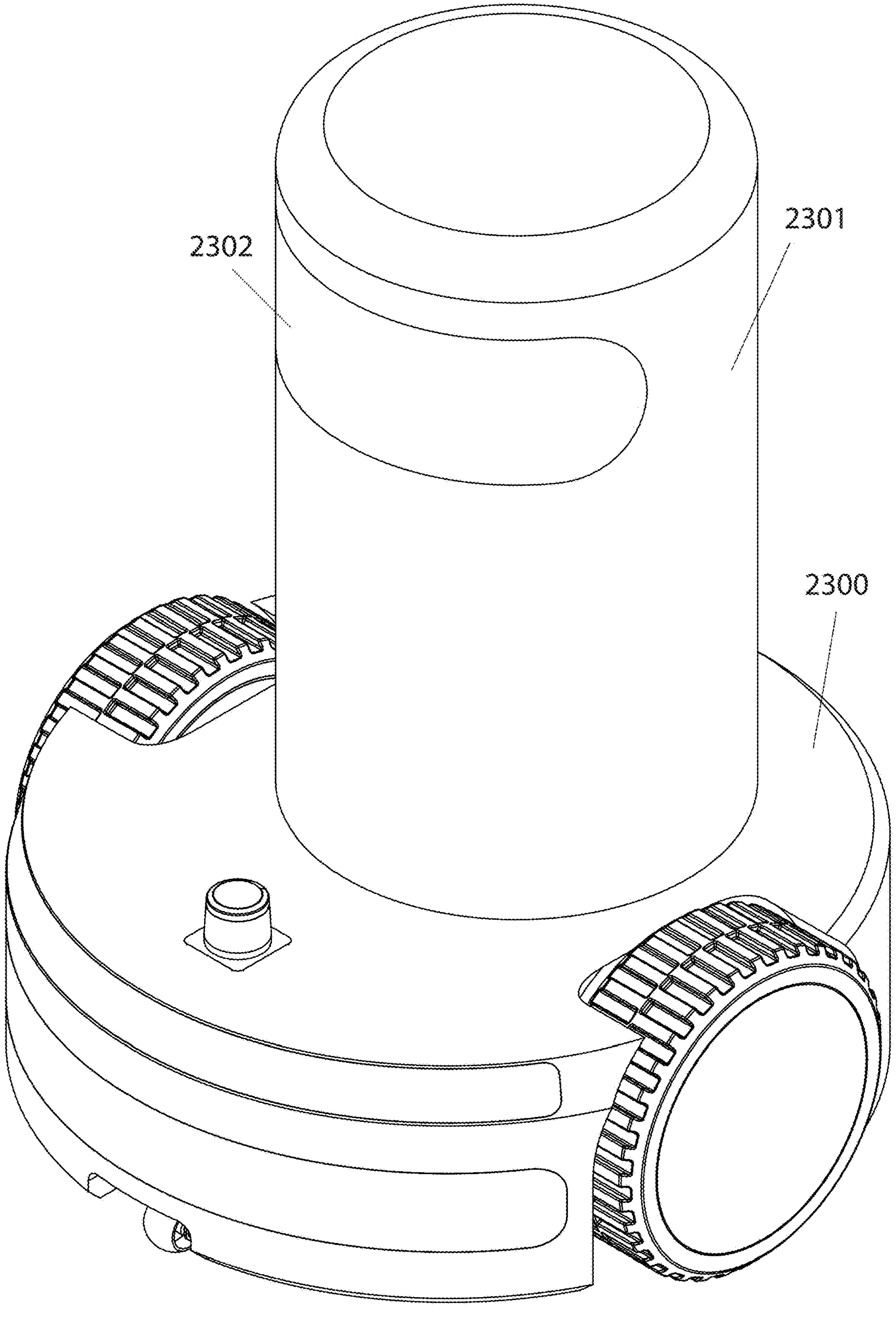
FIG. 23 illustrates an example of a VMP robot customized to function as a predator robot, according to some embodiments.
Figure 24A:
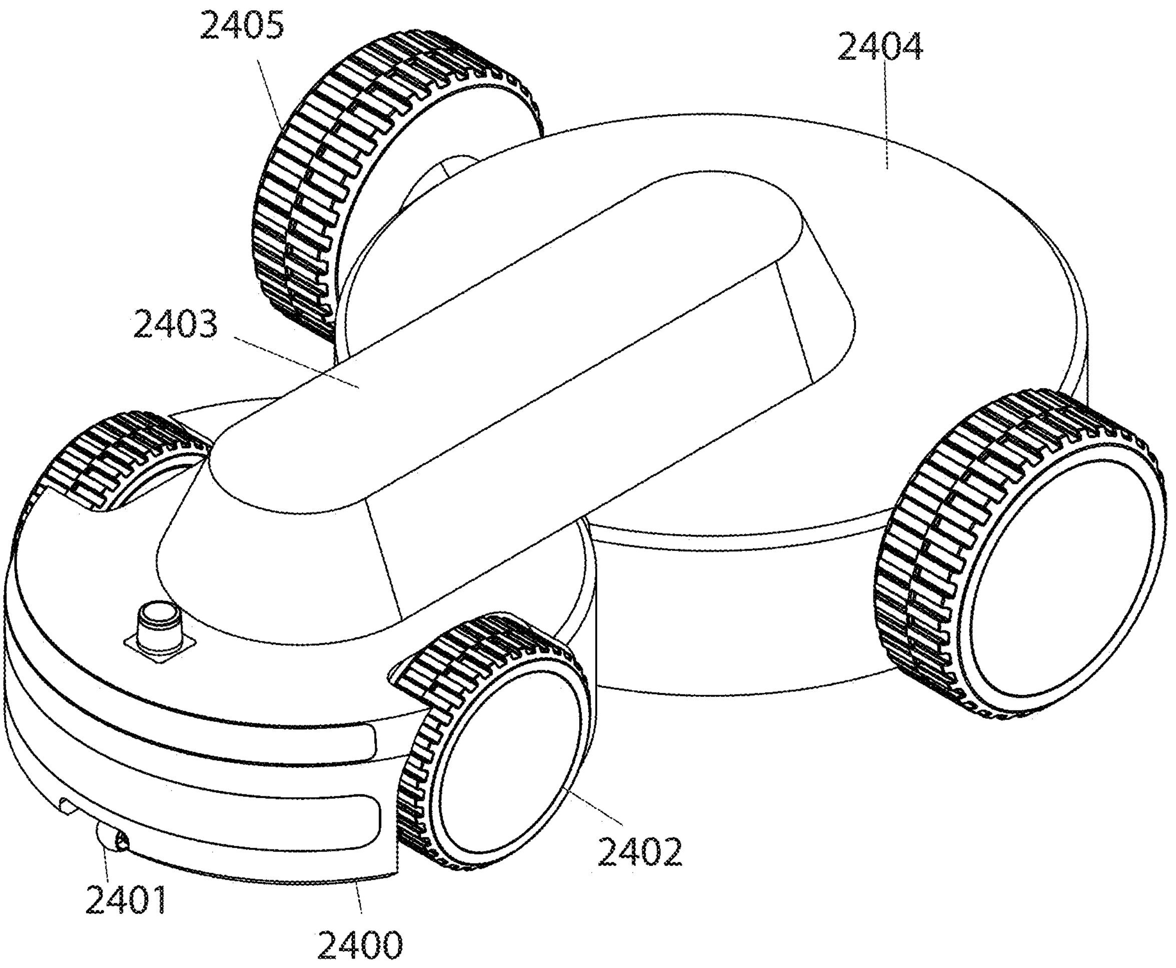
FIGS. 24A and 24B illustrate an example of a VMP robot customized to function as a lawn mowing robot, according to some embodiments.
Figure 24B:
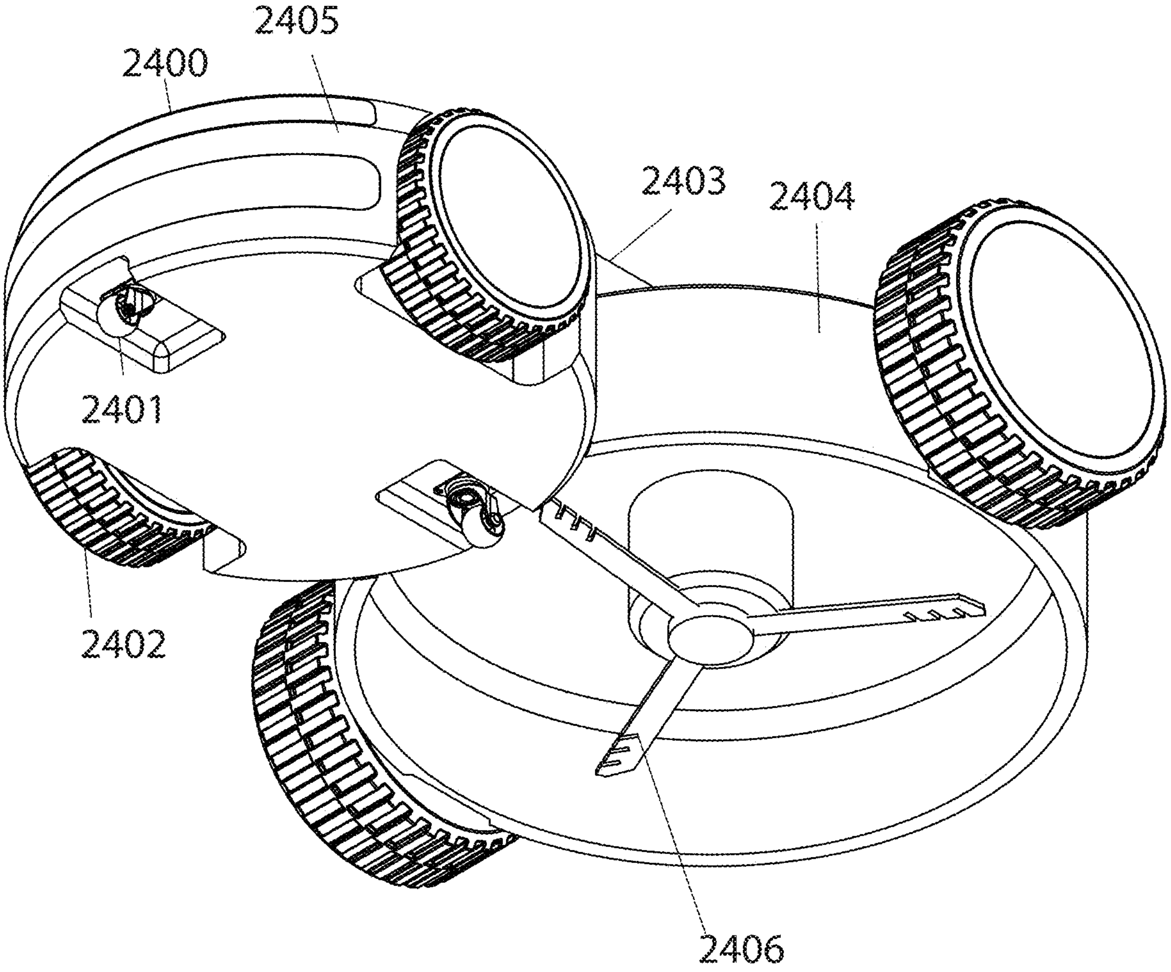
Figure 25:
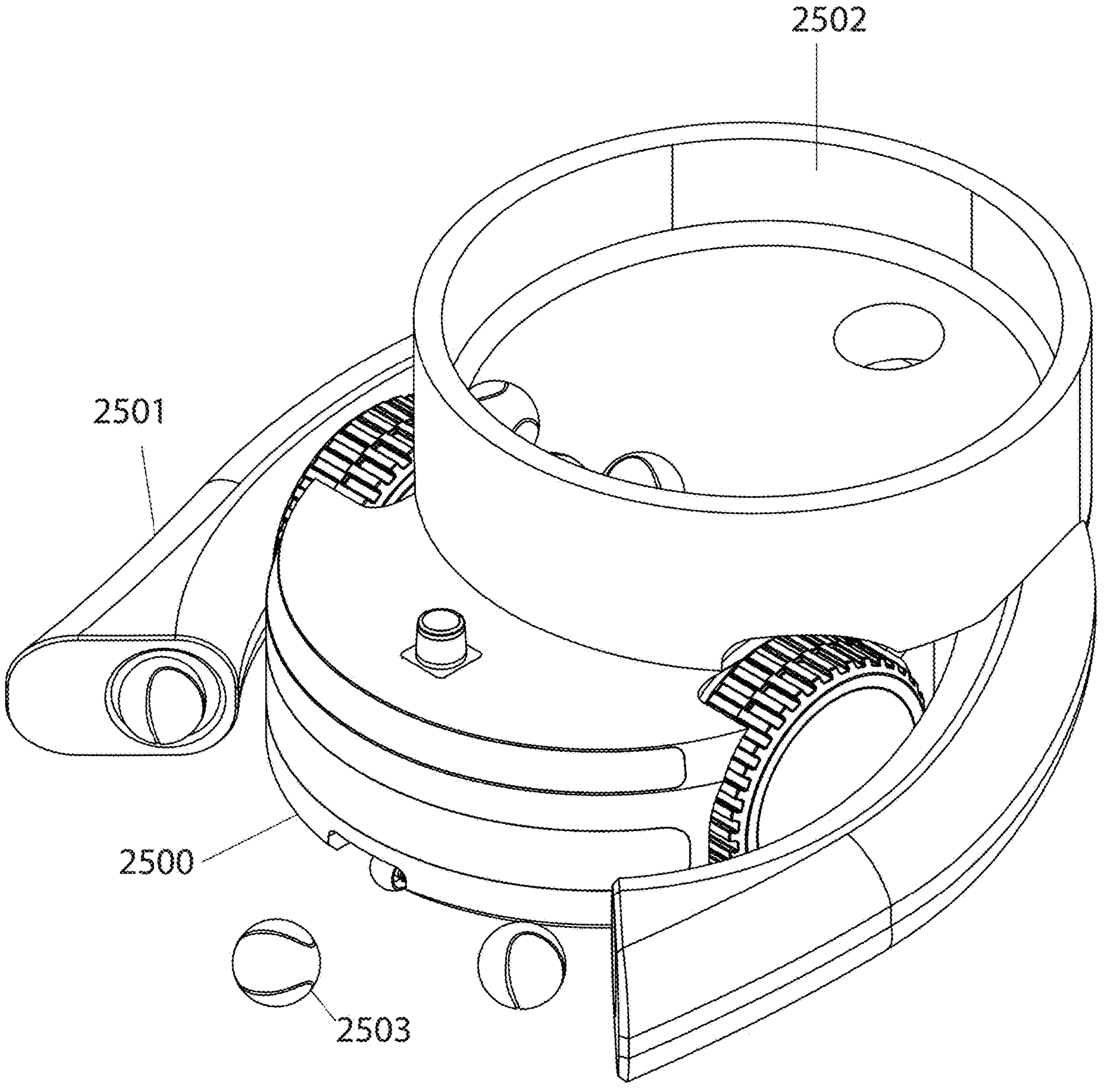
FIGS. 25 and 26 illustrate an example of a VMP robot customized for use in the sports industry, according to some embodiments.
Figure 26:
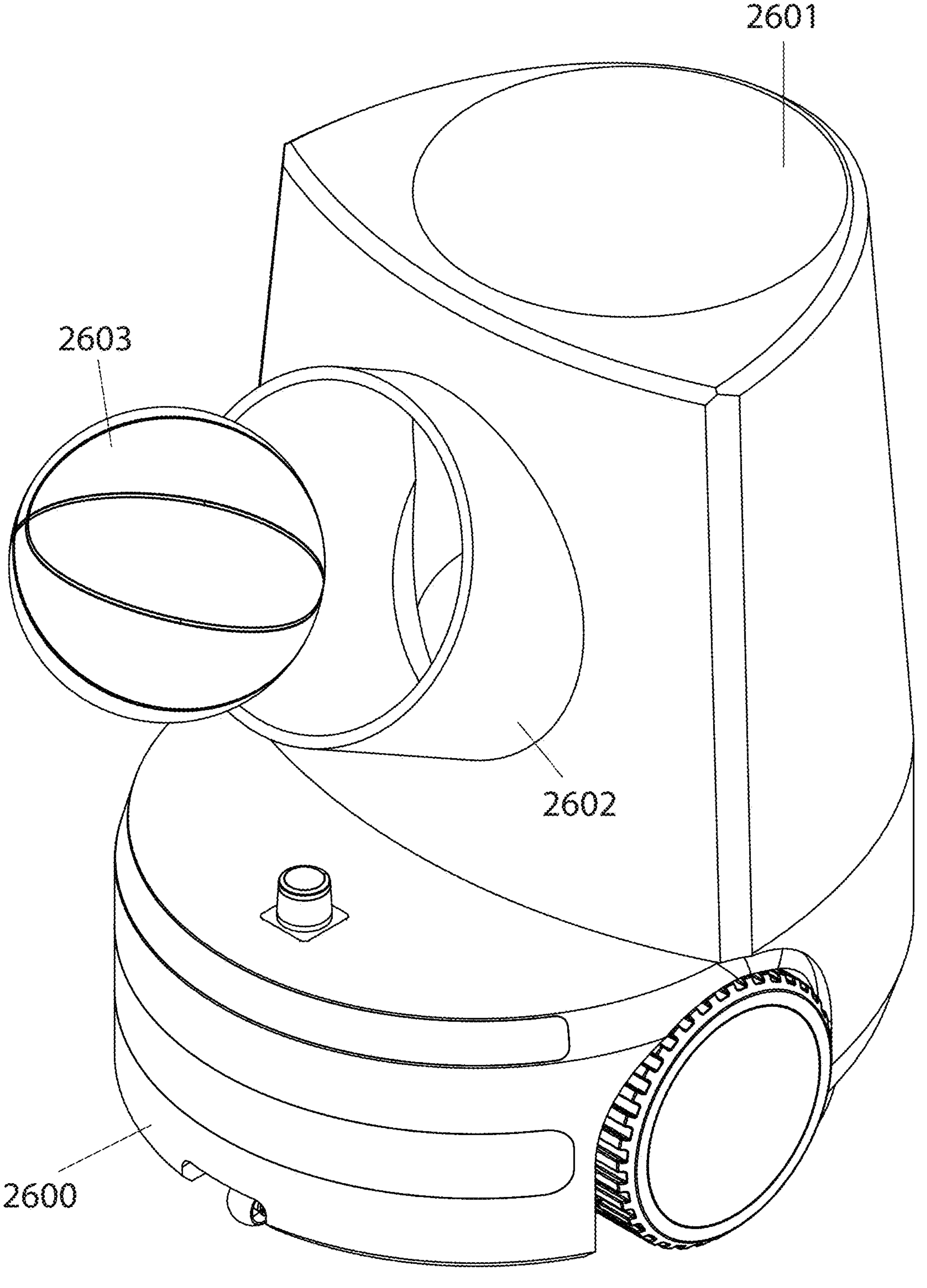

FIG. 22 illustrates the VMP robot customized to function as a mobile chair including VMP robot 2200 and coupled chair 2201. In some cases, the chair 2201 may be interchangeable with different types of chairs depending on the needs and desires of the user. In some cases, the mobile chair may be used as a replacement for a wheel chair or motorized scooter. In some cases, the chair may lower and extend such that the user may easily demount from the chair and may reach higher items. In some instances, a user directs the mobile chair using verbal commands. In other instances, a user chooses a destination using an application of a communication device paired with the processor of the VMP robot 2200. In some instances, the processor chooses an optimal movement path to the destination using path planning methods similar to those described herein. In other instances, the user directs the VMP robot 2200 using a remote control or by drawing a movement path in a map using the application of the communication device. In some instances, the application of the communication device suggests a modification to the movement path based on, for example, finding a movement path that reaches the destination in a shorter time. FIG. 23 illustrates the VMP robot customized to function as a predator robot including VMP robot 2300 and extension 2301 with sensor window 2302 behind which additional sensors are housed. The additional sensors interface with VMP robot 2300 and allow the processor to observe the environment at higher heights. In some instances, extension 2301 may be reconfigured to appear as a particular type of animal or to have a particular color that may be off putting to specific animals. In some cases, extension 2301 emits lights and sounds that may be off putting to specific animals. For example, the predator robot may act as a replacement to hounds that are used in hunting season to direct animals to a particular location. In some instances, the predator robot may be used for an opposite effect, wherein extension 2301 may be reconfigured to appear as a particular type of animal or to have a particular color that may be enticing to specific animals. In some cases, extension 2301 emits lights and sounds that may be enticing to specific animals. In some cases, a user may choose a particular type of animal using an application of a communication device paired with the processor of the VMP robot or a user interface of the VMP robot. The processor may then alter the lights and sounds used based on the animal chosen in order to chase the animal away or attract the animal closer. In some cases, the processor may identify different types of animals using computer vision technology. In some cases, the processor only emits lights and sounds upon identifying a particular type of animal. In some instances, a user may choose an area within a map of the environment that they wish the predator robot to explore in search of particular animals. FIGS. 24A and 24B illustrate the VMP robot customized to function as a robotic lawn mower including VMP robot 2400 with castor wheels 2401 and drive wheels 2402 and connecting element 2403 used to connect VMP robot 2400 with mowing component 2404. Mowing component 2404 includes wheels 2405 and blade 2406. In some instances, blade 2406 is electrically coupled with the electronics of VMP robot 2400 such that the processor of VMP robot 2400 may control the operation of blade 2406. In some instances, the blade 2406 may rotate in one direction or in both directions. In some instances, a motor is used to rotate the blade 2406. In some cases, VMP robot 2400 includes driving surface sensors, the data from which the processor may use to predict the current driving surface of the VMP robot with mower. In some instances, the processor activates blade 2406 when a grass driving surface is detected. In some cases, the processor only activates blade 2406 when the driving surface is grass. In some instances, the VMP robot 2400 includes sensors that may measure the distance to a top of a patch of grass. In some cases, the processor determines the distance between the top of the patch of grass and the blade 2406. In some instances, the blade 2406 may be programmed to only activate when the distance between the top of the grass and the blade is below a predetermined threshold or when the height of the grass is above a predetermined threshold. In some cases, the processor generates a map of a location with grass, such as a backyard, a park or a field, by stitching captured images of the location together at overlapping points, as described herein. The processor may localize during mapping and operation when a measurement of the environment is taken by comparing the measurement against a map (e.g., spatial map, Wi-Fi map, driving surface map, etc.), as described herein. In some cases, the VMP robot is controlled by a user using a remote control or application of a communication device paired with the processor of the VMP robot. In some cases, a user may choose areas to mow on a map accessed using the application of the communication device. In some cases, a schedule may be provided to the processor using the application or the processor may autonomously generate a schedule for mowing grass in a particular area. In some cases, the processor learns optimal grass cutting schedule over time based on length of the grass observed during work sessions executed over time. Learning methods are described further herein. In some cases, the processor may detect when blade 2406 is stuck or stalled using sensor data, such as the amount of current drawn by the motor of the blade 2406, wherein a sudden increase in current may indicate entanglement of an object. In some cases, processors of multiple VMP robots with mowers collaborate to mow grass in a shorter period of time using methods such as those described herein. For example, processors divide an area to be mowed and share areas covered such that repeat coverage of locations may be avoided. In some embodiments, multiple users may share a single VMP robot with mower. For example, neighbors of a street may share the VMP robot with mower. In some cases, a control system manages operation of multiple VMP robots with mowers, instructing processors of the multiple mowers on the areas to mow and when. For example, a control system manages mowing of city parks and sports fields, instructing VMP robots with mowers to mow an entire or a portion of city parks and sports fields. Processors share their sensor data with the control system such that the control system may learn optimal mowing schedule of different areas. In some cases, VMP robots move in a boustrophedon pattern across an area during mowing. FIGS. 25 and 26 illustrate the VMP robot customized for use in the sports industry. For example, FIG. 25 includes VMP robot 2500 customized to collect tennis balls including tubes 2501 and ball container 2502. Tubes 2501 include a means for generating suction such that tennis balls 2503 may be suctioned into tubes 2501 and into ball container 2502. Tubes 2501 extend outwards to direct tennis balls 2503. In some instances, customized VMP robot 2500 is used to facilitate ball collected during or at the end of a tennis session. In some instances, the tennis ball collecting robot may be used at the professional level as a replacement for human ball collectors. In some cases, tennis ball collecting robot may capture images of the environment, process the images and detect the location of tennis balls using computer vision technology. In some instances, the tennis ball collecting robot navigates around the tennis court, detecting balls and collecting them. In some instances, the tennis ball collecting robot positions itself at a side or back end of a tennis court after collecting all or a portion of all the free tennis balls or a predetermined number of tennis balls. In some cases, the tennis ball collecting robot may detect a ball approaching and may navigate in a direction away from the tennis ball to avoid any damage. In some instances, the processor learns over time which areas of the tennis court it is less likely to encounter an approaching tennis ball and hence optimal positioning. In some cases, the tennis ball collecting robot remains at a parked position until verbally instructed by a user to approach for balls. The processor may detect the user and approach to a nearby location. Other commands may also be possible, such as collect balls, back away, collect a predetermined number of balls (like 3, 5, or 15 for example), stop collecting balls, and the like. In some instances, the processor maps one or more adjacent tennis courts using mapping methods similar to those disclosed herein. In some instances, the processor or a user labels the one or more courts (e.g., court 1, court 2, court A, court B, etc.) In some cases, the user labels the one or more courts using an application of a communication device paired with the processor or a user interface on the VMP robot 2500 that may display the map. In some instances, the user may also choose one or more courts on which the tennis ball collecting robot is to remain or may create a virtual boundary within the map that the tennis ball collecting robot may not cross using the application. In some instances, multiple tennis ball collecting robots collaborate, each collecting balls in a particular area of the environment and positioning themselves optimally such that each player on the court may have access to the tennis balls within ball container 2502. In some instances, a similar type of robot is used for collection of golf balls, basketballs, etc. In another example, FIG. 26 illustrates the VMP robot 2600 customized to launch basketballs in the direction of basketball players during practice including tube 2601 within which basketballs are dropped and tube 2602 from which basketballs 2603 are launched. In some instances, the basketball launching robot allows basketballs to reach players at a faster rate as the processor of VMP robot 2600 may use sensor data to detect players without a basketball and immediately launch a basketball 2601 in their direction. In some cases, basketballs are autonomously fed into tube 2601 by another robot or by another mechanism. In such instances, the basketball launching robot also allows basketball players to maximize their playing time as no one player is required to collect their own rebound or rebounds of their teammates. Multiple basketball launching robots may be used simultaneously.

Figure 27A:
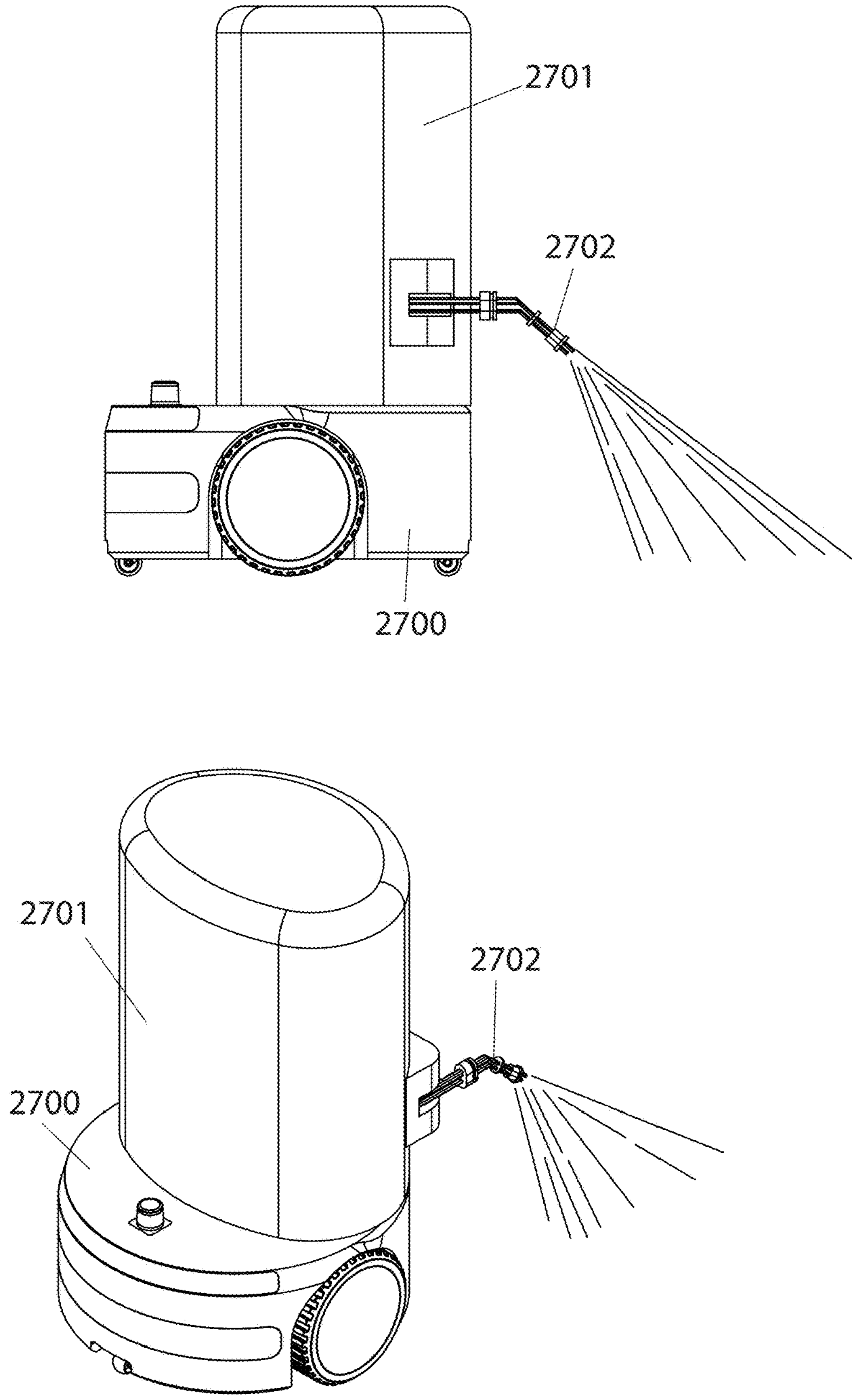
FIGS. 27A and 27B illustrate an example of a VMP robot customized to function as a robotic pressure cleaner, according to some embodiments.
Figure 27B:
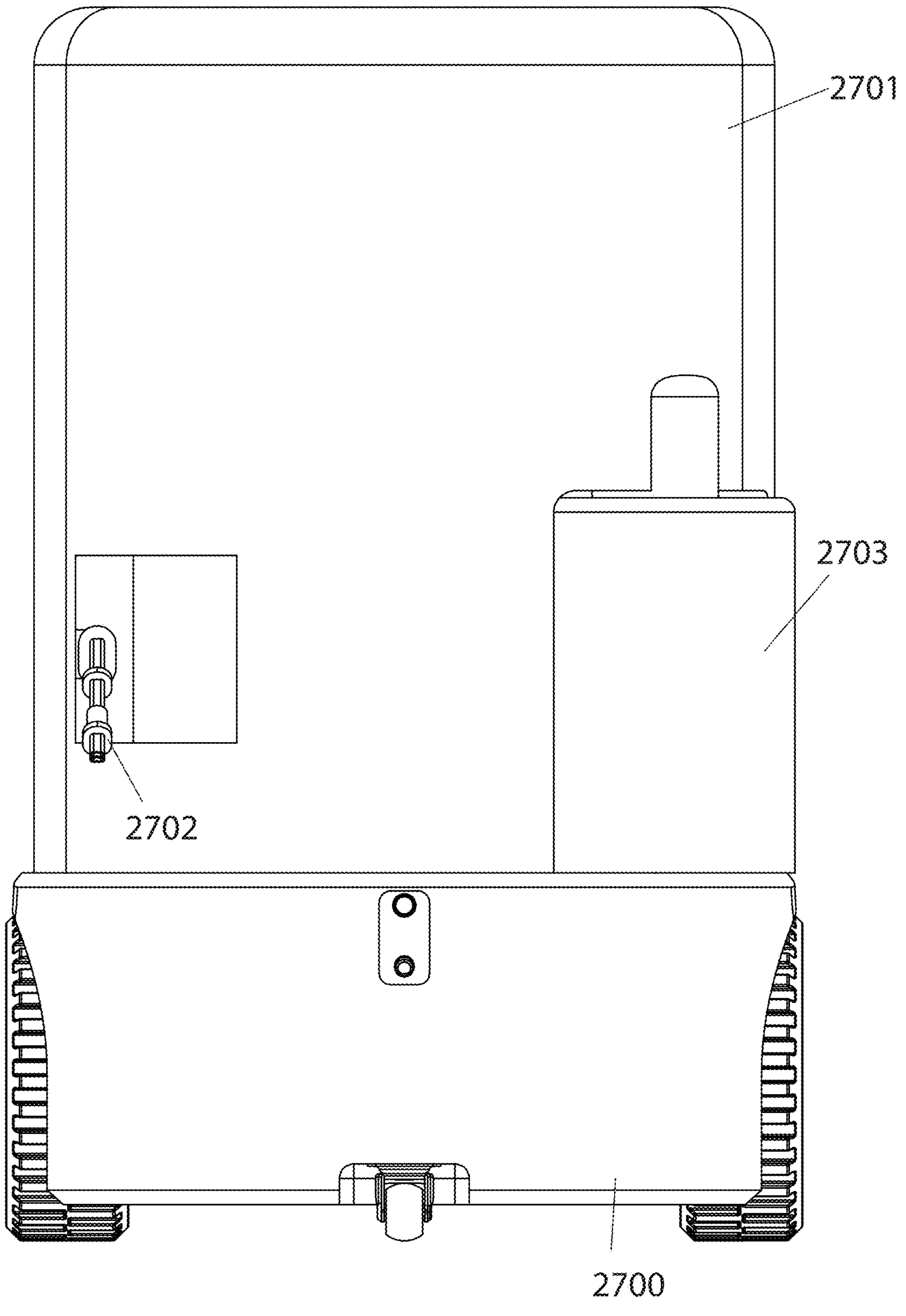

FIGS. 27A and 27B illustrate the VMP robot customized to function as robotic pressure cleaner including VMP robot 2700, water tank 2701, nozzle 2702, and cleaning agent tank 2703. In some instances, the robotic pressure cleaner may clean surfaces using a high-pressure liquid to remove unwanted matter from the surface. Examples of surfaces include cement road, hard wood floor, a side of a residential or commercial building, a vehicle body, and the like. In some cases, a hose connected to a water supply is connected to the robotic pressure cleaner and used to supply continuous water as opposed to a using water tank 2701. Using a hose connected to an external water source may be preferable as it may provide the robotic pressure cleaner with an unlimited water supply. In some instances, the robotic pressure cleaner further includes a motor or engine and a pump to generate the high-pressure liquid. In some instances, a motor or engine (e.g., electric or fuel powered) may be used to provide power to the water pump. In some cases, a fuel engine may be preferable as it may provide more freedom of maneuverability for the robotic pressure cleaner as it is not limited by connection to an electrical socket. In some cases, an electrically powered motor may be powered by one or more rechargeable batteries of the robotic pressure cleaner. An electrical motor powered by one or more rechargeable batteries of the robotic pressure cleaner may be preferable as it is a clean energy and provides the robotic pressure cleaner with freedom of maneuverability. In some instances, the robotic pressure cleaner is powered using electricity from an electrical socket. In other instances, the robotic pressure cleaner may be powered using various methods. In some cases, the water pump accelerate water to produce a release of high-pressured water. In some instances, the component used to release liquid, in this case nozzle 2702, is a high-pressure rated liquid release component. For example, a high-pressure rated hose may be used to release the high-pressure water onto the surface. In some cases, the water pressure may be adjustable for the task at hand. For example, different water pressures may be used for different types of surfaces, such as high water pressure for cleaning streets and lower water pressure for cleaning a vehicle. In some instances, the water pressure depends on the level of dirt build-up on the surface being cleaned. In some cases, the processor uses sensor data to predict the level of dirt build-up on a surface and autonomously adjusts the water pressure during cleaning. In other instance, a user chooses the water pressure using an application of a communication device paired with the processor or a user interface on the robotic pressure cleaner. In some cases, the user chooses a type of surface to be cleaned and the processor uses a default water pressure based on the type of surface chosen. In some instances, different cleaning detergents may be used in combination with the water, the cleaning agents being housed within cleaning agent tank 2703. For example, a cleaning detergent that assists with cleaning of grease or oil may be used to clean a surface such as the floor of an auto shop, a garage, or the like. In some cases, the robotic pressure cleaner may include more than one cleaning agent tanks and the processor may choose which cleaning agent to use based on the type of surface and type of dirt on the surface. In some instances, the user may choose which cleaning agent to used using the application or user interface of the robot. In some instances, the robotic pressure cleaner may use pellets, sand, or the like for assisting with removing dirt from a surface. For example, sand may be combined with the pressurized water to remove paint from a sidewalk. In some cases, the processor detects when the dirt has been removed from the surface to prevent damage to the surface from over cleaning. For example, using a high water pressure or pellets or sand on a surface for an extended period of time may damage the surface through erosion. In some instances, the liquid release component may be angled such that the high pressure water released is aimed at specific locations. For example, for cleaning a vehicle, side of a building or the like, the nozzle 2703 may be rotated 90 degrees to the right such that the direction of the pressurized liquid is aimed at the surfaces to be cleaned. In some cases, the processor may learn the optimal angle of the liquid release mechanism, optimal cleaning agent, optimal water pressure, optimal driving speed, and the like for loosening a particular type of dirt from a particular surface by observing certain factors over time, such as the length of time it took to loosen a particular type of debris from a particular surface, the amount of water pressure used, the angle of the liquid release mechanism, the amount of water consumed, the type of cleaning agent used, driving speed, and the like. In some instanced, the robotic pressure cleaner may reduce its speed to provide a more thorough cleaning of the surface. In some cases, one or more sensors scan the surface and detects areas that require further cleaning and the robot cleans those areas. In some instances, a user selects surfaces to be cleaned by choosing the surface in a map using the application. In some cases, a user controls the movement of the robotic pressure cleaner during cleaning using a communication device or provides a movement path by drawing it in a map using the application. In some cases, the processor maps and localizes using mapping and localization methods described herein. In some instances, multiple robotic pressure cleaners collaborate to pressure clean one or more surfaces using collaborative methods described herein. An example of a robotic pressure cleaner is further described in U.S. Patent Application No. 62/756,896, the entire contents of which is hereby incorporated by reference.

Figure 28:
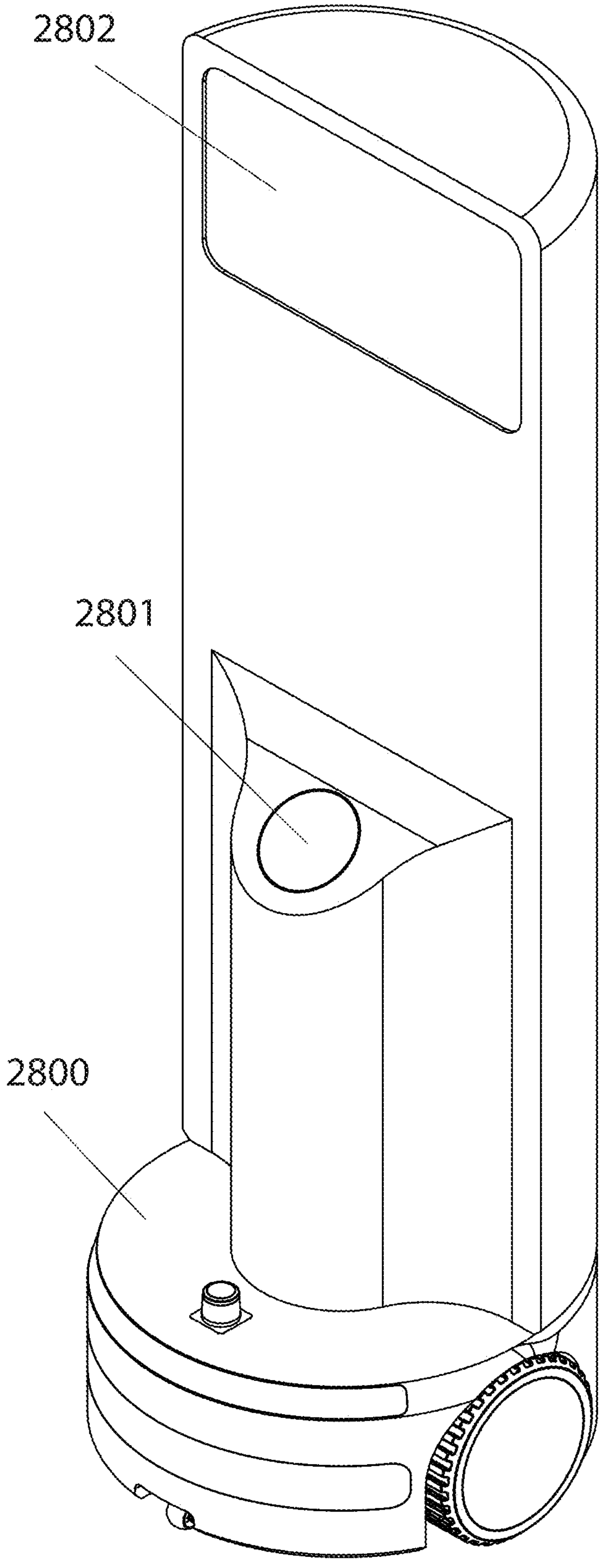
FIG. 28 illustrates an example of a VMP robot customized to function as a robotic mobile sign, according to some embodiments.
Figure 29A:
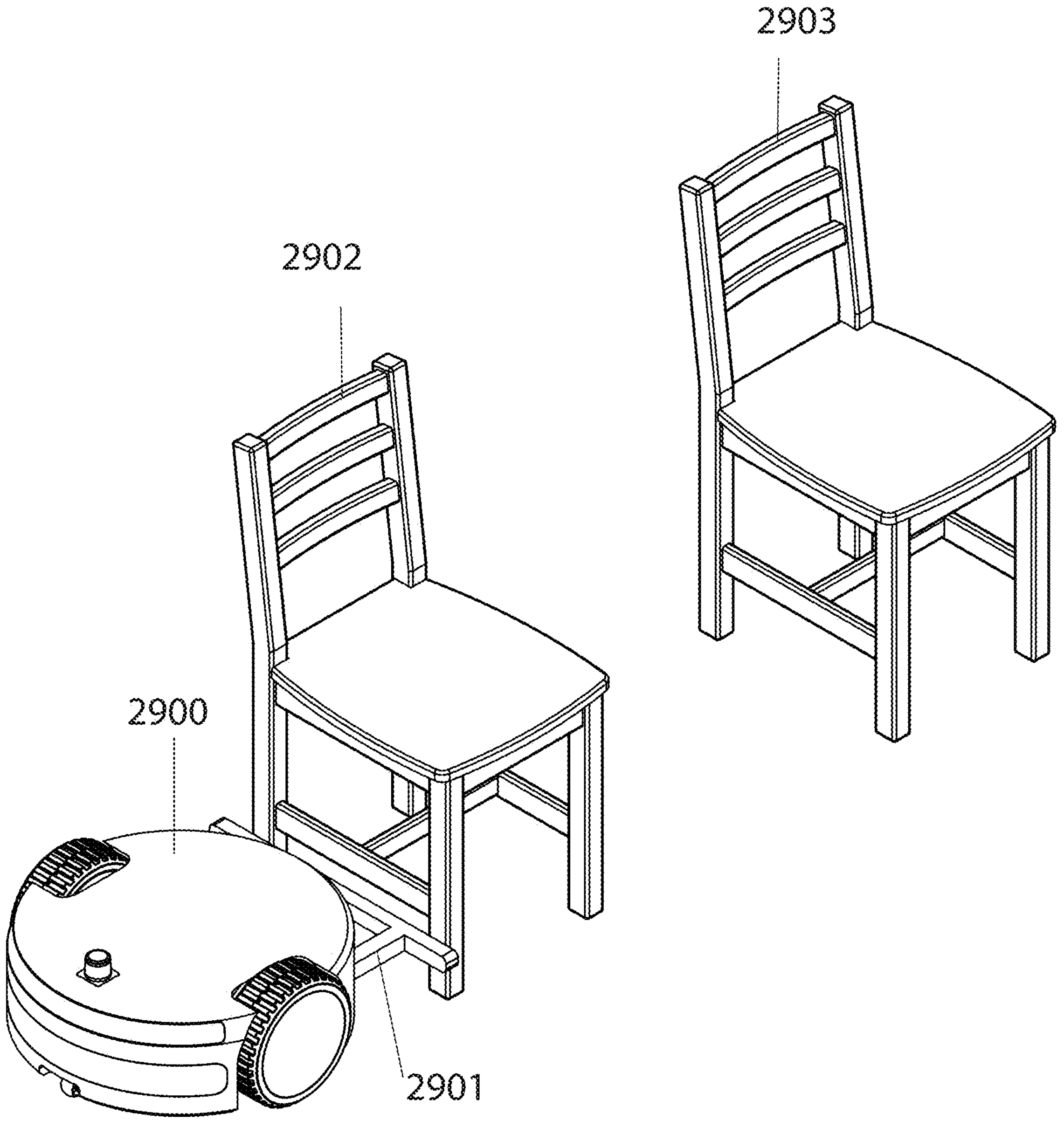
FIGS. 29A and 29B illustrate an example of a VMP robot customized to function as a robotic chair mover, according to some embodiments.
Figure 29B:
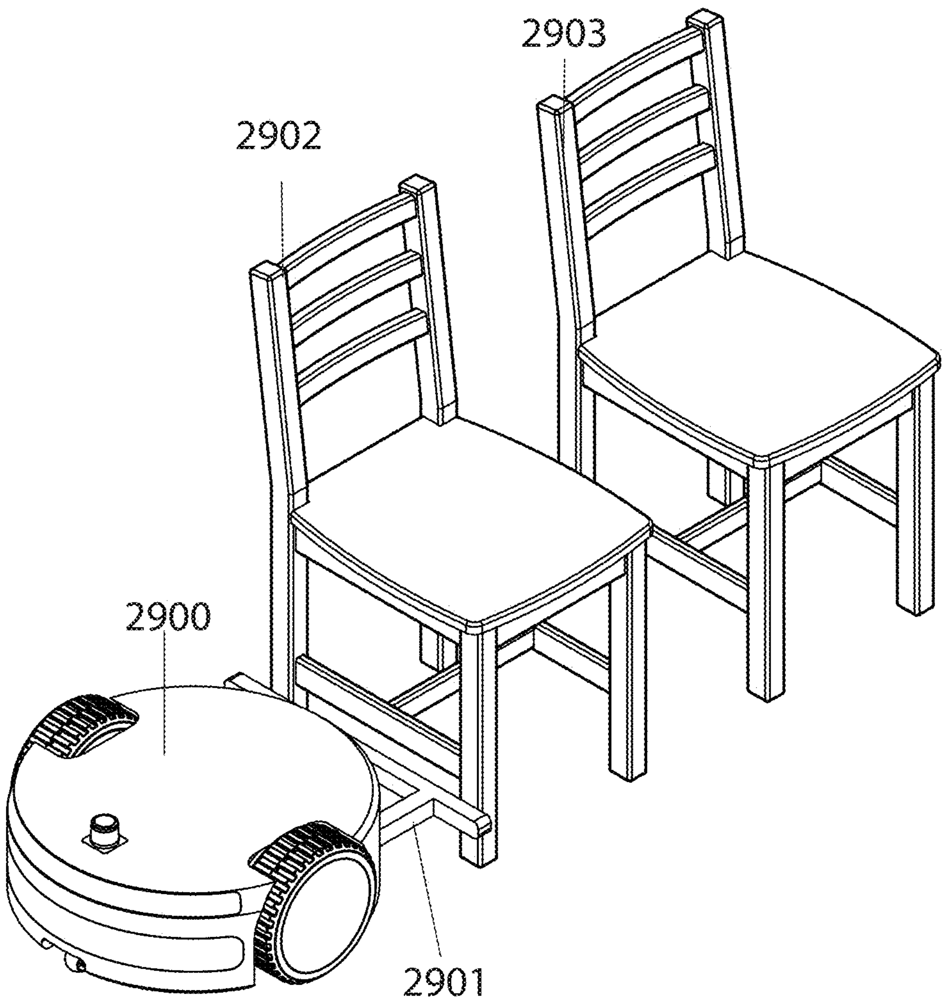

FIG. 28 illustrates the VMP robot customized to function as a robotic mobile sign including VMP robot 2800, user interface 2801, and virtual sign 2802. In some cases, the robotic mobile sign includes sensor windows behind which sensors for observing the environment are housed in an area below and/or above user interface 2801 such that the processor may observe the environment at am increased height. In some instances, the robotic mobile sign may be used in an airport. In some instances, the robotic mobile sign may be positioned at an arrivals gate and the virtual sign 2802 may display a name of an arriving airport guest. In some cases, the arriving airport guest may locate the robotic mobile sign and using the user interface 2801 confirm their presence. In some instances, the robotic mobile sign may proceed to direct the airport guest to a particular location, such as a location of a parked vehicle of their driver. In some instances, a user may provide text or an image to display on virtual sign 2802 to the processor using the user interface 2801 or an application of a communication device paired with the processor. The user may further provide a location to wait for a guest and a location to direct the guest to once they have confirmed their presence or once the processor autonomously detects the presence of the particular person. In some instances, the presence of a guest is detected by the entry of a unique code by the guest using the user interface or the robotic mobile sign may capture an image of the guest using a camera and transmit the image to the user on the application for confirmation. In some instances, the user may be able to track the robotic mobile sign using the application of the communication device. In some instances, the user may be able to direct the robotic mobile sign using the application. In some cases, the mobile robotic sign simply provides instructions to the guest whose name is displayed on virtual sign 2802. In some cases, the robotic mobile sign may be used for advertising purposes as well or other applications. In some instances, the robotic mobile sign is a service and users are required to provide payment for use. In some cases, multiple robotic mobile signs are parked in a parking area until requested for service by a user via an application of a communication device. In some instances, a control system manages operation of the multiple robotic mobile signs using control system management methods similar to those described herein. In some instances, processors of multiple robotic mobile signs autonomously collaborate to respond to requests from users using collaborative methods similar to those disclosed herein. FIG. 29A illustrates the VMP robot customized to function as robotic chair mover including VMP robot 2900 with moving component 2901. In some instances, the robotic chair mover moves chairs to a location by positioning itself in an optimal position relative to the chair 2902 to use the moving component 2901 to move chair 2902. FIG. 29B illustrates chair 2902 moved closer towards the chair 2903 by moving component 2901 of robotic chair mover. In some cases, the robotic chair mover moves chairs in a facility, such as a restaurant, to one area such that the floor may be clear of chairs for cleaning by, for example, a robotic surface cleaner. The robotic chair mover may move chairs back to their original location. In some cases, a robotic surface cleaner follows behind robotic chair mover as the robotic chair mover moves chairs for the robotic surface cleaner to access the floor beneath and around chairs. In some cases, the processor of the robotic chair mover initially maps the environment and marks the location of chairs within the map. In that way, the processor may know where to return chairs to after moving them. In some instances, the processor is provided with a floor map that includes the location of chairs for an event, for example. In some cases, the processor moves a collection of chairs all located in one area such that they are positioned as provided in the floor map. In some cases, the robotic chair mover may have the capability to stack or de-stack chairs. In some instances, the robotic chair mover localizes using similar localization methods as described herein. In some cases, processors of multiple robotic chair movers collaborate to position chairs in specific locations. In some instances, each robotic chair mover may be responsible for moving a particular number of chairs or may be responsible for placing all required chairs in a subarea of the environment.

Figure 30:
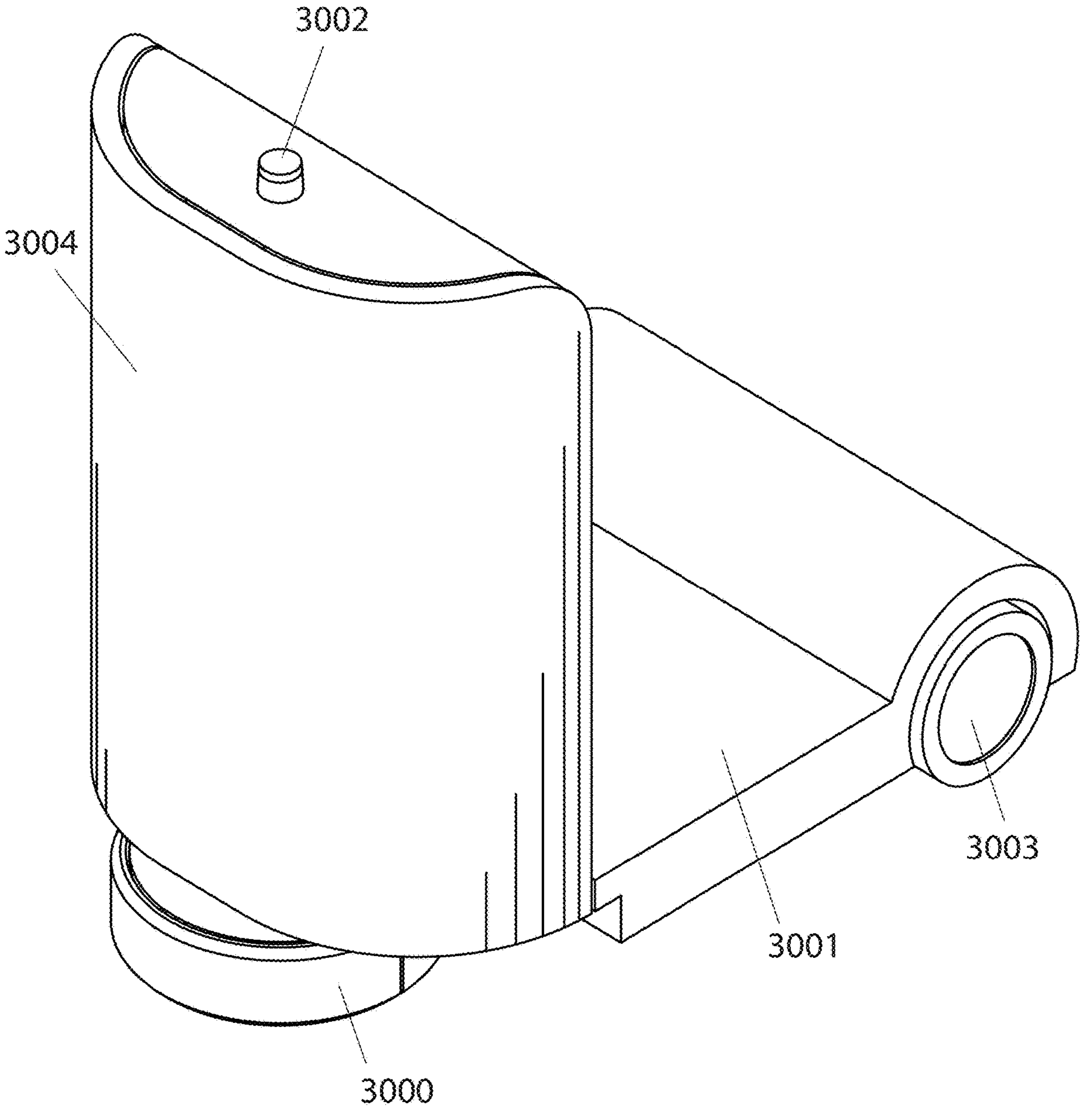
FIG. 30 illustrates an example of a VMP robot customized to function as a robotic item transportation device, according to some embodiments.

FIG. 30 illustrates another configuration of a VMP robot 3000 that is customized to function as an item transportation robot. VMP robot 3000 is customized with platform 3001 on which items may be placed for transportation. Platform 3001 includes LIDAR 3002 and wheels 3003. Different types of sensors for mapping, localization, and navigation may be housed within compartment 3004 and behind sensor windows (not shown). In some cases, the item transportation robot may transport an item from a first location to a second location. For example, a consumer may order an item online and the item transportation robot may transport the item from a store or warehouse to a home of the consumer. The item may be a food item, a clothing item, a sports equipment item, an automotive item, a home and garden item, an office item, an electronics item, furniture, and the like. Different sized item transportation robots may be used to transport items of various sizes. In some instances, the consumer orders the item using an application of a communication device paired with a control system that manages one or more item transportation robots. In some cases, the control system receives the request for transportation of a particular item from a first location (e.g., warehouse) to a second location (e.g., consumer home). In some instances, the control system determines which item transportation robot shall execute the request based on the distance of the robot from the first location, the time to reach the first location, the battery or fuel level of the robot, the size capacity of the robot, and the like, and transmits the request to the processor of the item transportation robot chosen for execution. In some cases, item transportation robots autonomously park in a parking lot until departing to execute a request and return back to the parking lot after executing the request. In some instances, the consumer may view a status and/or the location of the item transportation robot using the application. In some cases, the item transportation robot is used within an establishment for transporting items. In some instances, a control system manages one or more item transportation robots operating within the establishment. For example, a consumer may order an item online from a particular storefront. Upon the consumer arriving at the storefront, an item transportation robot may be instructed to transport the ordered item from a storage location to the front of the store for the consumer to pick up. In some instances, the control system, being paired with the application from which the item was ordered, may detect when the consumer is within close proximity to the store front and may instruct the item transportation robot to transport the ordered item to the front of the store when the consumer is a predetermined distance away. In other instances, the consumer may use the application to alert the control system that they have arrived at the store front. In some cases, the control system may send an alert to the application when the item transportation robot has arrived at a delivery or item pick up location. In some instances, the application of the communication device from which an item is ordered may be used to specify an item, a particular time for delivery of the item, a store front pick up location, a delivery location, and the like. In some instances, the application may use GPS location technology for locating a consumer. In some cases, an item is delivered to a current location of the consumer. For example, a control system may locate a consumer that ordered a food item when the food item is ready for delivery and instruct the item transportation robot to deliver the food item to the current location of the consumer, which is some instances may change part way through delivery. In some cases, a consumer may select a previous order for repeat delivery. In some instances, the control system may detect the location of the consumer using the application of the communication device paired with the control system and may trigger particular instructions based on the location of the consumer. For example, delivery of an item to a current location of a consumer or transportation of an item from a storage location in the back of a store front when the consumer is close to reaching the store front. In some instances, the control system notifies the item transportation robot that a delivery is complete when the consumer reaches outside a predetermined range, at which point the robot may navigate back to a storage location or another location. In some cases, the item transportation robot retreats to a storage location, a parking lot, or another location after completing a delivery. For example, after the item transportation robot has delivered a food item to a consumer in a restaurant, the robot may navigate back to a kitchen area to receive another order. In some cases, a barcode or other type of identification tag located on the item transportation robot may be scanned by a scanner of the communication device after delivery of an item to alert the robot that it may navigate back to its storage location or another location. In other cases, other methods of alerting the item transportation robot that it may navigate back to its storage location or to another location may be used, such as, voice activation or activating a button positioned on the robot or weight sensor. In other cases, the item transportation robot may autonomously navigate back to a designated storage location, parking location, or charging location after delivery of an item. In some instances, the application or a user interface of the robot may provide information such as, when an item ordered is ready, a delay in order processing, a day and time an order will be ready, availability of an item, a status of the robot, etc. to the consumer. In other instances, information may be communicated using audio or visual methods. Examples of robot statuses may include, but are not limited to, in route to the item delivery location, parked at the item delivery location, item delivery complete, item delivery delayed, item delivery incomplete, stuck, collision with obstruction, damaged, container or platform cleaning required, and the like. In some instances, the item transportation robot may include sensors that may measure the amount of available space for items within a container or on a platform or the amount of available weight capacity. In some cases, the platform 3002 of the item transportation robot may accommodate multiple items for delivery to different locations. In some instances, the delivery locations of the multiple items are all within a predetermined radius. In some instances, the multiple items are all delivered to a central location in close proximity to all consumers that ordered the multiple items. In some instances, platform 3002 may be replaced with a container or may include a container within which items may be placed for transportation. In some instances, an operator or another robot places items on the platform. Further details of an item transportation robot are described in U.S. Patent Application No. 62/729,015, the entire contents of which are hereby incorporated by reference.

Figure 31A:
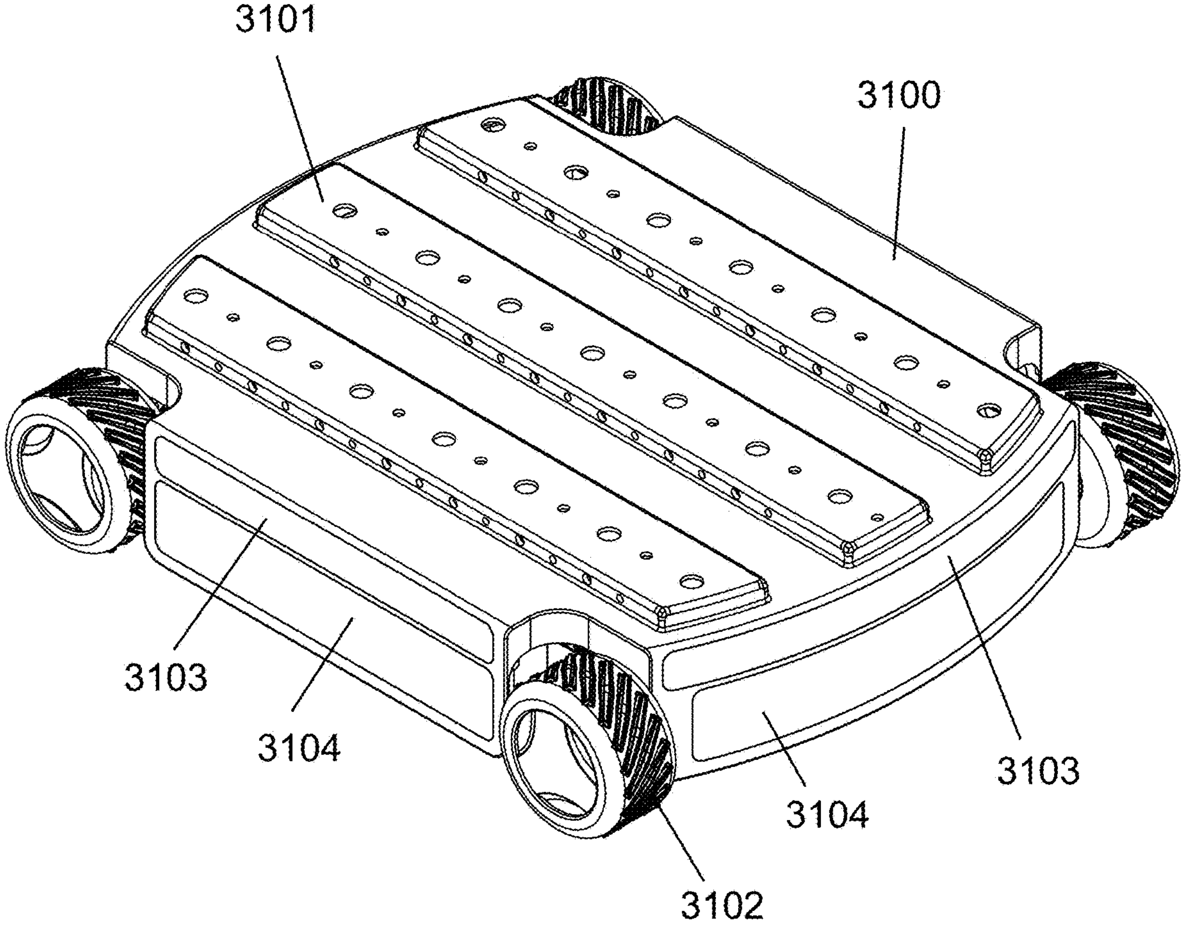
FIGS. 31A and 31B illustrate an example of a VMP robot, according to some embodiments.
Figure 31B:
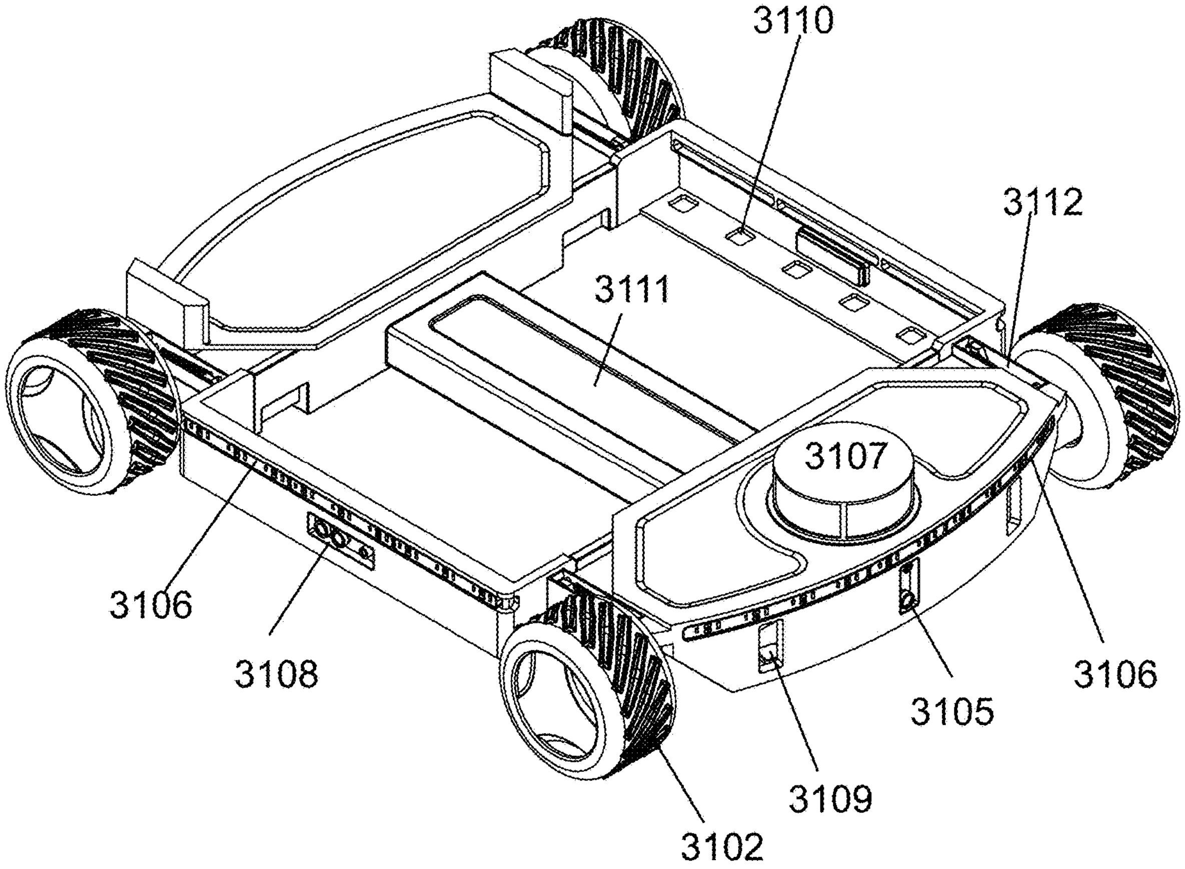

FIGS. 31A-31C illustrate yet another example of a VMP robot that may be customized for various functions. FIG. 31A illustrates a top perspective view of the VMP robot including casing 3100, securing racks 3101 with hole arrays for securing different structures to the VMP robot depending on the desired function of the robotic device, mecanum wheels 3102, windows 3103 for side, front, and back LIDAR sensors, and windows 3104 for cameras and other sensor arrays. FIG. 31B illustrates a top perspective view of the VMP robot without the casing. Camera 3105, sensor arrays 3106, LIDAR 3107, depth camera 3108, slots 3109 for additional sensors, slots 3110 for floor sensors, battery 3111 and wheel module 3112 including the wheel suspension and motor of wheel 3102. In other embodiments, other variations of VMP robot may be used. In some embodiments, a VMP robot or components thereof may be scaled in size in any direction to accommodate the intended function of the customized VMP robot. In some embodiments, the VMP robot may include multiple different components for performing a plurality of different tasks. An example of a multi-purpose robot is described in U.S. Patent Application No. 62/774,420, the entire contents of which is hereby incorporated by reference. For example, the VMP robot may include one or more of: a speaker module, a UV module, a compressor module, a dispensing module, an air pressure reduction and addition module, a brush module, a fluid module, a cloth module, a steam module, a dust collection module, a cleaning module, a mopping module, a supply carrying module, a material collection module, a service performing module, etc. In some embodiments, the supply carrying module includes one or more of: a module for carrying a battery, a module for delivery of electricity, a module for transmission of an electrical signal, and a module for delivery of food. In some embodiments, the supply carrying module performs at least some processing, wherein the processing comprises charging the battery, strengthening the electrical signal, or heating or cooking the food. In some embodiments, the supply carrying module is capable of dispensing with supply. In some embodiments, the supply includes a solid, a fluid, or a gas. In some embodiments, the gas is used for tire inflation. In some embodiments, the gas or fluid is used for power washing the floor of the environment. In some embodiments, the solid comprises a print receipt or cash from an ATM machine. In some embodiments, the fluid comprises paint, detergent, water, or hydrogen peroxide. In some embodiments, the supply carrying module generates a supply from a plurality of materials. In some embodiments, the supply carrying module carries supply comprising one or more of: a food tray, a medical patient, food, liquid, medication, gasoline, a power supply, and a passenger. In some embodiments, the supply carrying module comprises a module for delivery of pizza, wherein the module heats or cooks the pizza. In some embodiments, the service performing module repeats an electrical signal, transforms $H_2O$ into $H_2O_2$, or trims grass. In some embodiments, the material collection module collects tennis balls or dust or debris.

Figure 32:
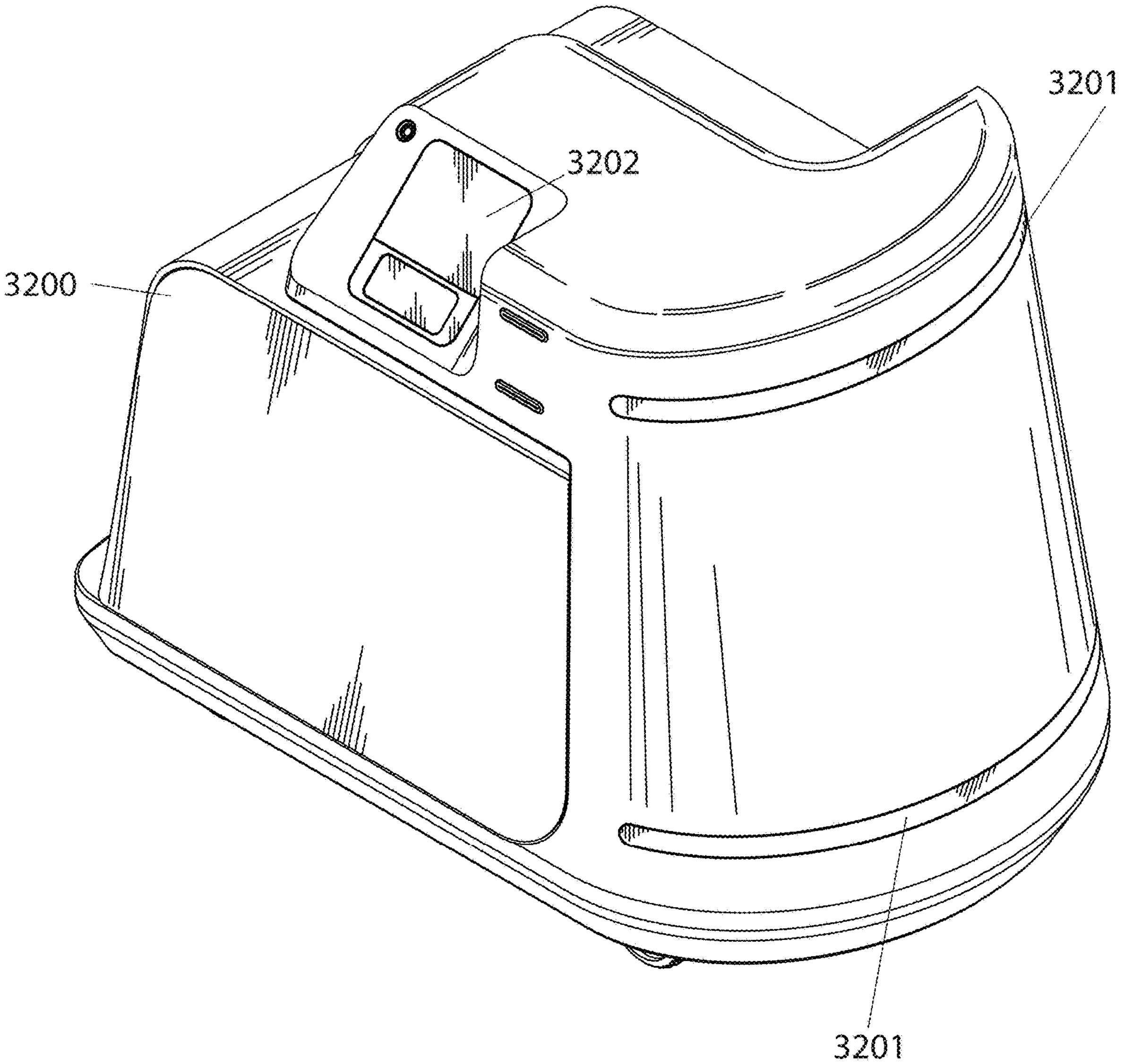
FIGS. 32 and 33 illustrate an example of a robot for transporting luggage, according to some embodiments.
Figure 33:
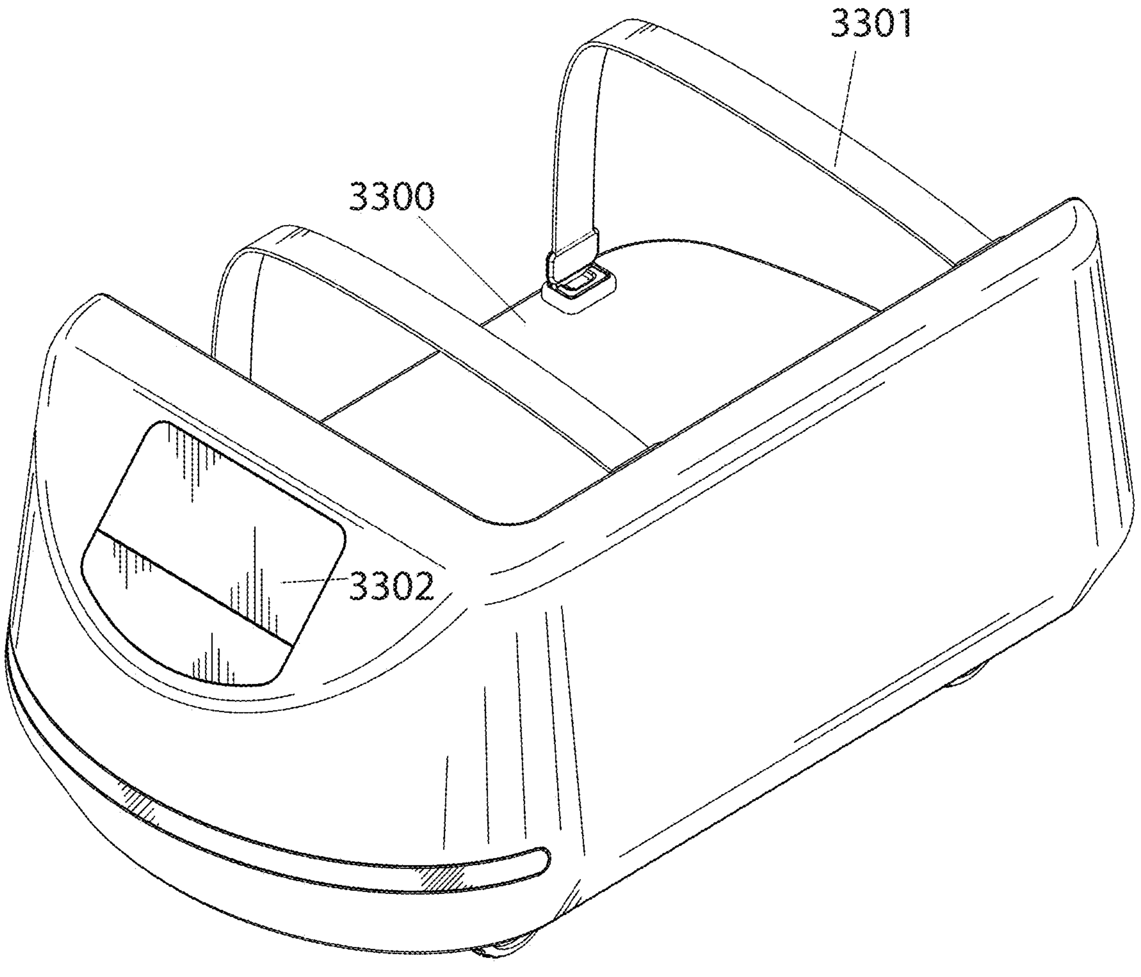

Various different types of robotic devices with different configurations may employ the methods and techniques and include at least a portion of the components described herein. For example, FIG. 32 illustrates a robot for transporting luggage at the airport including luggage compartment 3200, sensor windows 3201 behind which sensors used for mapping and localization are housed, and user interface 3202. In some instances, a user may use user interface 3202 to choose a desired location for luggage drop-off or to enter an airline, flight number or reservation number which the processor may use to determine a drop-off location of the luggage. In some cases, a user may use an application of a communication device paired with a control system managing one or more robots to request luggage transportation from their current location or another location. The user may also use the application to choose a desired location for luggage drop-off or to enter an airline, flight number or reservation number which the processor may use to determine a drop-off location of the luggage. In some instances, robots for transporting luggage autonomously approach vehicles at the drop-off zone of an airport or arrivals area or another location. In some instances, a user requests a robot for luggage transport from a current location (e.g., determined by the processor using GPS of the communication device of the user) and flight number (or airline or reservation number), the control system managing the robots receives the request and transmits the request to a particular robot, the robot navigates to the current location of the user, the user enters an authorization code provided by the application using the user interface 3202 causing compartment 3200 to open, the user places their luggage in the compartment 3200 and presses a button on the robot to close compartment 3200, the robot autonomously transports the luggage to a luggage drop-off location based on the flight number provided by the user and the user proceeds to security. In other cases, the user may use the user interface 3202 to enter information. In some cases, other methods are used to open compartment 3200 or a user may open the compartment 3200 without any authorization or verification. In some instances, the control system determines which robot to transmit each request to based on various factors, such as a battery level of each robot, a current location of each robot, a pick up location of the luggage, a drop off location of the luggage, a size of the robot, and the like. In other cases, processors of robots collaborate to determine which robot responds to each request. In some instances, other implementation schemes fir the luggage transporting robots may be used. FIG. 33 illustrates another robot for transporting luggage at the airport including luggage platform 3300, luggage straps 3301, sensor window 3302 behind which sensors are positioned, and graphical user interface 3303 that a user may use to direct the robot to a particular location in an airport.

Figure 34A:
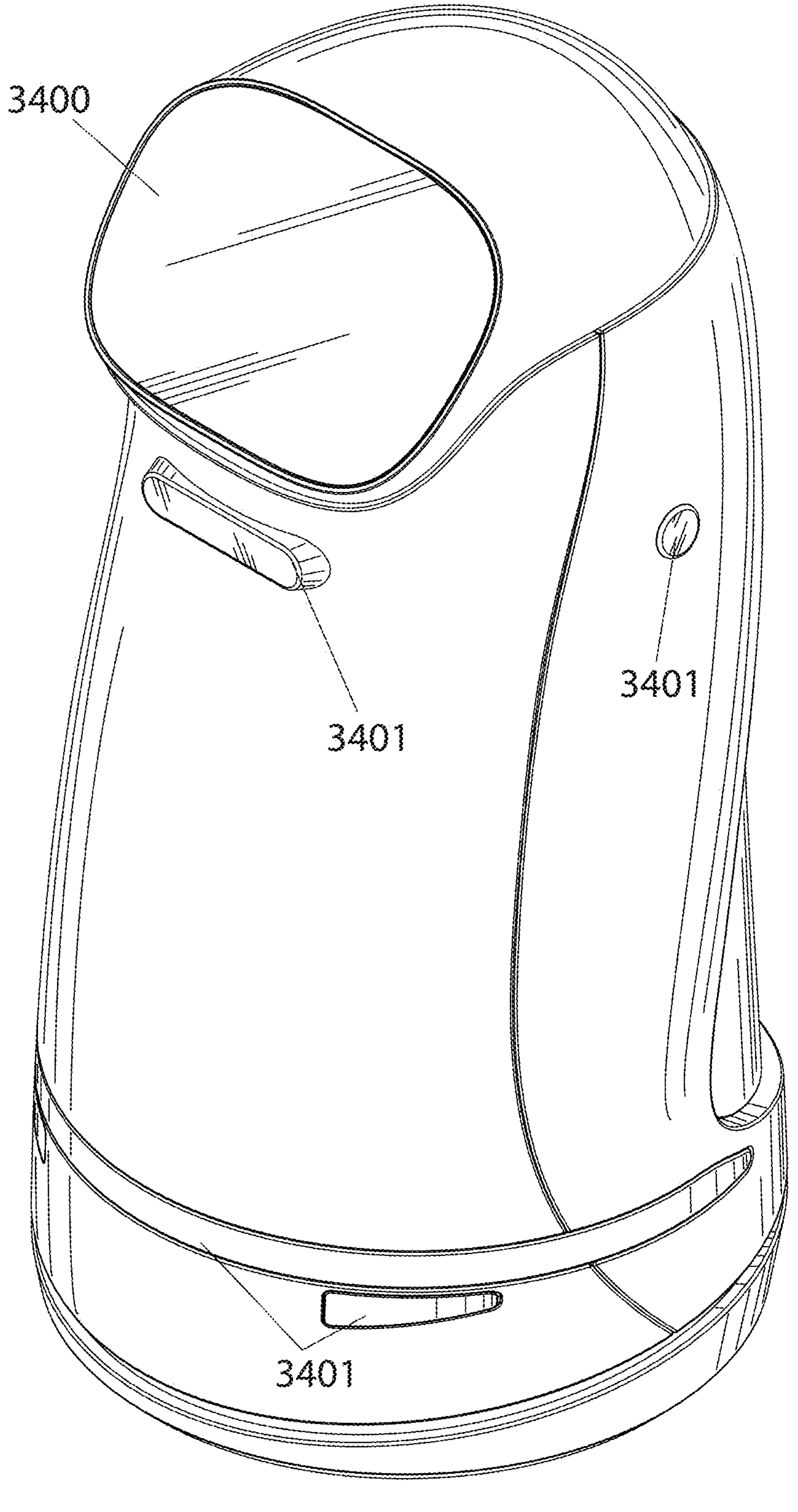
FIGS. 34A and 34B illustrate an example of a security service robot, according to some embodiments.
Figure 34B:
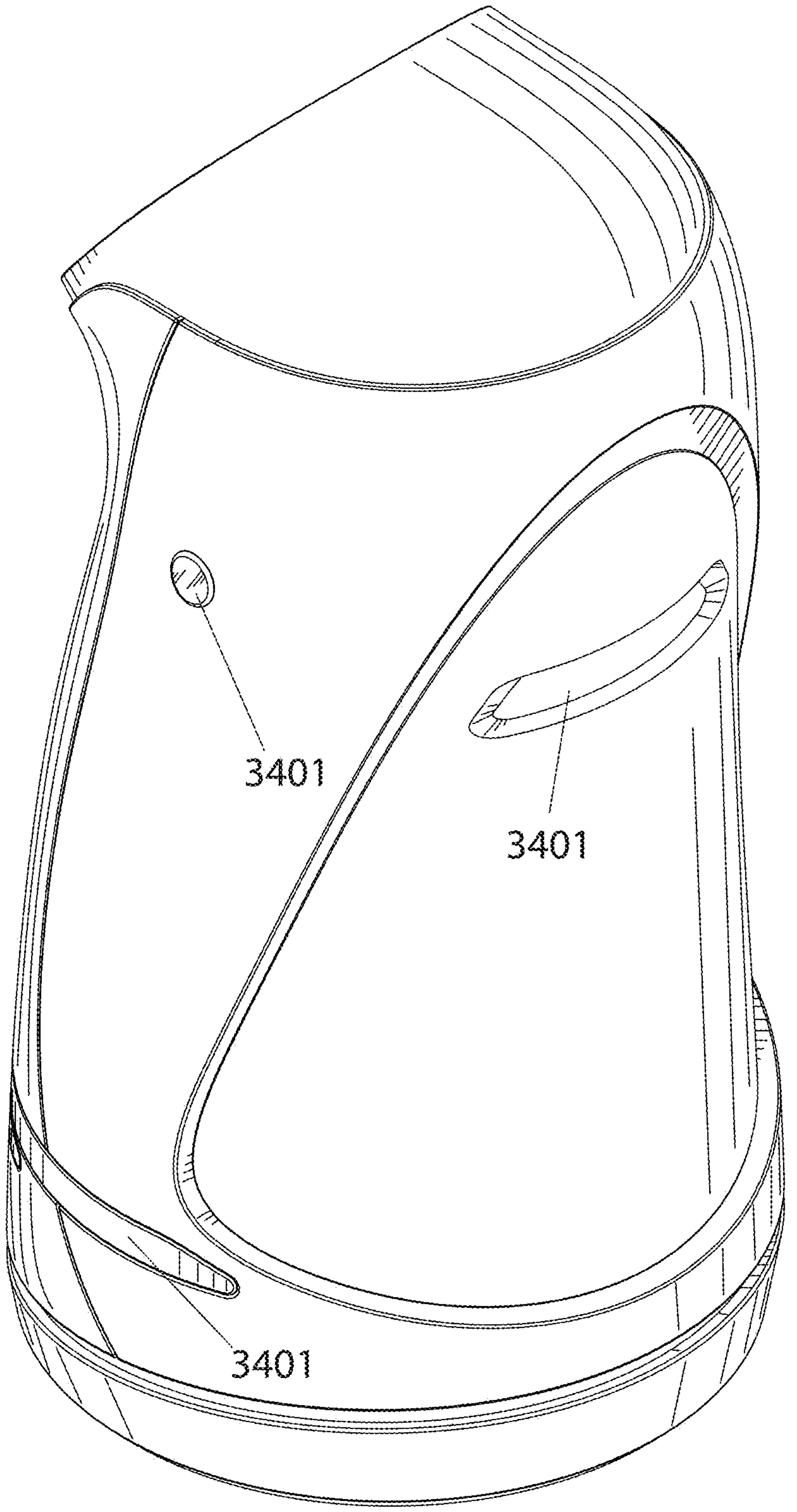
Figure 35:
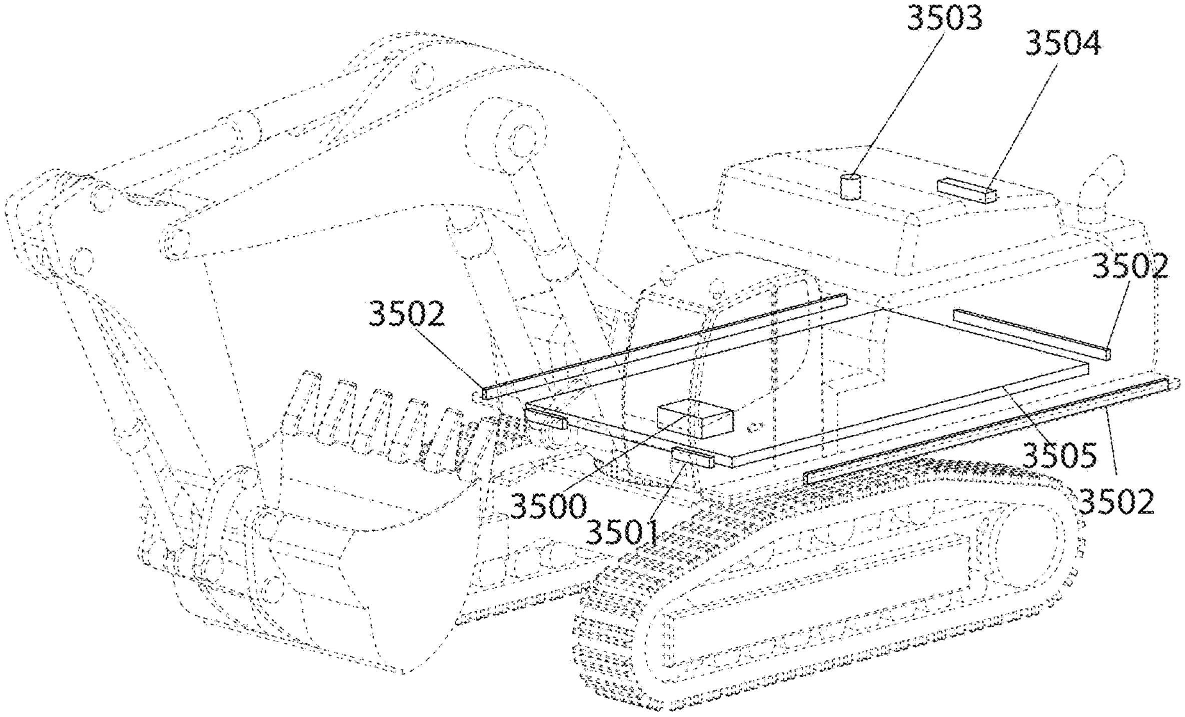
FIG. 35 illustrates an example of a robotic excavator, according to some embodiments.
Figure 36:
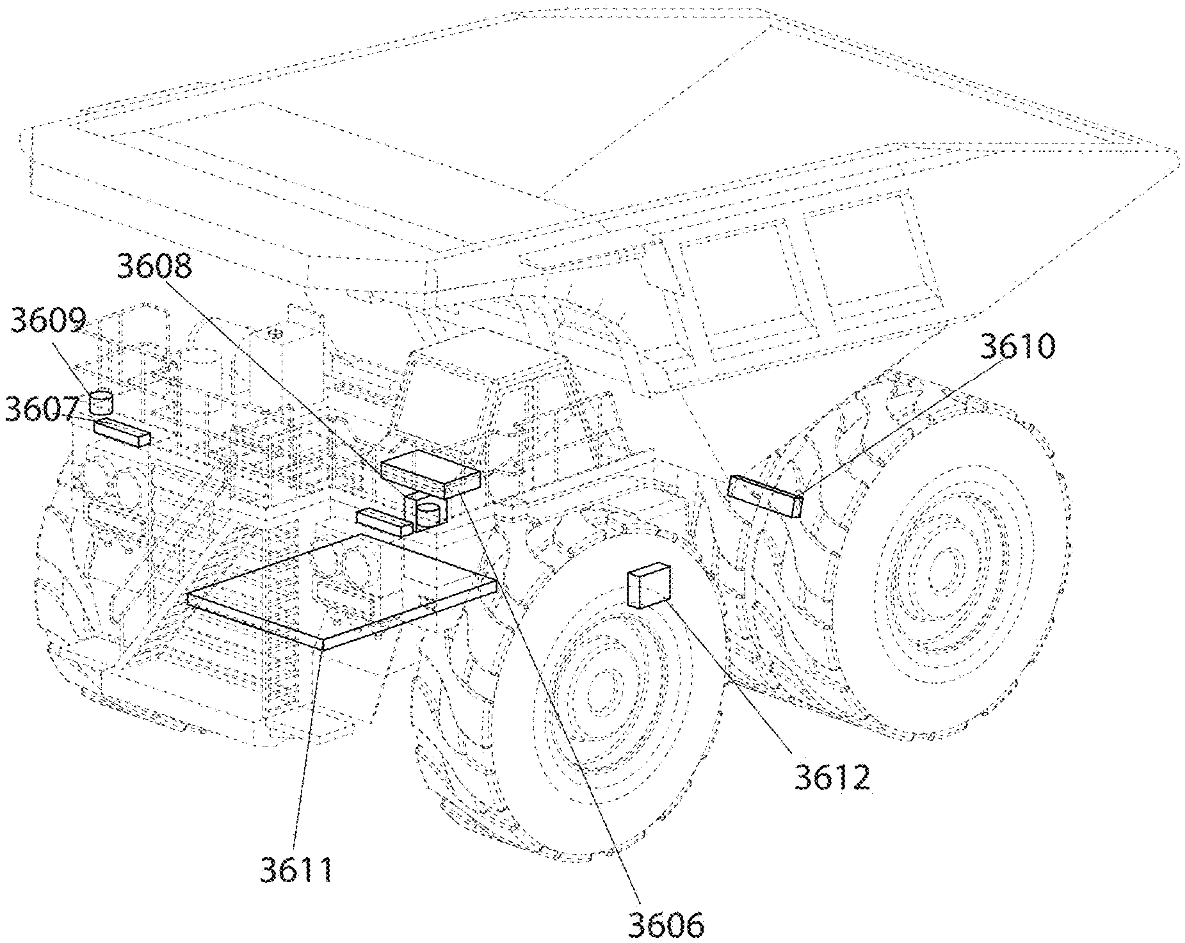
FIG. 36 illustrates an example of a robotic dump truck, according to some embodiments.
Figure 37A:
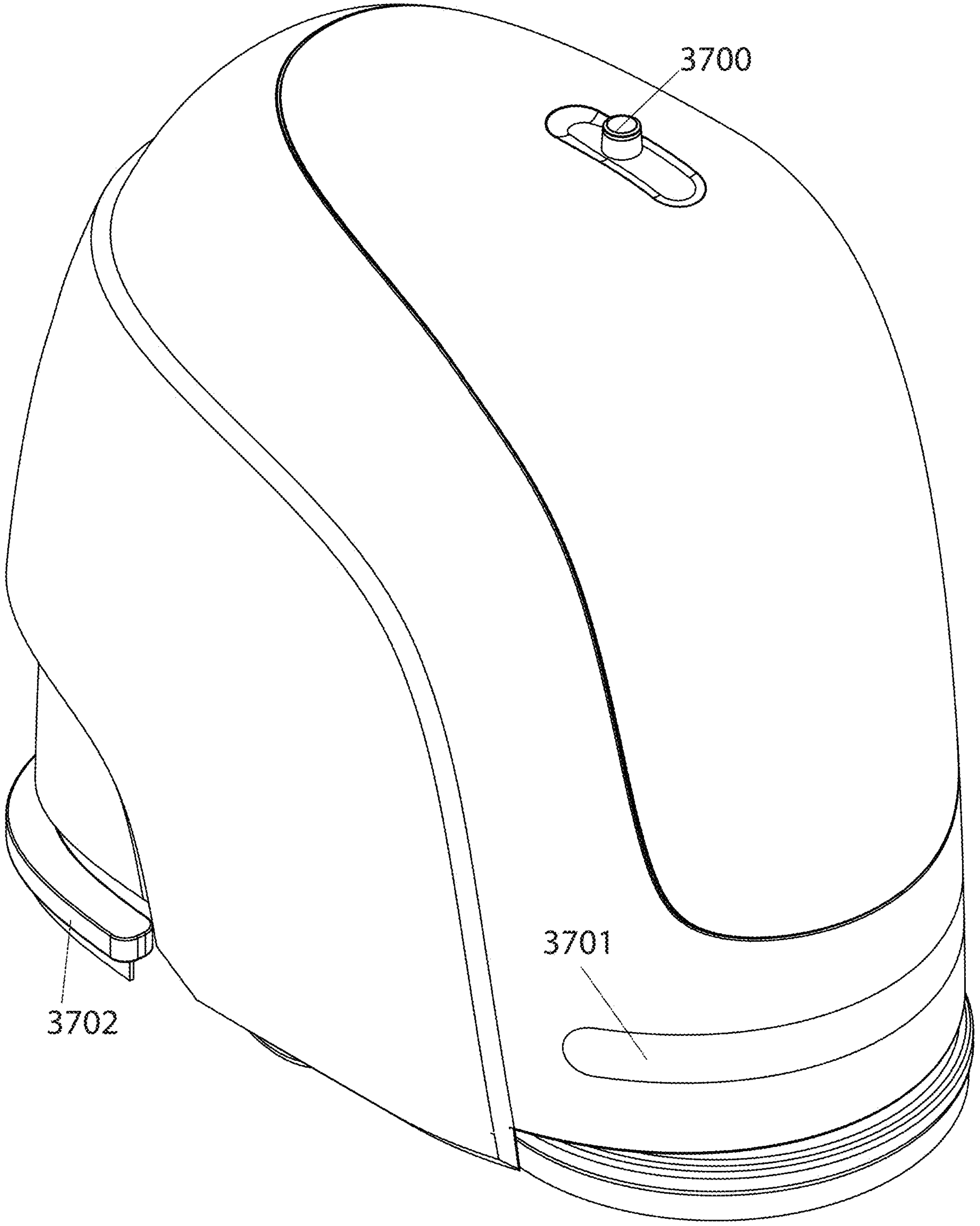
FIGS. 37A and 37B illustrate an example of a commercial floor cleaner, according to some embodiments.
Figure 37B:
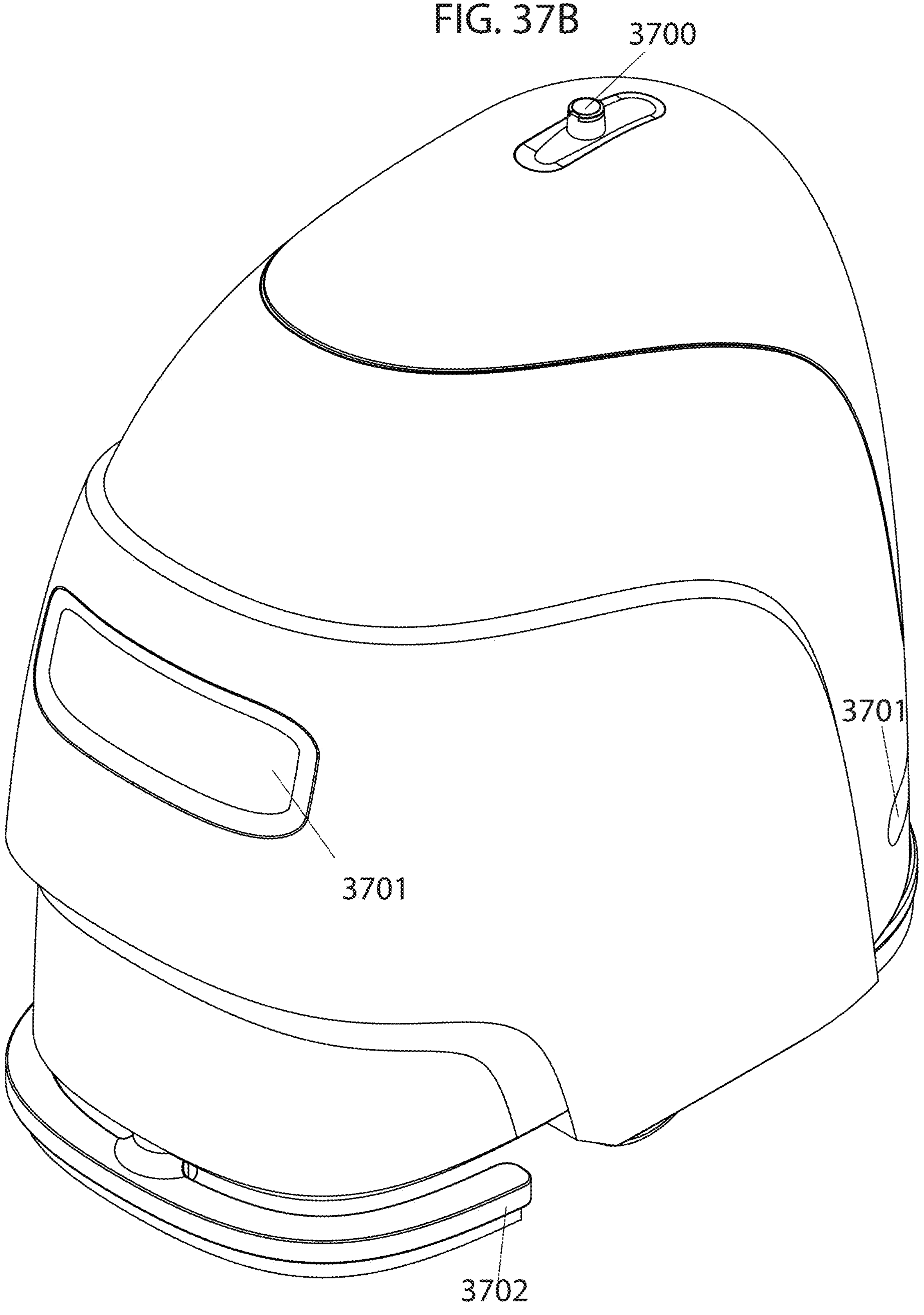

FIGS. 34A and 34B illustrate an example of security service robot including graphical user interface 3400 and sensor windows 3401 behind which sensors are housed. Sensors may include cameras, lasers, inertial measurement unit, and the like. The security service robot may use imaging devices to monitor an environment. In some instances, images captured by sensors of the robot may be viewed by a user using an application of a communication device paired with processor of the security service robot. In some instances, imaging devices record a live video which the user may access using the application. In some cases, the user may use the user interface 3400 or an application paired with the processor to choose an area of the environment for the robot to monitor by selecting the area in a map. In some cases, the user may choose a particular duration for the robot to spend monitoring each different area of the environment. In some instances, the security service robot includes a memory of verified people and may use image recognition technology to verify a detected person. In some cases, the processor notifies the user when an unverified person is detected by sending an alert to the application, by sounding an alarm, or by flashing lights or may alert the authorities. In some instances, processors of two or more security service robots collaborate to monitor areas of an environment, each robot being responsible for a particular area of the environment. Another example includes a robotic excavator illustrated in FIG. 35 with a compartment 3500 including a processor, memory, network card, and controller, one of two cameras 3501, sensor arrays 3502 (e.g., TOF sensors, sonar sensors, IR sensors, etc.), a LIDAR 3503, rear rangefinder 3504, and battery 3505. FIG. 36 illustrates an example of a robotic dump truck with a compartment 3606 including a processor, memory, and controller, one of two cameras 3607, sensor array 3608 (e.g., TOF sensors, sonar sensors, IR sensors, etc.), a LIDAR 3609, rear rangefinder 3610, battery 3611, and movement measurement device 3612. In some instances, robotic excavator may autonomously dig a hole in an area of an environment. In some cases, an application of a communication paired with the processor of the robotic excavator may be used to capture images of an environment. In some instances, the application generates a map of the environment by stitching images together at overlapping points. In some cases, the user may rotate the map, viewing the environment in three dimensions. In some cases, the user may choose an area in the map for the robotic excavator to dig using the application. In some cases, the user may draw the shape of the desired hole in two dimensions on the map displayed on the communication device via the application and may further choose the depth of the hole in different locations. In some instances, the application creates a rendering of the requested hole and the user may adjust specifications of the hole and re-render. For example, a user may use the application to capture images of their backyard. The application generates a three dimensional map of the backyard and the user may view the map in two dimensions or three dimensions using the application. The user may draw an oval for a swimming pool in a two dimensional top view of the back yard using drawing tools of the application. The user may specify a shallow depth in first area of the oval, a deep depth in a second area of the oval and in a third area a gradual change in depth between the shallow depth and deep depth. The user views a rendering of the hole created by the application and confirms. The application transmits the map and desired hole to the processor of the robotic excavator. Using SLAM techniques described herein the processor of the robotic excavator digs the oval hole for the swimming pool. In some instances, the processor of the robotic excavator collaborates with the processor of the robotic dump truck, such that the robotic dump truck strategically positions itself to receive the dug dirt from the robotic excavator. In some instances, the robotic dump truck follows the robotic excavator and positions itself such that the robotic excavator is not required to drive to dump the dug dirt. In some instances, a user may specify a location for the robotic dump truck to dump the dirt using the application. In some cases, two or more robotic excavators and/or robotic dump trucks may collaborate using collaboration methods such as those described herein. FIGS. 37A and 37B illustrate yet another variation of a commercial floor cleaner including LIDAR 3700, sensor windows 3701 behind which sensors for SLAM are located (e.g., camera, depth sensing device, laser, etc.), and cleaning tool 3702. The commercial floor cleaner may operate in a similar manner as described above for other surface cleaning robots.

Figure 38A:
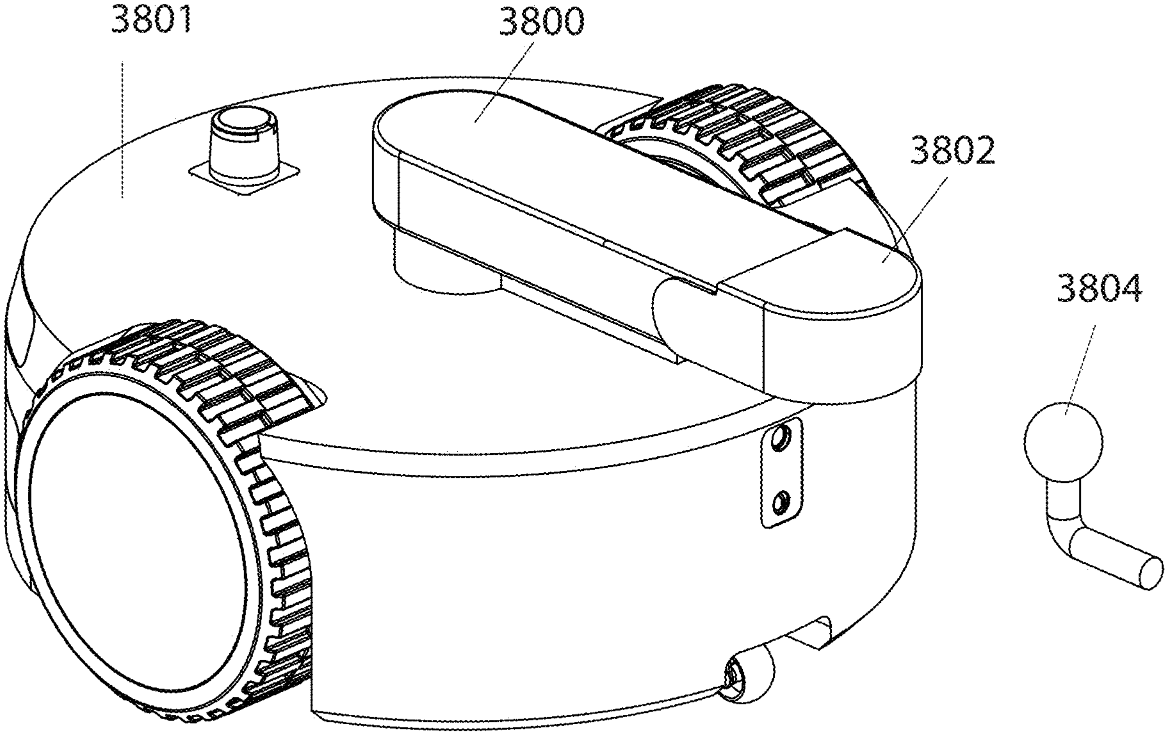
FIGS. 38A-38D illustrate an example of a coupling mechanism, according to some embodiments.
Figure 38B:
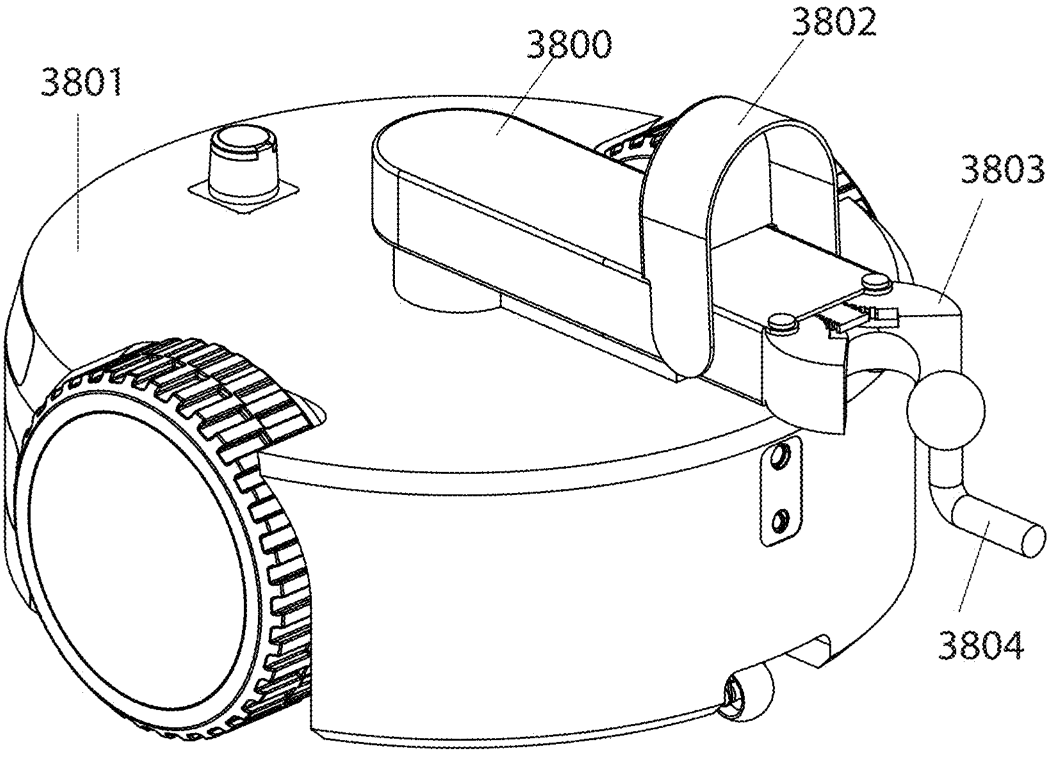
Figure 38C:
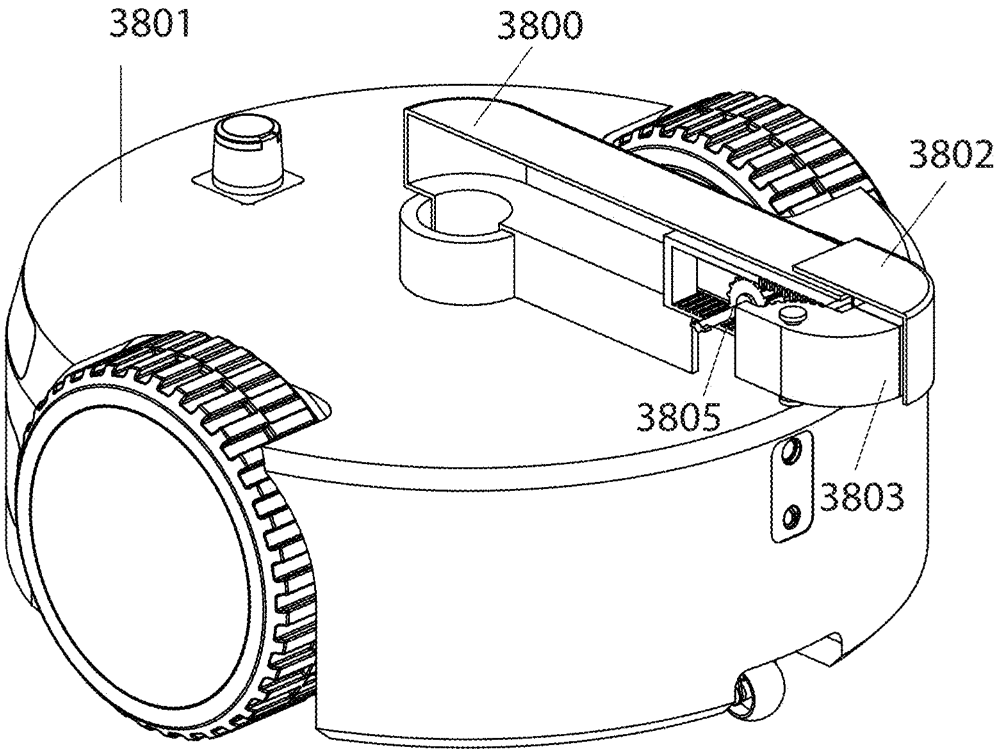
Figure 38D:
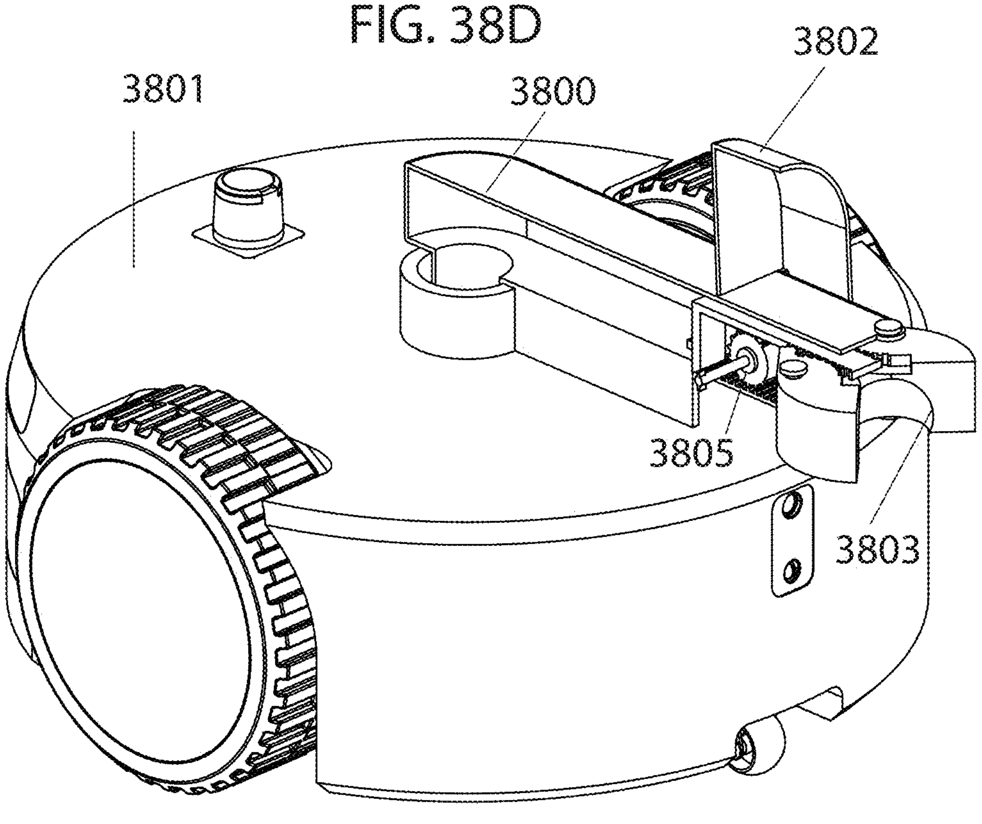
Figure 39A:
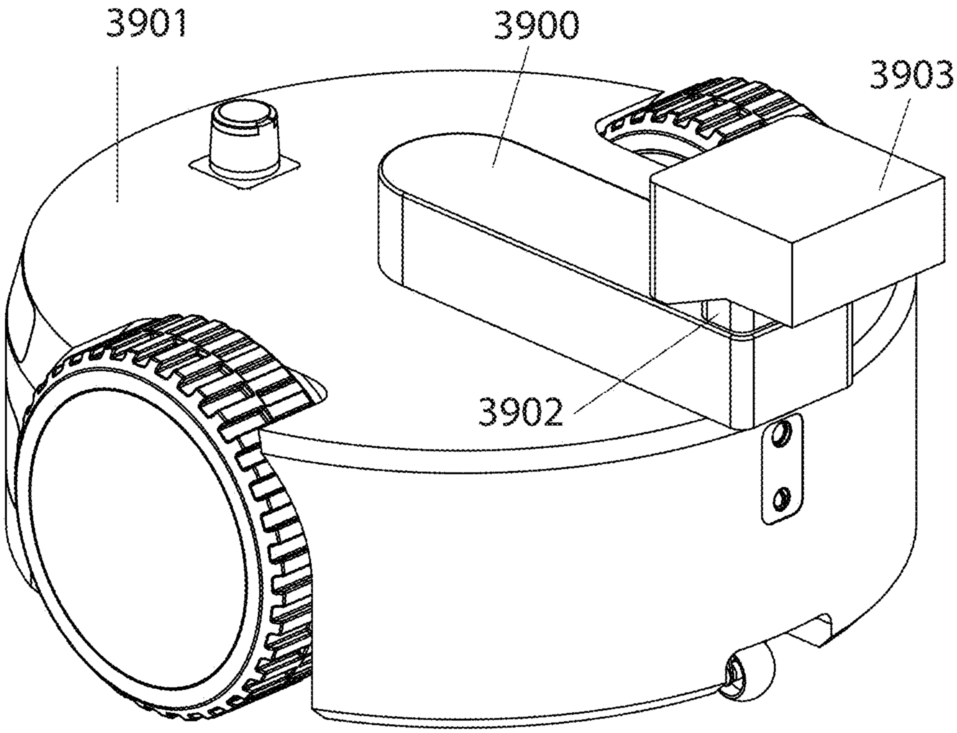
FIGS. 39A and 39B illustrate an example of a coupling mechanism, according to some embodiments.
Figure 39B:
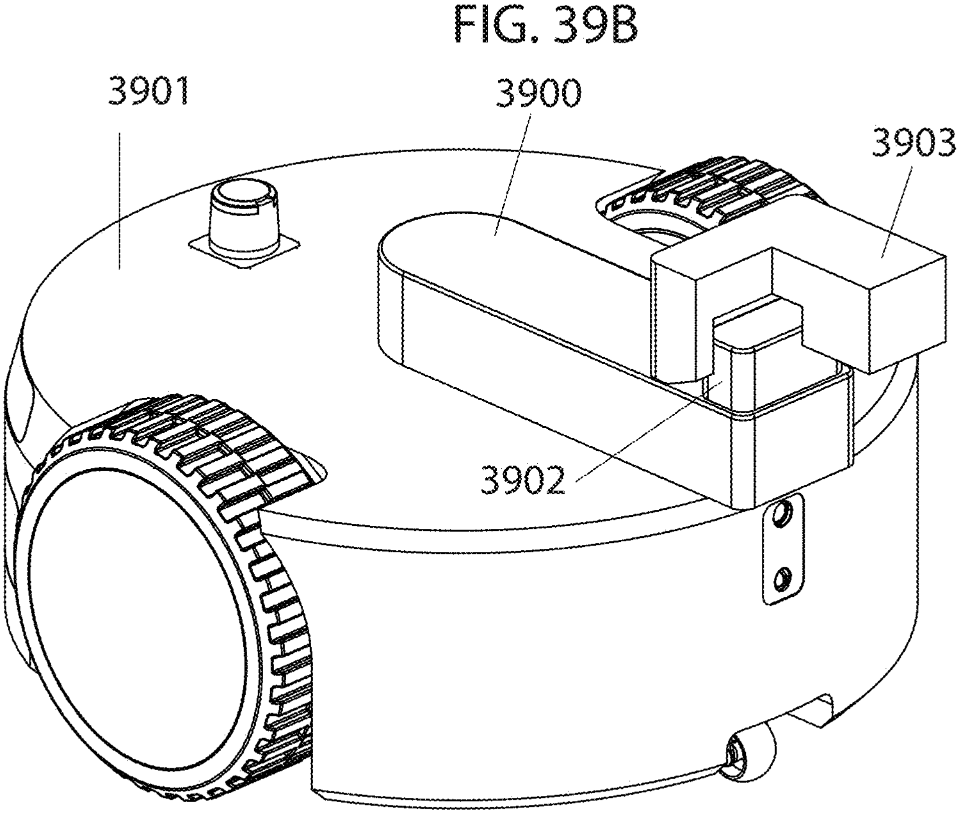
Figure 40A:
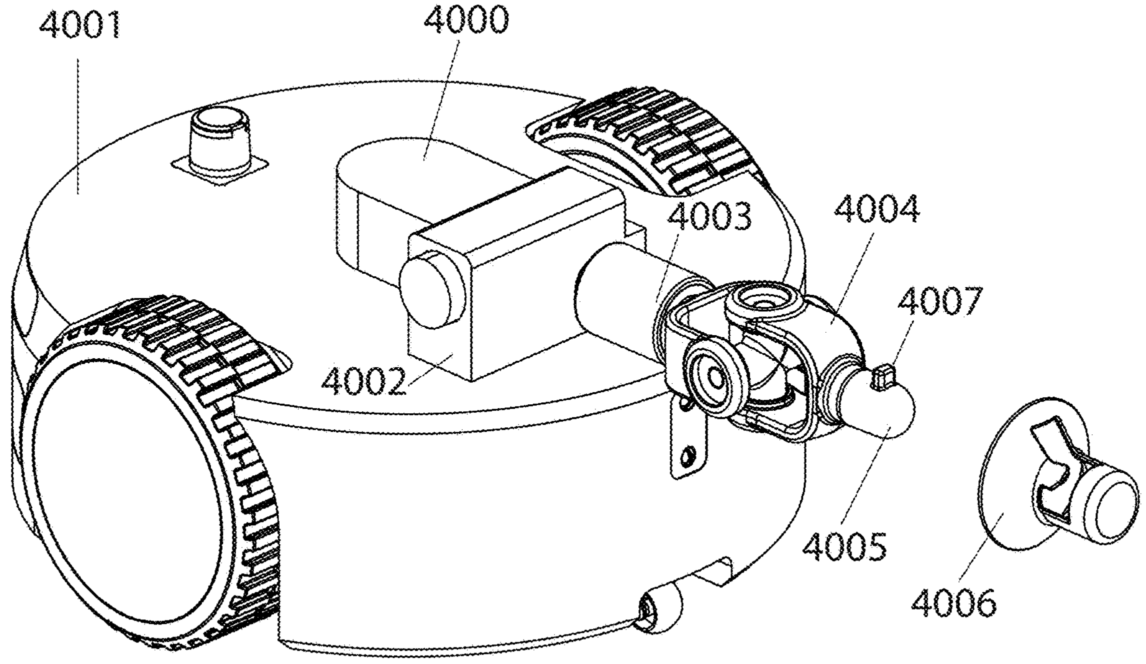
FIGS. 40A-40D illustrate an example of a coupling mechanism, according to some embodiments.
Figure 40B:
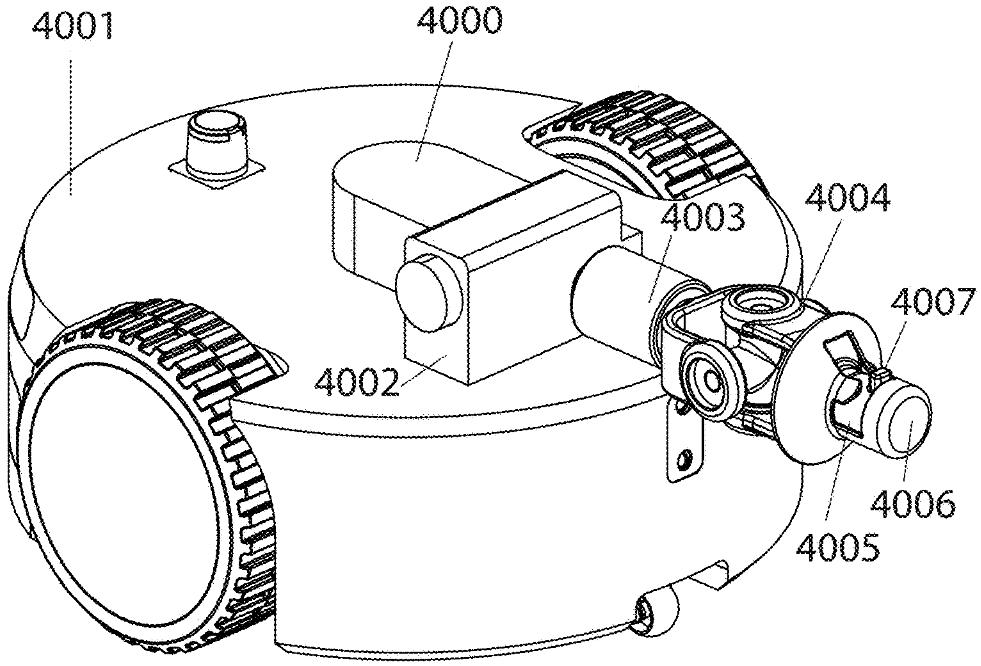
Figure 40C:
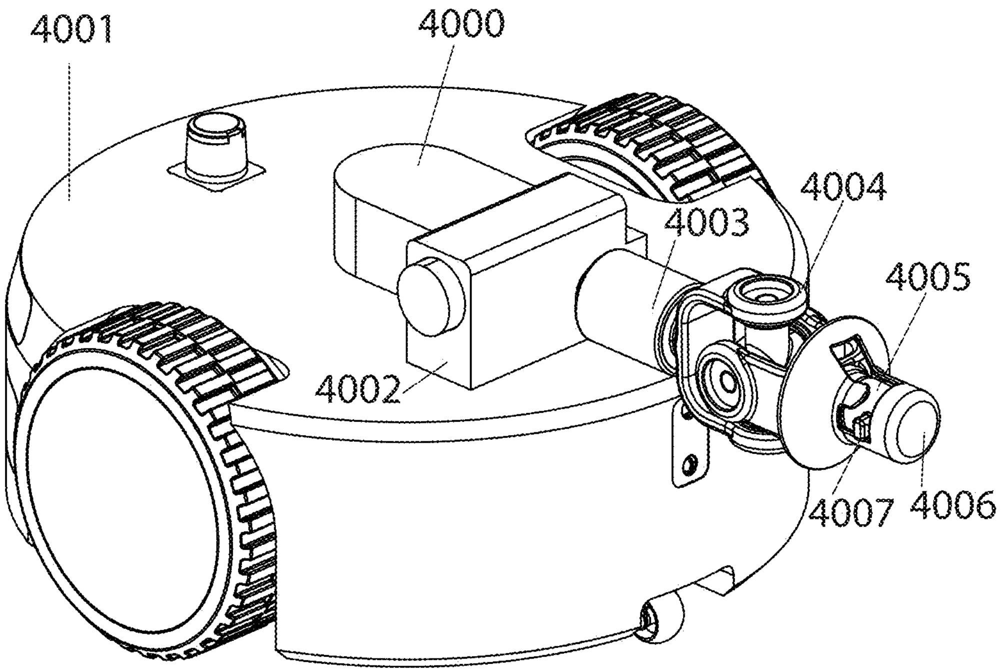
Figure 40D:
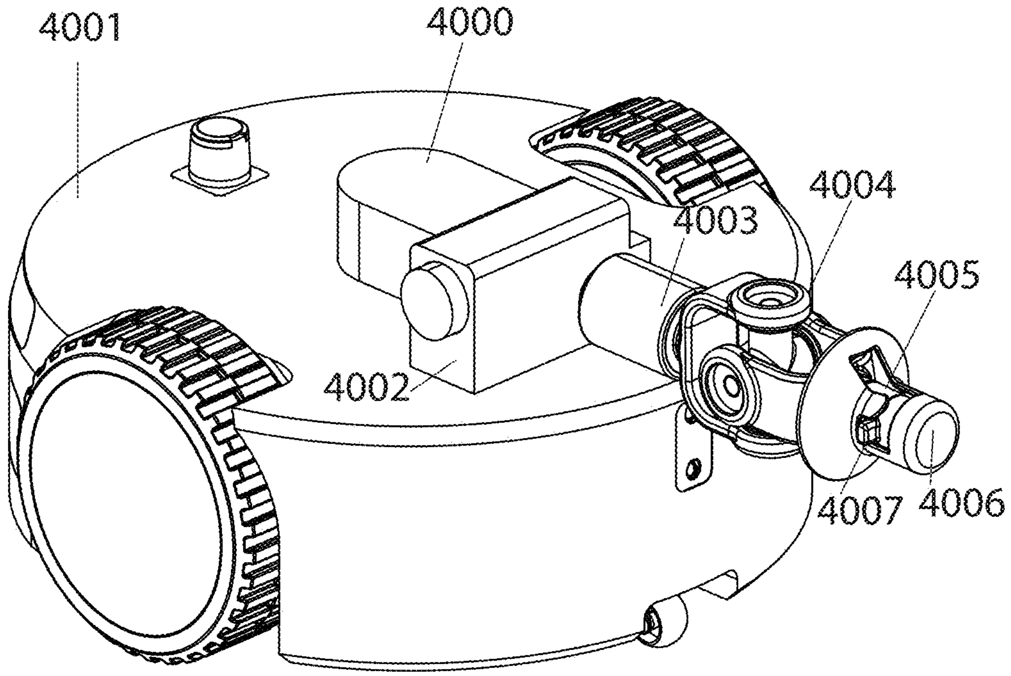

In some embodiments, different coupling mechanisms may be used to couple additional structures to a VMP robot during customization. For example, FIGS. 38A and 38B illustrate an example of a coupling mechanism including connecting arm 3800 connected to VMP robot 3801, cap 3802 rotatably coupled to connecting arm 3800 and clamp 3803 coupled to connecting arm 3800 using a gear mechanism. Clamp 3803 may be used to clamp component 3804 that may be coupled to a larger structure such as a commercial floor scrubber, a wagon, a lawn mower, and the like. Component 3804 may rotate relative to clamp 3803. FIGS. 38C and 38D illustrate a cutaway view of the coupling mechanism including main gear 3805. As main gear 3805 rotates, the cap 3802 and clamp 3803 open and close depending on the direction of rotation. A portion of main gear 3805 is toothless (shown in FIG. 38D) such that rotation of main gear 3805 causes cap 3802 to open or clean before opening or closing clamp 3803. FIGS. 39A and 39B illustrate another example of a coupling mechanism including connecting arm 3900 connected to VMP robot 3901 and extendable arm 3902 that may be extended into an opening of similar shape and size within component 3903. Component 3903 may be coupled to a larger structure such as a seed planter, a shovel, a salt distributor, and the like. Extendable arm 3902 may be extended and retracted using, for example, a solenoid or hydraulics. FIGS. 40A and 40B illustrate yet another coupling mechanism including connecting arm 4000 connected to VMP robot 4001 with motor and gearbox 4002, first link 4003, middle link 4004, and end link 4005. Load receiver 4006 coupled to some payload (e.g., wheel lift, a rake, a disk for farming, etc.) approaches to connect with end link 4005 with pin 4007 fitting within groove 4008 of load receiver 4006. Note that load receiver 4006 is conical to help guide end link 4006 as they approach to connect. Once engaged, motor and gearbox 4002 rotate links 4003, 4004, and 4005, 90 degrees as illustrated in FIG. 40C. This causes pin 4007 to also rotate 90 degrees. As VMP robot 4001 drive forward, pin 4007 will move into the position shown in FIG. 40D thereby connecting the payload with the VMP robot 4001 as it navigates around an environment.

Figure 41B:
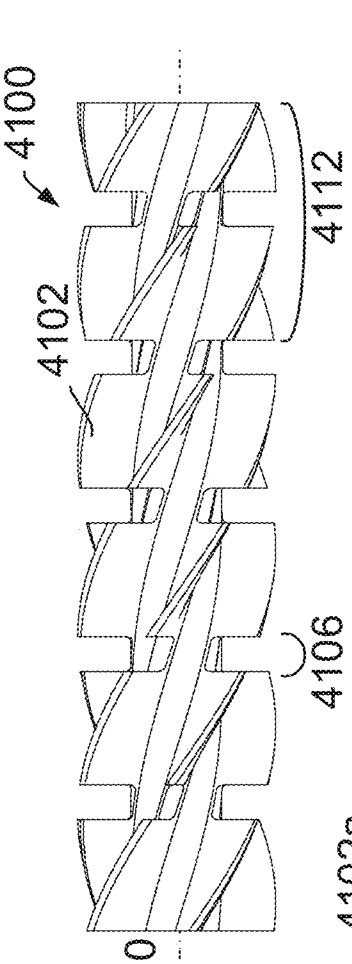
FIGS. 41A-41C illustrate an example of a brush, according to some embodiments.
Figure 41C:
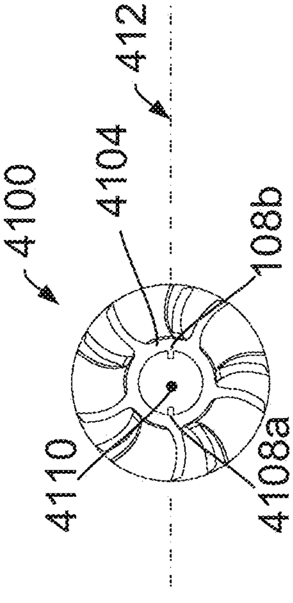
Figure 41A:
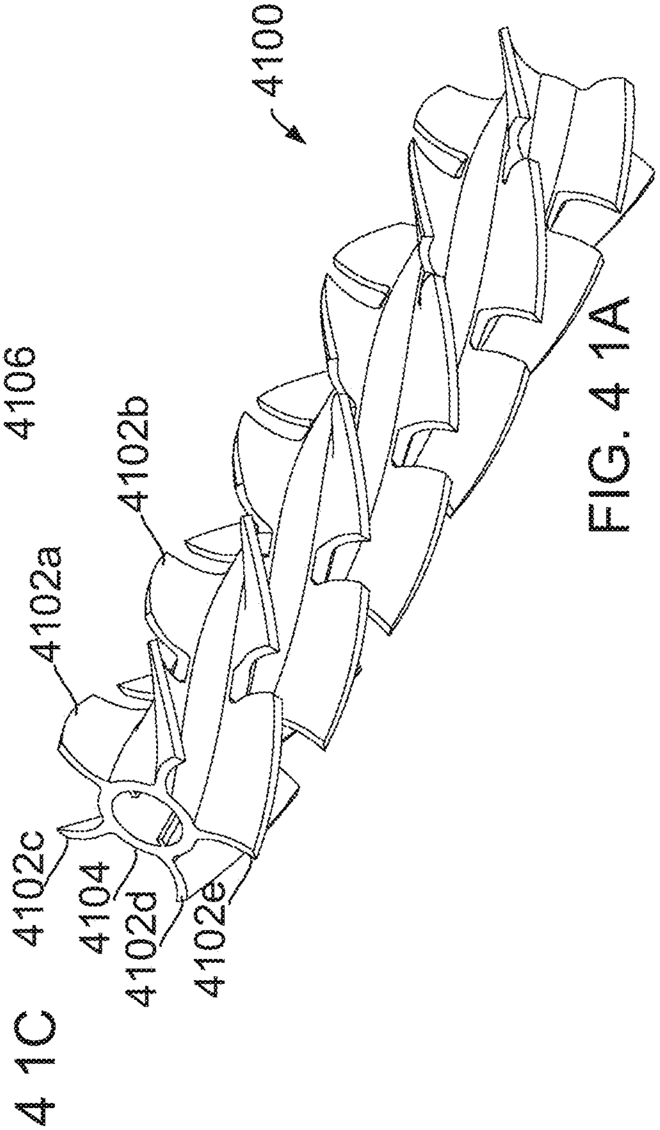
Figure 4:
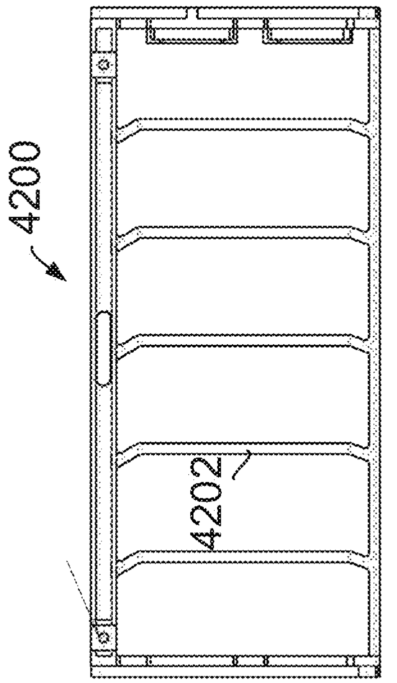
Figure 4:
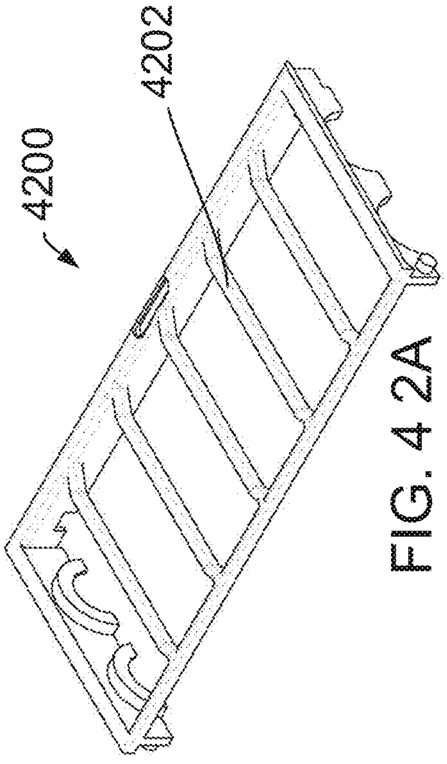
Figure 4:
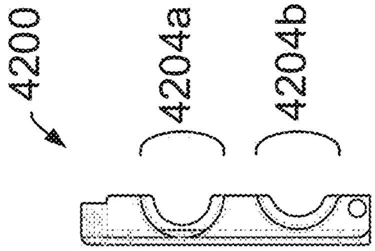
Figure 4:
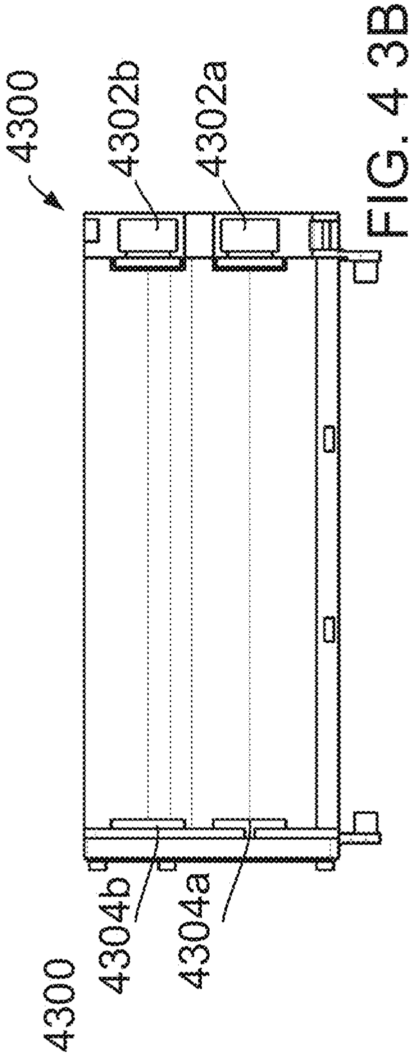
Figure 4:
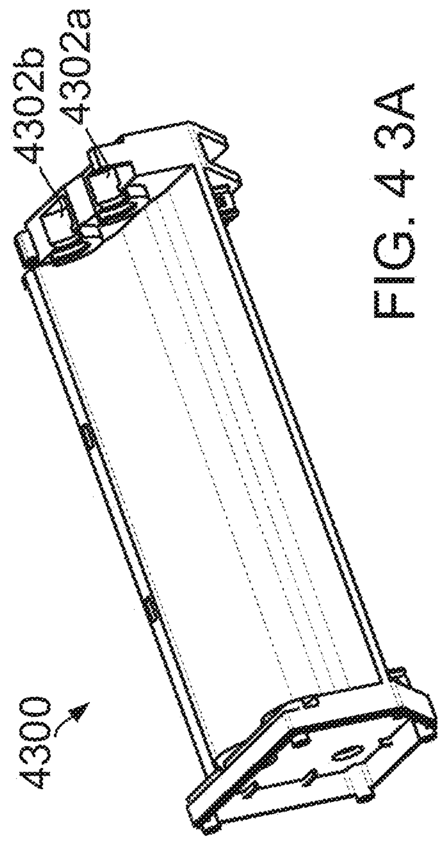
Figure 4:
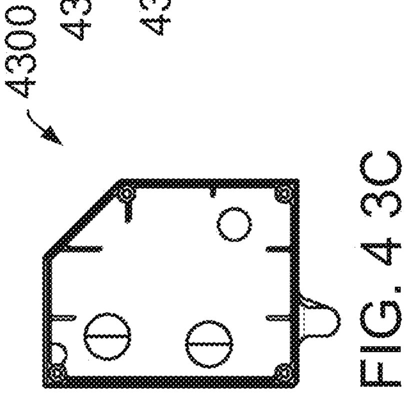
Figure 4:
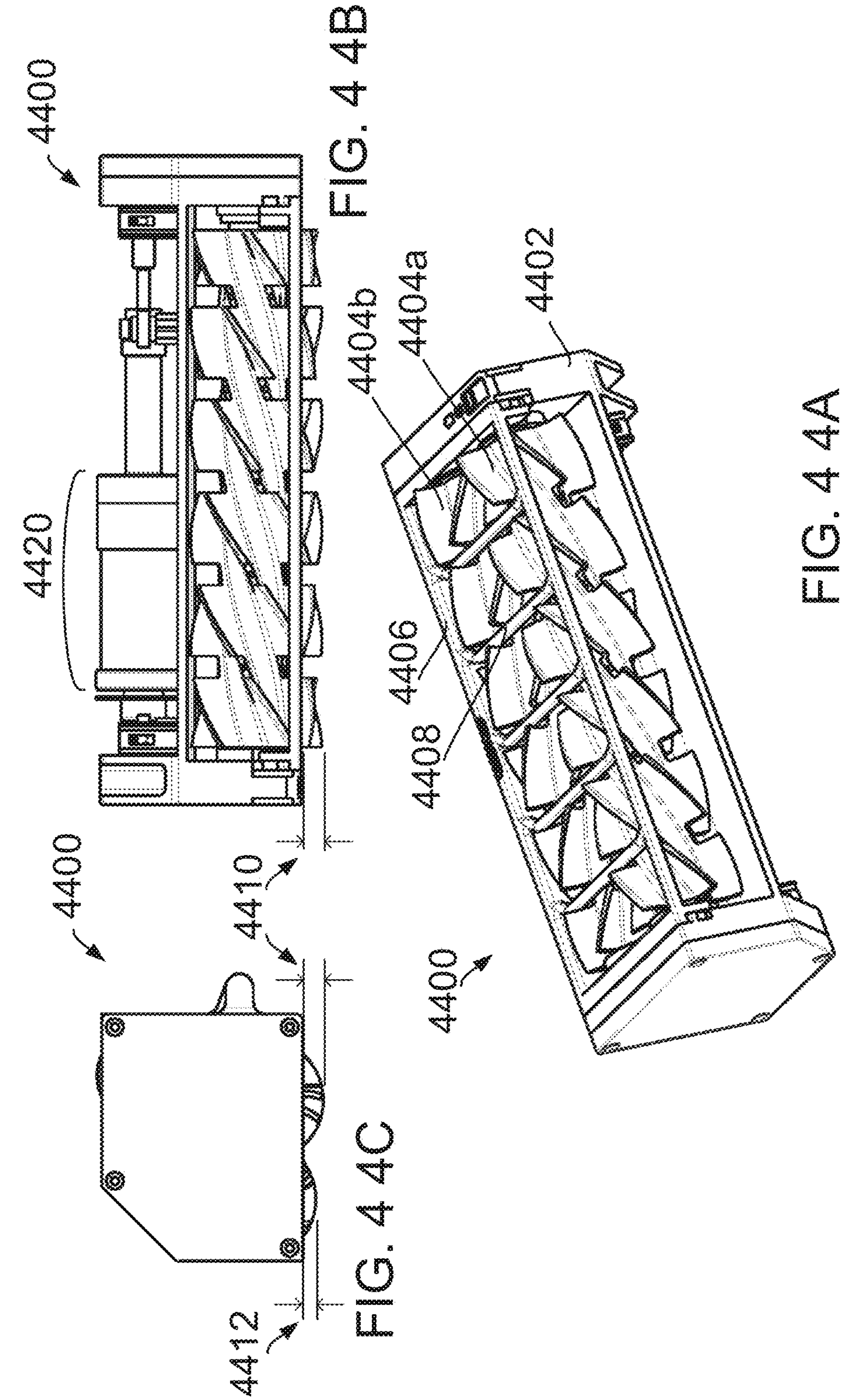
Figure 45A:
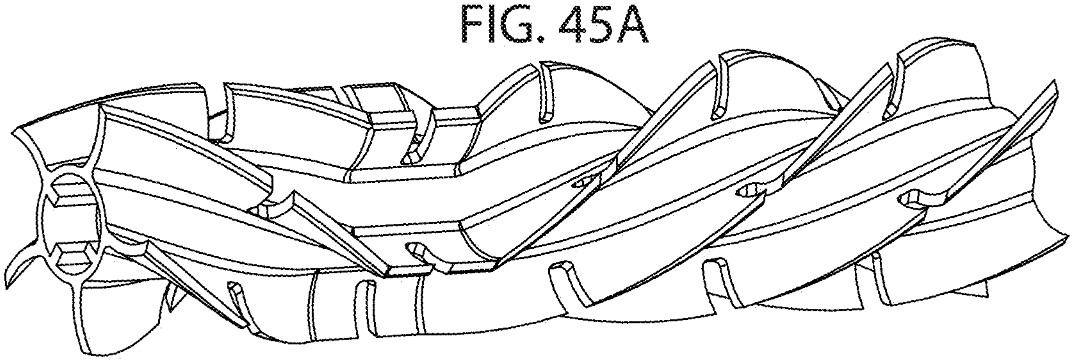
FIGS. 45A-45H illustrate examples of a variation of brushes, according to some embodiments.
Figure 45B:
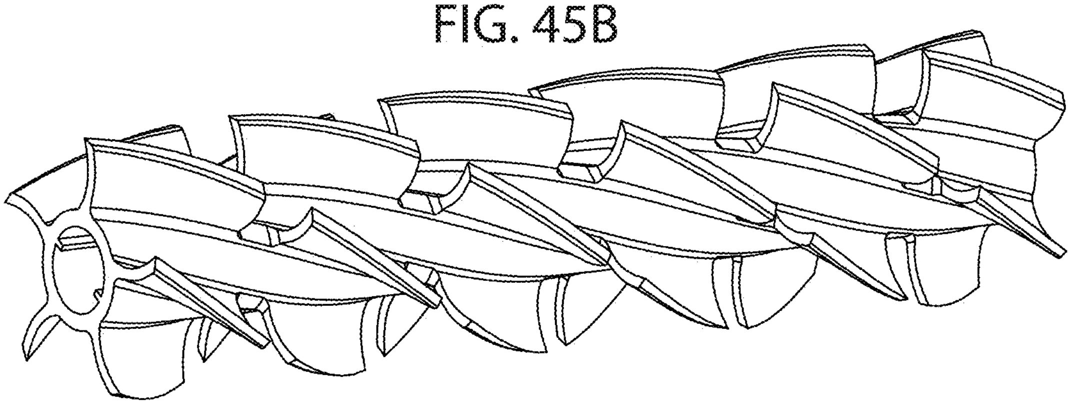
Figure 45C:
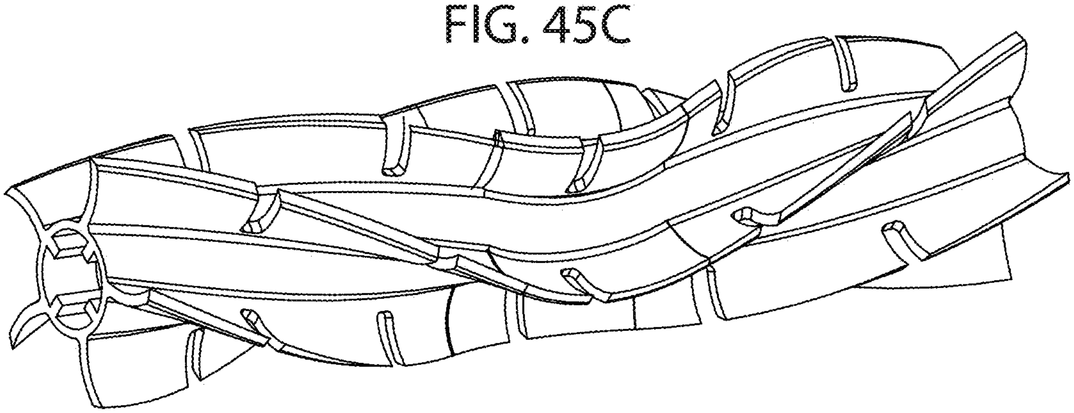
Figure 45D:
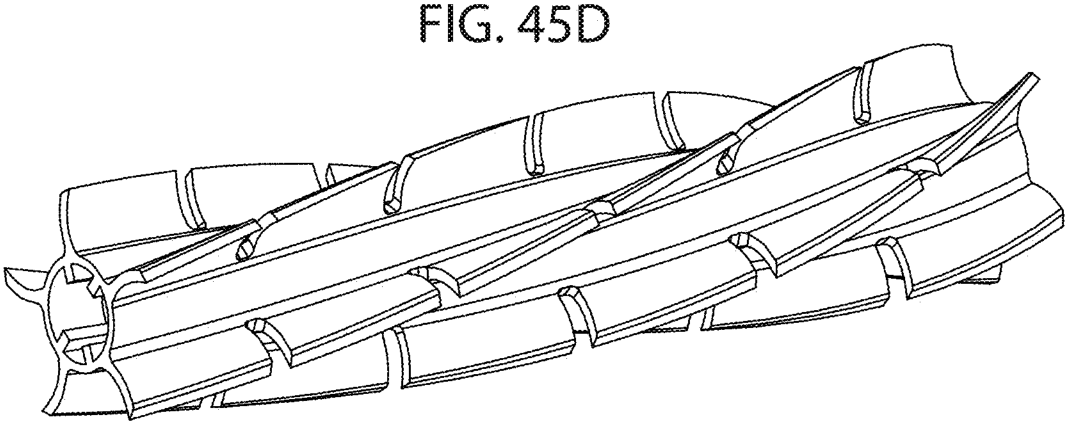
Figure 45E:
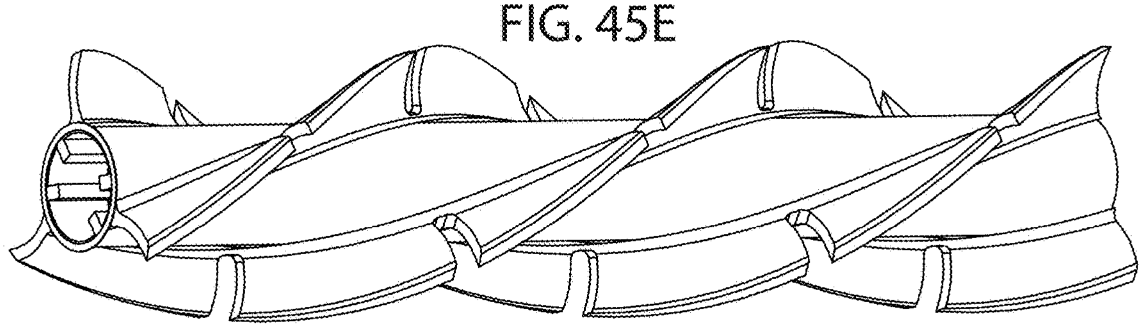
Figure 45F:
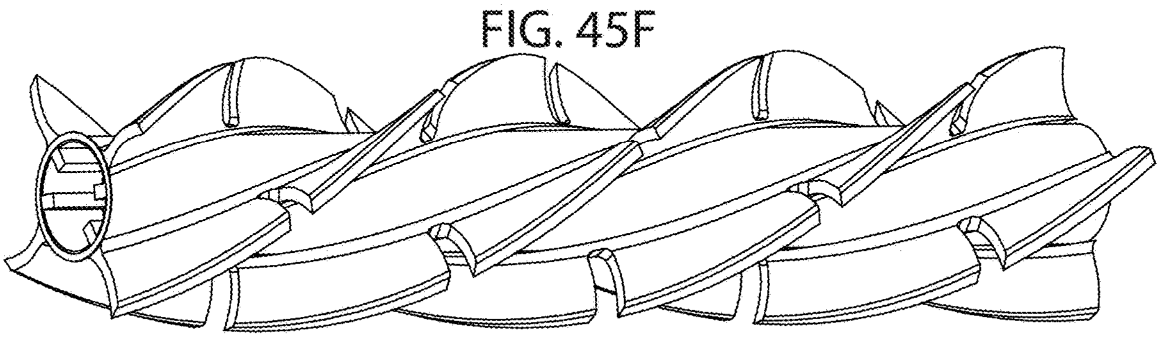
Figure 45G:
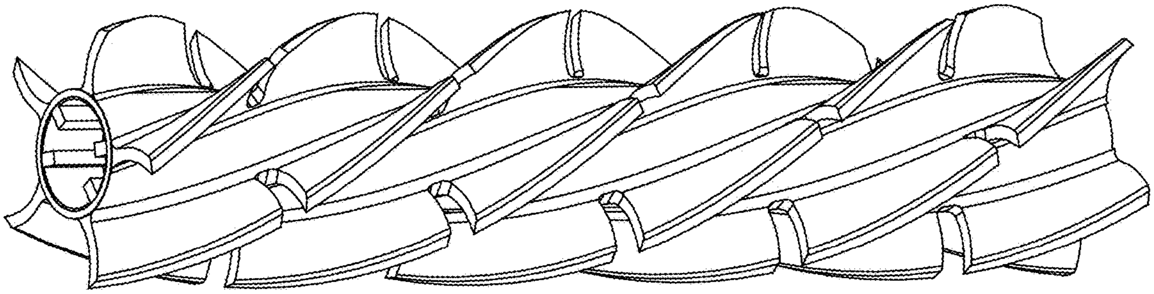
Figure 45H:
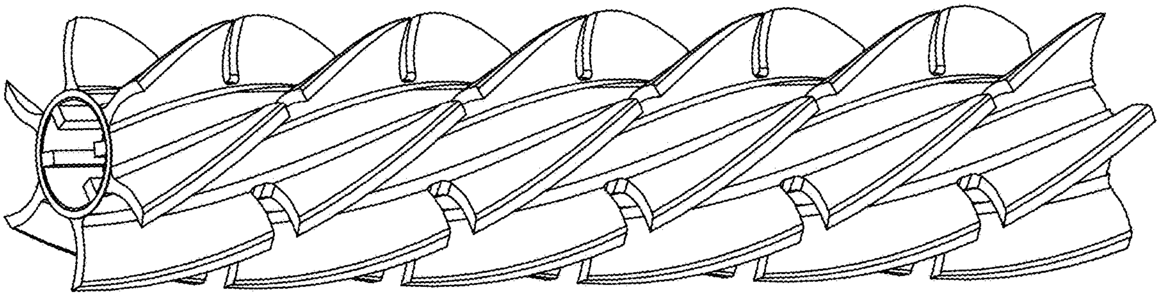

In some embodiments, robotic surface cleaners, such as those illustrated in FIGS. 4 and 5, may include helical brushes. FIGS. 41A-41C illustrate a brush 4100, according to some embodiments, in orthogonal view, front view, and end view, respectively. Brush 4100 may include a number of segmented blades 4102*a*, 4102*b*, 4102*c*, 4102*d*, and 4102*e*. In some embodiments, at least five segmented blades may be used. In some embodiments, at least four segmented blades or other number of blades may be used. In other embodiments, at most six blades may be used. The selection of number of segmented blades may be made based on the size of debris anticipated to be cleaned and the size of the robotic device. For example, fewer segmented blades may be selected to capture larger debris more effectively while more segmented blades may be selected to capture smaller debris more effectively. Although only five segmented blades are illustrated, one skilled in the art will readily recognize that other numbers of segmented blades may be enabled from this representative illustration. Each of segmented blades 4102*a* to 4102*e* may be positioned in a spiral path along hollow blade root 104 and mechanically coupled therewith. Segmented blades may be mechanically coupled with a hollow blade root in any manner known in the art without departing from embodiments provided herein. Furthermore, segmented blades 4102*a* to 4102*e* may be positioned equidistant from one another. This positioning allows for two counter-rotating brushes to be interleaved. FIG. 41B illustrates a number of cut-outs 4106 extending along each segmented blade 4102. Cut-outs may be sized and positioned to accommodate clearance of brush guard bars. This allows a portion of the segmented blade to extend beyond the brush guard. In addition, for FIG. 41B, blade ends 4112 may be rounded, wherein the contact edge of each segmented blade may be rounded or semi-rounded to provide for a gentler action on a cleaning surface and improve debris capture and pickup. In contrast, a flat blade end may tend to push debris resulting in an inefficient system. FIG. 41C illustrates hollow blade root 4104 defining a cylinder 4110 for receiving a drive axle (not illustrated). In order to mate hollow blade root embodiments with a drive axle, one or more keyways 4108*a* and 4108*b* may be formed along an interior surface of a hollow blade root. As may be appreciated, brushes disclosed herein may be manufactured from a variety of compounds without departing from embodiments disclosed herein. For example, brushes may be manufactured from a material such as, a natural rubber, a polymeric compound, a siliconized polymeric compound, a flexible material, a semi-flexible material, or any combination thereof. Furthermore, materials may be selected having a durometer shore A value in a range of approximately 50 A to 70 A or other range depending on the stiffness desired. In one embodiment, the material may have a durometer shore A value of approximately 60 A, which represents a satisfactory and effective compromise between flexibility and strength. Centerline 120 is provided to illustrate an axis of rotation and centerline of brush embodiments illustrated herein.

FIGS. 42A-42C illustrate an example of a brush guard in orthogonal view, top view, and end view, respectively. Brush guard 4200 includes a number of brush guard bars 4202 that may be positioned substantially perpendicular with a pair of counter-rotating brushes. As noted above, cut-outs may be sized and positioned to accommodate clearance of brush guard bars. This allows a portion of the segmented blade to extend beyond the brush guard. In some embodiments, brush guard bars may be useful to prevent intake of cables and the like. In addition, in some embodiments, brush guards further include a pair of retainers 4204*a* and 4204*b* formed to capture a pair of counter-rotating brushes. Retainers may be positioned along an end of the brush guard.

FIGS. 43A-43C illustrate an example of a housing in orthogonal view, top view, and end view, respectively. Some housing embodiments are provided to contain pairs of interleaved counter-rotating brushes as disclosed herein. Housing 4300 includes at least cradles 4302*a* and 4302*b* for receiving a pair of interleaved counter-rotating brushes. Cradles 4302*a* and 4302*b* may be positioned on one end of housing 4300. End caps 4304*a* and 4304*b* may be positioned along an opposite end of housing 4300 from cradles 4302*a* and 4302*b*. Cradles and end caps may be provided to maintain interleaved counter-rotating brush pairs in a substantially parallel position allowing for interleaved brushes to operate properly.

FIGS. 44A-44C illustrate an example of a brush assembly 4400 in orthogonal view, side view, and end view. Housing 4402 retains interleaved counter-rotating brushes 4402*a* and 4402*b* in a substantially parallel position. Brush guard 4406 has a number of brush guard bars 4408 that may be positioned substantially perpendicular with interleaved counter-rotating brushes 4404*a* and 4404*b*. As noted above, cut-outs may be sized and positioned to accommodate clearance of brush guard bars. This allows a portion of the segmented blade to extend beyond the brush guard. The extension of segmented blades is illustrated at 4410 and 4412. As may be seen, a portion of each interleaved counter-rotating brush may extend from brush guard bars to contact a surface to be cleaned. In some embodiments, the extended portion of each interleaved counter-rotating brush may be different. For example, as illustrated, extension 4410 is greater than extension 4412. This difference may be useful to improve cleaning of debris from surfaces along a particular direction. In some embodiments, the extended portion of each interleaved counter-rotating brush may be substantially equal. In some embodiments, the extension may be from 2 to 12 mm or another range depending on the design. In some embodiments, the difference between extensions may be up to approximately 10 mm. Further illustrated is drive 4420 for providing mechanical rotation for interleaved counter-rotating brushes 4404*a* and 4404*b*. Any drive known in the art may be utilized without departing from embodiments provided herein.

As noted above for FIG. 41, the segmented blades are positioned in a spiral path which allows for interleaving of the counter-rotating blades. Without being bound by theory, it is proposed that the rotation of interleaved counter-rotating blades provides a measure of airflow induction that may improve the ability of the brush assembly to capture debris or liquids. As the two brushes rotate in opposite directions air may be trapped in a groove between the meshing helix blades of each brush, causing an increase in the density of air particles and pressure within the groove compared to outside the groove, thereby creating suction. An example of counter-rotating brushes is provided in U.S. patent application Ser. No. 15/462,839, the entire contents of which is hereby incorporated by reference. In other embodiments, various configurations are possible. For example, the two counter-rotating brushes may be of different length, diameter, shape (e.g., the path along which the blades follow, the number of blades, the shape of blades, size of blades, pattern of blades, etc.), and material while the two brushes are rotatably mounted parallel to the floor surface plane and are positioned a small distance from one another such that the blades at least partially overlap. In some embodiments, the two brushes are positioned different distances from the floor surface while remaining a small distance from one another such that the blades at least partially overlap. In some embodiments, more than two brushes are used (e.g., three, four, or six brushes). FIGS. 45A-45D illustrate four examples of different variations of brushes in terms of shape and size of blades that may be used. In some embodiments, a single brush may include a combination of different blades (e.g., shape, size, orientation, etc.). FIGS. 45E-45H illustrate four examples of different variations of brushes in terms of the number of blades.

Figure 46A:
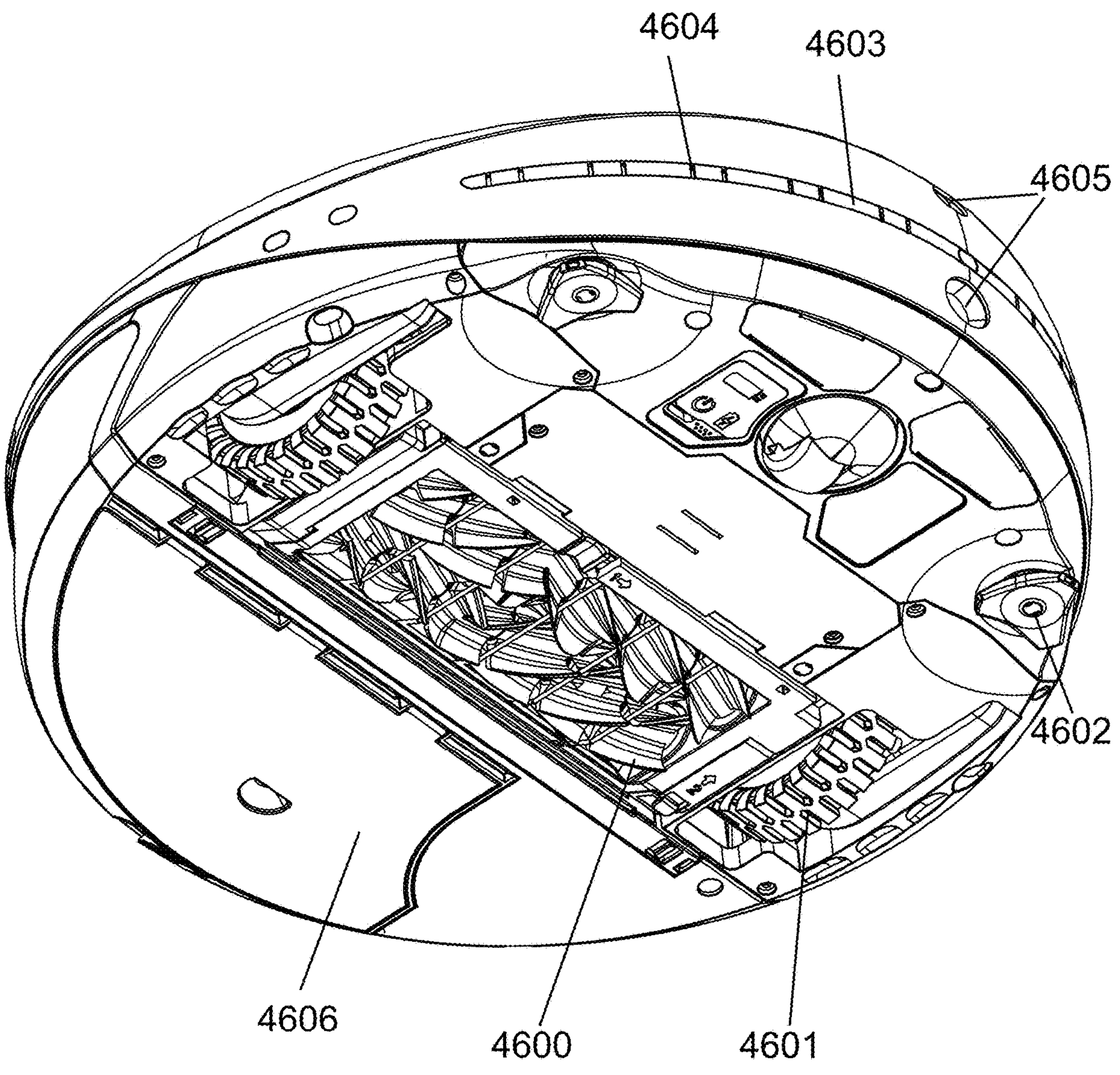
FIGS. 46A-46C illustrate an example of helical brushes of a robotic surface cleaner, according to some embodiments.
Figure 46B:
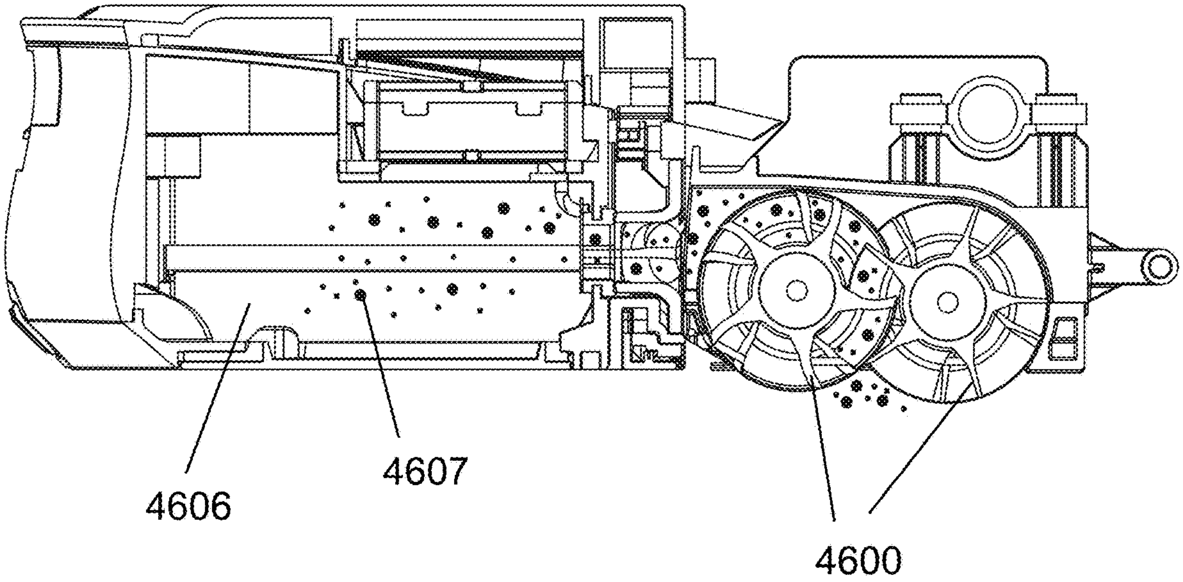
Figure 46C:
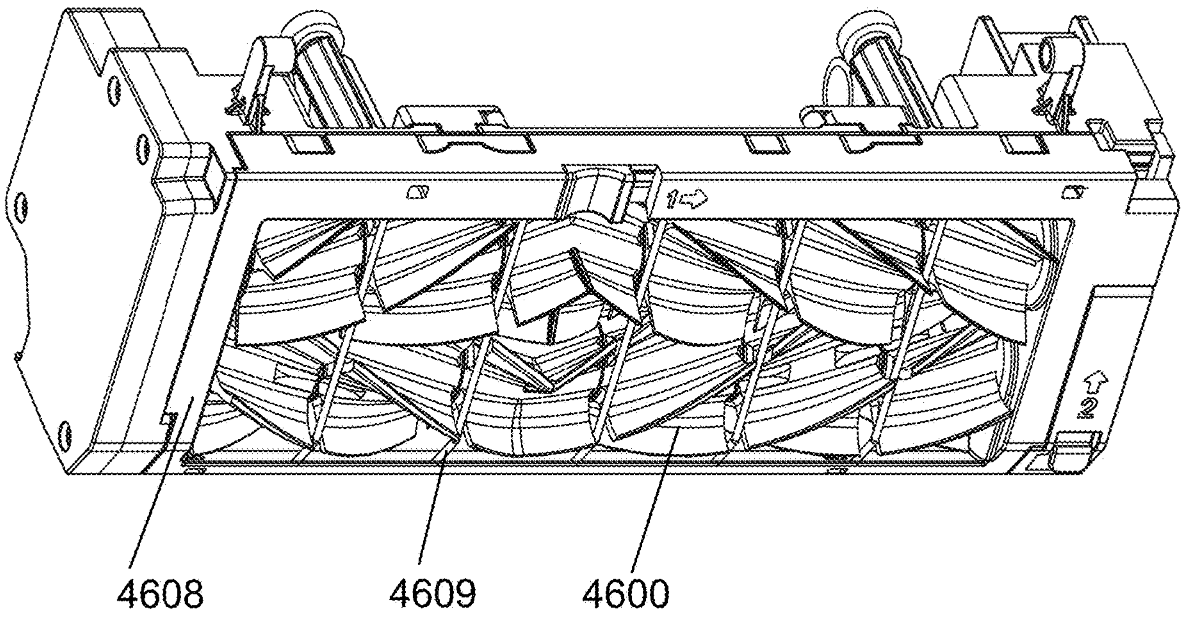

FIG. 46A-46C illustrate an example of helical brushes of a robotic surface cleaner. FIG. 46A illustrates a bottom perspective view of a robotic surface cleaner with two interacting helical brushes 4600, wheels 4601, side brushes 4602 (bristles not shown), sensor window 4603 with openings 4604 behind which sensors, such as obstacle sensors, are housed, additional sensors 4605 (e.g., camera, laser, TOF sensor, obstacle sensor, etc.), and dustbin 4606. FIG. 46B illustrates a cutaway side view of the two helical brushes 4600 and dustbin 4606. A path of the dust and debris 4607 is illustrated, the dust and debris 4607 being suctioned from the floor in between two meshing flaps and into the dustbin 4606, the two meshing flaps creating an additional vacuum as described above. FIG. 46C illustrates a perspective view of the brush compartment, with helical brushes 4600 and brush guard 4608, the bars 4609 positioned such that they align with the spacing in between the flaps of the helical brushes 4600. In some embodiments, robotic surface cleaners may include one or more side brushes. Examples of side brushes are described in U.S. Patent Application Nos. 62/702,148, 62/699,101, Ser. Nos. 15/924,176, 16/024,263, and 16/203,385, the entire contents of which are hereby incorporated by reference. In some embodiments, the one or more side brushes may include a side brush cover that reduces the likelihood of entanglement of the side brush with an obstruction. An example of a side brush cover is disclosed in U.S. patent application Ser. No. 15/647,472, the entire contents of which is hereby incorporated by reference.

In some embodiments, brush assemblies may be coupled with a vacuum assembly. Vacuum assemblies are well-known in the art and, as such, any vacuum assembly in the art may be utilized without departing from embodiments provided herein. For example, a vacuum assembly may include a stationary or mobile configuration where brush assembly embodiments are in direct contact with a surface to be cleaned. In those examples, a vacuum assembly may follow the brush assembly to collect and store debris. One skilled in the art will readily recognize that brush assembly embodiments may be mechanically coupled in any number of manners to a vacuum assembly to provide a vacuum cleaner. In some embodiments, vacuum assemblies may be automatically or manually operated without limitation.

In some embodiments, robotic surface cleaners may include a spinning brush subsystem with a rotating assembly. In some embodiments, the rotating assembly comprises a plate with attached components such as, cleaning apparatuses, vacuum motor and debris container, and at least a portion of a mechanism for rotating the assembly. For example, the rotating assembly may include one of two components of a rotating mechanism, such as a gear, while the other portion of the rotating mechanism may be attached to the casing of the robotic device. In some embodiments, the plate of the rotating assembly may be positioned at the base of the casing of the robotic surface cleaner, such that the plate may be supported by the floor of the casing. In some embodiments, the rotating assembly may rotate in a plane parallel to the working surface at a speed with respect to the static casing of the robotic surface cleaner. In some embodiments, the casing of the robotic surface cleaner may include and/or house components of the robotic device such as, the wheels, wheel motor, control system and sensors. The casing may also include at least a portion of a mechanism for rotating the rotating assembly. For example, the casing may house a fixed motor with a rotating shaft, the rotating shaft fixed to the rotating assembly for rotation. As the rotating assembly rotates the cleaning apparatuses pass multiple times over the portion of the work surface covered by the robotic device. The number of times the cleaning apparatuses pass over the area covered is dependent on the rotational speed of the assembly and the speed of the robotic device. In some embodiments, the rate of rotation of the rotating assembly should allow the rotating assembly, and hence cleaning apparatuses, to rotate 360 degrees at least twice while covering the same area. In some embodiments, the rotational speed of the rotating apparatus adjusts with the speed of the robotic surface cleaner. This increase in coverage in addition to the added friction between cleaning apparatuses and the working surface from rotation of the rotating assembly results in a more thoroughly cleaned area. Cleaning apparatuses may include, but are not limited to, brushes such as roller or flat brushes, mop, cleaning cloth, scrubber, UV sterilization, steam mop, and dusting cloth. In some cases, there is no cleaning apparatus and suction from the motor is purely used in cleaning the area. In some embodiments, the rotating assembly may include two or more cleaning apparatuses. In some embodiments, only a portion of or all of the total number of cleaning apparatuses are operational during cleaning. In some embodiments, different types of cleaning apparatuses may be easily exchanged from the rotating assembly. In some embodiments, the processor of the robotic surface cleaner may operate different cleaning apparatuses during different portions of a cleaning session. In some embodiments, a user or the processor may choose which cleaning apparatuses to use in different areas of the environment (e.g., based on sensor data for the processor).

Several different mechanisms for rotating the rotating assembly may be used. In one embodiment, an electrically driven mechanism is used to rotate the rotating assembly. For example, the plate of the rotating assembly may be used as a gear, having gear teeth around the edges of the plate. The gear plate may then interact with a second gear attached to the casing of the robotic device and rotationally driven by an electric motor. Rotation of the gear driven by the motor causes rotation of the gear plate of the assembly. In a further example, a fixed electric motor with rotating shaft housed within the casing of the robotic device is used to rotate the rotating assembly. The rotating shaft is centrally fixed to the plate of the rotating assembly such that rotation of the shaft driven by the electric motor causes rotation of the rotating assembly. In other embodiments, a mechanically driven mechanism is used to rotate the rotating assembly. For example, rotation of the wheels may be coupled to a set of gears attached to the casing of the robotic device, such that rotation of the wheels causes rotation of the gears. The wheel driven gears may then interact with the plate of the rotating assembly, the plate being a gear with gear teeth around its edges, such that rotation of the wheel driven gears causes rotation of the rotating assembly.

In one embodiment, the rotating assembly rotates in a clockwise direction while in other embodiments the rotating assembly rotates in a counterclockwise direction. In some embodiments, the assembly may rotate in either direction, depending on, for example, user input or the programmed cleaning algorithm. For example, the cleaning algorithm may specify that after every 50 rotations the direction of rotation be switched from counterclockwise to clockwise and vice versa. As a further example, the user may choose the direction of rotation and/or the frequency of alternating direction of rotation. In some instances, the direction of rotation changes back and forth each time the same area is covered by the robot. In yet another embodiment, rotation of the rotating assembly may be set for a predetermined amount of time. This may be set by, for example, the user or the programmed cleaning algorithm. In some embodiments, rotation of the assembly may be activated and deactivated by the user. In yet another embodiment, the speed of rotation of the assembly may be adjusted by the user. In some embodiments, the robotic device operates without rotation of the rotating assembly. In some embodiments, the rotating assembly may be set to oscillate wherein the assembly rotates a predetermined number of degrees in one direction before rotating a predetermined number of degrees in the opposite direction, resulting in an oscillating motion. In some embodiments, the degree of rotation may be adjusted. For example, the assembly may be set to rotate 270 or 180 degrees before rotating the same amount in the opposite direction.

In some embodiments, electrical contacts are placed on the casing of the robotic device and on the plate of the assembly such that electrical contacts on the casing are in constant contact with electrical contacts on the plate during rotation of the assembly. This ensures power may continuously flow to electrical components mounted to the rotating plate of the assembly.

Figure 47:
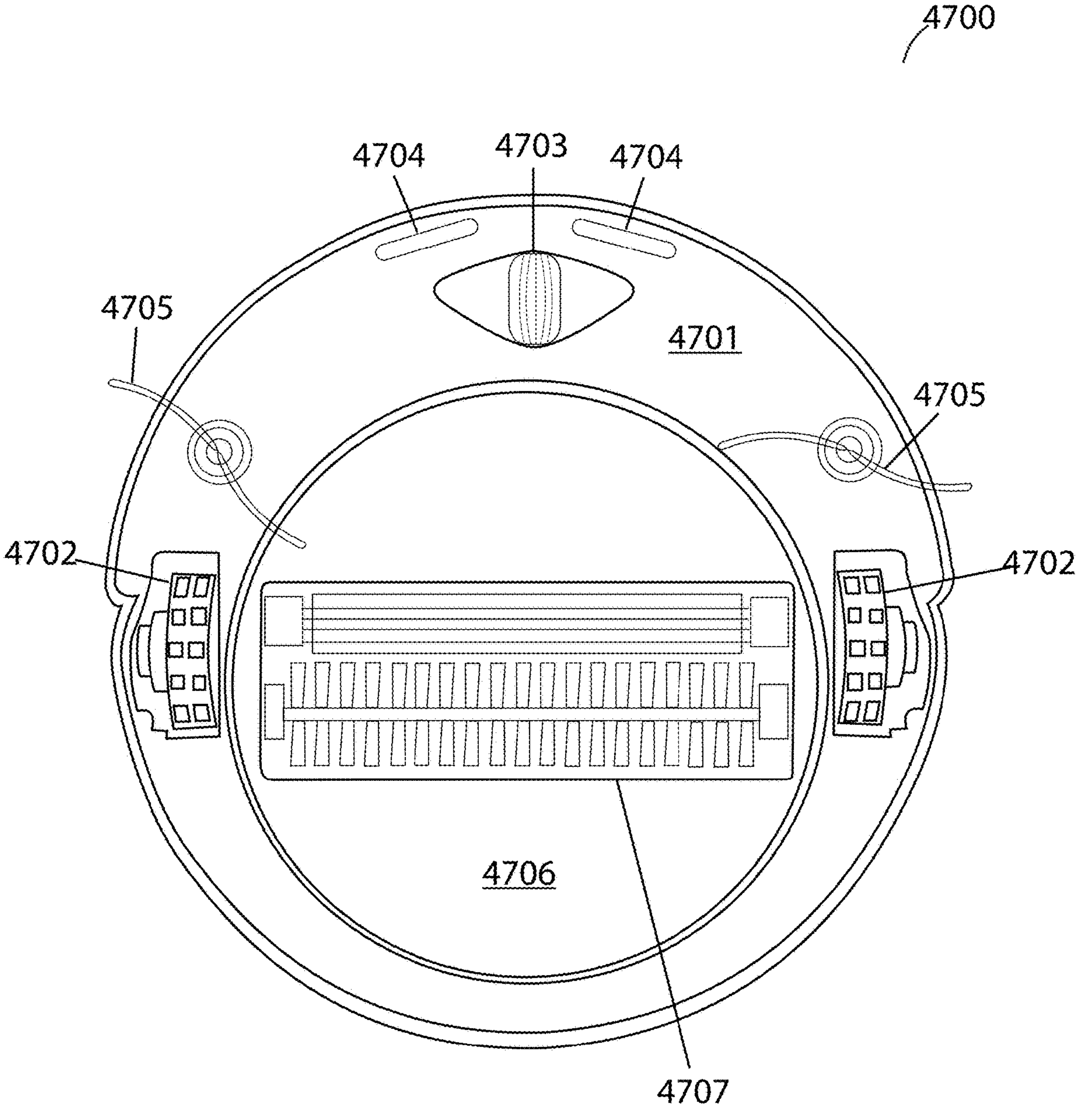
FIG. 47 illustrates a bottom view of a robotic vacuum with a rotating cleaning assembly, according to some embodiments.

FIG. 47 illustrates a bottom view of robotic vacuum 4700 with rotatable assembly 4706. Casing 4701 of robotic vacuum 4700 houses stationary components, including but not limited to, driving wheels 4702, steering wheel 4703, a control system (not shown), batteries (not shown), a processor (not shown) and a means to rotate the assembly 4706 (not shown). Casing 4701 may further house other components without limitation. Components shown are included for illustrative purposes and are not intended to limit the invention to the particular design shown. In the example shown, casing 4701 further houses sensors 4704 and side brushes 4705. Rotating assembly 4706 of robotic vacuum 4700 is supported by and rotates at a predetermined speed with respect to static casing 4701. Assembly 4706 includes main cleaning apparatuses 4707, vacuum motor (not shown), and debris container (not shown). In other embodiments, assembly 4706 may include additional components or any other combination of components than what is shown.

Figure 48A:
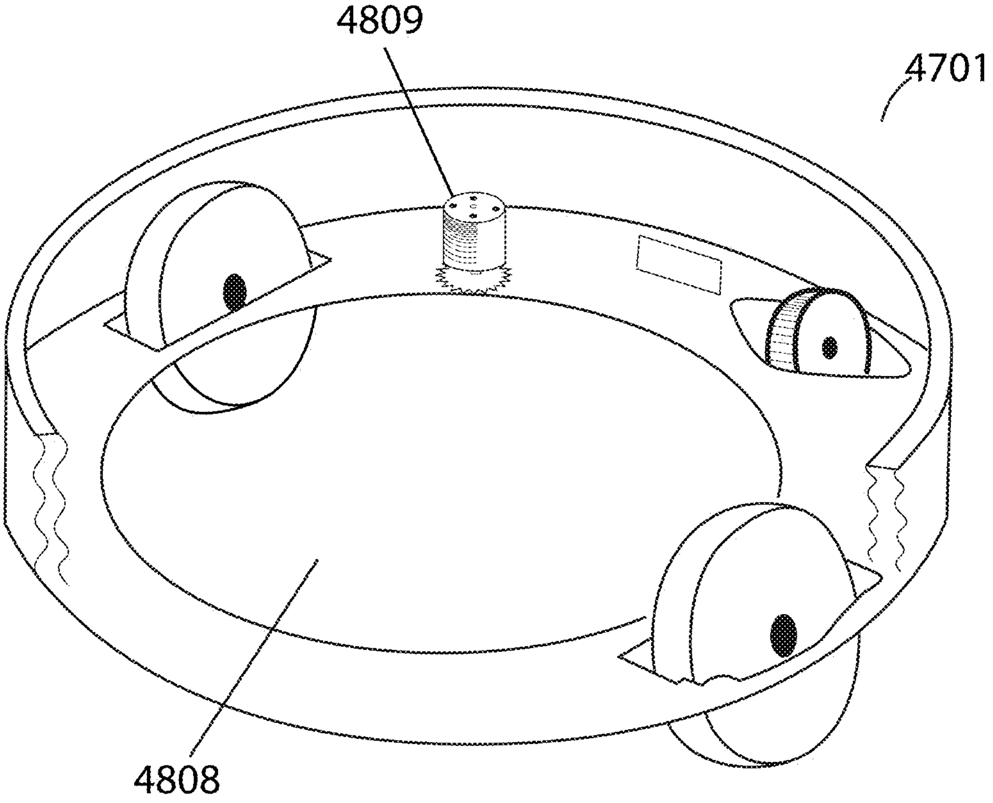
FIG. 48A illustrates a perspective view of the casing of a robotic vacuum, according to some embodiments.
Figure 48B:
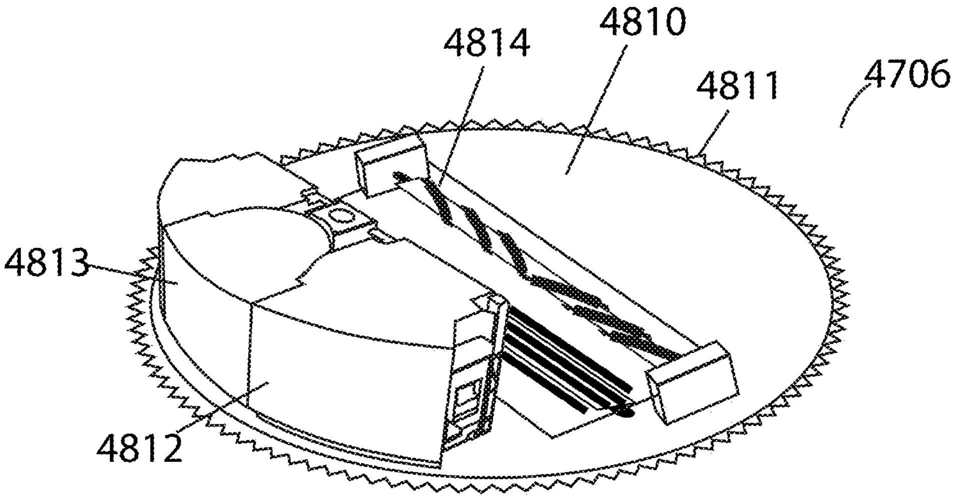
FIG. 48B illustrates a perspective view of the rotating cleaning assembly of a robotic vacuum, according to some embodiments.

FIG. 48A illustrates a perspective view of casing 4701 of robotic vacuum 4700. Rotating assembly 4706 fits within opening 4808 in casing 4701. The diameter of opening 4808 is smaller than the diameter of rotating assembly 4706 such that rotating assembly 4706 may be supported by casing 4701. Electric motor driven gear 4809 rotate assembly 4706. FIG. 48B illustrates a perspective view of rotating assembly 4706 of robotic vacuum 4700. Rotating assembly 4706 comprises plate 4810 with attached debris container 4812, vacuum motor 4813, and cleaning apparatus 4814. In this example, plate 4810 is a gear plate with gear teeth used in rotating assembly 4706. As electrically driven gear 4809 rotates, it interacts with gear teeth of gear plate 4809 causing assembly 4706 to rotate.

In some embodiments, as robotic vacuum 4700 drives through an area, motor and gear set 4809 rotate causing plate 4810 of rotating assembly 4706 to rotate in a plane parallel to the working surface. In some embodiments, the rate of rotation of rotating assembly 4706 should allow rotating assembly 4706, and hence cleaning apparatuses, to rotate 360 degrees at least twice while covering the same area. The rotational speed of the rotating assembly used to achieve at least two full rotations while covering the same area is dependent on the speed of the robotic device, where a high rotational speed is required for a robotic device with increased movement speed.

Figure 49:
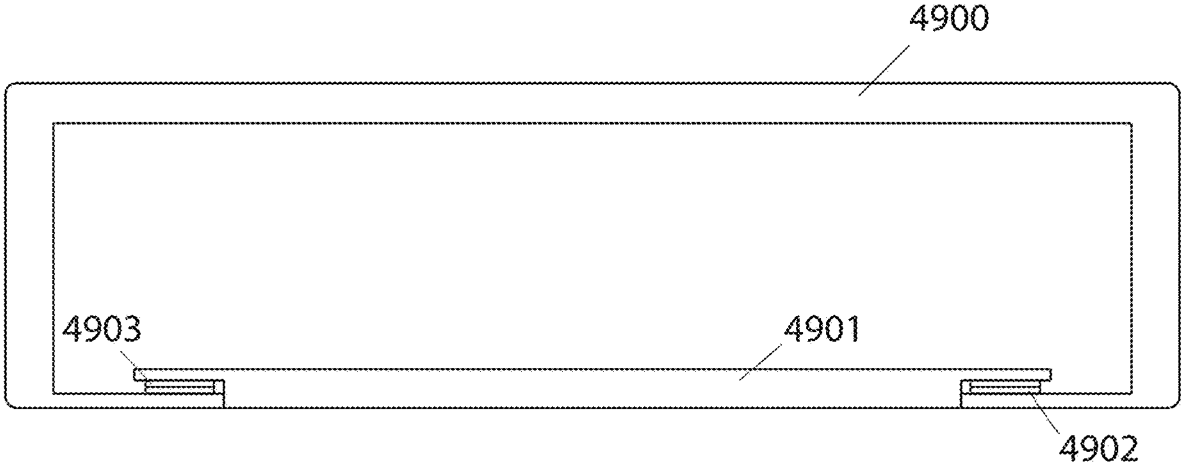
FIG. 49 illustrates a cross-sectional view of a casing and rotating assembly of a robotic vacuum, according to some embodiments.

FIG. 49 illustrates casing 4900 of a robotic vacuum with rotating assembly 4901. In this illustration, there are no components housed within casing 4900 or attached to rotating assembly 4901 for simplicity. The purpose of FIG. 49 is to demonstrate an embodiment, wherein rotating assembly 4901, supported by the floor of robotic vacuum casing 4900, is electrically connected to casing 4900 by electrical contacts. Robotic vacuum casing 4900 contains electrical contacts 4902 and the plate of rotating assembly 4901 contains electrical contacts 4903. In this configuration, electrical contacts 4902 of casing 4900 and electrical contacts 4903 of rotating assembly 4901 are in constant connection with one another as rotating assembly 4901 spins. This ensures any electrical components mounted to rotating assembly 4901 receive electrical power as required during rotation of assembly 4901.

Figure 50A:
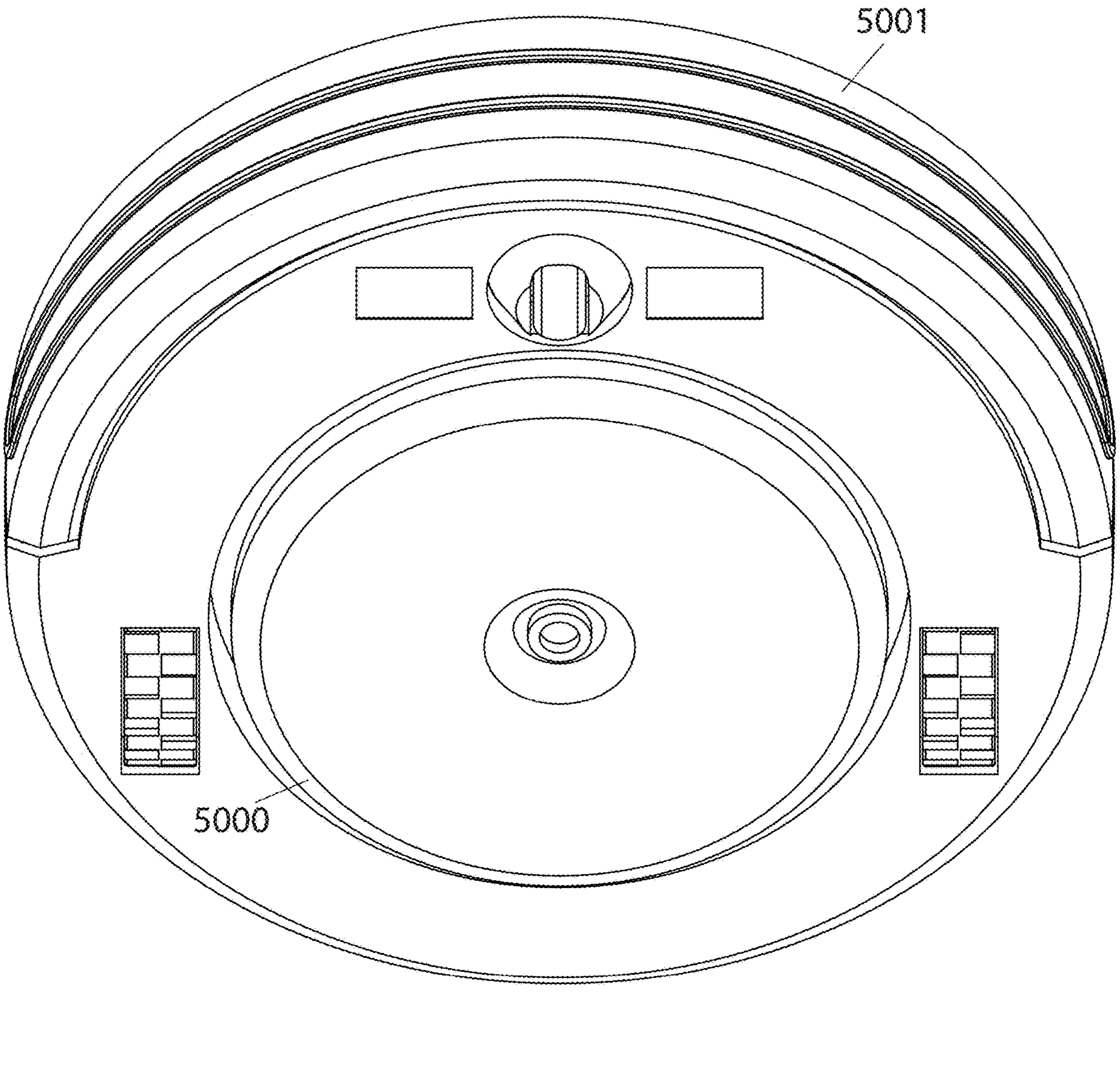
FIGS. 50A and 50B illustrate a spinning cleaning tool subsystem, according to some embodiments.
Figure 50B:
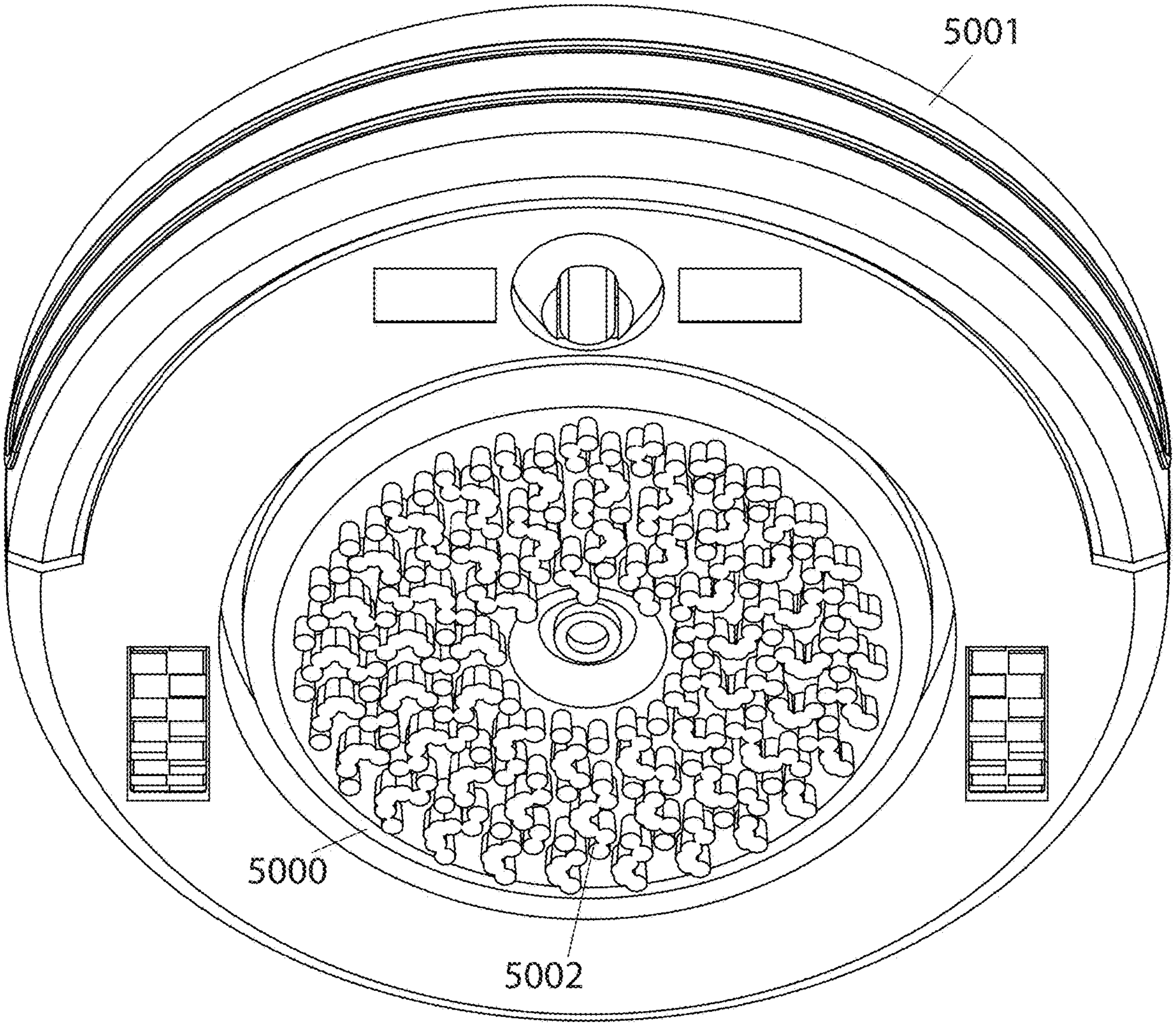

Various cleaning apparatuses may be coupled to the rotating assembly. Various configurations may be used for rotating the one or more cleaning apparatuses. For example, FIG. 50A illustrates a bottom perspective view of a rotating plate 5000 of a surface cleaning robot 5001, to which a cleaning apparatus may be attached, such as a dust pad or scrubbing pad. For instance, FIG. 50B illustrates a mop 5002 attached to rotating assembly 5000.

Methods described herein for improving the cleaning efficiency of a robotic surface cleaner may be implemented independently or may be combined with other methods for improving cleaning efficiency. For example, both a rotating cleaning assembly and a vacuum motor with increased power may be implemented in combination with one another to improve cleaning efficiency. As a further example, counter-rotating brushes may also be implemented into the combination to further improve cleaning efficiency. Further details on a spinning cleaning tool subsystem are provided in U.S. patent application Ser. Nos. 14/922,143 and 15/878,228, the entire contents of which are hereby incorporated by reference.

In some embodiments, robotic surface cleaners may include a mop attachment having a passive liquid (or fluid) flow pace control using a pressure actuated valve to provide mopping functionality to a robotic surface cleaning device. In some embodiments, the removable mop attachment module includes a frame; a reservoir positioned within the frame, one or more drainage apertures positioned on the bottom of the removable mop attachment module that allow liquid to flow out of the reservoir; a breathing aperture, which may allow air into the reservoir, positioned on an upper portion (or on another location in some cases) of the reservoir, and a pressure actuated valve positioned on an inner surface of the reservoir and under the breathing aperture(s), sealing the reservoir while in a closed position and opening when a certain amount of negative air pressure has built up inside the reservoir due to the draining of liquid, letting some air inside the reservoir through the breathing aperture(s). In some embodiments, the pressure actuated valve includes a valve body, adapted for mounting on at least an air passage; a valve member connected to the valve body having at least a flexible element moveable relative to the valve body that forms a seal on the air passage when in a closed position, wherein a certain pressure difference between the two sides of the valve member moves the flexible element from the closed position to an open position letting air enter the air passage. It will be obvious to one skilled in the art that the pressure actuated valve may function with various fluids capable of creating a negative pressure behind the valve and opening the valve.

Figure 51:
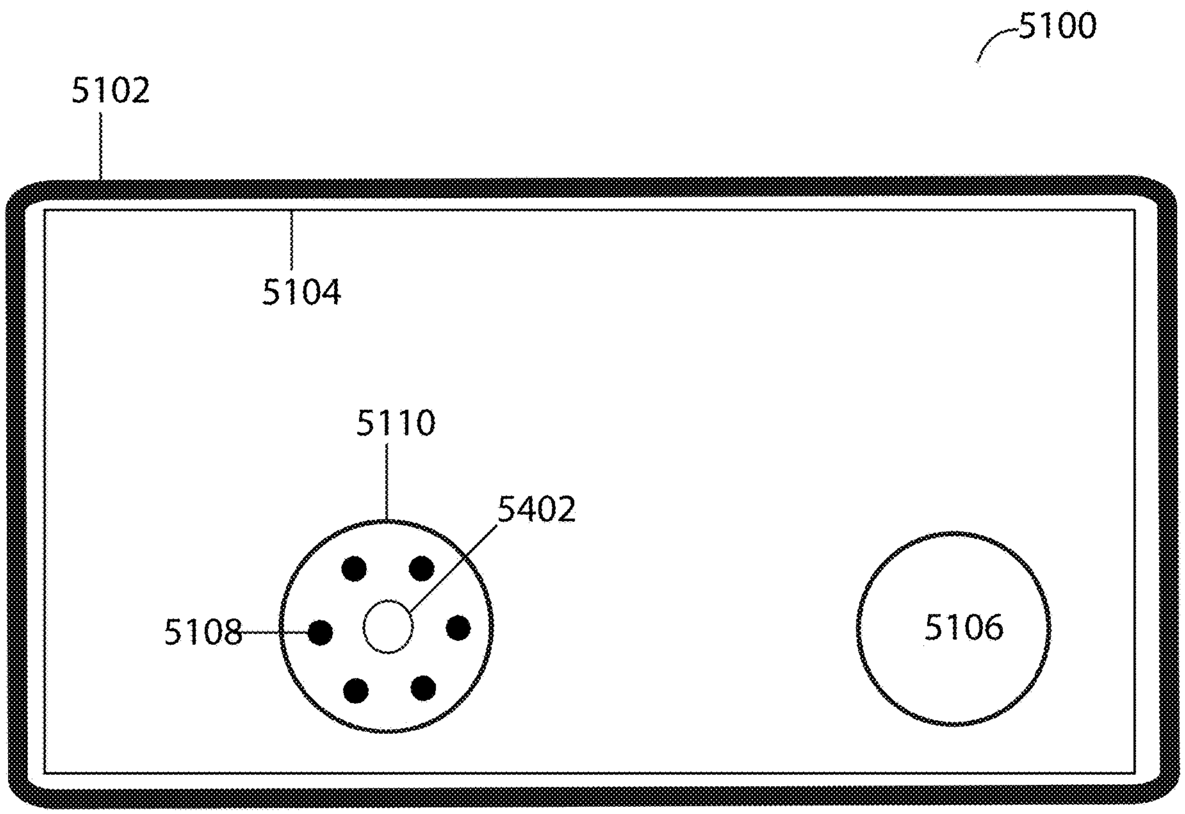
FIG. 51 illustrates an overhead view of a removable mop attachment module, according to some embodiments.

FIG. 51 illustrates an overhead view of a removable mopping attachment 5100 used in some embodiments. A frame 5102 houses a reservoir 5104 in which cleaning liquid may be stored. The reservoir 5104 has an opening 5106 for refilling cleaning liquid, which will be sealed by a lid (not shown). A series of apertures 5108 as air breathing inlets are positioned on an upper portion of the reservoir. A pressure actuated valve 5110 is mounted under the air breathing inlets and seals the reservoir 5104 from inside when it is in a closed position. Member 5402 is a part of the valve 5110, discussed below.

Figure 52:
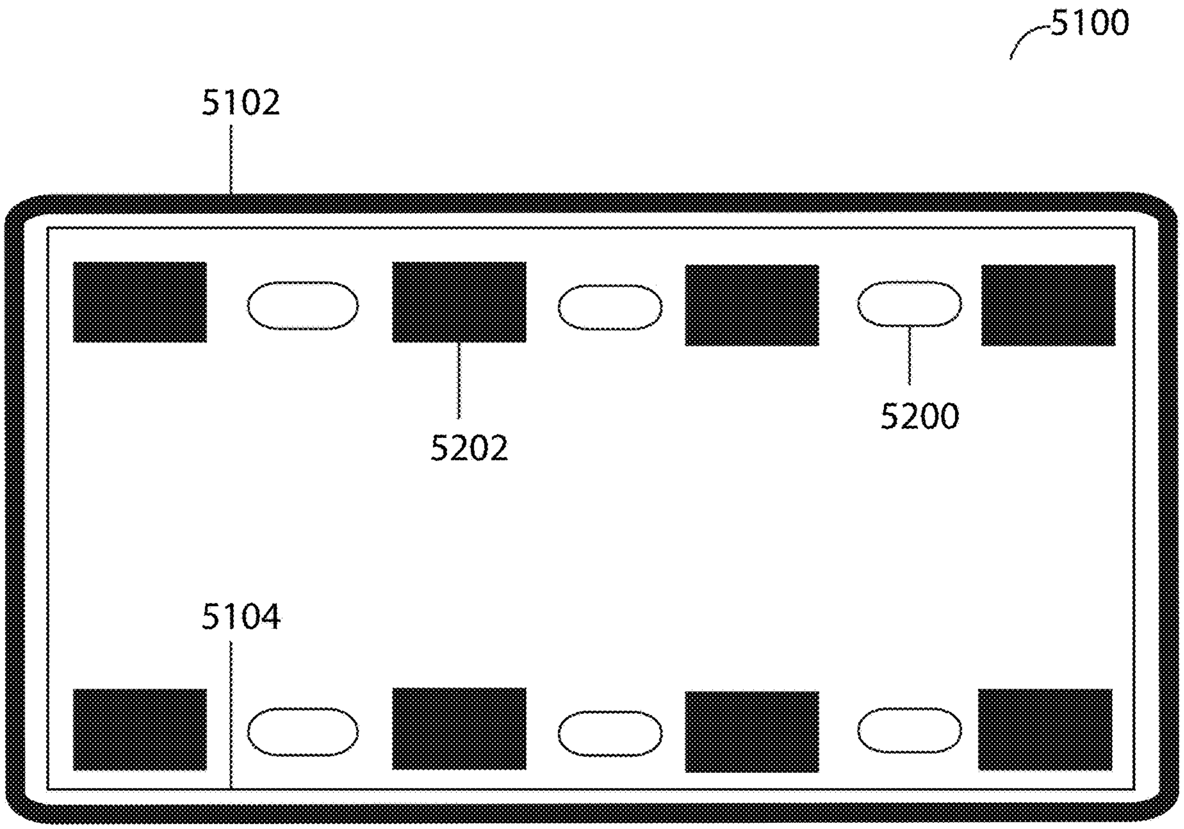
FIG. 52 illustrates a bottom view of a removable mop attachment module, according to some embodiments.

FIG. 52 illustrates a bottom view of the mopping attachment 5100. On the bottom of the frame 5102, liquid drainage apertures 5202 let the cleaning liquid out of the reservoir 5104 and dampen a mopping cloth (not shown) that may be attached to the underside of the mopping extension 5100 via attaching devices 5200. It will be obvious to one skilled in the art that the attaching devices 5200 for attaching the mop cloth could be one of many of the known attachment mechanisms in the art such as Velcro, magnets, snap fasteners, a zipper, a railing system, or a simple cloth grabbing mechanism.

Figure 53:
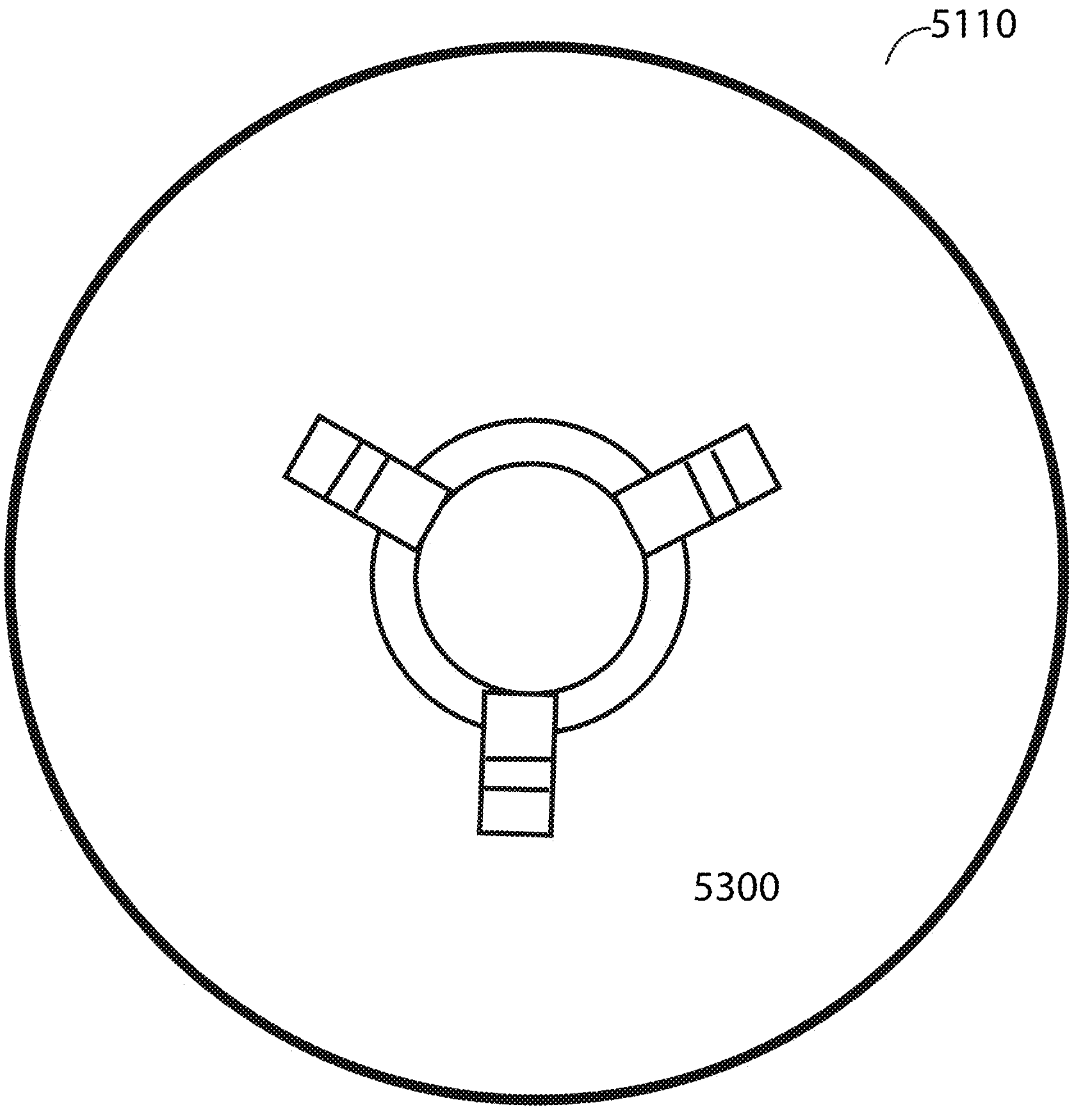
FIG. 53 illustrates an overhead view of a pressure actuated valve, according to some embodiments.

FIG. 53 illustrates an overhead view of the pressure actuated valve 5110, according to some embodiments. The pressure actuated valve 5110 has a flexible member 5300, which seals the reservoir and stops air from entering the reservoir through the breathing inlets illustrated in FIG. 51. It will be obvious to one skilled in the art that the flexible member 5300 could be made of various flexible materials, such as, but not limited to, silicon, rubber, or plastic.

Figure 54:
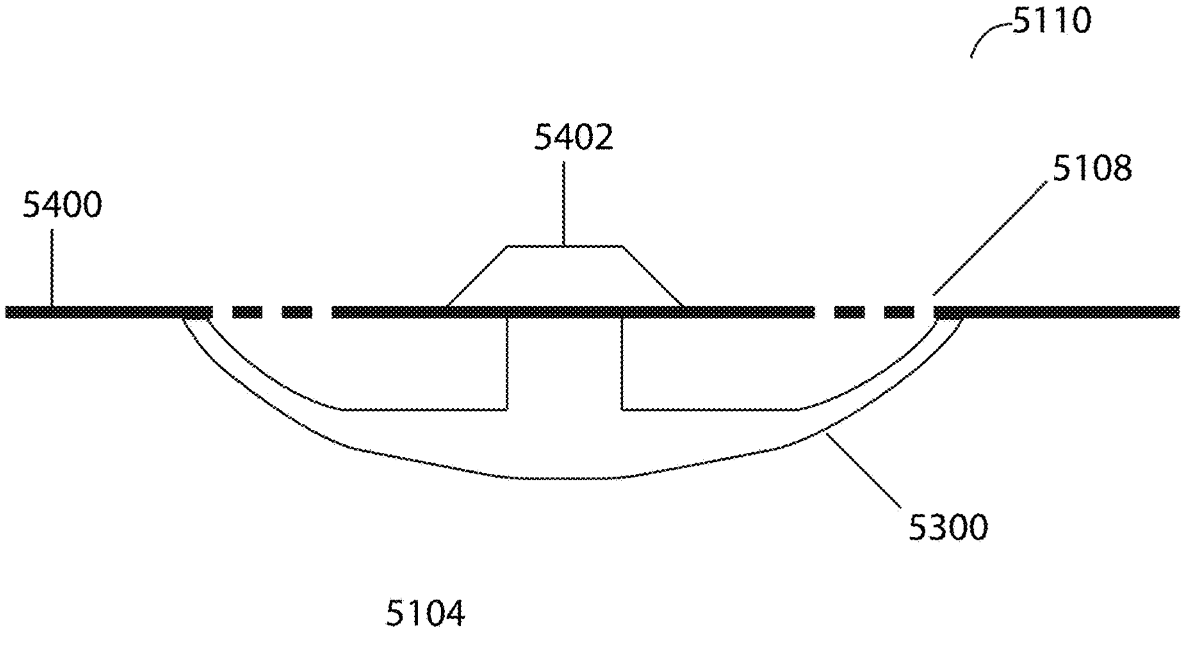
FIG. 54 illustrates a cross sectional view of a pressure actuated valve in a closed position, according to some embodiments.

FIG. 54 illustrates a cross sectional view of the pressure actuated valve 5110 installed on an inner surface of a side 5400 of the reservoir 5104. In the example illustrated, the pressure actuated valve is in a closed position. The pressure actuated valve 5110 is mounted inside the reservoir 5104 using a member 5402 in a way that it seals the reservoir 5104. When the reservoir 5104 is sealed and the liquid inside the reservoir 5104 drains through the drainage apertures 5202 (shown in FIG. 52), a negative pressure builds up inside the reservoir 5104. When the negative pressure gets high enough, the pressure difference between a first and a second side of the valve 5110 moves flexible member 5300 from a closed position to an open position, wherein flexible member 5300 is drawn away from the side 5400 of the reservoir. This allows some air into the reservoir through the intake apertures 5108, which increases the air pressure inside the reservoir 5104, allowing liquid to drain from the drainage apertures once again.

Figure 55:
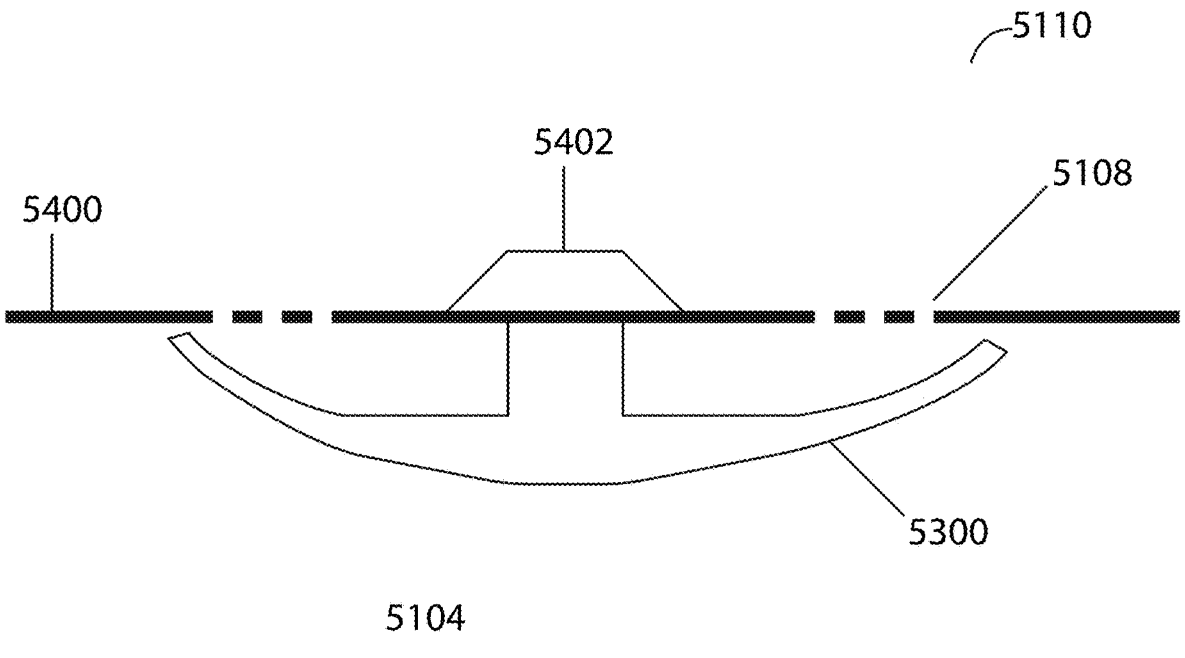
FIG. 55 illustrates a cross sectional view of a pressure actuated valve in an open position, according to some embodiments.

FIG. 55 shows a cross sectional view of the pressure actuated valve 5108 in an open position. Upon reaching a certain amount of negative pressure within the reservoir 5104, the flexible member 5300 is drawn away from the side 5400 of the reservoir 5104 by the built up negative pressure, unblocking the intake apertures 5108, which lets air momentarily inside the reservoir 5104 until the negative pressure has equalized enough to cause the flexible member 5300 to return to the closed position. It will be obvious to one skilled in the art that the pressure actuated valve 5110 could be installed on the top or side or another location on the reservoir. In embodiments, the pressure actuated valve is installed higher than the reservoir's maximum allowable liquid level. It will be obvious to one skilled in the art that the member 5402 may be mounted on the reservoir 104 using various known mechanism in the art.

Figure 56:
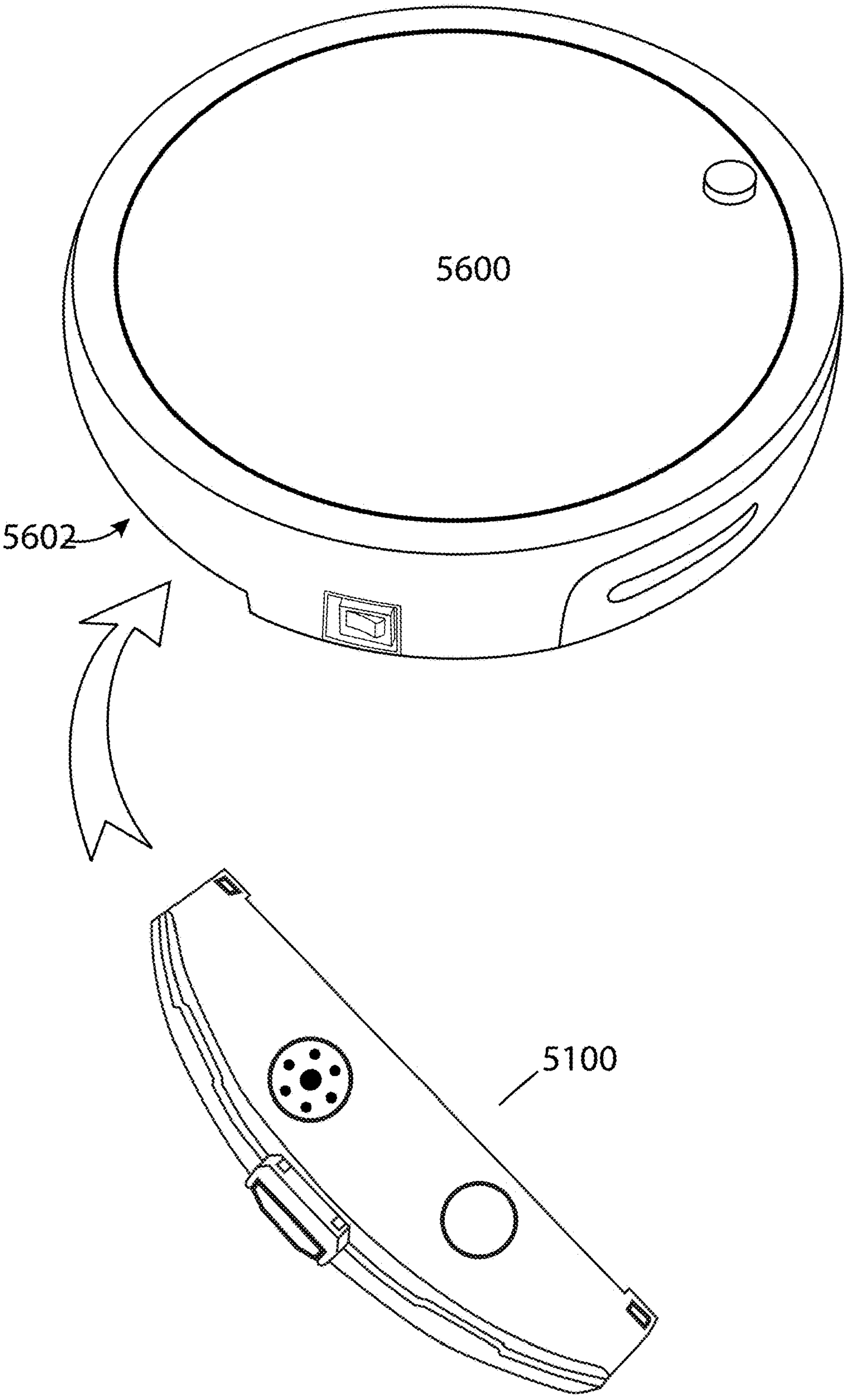
FIG. 56 illustrates a perspective view of a removable mop attachment and its housing in a robotic surface cleaning device, according to some embodiments.

FIG. 56 illustrates a perspective view of an example of a removable mopping attachment 5100 and how it may be attached to or removed from a robotic surface cleaning device 5600. The robotic surface cleaning device 5600 has a slot 5602 on the underside thereof for receiving the mopping attachment. The mopping attachment 5100 may be installed within the slot 5602 such that the mopping cloth (not shown) on the bottom of the mopping attachment 5100 is in contact with the work surface.

Figure 57:
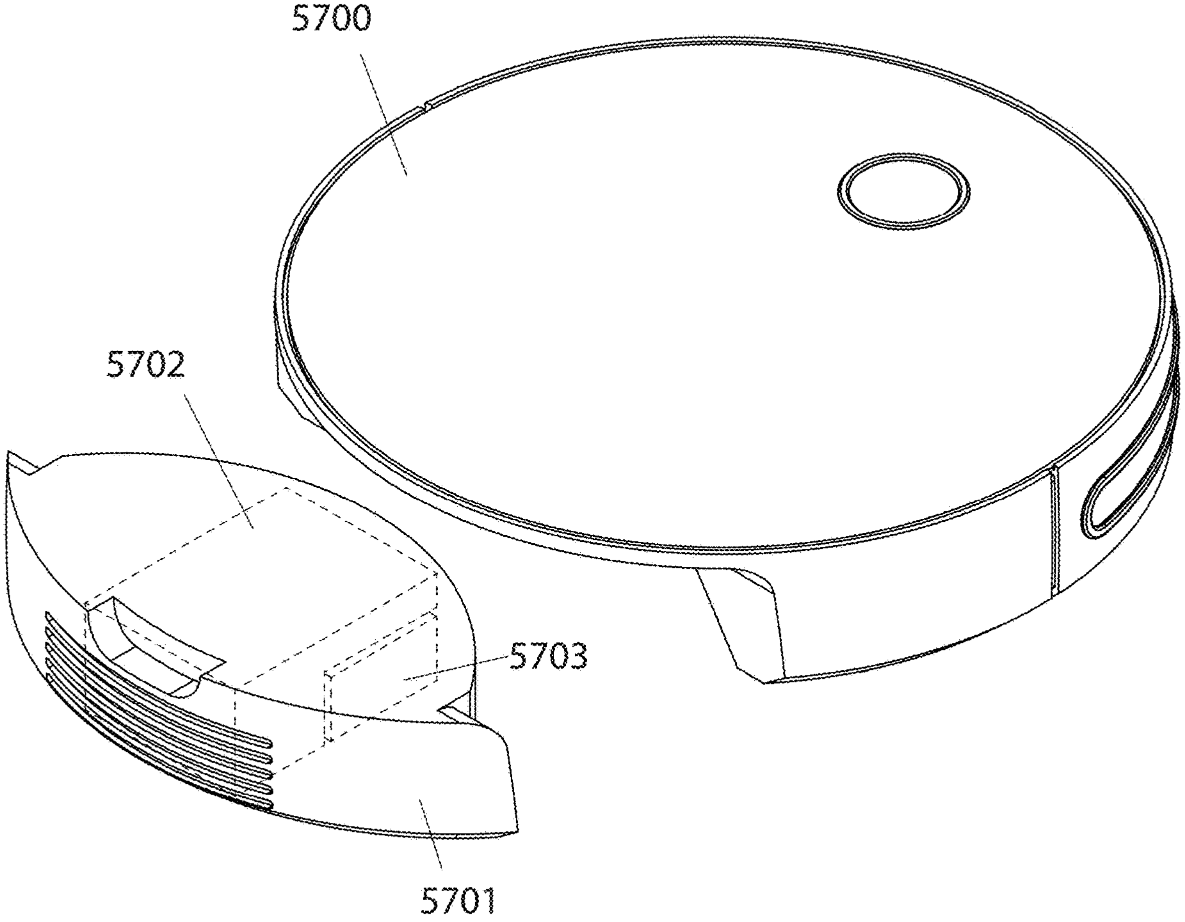
FIG. 57 illustrates an example of a single mopping and vacuuming module for robotic surface cleaners, according to some embodiments.

In some embodiments, robotic surface cleaners include a single module for mopping and vacuuming. For example, FIG. 57 illustrates a robotic surface cleaner 5700 with a single mopping and vacuuming module 5701 that may be slidingly coupled to robotic surface cleaner 5700 during cleaning and detached to access the dustbin or fluid reservoir, for example. Module 5701 includes vacuum compartment 5702 (e.g., dustbin, impeller, etc.) and mopping compartment 5703 (e.g., fluid reservoir, air pressure valve, mopping cloth, etc.). The single mopping and vacuuming module may be used for dispensing water using a motorized method during mopping and collecting dust during vacuuming. The single mopping and vacuuming module may be detachable as a single unit from the robotic surface cleaning device.

Figure 58:
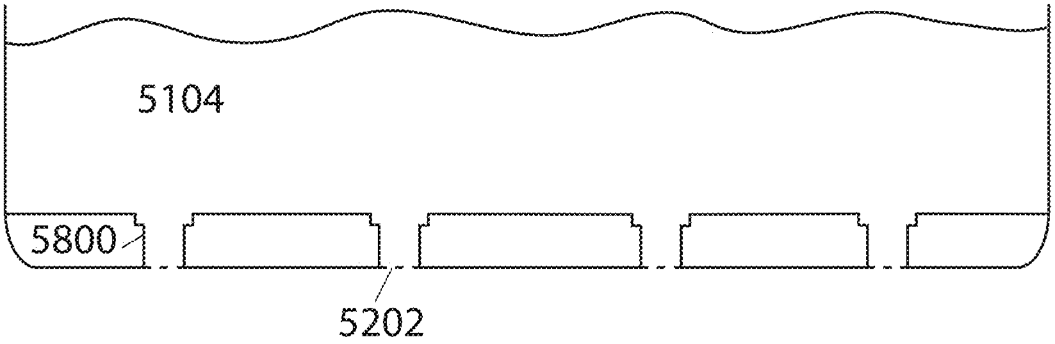
FIG. 58 illustrates flow reduction valves positioned on drainage apertures to reduce the flow of liquid from a reservoir, according to some embodiments.

In some embodiments, the drainage apertures may further include a flow reduction valve positioned on the drainage apertures to reduce the flow of liquid from the reservoir. FIG. 58 illustrates an example of flow reduction valves 5800 positioned on drainage apertures 5202 to reduce the flow of liquid from reservoir 5104, according to some embodiments. Further details of a pressure actuated valve for controlling the release of liquid for mopping are described in U.S. patent application Ser. No. 16/440,904, the entire contents of which is hereby incorporated by reference.

In some embodiments, robotic surface cleaners include a control mechanism for mopping that controls the release of liquid. In some embodiments, the release of liquid by the control mechanism may be determined by the motion of the robotic surface cleaning device. In some embodiments, the release of liquid by the control mechanism may be determined by the rotary motion of one or more non-propelling wheels of the robotic surface cleaning device. For example, a rotatable cylinder with at least one aperture for storing a limited quantity of liquid is connected to an outside member such as a non-propelling (non-driving) wheel of the robotic surface cleaning device. The cylinder is connected to the non-propelling wheel directly or via an axle or a gear mechanism such that cylinder rotation is controlled by the rotation of the wheel. More particularly, the axle turns the rotatable cylinder when the motion of the robotic surface cleaning device occurs. In some embodiments, the axle turns the rotatable cylinder when the rotary motion of one or more non-propelling wheels of the robotic surface cleaning device occurs. The cylinder is within or adjacent to a liquid reservoir tank. There is a passage below the cylinder and between the cylinder and a drainage mechanism. Each time at least one aperture is exposed to the liquid within the reservoir tank, it fills with liquid. As the wheel turns, the connected cylinder is rotated until the aperture is adjacent to the passage. Upon exposure to the passage, the liquid will flow out of the aperture by means of gravity, pass through the passage, and enter the drainage mechanism, whereby the liquid is delivered onto the working surface. In some embodiments, the drainage mechanism disperses liquid throughout a plane. For example, a drainage mechanism may include a hollow body with a perforated underside through which liquid may pass to surfaces below. In some embodiments, the faster the non-propelling wheels rotates, the faster the cylinder turns, the faster the aperture releases liquid into the passage. Moreover, if the non-propelling wheels rotates, say, twice faster, the cylinder turns twice faster, and the aperture releases liquid into the passage twice faster. Furthermore, when the rotary motion of the non-propelling wheel halts, the cylinder stops turning, and the further release of liquid into the passage is stopped as well. It is worth meanwhile to note that speed of the robotic surface cleaning device may be proportional to the rate of the rotary motion of the non-propelling wheels. The above reasoning explains that rapidity of the release of liquid into the passage and the drainage mechanism may be proportional to the speed of the robotic surface cleaning device and/or the rate of the rotary motion of one or more non-propelling wheels.

Figure 59:
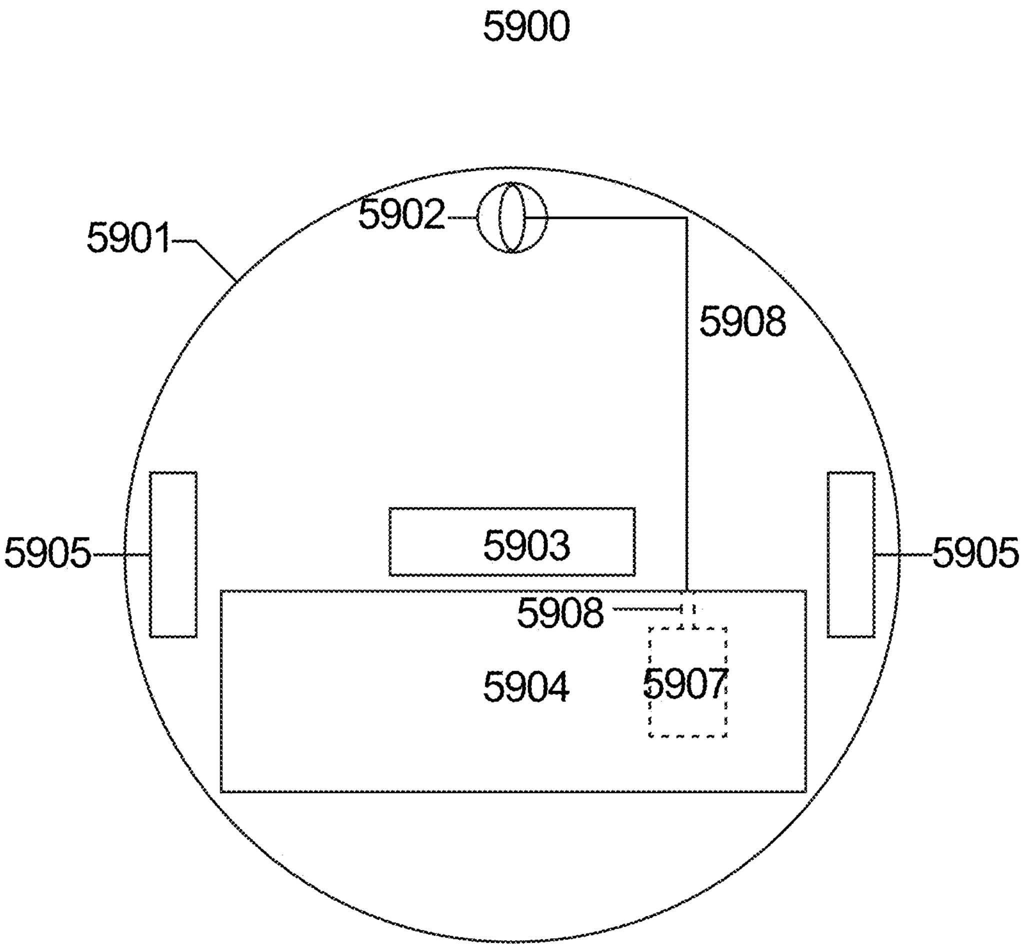
FIG. 59 illustrates a bottom view of a robotic floor cleaning device, according to some embodiments.

FIG. 59 illustrates a bottom view of a robotic floor cleaning device 5900. Robotic floor cleaning device 5900 is comprised of chassis 5901, non-propelling wheel 5902, motor 5903, mop module 5904, and propelling wheels 5906.

Rotatable cylinder 5907 is positioned inside mop module 5904 and is connected to non-propelling wheel 5902 by connecting outside member 5908 that transfers rotational movement to the cylinder 5907. This connecting outside member may be comprised of an axle and/or gear mechanism.

Figure 60A:
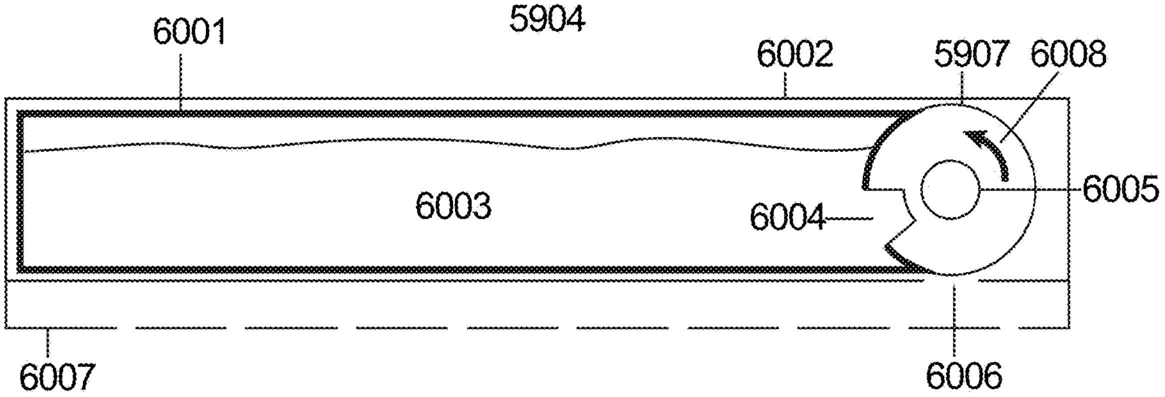
FIGS. 60A and 60B illustrate a cross-sectional view of mop attachment module, according to some embodiments.
Figure 60B:
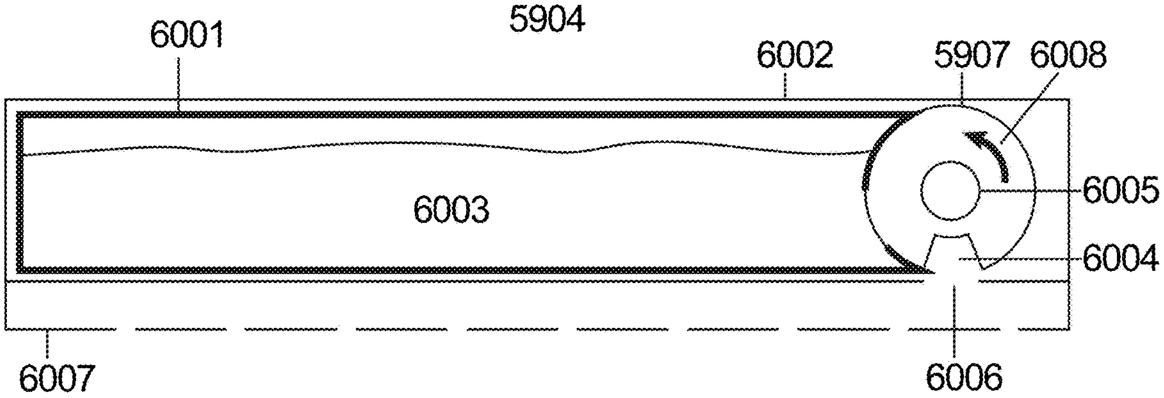

FIG. 60A illustrates a cross-sectional view of the mop module 5904. In this embodiment, the rotatable cylinder 5907 is positioned adjacent to the liquid reservoir 6001, however, other arrangements are possible. Mop module 5904 is comprised of frame 6002, liquid reservoir 6001 containing liquid 6003, rotatable cylinder 5907 (which includes aperture 6004 and axle 6005), passage 6006, and drainage mechanism 6007. In this position, liquid 6003 fills aperture 6004 and rotatable cylinder 5907 is blocking liquid from escaping reservoir 6001. As axle 6005 turns, cylinder 5907 will be rotated in direction 6008 and aperture 6004 will be rotated toward passage 6006. FIG. 60B illustrates a cross-sectional view of mop module 5904 after cylinder 5907 has been rotated in direction 6008. In this position, cylinder 5907 is rotated so that aperture 6004 is adjacent to passage 6006. In this position, liquid that had entered aperture 6004 while it was previously adjacent to liquid 6003 will flow downwards through passage 6006 by means of gravity into drainage mechanism 6007, to be dispersed onto the working surface. Liquid 6003 is only delivered to drainage mechanism 6007 when cylinder 5907 is rotating. Since rotation of cylinder 5907 is controlled by rotation of axle 6005, liquid is no longer delivered to drainage mechanism 6007 when axle 6005 stops rotating. The arrangement of components may vary from the example illustrated without departing from the scope of the invention.

Figure 61A:
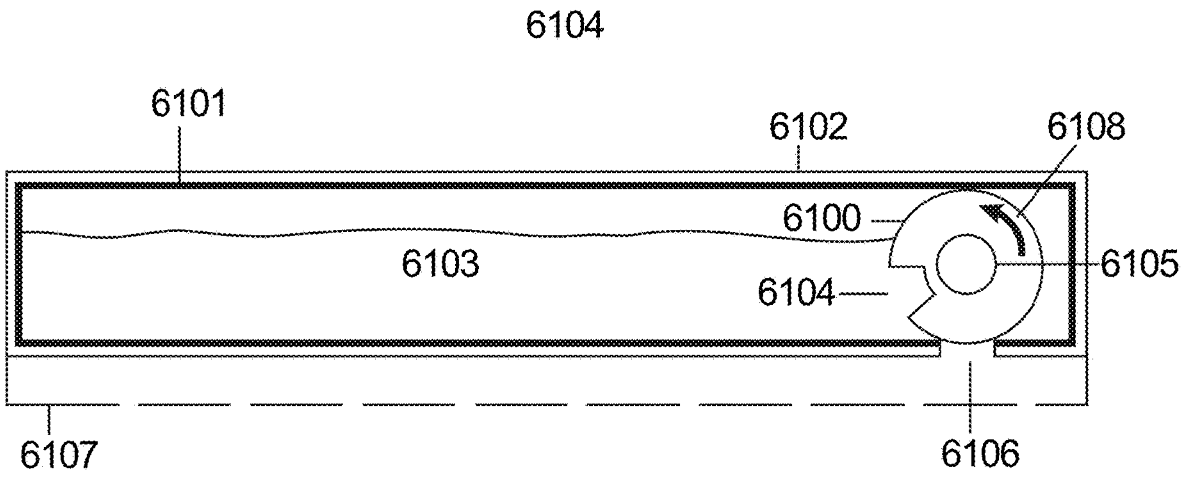
FIGS. 61A and 61B illustrate a cross-section of a mop attachment module, according to some embodiments.
Figure 61B:
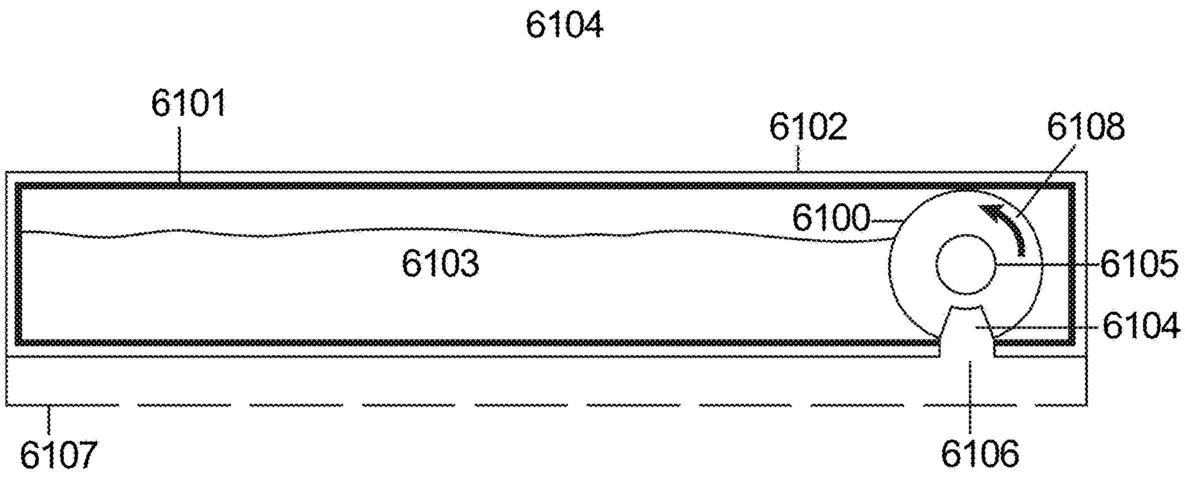

FIGS. 61A and 61B illustrate a cross-sectional view of an embodiment wherein the rotatable cylinder is provided within the reservoir (rather than adjacent to it). FIG. 61A illustrates mop module 6104 is comprised of frame 6102, liquid reservoir 6101 containing liquid 6103, rotatable cylinder 6100 (which includes aperture 6104 and axle 6105), passage 6106, and drainage mechanism 6107. In this position, liquid 6103 fills aperture 6104 and rotatable cylinder 6100 is blocking liquid from escaping reservoir 6101. As axle 6105 turns, cylinder 6100 will be rotated in direction 6108 and aperture 6104 will be rotated toward passage 6106. FIG. 61B illustrates a cross-sectional view of mop module 6104 after cylinder 6100 has been rotated in direction 6108. In this position, cylinder 6107 is rotated so that aperture 6104 is adjacent to passage 6106. In this position, liquid that had entered aperture 6104 while it was previously adjacent to liquid 6103 will flow downwards through passage 6106 by means of gravity into drainage mechanism 6107, to be dispersed onto the working surface. Liquid 6103 is only delivered to drainage mechanism 6107 when cylinder 6100 is rotating. Since rotation of cylinder 6100 is controlled by rotation of axle 6105, liquid is no longer delivered to drainage mechanism 6107 when axle 6105 stops rotating.

Figure 62:
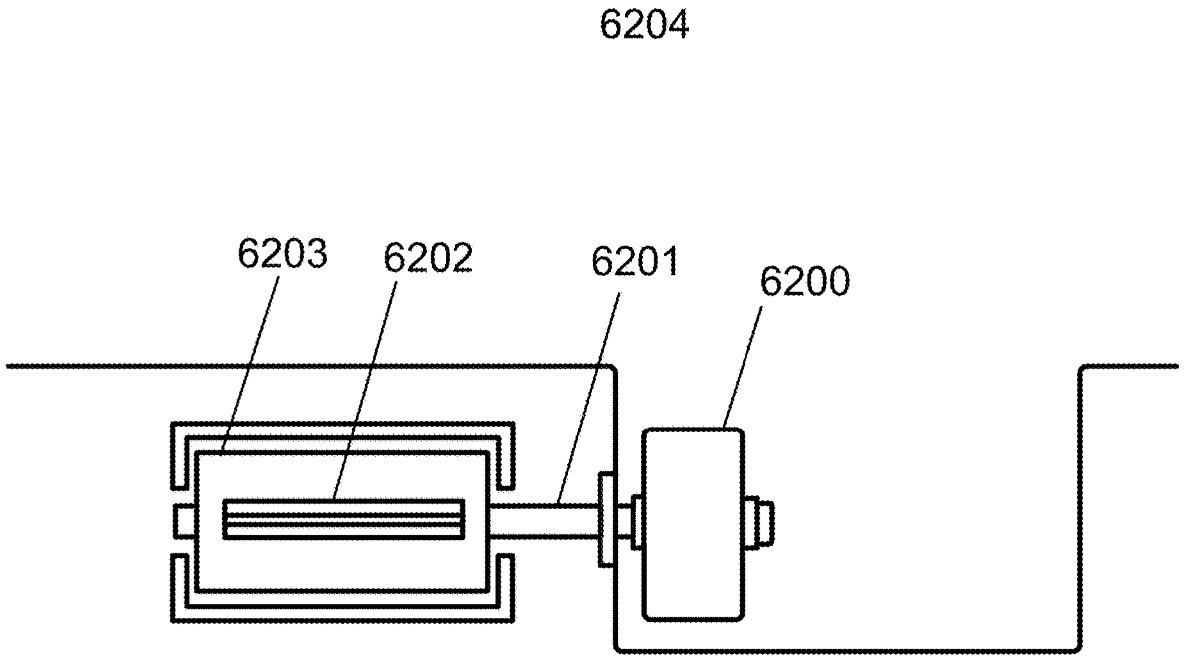
FIG. 62 illustrates a top view of a non-propelling wheel connected to a rotatable cylinder, according to some embodiments.

FIG. 62 illustrates a top view of mop module 6204 with non-propelling wheel 6200 connected to rotatable cylinder 6203 with aperture 6202 by member 6201. When the robotic floor cleaning device is operational, non-propelling wheel 6200 rotates thereby transferring rotational motion to rotatable cylinder 6203 by connecting member 6201.

It should be understood that in some embodiments, a frame to hold the mop module components may be omitted, and the components thereof may be built directly into the robotic surface cleaning device. The size, number, and depth of apertures on the rotatable cylinder as well as the rotation speed of the rotatable cylinder may be modified to adjust the liquid flow rate from the reservoir. In some embodiments, a removable mop module comprising the elements described above may be provided as an attachment to a robotic surface cleaning device. That is, the frame and all components may be removed and replaced as desired by an operator. In some embodiments, the liquid flow rate from said reservoir may be adjusted by adding additional cylinders having at least one aperture and corresponding passages.

In some embodiments, the rotatable cylinder with at least one aperture is connected to a motor and the motor rotates the rotatable cylinder. In some embodiments, a processor of the robotic surface cleaning device may control operation of the motor based on information received from, for example, an odometer or gyroscope providing information on movement of the robotic surface cleaning device, optical encoder providing information on rotation of the wheels of the robotic surface cleaning device or its distance travelled, user interface, floor sensors, timer, sensors for detecting fluid levels or other types of device that may provide information that may be useful in controlling the operation of the motor and hence the release of cleaning fluid. For example, in some embodiments, the motor may operate based on movement of the robotic surface cleaning device. For instance, if the mobile robotic device is static the motor will not operate, in which case liquid will not vacate the liquid reservoir. In other embodiments, the motor may become operational at predetermined intervals wherein intervals may be time based or based on the distance travelled by the robotic surface cleaning device or based on any other metric. In some embodiments, the motor may become operational upon the detection of a particular floor type, such as hardwood or tiled flooring. In some embodiments, the motor may become operational upon the detection of a mess on the floor. In some embodiments, the motor may operate based on whether or not the wheels of the robotic surface cleaning device are spinning. In some embodiments, a user of the robotic surface cleaning device may control the operation of the motor and hence the release of cleaning fluid by, for example, pushing a button on the robotic surface cleaning device or remote control. In some embodiments, the motor controlling the cylinder and hence the release of cleaning fluid may automatically cease operation upon detecting the depletion of the cleaning fluid.

In some embodiments, the motor may operate at varying speeds thereby controlling the speed of the cylinder and release of fluid. For example, if the motor is operating at a high speed, liquid is released more frequently. Therefore, if the speed of the robotic surface cleaning device is maintained yet the speed of the motor is increased, more liquid will be dispersed onto the work area. If the motor is operating at a lower speed, liquid is released less frequently. Therefore, if the speed of the robotic surface cleaning device is maintained yet the power of the motor is decreased, less liquid will be dispersed onto the work area. In some embodiments, the processor of the robotic surface cleaning device may control the speed of the motor. In some embodiments, the speed of the motor may be automatically adjusted by the processor based on the speed of the robotic surface cleaning device, the type of floor, the level of cleanliness of the work area, and the like. For example, floor sensors of the robotic surface cleaning device may continually send signals to the processor indicating the floor type of the work surface. If, for instance, the processor detects a carpeted work surface based on the sensor data, then the processor may cease operation of the motor, in which case liquid will not be released onto the carpeted surface. However, if the processor detects a hard floor surface, such as a tiled surface, the processor may actuate the motor thereby rotating the cylinder and releasing cleaning liquid onto the floor. In some embodiments, the processor may be able to differentiate between different hard floor surface types and direct actions accordingly. For example, mopping on a hardwood floor surface may damage the hardwood floor. If during a mopping sequence the processor detects that the floor has transitioned from a tiled surface to a hardwood surface based on sensor data, the processor may cease operation of the mopping mechanism. In some embodiments, the speed of the motor may be increased and decreased during operation by the processor. In some embodiments, the user of the robotic surface cleaning device may increase or decrease the speed of the motor and hence the amount of cleaning fluid released by, for example, a button on the robotic surface cleaning device or a remote control or other communication device.

Figure 63:
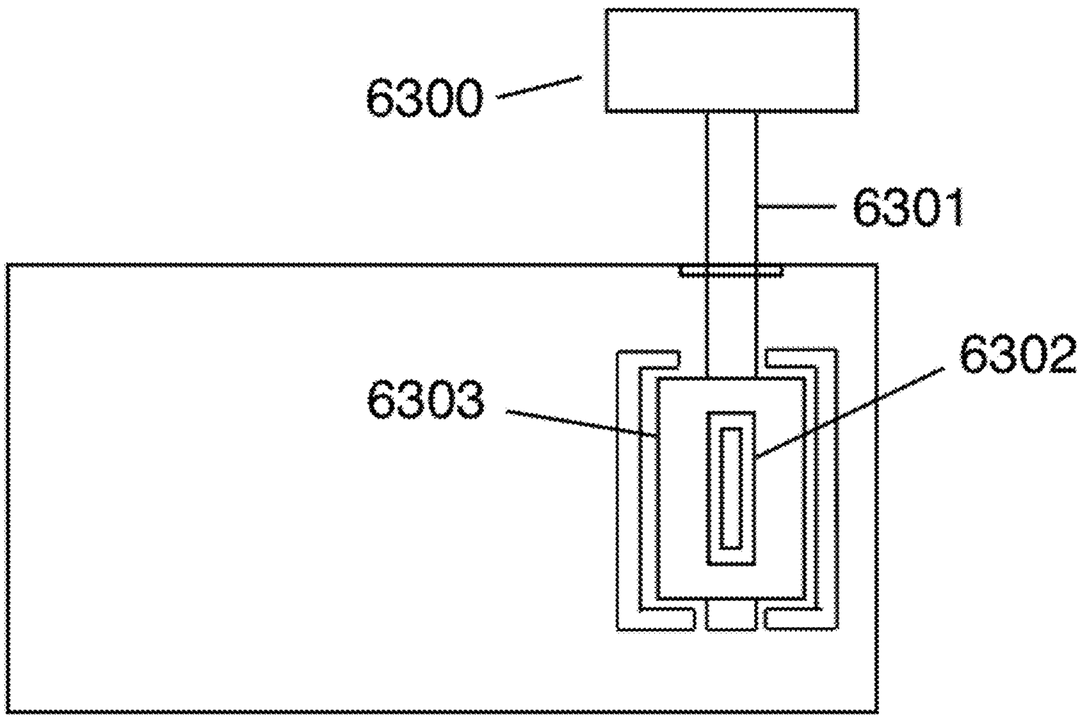
FIG. 63 illustrates a top view of a motor connected to a rotatable cylinder, according to some embodiments.

FIG. 63 illustrates a top view of motor 6300 connected to rotatable cylinder 6303 with aperture 6302 by member 6301. When the robotic surface cleaning device is operational, motor 6300 operates thereby transferring rotational motion to rotatable cylinder 6303 by connecting member 6301. Further details of a mopping module with controlled liquid release are provided in U.S. patent application Ser. Nos. 15/673,176 and 16/058,026, the entire contents of which are hereby incorporated by reference.

In some instances, the mopping module includes a reservoir and a water pump driven by a motor that delivers water from the reservoir indirectly or directly to the driving surface. In some embodiments, the water pump autonomously activates when the robotic surface cleaner is moving and deactivates when the robotic surface cleaner is stationary. In some embodiments, the water pump includes a tube through which fluid flows from the reservoir. In some embodiments, the tube may be connected to a drainage mechanism into which the pumped fluid from the reservoir flows. In some embodiments, the bottom of the drainage mechanism includes drainage apertures. In some embodiments, a mopping pad may be attached to a bottom surface of the drainage mechanism. In some embodiments, fluid is pumped from the reservoir, into the drainage mechanism and fluid flows through one or more drainage apertures of the drainage mechanism onto the mopping pad. In some embodiments, flow reduction valves are positioned on the drainage apertures. In some embodiments, the tube may be connected to a branched component that delivers the fluid from the tube in various directions such that the fluid may be distributed in various areas of a mopping pad. In some embodiments, the release of fluid may be controlled by flow reduction valves positioned along one or more paths of the fluid prior to reaching the mopping pad.

Figure 64:
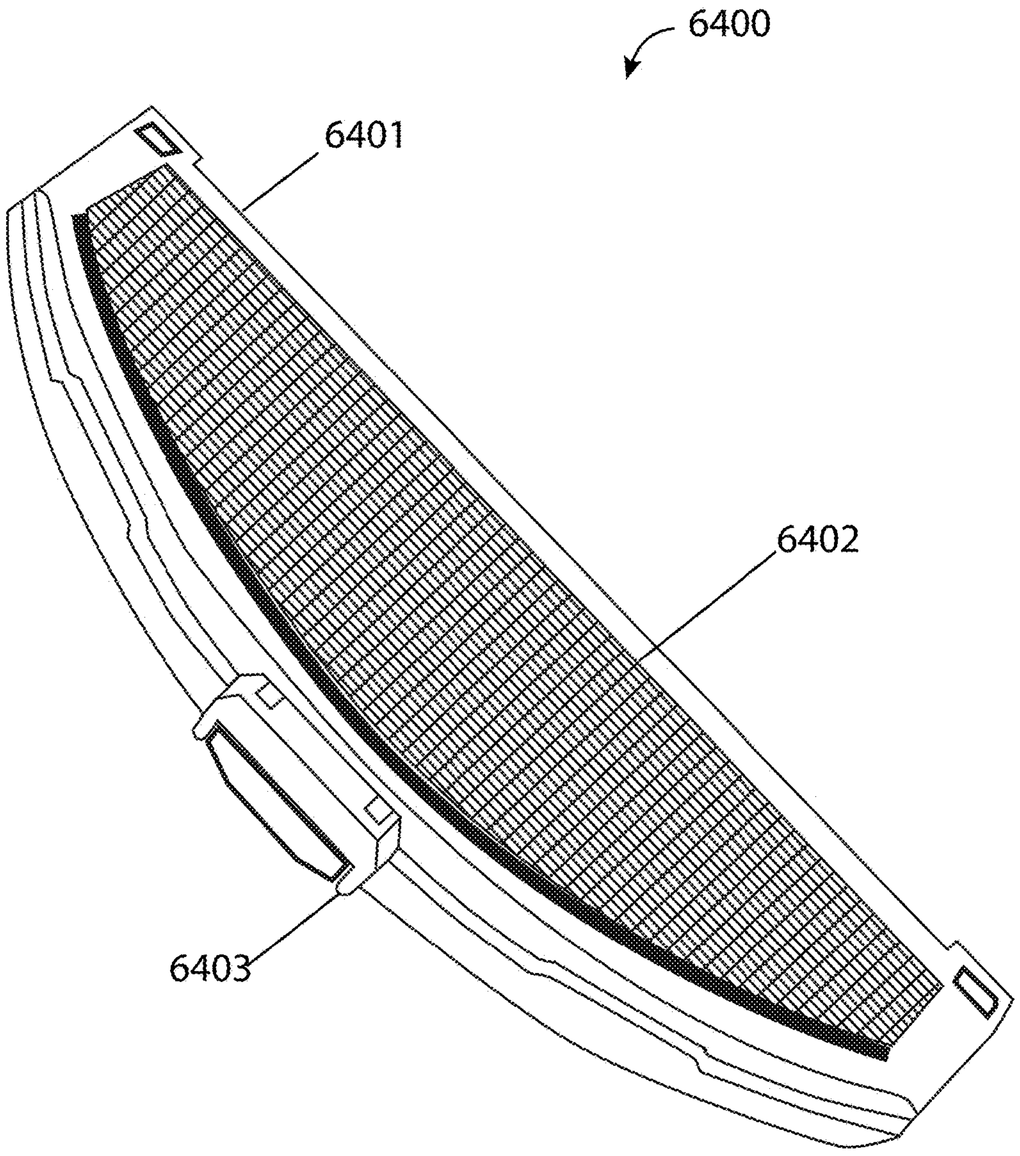
FIG. 64 illustrates an example of a mopping extension, according to some embodiments.

Some embodiments provide a mopping extension unit for robotic surface cleaners to enable simultaneous vacuuming and mopping of work surface and reduce (or eliminate) the need for a dedicated mopping robot to run after a dedicated vacuuming robot. In some embodiments, a mopping extension may be installed in a dedicated compartment in the chassis of a robotic surface cleaning device. In some embodiments, a cloth positioned on the mopping extension is dragged along the work surface as the robotic surface cleaning device drives through the area. In some embodiments, nozzles direct fluid from a cleaning fluid reservoir to the mopping cloth. The dampened mopping cloth may further improve cleaning efficiency. In some embodiments, the mopping extension further comprises a means for moving back and forth in a horizontal plane parallel to the work surface during operation. In some embodiments, the mopping extension further comprises a means for moving up and down in a vertical plane perpendicular to the work surface to engage or disengage the mopping extension. In some embodiments, a detachable mopping extension may be installed inside a dedicated compartment within the chassis of a robotic surface cleaning device. FIG. 64 illustrates a bottom view of an example of a detachable mopping extension 6400. In some embodiments, the mopping extension may be attached to the chassis of a robotic surface cleaning device (not shown). The mopping extension includes a frame 6401 that supports a removable mopping cloth 6402 and a latch 6403 to secure and release the mopping extension to and from the robotic surface cleaning device.

Figure 65:
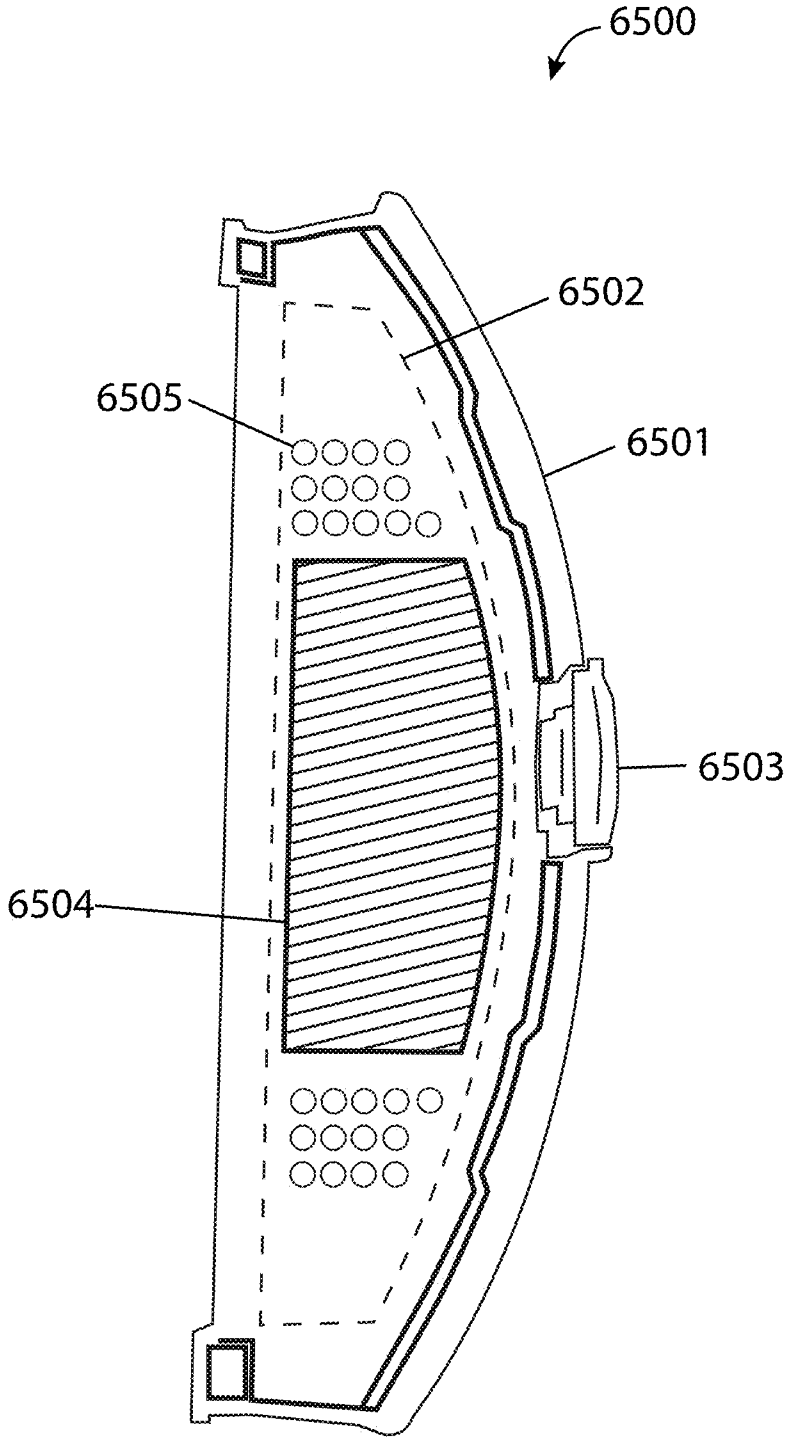
FIG. 65 illustrates an example of a mopping extension with internal components, according to some embodiments.

FIG. 65 illustrates an example of internal components of a mopping extension 6500. The frame 6501 supports the mop components. A latch 6503 secures the mopping extension to the chassis of the robotic device and may be released to detach the mopping extension. In some embodiments, the mopping extension further includes a refillable fluid reservoir 6504 that stores cleaning fluid to be dispersed by nozzles 6505 onto the mopping cloth 6502. In some embodiments, the nozzles continuously deliver a constant amount of cleaning fluid to the mopping cloth. In some embodiments, the nozzles periodically deliver predetermined quantities of cleaning fluid to the cloth.

Figure 66:
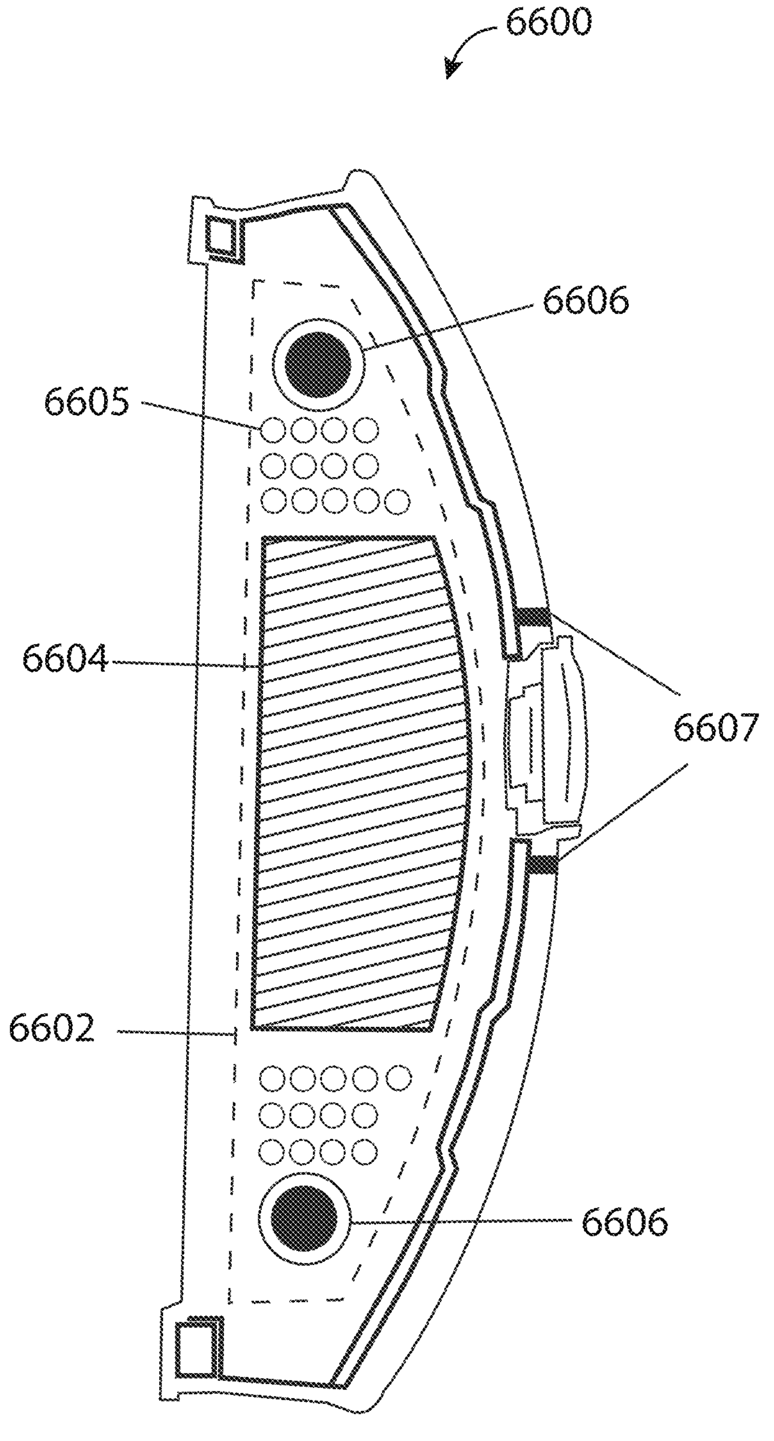
FIG. 66 illustrates an example of a mopping extension with ultrasonic oscillators, according to some embodiments.

FIG. 66 illustrates an example of a mopping extension 6600 with a set of ultrasonic oscillators 6606 that vaporize fluid from the reservoir 6604 before it is delivered through the nozzles 6605 to the mopping cloth 6602. Metal electrodes 6607 provide power from a main battery (not shown) of the robotic surface cleaning device to the ultrasonic oscillators. In some embodiments, the ultrasonic oscillators vaporize fluid continuously at a low rate to continuously deliver vapor to the mopping cloth. In some embodiments, the ultrasonic oscillators turn on at predetermined intervals to deliver vapor periodically to the mopping cloth. In some embodiments, a heating system may alternatively be used to vaporize fluid. For example, an electric heating coil in direct contact with the fluid may be used to vaporize the fluid. The electric heating coil may indirectly heat the fluid through another medium. In other examples, radiant heat may be used to vaporize the fluid. In some embodiments, water may be heated to a predetermined temperature then mixed with a cleaning agent, wherein the heated water is used as the heating source for vaporization of the mixture.

Figure 67A:
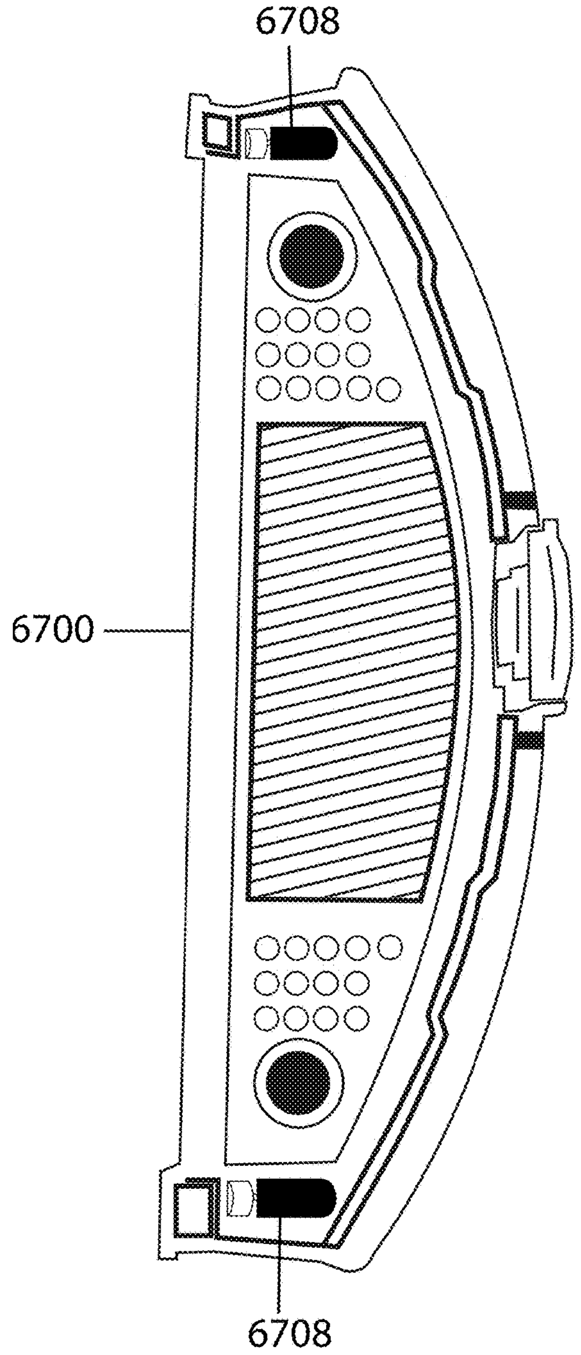
FIGS. 67A and 67B illustrate an example of a mopping extension with eccentric rotating mass vibration motors, according to some embodiments.
Figure 67B:
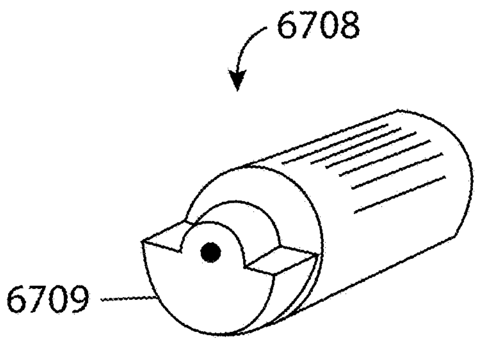

In some embodiments, the mopping extension includes a means to vibrate the mopping extension during operation. FIG. 67A illustrates an example of a mopping extension 6700 with eccentric rotating mass vibration motors. FIG. 67B illustrates a close up perspective view of an eccentric rotating mass vibration motor 6708. Eccentric rotating mass vibration motors rely on the rotation of an unbalanced counterweight 6709 to provide vibrations to the mopping extension.

Figure 68:
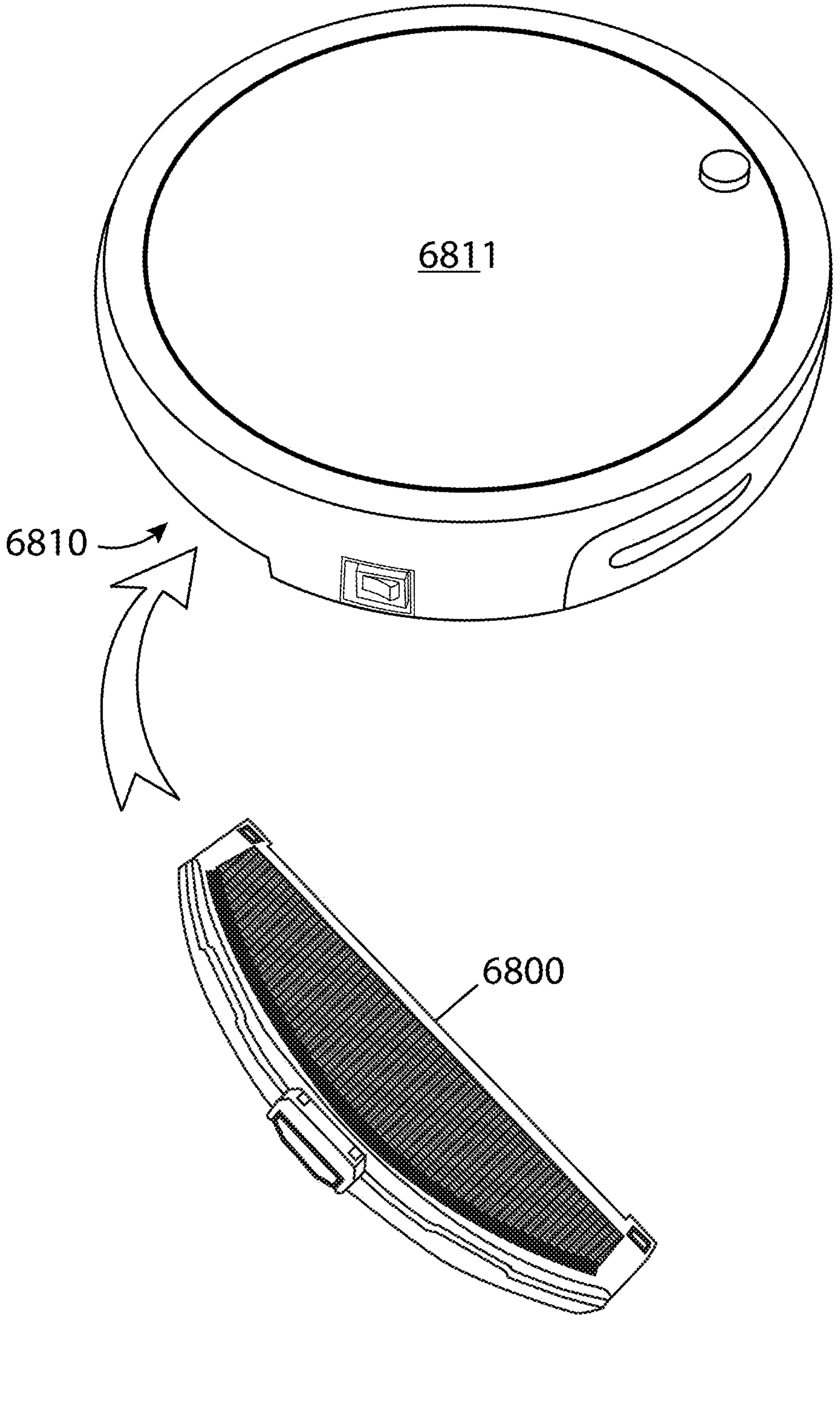
FIG. 68 illustrates the insertion of a mopping extension into a compartment of a robotic vacuum, according to some embodiments.
Figure 69:
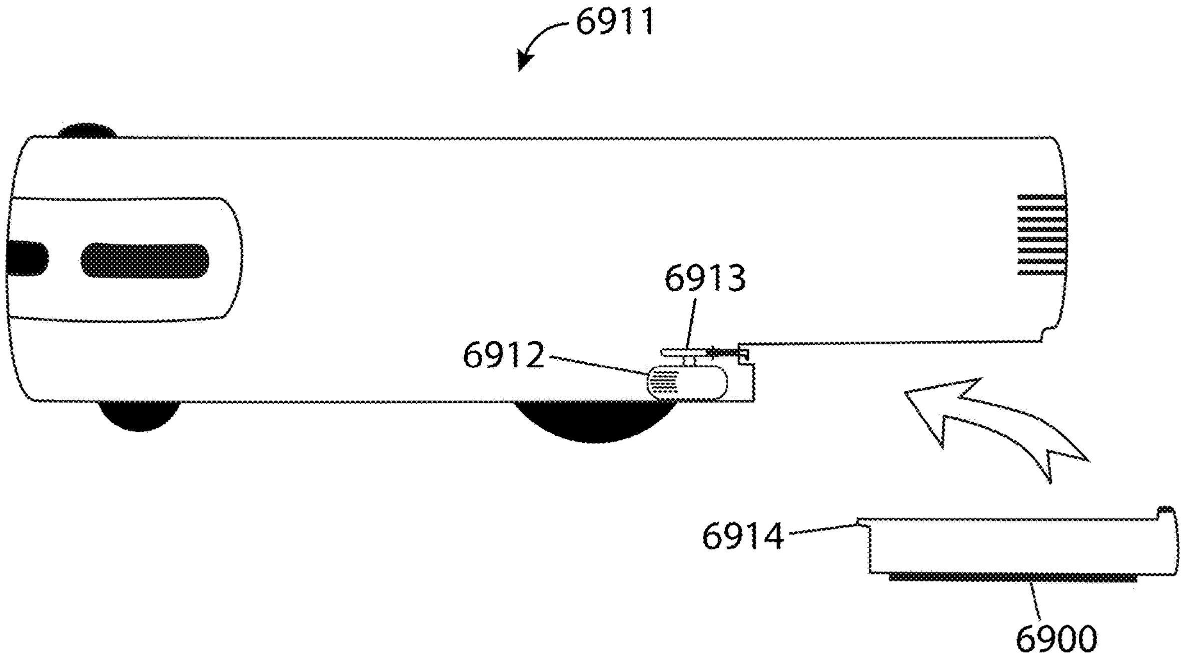
FIG. 69 illustrates a robotic vacuum with a motor to move a mopping extension back and forth during operation, according to some embodiments.

FIG. 68 illustrates an example of a corresponding robotic vacuum to which a mopping extension 6800 may be attached. The mopping extension 6800 fits into a compartment 6810 on the underside of the robotic vacuum 6811 such that a cloth of the mopping extension may be caused to make contact with the work surface as the robotic vacuum 6811 drives. In some embodiments, the mopping extension includes a means to move the mopping extension back and forth in a horizontal plane parallel to the work surface during operation. FIG. 69 illustrates a side elevation view of an example of a robotic vacuum with a mechanism for moving the mopping extension back and forth. An electric motor 6912 positioned inside the chassis of the robotic vacuum

6911 transfers movements to the mopping extension 6900 through a rod 6913 to tabs 6914 on the mopping extension.

Figure 70A:
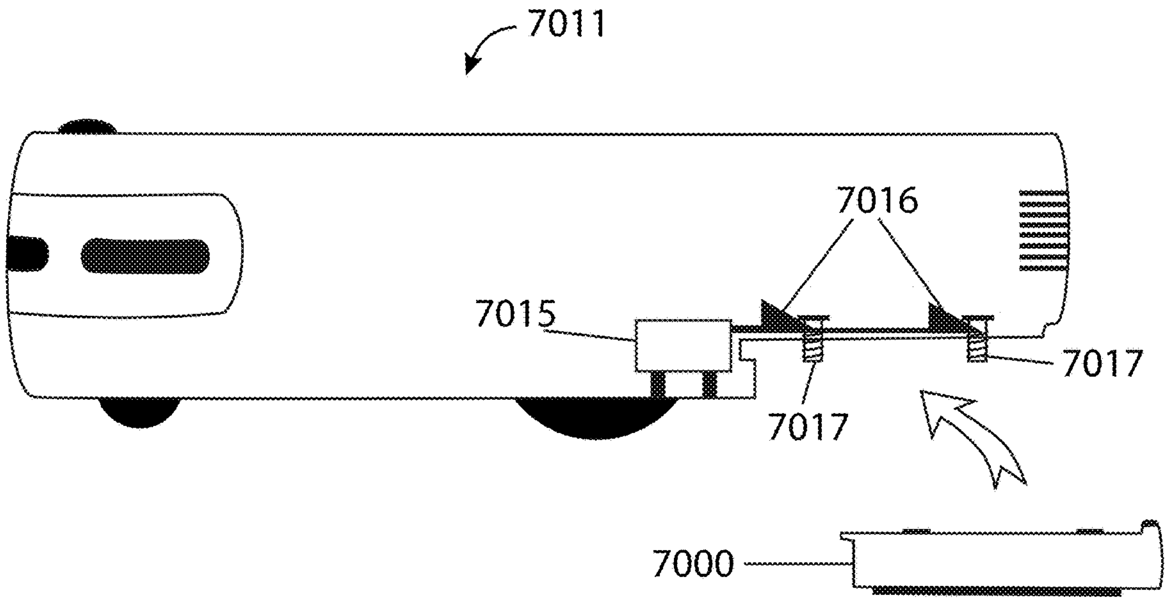
FIGS. 70A and 70B illustrate a robotic vacuum with a mechanism for engaging and disengaging a mopping extension, according to some embodiments.
Figure 70B:
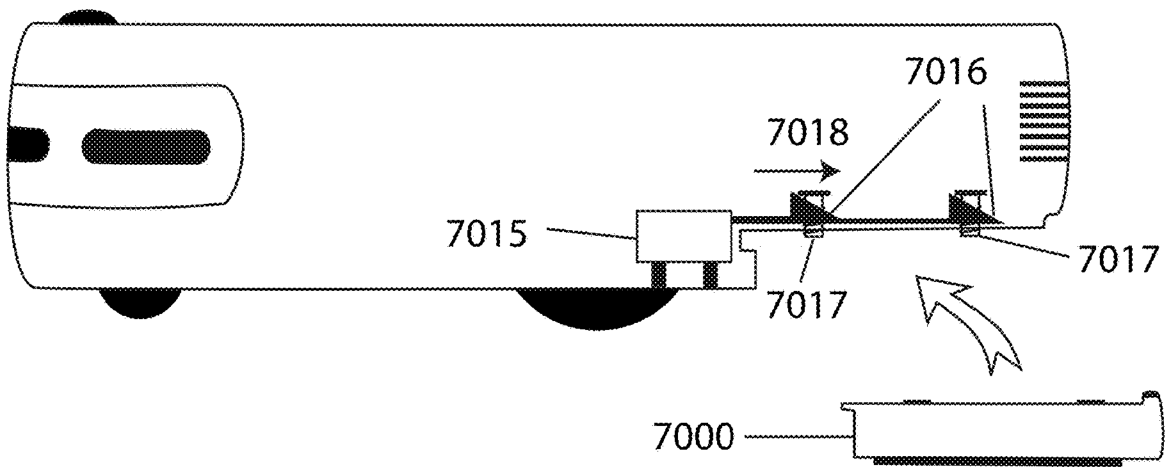
Figure 70C:
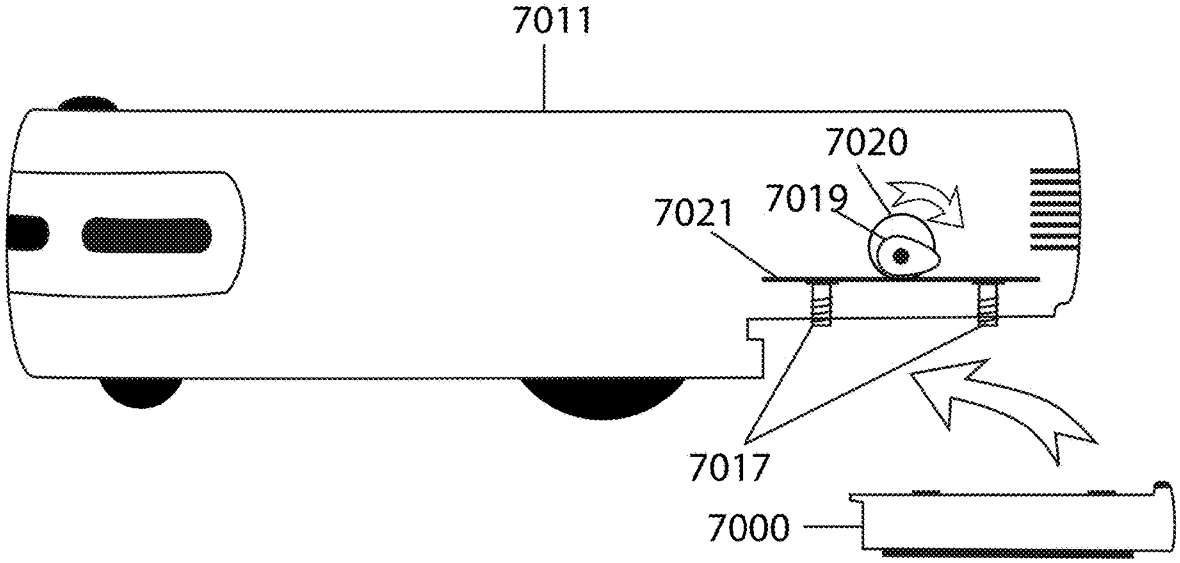
FIGS. 70C and 70D illustrate a robotic vacuum with an alternative mechanism for engaging and disengaging a mopping extension, according to some embodiments.
Figure 70D:
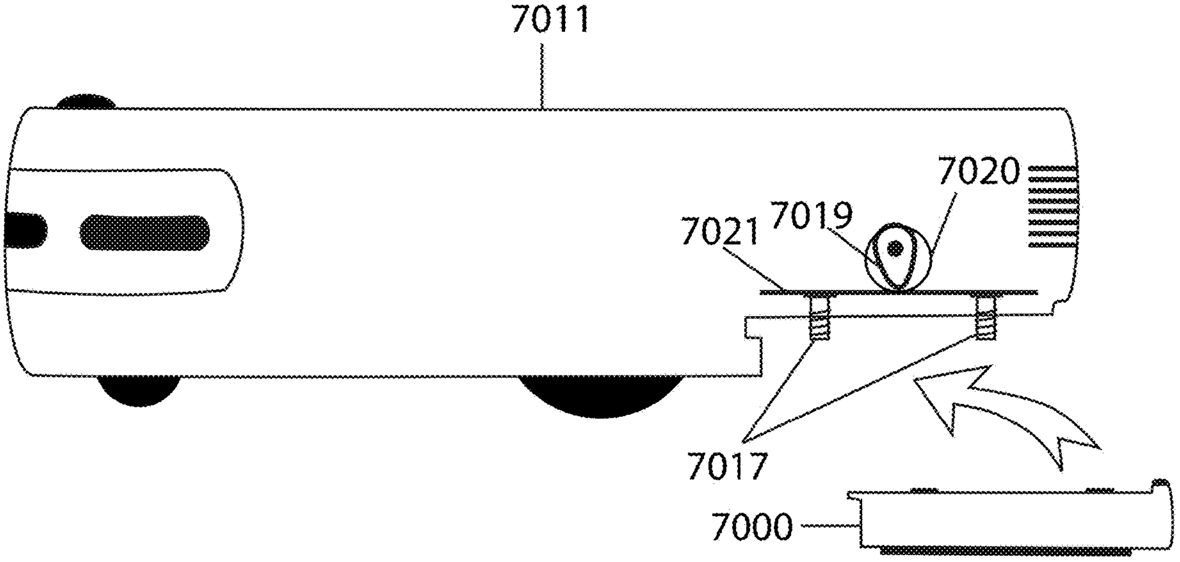

In some embodiments, the mopping extension includes a means to engage and disengage the mopping extension during operation by moving the mopping extension up and down in a vertical plane perpendicular to the work surface. In some embodiments, engagement and disengagement may be manually controlled by a user. In some embodiments, engagement and disengagement may be controlled automatically based on sensory input. FIG. 70A illustrates a side view of an examples of a robotic vacuum 7011 with a means for engaging and disengaging a mopping extension 7000. (The mopping extension is shown not attached to the robotic vacuum in this example to more clearly show details; another example in which the mopping extension is attached will be provided later.) An electric servomotor 7015 positioned within the chassis of the robotic vacuum pushes forward and pulls back wedges 7016 that raise and lower springs 7017 to which the mopping extension 7000 may be attached. When the wedges are pulled back, as shown in FIG. 70A, the mopping extension, when attached, will be engaged. Referring to FIG. 70B, when the wedges 7016 are pushed forward in a direction 7018 by the electric servomotor 7015, the springs 7017 are raised and the mopping extension 7000 is disengaged. FIG. 70C and FIG. 70D illustrate an example of an alternate method for engaging and disengaging a mopping extension. An oval wheel 7019 positioned in the chassis of a robotic vacuum 7011 is turned by an electric motor 7020, which causes the wheel to push down a plate 7021. When the wheel is not pushing the plate down, springs 7017 are not pushed down and the mopping extension 7000 is not engaged. In FIG. 70D the wheel 7019 is pushing down the plate 7021 causing the springs 7017 to be pushed down which lowers the mopping extension 7000, engaging it.

Figure 71A:
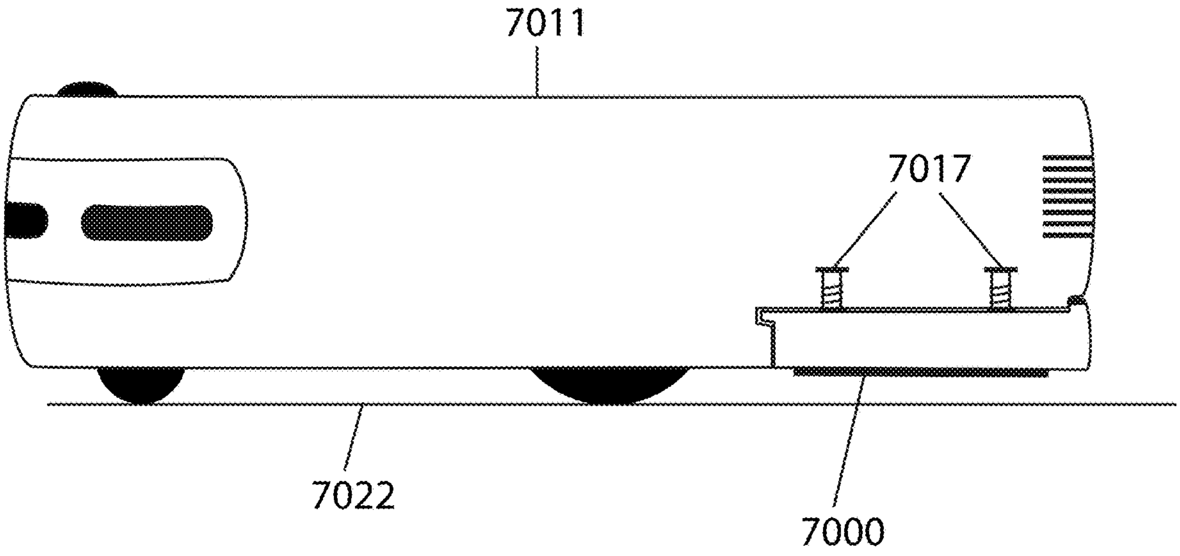
FIGS. 71A and 71B illustrate a robotic vacuum with a mopping extension attached in a disengaged and engaged position, respectively, according to some embodiments.
Figure 71B:
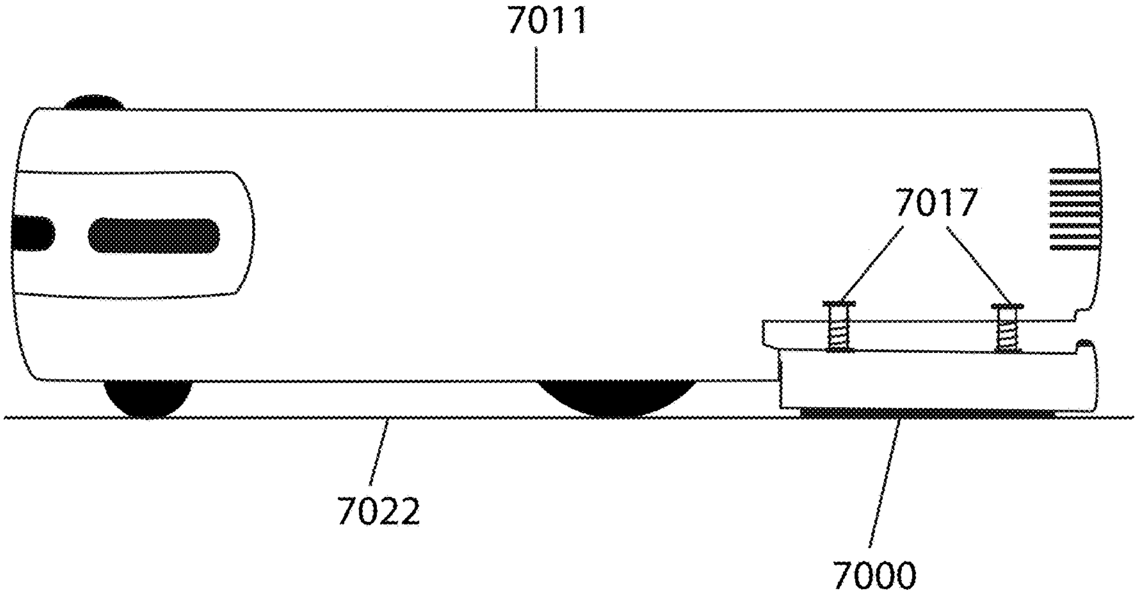

FIGS. 71A and 71B illustrate and example of a robotic vacuum 7011 with a mopping extension 7000 attached. In FIG. 71A, the springs 7017 are not lowered and the mopping extension 7000 is in a disengaged position, where the mopping extension cannot make contact with the work surface 7022. In FIG. 71B the springs 7017 are lowered and the mopping extension 7000 is in an engaged position, such that the mopping extension makes contact with the work surface 7022. Further details of a mopping extension for robotic surface cleaners are provided in U.S. patent application Ser. Nos. 14/970,791 and 16/375,968, the entire contents of which are hereby incorporated by reference.

Figure 72:
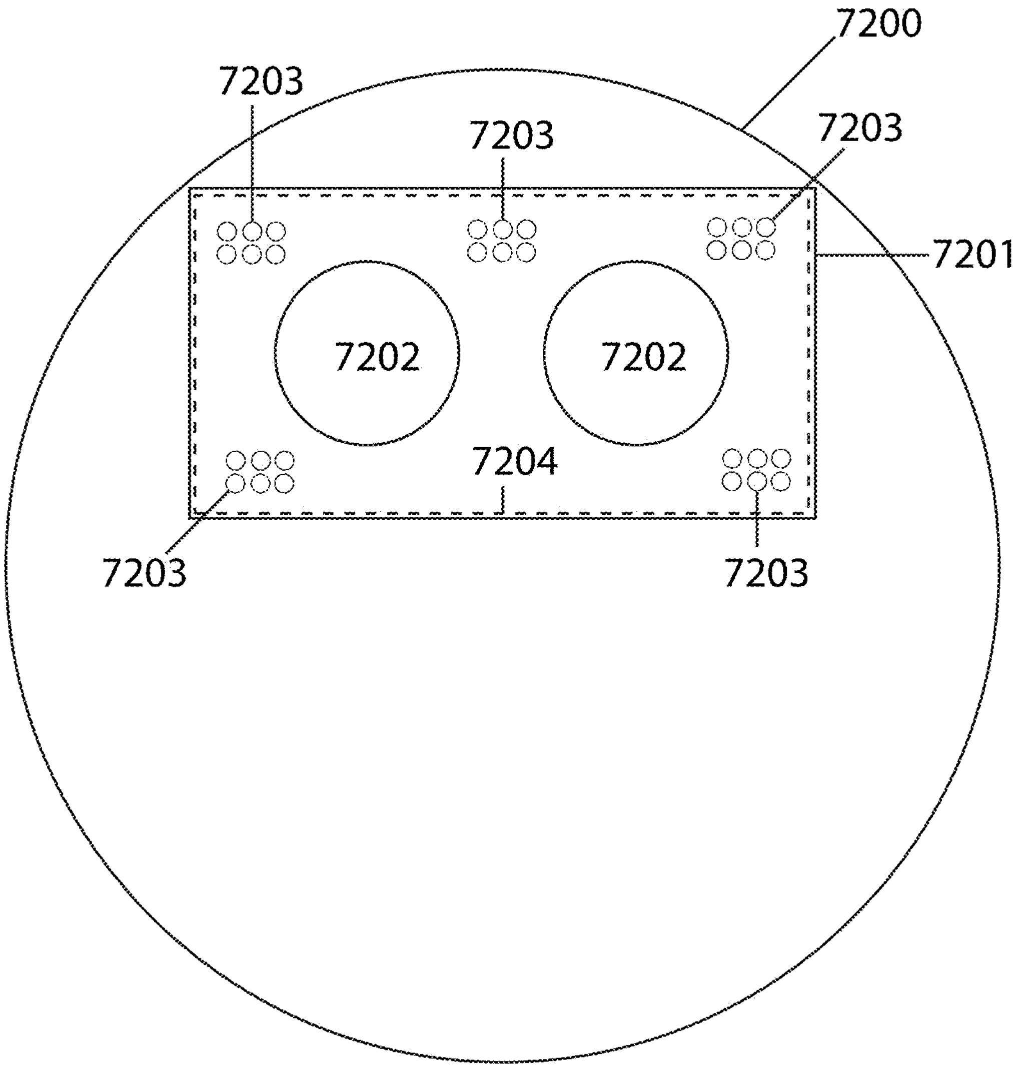
FIG. 72 illustrates an overhead view of the underside of a mobile robotic floor cleaning device, according to some embodiments.

In some embodiments, robotic surface cleaners include steam cleaning apparatus. FIG. 72 illustrates an overhead view of the underside of a robotic surface cleaning device 7200. A reservoir 7201 is positioned within the robotic surface cleaning device. Ultrasonic oscillators 7202 are connected to the reservoir and vaporize the water to produce steam. (Other means for vaporizing water, such as heating systems, are well known and may be used in place of ultrasonic oscillators without departing from the scope of the invention.) Nozzles 7203 deliver the steam to an area to receive steam. In some embodiments, an area to receive steam might be the surface or floor that the robotic surface cleaning device is driving and working on. In some embodiments, a mopping cloth 7204 disposed under the nozzles to facilitate mopping or wiping of a work surface. In some embodiments, the nozzles continuously deliver a substantially constant flow of steam to the mopping cloth. In some embodiments, the nozzles periodically deliver predetermined quantities of steam to the cloth. Further details of a steam cleaning apparatus for robotic surface cleaners are provided in U.S. patent application Ser. Nos. 15/432,722 and 16/238,314, the entire contents of which are hereby incorporated by reference.

Figure 73A:
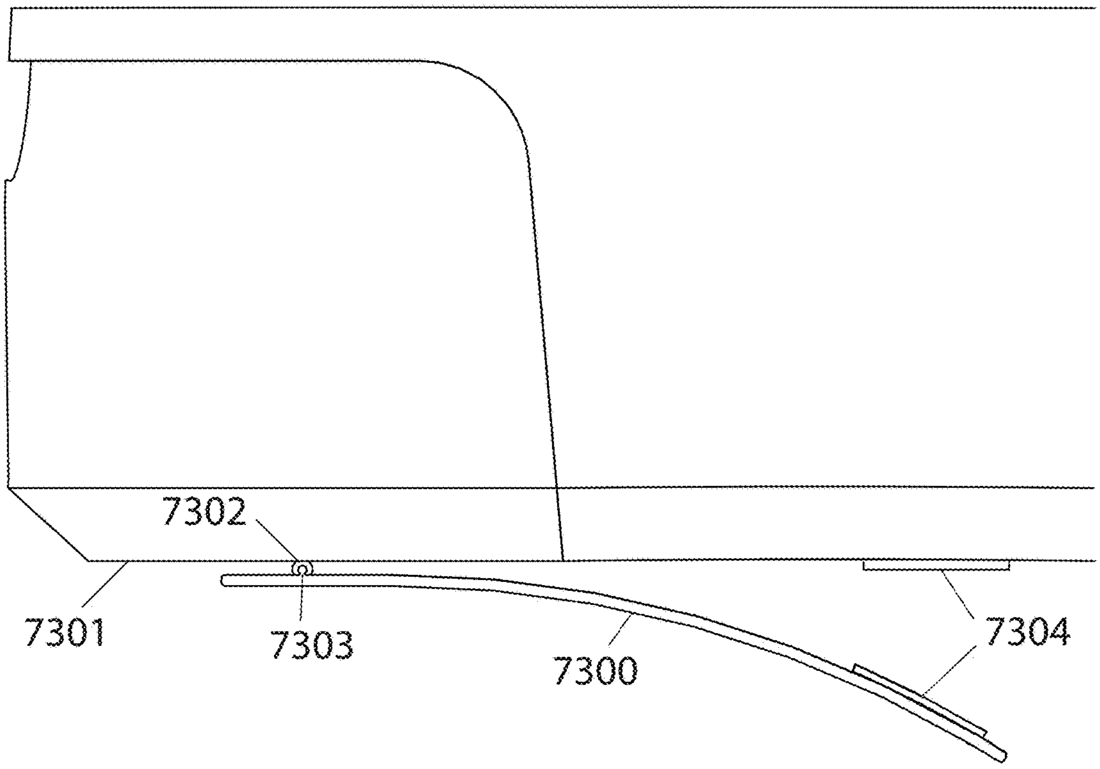
FIGS. 73A-73F illustrate methods for attaching a mopping cloth to a robotic surface cleaner, according to some embodiments.
Figure 73B:
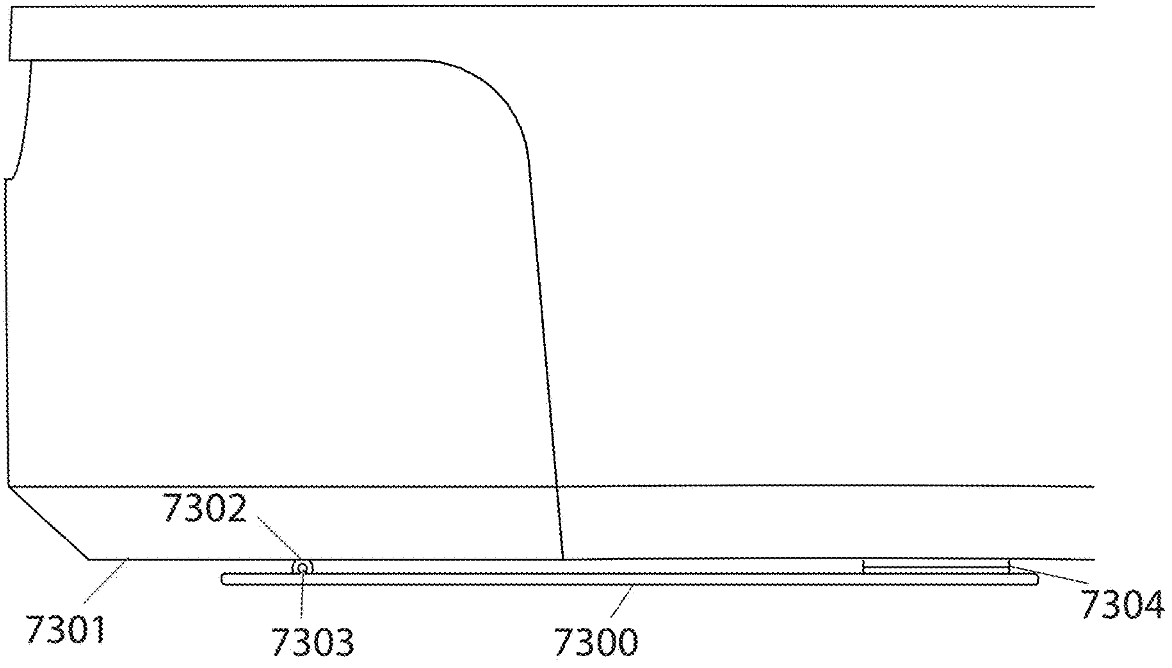
Figure 73C:
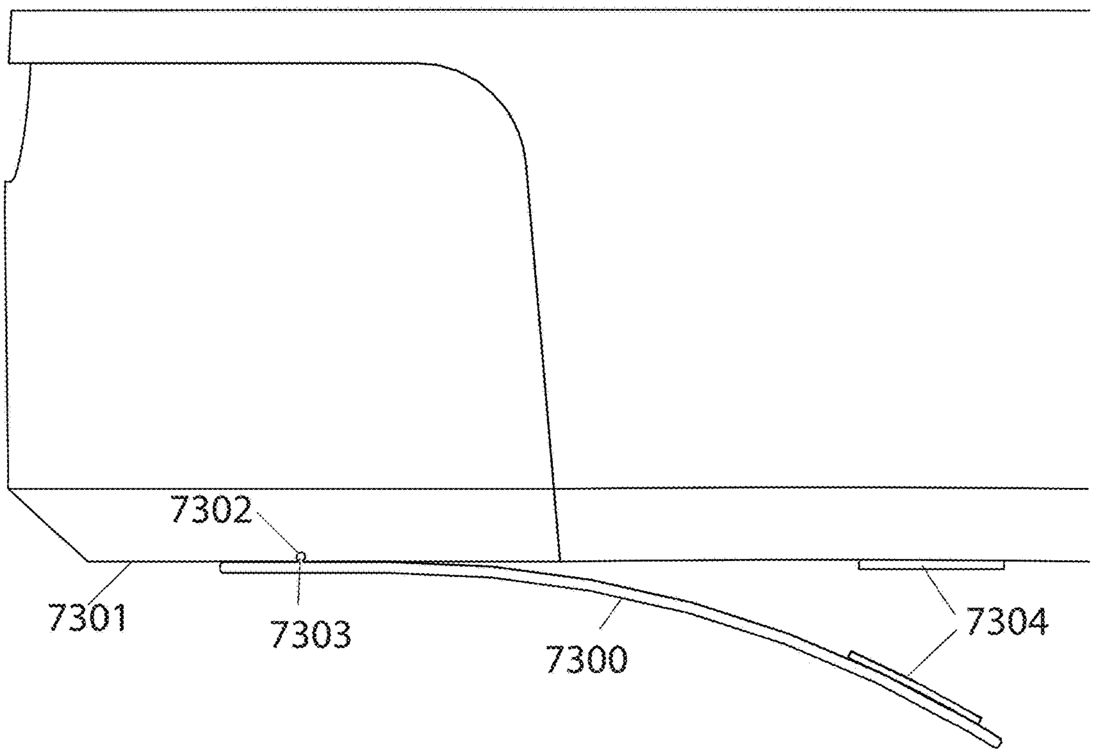
Figure 73D:
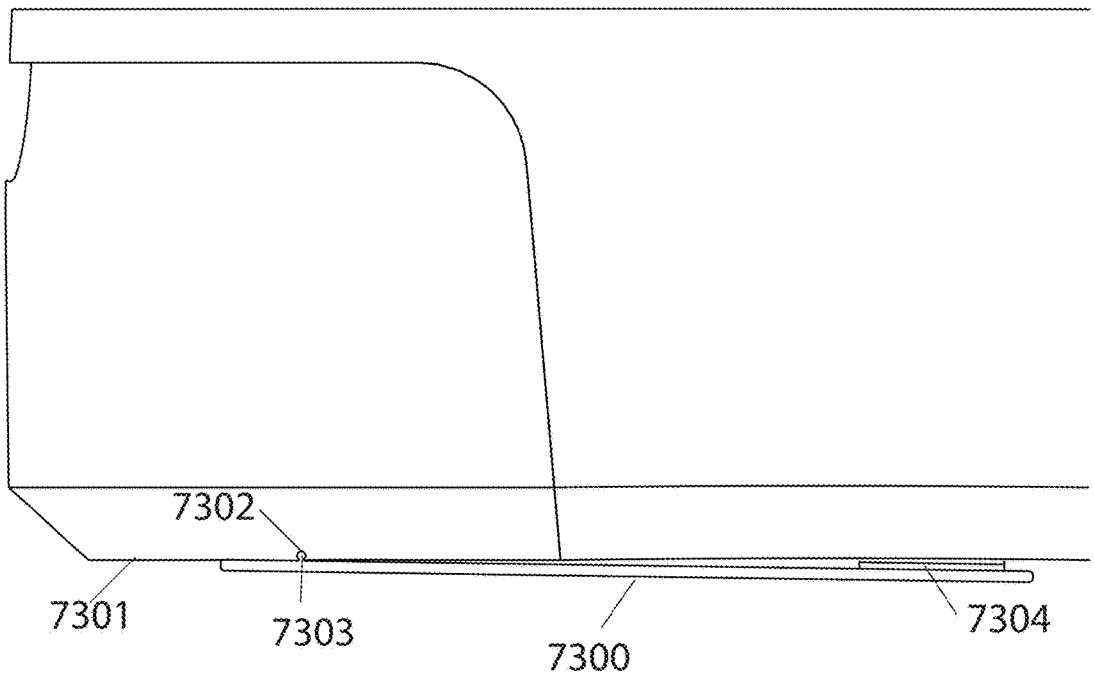
Figure 73E:
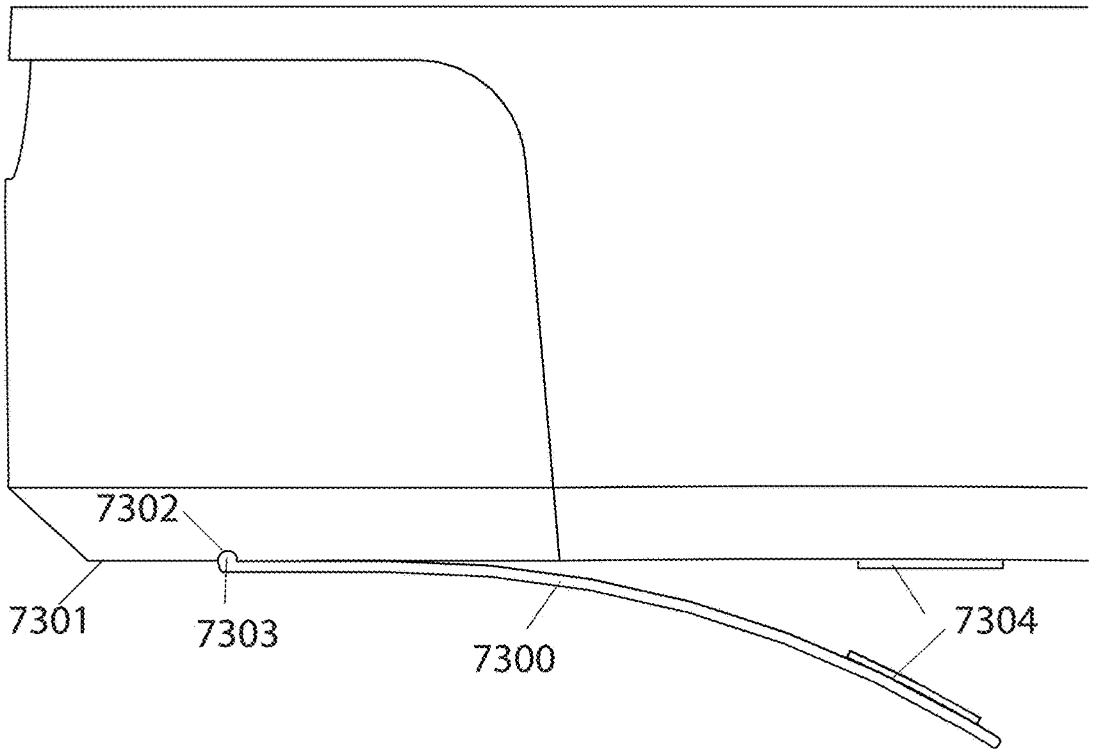
Figure 73F:
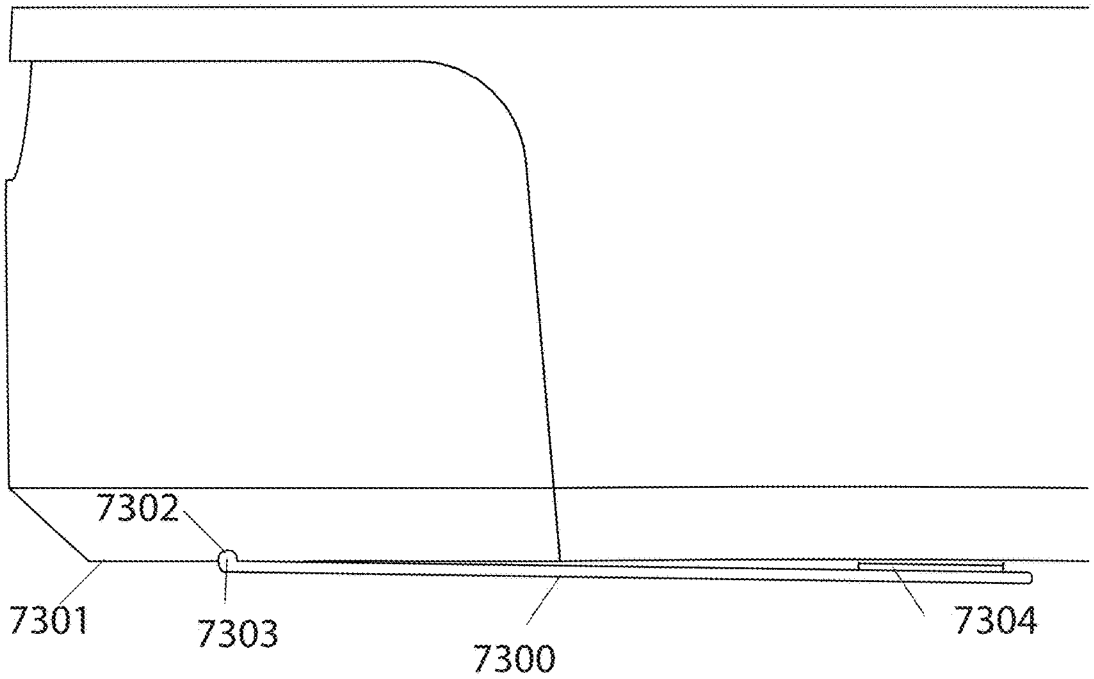

In some embodiments, a mopping cloth is detachable from the main body of the robotic surface cleaning device such that the mopping cloth may be removed and washed by a user after it has become soiled. Various securing methods map be used, such as clamp, magnets Velcro, etc. For example, a mopping cloth may be detachable with a portion of the bottom surface of the robot chassis or a component of the robot (e.g., dustbin or fluid reservoir). FIGS. 73A and 73B illustrate an example of a mopping cloth 7300 slidingly coupled to a bottom of a robotic surface cleaner 7301 on a first end. The bottom of robotic surface cleaner 7301 includes a groove 7302 into which a lip 7303 of mopping cloth 7300 may slide. After sliding the first send of mopping cloth 7300 into position on the bottom of the chassis, as shown in FIG. 73A, the opposite end of mopping cloth 7300 may be secured to the bottom of the chassis as well using Velcro or magnets 7304, for example, as illustrated in FIG. 73B. FIGS. 73C-73F illustrate alternative groove and lip configurations for securing the mopping cloth to the bottom of the chassis. In FIGS. 73C-73F the groove 7302 extends inwards towards the chassis. In some embodiments, the mopping cloth includes the groove and the bottom of the chassis of the robot includes the lip. In some embodiments, both sides of the mopping cloth are secured to the bottom of the robot using groove and lip mechanism as described. In some embodiments, the side on which the mopping cloth is secured with the groove and lip mechanism may vary depending on the movement of the robot, and, for example, avoiding Velcro or magnets from detaching. In some embodiments, the groove and lip sliding mechanism may be used on any side of the mopping cloth and more than one groove and lip sliding mechanism may be used. In some embodiments, the positioning of the groove and lip sliding mechanism and the second securing mechanism (item 7304 in FIGS. 73A-73F) may vary depending on, for example, which configuration best secures the mopping cloth to the robot during operation.

In some embodiments, water is placed within a liquid reservoir of a surface cleaning robot and the water is reacted to produce hydrogen peroxide for cleaning and disinfecting the floor as the robot moves around. In some embodiments, the liquid reservoir may be a part of an extension module, a replacement module, or built into the robot. In some embodiments, the process of water electrolysis may be used to generate the hydrogen peroxide. In some embodiments, the process includes water oxidation over an electrocatalyst in an electrolyte, that results in hydrogen peroxide dissolved in the electrolyte which may be directly applied to the working surface or may be further processed before applying it to the working surface.

Figure 74:
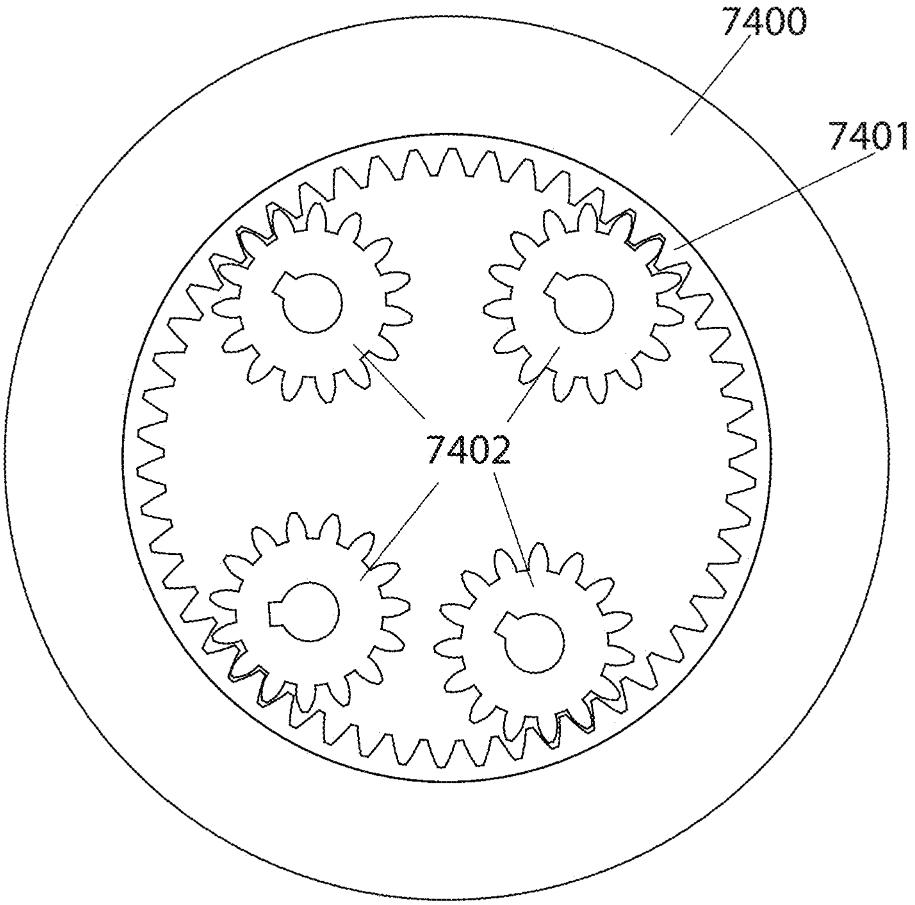
FIG. 74 illustrates an example of a wheel of a VMP robot, according to some embodiments.

In some embodiments, the wheels of the VMP robot include a wheel suspension system. In some embodiments, the wheel suspension system is a dual suspension system including a first and second suspension system. In some embodiments, the first suspension system includes a wheel coupled to a rotating arm pivotally coupled to a wheel frame. A spring is attached to the rotating arm on one end and the wheel frame on an opposite end. The spring is in an extended state, such that it constantly applies a force to the rotating arm causing the wheel to be pressed against the driving surface as the spring attempts to return to an unstretched state. As the rotating arm with coupled wheel rotates into the wheel frame (e.g., due to an encounter with an obstacle or deformity in the driving surface) the spring is further extended. In some embodiments, the second suspension system includes one or more extension springs vertically positioned between the wheel frame and the chassis of the VMP robot. The wheel frame is slidingly coupled to a base that may be attached to the VMP robot chassis. A first end of the one or more extension springs interfaces with the wheel frame and a second end with the base, such that the one or more extension springs pull the wheel frame and base together as the one or more springs attempt to return to an unstretched state. The wheel frame with coupled rotating arm and wheel can therefore move vertically as the one or more extension springs compress and extend. When the wheel frame, and hence wheel, move vertically upwards the one or more extension springs are further extended. In some embodiments, dampers are positioned along the axis of the one or more extension springs to dissipate energy and provide for a more stable ride. In some embodiments, the spring stiffness of the one or more extension springs is such that the weight of the VMP robot and any additional structures attached thereto can be supported without fill compression of the one or more extension springs. In some embodiments, the second suspension system only allows movement in one direction. In some embodiments, travel limiting screws are coupled to the base to limit the amount of vertical movement. In some embodiments, the one or more extension springs are housed within spring housings. In some embodiments, the first and second suspensions are used independently. An example of a dual wheel suspension system is described in U.S. patent application Ser. Nos. 15/951,096 and 16/270,489, the entire contents of which are hereby incorporated by reference. Other examples of wheel suspension systems that may be used are described in U.S. patent application Ser. Nos. 15/447,450, 15/447,623, and 62/720,521. In some embodiments, one or more wheels of the VMP robot are driven by one or more electric motors. For example, FIG. 74 illustrates a wheel 7400 including wheel gear 7401. Wheel 7400 is driven by one or more output gears 7402 of one or more corresponding electric motors that interface with wheel gear 7401. The processor of the VMP robot may autonomously activate each of the one or more output gears 7402 independently of one another depending on the amount of torque required. For example, the processor may detect an obstacle on the driving surface and may activate all electric motors of the output gears 7402 as a large amount of torque may be required to overcome the obstacle. Output gears 7402 may rotate when deactivated. In other embodiments, any number of output gears interfacing with the wheel gear may be used.

Figure 75B:
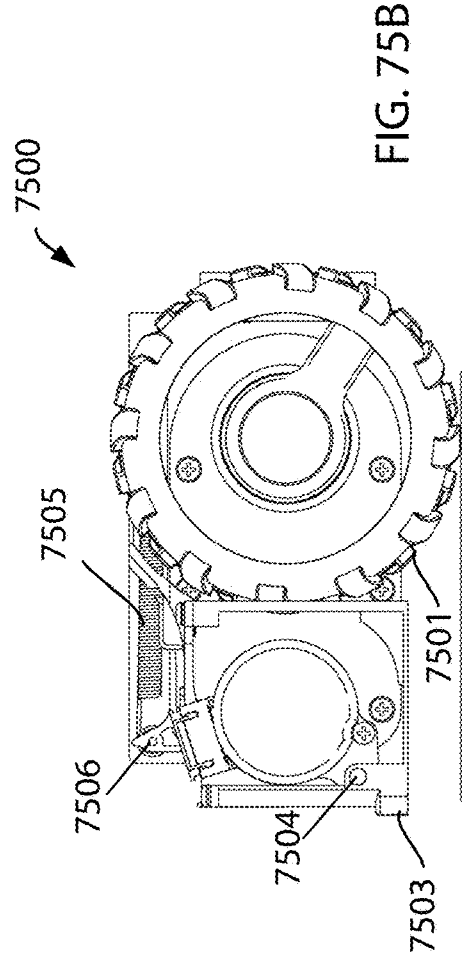
FIGS. 75A-75C illustrate an example of a wheel suspension system, according to some embodiments.
Figure 75C:
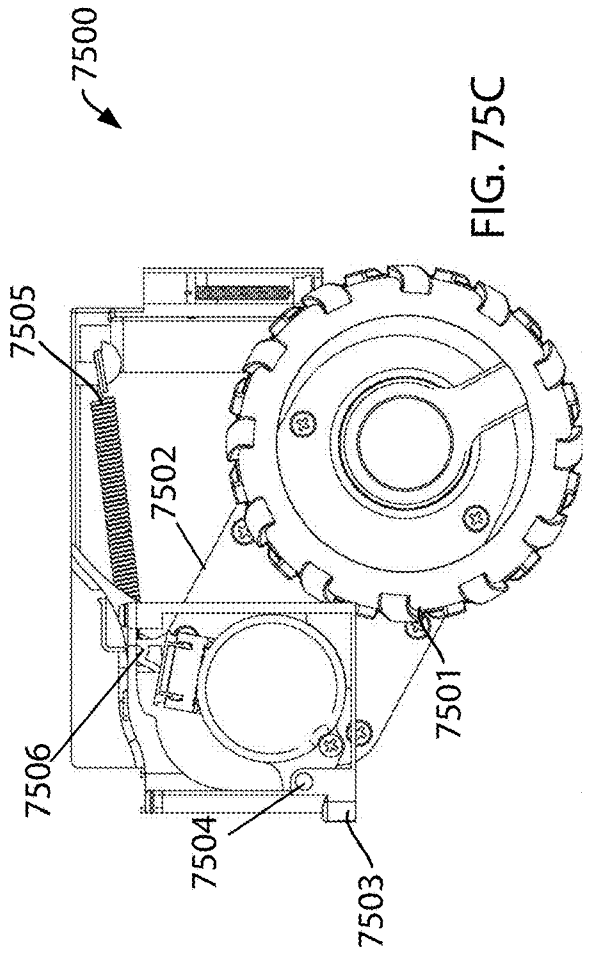
Figure 75A:
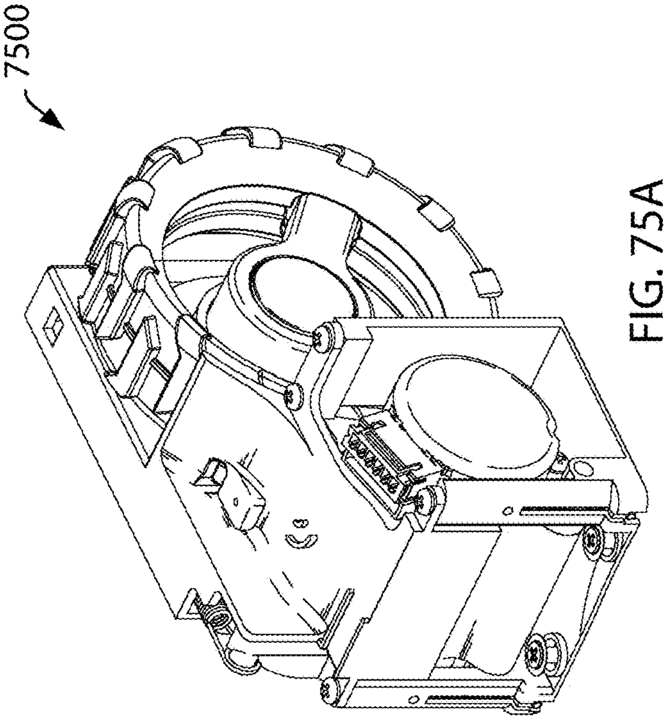

FIGS. 75A-75C illustrate an example of the first suspension system of the dual suspension system. FIG. 75A illustrates a top perspective view of the first suspension system 7500. FIG. 75B illustrates wheel 7501 in a fully retracted position, with the first suspension system 7500 disengaged and FIG. 75C illustrates wheel 7501 in a fully extended position. Wheel 7501 is coupled to rotating arm 7502 pivotally coupled to wheel frame 7503. Rotating arm 7502 pivots about point 7504. Spring 7505 is anchored to rotating arm 7502 at point 7506 on one end and to wheel frame 7503 on the opposite end. When wheel 7501 is retracted, as in FIG. 75B, spring 7505 is extended. Since spring 7505 is extended in FIG. 75B, spring 7505 pulls on point 7506 of rotating arm 7502, causing it to pivot about point 7504. This causes wheel 7501 to be constantly pressed against the driving surface. When an uneven surface or an obstacle is encountered, first suspension system 7500 is engaged as in FIG. 75C such that the wheel maintains contact with the driving surface. For example, if a hole is encountered, rotating arm 7502 immediately pivots downward due to the force of spring 7505 as it attempts to return to an unstretched state, such that wheel 7501 maintains contact with the driving surface. In some embodiments, the first suspension system is a long-travel suspension system providing, for example, up to approximately 40.0 mm of vertical displacement.

Figure 76:
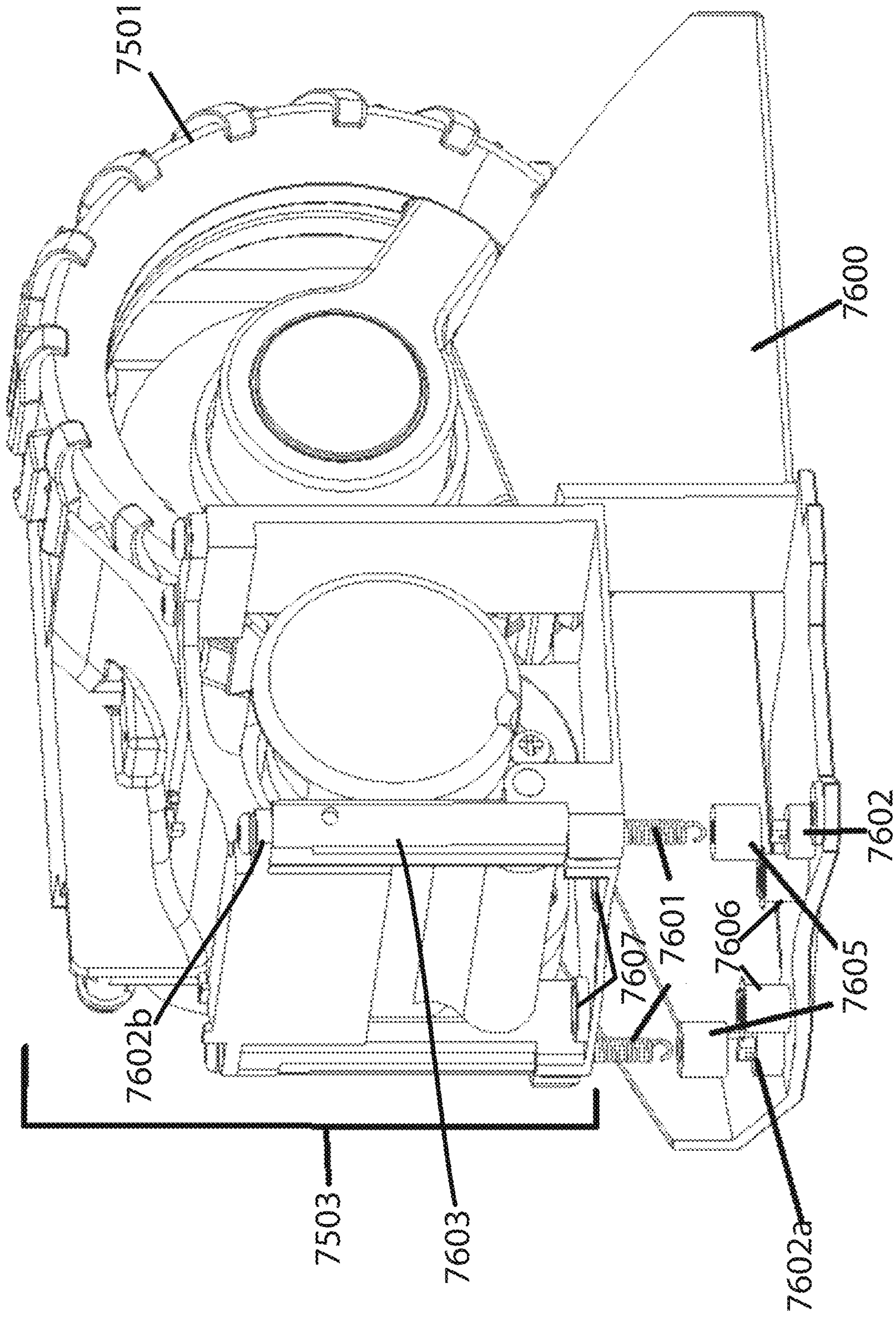
FIG. 76 illustrates an example of a wheel suspension system, according to some embodiments.

FIG. 76 illustrates an example of the second suspension system of the dual suspension system. Wheel frame 7503 is slidingly coupled with base 7600. Base 7600 includes a number of mounting elements for mounting to the chassis of the VMP robot. Extension springs 7601 are coupled with base 7600 by bottom anchors 7602*a* and with wheel frame 7503 by top anchors 7602*b*. Extension springs 7601 are positioned within spring housings 7603. Dampers 7605 are positioned along the axis of extension springs 7601. Dampers disperse spring energy such that any residual oscillating energy in the suspension springs that may cause the VMP robot to oscillate and vibrate is minimized. Travel limiting screws 7606 are disposed on base 7600. The shaft of travel limiting screws 7606 fit within holes 7607 of wheel frame 7503, however the top of travel limiting screws 7606 are larger than holes 7607, thereby limiting the maximum upward vertical movement as wheel frame 7503 moves relative to base 7600. The tension of extension springs 7601 may be chosen such that the position of frame 7503 along the length of the shaft of travel limiting screws 7606 may provide a desired range of upward and downward vertical movement. When placed on the driving surface, a force substantially equal and opposite to the weight of the VMP robot and any structures attached thereto acts on the wheels, thereby pushing wheel frame 7503 vertically upwards relative to base 7600. Since wheel frame 7503 and base 7600 are mechanically coupled by extension springs 7601, the tension of extension springs 7601 determine the amount by which wheel frame 7503 is pushed upwards. In some embodiments, the maximum upward movement is equal to the maximum downward movement while in other embodiments, the maximum upward movement is greater than the maximum downward movement and vice versa. In some embodiments, the second suspension system is a short-travel suspension system providing, for example, up to approximately 3.0 mm of upward and downward vertical displacement.

Figure 77A:
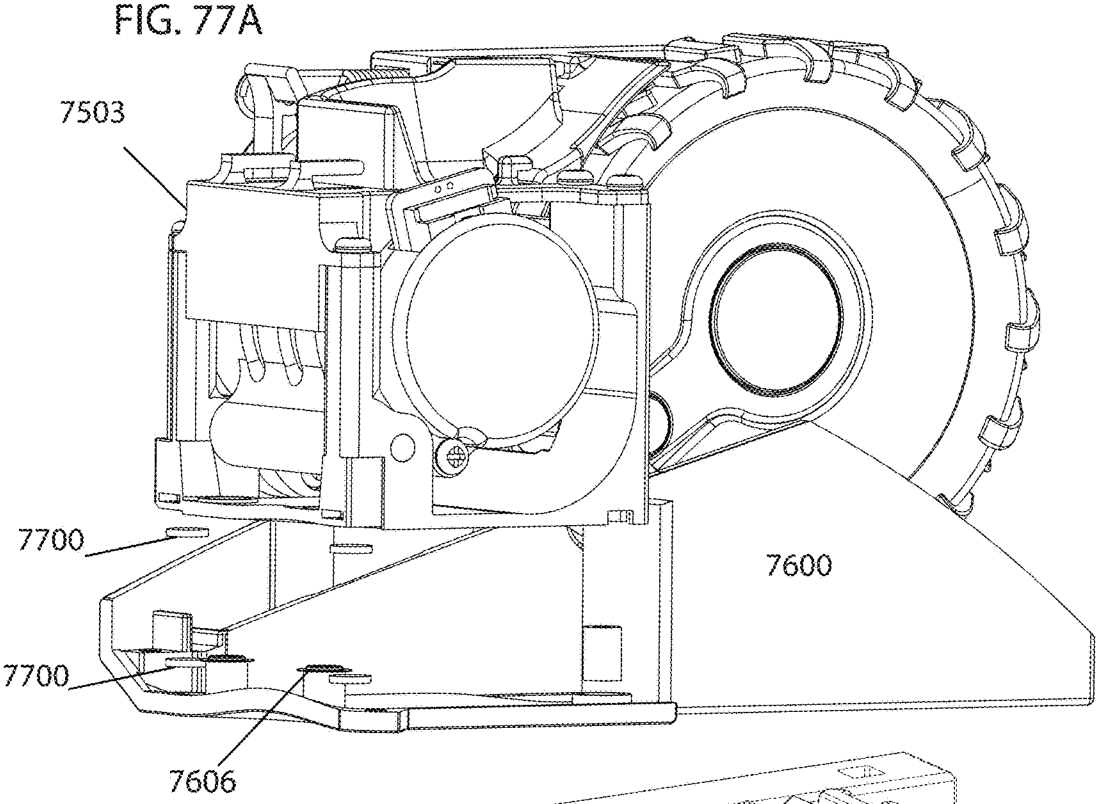
FIGS. 77A and 77B illustrate an example of a wheel suspension system, according to some embodiments.
Figure 77B:
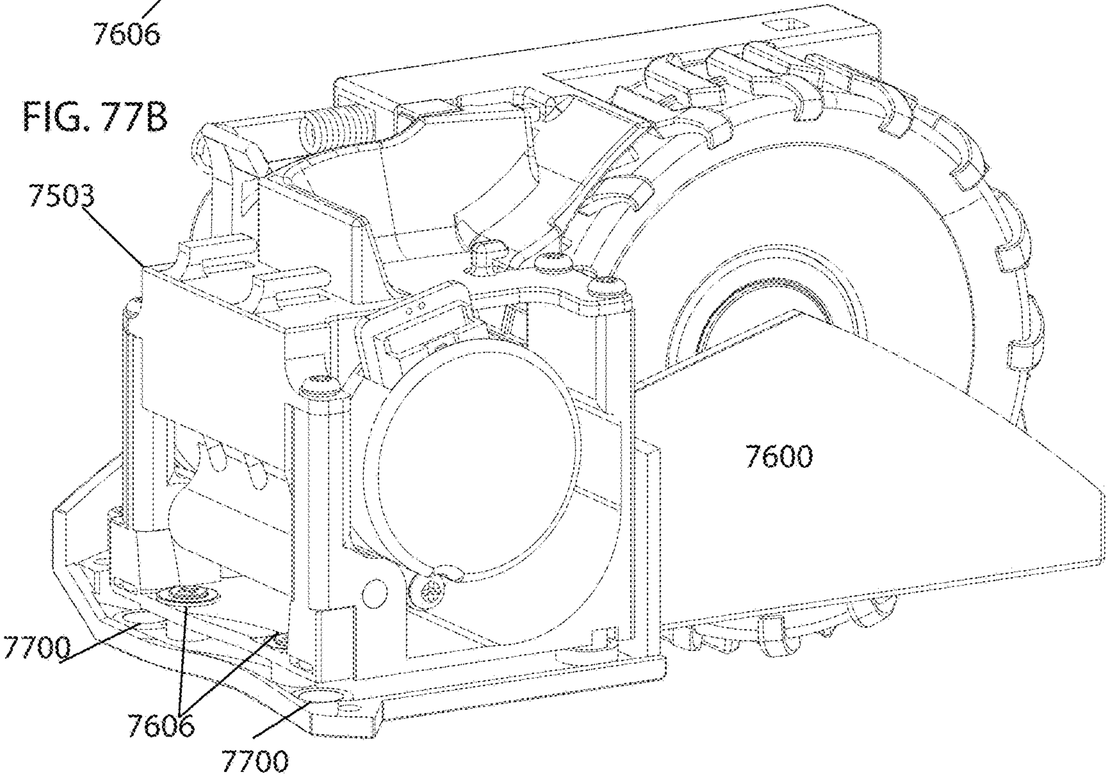
Figure 78:
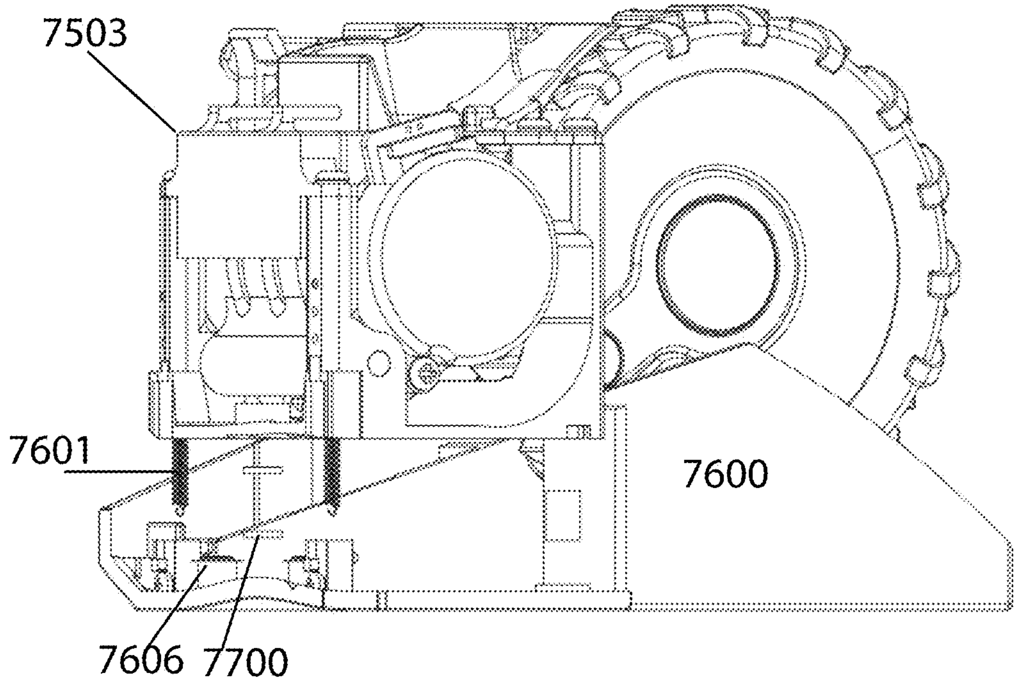
FIG. 78 illustrates an example of a wheel suspension system, according to some embodiments.

In some embodiments, magnets are used in place of the vertically positioned extension springs of the second suspension. FIG. 77A illustrates an exploded view of an example of the second suspension system where magnets 7700 are used in place of extension spring. FIG. 77B illustrates the second suspension system including base 7600, slidingly coupled with wheel frame 7503, the two attracted to each other by paired magnets 7700. Paired magnets are oriented by opposite poles such that they attract one another. One magnet of the magnet pair 7700 is affixed to wheel frame 7503 while the other magnet of the magnet pair 7700 is affixed to base 7600. Traveling limiting screws 7606 limit the linear separation of wheel frame 7503 and base 7600 as they slide relative to one another. Upon encountering uneven surfaces, such as small bumps or holes, the magnets will separate and pull back together as required, allowing a smoother ride. One or more sets of magnets may be used between wheel frame 7503 and base 7600. For instance, two magnet pairs may be positioned in the rear with one in the front and one on the side. Other variations may also be possible. In one embodiment, each wheel includes three magnet pairs. In yet another embodiment, magnets are used in addition to extension springs in the second suspension system, both having complimentary functionality as when used independently. FIG. 78 illustrates an exploded view of an example of the second suspension system including extension springs 7601 and magnet pair 7700. Extension springs 7601 extend and compress and magnets of magnet pair 7700 come together and pull apart as the VMP robot drives over uneven surfaces, providing a smoother riding experience.

Figure 79A:
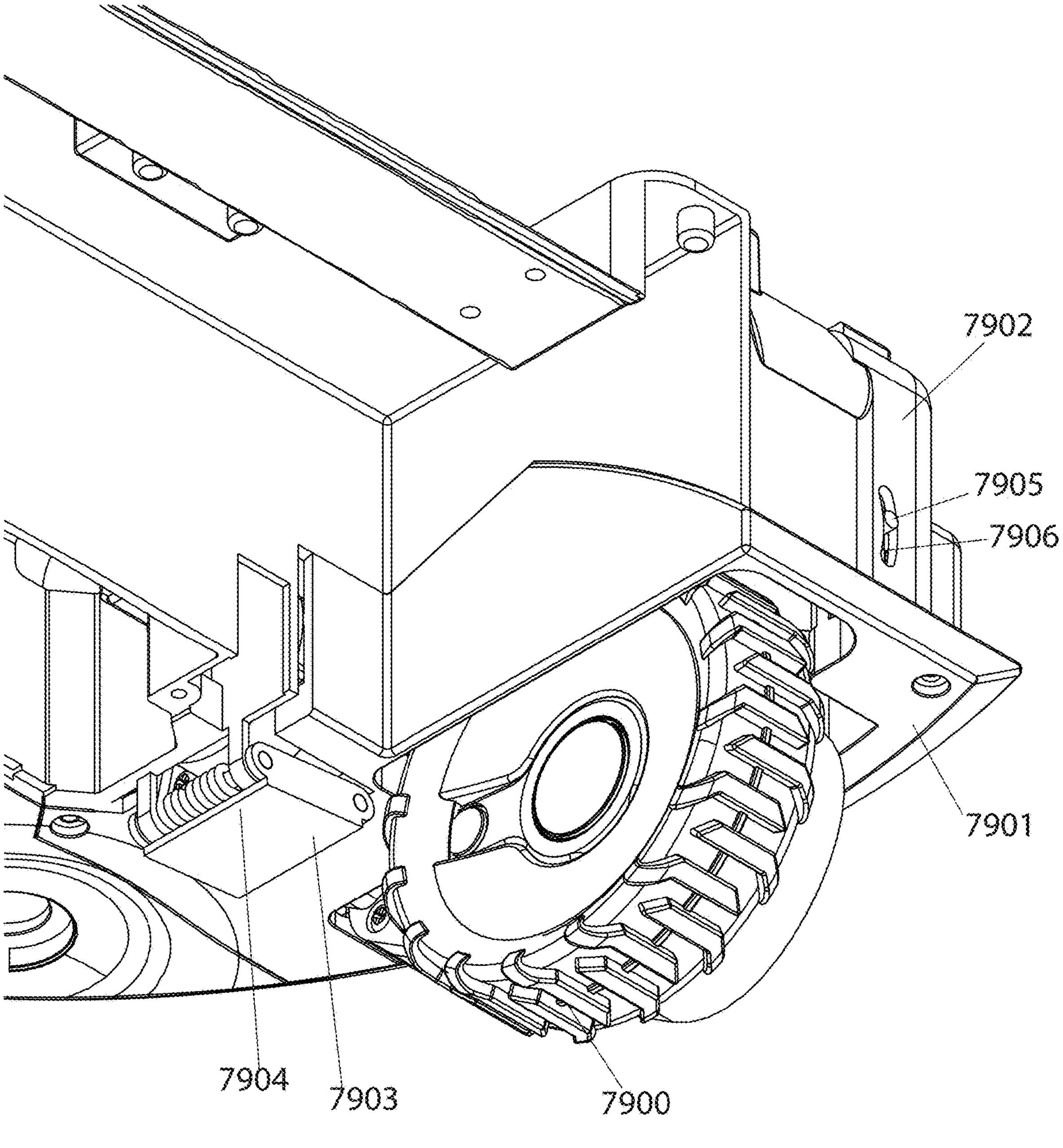
FIGS. 79A-79G illustrate an example of a wheel suspension system, according to some embodiments.
Figure 79B:
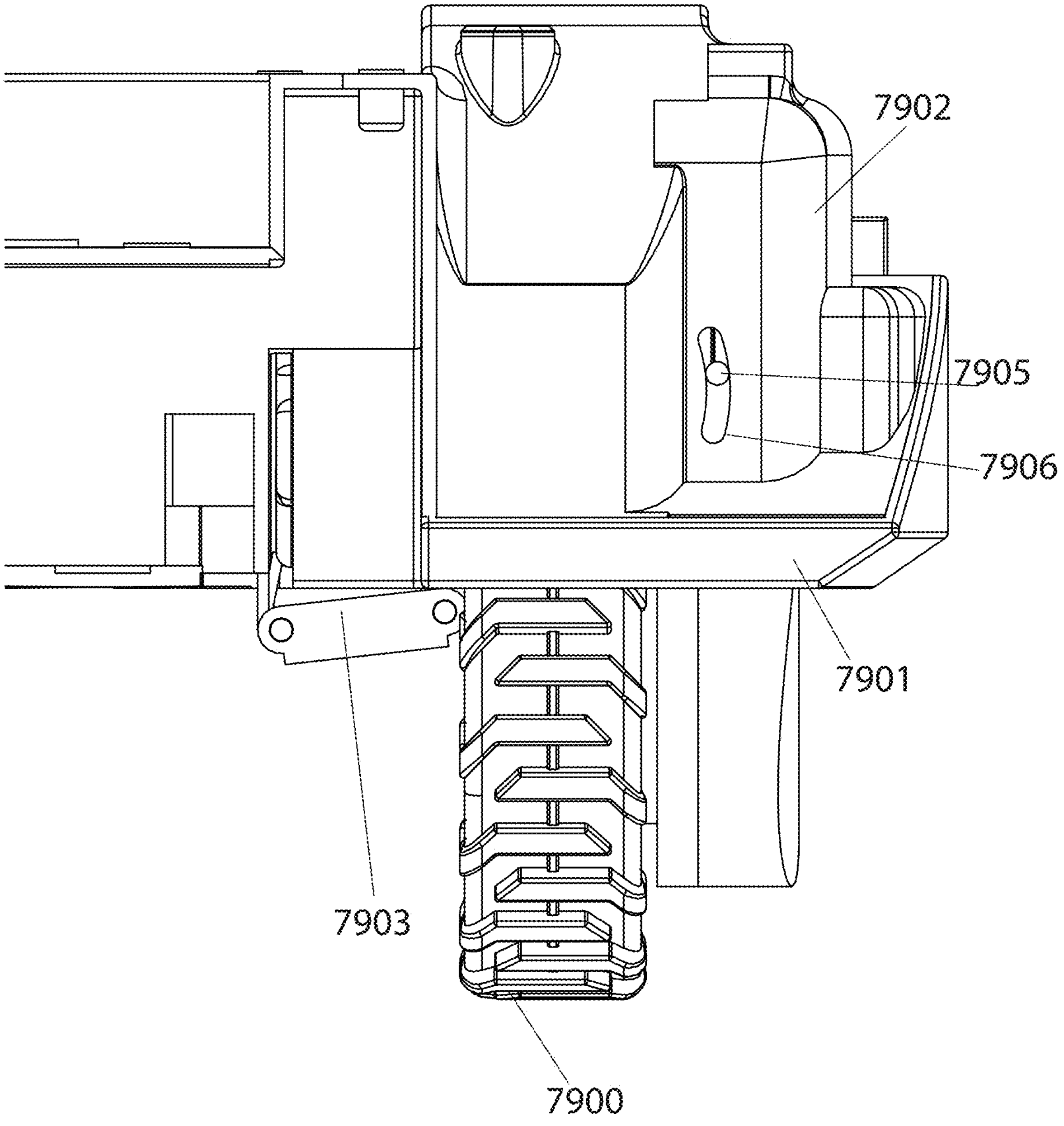
Figure 79C:
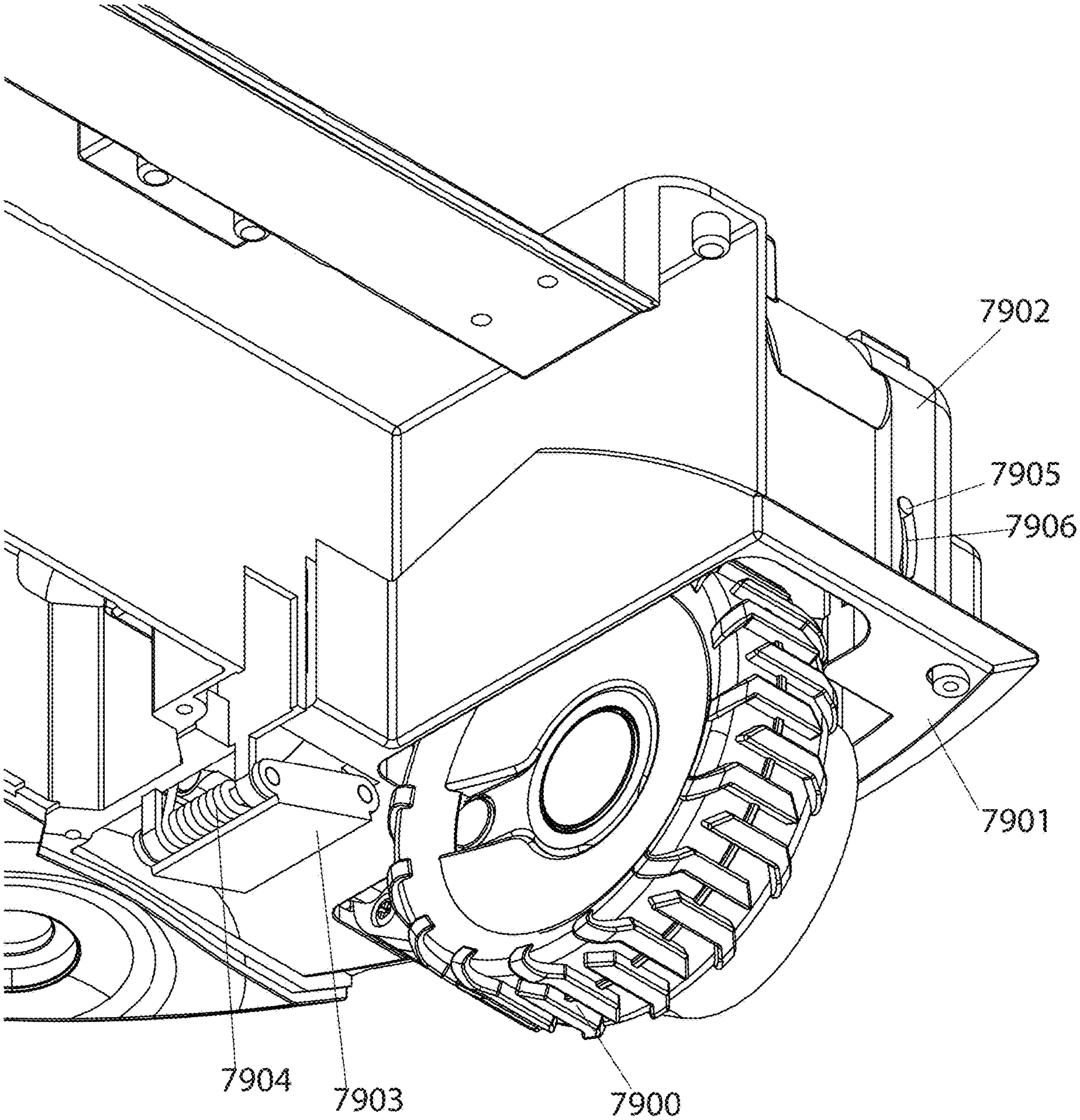
Figure 79D:
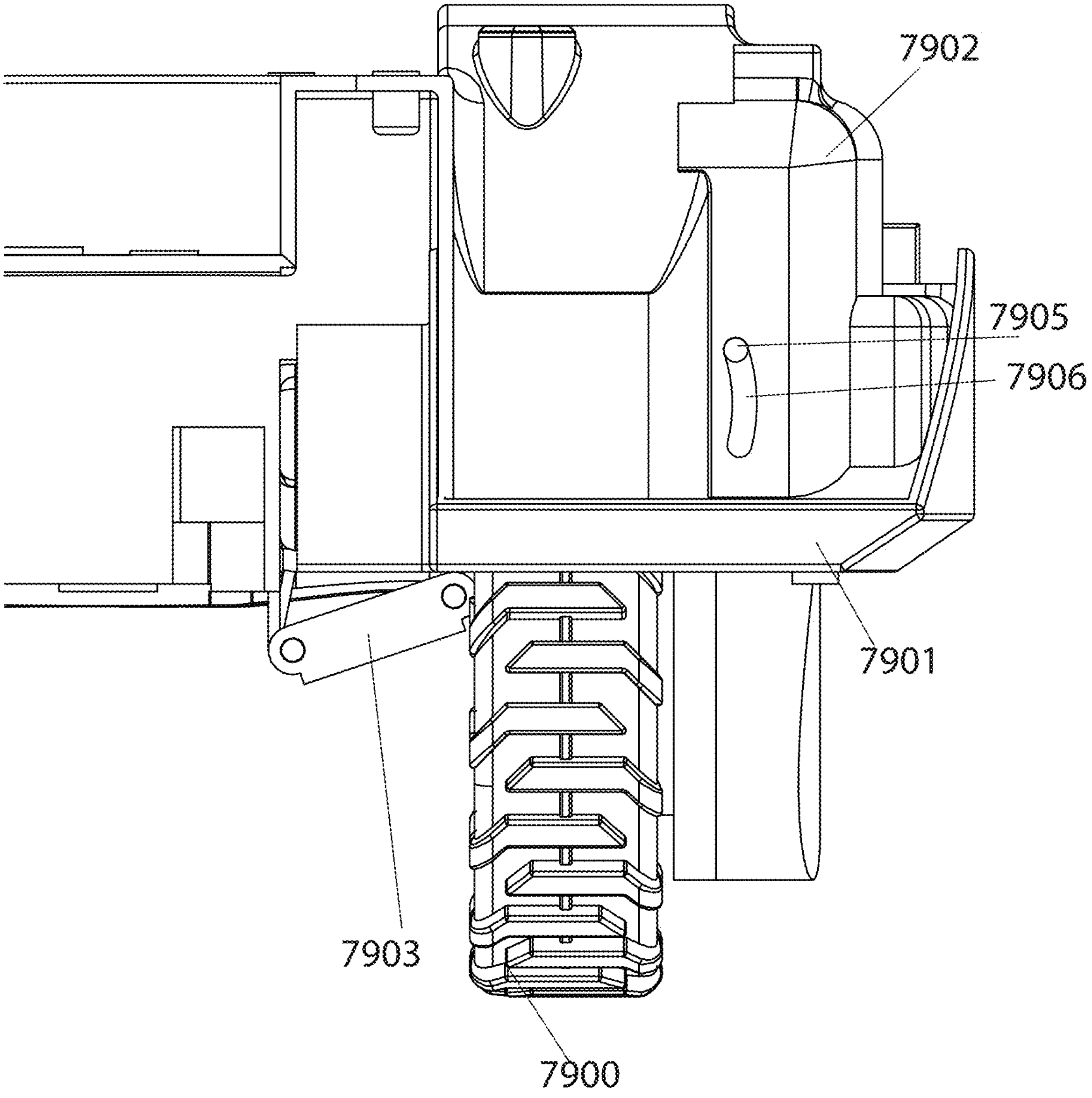
Figure 79E:
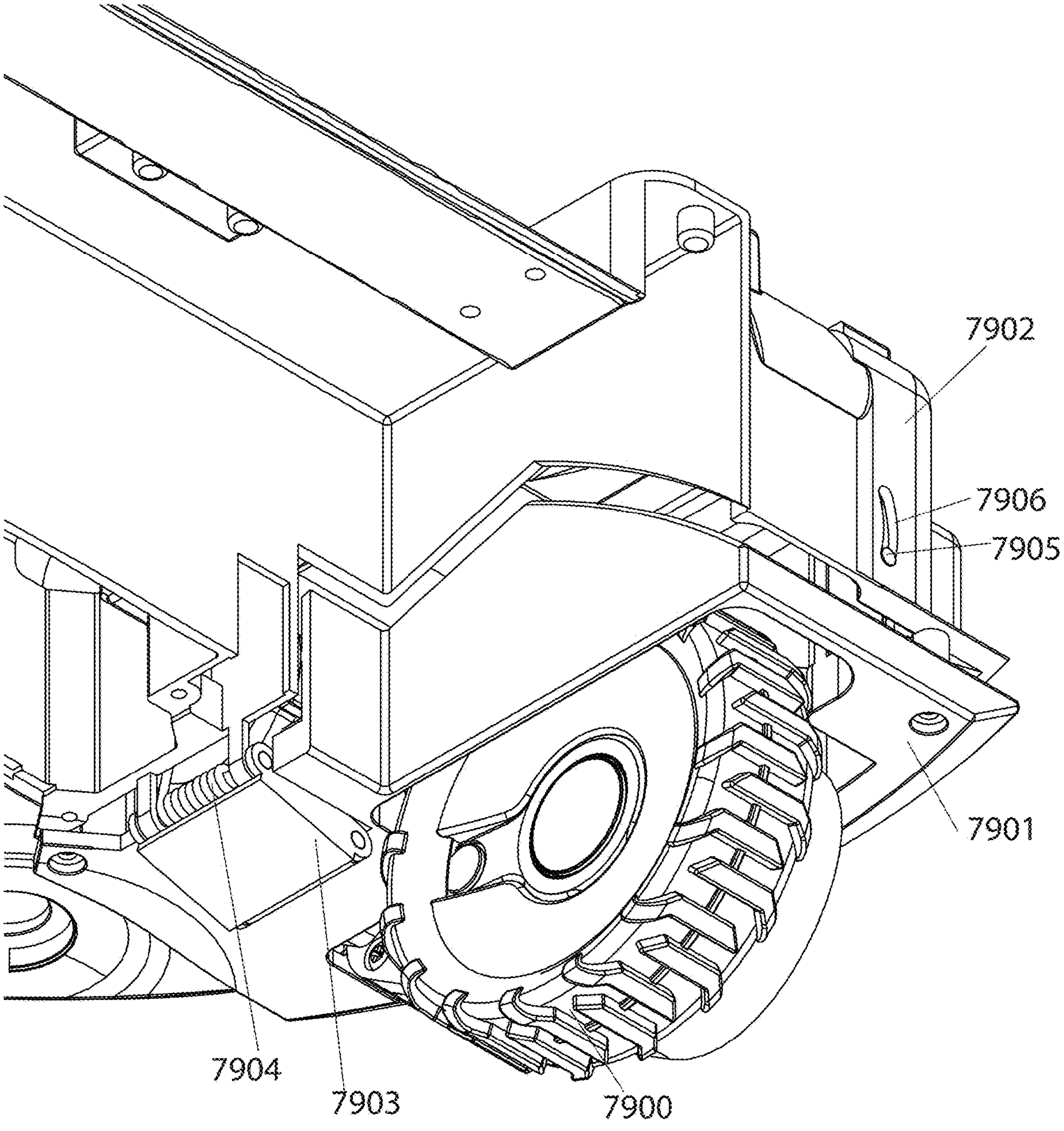
Figure 79F:
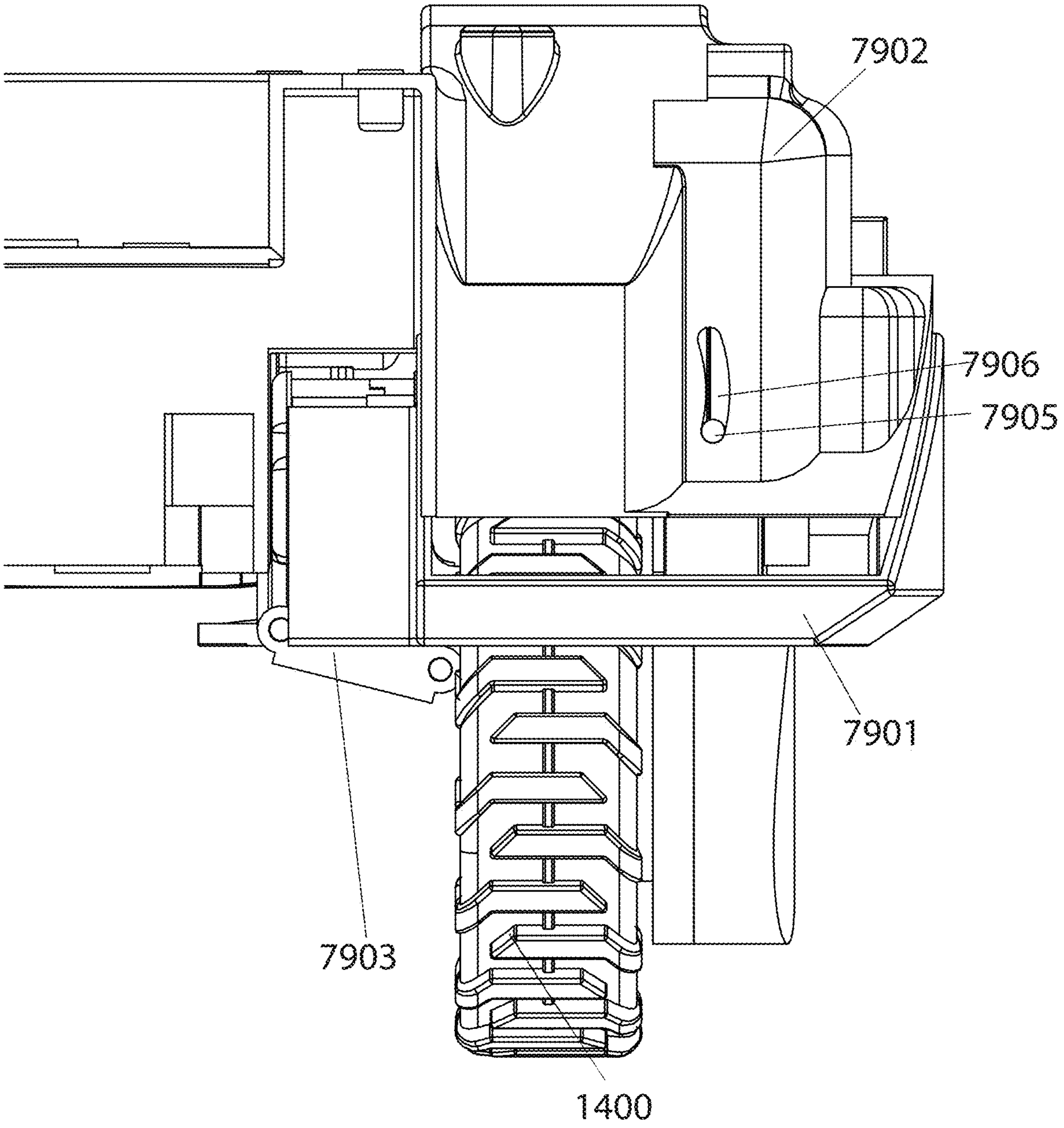
Figure 79G:
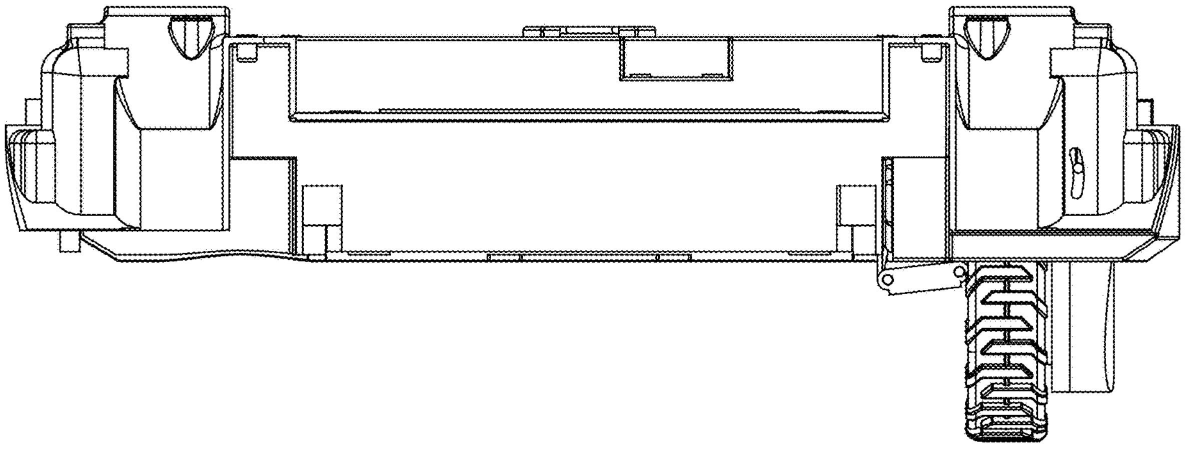

In some embodiments, the VMP robot (or any other type of robot that implements the methods and techniques described in the disclosure) may include other types of wheel suspension systems. For example, FIGS. 79A and 79B illustrate a wheel suspension system including a wheel 7900 mounted to a wheel frame 7901 slidingly coupled with a chassis 7902 of a robot, a control arm 7903 coupled to the wheel frame 7901, and a torsion spring 7904 positioned between the chassis 7902 and the control arm 7903. Wheel frame 7901 includes coupled pin 7905 that fits within and slides along slot 7906 of chassis 7902. When the robot is on the driving surface, the spring is slightly compressed due to the weight of the robot acting on the torsion spring 7904, and the pin 7905 is positioned halfway along slot 7906, as illustrated in FIGS. 79A and 79B. When the wheel 7900 encounters an obstacle such as a bump, for example, the wheel retracts upwards towards the chassis 7902 causing the torsion spring 7904 to compress and pin 7905 to reach the highest point of slot 7906, as illustrated in FIGS. 79C and 79D. When the wheel 7900 encounters an obstacle such as a hole, for example, the wheel extends downwards away from the chassis 7902 causing the torsion spring 7904 to decompress and pin 7905 to reach the lowest point of slot 7906, as illustrated in FIGS. 79E and 79F. The pin 7905 and the slot 7906 control the maximum vertical displacement of the wheel 7900 in an upwards and downwards direction as slot 7906 prevents pin 7905 attached to wheel frame 7901 with wheel 7900 from physically displacing past its limits. Therefore, the slot may be altered to choose the desired maximum displacement in either direction. Further, torsion springs with different spring stiffness may be chosen, which varies the position of the pin when the robot is on the driving surface and hence the maximum displacement in the upwards and downwards directions. In some embodiments, the wheel suspension system is configured such that displacement may only occur in one direction or displacement occurs in two directions. In some embodiments, the wheel suspension system is configured such that maximum displacement upwards is equal to maximum displacement downwards or such that maximum displacements upwards and downwards are different. FIG. 79G illustrates the wheel suspension during normal driving conditions implemented on a robot.

Figure 80A:
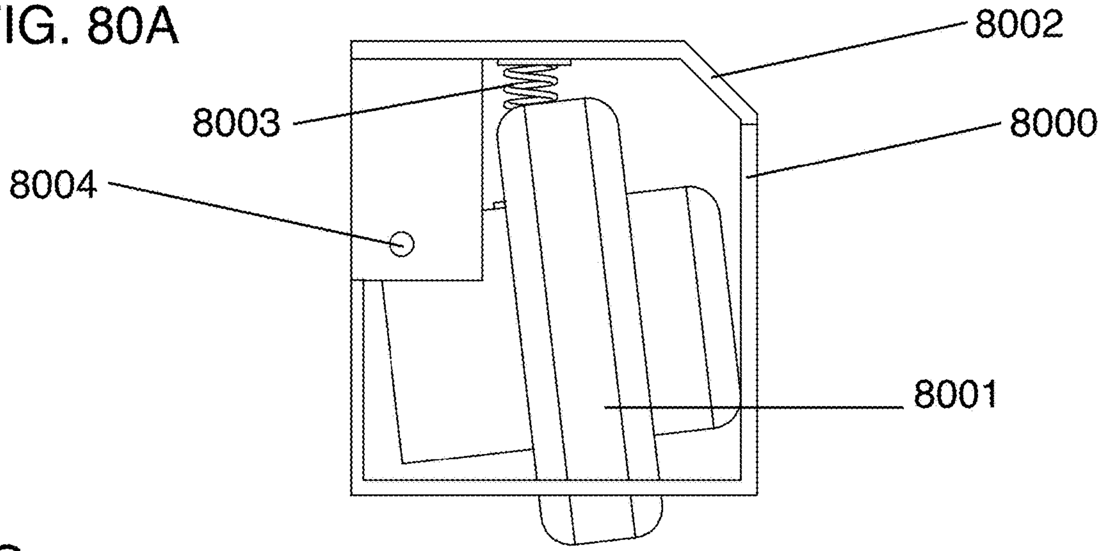
FIGS. 80A-80C illustrate an example of a wheel suspension system, according to some embodiments.
Figure 80B:
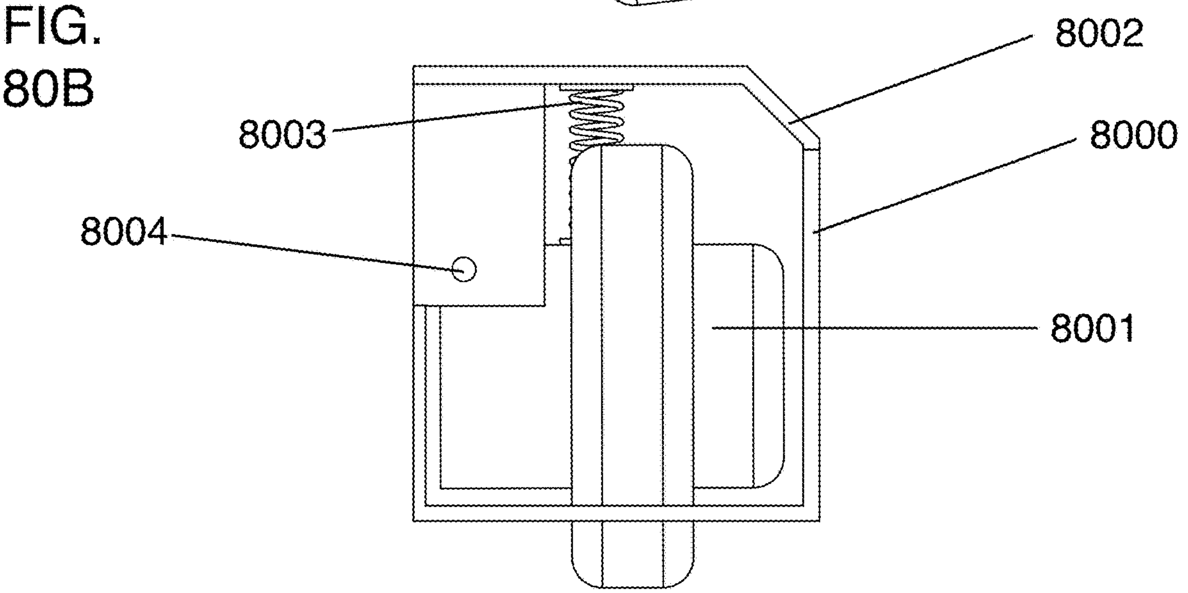
Figure 80C:
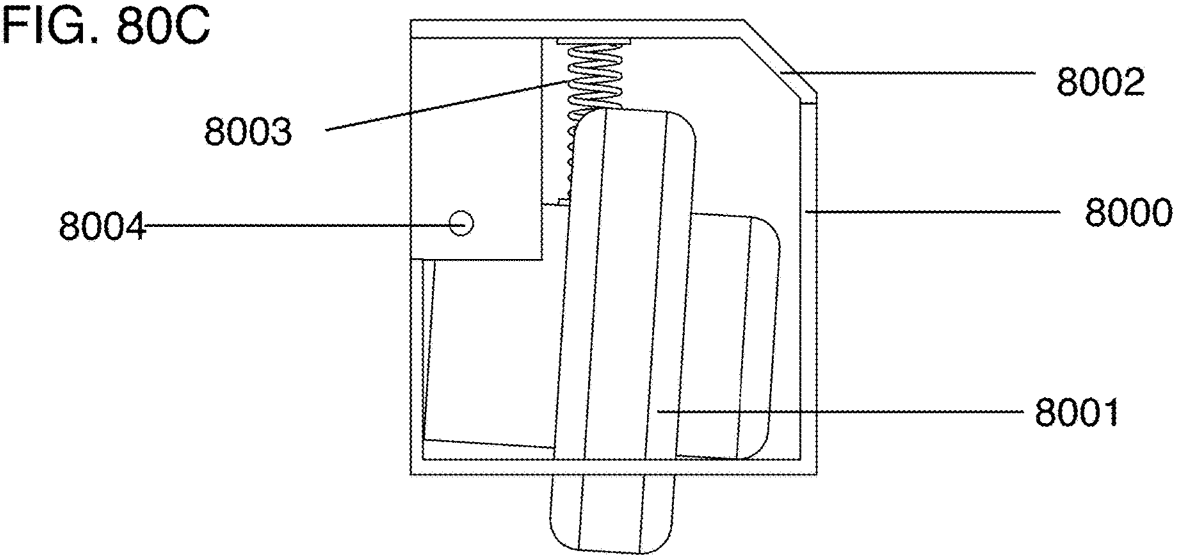
Figure 81A:
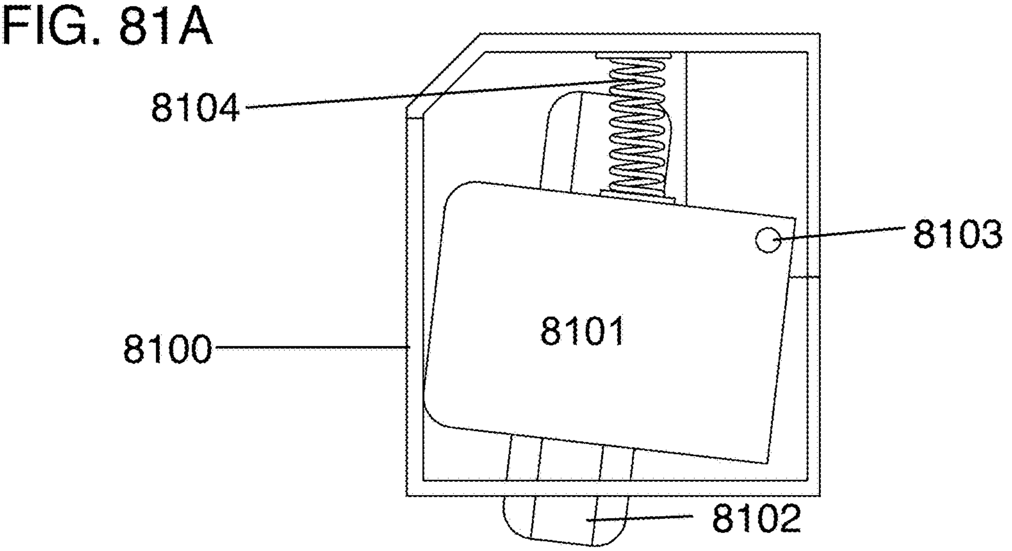
FIGS. 81A-81C illustrate an example of a wheel suspension system, according to some embodiments.
Figure 81B:
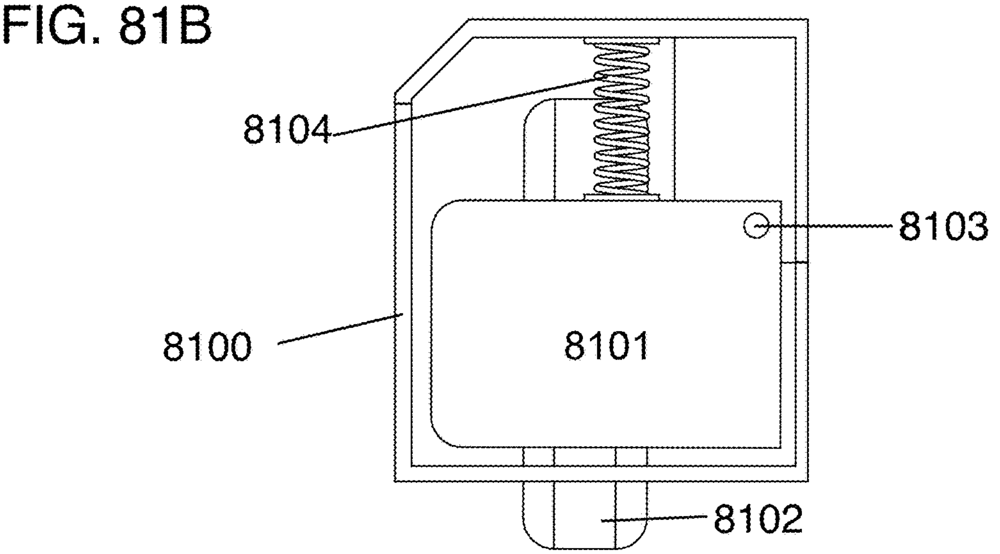
Figure 81C:
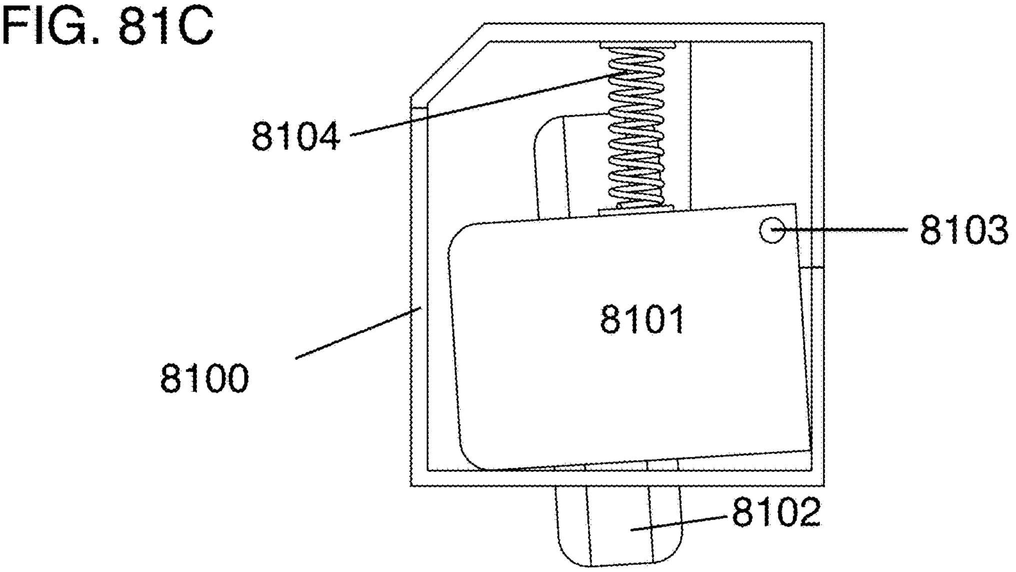

In one embodiment, the wheel suspension system is a pivoting suspension system including a wheel coupled to a wheel frame, an actuation spring coupled to the wheel frame on a first end, and a pivoting pin coupled to the wheel frame. The second end of the actuation spring and the pivoting pin are coupled to a top cover of the wheel frame, such that the wheel frame with attached wheel are pivotally coupled to the top cover such that the wheel frame and wheel may pivot from side to side about the pivot pin. In some embodiments, the top cover is or is attached to a chassis of the VMP robot. In some embodiments, the pivoting suspension system is combined with a trailing arm suspension system. FIGS. 80A-80C illustrate an example of a pivoting suspension system including a wheel frame 8000, a wheel 8001 coupled to the wheel frame 8000, a top cover 8002 of the wheel frame 8000, an actuation spring 8003 positioned between the wheel frame 8000 and the top cover 8002, and a pivot pin 8004 that pivotally coupled the wheel frame 8000 to the top cover 8002. FIG. 80B illustrates the wheel 8001 in a normal position. FIG. 80A illustrates the wheel 8001 slightly pivoted towards the left about pivot pin 8004. FIG. 80C illustrates the wheel 8001 slightly pivoted towards the right about pivot pin 8004. FIGS. 81A-81C illustrate a front view of another example of a pivoting wheel suspension including a wheel frame 8100, a wheel module 8101 with attached wheel 8102 pivotally coupled to wheel frame 8100 with pivot pin 8103, and actuation spring 8104 positioned between wheel frame 8100 and wheel module 8101. FIG. 81A illustrates the wheel module 8101 with attached wheel 8102 pivoted towards the right about pivot pin 8103. FIG. 81B illustrates the wheel module 8101 with attached wheel 8102 in a normal position. FIG. 81C illustrates the wheel module 8101 with attached wheel 8102 pivoted towards the left about pivot pin 8103. FIGS.

Figure 82A:
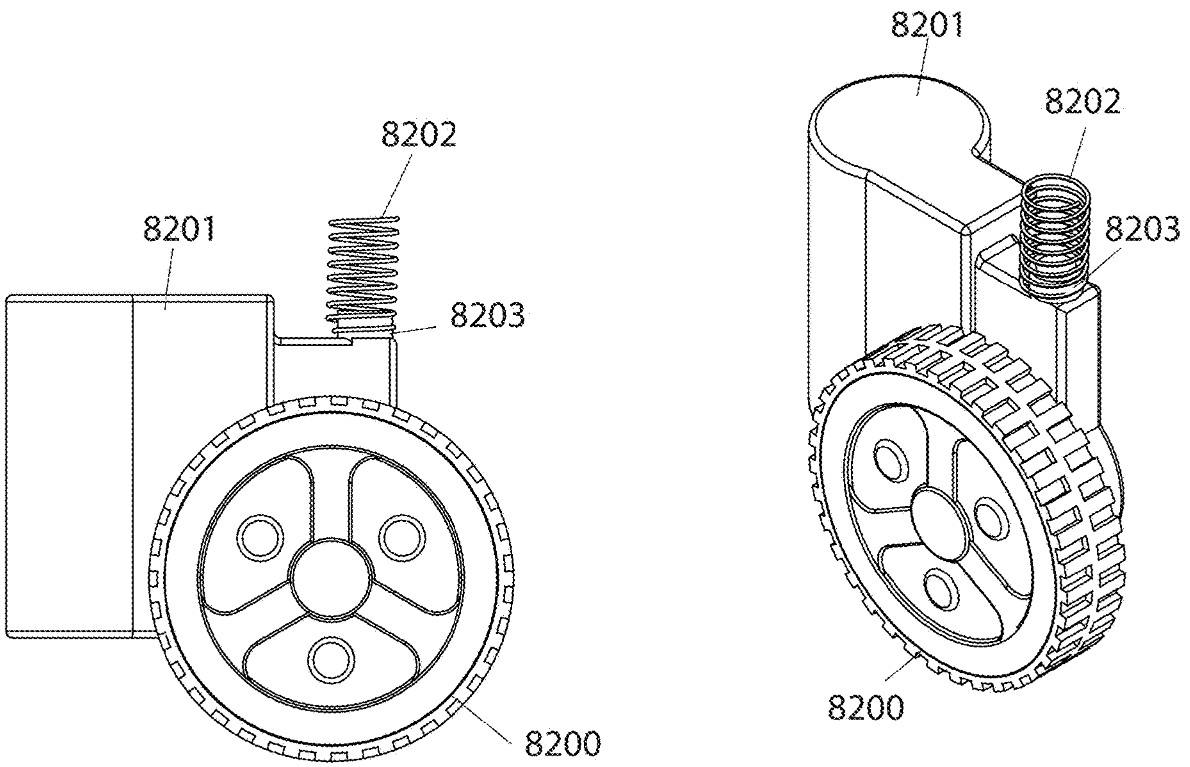
FIGS. 82A-82C illustrate an example of a wheel suspension system, according to some embodiments.
Figure 82B:
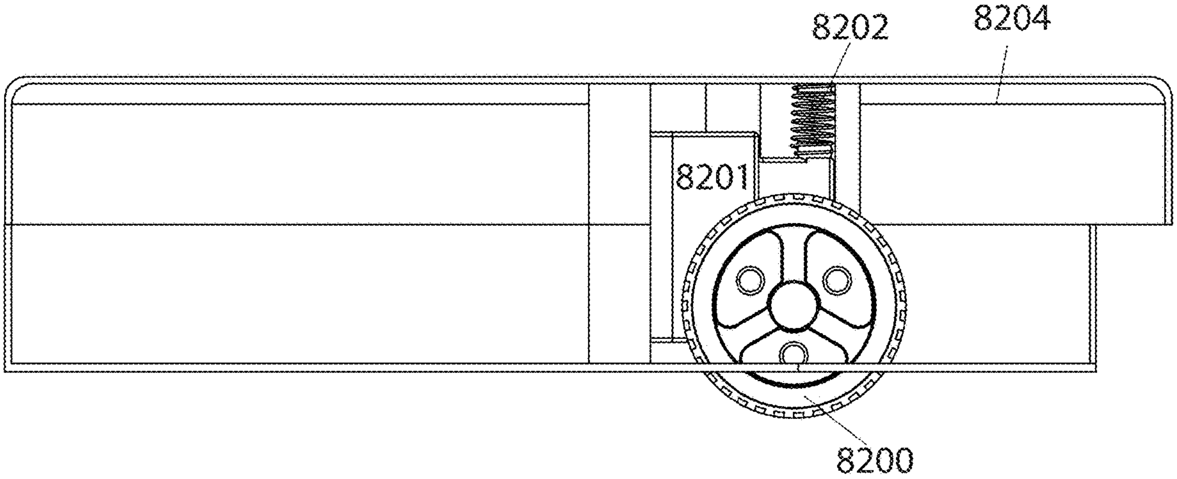
Figure 82C:
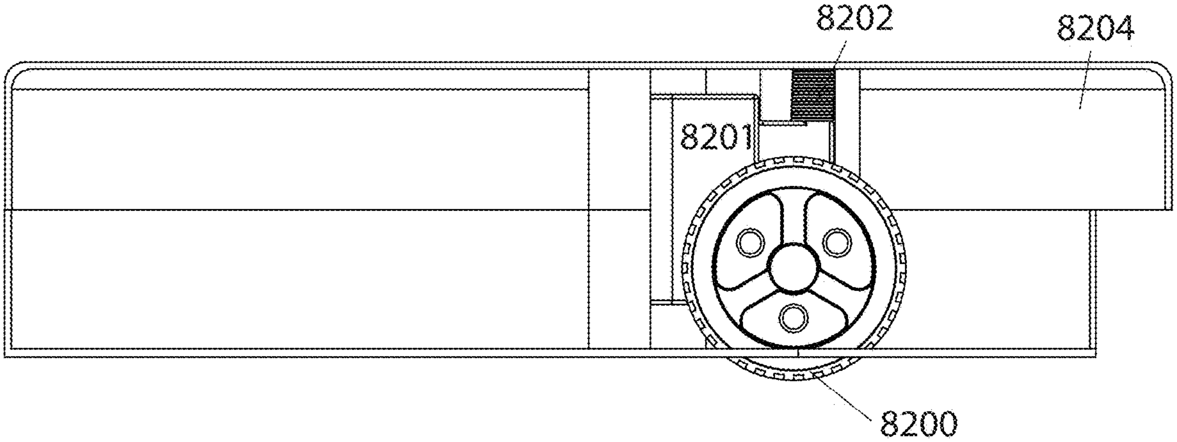
Figure 83A:
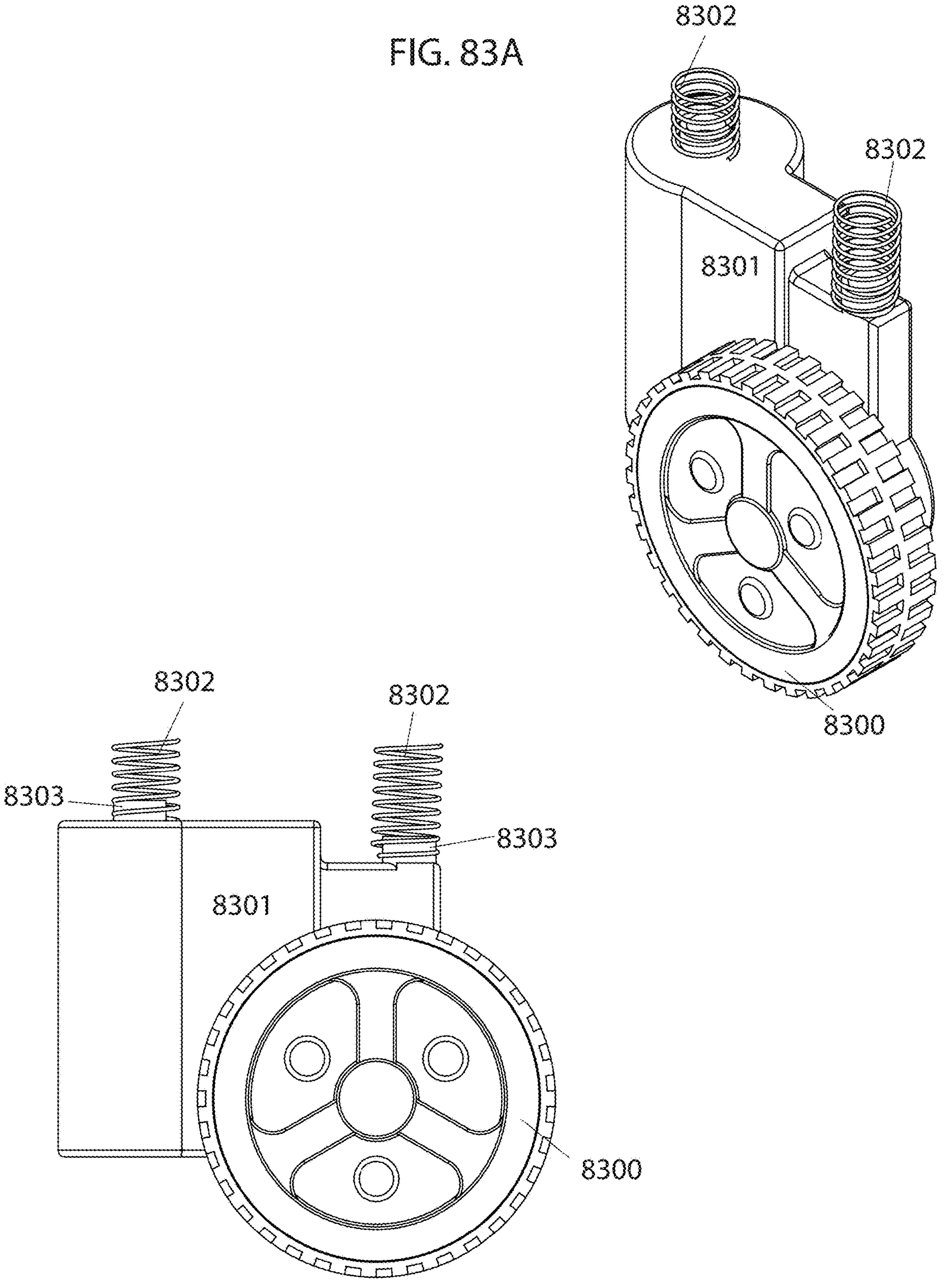
FIGS. 83A-83C illustrate an example of a wheel suspension system, according to some embodiments.
Figure 83B:
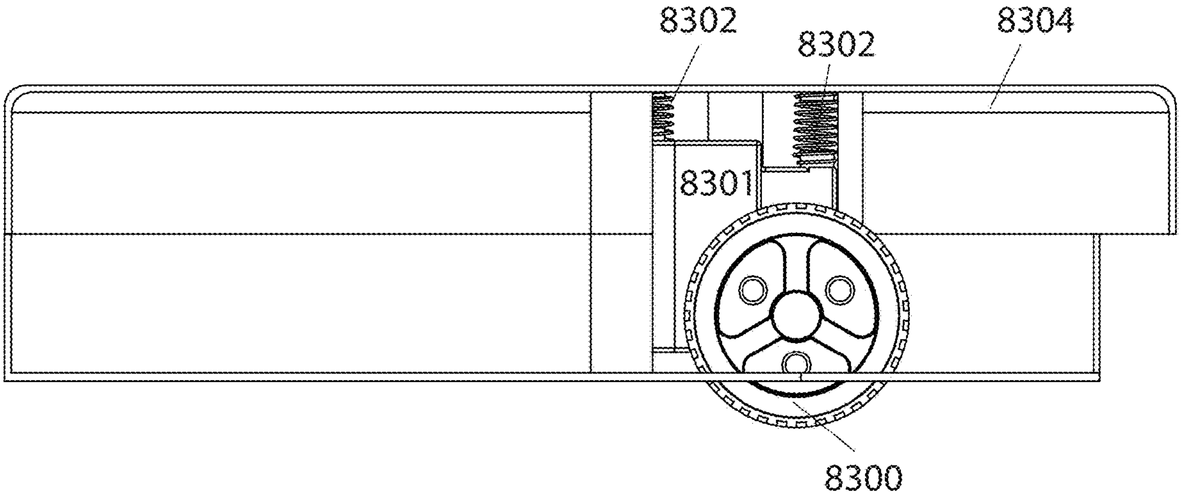
Figure 83C:
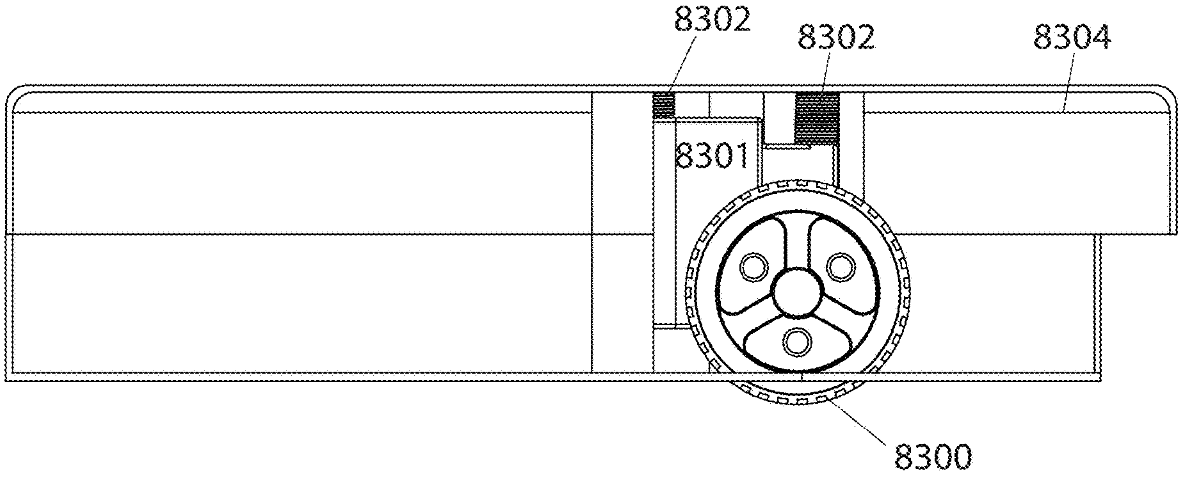

In another example, the wheel suspension includes a wheel coupled to a wheel frame. The wheel frame is slidingly coupled to the chassis of the VMP robot. A spring is vertically positioned between the wheel frame and the chassis such that the wheel frame with coupled wheel can move vertically. FIG. 82A illustrates an example of a wheel suspension system with wheel 8200 coupled to wheel frame 8201 and spring 8202 positioned on pin 8203 of wheel frame 8201. FIG. 82B illustrates the wheel suspension integrated with a robot 8204, the wheel frame 8201 slidingly coupled with the chassis of robot 8204. A first end of spring 8202 rests against wheel frame 8201 and a second end against the chassis of robot 8204. Spring 8202 is in a compressed state such that is applies a downward force on wheel frame 8201 causing wheel 8200 to be pressed against the driving surface. FIG. 82C illustrates wheel 8200 after moving vertically upwards (e.g., due to an encounter with an obstacle) with spring 8202 compressed, allowing for the vertical movement. In some embodiments, a second spring is added to the wheel suspension. FIG. 83A illustrates an example of a wheel suspension system with wheel 8300 coupled to wheel frame 8301 and springs 8302 is positioned on respective pins 8303 of wheel frame 8301. FIG. 83B illustrates the wheel suspension integrated with a robot 8304, the wheel frame 8301 slidingly coupled with the chassis of robot 8304. A first end of each spring 8302 rests against wheel frame 8301 and a second end against the chassis of robot 8304. Springs 8302 are in a compressed state such that they apply a downward force on wheel frame 8301 causing wheel 8300 to be pressed against the driving surface. FIG. 83C illustrates wheel 8300 after moving vertically upwards (e.g., due to an encounter with an obstacle) with springs 8302 compressed, allowing for the vertical movement.

Figure 84A:
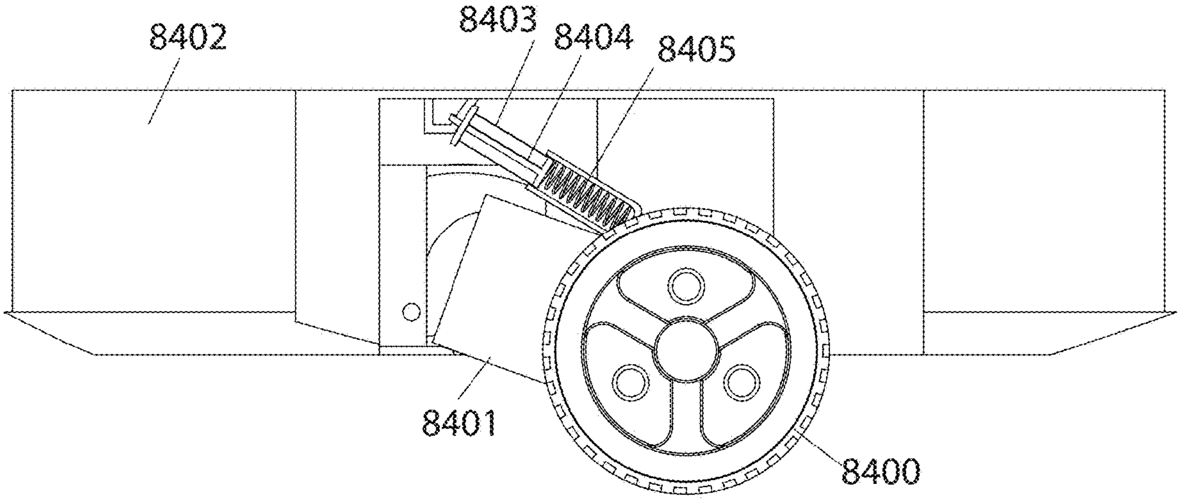
FIGS. 84A-84D illustrate an example of a wheel suspension system, according to some embodiments.
Figure 84B:
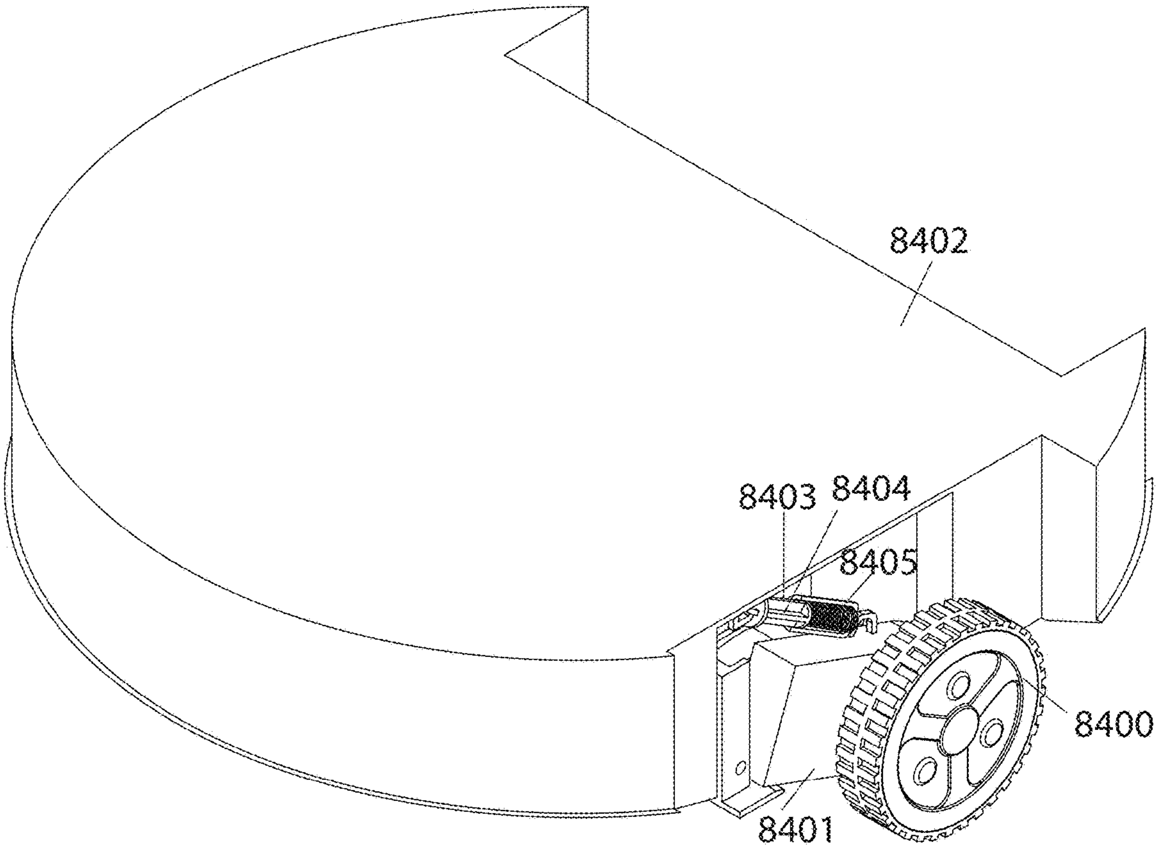
Figure 84C:
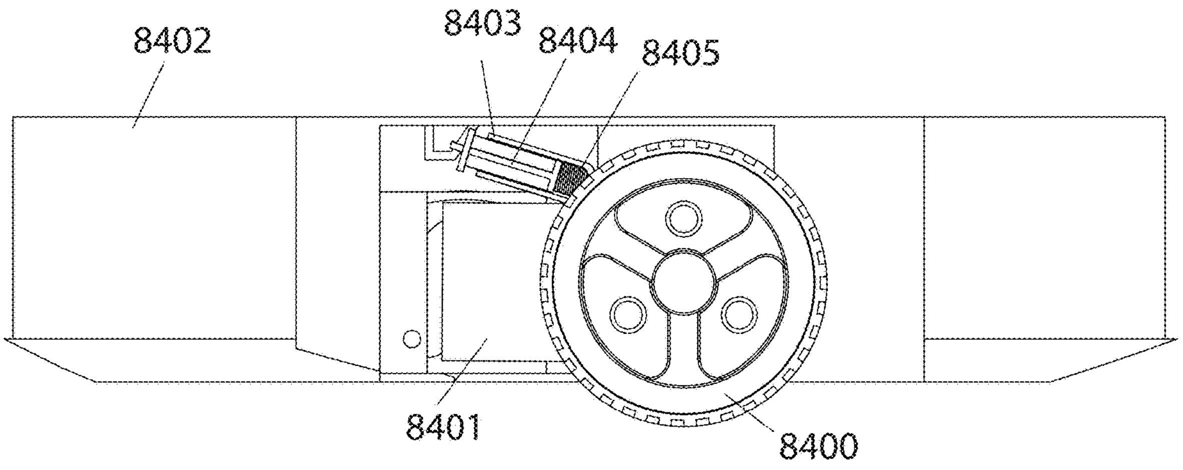
Figure 84D:
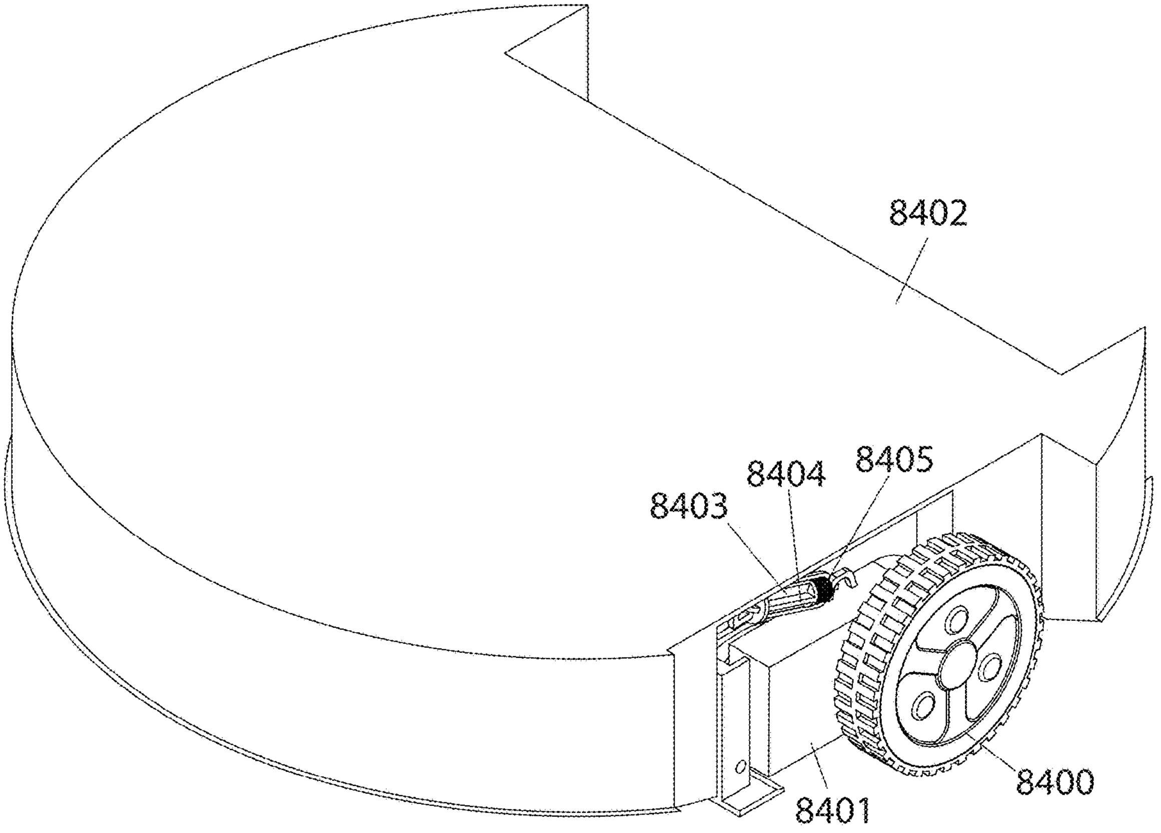

In one example, the wheel suspension includes a wheel coupled to a rotating arm pivotally attached to a chassis of the VMP robot and a spring housing anchored to the rotating arm on a first end and the chassis on a second end. A plunger is attached to the spring housing at the first end and a spring is housed at the opposite end of the spring housing such that the spring is compressed between the plunger and the second end of the spring housing. As the compressed spring constantly attempts to decompress, a constant force is applied to the rotating arm causing it to pivot downwards and the wheel to be pressed against the driving surface. When the wheel retracts (e.g., when encountering a bump in the driving surface), the rotating arm pivots upwards, causing the plunger to further compress the spring. FIGS. 84A and 84B illustrate an example of a wheel suspension including a wheel 8400 coupled to a rotating arm 8401 pivotally attached to a chassis 8402 of a robot and a spring housing 8403 anchored to the rotating arm 8401 on a first end and the chassis 8402 on a second end. A plunger 8404 is rests within the spring housing 8403 of the first end and a spring 8405 is positioned within the spring housing 8403 on the second end. Spring 8405 is compressed by the plunger 8404. As spring 8405 attempts to decompress it causes rotating arm 8401 to pivot in a downwards direction and hence the wheel 8400 to be pressed against the driving surface. FIGS. 84C and 84D illustrate the wheel 8400 retracted. When an obstacle such as a bump is encountered, for example, the wheel 8400 retracts as the rotating arm 8401 pivots in an upwards direction. This causes the spring 8405 to be further compressed by the plunger 8404. After overcoming the obstacle, the decompression of the spring 8405 causes the rotating arm 8401 to pivot in a downwards direction and hence the wheel 8400 to be pressed against the driving surface.

Figure 85A:
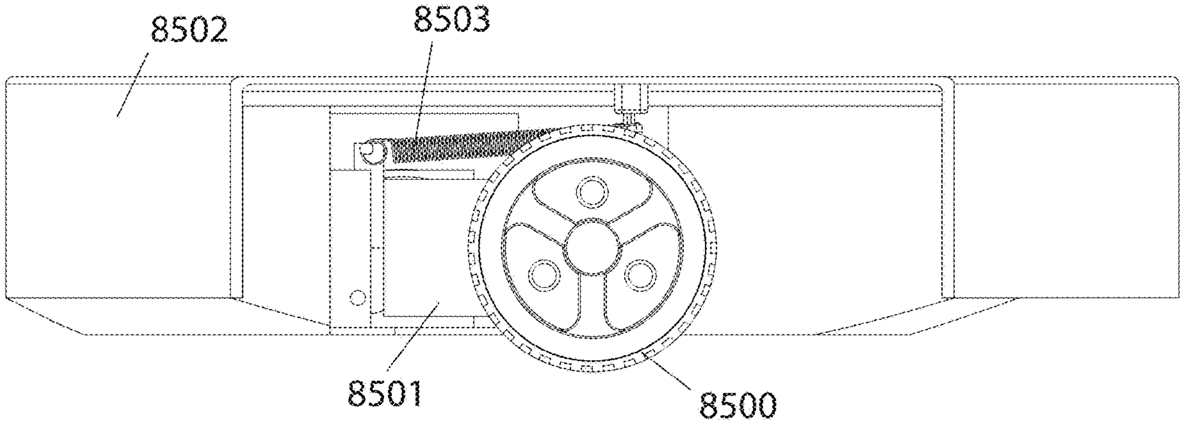
FIGS. 85A-85D illustrate an example of a wheel suspension system, according to some embodiments.
Figure 85B:
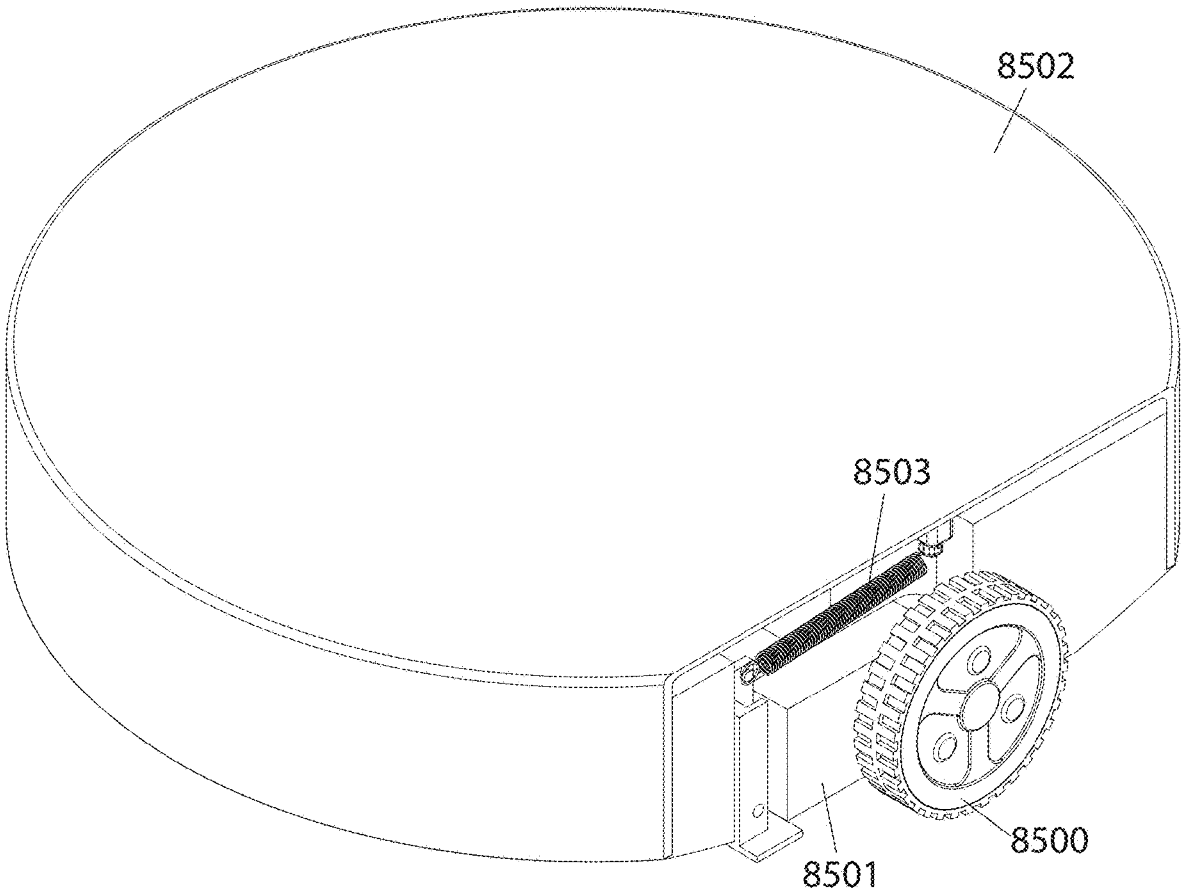
Figure 85C:
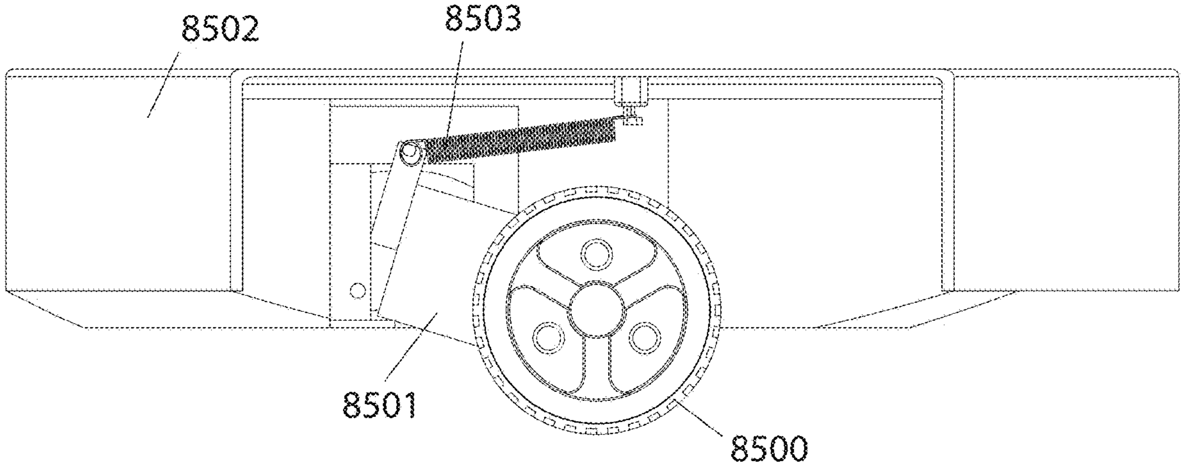
Figure 85D:
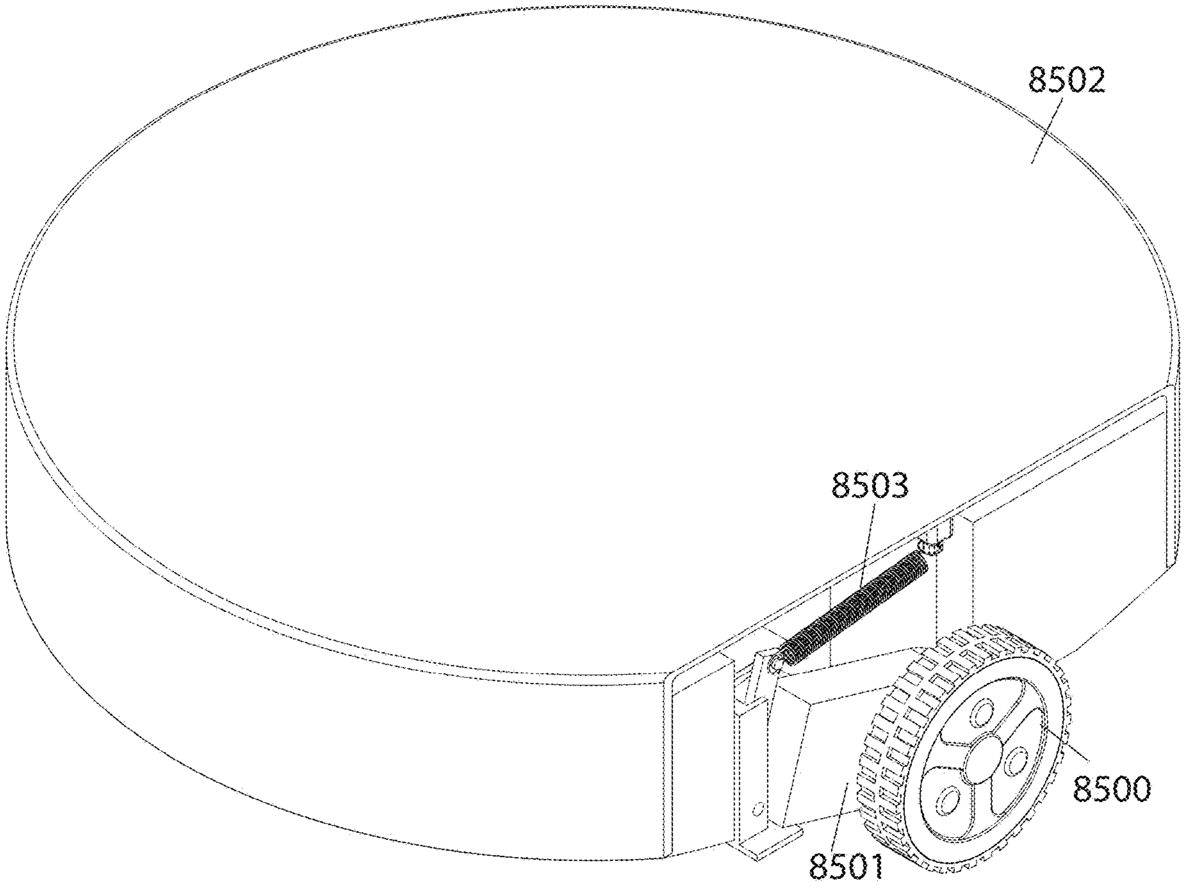

In yet another example, the wheel suspension includes a wheel coupled to a rotating arm pivotally attached to a chassis of the VMP robot and a spring anchored to the rotating arm on a first end and the chassis on a second end. The spring is in an extended state. As the spring constantly attempts to reach an unstretched state it causes the rotating arm to pivot in a downward direction and the wheel to be therefore pressed against the driving surface. When the wheel encounters an obstacle, the wheel suspension causes the wheel to maintain contact with the driving surface. The further the wheel is extended, the closer the spring is at reaching an unstretched state. FIGS. 85A and 85B illustrate an example of a wheel suspension including a wheel 8500 coupled to a rotating arm 8501 pivotally attached to a chassis 8502 of a robot and a spring 8503 coupled to the rotating arm 8501 on a first end and the chassis 8502 on a second end. The spring 8503 is in an extended state and therefore constantly applies a force to the rotating arm 8501 to pivot in a downward direction as the spring attempts to reach an unstretched state, thereby causing the wheel 8500 to be constantly pressed against the driving surface. When an obstacle, such as a hole, is encountered, for example, the wheel extends as illustrated in FIGS. 85C and 85D. The spring 8503 causes the rotating arm 8501 to rotate further downwards as it attempts to return to an unstretched state. In some embodiments, the springs of the different suspension systems described herein may be replaced by other elastic elements such as rubber. In some embodiments, wheel suspension systems may be used independently or in combination. Additional wheel suspension systems are described in U.S. patent application Ser. Nos. 15/951,096, 16/389,797, and 62/720,521, the entire contents of which are hereby incorporated by reference.

Figure 86A:
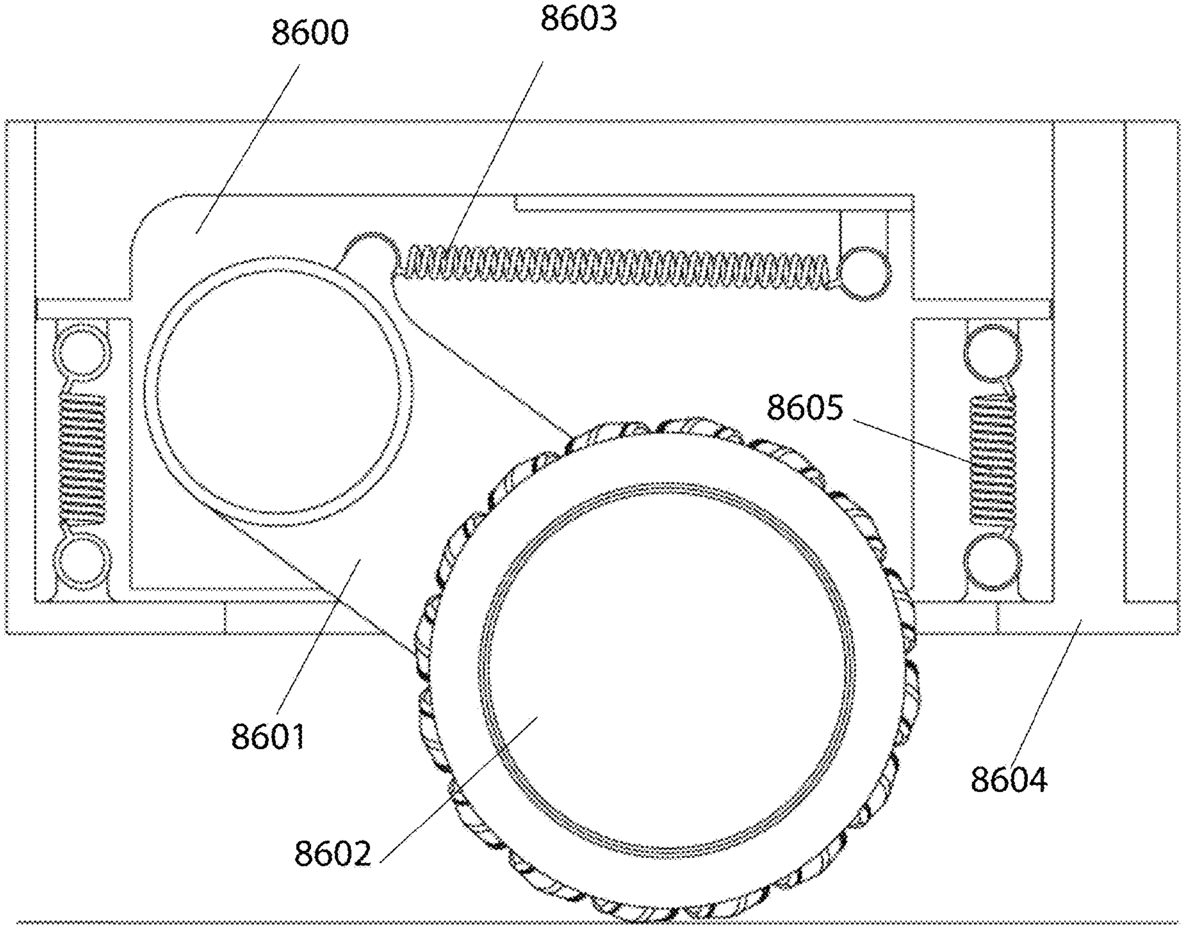
FIGS. 86A and 86B illustrate an example of a wheel suspension system, according to some embodiments.
Figure 86B:
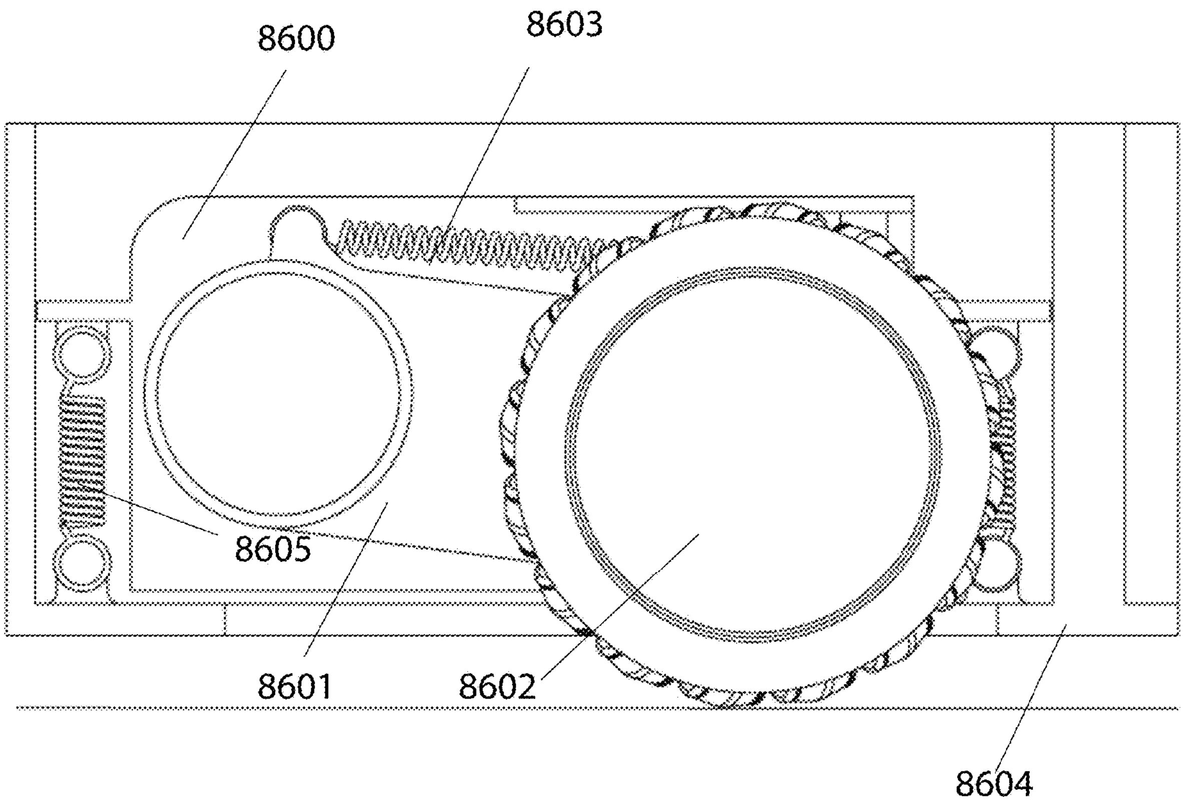

In one embodiment, the suspension system is a dual suspension system. A first suspension system of the dual suspension system includes a frame, a rotating arm pivotally coupled to the frame, a wheel coupled to the rotating arm, and an extension spring coupled with the rotating arm on a first end and the frame on a second end, wherein the extension spring is extended when the wheel is retracted. The extension spring of the first suspension system applies a force to the rotating arm as the extended extension spring compresses, causing the rotating arm to rotate downwards towards the driving surface such that the wheel coupled to the rotating arm is pressed against the driving surface. The second suspension system of the dual suspension system is a vertical suspension system including a base slidingly coupled with the frame, and a number of vertically positioned extension springs coupled with the frame on a first end and the base on a second end. In some embodiments, the number of extension springs of the second suspension system apply a force to the frame and base, pulling the two components together as the extension springs compress. In some embodiments, extension of the number of extension springs of the second suspension system cause vertical upward movement of the frame, rotating arm, and wheel relative to the base. In some embodiments, compression of the number of extension springs of the second suspension system cause vertical downward movement of the frame, rotating arm, and wheel relative to the base. In some embodiments, the base is fixed to the VMP robot chassis or is part of the VMP robot chassis. In some embodiments, the frame includes a number of spring housings for retaining the number of extension springs from the second suspension system. In some embodiments, the portion of the second suspension system further includes a number of dampers positioned along each axis of each of the number of extension springs. The portion from the second suspension system mitigates the effect of the degree of unevenness of the floor surface such as rates of rise and/or rates of fall of the floor surface. FIGS. 86A and 86B illustrate an example of dual suspension system including the first and second suspension systems as described above when the wheel is extended and retracted, respectively. The first suspension system includes a frame 8600, a rotating arm 8601 pivotally coupled to the frame 8600, a wheel 8602 coupled to the rotating arm 8601, and an extension spring 8603 coupled with the rotating arm 8601 on a first end and the frame 8600 on a second end, wherein the extension spring 8603 is compressed when the wheel is extended beyond the frame (FIG. 86A) and extended when the wheel is retracted towards the frame (FIG. 86B). The second suspension system includes a base 8604 slidingly coupled with the frame 8600, and a set of vertically positioned extension springs 8605 coupled with the frame 8600 on a first end and the base 8604 on a second end. In some embodiments, magnets are used in addition to or instead of extension springs in the second suspension system. In some embodiments, the first and second suspension systems are used independently and in other embodiments, are used in combination. In some embodiments, other types of wheel suspension systems are used.

Figure 87A:
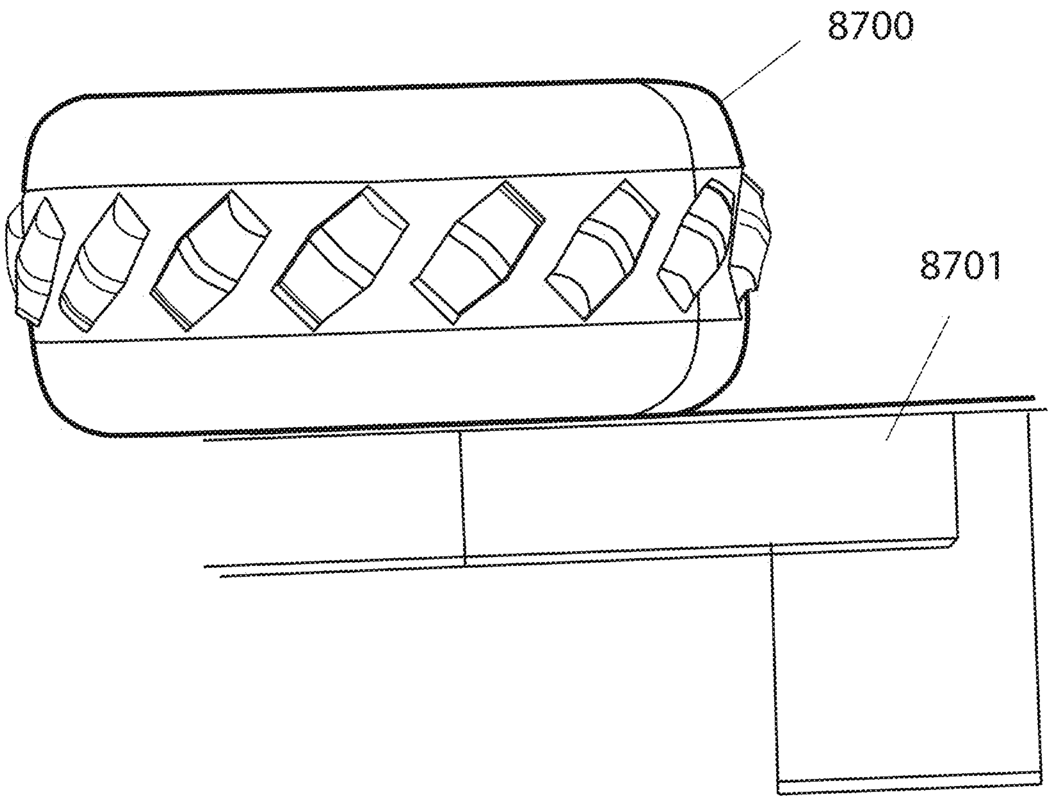
FIGS. 87A and 87B illustrate examples of mecanum wheels, according to some embodiments.
Figure 87B:
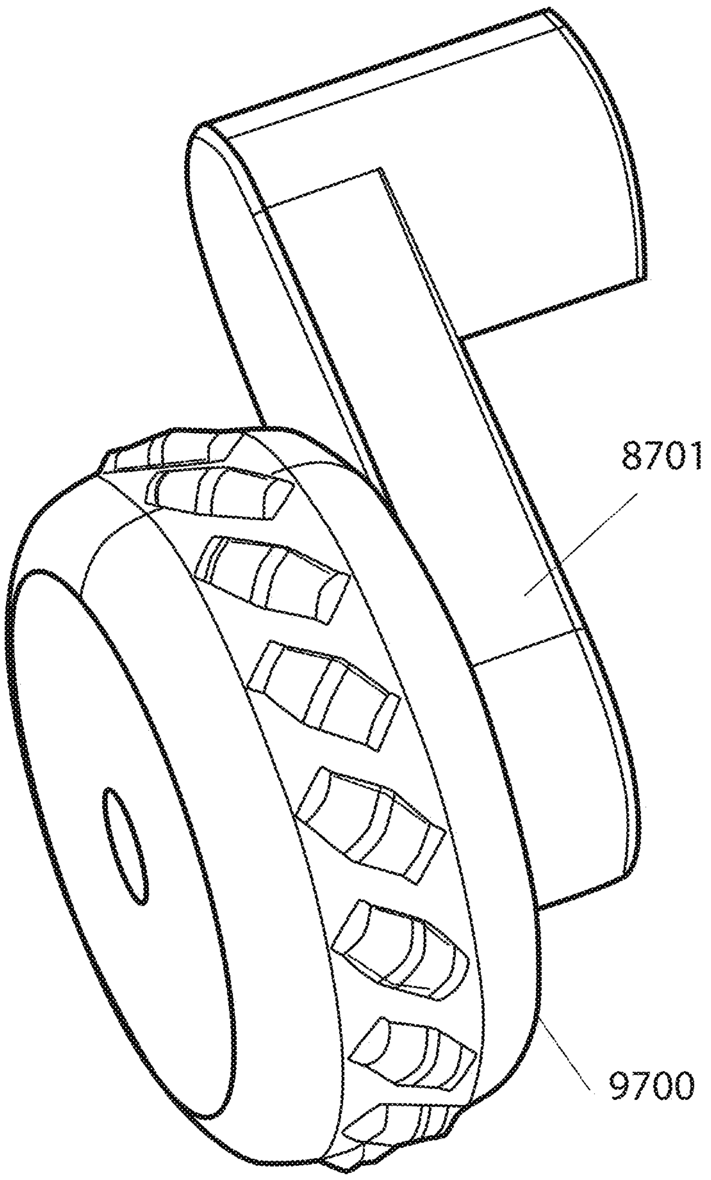
Figure 88A:
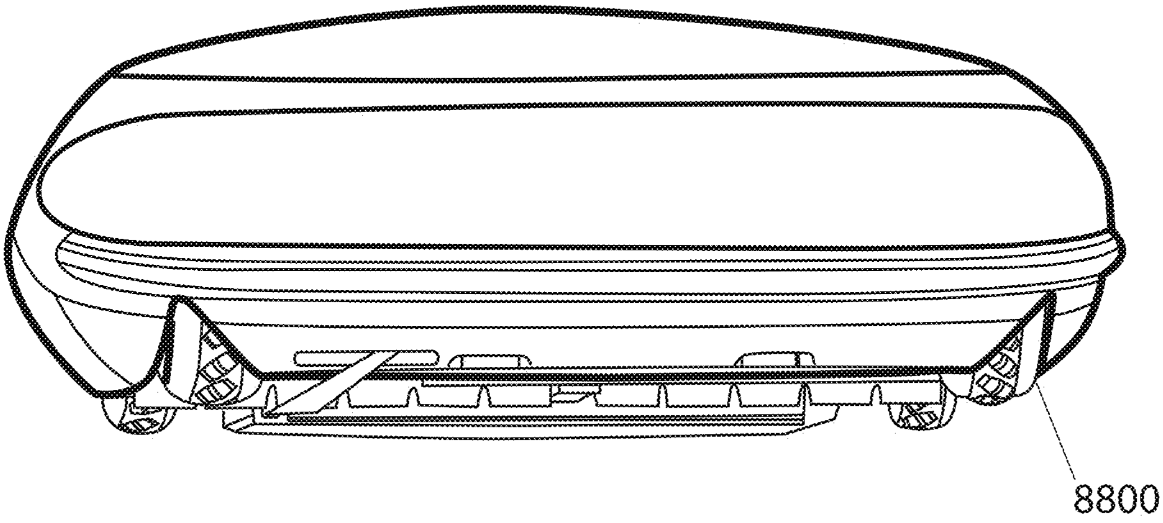
FIGS. 88A and 88B illustrate examples of a robotic device with mecanum wheels, according to some embodiments.
Figure 88B:
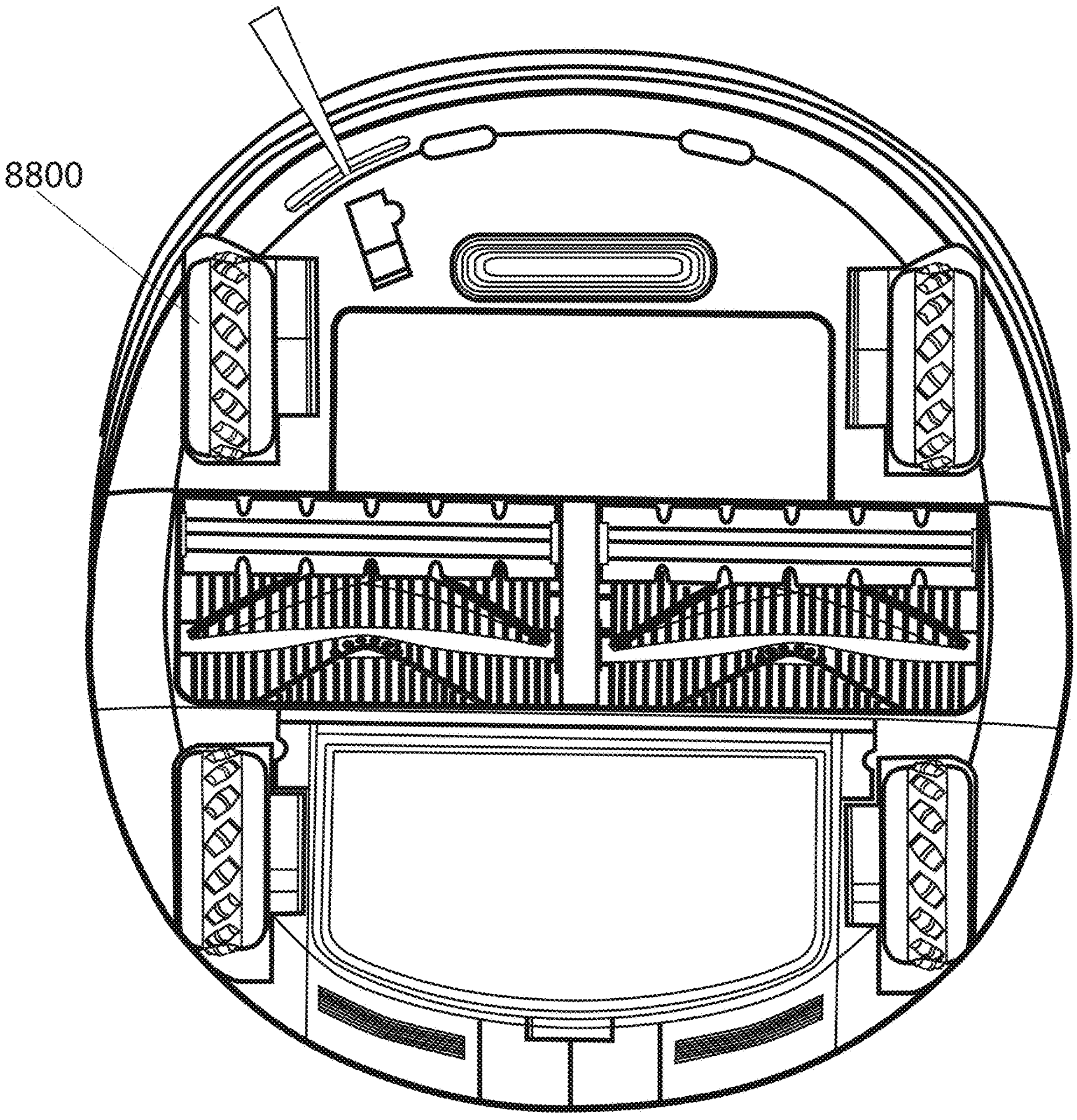

In some embodiments, the springs of the different suspension systems described herein may be replaced by other elastic elements such as rubber or with other mechanisms that provide similar function as the springs (e.g., magnets as described above). In some embodiments, the wheels used with the different suspension systems are mecanum wheels, allowing the VMP robot to move in any direction. For example, the VMP robot can travel diagonally by moving a front wheel and opposite rear wheel at one speed while the other wheels turn at a different speed, moving all four wheels in the same direction straight moving, running the wheels on one side in the opposite direction to those on the other side causing rotation, and running the wheels on one diagonal in the opposite direction to those on the other diagonal causes sideways movement. FIGS. 87A and 87B illustrate examples of a mecanum wheel 8700 attached to an arm 8701 of a robotic device. The arm may be coupled to a chassis of the robotic device. FIGS. 88A and 88B illustrate a front and bottom view of an example of a robotic device with mecanum wheels 8800, respectively, that allow the robotic device to move in any direction.

Figure 89:
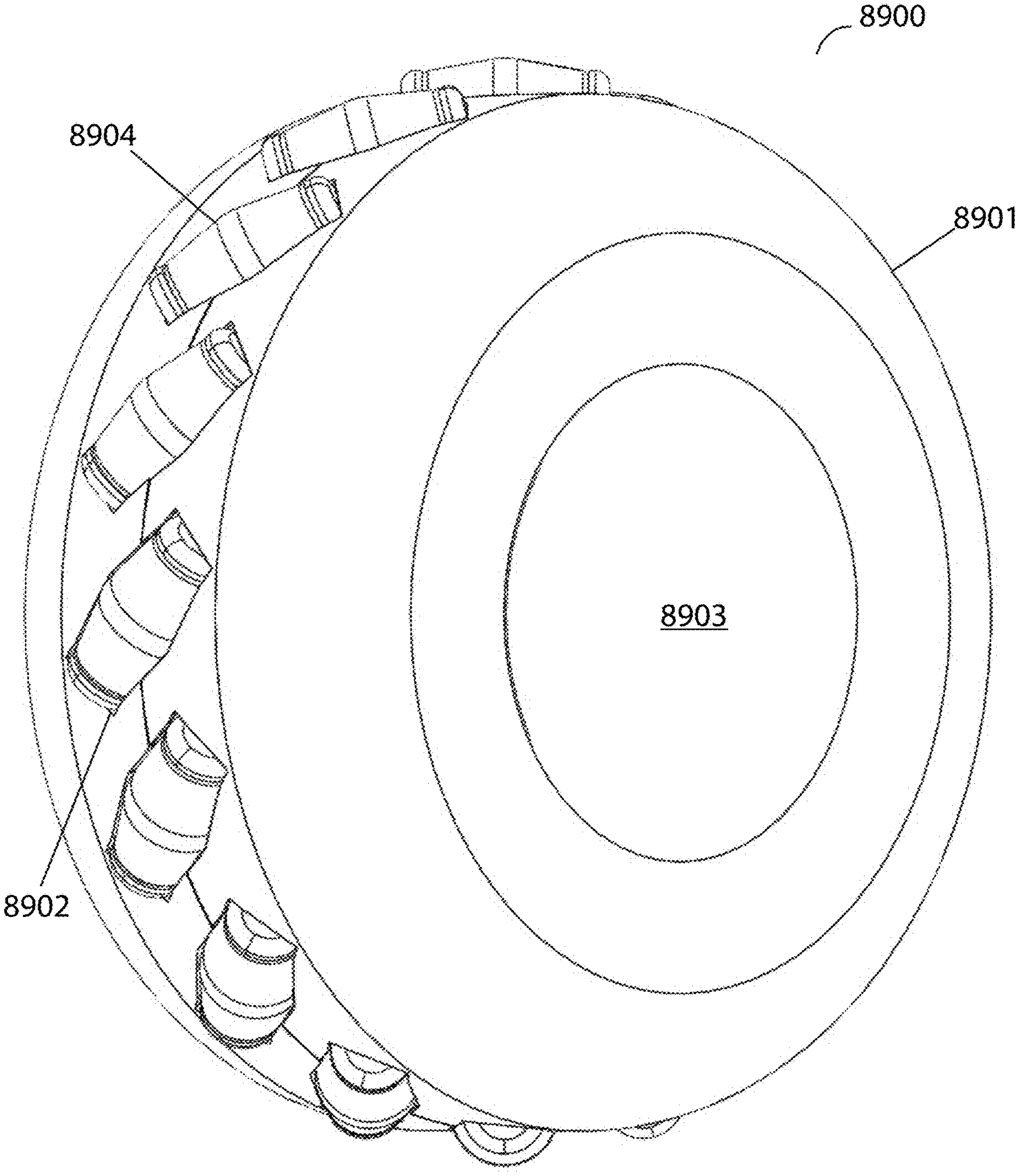
FIG. 89 illustrates a perspective view of an expandable mecanum wheel in a contracted position, according to some embodiments.

In some embodiments, the wheels of the VMP robot are also expandable. FIG. 89 illustrates an expandable mecanum wheel 8900 in a contracted position. The expandable wheel comprises: an outer housing 8901 with a plurality of apertures 8902 therein; an inner shaft 8903 co-centered and positioned within an outer shaft 8905 coupled to the outer housing 8901; a plurality of spokes (not shown) mounted pivotally by a first end to the inner shaft; a pivoting linkage (not shown) connected to a second end of the spoke; and a roller 8904 mounted at the distal end of the pivoting linkage so as to be rotatable around an axial of the roller. The inner shaft is positioned within the outer housing in a manner such that it can rotate independently and relative to the outer housing and coupled outer shaft. The inner shaft can be rotated relative to the outer housing and coupled outer shaft, causing the wheel to move from a first position (shown in FIG. 89) in which the linkages and rollers protrude minimally through their corresponding apertures to a second position in which the linkages and rollers protrude maximally through their corresponding apertures. The rollers form the circumference of the wheel, which is smallest in the contracted position and largest in the expanded position. The outer shaft coupled to the outer housing can rotate independently and relative to the inner shaft to rotate the expandable mecanum wheel once positioned at a desired circumference, causing the robot to move. When the inner shaft and the outer housing are caused to rotate relative to one another, the spokes together with the pivoting linkages work as a crank mechanism and translate the relative rotation of the two shafts to a linear movement of the roller radially outward from the center of the wheel, the aperture working as a guide.

Figure 90:
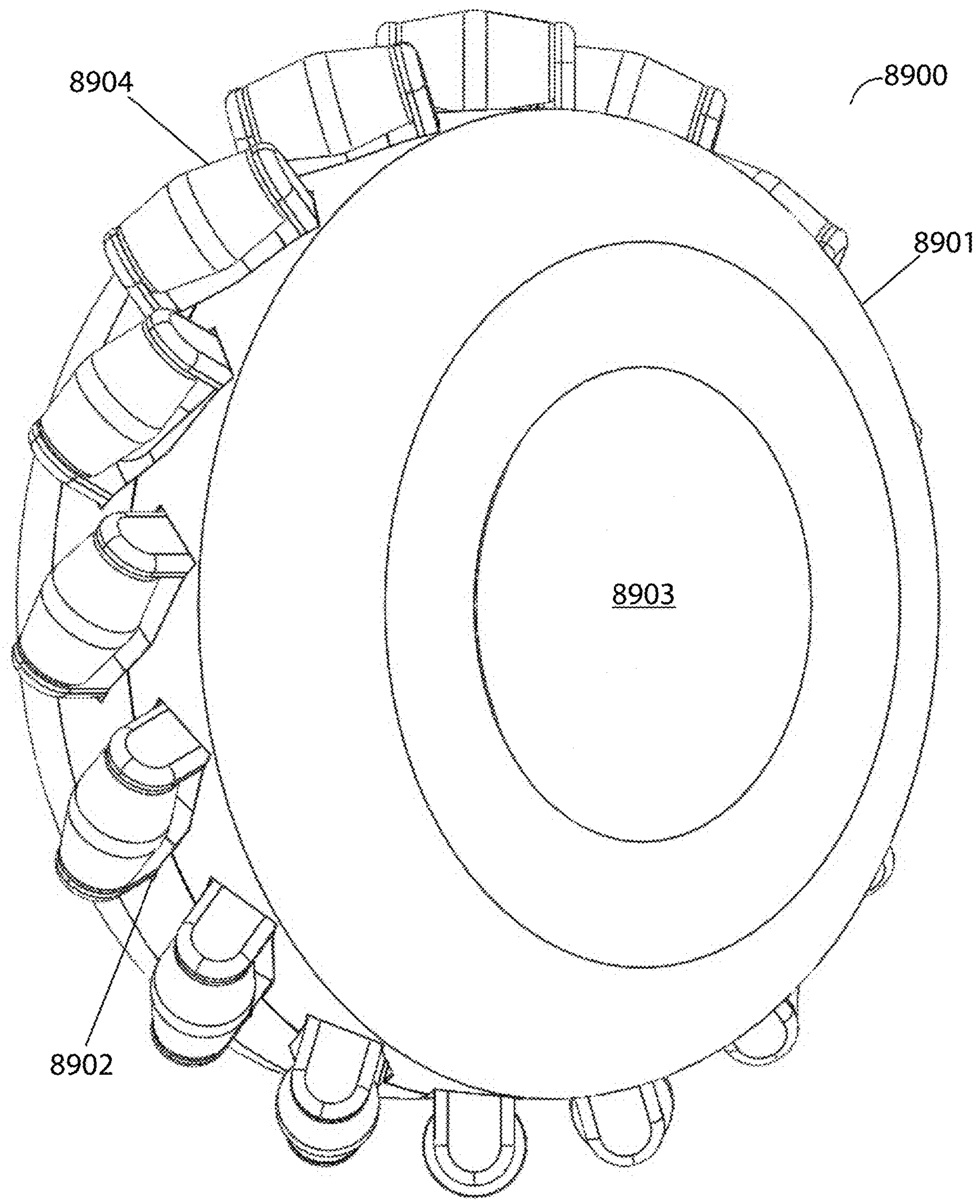
FIG. 90 illustrates a perspective view of an expandable mecanum wheel in an expanded position, according to some embodiments.

FIG. 90 illustrates the wheel 8900 is shown in the expanded position. The inner shaft 8903 has been rotated relative to the outer housing 8901 and coupled outer shaft 8905, causing the spokes (not illustrated) to move radially outward from the center of the wheel, the apertures 8902 guiding the pivoting linkages and rollers 8904. The rollers 8904 are thus pushed outward from the center of the wheel and form a circumference larger than the circumference formed when the wheel is in the contracted position shown in FIG. 89.

Figure 91A:
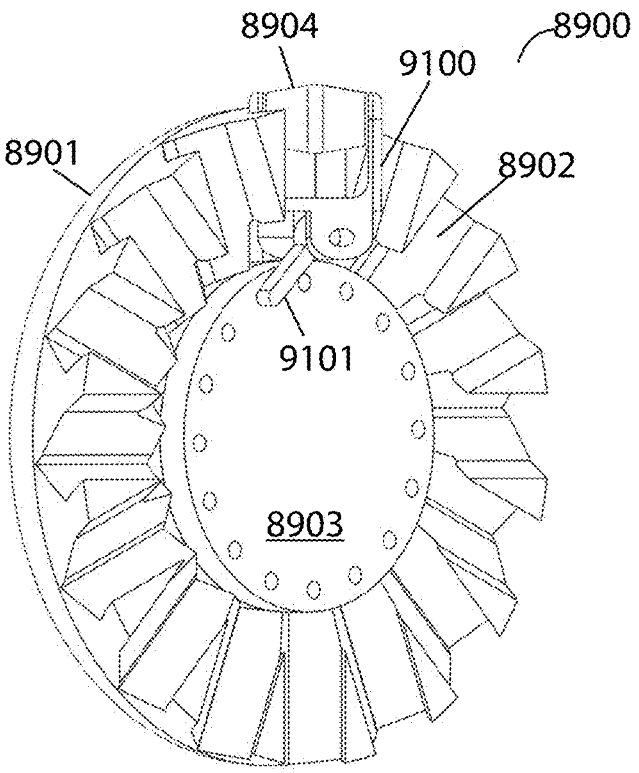
FIGS. 91A and 91B illustrate a cutaway of an expandable mecanum wheel in a contracted and extended position, respectively, according to some embodiments.
Figure 91B:
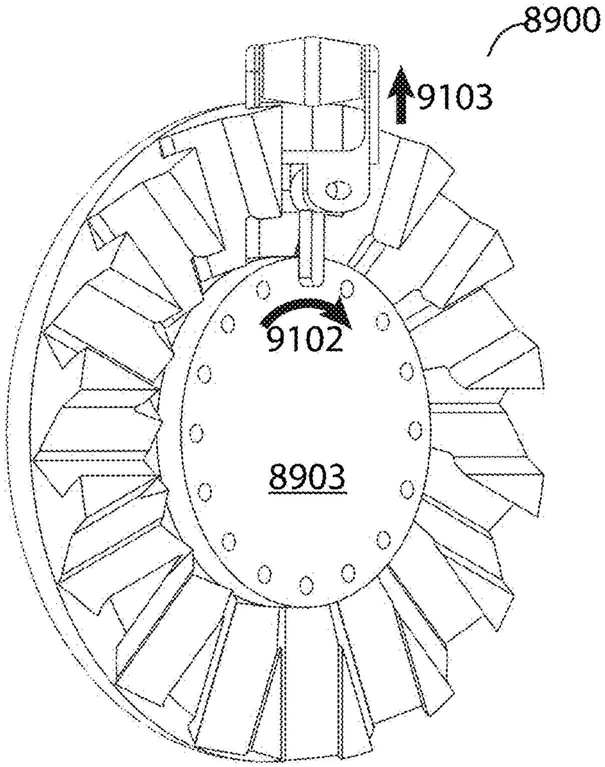

FIGS. 91A and 91B illustrate cutaway views of the wheel 8900. In both drawings, a singular spoke, linkage, and roller is illustrated in order to portray the parts more clearly, however, in practice, for each aperture 8902, there would be a corresponding spoke, linkage and roller. FIG. 91A illustrates the spoke 9101, linkage 9100 and roller 8904 are in a contracted position. The spoke 9101 is mounted pivotally by a first end to an inner shaft 8903, which is co-centered and positioned within the outer housing 8901 and coupled outer shaft (not shown). As shown in FIG. 91B, rotation of the inner shaft in direction 9102 results in each spoke, linkage, and roller group to be extended in a radially outward direction 9103. When the inner shaft 8903 is rotated in a direction 9102, until a point where each spoke is parallel with a radius of the inner shaft 8903, the linkage and roller are pushed at a maximal distance from the center of the wheel, creating a larger circumference. Sleeve 9104 fits over the aperture structures of outer housing 8901 to protect apertures 8902 from wear. In some embodiments, the sleeve is provided around the aperture to limit the wear of the link member and to provide better support for the link member as a guide.

In alternative embodiments, either the inner or the outer shaft may be connected to a means for rotating them and could rotate relative to the other one. In some embodiments, separate motors are used to rotate the inner shaft and the outer shaft. Rotation of the inner shaft increases or decreases the circumference of the wheel by extension and retraction of the rollers. Rotation of the outer shaft rotates the expandable mecanum wheel, causing the robot to move. In some embodiments, the same motor is used to expand and retract the wheel and to rotate the wheel.

In some embodiments, the processor of the VMP robot uses sensors to detect conditions used to determine when the wheels should be expanded or retracted. For example, data of a sensor monitoring tension on wheels may be used to determine when to expand the wheel, when, for example, more than a predetermined amount of tension is detected. In another example, the current drawn by the motor of the wheel may be used to indicate tension in rotation of the wheel when the current drawn by the motor is increased while trying to maintain the same wheel speed. Similarly, data of a sensor monitoring rate of rotation of a wheel may be used to determine when to expand the wheel, when, for example, it is determined that rotation is not concurrent with motor power. It will be obvious to one skilled in the art that the disclosed invention can benefit from any kind of sensing mechanism to detect tension etc. Further examples of expandable mecanum wheels are described in U.S. patent application Ser. Nos. 15/447,450 and 15/447,623, the entire contents of which are hereby incorporated by reference.

Figure 92A:
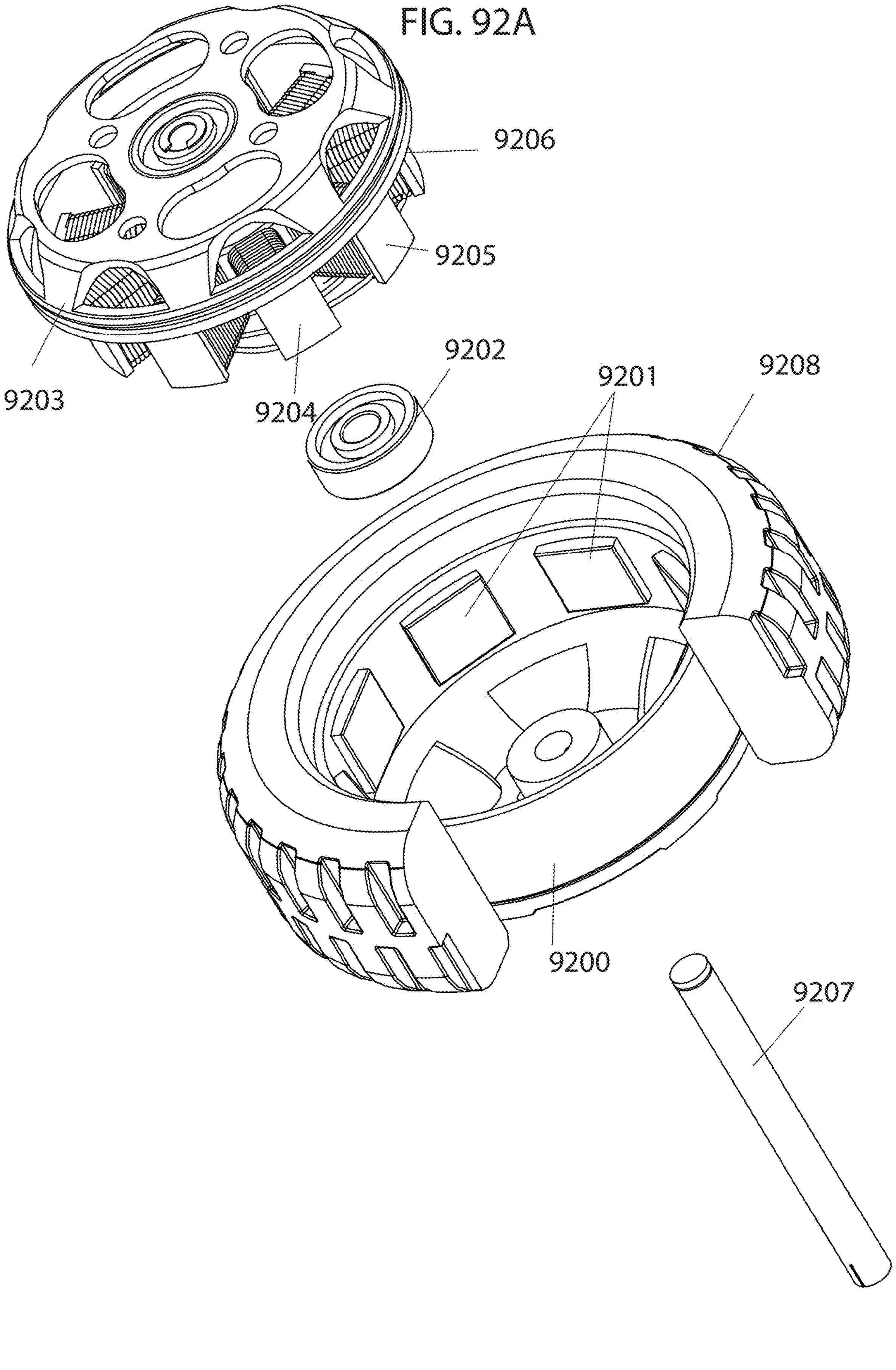
FIGS. 92A and 92B illustrate an example of a brushless DC wheel motor positioned within a wheel, according to some embodiments.
Figure 92B:
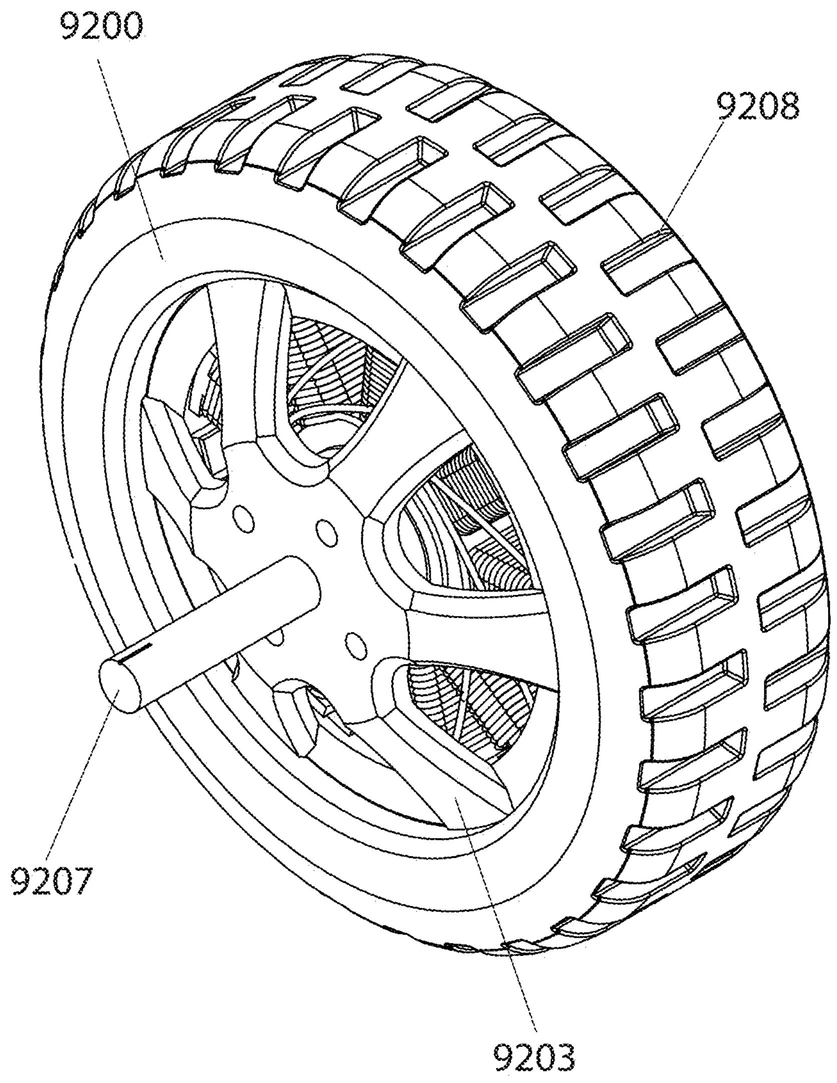

In some embodiments, the wheel motor is positioned within a wheel of the VMP robot. For example, FIGS. 92A and 92B illustrate a wheel with a brushless DC motor positioned within the wheel. FIG. 92A illustrates an exploded view of the wheel with motor including a rotor 9200 with magnets 9201, a bearing 9202, a stator 9203 with coil sets 9204, 9205, and 9206, an axle 9207 and tire 9208 each attached to rotor 9200. Each coil set (9204, 9205, and 9206) include three separate coils, the three separate coils within each coil set being every third coil. The rotor 9200 acts as a permanent magnet. DC current is applied to a first set of coils 9204 causing the coils to energize and become an electromagnet. Due to the force interaction between the permanent magnet (i.e., the rotor 9200) and the electromagnet (i.e., the first set of coils 9204 of stator 9203), the opposite poles of the rotor 9200 and stator 9203 are attracted to each other, causing the rotor to rotate towards the first set of coils 9204. As the opposite poles of rotor 9200 approach the first set of coils 9204, the second set of coils 9205 are energized and so on, and so forth, causing the rotor to continuously rotate due to the magnetic attraction. Once the rotor 9200 is about to reach the first coil set 9204 a second time, the first coil set 9204 is energized again but with opposite polarity as the rotor has rotated 180 degrees. In some embodiments, the set of coils immediately following the set of coils being energized are energized as well to increase the torque. FIG. 92B illustrates a top perspective view of the constructed wheel with the motor positioned within the wheel. In some embodiments, the processor uses data of a wheel sensor (e.g., halls effect sensor) to determine the position of the rotor, and based on the position determines which pairs of coils to energize.

Figure 93A:
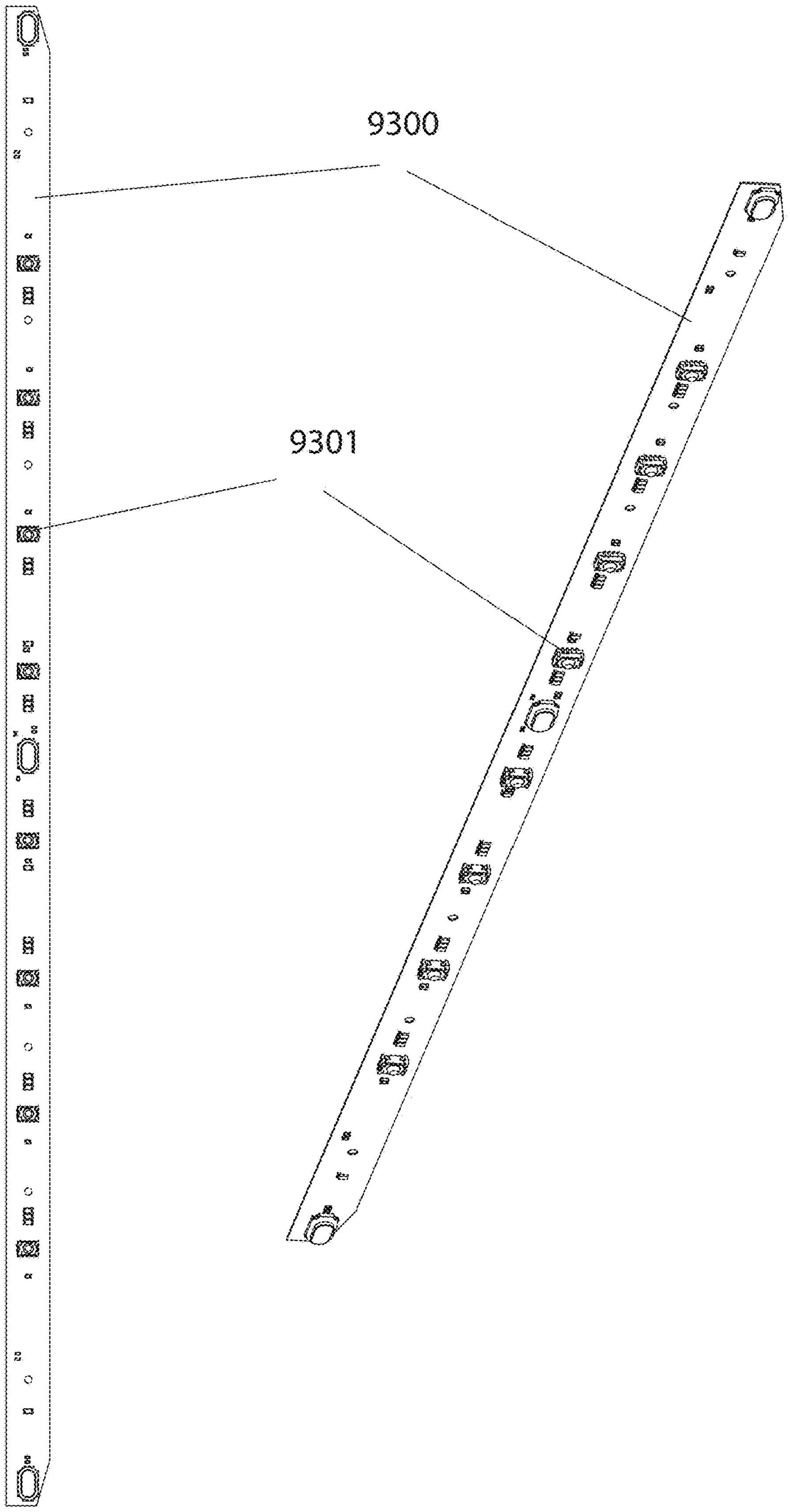
FIGS. 93A-93E illustrate an example of a sensor array, according to some embodiments.
Figure 93B:
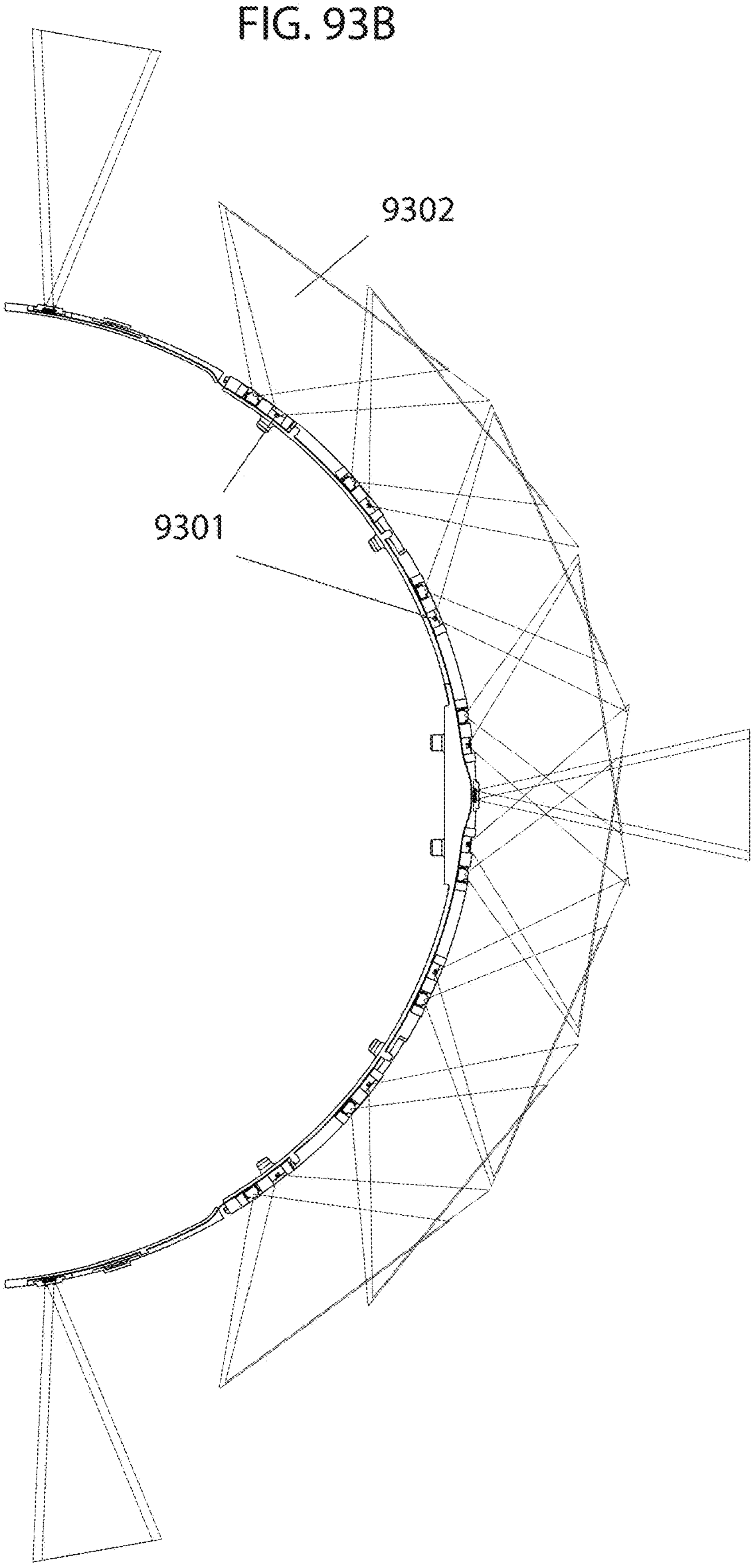
Figure 93C:
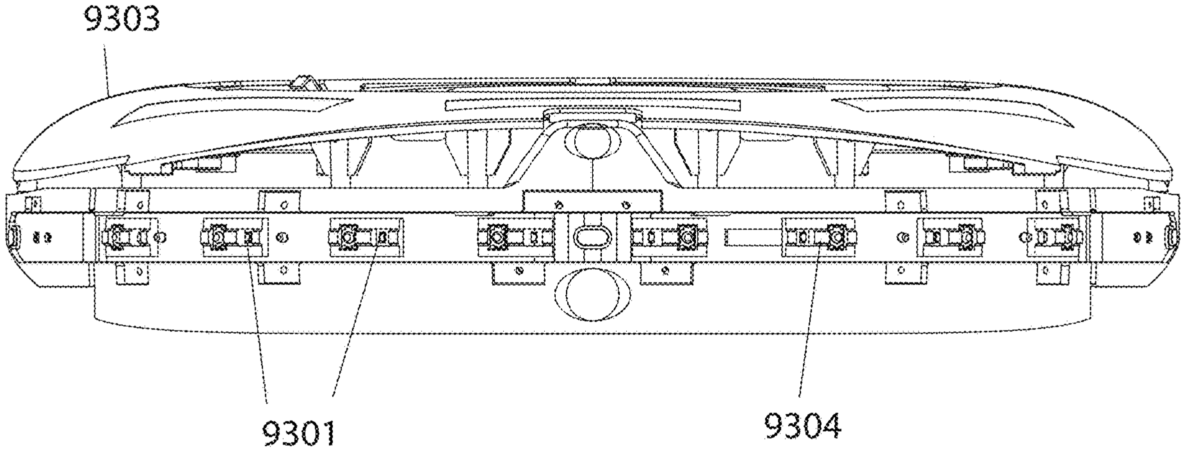
Figure 93D:
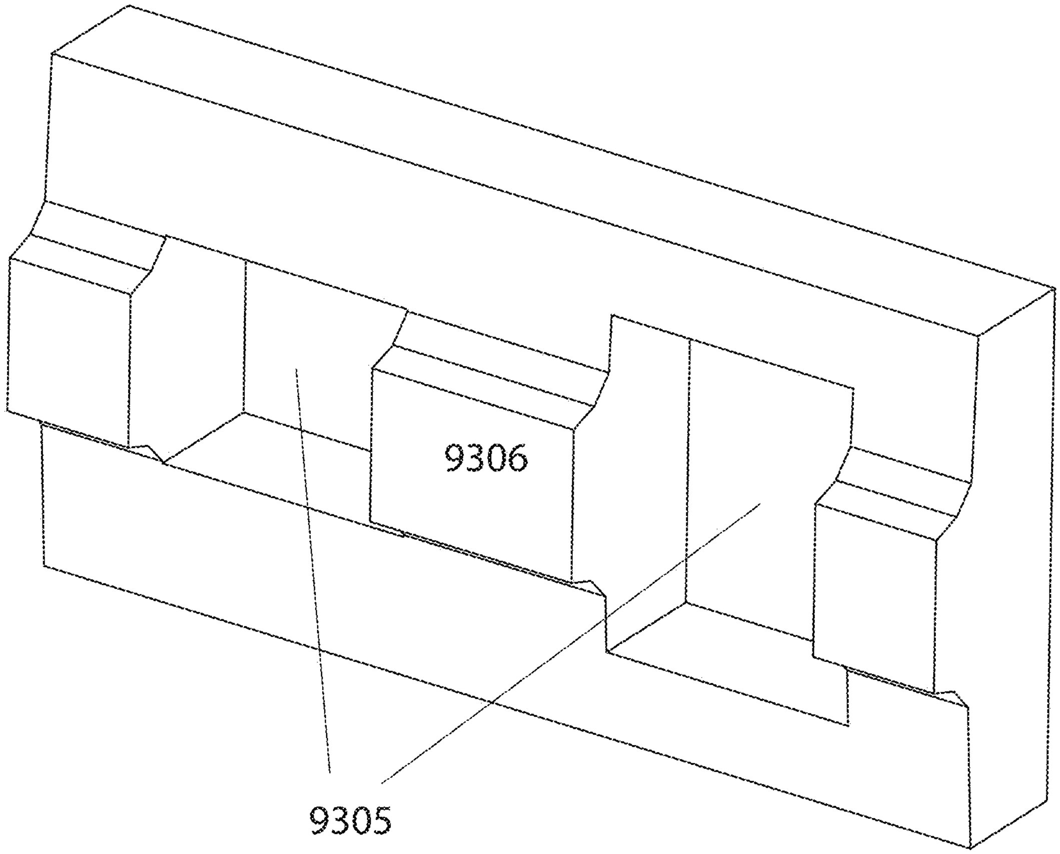

In some embodiments, the VMP robot, including any of its add-on structures, includes one or more sensor arrays. In some embodiments, a sensor array includes a flexible or rigid material (e.g., plastic or other type of material in other instances) with connectors for sensors (different or the same). In some embodiments, the sensor array is a flexible plastic with connected sensors. In some embodiments, a flexible (or rigid) isolation component is included in the sensor array. The isolation piece is meant to separate sensor sender and receiver components of the sensor array from each other to prevent a reflection of an incorrect signal from being received and a signal from being unintentionally rebounded off of the VMP robot rather than objects within the environment. In some embodiments, the isolation component separates two or more sensors. In some embodiments, the isolation component includes two or more openings, each of which is to house a sensor. In some embodiments, the sizes of the openings are the same. In alternative embodiments, the sizes of the openings are of various sizes. In some embodiments, the openings are of the same shape. In alternative embodiments, the openings are of various shapes. In some embodiments, a wall is used to isolate sensors from one another. In some embodiments, multiple isolation components are included on a single sensor array. In some embodiments, the isolation component is provided separate from sensor array. In some embodiments, the isolation component is rubber, Styrofoam, or another material and is placed in strategic locations in order to minimize the effect on the field of view of the sensors. In some embodiments, the sensors array is positioned around the perimeter of the VMP robot shell. In some embodiments, the sensor array is placed internal to an outer shell of the VMP robot. In alternative embodiments, the sensor array is located on the external body of the VMP robot. FIG. 93A illustrates an example of a sensor array including a flexible material 9300 with sensors 9301 (e.g., LED and receiver). FIG. 93B illustrates the fields of view 9302 of sensors 9301. FIG. 93C illustrates the sensor array mounted around the perimeter of a chassis 9303 of a robotic device, with sensors 9301 and isolation components 9304. FIG. 93D illustrates one of the isolation components 9304 including openings 9305 for sensors 9301 (shown in FIG. 93C) and wall 9306 for separating the sensors 9301.

Figure 93E:

In some embodiments, sensors of the VMP robot are positioned such that the field of view of the VMP robot is maximized while cross-talk between sensors is minimized. In some embodiments, sensor placement is such that the IR sensor blind spots along the perimeter of the VMP robot in a horizontal plane (perimeter perspective) are minimized while at the same time eliminating or reducing cross talk between sensors by placing them far enough from one another. In some embodiments, an obstacle sensor (e.g., IR sensor, TOF sensor, TSSP sensor, etc.) is positioned along the front of the robot at the midpoint such that the vertical blind spot of the VMP robot is minimized and such that the VMP robot is intentionally blind to objects below a predetermined height relative to the driving surface. For example, the VMP robot is blind to obstacles of certain size. In some embodiments, the predetermined height, below which the VMP robot is blind, is smaller or equal to the height the VMP robot is physically capable of climbing. This means that, for example, if the wheels (and suspension) are capable of climbing over objects 20 mm in height, the obstacle sensor should be positioned such that it can only detect obstacles equal to or greater than 20 mm in height. In some embodiments, a buffer is implemented and the predetermined height, below which the VMP robot is blind, is smaller or equal to some percentage of the height the VMP robot is physically capable of climbing (e.g., 80%, 90%, or 98% of the height the VMP robot is physically capable of climbing). The buffer increases the likelihood of the VMP robot succeeding at climbing over an obstacle if the processor decides to execute a climbing action. In some embodiments, at least one obstacle sensor (e.g., IR sensor, TOF sensor, TSSP sensor, etc.) is positioned in the front and on the side of the VMP robot. In some embodiments, the obstacle sensor positioned on the side is positioned such that the data collected by the sensor can be used by the processor to execute accurate and straight wall following by the VMP robot. In alternative embodiments, at least one obstacle sensor is positioned in the front and on either side of the VMP robot. In some embodiments, the obstacle sensor positioned on the side is positioned such that the data collected by the sensor can be used by the processor to execute accurate and straight wall following by the VMP robot. FIG. 93E illustrates an example of a sensor array showing the positioning and field of view of ten TSSP sensors, four presence LED sensors (e.g., IR transmitter), and three time-of-flight sensors. The position of the sensors allows for maximum combined field of view with minimal cross-talk among adjacent sensors. In some embodiments, TSSP sensors have an opening angle of 120 degrees and a depth of 3 to 5 cm, TOF sensors have an opening angle of 25 degrees and a depth of 40 to 45 cm, presence LED sensors have an opening angle of 120 degrees and a depth 50 to 55 cm. Further details of a sensor array are described in U.S. Patent Application No. 62/720,478, the entire contents of which is hereby incorporated by reference.

In some embodiments, the VMP robot may further include movement sensors, such as an odometer, inertial measurement units (like with a three axis accelerometer and a three axis gyroscope), and/or optical flow sensor (e.g., a visual odometry sensor facing the ground), and the like. In other embodiments, structure from motion techniques may be implemented to measure movement. A gyroscope sensor, for example, includes a small resonating mass that shifts when rotation is initiated or speed of rotation changes. The movement of the mass induces an electrical signal that may be read by a controller and converted or other processing module into an angular velocity or other measurements indicating speed, acceleration, and/or direction of movement. In further embodiments, the gyroscope sensor may be used to measure rotational movement. An odometer sensor, for example, may determine the distance (or path, e.g., in vector form with both distance and direction) travelled by counting the number of wheel rotations. Given the diameter of the wheel, the distance travelled can be calculated. An odometer can therefore be used to measure translational or rotational movement. In some embodiments, optical flow and structure from motion techniques measure movement using images and/or data derived from images. Motion may be estimated based on changes in the features, such as lighting, of consecutive images captured as the camera moves relative to objects in the environment.

In some embodiments, the VMP robot includes edge detection sensors to avoid cliffs and drop-offs. Examples of edge detection sensors are disclosed in U.S. patent application Ser. Nos. 14/941,385, 16/279,699, and 16/041,470, the entire contents of which are hereby incorporated by reference. In some embodiments, one or more rangefinder sensors may be positioned on the underside of a VMP robot such that emitted signals are directed downward. In some embodiments, one or more rangefinders are positioned on other portions of the VMP robot. For example, one or more rangefinders can be positioned on a side, front, and underside of the VMP robot. In some embodiments, some of the rangefinders are positioned on a side of the VMP robot and others are positioned on an underside. Any available type of rangefinder sensor may be employed, including laser rangefinder sensors, infrared rangefinder sensors, or ultrasonic rangefinder sensors. Generally, rangefinder sensors simultaneously emit a signal and start a timer. When the signal reaches an obstacle, it bounces off and, in a second step, reflects back into a receiver. Receipt of a reflected signal stops the timer. Because the signals travel at a constant rate, the time elapsed between when a signal is sent and when it is received may be used to calculate the distance that the signal traveled, and, thus, the distance from the sensor to the reflecting surface. In some embodiments, the one or more rangefinder sensors calculate the distance from their location to the nearest surface in their line of sight. On uniform flat surfaces, this distance, representing the distance from the bottom of the device to the work surface, is expected to remain substantially constant. Upon encountering a drop-off or cliff, the rangefinder sensors will detect a sudden increase in the distance to the nearest surface. A distance increase beyond a predetermined threshold may actuate the VMP robot's methods for avoiding the area, which may include reversing, turning away, or other methods.

Figure 94:
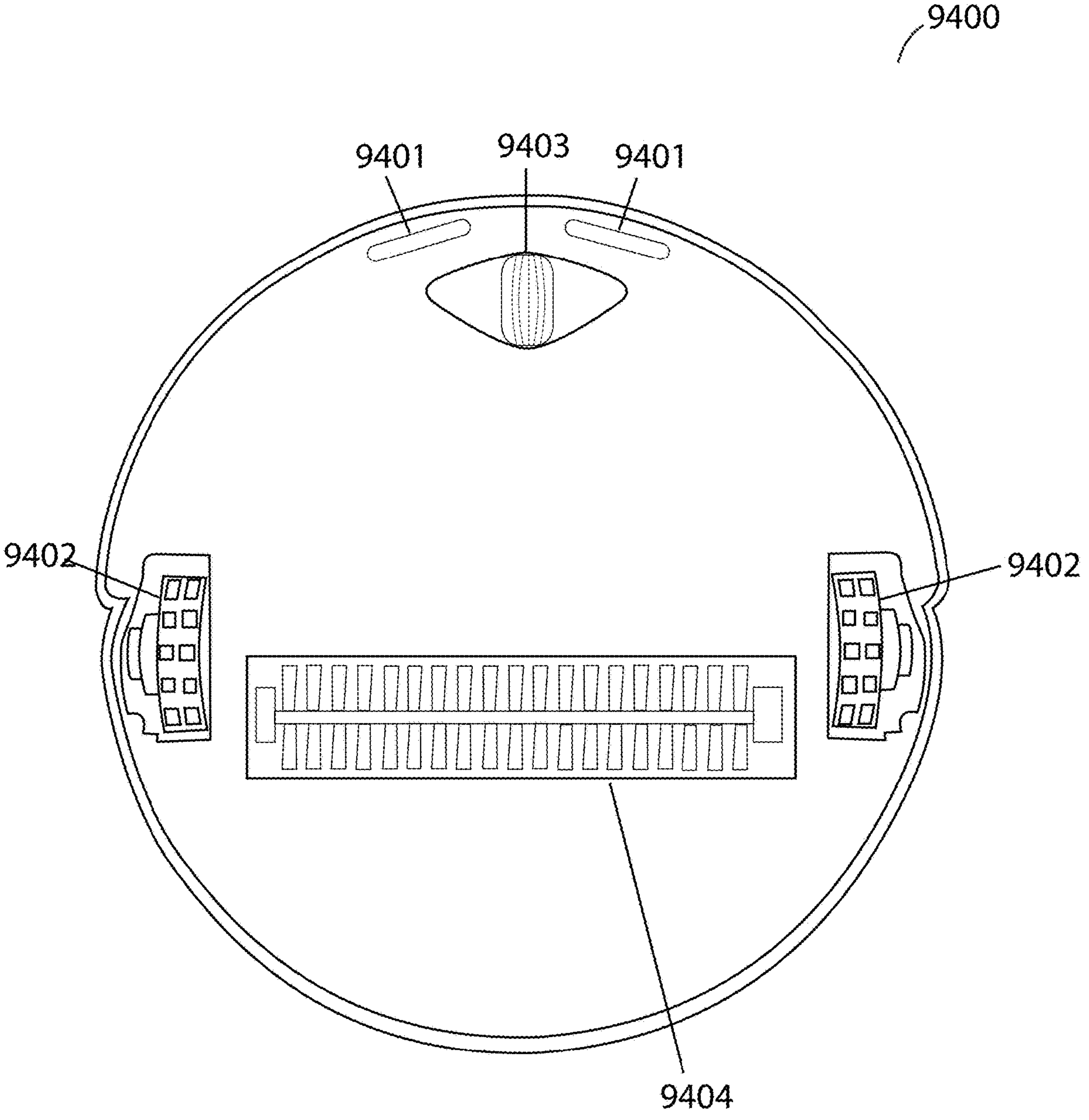
FIG. 94 illustrates an overhead view of an example of the underside of a robotic vacuum provided with rangefinder sensors to detect edges, according to some embodiments.
Figure 95A:
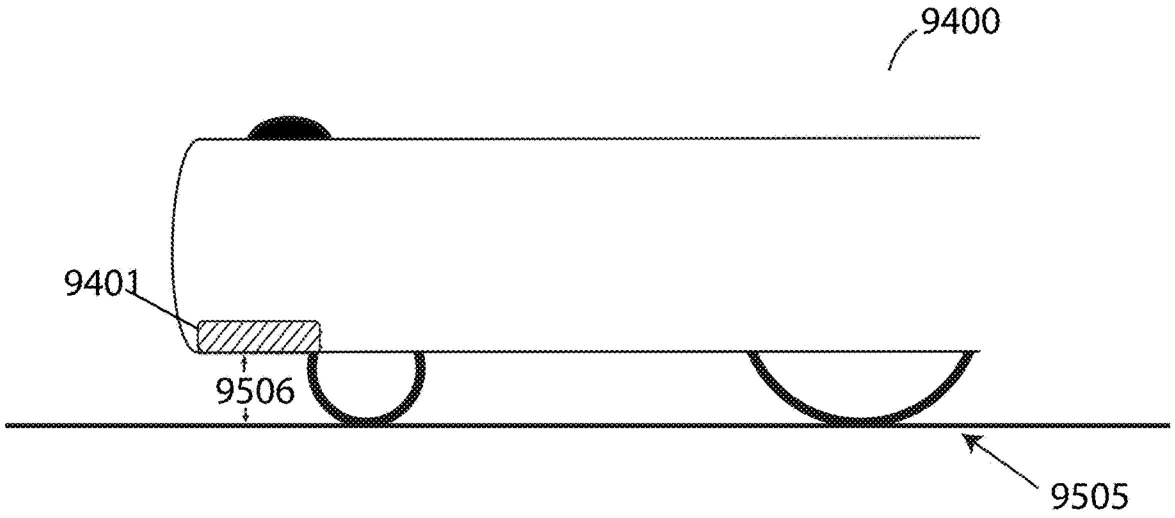
FIG. 95A illustrates an example of rangefinder sensors detecting no edge, according to some embodiments.
Figure 95B:
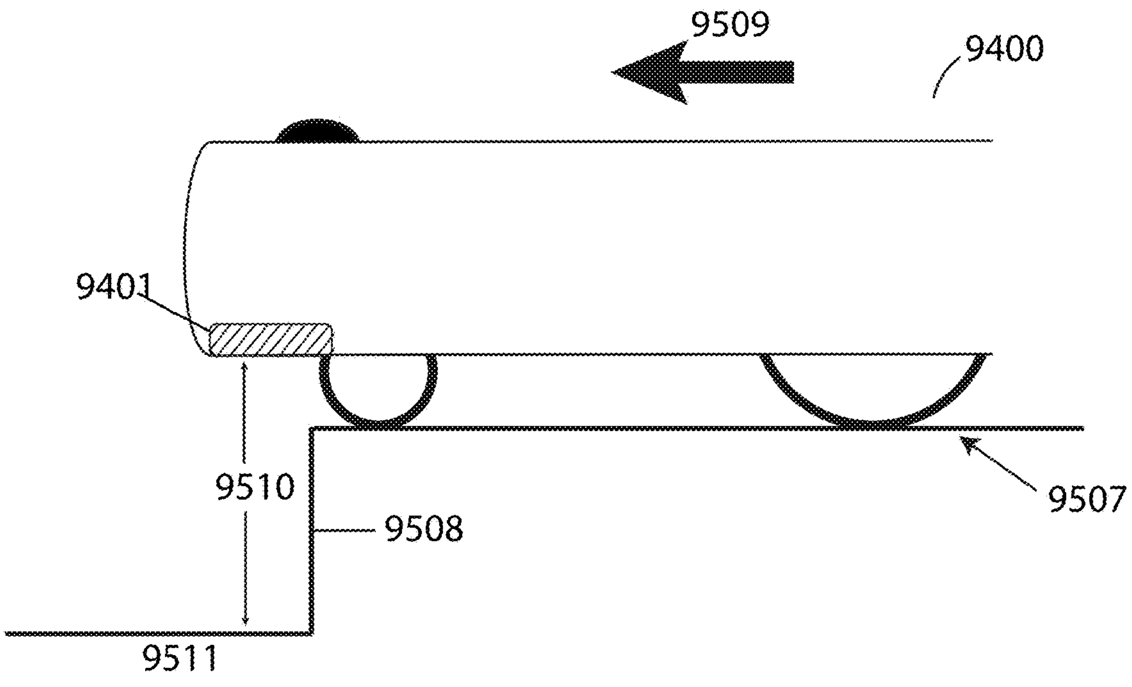
FIG. 95B illustrates an example of rangefinder sensors detecting a dangerous edge, according to some embodiments.

FIG. 94 illustrates an overhead view of the underside of an example of a robotic vacuum 9400 with a set of rangefinder sensors 9401 installed along a portion of the periphery thereof. A robotic vacuum may also include driving wheels 9402, a front wheel 9403 for steering, and a cleaning apparatus 9404. The positioning of rangefinder sensors may vary, however, in the preferred embodiment, rangefinder sensors are positioned substantially around a portion of (or all of) the periphery of the underside of the particular device in question so that, as the device is traveling in a forward direction, the rangefinder sensors may detect an edge before either any wheels of the device have traversed the edge or the center of mass of the device has passed the edge. FIG. 95A illustrates a side elevation view of the robotic vacuum 9400 using rangefinder sensors 9401 over a surface 9505 with no edges. The rangefinder sensors 9401 continuously calculate the distance 9506 from their location to the nearest surface, which is typically the work surface 205. (The nearest surface could be an item positioned on top of the work surface that the device has driven over.) The rangefinder sensors are electrically coupled with a processor of the device (not shown), which monitors the calculated distances. Positive changes in the distance greater than a predetermined amount may trigger the methods and algorithms for avoiding an area. Methods for avoiding areas include methods or algorithms employed to drive the robot away from a particular area. These methods may include turning 360 degrees and driving in the opposite direction, reversing, turning a small amount and then continuing, etc. In the example shown in FIG. 95A, no positive change is detected (indicating that no edges have been identified) and the device continues operation as normal. FIG. 95B illustrates a side elevation view of the robotic vacuum 9400 using rangefinder sensors 9401 over a surface 9507 with an edge 9508. In this case, the robotic vacuum has moved in a direction 9509 to arrive at the current location where the distance 9510 from the rangefinder sensor 9401 to the nearest surface 9511 is significantly greater than before. The increase in distance may be greater than a predetermined amount and trigger the methods for avoiding the area, thereby stopping the device from falling off the edge. In some embodiments, program code stored in the memory and executed by the processor of the VMP robot may effectuate the operations described herein.

Figure 96:
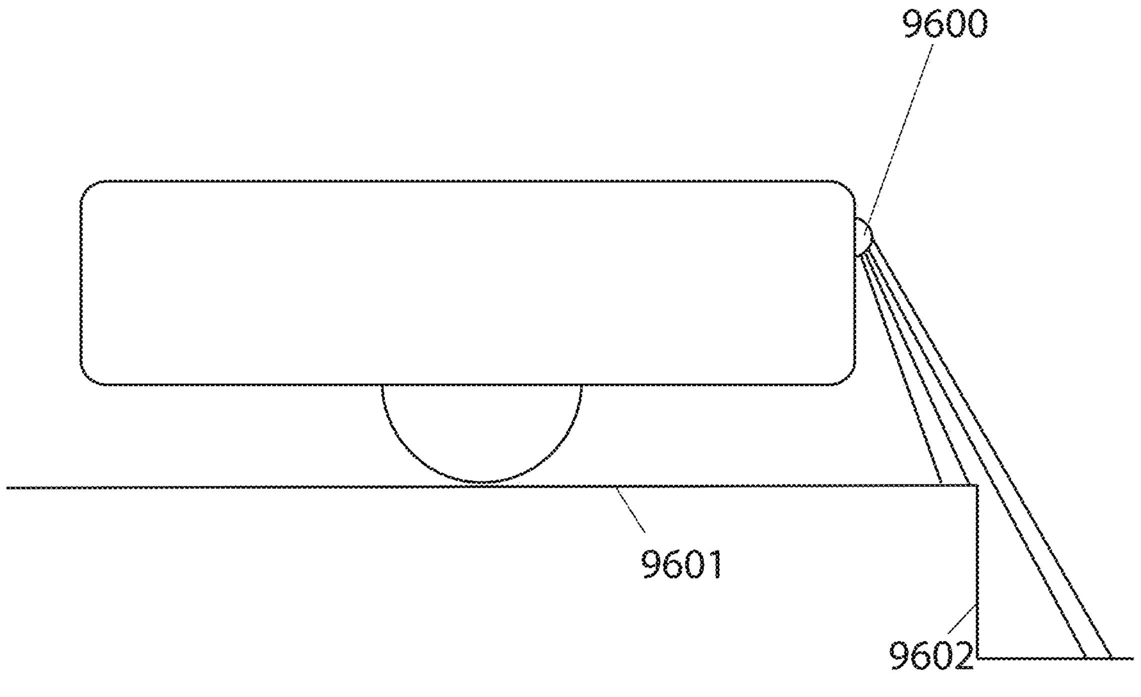
FIG. 96 illustrates a side view of an example of a robotic device, in this case a vacuum, with a rangefinder on a front side of the robotic vacuum, according to some embodiments.
Figure 97:
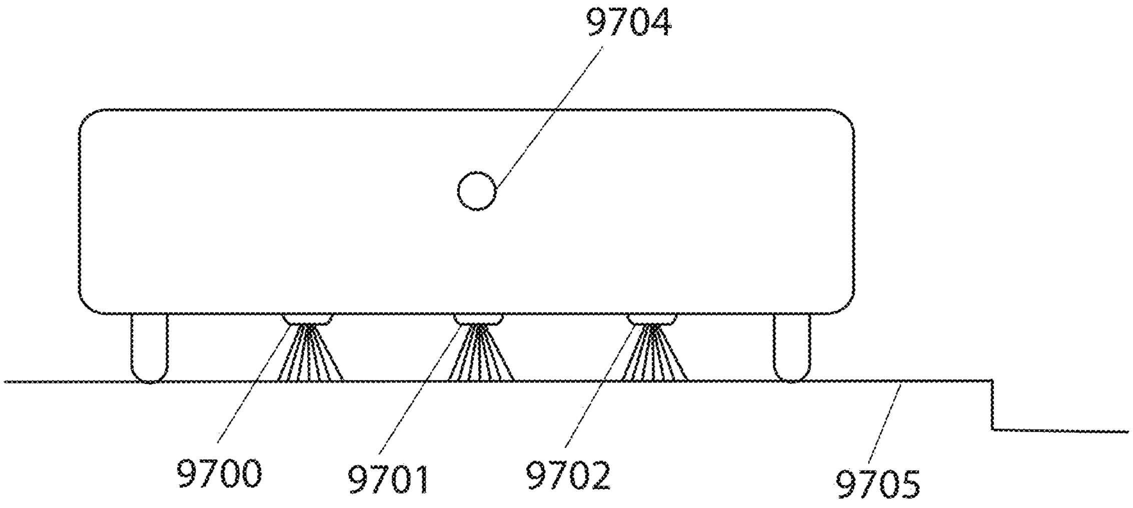
FIG. 97 illustrates a front view of an example of a robotic device, in this case a vacuum, with multiple rangefinders on a bottom side of the robotic vacuum, according to some embodiments.
Figure 98:
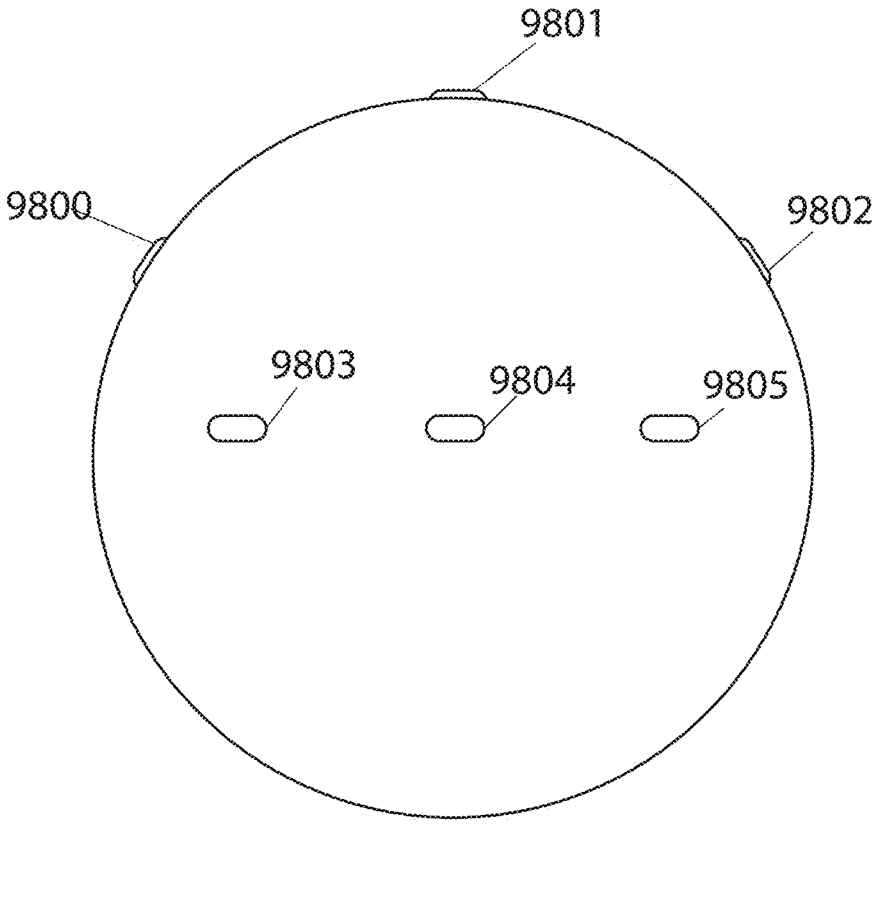
FIG. 98 illustrates a top view of an example of a robotic device, in this case a vacuum, with multiple rangefinders on a front and bottom side of the robotic vacuum, according to some embodiments.
Figure 99:
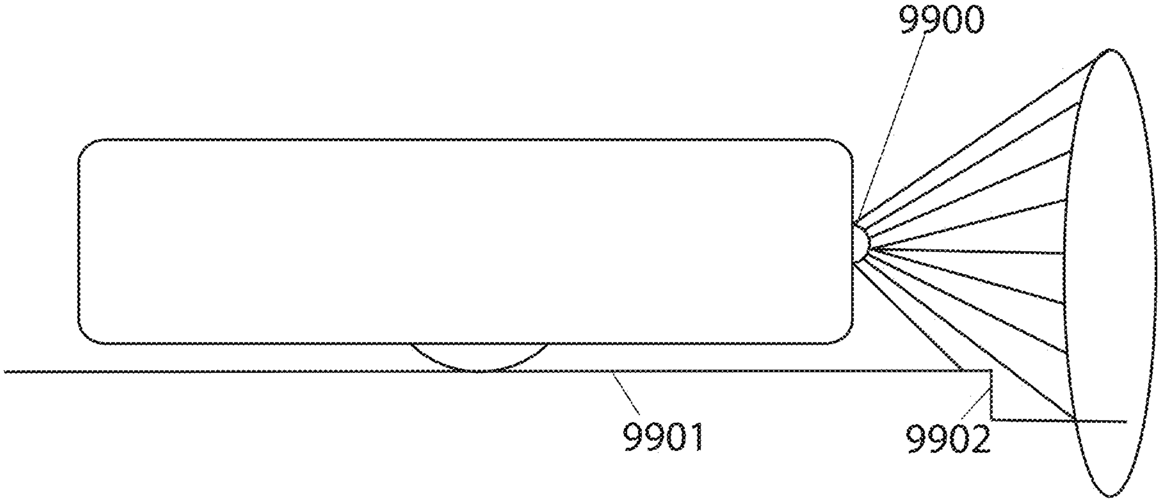
FIG. 99 illustrates a side view of an example of a robotic device, in this case a vacuum, with a LIDAR on a front side of the robotic vacuum, according to some embodiments.

In some embodiments, rangefinders are positioned on one or more portions of the VMP robot. For example, FIG. 96 illustrates a side view of an example of a robotic vacuum with rangefinder 9600 positioned on a front side of the robotic vacuum. Rangefinder 9600 measures distances to surface 9601 as the robotic device approaches cliff 9602. A processor of the robotic vacuum detects cliff 9602 by detecting an increase in distances measured by rangefinder 9600. FIG. 97 illustrates a front view of an example of a robotic vacuum with rangefinders 9700, 9701, and 9702 positioned on a bottom side and 9704 on a front side of the robotic vacuum. Rangefinders 9700, 9701, 9702, and 9704 measure distances to surface 9705. FIG. 98 illustrates a top view of an example of a robotic vacuum with rangefinders 9800, 9801, 9802, 9803, 9805, and 9805 positioned on a front, side, and bottom of the robotic vacuum. FIG. 99 illustrates a side view of an example of a robotic vacuum with LIDAR 9900 on a front side of the robotic vacuum. LIDAR 9900 measures distances to surface 9901 in three dimensions as the robotic device approaches cliff 9902. In embodiments, different arrangements of rangefinders and LIDAR systems (or otherwise distance sensors or detection systems) are possible.

In some embodiments, the processor uses sensor data to distinguish between dark surfaces (e.g., dark flooring, surface cracks, etc.) and cliffs. In some embodiments, the processor uses the amplitude of output data of a TOF sensor predict whether a dark surface or cliff is observed as the amplitude may correlate with reflectivity of a surface. In some embodiments, the amplitude of the output data of a TOF sensor is different when the area observed by the TOF sensor is a close, dark surface (e.g., dark carpet) as compared to when the area observed by the TOF sensor is a far surface, as is the case when the area observed by the TOF sensor is a cliff. In some embodiments, the processor uses this approach to distinguish between different types of other surfaces.

In some embodiments, the VMP robot (or any of its structures) includes various sensors for observing the surroundings. For example, in some embodiments, the VMP robot may include an on-board camera, such as one with zero-degrees of freedom of actuated movement relative to the VMP robot (which may itself have three degrees of freedom relative to a working environment), or some embodiments may have more or fewer degrees of freedom; e.g., in some cases, the camera may scan back and forth relative to the VMP robot. Such cameras may include, but are not limited to, depth cameras, such as stereo or structured light depth cameras, stereo vision cameras, or various other types of camera producing output data from which the environment may be perceived. In some embodiments, a time-of-flight camera may determine distance based on time required for light transmitted from the VMP robot to reflect off of an object and return to the camera, from which distance to the object can be inferred. Distance measurements to objects may also be estimated (or otherwise perceived) by capturing images of the objects from a moving camera, e.g., with structure from motion techniques. Distance may also be measured using a combination of one or more lasers, one or more cameras, and one or more image processors (or the main processor of the robot). (Modular Robot) Other depth perceiving devices that collect data from which depth may be inferred may be used. For example, in one embodiment the depth perceiving device may capture depth images containing depth vectors to objects, from which the processor can calculate the Euclidean norm of each vector, representing the depth from the camera to objects within the field of view of the camera. In some instances, depth vectors originate at the depth perceiving device and are measured in a two-dimensional plane coinciding with the line of sight of the depth perceiving device. In other instances, a field of three-dimensional vectors originating at the depth perceiving device and arrayed over objects in the environment are measured. In a further example, depth to objects may be inferred using the quality of pixels, such as brightness, intensity, and color, in captured images of the objects, and in some cases, parallax and scaling differences between images captured at different camera poses.

For example, a depth perceiving device may include a laser light emitter disposed on a baseplate emitting a collimated laser beam creating a projected light point on surfaces substantially opposite the emitter, two image sensors disposed on the baseplate, positioned at a slight inward angle towards to the laser light emitter such that the fields of view of the two image sensors overlap and capture the projected light point within a predetermined range of distances, the image sensors simultaneously and iteratively capturing images, and an image processor overlaying the images taken by the two image sensors to produce a superimposed image showing the light points from both images in a single image, extracting a distance between the light points in the superimposed image, and, comparing the distance to figures in a preconfigured table that relates distances between light points with distances between the baseplate and surfaces upon which the light point is projected (which may be referred to as 'projection surfaces' herein) to find an estimated distance between the baseplate and the projection surface at the time the images of the projected light point were captured. In some embodiments, the preconfigured table may be constructed from actual measurements of distances between the light points in superimposed images at increments in a predetermined range of distances between the baseplate and the projection surface.

Figure 100A:
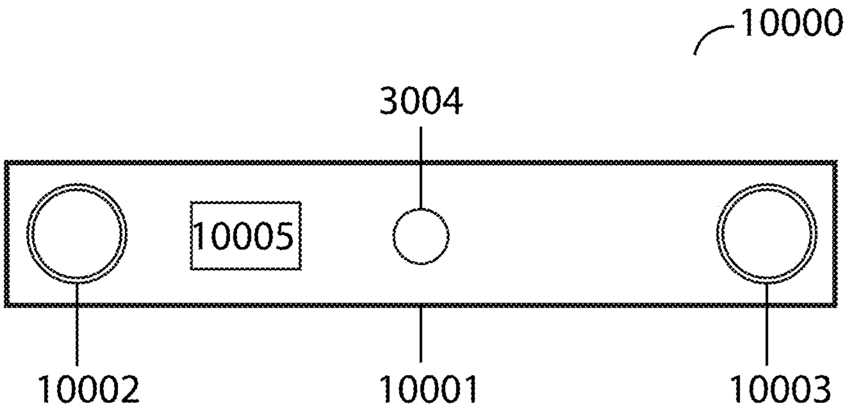
FIGS. 100A and 100B illustrate an example of a depth perceiving device, according to some embodiments.
Figure 100B:
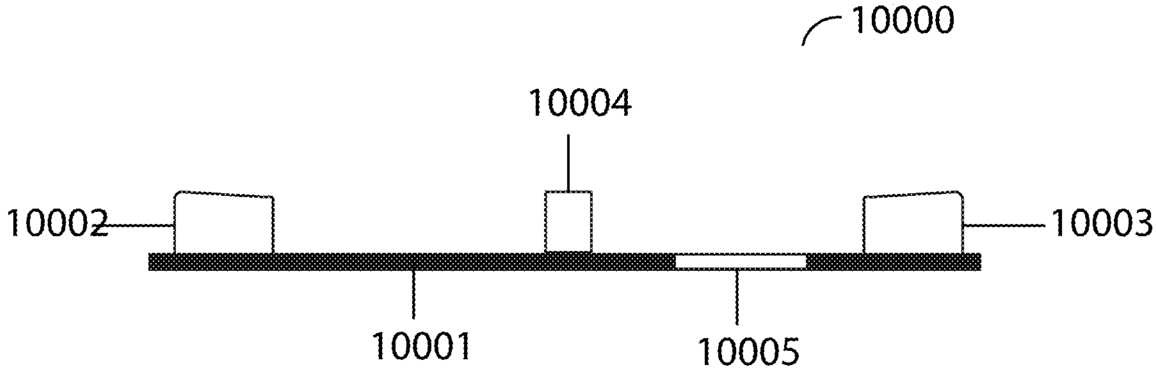
Figure 101:
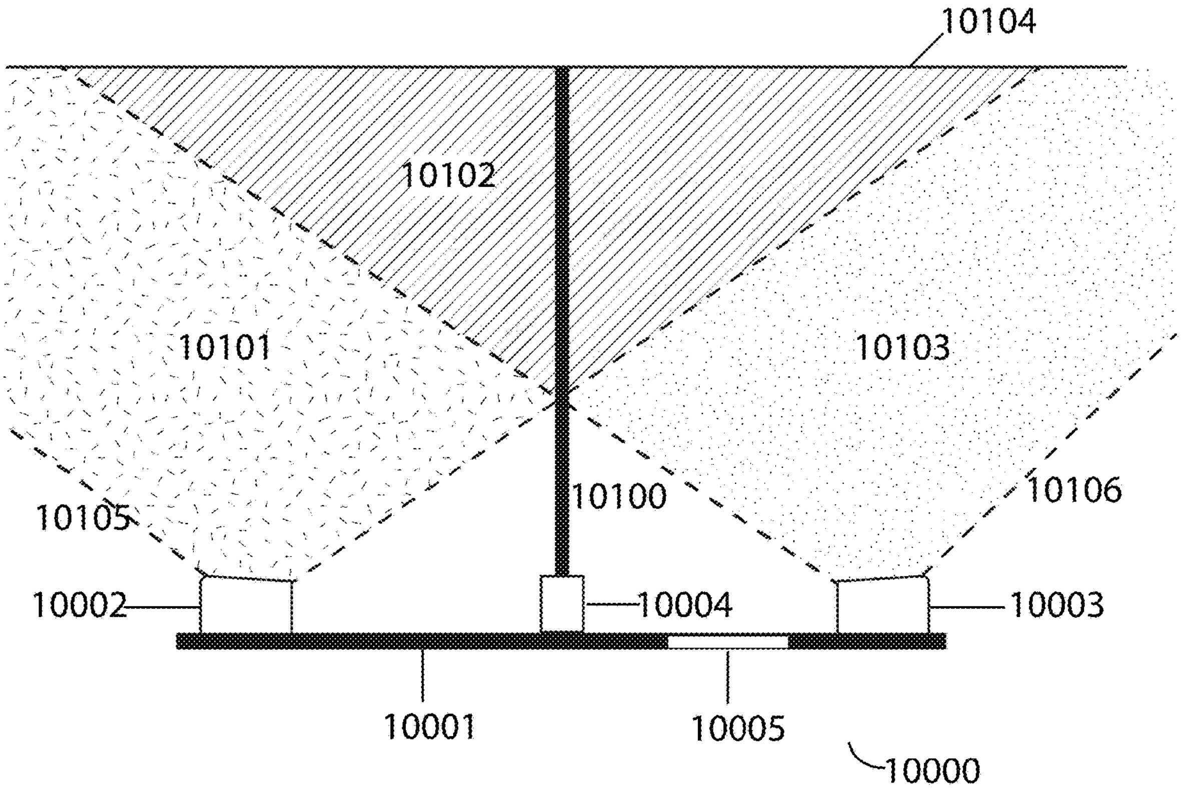
FIG. 101 illustrates an overhead view of an example of a depth perceiving device and fields of view of its image sensors, according to some embodiments.

FIGS. 100A and 100B illustrates a front elevation and top plan view of an embodiment of the depth perceiving device 10000 including baseplate 10001, left image sensor 10002, right image sensor 10003, laser light emitter 10004, and image processor 10005. The image sensors are positioned with a slight inward angle with respect to the laser light emitter. This angle causes the fields of view of the image sensors to overlap. The positioning of the image sensors is also such that the fields of view of both image sensors will capture laser projections of the laser light emitter within a predetermined range of distances. FIG. 101 illustrates an overhead view of depth perceiving device 10000 including baseplate 10001, image sensors 10002 and 10003, laser light emitter 10004, and image processor 10005. Laser light emitter 10004 is disposed on baseplate 10001 and emits collimated laser light beam 10100. Image processor 10005 is located within baseplate 10001. Area 10101 and 10102 together represent the field of view of image sensor 10002. Dashed line 10105 represents the outer limit of the field of view of image sensor 10002 (it should be noted that this outer limit would continue on linearly, but has been cropped to fit on the drawing page). Area 10103 and 10102 together represent the field of view of image sensor 10003. Dashed line 10106 represents the outer limit of the field of view of image sensor 10003 (it should be noted that this outer limit would continue on linearly, but has been cropped to fit on the drawing page). Area 10102 is the area where the fields of view of both image sensors overlap. Line 10104 represents the projection surface. That is, the surface onto which the laser light beam is projected.

In some embodiments, each image taken by the two image sensors shows the field of view including the light point created by the collimated laser beam. At each discrete time interval, the image pairs are overlaid creating a superimposed image showing the light point as it is viewed by each image sensor. Because the image sensors are at different locations, the light point will appear at a different spot within the image frame in the two images. Thus, when the images are overlaid, the resulting superimposed image will show two light points until such a time as the light points coincide. The distance between the light points is extracted by the image processor using computer vision technology, or any other type of technology known in the art. This distance is then compared to figures in a preconfigured table that relates distances between light points with distances between the baseplate and projection surfaces to find an estimated distance between the baseplate and the projection surface at the time that the images were captured. As the distance to the surface decreases the distance measured between the light point captured in each image when the images are superimposed decreases as well. In some embodiments, the emitted laser point captured in an image is detected by the image processor by identifying pixels with high brightness, as the area on which the laser light is emitted has increased brightness. After superimposing both images, the distance between the pixels with high brightness, corresponding to the emitted laser point captured in each image, is determined.

Figure 102A:
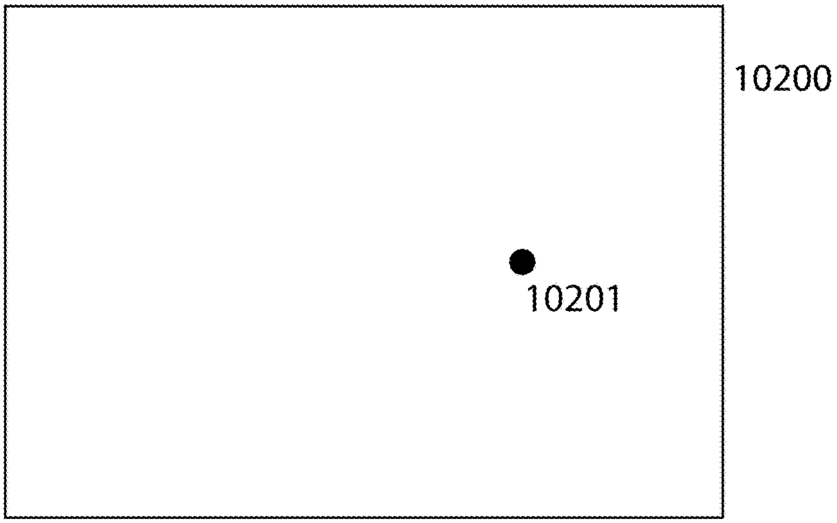
FIGS. 102A-102C illustrate an example of distance estimation using a variation of a depth perceiving device, according to some embodiments.
Figure 102B:
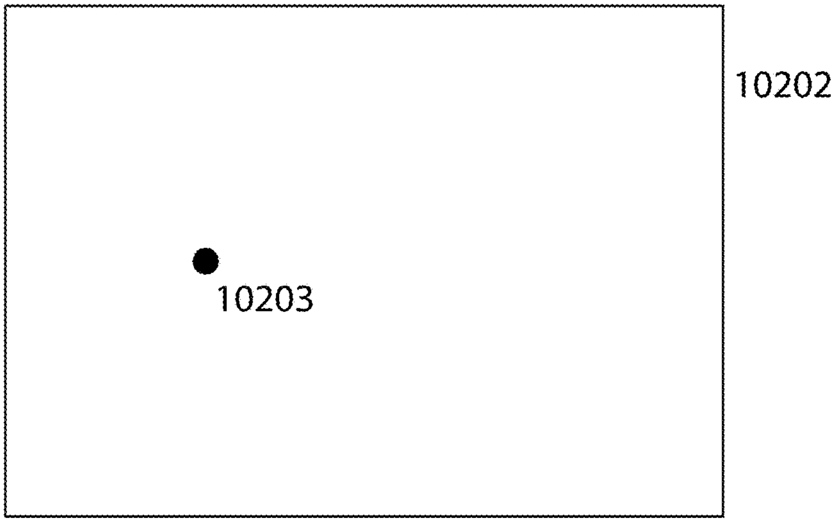
Figure 102C:
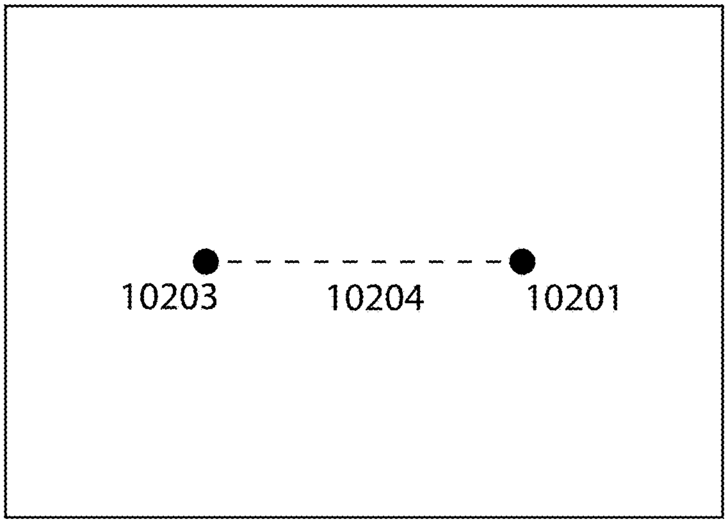

FIG. 102A illustrates an embodiment of the image captured by left image sensor 10002. Rectangle 10200 represents the field of view of image sensor 10002. Point 10201 represents the light point projected by laser beam emitter 10004 as viewed by image sensor 10002. FIG. 102B illustrates an embodiment of the image captured by right image sensor 10003. Rectangle 10202 represents the field of view of image sensor 10003. Point 10203 represents the light point projected by laser beam emitter 10004 as viewed by image sensor 10002. As the distance of the baseplate to projection surfaces increases, light points 10201 and 10203 in each field of view will appear further and further toward the outer limits of each field of view, shown respectively in FIG. 101 as dashed lines 10105 and 10106. Thus, when two images captured at the same time are overlaid, the distance between the two points will increase as distance to the projection surface increases. FIG. 102C illustrates the two images of FIG. 102A and FIG. 102B overlaid. Point 10201 is located a distance 10204 from point 10203, the distance extracted by the image processor 10005. The distance 10204 is then compared to figures in a preconfigured table that co-relates distances between light points in the superimposed image with distances between the baseplate and projection surfaces to find an estimate of the actual distance from the baseplate to the projection surface upon which the laser light was projected.

In some embodiments, the two image sensors are aimed directly forward without being angled towards or away from the laser light emitter. When image sensors are aimed directly forward without any angle, the range of distances for which the two fields of view may capture the projected laser point is reduced. In these cases, the minimum distance that may be measured is increased, reducing the range of distances that may be measured. In contrast, when image sensors are angled inwards towards the laser light emitter, the projected light point may be captured by both image sensors at smaller distances from the obstacle.

In some embodiments, the image sensors may be positioned at an angle such that the light point captured in each image coincides at or before the maximum effective distance of the distance sensor, which is determined by the strength and type of the laser emitter and the specifications of the image sensor used.

In some embodiments, the depth perceiving device further includes a plate positioned in front of the laser light emitter with two slits through which the emitted light may pass. In some instances, the two image sensors may be positioned on either side of the laser light emitter pointed directly forward or may be positioned at an inwards angle towards one another to have a smaller minimum distance to the object that may be measured. The two slits through which the light may pass results in a pattern of spaced rectangles. In some embodiments, the images captured by each image sensor may be superimposed and the distance between the rectangles captured in the two images may be used to estimate the distance to the projection surface using a preconfigured table relating distance between rectangles to distance from the surface upon which the rectangles are projected. The preconfigured table may be constructed by measuring the distance between rectangles captured in each image when superimposed at incremental distances from the surface upon which they are projected for a range of distances.

In some instances, a line laser is used in place of a point laser. In such instances, the images taken by each image sensor are superimposed and the distance between coinciding points along the length of the projected line in each image may be used to determine the distance from the surface using a preconfigured table relating the distance between points in the superimposed image to distance from the surface. In some embodiments, the depth perceiving device further includes a lens positioned in front of the laser light emitter that projects a horizontal laser line at an angle with respect to the line of emission of the laser light emitter. The images taken by each image sensor may be superimposed and the distance between coinciding points along the length of the projected line in each image may be used to determine the distance from the surface using a preconfigured table as described above. The position of the projected laser line relative to the top or bottom edge of the captured image may also be used to estimate the distance to the surface upon which the laser light is projected, with lines positioned higher relative to the bottom edge indicating a closer distance to the surface. In some embodiments, the position of the laser line may be compared to a preconfigured table relating the position of the laser line to distance from the surface upon which the light is projected. In some embodiments, both the distance between coinciding points in the superimposed image and the position of the line are used in combination for estimating the distance to the projection surface. In combining more than one method, the accuracy, range, and resolution may be improved.

Figure 103A:
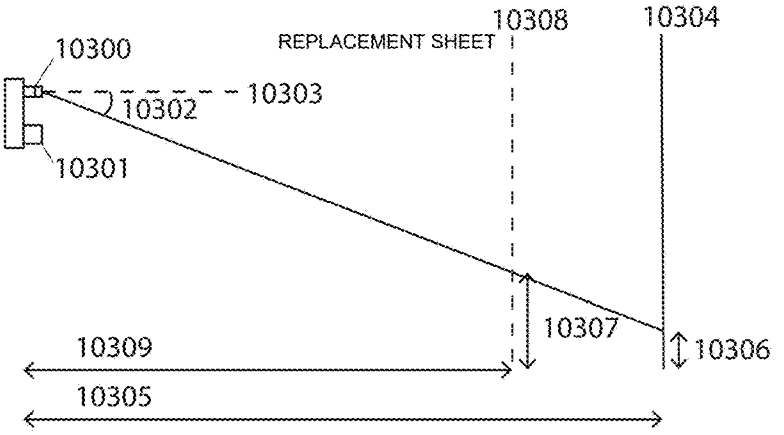
FIGS. 103A-103C illustrate an example of distance estimation using a variation of a depth perceiving device, according to some embodiments.
Figure 103B:
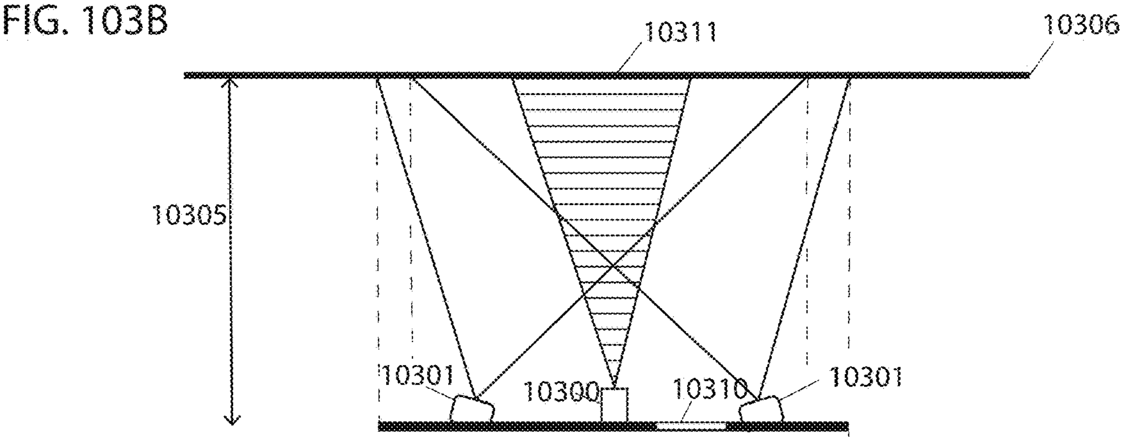
Figure 103C:
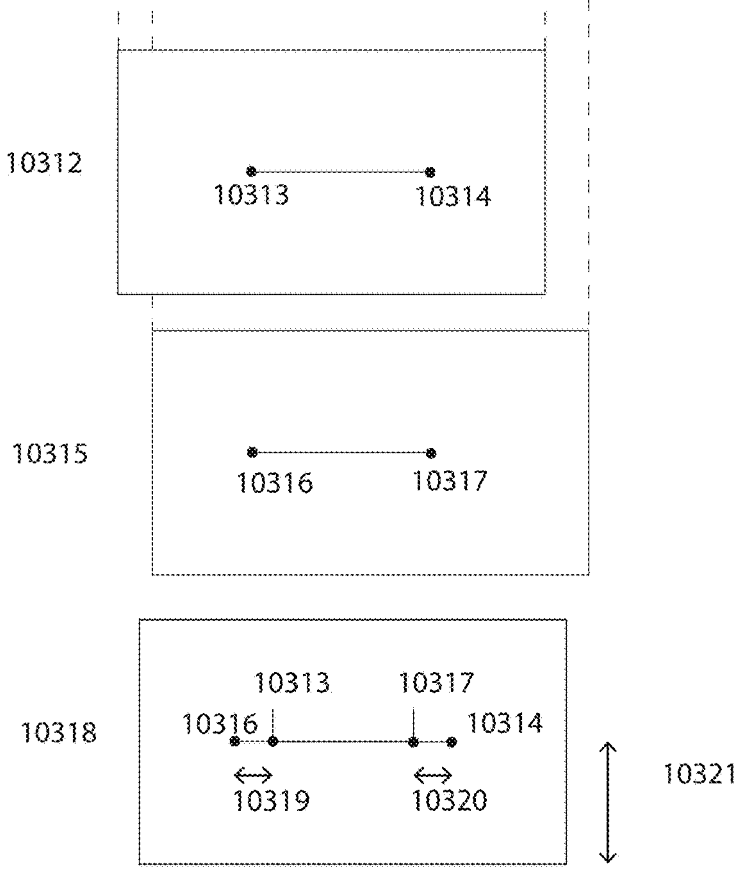

FIG. 103A illustrates an embodiment of a side view of a depth perceiving device including a laser light emitter and lens 10300, image sensors 10301, and image processor (not shown). The lens is used to project a horizontal laser line at a downwards angle 10302 with respect to line of emission of laser light emitter 10303 onto object surface 10304 located a distance 10305 from the depth perceiving device. The projected horizontal laser line appears at a height 10306 from the bottom surface. As shown, the projected horizontal line appears at a height 10307 on object surface 10308, at a closer distance 10309 to laser light emitter 10300, as compared to object 10304 located a further distance away. Accordingly, in some embodiments, in a captured image of the projected horizontal laser line, the position of the line from the bottom edge of the image would be higher for objects closer to the distance estimation system. Hence, the position of the project laser line relative to the bottom edge of a captured image may be related to the distance from the surface. FIG. 103B illustrates a top view of the depth perceiving device including laser light emitter and lens 10300, image sensors 10301, and image processor 10310. Horizontal laser line 10311 is projected onto object surface 10306 located a distance 10305 from the baseplate of the distance measuring system. FIG. 103C illustrates images of the projected laser line captured by image sensors 10301. The horizontal laser line captured in image 10312 by the left image sensor has endpoints 10313 and 10314 while the horizontal laser line captured in image 10315 by the right image sensor has endpoints 10316 and 10317. FIG. 103C illustrates images of the projected laser line captured by image sensors 10301. The horizontal laser line captured in image 10312 by the left image sensor has endpoints 10313 and 10314 while the horizontal laser line captured in image 10315 by the right image sensor has endpoints 10316 and 10317. FIG. 103C also illustrates the superimposed image 10318 of images 10312 and 10315. On the superimposed image, distances 10319 and 10320 between coinciding endpoints 10316 and 10313 and 10317 and 10314, respectively, along the length of the laser line captured by each camera may be used to estimate distance from the baseplate to the object surface. In some embodiments, more than two points along the length of the horizontal line may be used to estimate the distance to the surface. In some embodiments, the position of the horizontal line 10321 from the bottom edge of the image may be simultaneously used to estimate the distance to the object surface as described above. In some configurations, the laser emitter and lens may be positioned below the image sensors, with the horizontal laser line projected at an upwards angle with respect to the line of emission of the laser light emitter. In one embodiment, a horizontal line laser is used rather than a laser beam with added lens. In some embodiments, a laser line is formed from a series of light points. Other variations in the configuration are similarly possible. For example, the image sensors may both be positioned to the right or left of the laser light emitter as opposed to either side of the light emitter as illustrated in the examples.

In some embodiments, noise, such as sunlight, may cause interference causing the image processor to incorrectly identify light other than the laser as the projected laser line in the captured image. The expected width of the laser line at a particular distance may be used to eliminate sunlight noise. A preconfigured table of laser line width corresponding to a range of distances may be constructed, the width of the laser line increasing as the distance to the obstacle upon which the laser light is projected decreases. In cases where the image processor detects more than one laser line in an image, the corresponding distance of both laser lines is determined. To establish which of the two is the true laser line, the image processor compares the width of both laser lines and compares them to the expected laser line width corresponding to the distance to the object determined based on position of the laser line. In some embodiments, any hypothesized laser line that does not have correct corresponding laser line width, to within a threshold, is discarded, leaving only the true laser line. In some embodiments, the laser line width may be determined by the width of pixels with high brightness. The width may be based on the average of multiple measurements along the length of the laser line.

In some embodiments, noise, such as sunlight, which may be misconstrued as the projected laser line, may be eliminated by detecting discontinuities in the brightness of pixels corresponding to the hypothesized laser line. For example, if there are two hypothesized laser lines detected in an image, the hypothesized laser line with discontinuity in pixel brightness, where for instance pixels 1 to 10 have high brightness, pixels 11-15 have significantly lower brightness and pixels 16-25 have high brightness, is eliminated as the laser line projected is continuous and, as such, large change in pixel brightness along the length of the line are unexpected. These methods for eliminating sunlight noise may be used independently, in combination with each other, or in combination with other methods during processing. For example, in some embodiments, an IR receiver may distinguish a true IR signal from sunlight by detection of a unique pattern encoded in the IR signal. In some embodiments, the transmitted signal of the IR sensor is modified to include a unique pattern which the IR receiver may use to distinguish the true IR signal from sunlight, thereby avoiding false detection of signals.

Figure 104:
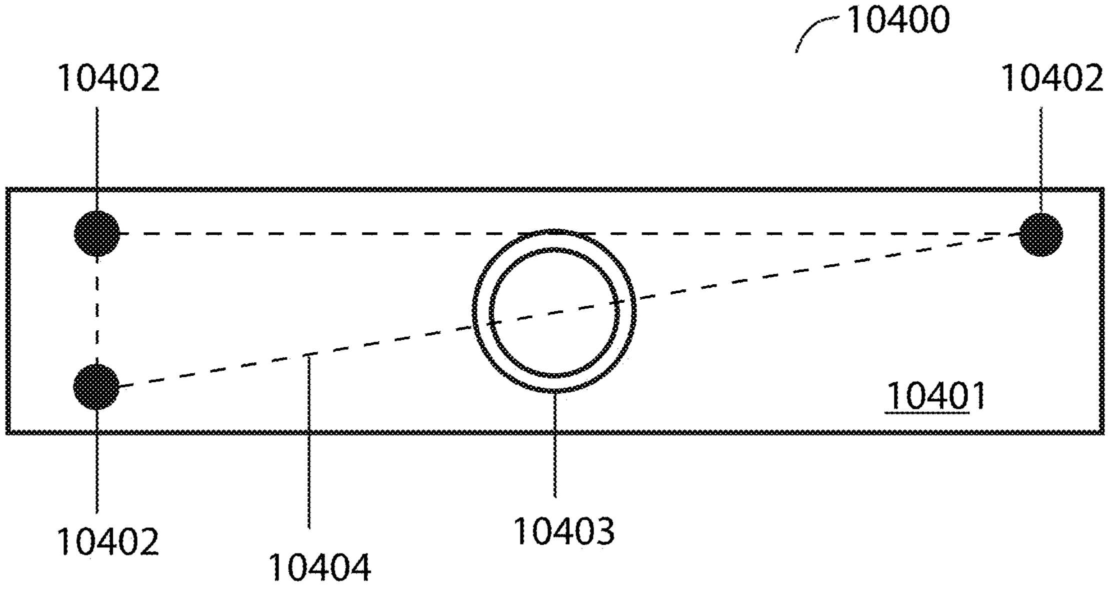
FIG. 104 illustrates an example of a depth perceiving device, according to some embodiments.
Figure 105:
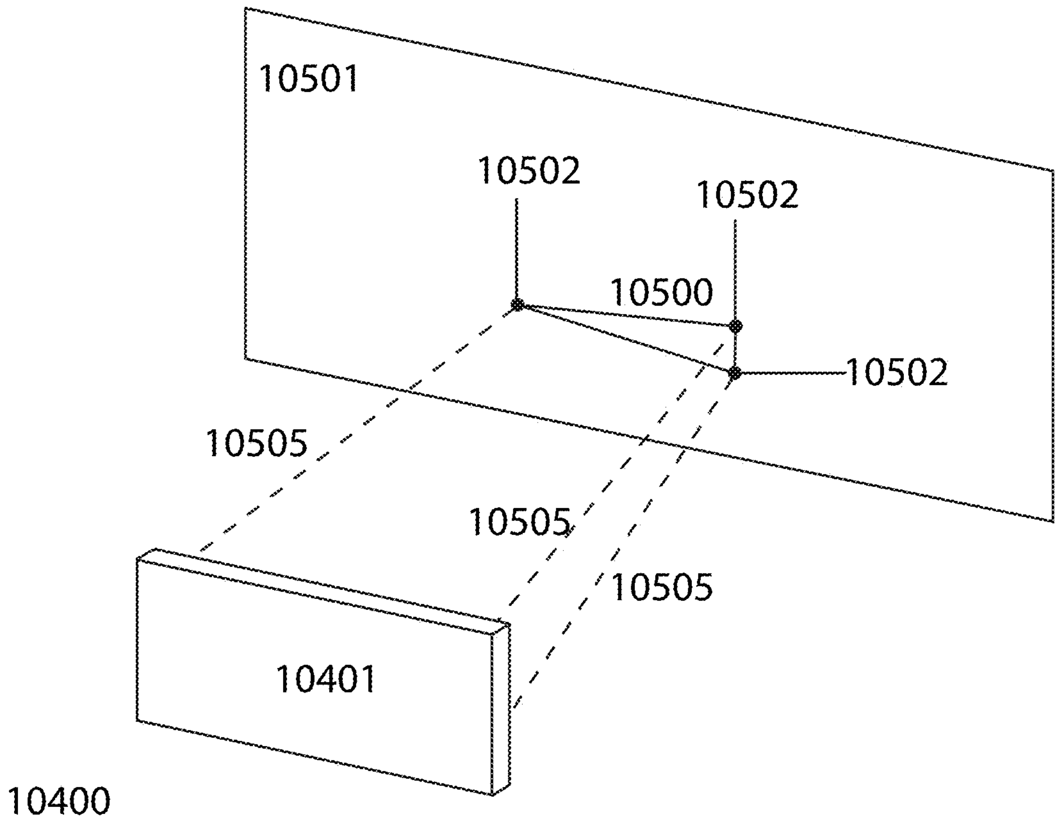
FIG. 105 illustrates a schematic view of a depth perceiving device and resulting triangle formed by connecting the light points illuminated by three laser light emitters, according to some embodiments.

In another example, a depth perceiving device includes an image sensor, an image processor, and at least two laser emitters positioned at an angle such that they converge. The laser emitters project light points onto an object, which is captured by the image sensor. The image processor may extract geometric measurements and compare the geometric measurement to a preconfigured table that relates the geometric measurements with depth to the object onto which the light points are projected. In cases where only two light emitters are used, they may be positioned on a planar line and for three or more laser emitters, the emitters are positioned at the vertices of a geometrical shape. For example, three emitters may be positioned at vertices of a triangle or four emitters at the vertices of a quadrilateral. This may be extended to any number of emitters. In these cases, emitters are angled such that they converge at a particular distance. For example, for two emitters, the distance between the two points may be used as the geometric measurement. For three of more emitters, the image processer measures the distance between the laser points (vertices of the polygon) in the captured image and calculates the area of the projected polygon. The distance between laser points and/or area may be used as the geometric measurement. The preconfigured table may be constructed from actual geometric measurements taken at incremental distances from the object onto which the light is projected within a specified range of distances. Regardless of the number of laser emitters used, they shall be positioned such that the emissions coincide at or before the maximum effective distance of the depth perceiving device, which is determined by the strength and type of laser emitters and the specifications of the image sensor used. Since the laser light emitters are angled toward one another such that they converge at some distance, the distance between projected laser points or the polygon area with projected laser points as vertices decrease as the distance from the surface onto which the light is projected increases. As the distance from the surface onto which the light is projected increases the collimated laser beams coincide and the distance between laser points or the area of the polygon becomes null. FIG. 104 illustrates a front elevation view of a depth perceiving device 10400 including a baseplate 10401 on which laser emitters 10402 and an image sensor 10403 are mounted. The laser emitters 10402 are positioned at the vertices of a polygon (or endpoints of a line, in cases of only two laser emitters). In this case, the laser emitters are positioned at the vertices of a triangle 10404. FIG. 105 illustrates the depth perceiving device 10400 projecting collimated laser beams 10505 of laser emitters 10402 (not shown) onto a surface 10501. The baseplate 10401 and laser emitters (not shown) are facing a surface 10501. The dotted lines 10505 represent the laser beams. The beams are projected onto surface 10501, creating the light points 10502, which, if connected by lines, form triangle 10500. The image sensor (not shown) captures an image of the projection and sends it to the image processing unit (not shown). The image processing unit extracts the triangle shape by connecting the vertices to form triangle 10500 using computer vision technology, finds the lengths of the sides of the triangle, and uses those lengths to calculate the area within the triangle. The image processor then consults a pre-configured area-to-distance table with the calculated area to find the corresponding distance.

Figure 106:
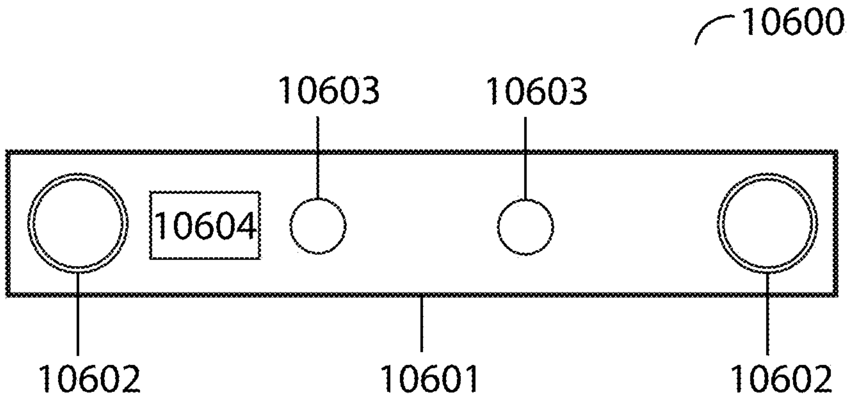
FIG. 106 illustrates an example of a depth perceiving device, according to some embodiments.
Figure 107:
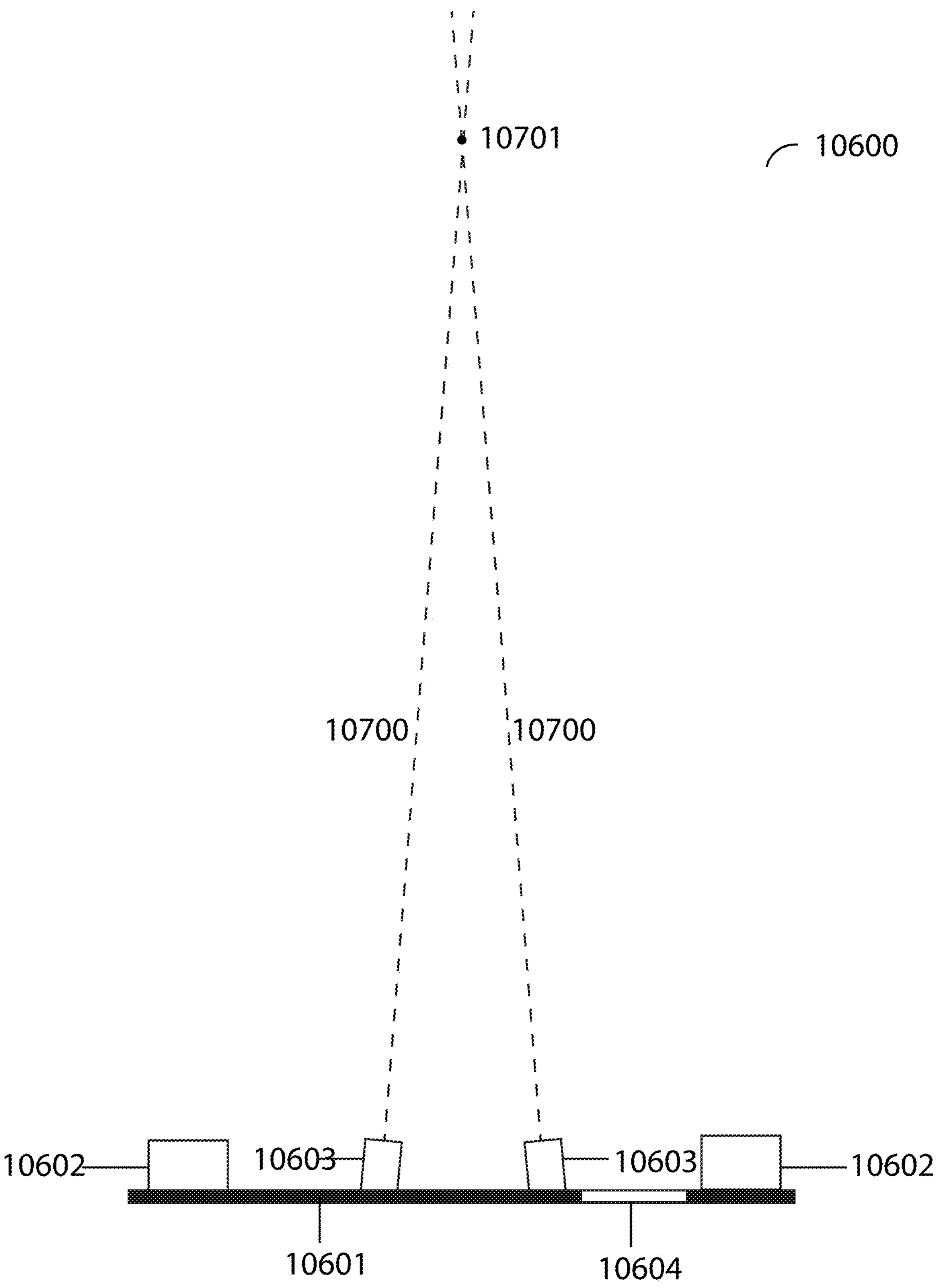
FIG. 107 illustrates an example of a depth perceiving device, according to some embodiments.

In some embodiments, a second image sensor is included to improve accuracy of the depth perceiving device. FIG. 106 illustrates a front elevation view of an example of a depth perceiving device 10600 including a baseplate 10601, image sensors 10602, laser light emitters 10603, and image processors 10604. The laser light emitters 10603 are positioned with a slight inward angle toward each other, with the point of convergence being a predetermined distance from the baseplate. The one or more image sensors shall be positioned such that the fields of view thereof will capture laser projections of the laser light emitters within a predetermined range of distances. FIG. 107 illustrates an overhead view of the depth perceiving device. Laser light emitters 10603 are disposed on baseplate 10601 and emit collimated laser light beams 10700, which converge at point 10701. Image sensors 10602 are located on either side of the laser light emitters. Image processor 10604 is located within baseplate 10601. In some embodiments, the maximum effective distance of the depth perceiving device is at the point where the laser beams coincide. In other embodiments, using different wavelengths in each laser light emitter will allow the image processor to recognize the distances between the light points after the point of convergence as being further from the baseplate than the identical distances between the light points that will occur before the point of convergence. In distances beyond point 10701, the laser beam from the right-most laser emitter will appear on the left side, and the laser beam from the left-most laser emitter will appear on the right side. Upon identifying the switch in locations of the laser beams, the image processor will determine that the extracted distance is occurring after the point of convergence.

Figure 108:
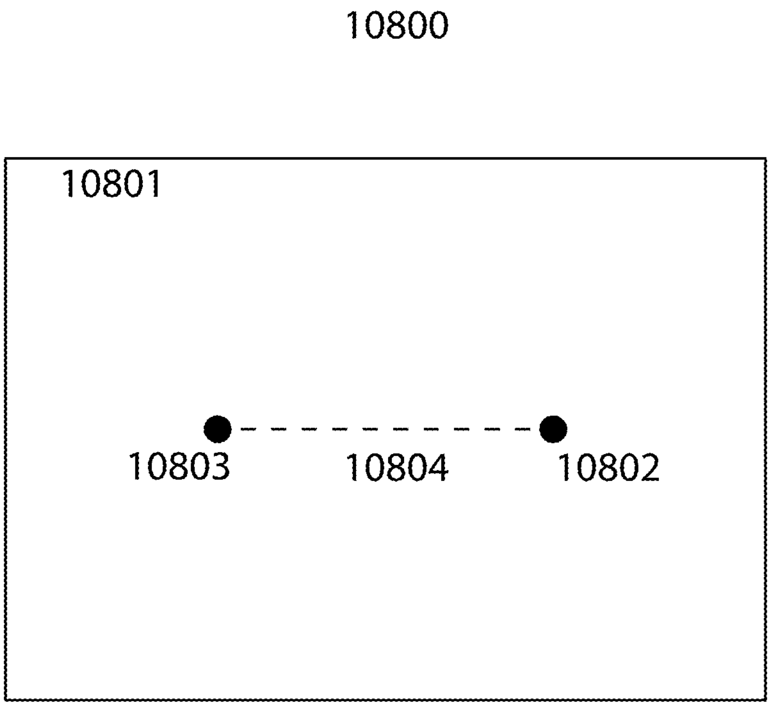
FIG. 108 illustrates an image captured by an image sensor, according to some embodiments.

In some embodiments, the one or more image sensors simultaneously and iteratively capture images at discrete time intervals. FIG. 108 illustrates an image 10800 captured by image sensor 10602. Rectangle 10801 represents the field of view of image sensor 10602. Points 10802 and 10803 represent the light points projected by the laser light emitters 10603. As the distance of the baseplate to projection surfaces increases, the light points 10802, 10803 will appear closer and closer together until the distance between them is null, after which point the light points will diverge from each other. Thus, the distance 10804 between the two points may be analyzed to determine the distance to the projection surface at the time that an image is captured. The image 10801 is sent to the image processor, which extracts the distance 10804 between the two points (if any). The distance 10804 is then compared to figures in a preconfigured table that co-relates distances between light points in the system with distances between the baseplate and projection surfaces to find an estimate of the actual distance from the baseplate to the projection surface at the time the image of the laser light projections was captured. In some embodiments, the process of capturing an image, sending it to an image processor, and extracting the distance between the light points is performed simultaneously using a second image sensor, and the data extracted from images from the first image sensor is combined with the data extracted from the second image sensor to obtain a more accurate aggregate reading before consulting the preconfigured table.

Figure 109A:
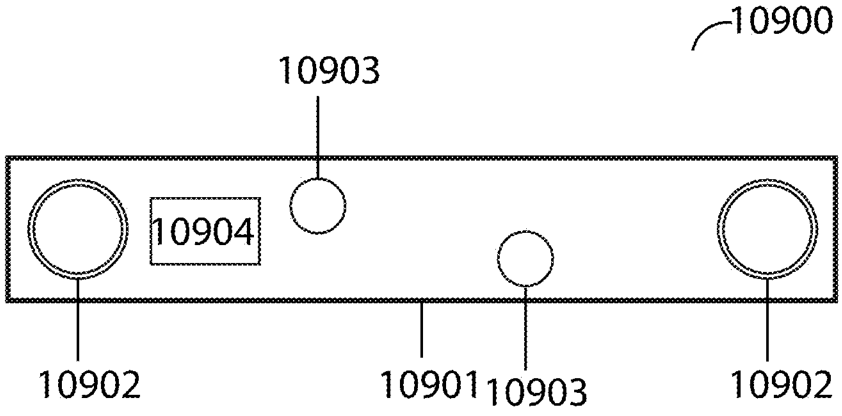
FIGS. 109A and 109B illustrate an example of a depth perceiving device, according to some embodiments.
Figure 109B:
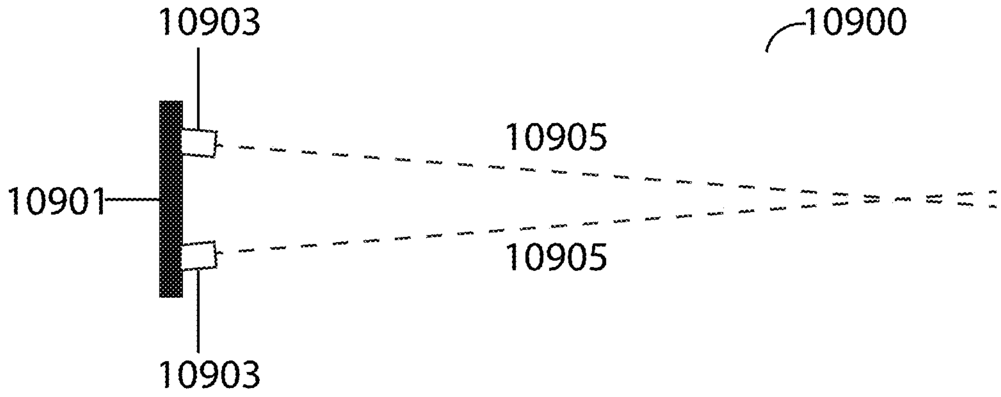
Figure 110A:
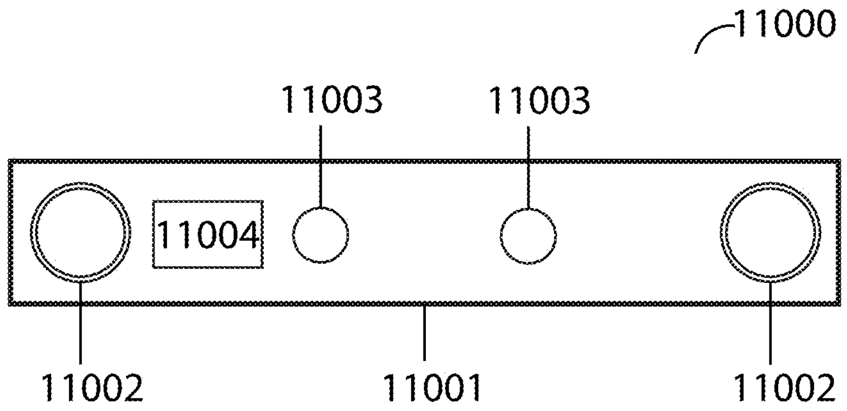
FIGS. 110A and 110B illustrate an example of a depth perceiving device, according to some embodiments.
Figure 110B:
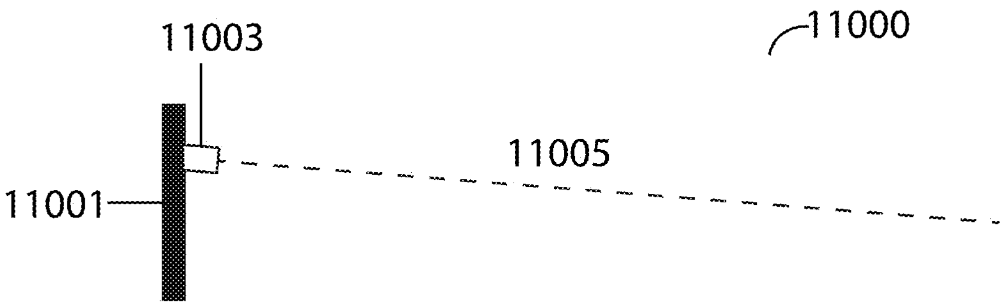
Figure 111:
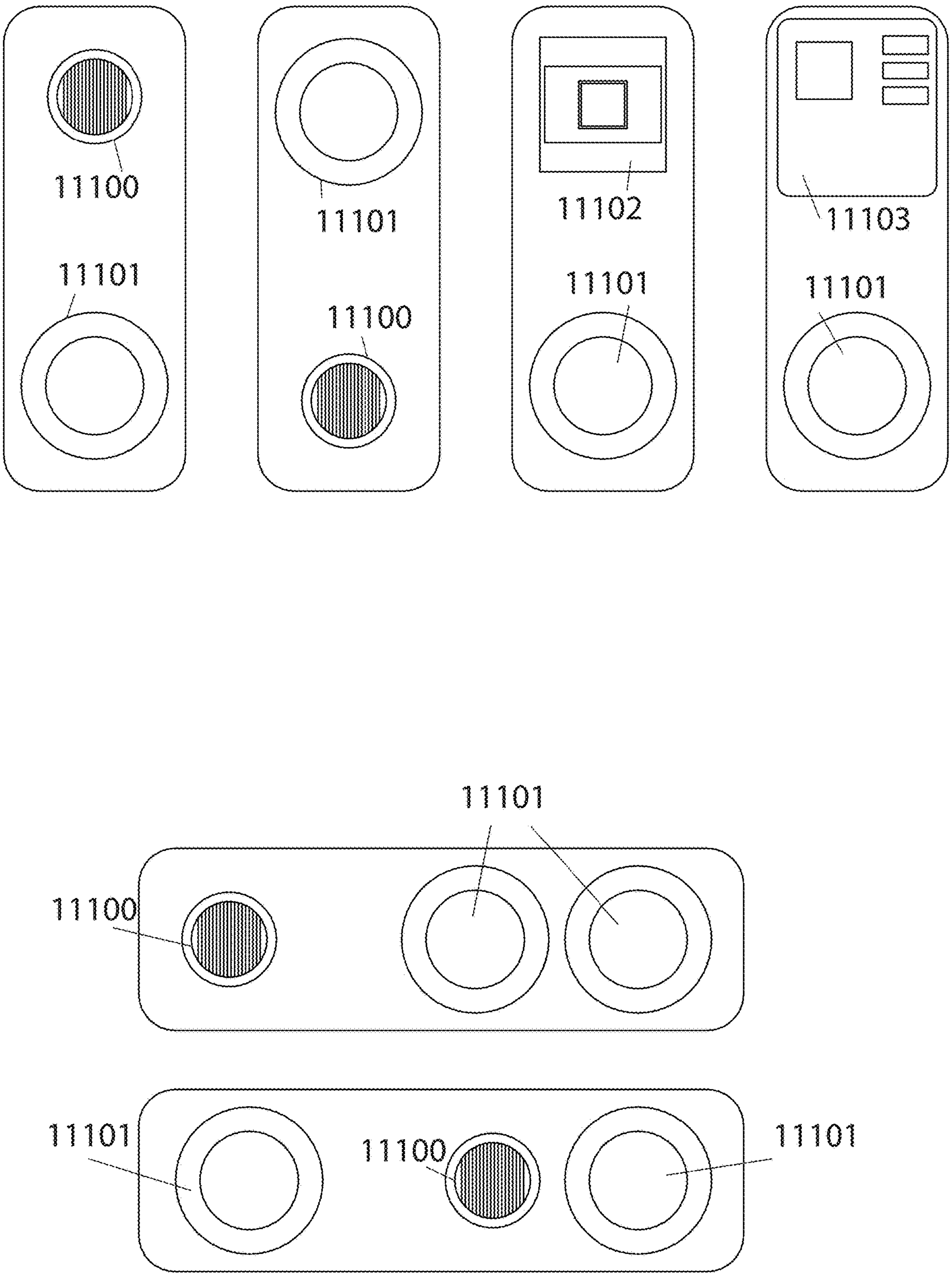
FIG. 111 illustrates various different configurations of a depth perceiving device, according to some embodiments.

Other configurations of the laser light emitters are possible. For example, in FIG. 109A a depth perceiving device 10900 includes laser light emitters 10903 positioned at different heights on the baseplate 10901, image sensors 10902 and image processor 10904. The laser beams will still converge, but the light points will move in a vertical plane in addition to a horizontal plane of captured images as the distance to the projection surface changes. This additional data will serve to make the system more accurate. FIG. 109B illustrates a side view of the depth perceiving device 10900 wherein the laser beam emissions 10905 can be seen converging in a vertical plane. In another example, in FIG. 110A a depth perceiving device 11000 includes laser light emitters 11003 positioned on baseplate 11001 at a downward angle with respect to a horizontal plane, image sensors 11002, and image processor 11004. The laser beams will still converge, but, in a similar manner as previously described, the light points will move in a vertical plane in addition to a horizontal plane of the image as the distance to the projection surface changes. FIG. 110B illustrates a side view of the depth perceiving device 11000, wherein the laser beam emissions 11005 can be seen angled downward. FIG. 111 illustrates various different configurations of a depth perceiving device in terms of positioning of components and types of components included, such as laser emitter 11100, camera 11101, TOF sensor 11102, and a gyroscope 11103.

Combinations including laser emitter 11100 and camera(s) 11101 may be used to estimate depth using methods such as those described above. Combinations including two cameras 11101 and a laser emitter 11100 may improve accuracy as two cameras capture images of the environment. Camera 11101 and TOF sensor 11102 or the camera 11101 and gyroscope 11103 combinations may each be used to estimate depth, the two methods increasing the accuracy and/or confidence of measured depth when used in combination as two different data sources are used in measuring depth.

In some embodiments, ambient light may be differentiated from illumination of a laser in captured images by using an illuminator which blinks at a set speed such that a known sequence of images with and without the illumination is produced. For example, if the illuminator is set to blink at half the speed of the frame rate of a camera to which it is synched, the images captured by the camera produce a sequence of images wherein only every other image contains the illumination. This technique allows the illumination to be identified as the ambient light would be present in each captured image or would not be contained in the images in a similar sequence as to that of the illumination. In embodiments, more complex sequences may be used. For example, a sequence wherein two images contain the illumination, followed by three images without the illumination and then one image with the illumination may be used. A sequence with greater complexity reduces the likelihood of confusing ambient light with the illumination. This method of eliminating ambient light may be used independently, or in combination with other methods for eliminating sunlight noise. For example, in some embodiments, the depth perceiving device further includes a band-pass filter to limit the allowable light.

Traditional spherical camera lenses are often affected by spherical aberration, an optical effect that causes light rays to focus at different points when forming an image, thereby degrading image quality. In cases where, for example, the distance is estimated based on the position of a projected laser point or line, image resolution is important. To compensate for this, in some embodiments, a camera lens with uneven curvature may be used to focus the light rays at a single point. Further, with traditional spherical camera lens, the frame will have variant resolution across it, the resolution being different for near and far objects. To compensate for this uneven resolution, in some embodiments, a lens with aspherical curvature may be positioned in front of the camera to achieve uniform focus and even resolution for near and far objects captured in the frame. In some embodiments both cameras (or otherwise imaging sensors of the depth perceiving device) are placed behind a single camera lens.

In some embodiments, two-dimensional imaging sensors may be used. In other embodiments, one-dimensional imaging sensors may be used. In some embodiments, one-dimensional imaging sensors may be combined to achieve readings in more dimensions. For example, to achieve similar results as two-dimensional imaging sensors, two one-dimensional imaging sensors may be positioned perpendicularly to one another. In some instances, one-dimensional and two-dimensional imaging sensors may be used together.

In some embodiments, two CMOS cameras combined into one special chip may be used. Alternatively, in some embodiments, a silicon based chip implementing a light (i.e., LED) transmitter and/or a camera or imager and/or a receiver may be used. In some embodiments, a camera implemented on a board or on a silicon chip or in combination with a silicon chip to provide RGB and depth information may be used. These embodiments may be implemented in a single independent frame such as a sensor module or system on a chip, or may be implemented into the body of a robot, using the chassis or body of the robot as a frame. The embodiments described herein may be implemented in a single chip or combined modules inside one chip. The embodiments described herein may be implemented in software and/or hardware. For example, methods and techniques for extracting 2D or 3D described may be implemented in various ways.

Figure 112A:
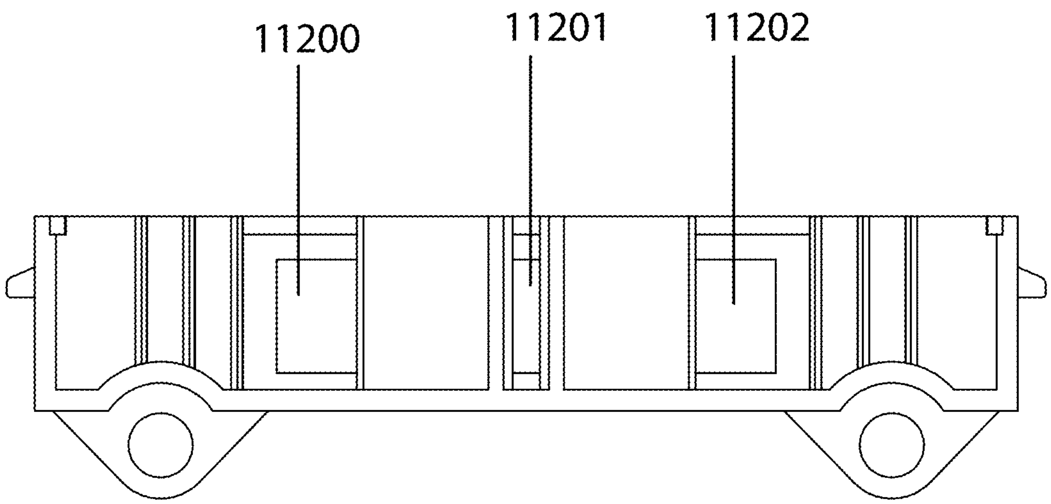
FIGS. 112A-112E illustrate an example of a mechanical filter for a light source, according to some embodiments.
Figure 112B:
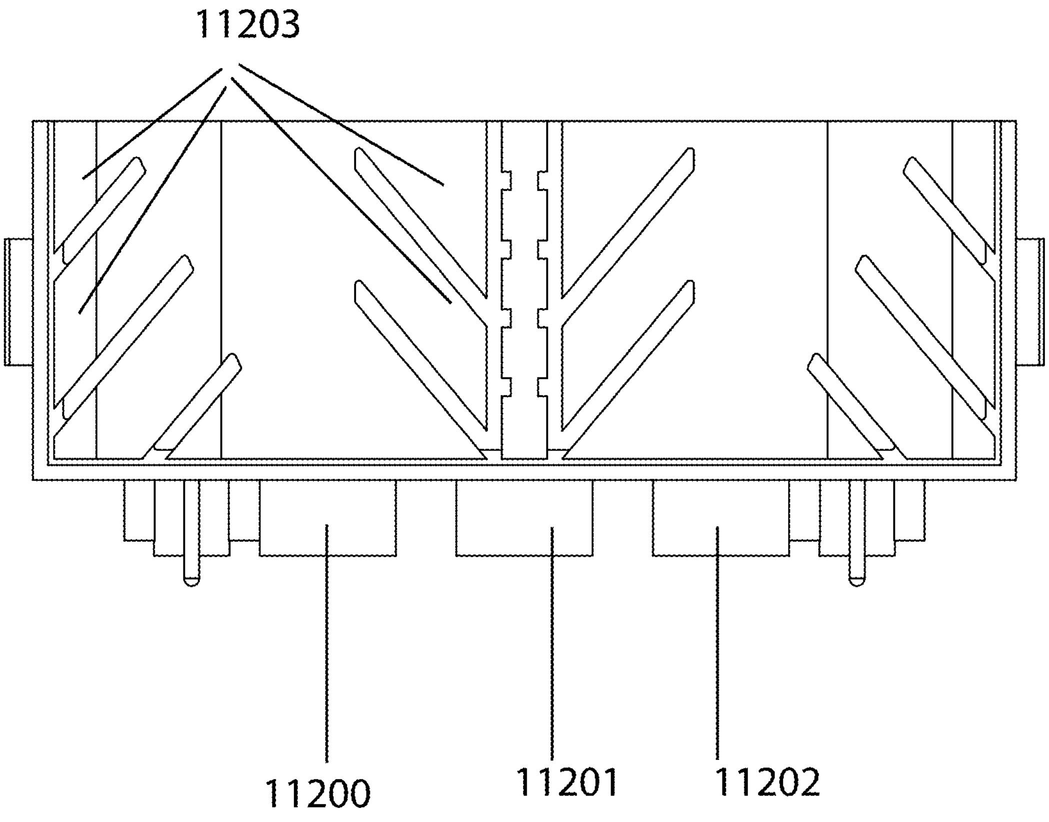
Figure 112C:
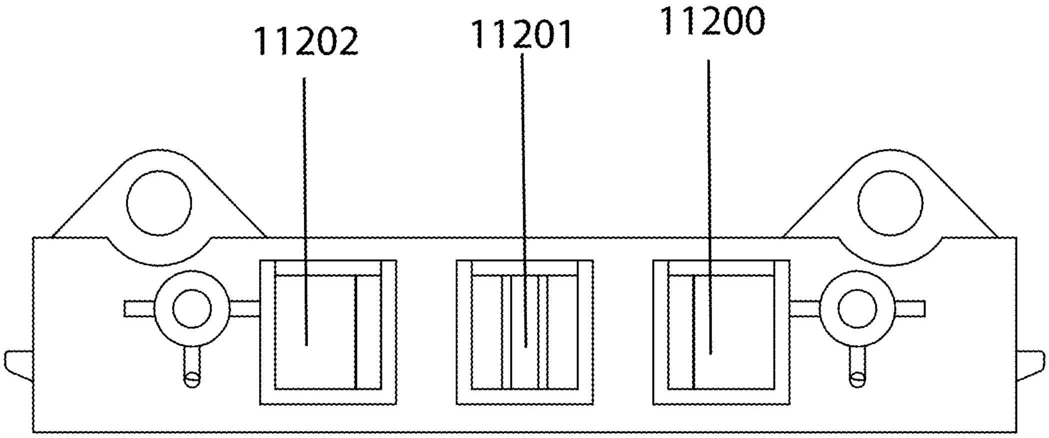
Figure 112D:
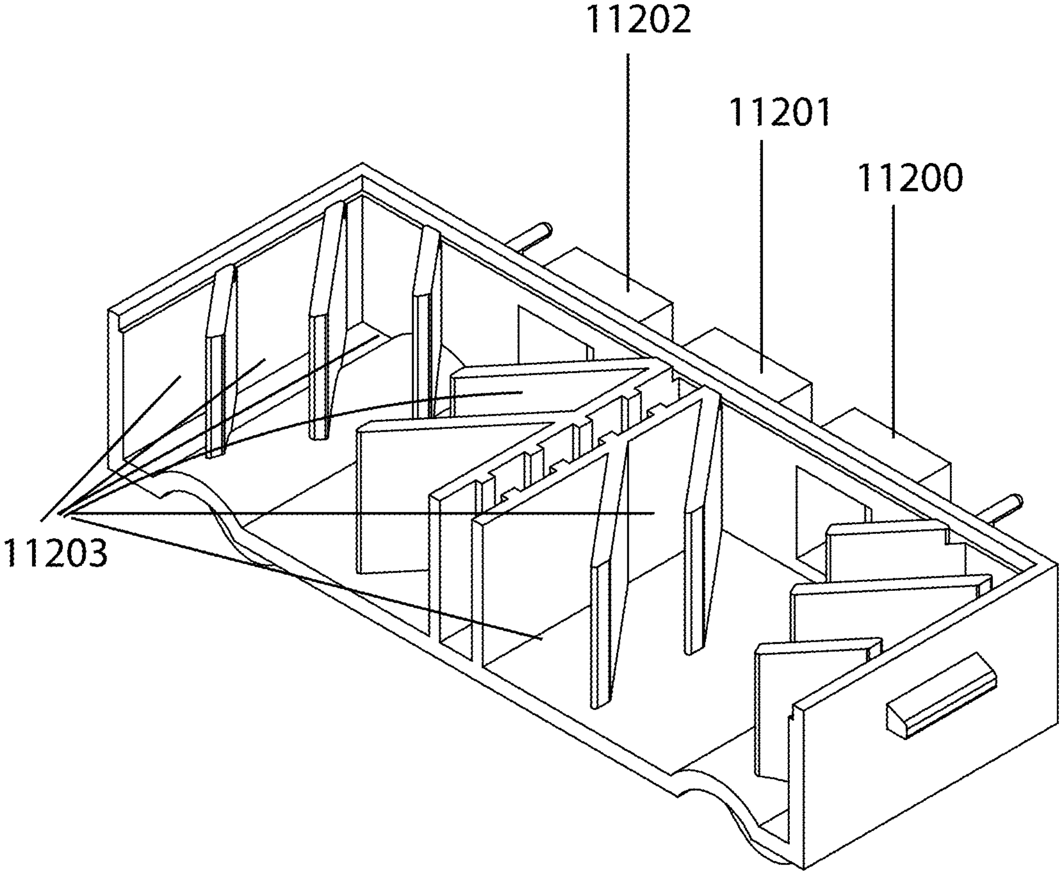
Figure 112E:
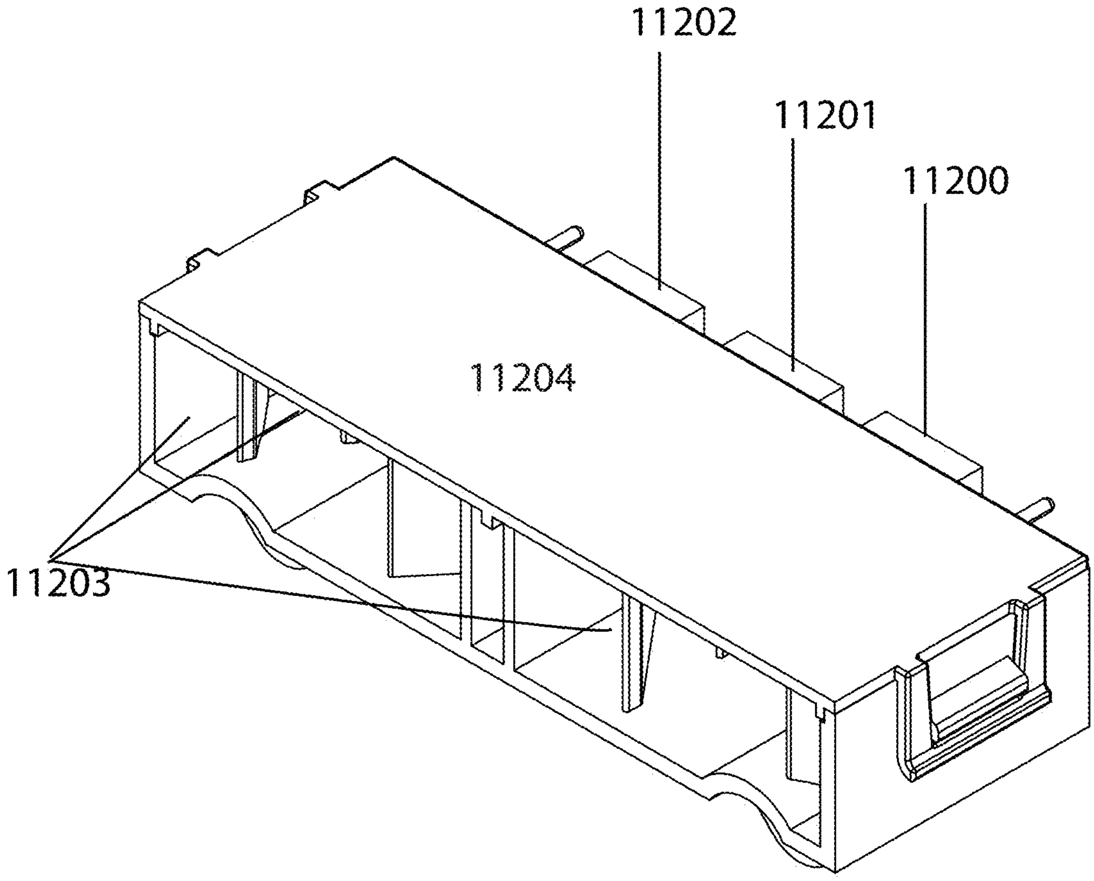
Figure 113A:
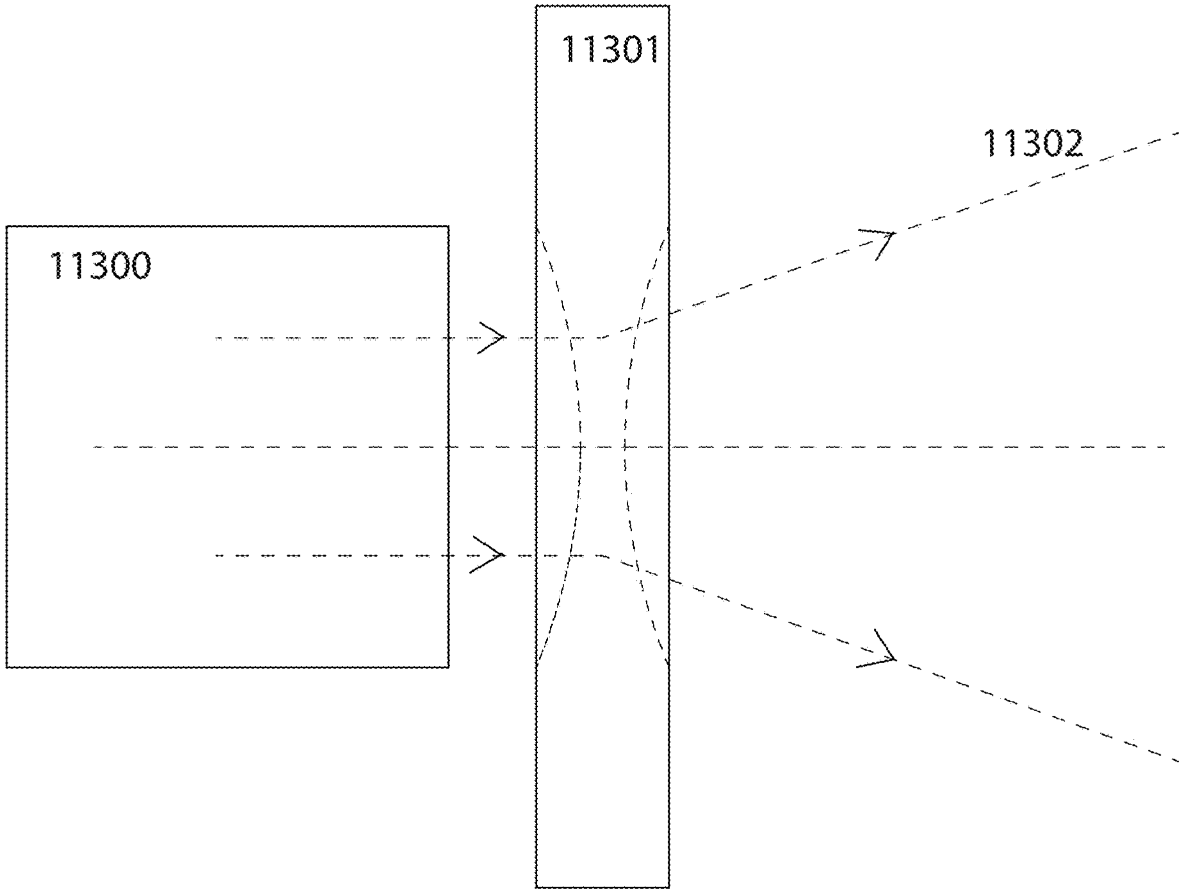
FIGS. 113A-113E illustrate examples of a lens used to converge and diverge light emitted by a light emitter, according to some embodiments.
Figure 113B:
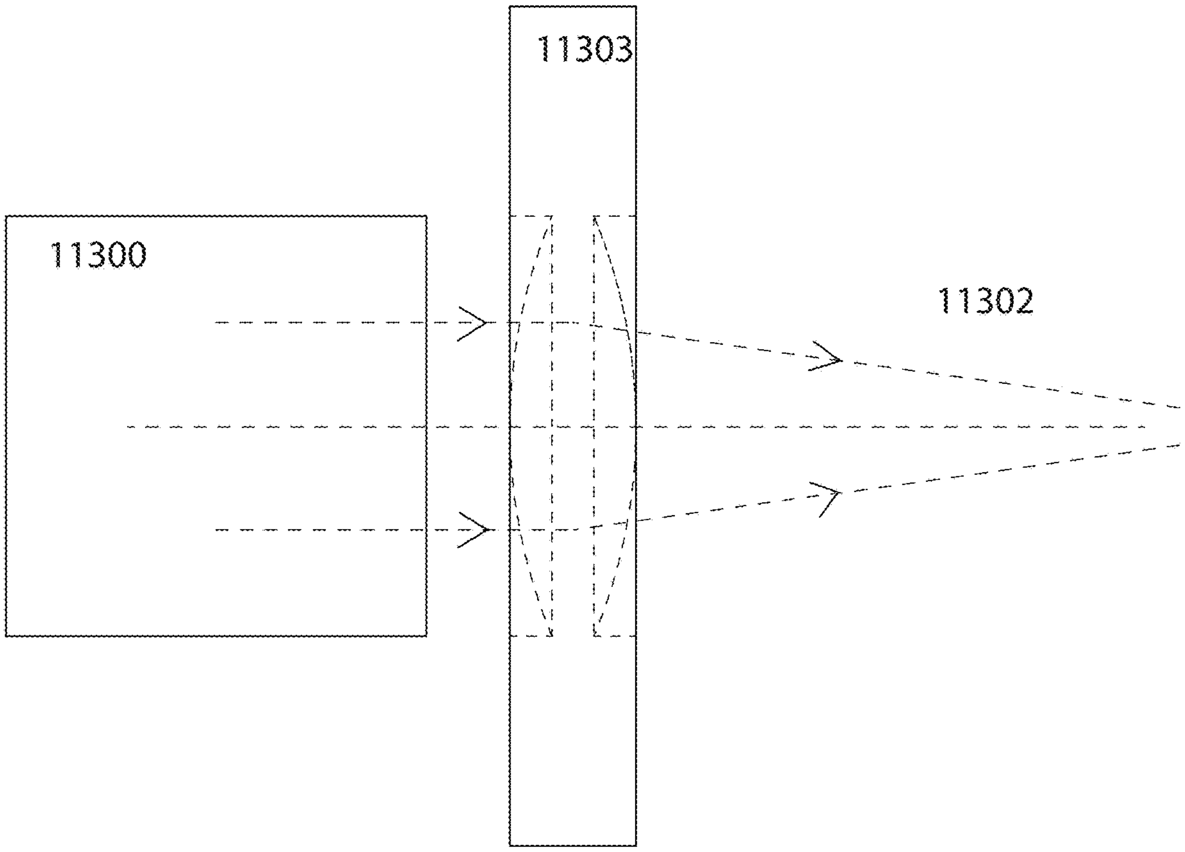
Figure 113C:
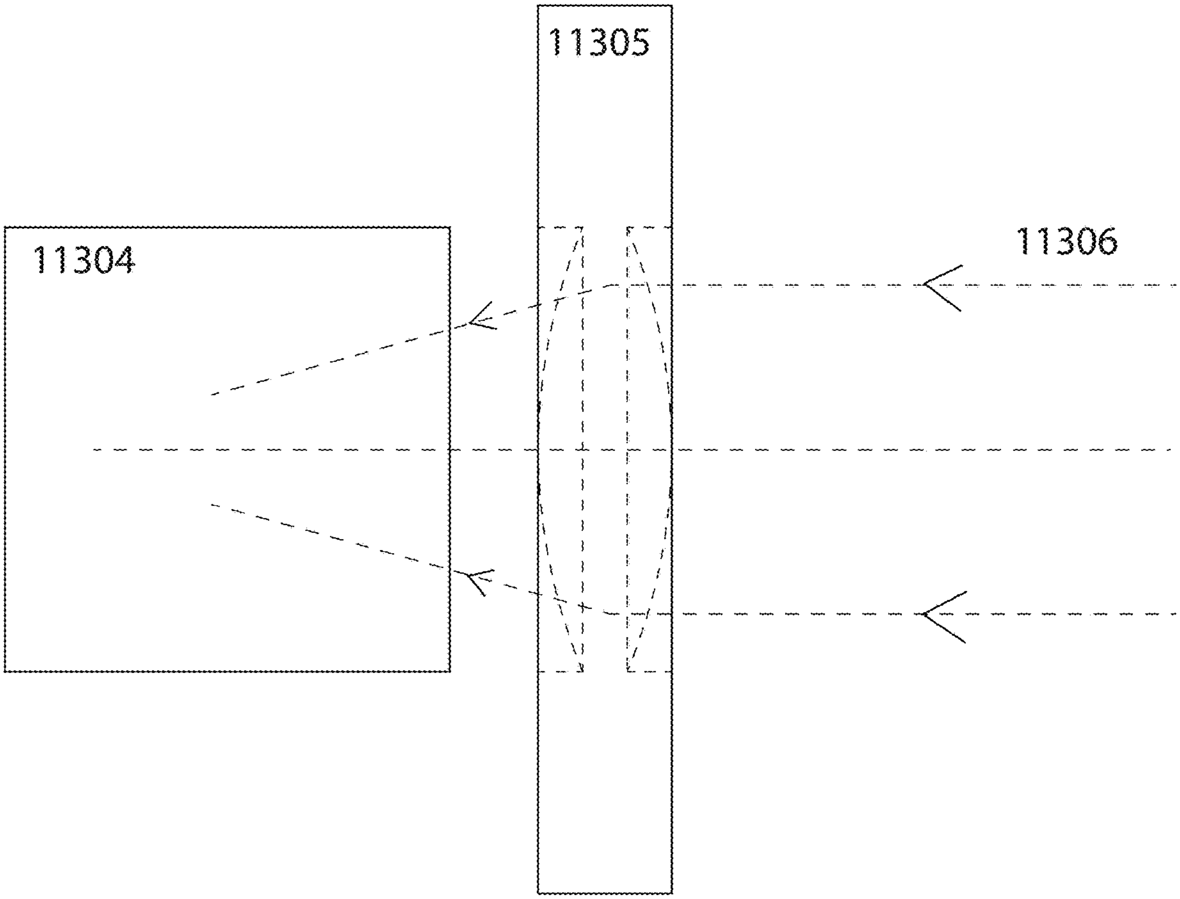
Figure 113D:
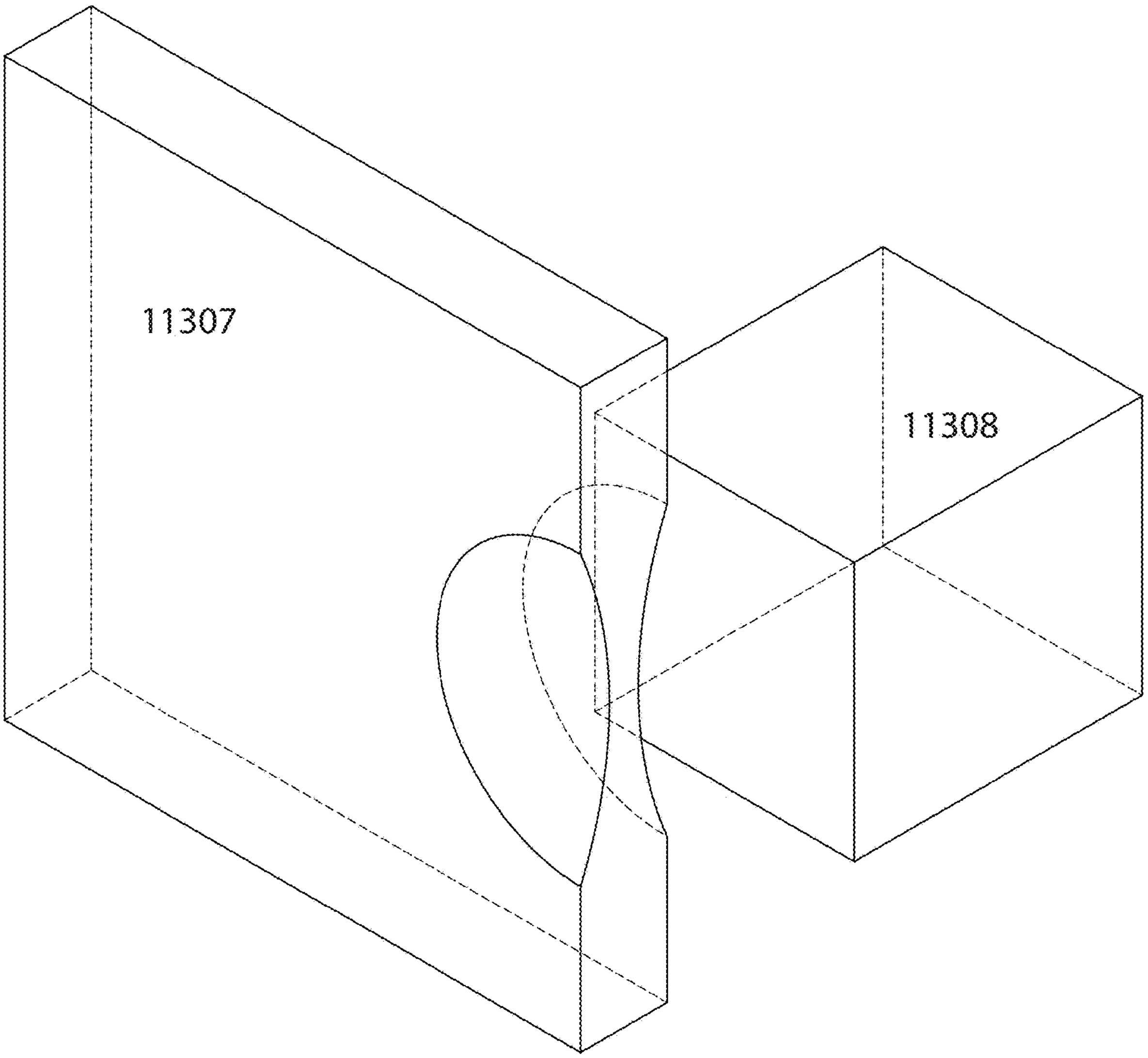
Figure 113E:
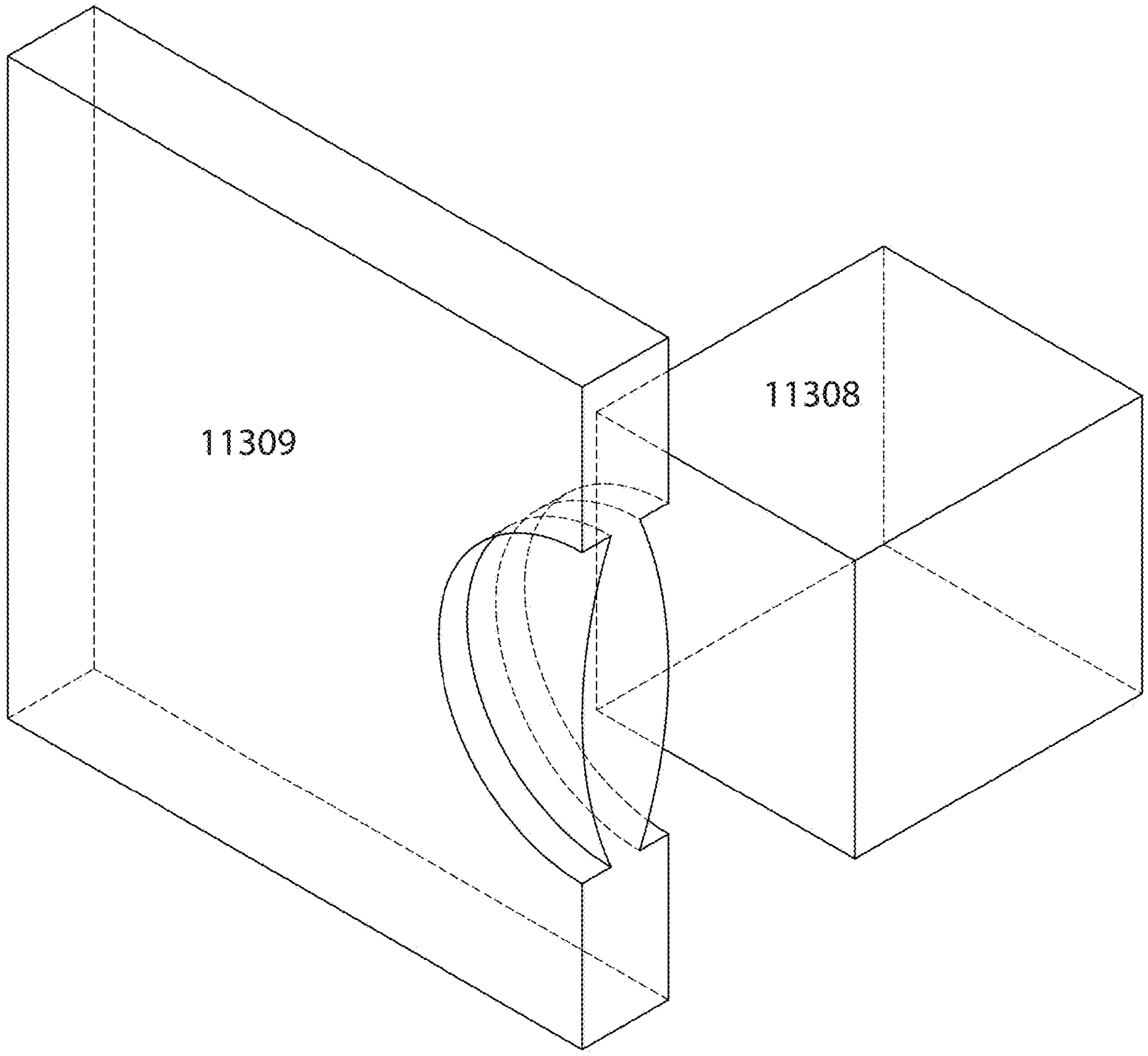

In some embodiments, a single laser diode with an optical lens arrangement may be used to generate two or more points. The arrangement of the lens may create a plurality of disconnected points instead of a line. The arrangement may control the distance and divergence or convergence of the points. In some embodiments, there may be a physical barrier with perforation arranged in front the lens or emitted laser line to create points. In some embodiments, mirrors may be used to generate two or more points. For example, a single LED with some optical arrangement may generate three light points, each a vertex of a triangle. In some embodiments, multiple laser diodes are used to create light points. In some embodiments, the single light source may be used to generate an arrangement of points using a mechanical filter such as that shown in FIGS. 112A-112F. FIGS. 112A and 112C illustrate a front and rear view, respectively, of the mechanical filter with openings 11200, 11201, and 11202 through which light may pass. FIGS. 112B and 112D illustrate a top plan and top perspective view of the mechanical filter with openings 11200, 11201, and 11202, and reflection absorbers 11203. FIG. 112E illustrates the constructed mechanical filter with top cover 11204. A single light source may be positioned behind the mechanical filter. A portion of the light beams from the light source may be absorbed by reflection absorbers while a portion of the light beams pass through openings 11200, 11201, and 11202. The mechanical filter thereby generates three light points from single light source. The mechanical filter is designed such that light receiving angle is 52 degrees and light reflector walls are 40 degrees with respect to a vertical. In some embodiments, lenses are used to diverge or converge light emitted by a light emitter. In some embodiments, these lenses are used as sensor windows as described above. For example, FIG. 113A illustrates a light emitter 11300 with diverging lens 11301, causing light 11302 to diverge. FIG. 113B illustrates a light emitter 11300 with converging lens 11303, causing light 11302 to converge. FIG. 113C illustrates a light receiver 11304 with converging lens 11305, causing light 11306 to converge. FIG. 113D illustrates a concave lens 11307 positioned on a sensor window of sensor 11308. FIG. 113E illustrates a convex lens 11309 positioned on a sensor window of sensor 11308.

Figure 114A:
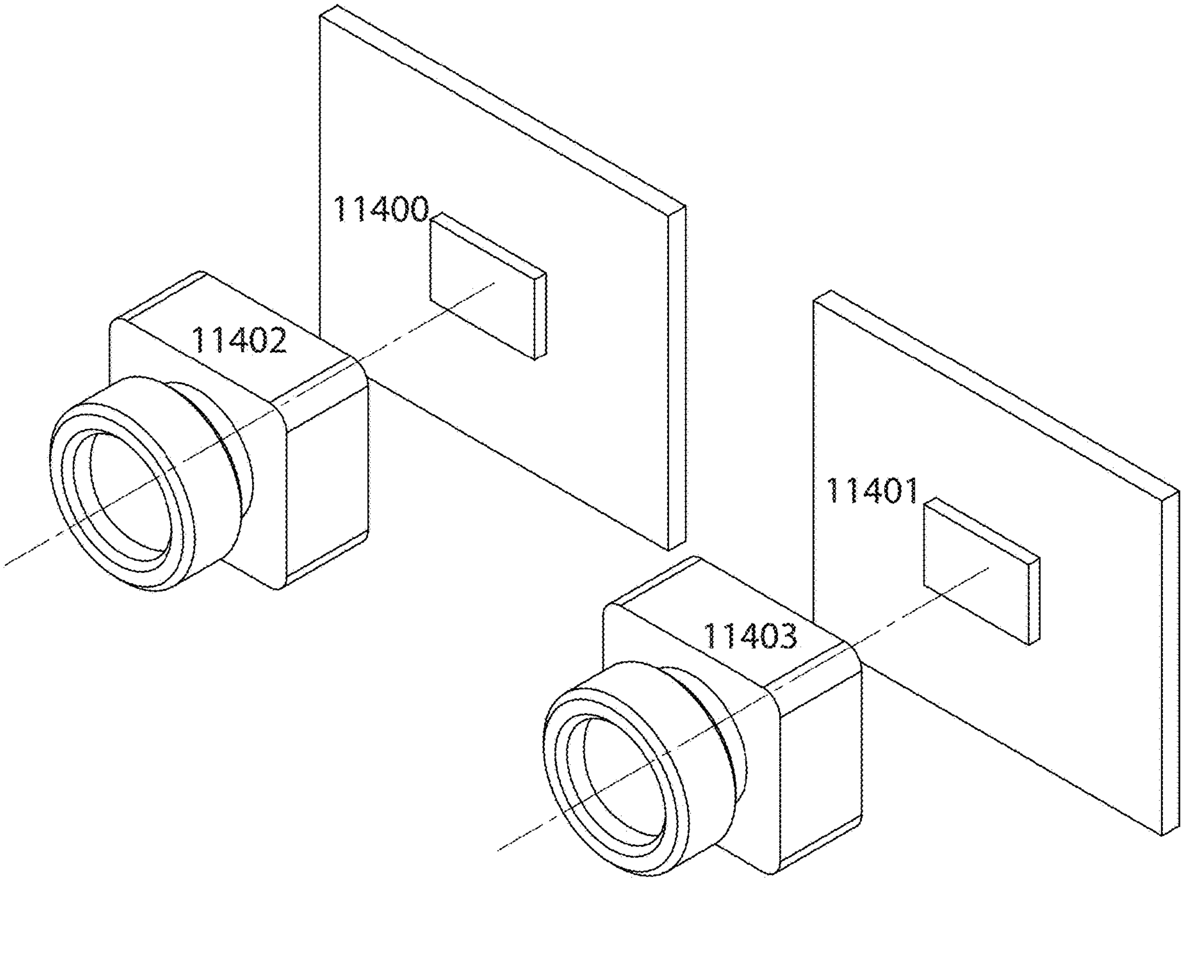
FIGS. 114A-114C illustrate examples of arrangements of image sensors and lenses, according to some embodiments.
Figure 114B:
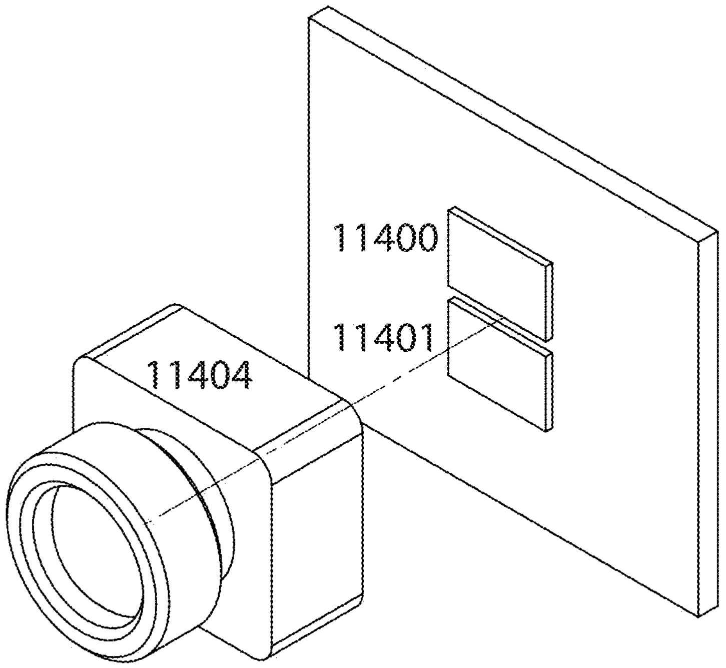
Figure 114C:
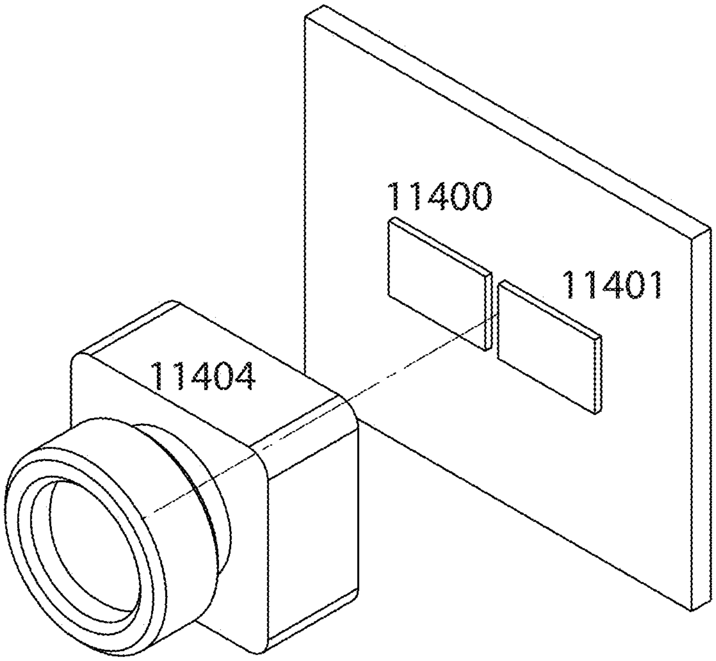

In some embodiments, a second image sensor is provided on the baseplate. In some embodiments, the second image sensor may be positioned behind the same lens or may have its own lens. For example, FIG. 114A illustrates two cameras 11400 and 11401 each behind their own respective lens 11402 and 11403, respectively. FIGS. 114B and 114C illustrate the two cameras 11400 and 11401 behind a single lens 11404. The process of iteratively capturing images of the two or more laser light points and analyzing the distance between light points (or the surface area within light points) is repeated with images captured by the second image sensor. The two image sensors (or more image sensors in other cases) are configured to capture images simultaneously such that the distance between the baseplate and projection surface is the same in the images captured by both image sensors. In some embodiments, the image sensor determines the mean of the distances between light points (or the mean surface area within light points) in the images of each image sensor and compares the value to figures in a preconfigured table that relates distances between light points with distances between the baseplate and projection surfaces to find an estimated distance between the baseplate and the projection surface at the time of the capture of the images. A second image sensor, therefore, serves to improve the accuracy of the estimation.

Figure 115A:
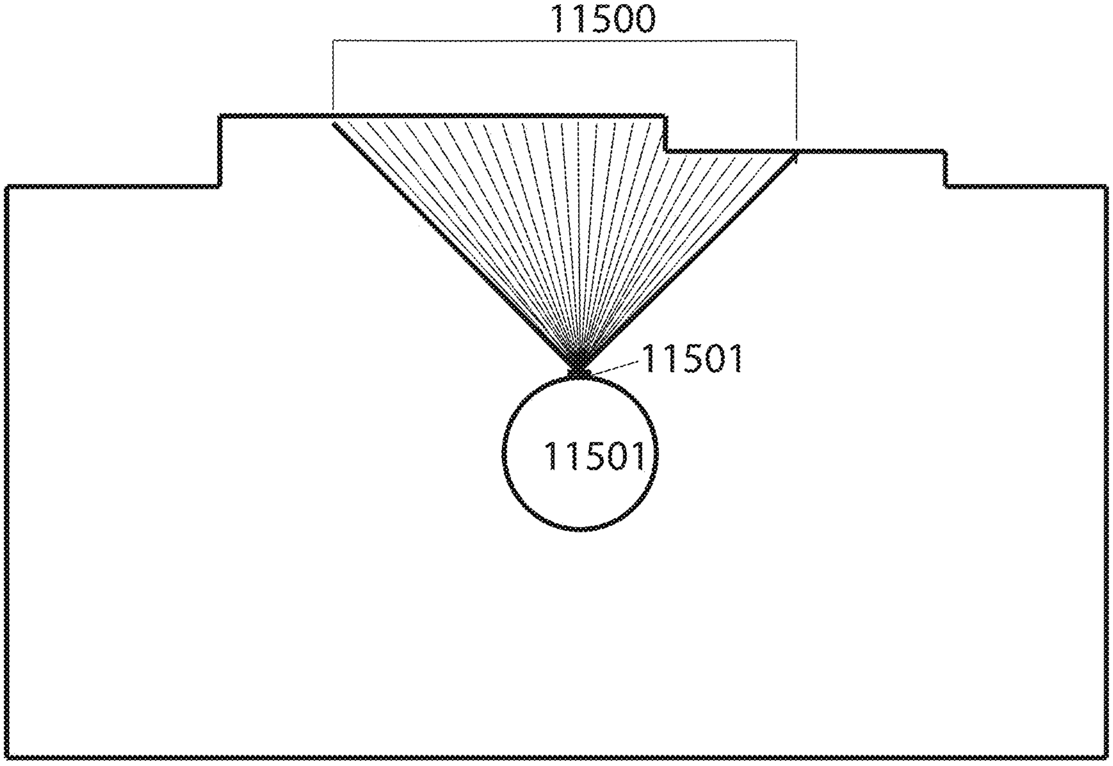
FIGS. 115A and 115B illustrate an expanded field of view using two image sensors, according to some embodiments.
Figure 115B:
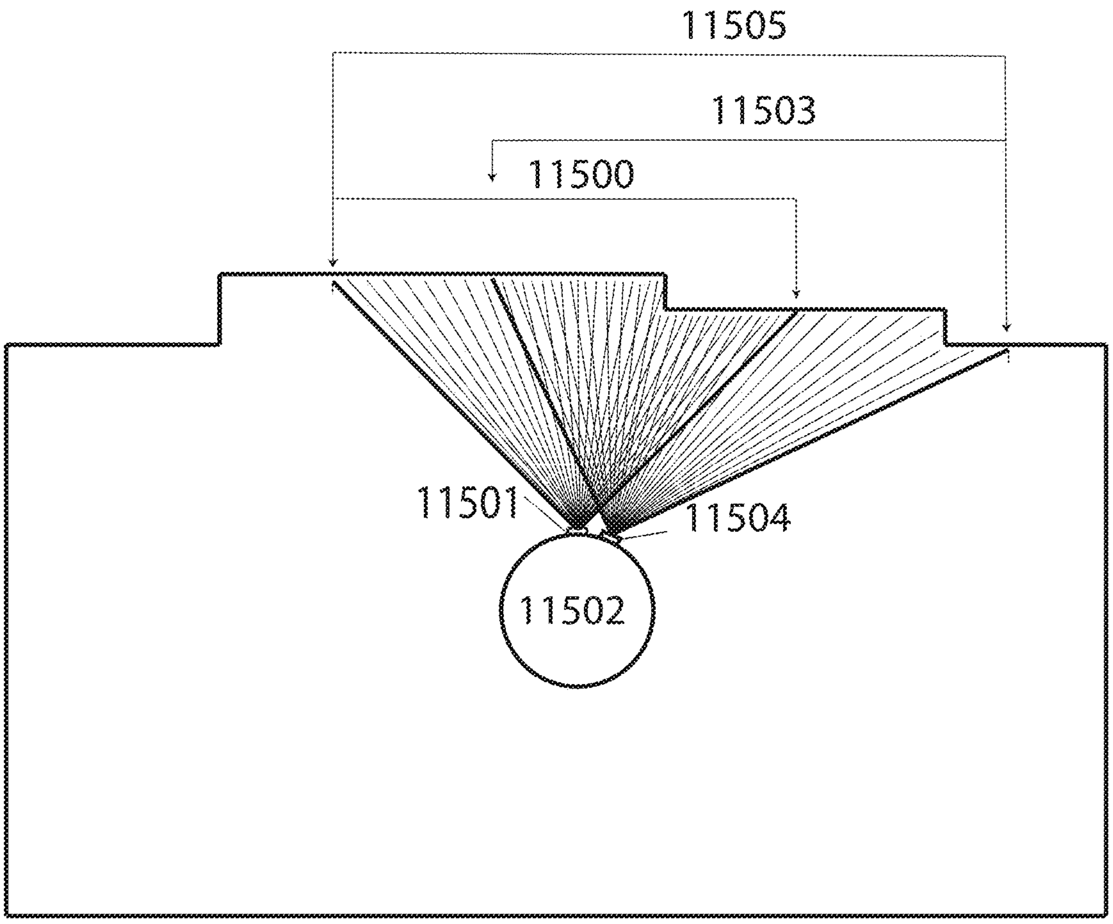

Depending on the arrangement and when done advantageously, in addition to providing accuracy, the second camera can increase the field of view of the distance readings. For example, the first camera may be a blind to a range of short distances when the projected light does not fall within the field of view (FOV) of the first camera, however, the projected light may be seen with the field of view of the second camera because of difference in the position between the two cameras. Also, when implemented advantageously, the FOV of the cameras may combined to provide double the FOV or provide less than double FOV with some overlap which serves for high accuracy. The arrangement of cameras (e.g., CMOS), image sensors, laser diodes, LEDs used in a distance measurement device do not have to be in any particular arrangement so long as the arrangement of each component and geometry of the arrangement of the components are known in the software estimating the distance. Based on knowing the physical arrangement of components, the software may estimate depth of objects as described above. In some embodiments, the movement of the camera may be used to increase the FOV. For example, FIG. 115A illustrates a FOV 11500 of a single image sensor 11501 of a robot 11502. FIG. 115B illustrates the FOV 11500 of image sensor 11501 and FOV 7703 of image sensor 11504, producing increased FOV 11505. An increased FOV may similarly be achieved by movement of the camera. In some embodiments, the camera or a separate software increases the FOV.

Another technique for associating an external measurement with an image includes taking a measurement for a single point with a single point range finder such as FlightSense from STMicro and using the measurement of the single point to extrapolate the measurement to the whole FOV of the image. In some embodiments, a sensor such as VL6180 or VL 53 from ST Micro is used to capture one measurement to a point in the FOV of the camera and the measurement is extrapolated based on the image processing techniques described to infer depth measurements to all obstacles in the FOV. For example, in some embodiments, two laser rangefinders, a camera, and an image processing unit are disposed on a main housing. In some embodiments, the camera and two laser rangefinders are positioned such that the laser rangefinders analyze predetermined lines of sight within the camera's image frame. In some embodiments, the laser rangefinders measure the distance to the first encountered obstacle in their respective lines of sight. Each line of sight intersects with an obstacle at an arbitrary point, which shall be referred to herein as the first and second points. In some embodiments, the camera captures an image of the area. In a next step, the image processing unit calculates the color depths at the first and second points. In a next step, the image processing unit calculates the color depth of the pixels that form a straight line between the first and second points (referred to herein as the Connecting Line) and compares the color depth of these pixels with the color depths of the first and second points. In some embodiments, if the color depth of all the pixels in the Connecting Line is consistent with (or within a preset range of) the color depths of the first and second points, the system determines that the distances of all the pixels in that region are within a threshold from the distances measured by the laser rangefinder at the first and second points. In some embodiments, when the color depth of the Connecting Line is within a preset range of the color depths of the first and second points, the system determines that the surface or obstacle being analyzed is a substantially flat surface. Further description of this method is provided in U.S. patent application Ser. Nos. 15/447,122 and 16/393,921, the entire contents of which are hereby incorporated by reference. Other depth perceiving devices that may be used to collect data from which depth may be inferred are described in U.S. patent application Ser. Nos. 15/243,783, 15/954,335, 15/954,410, 15/257,798, 15/674,310, 15/224,442, and 15/683,255, the entire contents of which are hereby incorporated by reference.

Figure 116:
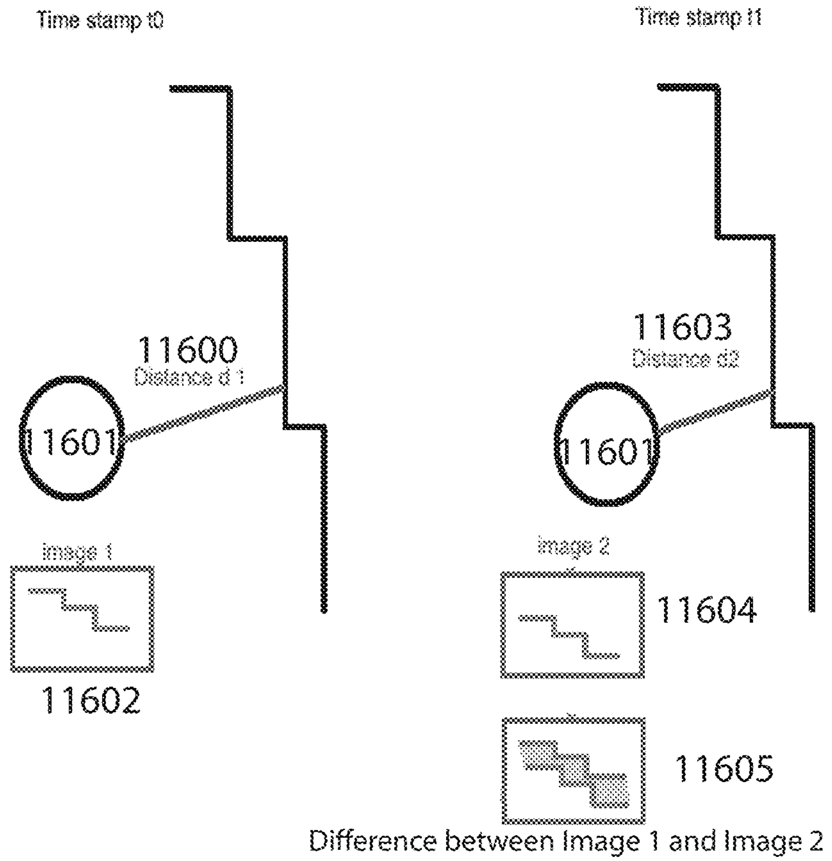
FIG. 116 illustrates a difference between two images captured from two different positions of a sensor, according to some embodiments.
Figure 117:
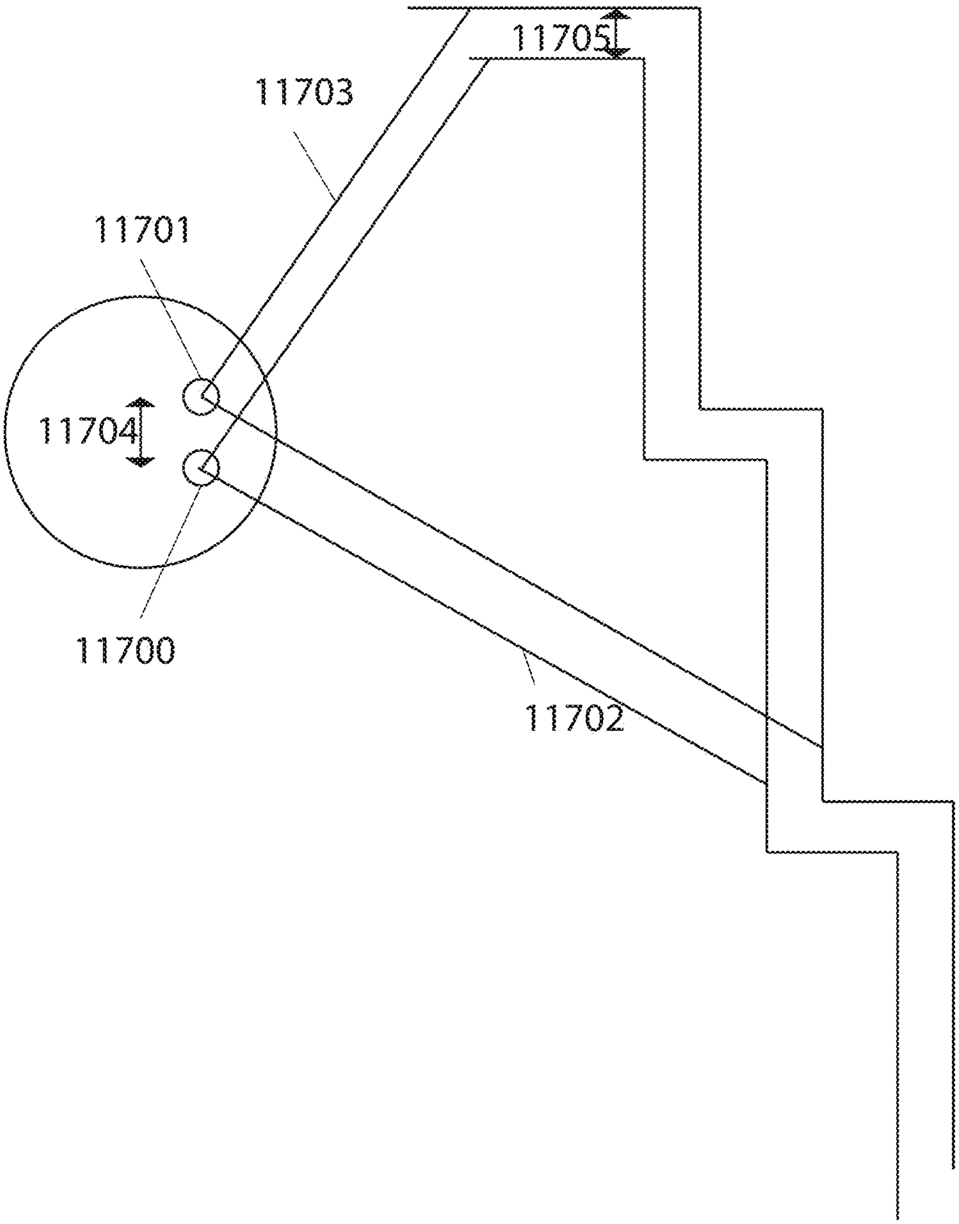
FIG. 117 illustrates a difference between two images captured from two different sensors positioned a distance apart, according to some embodiments.

In some embodiments accuracy of depth measurement is increased when the VMP robot moves from a first location to a second location causing a second reading of a time-of-flight (TOF) camera or distance measurement device to provide a second reading which is different from the first reading at the first location. Due to the movement of the VMP robot the distances to obstacles and perimeters of the environment changes, and hence the two readings differ. Concurrently, a second image is captured with slight difference with the first image. In some embodiments, the processor compares the difference in the two images, with the differentiations between the TOF readings of both images providing the changed position of the VMP robot within the environment. For example, FIG. 116 illustrates a measured distance 11600 by a sensor of robot 11601 and resulting image 11602 in a first position and a second measured distance 11603 measured by the same sensor of robot 11601 and resulting image 11604 after moving to a second position. Image 11602 from the first position and image 11604 from the second position can be used to determine a difference between the two positions 11605. FIG. 116 may also be represented in a space-time coordinate system, wherein there is no difference in the time the images were captured, the two images taken simultaneously with the cameras being a distance apart from one another. This is shown in FIG. 117, wherein camera 11700 in a first position and camera 11701 in a second position on a robot each capture an image in respective fields of view 11702 and 11703. Because of distance 11704 between cameras 11700 and 11701, the same difference 11705 between the two images as that shown in 11605 of FIG. 116 is found. In some embodiments, this may be similar to a stereo vision apparatus. Using exteroceptive sensors, such as VL6180 or VL 53 from ST Micro, are not the only option for accomplishing the distance measuring methods described. A person of the art may identify equivalent sensors, whether they be light based, sonar based, radio based, or optical based, for example, that can provide similar effect. Any sensor, exteroceptive or proprioceptive, capable of providing the difference in position when the first image and the second image are taken, as illustrated above, may be used to accomplish the same technique.

In some embodiments, various filters may be used to smooth pixel readings. For example, a median of a combination of pixels within a threshold distance in pixel space can be used instead of using each pixel individually. Other software filters can be used to extract the line or dots or any other structured light from the image and separate it from surrounding noise and light. For example, to identify a line laser within an image, the filter may search for columns where only a single bright area is observed and for bright areas that do not exceed more than a certain number of pixels in width. A depth or breadth search can be implemented to determine which of the consecutively connected bright points in a column are likely to be the line laser and which ones are likely to be noise. In addition to search algorithms, the relationship between light points in different columns can be used to produce more accurate and noise free readings. A low or high pass filter or a combination of physical filters may be used to allow a particular wavelength inside the camera imager to reduce noise. For example, if a 920 nm laser is being used, other spectrums may be filtered out. In some embodiments, ambient light is used instead of active illumination. Alternative forms of active illumination identify a structure or pattern in a captured image and analyze the change of dimensions, shape or position and the relationship between the pattern or structure and the recorded odometry. Given the resolution of the camera and odometry or inertial information providing displacement in the real world, the change in size, shape, or position of the identified pattern or structure in the image as the robot moves can be inferred and ultimately used to infer distance to the surroundings. In other embodiments, a time of flight sensor, commonly having a narrow angular measurement range, may be used to identify the distance to objects at one or two angles. This information may be combined into the image captured, along with the features in the image, and extrapolated into a larger field of view (i.e. angular field of view of an image).

In some embodiments, depth is measured as a single measurement point without overlap. For example, the VMP robot may include a sensor, such as a TOF flightsense sensor, capable of measuring the distance to a single point. In some embodiments, the VMP robot rotates 360 degrees while the sensor measures single point distance measurements. In some embodiments, an gyroscope or other movement measurement device may be used to measure the turning angle such that a distance measurement may be associated with each degree (or any other increment of degrees, such as 0.025, 0.5, 2, or 5 degrees) of rotation. In some embodiment, a higher resolution gyroscope may be used with a high sampling rate sensor (e.g., 50 readings per second). In some embodiments, as the VMP robot rotates to complete a full turn, the robot may deviate, slipping and drifting. In such instances, the VMP robot is not actually located at the estimated location of the VMP robot, resulting in erroneous distance measurements. In some embodiments, the VMP robot may include an upward facing camera and at each measurement step may capture an image that the processor may use to adjust for the slippage by comparing the image captured to the image expected after a predetermined number of degrees of rotation. In some embodiments, the difference between the actual and the expected image may be used by the processor to correct for slippage. In some embodiments, the processor determines the amount of rotation and translation required to align the captured image with the expected image and uses the measured adjustment to adjust the VMP robot. In some embodiments, more than one TOF sensor may be used to improve depth measurements. In other cases, other configurations may be used to correct for deviation of the VMP robot. For example, the processor may extract any feature in an image and observe its displacement or the displacement of a projected laser line or arrangement of laser points. In embodiments, the orientation of the camera may vary (e.g., forward facing and angled upwards, forward facing, back facing and angled downwards, etc.).

In some embodiments, the processor compares identified features in two images captured by the same camera consecutively to estimate depth, given that motion of the camera between images is measured by, for example, a gyroscope of the VMP robot. In some embodiments, the processor compares the size of identified features, such as edges or lines between the two images. In some embodiments, the processor determines the size using pixel intensity. For example, the width or length of the number of consecutive pixels defining an edge as described above. In one instance, the processor may observe an edge in a first image but may not know if the edge is a small edge close by or a large edge further away. The speed at which the edge increases or decreases in size may be proportional to the speed of movement of the VMP robot and how far the feature is from the VMP robot. If the edge is small and close by, the edge will appear much larger in size in the consecutive image, however if the edge is large and far, the edge will not appear much larger in the consecutive image, assuming the VMP robot is moving toward the edge. The edge (or other feature) increases in size as the VMP robot moves closer and decreases in size as the VMP robot moves further away. In some embodiments, a distance sensor or camera of the VMP robot may be used to measure the distance to a feature that increases or decreases in size depending on the distance of the feature from the VMP robot. In some embodiments, the processor may estimate the distance of the feature based on the size of the feature in a captured image. Since an image shown on a CMOS or CCD camera is a lossy extraction of three-dimensions, the features detected in the camera screen form an association with each other that is proportional to the distance of those features from the VMP robot. Therefore, when one point of the image is known to be at a certain distance based on distance measurement using a one point distance sensor, other distance information of features may be extrapolated. In some embodiments, the processor compares identified features in two images captured simultaneously by two cameras positioned a known distance apart to estimate depth.

Figure 118A:
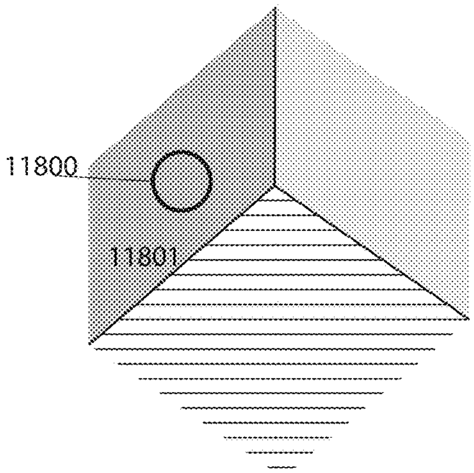
FIGS. 118A-118F illustrate an example of a corner detection method, according to some embodiments.
Figure 118B:
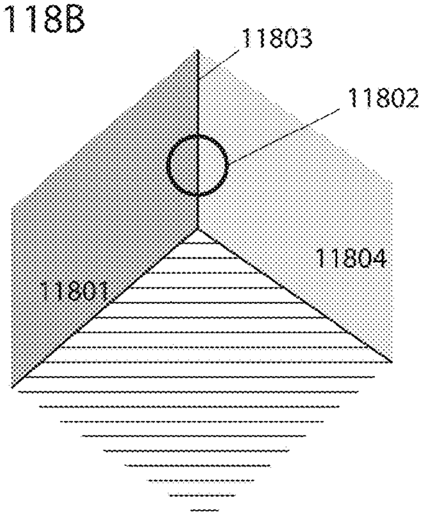
Figure 118C:
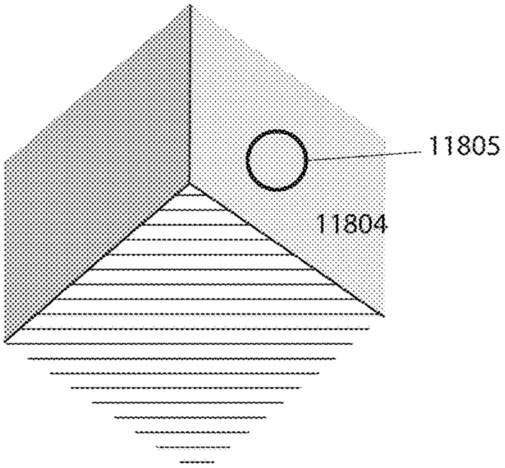
Figure 118D:
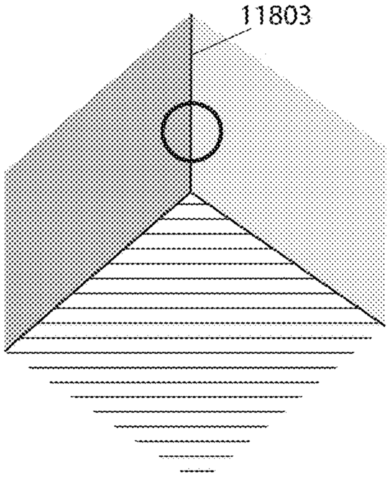
Figure 118E:
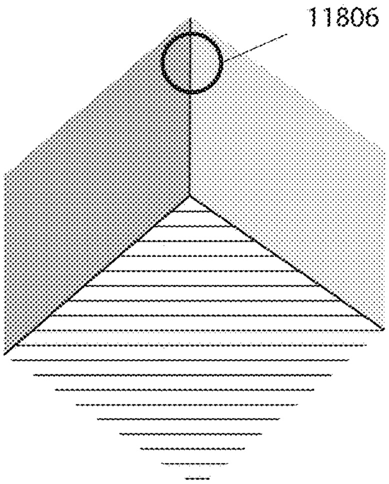
Figure 118F:
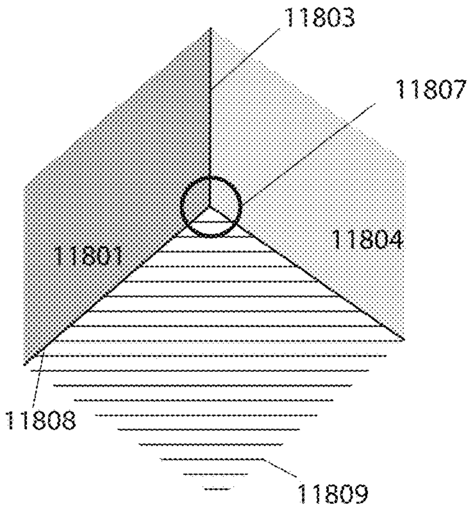

In some embodiments, the processor may detect an edge and a corner using pixel intensity as changes in intensity are usually observable at edges and corners. FIGS. 118A-118F illustrate an example of how a corner may be detected by a processor by a sliding window that moves across an image. The process begins with the processor considering area 11800 on wall 11801 and observing the changes in color intensity as shown in FIG. 118A. After observing insignificant changes in color intensity, the processor moves on and considers area 11802 with edge 11803 joining walls 11801 and 11804 and observes large changes in color intensity along edge 11803 as illustrated in FIG. 118B. In FIG. 118C the processor moves to the right to consider another area 11805 on wall 11804 and observes no changes in color intensity. In FIG. 118D it returns back to edge 11803 then moves upward to consider area 11806 as shown in FIG. 118E and observes changes in color intensity along edge 11803. Finally, in FIG. 118F the processor moves down to consider area 11807 with edges 11803 and 11808 joining walls 11801 and 11804 and floor 11809. Changes in color intensity are observed along edge 11803 and along edge 11807. Upon discovering changes in color intensity in two directions by the processor, a corner is identified. Upon discovering changes in color intensity in one direction by the processor, an edge is identified. In other instances, changes in pixel intensities may be identified by a processor of a camera. These large changes in intensity may be mathematically represented by entropy where high entropy signifies large changes in pixel intensity within a particular area. The processor may determine the entropy using $$H(X) = -\sum_{i=1}^{n} P(x_i)\log P(x_i),$$

wherein $X=(x_1, x_2, \ldots, x_n)$ is a collection of possible pixel intensities, each pixel intensity represented by a digital number. $P(x_i)$ is the probability of a pixel having pixel intensity value $x_i$. $P(x_i)$ may be determined by counting the number of pixels within a specified area of interest with pixel intensity value $x_i$ and dividing that number by the total number of pixels within the area considered. If there are no changes or very small changes in pixel intensity in an area then H(X) will be very close to a value of zero. Alternatively, the pixel values of one reading (such as those with 90 numbers) may be mapped to a continuous function and the derivative of that function considered to find areas with large changes in pixel values. With the derivative being the slope, a derivative of zero would be indicative of no change in pixel value while a derivative approaching unity would be indicative of a large change in pixel values. Other methods for edge or corner detection may be used by the processor. In some embodiments, other features can be identified to further capture the identity of the environment or objects within the environment. In some instances, features are compared with a previously created map.

In some embodiments, one or more of the depth perceiving devices described above may be used for adjusting the heading of the VMP robot. In some embodiments, one or more collimated light emitters positioned on the VMP robot emit collimated light beams in a predetermined pattern. The light pattern may include two light points, or may be more complex as described above. For the purposes of this teaching, a pattern including two light points will be used as an example. However, any pattern may be used without limitation. In some embodiments, the one or more light emitters are positioned such that light is emitted in a predetermined plane onto surfaces in front of the one or more light emitters. In some embodiments, a camera positioned on the VMP robot captures images of the light pattern as it is projected upon surfaces substantially opposite the light emitters. In some embodiments, the captured images are sent to the processor electrically coupled to the camera and the processor analyzes the images to determine whether the image of the light pattern is distorted. Distortion of the image will occur if the plane upon which the image is projected is not parallel to the plane in which the light is emitted. If the image is distorted, the plane of light emission is not parallel to the surface upon which the light is being projected. If the image is not distorted, the plane of light emission is parallel to the surface upon which the light is being projected. Depending on the results of the image analysis, the device may take any of a variety of actions to maintain or correct its heading. For example, if it is desired to maintain a heading perpendicular to walls in a workspace, the one or more light emitters and camera may be positioned parallel to the heading of the VMP robot. This way, when the camera and light emitter are perpendicular to the plane of the wall, the heading of the VMP robot will also be perpendicular to the wall. In some embodiments, the camera continuously captures images of the light pattern projected by the one or more light emitters and the processor determines if the light pattern is distorted in the captured image. If the light pattern is distorted, the processor adjusts the heading of the VMP robot by an amount proportional to the distortion. If there is no distortion in the light pattern, the heading of the VMP robot does not require adjustment.

In some embodiments, the processor detects asymmetry (or otherwise distortion) in the captured image of a particular feature (e.g., a line, a curve, a polygon, one or more points, an edge, a corner, a wall, a floor, etc.) formed by projected light points and may adjust the heading of the VMP robot by an amount proportional to the degree of asymmetry of the feature in the image. For example, the VMP robot may drive along a boustrophedon movement path, wherein the movement paths of the VMP robot are parallel to one wall and perpendicular to another. A laser of a depth perceiving device may emit six light points positioned to form a hexagon onto a wall perpendicular to a direction of movement of the VMP robot. A camera of the depth perceiving device may continuously capture images of the light points projected onto the wall. A processor of the VMP robot processes the images to determine if the projected hexagon is symmetric or asymmetric. If the image of the projected hexagon is symmetric, the heading of the VMP robot is along a movement path perpendicular to the wall on which the light points were projected, and hence does not require any adjustment. If the image of the projected hexagon is asymmetric, the heading of the VMP robot is not along the movement path perpendicular to the wall on which the light points were projected, and hence requires an adjustment proportional to the asymmetry of the projected hexagon in the captured image. In some embodiments, the processor receives a multidimensional array that includes at least one parameter describing a feature captured in an image. In some embodiments, values of the at least one parameter of the multidimensional array correspond with pixels of the image of the feature. In some embodiments, the processor determines an amount of asymmetry of the feature in the image based on at least a portion of the values of the at least one parameter. In embodiments, parameters may be qualitative (e.g., a classification) or quantitative (e.g., indicated by a numerical value). For example, a parameter may be pixel brightness given by a numerical value indicative of pixel brightness. Or in another example, a parameter may be pixel position given by the x and y coordinates of the position of the pixel in the captured image. In one example, the parameter may be feature type given by a classification of one of: line, curve, edge, corner, wall, floor, etc.

In some embodiments, the processor determines distortion by dividing the image along a division line and comparing the two portions of the image. In some embodiments, the division line is horizontal or vertical. In some embodiments, the division line is along a centerline of the image. In some embodiments, the processor compares two portions of an image by counting the number of columns of unilluminated pixels found between the division line and the first illuminated pixel (the projected light) in both left and right directions. These distances may then be compared to determine whether the points are the same distance from the division line, wherein discrepancies in distance indicate distortion and thus the need for heading adjustment. In some embodiments, the processor determines the amount of heading adjustment required based on a difference between the counted number of pixels in the left and right directions and a known ratio between an amount of heading adjustment per pixel. In some embodiments, the processor adjusts the heading such that there is no difference between the counted number of pixels in the left and right directions. In some embodiments, the processor compares two portions of the image by determining a distance between the division line and the first illuminated pixel in both left and right directions. In some embodiments, the processor determines the amount of heading adjustment required based on a difference between the distance determined in the left and right directions and a known ratio between an amount of heading adjustment per unit of distance. In some embodiments, the processor adjusts the heading such that there is no difference between the distance in the lift and right directions.

In some embodiments, the processor extracts natural features of the environment (e.g., edges and corners) from captured images and determines asymmetry of one or more of those features to determine the heading adjustment. An example of a method for extracting edges and corners is described above. In this case, the processor only requires captured images of the environment to determine heading adjustment as one or more light emitters are not required to form the feature. For example, the VMP robot may drive along a boustrophedon movement path, wherein movement paths are parallel to one wall and perpendicular to another. A camera may capture images of the wall perpendicular to the movement path of the VMP robot and a processor may extract a line separating the wall from the floor. The processor processes the image to determine if the line is symmetric or asymmetric about a vertical division line. If the extracted line in the image is symmetric, the heading of the VMP robot is along a movement path perpendicular to the wall, and hence does not require any heading adjustment. If the extracted line in the image is asymmetric, the heading of the VMP robot is not along the movement path perpendicular to the wall, and hence requires an adjustment proportional the asymmetry of the feature in the captured image. In some embodiments, the processor simply examines pixels of images captured in sequence to determine heading adjustment. Given that images captured in sequence at least partially overlap, the processor may examine the overlap of pixels between two consecutive images to determine if the pixels have moved asymmetrically from a first image captured to a second image captured consecutively. For example, the VMP robot may drive along a boustrophedon movement path, wherein movement paths are parallel to one wall and perpendicular to another. A camera may capture images of a wall perpendicular to the movement path of the VMP robot and a processor may compare the overlap of the pixels in the two images. If the overlap of pixels between a first image captured and a second image captured consecutively is asymmetric (e.g., there is more overlap on one side) then the pixels moved asymmetrically, and hence adjustment to the heading is required. If the overlap of pixels between a first image captured and a second image captured consecutively is symmetric, then the heading does not require any adjustment. Further details of a method for adjusting the heading of a robot are described in U.S. patent application Ser. Nos. 15/410,624 and 16/504,012, the entire contents of which are hereby incorporated by reference.

In some embodiments, positioning the one or more light emitters and camera on a rotatable housing allows adjustment of the heading angle that the VMP robot will maintain with relation to surfaces in the environment. The housing may be rotated such that the VMP robot maintains a heading perpendicular to surfaces, parallel to surfaces, at a 45 degree angle to surfaces, or any other angle without limitation. In some embodiments, the VMP robot may include a plurality of one or more light emitters and camera sets. In some embodiments, two sets of one or more light emitters and one camera are positioned parallel to and opposite one another to face two opposing directions. This configuration would permit the processor of the VMP robot to locate a reference surface with less movement than embodiments with only one or more light emitters and one camera.

In some embodiments, a range of certainty in the data collected may be provided for each reading. For example, in a 90-degree field of view, readings falling within the middle region of the field of view may be more accurate than those closer to the limits of the field of view. Readings taken from different distances may have different certainties or resolutions. More reflective areas may provide brighter points than less reflective areas. This may affect the level of certainty of measurements. Certain surrounding conditions, such as ambience light, may provide more confidence in the readings. In extremely bright environments, statistical and Bayesian methods may be used to filter out the noise whereas in darker environments it may be less computationally complex to identify bright points within the image.

In some embodiments, the processor of the VMP robot uses data from various sensors, such as cameras, LIDAR, and other depth sensing devices (or depth perceiving devices), to generate a spatial representation of the surroundings. In some embodiments, the mapping methods proposed herein are implemented on an ARM Cortex M7 MCU Atmel's SAM S70 processor but other similar devices or other devices that perform similar functionality may be used. In some embodiments, the VMP robot or support infrastructure (e.g., a base station or remote datacenter) may include an application specific integrated circuit (e.g., an AI co-processor ASIC) that cooperates with a physically separate or integrated central processing unit to analyze frames of video (and depth-camera readings) in the manner described herein. In some cases, the ASIC may include a relatively large number (e.g., more than 500) arithmetic logic units configured to operate concurrently on data. In some cases, the ALU's may be configured to operate on relatively low-precision data (e.g., less than or equal to 16 bits, 8 bits, or 4 bits) to afford more parallel computing units per unit area of chip substrate. In some cases, the AI co-processor ASIC may have an independent memory interface (relative to the CPU) to memory, and in some cases, independent memory from that accessed by the CPU. In some cases, the interface may be to High Bandwidth Memory (HBM), e.g., as specified by the JEDEC HBM2 specification, that includes a 3-dimensional stack of dynamic random access memory. In some cases, the memory accessed by the AI-co-processor ASIC may be packed in a multi-chip package with such a 3-dimensional stack of memory, e.g., on a shared package substrate that connects to the CPU via a system board.

In some embodiments, a camera captures spatial data while the VMP robot moves within the surroundings. In some embodiments, the VMP robot moves back and forth across the environment in straight lines, such as in a boustrophedon pattern. In some embodiments, the camera captures spatial data while the VMP robot rotates 360 degrees. In some embodiments, spatial data of the surroundings are captured continuously as the VMP robot moves around the surroundings or rotates in one or more different positions in the surroundings. In some embodiments, the camera captures objects within a first field of view. In some embodiments, the image captured is a depth image, the depth image being any image containing data which may be related to the distance from the camera to objects captured in the image (e.g., pixel brightness, intensity, and color, time for light to reflect and return back to sensor, depth vector, etc.). In one embodiment, the camera measures vectors from the camera to objects in the surroundings and the processor calculates the L2 norm of the vectors using $\|x\|_P|=(\Sigma_i|x_i|^P)^{1/P}$ with P=2 to estimate depths to objects. In some embodiments, the camera rotates to observe a second field of view partly overlapping the first field of view and captures a depth image of objects within the second field of view (e.g., differing from the first field of view due to a difference in camera pose). In some embodiments, the processor compares the depth readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the spatial representation (or otherwise map) relative to operations on data with less overlap. In some embodiments, the processor infers the angular disposition of the VMP robot from the size of the area of overlap and uses the angular disposition to adjust odometer information to overcome the inherent noise of an odometer.

Prior to measuring vectors from the camera to objects within each new field of view and estimating depths, the processor may adjust previous readings to account for the measured movement of the VMP robot as it moves from observing one field of view to the next (e.g., differing from one another due to a difference in camera pose). This adjustment accounts for the movement of the coordinate system observed by the camera o with respect to a stationary coordinate system that may or may not coincide with the first field of view of the camera. In instances wherein the camera and VMP robot move as a single unit, the observed coordinate system of the camera moves with respect to the stationary coordinate system as the VMP robot moves. In some embodiments, a movement measuring device such as an odometer, gyroscope, optical flow sensor, etc. measures the movement of the VMP robot and hence the camera (assuming the two move as a single unit) as the camera moves to observe new fields of view with corresponding new observed coordinate systems. In some embodiments, the processor stores the movement data in a movement vector and transforms all perimeter and object coordinates to correspond to, for example, the initial coordinate system observed by the camera coinciding with the stationary coordinate system. For example, in an embodiment where C is a stationary Cartesian coordinate system, C0 may be the observed coordinate system of a camera fixed to a robotic device at time t0 with state S and coinciding with stationary coordinate system C. The robotic device with attached camera displaces and the camera observes coordinate system C1 at time t1 with state S'. A movement measuring device measures the movement vector V with values (x, y, theta) and the processor uses the movement vector V to transform coordinates observed in coordinate system C1 to corresponding coordinates in coordinate system C0, coinciding with static coordinate system C. The movement vector V allows all coordinates corresponding to different coordinate systems to be transformed to a single coordinate system, such as the static coordinate system C, thereby allowing the entire perimeter to correspond to a single coordinate system. Some embodiments of the present techniques reduce a non-trivial problem to simple addition of vectors. Embodiments of this approach may be a lossy compression of the state world; but, by adjusting resolutions and creatively using mathematical estimations, acceptable results can be achieved for most home environments. With a holistic, stationary, or global coordinate system in which the camera of the robotic device observes a local coordinate system, a function that relates the local observations of the camera to the stationary or global observation can be created. A challenge can be estimating a reliable function that can provide high accuracy. For example, accounting for scenarios wherein the surface on which the robotic device operates is unlevelled whereby the odometer may measure a depth greater or smaller than the true 2D displacement. Methods for eradicating such issues have been suggested in U.S. patent application Ser. No. 15/683,255, the entire contents of which are hereby incorporated by reference, whereby a processor of the robotic device monitors declining depth measurements as a depth measurement device of the robotic device moves towards a stationary object. If the steady decline of measurements is interrupted by a predetermined number of measurements that are a predetermined percentage greater than the measurements immediately before and after the interruption, the processor discards the interrupting measurements.

In some embodiments, the processor identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix may be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, may be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor determines the area of overlap based on translation and rotation of the camera between consecutive frames measured by an IMU. In some embodiments, the translation and rotation of the camera between frames is measured by two separate movement measurement devices (e.g., optical encoder and gyroscope of the VMP robot) and the movement of the VMP robot is the average of the measurements from the two separate devices. In some embodiments, the data from one movement measurement device is the movement data used and the data from the second movement measurement device is used to confirm the data of the first movement measurement device. In some embodiments, the processor uses movement of the camera between consecutive frames to validate the area of overlap identified between readings. Or, in some embodiments, comparison between the values of readings is used to validate the area of overlap determined based on measured movement of the camera between consecutive frames.

Figure 119A:
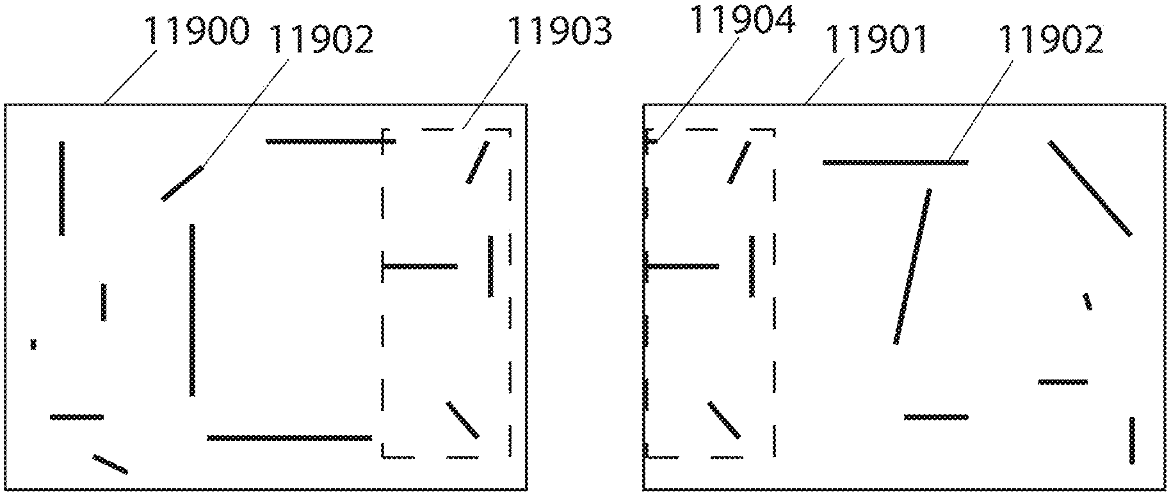
FIGS. 119A-119C illustrate how an overlapping area is detected in some embodiments using raw pixel intensity data and the combination of data at overlapping points.
Figure 119B:
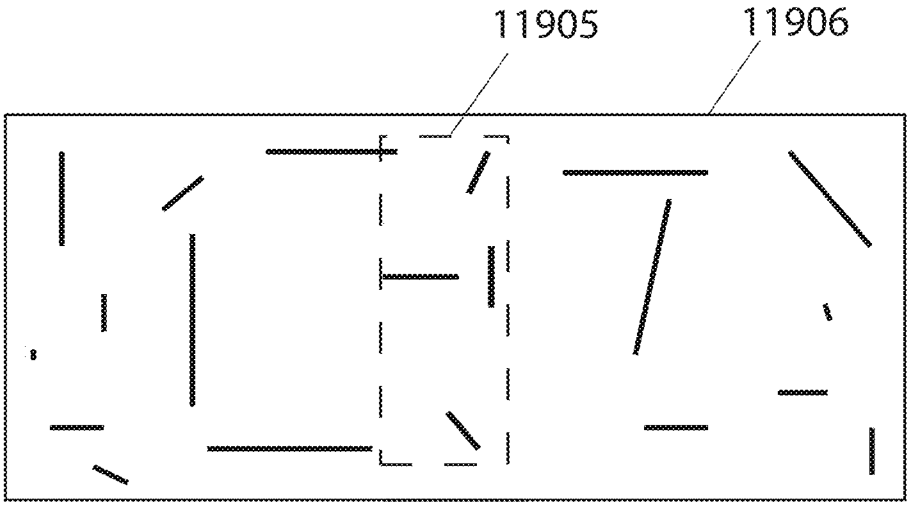
Figure 119C:
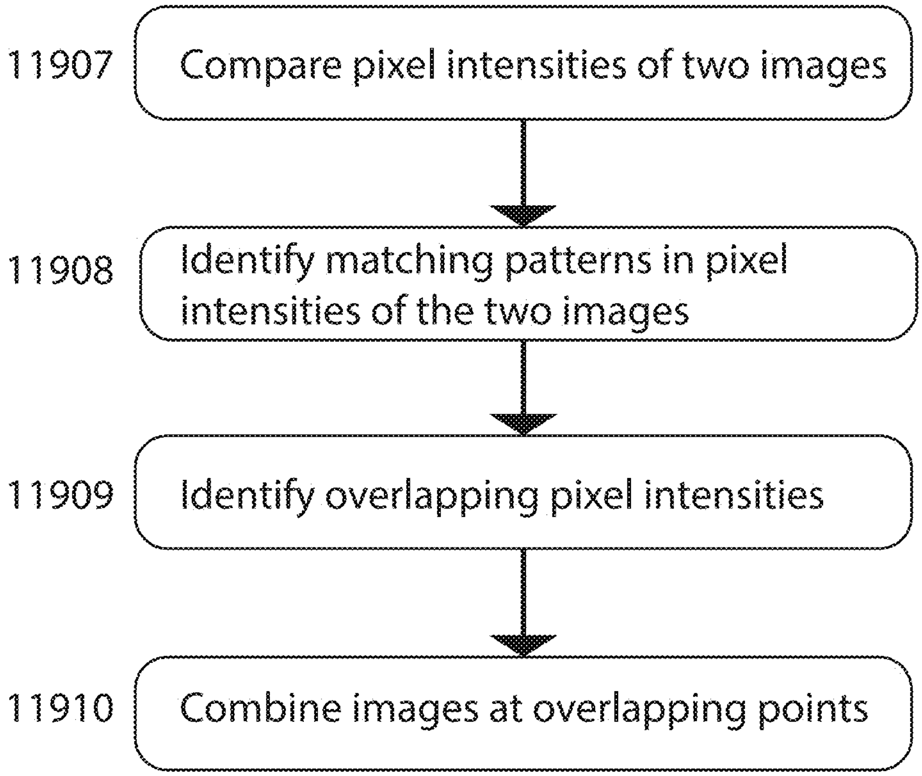

FIGS. 119A and 119B illustrate an example of identifying an area of overlap using raw pixel intensity data and the combination of data at overlapping points. In FIG. 119A, the overlapping area between overlapping image 11900 captured in a first field of view and image 11901 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. Lines 11902 represent pixels with high pixel intensity value (such as those above a certain threshold) in each image. Area 11903 of image 11900 and area 11904 of image 11901 capture the same area of the environment and, as such, the same pattern for pixel intensity values is sensed in area 11903 of image 11900 and area 11904 of image 11901. After identifying matching patterns in pixel intensity values in image 11900 and 11901, an overlapping area between both images may be determined. In FIG. 119B, the images are combined at overlapping area 11905 to form a larger image 11906 of the environment. In some cases, data corresponding to the images may be combined. For instance, depth values may be aligned based on alignment determined with the image. FIG. 119C illustrates a flowchart describing the process illustrated in FIGS. 119A and 119B wherein a processor of a robot at first stage 11907 compares pixel intensities of two images captured by a sensor of the robot, at second stage 11908 identifies matching patterns in pixel intensities of the two images, at third stage 11909 identifies overlapping pixel intensities of the two images, and at fourth stage 11910 combines the two images at overlapping points.

Figure 120A:
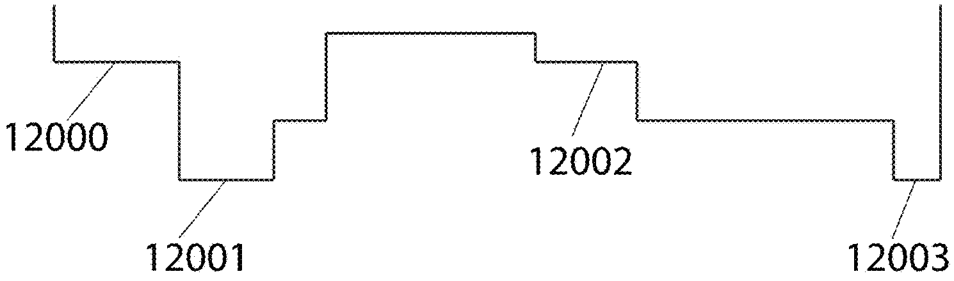
Figure 120B:
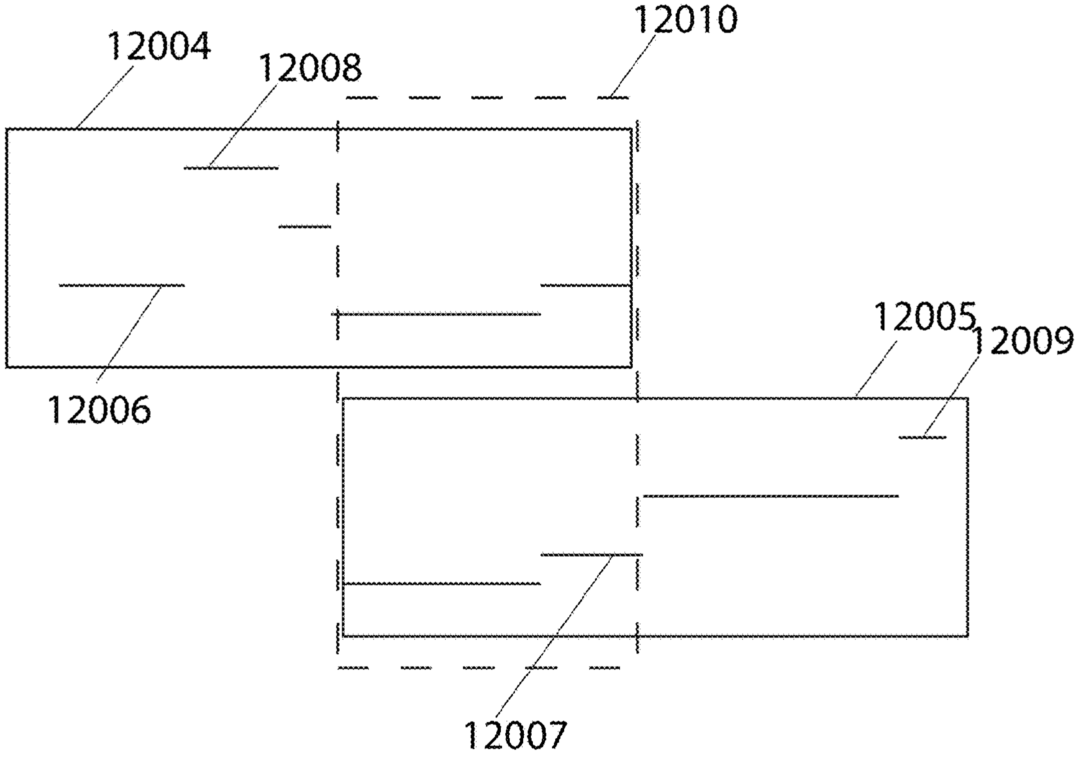
Figure 120C:
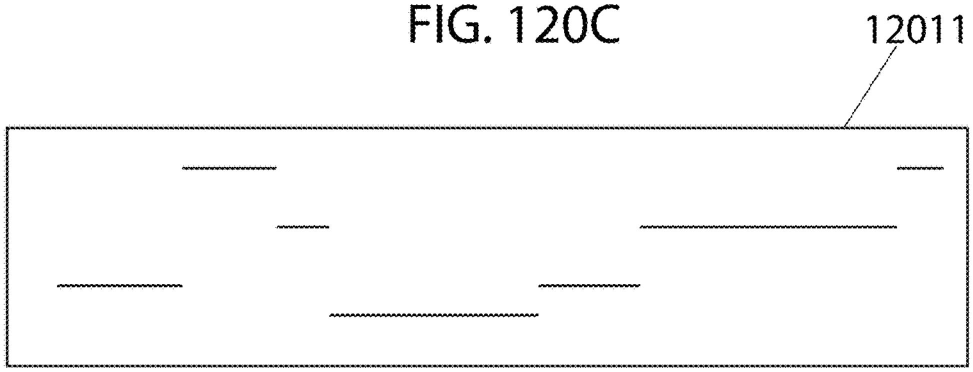

FIGS. 120A-120C illustrate another example of identifying an area of overlap using raw pixel intensity data and the combination of data at overlapping points. FIG. 120A illustrates a top (plan) view of an object, such as a wall, with uneven surfaces wherein, for example, surface 12000 is further away from an observer than surface 12001 or surface 12002 is further away from an observer than surface 12003. In some embodiments, at least one infrared line laser positioned at a downward angle relative to a horizontal plane coupled with at least one camera may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from a camera in the horizontal plane. The position of the laser line (or feature of a structured light pattern) in the image may be detected by finding pixels with intensity above a threshold. The position of the line laser in the captured image may be related to a distance from the surface upon which the line laser is projected. In FIG. 120B, captured images 12004 and 12005 of the laser line projected onto the object surface for two different fields of view are shown. Projected laser lines with lower position, such as laser lines 12006 and 12007 in images 12004 and 12005 respectively, correspond to object surfaces 12000 and 12002, respectively, further away from the infrared illuminator and camera. Projected laser lines with higher position, such as laser lines 12008 and 12009 in images 12004 and 12005 respectively, correspond to object surfaces 12001 and 12003, respectively, closer to the infrared illuminator and camera. Captured images 12004 and 12005 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 12004 and 12005 bound within dashed lines 12010 have similar arrangement of pixel intensities as both images captured a same portion of the object within their field of view. Therefore, images 12004 and 12005 may be combined at overlapping points to construct larger image 12011 of the environment shown in FIG. 120C. The position of the laser lines in image 12011, indicated by pixels with intensity value above a threshold intensity, may be used to infer depth of surfaces of objects from the infrared illuminator and camera (see, U.S. patent application Ser. No. 15/674,310, the entire contents of which is hereby incorporated by reference).

In some embodiments, a light point or light structure may be projected and captured in two consecutive images of the surroundings. Given the movement of the VMP robot, and the two images, the processor may determine the overlap between images. In some embodiments, movement may be measured with an optical encoder and an inertial measurement unit may be used to enhance movement measurements.

In some embodiments, the area of overlap between readings taken within the two field of views is estimated based on the measured movement of the VMP robot and is used as a method of verifying the identified area of overlap. It may also be used as the primary method of identifying the area of overlap. In this embodiment, devices such as an odometer, gyroscope, and optical flow sensor may be used to measure movement. For example, the angular displacement provided by an odometer and gyroscope and/or the mathematical convolution of the two may be used to estimate the area of overlap. In some embodiments the readings from the odometer, gyroscope and optical sensor may be combined to produce more accurate readings, e.g., with data fusion techniques and a Kalman filter. Gyroscopes and odometers provide similar readings (e.g., in vector form indicating magnitude of distance and direction). However, since each measurement device is subject to a different type of noise and different errors, combining readings from both measurement devices through a mathematical process can produce more accurate readings. In some embodiments, the VMP robot may have more than one movement measuring device in order to measure movement between each time step or fields of view observed. For example, the VMP robot may have gyroscopes and odometers that simultaneously provide redundant information. In many implementations, only one set of information is used by the processor of the VMP robot while the other is discarded. In other implementations, the processor combines the two readings by, for example, using a moving average (or some other measure of central tendency may be applied, like a median or mode) or a more complex method. Due to measurement noise, the type of measurement device used, etc. discrepancies between the measurements by a first device and a second device may exist and may not be the exact same. In such cases, the processor calculates movement of the VMP robot by combining the measurements from the first and second device, or selects measurements from one device as more accurate than the others. For example, the processor may combine measurements from the first device and the second device (or measurements from more devices, like more than three, more than five, or more than 10) using a moving average (or some other measure of central tendency may be applied, like a median or mode). The processor may also use minimum sum of errors to adjust and calculate movement of the VMP robot to compensate for the lack of precision between the measurements from the first and second device. By way of further example, the processor may use minimum mean squared error to provide a more precise estimate of the movement of the VMP robot. The processor may also use other mathematical methods to further process measured movement of the VMP robot by the first and second device, such as split and merge algorithm, incremental algorithm, Hough Transform, line regression, Random Sample Consensus, Expectation-Maximization algorithm, or curve fitting, for example, to estimate more realistic movement of the VMP robot. In another embodiment, the processor may use the k-nearest neighbors algorithm where each movement measurement is calculated as the average of its k-nearest neighbors.

In some embodiments, the processor generates a simulated representation of the VMP robot in various positions within the environment. In some embodiments, the processor generates a simulated representation of the surroundings for each hypothetical state of the VMP robot. In some embodiments, the processor compares the measurement against each simulated representation of the environment (e.g., a floor type map, a spatial map, a Wi-Fi map, etc.) corresponding with a perspective of each of the hypothetical states of the VMP robot. In some embodiments, the processor chooses the state of the VMP robot that makes the most sense as the most feasible state of the VMP robot. In some embodiments, the processor selects additional hypothetical states of the VMP robot as a backup to the most feasible state of the VMP robot.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the processor expands the area of overlap to include a number of readings immediately before and after (or spatially adjacent) readings within the identified area of overlap.

Structure of data used in inferring readings may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

In some embodiments, two classes of sensors are used, one acting as a predictor and the other confirming perimeter points of a work space. The predictor sensor predicts a specific coordinate as a perimeter point. The second set of sensors may either confirm or refute the prediction. For example, a predicted coordinate is proven to be false if the second set of sensors detects the VMP robot occupying the area within which the coordinate is found. If the second set of sensors detects that coordinate is within an area the VMP robot cannot access, the prediction is found true. In some embodiments, this is implemented with a low range sensor array. The second set of sensors may be, but is not limited to, a low range of IR sensors, distance sensor, tactile sensor, a bumper sensor, or other similar types of sensors.

In some embodiments, the processor identifies one or more gaps in the spatial representation of the surroundings (or otherwise map of the environment). In some embodiments, the camera is navigated to the area in which the gap exists for further exploration, capturing new images while exploring. New data is captured by the camera and combined with the existing map at overlapping points until the gap in the map no longer exists. In some embodiments, the processor identifies the gap in the map and navigates the camera to the area in which the gap exists. In some embodiments, the perimeters and objects in the map may be stored in memory of and used by the VMP robot to perform tasks within discovered areas of the map. As the VMP robot performs a task, it marks the areas covered within the map (e.g., in memory) to avoid repeat coverage. While the VMP robot performs work in discovered areas, it continues to take images and merge the data them with the existing map to close any gaps in the perimeters that may exist and, in the process, may discover previously undiscovered areas. In some embodiments, the discovered area is split into sections that are covered by the VMP robot in succession starting from the section closest to the VMP robot and ending at the sections furthest away. Any other order may be acceptable depending on the situation. After covering discovered areas within the surroundings, the VMP robot identifies any remaining gaps in the perimeters that may have not been closed while performing work in the discovered area. These gaps may be due to, for example, an opening in the wall, such as in the case of a door or an opening between separated areas, blind spots unseen by the sensor, or a lack of data resulting from a sensor with inadequate detection range.

In some embodiments, the VMP robot moves towards the undiscovered area within which a first gap is located while continuously taking images of the undiscovered area and merging the data from the images taken within overlapping successive field of views together at the area of overlap between successive field of views. Some embodiments may interrogate a map in memory to detect undiscovered areas. An area may be designated as undiscovered if no data, less than a threshold amount of data, or data of less than a threshold confidence, exists in a particular region. Thus, undiscovered areas may be distinguished from open areas by measurements being taken in an area by the VMP robot. The VMP robot may continue to explore undiscovered areas within which the gap is located by taking images and combining them with previously taken images until the gap no longer exists (e.g., measurements with greater than a threshold spatial resolution are obtained). During exploration of undiscovered areas within which gaps are located, the VMP robot may perform work (e.g., clean) in new areas discovered. If it does perform work, areas covered may be marked in order to avoid repeat coverage. In some embodiments, the processor of the VMP robot may split the newly discovered areas into sections and the VMP robot may successively cover each section one at a time, finishing cleaning on one area before moving on to the next area. The VMP robot continues to explore unrecognized areas in the map within which gaps are identified until no gaps exist and the perimeter is a complete closed loop.

In some embodiments, after exploring undiscovered areas within which identified gaps are located and covering all discovered areas within the map, the VMP robot moves along the perimeters of the environment while using sensory devices, such as tactile sensors (like bump sensors) or short-range IR sensors, facing towards the perimeters of the map to verify that no additional gaps exist. For example, the VMP robot may use the tactile sensor to observe physical contact between the VMP robot and the perimeters as it follows along the perimeter of the map to ensure no additional gaps exist. In some embodiments, an additional gap may be observed while following along the perimeters, in which case the VMP robot may proceed to explore (e.g., position its sensors such that it can image) the undiscovered areas while mapping newly discovered areas as described above. In some embodiments, the VMP robot returns back to its home base after moving along the perimeters to check that no additional gaps exist. In some embodiments, the actions of covering internal areas within the map and moving along the perimeters can alternate. For example, the internal areas of one room can be covered and movement around the perimeters completed before moving on to the internal area and perimeters of a second room. In other embodiments, the location of the perimeters sensed may be compared to the location of the perimeters in the map to check for accuracy. For example, using a tactile sensor, the location at which physical contact between the VMP robot and perimeters are observed can be compared to the corresponding location within the map to check if there are coinciding perimeters. This method may also be used to determine ground truth of the location of the perimeters in comparison to the perceived location of the perimeters. In some embodiments, ground truth may be used to adjust measurements or the perimeters. The VMP robot may move along the perimeters and compare its sensed position to that of the perimeters at any time during or after the process of plotting the perimeters of the map.

In some embodiments, where the gap in the perimeters is due to an opening in the wall, when for example, there is a doorway or an opening between two separate areas, exploration of the undiscovered areas within which the gap is identified can lead to the discovery of a room, a hallway or any other separate area. During exploration of undiscovered areas, the camera continues to measure distances to objects within its field of view such that newly discovered areas, such as a room, hallway, or any other area, are added to the plotted map by combining new distance measurements with the perimeters at overlapping points. In some embodiments, identified gaps that are found to be, for example, an opening in the wall are used in separating areas into smaller subareas. For example, the opening in the wall between two rooms may be used to segment the area into two subareas, where each room is a single subarea. This could be expanded to five rooms, for example, where each room separated from rooms adjacent to it by an opening in the wall may be segmented into five subareas using the openings in the walls as dividers. In some embodiments, the processor of the VMP robot provides a unique tag to each subarea and uses the unique tag to order the subareas for coverage by the VMP robot, choose different work functions for different subareas, add restrictions to subareas, set cleaning schedules for different subareas, and the like.

In some embodiments, wherein the VMP robot detects a second room beyond an opening in the wall detected within a first room being covered, the opening in the wall between the two rooms is identified as a doorway. In such embodiments, to identify the doorway connecting the two rooms, the VMP robot may cover the internal space within the first room, but remain distanced from the boundaries detected. The VMP robot may then cover (e.g., with a serpentine coverage path or other paths) the internal space within the first room again but this time reach closer to the boundaries detected. The VMP robot may record covered areas. For example, the VMP robot may mark areas covered within a map or record coordinates corresponding to areas covered. The distance between the outer edge of the recorded first internal space covered and areas of the recorded second internal space covered are determined, where the distance measured is perpendicular to the outer edge of the first internal space. In some embodiments, recorded areas of the second internal space covered that are below a threshold distance may be discarded and any remaining recorded areas of the second internal space may be referred to as an outside space. The centroids of the recorded outside spaces and the recorded first internal space covered may be determined and path lines between centroid of the first internal space and centroids of outside spaces may be created. The segments of the path lines passing through the internal space and outside spaces are discarded leaving only path lines connecting the outer edges of the internal space to the outer edges of the outside spaces. The one or more processors of the VMP robot may then mark openings in the wall as a doorway using an iterative process where a theoretical doorway line perpendicular to each path line is fitted to perimeter data. At each iteration, a doorway line moves further along a corresponding path line, beginning closer to the internal space, until the doorway line aligns with the perimeter data, at which point the doorway line is identified as a doorway. In some embodiments, the line of sight of the VMP robot is limited and only a small area beyond the opening in the wall is discovered. In such cases, the VMP robot moves closer to the opening in the wall and scans to discover enough area and hence collect more data beyond the opening in the wall before deciding to initiate the steps described for identifying a doorway. In some embodiments, walls are geometrically modeled as a line and an opening in the wall is detected by a deviation in depth data from a line fitted to the depth data, where depth data beyond a deviation threshold is considered to be an opening in the wall.

Figure 121:
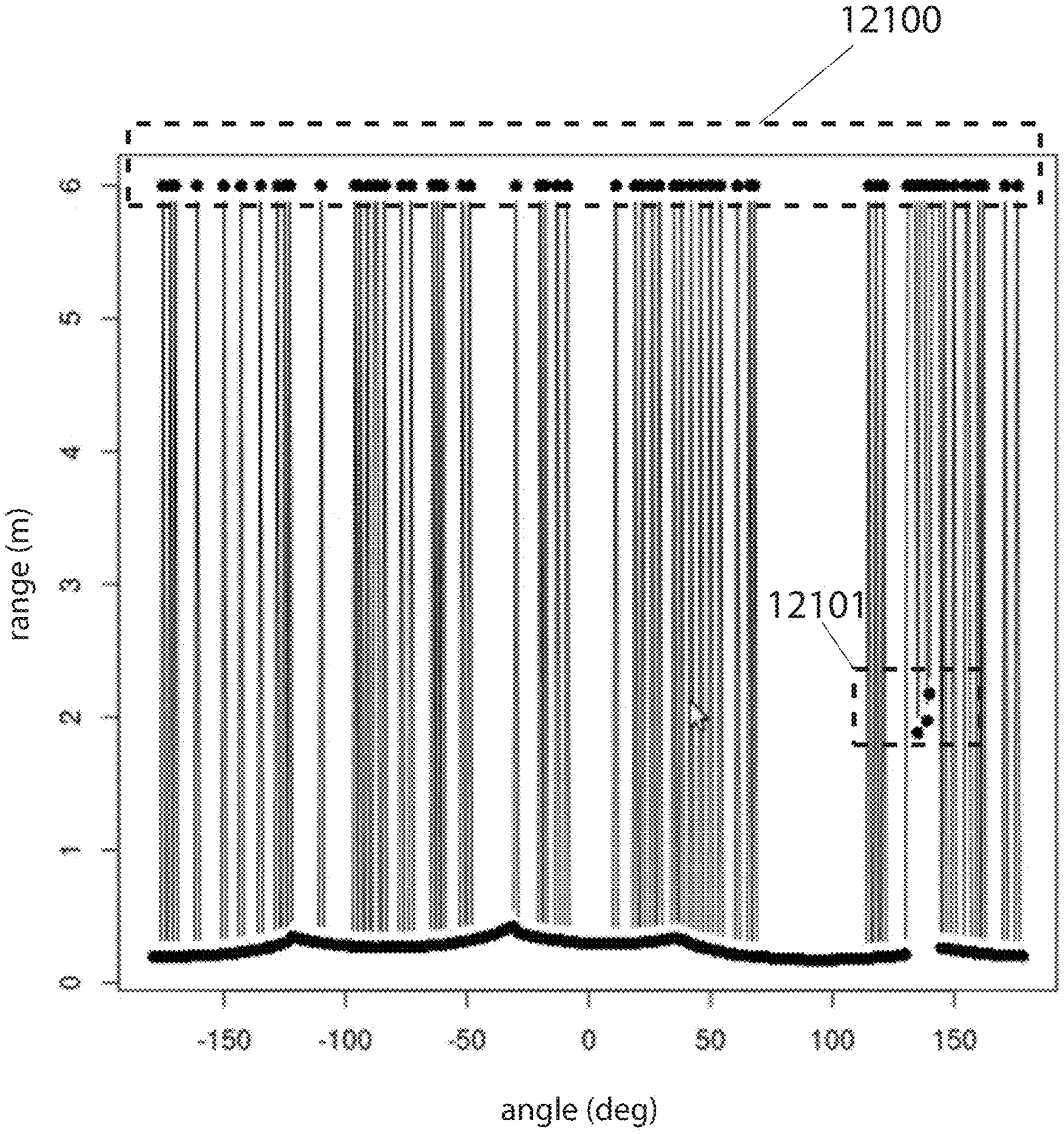

In some embodiments, a depth sensor of the VMP robot outputs range and light intensity for every reading taken such that the number of readings taken at a single time point depends on the angular resolution of the depth sensor and the size of the field of view. For example, a reading may be taken every 0.5° or every 2° for a 100° field of view resulting in 200 or 50 readings at a single time point, respectively. If more than one set of readings is taken for a particular field of view, the processor averages the data for each angular resolution. Since depth sensors have a minimum and maximum detectable range, invalid and undefined readings may result from out of range measurements (i.e. those too far or too close to the depth sensor). To eliminate these undefined values, the processor assigns them a large number and filters them out from the measurements of the environment. In embodiments, the processor also filters out outliers due to noise, corrupt data, etc. For example, FIG. 121 illustrates readings taken by a depth sensor for a particular field of view. Data points 12100 with value of 6 meters, the maximum range of the depth sensor, are considered invalid data points resulting from out of range data and are filtered out by the processor. Remaining data points are fitted to a line model and any deviation from the line model are identified as an opening in the wall by the processor. Data points 12101, for example, are identified by the processor as a deviation from a line model and are considered an opening in the wall. In embodiments, the range and light intensity recorded by the depth sensor for each reading is used by the processor to calculate an error associated with deviation of the range data from a line model. The processor of the VMP robot relates the light intensity and range of a point captured by the depth sensor using $$I(n) = \frac{a}{r(n)^4},$$

wherein I(n) is the intensity of point n, r(n) is the distance of the particular point on an object and $a=E(I(n)r(n)^4)$ is a constant that is determined by the processor using a Gaussian assumption.

Figure 122:
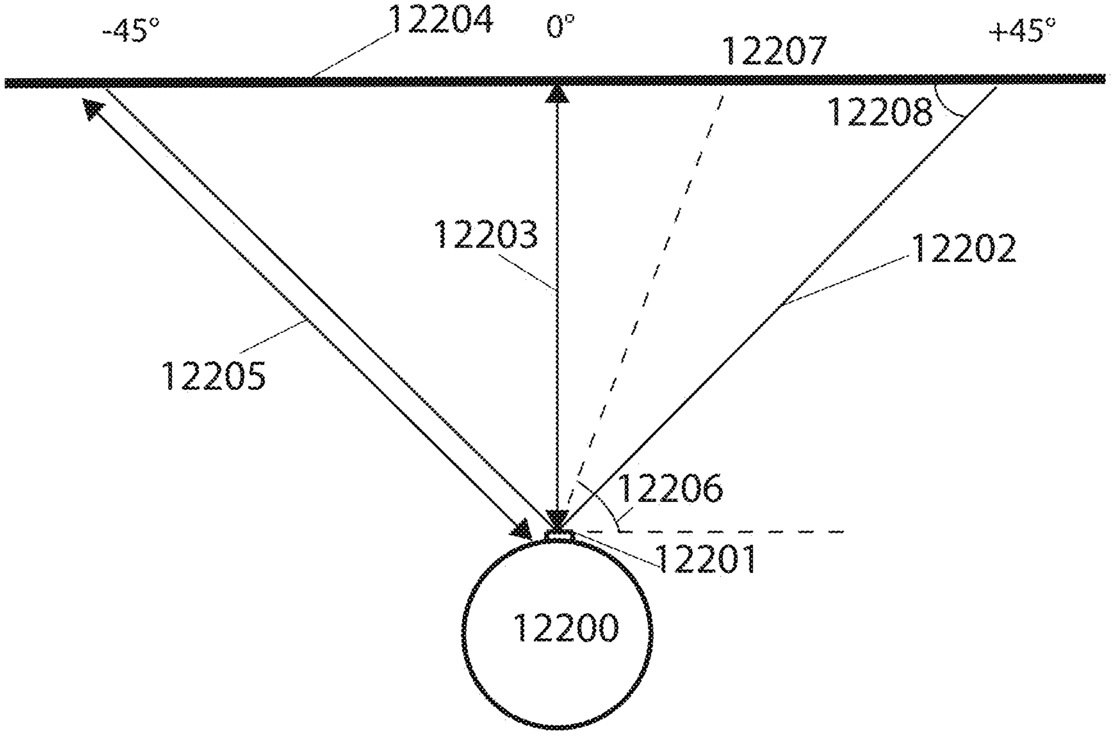

FIG. 122 illustrates VMP robot 12200 with depth sensor 12201 with field of view 12202 of 90°, the center of the field of view located at 0° and spanning to +45° and −45° on either side. Distance 12203 to object 12204 taken with field of view 12202 measured at angle 0° is the minimum distance $d_{min}$ of all readings taken within field of view 12202, while distance 12205 measured at angles +/−45° are the maximum distance $d_{max}$. Given $d_{min}$, the processor calculates the distance $$r(n) = \frac{d_{min}}{\sin(-\theta(n))}$$

corresponding to a point n on an object at any angular resolution θ(n). This is shown in FIG. 122 wherein angle 12206 of point 12207 on object 12204 corresponds to θ(n) of point n in the equation above. The horizon $$\alpha = a\sin\frac{d_{min}}{d_{max}}$$

of the depth sensor is also computed by the processor given $d_{min}$ and $d_{max}$. This is shown in FIG. 122 as angle 12208. The processor uses a combined error $$e = \sum (I(n)r(n)^4 - a)^2 + \left(r(n) - \left(\frac{d_{min}}{\sin(-\theta(n))}\right)\right)^2$$

of the range and light intensity output by the depth sensor to identify deviation from the line model and hence detect an opening in the wall. The error e is minimal for walls and significantly higher for an opening in the wall, as the data will significantly deviate from the line model. A threshold is used by the processor to determine whether the data points considered indicate an opening in the wall when, for example, the error exceeds some threshold value.

Figure 123:
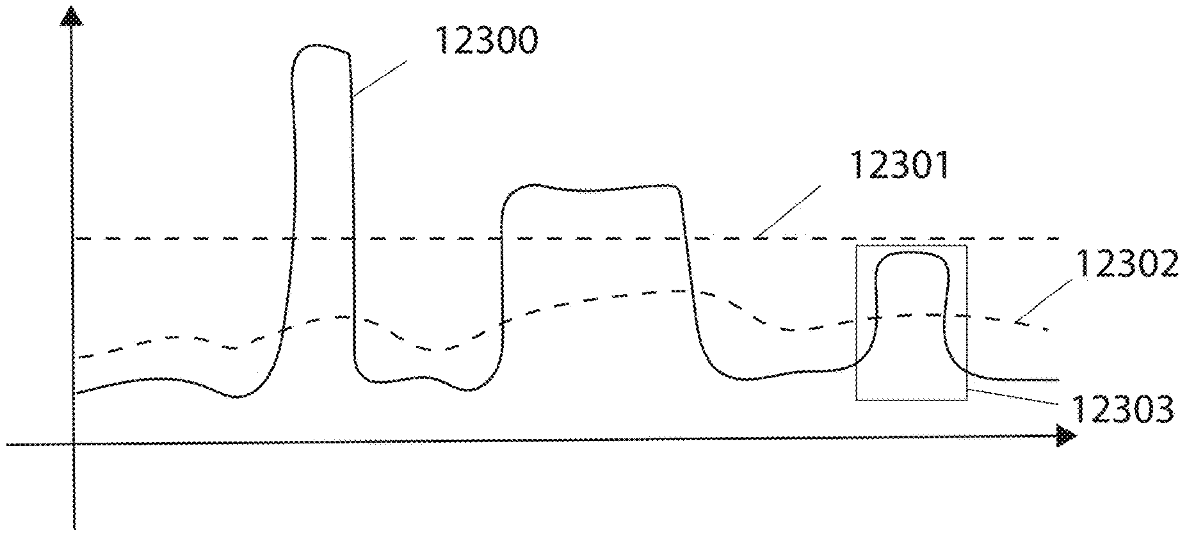

In some embodiments, the processor uses an adaptive threshold wherein the values below the threshold may be considered to be a wall. An adaptive threshold across the data is determined by the processor of the VMP robot by averaging a number of local measurements. For example, threshold value $x_i$ is determined by the processor as the average of the local data measurements spanning from $x_i+1$ to $x_i+L$, wherein L determines the number of local data measurements considered in calculating threshold value $x_i$. In some embodiments, order statistics is also used by the processor to determine adaptive threshold values. FIG. 123 illustrates range data 12300 and fixed threshold 12301 as well as adaptive threshold 12302. Adaptive threshold 12302 is adjusted based on range data in the local region of interest. In certain cases, wherein a fixed threshold value is used, certain regions may be incorrectly identified as a wall, such as region 12303.

In some embodiments, the processor does not consider openings with width below a specified threshold as an opening in the wall, such as openings with a width too small to be considered a door or too small for the VMP robot to fit through. The processor of the VMP robot estimates the width of the opening in the wall by identifying angles φ with a valid range value and with intensity greater than or equal to $$\frac{a}{d_{max}}.$$

The difference between the smallest and largest angle among all $$\varphi = \left\{\theta(n) \vee (\{r(n) \neq \infty\}) \wedge \left(I(n) \geq \left(\frac{a}{d_{max}}\right)^4\right)\right\}$$

angles provide an estimate of the width of the opening. The width of an opening in the wall may also be determined by the processor by identifying the angle at which the measured range noticeably increases and the angle at which the measured range noticeably decreases and taking the difference between the two angles.

Similar to the line model method described above, in some embodiments a wall or opening in the wall is detected by the processor using recursive line fitting of the data. The processor of the VMP robot compares the error $(y-(ax+b))^2$ of data points $n_1$ to $n_2$ to a threshold $T_1$ and summates the number of errors below the threshold. The processor then computes the difference between the number of points considered $(n_2-n_1)$ and the number of data points with errors below threshold $T_1$. If the difference is below a threshold $T_2$, i.e., $$\left((n_2 - n_1) - \sum_{n_1}^{n_2} (y - (ax + b))^2 < T_1\right) < T_2,$$

then the processor assigns the data points to be a wall otherwise assigns the data points to be an opening in the wall.

Figure 124:
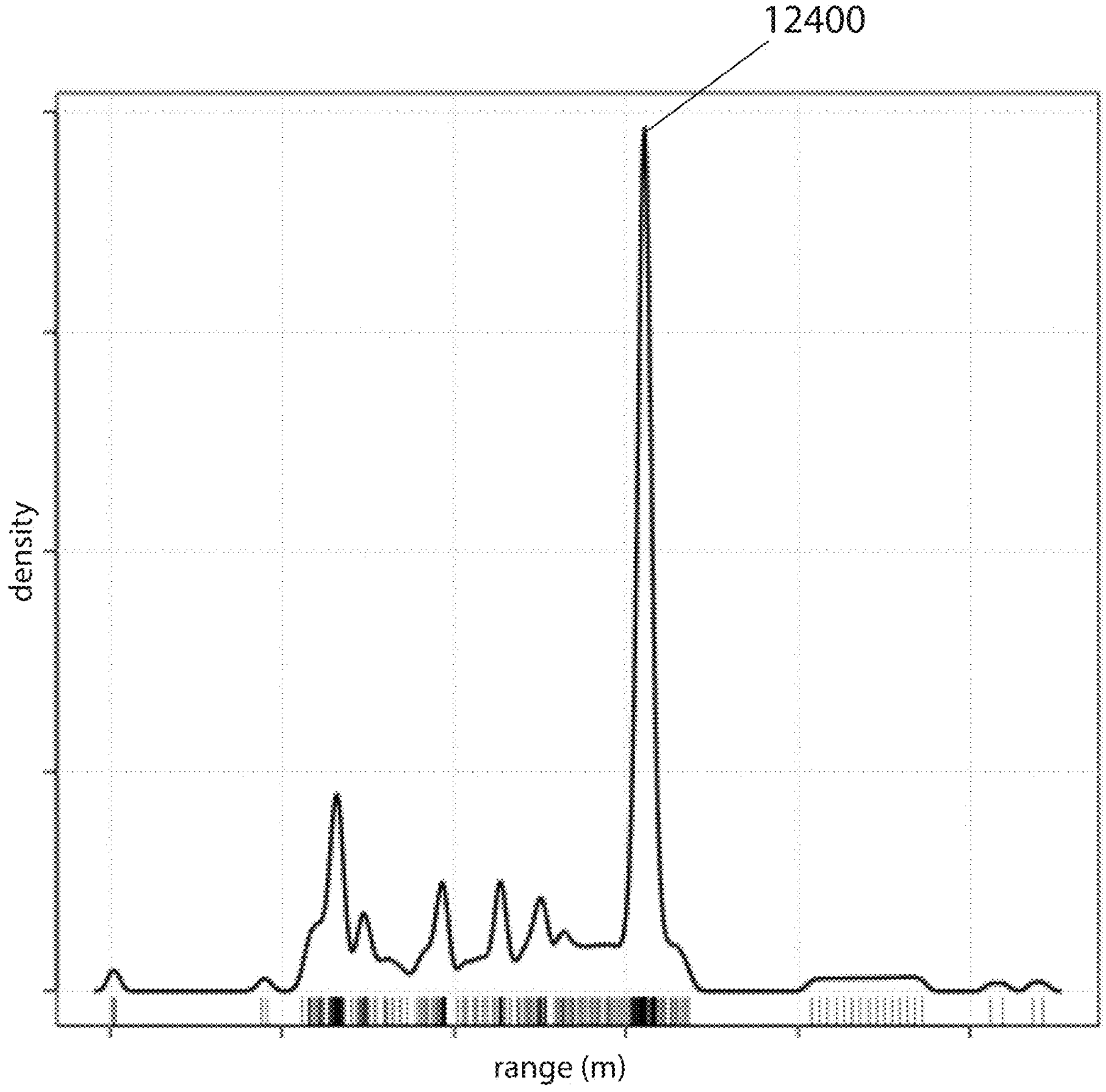

In another embodiment, the processor uses entropy to predict an opening in the wall, as an opening in the wall results in disordered measurement data and hence larger entropy value. When the entropy surpasses a certain threshold, it can be assumed to be an opening in the wall. Entropy of the measurement data is determined by the processor using $$H(X) = -\sum_{i=1}^{n} P(x_i)\log P(x_i)$$

wherein $X=(x_1, x_2, \ldots, x_n)$ is a collection of possible data measurements, such as depth measurements. $P(x_i)$ is the probability of a depth measurement having value $x_i$. $P(x_i)$ may be determined by, for example, counting the number of measurements within a specified area of interest with value $x_i$ and dividing that number by the total number of measurements within the area considered. In some embodiments, the processor compares entropy of measurement data to entropy of measurement data of a wall. For example, the entropy may be computed for the probability density function (PDF) of the data to predict if there is an opening in the wall in the region of interest. In the case of a wall, the PDF may show localization of readings around wall coordinates, thereby increasing certainty and reducing entropy. For example, FIG. 124 illustrates PDF of x-coordinate reading, wherein localization is shown as the peak in probability density 12400, indicating high certainty of a wall and hence lower entropy. In some embodiments, a region of interest is identified as an opening in the wall by the processor when the entropy surpasses a specified threshold. During measurement, the depth sensor may encounter three types of barriers, namely, an object, a wall, or the maximum depth senor range. In most cases, objects are concentrated around the wall of the environment and, hence, the probability of finding an object near a wall is higher. Each depth reading has a value with some probability. In any given row of the 2D x-y data the processor of the VMP robot takes the average of the y-component as the PDF estimate for the x-component, $$P(x) = \int P(x, y)dy \cong \int \frac{1}{N}dy = \frac{1}{N}\sum y.$$

In some embodiments, a probabilistic method is applied by pre-training the processor of the VMP robot with a classifier to provide a priori prediction. In embodiments, a supervised machine learning algorithm is used by the processor to identify features of openings and walls. A training set of, for example, depth data is used by the processor to teach the classifier common features or patterns in the data corresponding with openings and walls such that the processor can identify walls and openings in walls with some probability distribution. In this way, a priori prediction from a classifier combined with real-time measurement is used together to provide a more accurate prediction of a wall or opening in the wall. In some embodiments, Bayes Theorem is used by the processor to provide probability of an opening in the wall given that the VMP robot is located near an opening in the wall, $$P(A \mid B) = \frac{P(B \mid A)P(A)}{P(B)}.$$

$P(A|B)$ is the probability of an opening in the wall given that the VMP robot is located close to an opening in the wall, $P(A)$ is the probability of an opening in the wall, $P(B)$ is the probability of the VMP robot being located close to an opening in the wall, and $P(B|A)$ is the probability of the VMP robot being located close to an opening in the wall given that an opening in the wall is detected.

Figure 125:
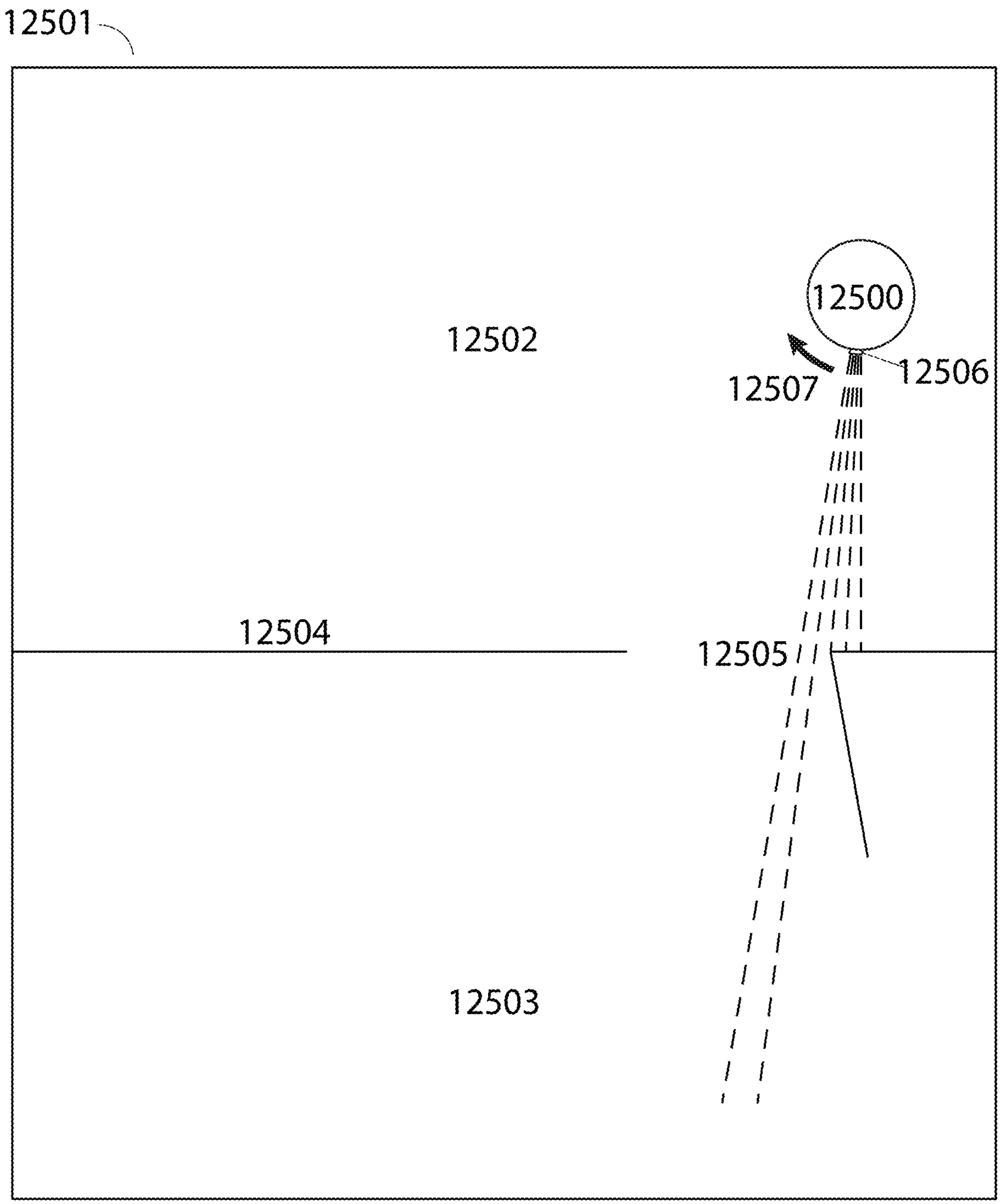

The different methods described for detecting an opening in the wall above may be combined in some embodiments and used independently in others. Examples of methods for detecting a doorway are described in, for example, U.S. patent application Ser. Nos. 15/615,284 and 16/163,541, the entire contents of which are hereby incorporated by reference. In some cases, the steps described for identifying a doorway are executed after identifying an opening in the wall. Different types of depth measurement devices may be used that are capable of measuring depth or data from which depth may be inferred, such as LIDAR, LADAR, depth sensor, TOF sensor, stereo vision and other distance or depth measuring devices. In some embodiments, more than one measurement device may be used simultaneously. In some embodiments, the processor of the VMP robot may mark the location of doorways within a map of the environment. For example, FIG. 125 illustrates VMP robot 12500 within workspace 12501 with two subareas 12502 and room 12503 divided by wall 12504 and connected by door 12505. Depth sensor 12506 measures the range to objects within the environment, such as wall 12504. The range data is fitted to a line model by the processor of the VMP robot. The data which fit the line model are assigned as a wall by the processor while range data that deviates from the line model by some error threshold are assigned as a door. As VMP robot 12500 rotates in direction 12507, part of the ranges measured within the field of view of depth sensor 12506 correspond with wall 12504 as well as door 12505. The ranges corresponding with door 12505 will be significantly greater than those measured for adjacent wall 12504 and, hence, will deviate from the line model. This sudden deviation can be identified by any of the methods described above for detecting an opening in a wall. In some embodiments, the VMP robot may be configured to avoid crossing the identified doorway for a predetermined amount of time or until the VMP robot has encountered the doorway a predetermined number of times. In some embodiments, the VMP robot may be configured to drive through the identified doorway into a second subarea for cleaning before driving through the doorway in the opposite direction. In embodiments, the VMP robot may be configured to execute any number of actions upon identification of a doorway and different actions may be executed for different doorways. In some embodiments, the processor uses doorways to segment the environment into subareas. In some embodiments, the processor represents subareas using a stack structure, for example, for backtracking purposes wherein the path of the VMP robot back to its starting position can be found using the stack structure.

To find an optimal location to move to, such that the VMP robot is able to best discover the opening in the wall and beyond, lines normal to a frontier of the area to be discovered are determined. From the normal lines a series of ray tracing may then be used to find a location suitable for the VMP robot to move to by first defining an area through which the rays pass. One or more processors of the VMP robot may mark the defined area in a map, for example, or record coordinates corresponding to the defined area. The defined area may also be recorded in any other form. To ensure the VMP robot is not too close to the frontier, in some embodiments, the defined area may be trimmed such that areas close to the frontier are eliminated. The centroid of the defined area is then used as the location the VMP robot moves to. In other embodiments, other locations within the defined area may be used. In some cases, the identified gap is simply a depression and the steps described for identifying a doorway are not required.

Due to noise in measurement and movement, in some embodiments, there are accumulating inaccuracies in the perimeters discovered as the VMP robot moves from one room to another. As the number of rooms increases the inaccuracies may accumulate further. For example, due to movement noise, a VMP robot intending to move directly forward into a second room from a first adjacent room may in reality have moved to a location further away. This movement noise results in the perimeters of the second room misaligning with the perimeters of the first room. In some embodiments, a room graph is created where each room is defined separately in order to avoid or minimize such issues. The room graph may be a mathematical graph that has nodes representing the rooms and vectors determining how the rooms are connected to one another. In some embodiments, each room has its own properties associated with it such as a centroid, a first set of perimeter points corresponding to an initial scan of the room, a completed set of perimeter points where all perimeters and doors are captured, a last set of perimeter points corresponding to the last scan of the room, a set of doors with an associated field of view, doors labelled with the room to which they lead to, a unique number and/or label to identify the room and flags signifying visitations to the room. For example, the doorways in each perimeter may be identified to have a path to adjacent rooms such that the VMP robot may return back to the first room after covering multiple rooms. For example, a wall and doorway shared between two rooms are found in both the boundaries of the first room and the second room. The doorway in the perimeter of the first room is identified to have a path to the second room and the doorway in the perimeter of the second room is identified to have a path to the first room.

In some embodiments, the processor of the VMP robot applies a room planner to keep track of the paths executed through the rooms and the rooms visited and to suggest one or more paths for the VMP robot to follow. For example, if there are two doors in a room, the room planner can suggest which door to go through. In embodiments, the room planner can also suggest alternative paths if a particular room is not accessible when, for example, a previously identified door is closed or blocked. In embodiments, the room planner has different modes, such as exploration mode wherein the VMP robot is configured to explore undiscovered areas or return to start mode wherein the VMP robot is configured to return to its initial starting point in the working environment. In embodiments, the room planner chooses the current perimeter view of each room and switches between different perimeter views of a room as each room can have multiple different sets of perimeters. For example, when the VMP robot first enters a room, the room planner of the VMP robot determines that the partial perimeter initially observed by a depth sensor of the VMP robot best matches with data of a perimeter view of the previous room and initially uses that perimeter as the view of the VMP robot. However, as the depth sensor of the VMP robot observes more areas within the room, the room planner finds that a perimeter view of the current room better matches the observations and switches the view of the VMP robot. In embodiments, the room planner chooses which perimeter view of a room to use based on a specific task of the VMP robot. For example, if the VMP robot is exiting a second room to enter a first room, the room planner finds it beneficial to load only the inside perimeter of the first room rather than all sets of perimeters of the first room. In embodiments, the room planner can apply MDP in a similar manner as described above for determining, for example, the optimal order in which different rooms are covered or the optimal coverage path. For example, the first time (or first few times) the room planner advises the next room to be visited on a pseudo random basis and monitors the performance. Then every time it experiments with the order of rooms, it monitors how the performance changes using a cost function that is penalized with movement of the VMP robot odometer. The goal is for the room planner to minimize the cost function over time and, once the algorithm converges, it is likely to provide the best possible order for visiting the rooms. In embodiments, the cost function can include other or additional penalizing factors, such as repeat coverage or distance travelled from on subarea to another. For example, a VMP robot can travel through rooms A, B, C, and D in the stated order to reach room D, meanwhile room D may have a direct connection to room A. Over time the system may converge such that the VMP robot is configured to travel directly to room D from room A rather than travelling through rooms B and C first to get to room D. In some embodiments, to avoid falling into a local minima, optimization is controlled by the processor of the VMP robot to achieve a balance between exploration and exploitation. The processor of the VMP robot controls the amount of time spent on exploration versus exploitation. In embodiments, the room planner is a component of the processor of the VMP robot or is an external component coupled to the processor of the VMP robot or may be included in an application of a mobile device and may be implemented in software, hardware, or both.

The VMP robot may use the map to autonomously navigate the environment during operation, e.g., a cleaning or other work session. In some embodiments, the plotted (e.g., mapped, e.g., in vector or bitmap form) perimeters are stored in memory for future use. Storage of the map may be in temporary memory such that a map is only available during an operational session or in more permanent forms of memory such that the map is available at the next session or startup. In some embodiments, the map is further processed to identify rooms and other segments. In some embodiments, a new map is constructed at each use. In some embodiments, the map may be externally stored on another device such as the docking station or other base station of a VMP robot or in the cloud (e.g., in memory of a server at a remote data center) or other remote storage device.

Figure 126A:
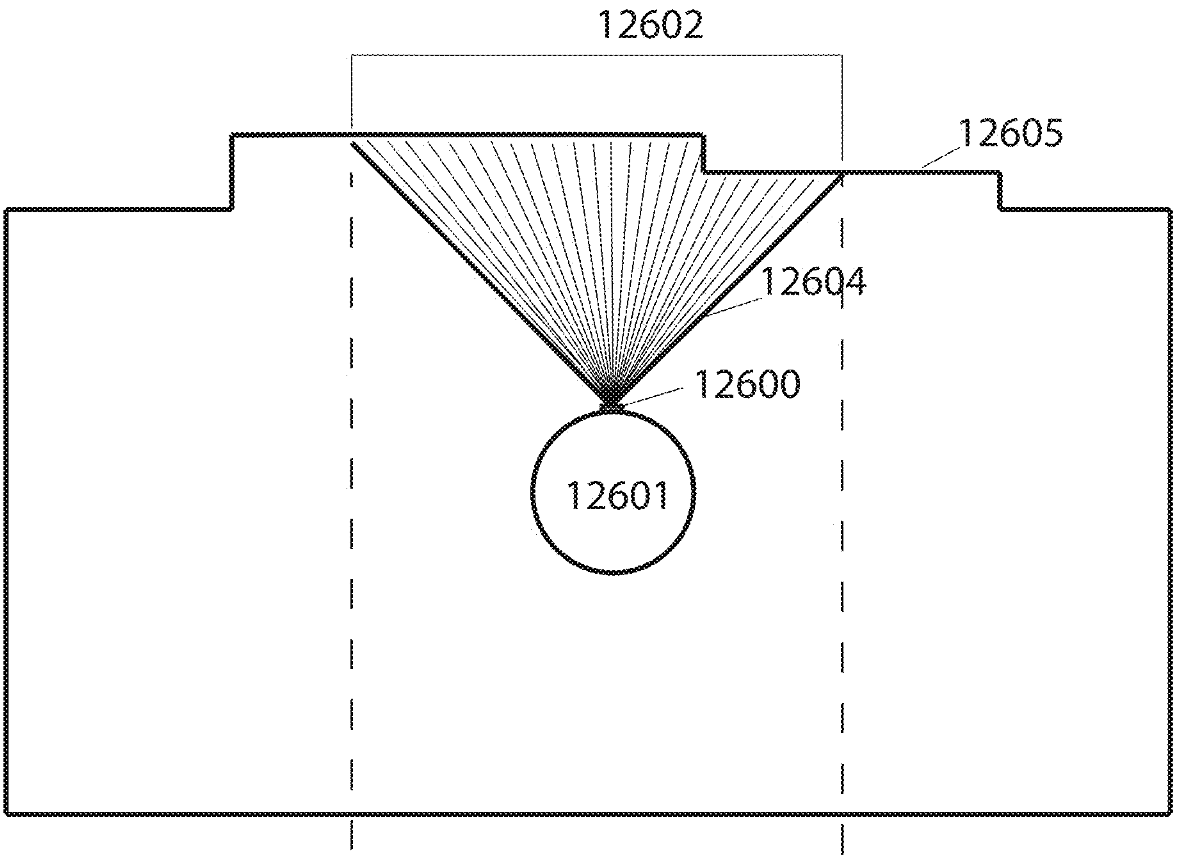
Figure 126B:
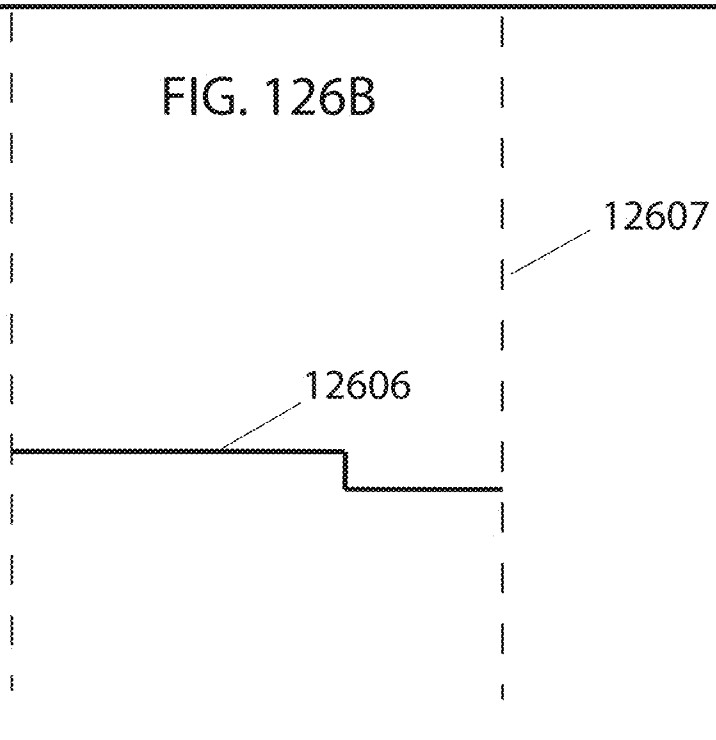

The door detection techniques described above apply to some embodiments of the depicted approach. For example, FIG. 126A illustrates an embodiment consistent with the above techniques wherein camera 12600 mounted on VMP robot 12601 is measuring distances 12602 within first field of view (i.e. field of view) 12604. Distance measurements 12602 taken by camera 12600 measure the distance from camera 12600 to object 12605, which in this case is a wall. FIG. 126B illustrates 2D perimeter segment 12606 resulting from plotted distance measurements 12602 taken within first field of view 12604. Dashed lines 12607 demonstrates that resulting 2D perimeter segment 12604 corresponding to distance measurements 12602 taken within field of view 12604. In some embodiments, 3D distance measurements are taken and plotted to construct 3D perimeter segments of the map.

Figure 127A:
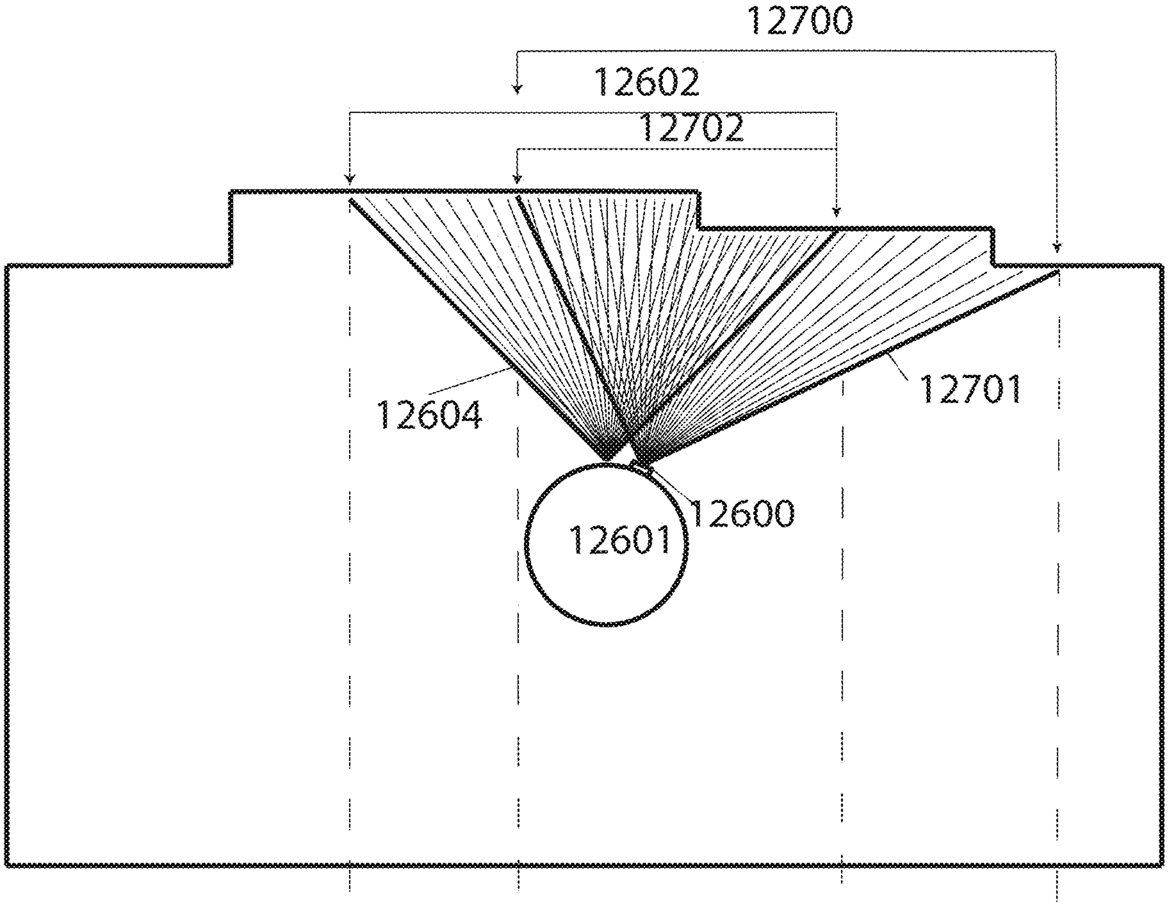

FIG. 127A illustrates camera 12600 mounted on VMP robot 12601 measuring distances 12700 within second field of view 12701 partly overlapping distance measurements 12602 within first field of view 12604. After distance measurements 12602 within first field of view 12604 are taken, VMP robot 12601 with mounted camera 12600 moves to observe overlapping second field of view 12701 and take distance measurements 12700. As VMP robot 12601 moves to observe second field of view 12701, the values of distance measurements 12602 taken within first field of view 12604 are adjusted to account for the movement of VMP robot 12601. Distance measurements 12702 represent the area of overlap between distance measurements 12602 taken within field of view 12604 and distance measurements 12700 taken within field of view 12701.

Figure 127B:
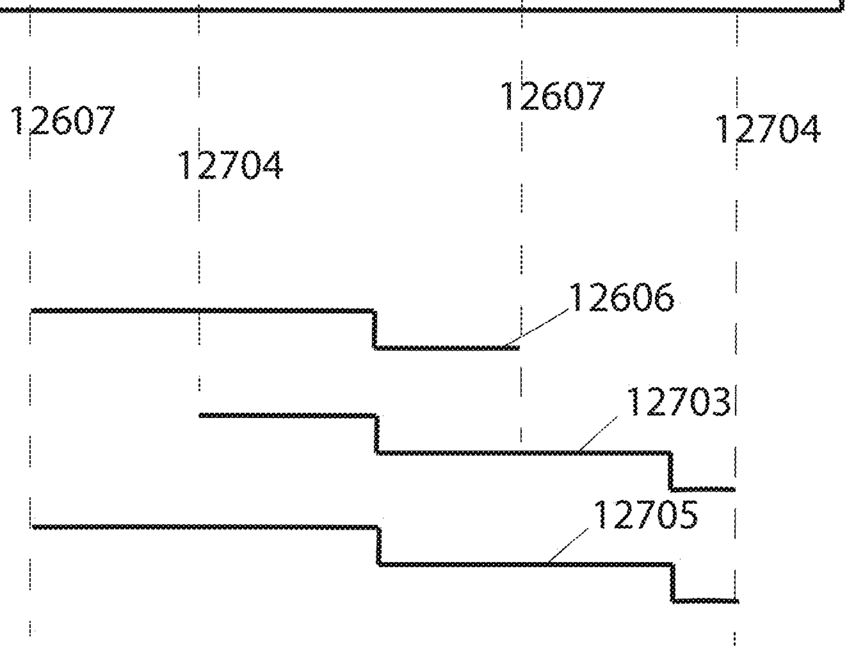

FIG. 127B illustrates 2D perimeter segments 12606 and 12703 resulting from distance measurements 12602 and 12700, respectively. While shown aligned, the processor may receive the data in a format in which each segment is in a distinct coordinate system, e.g., each in pixel coordinates of a different image. Segments 12606 and 12703 are bounded by dashed lines 12607 and 12704, respectively. 2D perimeter segment 12705 constructed from the combination of 2D perimeter segments 12606 and 12703 and bounded by the outermost dashed lines of 12607 and 12704 is also illustrated. Distance measurements 12700 captured within second field of view 12701 are compared to distance measurements 12602 captured within first field of view 12604 to identify the area of overlap bounded by the innermost dashed lines of 12704 and 12607. The processor of the VMP robot may compare measurements and determine the area of overlap using different methods. In some embodiments, an area of overlap may be identified in response to detecting an iteration of comparison in which a number of consecutive distance values measured from the first field of view and second field of view are equal or close in value. Although the values of overlapping distance measurements from the first and second fields of view may not be exactly the same, distances with similar values, to within a tolerance range of one another, can be identified (e.g., determined to correspond based on similarity of the values). For example, the processor may compute a root mean square (RMS) delta of values between consecutive fields of view at a spatial offset. The spatial offset is incremented until a first derivative of the RMS delta crosses zero or a global minimum is found. Furthermore, identifying matching patterns in the value of distances measured within the first and second fields of view can also be used in identifying the area of overlap. For example, a sudden increase then decrease in the distance values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the measured distances, can also be used to estimate the area of overlap. A Jacobian and Hessian matrix can be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric can be used to indicate how good of an overlap there is between the two sets of perceived depths, such as the Szymkiewicz-Simpson coefficient. Or some embodiments may determine an overlap with a convolution. Some embodiments may implement a kernel function that determines an aggregate measure of differences (e.g., a RMS value) between some or all of a collection of adjacent distance readings in one image relative to a portion of the other image to which the kernel function is applied. Some embodiments may then determine the convolution of this kernel function over the other image, e.g., in some cases, with a stride of greater than one pixel value. Some embodiments may then select a minimum value of the convolution as an area of identified overlap that aligns the portion of the image from which the kernel function was formed with the image to which the convolution was applied. Areas of overlap may also be identified in response to other detected comparisons. For example, the one or more processors of the VMP robot may use pixel patterns and/or features and/or patterns of columns, rows, and/or curves with high brightness (to which arcs or lines may be fitted) to determine overlapping points of similarities between two different images).

In some embodiments, the measured movement of VMP robot 12601 over one time step, as it moves from observing first field of view 12604 to observing second field of view 12701, is used to estimate the area of overlap between distance measurements 12602 and 12700 and is used to verify the identified area of overlap. In some embodiments, the area of overlap identified using the methods described above is verified if the identified overlap is within a threshold angular distance of the overlap estimated using measured movement. In some embodiments, the processor uses the measured movement to choose a starting point for the comparison between measurements from the first field of view and measurements from the second field of view. For example, the processor uses the measured movement to choose a starting point for the comparison between measurements from the first field of view and measurements from the second field of view. The processor iterates using a method such as that described above to determine the area of overlap. The processor verifies the area of overlap if it is within a threshold angular distance of the overlap estimated using measured movement.

In some embodiments, measured movement of VMP robot 12601 may be used as the primary method of determining the area of overlap. Movement measuring devices such as odometer, gyroscope, structure from motion, and optical flow sensor may be used to measure movement of VMP robot 12601. In some embodiments, the processor stores the movement data in a movement vector and transforms all distance measurements to correspond to, for example, an initial coordinate system of a first field of view observed by the camera coinciding with a stationary coordinate system. For example, in an embodiment where C is a stationary Cartesian coordinate system, C0 may be the observed coordinate system of a first field of view of a camera fixed to a VMP robot at time t0 with state S and coinciding with stationary coordinate system C. The VMP robot with attached camera displaces and the camera observes coordinate system C1 of a second field of view of the camera at time t1 with state S'. A movement measuring device measures the movement vector V with values (x, y, theta) as the VMP robot moves from observing a first field of view to a second field of view. The processor uses the movement vector V to transform distances observed in coordinate system C1 of the second field of view to corresponding distances in coordinate system C0 of the first field of view, coinciding with static coordinate system C. The movement vector V allows all measurements corresponding to different coordinate systems of different fields of view observed to be transformed to a single coordinate system, such as the static coordinate system C, thereby allowing all perimeters to correspond to a single coordinate system. Further details of this method are provided in U.S. patent application Ser. No. 16/163,508, the entirety of which is hereby incorporated by reference.

2D perimeter segment 12606 from plotted distance measurements taken within first field of view 12604 and 2D perimeter segment 12703 from plotted distance measurements taken within second field of view 12701 may be combined at the area of overlap to construct larger 2D perimeter segment 12705. When the values of overlapping distance measurements from field of view 12604 and 12701 within the area of overlap are slightly different, an analytical method, such as a data or sensor fusion algorithm, averaging, minimum sum of errors, or any other suitable method is used to calculate a single distance value for each pair of overlapping distance measurements that can result in a more accurate ground truth as compared to the distance measurements initially taken. In some embodiments, the processor of the VMP robot may select an analytical method, such data or sensor fusion algorithms, minimum mean square error or sum of squared residuals minimization or any other method to merge multiple data sets together. Further, the one or more processors of the VMP robot may additionally use other mathematical processing to improve accuracy of the data in order to achieve better alignment between successive sets of overlapping distance measurements.

In some embodiments, this method is repeated such that distance measurements captured within successively overlapping field of views may be combined to construct the perimeters of the entire map.

Figure 128:
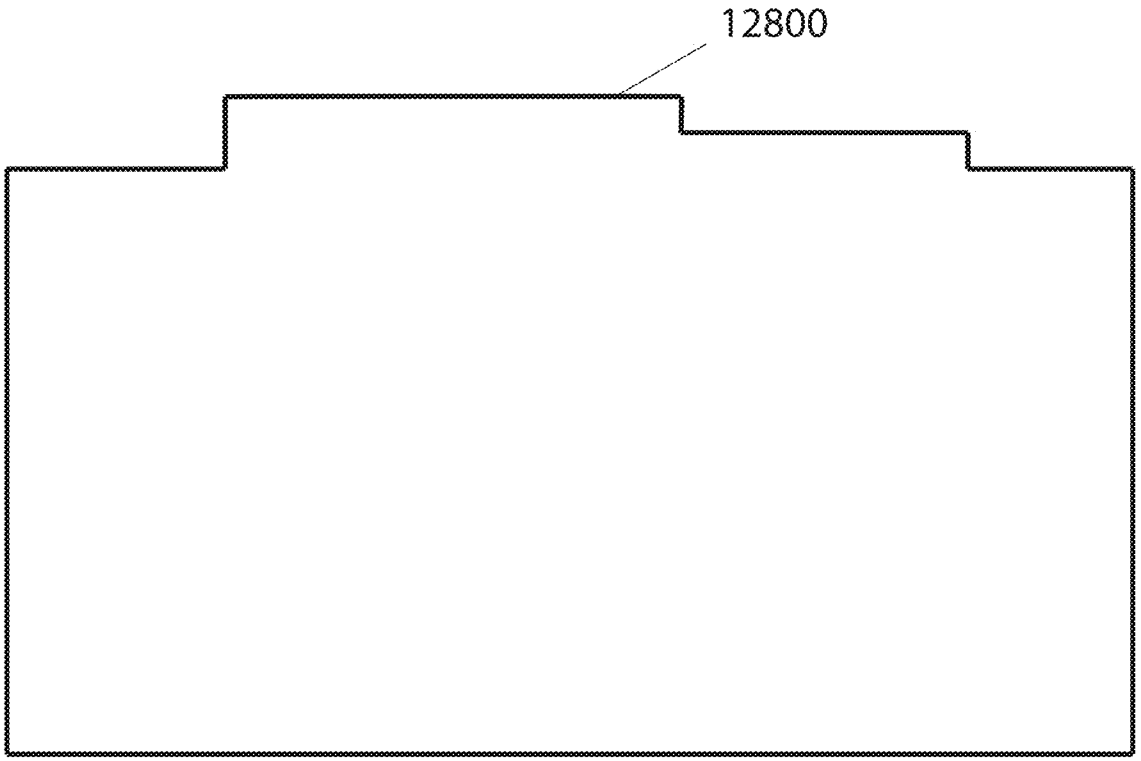

FIG. 128 illustrates data produced by an embodiment where complete closed loop 2D perimeter 12800 is constructed from plotted distance measurements taken within successively overlapping field of views. 2D perimeter 12800 can, for example, be used by VMP robot 12601 with mounted camera 12600 to autonomously navigate within the map during operation. Some embodiments may determine a coverage path based on the area bounded by perimeter 12800.

Figure 129A:
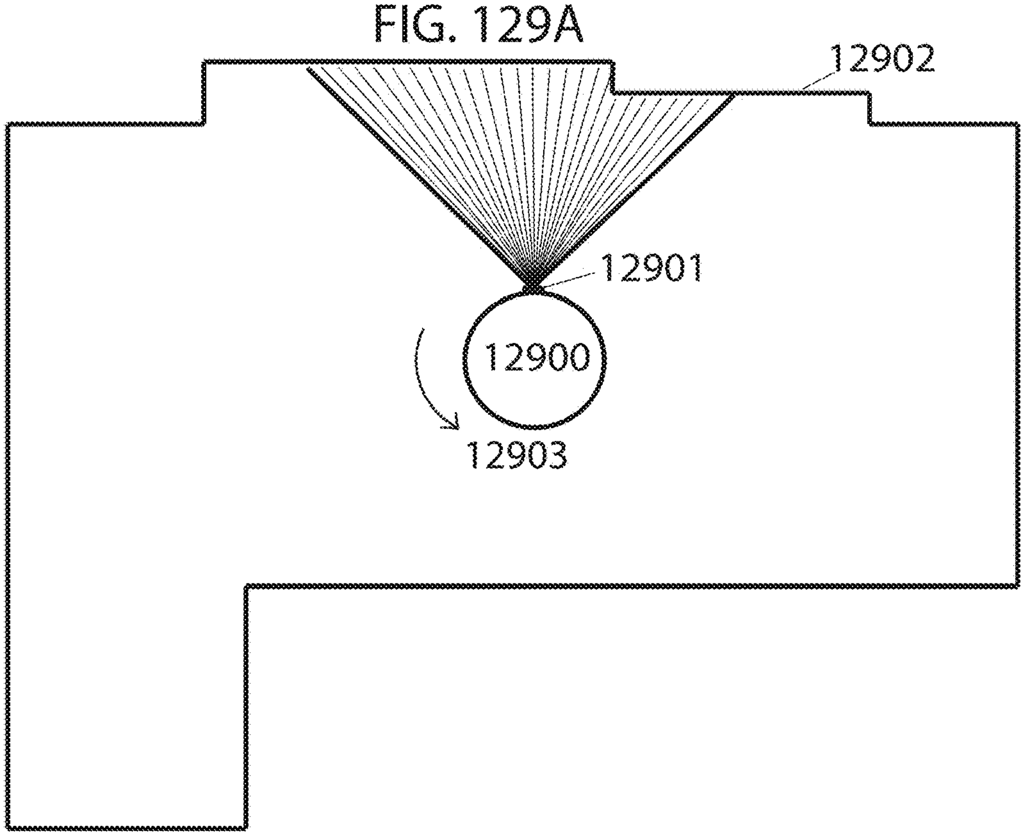
Figure 129B:
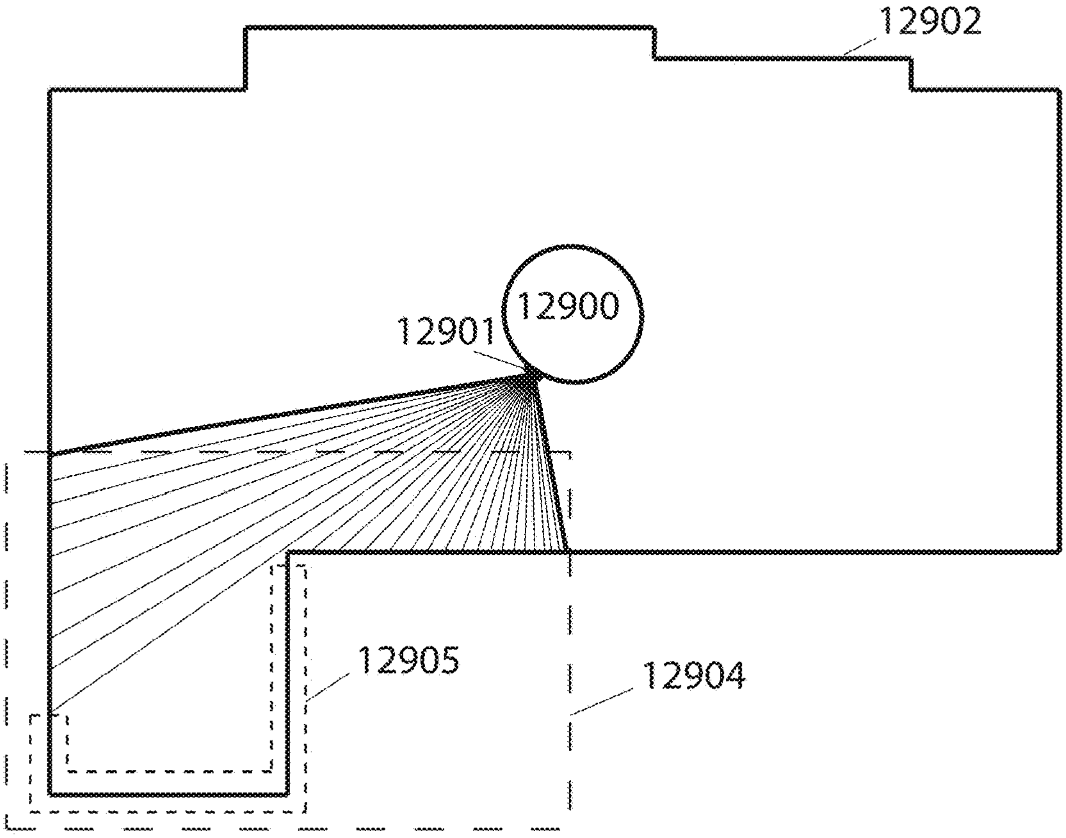

In some instances, the perimeters of the map are incomplete where gaps are observed within the perimeters due to lack of distance measurements. The lack of distance measurements may be due to, for example, an opening in the wall, blind spots unseen by the measuring device or a lack of data resulting from a measuring device with inadequate detection range. FIG. 129A illustrates VMP robot 12900 with mounted camera 12901 rotating in direction 12903 while taking distance measurements within field of view 12904. In this example, VMP robot 12900 is attempting to plot a 2D perimeter from distance measurements taken within successively overlapping field of views by rotating camera 12901 by 360 degrees. At this first-time point, camera 12901 is able to detect wall 12902 within field of view 12904 of camera 12901. FIG. 129B illustrates VMP robot 12900 with mounted camera 901 taking distance measurements within field of view 12906 at a second-time point. Although the position of VMP robot 12900 is approximately at the center of map 12907, camera 12901 cannot detect wall 12902 in area 12905 within field of view 12906 due to the shape of map 12907.

Figure 129C:
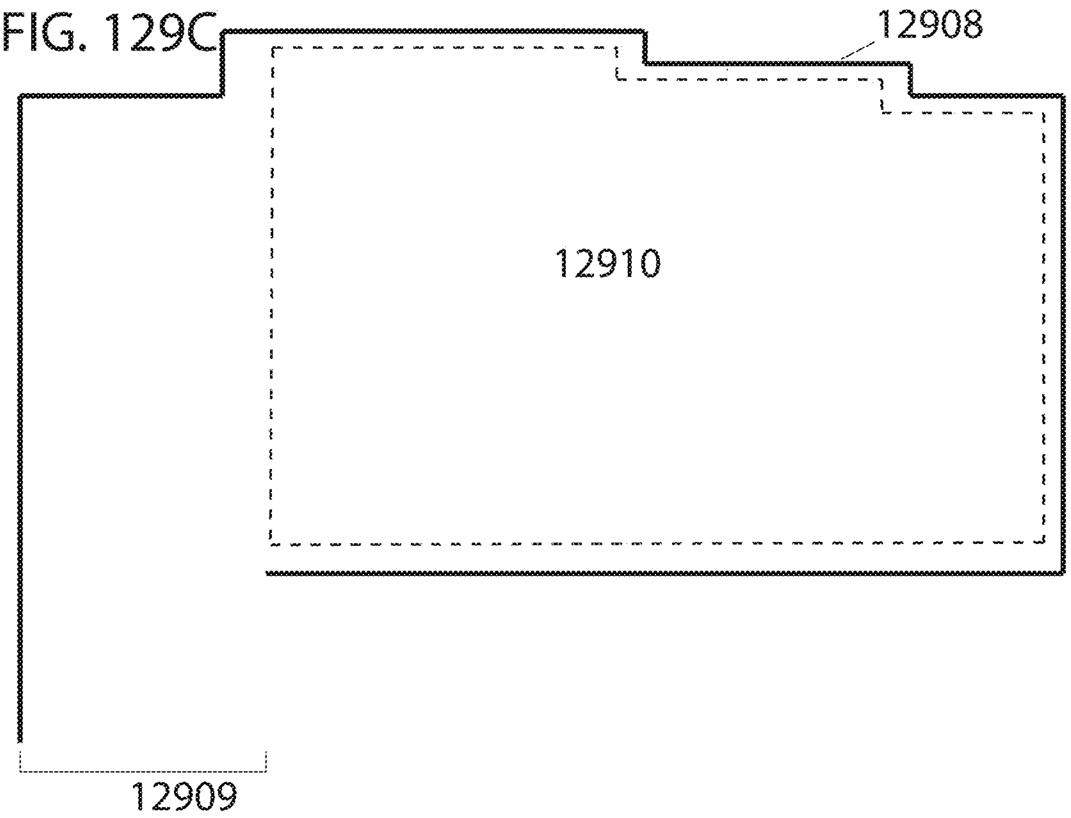

FIG. 129C illustrates resulting incomplete perimeters 12908 of map 12907. Perimeters 12908 are incomplete as distances were not measured for a section of map 12907 due to a blind spot unseen by camera 12901, resulting in undiscovered area 12909 within which a gap exists. Despite the gap, incomplete perimeters 12908 are used by VMP robot 12900 to perform work in discovered area 12910 of map 12907 as described above. As VMP robot 12900 covers area 12910 it marks (e.g., in memory, on a map) covered areas within perimeters 12908 to avoid repeat coverage. While performing work in discovered area 12910, VMP robot 12900 continues to take distance measurements and merge them with existing perimeters 12908 to close any gaps which may exist. In some embodiments, discovered area 12910 is segmented into sections and VMP robot 12900 performs work in each section successively, beginning with sections closest to VMP robot 12900 and ending with the sections furthest away from VMP robot 12900. For illustrative purposes, assume after completing coverage in discovered area 12910, undiscovered area 12909 within which a gap located still exists. In some embodiments, VMP robot 12900 then travels towards undiscovered area 12909 while taking distance measurements.

For example, some embodiments may form a double connected edge list (DCEL) and then select edges of the perimeters having only one vertex in the list. Embodiments may then navigate the VMP robot to an opposing vertex of the selected edges that is not part of the DCEL. Or some embodiments may cause the VMP robot to traverse a path in an arc centered on such a point while facing the point.

VMP robot 12900, in some embodiments, explores undiscovered area 12909 wherein a gap is identified by taking distance measurements and combining them with previously measured overlapping distance measurements until the gap in undiscovered area 12909 no longer exists. In some embodiments, VMP robot 12900 performs work in the new areas it discovers as it explores undiscovered area 12909 wherein the gap is located. If VMP robot 12900 does perform work in newly discovered areas during exploration, in some embodiments, newly discovered areas are split into sections and VMP robot 12900 covers them one at a time.

Figure 129D:

In some embodiments, VMP robot 12900 explores undiscovered area 12909 wherein the gap is located in perimeters 12908 before performing work in discovered area 12910. In any case, as VMP robot 12900 moves, it marks areas covered within perimeters 12908 to avoid repeat coverage. In some embodiments, VMP robot 12900 uses marked areas within the perimeters of the map to decide whether to cover marked areas again based on the path of the VMP robot, the user settings, and/or its coverage algorithm. FIG. 129D illustrates complete closed loop perimeters 12911 of map 12907 after exploration of undiscovered area 12909 is complete. In some embodiments, after exploring undiscovered areas within which identified gaps are located and covering all discovered areas within the perimeters, the VMP robot moves along the perimeters while using sensory devices to verify that no additional gaps exist.

Figure 129E:
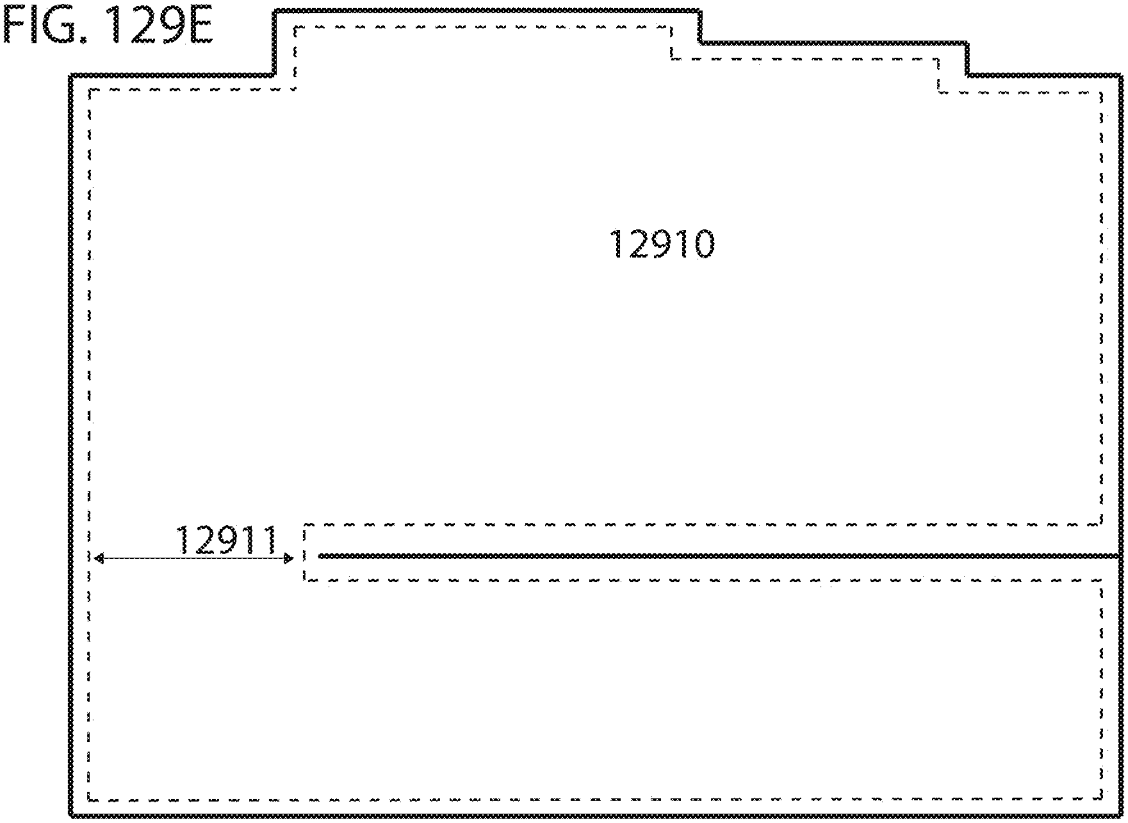
Figure 129F:
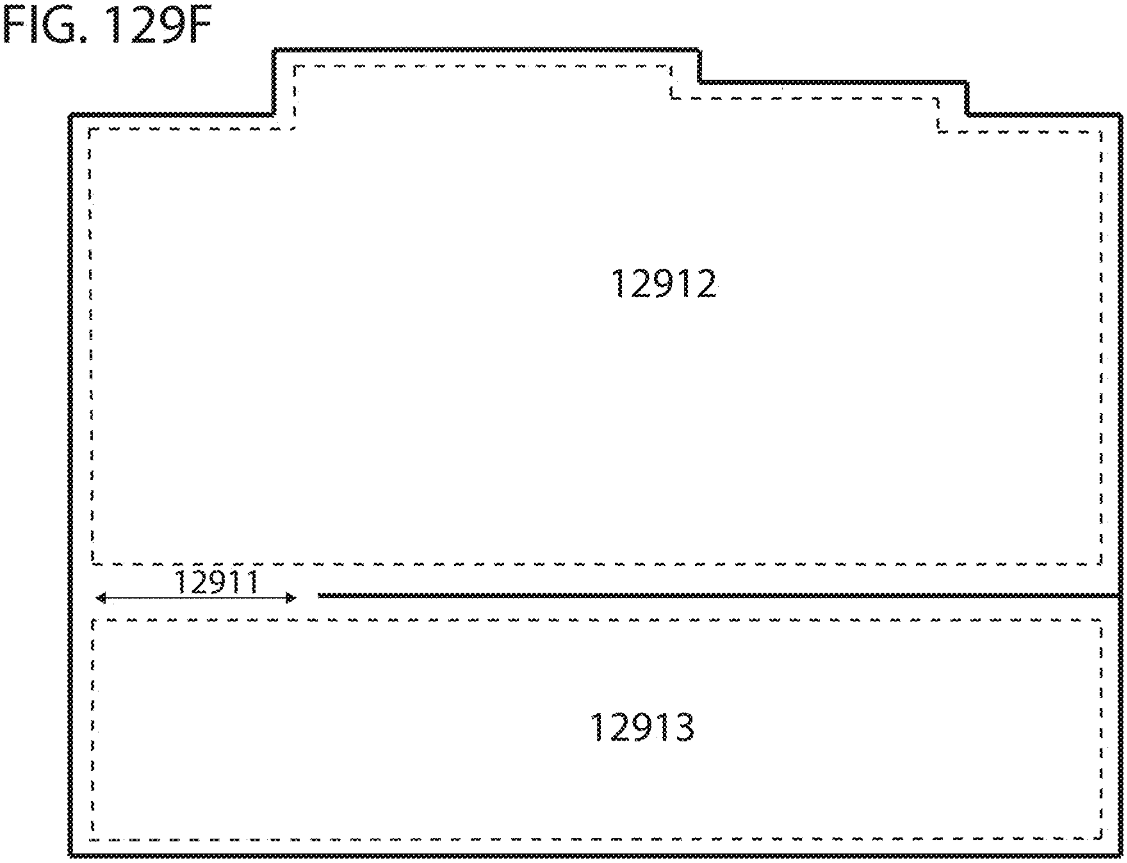

FIG. 129E illustrates an embodiment wherein VMP robot 12900 discovers an extension to discovered area 12910 upon exploring the undiscovered area within which a gap was located (FIG. 129D). The VMP robot may determine, based on sensed data, that the initially observed gap in the perimeters was due to opening in the wall 12911 separating two areas using the techniques discussed above. Opening in the wall 12911 can be used to segment total area 12910 outlined by dashed lines in FIG. 129E using the techniques discussed above, into smaller subareas 12912 and 12913 each separately outlined by dashed lines in FIG. 129F. Subareas 12912 and 12913 may be treated independently, wherein the VMP robot can be programmed to operate and execute tasks within a particular subarea. For example, the VMP robot may be programmed to execute a wall-follow coverage algorithm in subarea 12912 and rectangular-spiral coverage algorithm in subarea 12913, or to only clean subarea 12913, or to clean subarea 12912 and 12913 on particular days and times. In some embodiments, unique tags, such as a number or any label, can be assigned to each subarea. In some embodiments, the user assigns unique tags to each subarea, and embodiments receive this input and associate the unique tag (such as a human-readable name of a room, like "kitchen") with the area in memory. Some embodiments may receive instructions that map tasks to areas by these unique tags, e.g., a user may input an instruction to the VMP robot in the form of "vacuum kitchen," and the VMP robot may respond by accessing the appropriate map in memory that is associated with this label to effectuate the command. In some embodiments, the VMP robot assigns unique tags to each subarea. For example, 12912 and 12913 can be considered unique tags used to identify two separate subareas. The unique tags can be used to set and control the operation and execution of tasks within each subarea and to set the order of coverage of each subarea. For example, the VMP robot can be programmed to cover subarea 12912 first and subarea 12913 last. In some embodiments, the order of coverage of the subareas is such that repeat coverage within the total area is minimized. In another embodiment, the order of coverage of the subareas is such that coverage time of the total area is minimized. The order of subareas can be changed depending on the task or desired outcome. The example provided only illustrates two subareas for simplicity but can be expanded to include multiple subareas, spaces, or environments, etc.

In some embodiments, an opening in the wall separating two rooms is identified as a doorway. For example, consider FIG. 130A, where first room 13000, opening in the wall 13001, and an area beyond 13001 are discovered. In some embodiments, to identify opening in the wall 13001 as a doorway, a VMP robot may cover first internal space 13002 within first room 13000 but remain distanced from the boundaries detected as illustrated in FIG. 130B. The VMP robot may then cover second internal space 13003 within the first room 13000, but this time reaches closer to the boundaries detected. The processor of the VMP robot may record covered areas. For example, the processor may mark areas covered within a map or record coordinates corresponding to areas covered. Other methods of recording areas covered may also be used. Distances 13004 between the outer edge of recorded first internal space 13002 covered and recorded second internal space 13003 covered, beyond first internal space 13002, are determined. Recorded areas from second internal space 13003 that are below threshold distance 13005 are discarded and remaining recorded area 13003, as shown in FIG. 130C, is referred to as an outside space. Centroids 13006 and 13007 of first internal space 13002 and outside space 13005, respectively, are determined and path line 13008 between centroids 13006 and 13007 is created. Path line 13008 passing through first internal space 13002 and outside space 13005 may be trimmed leaving only path line 13008 connecting the outer edge of first internal space 13002 to outer edge of outside space 13005 as shown in FIG. 130D. The processor of the VMP robot then marks opening in the wall 13001 as a doorway using an iterative process where theoretical doorway line 13009 perpendicular to path line 13008 connecting the outer edge of first internal space 13002 and the outer edge of outside space 13005 is fit to perimeter 13010. At each iteration, doorway line 13009 moves further along path line 13008, beginning closer to first internal space 13002, until doorway line 13009 aligns with perimeter 13010, at which point the one or more processors identify doorway line 13009 as a doorway and designated as such in memory.

In some embodiments, as in the case shown in FIG. 130E, the line of sight of the VMP robot is limited and only a small area beyond opening in the wall 13001 in room 13000 is discovered. In such cases, the VMP robot moves closer to opening in the wall 13001 and scans to discover enough area beyond opening in the wall 13001 before initiating the steps described above for identifying a doorway. To find the optimal location to move to, such that the VMP robot is able to best discover opening in the wall 13001 and beyond, lines 13011 normal to frontier 13012 of the area to be discovered are determined as illustrated in FIG. 130F. From normal lines 13011, a series of rays 13013 are used to find a location suitable for the VMP robot to move to by first defining area 13014 through which rays 13013 pass. The defined area may, for example, be marked in a map or coordinates corresponding to the defined area may be recorded in memory. To ensure (or increase the likelihood that) the VMP robot is not too close to frontier 13012, defined area 13014 is trimmed such that areas close to frontier 13012 are eliminated, as shown in FIG. 130G. Centroid 13015 of defined area 13014 may then be used as the location the VMP robot moves to in order to discover opening in wall 13001 and beyond. In other embodiments, other locations within defined area 13014 may also be used. In some cases, the opening in the wall is simply a depression and the steps described for identifying a doorway are not required as described herein.

FIG. 131 depicts an example of a VMP robot 13100 with processor 13101, memory 13102, a first set of sensors 13103, second set of sensors 13104, network communication 13105, movement driver 13106, timer 13107, and more or more cleaning tools 13108. The first and second set of sensors 13103 and 13104 may include depth measuring devices, movement measuring devices, and the like. In some embodiments, the VMP robot may include the features of a VMP robot described herein. The shape of the illustrated features is not meant to imply that the VMP robot has a round shape or that any feature has any particular shape. In some embodiments, program code stored in the memory 13102 and executed by the processor 13101 may effectuate the operations described herein. Some embodiments additionally include user device 13109 having a touchscreen 13110 with a software application coupled to the VMP robot 13100.

FIG. 132 illustrates a flowchart describing embodiments of a path planning method of a VMP robot 13200, 13201, 13202, 13203, 13204, 13205 and 13206 corresponding with steps performed in some embodiments.

In some embodiments, a precision coefficient is calculated for each distance measurement. The value of the precision coefficient of a distance measurement is influenced by the value of the precision coefficient of distance measurements within its vicinity, the number of close-by distance measurements with high precision coefficient, the similarity between and the number of overlapping distance measurements recorded within separate field of view. For example, if the values of overlapping distance measurements from two successive field of views within the overlapping area are exactly the same, the value of the precision coefficient may have more positive change than if the values of overlapping distance measurements need a slight mathematical adjustment to be aligned together. In some embodiments, a tolerance range within which distance measurements are expected to fall within is established and the position of a distance measurement with respect to the tolerance range influences the value of its precision coefficient. In other embodiments, the value of the precision coefficient of distance measurements is influenced by the size of the overlapping area within which the distance measurement lies. For example, if the area of overlap between two successive field of view is large, the value of precision coefficient of distance measurements within the area of overlap may be more positively influenced and may be a better estimate of the ground truth than if they lied within a smaller area of overlap.

In some embodiments, more than two sets of distance measurements may overlap. The combination of increased number of overlapping sets of distance measurements results in distance measurements with more accurate ground truth. In other embodiments, each distance measurement overlaps with at least one other distance measurement taken from another field of view (i.e. field of view).

While the examples and illustrations provided apply the some of the present techniques to the construction of a 2D perimeters using 2D distance measurements, the 2D perimeters may be constructed using 3D distance measurements as well. Furthermore, embodiments may construct 3D perimeters of the map using 3D distance measurements. The 3D perimeters of the map may be plotted using at least one camera, such as a distance measuring camera, capable of taking 3D distance measurements. 3D distance measurements taken within overlapping field of views may be combined at identified areas of overlap where overlapping distance measurements are used as the attachment points. In some embodiments, 2D perimeters can be extracted from the plotted 3D perimeters.

In some embodiments, the map is constructed in a coordinate system, where measured distances are expressed in coordinates and marked within the coordinate system. The coordinate system can be a Cartesian, polar, or homogenous coordinate system or any other coordinate system. In some embodiments, distances expressed in one type of coordinate system may be translated to another type of coordinate system. For example, distances expressed as Cartesian coordinates may be translated to polar, homogenous or any other type of coordinates or distances expressed as polar coordinates may be translated to Cartesian, homogenous or any other type of coordinates. Translated coordinates may be marked within a corresponding coordinate system to plot the perimeters.

The resulting plot of the perimeters may be encoded in various forms. For instance, some embodiments may construct a point cloud of three dimensional points by transforming vectors into a vector space with a shared origin, e.g., based on the above-described vectors, in some cases displacement vectors may be used and refined based on measured depths. Some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when plotting.

In embodiments, constructing the map of the environment from 3D point clouds can be advantageous as certain features that may be indistinguishable in a 2D point cloud may be identified in a 3D point cloud. For example, with 2D point clouds, depth readings to objects are only captured at a particular height, therefore, if there is an obstacle in the surface of an environment, such as a bump, the processor of the VMP robot may be unaware. However, with a 3D point cloud, the obstacle may be observed as sensors of the VMP robot may take readings in all three directions. For example, FIG. 133A illustrates top and side view of robotic vacuum 13300 and readings 13301 taken in the x- and y-direction by sensor 13302. Since readings 13301 are only taken in the x- and y-direction, slight slope 13303 may be identified as an obstacle, such as a wall, resulting in robotic vacuum 13300 avoiding area 13304 while it is actually accessible by robotic vacuum 13300 for cleaning. FIG. 133B illustrates top and side views of robotic vacuum 13300 and readings 13305 taken in the x-, y-, and z-direction by sensor 13302. Since readings 13305 are taken in the x-, y-, and z-direction, slight slope 13303 may be identified as a climbable obstacle resulting in robotic vacuum 13300 cleaning area 13304. In embodiments, the control system of the VMP robot may be trained using deep learning to distinguish between features such as, climbable bump, unclimbable bump, wall, and furniture within the working environment. For example, FIG. 134 illustrates VMP robot 13400 and readings 13401 taken in the x-, y-, and z-direction by sensor 13402. The processor of VMP robot 13400 may distinguish protrusion 13403 and slope 13404 within the 3D point cloud and based on their features may classify them as climbable or unclimbable obstacles. For example, protrusion 13403 may be classified as climbable while slope 13404 may be classified as unclimbable. In some embodiments, a protrusion and/or slope may be distinguished as climbable or unclimbable based on the reward historically generated for past protrusions and/or slopes with similar features to those being considered, wherein the magnitude of the reward may be based on the level of completion of the climbing path.

In some embodiments, more than one camera may be used to improve accuracy of the map. For example, a plurality of distance measuring cameras (e.g., carried by the VMP robot) may be used simultaneously (or concurrently) wherein distance measurements from each camera are used to more accurately plot the perimeters of the map. The use of a plurality of distance measuring cameras is expected to allow for the collection of distance measurements from different perspectives and angles, for example. Where more than one distance measuring camera is used, triangulation or others suitable methods may be used for further data refinement and accuracy. In some embodiments, a 360-degree LIDAR is used to create perimeters of the map. It should be emphasized, though, that embodiments are not limited to techniques that construct maps in this way, as the present techniques may also be used for plane finding in augmented reality, barrier detection in virtual reality applications, outdoor mapping with autonomous drones, and other similar applications, which is not to suggest that any other description is limiting. In some embodiments, other mapping methods may be used in generating a spatial representation of the surroundings, such as the mapping methods described in U.S. patent application Ser. Nos. 16/048,179, 16/048,185, 16/163,541, 16/163,562, and 16/163,508, the entire contents of which are hereby incorporated by reference.

In some embodiments, the processor of the VMP robot may generate multiple maps of the environment over multiple working sessions. The maps may be stored in a memory of the VMP robot and may be combined with previously generated maps to keep the map of the environment up to date. In some embodiments, a predetermined map of the environment may be generated and stored in an internal memory of the VMP robot. In some embodiments, the VMP robot may generate a map of the environment during operation in the environment. In some embodiments, the processor may update the internal map of the environment with observations collected during each successive work session. Continuous updates to the map of the environment may help establish the most efficient path of the VMP robot. In some embodiments, the processor of the VMP robot generates a local map and a global map. In some embodiments, the processor integrates the local map into the global map. In some embodiments, the processor only observes a portion of the global map that is local relative to the location of the VMP robot. In some embodiments, one or more local maps are superimposed on a global map. In some instances, local maps are combined to create a global map. In some instances. The processor generates a local map and determines its location based on locating the local map within the global map by detecting similar features between the two maps.

The VMP robot may, for example, use the map to autonomously navigate the environment during operation, e.g., accessing the map to determine that a candidate route is blocked by an obstacle denoted in the map, to select a route with a route-finding algorithm from a current point to a target point, or the like. To avoid false detection of an obstacle, in some embodiments, each location within the map is assigned an obstacle probability indicating the probability of an obstacle existing in each respective location. The obstacle probability assigned to a particular location increases each time an obstacle is observed in the particular location, and the processor qualifies an obstacle as existing in a particular location only when the obstacle probability is greater than a predetermined threshold. For example, all locations in a map are initially set to an obstacle probability of 0.25 (i.e., 25% chance that an obstacle exists in each location). When an obstacle is observed in a particular location, the obstacle probability increases to 0.325, and if observed a second time in the same particular location the obstacle probability increases to 0.3925, and so on. When the obstacle probability assigned to a particular location is greater than 0.325, the processor qualifies an obstacle as existing in the particular location. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. Examples of methods for dividing an environment into zones are described in U.S. patent application Ser. Nos. 14/817,952, 16/198,393, and 15/619,449, the entire contents of which are hereby incorporated by reference. In some embodiments, a new map is constructed at each use, or an extant map is updated based on newly acquired data.

In some embodiments, the memory of the VMP robot may include an internal database of obstacles likely to be encountered within the environment. In some embodiments, an obstacle encountered in the environment may be identified using various sensors to capture features of the obstacle and the processor may determine the type of obstacle based on the internal database. The processor may note the increased likelihood of that type of obstacle being located in the region of the environment in which it was encountered. In some embodiments, the processor may mark the location in the map. For example, images sensors of the VMP robot continuously capture images, and if the VMP robot encounters a wire on the floor, the processor analyzes images of the wire to extract features of the obstacle and compares them with features of obstacles within the internal database to determine that it is a wire. The processor may mark the region in which the wire was encountered within an internal map as a region with increased likelihood of containing a wire. In some embodiments, the processor may further determine if an obstacle may be overcome by the VMP robot. For example, the processor may determine if the wire is an obstacle that may be overcome by the VMP robot by, for example, driving over the wire. If so, the VMP robot may attempt to drive over the obstacle. If, however, the VMP robot encounters a large obstacle, such as a chair or table, the processor may determine that it cannot overcome the obstacle and may attempt to maneuver around the obstacle and continue along its path. In some embodiments, regions wherein obstacles are consistently encountered may be classified by the processor as a high obstacle density area and may be marked in the map of the environment. In some embodiments, the processor may attempt to alter its path to avoid high obstacle density areas. In some embodiments, the processor may alert a user when an unanticipated obstacle blocking the path of the VMP robot is encountered, particularly when the VMP robot may not overcome the obstacle by maneuvering around or driving over the obstacle. The VMP robot may alert the user by generating a noise, sending a message to an application of a communication device paired with the VMP robot or any other device paired with the VMP robot, displaying a message on a screen of the VMP robot, illuminating lights, and the like.

In some embodiments, the processor has access to multiple coordinate systems with different resolutions and is able to switch from one resolution to another depending on the accuracy required. For example, the processor of the VMP robot may use a high-resolution coordinate system when finding the perimeter of the place and a low-resolution coordinate system when covering the internal area of the place or moving from one location to another. As a further example, if the processor wants the VMP robot to remain distanced from obstacles the processor may use a low-resolution coordinate system. In some embodiments, the processor evaluates the performance of the VMP robot in executing actions using different coordinate system resolutions. In embodiments, the processor uses a Markov Decision Process (MDP) consisting of a sequence of states and actions followed by rewards. Actions are taken to transition from one state to another and, after transitioning to each new state, the processor assigns a reward. For a sequence of states and actions, the processor calculates a net reward as the sum of rewards received for the sequence of states and actions, with future rewards discounted. The expected net reward for the execution of a sequence of states and actions is given by a state-action value function. The processor is configured to find the optimal state-action value function by identifying the sequence of states and actions, including coordinate system resolution to use in executing the actions, with highest net reward. Since multiple actions can be taken from each state, the goal of the processor is to also find an optimal policy that indicates the action, including coordinate system resolution to use in executing the action, from each state with the highest reward value. For example, if the VMP robot is observed to bump into an obstacle while executing an action using a low-resolution coordinate system, the processor calculates a lower reward than when the VMP robot completes the same action free of any collision using a high-resolution coordinate system, assuming collisions with obstacles reduces the reward achieved. If this is repeated over time, the processor eventually derives a policy to execute that particular action using a high-resolution coordinate system as it achieves higher reward. In embodiments, as the VMP robot executes more actions using high- and low-resolution coordinate systems over time, data is gathered on the reward assigned to each state and action, the action including the coordinate system resolution used in executing the action. In embodiments, the processor compares the reward received for executing an action from one state to another using a high-resolution coordinate system and executing the same action using a low-resolution coordinate system. Over time the processor determines a policy that maximizes the net reward. In embodiments, the sequence of states and actions corresponds to the states visited and actions taken (including the resolution of the coordinate system used in completing each action) while, for example, executing a work session from start to finish. Over time, as more states are visited and different actions from each state are evaluated, the system will converge to find the most optimal action (including the resolution of the coordinate system used in completing each action) to take from each state thereby forming an optimal policy. Further, as different sequences of states and actions are evaluated over time, the system will converge to the most optimal sequence of states and actions. For example, consider the states visited and actions taken from each state while cleaning a room using a high and low-resolution coordinate system. If the VMP robot has multiple encounters with obstacles and coverage time is increased while executing actions from different states during the cleaning session the processor calculates a lower net reward (assuming collisions and cleaning time are factors in determining the reward value) than when completing the cleaning session collision free using a high-resolution coordinate system. If this is continuously observed over time, the processor derives a policy to use a high-resolution coordinate system for the particular actions taken while cleaning the room. In this example, only two levels of coordinate system resolution are considered for illustrative purposes, however, the processor can consider a greater number of different resolution levels.

In some embodiments, the VMP robot is configured with a first exteroceptive sensor (e.g., depth sensor) and a second proprioceptive sensor (e.g., gyroscope, such as in a three or six axis inertial measurement unit (IMU)), the data of which the processor uses simultaneously and interchangeably for mapping and localization of the VMP robot. In some embodiments, data from one sensor is used in a primary method for mapping and localization while data from the other sensor is used in a secondary method for mapping and localization. The processor uses the secondary method for mapping and localization when, for example, the sensor used in the primary method for mapping and localization malfunctions, becomes unusable or is functionally affected by the environment. For example, in direct sunlight a first exteroceptive sensor, such as a depth camera, may not provide the reliable readings required for a primary method for mapping and localization. In such instances, the processor uses a secondary method for mapping and localization using data from a second proprioceptive sensor, such as a gyroscope, to localize the VMP robot and mark the area covered by the VMP robot such that repeat coverage is avoided. The transition between the primary and secondary method may be seamless (e.g., occurring within less than 10 seconds, less than 1 second, or less than 500 milliseconds, and resulting in less than 1 cm, 10 cm, or 50 cm of error in position over 10 seconds of travel) and may be controlled with a finite state machine. In some embodiments, the processor uses the secondary method to verify output of the primary method. In some embodiments, one sensor is active (e.g., depth sensor emitting light to the environment and measuring reflected light) and the other sensor is passive (e.g., gyroscope measuring movement). For example, data from a digital camera (i.e., passive sensor) is used in a primary method for mapping and localization and data from a wheel encoder (i.e., active sensor) is used in a secondary method for mapping and localization.

In some embodiments, IMU measurements in a multi-channel stream indicative of acceleration along three or six axes may be integrated over time to infer a change in pose of the VMP robot, e.g., with a Kalman filter. In some cases, the change in pose may be expressed as a movement vector in the frame of reference of the room through which the VMP robot moves. Some embodiments may localize the VMP robot or map the room based on this movement vector (and contact sensors in some cases) even if the camera is inoperative or degraded. In some cases, IMU measurements may be combined with image-based (or other exteroceptive) mapping data in a map or localization determination. Or in some cases, data from one active sensor may be used at a time for localization or mapping, and the other sensor may remain passive, e.g., sensing data, but that data may not be used for localization or mapping while the other sensor is active. Some embodiments may maintain a buffer of sensor data from the passive sensor (e.g., including measurements over a preceding duration, like one second or ten seconds), and upon failover from the active sensor to the passive sensor, which may then become active, some embodiments may access the buffer to infer a current position or map features based on both currently sensed data and buffered data. In some embodiments, the buffered data may be calibrated to the location or mapped features from the formerly active sensor, e.g., with the above-described sensor fusion techniques.

In some embodiments, the VMP robot is configured with high resolution sensors, the data of which the processor uses to locally enhance observed perimeters. For example, a VMP robot may be configured with a long-range, low-resolution depth camera and a short-range (e.g., 50 cm), high-resolution TOF sensor. The processor may use the TOF sensor to locally discover perimeters. In embodiments, the processor combines locally discovered perimeters with globally discovered perimeters. In some embodiments, the VMP robot visits perimeters discovered after a first mapping session to observe the perimeters using higher resolution sensors. In some embodiments, discovery of perimeters is executed offline and saved in a memory of the VMP robot or online wherein the perimeter map is saved to, for example, the cloud. In some embodiments, the perimeter map is updated online in an incremental manner.

In some embodiments, the processor uses captured sensor data of objects, such as walls or furniture, within the surrounding environment to update the location of the VMP robot within the perimeter map such that the processor is aware of the position of the VMP robot relative to perimeters and objects within the environment as it operates. As the VMP robot moves within the environment and sensors capture data, the processor tracks the position of the VMP robot relative to observed objects within the environment by associating newly captured data of objects with previously captured data of objects. Prior to associating newly captured sensor data of objects with previously captured sensor data of objects, the processor updates the estimated position of previously captured objects relative to the VMP robot based on the most recent state of the objects and the motion model of the VMP robot. In some embodiments, the processor associates new sensor data with previously captured sensor data of different objects within the environment by defining acceptance gates around current estimated positions of previously captured objects. The newly captured sensor data that falls within an acceptance gate of an object and is closest to the updated estimated position of the object is associated with the corresponding previously captured sensor data of the object. However, over time, as the VMP robot moves around the environment and observes more objects and collects more sensor data, determining to which previously captured object newly captured sensor data is associated to becomes increasingly challenging. In such instances, the processor uses a probabilistic data association filter (PDAF) to associate newly captured sensor data with previously captured sensor data of observed objects within the environment. The PDAF considers all sensor data falling within the acceptance gate, wherein instead of updating the position of an object based on a single best matched observation, the PDAF updates based on all observations falling within the gating window, weighted by their likelihoods. In some embodiments, the PDAF accounts for the statistical distribution of sensor data errors and clutter and assumes that only one of the candidate observations within the gating window is a match, and the rest are false alarms. In other embodiments, the processor uses other methods for tracking the location of the VMP robot within the perimeter map of the place during mapping and/or operation. For example, in one embodiment the processor uses scan matching techniques wherein the optimization algorithms, such as Gauss-Newton or Levenberg-Marquardt, are used to find the best match between scans by minimizing the error between the data of the scans.

In some embodiments, cliffs are marked as obstacles in the map. In some embodiments, cliffs are detected using edge sensors as described above. In some embodiments, the cliffs marked as obstacles in the map prevent the VMP robot from visiting the cliff area more than one time. Without the cliffs marked as obstacles in the map, the VMP robot may attempt to visit the cliff area multiple times. Although the cliffs are detected by the edge detection sensors and prevent the VMP robot from moving past the cliff, the processor may not learn that the cliff area is off limits and may try to visit the cliff area multiple times. By adding cliffs to the map as obstacles, the VMP robot may avoid returning to cliff area again during the same work session and in future work sessions if the map is saved. FIGS. 135A-135C illustrate how a movement path of the VMP robot may evolve over time. FIG. 135A illustrates the movement path 13500 of the VMP robot 13501 during a first time visiting cliff area 13502 of staircase 13503. After detecting cliff area 13502 for the first time, the processor marks the cliff area 13502 as perimeter, similar to perimeter of the wall 13504 adjacent to cliff area 13502. FIG. 135B illustrates the movement path 13505 of the VMP robot 13501 after visiting the cliff area 13502 a second time, wherein the processor treats the cliff area 13502 as a perimeter and follows along the perimeter without trying to cross over the perimeter as illustrated in FIG. 135A FIG. 135C illustrates a coverage path 13506 of the VMP robot 13501 after marking cliff area 13502 as an obstacle in the map. In future coverage of the environment, the VMP robot does not attempt to explore the cliff area with edge detection sensors by crossing over. The processor treats the cliff area as a perimeter of the environment and directs the VMP robot to move along a smooth line parallel to the cliff line as it if was a wall, as illustrated in the examples shown in FIGS. 135B and 135C.

In some instances where linear algebra is used, Basic Linear Algebra Subprograms (BLAS) may be implemented to carry out operations such as vector addition, vector norms, scalar multiplication, matrix multiplication, matric transpose, matrix-vector multiplication, linear combinations, dot products, cross products, and the like.

The techniques described herein, e.g., such as mapping and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a mapping chip or a processing chip with a mapping processing unit may be used.

In some embodiments, the processor localizes itself during mapping or during operation. In some embodiments, methods of localization are inherently independent from mapping and path planning but may be used in tandem with any mapping or path planning method or may be used independently to localize the VMP robot irrespective of the path or map of the environment. In some embodiments, the processor uses quantum SLAM.

In some embodiments, the processor localizes the VMP robot within an environment represented by a phase space or Hilbert space. In some embodiments, the space includes all possible states of the VMP robot within the space. In some embodiments, a probability distribution may be used by the processor of the VMP robot to approximate the likelihood of the state of the VMP robot being within a specific region of the space. In some embodiments, the processor of the VMP robot determines a phase space probability distribution over all possible states of the VMP robot within the phase space using a statistical ensemble including a large collection of virtual, independent copies of the VMP robot in various states of the phase space. In some embodiments, the phase space consists of all possible values of position and momentum variables. In some embodiments, the processor represents the statistical ensemble by a phase space probability density function $\rho(p,q,t)$, q and p denoting position and velocity vectors. In some embodiments, the processor uses the phase space probability density function $\rho(p,q,t)$ to determine the probability $\rho(p,q,t)dq\,dp$ that the VMP robot at time t will be found in the infinitesimal phase space volume dq dp. In some embodiments, the phase space probability density function $\rho(p,q,t)$ has the properties $\rho(p,q,t)\geq 0$ and $\int\rho(p,q,t)d(p,q)=1$, $\forall t\geq 0$, and the probability of the position q lying within a position interval a, b is $$P[a \le q \le b] = \int_a^b \int \rho(p, q, t)dpdq.$$

Similarly, the probability of the velocity p lying within a velocity interval c, d is $$P[c \le q \le d] = \int_c^d \int \rho(p, q, t)dqdp.$$

In some embodiments, the processor determines values by integration over the phase space. For example, the processor determines the expectation value of the position q by $\langle q\rangle=\int q\,\rho(p,q,t)d(p,q)$.

In some embodiments, the processor evolves each state within the ensemble over time t according to an equation of motion. In some embodiments, the processor models the motion of the VMP robot using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of phase space density function $\rho(p,q,t)$ under a Hamiltonian H using the Liouville equation $$\frac{\partial \rho}{\partial t} = -\{\rho, H\},$$

wherein $\{\cdot,\cdot\}$ denotes the Poisson bracket and H is the Hamiltonian of the system. For two functions $f$, g on the phase space, the Poisson bracket is given by $$\{f, g\} = \sum_{i=1}^{N} \left(\frac{\partial f}{\partial q_i}\frac{\partial g}{\partial p_i} - \frac{\partial f}{\partial p_i}\frac{\partial g}{\partial q_i}\right).$$

In this approach, the processor evolves each possible state in the phase space over time instead of keeping the phase space density constant over time, which is particularly advantageous if sensor readings are sparse in time.

In some embodiments, the processor evolves the phase space probability density function $\rho(p,q,t)$ over time using the Fokker-Plank equation which describes the time evolution of a probability density function of a particle under drag and random forces. In comparison to the behavior of the VMP robot modeled by both the Hamiltonian and Liouville equations, which are purely deterministic, the Fokker-Planck equation includes stochastic behaviour. Given a stochastic process with $dX_t=\mu(X_t,t)dt+\sigma(X_t,t)dW_t$, wherein $X_t$ and $\mu(X_t,t)$ are M-dimensional vectors, $\sigma(X_t,t)$ is a M×P matrix, and $W_t$ is a P-dimensional standard Wiener process, the probability density $\rho(x,t)$ for $X_t$ satisfies the Fokker-Planck equation $$\frac{\partial \rho(x,t)}{\partial t} = -\sum_{i=1}^{M}\frac{\partial}{\partial x_i}[\mu_i(x,t)\rho(x,t)] + \sum_{i=1}^{M}\sum_{j=1}^{M}\frac{\partial^2}{\partial x_i \partial x_j}[D_{ij}(x,t)\rho(x,t)]$$

with drift vector $\mu=(\mu_1, \ldots, \mu_M)$ and diffusion tensor $$D = \frac{1}{2}\sigma\sigma^T.$$

In some embodiments, the processor adds stochastic forces to the motion of the VMP robot governed by the Hamiltonian H and the motion of the VMP robot is then given by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p,q,t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D\nabla_p \rho),$$

wherein $\nabla_p$ denotes the gradient with respect to position p, $\nabla\cdot$denotes divergence, and $$D = \frac{1}{2}\sigma_N\sigma_N^T$$

is the diffusion tensor.

In other embodiments, the processor incorporates stochastic behaviour by modeling the dynamics of the VMP robot using Langevin dynamics, which models friction forces and perturbation to the system, instead of Hamiltonian dynamics. The Langevian equations are given by $M\ddot{q}=-\nabla_q U(q)-\gamma p+\sqrt{2\gamma k_B T M}R(t)$, wherein $(-\gamma p)$ are friction forces, $R(t)$ are random forces with zero-mean and delta-correlated stationary Gaussian process, T is the temperature, $k_B$ is Boltzmann's constant, $\gamma$ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla_p\cdot(\gamma M\nabla_p\rho)$ is a model of classical Brownian motion, modeling a diffusion process. In some embodiments, partial differential equations for evolving the probability density function over time may be solved by the processor of the VMP robot using, for example, finite difference and/or finite element methods.

FIG. 136A illustrates an example of an initial phase space probability density of a VMP robot, a Gaussian in (q,p) space. FIG. 136B illustrates an example of the time evolution of the phase space probability density after four time units when evolved using the Liouville equation incorporating Hamiltonian dynamics, $$\frac{\partial \rho}{\partial t} = -\{\rho, H\}$$

with Hamiltonian $$H = \frac{1}{2}p^2.$$

FIG. 136C illustrates an example of the time evolution of the phase space probability density after four time units when evolved using the Fokker-Planck equation incorporating Hamiltonian dynamics, $$\frac{\partial \rho}{\partial t} = -\{\rho, H\} + \nabla_p \cdot (D\nabla_p \rho)$$

with D=0.1. FIG. 136D illustrates an example of the time evolution of the phase space probability density after four time units when evolved using the Fokker-Planck equation incorporating Langevin dynamics, $$\frac{\partial \rho}{\partial t} = -\{\rho, H\} + \nabla_p \cdot (\gamma p \rho) + k_B T \nabla_p \cdot (\gamma M \nabla_p \rho)$$

with $\gamma=0.5$, T=0.2, and $k_B=1$. FIG. 136B illustrates that the Liouville equation incorporating Hamiltonian dynamics conserves momentum over time, as the initial density in FIG. 136A was only distorted in the q-axis (position). In comparison, FIGS. 136C and 136D illustrate diffusion along the p-axis (velocity) as well, as both evolution equations account for stochastic forces. With the Fokker-Planck equation incorporating Hamiltonian dynamics the density spread more equally (FIG. 136C) as compared to the Fokker-Planck equation incorporating Langevin dynamics where the density remained more confined (FIG. 136D) due to the additional friction forces.

In some embodiments, the processor of the VMP robot may update the phase space probability distribution when the processor receives readings (or measurements or observations). Any type of reading that may be represented as a probability distribution that describes the likelihood of the state of the VMP robot being in a particular region of the phase space may be used. Readings may include measurements or observations acquired by sensors of the VMP robot or external devices such as a Wi-Fi™ camera. Each reading may provide partial information on the likely region of the state of the VMP robot within the phase space and/or may exclude the state of the VMP robot from being within some region of the phase space. For example, a depth sensor of the VMP robot may detect an obstacle in close proximity to the VMP robot. Based on this measurement and using a map of the phase space, the processor of the VMP robot may reduce the likelihood of the state of the VMP robot being any state of the phase space at a great distance from an obstacle. In another example, a reading of a floor sensor of the VMP robot and a floor map may be used by the processor of the VMP robot to adjust the likelihood of the state of the VMP robot being within the particular region of the phase space coinciding with the type of floor sensed. In an additional example, a measured Wi-Fi™ signal strength and a map of the expected Wi-Fi™ signal strength within the phase space may be used by the processor of the VMP robot to adjust the phase space probability distribution. As a further example, a Wi-Fi™ camera may observe the absence of the VMP robot within a particular room. Based on this observation the processor of the VMP robot may reduce the likelihood of the state of the VMP robot being any state of the phase space that places the VMP robot within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot. (X make sure this covers switching between FOVs).

In embodiments, the processor of the VMP robot may update the current phase space probability distribution $\rho(p, q, t_i)$ by re-weighting the phase space probability distribution with an observation probability distribution $m(p, q, t_i)$ according to $$\bar{\rho}(p, q, t_i) = \frac{\rho(p, q, t_i) \cdot m(p, q, t_i)}{\int \rho(p, q, t_i) m(p, q, t_i) d(p, q)}.$$

Figure 137A:
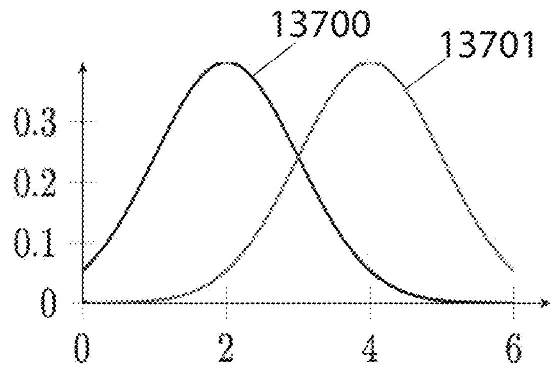
Figure 137B:
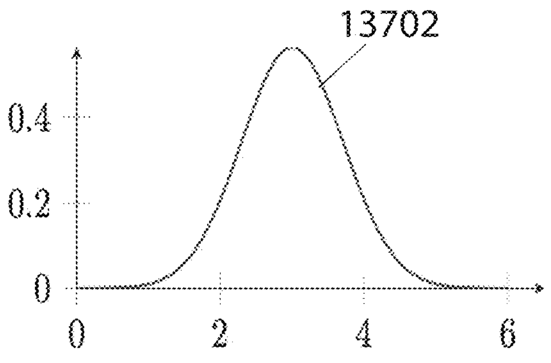
Figure 137C:
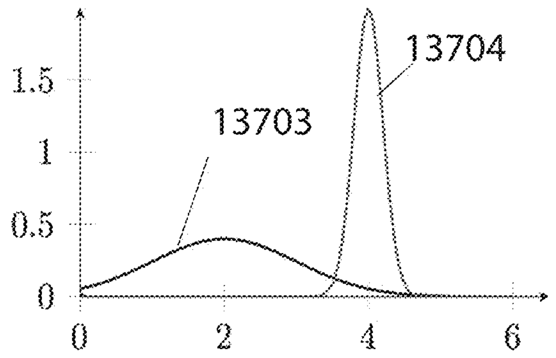
Figure 137D:
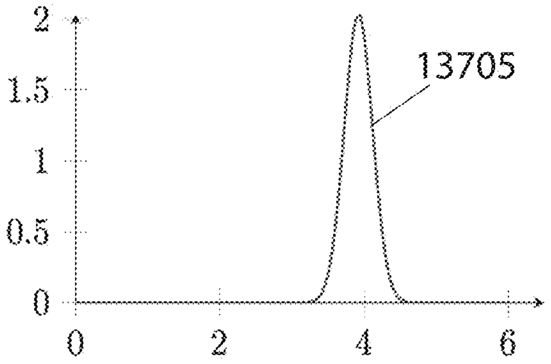
Figure 137E:
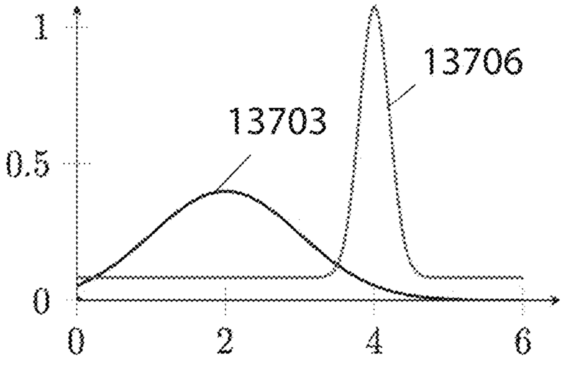
Figure 137F:
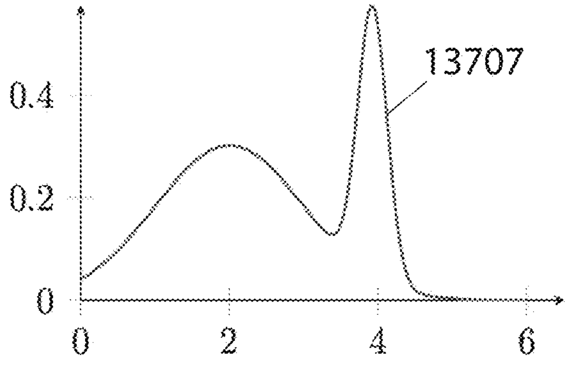

In some embodiments, the observation probability distribution may be determined by the processor of the VMP robot for a reading at time $t_i$ using an inverse sensor model. In some embodiments, wherein the observation probability distribution does not incorporate the confidence or uncertainty of the reading taken, the processor of the VMP robot may incorporate the uncertainty into the observation probability distribution by determining an updated observation probability distribution $$\hat{m} = \frac{1-\alpha}{c} + \alpha m$$

that may be used in re-weighting the current phase space probability distribution, wherein $\alpha$ is the confidence in the reading with a value of $0 \le \alpha \le 1$ and $c = \iint dpdq$. For example, FIG. 137A illustrates an example of a current probability distribution 13700 and an observation probability distribution 13701. FIG. 137B illustrates the updated probability distribution 13702 after re-weighting the current probability distribution 13700 with the observation probability distribution 13701. Similarly, FIG. 137C illustrates an example of a current probability distribution 13703 and an observation probability distribution 13704. FIG. 137D illustrates the updated probability distribution 13705 after re-weighting the current probability distribution 13703 with the observation probability distribution 13704. In this example, the observation probability distribution 13704 is very narrow with a standard deviation of 0.2, indicating high confidence in the observation which is reflected in the resulting re-weighted probability distribution 13705 as it predominantly reflects the observation probability distribution 13704. In FIG. 137E the same current probability distribution 13703 is shown, however, the observation probability distribution 13706 is more spread as compared to 13704, with a standard deviation of 0.5. The resulting update probability distribution 13707 is illustrated in FIG. 137F. At any given time, the processor of the VMP robot may estimate a region of the phase space within which the state of the VMP robot is likely to be given the phase space probability distribution at the particular time.

Figure 138A:
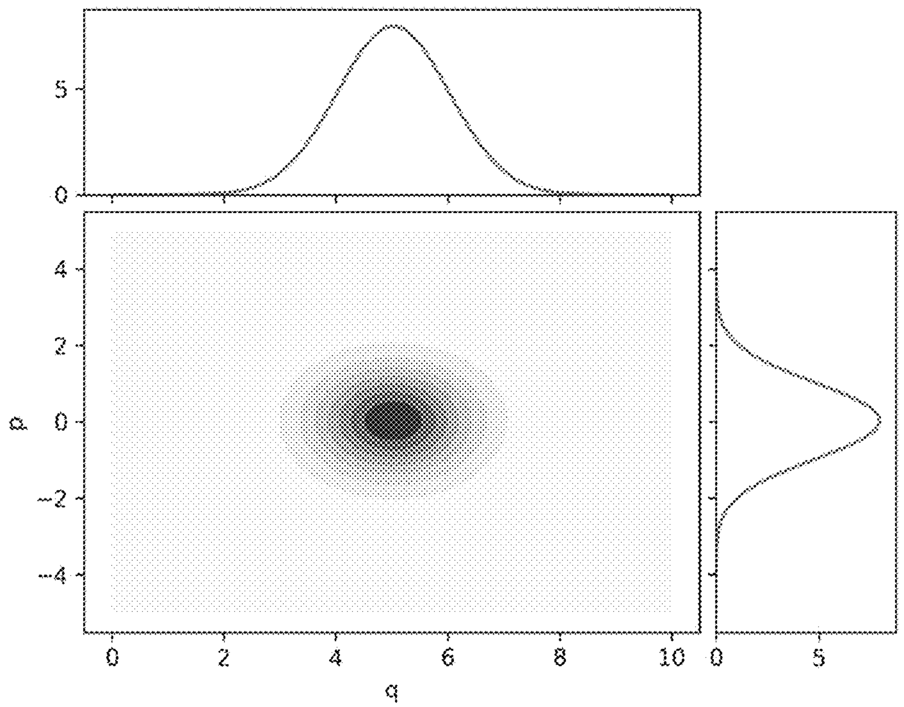
Figure 138B:
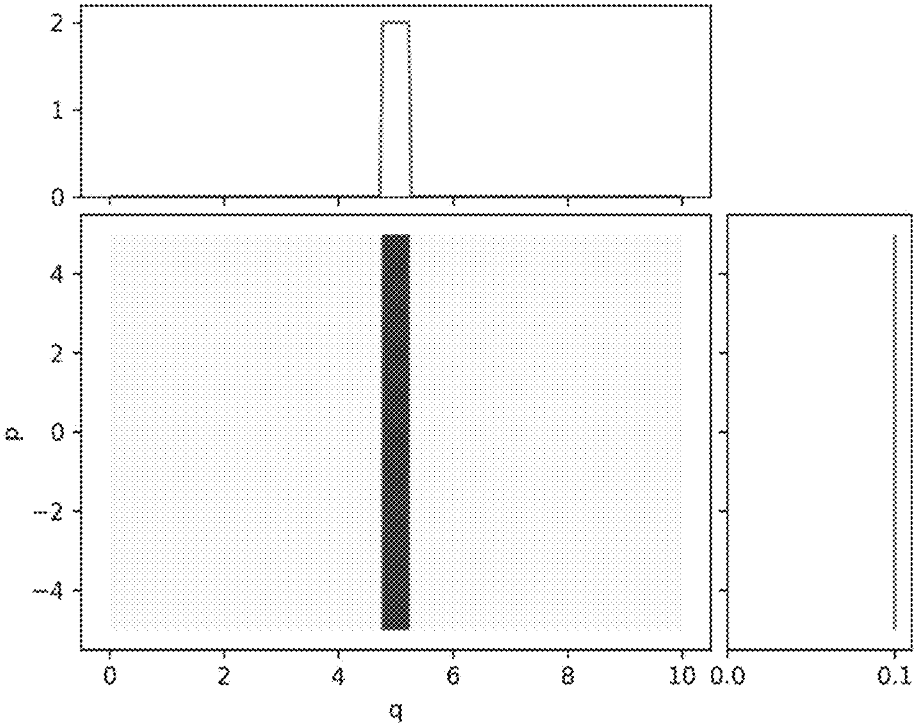
Figure 138C:
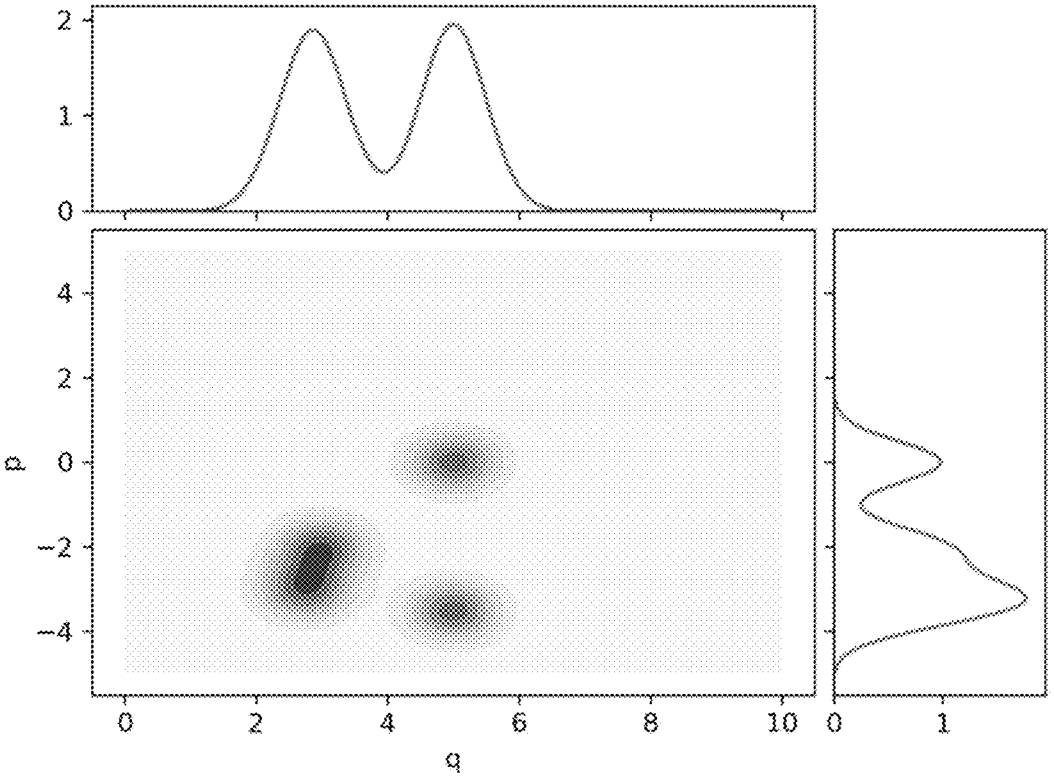
Figure 138D:
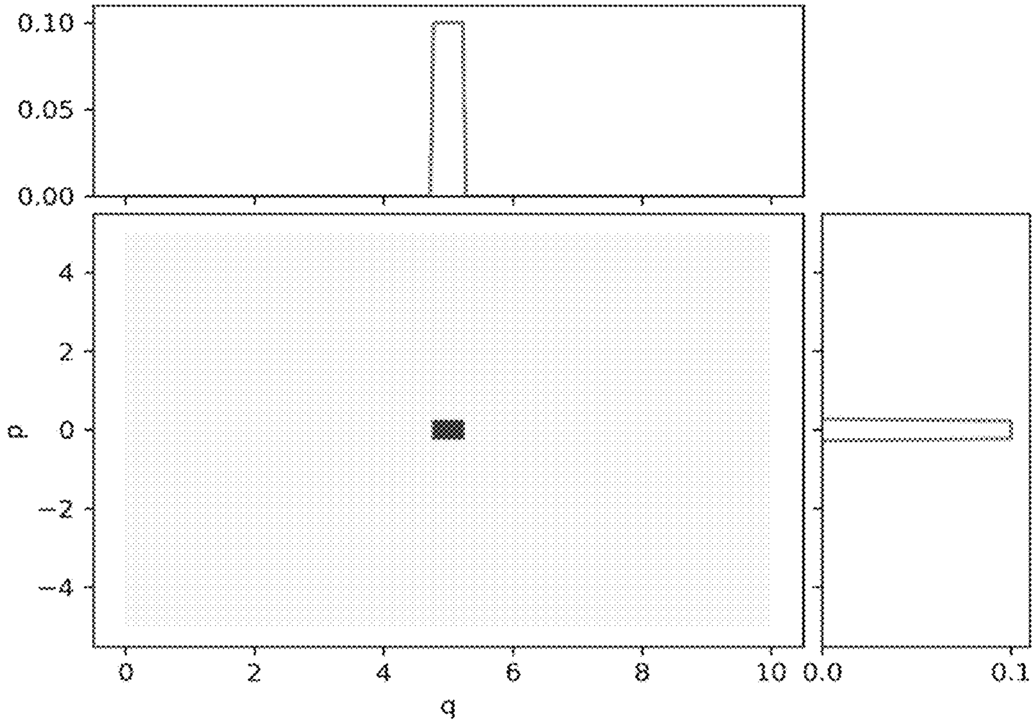

To further explain the localization methods described, examples are provided. In a first example, the processor uses a two-dimensional phase space of the VMP robot, including position q and velocity p. The processor confines the position of the VMP robot q to an interval [0,10] and the velocity p to an interval [−5,+5], limited by the top speed of the VMP robot, therefore the phase space (p,q) is the rectangle D=[−5,5]×[0,10]. The processor uses a Hamiltonian function $$H = \frac{p^2}{2m},$$

with mass m and resulting equations of motion $\dot{p}=0$ and $$\dot{q} = \frac{p}{m}$$

to delineate the motion of the VMP robot. The processor adds Langevin-style stochastic forces to obtain motion equations $\dot{p} = -\gamma p + \sqrt{2\gamma m k_B T} R(t)$ and $$\dot{q} = \frac{p}{m},$$

wherein R(t) denotes random forces and m=1. The processor of the VMP robot initially generates a uniform phase space probability distribution over the phase space D. FIGS. 138A-138D illustrate examples of initial phase space probability distributions the processor may use. FIG. 138A illustrates a Gaussian distribution over the phase space, centered at q=5, p=0. The VMP robot is estimated to be in close proximity to the center point with high probability, the probability decreasing exponentially as the distance of the point from the center point increases. FIG. 138B illustrates uniform distribution for $q \in [4.75, 5.25]$, $p \in [-5, 5]$ over the phase space, wherein there is no assumption on p and q is equally likely to be in [4.75,5.25]. FIG. 138C illustrates multiple Gaussian distributions and FIG. 138D illustrates a confined spike at q=5, p=0, indicating that the processor is certain of the state of the VMP robot.

In this example, the processor of the VMP robot evolves the phase space probability distribution over time according to Langevin equation $$\frac{\partial\rho}{\partial t} = -\{\rho, H\} + \left(\gamma\frac{\partial}{\partial p}\right)\cdot(p\rho) + \gamma k_B T\frac{\partial^2\rho}{\partial p^2},$$

wherein $$\{\rho, H\} = p\frac{\partial\rho}{\partial q}$$

and m=1. Thus, the processor solves $$\frac{\partial\rho}{\partial t} = -p\frac{\partial\rho}{\partial q} + \gamma\left(\rho + p\frac{\partial\rho}{\partial p}\right) + \gamma k_B T\frac{\partial^2\rho}{\partial p^2} \text{ for } t > 0$$

with initial condition $\rho(p,q,0)=\rho_0$ and homogenous Neumann perimeter conditions. The perimeter conditions govern what happens when the VMP robot reaches an extreme state. In the position state, this may correspond to the VMP robot reaching a wall, and in the velocity state, it may correspond to the motor limit. The processor of the VMP robot updates the phase space probability distribution each time a new reading is received by the processor. FIGS. 139A and 139B illustrate examples of observation probability distributions for odometry measurements and distance measurements, respectively. FIG. 139A illustrates a narrow Gaussian observation probability distribution for velocity p, reflecting an accurate odometry sensor. Position q is uniform as odometry data does not indicate position. FIG. 139B illustrates a bimodal observation probability distribution for position q including uncertainty for an environment with a wall at q=0 and q=10. Therefore, for a distance measurement of four, the VMP robot is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor of the VMP robot may determine an observation probability distribution of a reading using an inverse sensor model and the phase space probability distribution may be updated by the processor by re-weighting it with the observation probability distribution of the reading.

The example described may be extended to a four-dimensional phase space with position q=(x,y) and velocity $p=(p_x, p_y)$. The processor solves this four dimensional example using the Fokker-Planck equation $$\frac{\partial\rho}{\partial t} = -\{\rho, H\} + \nabla_p\cdot(\gamma p\rho) + k_B T\nabla_p\cdot(\gamma M\nabla_p\rho)$$

with $M=I_2$ (2D identity matrix), T=0.1, $\gamma$=0.1, and $k_B$=1. In alternative embodiments, the processor uses the Fokker-Planck equation without Hamiltonian and velocity and applies velocity drift field directly through odometry which reduces the dimension by a factor of two. The map of the environment for this example is given in FIG. 140, wherein the white space is the area accessible to the VMP robot. The map describes the domain for $q_1, q_2 \in D$. In this example, the velocity is limited to $p_1, p_2 \in [-1,1]$. The processor models the initial probability density $\rho(p,q,0)$ as Gaussian, wherein $\rho$ is a four-dimensional function. FIGS. 141A-141C illustrate the evolution of $\rho$ reduced to the $q_1, q_2$ space at three different time points (i.e., the density integrated over $p_1, p_2$, $\rho_{red}=\iint\rho(p_1, p_2, q_1, q_2)dp_1dp_2$). It can be seen that with increased time, the initial density focused in the middle of the map starts to flow into other rooms. FIGS. 142A-142C illustrate the evolution of $\rho$ reduced to the $p_1, q_1$ space and 143A-143C illustrate the evolution of $\rho$ reduced to the $p_2, q_2$ space at the same three different time points to show how velocity evolves over time with position. The four-dimensional example is repeated but with the addition of floor sensor data observations. FIG. 144 illustrates a map of the environment indicating different floor types 14400, 14401, 14402, and 14403 with respect to $q_1, q_2$. Given that the sensor has no error, the processor may strongly predict the area within which the VMP robot is located based on the measured floor type, at which point all other hypothesized locations of the VMP robot become invalid. For example, the processor may use the distribution $$m(p_1, p_2, q_1, q_2) = \begin{cases} const > 0, & q_1, q_2 \text{ with the observed floor type} \\ 0, & \text{else} \end{cases}.$$

If the sensor has an average error rate $\epsilon$, the processor may use the distribution $$m(p_1, p_2, q_1, q_2) = \begin{cases} c_1 > 0, & q_1, q_2 \text{ with the observed floor type} \\ c_2 > 0, & \text{else} \end{cases}$$

with $c_1$, $c_2$ chosen such that $\int_p\int_{D_{obs}} md(q_1,q_2)d(p_1,p_2)=1-\epsilon$ and $\int_p\int_{D_{obs}^c} md(q, q_2)d(p_1, p_2)=\epsilon$. $D_{obs}$ is the $q_1, q_2$ with the observed floor type and $D_{obs}^c$ is its complement. By construction, the distribution m has a probability $1-\epsilon$ for $q_1, q_2 \in D_{obs}$ and probability $\epsilon$ for $q_1, q_2 \in D_{obs}^c$. Given that the floor sensor measures floor type 14402, the processor updates the probability distribution for position as shown in FIG. 145. Note that the corners of the distribution were smoothened by the processor using a Gaussian kernel, which corresponds to an increased error rate near the borders of an area. Next, Wi-Fi signal strength observations are considered. Given a map of the expected signal strength, such as that in FIG. 146, the processor may generate a density describing the possible location of the VMP robot based on a measured Wi-Fi signal strength. The darker areas in FIG. 146 represent stronger Wi-Fi signal strength and the signal source is at $q_1, q_2$=4.0, 2.0. Given that the VMP robot measures a Wi-Fi signal strength of 0.4, the processor generates the probability distribution for position shown in FIG. 147. The likely area of the VMP robot is larger since the Wi-Fi signal does not vary very much. For wall distance measurements, a wall distance map, such as that shown in FIG. 148 may be used by the processor to approximate the area of the VMP robot given a distance measured. Given that the VMP robot measures a distance of 3 distance units, the processor generates the probability distribution for position shown in FIG. 149. For example, the processor evolves the Fokker-Planck equation over time and as observations are successively taken, the processor re-weights the density function with each observation wherein parts that do not match the observation are considered less likely and parts that highly match the observations relatively increase in probability. An example of observations over time may be, t=1: observe $p_2$=0.75; t=2: observe $p_2$=0.95 and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

Figure 152:
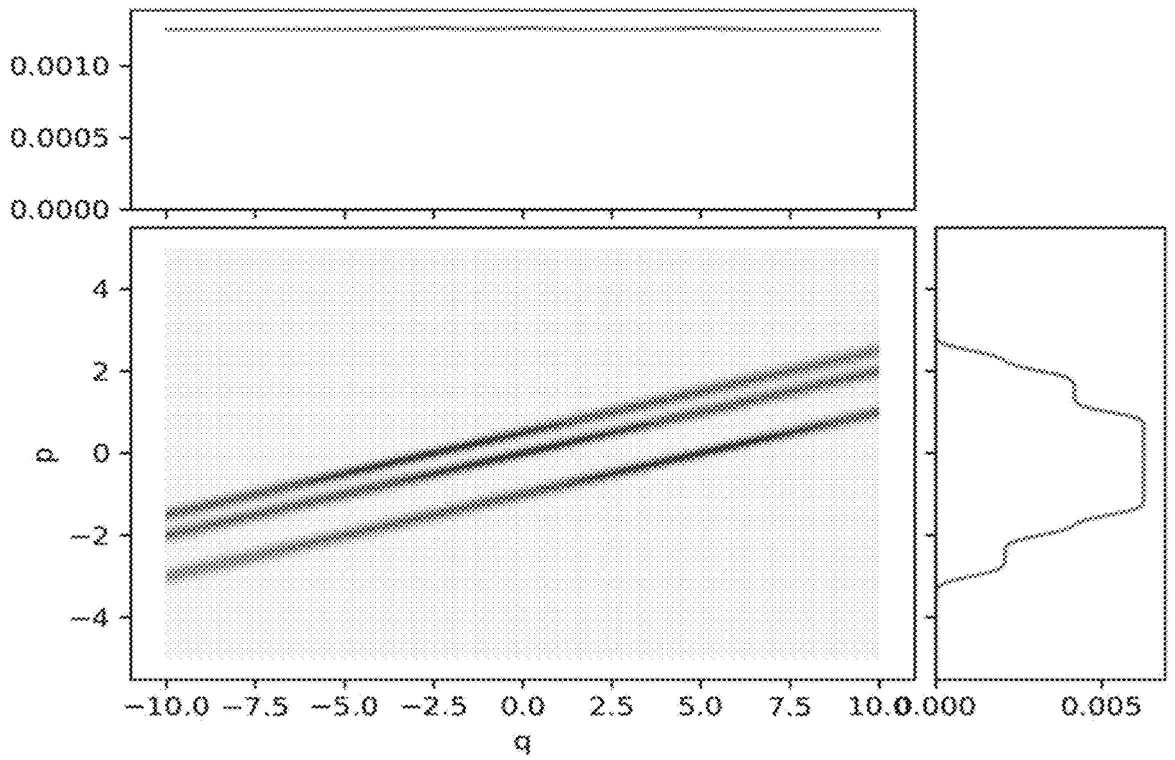
Figure 153:
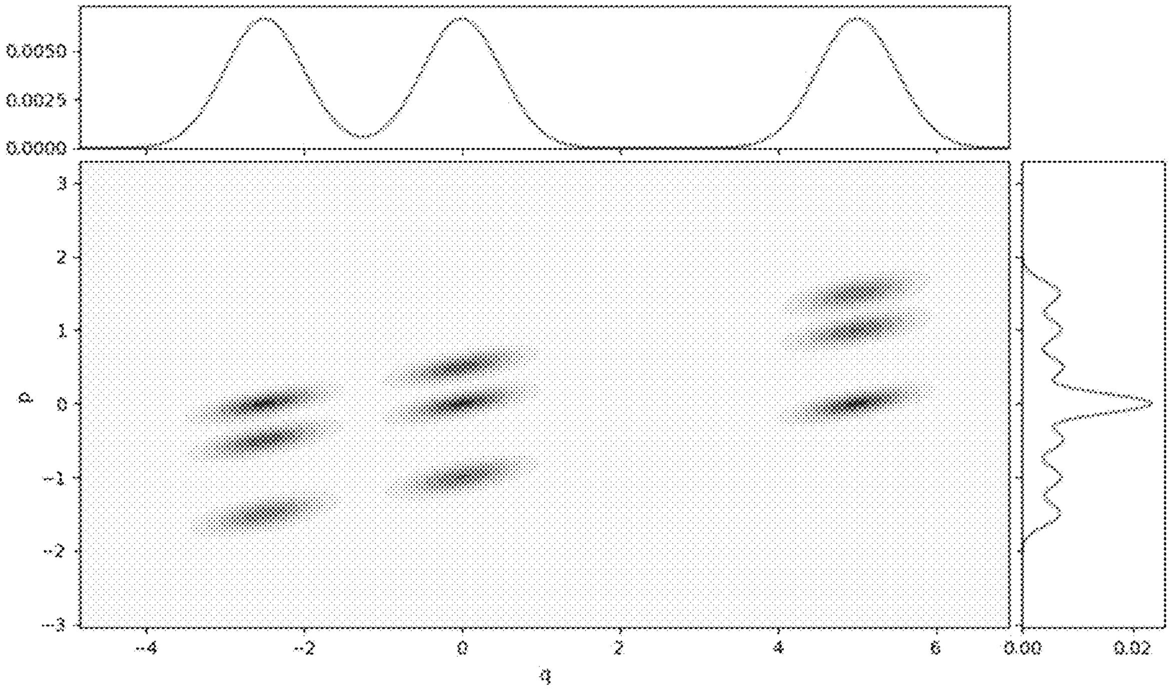

In another example, the VMP robot navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein $q\in[-10,10]$ and $p\in[-5,5]$. The floor has three doors at $q_0$=−2.5, $q_1$=0, and $q_2$=5.0 and the processor of the VMP robot is capable of determining when it is located at a door based on sensor data observed and the momentum of the VMP robot is constant, but unknown. Initially the location of the VMP robot is unknown, therefore the processor generates an initial state density such as that in FIG. 150. When the processor determines the VMP robot is in front of a door, the possible location of the VMP robot is narrowed down, but not the momentum. Therefore, the processor may update the probability density to that shown in FIG. 151. The processor evolves the probability density, and after five seconds the probability is as shown in FIG. 152, wherein the uncertainty in the position space has spread out again given that the momentum is unknown. However, the evolved probability density keeps track of the correlation between position and momentum. When the processor determines the VMP robot is in front of a door again, the probability density is updated to FIG. 153, wherein the density has significantly narrowed down, indicating a number of peaks representing possible location and momentum combinations of the VMP robot. For the left door, there is equal likelihood for p=0, p=−0.5, and p=−1.5. These momentum values correspond with the VMP robot travelling from one of the three doors in five seconds. This is seen for the other two doors as well.

In some embodiments, the processor models motion of the VMP robot using equations $\dot{x}$= v cos ω, $\dot{y}$=v sin ω, and $\dot{\theta}$=ω, wherein v and ω are translational and rotational velocities, respectively. In some embodiments, translational and rotational velocities of the VMP robot are computed using observed wheel angular velocities $\omega_l$ and $\omega_r$ using $$\begin{pmatrix} v \\ w \end{pmatrix} = J\begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_l$ and $r_r$ are the left and right wheel radii, respectively and b is the distance between the two wheels. Assuming there are stochastic forces on the wheel velocities, the processor of the VMP robot evolves the probability density ρ=(x,y,θ, $\omega_l$, $\omega_r$) using $$\frac{\partial \rho}{\partial t} = -\begin{pmatrix} v\cos\theta \\ v\cos\theta \\ \omega \end{pmatrix} \cdot \nabla_q \rho + \nabla_p \cdot (D \nabla_p \rho)$$

wherein $$D = \frac{1}{2}\sigma_N \sigma_N^T$$

is a 2-by-2 diffusion tensor, q=(x,y,θ) and p=($\omega_l$,$\omega_r$). In some embodiments, the domain is obtained by choosing x, y in the map of the environment, θ∈[0,2π), and $\omega_l$,$\omega_r$ as per the VMP robot specifications. In some embodiments, solving the equation may be a challenge given it is five-dimensional. In some embodiments, the model may be reduced by replacing odometry by Gaussian density with mean and variance. This reduces the model to a three-dimensional density ρ=(x,y,θ). In some embodiments, independent equations may be formed for $\omega_l$,$\omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -\begin{pmatrix} \overline{v}\cos\theta \\ \overline{v}\cos\theta \\ \overline{\omega} \end{pmatrix} \cdot \nabla \rho + \nabla .$$

(D∇ρ), t>0 wherein $$D = \begin{pmatrix} dv^2\cos^2\theta & dv^2\sin\theta\cos\theta & 0 \\ dv^2\sin\theta\cos\theta & dv^2\sin^2\theta & 0 \\ 0 & 0 & d\omega^2 \end{pmatrix},$$

$\overline{v}$, $\overline{\omega}$ represent the current mean velocities, and dv, dω the current deviation. In some embodiments, the processor determines $\overline{v}$, $\overline{\omega}$ from the mean and deviation of the left and right wheel velocities $\omega_L$ and $\omega_R$ using $$\begin{pmatrix} \overline{v} \\ \overline{\omega} \end{pmatrix} = J\begin{pmatrix} \overline{\omega}_L \\ \overline{\omega}_R \end{pmatrix}.$$

In some embodiments, the processor uses Neumann perimeter conditions for x, y and periodic perimeter conditions for θ.

In some embodiments, localization is applied to vehicles. For example, the processor localizes a vehicle with position coordinate q=(x,y) and momentum coordinate p=($p_x$, $p_y$). For simplification, the mass of the vehicle is 1.0, the earth is assumed to be planar, and q is a position with reference to some arbitrary point and distance. Thus, the processor evolves the probability density ρ over time according to $$\frac{\partial \rho}{\partial t} = -p \cdot \nabla_q \rho + \nabla_p \cdot (D \nabla_p \rho),$$

wherein D is as defined above. The processor uses a moving grid, wherein the general location of the vehicle is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15,15]×[−15,15], corresponding to maximum speed of 15 m/s in each spatial direction. The processor uses velocity and GPS position observations to increase accuracy of approximated localization of the vehicle. Velocity measurements provide no information on position, but provide information on $p_x^2+p_y^2$, the circular probability distribution in the p space, as illustrated in FIG. 154 with |p|=10 and large uncertainty. GPS position measurements provide no direct momentum information but provides a position density. The processor further uses a road map to exclude impossible states of the vehicle. For instance, it is impossible to drive through buildings and if the velocity is high there is a higher likelihood that the vehicle is on specific roads. FIG. 155 illustrates a road map used by the processor in this example, wherein white areas 15500 indicate roads and gray areas 15501 indicate no roads and the maximum off road speed is ±5 m/s. Position 15502 is the current probability density collapsed to the $q_1$, $q_2$ space. In combining the road map information with the velocity observations, the processor determines that is highly unlikely that with an odometry measurement of |p|=10 that the vehicle is in a position off the road. In some embodiments, other types of information may be used to improve accuracy of localization. For example, a road map to correlate position and velocity, distance to and probability density of other vehicles using similar technology, Wi-Fi map to extract position, and video footage to extract position.

In some embodiments, the processor uses finite differences methods (FDM) to numerically approximate partial differential equations of the form $$\frac{\partial \rho}{\partial t} = -\{\rho, H\} + \nabla_p \cdot (D\nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x,t) with velocity v, diffusion coefficient a, $$\frac{\partial u}{\partial t} = a\frac{\partial^2 u}{\partial x^2} - v\frac{\partial u}{\partial x}$$

on a mesh $x_0, \ldots, x_j$, and times $t_0, \ldots, t_N$ may be approximated by a recurrence equation of the form $$\frac{u_j^{n+1} - u_j^n}{k} = a\frac{u_{j+1}^n - 2u_j^n + u_{j-1}^n}{h^2} - v\frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2},$$

$$\text{and } \frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v} \text{ and } k < \frac{h^2}{2a}.$$

The stability conditions place limitations on the time step size k which may be a limitation of the explicit method scheme. If instead the processor uses a central difference at time $$t_{n+\frac{1}{2}},$$

the recurrence equation is $$\frac{u_j^{n+1} - u_j^n}{k} = \frac{1}{2}\left(a\frac{u_{j+1}^{n+1} - 2u_j^{n+1} + u_{j-1}^{n+1}}{h^2} - v\frac{u_{j+1}^{n+1} - u_{j-1}^{n+1}}{2h} + a\frac{u_{j+1}^n - 2u_j^n + u_{j-1}^n}{h^2} - v\frac{u_{j+1}^n - u_{j-1}^n}{2h}\right),$$

know as the Crank-Nicolson method. The processor obtains the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1} - u_j^n}{k} = a\frac{u_{j+1}^{n+1} - 2u_j^{n+1} + u_{j-1}^{n+1}}{h^2} - v\frac{u_{j+1}^{n+1} - u_{j-1}^{n+1}}{2h},$$

which is unconditionally stable for an time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{\rho, H\} + \nabla_p \cdot (D\nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation $$\frac{\partial \rho}{\partial t} = L\rho,$$

with differential operator, e.g., $L=-\{\cdot, H\}+\nabla_p\cdot(D\nabla p)$. The processor discretizes the abstract equation in space $$\text{(e.g., by } FEM \text{ or } FDM\text{)} \ \frac{\partial \overline{\rho}}{\partial t} = \overline{L}\overline{\rho},$$

wherein $\overline{\rho}$, $\overline{L}$ are the projections of ρ, L on the discretized space. The processor discretizes the equation in time using a numerical time integrator (e.g., Crank-Nicolson)

$$\frac{\overline{\rho}^{n+1} - \overline{\rho}^{n}}{h} = \frac{1}{2}\left(\overline{L}\overline{\rho}^{n+1} + \overline{L}\overline{\rho}^{n}\right),$$

leading to the equation $$\left(I - \frac{h}{2}\overline{L}\right)\overline{\rho}^{n+1} = \left(I + \frac{h}{2}\overline{L}\right)\overline{\rho}^{n},$$

which the processor solves. In a fully discretized system, this is a linear equation. Depending on the space and discretization, this will be a banded, sparse matrix. In some embodiments, the processor employs alternating direction implicit (ADI) splitting to ease the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio advection to diffusion) is larger than 2 or smaller than −2.

Perimeter conditions are essential in solving the partial differential equations. Perimeter conditions are a set of constraints that determine what happens at the perimeter of the domain while the partial differential equation describe the behaviour within the domain. In some embodiments, the processor uses one or more the following perimeter conditions: reflecting, zero-flux (i.e., homogenous Neumann perimeter conditions)

$$\frac{\partial \rho}{\partial \vec{n}} = 0$$

for $p,q \in \partial D$, $\vec{n}$ unit normal vector on perimeters; absorbing perimeter conditions (i.e., homogenous Dirichlet perimeter conditions) $\rho=0$ for $p,q\in\partial D$; and constant concentration perimeter conditions (i.e., Dirichlet) $\rho=\rho_0$ for $p,q\in\partial D$. To integrate the perimeter conditions into FDM, the processor modifies the difference equations on the perimeters, and when using FEM, they become part of the weak form (i.e., integration by parts) or are integrated in the solution space. In some embodiments, the processor uses Fenics for an efficient solution to partial differential equations.

In some embodiments, the processor uses quantum mechanics to localize the VMP robot. In some embodiments, the processor of the VMP robot may determine a probability density over all possible states of the VMP robot using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$, i.e. $\rho(\vec{r}, t)=|\Psi(\vec{r}, t)|^2$. In some embodiments, the processor of the VMP robot normalizes the wave function which is equal to the total probability of finding the particle, or in this case the VMP robot, somewhere. The total probability of finding the VMP robot somewhere adds up to unity $\int|\Psi(\vec{r}, t)|^2 dr=1$. In some embodiments, the processor of the VMP robot may apply Fourier transform to the wave function $\Psi(\vec{r}, t)$ to yield the wave function $\Phi(\vec{p}, t)$ in the momentum space, with associated momentum probability distribution $\sigma(\vec{p}, t)=\Phi|(\vec{p}, t)|^2$. In some embodiments, the processor may evolve the wave function $\Psi(\vec{r}, t)$ using Schrödinger equation $$i\hbar\frac{\partial}{\partial t}\Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

i is the imaginary unit, ℏ is the reduced Planck constant, $\nabla^2$ is the Laplacian, and $V(\vec{r})$ is the potential. An operator is a generalization of the concept of a function and transforms one function into another function. For example, the momentum operator $\hat{p}=-i\hbar\nabla$ and that is why $-h^2/2m\ \nabla^2$ corresponds to kinetic energy. The Hamiltonian function $$H = \frac{p^2}{2m} + V(\vec{r})$$

has corresponding Hamilton operator $$\hat{H} = -\frac{\hbar^2}{2m}\nabla^2 + V(\vec{r}).$$

For conservative systems (constant energy), the time-dependent factor may be separated from the wave function $$\left(e.g., \Psi(\vec{r}, t) = \Phi(\vec{r})e^{-\frac{iEt}{\hbar}},\right.$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi=E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r}, t)=\Sigma_k c_k(t)\varphi_k(\vec{r})$, corresponding to expressing the wave function in the basis given by energy eigenfunctions. Substituting this equation into the Schrodinger equation, $$c_k(t) = c_k(0)e^{-\frac{iE_k t}{\hbar}}$$

wherein $E_k$ is the eigen-energy to the eigenfunction $\varphi P_k$. For example, the probability of measuring a certain energy $E_k$ at time t is given by the coefficient of the eigenfunction $\Phi_k$, $$|c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r})=|\Psi(\vec{r}, t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle\phi|$ (i.e., bra). The integral over the product of two functions is analogous to an inner product of abstract vectors, $\int\phi^*\psi d\tau=\langle\phi|\cdot|\psi\rangle\equiv\langle\phi|\psi\rangle$. In some embodiments, $\langle\phi|$ and $|\psi\rangle$ are state vectors of a system and the processor determines the probability of finding $\langle\phi|$ in state $|\psi\rangle$ using $p(\langle\phi|,|\psi\rangle)=|\langle\phi|\psi\rangle|^2$. For a Hermitian operator $\hat{A}$ eigenkets and eigenvalues are denoted $A|n\rangle=a_n|n\rangle$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A=\langle n|a_n$. For every physical property (energy, position, momentum, angular momentum, etc.) there exists an associated linear, Hermitian operator $\hat{A}$ (called am observable) which acts on the Hilbert space H. Given A has eigenvalues $a_n$ and eigenvectors $|n\rangle$, and a system in state $|\phi\rangle$, the processor determines the probability of obtaining $a_n$ as an outcome of a measurement of A using $p(a_n)=|\langle n|\phi\rangle|^2$. In some embodiments, the processor evolves the time-dependent Schrodinger equation using $$i\hbar\frac{\partial|\psi\rangle}{\partial t} = \hat{H}|\psi\rangle.$$

Given a state $|\phi\rangle$ and a measurement of the observable A, the processor determines the expectation value of A using $\langle A\rangle=\langle\phi|A|\phi\rangle$, corresponding to $$\langle A\rangle = \frac{\int\phi^*\hat{A}\phi d\tau}{\int\phi^*\phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the VMP robot, the processor evolves the wave function $\Psi(\vec{r}, t)$ using the Schrödinger equation $$i\hbar\frac{\partial}{\partial t}\Psi(\vec{r}, t) = \left[\frac{\hbar^2}{2m}\nabla^2 + V(\vec{r})\right]\Psi(\vec{r}, t).$$

In some embodiments, a solution is written in terms of eigenfunctions $\psi_n$ with eigenvalues $E_n$ of the time-independent Schrodinger equation $H\psi_n=E_n\psi_n$, wherein $\Psi(\vec{r}, t)=\Sigma_{c_n}c_n e^{-iE_n t/\hbar}\psi_n$ and $c_n=\int\Psi(\vec{r},0)\psi_n^*dr$. In some embodiments, the time evolution is expressed as a time evolution via a unitary operator $\cup(t)$, $\Psi(\vec{r}, t)=\cup(t)\Psi(\vec{r},0)$ wherein $\cup(t)=e^{-iHt/\hbar}$. In some embodiments, the probability density of the Hilbert space may be updated by the processor of the VMP robot each time an observation or measurement is received by the processor of the VMP robot. For each observation with observation operator A the processor of the VMP robot may perform an eigen-decomposition $A\omega_n=a_n\omega_n$, wherein the eigenvalue corresponds to the observed quantity. In some embodiments, the processor observes a value a with probability $0\le p\le 1$. In some embodiments, wherein the operator has a finite spectrum or a single eigenvalue is observed, the processor of the VMP robot may collapse to the eigenfunction(s) with corresponding probability $$\Psi(\vec{r}, t) \to \gamma \sum_{n=1}^{N} p(a_n) d_n \omega_n,$$

wherein $d_n = \int \omega_n^* \Psi dr$, p(a) is the probability of observing value a, and $\gamma$ is a normalization constant. In some embodiments, wherein the operator has continuous spectrum, the summation may be replaced by an integration $\Psi(\vec{r}, t) \to \gamma \int p(a) d_n \omega_n da$, wherein $d_n = \int \omega_n^* \Psi dr$.

For example, consider a VMP robot confined to move within an interval $$\left[-\frac{1}{2}, \frac{1}{2}\right].$$

For simplicity, the processor sets $\hbar = m = 1$, and an infinite well potential and the regular kinetic energy term are assumed. The processor solves the time-independent Schrodinger equations, resulting in wave functions $$\psi_n = \begin{cases} \sqrt{2}\sin\left(k_n\left(x - \frac{1}{2}\right)\right)e^{-i\omega_n t}, & -\frac{1}{2} < x < \frac{1}{2}, \\ 0, & \text{otherwise} \end{cases}$$

wherein $k_n = n\pi$ and $E_n = \omega_n = n^2\pi^2$. In the momentum space this corresponds to the wave functions $$\phi_n(p, t) = \frac{1}{\sqrt{2\pi}} \int_{-\infty}^{\infty} \psi_n(x, t)e^{-ipx} dx = \frac{1}{\sqrt{\pi}} \frac{n\pi}{n\pi + p} \operatorname{sinc}\left(\frac{1}{2}(n\pi - p)\right).$$

The processor takes suitable functions and computes an expansion in eigenfunctions. Given a vector of coefficients, the processor computes the time evolution of that wave function in eigenbasis. In another example, consider a VMP robot free to move on an x-axis. For simplicity, the processor sets $\hbar = m = 1$. The processor solves the time-independent Schrodinger equations, resulting in wave functions $$\psi_E(x, t) = Ae^{\frac{i(px - Et)}{\hbar}},$$

wherein energy $$E = \frac{\hbar^2 k^2}{2m}$$

and momentum $p = \hbar k$. For energy E there are two independent, valid functions with $\pm p$. Given the wave function in the position space, in the momentum space, the corresponding wave functions are $$\phi_E(p, t) = e^{\frac{i(px - Et)}{\hbar}},$$

which are the same as the energy eigenfunctions. For a given initial wave function $\psi(x,0)$, the processor expands the wave function into momentum/energy eigenfunctions $$\phi(p) = \frac{1}{\sqrt{2\pi\hbar}} \int \psi(x, 0)e^{-\frac{ipx}{\hbar}} dx,$$

then the processor gets time dependence by taking the inverse Fourier resulting in $$\psi(x, t) = \frac{1}{\sqrt{2\pi\hbar}} \int \phi(p)e^{\frac{ipx}{\hbar}} e^{-\frac{iEt}{\hbar}} dp.$$

An example of a common type of initial wave function is a Gaussian wave packet, consisting of a momentum eigenfunctions multiplied by a Gaussian in position space $$\psi(x) = Ae^{-\left(\frac{x}{a}\right)^2} e^{\frac{ip_0 x}{\hbar}},$$

wherein $p_0$ is the wave function's average momentum value and a is a rough measure of the width of the packet. In the momentum space, this wave function has the form $$\phi(p) = Be^{-\left(\frac{a(p - p_0)}{2\hbar}\right)^2},$$

which is a Gaussian function of momentum, centered on $p_0$ with approximate width $$\frac{2\hbar}{a}.$$

Figure 156A:
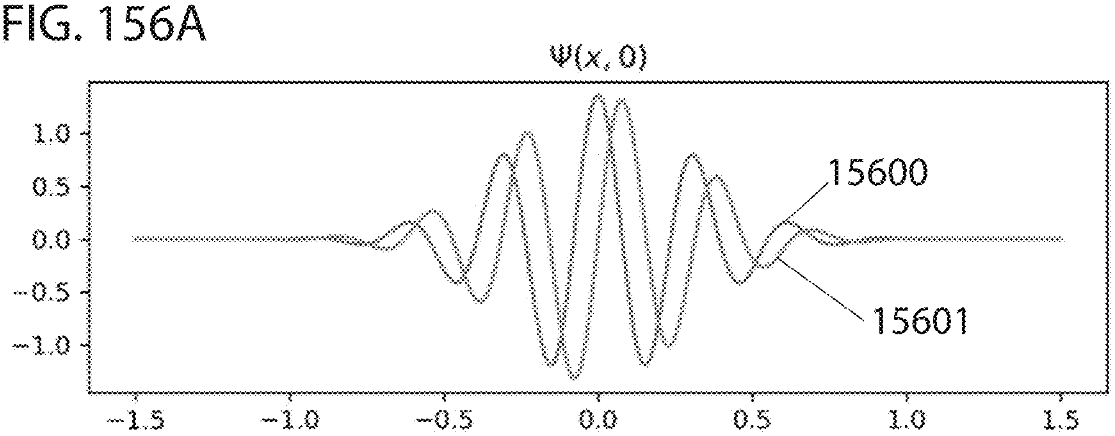
Figure 156B:
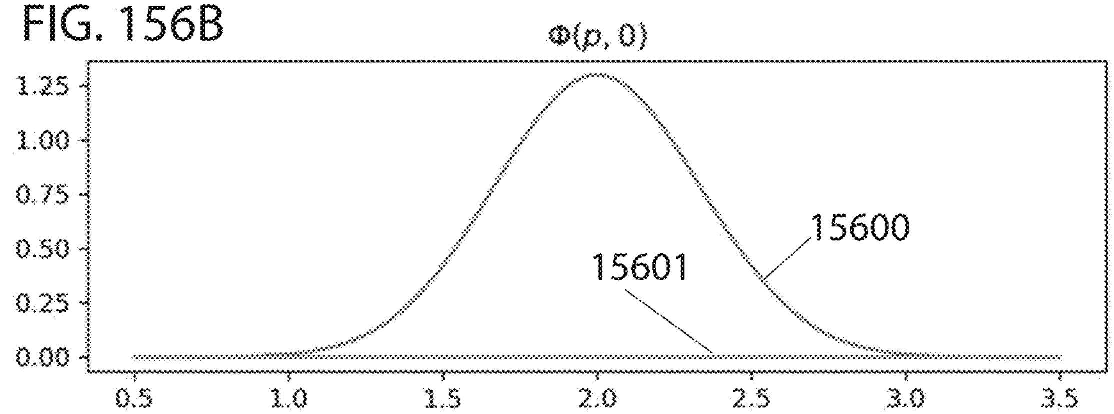
Figure 156C:
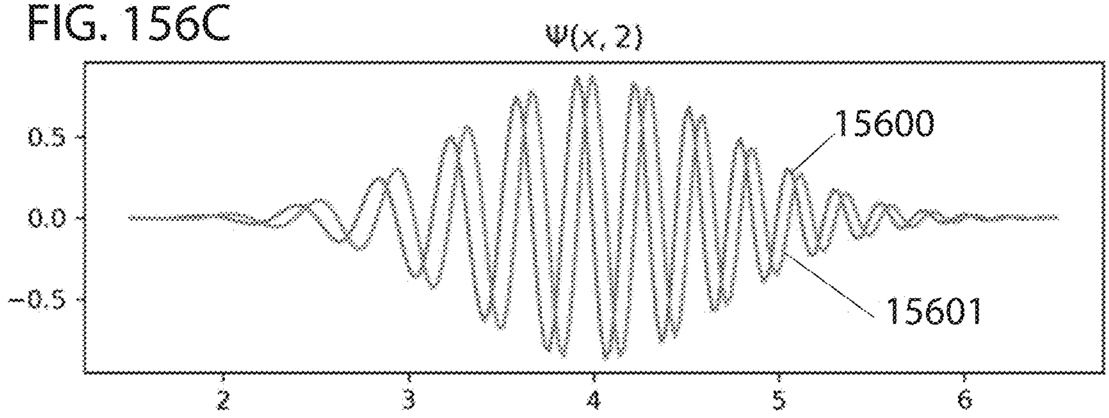
Figure 156D:
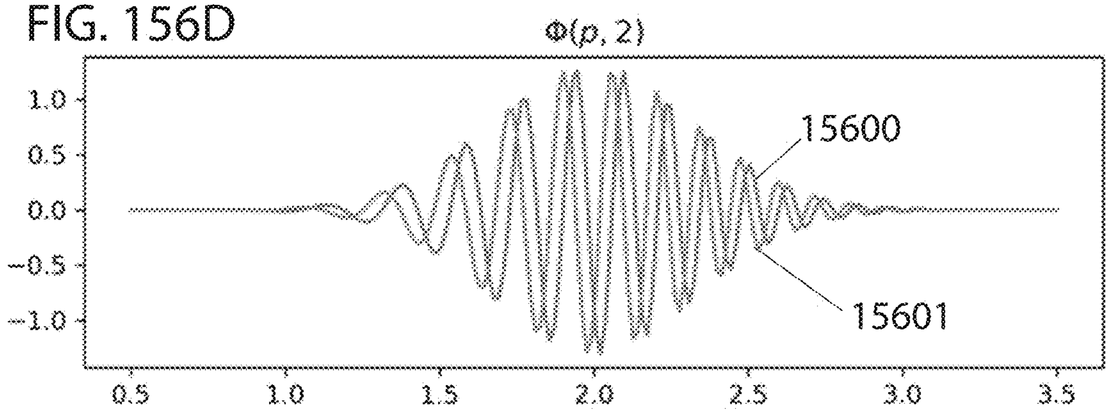

Note Heisenberg's uncertainty principle wherein in the position space width is ~a, and in the momentum space is ~1/a. FIGS. 156A and 156B illustrate an example of a wave packet at a first time point for $\psi(x)$ and $\phi(p)$, respectively, with $x_0$, $p_0 = 0$, 2, $\hbar = 0.1$, m=1, and a=3. 15600 are real parts and 15601 are imaginary parts. As time passes, the peak moves with constant velocity $$\frac{p_0}{m}$$

and the width of the wave packet in the position space increases. This happens because the different momentum components of the packet move with different velocities. In the momentum space, the probability density $|\phi(p,t)|^2$ stays constant over time. See FIGS. 156C and 156D for the same wave packet at time t=2.

Figure 157A:
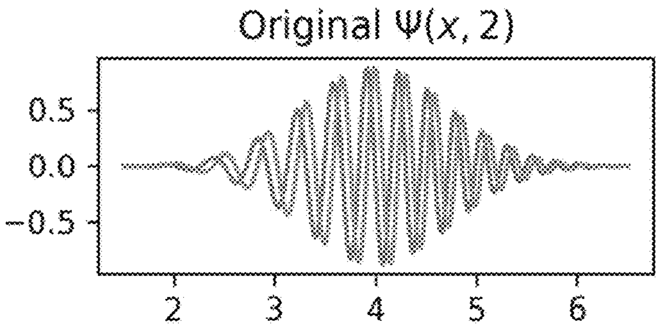
Figure 157B:
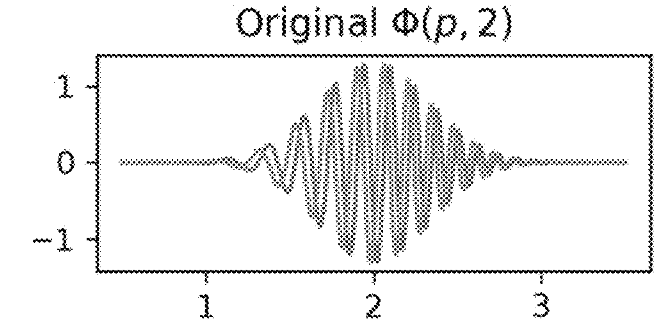
Figure 157C:
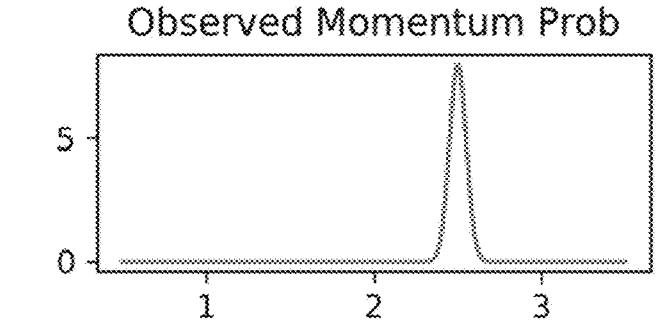
Figure 157D:
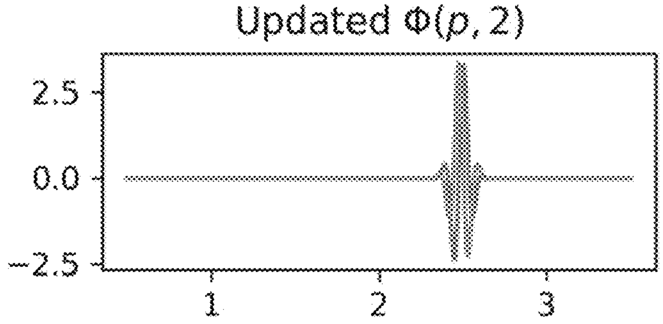
Figure 157E:
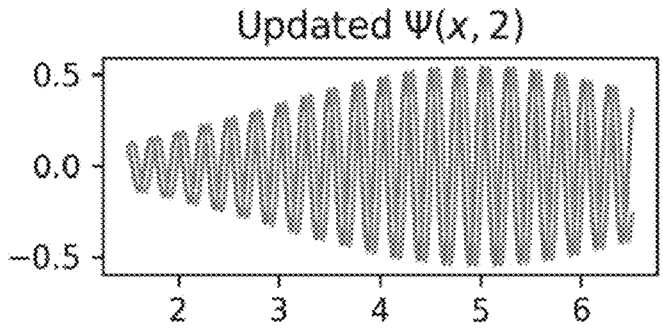
Figure 158A:
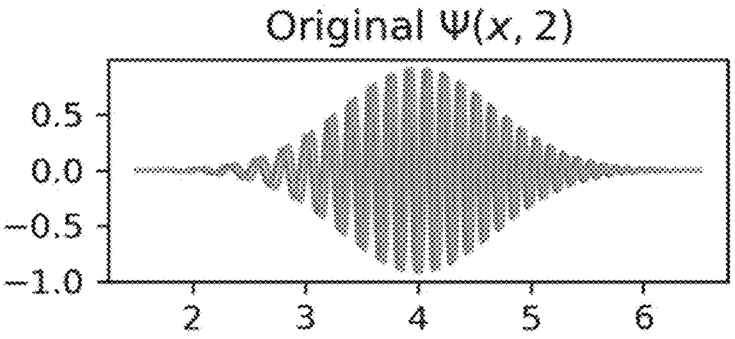
Figure 158B:
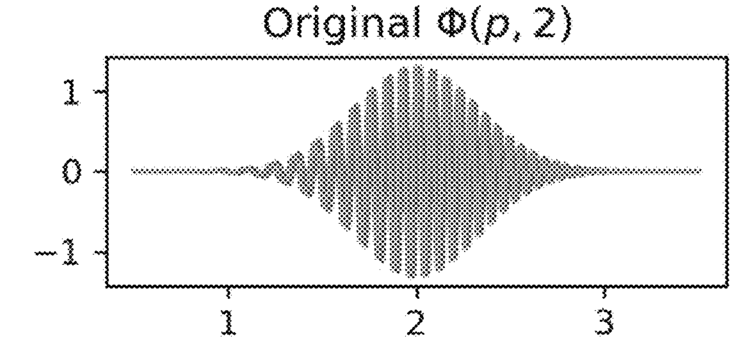
Figure 158C:
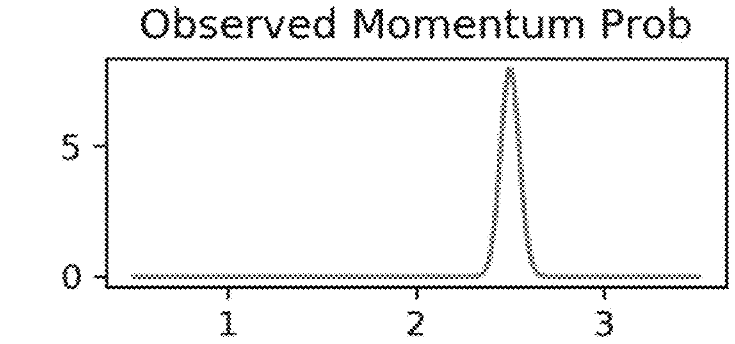
Figure 158D:
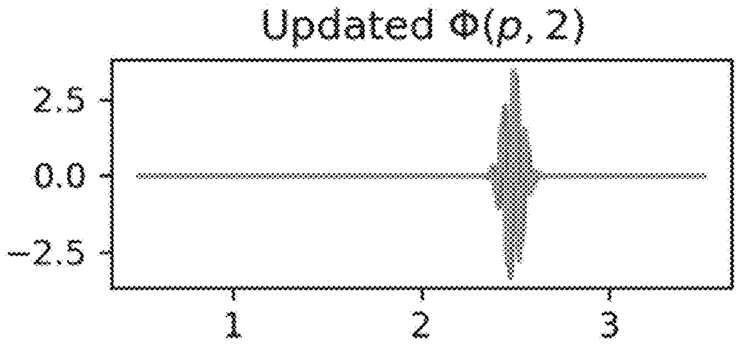
Figure 158E:
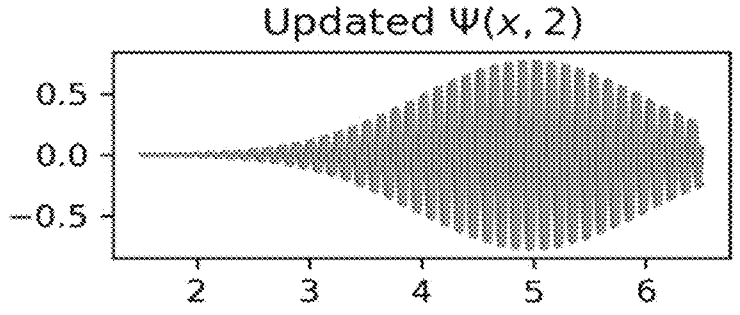
Figure 159A:
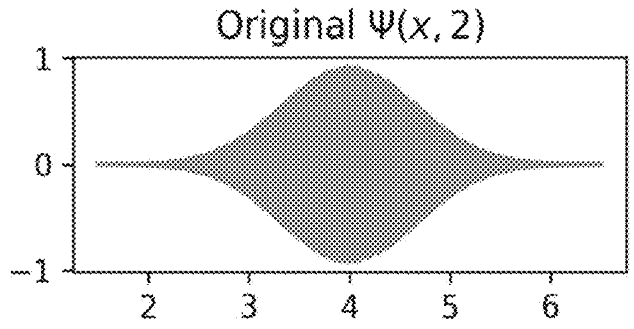
Figure 159B:
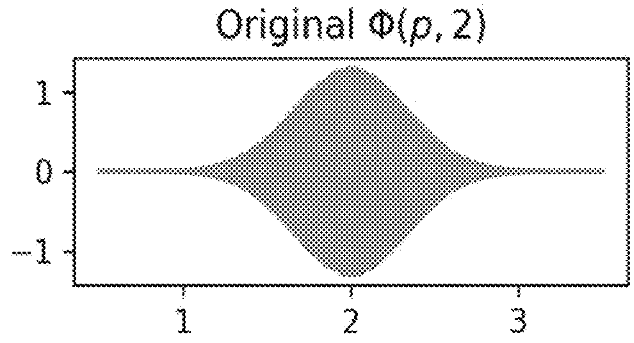
Figure 159C:
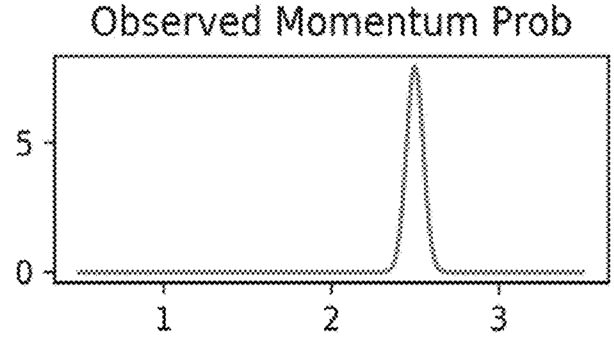
Figure 159D:
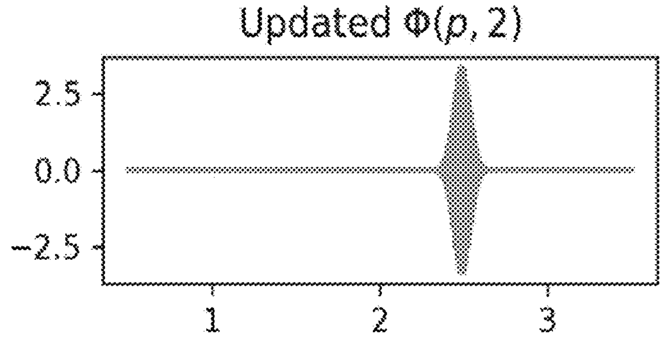
Figure 159E:
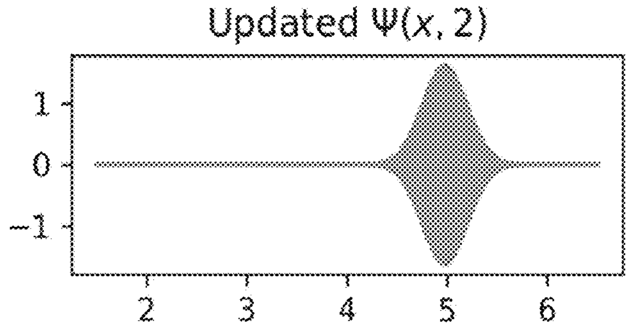
Figure 160A:
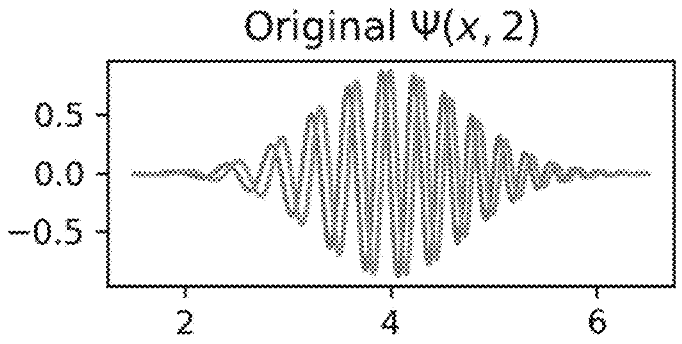
Figure 160B:
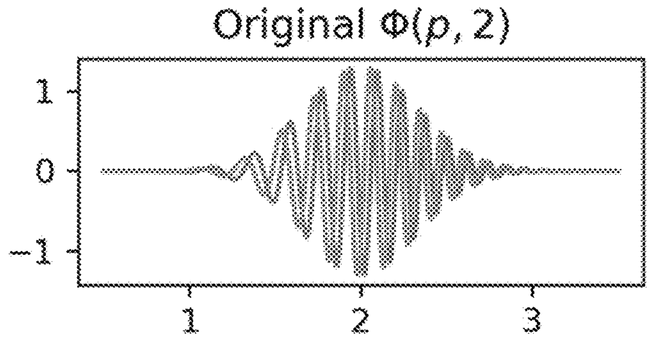
Figure 160C:
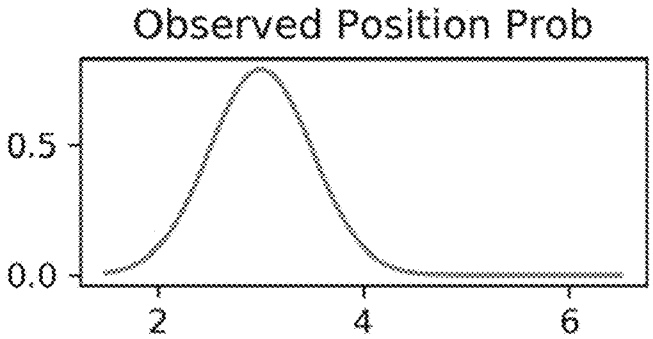
Figure 160D:
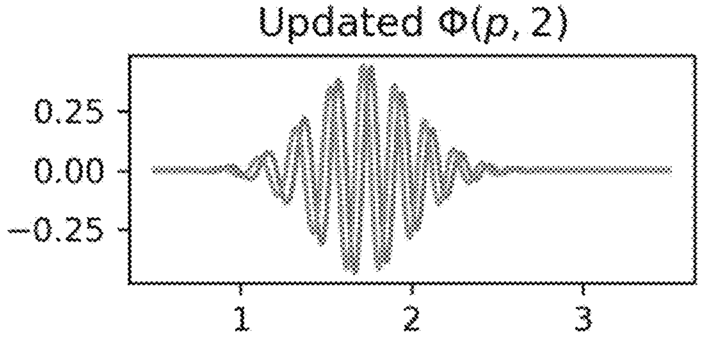
Figure 160E:
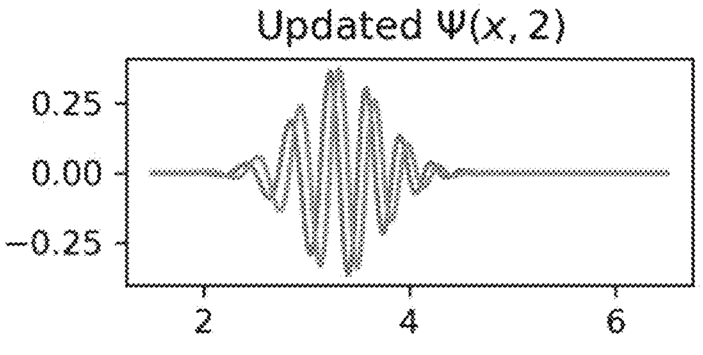

When modeling the VMP robot using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around p=2.5 with $\sigma = 0.05$, a strong assumption that the momentum is 2.5. Since the observation operator is the momentum operators, the wave function expressed in terms of the eigenfunctions of the observation operator is $\phi(p,t)$. The processor projects $\phi(p,t)$ into the observation space with probability $f$ by determining $\tilde{\phi}(p,t)=f(p)\phi(p,t)$. The processor normalizes the updated $\phi$ and takes the inverse Fourier transform to obtain the wave function in the position space. FIGS. 157A, 157B, 157C, 157D, and 157E illustrate the initial wave function in the position space $\psi(x)$, the initial wave function in the momentum space $\phi(p)$, the observation density in the momentum space, the updated wave function in the momentum space $\tilde{\phi}(p,t)$ after the observation, and the wave function in the position space $\psi x)$ after observing the momentum, respectively, at time t=2, with $x_0$, $p_0$=0, 2, $\hbar$=0.1, m=1, and a=3. Note that in each figure the darker plots are the real parts while the lighter plots are the imaginary parts. The resulting wave function in the position space (FIG. 157D) may be unexpected after observing a very narrow momentum density (FIG. 157C) as it concludes that the position must have spread further out from the original wave function in the position space (FIG. 157A). This effect is due to Heisenberg's uncertainty principle. With decreasing $\hbar$ this effect diminishes, as can be seen in FIGS. 158A-158E and FIGS. 159A-159E, illustrating the same as FIGS. 157A-157E but with $\hbar$=0.05 and $\hbar$=0.001, respectively. Similar to observing momentum, position may also be observed and incorporated as illustrated in FIGS. 160A-160E which illustrate the initial wave function in the position space $\psi(x)$, the initial wave function in the momentum space $\phi(p)$, the observation density in the position space, the updated wave function in the momentum space $\tilde{\phi}(x,t)$ after the observation, and the wave function in the position space $\psi(p)$ after observing the position, respectively, at time t=2, with $x_0$, $p_0$=0, 2, $\hbar$=0.1, m=1, and a=3.

Figure 165A:
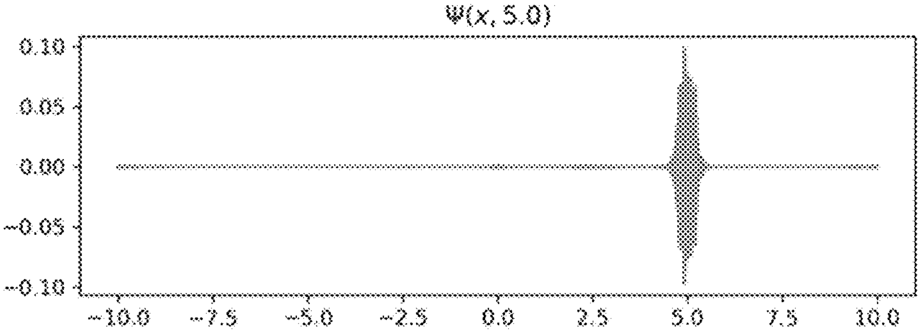
Figure 165B:
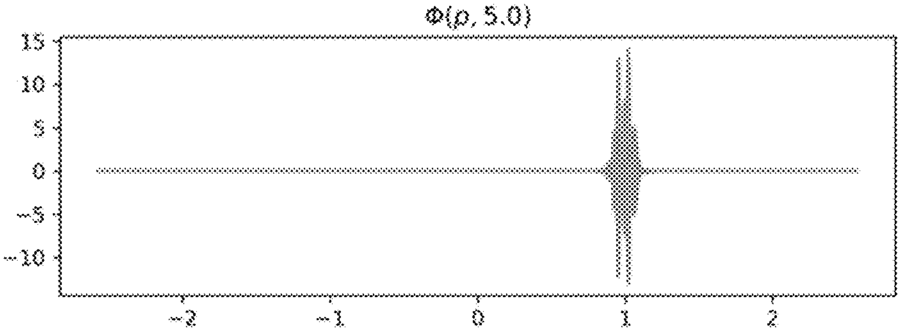
Figure 165C:
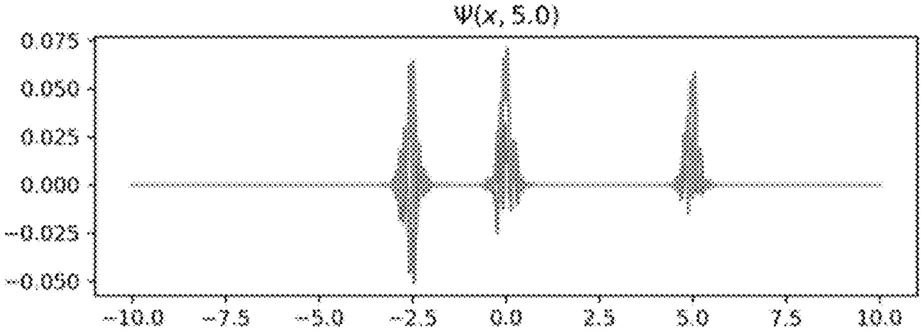
Figure 165D:
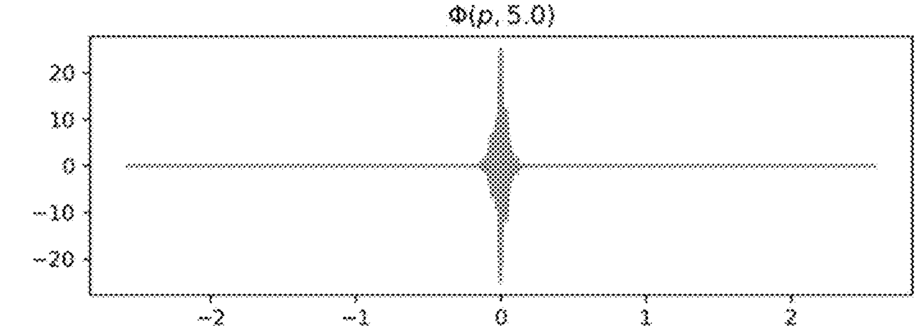
Figure 165E:
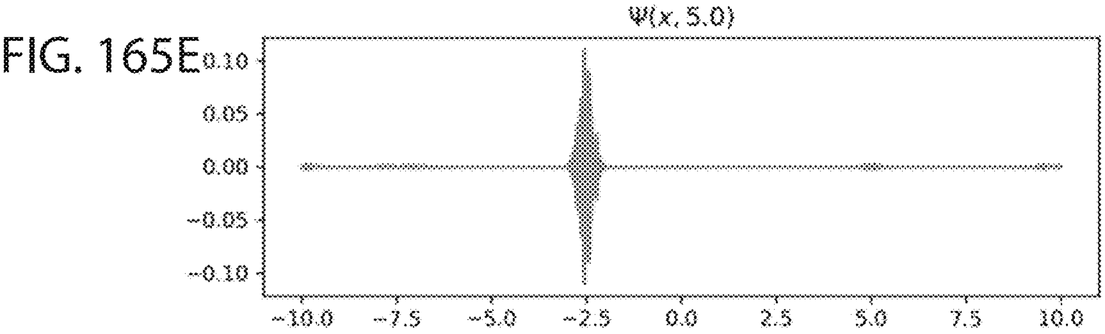
Figure 165F:
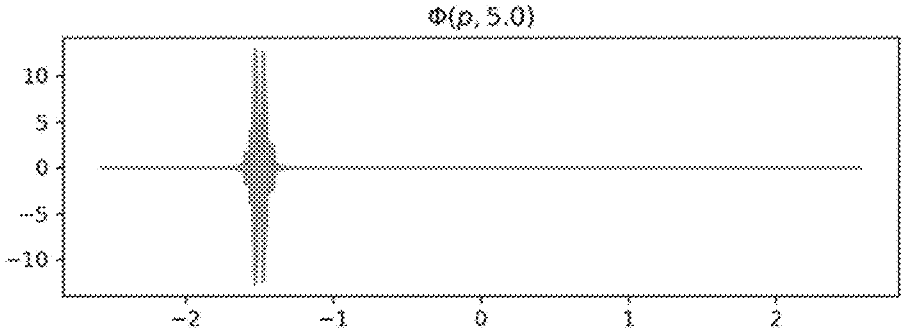
Figure 165G:
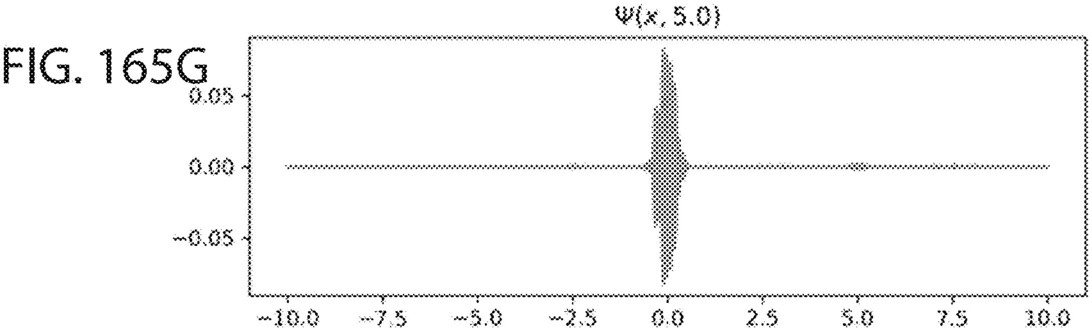
Figure 165H:
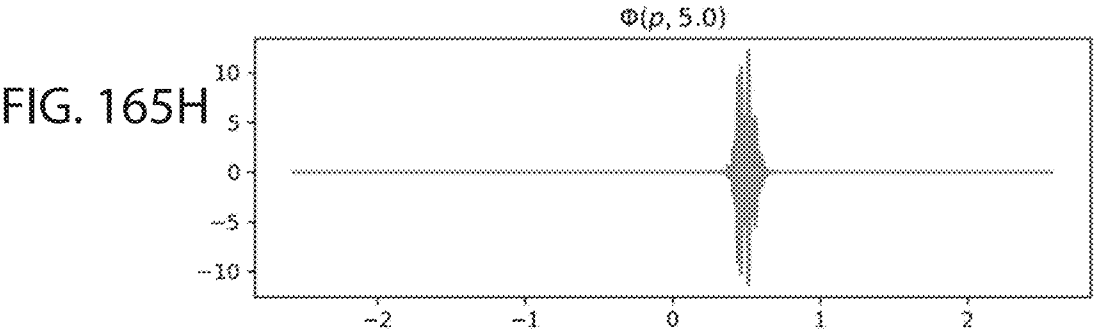
Figure 166A:
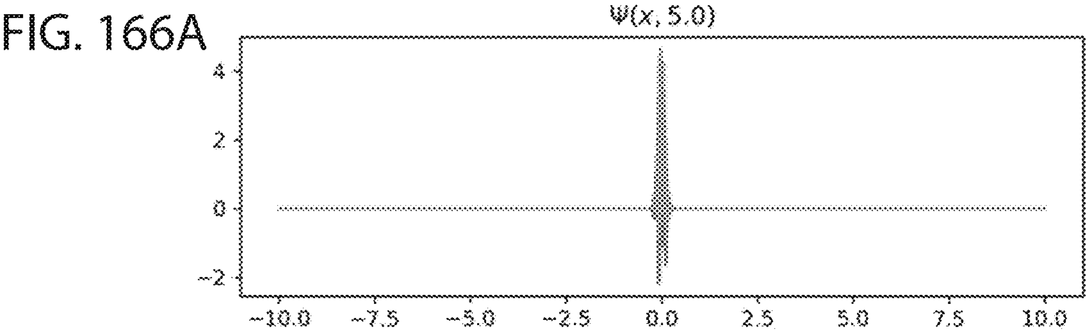
Figure 166B:
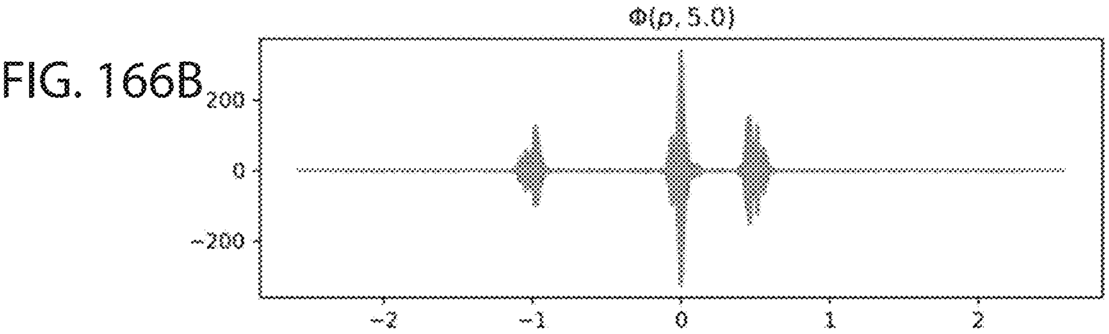
Figure 166C:
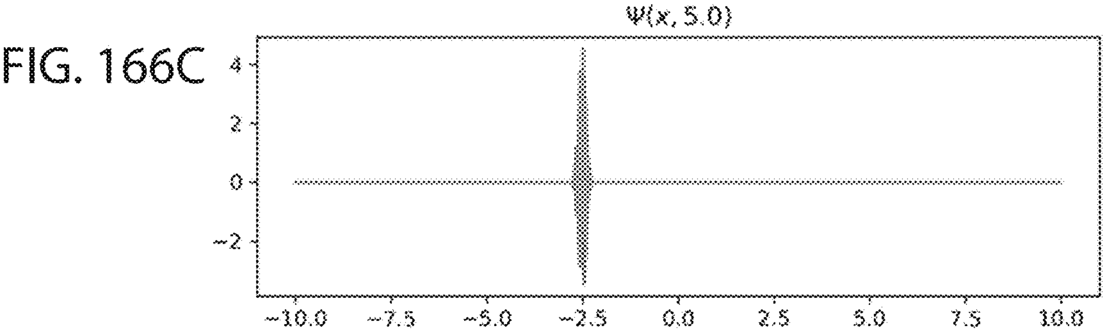
Figure 166D:
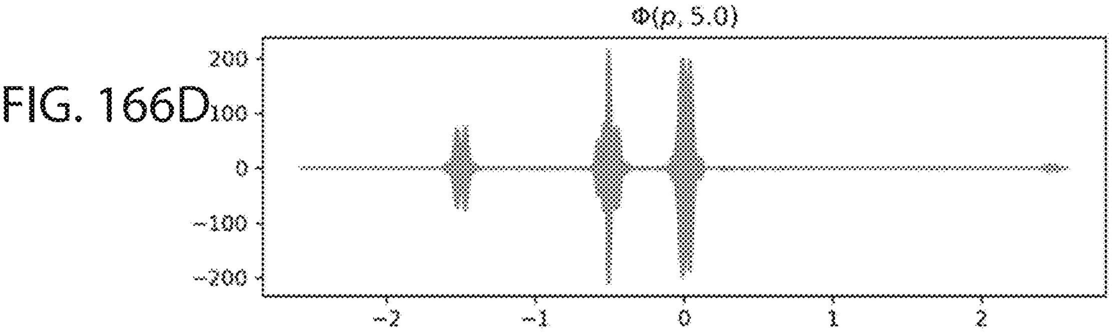
Figure 166E:
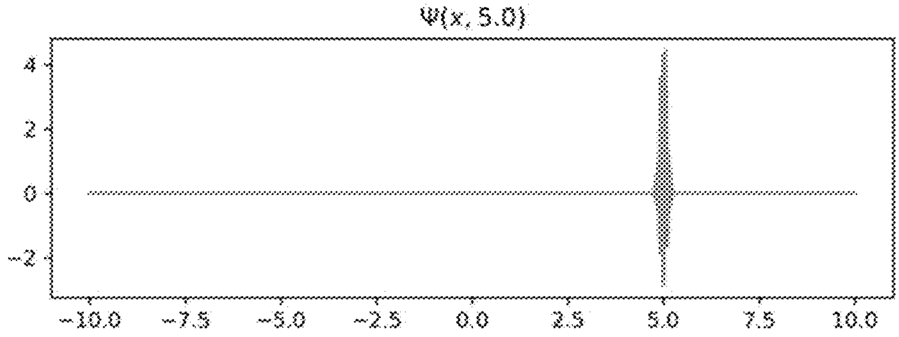
Figure 166F:
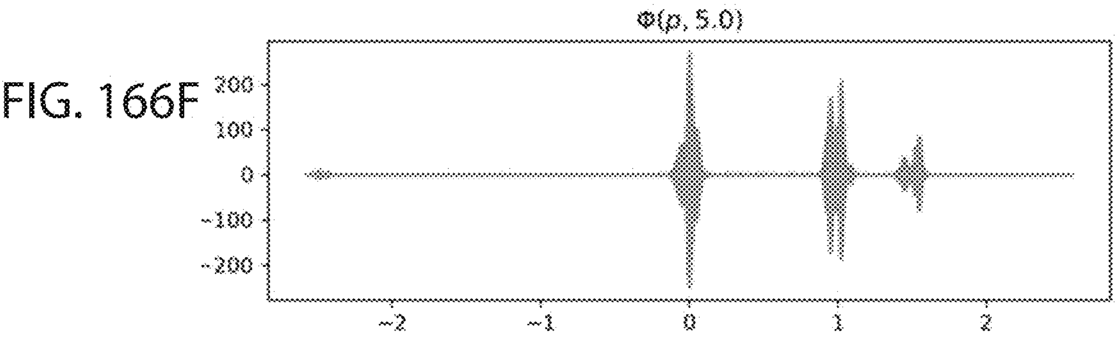

In quantum mechanics, wave functions represent probability amplitude of finding the system in some state. Physical pure states in quantum mechanics are represented as unit-norm vectors in a special complex Hilbert space and time evolution in this vector space is given by application of the evolution operator. Further, in quantum mechanics, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a VMP robot navigates along a one-dimensional floor that includes three doors at doors at $x_0$=−2.5, $x_1$=0, and $x_2$=5.0 and the processor of the VMP robot is capable of determining when it is located at a door based on sensor data observed and the momentum of the VMP robot is constant, but unknown. Initially the location of the VMP robot is unknown, therefore the processor generates initial wave functions of the state shown in FIGS. 161A and 161B. When the processor determines the VMP robot is in front of a door, the possible position of the VMP robot is narrowed down to three possible positions, but not the momentum, resulting in wave functions shown in FIGS. 162A and 162B. The processor evolves the wave functions with a Hamiltonian operator, and after five seconds the wave functions are as shown in FIGS. 163A and 163B, wherein the position space has spread out again given that the momentum is unknown. However, the evolved probability density keeps track of the correlation between position and momentum. When the processor determines the VMP robot is in front of a door again, the wave functions are updated to FIGS. 164A and 164B, wherein the wave functions have significantly narrowed down, indicating a number of peaks representing possible position and momentum combinations of the VMP robot. And in fact, if the processor observes another observation, such as momentum p=1.0 at t=5.0, the wave function in the position space also collapses to the only remaining possible combination, the location near x=5.0, as shown in FIGS. 165A and 165B. It can be seen that the processor collapsed the momentum wave function accordingly. Also, the processor reduced the position wave function to a peak at x=5.0. Given constant momentum, the momentum observation of p=1.0, and that the two door observations were 5 seconds apart, the position x=5.0 is the only remaining valid position hypothesis. FIGS. 165C and 165D illustrate the resulting wave function for a momentum observation of p=0.0 at t=5.0 instead. FIGS. 165E and 165F illustrate the resulting wave function for a momentum observation of p=−1.5 at t=5.0 instead. FIGS. 165G and 165H illustrate the resulting wave function for a momentum observation of p=0.5 at t=5.0 instead. Similarly, the processor collapses the momentum wave function when position is observed instead of momentum. FIGS. 166A and 166B illustrate the resulting wave function for a position observation of x=0.0 at t=5.0 instead. FIGS. 166C and 166D illustrate the resulting wave function for a position observation of x=−2.5 at t=5.0 instead. FIGS. 166E and 166F illustrate the resulting wave function for a position observation of x=5.0 at t=5.0 instead.

In some embodiments, the processor of the VMP robot considers multiple possible scenarios wherein the VMP robot is located in other likely locations in addition to the location estimated by the processor. As the VMP robot moves within the environment, the processor gains information of its surroundings from sensory devices which it uses to eliminate less likely scenarios. For example, consider a processor of a robotic dump truck estimating itself to be 100 cm away from a wall. To account for measurement noise the processor considers additional likely scenarios wherein the robot is, for example, 102, 101, 99 and 98 cm away from the wall. The processor considers these scenarios as possibly being the actual true distance from the wall and therefore reduces its speed after traveling 98 cm towards the wall. If the robot does not bump into the wall after traveling 98 cm towards the wall it eliminates the possibility of it having been 98 cm away from the wall and the likelihood of the robot being 99, 100, 101 and 102 cm away from the wall increases. This way as the robotic dump truck travels within the environment, the processor adjusts its confidence of its location with respect to other VMP robots and the environment based on observations and information gained of the surroundings. In some cases, such a method reduces collisions. In an alternative visualization of this approach the processor inflates the surface area occupied by the robotic dump truck such that it is hypothesized that the robotic dump truck occupies all state spaces falling within the borders of the inflated surface area. Since the error of perceived position of the robot increases with movement, the processor inflates the surface area occupied by the robot with every movement. The processor deflates the surface area occupied by the robot when occupancy of a hypothesized state space falling within the borders of the surface area is proven to be false, thereby reducing the number of state spaces and hence area occupied by the robotic dump truck. In this example, wherein the surface area occupied by the robotic dump truck is equivalent to the integral of all state spaces falling within the borders of the surface area, the occupancy of all state spaces is uniformly distributed. In some embodiments, the inflation and deflation is not the same in all directions. In some embodiments, the amounts of inflation and deflation in different directions depends on the type of motion, noise, sensors, etc.

In some embodiments, the processor initially assumes the VMP robot is located somewhere within an area greater than the size of the robot, the location being the seed location of the VMP robot. This is due to initial uncertainty in the position and heading of the VMP robot and the surroundings. As more data is collected and the processor is more certain of the position of the VMP robot relative to its surroundings, the processor reduces the size of area within which the VMP robot is assumed to be located. On the other hand, as the VMP robot moves and noise, such as movement noise, is introduced, the processor increases the area within which the VMP robot is assumed to be located as uncertainty in the position of the robot increases. In some embodiments, the processor adjusts the shape of the area within which the VMP robot is assumed to be located within based on deviation between the measured and true heading and translation of the VMP robot as it moves. In some embodiments, the processor uses information on linear and angular undershoot and overshoot to help determine the shape of the area within which the VMP robot is assumed to be located within. Force is needed to cause linear and angular acceleration and a given amount of force can either be spent on linear overshooting or angular overshooting. If the VMP robot overshoots linearly it undershoots angularly and vice versa.

FIGS. 167A-167C illustrate an example of how the area within which the VMP robot is assumed to be located changes in size with the collection of data and movement of the VMP robot. FIG. 167A illustrates VMP robot 16700 with sensor 16701 within environment 16702. VMP robot 16700 rotates 360 degrees while sensor 16701 captures data of the environment. The processor of VMP robot 16700 uses a subset of the data to create a low-resolution map of the environment. Initially, the processor of VMP robot 16700 assumes VMP robot 16700 is located somewhere within area 16703, greater in size than VMP robot 16700 as there is uncertainty in the location of VMP robot 16700. For example, the true rotation of the VMP robot may not actually be exactly 360 degrees or the VMP robot may not actually rotate exactly in place resulting in uncertainties in position and heading of the VMP robot relative to the surrounding environment. FIG. 167B illustrates sensor 16701 capturing data of the environment within field of view 16704. As more data is captured and processed, the processor becomes more certain of the predicted location of VMP robot 16700 and hence reduces the size of area 16703 within which the VMP robot is assumed to be located. FIG. 167C illustrates VMP robot 16700 moving within environment 16702 in direction 16705. As VMP robot 16700 moves, noise, such as movement noise, is introduced and the processor increases area 16703 within which the VMP robot is assumed to be located as uncertainty in the location of the VMP robot 16700 increases. FIG. 168 illustrates an example of a shape of area 16703 within which VMP robot 16700 with sensor 16701 is assumed to be located. As VMP robot 16700 moves within environment 16702, the processor of VMP robot 16700 adjusts the shape of area 16703 based on deviation between the measured and true heading and translation of VMP robot 16700 as it moves. In some embodiments, the processor uses information on linear and angular undershoot and overshoot to help determine the shape of area 16703.

In embodiments, wherein the state of the VMP robot within a space is initially unknown, the processor of the VMP robot may generate a uniform probability distribution over the space. In other instances, any other probability distribution may be generated depending on the information known about the state of the VMP robot and the certainty of the information. Over time and as more measurements and observations are received by the processor of the VMP robot, the probability distribution over all possible states of the VMP robot in the space evolves.

In some embodiments, the processor uses quantum refinement. In some embodiments, the processor simulates multiple VMP robots located in different possible locations within the environment. In some embodiments, the processor may view the environment from the perspective of each different simulated VMP robot. In some embodiments, the collection of simulated VMP robots form an ensemble. In some embodiments, the processor evolves the location of each simulated VMP robot or the ensemble over time. In some embodiments, the range of movement of each simulated VMP robot may be different. In some embodiments, the processor may view the environment from the FOV of each simulated VMP robot, each simulated VMP robot having a slightly different spatial representation of the environment based on their simulated location and FOV. In some embodiments, the collection of simulated VMP robots form an approximate region within which the VMP robot is truly located. In some embodiments, the true location of the VMP robot is one of the simulated VMP robots. In some embodiments, when a measurement of the environment is taken, the processor checks the measurement of the environment against the spatial representation of the environment of each of the simulated VMP robots. In some embodiments, the processor predicts the VMP robot is truly located in the location of the simulated VMP robot having a spatial representation that best matches the measurement of the environment. In some embodiments, the simulated VMP robot which the processor believes to be the true VMP robot may change or may remain the same as new measurements are taken and the ensemble evolves over time. In some embodiments, the ensemble of simulated VMP robots remain together as the ensemble evolves over time. In some embodiments, the overall energy of the collection of simulated VMP robots remains constant in each timestamp, however the distribution of energy to move each simulated VMP robot forward during evolution may not be distributed evenly among the simulated VMP robots. For example, in one instance a simulated VMP robot may end up much further away than the remaining simulated VMP robots or too far to the right or left, however in future instances and as the ensemble evolves may become close to the group of simulated VMP robots again. In some embodiments, the ensemble evolves to most closely match the sensor readings, such as a gyroscope or optical sensor. In some embodiments, the evolution of the location of simulated VMP robots is limited based on characteristics of the physical VMP robot. For example, a robot may have limited speed and limited rotation of the wheels, therefor it would be impossible for the robot to move two meters, for example, in between time steps. In another example, the robot may only be located in certain areas of an environment, where it may be impossible for the robot to be located in areas where an obstacle is located for example. In some embodiments, this method of quantum refinement may be used to hold back certain elements or modify the overall understanding of the environment. For example, when the processor examines a total of ten simulated VMP robots one by one against a measurement, and selects one simulated VMP robot as the true VMP robot, the processor filters out nine simulated VMP robots, thus filtering ten quanta to one quantum.

In some embodiments, the FOV of each simulated VMP robot may not include the exact same features as one another. In some embodiments, the processor saves the FOV of each of the simulated VMP robots in memory. In some embodiments, the processor combines the FOVs of each simulated VMP robot to create a FOV of the ensemble using methods such as least squares methods. This method is described above for creating a map by aligning sensor data to create one representation of the environment, which may be more accurate than each individual FOV. In some embodiments, the processor tracks the FOV of each of the simulated VMP robots individually and the FOV of the entire ensemble. In some embodiments, other methods may be used to create the FOV of the ensemble (or a portion of the ensemble). For example, a classifier AI algorithm may be used, such as Naive Bayes classifier, Least squares support vector machines, k-nearest neighbor, Decision trees, and Neural networks. In some embodiments, more than one FOV of the ensemble (or a portion of the ensemble) may be generated and tracked by the processor, each FOV created using a different method. For example, the processor may track the FOV of ten simulated VMP robots and ten differently generated FOVs of the ensemble. At each measurement timestamp, the processor may examine the measurement against the FOV of the ten simulated VMP robots and/or the ten differently generated FOVs of the ensemble and may choose any of these 20 possible FOVs as the ground truth. In some embodiments, the processor may examine the 20 FOVs instead of the FOVs of the simulated VMP robots and choose a derivative as the ground truth. The number of simulated VMP robots and/or the number of generated FOVs may vary. During mapping for example, the processor may take a first field of view of the camera and calculate a FOV for the ensemble or each individual observer (simulated VMP robot) inside the ensemble and combine it with the second field of view captured by the camera for the ensemble or each individual observer inside the ensemble. The processor switches between the FOV of each observer (e.g., like multiple CCTV cameras in an environment that an operator may switch between) and/or one or more FOVs of the ensemble (or a portion of the ensemble) and chooses the FOVs that are more probable to be close to ground truth. At each time iteration, the FOV of each observer and/or ensemble evolves into being closer to ground truth.

In some embodiments, simulated VMP robots may be divided in two or more classes. For example, simulated VMP robots may be classified based on their reliability, such as good reliability, bad reliability, or average reliability or based on their speed, such as fast and slow. Classes that move to a side a lot may be used. Any classification system may be created, such as Linear classifiers like Fisher's linear discriminant, Logistic regression, Naive Bayes classifier and Perceptron, Support vector machines like Least squares support vector machines, Quadratic classifiers, Kernel estimation like k-nearest neighbor, Boosting (meta-algorithm), Decision trees like Random forests, Neural networks, and Learning vector quantization. In some embodiments, each of the classes evolve differently. For example, for fast speed and slow speed classes, each of the classes moves differently wherein the simulated VMP robots in the fast class will move very fast and will be ahead of the other simulated VMP robots in the slow class that move slower and fall behind. For example, given a gyroscope that shows two meters of movement and classes X, Y, and Z, the ensemble may evolve as illustrated in FIG. 169. At each time stamp 16900, 16901, and 16902, class X moves the fastest as it belongs to the fastest speed class. In other words, when a force is applied at each time stamp to evolve the classes over time, the force moves class X more than the rest of the classes. This may be due to class X being lighter than the rest of the simulated VMP robots. The kind and time of evolution may have different impact on different simulated VMP robots within the ensemble. The evolution of the ensemble as a whole may or may not remain the same. The ensemble may be homogenous or non-homogenous.

In some embodiments, samples are taken from the phase space. In some embodiments, the intervals at which samples are taken may be fixed or dynamic or machine learned. In a fixed interval sampling system, a time may be preset. In a dynamic interval system, the sampling frequency may depend on factors such as speed or how smooth the floor is and other parameters. For example, as the speed of the VMP robot increases, more samples are taken. Or more samples are taken when the VMP robot is traveling on rough terrain. In a machine learned system, the frequency of sampling may depend on predicted drift. For example, if in previous timestamps the measurements taken indicate that the VMP robot has reached the intended position fairly well, the frequency of sampling is reduced. In some embodiments, the above explained dynamic system may be equally used to determine the size of the ensemble. If, for example, in previous timestamps the measurements taken indicate that the VMP robot has reached the intended position fairly well, a smaller ensemble may be used to correct the knowledge of where the VMP robot is. In some embodiments, the ensemble is regenerated at each interval. In some embodiments, a portion of the ensemble is regenerated. In some embodiments, a portion of the ensemble that is more likely to depict ground truth may be preserved and the other portion regenerated. In some embodiments, the ensemble may not be regenerated but one of the observers (simulated VMP robots) in the ensemble that is more likely to be ground truth is chosen as the most feasible representation of the true VMP robot. In some embodiments, observers (simulated VMP robots) in the ensemble take part in becoming the most feasible representation of the true VMP robot based on how their individual description of the surrounding fits with the measurement taken.

The multi-dimensionality in quantum localization described above provides robustness that may be useful in various applications. In some embodiments, the processor uses localization for controlling the operation, settings, and functionality of the VMP robot. For example, the processor uses localization to control the behavior of the VMP robot in different areas, where for instance, certain cleaning functions or settings are desired for different environments. These functions or settings may be triggered once the processor has localized the VMP robot against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the VMP robot. If the processor localizes the VMP robot against a perimeter, for example, it may choose to select a path along the perimeter or it may trigger a polymorphic or other type of path planning algorithm. Or, localizing the VMP robot against a perimeter may trigger a path planning algorithm for cleaning central areas of the environment and, once completed, a wall follow algorithm for cleaning along the boundaries of the environment.

In embodiments, other methods of localization may be used independently or in combination. Examples of localization methods are described in U.S. Patent Application Nos. 62/748,943, 62/746,688, 16/297,508, 62/740,573, 62/740,580, Ser. Nos. 15/955,480, 15/425,130, and 15/955,344 the entire contents of which are hereby incorporated by reference.

In some embodiments, quantum SLAM techniques (or any mapping and localization methods and techniques) may be combined with virtual reality. For example, the combination may be powerful in the real estate industry. Rather than manually capturing images used for selling a home, for example, consider a robot or communication device capable of mapping a home (as described above) while also capturing videos of the home. In some instances, the processor of the robot or communication device combines the generated map and the video to create a virtual reality of the home for potential buyers to experience. In some instances, the processor of the robot creates the virtual reality and shares it with an application of the communication device paired with the robot. In some embodiments, the processor may autonomously modify the virtual reality of the home by staging it with hypothetical furniture in the virtual reality space. In some embodiments, the processor may remove items captured in the virtual reality space. In some embodiments, the virtual reality is displayed by the application of the communication device and a user may choose VR objects (e.g., furniture) or VR features (e.g., paint color, flooring type) to add or remove from the virtual reality of the home. In some embodiments, the application includes preset staging packages (e.g., modern, luxury, chic, minimalist, etc.) that a user may choose using the application. In some embodiments, the application may be used by a user for interior design purposes. For example, the application may be used by the user to download specific VR objects, such as particular furniture from well-known furniture manufacturers, and place the VR objects within the VR home to determine if it fits within the space. In another example, the processor may be used to create a virtual reality of a street. The application of the communication device may be used by the user to remove cars and add potted flowers in the virtual reality of the street. For example, FIGS. 170A and 170B illustrate front and rear perspective views of an example of VMP robot 17000 customized to function as an image capturing and video recording robot including four (or more in other cases) stereovision cameras 17001 to capture 360 degrees of the surrounding area, connected to the robot 17000 by connector 17002. The processor of the VMP robot 17000 builds a 3D virtual reality of a home or other spaces using the images and/or videos captured. In some embodiments, the virtual reality of an environment is generated while also mapping the environment as described above. In some embodiments, the 3D virtual reality generated from the captured images may allow a viewer to virtually traverse an environment remotely, feeling as if the viewer were in the environment. In some embodiments, the viewer may be able to remotely guide their virtual experience through the environment, feeling as if the viewer were physically in the environment. For example, a viewer may be able to direct their way through the environment by, for example, clicking, tapping, or swiping to a location in the virtual reality representation. For example, a cursor may be used by a viewer to maneuver through a 3D virtual reality representation of a home by clicking a location to which the viewer desires to move. The viewer may virtually view the home from the perspective of the viewer had they been physically standing at the desired location. In some embodiments, the viewer may use the cursor to rotate the FOV when positioned at the desired location, as if the viewer were physically located at the desired location and rotating in place. In other embodiments, different methods for virtually moving the viewer and rotating the FOV may be used.

In some embodiments, the image capturing robot is mailed to a home by, for example, a realtor. In some embodiments, an image capturing robot such as that illustrated in FIGS. 170A and 170B may be mailed in two or more components and the user assembles the robot upon receipt. In some embodiments, image capturing robots with other configurations are used, such as smaller robots or robots with an extendable pole on which cameras are coupled or may be attached to (similar to FIGS. 170A and 170B) as they may be easier to mail. When the homeowner receives the package, the homeowner may place the robot in the home. In some embodiments, the robot may be connected to Wi-Fi of the homeowner. In some embodiments, the processor of the robot may stream or upload any images or videos captured. In some embodiments, the images captured may be uploaded to a cloud and the uploaded images on the cloud may be accessed using an application executed on any communication device with Wi-Fi connection. In some embodiments, the images captured are uploaded directly to a particular website. In some embodiments, the images captured may be used in a virtual reality setting as described above. In some embodiments, a user may be able to direct the actions of the robot and capture images of the environment remotely using an application of a communication device such as a smartphone, laptop, tablet, remote control, and the like. For example, a realtor may control and command the actions of an image capturing robot, including its movement and the camera, from their office. In some embodiments, the camera captures images or videos while the robot traverses the environment. In some embodiments, the camera captures images or videos while the robot rotates (e.g., 360 degrees) when located at particular locations within the environment.

In some embodiments, the image capturing robot may traverse the environment using a set of wheels, being careful to avoid obstacles in the environment. In some embodiments, the robot may attempt to avoid elevation changes which may make the robot unstable. In some embodiments, the speed at which the robot travels may be optimized. For example, to travel through the environment quickly a robot may be commanded to travel at fast speed. In some embodiments, the robot may be ordered to travel slowly. In some embodiments, the speed at which the robot travels may be optimized to obtain the best images possible or adequate images for the application. For example, when capturing images of an environment it may be preferable that the image capturing robot travel at a slower speed as traveling at a higher speed may cause blurry images. In some embodiments, the robot may have the ability to travel at a same speed regardless of the surface type. For example, the robot may under normal circumstances travel at a slower speed on a thick pile carpet as compared to a tiled surface. As such, the processor of the robot may provide more power to the wheels when on, for example, a thick pile carpet, in order to achieve the same speed as when navigating on, for example, a tiled surface. In some embodiments, the image capturing robot may be an air based device (e.g., a robotic drone). In some embodiments, it may be beneficial to capture images of the environment from a higher perspective, such as a higher perspective in a room or a top perspective over a building (e.g., birds eye view). In some embodiments, the image capturing robot may use a set of rotors to fly, avoiding obstacles while capturing images of the environment. For example, the camera may be used to capture images of a bedroom from the eye level of a human to provide a realistic perspective view of the bedroom. As described above, the image capturing robot may be controlled remotely, including the speed at which the robot flies, the direction in which the robot travels, and the internal or external camera.

In some embodiments, the VMP robot includes one or more onboard cameras used for capturing images and videos. In some embodiments, the VMP robot includes one or more cameras capable of capturing images or videos of the environment in 360 degrees. In some embodiments, the VMP robot may carry, connect with, and control an external camera, smartphone, or other type of device capable of capturing images or videos. In some embodiments, a schedule (e.g., day, time, frequency, duration of time to spend in each area, etc.) may be set by a user or the processor of the VMP robot for capturing images or videos of a place. For example, the schedule of an image capturing robot may include capturing images of a first side of a house in the morning as the first side of the house faces the morning sun and capturing images of a second side of a house in the afternoon as the second side faces the afternoon sun, the goal being to entice buyers by displaying the natural light in the home.

In some embodiments, the processor may display a status of the robot on an interface of the robot or may transmit its status to a communication device paired with the robot which may display the status of the robot. In some embodiments, the status of the robot may be communicated using audio or visual methods. Examples of statuses and/or messages may include, but is not limited to, arrived in at a location, in route to a location, parked at a location, capturing images, image capturing complete, image capturing delayed, image capturing incomplete, stuck, collision with obstruction, damaged, and the like.

In some embodiments, the processor of the image capturing robot labels the images captured based on which room the image was captured in. In some embodiments, for example, the processor may label an image captured in a living room, as living room. In some embodiments, a user may label each image using an application of a communication device paired with the robotic device. In some embodiments, filters may be used when capturing images to alter the aesthetics of the image. For example, special lighting effects such as using a warm light filter rather than a bright light filter may be applied by the processor to make a particular room appear cozy.

In some embodiments, the image capturing robot may be used for multiple applications, such as surveillance. For example, an image capturing robot may provide surveillance surrounding a home. A static camera mounted on a wall remains in one location and may be unable to capture an image of a burglar, however, the image capturing robot described herein may follow the burglar around the home and is more likely to capture an image of the burglar. In some embodiments, the processor may identify objects in images, such as a weapon of the burglar. In some embodiments, the processor may alert a homeowner or emergency services when a burglar or suspicious activity is detected or of a level of danger or of particular details, such as detection of a weapon. Further details of an image capturing robot are described in U.S. Patent Application No. 62/730,675, the entire contents of which is hereby incorporated by reference.

SLAM and variations of SLAM may be used for various applications. For example, a wearable product, such as a watch, may be used to capture measurements of the environment while rotating the wearable product. FIG. 171A illustrates a watch 17100 and a user rotating their hand while the watch 17100 captures measurements of the environment. FIG. 171B illustrates other wearable products, namely glasses 17101, watch 17100, and hardhat 17102 including sensors (e.g., camera, LIDAR, depth sensor, inertial measurement unit, etc.) 17103 that may be used to capture measurements of the environment. In some embodiments, a local processor may generate a map of the environment and localize using the sensor measurements. In some embodiments, the sensor measurements are transmitted to an external memory and the map is generated by a processor of another device. In some embodiments, the axis of rotation may be noisy during movement of the wearable products and sensor data collection, therefore similar methods as described above for generating a map may be used.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multipurpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used. In some embodiments, a localization and mapping chip or a processing chip such as a CPU or MCU with a localization and mapping processing unit may be used.

In some embodiments, various bumps on a path of the VMP robot may affect the map or localization. In some embodiments, an IMU may be used to measure a bump in the z-axis. In some embodiments, the processor detects a bump when the values in the z-axis suddenly increase beyond a predetermined threshold. In some embodiments, the processor filters out the readings captured while the robot was traversing across the bump. In some embodiments, the processor uses the last known good mapping and localization prior to the robot traversing the bump, generates an ensemble of eight (or another number) hypothesized robots, each hypothesized robot being approximately half a diameter of the robot apart from one another and located within the last known good map around the last known good localization, and determines which hypothesized robot fits best with readings collected after fully traversing over the bump. In some embodiments, the number of hypothesized robots and the distance between the hypothesized robots may vary. In some embodiments, the processor may choose a particular hypothesized robot and generate an ensemble around the hypothesized robot in iterative process until gaining localization back. In some embodiments, these methods may be performed in parallel or done in an iterative process. In some embodiments, the processor of the robot adjusts all of its motors such as the main brush motor, the one or more side brushes motors, etc. to on, off, then maximum speed intermittently when the robot becomes stuck. In some embodiments, the processor stops its motors and announces an error code. In some embodiments, the GUI of the robot of an application of a communication device paired with the processor of the robot may suggest that the robot either abort the sweeping or drive back to the dock when the robot is stuck. In some embodiments, the processor adjusts all motors to maximum speed and drives at full speed to overcome being stuck and drives back to the dock when drive back to the dock is selected.

In some embodiments, a VMP robot may attempt to make a determination as to whether or not it has visited a work area previously. In some embodiments, the processor of the VMP robot may localize and place itself within an internal map of the environment to determine its location. In some embodiments, sensors, cameras or the like may capture information of the environment and the processor may determine whether or not the captured area has been previously visited. For example, cameras of a VMP robot may capture images of a working environment such as obstacles, the transition points of floors and walls, and the like. A processor of a VMP robot may extrapolate features in these images in order to determine a layout of a work area. In some embodiments, a VMP robot may have a database of images captured of the work environment and the processor of the VMP robot may identify common features between the images captured and those in the database in order to determine if a work area has previously been visited. Alternatively, LIDAR may capture features of the working environment, and the processor may use the data captured to identify features of a work area based on data from prior work cycles. In some embodiments, the processor of the VMP robot may identify features in a given work area, such as a wall pattern and attempt to identify whether or not those are features that were identified previously in the same working session. For example, if the processor of the VMP robot has identified a unique characteristic of a wall, if the VMP robot returns and identifies the same characteristic in the wall area, a processor of the VMP robot may determine that it has already operated in this location. In some embodiments, a unique characteristic may appear slightly different when identified a second time, and the processor of a VMP robot may need to manipulate the data of the unique characteristic captured in order to determine whether or not the characteristic accurately matches what was previously captured when determining whether or not a work area has previously been operated in. For example, a unique characteristic of a work area may initially be captured up close, but at a later time, the same characteristic may be captured from further away, or from a different sensor type, or from a different angle, or the like. In such a situation, the processor of the VMP robot manipulate the data captured by, for example, enlarging an image captured from further away to attempt to match with the image captured up close, rotating the image if the images were captured from different angles, or the like to determine if the images match each other. As another example, a VMP robot may encounter a transition from one work surface type to another such as a wood flooring surface to a thick pile carpet surface, and based on where the transition is in a work area in relation to where the VMP robot is located in an internal map of the work environment, the processor of the VMP robot may determine that it has already visited this location.

In some embodiments, if the processor of the VMP robot recognizes an area as having been previously visited, the processor may alter the operations or path of the VMP robot. For example, if a VMP robot has already operated in a first work area, has just finished operating in a second work area, and has traveled back to the first work area, the processor may determine that the VMP robot has already completed operations in the first work area and thereafter direct the VMP robot to leave the first work area. In another example, a schedule of a VMP robot may be set for a first work area. If the VMP robot navigates to the first work area at a time or date on which the VMP robot is not to operate in the first work area, the processor may identify that it has navigated to the first work area and direct the VMP robot to leave the first work area. In some embodiments, the VMP robot may enter a first work area, the processor may determine that the first work area has a low priority for operations and thus direct the VMP robot to leave and operate in a second work area with a higher priority for operations. In some embodiments, if the VMP robot has left a work area with a low operations priority and has completed operations in other work areas with a higher priority, the VMP robot may thereafter navigate back to the first work area to complete operations. In some embodiments, the VMP robot may operate in a portion of a first work area, navigate to a second work area to complete operations, then navigate back to the first work area to complete operations in a second portion of the first work area. In some embodiments, the VMP robot may navigate away from an area with a low operations priority and return to this work area during a different operations cycle.

In some embodiments, the VMP robot may be ordered to skip operations in a work area. For example, a button on a user interface of the VMP robot, or an application of a communications device that is paired with the VMP robot may be used to command the processor of the VMP robot to skip operations in a given work area. An example of a communications device includes but is not limited to: a smart phone, smart watch, laptop, tablet, remote control, or the like. In some embodiments, if a VMP robot enters a work area, the VMP robot may be commanded to leave the work area. For example, when individuals are in a work area, a VMP robot may attempt to operate in the same work area which may be burdensome or frustrating for the individuals, and the VMP robot may be commanded to leave the work area. In some embodiments, if the VMP robot is commanded to leave a work area, the VMP robot may attempt to return to the work area for operations at a later time. For example, if a VMP robot is ordered to leave a work area, the VMP robot may attempt to operate in the work area at the end of the operational cycle, returning after it has completed operations in all other work areas. In some embodiments, the VMP robot may be commanded to clean a room at a particular point in a cleaning session. For example, a VMP robot may be commanded to leave a work area and not to operate in it until a first and second work area are operated in, but to operate in the work area skipped previously before operating in a fourth and fifth work area. In some embodiments, a selection may be made as to when a work area is to be operated in based on the number of times a button is pressed commanding the robot to skip a work area. For example, if a button is pressed six times in succession, then the VMP robot should operate in the skipped work area once five other work areas are operated in first. In some embodiments, the VMP robot may be commanded to leave an area, where after the VMP robot may attempt to operate in the area during a different operational cycle. In some embodiments, the VMP robot may store data regarding commands to leave a work area and use this data for future operational cycles. For example, if on a recurring basis, a VMP robot is commanded to leave a work area at a similar time on a recurring basis, a processor of the VMP robot may compile this data and use it in future operational cycles to determine that the VMP robot should not operate in that area at those times. In some embodiments, the VMP robot may alter a schedule it has set for recurring services based on commands received to vacate an area. In some embodiments, a command may be set for the VMP robot to vacate an area but to return at an unspecified future time. In some embodiments, a command may be set for the VMP robot to vacate an area but to return at a specified predetermined time. In some embodiments, if a first VMP robot obtains a command to leave a work area, the processor of the first VMP robot may communicate with additional VMP robots for the purposes of sharing this data in order to indicate that other VMP robots should not operate in a given area at a particular time or for the purposes of sharing other data. In some embodiments, the processor of the VMP robot may use historical data with regards to prior work operations when planning an operational session. For example, in embodiments, for a mobile robotic cleaning device, an operational session set by the processor of the VMP robot may use prior historical data with regards to the level of debris previously cleaned in each work area in determining which work areas should be cleaned first.

In some embodiments, the processor of the VMP robot may fail in a localization capacity and not recognize where it is located in a work environment. In some embodiments, if localization fails, the VMP robot may begin a new mapping of the working environment, operating in a new functional and mapping capacity, visiting each work area, such as, each room, and mapping these areas beginning with the work area in which localization first failed. In some embodiments, the failure of localization may include the loss of data pertaining to the location of the VMP robot's initial navigational starting point, such as the location of a docking or base station of the VMP robot to which the VMP robot returns following each work session. In some embodiments, when localization fails the processor of the VMP robot may immediately begin to search for the base station. In some embodiments, when localization fails the VMP robot may operate and map work areas while simultaneously searching for the base station. In some embodiments, when localization fails the VMP robot may complete a work session, mapping the environment as it does so, and return to each work area after the work session to search for the base station. In some embodiments, the processor of the VMP robot may search for the base station by searching for an IR light emitted by a transmitter of the base station to be received by the VMP robot which will signal the VMP robot to return to the base station. In some embodiments, the processor of the VMP robot may search for a base station by rotating in 360 degrees in each work area until a signal from the base station is received by the VMP robot. In some embodiments, if the VMP robot does not detect a signal from the base station in a work area, the VMP robot may automatically navigate to a different work area. In some embodiments, if the VMP robot detects a signal from the base station in a work area, the VMP robot may automatically cease operations and navigate directly to the base station. In some embodiments, if the VMP robot detects a signal from the base station in a work area, the VMP robot may navigate to a new work area before navigating back to the base station. In some embodiments, if the base station is detected by the VMP robot, and the VMP robot thereafter navigates to a new work area, a path plan may be set by the processor for navigating back to the base station. In some embodiments, if a first VMP robot's localization fails, a processor of the first VMP robot may communicate with a centralized control system, a base station, other devices or processors of other VMP robots to assist with the processor recovering a localization capacity. For example, if a first VMP robot's localization fails, a processor of the first VMP robot may send out, for example, a distress signal indicating that it has lost localization, and a processor of a second VMP robot, may share data such as maps or other beneficial data with the processor of the first VMP robot to assist the with recovering some form of a localization capacity. In an additional example, if the localization capacity of the processor of the VMP robot fails, the processor may communicate with a centralized control system, base station, other devices or processors of other VMP robots to attempt to recover data such as maps or other beneficial data to assist the with recovering some form of a localization capacity. In some embodiments, the signal transmitter used may be an omni-directional signal emitter such as, for example, an IR signal emitter. In some embodiments, the signal transmitter may located on a VMP robot and the signal may be received by the base station. In some embodiments, when localization fails, the VMP robot may detect and mark obstacles encountered in the environment within a new map generated during the operational cycle as the VMP robot navigates in the work environment. In some embodiments, features on the base station may be used for the processor of the VMP robot to easily distinguish when searching for the base station. For example, unique angles or physical characteristics of a base station may be implemented in memory of the processor to help the processor easily identify the base station. Further, characteristics of a surface of a base station such as printing, painting, patterns, and the like may be used by the processor to easily identify the base station. Further details of methods for recognizing prior rooms and skipping prior rooms visited are disclosed in U.S. Patent Application No. 62/740,558, the entire contents of which is hereby incorporated by reference.

In some embodiments, the processor of the VMP robot generates a movement path in real-time based on the observed environment. In some embodiments, the processor of the VMP robots determines a movement path in real-time based on sensor observations captured by sensors. In some embodiments, a topological graph represents the movement path and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the VMP robot as it follows along edges linked at vertices. While executing the movement path, in some embodiments, rewards may be assigned by the processor as the VMP robot takes actions to transition between states and uses the net cumulative reward to evaluate a particular movement path comprised of actions and states. A state-action value function may be iteratively calculated during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the VMP robot iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment. In some embodiments, the reward is determined individually for the VMP robot, or the reward is a cumulative reward of each of the two or more VMP robots collaborating with another. For example, the movement path chosen for each of the two or more robotic dump trucks and robotic excavators collectively maximizes the cumulative reward. Further, the states, actions, and outcomes experienced by one VMP robot may be shared with other VMP robots operating within the same environment such that actions that resulted in poor outcome may be avoided. For example, if one robotic dump truck finds that the action of transitioning to a particular state results in the robotic dump truck becoming stuck on the way to dump excavated soil, this information may be shared with other processors of robotic dump trucks such that they may avoid that particular action.

In some embodiments, the properties of the vertices and edges of the topological graph describing the movement path of the VMP robot may be provided at run-time as an argument based on sensory input of the VMP robot or other collaborating VMP robots or from external sensors. A property of a vertex may be, for example, its position and the number and position of vertices linked via edges. A property of an edge may be, for example, edge type such as a line or arc, edge length or radius depending on edge type, angular orientation and connecting vertices. In some embodiments, vertices and edges may also include other properties such as driving surface type (e.g., gravel, paved, hard wood floor, carpet, tile, etc.), area identifier (e.g., excavation area, soil dump site, parking lot, highway, bedroom, kitchen, etc.) and/or driving conditions (e.g., maximum speed). In some embodiments, the number of roots or nodes of the topological graph is limited to one. A vertex designated as a root within the topological graph by the processor of the VMP robot is capable of reaching the whole graph from the designated vertex, i.e. there is a path from the root to all other vertices and edges within the graph.

As the processor receives sensory input (from a local or remote sources), in some embodiments, it creates a representation of the map in a taxicab coordinate system and begins to devise a topological path within discovered areas, i.e. areas for which sensory input has been collected, the edges of the path being lines following along the gridlines of the taxicab coordinate system. Sensory input may be, for example, a collection of distance measurements. In some embodiments, distance measurements may be taken using distance measurement devices such as LIDAR, camera, laser, sonar, ultrasonic, stereo vision, structured light vision devices or chip-based depth sensors using CMOS or CCD imagers, IR sensors, and such. In some embodiments, other sensory input may be used, for example, data indicating driving surface type or obstacle detection. For example, optical driving surface sensors may detect a pattern of reflected light emitted onto the driving surface, which upon multiple stages of signal processing and machine learning embodiments may determine to a degree of certainty the type of driving surface upon which the VMP robot drives. As a further example, obstacles may be detected by embodiments based on a sensed reflection of emitted light from an obstacle sensor. Tactile sensors may also be used by embodiments to provide sensory input to the processor when physical contact is made with an object. The devised topological path may be based on estimates of suitable properties for vertices and edges based on sensory input received. The next action or movement of the VMP robot may be along a path defined by the estimated properties of the vertices and edges. As the VMP robot executes the action, it transitions from its current state to a new state. After completing each action and transitioning to a new state, in embodiments, a reward may be assigned by the processor and a state-action value function may be iteratively calculated based on the current reward and the maximum future reward at the next state. In some embodiments, e.g., where time is not considered discrete, the value of the reward may be dependent on sequential time required to complete the action and transition to the new state, where a greater negative reward is assigned for longer times. As such, in some embodiments, the VMP robot incurs a negative reward at all times. Since the VMP robot is penalized for time, any event that may reduce the efficiency of the VMP robot in terms of time to complete its task increases its overall penalty. These events may include collisions with obstacles, number of U-turns, repeat actions, driving distance, and driving on particular types of driving surfaces. In some embodiments, the processor uses these events to directly assign negative reward thereby acting as optimization factors themselves. In some embodiments, the processor uses other efficiency metrics, such as percentage or level of task completion. Once the VMP robot completes its task and hence the topological movement path required to complete the task, a positive reward value (e.g., predetermined or dynamically determined) may be assigned. A net reward value for the executed movement path, consisting of a sequence of states and actions, may then be calculated as the sum of the cumulative negative reward from the multiple actions taken while transitioning from one state to another and the positive reward upon completion of the task. In some embodiments, the state is a collection of current states of the two or more VMP robots collaborating with one another and the reward is a cumulative reward of each of the two or more VMP robots collaborating.

As multiple work sessions are executed over time, in embodiments, optimal state-action value function and optimal policy from which actions from different states are selected may be determined. From a single state, there may be several actions that may be executed. The sequence of states and actions that result in the maximum net reward, in some embodiments, provides the optimal state-action value function. The action from a state which results in the highest reward provides the optimal policy for the given state. As different movement paths are executed over time, the number of states experienced, actions taken from each state, and transitions increase. In some embodiments, the processor devises a path for the VMP robot iteratively over multiple work sessions, evolving to become more efficient by choosing transitions that result in most favorable outcomes and by avoiding situations that previously resulted in low net reward. In some embodiments, properties for each movement path are selected within an assigned work cycle such that the cumulative penalty value for consecutive work cycles have a lowering trend over time. In some embodiments, convergence to a particular movement path may be executed by the processor of the VMP robot when the reward is maximized or a target reward is achieved or a period of time has passed after which the processor may converge the movement path to the path with highest reward. After convergence, assuming the system did not fall into a local minimum or is able to get out of a local minimum, the evolved movement path may be deemed by the processor of the VMP robot to likely be more efficient than alternate paths that may possibly be devised using real-time sensory input of the working environment. For example, processors of multiple robotic garbage trucks collaborate with one another to determine the movement path of each of the robotic garbage trucks that minimizes the time required for the garbage trucks to pick up all city garbage, resulting in maximum reward for the system of robotic garbage trucks collaborating with each other.

In some embodiments, the processor may avoid falling into a local minimum using techniques such as random restarts, simulated annealing and tabu search. For example, in employing random restarts technique, the processor may randomly restart the process of searching for a candidate solution starting at a new random candidate after a certain amount of time, while still saving in memory previous candidate solutions. In some embodiments, wherein simulated annealing technique is used, the processor replaces a current candidate solution when a better solution is found but may also probabilistically replace the current candidate solution with a worse solution. In some embodiments, using tabu search technique, the processor refuses to return back to recently considered candidate solutions until they are sufficiently in the past. This is expected to provide a more reliable and efficient method for a VMP robot to devise path plans as their movements are evaluated and optimized in real-time, such that the most efficient movements are eventually executed and factors reducing efficiency, including but not limited to, repeat coverage, collisions with obstacles, particular types of driving surfaces and U-turns, are reduced with the fine-tuning of properties over time.

The states and actions of the VMP robot (or of multiple VMP robots) devising and executing the movement path may be represented by a Markov Chain comprised of a sequence of random variables $s_1$, $s_2$, $s_3$, . . . . The random variables are states the VMP robot may experience and form a set S called the state space. The topological graph defining the movement path of the VMP robot may therefore be thought of as a sequence of states $s \in S$, where states are connected by paths and are each defined with a discrete time stamp $t \in T$. For the VMP robot to transition from a current state s to next state s', the VMP robot performs an action a E A over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state P(s'|s). is dependent only on the present state. A Markov chain may, therefore, be represented by a topological graph, where the edges of graph t are labelled by the probabilities of transitioning from one state at time t to another at time t'. A Markov chain may be extended to a Markov Decision Process (MDP) through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by P(s'|s), the immediate reward after transitioning from state s to state s' given by r, and the discount factor γ, representing the difference in importance between future and present rewards. The goal of the MDP is to find an optimal state-action value function by identifying sequence of states and actions with highest net reward. Since multiple actions may be taken from each state, the goal is to also find an optimal policy that indicates the action from each state with the highest reward value.

In a MDP actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r, $s_t$, $a_t$, $r_{t+1}$, $s_{t+1}$, $a_{t+1}$, $r_{t+2}$, $s_{t+2}$, $a_{t+2}$, $r_{t+3}$, . . . $a_T$, $r_T$, $S_T$. The net return $R_T = r_{t+1} + \gamma^1 r_{t+2} + \ldots + ^{\gamma^{T-t-1}} r_T$ to be expected in the future is the sum of the rewards received for the sequence of states and actions beginning from state $s_t$ and ending with terminal state $s_T$, wherein $0 \le \gamma < 1$ is a discount factor applied as distant rewards are less important. The value of a state-action pair $Q(s,a) == E[R_T | s_t = s, a_t = a]$ is defined as equivalent to the expected return $R_T$ for the sequence of states and actions beginning with state $s_t$ and action $a_t$ and ending with terminal state $S_T$. By finding the sequence of states and actions which maximize the state-action value function Q(s,a), the optimal value function $Q^*(s,a) = \max E[R_T | s_t = s, a_t = a]$ is identified. And the optimal policy $\pi^*(s) = \text{argmax } Q^*(s,a)$ for each state may be derived by identifying the highest valued action which can be taken from each state. To iteratively calculate the state-action value function for a given state s and action a, the Bellman Optimality equation may be applied. The optimal value function obeys Bellman Optimality equation and may be expressed as $Q^*(s,a) = E[r + \gamma \max Q^*(s',a')]$. The equation expresses that the value for a given state s and action a should represent the current reward r observed at state s plus the maximum discounted γ future reward for the next state s' the robotic device would end up in. This equation can be used by the processor to iteratively calculate the state-action value $Q_{i+1}(s,a) = E[r + \gamma \max Q_i(s',a')]$ for a given state s and action a as the sequence of states and action are executed. i is the iteration number and begins at i=0, with $Q_0(s',a')$ being initially assumed based, for example, on previous experience, the midpoint of the min and max value possible, or an arbitrary value. Based on the definition of an expected value, the equation is equivalent to $Q_{i+1}(s,a) = \Sigma P(s'|s)[r + \gamma \max Q_i(s',a')]$, wherein P(s'|s) is the probability that action a will lead to state s', as previously described above. In the particular application of determining optimal movement path, the sequence of states and actions corresponds to the states visited and actions taken while executing the movement path from start to finish, where actions are defined by the properties of vertices and edges chosen based on sensory input from sensors of the VMP robot or sensors of other VMP robots or fixed sensing devices. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions.

In some embodiments, the processor of the VMP robot may employ topological geometry to spatially relate objects. In some embodiments, the processor of the VMP robot may use topological geometry to perform transformation of objections, such as, translation, rotation, reflection, stretching, bending and twisting, but neighborhoods, i.e. spatial relations, may remain preserved. For example, a circular curve centered within a larger circular curve contains a point P between the two circular curves and a point Q within the smaller circular curve. After transformation, the smaller circular curve has been stretched and bent to become a rectangular slit but remains within the larger circular curve. To preserve neighborhoods, the point P must remain between the two curves while the point Q must remain within the inner curve. In some embodiments, the topological graph is similar to a Euclidean graph, such that the movement path described by the graph consists of a set of vertices and edges. However, in a Euclidean graph the edges are limited to being lines and the lines connecting vertices are equal to the Euclidean distance. This means the path between two vertices is always equal to the shortest path between them. In topological geometry, the edge may be a line, arc, or curve, hence the path between two vertices may not necessarily be the shortest path as in Euclidean geometry. Further, with topological graph, the elements of the graph, namely vertices and edges, may be deformed by means of variation in assigned properties. With topological geometry, any movement path may be devised with path elements, such as vertices, edges, and their associated properties. For example, a boustrophedon movement path, characterized by back and forth movement, may be considered equivalent to a set of vertices linked by edges, the vertices having properties defining position and angular orientation of linked vertices and the edges having properties defining edge type, such as a line, with given length, angular orientation and connecting vertices. As a further example, a spiraling movement path may be defined by a set of vertices linked by edges having edge type property of an arc, the radius of the arc increasing linearly at each step to achieve the spiraling movement.

In some embodiments, the processor implements the movement path within a taxicab coordinate system thereby reducing the dimensionality of the topological graph. In taxicab geometry, all paths follow along gridlines of the coordinate system, thereby limiting edge type to a line. Further, the distance metric between vertices is the rectilinear distance or L1 norm $$d(p, q) = |p - q| = \sum_{i=1}^{n} |p_i - q_i|,$$

wherein (p,q) are vectors $p=(p_1, p_2, \ldots, p_n)$ and $q=(q_1, q_2, \ldots, q_n)$. With taxicab geometry, the rectilinear distance between the two points is independent of the structure of the path following along the gridlines of the taxicab coordinate system.

In some embodiments, sensory data is assumed to be independent and identically distributed (IID), where each observation has the same probability distribution as all other observations and all observations are mutually independent. If observations are defined to assume values in $\mathbb{I} \subseteq R$, then two random variables X and Y are identically distributed if and only if $P[x \geq X]=P[x \geq Y]$, $\forall x \in \mathbb{I}$ and are independent if and only if $P[y \geq Y]=P[y \geq Y | x \geq X] \wedge P[x \geq X]=P[x \geq X | y \geq Y]$, $\forall x,y \in \mathbb{I}$. In some embodiments, the sensory input may go through various layers of mathematical processing, such as feature scaling, Bayesian probabilistic methods, and the like. Sensory input may include distance measurements or other measurements from which distance of objects may be inferred, such as time-of-flight or pixmap. As the VMP robot (or VMP robots in the case of collaborating robots) moves along the devised topological path, the processor of the VMP robot continues to receive sensory data (either from a local or remote source). The sensory data is used to revise and expand the map as well as revise the properties of vertices and edges defining the topological path. As more sensor data is collected a better perception of the environment is revealed and the map becomes more accurate and inclusive of the area. The topological path may consist of any number of vertices and edges, depending on the shape, size, etc., of the area discovered, and may be arranged in any number of ways. Because of the stochastic nature of the work place and partial observability, despite the efforts of processor to propose an optimal path, there may exist better paths which were not obvious to the processor at the time of decision making. However, over time the topological path is optimized by, for example, combining vertices by passing or eliminating an edge, removing or adding vertices, and/or edges and changing the direction or position of vertices and/or edges. In embodiments, the VMP robot may begin to start performing work before exploration of the entire area is complete. In such cases, the processor is likely to choose movements that are locally optimal but not globally optimal.

In some embodiments, the processor of the VMP robot (or processors of VMP robots, in case of multiple VMP robots collaborating to complete a task) evaluates different movement paths while offline (e.g., between work sessions, such as between excavating sessions for robotic dump trucks and robotic excavators) using sensory input of the working environment previously collected and stored in memory of, or otherwise accessible to, the VMP robot. Or in some cases, such processing may be offloaded to a remote application, e.g., a processor in a charging state or cloud-based infrastructure. In some embodiments, the processor of VMP robot experiments with (e.g., simulates and determines outcomes from) previously executed and new movement paths. Properties of vertices and edges are inferred from previously collected sensory input. In some embodiments, the processor of the VMP robot is able to enhance and fine-tune movement paths while offline (or some embodiments may perform these actions online). The estimated time required to complete a task (e.g., cleaning a room with greater than threshold area coverage) is used to calculate a theoretical net reward value. The movement path with the greatest theoretical net reward value may be executed at the next cleaning cycle and based on measured performance (e.g., time to clean) the true net reward value may be determined. Some embodiments may determine a difference between estimated and measured performance and adjust model parameters to reduce the difference.

In some embodiments, the processor instructs the VMP robot to avoid entering and working in areas with high density of obstacles until finishing work in other areas such that the VMP robot can finish majority of the work before potentially becoming stuck. FIG. 172 illustrates an example of a map wherein area 17200 is an area of high obstacle density. For a robotic cleaner, for example, this may be where several pieces of furniture are located. The processor instructs the robotic cleaner to clean areas 17201 with low obstacle density before cleaning area 17200 to avoid getting stuck in the high obstacle density area 17200 before the majority of the area is cleaned.

Other path planning methods are described in U.S. patent application Ser. Nos. 16/041,286, 15/406,890, and 14/673,633, the entire contents of which are hereby incorporated by reference. For example, in some embodiments, the processor of a robot may learn a path, such as a path between a first location and a second location, in a variety of ways. In some embodiments, the processor of the robot may be taught a path by directing the robot along the desired path by physically moving the robot or by using a remote control or an application of a communication device paired with the processor of the robot. Other methods of moving the robot along the desired path may also be used, such as voice commands. In some embodiments, a live video feed (or real-time images) of a camera mounted on the robot is transmitted to a remote operator that controls movement of the robot using an input device (e.g., joystick, keyboard, mouse, touchscreen of communication device, etc.). In some embodiments, the processor of the robot may be taught a path between the first location and second location by physically wheeling the robot from the first location, through the environment, to the second location. In some embodiments, the first location is the same as the second location. In some embodiments, the path is a cleaning coverage path. In some embodiments, the processor of the robotic-floor cleaning device is taught the same path or different paths multiple times in the same area. In some embodiments, the processor of the robot is taught one or more paths for one or more different areas (e.g., kitchen, bathroom, bedroom, etc.) and paths to navigate between one or more areas. Over time, as the processor learns more and more paths, the processor becomes more efficient at covering areas or navigating between two areas or locations. In some embodiments, the processor collects data using one or more sensors during learning one or more paths and uses data collected to learn most efficient coverage of an area or navigation between areas or locations. In some embodiments, the processor of the robot uses similar methods and techniques as those described above for learning and converging to the most efficient movement path during manual training, wherein the robot is controlled to move along a particular path.

In one example, the path planning method may be used for a food delivery or other type of delivery robot. For instance, an operator may remotely guide the delivery robot using an input device based on a live video feed from a camera of the robot transmitted to a communication device (e.g., laptop, smartphone, tablet, etc.) of the operator. In some embodiments, the operator directs the delivery robot, from a first location to a second location. For example, if a customer orders a pizza to a specific location, the operator remotely navigates the robot along a path from the pizza store to the specific location. In the future, the processor of the delivery robot autonomously navigates to the specific location when an order for pizza is requested to the specific location. In some embodiments, the robot is manually navigated to the specific location a predetermined amount of times before it autonomously navigates to the specific location. In some embodiments, the details learned by a processor during path learning may be shared with one or more other processors of one or more robots, such that details learned by a single processor may improve SLAM of other processors of other robots. For example, during manual training a processor may learn to avoid a particular road due to continuous traffic and may mark it in the map. This may be shared with processors of other robots operating in the same environment. In some embodiments, a robot is manually taught a path by driving the robot. For example, the processor of an autonomous car may be taught the most efficient movement paths within an environment by manually driving the autonomous vehicle within the environment for a predetermined amount of time.

In some embodiments path learning may be initiated by, for example, a user pressing a start button on the robot or on any other device capable of communicating with the processor of the robot, voice activation or autonomously upon startup, prior to beginning the process of teaching a path to a processor of the robot. In some embodiments, path learning may be completed by, for example, pressing an end button on the robot or on any other device capable of communicating with the processor of the robot, voice activation, or autonomously upon detecting no movement of the robot for a predetermined amount of time. Path learning may be initiated when the robot is positioned at a first location and completed after the robot has navigated along the desired path and returned back to the first location or any other location. In some embodiments, path learning may be initiated when the robot is positioned at a first location and completed after the robot has navigated along the desired path to the second location. Alternatively, in some embodiments, path learning may be initiated and completed using an application of a communication device, such as a mobile device, laptop or smart phone, capable of communicating with the robot. In some embodiments, an application of a communication device may be used to mark a path of the robot within a map of the working environment that may be shared with the processor of the robot and the processor actuates the robot to move along the path. During path learning, the processor of the robot may determine its location within an internal map of the working environment while simultaneously mapping the environment. In some instance, the processor of the robot may mark observed obstacles in the working environment within an internal map of the environment. In some embodiments, the robot includes an extendable handle that a user may use to physically wheel the robot along a path. In some embodiments, a communication device may be used to manually direct the robot along a path. In some embodiments, the communications device is part of the robot and it detachable and wireless. In some embodiments, the communication device is a personal device that executes an application paired with the processor of the robot. In some embodiments, the communication device is a user interface built into the robot.

In some embodiments, the processor of the VMP robot (or processors of robots collaborating with one another to complete a task) may determine an optimal (e.g., locally or globally) coverage of the environment by minimizing a cost function or by maximizing a reward function. For example, processors of robotic dump trucks and robotic excavators collaborating with one another determine an optimal excavating plan of a mining site such that excavation of soil by the robotic excavators, alignment of the robotic dump trucks for receiving excavated soil, placement of the excavated soil into the dump trucks by the robotic excavators, and transportation of the excavated soil to a soil dump site by the robotic dump trucks is as efficient as possible. The processor of the VMP robot may divide an environment A into n zones $A_1, A_2, \ldots, A_n \subset A$ wherein the index indicates the order of coverage of the zones. For example, the robotic excavators may first excavate zone $A_1$, followed by zone $A_2$, and so on. Or a first robotic excavator may excavate zone $A_1$ and second excavator may excavate zone $A_2$, and so on, dividing the areas to be excavated between the collaborating robotic excavators to complete the task more efficiently. In some embodiments, zones $A_1, A_2, \ldots, A_n$ may overlap. For example, there may be indices i and j, for which $i \neq j$ and $A_i \cap A_j \neq 0$. In some embodiments, zones $A_1, A_2, \ldots, A_n$ may not collectively represent the entire area of environment A, wherein the condition $\cup_i A_i = A$ may not be fulfilled. In some embodiments, the overall cost function C of a zone or an environment may be calculated by the processor of a VMP robot based on a travel and operation cost K and coverage L. In some embodiments, other factors may be inputs to the cost function. For example, the processor may use $C=\omega_1 K-\omega_2 L$ to determine cost, wherein weights $\omega_1, \omega_2 \geq 0$ may be used to adjust importance of travel and operation cost and coverage. The processor attempts to minimize the travel and operation cost K and maximize coverage L. In some embodiments, the processor determines the travel and operation cost K by computing individual cost for each zone and adding the required driving cost between zones. The driving cost between zones may depend on where the robot ended coverage in one zone, and where it begins coverage in a following zone. An operating cost function F for a zone $A_i$ may be specified, such that given zone $A_i$ and starting position $g_i$ of the VMP robot, the processor may compute operation cost $h_i$ and final position $f_i$ of the VMP robot using $h_i, f_i = F(A_i, g_i)$. The operation cost $h_i$ may be dependent on factors such as the movement path of the VMP robot, coverage time, etc. Upon completion of coverage of zone $A_i$, the processor may actuate the VMP robot to move towards the closest position $g_{i+1}$ within the next zone $A_{i+1}$ to be covered, i.e., $$g_{i+1} = \underset{g \in A_{i+1}}{\operatorname{argmin}} D(f_i, g).$$

The function $D(f_i, g)$ may be used by the processor to determine distance from final position $f_i$ to every possible position $g \in A_{i+1}$. In some embodiments, the processor uses a travel cost function $T(f_i, g_{i+1})$ for driving from final position $f_i$ of zone $A_i$ to starting position $g_{i+1}$ of zone $A_{i+1}$, given final position $f_i$ and starting position $g_{i+1}$, to determine travel cost $p_{i+1} = T(f_i, g_{i+1})$. Therefore, the processor determines the travel and operation cost $K_i$ for a zone $A_i$ using $K_i = h_i + p_i$. And, the processor determines the total travel and operation cost for all zones $A_1, A_2, \ldots, A_n$ of environment A using $$K = \sum_{i=1}^{n} K_i = \sum_{i=1}^{n} h_i + p_i.$$

In some embodiments, the processor determines the coverage for the environment using $L = \|\cup_i A_i\|$, wherein the norm may refer to the square meters of area covered (or otherwise area operated on) by the VMP robot.

In some embodiments, the processor of the VMP robot minimizes the total cost function $C = \omega_1 K - \omega_2 L$ by modifying zones of environment A by, for example, removing, adding, shrinking, expanding, moving and switching the order of coverage of zones. For example, in some embodiments the processor may restrict zones to having rectangular shape, allow the VMP robot to enter or leave a zone at any surface point and permit overlap between rectangular zones to determine optimal zones of a environment. In some embodiments, the processor includes or excludes additional conditions. Since a rectangle may be defined by x, y coordinates of its center, its width and its height, the processor defines zones of a environment using an n×4 array of floating point numbers. The processor may initially create and order rectangular zones for coverage by the VMP robot (or multiple VMP robots in the case of collaboration among multiple robots, for example rectangular zones of areas to be excavated by collaborating robotic excavator and robotic dump trucks). In some embodiments, the processor uses gradient descent to compute the division of zones (i.e. size, location) that results in minimal cost, as defined by the cost function C, by iteratively modifying division of zones based on a partial derivative of the cost function with respect to each respective parameter defining the zones. The processor determines gradient descent for a zone $A_i$ using $$A_i = A_i - h\frac{\partial C}{\partial A_i},$$

wherein h is the step size of the gradient descent. In some embodiments, the processor determines derivatives of the cost function C with respect to each of the four variables defining the rectangle by using, in some embodiments, a finite difference approximation. FIGS. 173A-173C illustrate an implementation of gradient descent. In FIG. 173A rectangular zones 17300, 17301 and 17302 of environment 17303 are shown. Units along the x- and y-axis may be feet or other unit of measurement. A VMP robot begins at point 17304 then sequentially covers zones 17300, 17301, and 17302 and ends at point 17305. The initial coverage is not ideal. To improve coverage, the processor applies gradient descent. Since the cost function is based on coverage, the zones may be expanded by embodiments in the direction of uncovered areas and avoid overlap. For instance, embodiments may determine partial derivative of the cost function with respect to parameters of the zones that indicate such an adjustment will tend to reduce the cost locally. To lower traveling cost, the proximity of zones with respect to other zones to be covered immediately before and after is increased (i.e. distance between sequentially ordered zones is reduced) by the processor. FIGS. 173B and 173C illustrate the steps in an iterative process of gradient descent and optimization of coverage. Some embodiments may iteratively adjust until a stopping condition is reached, e.g., until there is less than a threshold amount of change between sequential iterations in cost. FIG. 173B illustrates expansion of rectangular zones 17300, 17301, and 17302 to improve coverage while FIG. 173C illustrates further optimization of coverage and traveling cost by the processor such that there is no overlap between zones 17300, 17301, and 17302 and the border of each zone is adjacent to the border of those zones to be covered immediately before and after.

In some embodiments, the processor may use various functions to further improve optimization of coverage of the environment. These functions may include, a discover function wherein a new small zone may be added to large and uncovered areas, a delete function wherein any zone with size below a certain threshold may be deleted, a step size control function wherein decay of step size in gradient descent may be controlled, a pessimism function wherein any zone with individual operating cost below a certain threshold may be deleted, and a fast grow function wherein any space adjacent to a zone that is predominantly unclaimed by any other zone may be quickly incorporated into the zone. In some embodiments, deadlocking may occur when, for example, stuck in local maximum or minimum or when driving distance measure fails to account for perimeters (e.g., walls, buildings, or other areas the robot cannot travel). Some embodiments may implement stochastic gradient descent to reduce the effects of local minima or maxima. Another example of deadlock is illustrated in FIG. 174A between zones 17300 and 17302 as they are both competing for the same area with the same priority. Zone 17300 desires expansion towards starting point 17304 as coverage begins in zone 17300 and zone 17303 desires expansions towards ending point 17305 as coverage ends in zone 17303. Such a situation may be avoided by beginning coverage in zone 17303 and ending in zone 17300. Alternatively, the weights in the cost function for coverage and travel and operating cost may be adjusted. For example, if more weight is given to travel and operating cost, zones 17300, 17301 and 17303 may be as illustrated in FIG. 174B wherein overlap between zones 17301 and 17303 is observed as traveling distance between zones results in larger penalty than overlap between zones.

In some embodiments, the cost accounts for additional features other than or in addition to travel and operating cost and coverage. Examples of features that may be inputs to the cost function may include, coverage, size, and area of the zone, zone overlap with perimeters (e.g., walls, buildings, or other areas the robot cannot travel), location of zones, overlap between zones, location of zones and shared boundaries between zones. In some embodiments, a hierarchy may be used by the processor to prioritize importance of features (e.g., different weights may be mapped to such features in a differentiable weighted, normalized sum). For example, tier one of a hierarchy may be location of the zones such that traveling distance between sequential zones is minimized and boundaries of sequential zones are shared, tier two may be to avoid perimeters, tier three may be to avoid overlap with other zones and tier four may be to increase coverage.

In some embodiments, the cost function may be integrated with MDP wherein the processor of the VMP robot finds the division of zones, order of coverage of zones, movement path, etc. that minimizes the cost function, thereby maximizing the reward of the MDP.

In some embodiments, the processor represents the environment using a coordinate map including a collection of cells, and zones may have the form of any connected component on the coordinate map. In such embodiments, the coordinate map of the environment is represented using a matrix wherein each entry corresponds to a coordinate cell of the environment and zones may be represented using a matrix corresponding to a portion of the coordinate cells of the environment. In some embodiments, each cell of the environment can only belong to a single zone, overlap between zones is avoided by construction. Entries in the matrices of zones may have a value of zero if the corresponding cell of the environment is empty or may have a value of one if the cell is occupied by, for example, a wall or building or static object. Zones may initially be created and ordered for coverage by the processor of the VMP robot. In some embodiments, to optimize division of zones of an environment, the processor proceeds through the following iteration for each zone of a sequence of zones, beginning with the first zone: expansion of the zone if neighbor cells are empty, movement of the VMP robot to a point in the zone closest to the current position of the VMP robot, addition of a new zone coinciding with the travel path of the VMP robot from its current position to a point in the zone closest to the VMP robot if the length of travel from its current position is significant, execution of a coverage pattern (e.g. boustrophedon) within the zone, and removal of any uncovered cells from the zone. In some embodiments, additional steps may be included in the iteration or certain steps described may be omitted, which is not to suggest that any other process herein is not also amenable to such variation. In some embodiments, additional functionalities may be used by the processor such as, placement of a new zone in any large, uncovered areas to increase discovery speed, deletion of areas with size below a certain threshold and aggressive growth of efficient zones wherein efficiency may be measured by for example, coverage time or coverage path. FIG. 175A illustrates zone segmentation resulting from execution of some examples of the iteration described herein with coverage beginning and ending at point 17500 of environment 17501. Order of coverage is shown by arrow 17502. FIG. 175B illustrates the boustrophedon pattern executed for coverage of environment 17501 represented by the back and forth striations within each zone and leading from one zone into another.

In some embodiments, the processor determines optimal division of zones of an environment by modeling zones as emulsions of liquid, such as bubbles. For instance, some embodiments may determine a Euclidean Steiner tree with Steiner vertices that define zone corners and correspond to obstacles. In some embodiments, the processor creates zones of arbitrary shape but of similar size, avoids overlap of zones with static structures of the environment and minimizes surface area and travel distance between zones. In some embodiments, behaviors of emulsions of liquid, such as minimization of surface tension and surface area and expansion and contraction of the emulsion driven by an internal pressure are used in modeling the zones of the environment. To do so, in some embodiments, the environment is represented by a grid map and divided into zones by the processor. In some embodiments, the processor converts the grid map into a routing graph G consisting of nodes N connected by edges E. The processor represents a zone A using a set of nodes of the routing graph wherein $A \subset N$. The nodes are connected and represent an area on the grid map. In some embodiments, the processor assigns a zone A a set of perimeter edges E wherein a perimeter edge $e=(n_1, n_2)$ connects a node $n_1 \in A$ with a node $n_2 \notin A$. Thus, the set of perimeter edges clearly defines the set of perimeter nodes $\partial A$, and gives information about the nodes, which are just inside zone A as well as the nodes just outside zone A. Perimeter nodes in zone A may be denoted by $\partial A^{in}$ and perimeter nodes outside zone A by $\partial A^{out}$. The collection of $\partial A^{in}$ and $\partial A^{out}$ together are all the nodes in $\partial A$. FIG. 176A illustrates zones 17600, 17601, and 17602 and wall 17603 of an environment. FIG. 176B illustrates zones 17600, 17601, and 17602 with $\partial A^{in}$ perimeter nodes 17604, 17605, and 17606 and $\partial A^{out} \partial A^{in}$ perimeter nodes 17607, 17608, and 17609, respectively. In some embodiments, the processor expands a zone A in size by adding nodes from $\partial A^{out}$ to zone A and reduces the zone in size by removing nodes in $\partial A^{in}$ from zone A, allowing for fluid contraction and expansion.

In some embodiments, the processor determines a numerical value to assign to each node in $\partial A$, wherein the value of each node indicates whether to add or remove the node from zone A. The processor may, for example, compute a numerical value for each node in $\partial A$ for each zone $A_1, A_2, \ldots, A_n$ of an environment. Depending on the value of each node in $\partial A$, each node is either removed from zone A, added to zone A or moved to another zone by the processor. In some embodiments, the numerical value computed may be dependent on growth (if the area is small) and decay (if the area is large) of the zone, distance of the node from the center of the zone, order of zone coverage, and a surface smoother score. For example, for a perimeter node of a zone, the processor evaluates growth and decay of the zone and distance of the node from the center of the zone by using $$\frac{c_1}{a} + \frac{c_2}{d^2},$$

wherein a is area of the zone, d is the distance of the node from the center of the zone and $c_1$, $c_2$ are constants which dictate the importance of each term in the equation. FIG. 177A illustrates zones 17700, 17701, and 17702 with same start and end point 17703. In FIG. 177B values for $$\frac{1}{a}$$

are shown for perimeter nodes of zones 17700, 17701 and 17702.

$$\frac{1}{a}$$

for each perimeter node within the same zone is equal in value as indicated by the consistent color of perimeter nodes in each zone. Arrows indicate approximate value of perimeter nodes for each zone. In comparing perimeter nodes from different zones, perimeter nodes belonging to smaller zones result in a greater value for $$\frac{1}{a}$$

as indicated by the color of perimeter nodes of different zones. Smaller areas with greater value for $$\frac{1}{a}$$

may indicate desired growth of the zone.

FIG. 177C illustrates values of $$\frac{1}{d^2}$$

for perimeter nodes of zones 17700, 17701, and 17702. There is not significant difference in the value of $$\frac{1}{d^2}$$

for perimeter nodes in zone 17700 as it is circular. For zone 17701 perimeter nodes located at the corners, bounded by dashed lines, are further from the center and therefore have a smaller value for $$\frac{1}{d^2}$$

as compared to perimeter nodes along the edges of zone 17702. This is indicated by the inconsistent color between perimeter nodes further away from and closer to the center of the zone. Similarly, with zone 17702 being long and slender, perimeter nodes located in the middle section are closer to the center of the zone and therefore have greater value for $$\frac{1}{d^2}$$

while perimeter nodes on the ends of zones 17702, bounded by dashed lines, are further away and have smaller value for $$\frac{1}{d^2}.$$

In embodiments, wherein the processor of the VMP robot uses the order of zone coverage to compute the numerical value of each node in ∂A, nodes closer to the previous or next zone to be covered increase the numerical value of each node in ∂A. In some embodiments, the processor calculates an order score using, for example, $$c\left(\frac{1}{az+1}+b\right)$$

wherein a, b, c are constants and $$z=\frac{x-x_{min}}{x_{max}-x_{min}}$$

wherein x is the distance between the perimeter node of interest and the closest perimeter node in the next zone to be covered, $x_{min}$ is the distance between the closest perimeter nodes between the current zone and the next zone to be covered while $x_{max}$ is the distance between the furthest perimeter nodes between the current zone and the next zone to be covered. In some embodiments, the order score is then computed by the processor, with z calculated using the current zone and previous zone covered and the order score calculated using the next zone to be covered and previous zone covered are combined by the processor. The constant a controls how sharp the drop of the function is between $x_{min}$ and $x_{max}$, b shifts the entire function along the y-axis such that the threshold for assigning negative score may be controlled and c scales the value of the function.

FIG. 178 illustrates the order score for perimeter nodes of zones 17700, 17701, and 17702 with same start and end point 17703 (FIG. 177A). The constants used in the illustrated example are a=15, b=−0.2, c=0.1. Perimeter nodes of each zone closer to the previous zone covered (or start point) and next zone to be covered (or end point), bounded by dashed lines, have greater score. In some embodiments, individual scores based on growth and decay of the zone, distance of the node from the center of the zone and order of zone coverage are combined by the processor to determine overall numerical value of each node in ∂A, wherein areas of zone A containing nodes with high numerical value indicate expansion while those containing nodes with low numerical value indicate contraction. However, in some embodiments the result produced by the processor may be segmented and have non-smooth borders. Therefore, in embodiments a surface smoother score may also be used by the processor in determining the numerical value of each node in ∂A. For each node in ∂A, the processor uses a local 3-by-3 grid, wherein for example, the node is at the center of the grid. In some embodiments, other grid sizes may be used. The number of nodes within the grid within the same area (e.g. inner or outer perimeter areas) as the perimeter node of interest may be counted by the processor and the overall score of the perimeter node may be multiplied by the counted number in order to smoothen boundaries. In some embodiments, the processor of the robot may determine the numerical value of each node in ∂A of zone A by combining scores for growth and decay of the zone, distance of the node from the center of the zone, order of zone coverage and surface smoother.

For example, FIG. 179A illustrates numerical values of perimeter nodes for zones 17700, 17701 and 17702 with start and end point 17703 (FIG. 177A) computed by the processor by combining scores for growth and decay of the zone, distance of the node from the center of the zone, order of zone coverage and surface smoother. Areas of zones 17700, 17701, and 17702 containing nodes with high numerical value, bounded by dashed lines, indicate expansion while nodes in other areas with low numerical value indicate contraction. For example, perimeter nodes with numerical value less than some value may be removed by the processor while those with numerical value above some value may be added. In this way, the processor may expand a zone A in size by adding nodes from $\partial A^{out}$ (outer perimeter nodes) to zone A and may reduce its size by removing nodes in $\partial A^{in}$ (inner perimeter nodes) from zone A. Some embodiments may iteratively make such adjustments until a stopping condition, such as an equilibrium, is detected.

The expansion and contraction are depicted in FIG. 179B as areas of zone 17700, 17701, and 17702 containing nodes with high numerical values as shown in FIG. 79A have expanded after several iteration steps while those with low numerical values have contracted. This allows ordered zones to come closer together to reduce travel distance between sequentially ordered zones while expanding to cover more area of the environment. Areas of zones 17700, 17701, and 17702 bounded by dashed lines in FIG. 179B contain perimeter nodes with high numerical value therefore the processor will continue to expand those areas with more iterations while areas with perimeter nodes with low numerical value will contract. In embodiments, additional functions may be used by the processor to improve performance of zone optimization such as discover, delete and aggressive growth functions described earlier. Furthermore, additional features may be used in computing the numerical value of perimeter nodes, which is not to suggest that other descriptions are limiting.

In some embodiments, the processor determines the best division of an environment by minimizing a cost function defined as the difference between theoretical (e.g., modeled with uncertainty) area of the environment and the actual area covered. The theoretical area of the environment may be determined by the processor using a map of the environment. The actual area covered may be determined by the processor by recorded movement of the VMP robot using, for example, an odometer or gyroscope. For example, processors of robotic excavators use the map of the environment to determine theoretical area to be excavated and then determine the actual area excavated at the end of the work session. In some embodiments, the processor may determine the best division of the environment by minimizing a cost function dependent on a movement path taken by the VMP robot comprising the movement paths taken within each zone and in between zones. The processor may restrict zones to being rectangular (or having some other defined number of vertices or sides) and may restrict the VMP robot to entering a zone at a corner and to driving a serpentine routine (or other driving routine) in either x- or y-direction such that the trajectory ends at another corner of the zone. The cost associated with a particular division of an environment and order of zone coverage may be computed as the sum of the distances of the serpentine path travelled for coverage within each zone and the sum of the distances travelled in between zones (corner to corner).

Figure 180:
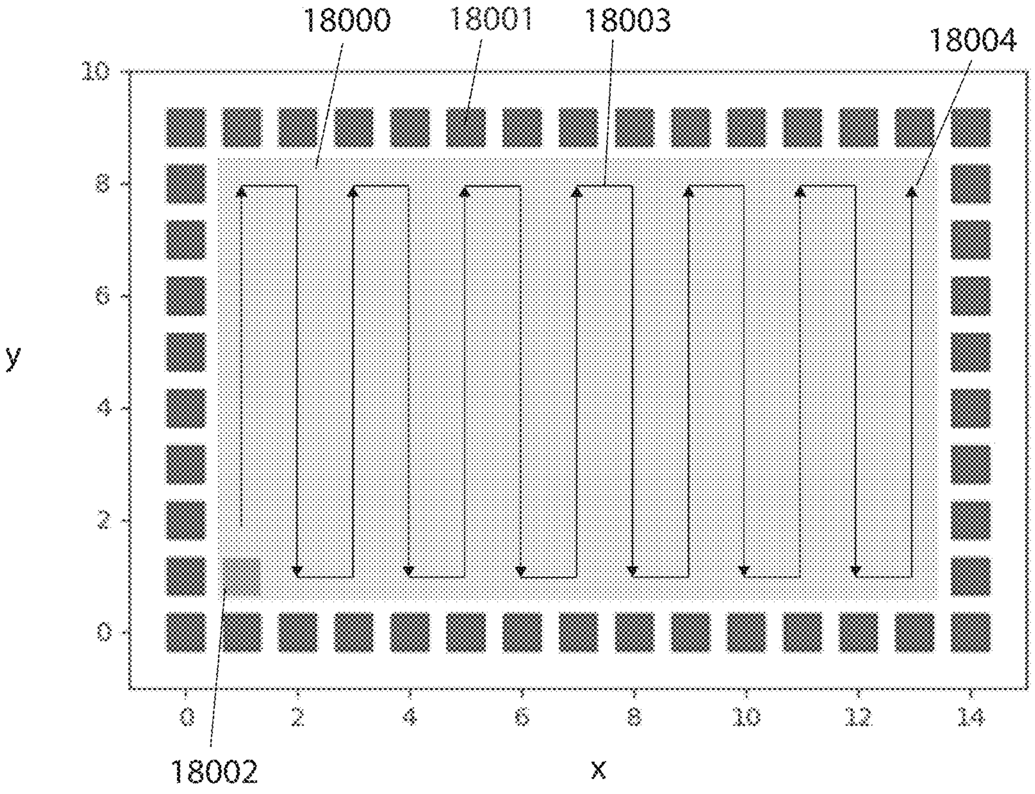

For example, FIG. 180 illustrates an example of rectangular zone 18000 of the environment with perimeter 18001. Each square division may represent a single unit and may be used by the processor to compute distance travelled within the zone. From starting position 18002 at the lower left corner the VMP robot may follow serpentine path 18003 to position 18004 at the top right corner of the zone. Assuming zone 18000 is the only zone of the environment, the VMP robot returns back to initial position 18002. The processor computes the distance of serpentine path 18003 and the return path to position 18004 as 122 units and assigns the cost to this particular division of the environment and order of zone coverage. In some cases, a portion of the area of a zone is covered with a serpentine path, e.g., some embodiments may navigate around some or all of a perimeter of a zone before covering the interior with a serpentine path. To minimize cost function and improve coverage efficiency zones may be further divided, merged, reordered for coverage and entry/exit points of zones may be adjusted. In some embodiments, the processor of the VMP robot may initiate these actions at random or may target them. In some embodiments, wherein actions are initiated at random (e.g., based on a pseudorandom value) by the processor, the processor may choose a random action such as, dividing, merging or reordering zones, and perform the action. The processor may then optimize entry/exit points for the chosen zones and order of zones. A difference between the new cost and old cost may be computed as $\Delta$=new cost−old cost by the processor wherein an action resulting in a difference <0 is accepted while a difference >0 is accepted with probability $\exp(-\Delta/T)$ wherein T is a scaling constant. Since cost, in some embodiments, strongly depends on randomly determined actions the processor of the VMP robot, embodiments may evolve 10 different instances and after a specified number of iterations may discard a percentage of the worst instances.

Figure 181A:
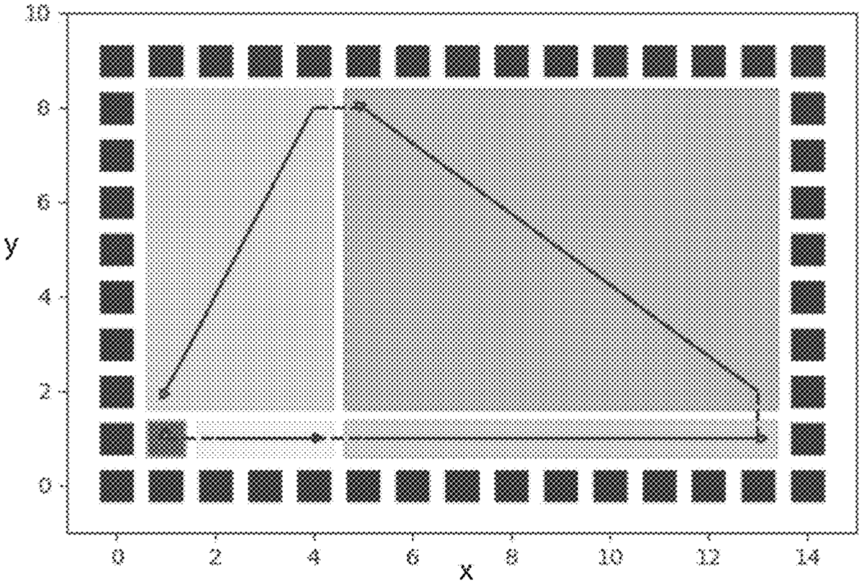
Figure 181B:
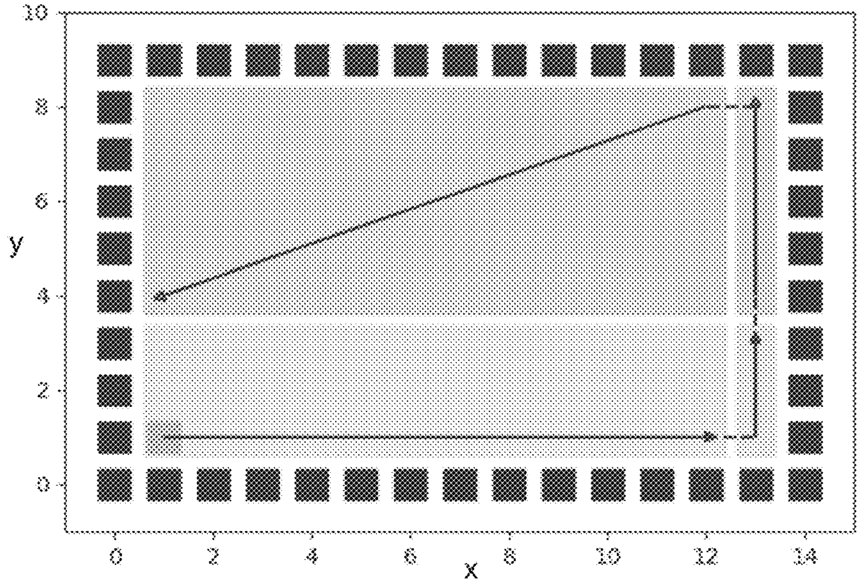
Figure 181C:
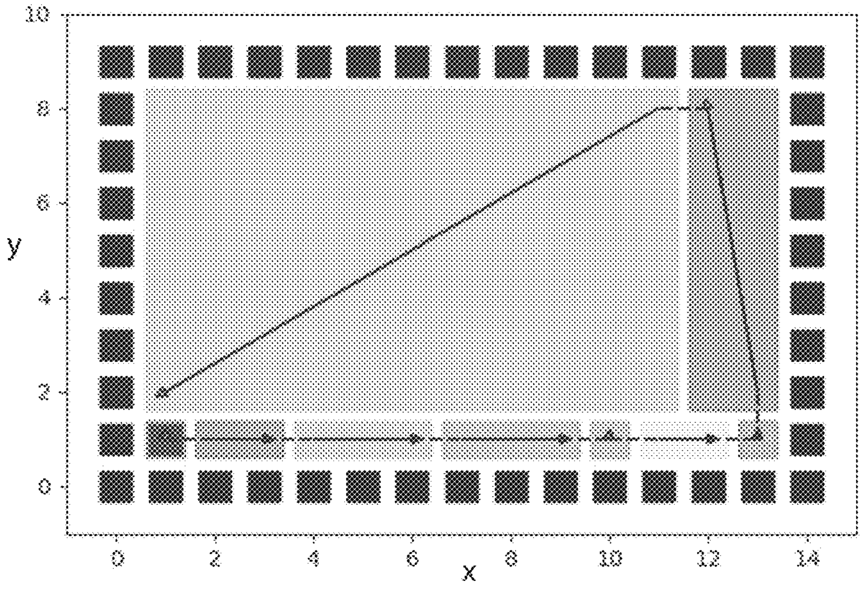
Figure 182:
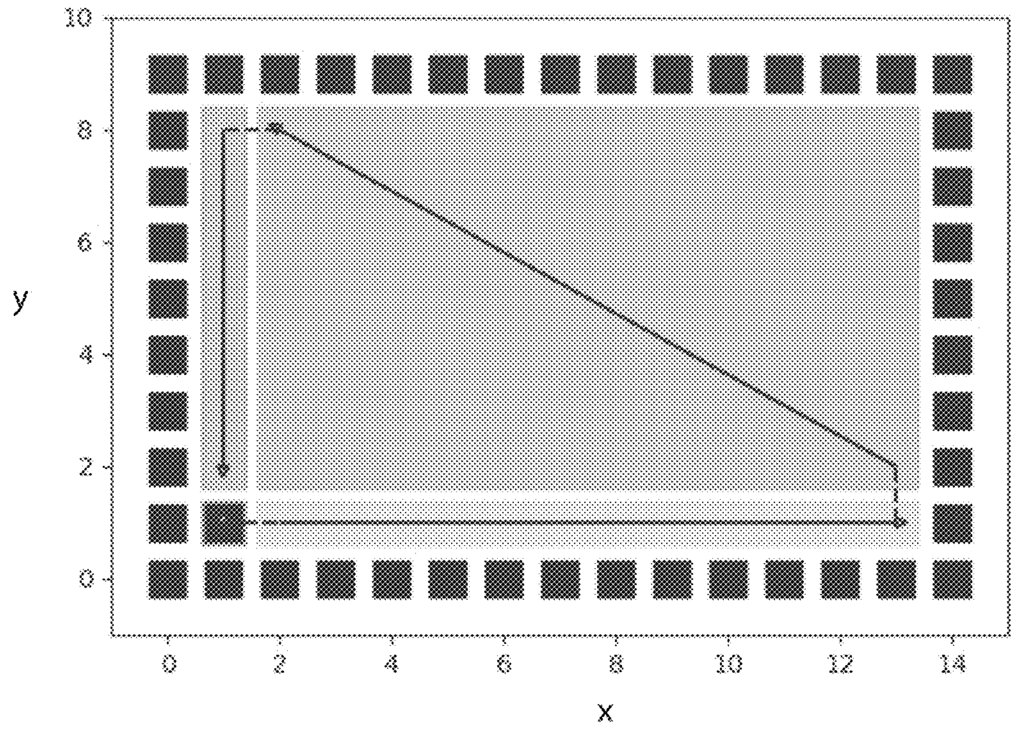
Figure 183A:
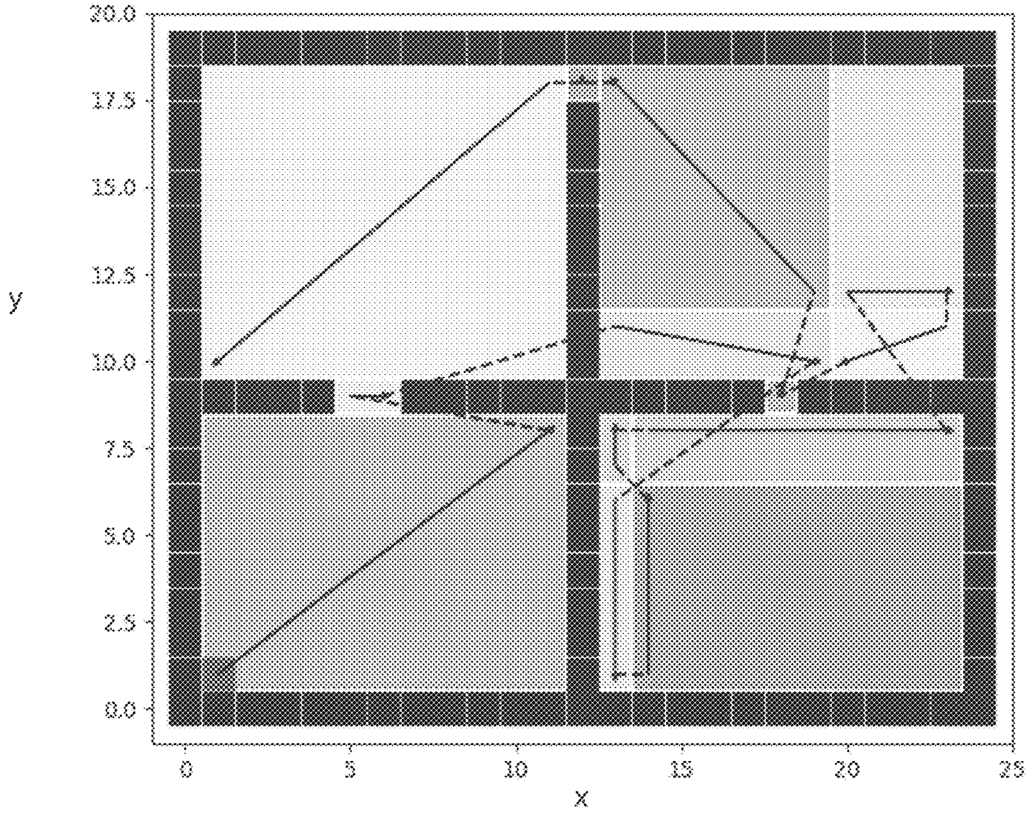
Figure 183B:
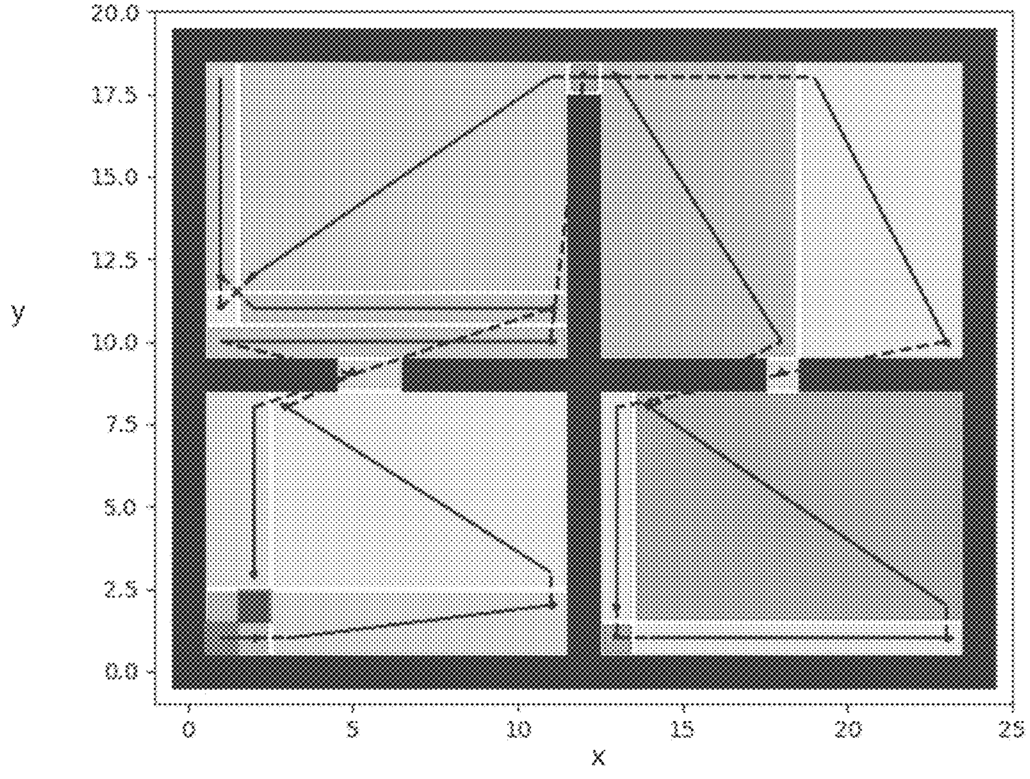

In some embodiments, the processor actuates the VMP robot to execute the best or a number of the best instances and calculate actual cost. For example, FIG. 181A illustrates a random action approach to minimizing the cost function resulting in improved division and order of zones of the same environment shown in FIG. 180. Rectangular divisions indicate different zones and arrows indicate order of coverage of the zones as well as entry and exit points of each zone. Serpentine coverage of each zone is not shown, but may be implemented. The new cost is 104 as compared to 122 for the zone coverage in FIG. 180 and avoids repeat coverage of areas. FIGS. 181B and 181C illustrate other instances resulting from random action approach to minimizing the cost function, with cost 106 and 104, respectively. In embodiments, wherein actions are targeted, the processor may find the greatest cost contributor, such as the largest travel cost, and initiate a targeted action to reduce the greatest cost contributor. For example, FIG. 182 illustrates a targeted action approach to minimizing the cost function wherein greatest cost generator in FIG. 180, caused by travel distance from end point 18003 back to starting position 18001, is identified and eliminated by the processor resulting in improved division and order of zones of the same environment. The new cost is 104 as compared to 122 for zone coverage shown in FIG. 180 and avoids repeat coverage of areas. In embodiments, random and targeted action approaches to minimizing the cost function may be applied to workspaces comprising multiple rooms by the processor of the VMP robot. For example, FIGS. 183A and 183B illustrate zone division and order of zone coverage of an environment comprising four rooms determined by the processor from minimizing the cost function by random and targeted action approaches, respectively. Arrows illustrate the order of zone coverage and entry/exit points of each zone. Serpentine paths within each zone are not illustrated. In embodiments, the processor may directly actuate the VMP robot to execute coverage for a specific division of the environment and order of zone coverage without first evaluating different possible divisions and orders of zone coverage by simulation. In embodiments, the processor may determine the best division of the environment by minimizing a cost function comprising some measure of the theoretical area of the environment, the actual area covered, and the path taken by the VMP robot within each zone and in between zones.

In some embodiments, the processor of the VMP robot divides the map of the environment into zones wherein each zone is defined by a zone matrix including the respective portion of the cells of the map as entries. In some embodiments, the processor updates a coverage matrix of a zone corresponding to the zone matrix to indicate actual coverage or work completed. For a given zone, in some embodiments, each entry of its coverage matrix corresponds to an entry of its zone matrix and hence a cell of the environment. When a cell of a workspace is covered by the VMP robot, the value of the corresponding entry in the coverage matrix is updated to indicate coverage or work completed. For example, each time a cell of a zone is covered, the value of the corresponding entry in the coverage matrix of the zone may be increased by one, with all entries beginning with a value of zero to indicate no coverage. (Or values may be decremented by some amount in systems in which reversed signs convey the sematic equivalent to that described herein—a qualification that applies generally to this document, e.g., discussion of maximizing a reward function should be read as indicating the inventors also contemplate minimizing a cost function). In some embodiments, the processor determines a reward and assigns it to a policy based on performance of coverage of the environment by the VMP robot. In some embodiments, the policy may include the zones created, the order in which they were covered, and the movement (or coverage) path (i.e., it may include data describing these things). In some embodiments, the policy may include a collection of states and actions experienced by the VMP robot during coverage of the environment as a result of the zones created, the order in which they were covered and movement path. In some embodiments, the reward is based on actual coverage, repeat coverage, total coverage time, travel distance between zones, etc. In some embodiments, the process may be iteratively repeated to determine the policy that maximizes the reward. In some embodiments, the processor determines the policy that maximizes the reward using a MDP as described above.

In some embodiments, a processor of a VMP robot may evaluate different divisions of an environment while offline. For example, environment 18400 in FIG. 184A includes bedrooms 18401 and 18402, living room 18403, entry area 18404 and kitchen/dining area 18405. While offline, the processor may initially divide and order zones of environment 1800 for coverage as shown in FIG. 184B, wherein zones are shown by rectangular divisions and the order of zone coverage as well as entry/exit points of each zone is indicated by arrows with starting position 1806. Before starting coverage of environment 18400 the processor may iterate through divisions of the environment and order of zone coverage to find the division and order of zone coverage that optimizes (e.g., locally or globally) the movement path for an objective function like those described above. For example, the order of zone coverage in FIG. 184B is not efficient as the VMP robot would need to back track resulting in repeat coverage in areas within dashed lines 18407 and 18408. The processor may iterate and divide and order zones of the environment for coverage as shown in FIG. 184C, wherein back tracking and hence repeat coverage of areas is minimized.

In some embodiments, the processor of the VMP robot employs a routing method for determining a fastest route based on historical data. In some embodiments, the routing method includes routing items through a network of nodes connected by links and using a positive and negative rewards system. In some embodiments, each item's trip from a starting node to a destination node is monitored by the processor. In some embodiments, the item is the VMP robot or another robot. An item may travel from a starting node along a link to another node where it is transferred to another link, by which it travels to another node where it is transferred to another link, and so on, until the item has arrived at its destination node. FIG. 185 illustrates a network 18500. The network is comprised of nodes 18501 and links 18502 connecting the nodes. A plurality of possible routes between a given starting node processor may choose the most efficient route from a given starting node to a given destination node. FIG. 186 illustrates another network 200. If an item with starting node 18601 has a destination node of 18609, there is more than one route the item may take to arrive at the destination. The item may take the route: node 18602, node 18606, node 18605, node 18611, node 18614, node 18612, node 18608, node 18609. This route contains seven nodes before the destination is reached. An alternative route is: node 18602, node 18606, node 18607, node 18613, node 18610, node 18609. This route contains five nodes before the destination is reached. Although the first route contains more nodes than the second route, which can cause a route to take longer, the second route may take longer than the first route because the total distance between nodes is greater. Another alternative route is node 18602, node 18603, node 18604, node 18607, node 18613, node 18610, node 18609. This route contains six nodes before the destination is reached. Although this route contains more nodes than the second route, it may be advantageous in the event that there is a lot of traffic at node 18606. Because it follows a different path than the other two routes, it may serve as an efficient route under certain circumstances.

The efficiency of the particular route used may be evaluated by looking at each segment of the trip between nodes. A small negative reward is assigned at the end of each segment of a trip based on the amount of delay (if any) incurred during the segment. So, referring to the example in FIG. 186, the routes with more nodes will result in more opportunities for delays and therefore penalties. However, the delay within each segment of the trip is also accounted for. The processor is configured to maximize rewards at all times, so it attempts to select the route with the smallest likelihood of delay. A large positive reward is assigned at the end of each complete trip to incentivize the processor to continue trips in spite of the negative rewards incurred after each segment. In some embodiments, the processor calculates rewards for trip segments using [W (estimated)−W (actual)]R=reward, wherein W (estimated) is the amount of time to complete the segment with no delays; W (actual) is the amount of time it actually took to complete the segment; and R is a predetermined reward rate. The reward rate is negative, so that greater penalties are assigned as the deviation from the estimated segment time (amount of time to complete the segment with no delays) increases. As stated previously, the processor is configured to attempt to maximize rewards at all times, so that it always attempts to find the route with the shortest trip time. This processor may therefore determine W (estimated)−W (actual)=Deviation and ArgMin [W (estimated)−W (actual)]. The greater the deviation from the estimated trip time, the larger the penalty. Deviation from the ideal trip time may occur for a variety of reasons, such as traffic within the network and waiting in queues. In some embodiments, the reward of each state may be determined using a MDP as described above for path planning, wherein the processor may determine a total reward for different executed routes and derive a policy that maximizes the total reward. The processor may compare values of routes used and determine which routes for items traveling from a particular starting node to a particular destination node have the highest value. Over time, the processor learns which actions from different states result in highest rewards. As the processor completes more and more trips, and more and more data is gathered, the route improves, eventually converging to the most efficient route. In some embodiments, the processor of the VMP robot uses the routing method to determine the fastest route for, for example, covering a room for cleaning, delivering an item or transporting passengers, mopping an area, etc. In other cases, the routing method may be used in various applications without limitation. For example, the routing method may be used to route packages through a pneumatic tube network, route trains through a rail network, or route baggage through a conveyor belt network. Further details of a routing method are disclosed in U.S. patent application Ser. No. 15/006,434, the entire contents of which is hereby incorporated by reference.

For the VMP robot to physically take action and move, the processor may actuate the wheels, tracks, or other actuated interfaces with the environment. This may be accomplished, in some embodiments, through three subsystem layers of the processor, which in some cases, is onboard the robot. In some embodiments, the first subsystem layer is the velocity controller, which receives requested linear and angular velocities and displacement from the navigation algorithm (e.g., in the processor, implementing the techniques above) after the next action of the VMP robot is chosen. The velocity controller may set the linear and angular velocity in m/s and rad/s, respectively. Formally, a linear velocity in the x-direction of a coordinate system is represented by Vx while an angular velocity is represented by $V_w$. The velocity controller may also be used to monitor the set velocity to increase the likelihood that the target value is reached and maintained and to read and return the linear and angular velocities from a platform layer. This first subsystem layer, in some embodiments, also comprises an emergency stop function, such that the velocity is set to 0 m/s in the case of an emergency. Further, the ramp up/down time for a desired speed may be set within the velocity controller, thereby controlling acceleration and deceleration of the VMP robot. The gradual acceleration and deceleration protects the motor and gears as a sudden increase in speed imposes a large torque on the wheel motors thereby causing wear to the motor and gears. For an emergency situation, ramp down is set to 0 m/s, causing the VMP robot to immediately stop.

In some embodiments, the second layer includes a differential drive controller responsible for converting velocity set in the velocity controller into actual velocity. The linear and angular velocity set by the velocity controller must be translated into a velocity for each wheel or another component that provides motion (e.g., tracks). The differential drive controller sets the values on each of the individual motors and at this layer polarity indicates direction. The third layer is the embedded motor driver. Details of its functions are hidden from higher level subsystems, such as the velocity controller and differential drive controller. This driver controls the direction that the motor spins by setting a value of 0, 1, or −1, where for example, 0 indicates no rotation, 1 indicates clockwise rotation, and −1 counter-clockwise rotation (in other instances, other values may be used). At an even lower level, the direction the motor spins may be controlled by applying a voltage of 0V, 5V or −5V (in other instances, other values may be used) to a general-purpose input/output (GPIO) pin on the integrated circuit (IC) or controller chip. The embedded motor driver also controls each motor individually by sending pulses of voltage to each motor. The number of voltage pulses per second controls the rotational speed of the motor while the value of voltage pulse controls the direction of rotation of the motor. Initially equal number of voltage pulses per second are sent to each of the motors of the VMP robot. Since the motor is an analogue device and small variations exist in their wiring the number of rotations of each motor will not be exactly the same for every voltage pulse received. The gears and gear box also introduce some noise as they are slightly different from one another. Further, slippage adds to the unpredictability of the speed and/or displacement of each wheel. Therefore, the number of voltage pulses per second needs to adjusted based on such noise in order to achieve the target rotational speed and displacement over a period of time.

In some embodiments, the processor in each of the three layers described above has three modes: regular operational mode, in which the controller will accept velocity commands and check for safety events; safety mode, in which a safety event has occurred and the VMP robot remains stopped until the event is acknowledged by the application layer; and recovery mode, in which a safety event is acknowledged by the application layer and corrective action is taken or the safety event is ignored. The three modes may have a mutex lock in relation to one another such that the VMP robot cannot move if any of the processors of the three layers are in safety or recovery mode.

Due to imperfection in analog motors, gears, tiny spikes in voltage, measurement errors and such, a difference between the desired traveled distance and the actual traveled distance is expected. When the navigation algorithm (such as that above) determines the next action, in some embodiments, the corresponding linear and angular velocities and displacement requested to achieve said action is passed from the velocity controller, to the differential driver controller, then to the embedded motor driver to actuate movement of the wheels and complete the action. In some embodiments, an encoder measures the distance travelled by the VMP robot. In addition to the encoder system, a gyroscope, such as L3GD20 gyroscope by STMicroelectronics, may also be used. The gyroscope may use an $I^2C$ (inter-integrated-circuit) interface with two pins or an SPI (serial peripheral interface) with four pins to communicate with the processor. The traveled distance measured may not necessarily be the same as the desired target displacement. In some embodiments, an adaptive processor is used to record the difference between the target value and actual value of the displacement over one time step, i.e. the absolute error error=|target value−actual value|. As the VMP robot moves, the processor calculates the absolute error sum by summating the absolute error for each time step using $$\text{error sum} = \sum_{t=1}^{\infty} \text{error}_t.$$

In some embodiments, the processor of the VMP robots uses a control loop feedback mechanism to minimize the difference between the target value and actual value by correcting the future number of voltage pulses provided to each motor based on previous results, wherein the number of voltage pulses per second controls the rotational speed of the motor and hence measured displacement over one time step. In some embodiments, the future number of voltage pulses provided is corrected by using a proportional adjustment. For example, if a wheel is receiving 100 pulses per second and previously measured displacement is ten percent more than the target displacement desired, a proportional adjustment $P=K_p$*error is applied to the future number of voltage pulses such that 90 pulses per second are provided in order to attempt to achieve the target displacement, wherein $K_p$ is the proportional gain constant. This helps smoothen the trajectory of the VMP robot, however since the adjustment is applied at a time when the wheel is already faster than desired, the initial velocity of the wheel prior to the adjustment still has an impact on the trajectory which is affected by the original overshoot. An integral $$I = K_i \int_0^t \text{error } dt$$

of past errors over time may be applied as a further correction to eliminate residual error, wherein $K_i$ is the integral gain constant. The processor determines the integral by summating the absolute error for each time step over a period of time. The integral correction helps reduce systematic errors, such as errors created due to, for example, a wheel being slightly larger or a motor being slightly more powerful or a motor receiving slightly higher voltage than expected. The integral may have a limit, where only a limited portion of the history is considered. The processor may also determine a derivative $$D = K_d \frac{\Delta \text{error}}{\Delta \text{time}}$$

to apply a correction to the variable controlling the target value in order to reduce the error, wherein $K_d$ is the derivative gain constant. The derivative is the best estimate of the future trend of the error based on its current rate of change. The three constants $K_p$, $K_i$, and $K_d$ may be tuned to the specific application such that the difference between the target value and actual value is minimized. The proportional, integral and derivative corrections may be combined by the processor to produce an output=P+I+D which may be applied as a correction to the variable controlling the desired outcome in order to reduce the overall error. In this case, for example, the correction may be applied to the number of voltage pulses per second provided to the motor in order to achieve the desired displacement and thereby reduce the error between target and actual displacement. At startup, the accumulated error is reduced by the gradual acceleration of the VMP robot. This allows the displacement and corresponding adjustment of the motor speed to be applied before the VMP robot reaches maximum speed resulting in smaller displacements while only limited feedback is available.

The implementation of a feedback processor is beneficial in some cases as a differential drive mechanism, comprised of two independently driven drive wheels mounted on a common axis, used by VMP robots may be highly sensitive to slight changes in velocity in each of the wheels. The small errors in relative velocities between the wheels may affect the trajectory of the VMP robot. For rolling motion the VMP robot rotates about an instantaneous center of curvature (ICC) located along the common axis. To control the trajectory of the VMP robot the velocities of the two wheels may be varied. The angular velocity ω about the ICC may be related to the velocities $v_l$ and $v_r$ of the left and right wheels by the processor using $$\omega\left(R + \frac{l}{2}\right) = v_r$$

and $$\omega\left(R - \frac{l}{2}\right) = v_l,$$

wherein l is the length of the axle connecting the two wheels and R is the distance from the ICC to the midpoint of the axle connecting the two wheels. If $v_l=v_r$, then there is only forward linear motion in a straight line. If $v_l=-v_r$, then the ICC is at the midpoint of the axle and there is only rotation in place. If $$v_l = 0 \ \frac{\text{m}}{\text{s}},$$

then the ICC is at the left wheel, i.e. rotation is about the left wheel. The same applies for the right wheel if $$v_r = 0 \ \frac{\text{m}}{\text{s}}.$$

To navigate the VMP robot, assume the VMP robot centered at the midpoint between the two wheels and is at a position (x,y), headed in a direction θ with respect to the horizontal x-axis. By adjusting $v_l$ and $v_r$ the VMP robot may move to different positions and orientations. The processor determines the position of the ICC using $ICC=[ICC_x,ICC_y]=[x-R \sin\theta, y+R\cos\theta]$. At time t+δt the pose of the VMP robot $(x', y', \theta')$ is $$\begin{bmatrix} x' \\ y' \\ \theta' \end{bmatrix} = \begin{bmatrix} \cos(\omega\delta t) & -\sin(\omega\delta t) & 0 \\ \sin(\omega\delta t) & \cos(\omega\delta t) & 0 \\ 0 & 0 & 1 \end{bmatrix} \begin{bmatrix} x - ICC_x \\ y - ICC_y \\ \theta \end{bmatrix} + \begin{bmatrix} ICC_x \\ ICC_y \\ \omega\delta t \end{bmatrix}.$$

For a differential drive, the navigation strategy of the VMP robot is to move in a straight line, rotate in place, then move in a straight line again in order to reach desired (x,y,θ). For motion in a straight line where $v_l=v_r=v$, the equation used by the processor to determine the pose of the VMP robot reduces to $$\begin{bmatrix} x' \\ y' \\ \theta' \end{bmatrix} = \begin{bmatrix} x + v\cos\theta\delta t \\ y + v\sin\theta\delta t \\ \theta \end{bmatrix}.$$

And for rotation in place where $v_l=-v_r$, the equation used by the processor to determine the pose of the VMP robot reduces to $$\begin{bmatrix} x' \\ y' \\ \theta' \end{bmatrix} = \begin{bmatrix} x \\ y \\ \theta + \frac{2v\delta t}{l} \end{bmatrix}.$$

In some embodiments, an H bridge IC or driver, such as Quadruple Half-H bridge driver SN754410 by Texas Instruments or other similar bridge drivers, may be used to control DC motors. The H bridge is used to drive the motor's direction and regulate its speed. For example, Quadruple Half-H bridge driver SN754410 has 16 pins and is able to enable a pair of DC motors on each side of the IC using pins 1 and 9. These pins will run the motors by enabling them with a voltage generated by a battery connected to pin 16. The left motor leads connect to output pins 3 and 6 and right motor leads to output pins 11 and 14. Input pins 2, 7, 10, and 15 may be connected to a Beaglebone Black Board (BBB) from which input commands are sent. A BBB is a low-power open-source single-board computer. Pins 4, 5, 12 and 13 are connected to ground.

In some embodiments, the processor of the VMP robot uses a motion model to predict the position of the VMP robot within the environment. In some embodiments, the processor determines parameters of the motion model of the VMP robot that improve predictions of the motion model. In some embodiments, the processor uses a parametrized model $\hat{y}_{t+1}$=model ($y_t$, $p_t$) to predict output $\hat{y}_{t+1}$ at time t+1 given observed output $y_t$ at time t and parameters $p_t$. In some embodiments, the processor estimates the parameters that minimize a prediction error $y_{t+1}-\hat{y}_{t+1}$, wherein $y_{t+1}$ is the actual observed output at time t+1. In some embodiments, the processor uses recursive estimation $p_{t+1}=p_t+K_{t+1}(y_{t+1}-\hat{y}_{t+1})$ to estimate parameter $p_{t+1}$ at time t+1. In some embodiments, the processor uses the gain $K_{t+1}$ to determine how much the current prediction error $y_{t+1}-y_{t+1}$ affects the update of the parameter estimate. In some embodiments, the processor updates the parameter in the direction of the gradient of the error by, for example, $K_{t+1}=Q_{t+1}\Psi_{t+1}$ with $Q_{t+1}$ suitably chosen, and the gradient $$\Psi_{t+1}^T = \frac{\partial \hat{y}_{t+1}}{\partial p_t},$$

wherein $Q_{t+1}$ is a weighting factor used to determine how much to correct the parameter estimate. In some embodiments, the processor uses tracking error gradient descent wherein $Q_{t+1}$=constant. In some embodiments, the processor uses tracking error gradient descent with normalized gradient wherein $$Q_{t+1} = \frac{\gamma}{\|\Psi_{t+1}\|^2 + \text{Bias}},$$

wherein $\gamma$ is a constant. In some embodiments, $Q_{t+1}$ is chosen as a forgetting factor. In some embodiments, $K_{t+1}$ is chosen as Kalman gain of a Kalman filter.

In some embodiments, the processor of the VMP robot predicts where the VMP robot is going to be positioned $\hat{x}_{t+1}$=model ($x_t$, $u_t$,$\Delta$t) at time t+1 given an input state $x_t$ (i.e., previous position estimate) and sensor measurements $u_t$ (e.g., wheel encoder) at time t and a time step $\Delta$t. In some embodiments, the processor implements the model in a Kalman filter and the prediction step is an explicit Euler step in time. In some embodiments, the processor receives feedback on the computed state estimate (e.g., through sensor pose updates) and corrects the pose to $x_{t+1}$ at time t+1. In some embodiments, the processor determines a tracking error using $e=x_{t+1}-x_{t+1}$.

In some embodiments, the processor uses tracking error gradient descent to reduce the tracking error. In some embodiments, the processor adds parameters to the model $\hat{x}_{t+1}$=model ($x_t$, $u_t$,$\Delta$t,$p_t$) to improve the performance of the model. Examples of parameters include wheel radii, wheel distance, sensor position, etc. In some embodiments, the processor incrementally perturbs the parameters in the direction that reduces the tracking error the most, or otherwise in the direction of the descent on the tracking error function $$E = \frac{1}{2}e^T e.$$

In some embodiments, the processor updates the parameters using $$p_{t+1} = p_t + h\left(\frac{\partial \hat{x}_{t+1}}{\partial p_t}\right)^T e,$$

where h is a small step size. This is the same update rule as described above with $$Q_{t+1} = h \text{ and } \Psi_{t+1}^T = \frac{\partial \hat{x}_{t+1}}{\partial p_t}.$$

In some embodiments, the processor uses hyperparameters for fine tuning the model. In some embodiments, the processor uses an adaptive step size h(t), wherein $$Q_{t+1} = \frac{\gamma}{\|\Psi_{t+1}\|^2 + \text{Bias}},$$

for example. In some embodiments, the processor models uncertainty by premultiplying Q with a matrix M to, for example, do larger updates in directions with higher certainty and smaller updates in directions of uncertainty, or by taking the Kalman update instead as it is already corrected by both covariance matrices. In some embodiments, the processor improves stability of the model by, for example, detecting outliers and eliminating them or by delayed updates, or by delayed updates on a separate set of parameters.

In some embodiments, the processor uses an extended Kalman filter with augmented state space in modeling the motion of the VMP robot. In some embodiments, the processor uses the augmented state space $$\tilde{x}_t = \begin{pmatrix} x_t \\ p_t \end{pmatrix}$$

and applies the Kalman filter to $\tilde{x}$. In some embodiments, the parameters are taken as time-invariant and the processor models zero noise on the parameter portion of the state. Therefore, in some embodiments, the processor models dynamics using $$\tilde{x}_{t+1} = \tilde{\Phi}(\ldots) = \begin{pmatrix} \text{model}(x_t, u_t, \Delta t, p_t) \\ p_t \end{pmatrix}.$$

In some embodiments, the processor updates the Jacobian F from the non-augmented Kalman process using $$F = \frac{\partial \tilde{\Phi}}{\partial \tilde{x}_t} = \begin{pmatrix} F & \Psi_{t+1}^T \\ 0 & I \end{pmatrix},$$

wherein $\Psi_{t+1}{}^T$ is the model derivative with respect to the parameters as defined above.

For example, in some embodiments, the processor models motion of the VMP robot using $\dot{x}=v \cos \omega$; $\dot{y}=v \sin \omega$; $\dot{\theta}=\omega$, with initial conditions such as $x(t_0)=x_0$, and wherein v is translational velocity and ω is rotational velocity. In some embodiments, the processor uses a forward model including $x_{t+1}=x_t+v\Delta t \cos \theta_t$; $y_{t+i}=y_t+v\Delta t \sin \theta_t$; $\theta_{t+1}=\theta_t+\omega\Delta t$, to compute the motion of the VMP robot. In some embodiments, the processor determines translational and rotational velocities v and ω based on observed right and left wheel velocities $\omega_R$ and $\omega_L$ of the VMP robot using $$\begin{pmatrix} v \\ \omega \end{pmatrix} = J \begin{pmatrix} \omega_L \\ \omega_R \end{pmatrix},$$

wherein $$J = \begin{pmatrix} r_L/2 & r_R/2 \\ -r_L/b & r_R/b \end{pmatrix}$$

and $r_R$ and $r_L$ are right and left wheel radii and b is the distance between the right and left wheels. In some embodiments, the processor uses wheel sizes as parameters $p_t=[r_L, r_R]^T$ and $J=J(p_t)$. In some embodiments, the processor estimates parameters p for observed left and right wheel velocities $u_t=[\omega_L,\omega_R]^T$ to improve the forward model. Given abbreviated state vector $$x_t = \begin{pmatrix} x_t \\ y_t \\ \theta \end{pmatrix},$$

the processor uses forward model $$\hat{x}_{t+1} = \text{model}(x_t, u_t, \Delta t, p_t) = \begin{pmatrix} x_t + v_t \Delta t \cos\theta_t \\ y_t + v_t \Delta t \sin\theta_t \\ \theta_t + \omega_t \Delta_t \end{pmatrix}$$

with $$\begin{pmatrix} v_t \\ \omega_t \end{pmatrix} = J(p_t)u_t.$$

In some embodiments, the processor determines the gradient for a single time step in the direction of the model parameters using $$\Psi_{t+1}^T = \frac{\partial \hat{x}_{t+1}}{\partial p_t} = \frac{1}{2}\Delta t \begin{pmatrix} \omega_L \cos\theta_t & \omega_R \cos\theta_t \\ \omega_L \sin\theta_t & \omega_R \sin\theta_t \\ -2\omega_L/b & 2\omega_R/b \end{pmatrix}.$$

In some embodiments, the processor updates parameters $p_t$ in the direction of steepest descent of a single time step error function. In some embodiments, upon receiving a scan match the processor estimates the position of the VMP robot using EKF before the scan match and the position of the VMP robot based on the scan match. In some embodiments, the processor determines an error $e_{t+1}$=pose from scan match−pose from EKF before scan match and uses the error to update the parameters $p_{t+1}=p_t+Q_{t+1}\Psi_{t+1}e_{t+1}$.

FIG. 187A illustrates estimated left and right wheel parameters for augmented Kalman filter 18700 and 18701 and tracking error gradient descent 18702 and 18703 based on simulated data with Gaussian noise. Ground truth of left and right wheel parameters 18704 and 18705 are also plotted. FIG. 187B illustrates the resulting error in pose for augmented Kalman filter 18706, tracking error gradient descent 18707, and classic Kalman filter 18708. Both augmented Kalman filter and tracking error gradient descent perform better than classic Kalman filter. FIGS. 188A and 188B are the same as FIGS. 187A and 187B, respectively, however a smaller step size is used for tracking error gradient descent. This is evident as left and right wheel parameters estimated using tracking error gradient descent 18702 and 18703 approach ground truth 18704 and 18705 much slower, which is reflected in the resulting error of tracking error gradient descent 18707. FIGS. 189A and 189B are the same as FIGS. 187A and 187B, respectively, however a higher noise for the left and right wheel parameter is adding in the augmented Kalman filter. This results in noisier parameter estimates for the augmented Kalman filter 18700 and 18701. FIGS. 190A and 190B are the same as FIGS. 187A and 187B, respectively, however time variant left and right wheel parameters are used. Both augmented Kalman filter parameter estimates 18700 and 18701 and tracking error gradient descent parameter estimates 18702 and 18703 tracked changes in left and right wheel parameters 18704 and 18705. FIGS. 191A and 191B are the same as FIGS. 187A and 187B, respectively, however a drop in left and right wheel parameter is added. Both augmented Kalman filter parameter estimates 18700 and 18701 and tracking error gradient descent parameter estimates 18702 and 18703 quickly accounted for the drop in left and right wheel parameter resulting in minimal jump in error 18706 and 18707 for augmented Kalman filter and tracking error gradient descent, respectively.

In some embodiments, the processor uses deep neural networks to learn complex, non-linear functions. In some embodiments, the deep neural networks recognize patterns by clustering and classifying data. In some embodiments, the neural networks establish correlations between the input data. In some embodiments, the processor uses feedforward networks to learn a motion model for the VMP robot. In some embodiments, different hierarchy and training process are used to construct different possible motion models. For example, a first motion model uses previous pose and measure velocity to determine new pose. The first motion model takes position into account and is therefore capable of mapping coordinate dependent parameters (e.g., slightly tilted floor). In another example, a second motion model uses initial position and measured velocity to determine change in pose. The second motion model does not take position into account and therefore may only account for internal/general mismatches. Neither model 1 or 2 take previous velocities into account. In embodiments, previous velocities could be added but would increase the dimension of the neural network. While neural networks may be trained to a high degree of accuracy, they do not take previous measurements into account. Further, there is the challenge of online calibration with neural networks as calibration requires frequently running backpropagation. Depending on the size of the network, this may result in significant computational cost. Freezing the network and only updating the network with respect to a few parameters (e.g. additional tuning input parameters) may be considered conceptually similar to the methods described above.

In some embodiments, the processor uses a recurrent neural network as it is a time-aware type of neural network. Recurrent neural networks are able to keep states hidden from time step to time step. In contrast to feedforward neural networks, the input of recurrent neural networks includes not only the current input but also information perceived in previous steps. Internally, recurrent units have an internal state. This internal state also influences the output. With each input, this hidden state is updated. This mechanism provides a feedback loop at every time step in the input series. In some embodiments, the processor uses continuous time recurrent neural networks to account for slight mismatch in sampling speed of velocities. Different recurrent neural network hierarchies for modeling dynamics of the VMP robot may be used. In some embodiments, the recurrent neural network feeds back the output from one time step as input to the next time step. For example, FIG. 192 illustrates a recurrent neural network hierarchy wherein part of the output is fed back to the state variables (recurrent inputs). In some embodiments, the processor uses a time integration recurrent neural network to estimate a new state of the VMP robot. In one embodiment, the recurrent neural network receives state and sensor measurements as input and outputs a new state and feeds back the output as the state input. This recurrent neural network is illustrated in FIG. 193. In another embodiment, the recurrent neural network outputs how much the state changed and the change is fed back and added to the state input. In some embodiments, the model is updated by backpropagating the error. In some embodiments, the error is backpropagated using iterative closest point matching.

In some embodiments, the processor uses a modular structure to estimate a new state of the VMP robot wherein the recurrent neural network receives state, odometer (odom) measurements and inertial measurement unit (IMU) readings as input and the output position (x) and velocity (v) of the recurrent neural network (RNN) is used input into a non-linear ground-truth (GT) model (e.g., classical motion model), in addition to state, describing physics of the VMP robot. The GT model outputs a new state. This modular structure is illustrated in FIG. 194. In some embodiments, the processor updates the model by determining the hard-coded gradient of the ground truth model and directly backpropagating the gradient through the recurrent neural network.

In some embodiments, the processor estimates a new state of the VMP robot by learning to map observations to parameters p of a forward model (e.g., as described above). The recurrent neural network receives state, odometer (odom) measurements, and IMU readings as input and outputs parameters p, which are received as input into the forward model. The forward model also receives state and odometer measurements as input and outputs a new state. This is illustrated in FIG. 195. In some embodiments, the processor uses $p_{t+1}=p_t+Q_{t+1}\Psi_{t+1}e_{t+1}$ as described above to determine parameters instead of the recurrent neural networks shown in FIG. 195. Further description of estimation of model parameters is provided in U.S. patent application Ser. Nos. 16/041,286 and 16/353,019, the entire contents of which are hereby incorporated by reference.

In some embodiments, two or more VMP robots collaborate by sharing intelligence to accomplish a task together. Examples of collaborative methods are described in U.S. patent application Ser. No. 15/981,643, the entire contents of which is hereby incorporated by reference. Some embodiments describe a method for collaborative intelligence of robotic device. Collaborative intelligence differs from artificial intelligence as processors of robots learn from one another rather than learn from a user. For instance, a processor of a home control unit capable of learning a user's preferences (e.g. home temperature, music genre, cleaning schedule, alarm setting, etc.) from their actions over time is an example of artificial intelligence. Based on the user's preferences learned over time, a processor of a home control unit may therefore, for example, play a specific genre of music or set the shower to a specific temperature. This differs from collaborative intelligence wherein processors of robotic devices learn from one another. For example, if a second home control unit was introduced into a home already containing a first similar device, the processor of the first home control unit may share its intelligence with the processor of the second home control unit such that the processor of the second home control unit may learn the user's preferences from the processor of the first home control unit. Over time, as a processor of each robotic device operating within an environment learns from a user, the processors of the robotic devices may share their intelligence and learn from one another and thereby collaborate to complete tasks more efficiently. For example, the processor of the first home control unit may teach the processor of the second home control unit that the user prefers playing jazz music in the evening while the processor of the second home control unit may teach the processor of the first home control unit what time the user prefers to wake up. In some embodiments, the processors of robotic devices may autonomously split tasks. For example, the processor of one home control unit may control home temperature while the processor of the other home control unit may control lighting in the home. As a further example, a second cleaning robot introduced into a home wherein a first cleaning robot exists may collaborate with the first cleaning robot, wherein the processor of the first cleaning robot shares its intelligence hence teaching the processor of the second cleaning robot the user preferences learned, the map of the environment, the location of obstacles, etc, and vice versa. For example, the processor of the first cleaning robot may share with the processor of the second cleaning robot that the user likes the house cleaned at 8:00 AM and at the same time may learn from the processor of the second cleaning robot that its respective user likes the kitchen cleaned at 8:00 PM. In another example, two or more different types of autonomous robots signal each other before, during, or after a task is complete. For example, a robotic vacuum may signal a robotic steam cleaner after vacuuming is finished, thereby triggering the robotic steam cleaner to steam clean the floors. By sharing such intelligence, processors of both robots may autonomously collaborate with one another to schedule cleaning, determining, for example, cleaning location, cleaning time, and task allocation of each cleaning robot. In this way, processors of multiple robotic devices may collaborate to complete tasks by making decisions themselves without requiring user input to control their actions. For example, the processor of a first robot may know that user A likes the home temperature set to 75° F. while the processor of a second robot knows user B likes the home temperate at 73° F. The processors of the robots may autonomously share intelligence and collaborate and may infer based on shared intelligence that a home temperature of 74° F. is best when both users are present and to set the temperature to each individual user's preference when only they are present. In other instances, processors of robots may allow the user to choose the desired setting. For example, processors of first and second cleaning robots brought into the same environment and with separate user preferences stored may still share their respective user's preferences with one another however the user may choose the new preferences if preferences chosen by the collaborating robots are not desired. The processors of the robots may then learn the user's new preference for the future. In some embodiments, information from each robot may also be stored online, such as on the cloud, or may be stored on an external device.

In some embodiments, the processor of a robot may make inferences from shared intelligence. For instance, a processor of a robotic coffee machine may learn that a user gets home from a jog every morning at 5:00 AM and to therefore brew a cup of the user's preferred coffee at 5:00 AM. If one day at 4:45 AM the processor of a collaborating robotic vacuum cleaner detects the front door opening it may share this data with the processor of the robotic coffee machine and the processor of the robotic coffee machine may infer that the user is home early from their jog and may therefor brew a cup of coffee earlier than usual. In another example, the processor of a robotic tooth brush may collaborate with the processor of a robotic coffee maker, such that operation of the robotic tooth brush in the morning may be shared with the processor of the robotic coffee maker that may infer the user is awake and may therefor brew a cup of the user's preferred coffee before the user reaches the kitchen. If there are two users within the home, the processor of the robotic coffee machine may infer based on probabilities and statistics of information which user it is dealing with in order to maximize comfort without wasting energy. For instance, if the processor of the robotic coffee machine infers both users are awake it may brew a medium roast in order to appease both users if one prefers light roast and the other dark roast.

In some embodiments, processors of robotic devices may share data of multiple users in order to learn to make decisions benefiting all present users. For example, if two users prefer a robot to clean at 8:00 AM but one prefers mopping while the other user prefers sweeping, the processor of the robot may decide to clean at 8:00 AM using both cleaning functionalities to benefit both users. In another example, an AI system used for suggesting movies based on learned movie preferences of a user may compile movie preferences of all present users in order to suggest movies that all users may enjoy.

In some embodiments, processors of robots may provide suggestions to a user based on learned preferences of the user. For example, processors of robots may combine music preferences of a large group of individuals attending an event and suggest songs to play. In another example, processors of robots working at separate locations of a hotel chain may learn room preferences of an individual often travelling for work and staying within the same hotel chain and may prepare the room for the individual based on statistical information and probabilities from previously collected data or may provide suggestions to the user. For instance, the processor of a robot may decide to turn on a warm shower for the user at 6:15 AM based on previous intelligence on the time the user wakes up and the temperature of the shower the user uses. Or the processor of the robot may provide the user with a suggestion to set the alarm for 6:15 AM based on the user waking up at 6:15 AM during previous visits.

The examples provided above describe collaborative intelligence of robotic devices. In some embodiments, a method by which collaborative intelligence of robots may be executed includes broadcasting a signal by a transmitter of a first robot, detecting the signal by a receiver of a second robot, sending a second robot identifier by a transmitter of the second robot, receiving the second robot identifier by a receiver of the first robot, sending confirmation of receipt of the second robot identifier and sending a first robot identifier by the transmitter of the first robot, receiving the first robot identifier by the receiver of the second robot, sending confirmation of receipt of the first robot identifier by the transmitter of the second robot, establishing a data transfer channel (DTC) link between the first and second robots by a processor of the first robot and a processor of the second robot, transferring information between robots through the DTC link by the processor of the first robot and the processor of the second robot and, performing an action by at least one robot based on the transferred information. The DTC link may be, for example, a secure wireless connection (e.g. Wi-Fi or RF) between the first and second robot. In some embodiments, a reward may be assigned by the processor of each robot or may be assigned by the processor of one robot and back propagated to the other based on the outcome of the action. In embodiments, the reward assigned to each robot may be unproportioned. The goal may be to preform actions that maximize the reward. In some embodiments, as multiple robots interact with each other, the processor of each robot may establish a different level of trust with each robot it may interact with. In some embodiments, the level of trust may increase or decrease with each interaction depending on the outcome of the interaction. In some embodiments, information shared with a robot may be ranked at different levels of priority by the processor depending on the source of the information and the level of trust established with the source at the time. For example, the processor of a robot receiving information from processors of multiple robots may rank the priority of information received based on the level of trust established with each robot. As a further example, a processor of a robot receiving conflicting information from processors of two separate robots may give higher priority and importance to the information received from the processor of the robot with higher level of trust.

For example, two or more of robotic dump trucks and robotic excavators (e.g., one robotic dump truck and one robotic excavator, or three robotic dump trucks and two robotic excavators) collaborate to seamlessly excavate a mine and transport the excavated soil to one or more soil dump locations. In some embodiments, robotic excavators dig up soil and empty robotic dump trucks form a line and the robotic excavators fill the dump trucks with excavated soil from one or more areas of a mine. The filled robotic dump trucks transport the soil to one or more soil dump locations. In some embodiments, processors of the robotic dump trucks and robotic excavators collaborate to generate a map of the environment, localize themselves within the environment, and make decisions (e.g., tasks to be assigned to each robotic dump truck and robotic excavator based on factors such as battery or fuel level, physical characteristics such as size, specifications such as maximum speed, etc.). In some embodiments, the simultaneous collaboration, localization, and mapping is otherwise known as Quantum SLAM. In some embodiments, the two or more of robotic dump trucks and robotic excavators (or other robotic machinery) collaborate and share intelligence using a DTC. In some embodiments, the DTC link may be, for example, a secure wireless connection (e.g. Wi-Fi or RF) between the first and second robot. In some embodiments, collaborating robots, are actuators that take action or observers that observe the surroundings. In some embodiments, the DTC link is between two actuators, two observers or an actuator and an observer. In some embodiments, the processor of a robot establishes more than one DTC link. Different configurations of connections between collaborating robots may exist. For example, connection between two robots, connection from one robot to multiple robots, connection from multiple robots to one robot, etc. In some embodiments, DTC links are one-way connections wherein transfer of information is unidirectional, are two-way wherein information is bidirectional, or are more complex. In some embodiments, the processor of a robot assigns a measure of strength to a DTC link with another collaborating robot (e.g., a DTC link between two robotic excavators). In some embodiments, the processor adjusts the measure of strength based on the outcome of the collaboration. For example, if the shared intelligence between two robotic excavators results in reduced time to excavate an area, the respective processors increase the strength of the DTC link. In some embodiments, the measure of strength of the DTC link is a probability of the action resulting in a maximum reward. In some embodiments, the DTC link is a vector with magnitude and direction. The absolute value of the magnitude denotes the strength of the link and represents a probability between 0 and 1 of the action or collaboration resulting in a maximum reward, wherein a value of 1 signifies a very strong link. If the collaboration between robots is useful for both robots then the respective processors increase the strength of the DTC link as well as the level of confidence in the information received from the collaborating robot. If the exchange of information is useless to the collaborating robots, the respective processors reduce strength of DTC link and, if collaboration is repeatedly useless, the shared information may eventually be discarded and the link terminated by the respective processors. For example, if sensor measurements of the environment from a first robotic dump truck indicates a road way that allows a second robotic dump truck to reach its soil dump destination faster and the second robotic dump truck with whom the information has been shared travels to the road way and finds it is blocked, then the exchange of information was not helpful and the strength of the link is decreased by the processor of the first robotic dump truck as well as the level of confidence of the information received from the second robotic dump truck.

As a further example, consider the environment of robotic excavators K and L represented by a grid world and described by a m×n matrix G comprising all state spaces available to the robotic excavators. In a two-dimensional world, each entry of the matrix may represent a cell of the grid world and have a value (x,y). Robotic excavator K may be considered an observer while robotic excavator L may be considered an actuator. Robotic excavators K and L may understand the environment based on environment matrices $G_k$ and $G_L$, respectively. Coverage matrices $C_k$ and $C_L$ may correspond to environment matrices $G_k$ and $G_L$, respectively, and may be used to indicate excavating coverage of the mining site. Each entry of a coverage matrix C may correspond to an entry of an environment matrix G such that each time a cell of the environment in matrix G is excavated, a corresponding entry in the coverage matrix C is increased by a value of 1, with all entries of the coverage matrix initially having a value of 0. As such, the coverage matrices may allow the processors of the robotic excavators to keep track of excavated areas of the mining site. Initially, each robotic excavator may begin excavating the environment individually. At some point, robotic excavators K and L may meet and establish a DTC link such that the processor of robotic excavator K, the observer, may share its excavating coverage matrix $C_k$ with the processor of robotic excavator L, the actuator. The processor of robotic excavator L may convolve coverage matrices $C_k$ and $C_L$ to combine areas already excavated by both robotic excavators. Since this is an example of cooperative game theory, the processor of robotic excavator L may devise a policy that distributes excavation of the remaining uncovered cells among the two robotic excavators considering the maximum reward it may receive itself and the maximum reward it may leave for robotic excavator K to collect. In some embodiments, wherein the DTC is a two-way link between VMP robots, messages may be exchanged back and forth to ensure the reward function, accounting for the reward received by both robots, is maximized. The uncovered cells of the mining site, when divided for excavating coverage by robotic excavators K and L, may reduce excavating time of the mining site and thereby increase the reward received, assuming the reward is dependent on excavating time. Further, if total excavating time of the mining site is reduced as a result of collaboration with robotic excavator K, the processor of robotic excavator L may reinforce the strength of the DTC link with robotic excavator K. In some embodiments, wherein non-cooperative game theory is applied and the processors of robotic excavators K and L each attempt to maximize their own reward individually at the expense of one another, Nash equilibrium may apply. When each robotic excavator has chosen a strategy and no robotic excavators can benefit by changing strategies while all other robotic excavators keep their strategies unchanged, then the current set of strategies and corresponding payoffs constitute a Nash equilibrium. For example, robotic excavators K and L are in Nash equilibrium if the processor of robotic excavator K chooses the best strategy to execute for excavation coverage of the mining site, taking into account the policy chosen by the processor of robotic excavator L and the processor of robotic excavator L chooses the best policy to execute for excavation coverage of the mining site, taking into account the strategy chosen by the processor of robotic excavator K. Since our case is an instance of cooperative Game Theory, the processor of robot excavator L may calculate a heuristic policy, calculating the path of robotic excavator K from its current location to its base location (as well as its own path) and devises a policy that distributes the remaining work among them considering that maximum reward it would get and the maximum reward it would leave for robotic excavator K to collect. If this was a two-way link, the processors of both robots may exchange a few messages to achieve arg max $(R_L+R_K)$, wherein $R_L$, $R_K$ are the rewards. If robotic excavator L finishes the task earlier, thus receiving a reward with less cost (i.e., time is a penalty), it reinforces its link to robotic excavator K with a W factor (Hebbian Learning)

proportional to the probability of earning more rewards the next round. In other instances, this same example may be applied to robotic surface cleaners that collaborate to cover an area for cleaning more efficiently by dividing the surface area for cleaning and avoiding repeat coverage by sharing their respective coverage matrices. In yet other instances, this same example may be applied to various types of collaborating robots.

In some embodiments, the processor of a robot may form, strengthen, weaken or terminate DTC links with other robots, with the goal of forming coalitions that maximize the reward. For example, for a DTC link between an observer and actuator, the strength of the DTC link may be reinforced by the processor when $\exists o(t) \in 0 \wedge \exists a(t) \in A$, $a(t)|o(t-1) \Rightarrow P[r^*(t)>r(t)]$, wherein o(t) is an observation within the set of observations O, a(t) is an action within the set of actions A, and r*(t) is the optimal reward compared to all rewards in $\{r\}$, $\forall r \in \{r\}|P[r^*>r]$. For two actuators with actions $a_1$ and $a_2$, $\exists a_1(t) \in U \wedge \exists a_2(t) \in A$ wherein maximum reward may be assigned by the processor by, for example, saving time. The sum of the reward of $r_1$ and $r_2$ at time t is larger than the sum of $r_1$ at time t and $r_2$ at time t+1, i.e., $(r_1+r_2)(t)|(a_1+a_2)(t)>r_1(t)+r_2(t+1))|(a_1(t)+a_2(t+1))$. For two observers, maximum reward may be assigned by the processor for, for example, useful information gain. This may be quantified by the processor using conditional entropy $H(O_1|O_2)=H(O_1|O_2)-H(O_1)+H(O_2)$, wherein the combination of observations $O_1$ and $O_2$ should reduce the entropy H of observation $O_1$ given its combination with observation $O_2$ for useful information gain. For example, the data captured from a sensor of a robotic dump truck and a sensor of a robotic excavator may be combined with one another to produce a higher resolution image or portion of an image. In some embodiments, the DTC link may be terminated by the processor if the strength of the DTC link is below a predetermined threshold. The goal is to form relationships that provide the most reward and hence have the strongest DTC links.

In some embodiments, a MDP may be used by the processor of robots to learn with which robots a strong DTC link may be formed and hence with which robots may the most useful coalitions be formed. A MDP consists of a sequence of states and actions followed by rewards. For example, an action may be to combine sensor data from one robot with sensor data from a second robot. If the action of combining the sensor data results in readings with higher confidence level, a reward with greater value may be assigned as compared to the value of the reward assigned if the combination of sensor data results in readings with lower confidence level. A greater reward assigned by the processors of collaborating robots as a result of collaboration between the robots may translate to a stronger DTC link between the two. For example, the magnitude of a DTC link between an observer and actuator with an absolute value of one may signify a strong link given that the actions taken by the actuator given the observations from the observer generate maximum reward with a probability of one. Actions may be taken by a robot to transition from one state to another and after transitioning to each new state a reward may be assigned by the processor of the robot. For two collaborating robots, for example, both may transition to a new state after taking an action to collaborate. The reward may be assigned to both collaborators by their respective processors in one embodiment or may be provided to one robot by its processor and back propagated to the other robot. In some embodiments, the reward may be divided unevenly between collaborating robots.

A MDP includes a sequence of observed states s and actions a followed by rewards r, i.e., $s_t$, $a_t$, $r_{t+1}$, $s_{t+1}$, $a_{t+1}$, $r_{t+2}$, $s_{t+2}$, $a_{t+2}$, $r_{t+3}$, . . . $a_T$, $r_T$, $S_T$. The goal of the robot is to maximize the net reward $R_T$ to be expected in the future. The net reward $R_T=r_{t+1}+\gamma^1 r_{t+2}+ \ldots +\gamma^{T-t-1}$ is the sum of the rewards received for the sequence of states and actions experienced beginning from state $s_t$ and ending with terminal state $s_T$, wherein y is a discount factor applied with value $0 \leq \gamma < 1$. In some embodiments, the MDP may be solved by the processor using Q-Learning, a method based on estimating the expected total net reward in the future of each state-action pair. The expected net reward for the execution of a sequence of states and actions may be given by a state-action value function. In some embodiments, the goal is for the processor to find optimal state-action value function by identifying sequence of states and actions with highest net reward. Since multiple actions may be taken from each state, over time as the number of states experienced, actions, and transitions increase, the goal of the processor is to also find an optimal policy which contains the action from each state with highest reward value. The value of a state-action pair $Q(s,a)=E[R_T|s_t=s, a_t=a]$, also known as the Q-function, may be defined as equivalent to the expected net reward $R_T$ for the sequence of states and actions beginning with state $s_t$ and action $a_t$ and ending with terminal state $s_T$. By finding the sequence of states and actions which maximize the state-action value function Q(s,a), the optimal value function $Q^*(s,a)=\max E[R_T|s_t=s, a_t=a]$ may be identified by the processor. And the optimal policy for each state $\pi^*(s)=\operatorname{argmax} Q^*(s,a)$ may be derived by the processor by identifying the highest valued action that may be taken from each state. To iteratively calculate the state-action value function for a given state s and action a, the Bellman Optimality equation may be applied. The optimal value function obeys Bellman Optimality equation $Q^*(s,a)=E[r+\gamma \max Q^*(s',a')]$. The equation expresses that the value for a given state s and action a is dependent on the current reward r observed at state s and the maximum discounted γ future reward for the next state s' the VMP robot would end up in. This equation may be used by the processor to iteratively calculate the state-action value for a given state s and action a using $Q_{i+1}(s,a)=E[r+\gamma \max Q_i(s',a')]$ as the sequence of states and actions are executed. i is the iteration number and begins at i=0, with $Q_0(s',a')$ being initially guessed. In this particular context, the sequence of states and actions may correspond to the states visited and actions taken during a work session or over some time period. Over time, as more states are visited and different actions from each state are evaluated by the processor, the system converges to find the most optimal action to take from each state thereby forming an optimal policy. Further, as different sequences of states and actions are evaluated over time, the system converges to the most optimal sequence of states and actions. This process may be known as Q-Learning.

For two or more robots, the problem of reinforcement learning (RL) may become more complex. In some embodiments, RL such as Q-Learning, may be combined with deep learning (DL). RL may be used to define the objectives while DL may learn the complex representations to achieve such objectives. DL is a general framework for learning the representation of complex models and may be composed of linear transformations, convolution operations, non-linear activation functions, such as ReLU, and loss functions such as, mean square error and log likelihood. The combination of RL and DL may be known as Deep Reinforcement Learning (DRL). In instances wherein Q-Learning is used, the process may be known as Deep Q-Learning (DQL)

wherein deep neural networks represent the state-action value function (or Q-function) Q(s,a; w). For example, a Deep Q-Network (DQN) may be a combination of convolutional neural network (CNN) for learning feature representations with Q-Learning algorithm. The DQN may represent the state-action value function Q(s,a; w) wherein w is the network parameters. Given that the optimal value function $Q^*(s,a; w)=E[r+\gamma \max Q^*(s',a'; w')]$ obeys Bellman Optimality equation, a loss function $L(w)=[r+\gamma \max Q^*(s',a'; w')-Q(s,a; w)]^2$ may be defined. The MSE of loss function L(w) may be minimized by gradient descent in the DQN to find the optimal state-action value function by the processor. In some embodiments, a separate target network with parameters w', as above, may be used by the processor in estimating the maximum state-action value function. In some embodiments, exploitation of current optimal policy and exploration of potentially better policies may be balanced by the processor by employing a greedy approach that ensures the robot samples a random action some percentage of the time. To avoid suboptimal connections resulting from randomly generated events the processor may terminate some connections and for each terminated connection may redistribute its weight to other intact random connections. In some embodiments, experience replay may be employed wherein all experiences (s,a,r,s') may be stored in a replay memory and random mini-batches from the replay memory may be used by the processor instead of the most recent transition when training the network. This provides stability as RL may be unstable when a nonlinear function, such as a neural network, is used to approximate the value function.

In some embodiments, the processor uses Hebbian Learning to measure the strength of the DTC link W using $W'(OA,AA)=W+\eta(R'-R)$, wherein W is the strength of the link before collaboration, W' is the strength of the link after collaboration, $\eta$ is the learning rate, R' is the reward received as a result of collaboration and R is an integration of previous rewards or the expected reward had collaboration between robots not occurred.

In some embodiments, there may be noise in the data of the observer and the action taken by the actuator. In some embodiments, the processor determines conditional entropy of two events $H(AA|OA)=\Sigma_{ij}p(OA_i,AA_j)\log p(OA_i)/p(OA_i,AA_j)$, wherein $p(OA_i,AA_j)$ is the probability that $AA=AA_j$ and $Y=OA_i$. The entropy may be interpreted as the amount of randomness in the outcome of the action executed by the actuator based on the sensory input provided by the observer. For example, there may be a chance that the observation of the observer is the wrong observation or that the action taken by the actuator is not executed as expected. Therefore, in some embodiments, the processor determines a probability $$P(AA \mid OA) = \frac{p(OA \mid AA)P(AA)}{P(OA)}$$

for the accuracy of observation of the observer (OA) and the action of the actuator (AA) when determining the expected reward. P(OA|AA) is the probability of the OA making an observation given that the AA executes a particular action, P(AA) is the probability of the AA taking a particular action independent of the observation, and P(OA) is the probability of the OA having made an observation.

In some embodiments, the processor balances exploration of new DTC links and exploitation of existing DTC links. For example, actuators may be encouraged to find better sources of information, such as robots with better sensors or ideally positioned sensors, and observers may be encouraged to find actuators that have better use of their information. In some embodiments, the processor uses a regret analysis when determining exploration or exploitation. For example, the processor may determine a regret function $$\rho = T\mu * - \sum_{t=1}^{T} r_t$$

which is the difference between the reward sum associated with an optimal policy and the sum of the collected rewards. $\rho$ is the regret after T rounds, $r_t$ is the reward in round t and $\mu^*$ is the maximum reward mean. In some embodiments, the processor minimizes the regret by defining a cost function, for example $$C(w, b) \equiv \frac{1}{2n}\sum_x \|y(x) - a\|^2,$$

and minimizing the cost function using gradient descent. In this way, at each state, a policy that has a state-action value function at least equal to the previous state is chosen by the processor. In some embodiments, the processor uses a multi-armed bandit model wherein in a finite and countable state space and action space, the strategy is based on starting the sampling process on a uniform basis over a set of available actions and progressively focuses on the best actions according to previously observed rewards. Given k arms, n rounds with $n \geq k$, and unknown probability distributions P(R|a) for each action, the processor chooses action $a_t \in \{1, 2, \ldots, k\}$ and provides reward $R_t$ according to P(R|a). Given Q(a)=E[R|a], the goal is to maximize the cumulative reward while equivalently minimizing the regret function $\rho=\Sigma_t(Q^*-Q(a_t))$. The regret function quantifies the exploration and exploitation dilemma of a multi-armed bandit problem in the search for the most optimal device. In fact, regret is an integration of all small unearned rewards. Therefore, the data type is the same as the reward which is a multivariate function. In some cases, the processor solves the squared error of the cost function using stochastic gradient descent to minimize the regret. This ensures at each state a policy that has a value function at least equal to the previous state is chosen.

In some embodiments, the processor uses Monte Carlo Tree Search (MCTS) to maximize the reward. MCTS uses a statistics tree comprised of nodes connected by branches wherein value of nodes are given. Nodes of highest value are of top priority. Nodes may represent different states. The tree begins at the root node, then connects to child nodes and further onwards leaf nodes. The path from the root to a leaf node may represent, for example, states visited and actions taken to transition between states. There are four main steps in MCTS comprising selection, expansion, play-out and backpropagation. The processor may iteratively choose different paths and determine associated rewards. In some embodiments, the processor may use Lehmer random number generator to randomize actions chosen. The processor may backpropagate the result of each path in the tree to reflect the outcome of the actions taken. In some embodiments, the processor may simulate possible actions from a state and choose the action that results in a reward equal to or greater than the previous states.

In some embodiments, robots may be distributed over a network, such as a network in the cloud, wherein robots may be present at various locations. In such cases of remote collaboration, parameters such as latency may be considered by the processor of the robot. For example, latency may be considered when using satellite images to locate a moving vehicle. In embodiments, there may be a threshold latency time after which the information may be rendered useless by the processor of the robot.

In some embodiments, collaborative robots may have active or passive status, wherein during active status the transmitter of the robot may broadcast its presence and capabilities to other robots while during passive status the receiver of the robot may monitor and the transmitter respond to broadcasts from other robots. In some embodiments, active and passive statuses are not mutex. For example, a robot can be active at different times or when some links weaken, etc. Robots may alternate between active and passive statuses, wherein for example, robots may be active or passive at different times or robots may become active when links weaken or robots may become passive or active depending on the number of DTC links that have been formed. In some embodiments, active and passive can have different statuses for in-bound links and out-bound links. There may or may not be a maximum number of links set. There may or may not be a threshold from which point on the robot transitions from active to passive.

In some embodiments, information shared between processors of robots may be time stamped and contain a header with an identifier of the robot sharing the information. In some instances, wherein the information is passed between processors of multiple robots, the processor of each robot sharing their information may add their identifier to the header. This may be used to prevent information looping, wherein the processor of a robot may disregard incoming information if the header contains their identifier. In some embodiments, processors of intermediary robots may be bypassed. For example, the processor of an actuator robot connected to a processor of an observer robot directly and also indirectly through a processor of an intermediary observer robot may discard the indirect connection with the intermediary observer robot. As a further example, a processor of an actuator robot connected indirectly to a processor of a first observer robot through the processor of an intermediary second observer robot may initiate a broadcast and request direct connection to the processor of the first observer robot in instances where, for example, the processor of the actuator robot is often receiving useful information from the processor of the first observer robot.

In some embodiments, the processor determines a probability of termination of a DTC link using the Gittins index. The Gittins index is a value associated to the state of a stochastic process with a reward function and probability of termination. The Gittins index is a measure of the reward that may be achieved by a random process with a termination state and evolving from its present state, with the option of terminating the process at every later stage with the accrual of the probabilistic expected reward from that stage up to the termination state. The Gittins index is a measure of the reward that can be achieved by a random process bearing a termination state and evolving from its present state onward, under the option of terminating the said process at every later stage with the accrual of the probabilistic expected reward from that stage up to the attainment of its termination state. It is a real scalar value associated to the state of a stochastic process with a reward function and a probability of termination.

In some embodiments, the processor of the robot may keep track of the other robots within their vicinity, including information on the model, type, functionality, capability, role, operating system, security privileges and approximate proximity of the other robots.

In some embodiments, processors of robots use a Deep Collaborative Reinforcement Learning framework for collaborative intelligence, the framework being a combination of deep convolutional neural network (CNN), deep Q-network (DQN) and reward function for action and communication selection. For example, for collaborative robot vacuums, the input to a CNN by may be a grid map in the form of a two-dimensional array wherein each entry of the array corresponds with a cell of the grid map and an entry having a value of 1 indicates coverage of the cell while a value of 0 indicates no coverage of the cell. The output of the CNN may be merged with a feature of action history and used as input to a DQN. The output of the DQN may be possible actions of the robotic vacuum, such as, move forwards, move backwards, move right, move left and stop. Followed by each action, the processor may update the grid map and may share the updated information with processors of all cooperative robots. FIG. 196 illustrates an example of a Deep Collaborative Reinforcement Learning framework used by processors of vacuum robots in the example described above wherein grid map 19600 is input into CNN 19601. Output feature vector of grid map 19602 and action history 19603 are input into DQN 19604 which outputs action 19605. Action 19605 is passed to outbound DTC 19606 which may then be shared with processors of collaborating robots receiving the information through an inbound DTC, such as inbound DTC 19607, to update their grid map accordingly. In some embodiments, the grid map (with 0 and 1 values for uncovered and covered cells, respectively) provided as input into the CNN is in the form of a 2D input array. In some embodiments, the CNN architecture includes a cascade of Convolutions and ReLU functions. For example, the basic architecture that may be used for the CNN includes: a first layer that convolves 32 filters of 8×8 with stride 4 and applies ReLU activation function; a second layer that convolves 64 filters of 4×4 with stride 2 and applies ReLU activation function; and a third layer that convolves 64 filters of 3×3 with stride 1 and applies ReLU activation function. In some embodiments, the DQN architecture includes two fully connected layers which map the input feature map to the output actions, the first layer including a fully-connected layer consisting of 512 rectifier units and the second layer including a fully-connected linear layer with a single output for each valid action (e.g., a total of 5 outputs). In some embodiments, the reward function is proportional to the whole area that has been covered by the robots. In some instances, the goal of collaboration is to cover an area in the shortest time. For the example of collaborative vacuum robots above, the two factors in the reward function may be the whole area that has been covered by the robot and total time. To consider both factors in the reward function the processor of a robot vacuum may assign a reward of +1 when the robot finishes operation in a cell and −1 when it operates in a cell that has already been cleaned. In some embodiments, the processor incorporated the reward function in a reinforcement learning setting to learn a covering policy, based on the DQN algorithm. In some embodiments, the reward function used by the DQN may be based on various factors depending on the desired goals of the collaborative robots. In some embodiments, different CNN and/or DQN configurations may be used. In some embodiments, modifications in the model may be made to fit Temporal Difference learning and Q-Learning, depending on the real-world applications of the collaborative robots.

In some embodiments, the neural network comprised of a CNN and DQN may be trained by the processor of a robot using Q-Learning to learn a policy that maximizes future expected reward as described above. For robotic cleaning devices, for example, input into the network may be a feature map in the form of a two-dimensional array and the output Q-values for each possible action. The network may then decide the best action to execute based on the Q-value for each possible action. In some embodiments, the network may be trained millions of times (or another number of times) via Q-Learning to maximize the future expected reward. In some embodiments, Q-values may be any real values that may be optimized by the processor with simple squared error loss $L(w)=[r+\gamma \max_u Q(s',u'; w')-Q(s,u; w)]^2$ using backpropagation. In some embodiments, given a transition (s,u,r,s'), backpropagation includes in a first step providing a feed forward pass for the current state s to get predicted Q-value Q(s,a; w) for all actions, in a second step providing a feed forward pass for the next state s' to calculate the maximum overall network output max Q*(s',a'; w'), in a third step setting the Q-value target for the corresponding action to r+γ max Q*(s',a'; w') and setting, for all other actions, the Q-value target to the predicted Q-value Q(s,a; w) thereby making the loss zero for those outputs, and in a fourth step updating the weights of the network using back propagation.

In some embodiments experience replay may be employed by the processor of the robot wherein all experiences (s,a,r,s') may be stored in a replay memory and random mini-batches from the replay memory may be used by the processor instead of the most recent transition when training the network. This provides stability as RL may be unstable when a nonlinear function, such as a neural network, is used to approximate the value function. FIG. 197 illustrates a schematic of an embodiment of a method used by a processor for training a single cleaning robot. Grid map 300 is provided as input to the network. Current state 19701 is provided to DQN 19702 and predicted Q-value 19703 is determined for a selected action. Next state 19704 is provided to DQN 197305 to determine the maximum overall network output max Q*(s',a'; w') and set Q-value target 19706 for the corresponding action to r+γ max Q*(s',a'; w'). Based on loss 19707 between target Q-value 19706 and predicted Q-value 19703 gradient descent 19708 is used by the processor to minimize the loss and hence optimize the actions of the robot over time. FIG. 198 illustrates a flowchart describing testing of a trained network of a single cleaning robot, wherein the grid map is provided as input into the trained DQN and an action selection is provided as output from the DQN. A random action generator simultaneously outputs a random action. Both the action selected by the DQN and the random action from the random action generator are provided as input into a greedy algorithm that chooses either the action output from the DQN or the random action. This allows for a balance between exploration and exploitation.

In some embodiments, decentralized learning may be used wherein the processor of each robot learns its own Q-network parameters, treating the other robots as part of the environment, thereby using the environment as the sole source of interaction between robots. In this case, message passing is done using DTC links to share information. Another variant trains a single network whose parameters are shared among all robots. However, execution remains decentralized, at which point processors of robots receive different observations leading to different behavior. In some embodiments, a network of a single robot may be trained by the processor of the robot and its parameters shared with processors of collaborating robots via a DTC link. For example, processors of two floor cleaning robots may share grid map information via a DTC link. Followed by each action, the processor of each robot may update the grid map and share the updated grip map with the processor of the collaborating robot via DTC link. At the same time only the processor of one robot is training its DQN and sharing the DQN weights with the processor of the second robot while processors of both robots are testing their DQNs. In some embodiments, decentralized learning for covering areas (e.g., operating in areas) within a map has two benefits: first, only one DQN needs to be trained for coverage areas within the map which makes the training faster and less complicated, and second, the number of collaborative robots is not required wherein at execution time any number of robots may be collaborated for coverage of areas within the map. FIG. 199 illustrates an example of decentralized learning of a single DQN of a vacuum robot, wherein the network of Vacuum Robot 1 is being trained and its DQN weights are shared with the processor of collaborating Vacuum Robot 2. Processors of Vacuum Robots 1 and 2 update their grid map after each action and share grid map information with each other. In such an approach execution is decentralized, processors of collaborating robots receive different observations leading to different behaviors. For example, FIG. 200 illustrates another example of decentralized learning of a DQN wherein processors of two collaborating vacuum robots, 20000 and 20001, each learn their own network parameters. The processor of vacuum robot 20000 may share its action selection 20002 with the processor, and hence DQN 20003, of vacuum robot 20001 as indicated by arrow 20004. The processor of vacuum robot 20001 may receive the action of vacuum robot 20000 as input into its DQN 20003 and consider it in deciding action 20004. In this approach, the processor of each robot learns its own Q-network parameters, treating the other robots as part of the environment. In this case, message passing is done using DTC links to share information. Followed by each action, the processor of each robot updates its grid map and the shares the information to the processors of cooperative robots using a DTC link. In this approach, the execution remains decentralized, at which point the processors of robots receive different observations leading to different behaviors.

In some embodiments, centralized learning may be used by processors wherein information may be passed between robots. As a result, gradients may be pushed through DTC links, yielding a system that is end-to-end trainable, even across robots. For example, suppose that for each robot a, one Q-network $Q(s^a,u^a; w^a)$ is instantiated. In the setting of multi-robot RL, a Q-function that facilitates inter-robot communication by $Q(s^a,u^a im^a om^a; w^a)$ may be used by processors wherein $im^a$ and $om^a$ denote inbound messages and outbound messages for robot a, respectively, through a DTC link. In each time-step, the processors of robots select an environment action u∈U that affects the environment, and a communication action m∈M that is observed by other robots but has no direct impact on the environment or reward. FIG. 201 illustrates an example of centralized learning for multiple collaborative robots. In this approach, processors of robots may pass messages between one another during learning. As such, gradients may be pushed through DTC links, yielding a system that is end-to-end trainable across robots. In some embodiments, real-valued messages are discretized by the processors during execution and mapped to the discrete set of communication actions allowed by the task. FIG. 201 illustrates an example of centralized learning between two collaborating vacuum robots 20100 and 20101. DQN 20102 of vacuum robot 20100 may pass messages to DQN 20103 of vacuum robot 20101, via their processors, during learning through a DTC link as indicated by arrow 20104. The gradient may also be passed from DQN 20103 of vacuum robot 20101 to DQN 20102 of vacuum robot 20100 as indicated by arrow 20105, allowing for a system that is trainable across robots.

In one example, a hierarchical approach employing decentralized training may be used by processors of floor cleaning robots to collaboratively clean all areas of a map. In this approach, a model may be trained (e.g., by an external processor or a processor of one or more robots) for cleaning a map with size of 10×10. At execution time, the trained model may be used by processors of robots for cleaning a map with size of 100×100. In other embodiments, the model may be used for cleaning a map with any size. In some embodiments, the hierarchical approach employing decentralized training includes: 1) training a DQN on a 10×10 map, which may be efficient in terms of time and complexity, 2) applying the trained DQN to a larger map size such as 100×100, without training for a large map size, and 3) training for a single vacuum robot, while testing may be done for multiple collaborative vacuum robots. In some embodiments, the hierarchical method is composed of two layers. In the first layer, a map with size of 10×10 is defined (referred to as VMap for Virtual Map) and virtual vacuum robots are defined. In the second layer, the real map with size of 100×100 (called LMap for Large Map) and actual vacuum robots are defined. The actual robots move in the LMap based on 1) the movement of the robots of the first layer and 2) their own DQN network. The LMap may be considered as 100 maps with size of 10×10 (called SMap for Small Map). Each SMap in the LMap may be equivalent to one cell in the VMap of the first layer. The VMap (with size 10×10) may be considered as a low-resolution version of the LMap (with size 100×100). Each cell in the VMap may be equivalent to a 10×10 block (SMap) in the LMap. In some embodiments, the DQN for cleaning of the VMap is initially executed for virtual vacuum robots. In some embodiments, the trained DQN of a single robot on 10×10 map is used. The output of executing the DQN for cleaning of the VMap in the first layer are the paths of cleaning of the cells by all virtual vacuum robots. In some embodiments, these paths indicate how the actual vacuum robots should move in the LMap of the second layer and which SMap should be cleaned by each robot. For example, if a virtual robot 1 cleans locations (2,3), (3,3), (3,4), etc. in the VMap, the actual robot 1 should clean SMaps at locations (2,3), (3,3), (3,4), etc. in the LMap, respectively. In the second layer, for each SMap, the DQN for each actual vacuum robot is executed to clean the Lmap. In fact, at the second layer, each SMap is cleaned by only one of the actual robots, while the whole LMap is cleaned by all the actual robots. Therefore, the first layer indicates which blocks of the second layer should be cleaned by each robot.

In some embodiments, decentralized learning with a single DQN may be used in the training and testing (execution) phases, as described above. In some embodiments, the single DQN may be trained using a map with size of 10×10, and then in the testing phase, the trained network may be used for cleaning a map with size of 100×100 by collaborative vacuum robots. In other embodiments, other sizes of maps may be used. In the training phase, a single DQN may be used for cleaning of a map with size of 10×10 using a single vacuum robot. In some embodiments, 'VacuumRobot' and 'Environment' classes may be used to define a vacuum robot and a map with size of 10×10, respectively. Followed by the training, the training weights that may be used for vacuum robots for cleaning a new map are obtained. In the testing phase, the trained DQN may be used for cleaning of a new map using multiple vacuum robots. In this approach, the single trained DQN may be used and its parameters shared among all vacuum robots. In some embodiments, a list of objects may be defined from the 'VacuumRobot' class to represent the collaborative vacuum robots and the 'Environment' class may be used to define a map with size of 100×100.

In one example, a single vacuum robot and one-dimensional environment are initially used. In this case, there are two types of movement for the robot: left or right. A class for the robot and a class for the environment are defined. The environment is defined as a one-dimensional vector with three values, including 0 (uncleaned cell), 1 (cleaned cell) and 2 (robot location). The DQN is defined with two layers fully connected network (512 rectifier units and 2 nodes). A target network (estimator) and predictor network are implemented in the DQN and memory function to remember the previous states, actions, and replay. The environment is expanded from one dimension to two dimensions by extending the DQN from two movements to four movements (left, right, up, down) by adding CNN layers to the DQN. The convolutional layers include convolutional filters and activation functions. The convolutional filters extract features from the input map. The activation functions perform nonlinear mapping. The configuration of the deep network (CNN and DQN) is extended by changing the number of filters and layers. A network with five layers (three convolutional layers and two fully connected layers) is used. The convolutional layers include 3 layers with 32 (size of 8×8), 64 (size of 4×4) and 128 (size of 3×3) filters, for the first layer to the third layer, respectively. The fully connected layers include two layers with 512 rectifier units and 4 nodes. Modules for saving and loading of the model of DQN are implemented. A module for graphical visualization of vacuum robots in the environment is used. FIG. 202 illustrates the results of training the DQN described in the example above for a 3×3 map and a single robot vacuum. However, the DQN uses three layers instead of five and the input filter size is reduced from 8×8 to 3×3. FIG. 202 illustrates the total movements of the robot for cleaning the map (vertical axis) versus different number of episodes (horizontal axis). At the beginning of the training, a large number of movements were needed (on average 300 movements) while after around 6000 episodes of training, on average, 15 movements were needed for cleaning of the map with size 3×3. Therefore, using 6000 episodes, the DQN may be trained.

In another example, a modified Keras-rl library is integrated into the DQN. In the 'Environment' class a map size of 84×84 is used. A reward function having +1 when the robot cleans an uncleaned cell and −1 when the robot cleans a cleaned cell is implemented. In the Keras-rl library, a main module which has a fit function for training and also network model definition is used and the input channel of the DQN is changed from 3 channels to 1 channel to be the same as the map. The fit function is used for training of the network. Since the map is large, training may be slow, therefore training is treated as complete when 100 cells are cleaned. It means that the robot cleans a part of the whole map (100 cells instead of the 7056 cells) at each episode. The DQN includes 5 layers (three convolutional layers and two fully connected layers). The size of convolutional filters is 8×8, 4×4 and 3×3 with 32, 64, and 64 filters, respectively. The size of fully connected layers are 512 rectifier units and 4 nodes, for four movements. The size of input to the network is 84×84 (the map). The Keras-rl based network is trained for one robot to clean a part of a map (100 cells of 84×84 size map). The DQN was trained for 2000 episodes. FIG. 203 illustrates the graph of episode reward (vertical axis) for consecutive episodes (horizontal axis) while training the Kers-rl based DQN described in the example. FIG. 203 shows that the DQN network of the vacuum robot learned to clean the map efficiently. At the beginning of the training, the episode reward was negative (on average −100). This means that 300 movements were needed to clean 100 cells in one episode. By increasing the training steps, the reward became positive and at the end of training the episode reward became +50 on average. This means that 150 movements were needed to clean 100 cells in one episode. The reason is that the reward was +1 when the robot cleaned uncleaned cells and −1 when it cleaned previously cleaned cells. So, at the beginning of the training, the robots cleaned previously cleaned cells multiple times and got −1 reward, so the total reward for an episode was negative. However, after several episodes training, the robot learned to clean uncleaned cells and got +1 reward. In this example, for an episode, the maximum reward that a robot could achieve was 100 (100 cells), while the minimum reward could be any value less than 100.

In another example, the DQN is trained for a map with size of 10×10. In this example, the same DQN as described above is used except the size of convolutional filters are reduced to 4×4, 3×3, and 3×3 with 32, 64, and 64 filters, respectively. Also, instead of 4,2,1 pooling used in the above example, 1,1,1 pooling is used and the size of input to this network is 10×10 (the map). Instead of cleaning all of the cells of the 10×10 map, the length of an episode is reduced to clean 25% (25 cells out of 100 cells) of the whole 10×10 map. FIG. 204 illustrates a graph of episode reward (vertical axis) for consecutive episodes (horizontal axis) while training the DQN for 1,000,000 steps. The results show that the episode reward improved and the DQN converges. At the beginning of the training, the episode reward was around −30 while by increasing the number of steps, the episode rewards became around 10.

In another example, two scenarios for cleaning of a map with size of 10×10 are considered. In the first scenario, instead of cleaning all cells of the map with size of 10×10, the length of episode is reduced to clean 80% (80 cells out of 100 cells) of the map. The reduction is because the training of the vacuum robot to clean the whole map may be time consuming. In the first scenario, it was expected that at the beginning of the training, the robot would move a lot (cleans cells multiple times) and get a low reward. While, by increasing the number of episodes of training, the robot would move more efficiently and get a higher reward. The DQN of a single robot was trained with 10,000,000 steps, including 70500 episodes. FIG. 205 illustrates a graph of episode reward (vertical axis) for consecutive episodes (horizontal axis) when training the DQN for the 10,000,000 steps. At the beginning of the training, episodes include more steps compared to the end of training. The results show that the robot learned to clean the map. For instance, at episode 7 (at the beginning of training) the robot moved 455 times to clean 80 cells and got a reward of −294. In the middle of the training the total movements of the robot for cleaning of the 80 cells were decreased and so the reward was increased. In the last episode, the robot learned to clean the map efficiently and used 82 movements to clean 80 cells and got a reward of 79. The maximum reward that the robot could get was 80. In the second scenario, a fixed number of steps (for example, 100 steps) is set for each episode. It means that at each episode, the robot could only move 100 times to clean the cells. In this scenario, it was expected that at the beginning of the training, the robot would clean cells multiple times and get a low reward. While, by increasing the episodes, the robot would learn to clean more cells and get a higher reward. Also, since each episode is limited to 100 steps, the training time should be decreased. The DQN was trained for a single robot with 10,000,000 steps including 10,000 episodes (each episode includes 100 steps). The results show that the robot learned to efficiently clean the map. For instance, at episode 10 (at the beginning of training) the robot cleaned 27 cells with 100 movements and obtained a reward of −46. In the middle of the training the total cleaned cells were increased, as was the reward. In the last episode, the robot cleaned 91 cells with 100 movements and obtained a reward of 82.

In the previous example, DQN of a single vacuum robot wass trained for cleaning of a map with size of 10×10 based on two scenarios: 1) vacuum robot cleans 80% of the map and 2) a fixed number of steps (for example, 100 steps) used in each episode. Based on these scenarios, there were two trained DQN models. In another example, the Keras-rl library is extended to use these DQN models for multiple vacuum robots. In this architecture, multiple robots simultaneously clean cells of the map. Therefore, at each step, the state is affected by multiple DQNs and multiple cells are cleaned. Each robot chooses their next action based on the cleaned cells by all the robots at the previous step. For this example, the two models are tested for multiple vacuum robots (1, 2, 3, and 4) cleaning a map with size of 10×10 to 90%. The results show that by increasing the number of vacuum robots, the total number of movements are increased because there is an overlap in the cleaning of the cells by different robots. However, by increasing the number of robots, cleaning time of the map is decreased. For example, by using two robots, time is decreased to half. To calculate the reward, the reward was divided by the time of cleaning. For example, for 2, 3 and 4 robots, the reward was divided by ½, ⅓ and ¼, respectively. The results showed that by increasing the number of robots the total reward was increased and the robots collaborated effectively to clean the map.

In some embodiments, obstacles are added to the map by defining a new variable 'obstacle' in the 'Environment' class. The 'obstacle' may be defined as a 100×100 matrix (the same size as 'the environment). The values of each entry in matrix defining the 'obstacle' may be '0' (no obstacle) or '1' (obstacle). In some embodiments, the robots clean the cells of the map based on the values of the cells and entries in the matrix defining the obstacle. If a cell is occupied by an obstacle, the robot may not move into that location. In some embodiments, the DQN makes decision about the next movement of the robot based on the current state of the robot. In some embodiments, a post-processing check is implemented to make sure the next location of a robot is not an obstacle. If the next location is an obstacle, the robot does not move to that location.

To clean a whole 100×100 map, each robot cleans a SMap with size of 10×10 and then moves to the next SMap. In transition from one SMap to another SMap, there is a jump from the ending point in the current SMap to the starting point of the next SMap, because in each SMap, the initial and final locations of the robot are random. In some embodiments, the initial location is selected by a random function and final location is indicated based on the decision of DQN. Therefore, in some embodiments, movement of the robot between the SMaps may not be continuous. When, a robot finishes cleaning of the current SMap, the initial location of the next SMap is randomly indicated. To avoid jumps, a path finder method may be implemented to find the shortest path from the last location in the current SMap to the initial location in the next SMap. The robot moves through the path to the next block and starts cleaning of the block. The path finder method may be based on Dijkstra method to find the shortest path by considering the obstacles.

In some embodiments, semi-autonomous or autonomous vehicles may collaborate to travel more efficiently and safely by sharing intelligence through DTC links. For example, U.S. patent application Ser. No. 14/948,620, hereby incorporated by reference, describes a method for a guiding vehicle to collaborate with semi-autonomous or autonomous follower vehicles by sharing real-time intelligence on destination, route, navigation, obstacles, traffic, etc. using transmitters and receivers of vehicles. Vehicles with at least a portion of the same route of the guiding vehicle may join the driving group wherein the processor of follower vehicles use shared intelligence as well as information gathered by their sensors to control navigation and maneuver the vehicle. In embodiments, follower vehicles may relay information to one another using transmitters and receivers after establishing a DTC link. In embodiments, the guiding vehicle may broadcast signals from a transmitter comprising its destination, planned route and unique identifier. Follower-configured vehicles may receive the signal by a receiver and the processor may determine whether to join the driving group. For example, a follower vehicle may join the driving group when the processor detects that they share at least a portion of the same route as the guiding vehicle. In embodiments, follower vehicles may be arranged behind the guiding vehicle in lines and maintain a particular distance between themselves and adjacent vehicles using distance sensors or the like. The guiding vehicle may share information such as, its clock or time, velocity, steering position, rate of acceleration, rate deceleration, or any other useful information using a transmitter. Receipt of driving information from a guiding vehicle by a receiver may cause the processor of a follower vehicle to activate its actuators. For example, a follower vehicle may be actuated by the processor to accelerate if the guiding vehicle accelerates or adjust its steering position given the steering position of the guiding vehicle. In some embodiments, processors of autonomous vehicles and/or fixed sensing devices monitoring the environment may collaborate and share observations of the environment with one another to be able to observe areas beyond their current field of view. This may be useful when the current field of view of an autonomous vehicle is obstructed by, for example, a sloped road or an obstacle. The ability to observe the environment beyond the current field of view of the sensor(s) of an autonomous vehicle may be beneficial in embodiments wherein the speed of the autonomous vehicle may be limited by their current field of view. In some embodiments, autonomous vehicles driving within the same vicinity may collaborate to determine virtual lanes, driving direction of lanes, driving speed, space between adjacent vehicles, arrangement of vehicles, etc. given observations of the environment such as traffic in both driving directions, size of vehicles and road space and capabilities of the autonomous vehicles.

In some embodiments, the relationship between collaborating robots may be assigned a loyalty index by the processors of the robots, the value of which indicates the strength of the relationship. For example, U.S. patent application Ser. No. 15/986,670, the entire contents of which is hereby incorporated by reference, describes a loyalty index that may be assigned to collaborating robots by their respective processors. The loyalty index may be increased or decreased by the processors of the robots depending on the number of times the robots have authenticated one another, the outcomes of their interactions and/or any other factor, such as time. These factors may be variable. For example, if a first robot commands a second robot to vacuum a hallway and the second robot fails to or does a poor job of vacuuming the hallway the processor of the first robot may consider the second robot unreliable and therefore lower its loyalty index. Alternatively, if the second robot succeeds at cleaning the hallway the processor of the first robot may increase its loyalty index. In some embodiments, the value of the loyalty index may determine the type of interaction permitted between the robots. Loyalty index thresholds may be used by processors of robots to determine the type of interactions permitted between robots. For example, a low loyalty index between robots may permit authentication and the exchange of information while a high loyalty index may additionally permit robots to collaborate to complete a task together or permit one robot to command the other. In some embodiments, wherein a robot interacts with multiple other robots, the robot with whom the highest loyalty index is established is considered to have the highest level of trust. For example, if a robot interacts with two other robots having conflicting commands, the robot with whom the higher loyalty index is established is trusted by the processor of the robot. In some embodiments, the loyalty index may act a security measure against intruding robots as interactions between robots are limited until different levels of loyalty index thresholds are achieved.

In some embodiments, a block chain algorithm may be used by processors of collaborating robotic devices to protect against authorization over a network device or endpoint device. In some embodiments, the loyalty-based security system may give more weight and confidence to a stream of devices that have not been swapped for longer periods of times. The loyalty-based security system may establish increased loyalty between a chain of devices such that more traffic is sent over more trusted paths and more sensitive information is not routed via the paths that have new robotic devices in them. In some instances, the decisions follow a machine learned algorithm to identify what happens in each situation. The algorithm may be trained and a deep neural network may be used to follow the same pattern for making the future decisions. If a network device is swapped due to maintenance needs, the trust still reduces as it is initially unknown if this is an attack of legitimate maintenance. However, the trust increases with time and as more communication happens without a report of a security breach. This allows time for reaction to possible man in the middle attacks. In some embodiments, a graph is defined with various nodes and vertices. Each node represents a device in a network. It is assigned a mac address, an IP address and some other network identification parameters. A block chain may initiate a seed encryption on the first machine and pass on the key to the next and this continues all the way to the last node. The structure of the nodes could potentially form a spanning tree. In a converged network of equipment, the life of the block chain is approximately homogenous. If a device is inserted, swapped, or taken out of the network the chain has to be re-calculated and it will be a new one. Because of properties of block chain and the time it takes to decrypt, it will be impossible to recreate a hash within a timely manner. In some embodiments, the loyalty counter has to be proportional to the time it takes for a hash to be brute forced. As long as the increase in the loyalty counter is lower than expected time of brute force with a powerful computer, there is reasonable security. This will act as a barrier against an intruder attempting to achieve control over one or more end point devices. This feature is particularly important for security robots and autonomous driving cars, where unauthorized control over the robot could endanger lives or jeopardize an operation. The value of the loyalty index determines the level of control over the robot, where a very high loyalty index allows complete control over the robot system. The loyalty counter of users may be programmed to decay over time. This may be effective and resistant against manipulation of a time sensitive data accumulation process.

One example of collaborative intelligence includes collaboratively generating the spatial representation of the surroundings. For example, U.S. patent application Ser. No. 16/185,000, the entire contents of which is hereby incorporated by reference, describes a method for collaborative construction of a map using data collected by sensing devices mounted on autonomous or semi-autonomous vehicles operating within the same environment and/or fixed sensing devices monitoring the environment. In some embodiments, processors of two or more VMP robots collaborate to generate a map of the environment. In some embodiments, the VMP robots use distance sensors (e.g., LIDAR, sonar, depth camera, etc.) to measure the distance to objects within the environment within their respective fields of view. A processor of each VMP robot share their respective distance measurement with all or a select group of other VMP robots operating within the same environment with whom a wireless DTC is established. In some embodiments, other or additional sensor data is shared among the processors of the VMP robots (e.g., odometry data). In some embodiments, the processor of each VMP ROBOT adjusts the distance data received from a remote source based on the location of the remote source with respect to the location of the VMP ROBOT receiving the distance data. To form a larger field of view, the processor of each VMP robot stores at least a portion of local and remote (i.e., from other VMP robots) measurements and uses them to create a larger field of view of the map by combining overlapping measurements taken within separate fields of view, using overlapping readings as attachment points. In some embodiments, at least a portion of measurement are stored in temporary memory such that the measurements are only available during an operational session or in more permanent forms of memory such that the measurements are available at the next session or start up. In other embodiments, the processor stores at least a portion of measurements remotely on an external device or the cloud. The method of sharing and combining local and remote readings taken by sensing devices mounted on various VMP robots operating within the same environment is repeated, such that processors may construct an extended map of the environment by combining readings collected locally and remotely by multiple sensing devices positioned at different locations throughout the environment, allowing each VMP robot to see beyond the surroundings it has discovered itself. In some embodiments, the map of the environment is constructed using data collected locally and/or remotely from at least one sensing device. In some embodiments, the at least one sensing device is of the same type or of different types. In some embodiments, the data is collected over a period of time. In some embodiments, the map is collaboratively generated using the mapping methods described above.

In some embodiments, a control system manages the collaboration between two or more VMP robots. Examples of a control system for managing robots are described in U.S. patent application Ser. Nos. 16/130,880 and 16/245,998, the entire contents of which are hereby incorporated by reference. In some embodiments, the control system is wirelessly connected with the two or more VMP robots. In some embodiments, the control system receives at least a portion of the sensor data of internal and external observations collected by sensors of the two or more VMP robots. In some embodiments, the control system determines which tasks to provide to each VMP robot based on at least a portion of the sensor data received. In some embodiments, the control system wirelessly transmits commands to processors of the two or more VMP robots. In some embodiments, the information transmitted by the control system and/or the processors of the one or more VMP robots is collected and transmitted in real-time. In some embodiments, the control system and/or the one or more VMP robots may store the information received in a memory. In some embodiments, information stored in memory of the control system may be used to generate additional information, such as instructions for the one or more VMP robots, make decisions, optimize processes, etc. In some embodiments, information stored in memory of one or more VMP robots may be used to generate additional information, such as instructions, make decisions, optimize processes, etc. In some embodiments, the information transmitted from the control system to the processors of the one or more VMP robots may be instructions and/or commands and/or relevant information that may be used by the processors of the one or more VMP robots to, for example, make decisions and/or optimize individual processes. In some embodiments, the information transmitted from the processors of the one or more VMP robots to the control system may be external observations of the environment, status updates, GPS coordinates, etc. that may be used to, for example, make decisions, modify commands/instructions/information sent to processors of other VMP robots, optimize processes and optimize collaboration among the one or more VMP robots.

In some embodiments, the control system may be, for example, a centralized server, a specialized computing device within a consumer home, an application (mobile or web for example) accessible from a communication device such as a mobile phone, tablet, laptop, etc. and the like. The centralized control system may communicate with VMP robots within an environment using a wireless communication channel such as Wi-Fi (or another RF-based wireless signal) or Bluetooth. In some embodiments, the control system may be used to communication information to one or more VMP robots within an environment, wherein an environment may encompass a consumer home, a commercial establishment, a parking lot, one or more cities, and the like. In some embodiments, the control system may be autonomous, semi-autonomous and/or may be manually operated. In some embodiments, the control system communicates with one or more VMP robots within an environment to organize and improve the efficiency of the execution of one or more tasks by the one or more VMP robots within the environment. The one or more tasks may be, for example, the collection of refuse from consumer homes, distribution of items to commercial establishments, item pickup and delivery, playing music in the room within which the home owner is present, cleaning a home, transportation of items, and the like. In some embodiments, the control system may communicate with various VMP robots within an environment, some of which may be semi-autonomous or autonomous, static or mobile. Examples may include, but are not limited to, home assistants such as a Google Assistant or Amazon Alexa, an electronic speaker, a coffee maker, a television, a washing machine, a wireless router, a mobile robotic vacuum, a robotic mop, a mobile robotic refuse container, a vehicle, etc.

In one example, FIG. 206 illustrates VMP robots 20601 and 20602 transport items such as mobile router 20603 and grocery bag 20604 in an environment. VMP robots 20601 and 20602 are wirelessly connected to a control system 20600. VMP robots 20601 and 20602 may transmit or receive information from control system 20600 using the wireless communication channel. For instance, VMP robots 20601 and 20602 may transmit their status including information such as battery level, GPS coordinates, availability, etc., to control system 20600. Based on the received information, control system 20600 may transmit one or more commands to VMP robots 20601 and 20602. For example, if both VMP robots 20601 and 20602 are available for grocery pickup and delivery, and both have similar battery life but VMP robot 20601 is closer to the grocery store, control system 20600 may command VMP robot 20601 to pick up groceries at the grocery store and deliver them to a particular location. In some embodiments, the control system may transmit various commands to one or more VMP robots. Commands may include, but are not limited to, navigating to a particular location, recharging the battery, travelling at a specific speed, avoiding a particular area, avoiding particular surface types, conducting particular tasks at particular times, avoiding operation at particular times, playing music, carrying an item, navigating to a docking station, stopping a work function, conducting an internal diagnostic check, etc. In some embodiments, the control system may transmit scheduling information to the processor one or more VMP robots that may include dates, times, and locations associated with particular tasks assigned to the one or more VMP robots. For example, a control system may instruct robotic vacuum cleaners to clean a home at specific times of the day that coincide with when the homeowners are away. For example, a control system may order that an upstairs vacuum cleaner operate every other day at 11:00 AM, and that a downstairs vacuum cleaner operate every day at 1:00 PM. In some embodiments, a control system may be able to coordinate and manage the functions of different types of robots. For example, a control system may be responsible for controlling robotic vacuum cleaners in a home, while also controlling the actions of autonomous garbage trucks. For example, a control system may schedule robotic vacuum cleaners to clean a home every day at 1:00 PM, while also coordinating a robot carrying a mobile router to follow a homeowner around a home when the homeowner arrives at home.

In some embodiments, the information transmitted and received between the control system and the one or more VMP robots may include several different types of information, such as scheduling information, mapping information, navigation information, task information, status information, internal or external observations, or any other type of information that may be useful to the control system and/or the one or more VMP robots. In another example, a control system may coordinate multiple VMP robots within a city that are customized to transport passengers and/or objects wherein objects may sit directly on the chassis or pods may attach to the chassis within which passengers and/or objects may ride. Passengers may request transportation from one location to another, businesses may request delivery of particular items to or from a particular location, consumers may request pickup, delivery and/or transportation of items, and the like using, for example, an application of a communication device. The control system may receive a request and based on the information the control system has on the different VMP robots to which it is connected may transmit one or more commands to a particular VMP robot. The control system may have information such as the carrying capacity, GPS coordinates, battery level, status, and availability of the VMP robots to which is has a connection to. The control system may also consider environmental factors such as traffic, construction, and the like as well as other pending requests or tasks in choosing which VMP robot to send the one or more command to.

In one example, a control system may coordinate robotic servers within a restaurant environment. For example, a user may place an online order for pickup at a fast food restaurant using an application of a communication device. The control system may monitor the location of the user in real time using GPS technology and when the user arrives within a predetermined distance or time from the restaurant, the control system may instruct a robotic server to pick up the food order from the kitchen and navigate to the user's vehicle or a predetermined delivery location. The control system may consider the availability and the location within the environment of different robotic servers prior to deciding which robotic server to transmit the instruction to. The control system may consider the size of the user's order and command multiple robotic servers to deliver the user's food order. In some embodiments, a user may place an order for an item(s) from a retail establishment. The control system may monitor the location of the user in real time using GPS technology and when the user arrives within a predetermined distance or time from the retail establishment, the control system may instruct a robot delivery device to obtain the item(s) ordered and navigate to the user's vehicle, or to a predetermined delivery location. The control system may consider the available and location within the environment of different robotic delivery devices prior to deciding which robotic delivery device to transmit the instruction to.

In another example, a control system may coordinate cleaning of a consumer home by one or more robotic vacuums. The control system may transmit information such as, area to clean, date and time to clean, surface type, cleaning tool, to the one or more VMP robots based on information received from the one or more robotic vacuums such as location within the home, cleaning capabilities, battery level, etc. For example, the control system may command the robotic vacuum closest to the kitchen and with mopping capabilities to clean the kitchen. If the robotic vacuum has low battery, the control system may command the next robotic vacuum closest to the kitchen and with mopping capabilities to clean the kitchen while commanding the robotic vacuum with low battery to navigate to a charging station. Other robotic vacuums within the consumer home may be commanded to clean areas closest to their current location.

In an example, a consumer home or commercial establishment may have a control system device that may communicate information to one or more VMP robots within the environment. The control system may be autonomous and use machine learning techniques to learn needs of the environment and/or preferences of those within the environment or a user may manually use the control system to transmit information to VMP robots within the environment by, for example, a mobile application of a communication device. For example, a control system may autonomously command a VMP robot to transport an item, such as a home assistant device, around the environment such that it is within a particular distance from a user, a robotic coffee maker to start a pot of coffee, a music player to play jazz music in the evening, etc. based on observations of actions of the user over time or based on preferences set by the user.

In some embodiments, the control system may transmit instructions to execute particular driving settings to one or more mobile VMP robots such as, traveling speed and navigation route. In some embodiments, the mobile VMP robots may notify the control system if it is malfunctioning, damaged, stalled, stuck, or the like. In instances wherein mobile VMP robots are in the process of executing a task, the control system may command another mobile VMP robot to complete the task. In some embodiments, the control system may alert the police and/or paramedics if a mobile VMP robot is involved in an accident. In some embodiments, the control system may alert a user or an operator if a VMP robot becomes stuck, stalled, damaged or inoperable. In some embodiments, the control system the control system may command a VMP robot to maneuver away from an obstacle if an unanticipated obstacle is encountered.

FIG. 207 illustrates a flowchart describing an embodiment of a control system sending information to a VMP robot using a cloud service. Control system 20700 may transmit information to Wi-Fi router 20701 using a wireless communication channel. Wi-Fi router 20701 may transmit the information to cloud service 20702 using a wireless communication channel. Cloud service 20702 may transmit information to Wi-Fi router 20701 which may then relay the information to VMP robot 20703. The reverse may be executed such that the VMP robot may transmit information to the cloud and the control system retrieve the information from the cloud. In some embodiments, the information may include a unique tag such that the VMP robot may only retrieve information pertaining to itself and the control system may be aware of which VMP robot the information retrieved pertains to. Alternatively, information may be transmitted and received locally. FIG. 208 illustrates a flow chart describing an embodiment of a method for sending information to a VMP robot locally is illustrated. A control system 20800 may transmit information to Wi-Fi router 20801, which may then transmit the information to VMP robot 20802 using Wi-Fi. The reverse may be executed wherein VMP robot 20802 transmits information to Wi-Fi router 20801 which then transmits the information to control system 20800. FIG. 209 illustrates a flowchart depicting an embodiment of a method for sending and receiving information to a VMP robot locally. Control system 20900 may transmit information directly to VMP robot 20901 utilizing, for example, a Bluetooth, RF or Wi-Fi connection. The reverse may be executed wherein VMP robot 20901 transmits information directly to control system 20900.

In some embodiments, a control system responsible for managing item pick up, transport, distribution and/or delivery may transmit a signal to a receiver of the VMP robot to notify the processor of the VMP robot of the day and time of item pick up, transport, distribution and/or delivery of an item. In some embodiments, a signal received by the receiver may indicate immediate transport of a particular item to a specific location. The signal may be a Wi-Fi signal, Bluetooth signal, or other type of wireless signal. In some embodiments, a control system, may transmit information to one or more VMP robots to notify the one or more VMP robots that it is time for an item to be picked up, transported, distributed and/or delivered at which point each mobile VMP robot within the area may execute their respective task. In some embodiments, the control system may transmit information to notify the one or more VMP robots that they may navigate to their respective storage location or to another location after, for example, task completion. In some embodiments, a control system responsible for the work tasks of the one or more VMP robots may monitor the location of the one or more VMP robots or users interacting with the one or more VMP robots in real-time using sensors such as cameras, microphone module, etc. For example, the control system may send an instruction to a VMP robot of a user to execute a particular task after observing the user entering their home. In some embodiments, the control system may provide commands or instructions to the one or more VMP robots based on prior observations collected by sensors within the environments and/or on the VMP robot. For example, based on a prior history of a user most often playing music using their movable music device after work, the control system may command a VMP robot of the user to pick up and transport the moveable music player such that it constantly remains close to the user using wireless Wi-Fi, Bluetooth, or the like upon observing the user entering their home. In some embodiments, the user of the VMP robot may instruct the VMP robot to do the same using a communication device paired with the VMP robot, an interface of the VMP robot, or another method for communicating with the VMP robot. In another example, a control system may send a command using Wi-Fi, Bluetooth, or the like, to one or more VMP robots to transport a refuse waste bin to a collection location upon observing a refuse collection vehicle within a predetermined range of the VMP robot. The control system may also send a command to the one or more VMP robots to return to their storage location after observing that refuse collection has been completed.

In some embodiments, preferences may be set within the control system. For example, in some embodiments, preferences or instructions corresponding to a particular user may be set within the control system. In embodiments, the control system may instruct a VMP robot to execute a particular task when a particular user becomes present within an environment. For example, a user may select that the control system ensure that a user have a mobile robotic wireless router device follow a user around the home when the user enters the home. When the control system detects that the user has entered the home, the control system may send a command to the mobile robotic router to follow the user around the home. In some embodiments, the control system may detect a user using sensors, cameras, or the like, or may be made aware that a user has entered an area of the environment by a signal sent from a communication device paired with the control system, the VMP robot, or other control system. A communication device may comprise a mobile device, tablet, laptop, remote control, etc. In another example, preferred paths of robotic grocery carts may be set within a control system coordinating the delivery of groceries by robotic grocery carts such that areas of high traffic or accidents may be avoided.

In some embodiments, the control system may store all or a portion of the information obtained from all or a portion of the VMP robots to which it is connected to. In some embodiments, the historical information may be used to improve decisions made by the control system and processes and/or execution of tasks coordinated by the control system. For example, a control system coordinating delivery of groceries by multiple robotic grocery carts may learn using machine learning techniques the type of issues that commonly occur over time such that they may be avoided in the future and the process of delivering groceries to customers may be optimized. Issues may include, but are not limited to, collisions, delayed deliveries, incomplete deliveries, and the like. For example, the control system may choose a particular route for a robotic grocery cart delivering groceries to a particular location that avoids areas in which issues were previously noted due to, for example, high traffic areas and/or collision.

In some embodiments, information gathered by components of VMP robot may be transmitted to the control system in real time. In some embodiments, all or a portion of the information gathered by VMP robots may be stored in a centralized memory and may be accessed by the control system and/or VMP robots.

In some embodiments, the control system may obtain multiple maps of the working environment generated during multiple working sessions of multiple VMP robots. The maps may be combined with previously generated maps to keep the map of the working environment up to date or to improve the accuracy of the map of the environment. In some embodiments, a predetermined map of the working environment may be used by the control system and/or VMP robots to which the control system is connected to. In some embodiments, one or more VMP robots may generate one or more maps of the working environment during operation in the working environment and may transmit the map to the control system. In some embodiments, the control system may update the map of the working environment with the observations collected and transmitted by the one or more VMP robots during work sessions. In some embodiments, the control system shares the updated map with the processors of VMP robots. Continuous updates to the map of the working environment may help improve efficiency of decisions, processes and execution of tasks.

In some embodiments, a graphical user interface may be used to transmit information to a control system. Information may include, but is not limited to, request for grocery delivery, request for transportation, request for item pickup and/or delivery, user preferences for a home (e.g., temperature, lighting, etc.), request for information regarding the environment and/or VMP robots, etc. In some embodiments, the graphical user interface may be accessed by an application of a communication device capable of transmitting and receiving information to and from the control system using a method such as that described in FIG. 207, FIG. 208, or FIG. 209. Communication devices may include, but are not limited to, mobile phone, laptop, tablet, desktop computer, and the like. In some embodiments, a user may communicate with a control system in real time. For example, a user requiring transportation may communicate a request for transportation to a particular location to a control system that coordinates transportation of passengers within a city by robotic passenger pods using, for example, a graphical user interface of an application of a communications device. The control system may then transmit one or more instructions to a robotic passenger pod such that the request of the user may be fulfilled. The control system may determine which robotic passenger pod to transmit the instructions to depending on, for example, the location, availability, battery level, etc. of the robotic passenger pods and the start and ending location requested by the user.

In another example, a control system manages an autonomous robotic refuse container system. In some embodiments, the at least two robotic refuse containers are paired with the control system using a pairing method such as that described in U.S. patent application Ser. No. 16/109,617, the entire contents of which is hereby incorporated by reference. In some embodiments, the at least two robotic refuse containers communicate information with the control system, such as, a current volume of refuse, a maximum volume of refuse, a battery level, a current location, etc. and the control system instructs the at least two robotic refuse containers based on the information from the at least two robotic refuse containers communicated with the control system. In some embodiments, the control system receives a request for replacement from a processor of a first robotic refuse container. In some embodiments, the control system transmits instructions to a processor of a second robotic refuse container to navigate to a current location of the first robotic refuse container and instructions to the processor of the first robotic refuse container to navigate to a particular location. In some embodiments, the processor of the first robotic refuse container transmits the request for replacement because its refuse container is close to or is full, its battery level is low, or it is malfunctioning. In some embodiments, the control system determines the second robotic refuse container to replace the first robotic refuse container based on location of robotic refuse containers (e.g., to determine nearest robotic refuse container), fill volume of robotic refuse containers, battery charge of robotic refuse containers, etc. In some embodiments, the control system transmits information including the location of the first robotic refuse container and the route to navigate to the location of the first robotic refuse container to the processor of the second robotic refuse container. In some embodiments, the control system transmits information including the closest location to recharge a battery, the closest refuse collection location, and a navigational route to the processor of the first robotic refuse container.

In some embodiments, additional factors are used in determining the second robotic refuse container to replace the first robotic refuse container, including an activity level surrounding each of the at least two robotic refuse containers, a number of operation hours of each of the at least two robotic refuse containers, a condition of each of the at least two robotic refuse containers, a status of each of the at least two robotic refuse containers, a number of maintenance hours of each of the at least two robotic refuse containers, a time required for replacement of the first robotic refuse container, environmental conditions (e.g., traffic conditions, weather conditions, etc.), historical success in completing actions for each of the at least two robotic refuse containers, actions executed by each of the at least two robotic refuse containers, upcoming actions of each of the at least two robotic refuse containers, sensor data collected by each of the at least two robotic refuse containers, etc.

In some embodiments, a graphical user interface of an application of a communication device is used to communicate with one or more robotic refuse containers or a control system of one or more robotic refuse containers. An example of a communication device includes, a mobile phone, a laptop, a tablet, a desktop computer, a remote control, and the like. In some embodiments, the application of the communication device is paired with one or more robotic refuse containers or a control system of one or more robotic refuse containers. Information communicated between the application of the communication device and the one or more robotic refuse containers or the control system of one or more robotic refuse containers can include, but is not limited to, request for replacement of a particular robotic refuse container, fill level of a particular robotic refuse container, battery level of a particular robotic refuse container, request of a robotic refuse container at a particular location, etc. In some embodiments, a user communicates with the control system in real time using the application of the communication device, and the control system provides instructions to the one or more robotic refuse containers (as described above) based on the information communicated from the application. In some embodiments, the control system determines which robotic refuse container to transmit instructions to depending on, for example, the location, availability, battery level, etc. of the one or more robotic refuse containers and the instruction requested by the user.

In some embodiments, a schedule for replacement for each or a portion of the at least two robotic refuse containers is determined by the processors of each or the portion of the at least two robotic refuse containers or a control system managing the at least two robotic refuse containers. In some embodiments, a schedule of a robotic refuse container includes a day and time for replacement, a particular robotic refuse container that will replace the robotic refuse container, a navigational route to a particular location after replacement, etc. In some embodiments, the schedule of the robotic refuse container includes day and time for replacement and the particular robotic refuse container that will replace the robotic refuse container, the navigational route to a particular location after replacement, etc. are determined in real-time at the time of replacement. In some embodiments, the schedule of each or the portion of robotic refuse containers is determined based on an activity level surrounding each of the at least two robotic refuse containers, a number of operation hours of each of the at least two robotic refuse containers, a condition of each of the at least two robotic refuse containers, a status of each of the at least two robotic refuse containers, a number of maintenance hours of each of the at least two robotic refuse containers, environmental conditions (e.g., traffic conditions, weather conditions, etc.), etc. Examples of methods for setting a schedule are described in U.S. patent application Ser. Nos. 16/051,328 and 15/449,660, the entire contents of which are hereby incorporated by reference.

Figure 210A:
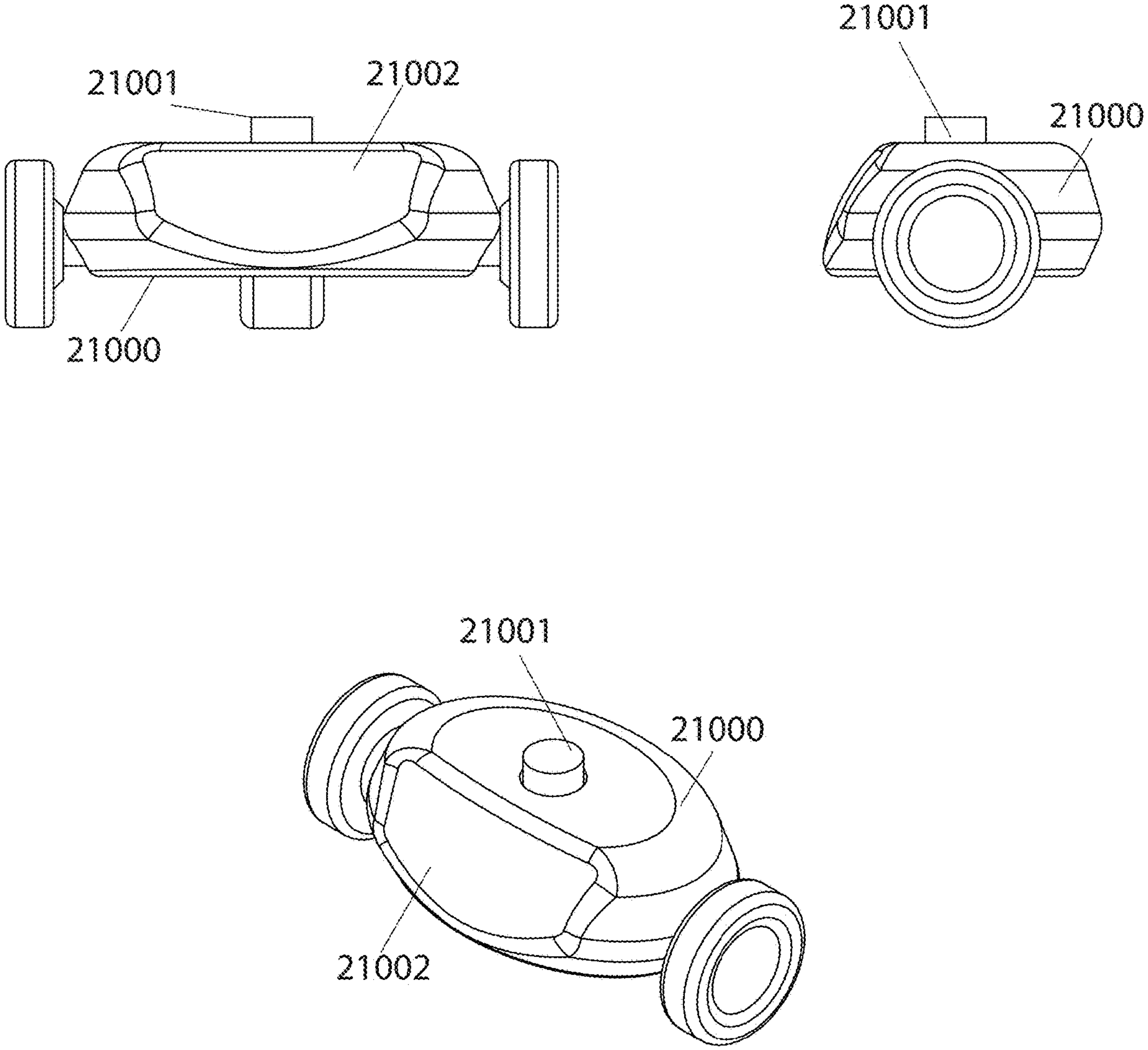
Figure 210B:
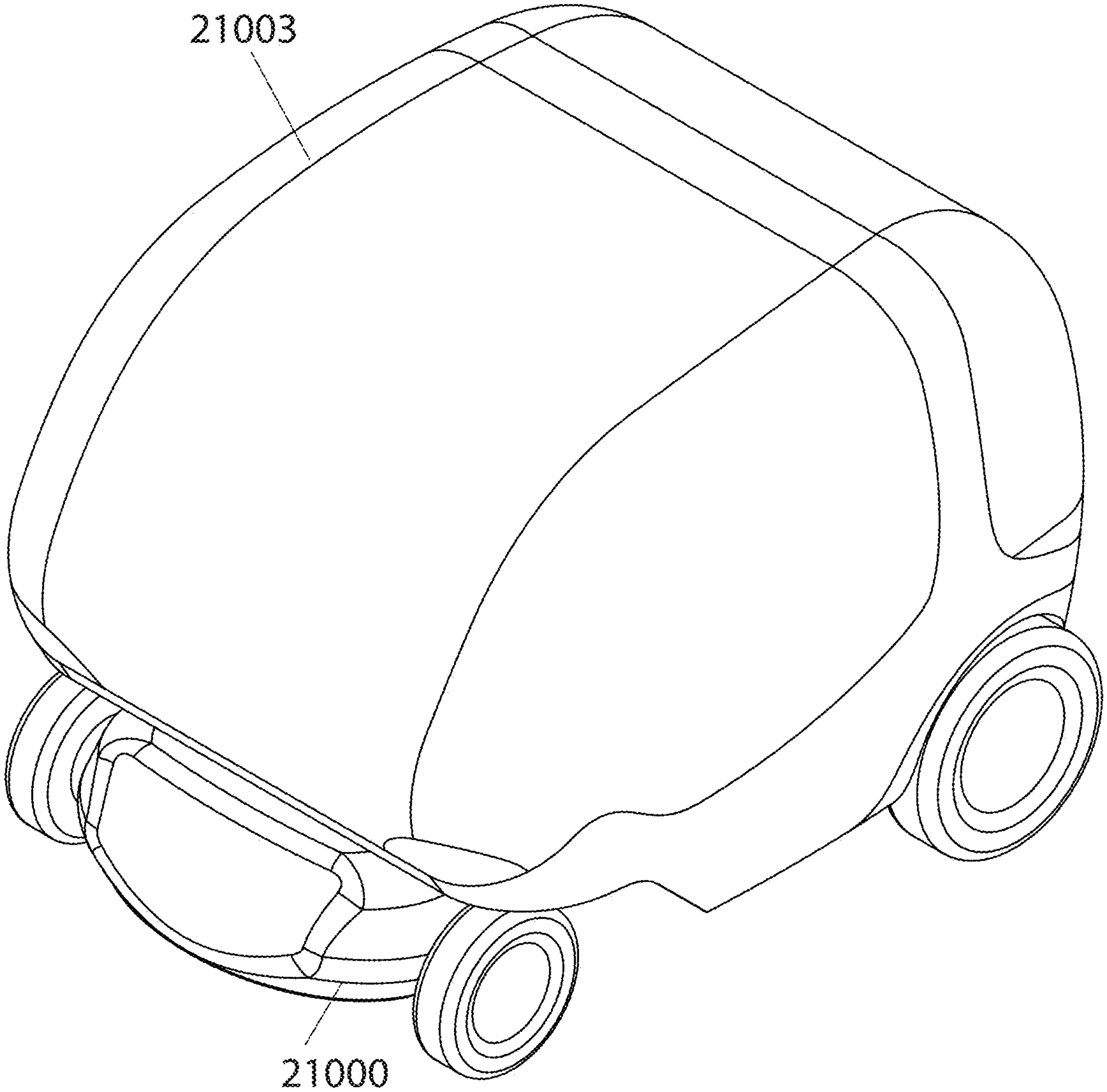
Figure 210C:
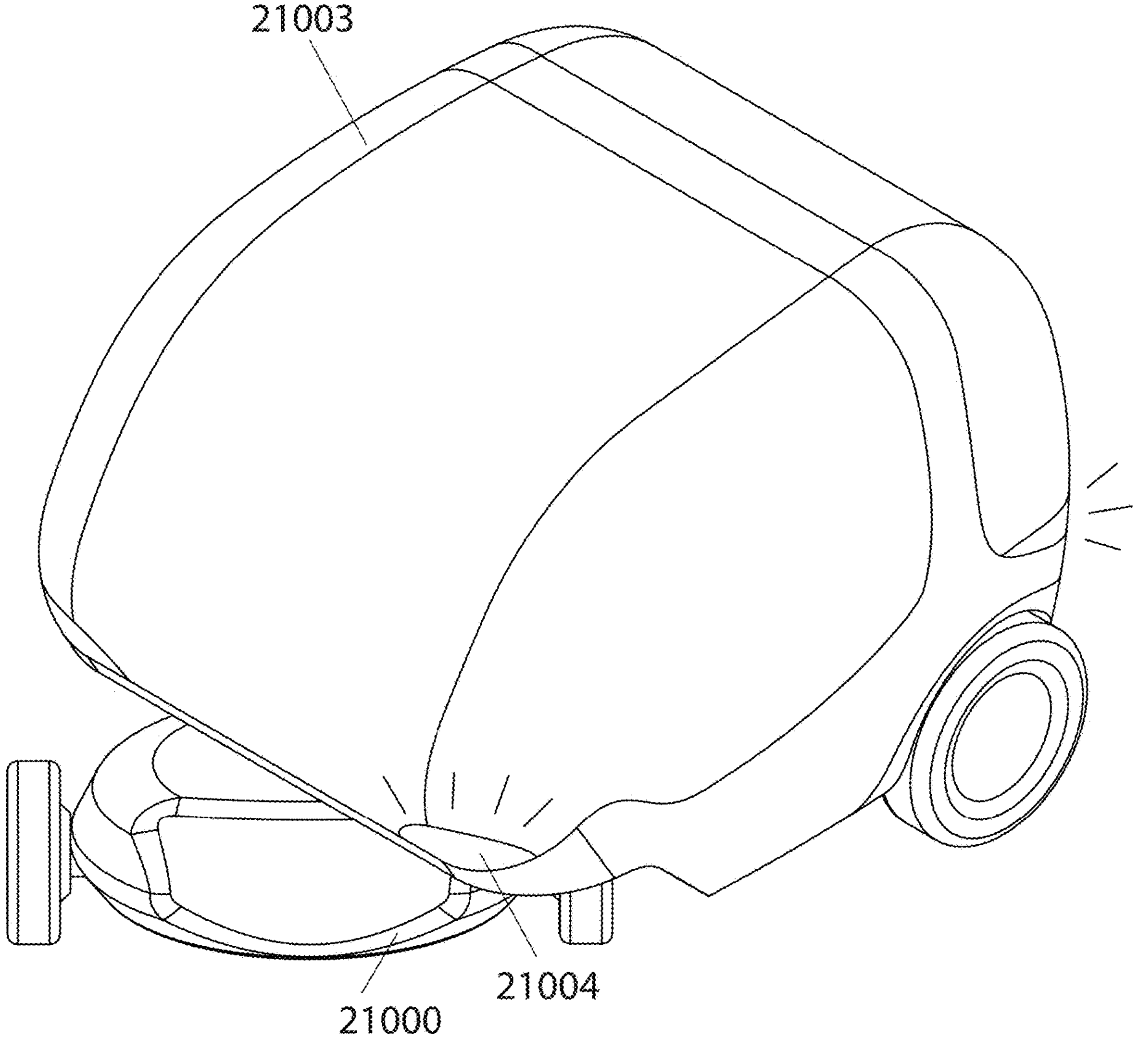
Figure 210D:
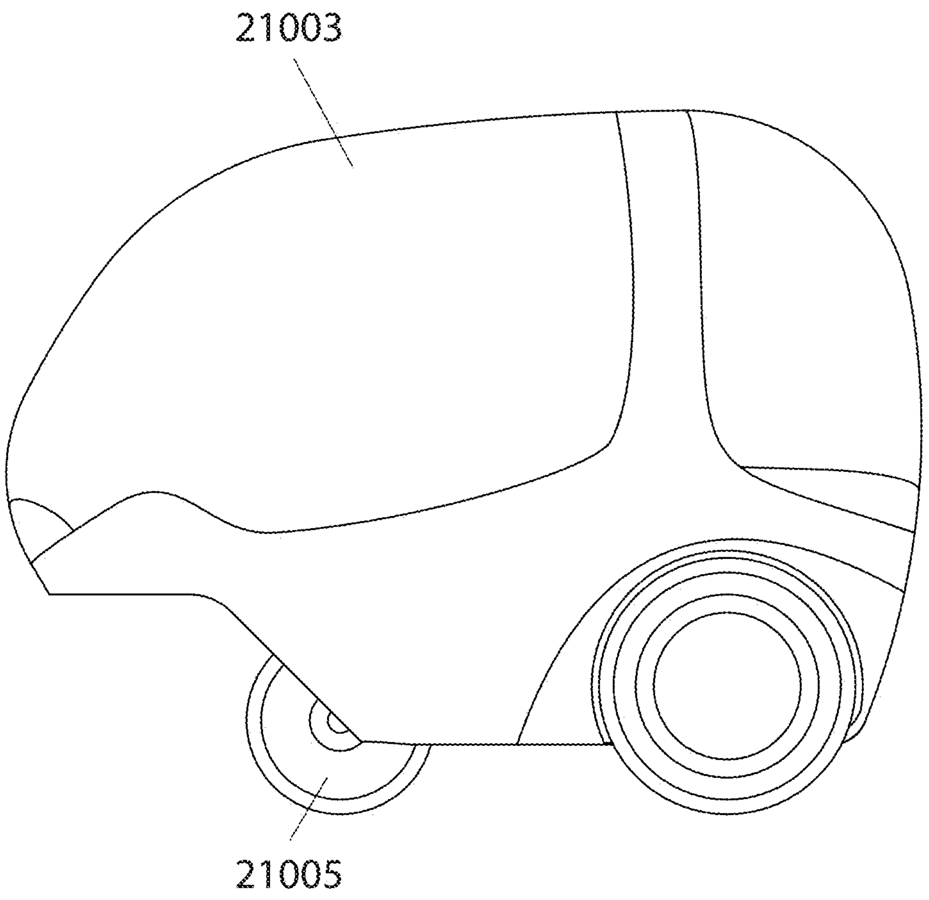

The control system for managing robots described may be used in other applications. For example, the control system may be similarly used to manage the transportation of luggage in an airport, the ploughing of roads, sweeping of roads, and transportation of passengers in a passenger pod. FIGS. 210A-210D illustrate an example of VMP robot customized to transport a passenger pod. FIG. 210A illustrates the VMP robot 21000 customized to interface with a passenger pod using connector 21001. VMP robot 21000 includes sensors for mapping and localization described above behind sensor window 21002. FIG. 210B illustrates a perspective view of VMP robot 21000 with attached passenger pod 21003, the two rotatably connected using connector 21001 (not shown). FIG. 210C illustrates a perspective view of VMP robot 21000 with attached passenger pod 21003, with VMP robot 21000 rotating towards the right and directing connected passenger pod 21003, as signaled by lights 21004. FIG. 210D illustrates the passenger pod 21003 on its own. When VMP robot 21000 is not connected with passenger pod 21003, wheel 21005 extends from within the chassis such that passenger pod 21003 may be manually moved (e.g., within a garage or driveway). In some embodiments, the VMP robot electronically connects with the pod, such that sensors or other electronic components of the pod may be shared with the processor of the VMP robot. Another example of a passenger pod and chassis is provided in U.S. patent application Ser. No. 16/230,805, the entire contents of which is hereby incorporated by reference.

In some embodiments, a pod may be transferred from one VMP robot to another while stationary or while operating. For example, if first VMP robot with a pod is low on battery a second VMP robot aligns itself with the first VMP robot to transfer the pod onto the second VMP robot and complete the transportation. The first VMP robot with low battery navigates to the nearest charging station. In some embodiments, the size or configuration of the VMP robot may be adjusted such that two or more pods may be transported by a single VMP robot. In some embodiments, pods are of various sizes depending on the item or number of persons to be transported within the pods. In some embodiments, VMP robot are of various sizes to accommodate pods of various sizes. In some embodiments, two or more VMP robots link together to form a larger vehicle to, for example, transport more items or passengers or larger items. In some embodiments, VMP robots may temporarily link together during execution of a task for, for example, reduced power consumption (e.g., when a portion of their paths are the same) or faster travel speed. In some embodiments, two or more VMP robots without loaded pods stack on top of one another to minimize space (e.g., when idle or when a portion of their routes match). In some embodiments, the two or more VMP robots navigate to a stacking device capable of stacking VMP robots by, for example, providing a lift or a ramp.

In some embodiments, an application of a communication device is paired with a control system that manages multiple VMP robots. In some embodiments, the application of the communication device is paired with a VMP robot upon loading of a pod or selection of the VMP robot to provide the service. In some embodiments, a pod is paired with a VMP robot upon loading. Examples of communication devices include, but are not limited to, a mobile phone, a tablet, a laptop, a remote control, and a touch screen of a pod. In some embodiments, the application of the communication device transmits a request to the control system for a VMP robot for a particular function (e.g., driving service, food delivery service, item delivery service, plowing service, etc.). For example, the application of the communication device requests a VMP robot for transportation of persons or items (e.g., food, consumer goods, warehouse stock, etc.) in a pod (i.e., a driving service) from a first location to a second location. In another example, the application of the communication requests snow removal in a particular area at a particular time or garbage pickup at a particular location and time or for a vehicle tow from a first location to a second location immediately. In some embodiments, the application of the communication device is used to designate a pickup and drop off location and time, service location and time, service type, etc. In some embodiments, the application of the communication device is used to set a schedule for a particular function. For example, the application of the communication device is used to set a schedule for grocery pickup from a first location and delivery to a second location every Sunday at 3:00 PM by a VMP robot customized to transport items such as groceries. In some embodiments, the application of the communication device provides information relating to the VMP robot performing the function such as battery level, average travel speed, average travel time, expected travel time, navigation route, current location, drop off location, pick up location, etc. In some embodiments, some parameters are modified using the application of the communication device. For example, a navigation route or travel speed or a delivery location of a VMP robot delivering food is modified using the application of the communication device. In some embodiments, the current location, pickup location, drop off location, and navigation route of the VMP robot is viewed in a map using the application of the communication device. In some embodiments, the application also provides an estimated time of arrival to a particular location and cost of the service if applicable. In some embodiments, the application of the communication device includes a graphical user interface such as the GUI described in U.S. patent application Ser. Nos. 15/272,752 and 15/949,708, the entire contents of which are hereby incorporated by reference. In some embodiments, the application of the communication device is a downloaded application, a web application or a downloaded software.

In some embodiments, the application of the communication device is used to request a VMP robot customized for transportation of pods within which persons or items are transported. In some embodiments, the VMP robot is requested to meet at a location of the pod (e.g., a garage, a designated parking area, etc.). In some embodiments, persons navigate the VMP robot from within the pod while in other embodiments, the VMP robot autonomously navigates. In some embodiments, the VMP robot determines a navigation route using methods such as those described in U.S. patent application Ser. Nos. 16/041,286, 15/406,890, and 14/673,633, the entire contents of which are hereby incorporated by reference. In one example, the VMP robot leaves a parking area and navigates to a location of a pod, loads the pod onto the chassis, transports items or passengers within the pod to a requested drop off location, unloads the pod at a nearby pod station or at the pickup location of the pod, then navigates back to the parking area and autonomously parks. In another example, the VMP robot leaves its designated parking area and navigates to a location of a pod, loads the pod onto the chassis from a pod station, transports passengers within the pod to a requested parking area, autonomously parks, navigates back to the pickup location of the pod, unloads the pod into the pod station, and navigates back to its designated parking area (or closest VMP robot parking area) until requested for another task. In some embodiments, VMP robot are permanently equipped with pods for transportation of items or persons. In some embodiments, VMP robot load a pod along their route to a requested pickup location. In some embodiments, VMP robot load the nearest available pod located along a route to the pickup location. In some embodiments, wherein all pods along a route to the pickup location are unavailable or nonexistent, the route is altered such that the VMP robot passes a location of the nearest available pod. In some embodiments, the application of the communication device is used to select one or more pick up or drop off locations and times, travel speed, audio level, air temperature, seat temperature, route, service schedule, service type, etc. In some embodiments, the application of the communication device provides information such as the payload, battery level, wheel pressure, windshield washer fluid level, average travel speed, current speed, average travel time, expected travel time, navigation route, traffic information, obstacle density, etc. In some embodiments, the VMP robot includes a user activated voice command such that operational commands, such as those related to direction, speed, starting and stopping, can be provided verbally.

In some embodiments, a VMP robot completes a service or task when completion of the service or task is confirmed by the application of the communication device whereby the application communicates the completion to a processor of the VMP robot or a control system managing the VMP robot (which then relays the information to the processor of the VMP robot). In some embodiments, a VMP robot completes a service or task when completion of the service or task is confirmed by activating a button or switch positioned on the VMP robot. In some embodiments, a VMP robot completes a service or task when completion of the service or task is confirmed by scanning of a barcode positioned on the VMP robot whereby the scanner communicates the completion to a processor of the VMP robot or a control system managing the VMP robot (which then relays the information to the processor of the VMP robot). In some embodiments, a processor of VMP robot or a control system managing a VMP robot autonomously detects completion of a task or service using sensors, such as imaging devices (e.g., observing position at a particular location such as tow yard), weight sensors (e.g., delivery of persons or items is complete when the weight has decreased by a particular amount), and inertial measurement units (e.g., observing coverage of roads within a particular area for tasks such as snow plowing or sweeping). In some embodiments, a processor of VMP robot or a control system managing a VMP robot autonomously detects completion of a task or service after being located at a final drop off location for a predetermined amount of time.

In some embodiments, a control system manages VMP robot (e.g., execution tasks and parking in parking areas) within an environment by monitoring and providing information and instructions to all or a portion of VMP robot. In some embodiments, the control system receives all or a portion of sensor data collected by sensors of a VMP robot from a processor of the VMP robot and from sensors fixed within the environment. In some embodiments, sensor data includes (or is used by the control system to infer) environmental characteristics such as road conditions, weather conditions, solar conditions, traffic conditions, obstacle density, obstacle types, road type, location of perimeters and obstacles (i.e., a map), and the like. In some embodiments, sensor data includes (or is used by the control system to infer) information relating to the function and operation of a VMP robot such as the weight of any transported item or person, number of items being transported, travel speed, wheel conditions, battery power, solar energy, oil levels, wind shield fluid levels, GPS coordinates, fuel level, distance travelled, vehicle status, etc. In some embodiments, the control system receives information for all or a portion of VMP robot within the environment relating to a current operation being executed, upcoming operations to execute, scheduling information, designated storage or parking location, and hardware, software, and equipment available, etc. from processors of all or a portion of VMP robot.

In some embodiments, the control system evaluates all or a portion of sensor data received and all or a portion of information pertaining to the VMP robot in choosing optimal actions for the VMP robot. For example, a control system managing VMP robot customized to transport passenger pods receives wheel condition information indicating a tire with low pressure from a processor of a mobile robot chassis transporting passengers in a passenger pod. The control system determines that the VMP robot cannot complete the transportation and instructs the VMP robot to stop at a particular location and instructs another available nearby VMP robot to load the pod and pick up the passengers at the particular location and complete the transportation. In another example, a control system instructs a processor of a VMP robot to modify its route based on continuous evaluation of traffic data received from various sensors of VMP robot and fixed sensors within the environment. In another instance, a control system instructs a processor of a VMP robot to modify its route based on continuous evaluation of road condition data received from various sensors of VMP robot and fixed sensors within the environment.

In some embodiments, the control system receives all or a portion of requests for VMP robot services from, for example, an application of a communication device paired with the control system, and instructs particular VMP robot to respond to the request. For example, the application of the communication device requests the control system to provide instructions to a VMP robot to plow a driveway at a particular location on Monday at 1 μm. In another example, the application of the communication device requests the control system to provide immediate instruction to a VMP robot to pick up an item at a provided pick up location and drop off the item at a provided drop off location and to drive at a speed of 60 km/h when executing the task. In some embodiments, the control system instructs the closest VMP robot equipped with the necessary hardware, software and equipment to complete the task or service. In some embodiments, the control system instructs VMP robot to park in a particular parking area after completion of a task. In some embodiments, the application of the communication device is used to monitor one or more VMP robot managed by the control system. In some embodiments, the application of the communication device is used to request the control system to provide instructions to or modify settings of a particular VMP robot.

In some embodiments, the control system has an action queue for each VMP robot that stores a sequence of actions to be executed (e.g., drive to a particular location, load/unload a particular pod, charge battery, etc.). In some embodiments, the control system iterates in a time step manner. In some embodiments, the time step structure, in the particular case of a control system managing VMP robot customized to transport pods, includes: checking, for running tasks, if corresponding pods are at their final destination, and if so, removing the tasks, and finding suitable VMP robot for pods corresponding to new tasks, and adding the required actions to the suitable chassis action queues (e.g. drive to pod, load the pod, drive to final destination, and unload pod); checking the top of the action queue for all VMP robot and if the action is to load/unload a pod, executing the action; handling special cases such as, VMP robot with low battery level, critical battery level, or idle; computing a next action for VMP robot that have a driving action at the top of their queue; and, checking the top of the action queue for all VMP robot and if the action is to load/unload a pod, executing the action. In some embodiments, similar time step structure is used for VMP robot customized for other functions.

In some embodiments, the control system uses a graph G=(V,E) consisting of a set of nodes V and a set of edges E to compute the next action for a VMP robot that has a driving action at the top of their queue. Nodes represent locations within the environment and are connected by edges, the edges representing a possible driving route from one node to another. In some embodiments, the control system uses an undirected graph wherein edges have no orientation (i.e., the edge (x,y) is identical to the edge (y,x)), particularly in cases where all roads in the environment are two-way. In some cases, not all roads are two-way (e.g. one-ways), therefore, in some embodiments, the control system uses a directed graph where directed edges indicate travel in one direction (i.e. edge (x,y) allows travel from node x to y but not vice versa). In some embodiments, the control system assigns each edge a weight corresponding to the length of the edge. In some embodiments, the control system computes the next driving action of a VMP robot navigating from a first location to a second location by determining the shortest path in the directed, weighted graph. In other embodiments, the weight assigned to an edge depends on one or more other variables such as, traffic within close proximity of the edge, obstacle density within close proximity of the edge, road conditions, number of available charged VMP robot within close proximity of the edge, number of VMP robot with whom linking is possible within close proximity of the edge, etc.

In some embodiments, the control system uses the number of VMP robot with whom linking is possible in determining the next driving action of a VMP robot as linking multiple chassis together reduces battery consumption and travel time. Further, reduced battery consumption increases the range of the linked VMP robot, the availability of VMP robot, and the number of pod transfers between VMP robot. Thus, in some situations a slightly longer (time and distance) route is preferable. In some embodiments, the control system estimates battery consumption. For example, the control system may use a discount factor α(n), wherein n represents the number of chassis linked. The discount factor for different numbers of linked VMP robot may be provided as $$\alpha(n) = \begin{cases} 1, & \text{if } n = 1 \\ 0.8, & \text{if } n = 2 \\ 0.6, & \text{if } n = 3 \end{cases}.$$

Therefore, for two VMP robots linked together (n=2), the battery consumption of each chassis is only 80% the normal battery discharge. In some embodiments, the control system solves the optimal route for reducing battery consumption using the strong product of graph G. In other embodiments, the control system checks the vicinity of a VMP robot for other VMP robots navigating in a similar direction. In some embodiments, the control system links two VMP robots if the two are located close to one another and either their destinations are located close to one another, or the destination of one VMP robot lies close to the travel path of the other VMP robots. In some embodiments, the control system selects the next driving action of the VMP robot to be along the edge that results in the minimum of the sum of distances to the destination from all edges of the current node. In some embodiments, the control system instructs the VMP robot to unlink if the next action increases the distance to the destination for either VMP robot.

In some embodiments, the control system computes a distance table including distances between all nodes of the graph and the control system chooses moving a VMP robot to a neighbour node of the current node that minimizes the distance to the destination as the next driving action of the VMP robot. In some embodiments, assuming all edge lengths are equal, the control system determines if a first VMP robot waits for a second VMP robot to form a link if they are within a predetermined distance from one another by: checking, when the distance between the VMP robot is zero, if there is a neighbor node for which the distances to respective destinations of both VMP robot decreases, and if so, linking the two VMP robot; checking, when the distance between the two VMP robot is one edge length, if the final destination of the first VMP robot is roughly in the same direction as the final destination of the second VMP robot by checking if the first VMP robot has a neighbor node towards its final destination which also decreases the distance to the destination of the second chassis, and if so, instructing the first VMP robot to wait for the second VMP robot to arrive at its node, the second VMP robot to travel to the node of the first VMP robot and both VMP robot to link; and, checking, when the distance between the two VMP robot is two edge lengths, if the first VMP robot is located along a path of the second VMP robot, and if so, instructing the first VMP robot to wait for the second VMP robot to arrive at its node and both VMP robot to link.

In some embodiments, the control system specifies the route of a VMP robot by a list of nodes that each VMP robot passes to reach its final destination. In some embodiments, the control system chooses edges between nodes with shortest length as the driving path of the VMP robot. In some embodiments, the control system composes route plans of VMP robot such that they share as many edges as possible and therefore can link for travelling along shared driving paths to save battery and reduce operation time. For example, a first VMP robot drives from node X to node Y via nodes L1 and L2 and a second VMP robot drives from node Z to node U via nodes L1 and L2. In this example, the first and second VMP robot link at node L1, drive linked along the edge linking nodes L1 and L2, then unlink at node L2 and the first VMP robot drives to node Y while the second VMP robot drives to node U. FIG. 211 illustrates paths of three VMP robots initially located at nodes 21100 (X), 21101 (Z), and 21102 (V) with final destination at nodes 21103 (Y), 21104 (U), and 21105 (W), respectively. The VMP robot initially located at nodes 21101 (Z) and 21102 (V) link at node 21106 (L3) and travel linked to node 21107 (L1). At node 21107 (L1), the VMP robot initially located at node 21100 (X) links with them as well. All three linked VMP robots travel together to node 1208 (L2), at which point the three VMP robots become unlinked and travel to their respective final destinations.

In some embodiments, the control system minimizes a cost function to determine a route of a VMP robot. In some embodiments, the cost function accounts for battery consumption and time to reach a final destination. In some embodiments, the control system may determine the cost C(S) of travelling along route S using $C(S)=\Sigma_{(x\rightarrow y)\in S} c(x\rightarrow y)+\beta\Sigma_{i chassis} \alpha t_i$ and $c(x\rightarrow y)=n\alpha(n)d(x,y)\gamma$, wherein $c(x\rightarrow y)$ is the cost of travelling along an edge from a first node x to a second node y, n is the number of chassis linked together, $\alpha(n)$ is the discount factor for battery discharge, d(x,y) is the length of the edge, $\gamma$ is a constant for battery discharge per distance unit, $\beta$ is a weight, $\Delta t_i$ is the time difference between the time to destination for linked chassis and the individual chassis i. In some embodiments, the control system uses individual weights $\beta_i$ with values that, in some instances, are based on travel distance. In some embodiments, the control system uses non-linear terms in the cost function. In some embodiments, the control system minimizes the cost function C(S).

In some embodiments, the control system initially chooses a route and identifies it as a current route. In some embodiments, the control system evolves the current route, and if the evolved route has a smaller cost than the current route, the evolved route becomes the current route and the previous current route is discarded. In some embodiments, the evolution of a route includes: merging driving segments of VMP robot by finding overlaps in driving segments in a current route graph and identifying nodes where VMP robot can link and drive the overlapping segment together and unlink; unlinking segments when, for example, a new VMP robot begins a task nearby and splitting the VMP robot into two groups provides more efficient routing; and, considering neighbouring nodes of start and end nodes of segments as the start and end nodes of the segments to determine if the cost lowers. In some embodiments, the control system iterates through different evolved routes until a route with a cost below a predetermined threshold is found or for a predetermined amount of time. In some embodiments, the control system randomly chooses a route with higher cost to avoid getting stuck in a local minimum.

In some embodiments, the control system identifies if a pair of route segments (e.g., X→U, Y→V) match by computing an estimated cost of combined routing, and subtracting it from the cost of individual routing. The larger the difference, the more likely that the segments overlap. In some embodiments, the control system merges the route segments if the difference in combined routing and individual routing cost is greater than a predetermined threshold. In some embodiments, the estimated cost of combined routing is calculated as the minimum cost of four routing paths (e.g., X→Y→U→V; X→Y→V→U; Y→X→U→V; Y→X→V→U). FIGS. 212A and 212B illustrate an example of the implementation of the described method for matching route segments. FIG. 212A illustrates individual routes 21200 of seven VMP robot 21201 from their current position to seven pods 21202 within environment 21203 with obstacles 21204 while FIG. 212B illustrates the updated routes 21205 to pods 21202 of VMP robot 21201 including segments where VMP robot are linked based on matching route segments identified using the approach described. In some embodiments, the control system identifies matching route segments of VMP robot without pods and evaluates stacking those pods during navigation along matching route segments to minimize occupied space. In some embodiments, the control system uses a cost function to evaluate whether to stack VMP robot. In some embodiments, the control system evaluates stacking idle VMP robot without pods. In some embodiments, VMP robot navigate to a stacking station to be stacked on top of one another. In some embodiments, the stacking station chosen is the stacking station that minimizes the total distance to be driven by all VMP robot to reach the stacking station.

In some embodiments, an individual VMP robot among a group of VMP robots all driving along a same path is designated as a leader vehicle while the remaining VMP robots in the group are designated follower vehicles. In some embodiments, the follower vehicles establish a connection with the leader vehicle and the leader vehicle provides intelligence to the follower vehicles. In some embodiments, the follower vehicles mimic the actions of the leader vehicle while within the driving group to automate driving of vehicles driving along the same path.

In some embodiments, the control system evaluates switching VMP robots by transferring a pod from one VMP robot to another during execution of a route as different VMP robots may have different routing graphs, different nodes and edges (e.g., highways that may only be entered by certain VMP robot), etc. that may result in reducing the overall route cost. In some embodiments, the control system evaluates switching VMP robots during the route evolution step described above. For example, a first set of slower VMP robots operate using routing graph G1=(V1,E1) and a second set of fast highway VMP robots operate using routing graph G2=(V2,E2). In this example, at least the edge weights of G1 and G2 are different, otherwise there is no advantage in choosing a VMP robot from either set of VMP robots. Also, there is a subset $N=V1\cap V2$ of nodes which are in both G1 and G2 and are accessible to both types of VMP robot. These nodes serve as locations where pods can switch from one type of VMP robot to the other. In FIG. 213, a slower VMP robot from the first set of VMP robots transports a pod from a location 21300 (X) to a location 21301 (U). During the route evolution step 21302, the control system identifies a close by faster VMP robot from the second set of VMP robots located at 21303 (Y) and a nearby transfer node 21304 (N1∈N). The control system evolves 21302 the route such that at 21304 (N1), the pod transfers from the slower VMP robot to the faster VMP robot. The faster VMP robot drives the pod from 21304 (N1) to 21305 (N2∈N), then the pod transfers to another slower VMP robot coming from a location 21306 (Z) that transports the pod to its final destination 21301 (U).

In some embodiments, the control system chooses two or more VMP robots to complete a task during the first step of the time step structure described above wherein the control system checks, for running tasks, if corresponding pods are at their final destination, and if so, removes the tasks, and finds suitable VMP robots for pods corresponding to new tasks, and adds the required actions to the suitable chassis action queues (e.g. drive to pod, load the pod, drive to final destination, and unload pod). In some embodiments, the control system uses other methods for choosing two or more chassis to completion of a task such as Multi-Modal Bellmann-Ford or Multi-Modal Dijkstra algorithms.

In some embodiments, the control system chooses the best VMP robot for a task by evaluating a battery level of the VMP robot, a required driving distance of the task, and a distance of the VMP robot to the pickup location. In some embodiments, the control system assigns an idle chassis to a task by: determining a score for each VMP robot in the environment having at least 50% battery power by calculating the distance of the VMP robot to the pod; determining for each of the VMP robot if their battery level is sufficient enough to complete the full task (e.g., driving the distance to the pod, then from the pod to the final destination), and, if so, subtracting three (or another reasonable number) from their score; and, choosing the VMP robot with the lowest score. In this way, a closer VMP robot scores better than a further VMP robot, and a VMP robot with enough charge to complete the task scores higher than a VMP robot with not enough charge. In other embodiments, the control system evaluates other variables in determining the best VMP robot for a task. In some embodiments, the control system chooses the best VMP robot for a task during the first step and/or the route evolution step of the time step structure described above.

In some embodiments, the control system distributes VMP robot throughout the environment based on, for example, demand within different areas of the environment. In some embodiments, wherein an abundance of VMP robot exists, the control system positions a VMP robot close to every pod, has excess VMP robot that are fully charged distributed throughout the environment, and immediately transfers pods from low battery VMP robot to fully charged VMP robot. In some embodiments, the control system may distribute VMP robot throughout the environment using the cost function $C(x,p)=\Sigma_{N_i} p_i \min d(N_i, x_i)$, wherein $N_i$ is a node in the routing graph, $p_i$ is the probability that a task will start from node $N_i$ at the next time frame, and $d(N_i, x_i)$ is the distance of the closest available VMP robot from the node $N_i$, assuming there are n idle VMP robot at positions $x_i$. The control system determines distribution of the VMP robot by minimizing the cost function. For example, FIG. 214 illustrates results of minimizing the cost function to determine optimal distribution of seven idle VMP robot within environment 21400. The color of the graph corresponds to the probability that a task will start from the particular node of the graph at the next time frame indicated by the colors on scale 21401. Darker dots 21402 represent initial position of idle VMP robot and lighter dots 21403 represent their position after minimization of the cost function. After optimization, idle VMP robot are closer to areas with nodes having a higher probability of a task starting.

In some embodiments, the processors of VMP robot collaborate by exchanging intelligence with one other as described above, the information relating to, for example, current and upcoming tasks, completion or progress of tasks (particularly in cases where a task is shared), delegation of duties, preferences of a user, environmental conditions (e.g., road conditions, traffic conditions, weather conditions, obstacle density, etc.), battery power, maps of the environment, and the like. For example, a processor of a VMP robot transmits traffic conditions to processors of nearby VMP robots with whom a connection has been established such that the nearby VMP robots can avoid the high trafficked area. In another example, a processor of a VMP robot unable to complete garbage pickup of an area due to low battery level communicates with a processor of another nearby VMP robots capable of performing garbage pickup, providing the VMP robots with current progress of the task and a map of the area such that it may complete the task. In some embodiments, processors of VMP robots exchange intelligence relating to the environment (e.g., environmental sensor data) or results of historical actions such that individual processors can optimize actions at a faster rate. For example, processors of VMP robots share depth data of objects within an environment to collaboratively build a map of the environment, as is described in U.S. patent application Ser. No. 16/185,000, the entire contents of which is hereby incorporated by reference. In some embodiments, processors of VMP robot collaborate to complete a task. In some embodiments, VMP robots collaborate using methods such as those described in U.S. patent application Ser. Nos. 15/981,643, 15/986,670, and 15/048,827, the entire contents of which are hereby incorporated by reference. In some embodiments, the processors of VMP robot (or a processor of a VMP robot and a control system) authenticate one another and establish a bond prior to collaborating (e.g., sharing data to collaboratively build a map, sharing data to complete a task, sharing data to autonomously park, etc.) using methods such as those described in U.S. patent application Ser. Nos. 15/981,643, 15/986,670, and 15/048,827, the entire contents of which are hereby incorporated by reference.

In some embodiments, VMP robots retreat to a designated parking area until requested for a particular function or task or after completing a particular function or task. For example, a VMP robot requested for pickup of persons (e.g., using an application of a communication device) autonomously traverses an environment from a parking area to a pickup location and transports the persons to a drop off location (e.g., specified using the application of the communication device). After completing the service, the VMP robot traverses the environment from the drop off location to the nearest parking area or to a designated parking area or to another requested pickup location. The VMP robot enters a parking area and autonomously parks in the parking area.

Some embodiments provide a method for autonomous parking of a VMP robot. In some embodiments, the processors of VMP robots each partially observe an environment (e.g., parking area). In some embodiments, the processors of VMP robots collaborate to achieve a common goal of maximizing their performance in parking by, for example, reducing time to exit from a parking area and reducing the amount of driving within the parking area before exiting. In some embodiments, a control system (as opposed to individual processors of VMP robots) such as the ones described and referenced to above manages all or a portion of the autonomous parking of VMP robots in a parking area. In some embodiments, the processors of VMP robots may use a multi-robot partially observable MDP to maximize their performance in autonomously parking. In some embodiments, the processors represent their respective partial observation of the environment by $o^{(i)}=o^{(i)}(S)$ wherein S is the full state of the environment. FIG. 215 illustrates an example of a multi-robot partially observable MDP wherein each VMP robot 21500, 21501, and 21502 with partial observation 21503, 21504, and 21505, respectively, interacts with environment 21506 represented by full state S by performing actions 21507, 21508, and 21509 and receiving rewards 21510, 21511, and 21512, respectively. Environment 21506 transitions from one state S to another given an action, such as actions 21507, 21508, and 21509. In this example, the full state S comprises the combined states s of each VMP robot in the parking area at a given time, and a new state of the environment is determined based on the action of each VMP robot.

In some embodiments, a map of the parking area is stored in the memories of the VMP robots. In some embodiments, the processors of VMP robots collaboratively or independently build and update a map of the parking area (and in some cases areas beyond the parking area) using mapping methods such as those described herein and those incorporated by reference above. In some embodiments, some VMP robots have a map of the parking area stored in memory and some VMP robots build a map of the parking area (and in some cases areas beyond the parking area). In some embodiments, the map of the parking area includes at least a global coordinate system such that positions of VMP robot with respect to the global coordinate system is known, the boundaries (e.g., walls), entry and exit points, and any obstacles present within the parking area. In some embodiments, processors of VMP robot determine the total space available for driving within the parking area using the map. In some embodiments, processors of VMP robot use localization methods such as those described herein and incorporated by reference above, to determine their position within the parking area with respect to a coordinate system. FIG. 216 provides an example of a map of parking area 21600 with coordinate system 21601, boundaries 21602, entry point 21603, exit point 21604, and obstacles 21605. In some embodiments, processors of VMP robots create the map of the parking area using method referred to above. In some embodiments, processors of VMP robots collaboratively create the map of the environment using methods referred to above.

In some embodiments, the processors represent the state of all VMP robots and the full state of the environment using $S=[s^{(1)},s^{(2)}, \ldots, s^{(N)}]$ wherein N is the number of VMP robots and $s^{(i)}$ denotes the state of VMP robot i (e.g., position, velocity, etc.). S identifies the situation in the parking area at any point in time. In some embodiments, the processors of VMP robots measure parking performance $K_{perf}$ using a linear metric wherein variables affecting performance (e.g., distance driven to exit, total time to exit, time to receive notification to exit, time to exit after receiving notification to exit, etc.) are linearly combined and are each weighted based on their importance to parking performance. For example, in some embodiments, processors calculate their parking performance $K_{perf}$ by summating K of each VMP robot and dividing it by the number of VMP robots. In some embodiments, processors determine their parking performance using non-linear metrics wherein the function K(i) includes non-linear terms. For example, processors square time to exit such that time contributes quadratically and penalizes large exit times more severely. FIG. 217 illustrates $K_{perf}$ plotted against linear measure $t_{out}$ 21700 and quadratic measure $t_{out}$ 21701. For $t_{out}<1$, the difference in $K_{perf}$ is minimal, however, for $t_{out}>1$, $K_{perf}$ grows a lot faster for the quadratic measure and, as time increases, the penalty incurred becomes larger and larger whereas the penalty for the linear measure grows as a constant rate. In other embodiments, parking performance may be calculated using the worst metric recorded among all vehicles. For example, $K_{perf}$ may be calculated by summating worst recorded time to exit and distance driven to exit.

In some embodiments, processors of VMP robots assign a reward incrementally over time or at the end of the parking session (e.g., when the VMP robot exits the parking area). In some embodiments, the total reward for all VMP robots may be the sum of all the individual rewards of the VMP robot. For example, processors each assign a reward to their respective VMP robot for each time step using $$r^{(i)}\left(s^{(i)}, a^{(i)}\right) = \omega_1 \Delta_{dist} + \omega_2\left(t_n^{(i)} - t_{exitcall}^{(i)}\right),$$

wherein $t_{exitcall}^{(i)}$ is time of a user requesting the car to exit, and $\Delta_{dist}$ is the distance that the car has driven due to action $a^{(i)}$. The total reward of all autonomous vehicles may be $$R_{sum}(S, A) = \sum_{i=1}^{N} r^{(i)}\left(s^{(i)}, a^{(i)}\right).$$

In some embodiments, processors of VMP robots train themselves on making decisions that maximize the reward using deep reinforcement learning. In some embodiments, processors use a deep Q-network with either a convolutional neural network or standard neural network or networks such as those described above. In some embodiments, processors of VMP robots collaborate to decide on the next actions to execute. In some embodiments, the collaboration process includes processors communicating with one another to gain intelligence, processors computing their current estimated action-value function, processors managing conflicting actions with one another (e.g., by choosing the actions that maximize reward), VMP robots executing actions, processors observing their respective new state and assigning a reward, and processors updating their action-value function.

In some embodiments, managing conflicting actions includes processors selecting a conflict-free action vector, processors creating a sorted list where VMP robots are ordered based on their maximum potential gain in reward, and processors iterating through the list and choosing, for each VMP robot, the action that maximizes its individual reward. In some embodiments, processors manage conflicting actions by negotiating with their respective current estimated action-value function. In embodiments wherein actions result in conflict (e.g., a robotic wants to move to a location occupied by another robotic intending to remain in the location, actions of two VMP robots resulting in a frontal crash, etc.), processors attempt to resolve the conflicts without creating new conflicts. In some embodiments, processors individually attempt to optimize their action-value function until there are no processors with larger potential gain in their respective field of view. In some embodiments, processors choose a sequence of actions resulting in greatest reward by considering action-value function of all or a portion of other VMP robots. In some embodiments, processors determine all allowed action sequences that do not result in conflict for a portion of VMP robots (e.g., four, six, or ten) within their respective field of view. In some embodiments, processors choose the sequence of actions by, for example, maximizing the combined q-values using $$\underset{I\in I}{\operatorname{argmax}}\sum_{(i,a_i)\in I} q_i(s_i, a_i),$$

wherein I∈I is an allowed action sequence of the set I of all allowed action sequences; minimizing the combined q-value difference of each involved VMP robot $$\underset{I\in I}{\operatorname{argmax}}\sum_{(i,a_i),(j,a_j)\in I} q_i(s_i, a_i) - q_j(s_j, a_j);$$

or, maximizing the combined weighted q-value $$\underset{I\in I}{\operatorname{argmax}}\sum_{(i,a_i)\in I} q_i(s_i, a_i)\omega_i$$

wherein $\omega_i$ is the weight of VMP robot i. In some embodiments, processors introduce a level of randomness in choosing actions to execute in order to promote some exploration.

In some embodiments, processors may compute their maximum gain in q-value and list VMP robots in descending order. In some embodiments, processors iterate, starting at the top of the list and for each VMP robot the best action sequence may be determined (e.g., no conflict and greatest gain in q-value). For example, FIG. 218 illustrates a simple grid representing a parking area with dots representing autonomous vehicles. FIGS. 218A-218C illustrate different action sequences assuming that VMP robot 21800 wants to exit. In FIG. 218A VMP robot 21800 does not negotiate with other VMP robots and only has the option of moving away, which decreases the reward by a certain value, for illustrative purposes, 5 (time and driving penalty), resulting in an overall reward of −5 for the action sequence. In FIG. 218B VMP robot 21800 negotiates with other VMP robots and moves towards the exit, increasing its reward by 5. However, for VMP robot 21800 to move, VMP robot 21801 must move, decreasing its reward by 1 (only driving penalty). The overall reward of the action sequence is therefore 4, higher than the previous case. In FIG. 218C, VMP robot 21800 moves towards the exit, increasing its reward by 5. However, for VMP robot 21800 to move, VMP robot 21801 must move, decreasing its reward by 1 (only driving penalty). For VMP robot 21801 to move, VMP robot 21802 must also move, also decreasing its reward by 1. Therefore, the overall reward of the action sequence is 3, lower than the previous case but higher than the first case. The processors negotiate and choose the best valued sequence of actions involving up to four cars. In this particular example, the action sequence illustrated in FIG. 218B is chosen. In some embodiments, processors only consider a portion of possible sequence actions and choose the first sequence action that results in a reward above a predetermined threshold. In some embodiments, the processors only save the action vector executed while discarding other action sequence combinations considered.

In some embodiments, processors represent the parking area using a logical matrix, wherein each entry corresponds with a location within the map of the parking area. A matrix element with a value of '1' indicates obstacles, while an element with a value of '0' indicates an empty space. Each grid cell may be identified as a two-dimensional coordinate. In some embodiments, VMP robots only occupy a single grid cell and have five possible actions: up, down, left, right, and idle. In some embodiments, each time step may include: processors computing their action-values given their respective observation $o_n$ of state $s_n$ to find most optimal action; collaborating to manage conflicts if they occur by choosing the strategy that maximizes the overall reward of all VMP robot; executing chosen actions; and, observing new local observations $o_{n+1}$ of new states $s_{n+1}$ and receiving individual rewards $r_{n+1}$. In some embodiments, processors compute an action-value table where for each possible action the estimated q-value may be determined in order to determine most optimal action. In some embodiments, processors compute the value of a state of a VMP robot by determining the minimum distance to an exit and taking the negative of it. In some embodiments, processors multiply the reward by a predetermined value for VMP robots attempting to exit the parking area in order to give them higher priority (i.e. placed higher in the ordered list, as described above) in the negotiation phase. In some embodiments, processors use more complex functions for calculating the value of a state, such as functions considering additional variables (e.g., time to exit, number of actions to exit, privacy of location, traffic of location, distance to obstacles, proximity to entry/exit points, etc.). For example, processors use a q-function that considers the distance to exit, privacy of a location, and proximity to entry/exit points. For a VMP robot attempting to exit the processor uses the q-function $q_{out}=5(q_{distance}-0.25q_{privacy})$ and for a VMP robot parked the q-function $q_{in}=q_{privacy}-0.1q_{distance}$+entry/exit penalty. For a VMP robot attempting to exit, the distance to exit is more important than the privacy of the location, while the opposite is true for a parked VMP robot. A parked VMP robot may additionally be penalized for proximity to entry/exit points in order to reduce likelihood of parked VMP robots blocking them. The q-value of a VMP robot attempting to exit is multiplied by five to provide priority to VMP robots attempting to exit. In some embodiments, processors compute probability to exit in the next step ($p_i$) (i.e., probability to get instruction to exit the parking area). In some embodiments, processors implement the probability to exit in computing q-values wherein the q-function is computed as a linear combination $q_{comb}^{(i)}$ $p^{(i)}q_{out}+(1-p^{(i)})q_{in}$.

In some embodiments, processors use stochastic gradient ascent to choose the best actions to execute where a combined q-value is computed by linearly combining n different q-tables $q_i$ corresponding with different parameters considered (e.g., distance to exit, privacy of locations, distance to entry, density of surrounding area, etc.) using $$q_{comb}(\vec{\omega}) = \sum_{i=1}^{n}\omega_i q_i.$$

Processors may learn a mapping F from state s to these n parameters maximizing individual reward wherein $\vec{\omega}=F(s)$ such that $$\vec{\omega} = \underset{\omega}{\operatorname{argmax}}\, G(q_{comb}(\omega), s).$$

$G(q_{comb}(\omega), s)$ is the return when in state s and following policy implied by $q_{comb}(\omega)$. In embodiments, processors attempt to find the best fit using $$\hat{\omega} = \underset{\omega}{argmin} \sum_s \|V(s) - q_{comb}(s, \omega)\|^2,$$

wherein V(s) is the state value function, then update ω slightly in direction of $\hat{\omega}$. In some embodiments, processors may use q-learning to choose the best possible action. Processors being with preset q-values for exiting VMP robots $q_{out}$ and parked VMP robots $q_{in}$. With each step, the processors update their respective current action-value function $q(s_n)=(1-\alpha)q(s_n)+\alpha(q(s_{n+1})+r_{n+1})$. In some embodiments, q-tables are updated in real time. In some embodiments, processors account for current experience in the q-function by adding $q_{current}$ to the calculated q-value. In some embodiments, processors decay $q_{current}$ to provide dynamic behaviour. For example, in each time step processors decay $q_{current}$ by $(1-\alpha)$, $\alpha<<0$ or if another VMP robot moves into position s, the particular position is discouraged by subtracting a factor β, β>0 from $q_{current}$.

In some embodiments, processors of VMP robots use higher resolution grids to represent the parking area, where vehicles occupy more than a single grid cell. In some embodiments, processors consider various possible actions, such as move upward, upward-right, right, downward-right, downward, downward-left, left, and upward-left. In other embodiments, other possible actions are used. For example, FIGS. 219A and 219B illustrate allowed actions in two starting directions indicated by black arrows 21900 and 21901. Grey arrows 21902 and 21903 numbered 0-4 are actions directed forwards and grey arrows 21904 and 21905 numbered 5-9 are actions directed backwards while black arrows 21900 and 21901 numbered 10 indicate idling.

In some embodiments, processors use an event driven approach wherein a mapping based on events is used to map a parking space to a reward value. In some embodiments, processors use the events, enter, exit, and optimize. The event enter describes the VMP robot entering the parking area and finding the best valued parking spot, finding an efficient route, and driving there. In some embodiments, processors may use an algorithm, such as Dijkstra's algorithm, to determine the most efficient route. In some embodiments, processors determine the best valued parking spot upon entering the parking area based on the distance from entry to the parking spot, distance to exit from the parking spot, and the amount of driving while instructed to remain parked (e.g., due to collaboration). In some embodiments, processors estimate the amount of driving while instructed to remain parked using, for example, $$d_{parked} = \left(\frac{1}{p} - t_{exit} - t_{spot}\right)e_{parked},$$

given an approximation for the expected amount of driving per time step $e_{parked}$ for each parking spot, where p is the exit probability and $t_{exit}$ and $t_{spot}$ refer to the time required to exit from the parking spot and the time to get to the parking spot, respectively. In some embodiments, processors may use Dijkstra's algorithm to estimate distance and times. The event exit describes a VMP robot getting instruction to exit, finding an efficient exit route, and driving there. In some embodiments, processors used Dijkstra's algorithm to approximate exit time and driving cost. In some embodiments, processors assign edges weights that correspond to the expected driving impact of moving from one space to another (e.g., for an empty space processors use a weight of −1 as only vehicle needs to move one space). If a tile is not empty other VMP robots must move. An estimate of the weight is adjusted by, for example, subtracting $$\left(\max\left(\frac{\text{number of robotic chassis}}{\text{number of obstacles}}\right) - 1\right),$$

wherein the maximum is taken over four 2-by-2 cells surrounding the cell corresponding with the parking spot of the VMP robot. FIG. 220 illustrates an example of four possible 2-by-2 blocks 22000, 22001, 22002, and 22003 of a VMP robot in parking spot 22004. The event optimize describes processors revaluating their current location and choosing to execute an action based on current known information. In some embodiments, processors of VMP robots negotiate to determine best actions to execute. In some embodiments, processors use q-learning to adaptively learn parking spot values.

In some embodiments, the processors may represent the parking area and VMP robots using a graph with nodes connected by edges, the nodes representing parking spots and edges representing a possible path from one parking spot to another. In some embodiments, processors assign nodes additional information (e.g., occupied/unoccupied, entry or exit, etc.). In some embodiments, processors assign edges weights that correspond with the cost of a VMP robot moving along those edges.

In some embodiments, processors represent the parking area and VMP robot using a fully continuous model, such as a classical mechanics particle model. In some embodiments, the parking area may be represented as a unit square [0,1]x[0,1] with walls at x=0,1 and y=0,1 with any position within the parking area is indicated by (x,y) coordinates. In some embodiments, each VMP robot has a position $\vec{x}=(x,y)\in[0,1]x[0,1]$, velocity $\vec{v}=(v_x, v_y)$ and force acting on the VMP robot $\vec{f}=(f_x, f_y)$. In some embodiments, processors may update the position, velocity, and force according to Newton's equations of motion. In some embodiments, processors derive the force from a potential function $\vec{f}=-\nabla\cup(\vec{x})$. The potential function ∪ models an energy surface and the force points in the direction of steepest descent, thus trying to minimize the current energy state. In some embodiments, the processors determine the potential function as the sum over different types of interactions. For example, the potential function for chassis-to-chassis interaction is $$\frac{1}{r},$$

wherein r is the distance between VMP robot. The function pushes the two VMP robot away from one another, the effect becoming stronger the closer the chassis are. The potential function for chassis-to-wall interaction is $$\frac{1}{r},$$

wherein r is the distance between the VMP robot and wall. The function pushes the VMP robot away from the wall, the effect becoming stronger the closer the chassis is to the wall. The potential function for chassis-to-exit interaction is r, wherein r is the distance between the VMP robot and the exit. The function constantly pulls the VMP robot in the direction of the exit. In some embodiments, processors incorporate friction into the computation of using $\vec{f}=-\nabla U(\vec{x})-\gamma\vec{v}$, wherein γ is a friction constant. In some embodiments, processors assign a direction to their respective VMP robot, are limited to accelerating and steering, and are prohibited from moving in a sideways direction in the above described continuous model for determining most optimal actions to execute. In some embodiments, processors use similar variables as described above to measure performance (e.g., time to exit, distance to exit, privacy of location, etc.).

In some embodiments, the autonomous parking method described above is used for non-autonomous vehicles, wherein autonomous VMP robots transport non-autonomous vehicles and use the same approach described above for autonomous parking of non-autonomous vehicles. In some embodiments, autonomous VMP robots transport non-autonomous vehicles using a towing mechanism. In other embodiments, non-autonomous vehicles are positioned on a platform of the autonomous VMP robots such that they may transport the non-autonomous vehicles. In some embodiments, non-autonomous vehicles drive up a ramp to position the vehicle on the platform and in other embodiments, the platform lowers and the vehicles drives onto the platform. In some embodiments, a lift is place beneath the chassis of the non-autonomous vehicle and raises it for transportation. In other embodiments, a wheel lift is used to transport the non-autonomous vehicle. Other methods of transporting a non-autonomous vehicle are possible. In some embodiments, non-autonomous vehicles transported by VMP robots and autonomous VMP robots park within the same parking area.

In some embodiments, the map of the environment may be accessed through an application of a communication device and displayed on a screen of the communication device, e.g., on a touchscreen. In some embodiments, the processor of the VMP robot sends the map of the workspace to the application at various stages of completion of the map or after completion. In some embodiments, a client application on the communication device displays the map on the screen and receives a variety of inputs indication commands, using a user interface of the application (e.g., a native application) displayed on the screen of the communication device. Examples of graphical user interfaces are described in U.S. patent application Ser. Nos. 15/272,752 and 15/949,708, the entire contents of each of which are hereby incorporated by reference. Some embodiments present the map to the user in special-purpose software, a web application, or the like, in some cases in a corresponding user interface capable of receive commands to make adjustments to the map or adjust settings of the VMP robot and any of its structures or components. In some embodiments, after selecting all or a portion of the perimeter line, the user is provided by embodiments with various options, such as deleting, trimming, rotating, elongating, shortening, redrawing, moving (in four or more directions), flipping, or curving, the selected perimeter line. In some embodiments, the user interface includes inputs by which the user adjusts or corrects the map perimeters displayed on the screen or applies one or more of the various options to the perimeter line using their finger or by providing verbal instructions, or in some embodiments, an input device, such as a cursor, pointer, stylus, mouse, button or buttons, or other input methods may serve as a user-interface element by which input is received. In some embodiments, the user interface presents drawing tools available through the application of the communication device. In some embodiments, the application of the communication device sends the updated map to the processor of the VMP robot using a wireless communication channel, such as Wi-Fi or Bluetooth.

In some embodiments, the map generated by the processor of the VMP robot (or one or remote processors) contains errors, is incomplete, or does not reflect the areas of the workspace that the user wishes the VMP robot to service. By providing an interface by which the user may adjust the map, some embodiments obtain additional or more accurate information about the environment, thereby improving the VMP robot's ability to navigate through the environment or otherwise operate in a way that better accords with the user's intent. For example, via such an interface, the user may extend the boundaries of the map in areas where the actual boundaries are further than those identified by sensors of the VMP robot, trim boundaries where sensors identified boundaries further than the actual boundaries, or adjusts the location of doorways. Or the user may create virtual boundaries that segment a room for different treatment or across which the robot will not traverse. In some cases where the processor creates an accurate map of the workspace, the user may adjust the map boundaries to keep the VMP robot from entering some areas.

In some embodiments, data is sent between the processor of the VMP robot and the application of the communication device using one or more wireless communication channels such as Wi-Fi or Bluetooth wireless connections. In some cases, communications are relayed via a remote cloud-hosted application that mediates between the robot and the communication device, e.g., by exposing an application program interface by which the communication device accesses previous maps from the robot. In some embodiments, the processor of the VMP robot and the application of the communication device are paired prior to sending data back and forth between one another. In some cases, pairing may include exchanging a private key in a symmetric encryption protocol, and exchanges may be encrypted with the key.

In some embodiments, via the user interface (which may be a single screen, or a sequence of displays that unfold over time), the user creates different areas within the workspace. In some embodiments, the user selects areas within the map of the workspace displayed on the screen using their finger or providing verbal instructions, or in some embodiments, an input device, such as a cursor, pointer, stylus, mouse, button or buttons, or other input methods. Some embodiments may receive audio input, convert the audio to text with a speech-to-text model, and then map the text to recognized commands. In some embodiments, the user labels different areas of the workspace using the user interface of the application. In some embodiments, the user selects different settings, such as tool, cleaning and scheduling settings, for different areas of the workspace using the user interface. In some embodiments, the processor autonomously divides the workspace into different areas and in some instances, the user adjusts the areas of the workspace created by the processor using the user interface. Examples of methods for dividing a workspace into different areas and choosing settings for different areas are described in U.S. patent application Ser. Nos. 14/817,952, 16/198,393, 15/619,449, and 62/658,705, the entire contents of each of which are hereby incorporated by reference.

In some embodiments, the user adjusts or chooses tool settings of the VMP robot using the user interface of the application of the communication device and designates areas in which the tool is to be applied with the adjustment. Examples of tools of a VMP robot customized to function as a surface cleaning robot include a suction tool (e.g., a vacuum), a mopping tool (e.g., a mop), a sweeping tool (e.g., a rotating brush), a main brush tool, a side brush tool, and an ultraviolet (UV) light capable of killing bacteria. Tool settings that the user can adjust using the user interface may include activating or deactivating various tools, impeller motor speed for suction control, fluid release speed for mopping control, brush motor speed for vacuuming control, and sweeper motor speed for sweeping control. In some embodiments, the user chooses different tool settings for different areas within the workspace or schedules particular tool settings at specific times using the user interface. For example, the user selects activating the suction tool in only the kitchen and bathroom on Wednesdays at noon. In some embodiments, the user adjusts or chooses robot cleaning settings using the user interface. Robot cleaning settings include, but are not limited to, robot speed settings, movement pattern settings, cleaning frequency settings, cleaning schedule settings, etc. In some embodiments, the user chooses different robot cleaning settings for different areas within the workspace or schedules particular robot cleaning settings at specific times using the user interface. For example, the user chooses areas A and B of the workspace to be cleaned with the robot at high speed, in a boustrophedon pattern, on Wednesday at noon every week and areas C and D of the workspace to be cleaned with the robot at low speed, in a spiral pattern, on Monday and Friday at nine in the morning, every other week. In addition to the robot settings of areas A, B, C, and D of the workspace the user selects tool settings using the user interface as well. In some embodiments, the user chooses the order of covering or operating in the areas of the workspace using the user interface. In some embodiments, the user chooses areas to be excluded using the user interface. In some embodiments, the user adjusts or creates a coverage path of the VMP robot using the user interface. For example, the user adds, deletes, trims, rotates, elongates, redraws, moves (in all four directions), flips, or curves a selected portion of the coverage path. In some embodiments, the user adjusts the path created by the processor using the user interface. In some embodiments, the user chooses an area of the map using the user interface and applies particular tool and/or operational settings to the area. In other embodiments, the user chooses an area of the workspace from a drop-down list or some other method of displaying different areas of the workspace.

In some embodiments, the application of the communication device is paired with various different types of customized VMP robots and the graphical user interface of the application is used to instruct these various customized VMP robots. For example, the application of the communication device may be paired with a VMP robot customized to transport a passenger pod and the user interface may be used to request a passenger pod for transportation from one location to another. In another example, the application of the communication device may be paired with a robotic refuse container and the user interface may be used to instruct the robotic refuse container to navigate to a refuse collection site or another location of interest. In one example, the application of the communication device may be paired with a robotic towing vehicle and the user interface may be used to request a towing of a vehicle from one location to another. In other examples, the user interface of the application of the communication device may be used to instruct a customized VMP robot to carry and transport an item (e.g., groceries, signal boosting device, home assistant, cleaning supplies, luggage, packages being delivered, etc.), to order a pizza or goods and deliver them to a particular location, to request a defibrillator or first aid supplies to a particular location, to push or pull items (e.g., dog walking), to display a particular advertisement while navigating within a designated area of an environment, etc.

In some cases, user inputs via the user interface may be tested for validity before execution. Some embodiments may determine whether the command violates various rules, e.g., a rule that a mop and vacuum are not engaged concurrently. Some embodiments may determine whether adjustments to maps violate rules about well-formed areas, such as a rule specifying that areas are to be fully enclosed, a rule specifying that areas must have some minimum dimension, a rule specifying that an area must have less than some maximum dimension, and the like. Some embodiments may determine not to execute commands that violate such rules and vice versa.

FIG. 221 illustrates an example of a process of creating and adjusting a two-dimensional map using an interactive user interface. In a first step 22100, sensors positioned on a VMP robot collect environmental data. In a next step 22101, a processor of the VMP robot generates a two-dimensional map of the workspace using the collected environmental data using a method such as those referenced above for creating a map of an environment, including those that use simultaneous localization and mapping (SLAM) techniques. In some methods, measurement systems, such as LIDAR, are used to measure distances from the VMP robot to the nearest obstacle in a 360 degree plane in order to generate a two-dimensional map of the area. In a next step 22102, the two-dimensional map is sent to an application of a communication device using one or more network communication connections and the map is displayed on the screen of the communication device such that a user can make adjustments or choose settings using a user interface of the application by, for example, a touchscreen or buttons or a cursor of the communication device. In a next step 22103, the application of the communication device checks for changes made by a user using the user interface. If any changes are detected (to either the map boundaries or the operation settings), the method proceeds to step 22104 to send the user changes to the processor of the VMP robot. If no changes to the map boundaries or the operation settings are detected, the method proceeds to step 22105 to continue working without any changes. These steps may be performed in the order provided or in another order and may include all steps or a select number of steps FIG. 222 illustrates the process of customizing VMP robot operation using a user interface. In a first step 22200, a user selects any size area (e.g., the selected area may be comprised of a small portion of the workspace or could encompass the entire workspace) of a workspace map displayed on a screen of a communication device using their finger, a verbal instruction, buttons, a cursor, or other input methods of the communication device. In a next step 22201, the user selects desired settings for the selected area. The particular functions and settings available are dependent on the capabilities of the particular VMP robot. For example, in some embodiments, a user can select any of: cleaning modes, frequency of cleaning, intensity of cleaning, navigation methods, driving speed, etc. In a next step 22202, the selections made by the user are sent to a processor of the VMP robot. In a next step 22203, the processor of the VMP robot processes the received data and applies the user changes. These steps may be performed in the order provided or in another order and may include all steps or a select number of steps.

FIG. 223A illustrates an overhead view of a workspace 22300. This view shows the actual obstacles of the workspace with outer line 22301 representing the walls of the workspace 22300 and the rectangle 22302 representing a piece of furniture. FIG. 223B illustrates an overhead view of a two-dimensional map 22303 of the workspace 22300 created by a processor of the VMP robot using environmental data collected by sensors. Because the methods for generating the map are not 100% accurate, the two-dimensional map 22303 is approximate and thus performance of the VMP robot may suffer as its navigation and operations within the environment are in reference to the map 22303. To improve the accuracy of the map 22303, a user may correct the perimeter lines of the map to match the actual obstacles via a user interface of, for example, an application of a communication device. FIG. 223C illustrates an overhead view of a user-adjusted two-dimensional map 304. By changing the perimeter lines of the map 22303 (shown in FIG. 223B) created by the processor of the VMP robot, a user is enabled to create a two-dimensional map 22304 of the workspace 22300 (shown in FIG. 223A) that accurately identifies obstacles and boundaries in the workspace. In this example, the user also creates areas 22305, 22306, and 22307 within the two-dimensional map 22304 and applies particular settings to them using the user interface. By delineating a portion 22305 of the map 22304, the user can select settings for area 22305 independent from all other areas. For example, for a surface cleaning robot the user chooses area 22305 and selects weekly cleaning, as opposed to daily or standard cleaning, for that area. In a like manner, the user selects area 22306 and turns on a mopping function for that area. The remaining area 22307 is treated in a default manner. Additional to adjusting the perimeter lines of the two-dimensional map 22304, the user can create boundaries anywhere, regardless of whether an actual perimeter exists in the workspace. In the example shown, the perimeter line in the corner 308 has been redrawn to exclude the area near the corner. The VMP robot will thus avoid entering this area. This may be useful for keeping the VMP robot out of certain areas, such as areas with fragile objects, pets, cables or wires, etc.

In some embodiments, setting a cleaning mode includes, for example, setting a service condition, a service type, a service parameter, a service schedule, or a service frequency for all or different areas of the workspace. A service condition indicates whether an area is to be serviced or not, and embodiments determine whether to service an area based on a specified service condition in memory. Thus, a regular service condition indicates that the area is to be serviced in accordance with service parameters like those described below. In contrast, a no service condition indicates that the area is to be excluded from service (e.g., cleaning). A service type indicates what kind of cleaning is to occur. For example, a hard (e.g. non-absorbent) surface may receive a mopping service (or vacuuming service followed by a mopping service in a service sequence), while a carpeted service may receive a vacuuming service. Other services can include a UV light application service, and a sweeping service. A service parameter may indicate various settings for the VMP robot. In some embodiments, service parameters may include, but are not limited to, an impeller speed parameter, a wheel speed parameter, a brush speed parameter, a sweeper speed parameter, a liquid dispensing speed parameter, a driving speed parameter, a driving direction parameter, a movement pattern parameter, a cleaning intensity parameter, and a timer parameter. Any number of other parameters can be used without departing from embodiments disclosed herein, which is not to suggest that other descriptions are limiting. A service schedule indicates the day and, in some cases, the time to service an area, in some embodiments. For example, the VMP robot may be set to service a particular area on Wednesday at noon. In some instances, the schedule may be set to repeat. A service frequency indicates how often an area is to be serviced. In embodiments, service frequency parameters can include hourly frequency, daily frequency, weekly frequency, and default frequency. A service frequency parameter can be useful when an area is frequently used or, conversely, when an area is lightly used. By setting the frequency, more efficient overage of workspaces is achieved. In some embodiments, the VMP robot cleans areas of the workspace according to the cleaning mode settings.

In some embodiments, the processor of the VMP robot determines or changes the cleaning mode settings based on collected sensor data. For example, the processor may change a service type of an area from mopping to vacuuming upon detecting carpeted flooring from sensor data (e.g., in response to detecting an increase in current draw by a motor driving wheels of the robot, or in response to a visual odometry sensor indicating a different flooring type). In a further example, the processor may change service condition of an area from no service to service after detecting accumulation of debris in the area above a threshold. Examples of methods for a processor to autonomously adjust settings (e.g., speed) of components of a VMP robot (e.g., impeller motor, wheel motor, etc.) based on environmental characteristics (e.g., floor type, room type, debris accumulation, etc.) are described in U.S. patent application Ser. Nos. 16/163,530 and 16/239,410, the entire contents of which are hereby incorporated by reference. In some embodiments, the user adjusts the settings chosen by the processor using the user interface. In some embodiments, the processor changes the cleaning mode settings and/or cleaning path such that resources required for cleaning are not depleted during the cleaning session. In some instances, the processor uses a bin packing algorithm or an equivalent algorithm to maximize the area cleaned given the limited amount of resources remaining. In some embodiments, the processor analyzes sensor data of the environment before executing a service type to confirm environmental conditions are acceptable for the service type to be executed. For example, the processor analyzes floor sensor data to confirm floor type prior to providing a particular service type. In some instances, wherein the processor detects an issue in the settings chosen by the user, the processor sends a message that the user retrieves using the user interface. The message in other instances may be related to cleaning or the map. For example, the message may indicate that an area with no service condition has high (e.g., measured as being above a predetermined or dynamically determined threshold) debris accumulation and should therefore have service or that an area with a mopping service type was found to be carpeted and therefore mopping was not performed. In some embodiments, the user overrides a warning message prior to the VMP robot executing an action. In some embodiments, conditional cleaning mode settings may be set using a user interface and are provided to the processor of the robot using a wireless communication channel. Upon detecting a condition being met, the processor implements particular cleaning mode settings (e.g., increasing impeller motor speed upon detecting dust accumulation beyond a specified threshold or activating mopping upon detecting a lack of motion). In some embodiments, conditional cleaning mode settings are preset or chosen autonomously by the processor of the VMP robot.

FIGS. 224A and 224B illustrate an example of changing perimeter lines of a map based on user inputs via a graphical user interface, like on a touchscreen. FIG. 224A depicts an overhead view of a workspace 22400. This view shows the actual obstacles of workspace 22400. The outer line 22401 represents the walls of the workspace 22400 and the rectangle 22402 represents a piece of furniture. Commercial use cases are expected to be substantially more complex, e.g., with more than 2, 5, or 10 obstacles, in some cases that vary in position over time. FIG. 224B illustrates an overhead view of a two-dimensional map 22410 of the workspace 22400 created by a processor of a VMP robot using environmental sensor data. Because the methods for generating the map are often not 100% accurate, the two-dimensional map 22410 may be approximate. In some instances, performance of the VMP robot may suffer as a result of imperfections in the generated map 22410. In some embodiments, a user corrects the perimeter lines of map 22410 to match the actual obstacles and boundaries of workspace 22400. In some embodiments, the user is presented with a user interface displaying the map 22410 of the workspace 22400 on which the user may add, delete, and/or otherwise adjust perimeter lines of the map 22410. For example, the processor of the VMP robot may send the map 22410 to an application of a communication device wherein user input indicating adjustments to the map are received through a user interface of the application. The input triggers an event handler that launches a routine by which a perimeter line of the map is added, deleted, and/or otherwise adjusted in response to the user input, and an updated version of the map may be stored in memory before being transmitted back to the processor of the VMP robot. For instance, in map 22410, the user manually corrects perimeter line 22416 by drawing line 22418 and deleting perimeter line 22416 in the user interface. In some cases, user input to add a line may specify endpoints of the added line or a single point and a slope. Some embodiments may modify the line specified by inputs to "snap" to likely intended locations. For instance, inputs of line endpoints may be adjusted by the processor to equal a closest existing line of the map. Or a line specified by a slope and point may have endpoints added by determining a closest intersection relative to the point of the line with the existing map. In some cases, the user may also manually indicate with portion of the map to remove in place of the added line, e.g., separately specifying line 22418 and designating curvilinear segment 22416 for removal. Or some embodiments may programmatically select segment 22416 for removal in response to the user inputs designating line 22418, e.g., in response to determining that areas 22416 and 22418 bound areas of less than a threshold size, or by determining that line 22416 is bounded on both sides by areas of the map designated as part of the workspace.

In some embodiments, the application suggests a correcting perimeter. For example, embodiments may determine a best-fit polygon of a perimeter of the (as measured) map through a brute force search or some embodiments may suggest a correcting perimeter with a Hough Transform, the Ramer-Douglas-Peucker algorithm, the Visvalingam algorithm, or other line-simplification algorithm. Some embodiments may determine candidate suggestions that do not replace an extant line but rather connect extant segments that are currently unconnected, e.g., some embodiments may execute a pairwise comparison of distances between endpoints of extant line segments and suggest connecting those having distances less than a threshold distance apart. Some embodiments may select, from a set of candidate line simplifications, those with a length above a threshold or those with above a threshold ranking according to line length for presentation. In some embodiments, presented candidates may be associated with event handlers in the user interface that cause the selected candidates to be applied to the map. In some cases, such candidates may be associated in memory with the line segments they simplify, and the associated line segments that are simplified may be automatically removed responsive to the event handler receive a touch input event corresponding to the candidate. For instance, in map 22410, in some embodiments, the application suggests correcting perimeter line 22412 by displaying suggested correction 22414. The user accepts the corrected perimeter line 22414 that will replace and delete perimeter line 22412 by supplying inputs to the user interface. In some cases, where perimeter lines are incomplete or contain gaps, the application suggests their completion. For example, the application suggests closing the gap 22420 in perimeter line 22422. Suggestions may be determined by the robot, the application executing on the communication device, or other services, like a cloud-based service or computing device in a base station.

Perimeter lines can be edited in a variety of ways such as, for example, adding, deleting, trimming, rotating, elongating, redrawing, moving (e.g., upward, downward, leftward, or rightward), suggesting a correction, and suggesting a completion to all or part of the perimeter line. In some embodiments, the application suggests an addition, deletion or modification of a perimeter line and in other embodiments the user manually adjusts perimeter lines by, for example, elongating, shortening, curving, trimming, rotating, translating, flipping, etc. the perimeter line selected with their finger or buttons or a cursor of the communication device or by other input methods. In some embodiments, the user deletes all or a portion of the perimeter line and redraws all or a portion of the perimeter line using drawing tools, e.g., a straight-line drawing tool, a Bezier tool, a freehand drawing tool, and the like. In some embodiments, the user adds perimeter lines by drawing new perimeter lines. In some embodiments, the application identifies unlikely boundaries created (newly added or by modification of a previous perimeter) by the user using the user interface. In some embodiments, the application identifies one or more unlikely perimeter segments by detecting one or more perimeter segments oriented at an unusual angle (e.g., less than 25 degrees relative to a neighboring segment or some other threshold) or one or more perimeter segments comprising an unlikely contour of a perimeter (e.g., short perimeter segments connected in a zig-zag form). In some embodiments, the application identifies an unlikely perimeter segment by determining the surface area enclosed by three or more connected perimeter segments, one being the newly created perimeter segment and identifies the perimeter segment as an unlikely perimeter segment if the surface area is less than a predetermined (or dynamically determined) threshold. In some embodiments, other methods are used in identifying unlikely perimeter segments within the map. In some embodiments, the user interface may present a warning message using the user interface, indicating that a perimeter segment is likely incorrect. In some embodiments, the user ignores the warning message or responds by correcting the perimeter segment using the user interface.

In some embodiments, the application autonomously suggests a correction to perimeter lines by, for example, identifying a deviation in a straight perimeter line and suggesting a line that best fits with regions of the perimeter line on either side of the deviation (e.g. by fitting a line to the regions of perimeter line on either side of the deviation). In other embodiments, the application suggests a correction to perimeter lines by, for example, identifying a gap in a perimeter line and suggesting a line that best fits with regions of the perimeter line on either side of the gap. In some embodiments, the application identifies an end point of a line and the next nearest end point of a line and suggests connecting them to complete a perimeter line. In some embodiments, the application only suggests connecting two end points of two different lines when the distance between the two is below a particular threshold distance. In some embodiments, the application suggests correcting a perimeter line by rotating or translating a portion of the perimeter line that has been identified as deviating such that the adjusted portion of the perimeter line is adjacent and in line with portions of the perimeter line on either side. For example, a portion of a perimeter line is moved upwards or downward or rotated such that it is in line with the portions of the perimeter line on either side. In some embodiments, the user may manually accept suggestions provided by the application using the user interface by, for example, touching the screen, pressing a button or clicking a cursor. In some embodiments, the application may automatically make some or all of the suggested changes.

In some embodiments, maps are represented in vector graphic form or with unit tiles, like in a bitmap. In some cases, changes may take the form of designating unit tiles via a user interface to add to the map or remove from the map. In some embodiments, bitmap representations may be modified (or candidate changes may be determined) with, for example, a two-dimensional convolution configured to smooth edges of mapped workspace areas (e.g., by applying a Gaussian convolution to a bitmap with tiles having values of 1 where the workspace is present and 0 where the workspace is absent and suggesting adding unit tiles with a resulting score above a threshold). In some cases, the bitmap may be rotated to align the coordinate system with walls of a generally rectangular room, e.g., to an angle at which a diagonal edge segments are at an aggregate minimum. Some embodiments may then apply a similar one-dimensional convolution and thresholding along the directions of axes of the tiling, but applying a longer stride than the two-dimensional convolution to suggest completing likely remaining wall segments.

Reference to operations performed on "a map" may include operations performed on various representations of the map. For instance, the VMP robot may store in memory a relatively high-resolution representation of a map, and a lower-resolution representation of the map may be sent to a communication device for editing. In this scenario, the edits are still to "the map," notwithstanding changes in format, resolution, or encoding. Similarly, a map stored in memory of the VMP robot, while only a portion of the map may be sent to the communication device, and edits to that portion of the map are still properly understood as being edits to "the map" and obtaining that portion is properly understood as obtaining "the map." Maps may be said to be obtained from a VMP robot regardless of whether the maps are obtained via direct wireless connection between the VMP robot and a communication device or obtained indirectly via a cloud service. Similarly, a modified map may be said to have been sent to the VMP robot even if only a portion of the modified map, like a delta from a previous version currently stored on the VMP robot, it sent.

In some embodiments, the user interface may present a map, e.g., on a touchscreen, and areas of the map (e.g., corresponding to rooms or other sub-divisions of the workspace, e.g., collections of contiguous unit tiles in a bitmap representation) in pixel-space of the display may be mapped to event handlers that launch various routines responsive to events like an on-touch event, a touch release event, or the like. In some cases, before or after receiving such a touch event, the user interface may present the user with a set of user-interface elements by which the user may instruct embodiments to apply various commands to the area. Or in some cases, the areas of a working environment are depicted in the user interface without also depicting their spatial properties, e.g., as a grid of options without conveying their relative size or position.

Examples of commands specified via the user interface include assigning an operating mode to an area, e.g., a cleaning mode or a mowing mode. Modes may take various forms. Examples include modes that specify how a robot performs a function, like modes that select which tools to apply and settings of those tools. Other examples include modes that specify target results, e.g., a "heavy clean" mode versus a "light clean" mode, a quite vs loud mode, or a slow versus fast mode. In some cases, such modes may be further associated with scheduled times in which operation subject to the mode is to be performed in the associated area. In some embodiments, a given area may be designated with multiple modes, e.g., a vacuuming mode and a quite mode. In some cases, modes are nominal properties, ordinal properties, or cardinal properties, e.g., a vacuuming mode, a heaviest-clean mode, a 10/seconds/linear-foot vacuuming mode, respectively.

Examples of commands specified via the user interface include commands that schedule when modes of operations are to be applied to areas. Such scheduling may include scheduling when cleaning is to occur or when cleaning using a designed mode is to occur. Scheduling may include designating a frequency, phase, and duty cycle of cleaning, e.g., weekly, on Monday at 4, for 45 minutes. Scheduling, in some cases, may include specifying conditional scheduling, e.g., specifying criteria upon which modes of operation are to be applied. Examples include events in which no motion is detected by a motion sensor of the VMP robot or a base station for more than a threshold duration of time, or events in which a third-party API (that is polled or that pushes out events) indicates certain weather events have occurred, like rain. In some cases, the user interface exposes inputs by which such criteria may be composed by the user, e.g., with Boolean connectors, for instance "If no-motion-for-45-minutes, and raining, then apply vacuum mode in area labeled "kitchen."

In some embodiments, the user interface may display information about a current state of the VMP robot or previous states of the VMP robot or its environment. Examples include a heat map of dirt or debris sensed over an area, visual indications of classifications of floor surfaces in different areas of the map, visual indications of a path that the robot has taken during a current cleaning session or other type of work session, visual indications of a path that the VMP robot is currently following and has computed to plan further movement in the future, and visual indications of a path that the VMP robot has taken between two points in the workspace, like between a point A and a point B on different sides of a room or a house in a point-to-point traversal mode. In some embodiments, while or after a VMP robot attains these various states, the VMP robot may report information about the states to the application via a wireless network, and the application may update the user interface on the communication device to display the updated information. For example, in some cases, a processor of a robot may report which areas of the working environment have been covered during a current working session, for instance, in a stream of data to the application executing on the communication device formed via a WebRTC Data connection, or with periodic polling by the application, and the application executing on the computing device may update the user interface to depict which areas of the working environment have been covered. In some cases, this may include depicting a line of a path traced by the robot or adjusting a visual attribute of areas or portions of areas that have been covered, like color or shade or areas or boundaries. In some embodiments, the visual attributes may be varied based upon attributes of the environment sensed by the robot, like an amount of dirt or a classification of a flooring type since by the robot. In some embodiments, a visual odometer implemented with a downward facing camera may capture images of the floor, and those images of the floor, or a segment thereof, may be transmitted to the application to apply as a texture in the visual representation of the working environment in the map, for instance, with a map depicting the appropriate color of carpet, wood floor texture, tile, or the like to scale in the different areas of the working environment.

In some embodiments, the user interface may indicate in the map a path the VMP robot is about to take (e.g., according to a routing algorithm) between two points, to cover an area, or to perform some other task. For example, a route may be depicted as a set of line segments or curves overlaid on the map, and some embodiments may indicate a current location of the VMP robot with an icon overlaid on one of the line segments with an animated sequence that depicts the VMP robot moving along the line segments. In some embodiments, the future movements of the VMP robot or other activities of the VMP robot may be depicted in the user interface. For example, the user interface may indicate which room or other area the VMP robot is currently covering and which room or other area the VMP robot is going to cover next in a current work sequence. The state of such areas may be indicated with a distinct visual attribute of the area, its text label, or its perimeters, like color, shade, blinking outlines, and the like. In some embodiments, a sequence with which the VMP robot is currently programmed to cover various areas may be visually indicated with a continuum of such visual attributes, for instance, ranging across the spectrum from red to blue (or dark grey to light) indicating sequence with which subsequent areas are to be covered.

In some embodiments, via the user interface or automatically without user input, a starting and an ending point for a path to be traversed by the VMP robot may be indicated on the user interface of the application executing on the communication device. Some embodiments may depict these points and propose various routes therebetween, for example, with various routing algorithms like those described in the applications incorporated by reference herein. Examples include A*, Dijkstra's algorithm, and the like. In some embodiments, a plurality of alternate candidate routes may be displayed (and various metrics thereof, like travel time or distance), and the user interface may include inputs (like event handlers mapped to regions of pixels) by which a user may select among these candidate routes by touching or otherwise selecting a segment of one of the candidate routes, which may cause the application to send instructions to the VMP robot that cause the VMP robot to traverse the selected candidate route.

In some embodiments, the map formed by the processor of the VMP robot during traversal of the working environment may have various artifacts like those described herein. Using techniques like the line simplification algorithms and convolution will smoothing and filtering, some embodiments may remove clutter from the map, like artifacts from reflections or small objects like chair legs to simplify the map, or a version thereof in lower resolution to be depicted on a user interface of the application executed by the communication device. In some cases, this may include removing duplicate borders, for instance, by detecting border segments surrounded on two sides by areas of the working environment and removing those segments.

Some embodiments may rotate and scale the map for display in the user interface. In some embodiments, the map may be scaled based on a window size such that a largest dimension of the map in a given horizontal or vertical direction is less than a largest dimension in pixel space of the window size of the communication device or a window thereof in which the user interfaces displayed. Or in some embodiments, the map may be scaled to a minimum or maximum size, e.g., in terms of a ratio of meters of physical space to pixels in display space. Some embodiments may include zoom and panning inputs in the user interface by which a user may zoom the map in and out, adjusting scaling, and pan to shifts which portion of the map is displayed in the user interface.

In some embodiments, rotation of the map or portions thereof (like perimeter lines) may be determined with techniques like those described above by which an orientation that minimizes an amount of aliasing, or diagonal lines of pixels on borders, is minimized. Or borders may be stretched or rotated to connect endpoints determined to be within a threshold distance. In some embodiments, an optimal orientation may be determined over a range of candidate rotations that is constrained to place a longest dimension of the map aligned with a longest dimension of the window of the application in the communication device. Or in some embodiments, the application may query a compass of the communication device to determine an orientation of the communication device relative to magnetic north and orient the map in the user interface such that magnetic north on the map as displayed is aligned with magnetic north as sensed by the communication device. In some embodiments, the robot may include a compass and annotate locations on the map according to which direction is magnetic north.

FIG. 225 illustrates an example of a logical architecture block diagram 22500 of applications 22502 for customizing a job of a workspace. Applications 22502 include at least two subdivisions: monitoring 22504 and configuring 22512. In some embodiments, applications are executed by a processor of a VMP robot, a processor of a communication device (e.g., mobile device, laptop, tablet, specialized computer), a processor of a base station of a VMP robot, or by other devices. In some embodiments, applications are executed on the cloud and in other embodiments applications are executed locally on a device. In some embodiments, different applications are executed by different means. In some embodiments, applications are autonomously executed by, for example, a processor and in other embodiments, a user provides instructions to the processor using a user interface of a mobile application, software, or web application of a communication device or user interface of a hardware device that has wireless communication with the processor of the VMP robot. In monitoring 22504, applications include mapping functions 22506, scheduling functions 22508, and battery status functions 22510. Mapping functions may correspond with generating a map (which may include updating an extant map) of a workspace based on the workspace environmental data and displaying the map on a user interface. Scheduling functions may include setting operation times (e.g., date and time) and frequency with, for example, a timer. In embodiments, service frequency indicates how often an area is to be serviced. In embodiments, operation frequency may include hourly, daily, weekly, and default frequencies. Some embodiments select a frequency responsive to a time-integrate of a measure of detected movement from a motion sensor, e.g., queried via a home automation API or in a robot or base station. Other embodiments select a frequency based on ambient weather conditions accessed via the Internet, e.g., increasing frequency responsive to rain or dusty conditions. Some embodiments select a frequency autonomously based on sensor data of the environment indicative of, for example, debris accumulation, floor type, use of an area, etc. In configuring 22512, applications may include navigating functions 22514, defining border or perimeter functions 22516, and cleaning mode functions 22522. Navigating functions may include selecting a navigation mode for an area such as selecting a default navigation mode, selecting a user pattern navigation mode, and selecting an ordered coverage navigation mode. A default navigation mode may include methods used by a robot in the absence of user-specified changes. A user pattern navigation mode may include setting any number of waypoints and then ordering coverage of an area that corresponds with the waypoints. An ordered coverage navigation mode may include selecting an order of areas to be covered—each area having a specified navigation mode. Defining borders or perimeter functions may allow users to freely make changes (22518) to boundaries such as those disclosed above. In addition, users may limit (22520) VMP robots by, for example, creating exclusion areas. Cleaning mode functions may include selecting an intensity of cleaning such as deep cleaning 22524 and a type of cleaning such as mopping or vacuuming 22526.

In some embodiments, the VMP robot contains several different modes. These modes may include a function selection mode, a screen saving mode, an unlocking mode, a locking mode, a cleaning mode, a mopping mode, a return mode, a docking mode, an error mode, a charging mode, a Wi-Fi pairing mode, a Bluetooth pairing mode, an RF sync mode, a USB mode, a checkup mode, and the like. In some embodiments, the processor (in virtue of executing the application) may represent these modes using a finite state machine (FSM) made up of a set of states, each state representing a different mode, an initial state, and conditions for each possible transition from one state to another. The FSM can be in exactly one of a finite number of states at any given time. The FSM can transition from one state to another in response to observation of a particular event, observation of the environment, completion of a task, user input, and the like. FIG. 226 illustrates an example of a simplified FSM chart, where different modes are shown, such as cleaning mode 22600, USB mode 22601, checkup mode 22602, and error mode 22603. Possible transitions between states (for some embodiments) are represented by directed arrows. For example, from screensaver mode 22604, a transition to unlocking mode 22605 and vice versa is possible.

In some embodiments, the mobile device application contains a FSM such that the user may switch between different modes that are used in controlling the VMP robot. In some embodiments, different modes are accessible from a drop-down list, or similar menu option, within the mobile device application from which the user can select the mode. FIG. 227 illustrates an example of a FSM chart for a mobile device application. Once the mobile device has completed Wi-Fi pairing mode 22700, function mode 22701, schedule mode 22702, and report mode 22703 are accessible and transition between any of these three states is possible as indicated by the directed arrows. In some embodiments, function mode is used to select function(s) of the VMP robot, such as vacuuming, mopping, sweeping, sanitizing, recharging, and the like. In some embodiments, the user selects various operation modes for the VMP robot, such as quiet mode, low power mode, partial or full vacuuming speed mode, partial or full brush speed mode, partial or full driving speed and limits the VMP robot's ability to operate on particular surface types and avoid certain obstacles, such as dynamic obstacles and the like. These selection options are not intended to be an exhaustive list. In some embodiments, the user uses schedule mode to set the schedule of operations such as day and time, type of operation, location, and the like. For example, the user can set vacuuming on Tuesdays at 9:00 am in the bedrooms and mopping on Fridays at 6:00 pm in the kitchen. In some embodiments, report mode is used to report notifications such as errors or task completion and/or to access cleaning statistics of the VMP robot. Diagnostic information can also be reported, such as low battery levels, required part replacements and the like. In some embodiments, checkup mode is included in the FSM and is used to check functionality of key components such as touch keys, wheels, IR sensors, bumper, etc. In some embodiments, based on notifications, errors and/or warnings reported in report mode, the user chooses specific diagnostic tests when in checkup mode to particularly target issues of the VMP robot. In some embodiments, a processor of the VMP robot determines the proper diagnostic test and performs the diagnostic test itself. In some embodiments, the processor disables all modes when in checkup mode until the processor completes all diagnostic tests and reboots. In another embodiment, RF sync mode is included in the FSM. When in RF sync mode, the VMP robot and corresponding charging station and/or virtual wall block sync with one another via RF. RF transmitters and receivers of RF modules are set at the same RF channel for communication. In some embodiments, the processor produces an alarm, such as a buzz, a vibration, or illumination of an LED when pairing with the charging station or when the virtual wall block is complete. Other indicators may also be used. The modes discussed herein are not intended to represent an exhaustive list of possible modes but are presented for exemplary purposes. Any other types of modes, such as USB mode, docking mode and screen saver mode, may be included in the FSM of the mobile device application.

In some embodiments, the application of the communication device may be used to communicate settings and operations to the processor or a centralized control system managing the VMP robot. In some embodiments, the graphical user interface of the application is used by an operator to choose settings, operations, and preferences of the VMP robot. In some instances, the application is used to display a map of the environment and the graphical user interface may be used by the operator to modify the map (e.g., modify, add, or delete perimeters, doorways, and objects and obstacles such as furniture, buildings, walls, etc.), modify or create a navigation path of the VMP robot, create or modify subareas of the environment, label areas of an environment (e.g., kitchen, bathroom, streets, parks, airport terminal, etc., depending on the environment type), choose particular settings (e.g., average and maximum travel speed, average and maximum driving speed of an operational tool, RPM of an impeller, etc.) and operations (e.g., mowing, mopping, transportation of food, painting, etc.) for different areas of the environment, input characteristics of areas of an environment (e.g., obstacle density, floor or ground type, weather conditions, floor or ground transitions, etc.), create an operation schedule that is repeating or non-repeating for different areas of the environment (e.g., plow streets A and B in the morning on Wednesday), etc.

In some embodiments, map data is encrypted when uploaded to the cloud, with an on-device only encryption key to protect customer privacy. For example, a unique ID embedded in the MCU of the VMP robot is used as a decryption key of the encrypted map data when uploading to the cloud. The unique ID of the MCU is not recorded or tracked at production, which prevents floor maps from being viewed or decrypted expect by the user, thereby protecting user privacy. When the VMP robot requests the map from the cloud, the cloud sends the encrypted map data and the VMP robot is able to decrypt the data from the cloud using the unique ID. In some embodiments, users may choose to share their map. In such cases, data will be anonymized.

In some embodiments, a real-time VMP robot manager is accessible using a user interface to allow a user to instruct the real-time operation of the VMP robot regardless of the device's location within the two-dimensional map. Instructions may include any of turning on or off a mop tool, turning on or off a UV light tool, turning on or off a suction tool, turning on or off an automatic shutoff timer, increasing speed, decreasing speed, driving to a user-identified location, turning in a left or right direction, driving forward, driving backward, stopping movement, commencing one or a series of movement patterns, or any other preprogrammed action.

Various methods may be used to pair an application of a communication device to a processor of the VMP robot. For example, in embodiments, a docking station of a VMP robot may be paired with a Wi-Fi network and VMP robot cloud services using a QR barcode generated by a mobile device application connected to the same Wi-Fi network and cloud services. In some embodiments, a mobile device is connected to a Wi-Fi network that is also accessible to a docking station corresponding to a VMP robot. In some embodiments, a smart phone, computer, tablet, or any device that has a Wi-Fi module, including stationary devices, may be used to connect to a Wi-Fi network that is also accessible to a docking station corresponding to a VMP robot. Once connected, the mobile device application with connectivity to the VMP robot cloud service is logged into using unique VMP robot cloud service login information. In some embodiments, the mobile device application is designed to run on a mobile, stationary, and/or smart communication device and may be downloaded onto the device through various means. In other embodiments, a web application accessible through a stationary, mobile, and/or smart communication device through a web browser and with connectivity to the VMP robot cloud services may be used. In other embodiments, a software provided with the VMP robot and docking station and with connectivity to the VMP robot cloud services may be downloaded onto the mobile device. After logging in, the application is used to generate a QR barcode containing the Wi-Fi access point's SSID, Wi-Fi password (if applicable), and the cloud service login information for the particular VMP robot. In some embodiments, the QR barcode may be provided as a sticker with the VMP robot and may comprise the at least one cloud service login information corresponding to the VMP robot. Using a button or other selection method on the VMP robot or autonomously upon, for example, initial setup or detecting available networks, the VMP robot enters a barcode scanning mode and the QR barcode displayed on the mobile device is scanned using an image sensor such as a CMOS camera installed on the VMP robot. In some embodiments, other types of scanners may be used to scan the barcode, such as laser scanner, CCD reader, omni-directional barcode scanner, and the like. One or more processors of the VMP robot use image recognition software to parse the QR barcode and extrapolate the Wi-Fi access point's SSID, Wi-Fi password, and cloud service login information for the particular VMP robot. The information acquired by the VMP robot is then shared by the VMP robot with the corresponding docking station using an RF communication channel. In some embodiments, the VMP robot and/or charging station may receive Wi-Fi network details and/or cloud service login information corresponding to the VMP robot through other means, such as user input of network details and/or cloud service login information using a user interface of the VMP robot. The docking station may connect to the wireless network and log into the VMP robot cloud services. The docking station may then relay any information relating to the VMP robot to the cloud service. The mobile device application, also having connectivity to the VMP robot cloud services, can retrieve any information related to the particular VMP robot. In the same way, the docking station may retrieve any information relayed to the VMP robot cloud services from the mobile application and share it with the VMP robot using an RF communication channel. In some embodiments, the docking station and VMP robot may transfer information using other types of wireless communication channels, such as Wi-Fi. Other means of connecting the various components of the system are also possible, such as the use of Bluetooth.

In some embodiments, the VMP robot may provide confirmation to a user and/or the charging station and/or the mobile device when QR barcode scanning is complete, using, for example, an audio or visual alarm or other signal, alerting the user and/or the charging station and/or the mobile device that the process has occurred. The VMP robot shares acquired information with the docking station using an RF communication channel. In some embodiments, the VMP robot and docking station are paired at the manufacturing or production stage of the VMP robot and corresponding docking station. Once the docking station receives the information, the Wi-Fi access point's SSID and password can be used to establish a Wi-Fi network connection. Using the cloud service login information corresponding to the VMP robot, the docking station is also able to connect to the VMP robot cloud service. In this way, the dock is able to relay information corresponding to the VMP robot directly to the VMP robot cloud services. The mobile device application, also having connectivity to the VMP robot cloud services, can then retrieve any information related to the particular VMP robot. Such information may include the model or serial number of the VMP robot or may include information such as cleaning time or movement path. In the same way, the docking station may also retrieve any information relayed to the VMP robot cloud services from the mobile application.

In some embodiments, the VMP robot and charging station may each be directly connected to the Wi-Fi router. For example, both the VMP robot and charging station may have capabilities to scan the QR barcode and extract Wi-Fi details required to establish a connection with the router. In other embodiments, the VMP robot may be directly connected to the Wi-Fi router and the charging station only connected to the VMP robot via a wireless communication channel such as RF or Bluetooth. In other embodiments only the charging station or the VMP robot may be connected to the Wi-Fi router. In some embodiments, the Wi-Fi router may not be connected with a cloud service and information may be transmitted between the mobile application and VMP robot and/or charging station locally. In other embodiments, the VMP robot and/or docking station may be connected to the mobile device application using wireless Bluetooth channel. A mobile device application may be used to recognize a Bluetooth card of the VMP robot and/or docking station and to connect with the VMP robot and/or docking station via Bluetooth.

FIGS. 228A, 228B, and 228C illustrate initial steps of the pairing method in accordance with some embodiments. Wireless router 22801 is used to connect mobile device 22802 to a Wi-Fi network, which is also accessible to docking station 22803 corresponding to VMP robot 22804. Mobile device application 22805 in FIG. 228B on mobile device 22802 with access to VMP robot cloud service is logged into using unique cloud service login information 22806 corresponding to VMP robot 22804. FIG. 1C illustrates in a third step mobile device application 22805 generates QR barcode 22807 containing the Wi-Fi access point's SSID, Wi-Fi password and cloud service login information corresponding to VMP robot 22804.

FIG. 229 illustrates button 22901 on the housing of VMP robot 22804 may be pressed to enter barcode scanning mode. In other embodiments, VMP robot 22804 may enter barcode scanning mode autonomously upon, for example, initial setup or detecting available networks. Image Sensor such as a CMOS camera 22902 is used to capture generated QR barcode 22808 displayed on mobile device 22802. In some embodiments, other types of scanners may be used to scan the barcode, such as laser scanner, CCD reader, omni-directional barcode scanner, and the like. The VMP robot provides confirmation when QR barcode scanning is complete using, for example, an audio or visual alarm or other signal. In some embodiments, image recognition software may be used to parse QR barcode 22808 and extrapolate the Wi-Fi access point's SSID and password as well as the cloud service login information corresponding to VMP robot 22804.

FIG. 230 illustrates information acquired by VMP robot 22804 is shared by VMP robot 22804 with docking station 22803 using RF communication channel 23001. Once docking station 22803 receives the information, the Wi-Fi access point's SSID and password are used by the charging station to establish a Wi-Fi network connection. Using the cloud service login information corresponding to VMP robot 104, docking station 22803 connects to VMP robot cloud service 23002. Docking station 22803 is then able to relay and retrieve information corresponding to VMP robot 22804 to and from VMP robot cloud service 23002.

FIG. 231 illustrates mobile device 22802 and docking station 22803 have connectivity to VMP robot cloud service 23002 such that any information relayed to cloud service 23002 by either mobile device 22802 or docking station 22803 can be retrieved by either mobile device 22802 or docking station 22803 as well, when connected to VMP robot cloud service 23002.

FIG. 232 illustrates a flowchart depicting the steps required to pair the charging station of a VMP robot to a Wi-Fi network and VMP robot cloud service is illustrated in accordance with some embodiments. Starting from step 1, a mobile device is connected to a Wi-Fi network, which is also accessible to a docking station corresponding to a VMP robot. Once connected, a mobile device application with connectivity to a VMP robot cloud service is logged into using unique VMP robot cloud service login information. After logging in, the application is used to generate a QR barcode containing the Wi-Fi access point's SSID, Wi-Fi password, and the cloud service login information corresponding to the particular VMP robot. Using a button or other selection mechanism on the VMP robot, the VMP robot enters a barcode scanning mode and the QR barcode displayed on the mobile device is scanned using an image sensor installed on the VMP robot. In other embodiments, the VMP robot may enter barcode scanning mode autonomously upon, for example, initial setup or detecting available networks. Image recognition software is then used to parse the QR barcode and extrapolate the Wi-Fi access point's SSID, Wi-Fi password, and cloud service login information corresponding to the particular VMP robot. In some embodiments, other types of scanners may be used to scan the barcode, such as laser scanner, CCD reader, omni-directional barcode scanner, and the like. The VMP robot shares this information with the corresponding docking station via RF. The docking station is then able to connect to the wireless network and log into the VMP robot cloud service. The docking station can then relay any information relating to the VMP robot to the cloud service. The mobile device application, also having connectivity to the VMP robot cloud service, can retrieve any information related to the particular VMP robot. In the same way, the docking station may retrieve any information relayed to the VMP robot cloud service from the mobile application.

In some embodiments, a QR barcode sticker may be provided with the VMP robot and/or corresponding charging station. The VMP robot may enter syncing mode by pressing a button on a user interface of the VMP robot or autonomously upon, for example, powering up for the first time or recognizing a wireless network or communication device. A communication device, such as a mobile device, laptop, tablet, remote and/or any device with a Wi-Fi and/or Bluetooth card, may use a communication device application to scan and parse the QR barcode. The communication device application may be a mobile application designed to run on a mobile, stationary, and/or smart communication device and may be downloaded onto the device through various means. In other embodiments, the communication device application may be a web application accessible through a stationary, mobile, and/or smart communication device through a web browser. In other embodiments, the communication device application may be a software provided with the VMP robot and docking station and may be downloaded onto the communication device. The communication device application may be a QR barcode, which may comprise instructions to connect to the VMP robot. In some embodiments, the instructions comprise disconnecting the communication device from a local router (if necessary), connecting the communication device to a Wi-Fi card of the VMP robot, and when the connection is no longer necessary disconnecting the communication device from the Wi-Fi card of the VMP robot and connecting it with the local router (if applicable). In other embodiments, the instructions may comprise connecting to the VMP robot using a Bluetooth communication channel. Once the communication device establishes a connection with the VMP robot, using an interface of the communication device application, information may be transmitted from the communication device to the VMP robot and vice versa. In some embodiments, a similar approach may be used to sync the docking station with the communication device. In other embodiments, the instructions contained within the QR barcode may comprise syncing the charging station with the communication device before or after syncing the VMP robot with the communication device. In some embodiments, the VMP robot may be synced with the communication device and the docking station may be connected with the VMP robot via wireless communication channel such as RF or Bluetooth. In other embodiments both the VMP robot and the docking station are synced with the communication device. In another embodiment, the charging station may be synced with the communication device and the docking station may be connected with the VMP robot via a wireless communication channel such as RF or Bluetooth. In some embodiments only the VMP robot or the charging station is synced with the communication device.

FIG. 233 illustrates a flowchart including the steps to one embodiment of pairing a communication device with a VMP robot. At an initial step 23300, the VMP robot enters syncing mode. This may be done by activating a button on a user interface of the VMP robot or autonomously upon, for example, powering up for the first time or recognizing a wireless network, wireless channel or communication device. In a next step 23301, a communication device application scans and parses a QR barcode provided with the VMP robot and corresponding docking station. The communication device application may be a mobile application designed to run on a mobile, stationary, and/or smart communication device and may be downloaded onto the device through various means. In other embodiments, the communication device application may be a web application accessible through a stationary, mobile, and/or smart communication device through a web browser. In other embodiments, the communication device application may be a software provided with the VMP robot and docking station and may be downloaded onto the communication device. In a next step 23302, the communication device application extracts instructions to connect with the VMP robot from the QR barcode. In some embodiments, the connection may be Wi-Fi and/or Bluetooth. After establishing a connection, in step 23303 the communication device and VMP robot transmit and receive information to and from one another.

In some embodiments, pairing begins with a user logging into the application. Upon signing in the application is used to connect with a Wi-Fi module of the docking station. Establishing the connection allows the application to obtain the certificate ID and serial number of the VMP robot. This unique information can then be used by the application to connect to a cloud service bound only to the particular VMP robot, through which information from the application is sent to the VMP robot and information from the VMP robot is retrieved. A software for connecting the docking station to the cloud is used by the docking station. The docking station obtains the certificate ID and serial number from the VMP robot by connecting via RF. The docking station connects to Wi-Fi and connects to the cloud service using the unique certificate ID and serial number bound only to the particular VMP robot. The docking station retrieves information from the cloud service sent from the application and transmits information from the VMP robot to the cloud for the application to retrieve. In some instance, the docking station software also includes obtaining a certificate that the docking station initially activates by connecting to the cloud service. A software for creating the certificate is used. A docking station software for connecting the docking station and the VMP robot via RF is used by the docking station. The software executes pairing when a button of the docking station is pressed for longer than two seconds (or some other duration of time). The software searches for a particular RF frequency and once detected stores the matching RF frequency for communication with the VMP robot. Integration of the Wi-Fi and RF software for the docking is used to put information from the cloud in form for RF transmission and vice versa.

In some embodiments, information relayed from the communication device to the VMP robot may include scheduling information. In some embodiments, scheduling information may comprise time of operation, area of operation, frequency of operation, type of operation, duration of operation and/or any other information relating to the operation and/or function of the VMP robot. In some embodiments, a user may send scheduling information remotely using a communication device via Wi-Fi and is not required to be within the vicinity of the VMP robot or dock In some embodiments, information may be configured to be transmitted to and received from VMP robot cloud services via wireless Wide Area Network (WAN) connection, such as a mobile device carrier network. In cases where the data is transmitted and received using a WAN connection, the mobile device application may be used to send information and remotely monitor status information, such as the status of the VMP robot or status of the working environment, such as room temperature. In embodiments, the transfer of information between the communication device application and cloud service and/or the docking station and cloud service and/or the docking station and VMP robot may comprise additional steps of which are not depicted herein.

In other embodiments, information may be configured to be transmitted to and received from Wi-Fi router(s) via wireless Local Area Network (LAN) connection. In some embodiments, data may be transmitted and received using LAN connection such that no data is transmitted over WAN. In some embodiments, data may be transmitted and received using both a LAN and a WAN connection. In embodiments, the transfer of information between the application of the communication device and wireless router and/or the docking station and wireless router and/or the docking station and VMP robot may comprise additional steps of which are not depicted herein or may be done through other communication channels, such as the use of Bluetooth.

In some embodiments, the docking station may be replaced by any other stationary device capable of transmitting and receiving information to and from the VMP robot cloud service, and capable of transmitting and receiving information to and from the VMP robot. In some embodiments, the VMP robot may dock and/or charge at a separate device than the stationary device used for the transfer of information to and from the cloud service and/or the transfer of information to and from the VMP robot. For example, a stationary device having memory, processor, Wi-Fi module and RF module may perform the same functions as those of the docking station described herein.

In some embodiments, a graphical user interface of the mobile device application such as that described above, may be used for retrieving and sending different types of information. The mobile device application may be, but does not have to be, the same or related to the mobile device application used in generating the QR barcode and connecting to the cloud service.

In some embodiments, the processor of the VMP robot may be able to retrieve information directly from the cloud service and/or from the mobile device. In some embodiments, the charging station may be able to retrieve information directly from the mobile device.

In some embodiments, VMP robots recharge at a base station. Various base stations with different configurations may be used. For example, a charging station with extendable prongs for recharging of a battery of a mobile robotic vacuum. In other instances, the charging station with extendable prongs may be used for other types of robots, such as different customized VMP robots. This charging station has two folding prongs with an electrical connector node on their ends. These prongs extend when the robot is in charging mode. Each prong comes out by rotating 90 degrees around a specified pivot. When they are out, these connectors at their end will align with the connectors at the bottom of the robot when the robot moves toward the charging station. When the mobile robotic vacuum approaches the charging station, the extendable prongs extend from the charging station. Once extended, the mobile robotic vacuum connects with the extendable prongs in order to charge. Once charging of the battery of the mobile robotic vacuum is finished and the mobile robotic vacuum is in work mode and not connected to the charging station anymore, the extendable prongs retract back into the casing of the charging station.

FIG. 234A illustrates a front-right-side view of the charging station with the extendable prongs 23401 stored within the device. The charging station's casing 23403 is also depicted. FIG. 234B is a front-right-side view of the charging station with the extendable prongs 23401 extended partially in between the stored position and the fully extended position. At the end of the prongs is shown an electrical connector node 23402. The charging station's casing 23403 is also depicted. FIG. 234C is a front-right-side view of the charging station with the extendable prongs 23401 in the fully extended position. At the end of the prongs is shown an electrical connector node 23402. The charging station's casing 23403 is also depicted.

FIG. 235A illustrates an overhead-right-side view of the possible internal mechanism of the charging station. An internal gearbox 23505 is illustrated which manages the movement of the extendable prongs 23504. In this illustration, the extendable prongs are in the fully extended position. The extendable prongs have an electrical connector node 23506 on the end of them. Rotation of the extendable prongs 23504 is achieved by the workings of the following mechanism stored within the gearbox 23505. A worm 23500 is press fit onto the motor shaft. When the motor is running the worm 23500 will rotate with it. It meshes with worm gear 23501, and the worm gear 23501 meshes with the third gear 23502 and that one meshes with prong gear 23503. Gear section of prong gear 23503 is a slice of a full circle. The side walls of it are used with the walls of the gear box 23505 as mechanical stops so that prong gear 23503 cannot rotate further than desired. The flat extrusion coming out of prong gear 23503 fits into the slot on the prong 23504, allowing prong gear 23503 to control the orientation of the prong 23504. This arrangement is mirrored on the other side of the worm 23500. This allows the worm gear on the other side 23501 to rotate in the opposite direction of the worm gear 23501 which in turn makes the other prong 23505 rotate in the opposite direction of opposite prong 23505. Electrical connector node 23506 is shown at the end of the prong 204. FIGS. 235B and 235C illustrate the same internal mechanism but with the prongs positioned in a partially extended position in between the stored position and fully extended position and in a fully extended position, respectively.

In one embodiment, the prongs extend outward upon the detection of a mobile robot. In another embodiment, the prongs extend outward for a predetermined amount of time upon the detection of a mobile robot. In another embodiment electrical power is provided to the electrical connector node contacts which is then transferred to the battery of a mobile robot. In another embodiment, the prongs are extended or retracted at the mobile robotic vacuum user's or operator's command. In another exemplary embodiment, the extendable prongs could be extended outwards from the charging station in various configurations other than sideways. For instance, the charging prongs could extend downwards when charging is required and be retracted upwards back into the charging station when not in charging mode.

Figure 236A:
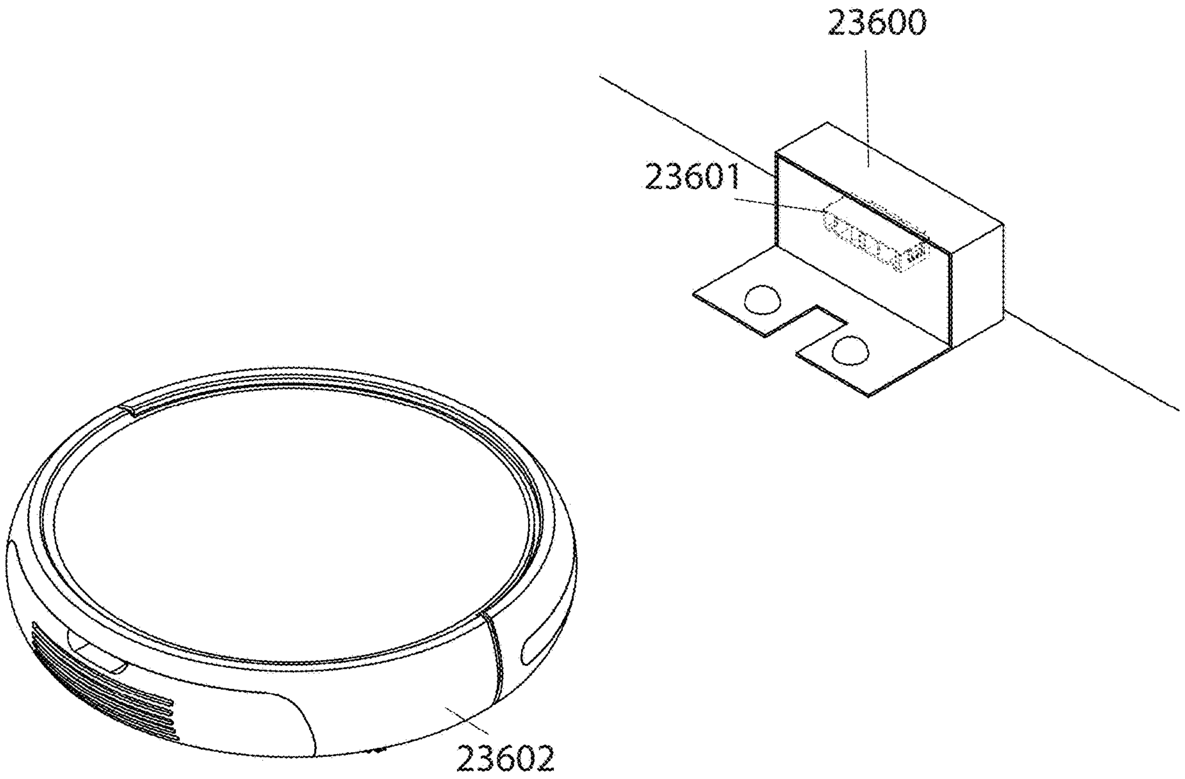
Figure 236B:
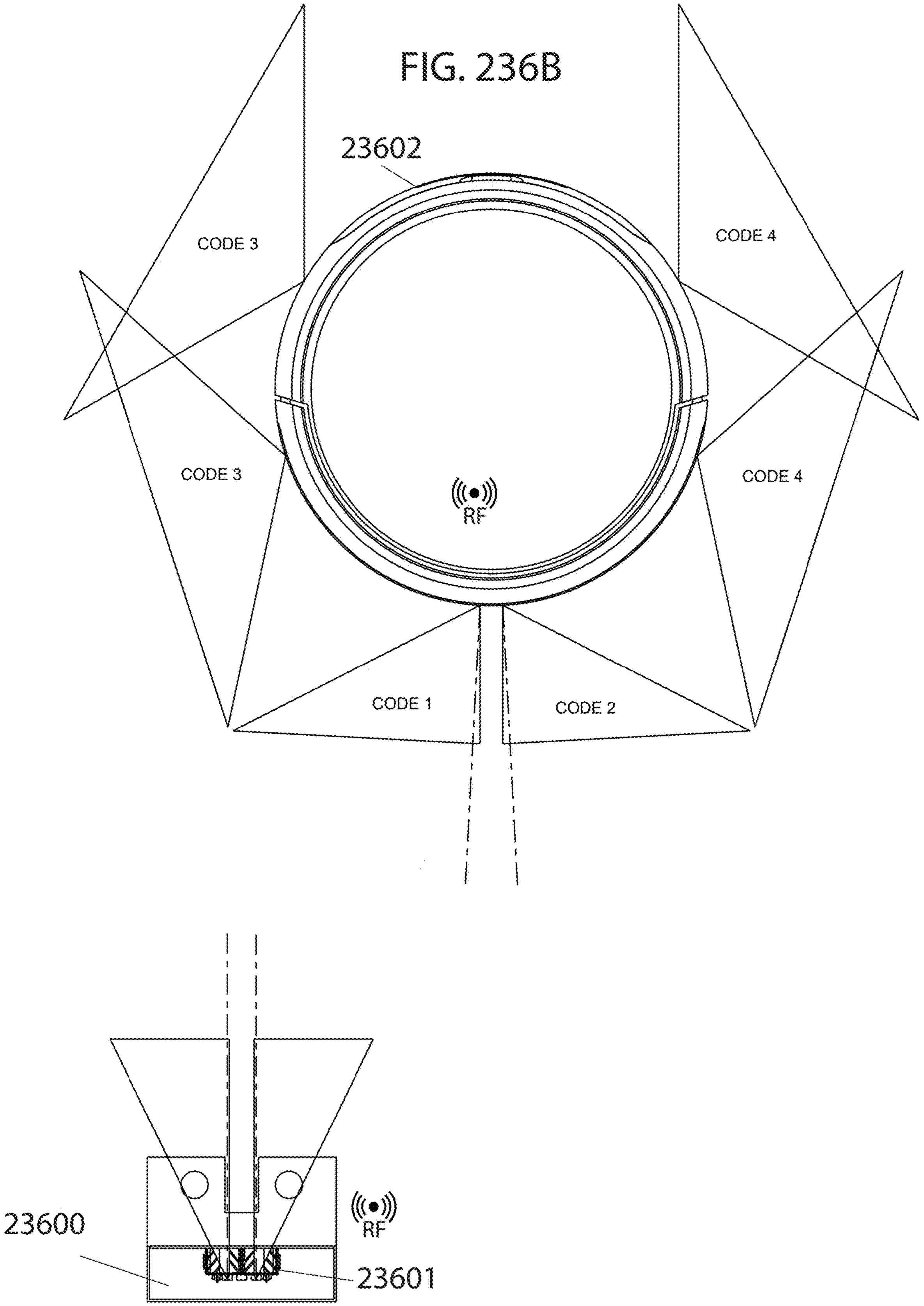
Figure 236C:
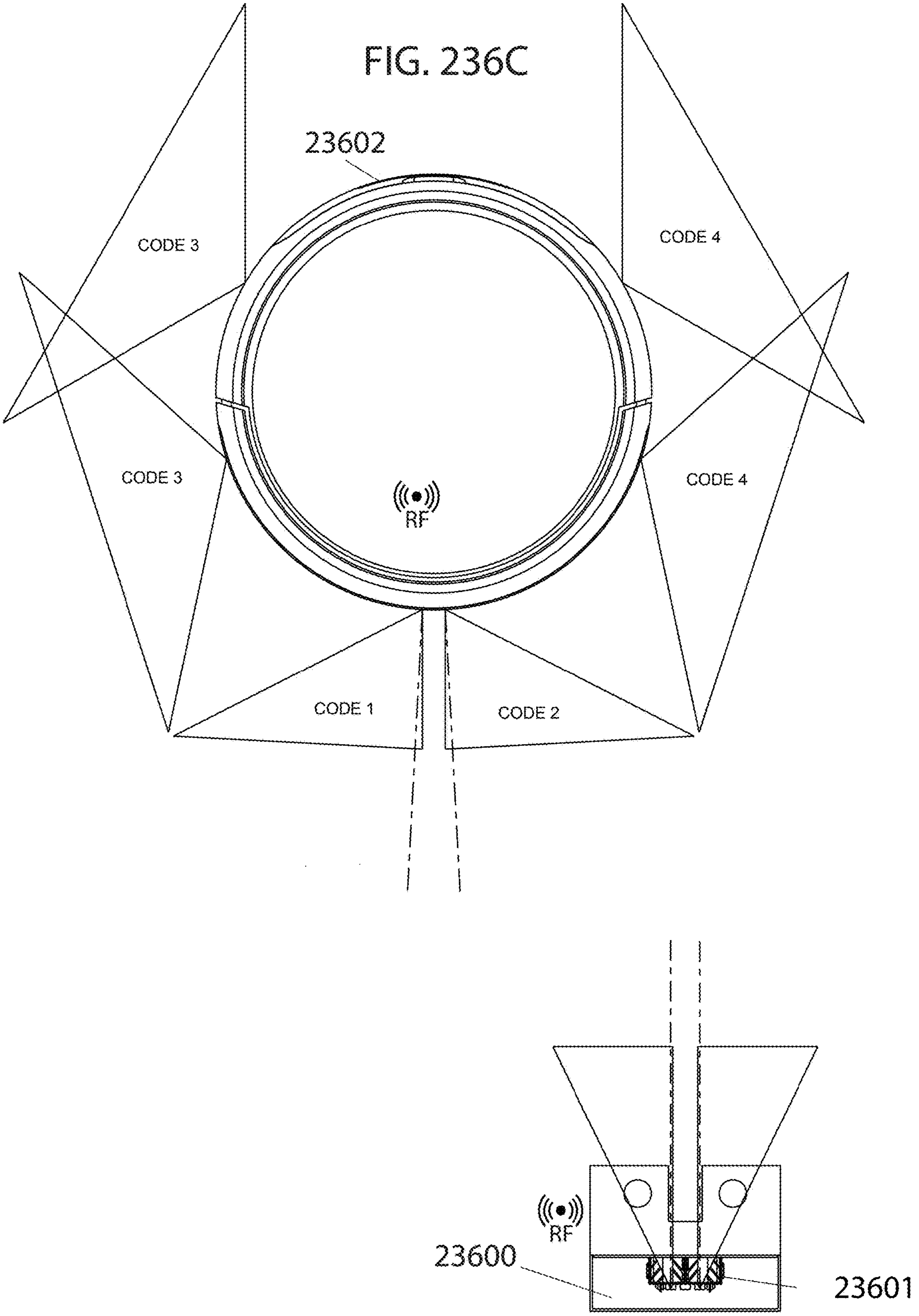
Figure 236F:
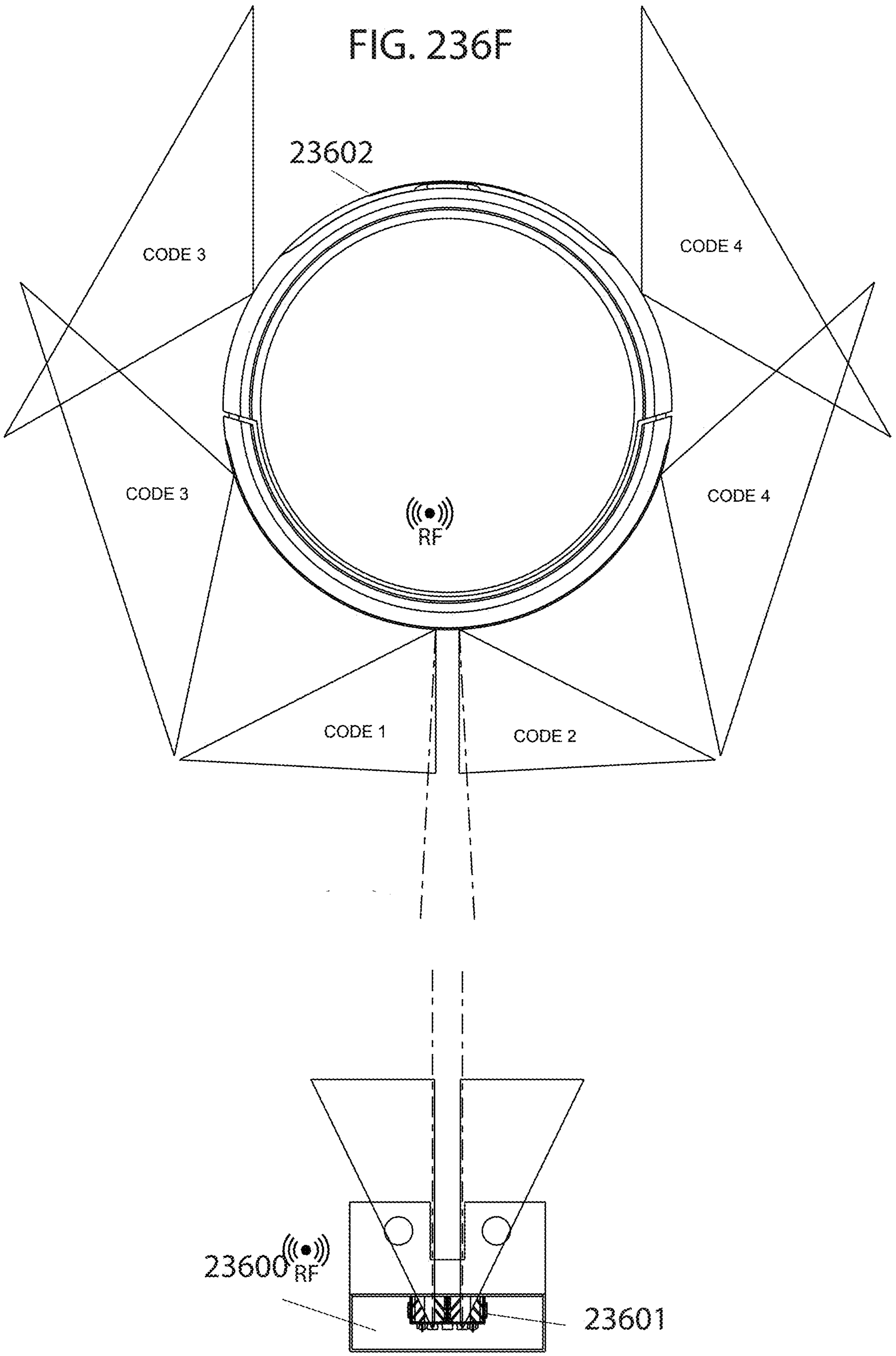

In some embodiments, the base station includes a mechanical filter such as that shown in FIGS. 112A-112F to reduce the likelihood of falsely detecting the robot approaching for charging. The mechanical filter only allows light within a predetermined range to be received by light receivers. FIGS. 112A and 112C illustrate a front and rear view, respectively, of the mechanical filter with openings 11200, 11201, and 11202 through which light may pass. FIGS. 112B and 112D illustrate a top plan and top perspective view of the mechanical filter with openings 11200, 11201, and 11202, and reflection absorbers 11203. FIG. 112E illustrates the constructed mechanical filter with top cover 11204. The mechanical filter is designed such that light receiving angle is 52 degrees and light reflector walls are 40 degrees with respect to a vertical. FIGS. 236A-236F illustrate charging station 23600 with mechanical filter 23601 and robot 23602. The charging station 23600 and the robot 23602 may communicate using RF signals. In some instances, different RF signals of the robot 23602 include different codes. Depending on which codes of the RF signals are received by the charging station 23600, the charging station may notify the robot 23602 if it is offset in either direction. In FIG. 236B, the charging station 23600 mainly receives code 1 from the RF signals from the robot 23602 and notifies the robot 23602 it is offset to the left. In FIG. 236C, the charging station 23600 mainly receives code 2 from the RF signals from the robot 23602 and notifies the robot 23602 it is offset to the right. In FIG. 236D, the charging station 23600 mainly receives code 4 from the RF signals from the robot 23602 and notifies the robot 23602 it needs to rotate counter clockwise. In FIG. 236E, the charging station 23600 mainly receives code 3 from the RF signals from the robot 23602 and notifies the robot 23602 it needs to rotate clockwise. In FIG. 236F, the charging station 23600 each receiver receives codes 1 and 2 from the RF signals from the robot 23602 and notifies the robot 23602 that both orientation and position of the robot are correct for docking.

Some embodiments provide a charging station for a mobile VMP robot including a main housing with electrical prongs, an opening in the main housing through which a charging cable housed within the main housing retracts and extends, a RF receiver, and one or more magnetic charging contacts disposed at a terminal end of the charging cable, wherein the terminal end of the charging cable with disposed one or more magnetic charging contacts is retracted within the main housing when charging mode is inactive and is extended through the opening in the main housing when charging mode is active.

In some embodiments, the mobile VMP robot includes one or more magnetic charging contacts corresponding with the one or more magnetic charging contacts disposed on the charging cable of the charging station. In some embodiments, the poles of the one or more magnetic charging contacts of the mobile VMP robot are opposite to the poles of the corresponding one or more magnetic charging contacts of the charging station. In some embodiments, the mobile VMP robot aligns its one or more magnetic charging contacts with the corresponding one or more magnetic charging contacts of the charging station using sensors of the mobile VMP robot. The magnetic property of the charging contacts aids in autonomously securing a connection between the one or more charging contacts of the charging station and the corresponding one or more charging contacts of the mobile VMP robot as they are attracted to one another.

In some embodiments, the RF receiver of the charging station receives signals transmitted by an RF transmitter disposed on the mobile VMP robot. When an omnidirectional radio signal transmitted from the RF transmitter disposed on the mobile VMP robot is within the range of the RF receiver disposed on the charging station, the RF receiver detects the signals and subsequently the presence of the mobile VMP robot approaching for charging. Once the mobile VMP robot is detected by the charging station, the charging station enters charging mode which causes a cable retraction-extension mechanism to extend the terminal end of the charging cable with disposed one or more magnetic charging contacts through the opening in the main housing for charging of the mobile VMP robot. When the RF receiver of the charging station no longer detects the signals transmitted from the RF transmitter of the mobile VMP robot, the charging station ceases charging mode which causes the cable retraction-extension mechanism to retract the terminal end of the charging cable with disposed one or more magnetic charging contacts through the opening into the main housing. In some embodiments, the RF transmitter disposed on the mobile VMP robot only transmits signals when charging is required and once charging is complete, the RF transmitter stops transmitting signals.

In some embodiments, the charging station further includes a RF transmitter and the mobile VMP robot further includes a RF receiver. In some embodiments, the RF receiver disposed on the mobile VMP robot receives the signals transmitted by the RF transmitter of the charging station, and if charging is required, the RF transmitter disposed on the mobile VMP robot transmits return signals to the RF receiver of the charging station. Upon receipt of the return signals by the RF receiver of the charging station, the charging station enters charging mode which causes the cable retraction-extension mechanism to extend the terminal end of the charging cable with disposed one or more magnetic charging contacts through the opening in the main housing for charging of the mobile VMP robot. When the RF receiver of the charging station no longer detects the return signals transmitted from the RF transmitter of the mobile VMP robot, the charging station ceases charging mode which causes the cable retraction-extension mechanism to retract the terminal end of the charging cable with disposed one or more magnetic charging contacts through the opening into the main housing. This avoids the charging station extending the charging cable when the mobile VMP robot is nearby but charging is not required. In some embodiments, wireless signals, such as RF, infrared, satellite, radar, radio, Bluetooth, Wi-Fi, etc., are used for communication between the charging station and mobile VMP robot.

In some embodiments, the mobile VMP robot disconnects its one or more magnetic charging contacts from the corresponding one or more magnetic charging contacts of the charging station by driving in a direction away from the charging station. In some embodiments, the charging station disconnects its one or more magnetic charging contacts from the corresponding one or more magnetic charging contacts of the mobile VMP robot by retracting the charging cable. In some embodiments, the one or more magnetic charging contacts of the mobile VMP robot and charging station are disconnected by the mobile VMP robot driving in the direction away from the charging station and the charging station simultaneously retracting the cable.

In some embodiments, the retraction-extension mechanism includes a motor attached to a reel around which the charging cable is wound. The motor causes rotation of the reel in one direction to extend the charging cable and in the opposite direction to retract the charging cable. In some embodiments, the charging cable is extended and retracted by manually rotating the wheel using a handle. In some embodiments, the charging cable is extended by pulling the charging cable and retracted by pushing a button disposed on the charging station or by a rapid tug of the charging cable that releases a torsion spring loaded reel to retract the charging cable. In other embodiments, other retraction-extension mechanisms are used to retract and extend the charging cable through the opening in the main housing.

In some embodiments, the charging station uses other methods for detecting the mobile VMP robot approaching for charging. In some embodiments, a visual or imaging sensor is disposed on the charging station and the charging station detects the mobile VMP robot approaching when the visual sensor detects the mobile VMP robot in its field of view. In other embodiments, an acoustic sensor disposed on the charging station detects a particular auditory frequency transmitted by a sensor disposed on the mobile VMP robot when it is within a predetermined range from the auditory sensor of the charging station. In some embodiments, a signal receiver disposed on the charging station detects a first unique signal (e.g., a signal including a unique sequence of numbers) transmitted by a signal transmitter of the mobile VMP robot when charging is required and a second unique signal transmitted by a signal transmitter of the mobile VMP robot when charging is no longer required. In other embodiments, other sensors (e.g., IR sensors, LIDAR, LADAR, distance sensors, RF sensors, etc.) can be used by the charging station to detect the presence and absence of the mobile VMP robot.

In some embodiments, the electrical prongs of the charging station are plugged into an electrical socket. In some embodiments, the electricity from the electrical socket powers the retraction-extension mechanism and charging of the mobile VMP robot. In some embodiments, the connection between the magnetic charging contacts of the charging station and the corresponding magnetic charging contacts of the mobile VMP robot completes an electrical charging circuit that allows electricity to flow to the mobile VMP robot for charging. In some embodiments, the charging station retracts the charging cable when the electrical charging circuit is incomplete.

In some embodiments, the charging station waits a predetermined amount of time before retracting the charging cable upon detecting charging is no longer required. In some embodiments, the charging station extends the charging cable upon detecting charging is required for a predetermined amount of time (e.g., after receiving a signal for a predetermined amount time).

In some embodiments, a length that the charging cable extends for charging of the mobile VMP robot is adjustable. In some embodiments, a user configures the length that the charging cable extends for charging of the mobile VMP robot using input buttons provided on the charging station. In some embodiments, the charging station extends the charging cable until a connection between the magnetic charging contacts of the charging station and the corresponding magnetic charging contacts of the mobile VMP robot is detected by, for example, a completed electrical charging circuit. In some embodiments, the charging station retracts the charging cable the same length as extended. In some embodiments, the charging station retracts the charging cable until a sensor of the charging station detects that the one or more charging contacts are within the main housing.

Figure 237A:
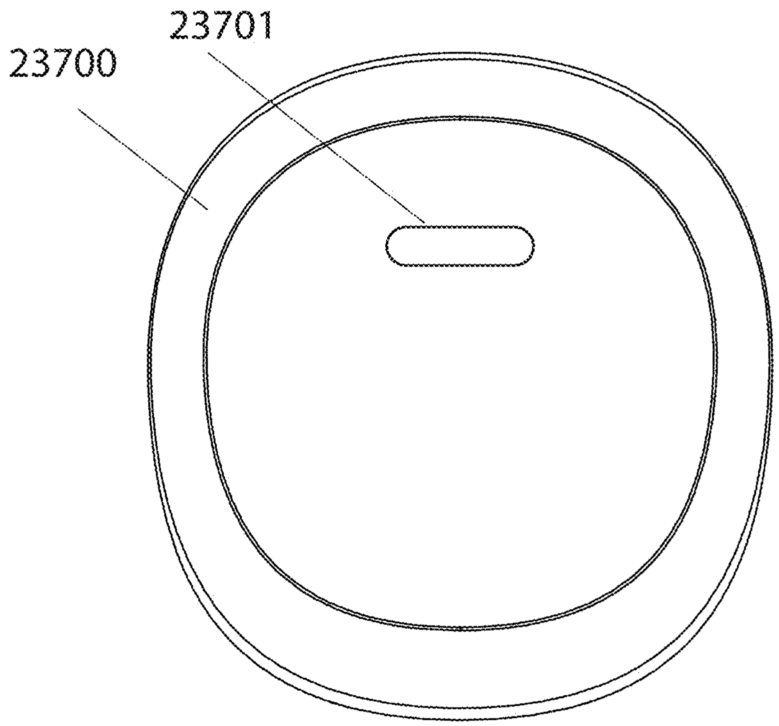
Figure 237B:
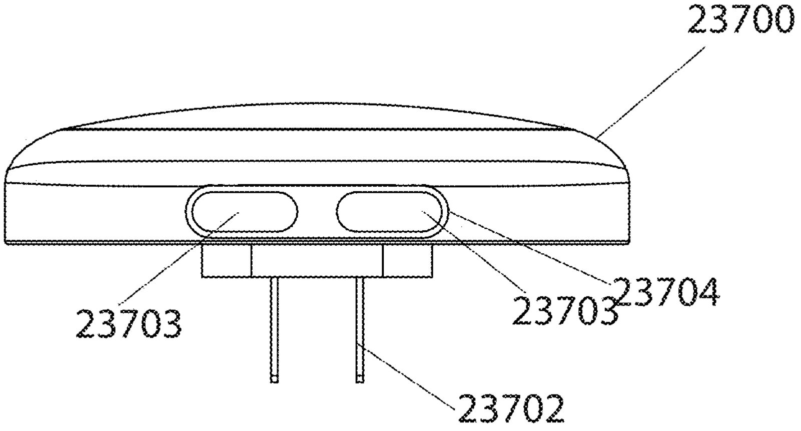
Figure 237C:
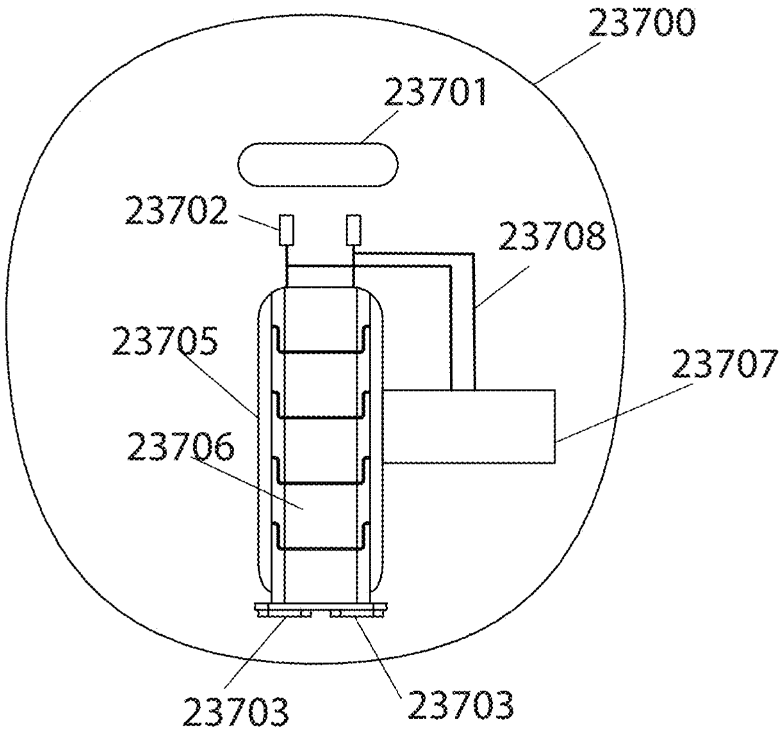

FIG. 237A illustrates a front view of a charging station including main housing 23700 and wireless signal receiver 23701 for receiving wireless signals transmitted from a wireless signal transmitter of a corresponding mobile VMP robot. FIG. 237B illustrates a bottom view of the charging station including main housing 23700, electrical prongs 23702, magnetic charging contacts 23703, and opening 23704 of main housing 23700 through which a charging cable (not shown) on which magnetic charging contacts 23703 are disposed extends and retracts. FIG. 237C illustrates a cross-sectional front view of the charging station including main housing 23700, wireless signal receiver 23701, reel 23705 around which charging cable 23706 with magnetic charging contacts 23703 is wound, motor 23707 for driving the reel to extend and retract magnetic charging contacts 23703 disposed at the terminal end of charging cable 23706, and electrical elements 23708 (e.g., electrical wires) coupling with electrical prongs 23702 with charging cable 23706 and motor 23707 to provide power to motor 23707 and electricity to magnetic charging contacts 23703 through charging cable 23706 when connected with corresponding magnetic charging contacts of the mobile VMP robot (not shown) to charge the mobile VMP robot. In FIGS. 237A-237C charging cable 23706 is retracted within main housing 23700 as charging mode is deactivated.

Figure 237D:
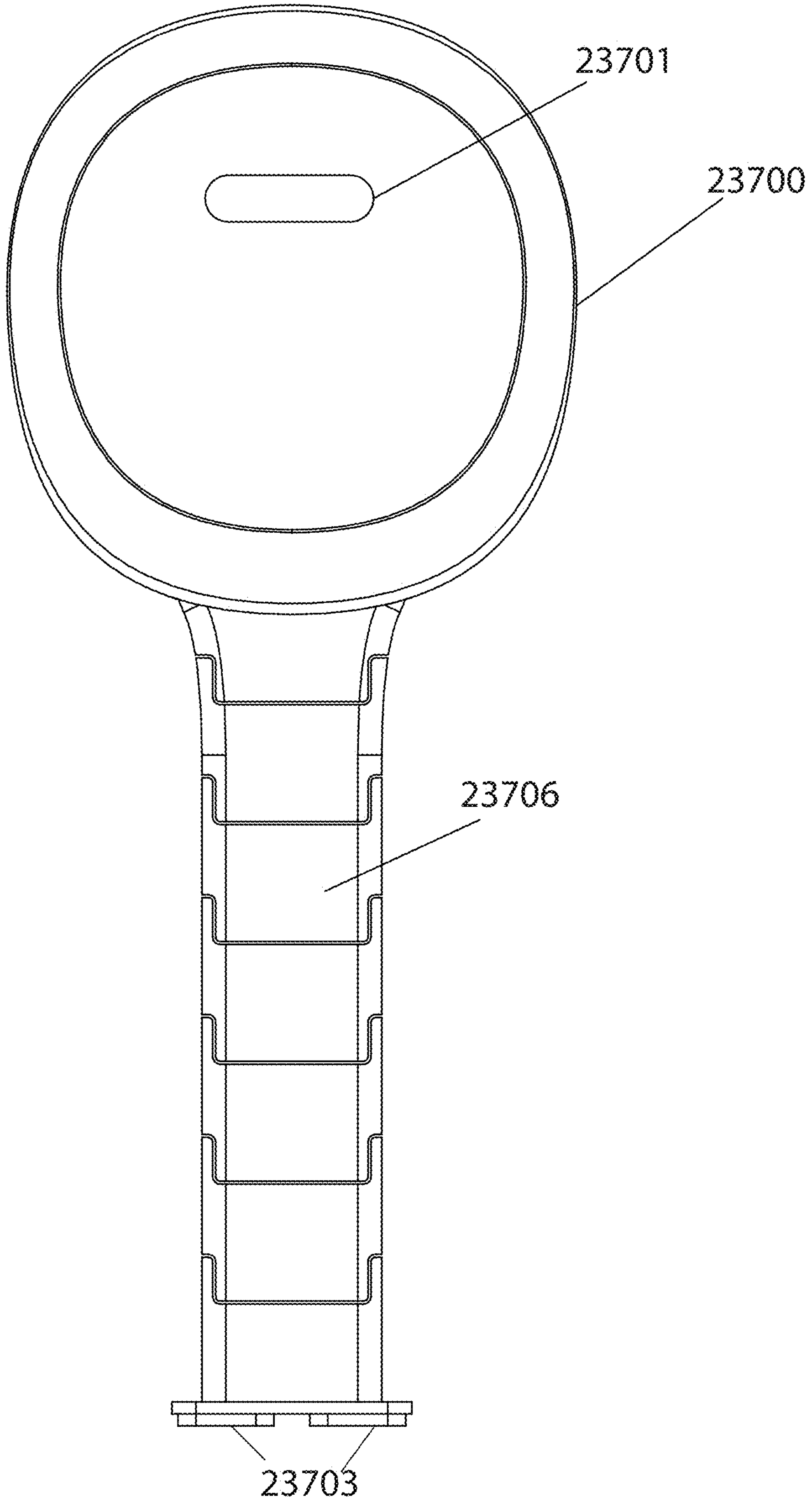

FIG. 237D illustrates a front view of the charging station with wireless signal receiver 23701 and charging cable 23706 with magnetic charging contacts 23703 disposed thereon extended from within main housing 23700. In some embodiments, charging cable 23706 includes links connected to one another. In some embodiments, links can be added or removed to adjust the length of the charging cable 23706. For example, links are added or removed to adjust the length of charging cable 106 depending on the height of an electrical wall socket to which the charging station is plugged. In other embodiments, charging cable 23706 is a continuous cord, such as a cord of a mobile phone charger or a laptop charger. In FIG. 237D charging cable 23706 is extended from within main housing 23700 as charging mode is activated.

FIG. 238A illustrates the charging station with charging cable 23706 (not shown) retracted within main housing 23700, as charging mode is deactivated as a result of wireless signal receiver 23701 detecting an absence of wireless signals transmitted from a wireless transmitter of the mobile VMP robot (not shown). In FIG. 238B wireless signal receiver 23701 receives wireless signals transmitted by wireless signal transmitter 23800 disposed on mobile VMP robot 23801. Mobile VMP robot 23801 transmits signals from wireless signal transmitter 23800 when approaching for charging. Upon wireless signal receiver 23701 of the charging station receiving wireless signals transmitted by wireless signal transmitter 23800 of mobile VMP robot 23801, the charging station enters charging mode which causes a cable retraction-extension mechanism to extend charging cable 23706 with disposed magnetic charging contacts 23703 through opening 23704 (not shown) in main housing 23700 for charging of mobile VMP robot 23801. Mobile VMP robot 23800 aligns its magnetic charging contacts 23802 with magnetic charging contacts 23703 of the charging station. Magnetic charging contacts 23802 of mobile VMP robot 23800 has opposite poles to corresponding magnetic charging contacts 23703 of the charging station. The magnetic property of charging contacts 23802 and 23803 aids in autonomously securing a connection for charging as they are attracted to one another. When charging is complete wireless signal transmitter 23800 disposed on mobile VMP robot 23801 ceases transmission of signals and begins to move in a direction away from the charging station. When wireless signal receiver 23704 of the charging station no longer detects the signals transmitted wireless signal transmitter 23800 of mobile VMP robot 23801, the charging station ceases charging mode which causes the cable retraction-extension mechanism to retract charging cable 23706 with disposed magnetic charging contacts 23703 through opening 23704 (not shown) into main housing 23700. The charging station with retracted charging cable 23706 is shown in FIG. 238A.

Another example of recharge station for recharging a battery of a mobile robot and method for navigating a mobile robot thereto is provided. FIG. 239A illustrates an example of a mobile robot. The mobile robot 23900 may be comprised of a casing or shell 23902, left and right wheels 23904, a front wheel 23906, a rechargeable battery 123908, charging contacts 23910 that are electrically coupled to the battery, processor (not illustrated), a right signal receiver 23912 and a left signal receiver 23914, the signal receivers being electrically coupled to the processor. Line 23916 represents the work surface upon which the mobile robot drives. Various types of mobile robots with different components or layouts may be used in conjunction with the presented recharge station, so long as the charging contacts and signal receivers are compatible (positioned appropriately to make contact or receive signals) with the below described recharge station. The example mobile robot is given for illustrative purposes only and is not intended to limit the scope of the invention. FIG. 239B illustrates recharge station 23918. Recharge station 23918 is comprised of housing 23920, charging contacts 23922, which are arranged on the surface of the housing so that the charging contacts 23910 (see FIG. 239A) of the mobile robot will make contact with them when the mobile robot drives up to and against the recharge station, power supply 23924 which is electrically coupled to the charging contacts and supplies power thereto, left signal emitter 23926 situated within and at the back of channel 23930, and right signal emitter 23928 situated within and at the back of channel 23932. The channels 23930 and 23932 serve to limit the signal range of the respective signal emitters 23926, 23928.

FIG. 240 illustrates an overhead view of recharge station 23918. As before, recharge station includes housing 23920, charging contacts 23922, power supply 23924, left signal emitter 23926, and right signal emitter 23928. Channels 23930 and 23932 can be seen limiting the signal range of emitters 23926, 23928. Left signal emitter 23926 emits a first signal 23934 in range 24000 and right signal emitter

23928 emits a second signal 23936 in range 24002. The first and second signals are unique from each other so that they may be differentiated by receivers. Signals may be differentiated by any of: a color of a signal, a carrier frequency of a signal, a modulation of a signal, a bit pattern of a signal, or a wavelength of a signal. Signals may be pulsed, emitted at intervals, or continuous. A number of baffles 23938 may also be provided within the housing to further limit the range of the signals and prevent signal reflections from creating false signals. In the preferred embodiment, baffles as well as the walls of the housing are made of a signal-absorbing material. It should be noted that range 24000 and range 24002 do not overlap. The signals 23934 and 23936 are each emitted within their own range that is not common with the range of the other signal emitter.

FIG. 241 illustrates an overhead view of recharge station 23918 used in conjunction with mobile robot 23900. Mobile robot 23900 aligns itself with recharge station 23918 using input from left and right signal receivers 23914, 23912. When left signal receiver 23914 detects signals 23934 and right signal receiver 23912 detects signals 23936, then the mobile robot is substantially correctly aligned with the recharge station 23918. From this point, the mobile robot needs only to drive in a forward direction until it charging contacts 23910 are positioned over the charging contacts 23922 to complete the battery circuit and charge the battery 23908. A processor (not illustrated) within the mobile robot 24000 may be programmed to seek a state in which both of these conditions are met when it enters a recharge station seeking mode. That is, the processor may be configured to seek a state in which the left signal receiver 23914 detects signals 23934 and the right signal receiver 23912 detects signals 23936. Seeking such a state may be carried out by driving the mobile robot in a random pattern or by following a set of navigation instructions or by using SLAM or other mapping technology to navigate to the general location of the recharge station and then using signal input as described herein to more precisely navigate to the recharge station.

The processor may be further configured to adjust movement of the mobile robot based on signals received by the receivers. For example, in some embodiments, when right signal receiver 23912 receives signals 23934 and left signal receiver 23914 receives no signals, the processor may be configured to turn the mobile robot clockwise a predetermined number of degrees, or until, for example left receiver 23914 detects signals 23934, then drive forward a predetermined distance, then rotate in a counterclockwise direction until left receiver 23914 detects signals 23934 and right receiver 23912 detects signals 23936. In a like manner, in some embodiments, when left signal receiver 23914 receives signals 23936 and right signal receiver 23912 receives no signals, the processor may be configured to turn the mobile robot counterclockwise a predetermined number of degrees, or until, for example, right receiver detects signals 23936, then drive forward a predetermined distance, then rotate in a clockwise direction until right receiver 23912 detects signals 23936 and left receiver 23914 detects signals 23934.

Additional navigational instructions may be defined for various scenarios, such as when the same signal is received by both receivers, when the receivers receive the correct signals for a period but after driving a distance, one of the receivers no longer receivers the corresponding correct modulated signal, etc.

FIG. 242 illustrates an overhead view of a mobile robot 23900 recharging on a recharge station 23918. (Some of the numbers have been omitted in this view so as not to unnecessarily obscure the invention.) As can be seen, charging contacts 23910 on mobile robot 23900 are positioned over charging contacts 23922 on the recharge station 23918, which causes them to make contact and complete the battery circuit to charge the battery 23908.

Figure 243A:
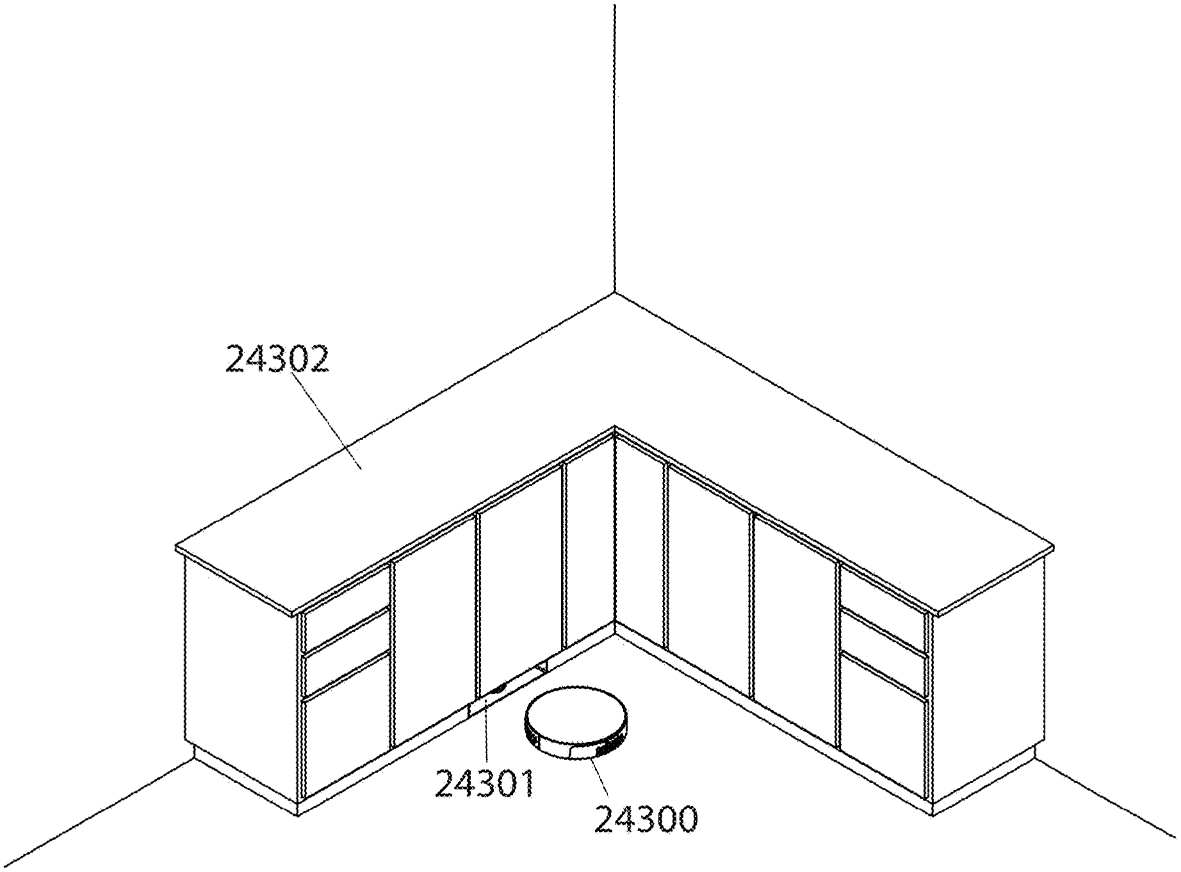
Figure 243B:
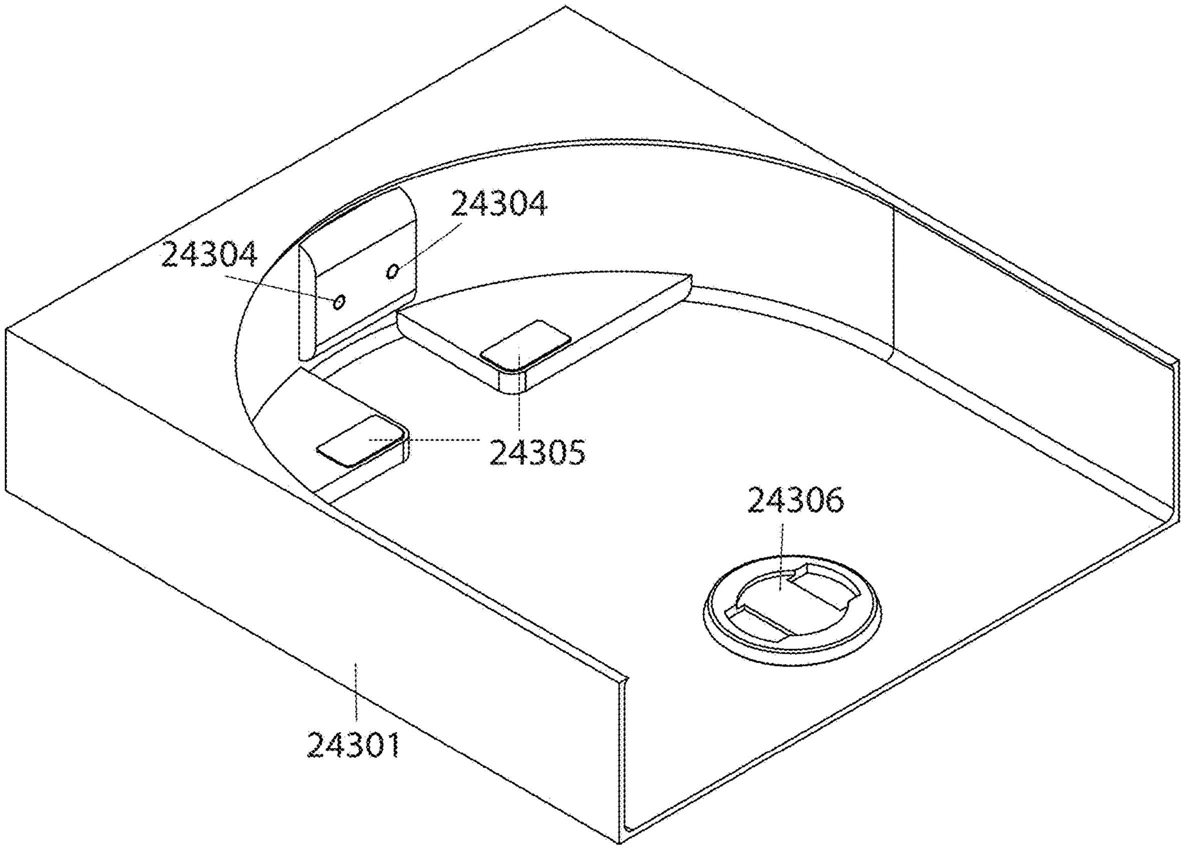
Figure 243C:
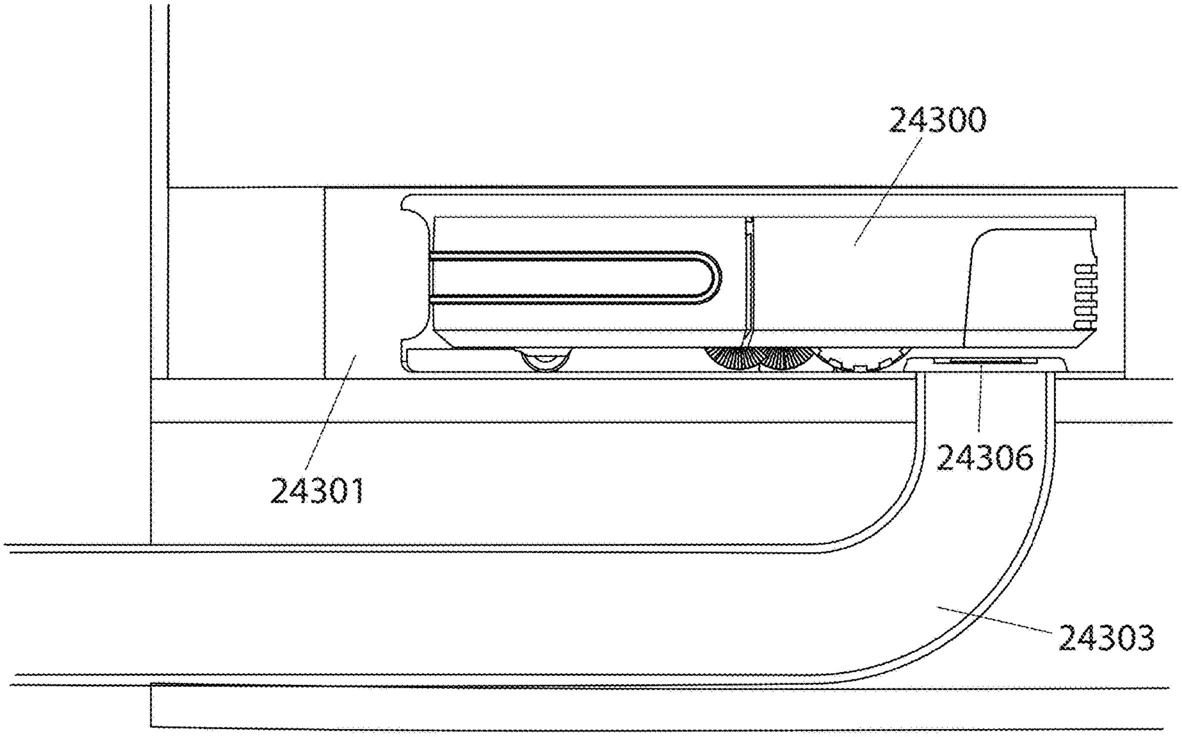
Figure 243D:
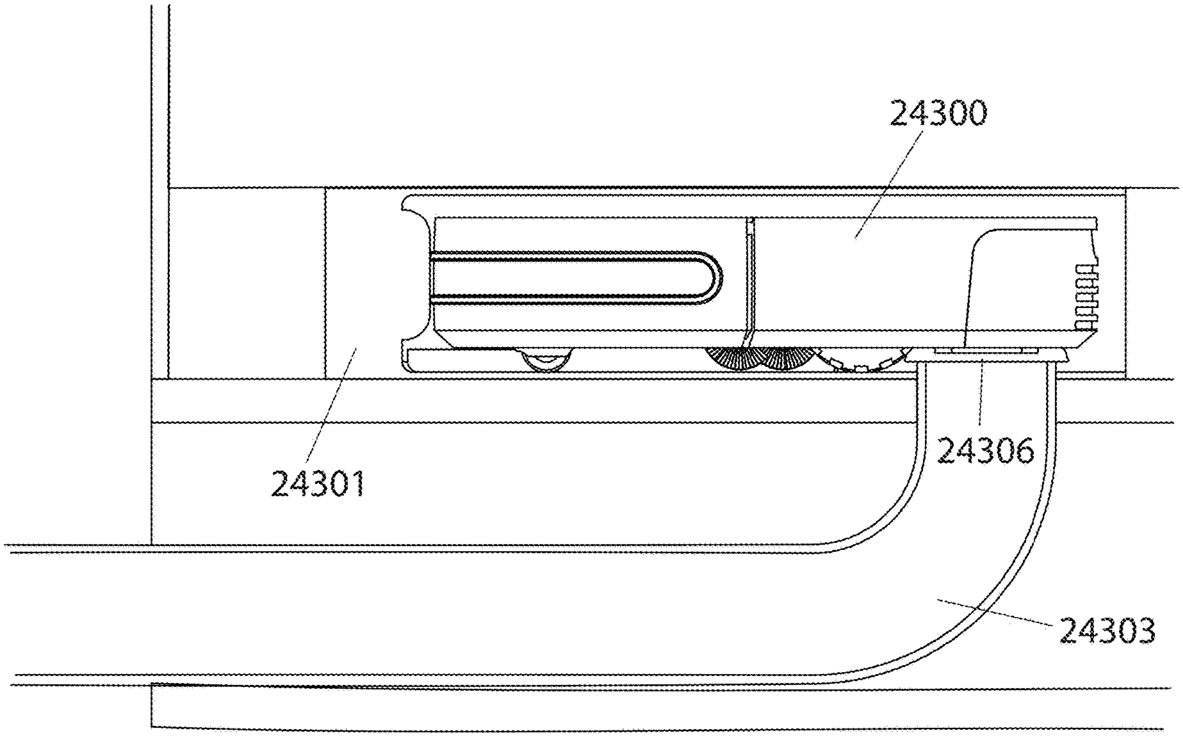

Another example of a charging station is illustrated in FIGS. 243A-243D that may be directly connected to the central vacuum system of a home. In FIG. 243A robot 24300 and charging station 24301 are illustrated. Charging station 24301 is installed beneath cabinets 24302 and is directly connected to central vacuum system 24303 of the home (not shown). FIG. 243B illustrates a perspective view of the charging station 24301 with sensors 24304 used by the robot to align with the charging station for docking, charging pads 24305, and suction interface 24306 connected with the central vacuum system 24303 (not shown). FIG. 243C illustrates the charging station 24301 connected to the central vacuum system 24303 of the home and robot 24300 positioned on the charging station 24301. When robot 24300 is positioned on the charging station 24301, suction interface 24306 extends and connects with an opening of a dustbin of the robot, as illustrated in FIG. 243D, such that the dust and debris within the dustbin may be removed by suction via the central vacuum system 24303. In some embodiments, the processor and charging station may detect when the robot 24300 is fully positioned on charging state 24301, thereby triggering the connection between the central vacuum system 24303 and the dustbin.

In some embodiments, the charging station is used for communication between an application of a communication device (such as that described above) and the VMP robot. For example, FIG. 244 illustrates a flowchart depicting an embodiment of a method of sending information to a robot via cloud service. An application of communication device 24400 transmits information to Wi-Fi router 24401, which then sends the information to cloud service 24402. Cloud service 24402 transmits the information to Wi-Fi router 24401, which then relays the information to docking station (or charging station) 24403. Docking station 24403 is able to receive and store information until robot 24404 is able to accept the information. Once robot 24404 is able to accept information (e.g., after completing a work session), docking station 24403 transmits the information to a processor of robot 24404 via wireless RF. In some embodiments, docking station 24403 may transmit the information to robot 24404 via Wi-Fi or other protocols capable of wireless transmission of information. In some embodiments, the application of the communication device may retrieve information from the cloud service and the docking station may transmit information to the cloud service. In some embodiments, the robot may transmit information to the docking station to transmit to the cloud service. Therefore, in some embodiments the robot, docking station, and application of the communication device may retrieve and transmit information to and from one another. In some embodiments, information may be configured to be transmitted to and received from cloud service 24401 via wireless Wide Area Network (WAN) connection, such as a mobile device carrier network. In cases where the data is transmitted and received using a WAN connection, the user may send information and remotely monitor status information, such as the status of the robot or status of the working environment, such as room temperature. In embodiments, the transfer of information between the application of the communication device, wireless router, and cloud service and/or the charging station, wireless router, and cloud service and/or the charging station and robotic device may include additional steps of which are not depicted herein. FIG. 245 illustrates a flow chart depicting an embodiment of a method for sending information to a robot locally. An application of communication device 24500 transmits information directly to Wi-Fi router 24501, which then sends the information to docking station 24502 via Wi-Fi. Docking station 24502 may receive and store information until robot 24503 is able to accept the information. Once robot 24503 is able to accept information, docking station 24502 may transmit the information to the processor of robot 24503 via wireless RF. In some embodiments, docking station 24502 may transmit the information to robot 24503 via Wi-Fi or other protocols capable of wireless transmission of information. In some embodiments, the application of the communication device may retrieve information from the Wi-Fi router and the docking station may transmit information to the Wi-Fi router. In embodiments, the robot may transmit information to the docking station to transmit to the Wi-Fi router that may later be retrieved by the application of the communication device. Therefore, in embodiments the robot, docking station and application of the communication device may retrieve and transmit information from and to one another. In some embodiments, information may be configured to be transmitted to and received from Wi-Fi router(s) via wireless Local Area Network (LAN) connection. In some embodiments, data may be transmitted and received using LAN connection such that no data is transmitted over WAN. In some embodiments, data may be transmitted and received using both a LAN and a WAN connection. In embodiments, the transfer of information between the application of the communication device and wireless router and/or the charging station and wireless router and/or the charging station and robotic device may include additional steps of which are not depicted herein or may be done through other communication channels, such as the use of Bluetooth. In some embodiments, the docking station may be replaced by any other stationary device capable of transmitting and receiving information to and from the cloud service, and capable of transmitting and receiving information to and from the charging device. In some embodiments, the robotic device may dock or charge at a separate device than the stationary device used for the transfer of information to and from the cloud service and the transfer of information to and from the robotic device. For example, a stationary device having memory, processor, Wi-Fi module and RF module may perform the same functions as those of the charging station depicted in FIG. 244 or FIG. 245. In some embodiments, the robotic device may connect directly to the cloud service and bypass the charging station.

The charging stations described here are not intended as being limited in applicability for particular types of VMP robots. For example, robotic cleaning devices, robotic towing devices, VMP robots that can carry and transport any type of payload, robotic security devices, robotic vehicles, robotic waiters, robotic shopping carts, robotic refuse containers, and the like. In an alternative embodiment, a single charging station may be used for the charging of multiple different types of robots. In some embodiments, the charging stations described herein may be reconfigured (e.g., changed in size or shape or organization of components) such that they may charge different types of robots. Charging stations used outdoors may use solar power for charging. In some embodiments, the battery of the VMP robot may be charged by directly plugging into a socket, or by connecting with a charging station. In some embodiments, the battery of the VMP robot may be charged by connecting with a charging station that is powered using solar energy. In some embodiments, the VMP robot may include solar panels and may be powered using solar energy.

In some embodiments, the VMP robot may include one or more protective covers for covering all or a portion of the body of the VMP robot. In some embodiments, the protective cover prevents the VMP robot and an object with which the VMP robot collides with from damage (e.g., dent, mark, scratch, crack, etc.). In some embodiments, the cover is fabricated from a rigid or flexible material. Examples of cover materials include rubber, rigid plastic, felt, cloth, flexible gel, etc. In some embodiments, the robotic surface cleaner may use one or more covers that are strategically positioned on the robot to protect portions of the robot that are more susceptible to damage (e.g., front portion of the robot). For example, a robotic surface cleaner may collide with a leg of a dining table during mapping or cleaning. A rubber cover of a front of the robotic surface cleaner may protect the furniture and the body of the robotic surface cleaner from damage as the rubber acts as a barrier during the collision, absorbing the impact instead of the furniture or body of the robot. In some embodiments, the cover may be easily attached and removed from the robot. For example, the cover may slide over the body of the robot. In another example, the cover may stick to a portion of the robot and may easily be peeled off of the robot. In one example, the cover is attached to the robot using an adhesive. The protective cover may be of any color. In some embodiments, the cover avoids covering sensors of the robot. In some embodiments, the cover covers sensors, providing protection for sensors as well, without affecting their functionality. For example, the cover may be a clear plastic and may not affect the ability of the sensor to observe the environment. In some embodiments, one or more protective covers are placed on objects within the environment as opposed to the robot. In some embodiments, one or more protective covers are placed on the robot and objects within the environment.

In some embodiments, the processor of the VMP robot autonomously adjust settings based on environmental characteristics observed using one or more environmental sensors (e.g., sensors that sense attributes of a driving surface, a wall, or a surface of an obstacle in an environment). Examples of methods for adjusting settings of a robot based on environmental characteristics observed are described in U.S. Patent Application Nos. 62/735,137 and Ser. No. 16/239,410. For example, in the case of a VMP robot customized as a smart bin, the processor may increase the power provided to the wheels when driving over grass as compared to cement such that a particular speed may be maintained despite the added friction from the grass. The processor may determine driving surface type using sensor data, wherein, for example, distance measurements for cement are more consistent over time as compared to grass due to the texture of grass. In some embodiments, the environmental sensor is communicatively coupled to the processor of the VMP robot and the processor of the VMP robot processes the sensor data (a term which is used broadly to refer to information based on sensed information at various stages of a processing pipeline). In some embodiments, the sensor includes its own processor for processing the sensor data. Examples of sensors include, but are not limited to (which is not to suggest that any other described component of the robotic cleaning device is required in all embodiments), floor sensors, debris sensors, obstacle sensors, cliff sensors, acoustic sensors, cameras, optical sensors, distance sensors, motion sensors, tactile sensors, electrical current sensors, and the like. The sensor may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment (e.g., periodically, like more often than once every 5 seconds, every second, every 500 ms, every 100 ms, or the like) and the processor obtains the sensor data. In some embodiments, the sensed data is associated with location data of the VMP robot indicating the location of the VMP robot at the time the sensor data was obtained. In some embodiments, the processor infers environmental characteristics from the sensory data (e.g., classifying the local environment of the sensed location within some threshold distance or over some polygon like a rectangle as being with a type of environment within a ontology, like a hierarchical ontology). In some embodiments, the processor infers characteristics of the environment in real-time (e.g., during a cleaning or mapping session, with 10 seconds of sensing, within 1 second of sensing, or faster) from real-time sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, lawn mower blade, etc.) based on the environmental characteristics inferred (in some cases in real-time according to the preceding sliding windows of time). In some embodiments, the processor activates or deactivates (or modulates intensity of) functions (e.g., vacuuming, mopping, UV sterilization, digging, mowing, salt distribution, etc.) based on the environmental characteristics inferred (a term used broadly and that includes classification and scoring). In other instances, the processor adjusts a movement path, operational schedule (e.g., time when various designated areas are operated on or operations are executed), and the like based on sensory data. Examples of environmental characteristics include driving surface type, obstacle density, room type, level of debris accumulation, level of user activity, time of user activity, etc.

In some embodiments, the processor of the VMP robot marks inferred environmental characteristics of different locations of the environment within a map of the environment based on observations from all or a portion of current and/or historical sensory data. In some embodiments, the processor modifies the environmental characteristics of different locations within the map of the environment as new sensory data is collected and aggregated with sensory data previously collected or based on actions of the VMP robot (e.g., operation history). For example, in some embodiments, the processor of a street sweeping robot determines the probability of a location having different levels of debris accumulation (e.g., the probability of a particular location having low, medium and high debris accumulation) based on the sensory data. If the location has a high probability of having a high level of debris accumulation and was just cleaned, the processor reduces the probability of the location having a high level of debris accumulation and increases the probability of having a low level of debris accumulation. Based on sensed data, some embodiments may classify or score different areas of a working environment according to various dimensions, e.g., classifying by driving surface type in a hierarchical driving surface type ontology or according to a dirt-accumulation score by debris density or rate of accumulation.

In some embodiments, the map of the environment is a grid map wherein the map is divided into cells (e.g., unit tiles in a regular or irregular tiling), each cell representing a different location within the environment. In some embodiments, the processor divides the map to form a grid map. In some embodiments, the map is a Cartesian coordinate map while in other embodiments the map is of another type, such as a polar, homogenous, or spherical coordinate map. In some embodiments, the environmental sensor collects data as the VMP robot navigates throughout the environment or operates within the environment as the processor maps the environment. In some embodiments, the processor associates each or a portion of the environmental sensor readings with the particular cell of the grid map within which the VMP robot was located when the particular sensor readings were taken. In some embodiments, the processor associates environmental characteristics directly measured or inferred from sensor readings with the particular cell within which the VMP robot was located when the particular sensor readings were taken. In some embodiments, the processor associates environmental sensor data obtained from a fixed sensing device and/or another robot with cells of the grid map. In some embodiments, the VMP robot continues to operate within the environment until data from the environmental sensor is collected for each or a select number of cells of the grid map. In some embodiments, the environmental characteristics (predicted or measured or inferred) associated with cells of the grid map include, but are not limited to (which is not to suggest that any other described characteristic is required in all embodiments), a driving surface type, a room or area type, a type of driving surface transition, a level of debris accumulation, a type of debris, a size of debris, a frequency of encountering debris accumulation, day and time of encountering debris accumulation, a level of user activity, a time of user activity, an obstacle density, an obstacle type, an obstacle size, a frequency of encountering a particular obstacle, a day and time of encountering a particular obstacle, a level of traffic, a driving surface quality, a hazard, etc. In some embodiments, the environmental characteristics associated with cells of the grid map are based on sensor data collected during multiple working sessions wherein characteristics are assigned a probability of being true based on observations of the environment over time.

In some embodiments, the processor associates (e.g., in memory of the VMP robot) information such as date, time, and location with each sensor reading or other environmental characteristic based thereon. In some embodiments, the processor associates information to only a portion of the sensor readings. In some embodiments, the processor stores all or a portion of the environmental sensor data and all or a portion of any other data associated with the environmental sensor data in a memory of the VMP robot. In some embodiments, the processor uses the aggregated stored data for optimizing (a term which is used herein to refer to improving relative to previous configurations and does not require a global optimum) operations within the environment by adjusting settings of components such that they are ideal (or otherwise improved) for the particular environmental characteristics of the location being serviced or to be serviced.

In some embodiments, the processor generates a new grid map with new characteristics associated with each or a portion of the cells of the grid map at each work session. For instance, each unit tile may have associated therewith a plurality of environmental characteristics, like classifications in an ontology or scores in various dimensions like those discussed above. In some embodiments, the processor compiles the map generated at the end of a work session with an aggregate map based on a combination of maps generated during each or a portion of prior work sessions. In some embodiments, the processor directly integrates data collected during a work session into the aggregate map either after the work session or in real-time as data is collected. In some embodiments, the processor aggregates (e.g., consolidates a plurality of values into a single value based on the plurality of values) current sensor data collected with all or a portion of sensor data previously collected during prior working sessions of the VMP robot. In some embodiments, the processor also aggregates all or a portion of sensor data collected by sensors of other VMP robots or fixed sensing devices monitoring the environment.

In some embodiments, the processor (e.g., of a robot or a remote server system, either one of which (or a combination of which) may implement the various logical operations described herein) determines probabilities of environmental characteristics (e.g., an obstacle, a driving surface type, a type of driving surface transition, a room or area type, a level of debris accumulation, a type or size of debris, obstacle density, level of traffic, driving surface quality, etc.) existing in a particular location of the environment based on current sensor data and sensor data collected during prior work sessions. For example, in some embodiments, the processor updates probabilities of different driving surface types existing in a particular location of the environment based on the currently inferred driving surface type of the particular location and the previously inferred driving surface types of the particular location during prior working sessions of the VMP robot and/or of other robots or fixed sensing devices monitoring the environment. In some embodiments, the processor updates the aggregate map after each work session. In some embodiments, the processor adjusts speed of components and/or activates/deactivates functions based on environmental characteristics with highest probability of existing in the particular location of the VMP robot such that they are ideal for the environmental characteristics predicted. For example, based on aggregate sensory data there is an 85% probability that the type of driving surface in a particular location is hardwood, a 5% probability it is carpet, and a 10% probability it is tile. The processor adjusts the speed of components to ideal speed for hardwood flooring given the high probability of the location having hardwood flooring. Some embodiments may classify unit tiles into a flooring ontology, and entries in that ontology may be mapped in memory to various operational characteristics of actuators of the VMP robot that are to be applied.

In some embodiments, the processor uses the aggregate map to predict areas with high risk of stalling, colliding with obstacles and/or becoming entangled with an obstruction. In some embodiments, the processor records the location of each such occurrence and marks the corresponding grid cell(s) in which the occurrence took place. For example, the processor uses aggregated obstacle sensor data collected over multiple work sessions to determine areas with high probability of collisions or aggregated electrical current sensor of a peripheral brush motor or motor of another device to determine areas with high probability of increased electrical current due to entanglement with an obstruction. In some embodiments, the processor causes the VMP robot to avoid or reduce visitation to such areas.

In some embodiments, the processor uses the aggregate map to determine a navigational path within the environment, which in some cases, may include a coverage path in various areas (e.g., areas including collections of adjacent unit tiles, like rooms in a multi-room work environment). Various navigation paths may be implemented based on the environmental characteristics of different locations within the aggregate map. For example, the processor may generate a movement path that covers areas only requiring low impeller motor speed (e.g., areas with low debris accumulation, areas with hardwood floor, etc.) when individuals are detected as being or predicted to be present within the environment to reduce noise disturbances. In another example, the processor generates (e.g., forms a new instance or selects an extant instance) a movement path that covers areas with high probability of having high levels of debris accumulation, e.g., a movement path may be selected that covers a first area with a first historical rate of debris accumulation and does not cover a second area with a second, lower, historical rate of debris accumulation.

In some embodiments, the processor of the VMP robot uses real-time environmental sensor data (or environmental characteristics inferred therefrom) or environmental sensor data aggregated from different working sessions or information from the aggregate map of the environment to dynamically adjust the speed of components and/or activate/deactivate functions of the VMP robot during operation in an environment. For example, an electrical current sensor may be used to measure the amount of current drawn by a motor of a main brush in real-time. The processor may infer the type of driving surface based on the amount current drawn and in response adjusts the speed of components such that they are ideal for the particular driving surface type. For instance, if the current drawn by the motor of the main brush is high, the processor may infer that a robotic vacuum is on carpet, as more power is required to rotate the main brush at a particular speed on carpet as compared to hard flooring (e.g., wood or tile). In response to inferring carpet, the processor may increase the speed of the main brush and impeller (or increase applied torque without changing speed, or increase speed and torque) and reduce the speed of the wheels for a deeper cleaning. Some embodiments may raise or lower a brush in response to a similar inference, e.g., lowering a brush to achieve a deeper clean. In a similar manner, an electrical current sensor that measures the current drawn by a motor of a wheel may be used to predict the type of driving surface, as carpet or grass, for example, requires more current to be drawn by the motor to maintain a particular speed as compared to hard driving surface. In some embodiments, the processor aggregates motor current measured during different working sessions and determines adjustments to speed of components using the aggregated data. In another example, a distance sensor takes distance measurements and the processor infers the type of driving surface using the distance measurements. For instance, the processor infers the type of driving surface from distance measurements of a time-of-flight ("TOF") sensor positioned on, for example, the bottom surface of the VMP robot as a hard driving surface when, for example, when consistent distance measurements are observed over time (to within a threshold) and soft driving surface when irregularity in readings are observed due to the texture of for example, carpet or grass. In a further example, the processor uses sensor readings of an image sensor with at least one IR illuminator or any other structured light positioned on the bottom side of the VMP robot to infer type of driving surface. The processor observes the signals to infer type of driving surface. For example, driving surfaces such as carpet or grass produce more distorted and scattered signals as compared with hard driving surfaces due to their texture. The processor may use this information to infer the type of driving surface.

In some embodiments, the processor infers presence of users from sensory data of a motion sensor (e.g., while the VMP robot is static, or with a sensor configured to reject signals from motion of the VMP robot itself). In response to inferring the presence of users, the processor may reduce motor speed of components (e.g., impeller motor speed) to decrease noise disturbance. In some embodiments, the processor infers a level of debris accumulation from sensory data of an audio sensor. For example, the processor infers a particular level of debris accumulation and/or type of debris based on the level of noise recorded. For example, the processor differentiates between the acoustic signal of large solid particles, small solid particles or air to determine the type of debris and based on the duration of different acoustic signals identifies areas with greater amount of debris accumulation. In response to observing high level of debris accumulation, the processor of a surface cleaning robot, for example, increases the impeller speed for stronger suction and reduces the wheel speeds to provide more time to collect the debris. In some embodiments, the processor infers level of debris accumulation using an IR transmitter and receiver positioned along the debris flow path, with a reduced density of signals indicating increased debris accumulation. In some embodiments, the processor infers level of debris accumulation using data captured by an imaging device positioned along the debris flow path. In other cases, the processor uses data from an IR proximity sensor aimed at the surface as different surfaces (e.g. clean hardwood floor, dirty hardwood floor with thick layer of dust, etc.) have different reflectance thereby producing different signal output. In some instances, the processor uses data from a weight sensor of a dustbin to detect debris and estimate the amount of debris collected. In some instances, a piezoelectric sensor is placed within a debris intake area of the robotic device such that debris may make contact with the sensor. The processor uses the piezoelectric sensor data to detect the amount of debris collected and type of debris based on the magnitude and duration of force measured by the sensor. In some embodiments, a camera captures images of a debris intake area and the processor analyzes the images to detect debris, approximate the amount of debris collected (e.g. over time or over an area) and determine the type of debris collected. In some embodiments, an IR illuminator projects a pattern of dots or lines onto an object within the field of view of the camera. The camera captures images of the projected pattern, the pattern being distorted in different ways depending the amount and type of debris collected. The processor analyzes the images to detect when debris is collected and to estimate the amount and type of debris collected. In some embodiments, the processor infers a level of obstacle density from sensory data of an obstacle sensor. For example, in response to inferring high level of obstacle density, the processor reduces the wheel speeds to avoid collisions. In some instances, the processor adjusts a frame rate (or speed) of an imaging device and/or a rate (or speed) of data collection of a sensor based on sensory data.

In some embodiments, a memory of the VMP robot includes an internal database of types of debris likely to be encountered within the environment. In some embodiments, the processor identifies the type of debris collected in the environment by using the data of various sensors capturing the features of the debris (e.g., camera, pressure sensor, acoustic sensor, etc.) and comparing those features with features of different types of debris stored in the internal database. In some embodiments, the processor determines the likelihood of collecting a particular type of debris in different areas of the environment based on, for example, current and historical data. For example, a VMP robot encounters accumulated dog hair on the surface. Image sensors of the VMP robot capture images of the debris and the processor analyzes the images to determine features of the debris. The processor compares the features to those of different types of debris within the internal database and matches them to dog hair. The processor marks the region in which the dog hair was encountered within a map of the environment as a region with increased likelihood of encountering dog hair. The processor increases the likelihood of encountering dog hair in that particular region with increasing number of occurrences. In some embodiments, the processor further determines if the type of debris encountered may be cleaned by a cleaning function of the VMP robot. For example, a processor of a robotic vacuum determines that the debris encountered is a liquid and that the robotic device does not have the capabilities of cleaning the debris. In some embodiments, the processor of the VMP robot incapable of cleaning the particular type of debris identified communicates with, for example, a processor of another VMP robot capable of cleaning the debris from the environment. In some embodiments, the processor of the VMP robot avoids navigation in areas with particular type of debris detected.

In some embodiments, the processor adjusts speed of components, selects actions of the robotic device, and adjusts settings of the robotic cleaning device, each in response to real-time or aggregated sensor data (or environmental characteristics inferred therefrom). For example, the processor may adjust the speed or torque of a main brush motor, an impeller motor, a peripheral brush motor or a wheel motor, activate or deactivate (or change luminosity or frequency of) ultraviolet (UV) treatment from a UV light configured to emit below a robot, steam and/or liquid mopping (e.g., modulating flow rate of soap or water), sweeping, or vacuuming (e.g., modulating pressure drop or flow rate), set a cleaning schedule, adjust a cleaning path, etc. in response to real-time or aggregated sensor data (or environmental characteristics inferred therefrom). In one instance, the processor of the robotic cleaning device may determine a cleaning path based on debris accumulation data of the aggregate map such that the cleaning path first covers areas with high likelihood of high levels of debris accumulation (relative to other areas of the work environment), then covers areas with high likelihood of low levels of debris accumulation. Or the processor may determine a cleaning path based on cleaning all areas having a first type of flooring before cleaning all areas having a second type of flooring. In another instance, the processor of the robotic cleaning device may determine the speed of an impeller motor based on most likely debris size or floor type marked in the aggregate map such that higher speeds are used in areas with high likelihood of large sized debris or carpet and lower speeds are used in areas with high likelihood of small sized debris or hard flooring. In another example, the processor of the robotic devices determines when to use UV treatment based on data indicating debris type of the aggregate map such that areas with high likelihood of having debris that can cause sanitary issues, such as food, receive UV or other type of specialized treatment.

In a further example, the processor identifies a user in a particular area of the environment using obstacle sensor data collected during an operational session. In response, the processor reduces the speed of noisy components when operating within the particular area or avoids the particular area to reduce noise disturbances to the user. In some embodiments, the processor controls operation of one or more components of the VMP robot based on environmental characteristics inferred from sensory data. For example, the processor deactivates one or more peripheral brushes of a surface cleaning device passing over locations with high obstacle density to avoid entanglement with obstacles. In another example, the processor activates the one or more peripheral brushes passing over location with high level of debris accumulation. In some instances, the processor adjusts the speed of the one or more peripheral brushes according to the level of debris accumulation.

In some embodiments, the processor of the VMP robot determines speed of components and actions of the VMP robot at a location based on different environmental characteristics of the location within an environment. In some embodiments, the processor assigns certain environmental characteristics a higher weight (e.g., importance or confidence) when determining speed of components and actions of the VMP robot. In some embodiments, input into the application of the communication device specifies or modifies environmental characteristics of different locations within the map of the environment. For example, driving surface type of locations, locations likely to have high and low levels of debris accumulation, locations likely to have a specific type or size of debris, locations with large obstacles, etc. are specified or modified using the application of the communication device.

In some embodiments, the processor may use machine learning techniques to predict environmental characteristics using sensor data such that adjustments to speed of components of the VMP robot may be made autonomously and in real-time to accommodate the current environment. Examples can include, but are not limited to, adjustments to the speed of components (e.g., a cleaning tool such a main brush or side brush, wheels, impeller, cutting blade, digger, salt or fertilizer distributor, or other component depending on the type of robot), activating/deactivating functions (e.g., UV treatment, sweeping, steam or liquid mopping, vacuuming, mowing, ploughing, salt distribution, fertilizer distribution, digging, and other functions depending on the type of robot), adjustments to movement path, adjustments to the division of the environment into subareas, and operation schedule, etc. In some embodiments, the processor may use a classifier such as a convolutional neural network to classify real-time sensor data of a location within the environment into different environmental characteristic classes such as driving surface types, room or area types, levels of debris accumulation, debris types, debris sizes, traffic level, obstacle density, human activity level, driving surface quality, and the like. In some embodiments, the processor dynamically and in real-time may adjust the speed of components of the VMP robot based on the current environmental characteristics. Initially, the processor may train the classifier such that it can properly classify sensor data to different environmental characteristic classes. In some embodiments, training may be executed remotely and trained model parameter may be downloaded to the VMP robot, which is not to suggest that any other operation herein must be performed on-VMP robot. The processor may train the classifier by, for example, providing the classifier with training and target data that contains the correct environmental characteristic classifications of the sensor readings within the training data. For example, the processor may train the classifier to classify electric current sensor data of a wheel motor into different driving surface types. For instance, if the magnitude of the current drawn by the wheel motor is greater than a particular threshold for a predetermined amount of time, the classifier may classify the current sensor data to a carpet driving surface type class (or other soft driving surface depending on the environment of the VMP robot) with some certainty. In other embodiments, the processor may classify sensor data based on the change in value of the sensor data over a predetermined amount of time or using entropy. For example, the processor may classify current sensor data of a wheel motor into a driving surface type class based on the change in electrical current over a predetermined amount of time or entropy value. In response to predicting an environmental characteristic, such as a driving type, the processor adjusts the speed of components such that they are optimal for operating in an environment with the particular characteristics predicted, such as a predicted driving surface type. In some embodiments, adjusting the speed of components includes adjusting the speed of the motors driving the components. In some embodiments, the processor also chooses actions and/or settings of the VMP robot in response to predicted (or measured or inferred) environmental characteristics of a location. In other examples, the processor inputs distance sensor data, audio sensor data, or optical sensor data into the classifier to classify the sensor data into different environmental characteristic classes (e.g., different driving surface types, room or area types, levels of debris accumulation, debris types, debris sizes, traffic level, obstacle density, human activity level, driving surface quality, etc.).

In some embodiments, the processor may use environmental sensor data from more than one type of sensor to improve predictions of environmental characteristics. Different types of sensors may include, but are not limited to, obstacle sensors, audio sensors, image sensors, TOF sensors, and/or current sensors. In some embodiments, the processor may provide the classifier with different types of sensor data and over time the weight of each type of sensor data in determining the predicted output is optimized by the classifier. For example, a processor of a VMP robot may use both electrical current sensor data of a wheel motor and distance sensor data to predict driving type, thereby increasing the confidence in the predicted type of driving surface.

In some embodiments, the processor may use thresholds, change in sensor data over time, distortion of sensor data, and/or entropy to predict environmental characteristics. In other instances, the processor uses other approaches for predicting (or measuring or inferring) environmental characteristics of locations within the environment. In some embodiments, to increase confidence in predictions (or measurements or inferences) of environmental characteristics in different locations of the environment, the processor uses a first set of environmental sensor data collected by a first environmental sensor to predict (or measure or infer) an environmental characteristic of a particular location a priori to using a second set of environmental sensor data collected by a second environmental sensor to predict an environmental characteristic of the particular location.

In some embodiments, the VMP robot may initially operate with default settings for various components. For example, the wheels may initially operate at a predetermined speed, resulting in a predetermined speed of the VMP robot. In another example, the main brush, peripheral brush, and impeller of a surface cleaning device may initially operate at a predetermined speed and the vacuum function may initially be activated while the mopping function is deactivated; however, if activated at a later time, the UV light may be activated by default. In some embodiments, default settings may be chosen during manufacturing based on what is suitable for most environments and/or users, or may be chosen by a user to suit a particular environment or their preferences. For example, for an outdoor road sweeper robot setting a default slow speed for a sweeper brush generally conserves energy, slow speed for an impeller of a leaf blower typically reduces sound, high speed for an impeller is usually more effective for leaf blowing, etc.

In some instances, different default settings are set by a user using an application of a communication device (as described above) or an interface of the VMP robot for different areas within an environment. For example, a user or a surface cleaning device may prefer reduced impeller speed in bedrooms to reduce noise or high impeller speed in areas with soft floor types (e.g., carpet) or with high levels of dust and debris. As the VMP robot navigates throughout the environment and sensors collect data, the processor may use the classifier to predict real-time environmental characteristics of the current location of the VMP robot such as driving surface type, room or area type, debris accumulation, debris type, debris size, traffic level, human activity level, obstacle density, etc. In some embodiments, the processor assigns the environmental characteristics to the corresponding grid cell of the map of the environment. In some embodiments, the processor may adjust the default speed of components to best suit the environmental characteristics of the location predicted.

In some embodiments, the processor may adjust the speed of components by providing more or less power to the motor driving the components. For example, for grass, the processor decreases the power supplied to the wheel motors to decrease the speed of the wheels and the VMP robot and increases the power supplied to the cutting blade motor to rotate the cutting blade at an increased speed for thorough grass trimming.

In some embodiments, the processor records all or a portion of the real-time decisions corresponding to a particular location within the environment in a memory of the VMP robot. In some embodiments, the processor marks all or a portion of the real-time decisions corresponding to a particular location within the grid map of the environment. For example, a processor marks the particular cell within the grid map corresponding with the location of the VMP robot when increasing the speed of wheel motors because it predicts a particular driving surface type. In some embodiments, data may be saved in ASCII or other formats to occupy minimal memory space.

In some embodiments, the processor represents and distinguishes environmental characteristics using ordinal, cardinal, or nominal values, like numerical scores in various dimensions or descriptive categories that serve as nominal values. For example, the processor may denote different driving surface types, such as carpet, grass, rubber, hardwood, cement, and tile by numerical categories, such as 1, 2, 3, 4, 5 and 6, respectively. In some embodiments, numerical or descriptive categories may be a range of values. For example, the processor may denote different levels of debris accumulation by categorical ranges such as 1-2, 2-3, and 3-4, wherein 1-2 denotes no debris accumulation to a low level of debris accumulation, 2-3 denotes a low to medium level of debris accumulation, and 3-4 denotes a medium to high level of debris accumulation. In some embodiments, the processor combines the numerical values with a 2D coordinate map of the environment forming a multi-dimensional coordinate map describing environmental characteristics of different locations within the environment, e.g., in a multi-channel bitmap. In some embodiments, the processor updates the grid map with new sensor data collected and/or information inferred from the new sensor data in real-time or after a work session. In some embodiments, the processor generates an aggregate map of all or a portion of the maps generated during each work session wherein the processor uses the environmental characteristics of the same cell predicted in each map to determine probabilities of each environmental characteristic existing in the particular cell.

In some embodiments, the processor uses environmental characteristics of the environment to infer additional information such as boundaries between rooms or areas, transitions between different types of driving surfaces, and types of areas. For example, the processor may infer that a transition between different types of driving surfaces exists in a location of the environment where two adjacent cells have different predicted type of driving surface. In another example, the processor may infer with some degree of certainty that a collection of adjacent cells of the grid map with combined surface area below some threshold and all having hard driving surface are associated with a particular environment, such as a bathroom as bathrooms are generally smaller than all other rooms in an environment and generally have hard flooring. In some embodiments, the processor labels areas or rooms of the environment based on such inferred information.

In some embodiments, the processor may adjust the speed of components of the VMP robot continuously. For example, the processor continuously increases the power provided to the main brush motor as the VMP robot transitions from operating on hardwood floor to carpeted floor. In other embodiments, the processor adjusts speed of components using discrete increments/decrements. For example, the processor may choose from 2, 3, or 4 different levels of speed during operation. In some embodiments, different discrete increments/decrements are used for different components.

In some embodiments, the processor commands VMP robot to complete operation on one type of driving surface before moving on to another type of driving surface. In some embodiments, the processor commands the VMP robot to prioritize operating on cells with a particular environmental characteristic first (e.g., cell with high level of debris accumulation, cells with carpet or grass, cells with minimal obstacles, etc.). In some embodiments, the processor generates a movement path that connects cells with a particular environmental characteristic and the processor commands the VMP robot to operate along the path. In some embodiments, the processor may command the VMP robot to drive over cells with a particular environmental characteristic more slowly or quickly for a predetermined amount of time and/or at a predetermined frequency over a period of time. For example, a processor may command a VMP robot to operate on cells with a particular driving surface type, such as hardwood flooring, five times per week. In some embodiments, a user provides the above-mentioned commands and/or other commands to the VMP robot using an application of a communication device paired with the VMP robot (as described above) or an interface of the VMP robot.

In some embodiments, each wheel motor has an independent controller. In some embodiments, the processor coordinates the controllers of each wheel motor to maintain a desired heading.

In some embodiments, the speed of a motor driving a component may be monitored using an encoder that measures revolutions per minute (RPM). In some embodiments, the controller may obtain the speed in a feedback loop and adjusts the power supplied to the motor to adjust the speed as required. In some embodiments, electric pulses control the RPM of a motor wherein an increase in the number of electric pulses per second translates to a higher RPM. Depending on the physical attribute of the motor and considering each motor is slightly different, the number of electric pulses sent per second can result in a slightly higher or lower RPM than expected. In such instances, the RPM of the motor may be independently measured and the controller may receive feedback and adjust the number of electric pulses per second to achieve the desired RPM. In some embodiments, a PID controller may smoothen adjustments to the RPM of the motor. In some embodiments, the controller may measure the rate of increase or decrease of motor RPM based on the number of electric pulses per second to minimize overshooting and undershooting. In some embodiments, the processor or controller may use angular acceleration or the second derivative to further smoothen RPM adjustment of motors. Smooth adjustment in the speed of motors, such as a sweeper motor or wheel motor is generally desired as pulsed and unpredictable behavior or a sudden change (like an increase or halt in the motor speed) can add a lot of torque pressure to the motor and cause damage.

In some embodiments, the VMP robot may be instructed to remain within an area, avoid crossing a boundary, or the like. For example, in some embodiments a virtual boundary device may be placed at a desired boundary location, such as a doorway between two rooms, and generate a virtual boundary. The processor of the VMP robot may detect the virtual boundary, and may cause the VMP robot to turn away upon detecting the virtual boundary. In some instances, the processor detects the virtual boundary by detecting one or more signals emitted by the virtual boundary device. In some embodiments, the VMP robot is on the virtual boundary when the processor detects two signals emitted by the virtual boundary device simultaneously. Examples of virtual boundary devices are described in U.S. patent application Ser. Nos. 14/673,656, 15/676,902, 14/850,219, 15/177,259, and 15/792,169, the entire contents of which are hereby incorporated by reference. In some embodiments, a user may instruct the VMP robot to avoid crossing a particular boundary. In some embodiments, a user may capture an image of the environment and using an application of a communication device may draw a boundary in the image. The processor may receive the image with drawn boundary and may locate the location of the drawn boundary using SLAM techniques described herein. For example, a user may capture an image of a doorway, draw a line across the doorway using an application and upon receiving the image with drawn boundary by the processor, the processor locates the boundary using SLAM and prevents the VMP robot from crossing the doorway boundary. In some embodiments, a user may instruct the VMP robot to operate in a first room prior to a second room by, for example, providing the instruction in an image captured by the user and delivered to the processor of the VMP robot.

In some embodiments, a simulation program is used to virtually test different algorithms, such as mapping, localization, area division, path planning, collaboration, and the like. In some embodiments, the simulation program includes one or more virtual robots within a virtual environment. In some embodiments, the simulation program includes a simulated graphical user interface of an application that is connected to one or more virtual robots. In some embodiments, the simulation program may include virtual environments of various sizes and shapes. In some embodiments, the virtual environments may include perimeters, doors, different floor types, uneven surfaces, obstacles of various shapes and sizes, and the like. In some embodiments, the simulation program displays the thought process of a virtual processor of a virtual robot. In some embodiments, the simulation program includes simulated sensor data. In some embodiments, the virtual robots may move in various directions within the simulated environment. In some embodiments, the virtual processor of a virtual robot may execute different actions, such as speed of components, direction of travel, speed of travel, division of the environment, mapping of the environment, localization within the environment, etc.

In some embodiments, the methods and techniques described herein may be implemented in a computer program executed on windows, Linux, Mac, or other operating system. In some embodiments, the program code may be a completely embedded in a system using a CPU such as Intel or AMD CPU or ARM CPU or ARM MCU such as Cortex M7 by Atmel or ST Micro. In embodiments, the methods and techniques described herein may be implemented as bare metal code or may use a real-time operating system. The methods and techniques described herein may be implemented on a FPGA or ASIC, etc.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described or illustrated in figures with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

The invention claimed is:

1. A system, comprising:
- an autonomous robotic chassis, the autonomous robotic chassis comprising:
  - a set of wheels coupled to the base;
  - at least one electric motor for rotating the set of wheels of the base;
  - a power module, comprising:
    - a battery, a battery compartment, and a power control circuitry;
- a navigation mechanism, comprising:
  - one or more tangible, non-transitory, machine-readable media storing instructions that when executed by a processor of the system effectuate operations comprising:
    - capturing, with at least one exteroceptive sensor, data of an environment as the autonomous robotic chassis moves within the environment;
      - capturing, with at least one proprioceptive sensor, data indicative of displacement of the autonomous robotic chassis within the environment;

determining, with the processor of the system, a position of the autonomous robotic chassis in a reference coordinate system by selecting a highest probable position of the autonomous robotic chassis with respect to the reference coordinate from a plurality of possible positions computed by:

integrating data indicative of the displacement of the autonomous robotic chassis to the last known position of the autonomous robotic chassis, wherein the data indicative of the displacement of the autonomous robotic chassis is subject to error due to possible drift or wheel slippage that is not reliably recordable; and selecting a highest probable position which accounts for errors by cross referencing each of the plurality of the possible positions with the newly captured data from the environment to find a best fit;

a mechanical interface, comprising:

a coupling mechanism to a plurality of external modules; and a wireless data transmitter and receiver, comprising:

a mechanism for transmitting status information of the autonomous robotic chassis to an external processor.

2. The system of claim 1, wherein the processor of the system determines each possible position by adding the data captured with the at least one proprioceptive sensor to the last known position and at least one possible variation of error in the data indicative of the displacement of the autonomous robotic chassis captured with the at least one proprioceptive sensor.

3. The system of claim 1, wherein the highest probable position of the autonomous robotic chassis, determined with the processor of the system and using the data captured by the at least one exteroceptive sensor, is considered as a corrected position of the autonomous robotic chassis.

4. The system of claim 1, wherein the external processor is a processor of a second autonomous robotic chassis.

5. The system of claim 1, wherein the external processor is a processor of a computing device.

6. The system of claim 1, wherein the external processor is a processor of a cloud system.

7. The system of claim 6, wherein operations further comprising:

processing, with the processor of the system, at least some data of the environment captured by the exteroceptive and data indicative of displacement captured by the at least one proprioceptive sensor on the cloud system.

8. The system of claim 4, wherein the autonomous robotic chassis and the second autonomous robotic chassis collaborate in completing a first task and a second task.

9. The system of claim 8, wherein the first task and the second tasks are complementary tasks.

10. The system of claim 4, wherein the autonomous robotic chassis and the second autonomous robotic chassis collaborate in completing a first part and a second part of a task.

11. The system of claim 1, wherein the autonomous robotic chassis further comprises a speaker module.

12. The system of claim 1, wherein at least one of the external modules among the plurality of external modules is a storage module.

13. The system of claim 12, wherein the storage module stores supplies.

14. The system of claim 12, wherein the storage module stores fluid.

15. The system of claim 12, wherein the storage module comprises a dispensing mechanism.

16. The system of claim 1, wherein the mechanical interface further comprises a coupling mechanism to a service performing module.

17. The system of claim 16, wherein the service performing module comprises a mechanism for delivery of electricity.

18. The system of claim 16, wherein the service performing module comprises a mechanism for delivery of a battery.

19. The system of claim 16, wherein the service performing module comprises a mechanism for cooking.

20. The system of claim 16, wherein the service performing module comprises a mechanism for heating food.

21. The system of claim 16, wherein the service performing module comprises a mechanism for strengthening electrical signals.

22. The system of claim 1, wherein the mechanical interface further comprises a coupling mechanism to a supply carrying module, wherein the supply carrying module comprises a mechanism for distributing supply, wherein the supply is a solid, a fluid, or a gas.

23. The system of claim 1, wherein the mechanical interface further comprises a coupling mechanism to a collection module.

24. The system of claim 23, wherein the collection module comprises a mechanism for collecting small objects, dust, or debris.

25. The system of claim 1, wherein the coupling mechanism is used to attach components to the autonomous robotic chassis for customization.

26. The system of claim 25, wherein the coupling mechanism comprises at least an arm connected to the autonomous robotic chassis using a main gear.

27. The system of claim 26, wherein the arm connected to the autonomous robotic chassis is further connected to a rotatable cap or a clamp.

28. The system of claim 27, wherein the components rotate relative to the cap or the clamp.

29. The system of claim 28, wherein the cap or the clamp opens and closes based on a direction of rotation of the main gear.

30. The system of claim 28, wherein the clamp is used to attach additional components.

31. The system of claim 30, wherein the additional components include any of: a surface scrubber, a wagon, and a lawn mower.

32. The system of claim 28, wherein the arm connected to the autonomous robotic chassis is further connected to an extendable arm, wherein the extendable arm is retractable using solenoid or hydraulics.

33. The system of claim 28, wherein the arm connected to the autonomous robotic chassis is further connected to consecutive links with a motor and a gearbox.

34. The system of claim 33, wherein the additional components are connected to an end link of the consecutive links.

35. The system of claim 34, wherein the additional components include a load receiver, wherein the load receiver is connected to the end link with a pin that fits within ridges of the load receiver.

36. A navigating device with an interface to couple with a plurality of modules, comprising:

an autonomous robotic chassis, comprising:

a set of wheels coupled to a base;

at least one electric motor for rotating the set of wheels of the base;

a power module, comprising:

a battery, a battery compartment, and a power control circuitry; a mechanical interface, comprising:

a coupling mechanism to a plurality of external modules;

a wireless data transmitter and receiver, comprising:

a mechanism for transmitting status information of the autonomous robotic chassis to an external processor;

a plurality of sensors, comprising:

at least one exteroceptive sensor and at least one proprioceptive sensor;

a processor; and one or more tangible, non-transitory, machine-readable media storing instructions that when executed by the processor of the data transmitter and receiver effectuate operations, comprising:

capturing, with the at least one exteroceptive sensor, data of an environment as the autonomous robotic chassis moves within the environment;

capturing, with the at least one proprioceptive sensor, data indicative of displacement of the autonomous robotic chassis within the environment;

determining, with the processor of the data transmitter and receiver, a position of the autonomous robotic chassis in a reference coordinate system by selecting a highest probable position of the autonomous robotic chassis with respect to the reference coordinate system from a plurality of possible positions computed by:

integrating data indicative of the displacement of the autonomous robotic chassis to the last known position of the autonomous robotic chassis, wherein the data indicative of the displacement of the autonomous robotic chassis is subject to error due to possible drift or wheel slippage that are not reliably recordable; and selecting the highest probable position accounts for errors by cross referencing each of the plurality of the possible positions with the newly captured data from the environment to find a best fit.

37. The device of claim 36, wherein the processor of the data transmitter and receiver determines each possible position by adding the data captured with the at least one proprioceptive sensor to the last known position and at least one possible variation of error in the data indicative of the displacement of the autonomous robotic chassis captured with the at least one proprioceptive sensor.

38. The device of claim 36, wherein the highest probable position of the autonomous robotic chassis, determined with the processor of the data transmitter and receiver and using the data captured by the at least one exteroceptive sensor, is considered as a corrected position of the autonomous robotic chassis.

39. The device of claim 36, wherein the external processor is a processor of a second autonomous robotic chassis.

40. The device of claim 36, wherein the external processor is a processor of a computing device.

41. The device of claim 36, wherein the external processor is a processor of a cloud system.

42. The device of claim 41, wherein operations further comprising:

processing, with the processor of the data transmitter and receiver, at least some data of the data of the environment captured by the exteroceptive and data indicative of displacement captured by the at least one proprioceptive sensor on the cloud system.

43. The device of claim 39, wherein the autonomous robotic chassis and the second autonomous robotic chassis collaborate in completing a first task and a second task.

44. The device of claim 43, wherein the first task and the second tasks are complementary tasks.

45. The device of claim 39, wherein the autonomous robotic chassis and the second autonomous robotic chassis collaborate in completing a first part of a task and a second part of a task.

46. The device of claim 36, wherein the autonomous robotic chassis further comprises a speaker module.

47. The device of claim 36, wherein at least one of the external modules among the plurality of external modules is a storage module.

48. The device of claim 47, wherein the storage module stores supplies.

49. The device of claim 47, wherein the storage module stores fluid.

50. The device of claim 47, wherein the storage module further comprises a dispensing mechanism.

51. The device of claim 36, wherein the mechanical interface further comprises a coupling mechanism to a service performing module.

52. The device of claim 51, wherein the service performing module comprises a mechanism for delivery of electricity.

53. The device of claim 51, wherein the service performing module comprises a mechanism for delivery of a battery.

54. The device of claim 51, wherein the service performing module comprises a mechanism for cooking.

55. The device of claim 51, wherein the service performing module comprises a mechanism for heating food.

56. The device of claim 51, wherein the service performing module comprises a mechanism for strengthening electrical signal.

57. The device of claim 36, wherein the mechanical interface further comprises a coupling mechanism to a supply carrying module.

58. The device of claim 57, wherein the supply carrying module comprises a mechanism for distributing supply.

59. The device of claim 58, wherein the supply is a solid, a fluid, or a gas.

60. The device of claim 36, wherein the mechanical interface further comprises a coupling mechanism to a collection module.

61. The device of claim 60, wherein the collection module comprises a mechanism for collecting small objects, dust, or debris.

62. The device of claim 36, wherein the coupling mechanism is used to attach components to the autonomous robotic chassis for customization.

63. The device of claim 62, wherein the coupling mechanism comprises at least an arm connected to the autonomous robotic chassis using a main gear.

64. The device of claim 63, wherein the arm connected to the autonomous robotic chassis is further connected to a rotatable cap or a clamp.

65. The device of claim 64, wherein the components rotate relative to the cap or the clamp.

66. The device of claim 65, wherein the cap or the clamp opens and closes based on a direction of rotation of the main gear.

67. The device of claim 64, wherein the clamp is used to attach additional components, wherein the additional components include any of: a surface scrubber, a wagon, and a lawn mower.

68. The device of claim 63, wherein the arm connected to the autonomous robotic chassis is further connected to an extendable arm, wherein the extendable arm is retractable using solenoid or hydraulics.

69. The device of claim 63, wherein the arm connected to the autonomous robotic chassis is further connected to consecutive links with a motor and a gearbox.

70. The device of claim 69, wherein the additional components are connected to an end link of the consecutive links.

71. The device of claim 70, wherein the additional components include a load receiver, wherein the load receiver is connected to the end link with a pin that fits within ridges of the load receiver.

72. One or more tangible, non-transitory, machine-readable media storing instructions that when executed by a processor of a wireless data transmitter and receiver effectuate operations comprising:

capturing, with at least one exteroceptive sensor, data of an environment as an autonomous robotic chassis moves within the environment;

capturing, with at least one proprioceptive sensor, data indicative of displacement of the autonomous robotic chassis within the environment;

determining, with the processor of the data transmitter and receiver, a position of the autonomous robotic chassis in a reference coordinate system by selecting a highest probable position of the autonomous robotic chassis with respect to the reference coordinate system from a plurality of possible positions computed by:

integrating data indicative of the displacement of the autonomous robotic chassis to the last known position of the autonomous robotic chassis, wherein the data indicative of the displacement of the autonomous robotic chassis is subject to error due to possible drift or wheel slippage that is not reliably recordable; and selecting the highest probable position accounts for errors by cross referencing each of the plurality of the possible positions with newly captured data to find a best fit.

73. The media of claim 72, wherein the processor of the data transmitter and receiver determines each possible position by adding the data captured with the at least one proprioceptive sensor to the last known position and at least one possible variation of error in the data indicative of the displacement of the autonomous robotic chassis captured with the at least one proprioceptive sensor.

74. The media of claim 72, wherein the highest probable position of the autonomous robotic chassis, determined with the processor of the data transmitter and receiver and using the data captured by the at least one exteroceptive sensor, is considered as a corrected position of the autonomous robotic chassis.

75. The media of claim 72, wherein the data transmitter and receiver comprises a mechanism for transmitting status information of the autonomous robotic chassis to an external processor.

76. The media of claim 75, wherein the external processor is a processor of a second autonomous robotic chassis.

77. The media of claim 75, wherein the external processor is a processor of a computing device.

78. The media of claim 75, wherein the external processor is a processor of a cloud system.

* * * * *